US012487861B2

(12) United States Patent
Talavera

(10) Patent No.: US 12,487,861 B2
(45) **Date of Patent: *Dec. 2, 2025**

(54) COMPLEX COMPUTING NETWORK FOR CONTROLLING COMPUTING OPERATIONS BASED ON A COMPUTING LOAD

(71) Applicant: Lilly R. Talavera, Allen, TX (US)

(72) Inventor: Lilly R. Talavera, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/922,360

(22) Filed: Oct. 21, 2024

(65) Prior Publication Data

US 2025/0117261 A1 Apr. 10, 2025

Related U.S. Application Data

(63) Continuation-in-part of application No. 18/916,544, filed on Oct. 15, 2024, and a continuation-in-part of application No. 18/402,659, filed on Jan. 2, 2024, now Pat. No. 12,124,881, said application No. 18/916,544 is a continuation-in-part of application No. 18/402,659, filed on Jan. 2, 2024, now Pat. No. 12,124,881, application No. 18/922,360 is a continuation-in-part of application No. PCT/US2024/010003, filed on Jan. 1, 2024.

(60) Provisional application No. 63/617,051, filed on Jan. 2, 2024, provisional application No. 63/546,234, filed on Oct. 29, 2023, provisional application No. 63/546,235, filed on Oct. 29, 2023, provisional application No. 63/544,227, filed on Oct. 15, 2023, provisional application No. 63/543,100, filed on Oct. 8, 2023, provisional application No. 63/543,101, filed on Oct. 8, 2023, provisional application No. 63/461,314, filed on Apr. 23, 2023, provisional application No. 63/461,313, filed on Apr. 23, 2023, provisional application No. 63/436,582, filed on Dec.

(Continued)

(51) Int. Cl.
*G06F 9/50* (2006.01)

(52) U.S. Cl.
CPC ........ *G06F 9/505* (2013.01); *G06F 2209/503* (2013.01)

(58) Field of Classification Search
CPC ........................................................ G06F 9/505
See application file for complete search history.

(56) References Cited

U.S. PATENT DOCUMENTS 5,845,257 A 12/1998 Fu et al.
7,093,004 B2 * 8/2006 Bernardin .............. G06F 9/505 709/219

(Continued)

FOREIGN PATENT DOCUMENTS

WO 2021205240 10/2021

OTHER PUBLICATIONS

International Search Report and Written Opinion of the International Searching Authority dated Apr. 24, 2024 in connection with International Application No. PCT/US24/10003, 10 pages.

(Continued)

*Primary Examiner* — Charlie Sun

(57) ABSTRACT

This disclosure is directed to intelligent synchronization of computing users, and associated timing data, based on parameters or data received from computing systems connected via wireless, satellite, wire-based, optical-fiber based, etc., computing networks.

30 Claims, 206 Drawing Sheets

Related U.S. Application Data

31, 2022, provisional application No. 63/436,580, filed on Dec. 31, 2022.

(56) References Cited

U.S. PATENT DOCUMENTS

| | | | |
|---|---|---|---|
| 7,668,785 | B1 | 2/2010 | Hammad |
| 7,720,871 | B2 | 5/2010 | Rogers |
| 8,392,206 | B2 | 3/2013 | Parekh |
| 8,694,624 | B2 | 4/2014 | Sinha |
| 8,700,659 | B2 | 4/2014 | Skeen |
| 8,935,279 | B2 | 1/2015 | Skeen |
| 9,529,867 | B1 | 12/2016 | Blevins |
| 10,102,546 | B2 | 10/2018 | Heath |
| 10,225,689 | B2 | 3/2019 | Du |
| 11,144,563 | B2 | 10/2021 | Peterson |
| 2002/0122355 | A1 | 9/2002 | Williams |
| 2007/0156664 | A1 | 7/2007 | Norton |
| 2009/0164283 | A1 | 6/2009 | Coley |
| 2010/0070894 | A1 | 3/2010 | Krishnamurthy |
| 2011/0191417 | A1 | 8/2011 | Rathod |
| 2013/0073366 | A1 | 3/2013 | Heath |
| 2013/0339877 | A1 | 12/2013 | Skeen |
| 2015/0033147 | A1 | 1/2015 | Patel |
| 2017/0171581 | A1 | 6/2017 | Mulligan |
| 2023/0070950 | A1 * | 3/2023 | Matsuoka ............. G06F 9/5038 |
| 2024/0039905 | A1 | 2/2024 | Talavera |

OTHER PUBLICATIONS

Non-Final Office Action dated Jan. 4, 2024 in connection with U.S. Appl. No. 18/377,819, 10 pages.

Final Office Action dated Apr. 17, 2024 in connection with U.S. Appl. No. 18/377,819, 25 pages.

Xie, H. (2005). User model-driven architecture for information retrieval in construction project management (Order No. 3178054). (Year:2005).

Kalia, S. (2016). Efficient search algorithms for social networking scheduling applications (Order No. 10142569). Available from ProQuest Dissertations and Theses Professional. (Year: 2016).

Talavera, L. (2024). International Application No. PCT/US24/10003 filed Jan. 1, 2024.

Notice of Allowance dated Nov. 13, 2024 in connection with U.S. Appl. No. 18/377,819, 11 pages.

* cited by examiner

Category to separate by pre-loaded, redeemable, Refundable, held till date is completed etc.

Trust Fund Separating Payments

| | | |
|---|---|---|
| 500 | Dinner at March 1st<br>XYZ Trust Fund | |
| 500 | Refundable payment<br>If she doesn't show up | |
| 300 | Booked shopping Trip<br>Trust fund Refundable if she doesn't show | |
| 200 | Booked Refundable shopping Trip Creator (time, gas) | |
| 5,000 | Concierge Service<br>Hand-Picked Girls | |
| 5,000 | Pre-loaded funds account to be redeemed | |

Time, date, location, Model etc

Time payment if she doesn't show up

Shopping Trip Payment Trust Fund

Time payment to Creator & breakdown of what that means

Pre-paid funds to platform for discounts

Potential discounts for preloading account

FIG. 76

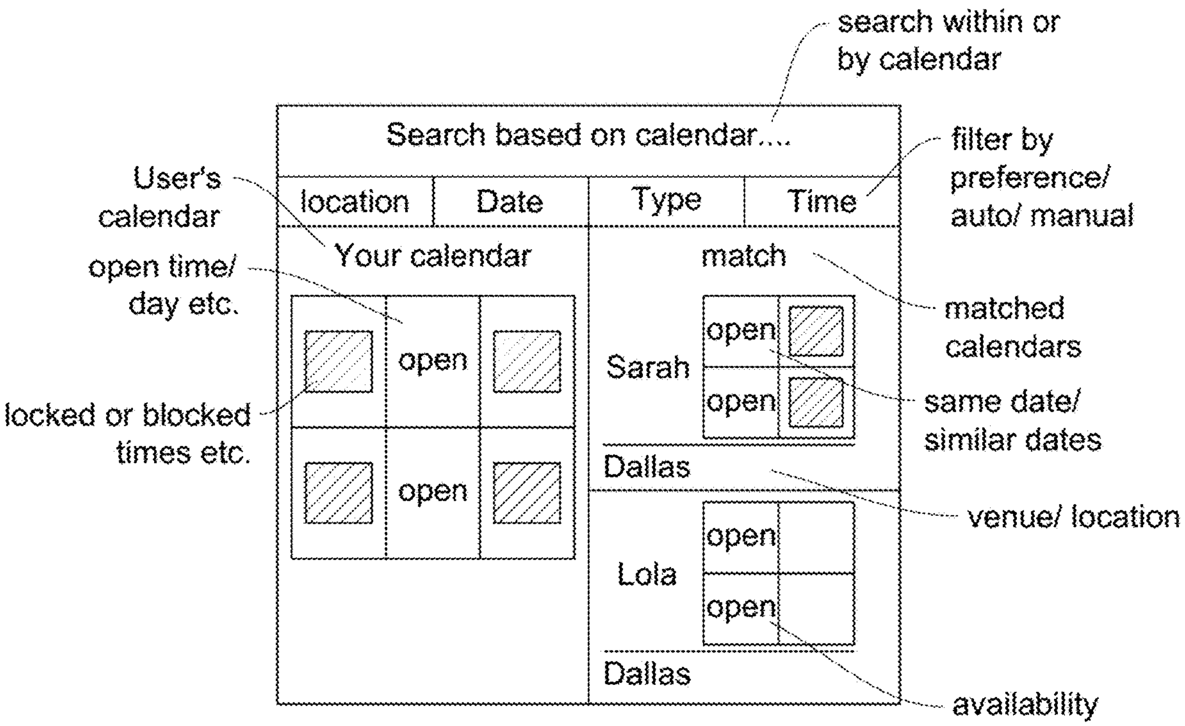
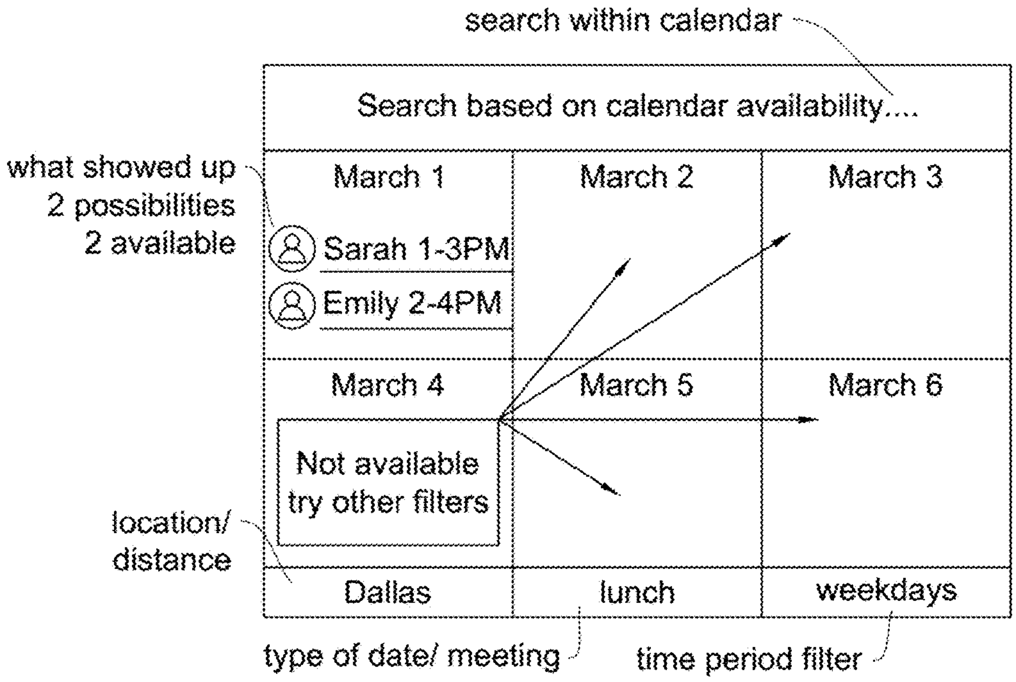
FIG. 157

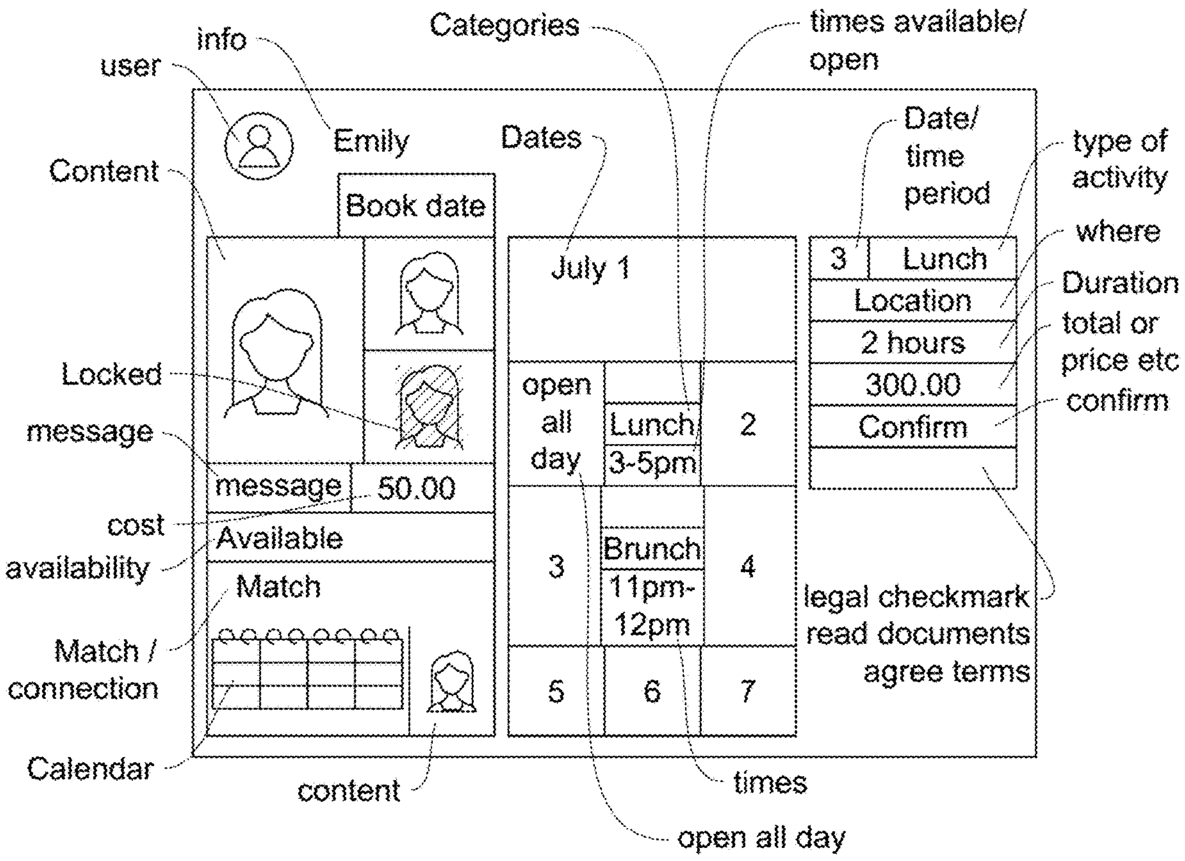
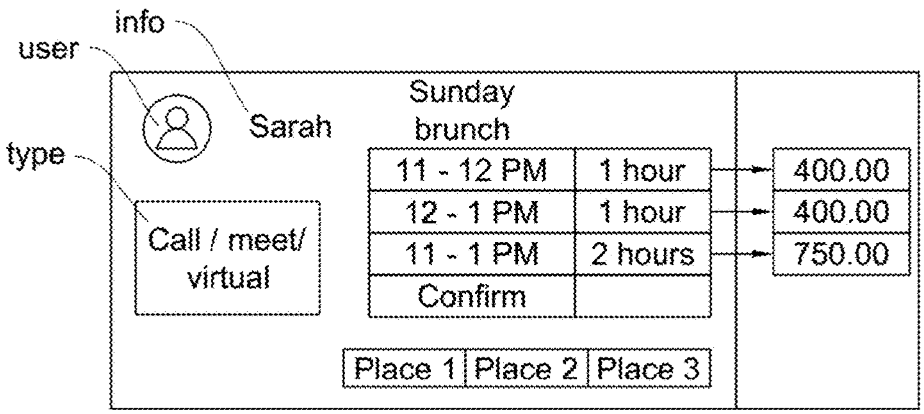
FIG. 197

I need help with /
I need to hire

| |
|---|
| Dog care |
| nanny |
| babysitter |
| Food |
| gas |
| Utilities |

I need more for

| |
|---|
| gas |
| makeup |
| Food |
| Doggy Daycare |
| Bills |

FIG. 269

| |
|---|
| gas fee |
| valet fee |
| Spilling food / Drink or Dress |

Breakdown/ Summary/ itemized

| | |
|---|---|
| 500 | Date |
| 300 | Dinner |
| 100 | Taxes |
| 200 | Fees |
| 1100 | Total |

FIG. 270

COMPLEX COMPUTING NETWORK FOR CONTROLLING COMPUTING OPERATIONS BASED ON A COMPUTING LOAD

CROSS-REFERENCE TO RELATED APPLICATIONS

This application is a continuation-in-part of U.S. application Ser. No. 18/402,659, filed on Jan. 2, 2024, issued as U.S. Pat. No. 12,124,881 on Oct. 22, 2024, which claims the benefit of U.S. Provisional Application No. 63/436,582, filed on Dec. 31, 2022, U.S. Provisional Application No. 63/461,314, filed on Apr. 23, 2023, U.S. Provisional Application No. 63/543,101, filed on Oct. 8, 2023, and U.S. Provisional Application No. 63/546,235, filed on Oct. 29, 2023, all of which are incorporated by reference into this application for all purposes. This application is also a continuation-in-part of U.S. application Ser. No. 18/916,544, filed on Oct. 15, 2024, which claims the benefit of U.S. Provisional Application No. 63/617,051, filed on Jan. 2, 2024 and U.S. Provisional Application No. 63/544,227, filed on Oct. 15, 2023, all of which are incorporated by reference into this application for all purposes. U.S. application Ser. No. 18/916,544, filed on Oct. 15, 2024, is also a continuation-in-part of U.S. application Ser. No. 18/402,659, filed on Jan. 2, 2024, issued as U.S. Pat. No. 12,124,881 on Oct. 22, 2024, which claims the benefit of U.S. Provisional Application No. 63/436,582, filed on Dec. 31, 2022, U.S. Provisional Application No. 63/461,314, filed on Apr. 23, 2023, U.S. Provisional Application No. 63/543,101, filed on Oct. 8, 2023, and U.S. Provisional Application No. 63/546,235, filed on Oct. 29, 2023, all of which are incorporated by reference into this application for all purposes. This application is also a continuation-in-part of PCT/US2024/010003. filed on Jan. 1, 2024, which claims the benefit of U.S. Provisional Application No. 63/436,580, filed on Dec. 31, 2022, U.S. Provisional Application No. 63/461,313, filed on Apr. 23, 2023. U.S. Provisional Application No. 63/543,100, filed on Oct. 8, 2023, and U.S. Provisional Application No. 63/546,234, filed on Oct. 29, 2023.

TECHNICAL FIELD

This disclosure is directed to efficiently and/or intelligently synchronizing computing users based on parameters and/or data received from disparate computing systems.

BACKGROUND

There is a need to improve the speed and efficiency of synchronizing computing device users and their timing data in complex computing networks.

BRIEF DESCRIPTION OF THE DRAWINGS

FIGS. 1C, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87A, 87B, 88, 89, 90, 91, 92, 93, 94, 95, 96, 97, 98A, 98B, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261A, 261B, 262, 263, 264, 265, 266, 267, 268, 269, 270, 271, 272, 273, 274, 275, 276, 277, 278, 279, 280, 281, 282, 283A, 283B, 284, 285A, 285B, 286, 287 are user interfaces and/or process flows (methods) according to some embodiments of the disclosure;

Figure 1A:
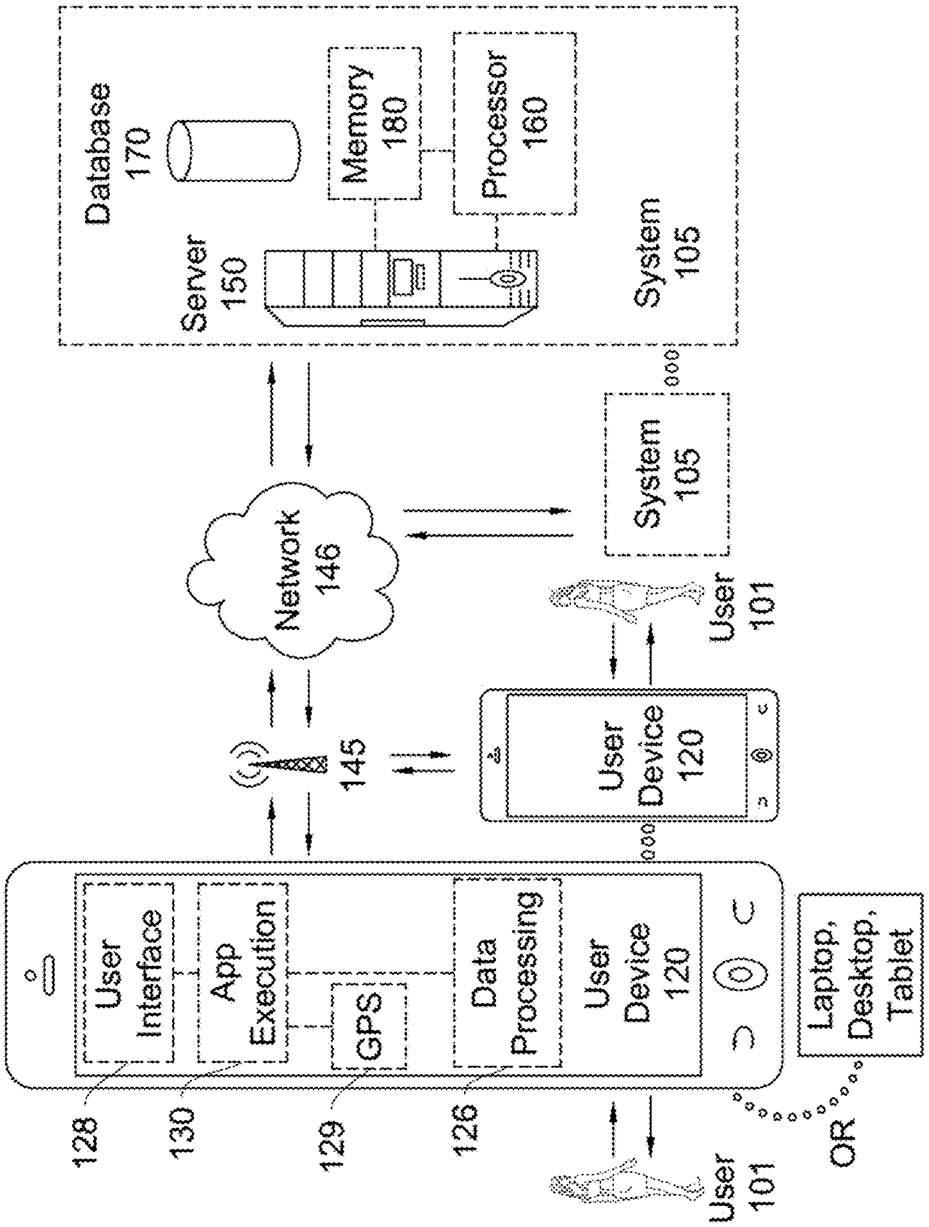
FIG. 1A is a network diagram for executing any methods described herein by some embodiments of the disclosure.

All of these drawings are illustrations of exemplary embodiments. The scope of the claims is not limited to the exemplary embodiments illustrated in the drawings and described herein.

DETAILED DESCRIPTION OF THE EMBODIMENTS

This disclosure is directed to intelligent synchronization of computing users, and associated timing data, along with novel arrangement of display data, based on parameters or data received from computing systems connected via wireless, satellite, wire-based, optical fiber based, etc., computing networks.

In some embodiments, any computing device, system, or apparatus described herein may be a (e.g., mobile or non-mobile computing device, a mobile phone, laptop, tablet, watch, e-reader, headgear, eyewear, a front-end or back-end server, a hologram, etc.) Any computing device may have voice and data capabilities. In some embodiments, the term "data" may refer to "signal" or "information." In some embodiments, the terms "signal," "data," and "information" may be used interchangeably. Any reference to data may also include references to the contents of the data. Any signals described herein may be electronic or electromagnetic signals.

Additionally, any signals described herein may be transitory or non-transitory. In some embodiments, signals are non-transitory signals. Additionally, any signals described herein may be analog signals, digital signals, and/or mixed analog and digital signals. The terms "system," "apparatus," "server," "box," "agent," "device," "unit," "sub- unit," "element," "application," "infrastructure," etc., may be used interchangeably. In some embodiments, any data or data set described herein may be structured or unstructured. In some embodiments, a method is provided for performing the various steps performed by any system described herein. In some embodiments, a non-transitory computer-readable medium comprising code is provided for causing a system to perform the methods described herein. In some embodiments, a system may comprise one or more physical housings that include various units, such as those illustrated in FIG. 1B. In some embodiments, a chipset may be disposed in one or more housings and interfaced with one or more hardware processors. The chipset may have hardware (e.g., electronic components in an electronic circuit) for supporting various connections within the system or any other link from the system to external systems. Any embodiments, elements, features, processes, etc.) which may be combined with any other embodiments, elements, features, processes, etc.) Any description in this disclosure associated with an interface, process flow, system, or embodiment may apply to one or more of any other interface, process flow, system, or embodiment.

FIG. 1A describes a schematic block diagram of a network system for executing the methods described herein. While the user device 120 is shown as a mobile phone, in other embodiments, the user device 120 may be any other mobile or non-mobile computing device, including laptops, desktops, tablets, gaming devices, wearable devices, eyewear, headgear, Internet of Things (IoT) devices, etc.) The illustrated network 146, such as the Internet or an intranet, may exchange data between the server 150 and the user device 120.

According to some embodiments, a user 101 and/or another computer interacts with the disclosed systems 100 for executing the methods disclosed herein. Disclosed user devices 120 may include computing devices capable of sending data and communicating over the internet with one or more servers 150, other user devices 120, or other computing devices. The methods described herein may be executed by at least one user device 120 (e.g., using the app execution 130 and data processing 126 systems), the server 150 (e.g., using the processor 160), or a combination of both.

A wireless communications network 145 may be a 3G network, 4G network, LTE, 5G, 6G, Wi-Fi, Bluetooth, satellite, wired, underwater, cellular, or any other network protocol. It may be a combination of any number of networks. Further, as mentioned above, a wired network connection, such as a conventional Ethernet connection, could be used with a personal computer with an Ethernet port. User devices 120 or servers 150 may include processors 430, such as digital signal processors or microprocessors for performing the different methods described in this specification.

Although the servers 150 illustrated in the present figure are illustrated as stand-alone computing machines, the computing functionality, including servers 150, processors or processor instances 160, memory or computing data storage areas 180, and databases 170 may be provided through a cloud implementation or by a hybrid enterprise/cloud architecture. It is understood that the terms system, apparatus, device, etc.) may be used interchangeably in this specification. In some embodiments, a method is provided for performing the various steps performed by any computing device, e.g., user device 120 and/or server 150, described herein. In some embodiments, a non-transitory computer-readable medium comprising code is provided for causing any user device 120, computing device, or server 150 to perform the methods described herein. The scope of any claims that may be a part of this application or any application stemming from the present application shall be determined by those claims as read in light of the claims. Still, the elements of the particularly illustrated embodiments shall not be imputed to the claim language unless particularly invoked through the use of means-plus-function language under 35 U.S.C. Section 112 (f).

Figure 1B:
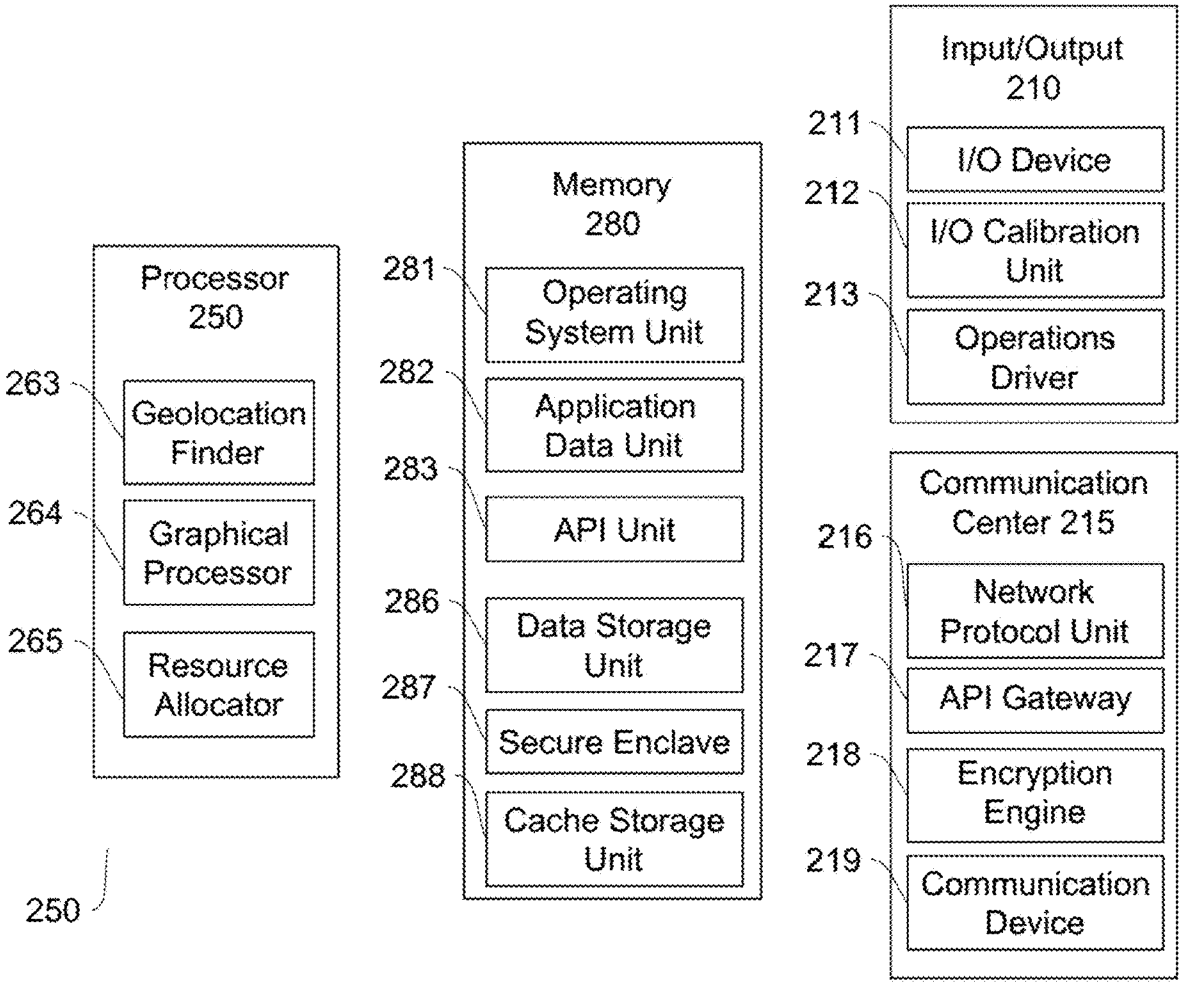
FIG. 1B is a system diagram for executing any methods described herein by some embodiments of the disclosure.

FIG. 1B illustrates an exemplary complex computing environment by some embodiments of the disclosure. For example, the computing environment may be included in and/or utilized by the system, the user device, and/or any other system described herein. The computing environment and/or any of its units and/or sub-units described herein may include general hardware, specifically-purposed hardware, and/or specially purposed software.

The computing environment may include, among other units, a processor 260, a memory 280, an input/output (I/O) unit 210, and a communication center 215. As described herein, each of the processor, the memory, the I/O unit, and/or the communication interface may include and/or refer to a plurality of respective units, sub-units, and/or elements. The various units may be implemented entirely in hardware, entirely in software, or in a combination of hardware and software. Some of the units may be optional. Any software described herein may be specially purposed software for performing a particular function. In some embodiments, hardware may also be specially purposed hardware for performing some specific functions.

Furthermore, each of the processor, the memory unit, the I/O unit, the communication unit, and/or the other units in FIG. 1B, may be operatively and/or otherwise communicatively coupled with each other using a chipset such as an intelligent chipset or a non-intelligent chipset. The chipset may have hardware for supporting connections in the computing environment and connections made to external systems from the computing environment. While various units of FIG. 1B are presented as separate units, some of the units may be comprised in other units. Additionally, some of the units may be optional. Additionally, one or more units may be coupled or connected (e.g., via a wired or wireless connection) to other units. For example, the processor may be connected to one or more other units in FIG. 1B.

As illustrated in FIG. 1B, a server 250 (which may be the system 105 or may be comprised in the system 105) may include, among other elements, any combination of a processor 260, a memory 280, an input/output (I/O) 210, and a communication center 215. As described in present embodiments, each of the processor 260, the memory 280, the I/O 210, and communication center 215 may include a plurality of respective units, subunits, and/or elements. Furthermore, each of the processor 260, the memory 280, the I/O 210, and the communication center 215 may be operatively or otherwise communicatively coupled with each other so as to facilitate the methods and techniques described herein. In some embodiments, at least some of the processor 260, the memory 280, the I/O 210, and the communication center 215, or any portions thereof, may be present include in one or more user devices 120. In some embodiments, methods, or portions thereof, may be performed entirely by one or more servers 150, one or more user devices 120, or may be performed by a combination of one or more servers 150 and one or more user devices 120. In some embodiments, an application server may be provided for downloading an application or software to user devices for performing the various methods described herein.

The processor 260 may control any one or more of the memory 280, the I/O 20, the communication center 215, or any other unit which may include the server 250, as well as any included subunits, elements, components, devices, or functions performed by each or a combination of the memory 280, the I/O 210, the communication center 215 or any other unit which may include the server 250. Any of the elements or sub-elements of the server 250 presented here may also be included in a similar fashion in any of the other units, subunits, and devices included in the operating system 100 of FIG. 1A. Additionally, any actions described herein as being performed by a processor 260 may be taken by the processor 260 alone, or by the processor 260 in conjunction with one or more additional processors, units, subunits, elements, components, devices, and the like. Additionally, while only one processor 260 may be shown in the figures included here, multiple processors may be present or otherwise included in the server 250 or elsewhere in the operating system of FIG. 1A. Thus, while instructions may be described as being executed by the processor 260 or the various subunits of the processor 263, 264, 265, the instructions may be executed simultaneously, serially, or otherwise by one or more multiple processors 260.

In some embodiments, a processor 260 may be implemented as one or more computer processor (CPU) chips, graphical processor (GPU) chips, or some combination of CPU chips and GPU chips, and may include a hardware device capable of executing computer instructions. In some embodiments, the processor 260 may execute any combination of instructions, codes, computer programs, and scripts. The instructions, codes, computer programs, and scripts may be received from, stored in, or received from and stored in any combination of the memory 280, the I/O 210, the communication center 215, subunits of the previously described elements, other devices, other computing environments. In some embodiments, various portions of any of the methods described herein may be executed either in series or in parallel.

In some embodiments, the processor 260 may include, among other elements, subunits. Subunits may include any combination of a geolocation finder 263, a graphical processor 264, and a resource allocator 265. Each of these subunits of the processor 260 may be communicatively or otherwise operably coupled with each other. Any of the subunits described with respect to any units or systems may be optionally included those units or systems.

The geolocation finder 263, particularly in communication with geolocation information provided by GPS subsystems 129 of user devices 120 (see FIG. 1A) may facilitate any combination of detection, generation, modification, analysis, transmission, and presentation of location information. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. In some embodiments, the geolocation finder 263 may include any one or a combination of various sensors, specifically-purposed hardware elements for enabling the geolocation finder 263 to acquire, measure, and transform location information.

The graphical processor (GPU) 264 may facilitate any combination of generation, modification, analysis, processing, transmission, and presentation of visual content. In some embodiments, the GPU 264 may be configured to receive multiple images from a user and perform analysis on and/or modifications to the images. Further, the GPU 264 may be configured to facilitate adjustments to videos and images associated with a user. In some embodiments, the GPU 264 may also be configured to render visual content for presentation on a user device 120 and/or to analyze visual content for metadata associated with a user or a user device. In some embodiments, the GPU 264 may include multiple GPUs and may therefore be configured to perform and/or execute multiple processes in parallel.

The resource allocator 265 may facilitate any one or combination of the determination, monitoring, analysis, and allocation of resources throughout the server 250, the system 100, any component of the system 100, or other computing environments. For example, the resource allocator 265 may facilitate interaction between the server 250, any subunit of the server 250, and a high volume (e.g., multiple) of users or associated user devices 120. As such, computing resources of the server 250 utilized by any one or a combination of the processor 260, the memory 280, the I/O 210, the communication center 215, and any subunit of these units, such as processing power, data storage space, network bandwidth, and the like may be in high demand at various times during operation. Accordingly, the resource allocator 265 may be configured to manage the allocation of various computing resources as they are required by particular units or particular subunits of the server 250.

In some embodiments, the resource allocator 265 may include sensors and/or other specially-purposed hardware for monitoring performance of each unit and/or subunit of the server 250, as well as hardware for responding to the computing resource needs of each unit or subunit. In some embodiments, the resource allocator 265 may utilize computing resources of a second computing environment separate and distinct from the server 250 to facilitate a desired operation.

In some embodiments, factors affecting the allocation of computing resources by the resource allocator 265 may include the number of ongoing user device connections and/or other communication channel connections, a duration, check-in, check-out, time stamp, time record, time and data record, location, time and data record, coordinate(s), during which computing resources are required by one or more elements of the server 250, and/or the like. In some embodiments, computing resources may be allocated to and/or distributed amongst a plurality of second computing environments included in the server 250 based on one or more factors mentioned above. In some embodiments, the allocation of computing resources of the resource allocator 265 may include one or more resource allocators 265 flipping a switch, adjusting processing power, adjusting memory size, partitioning a memory element, transmitting data, controlling one or more input and/or output devices, modifying various communication protocols, and the like. In some embodiments, the resource allocator 265 may facilitate utilization of parallel processing techniques such as dedicating a plurality of GPUs included in the processor 260 for processing high-quality analysis and manipulation of images and/or videos.

In some embodiments, the memory 280 may be utilized for one or any combination of storing, recalling, receiving, transmitting, and/or accessing various files and/or information during operation of the server 250. For example, the memory 280 may be utilized for storing recalling, and/or updating any datasets described herein. The memory 280 may include various types of data storage media such as solid state storage media, hard disk storage media, and any other type of data storage medium which may be known to a person of ordinary skill in the art. In some embodiments, the memory 280 may include dedicated hardware elements such as hard drives and/or servers, as well as software elements such as cloud-based storage drives. For example, the memory unit 280 may include various subunits such as an operating system unit 281, an application data unit 282, an application programming interface (API) unit 283, a data storage unit 286, a secure enclave 287, and/or a cache storage unit 288.

The memory 280 and any of its subunits described here may include any one or any combination of random access memory (RAM), read only memory (ROM), and various forms of secondary storage. RAM may be used to store volatile data and/or to store instructions that may be executed by the processor 260. For example, the data stored may be any one or a combination of a command, a current operating state of the server 250, an intended operating state of the server 250, and the like. As a further example, data stored in the memory 280 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory 280 may include one or more databases for storing any data described here, e.g., In some embodiments, the database 170 of FIG. 1A. Additionally or alternatively, one or more secondary databases located remotely from the server 250 may be utilized and/or accessed by the memory 280.

The operating system unit 281 may facilitate deployment, storage, access, execution, and/or utilization of an operating system utilized by the server 250 and/or any other computing environment described herein. In some embodiments, the operating system may include various hardware and/or software elements that serve as a structural framework for enabling the processor 260 to execute various operations such as the analysis of data received from user devices 120, etc.) The operating system unit 281 may further store various pieces of information and/or data associated with operation of the operating system and/or the server 250 as a whole, such as a status of computing resources (e.g., processing power, memory availability, resource utilization, and/or the like), runtime information, modules to direct execution of operations described herein, user permissions, security credentials, and the like.

The application data unit 282 may facilitate deployment, storage, access, execution, and/or utilization of an application utilized by the server 250 or any other computing environment described herein (e.g., a user device 120). For example, users may be required to download, access, and/or otherwise utilize a software application on a user device 120 such as a smartphone or other internet-enabled device in order for various operations described herein to be performed. As such, the application data unit 282 may store any information and/or data associated with the application which may allow the application and/or user device 220 to perform methods described herein. As such, information included in the application data unit 282 may enable a user to execute various operations described here. The application data unit 282 may further store various pieces of information and/or data associated with operation of the application and/or the server 250 as a whole, such as a status of computing resources (e.g., processing power, memory availability, resource utilization, and/or the like), runtime information, modules to direct execution of operations described herein, user permissions, security credentials, and the like.

The application programming interface (API) unit 283 may facilitate deployment, storage, access, execution, and/or utilization of information associated with APIs of the server 250 and/or any other computing environment described herein (e.g., a user device). For example, server 250 may include one or more APIs for enabling various devices, applications, and/or computing environments to communicate with the server 250, multiple other servers, databases, or other user devices. Accordingly, the API unit 283 may include API databases containing information that may be accessed and/or utilized by applications and/or operating systems of other devices and/or computing environments associated with the methods described herein. An API may direct communications between the background component of the user device 120 and the server 250. In some embodiments, each API database may be associated with a customized physical circuit included in the memory unit 280 and/or the API unit 283. Additionally, each API database may be public and/or private, and so authentication credentials may be required to access information in an API database.

The data storage unit 286 may facilitate one or more of deployment, storage, access, analysis, and utilization of data content by the server 250 and any other computing environment described herein (e.g., a user device). Data content may be text, numbers, images, videos, voice files, and any other form of media. For example, the data storage unit 286 may store one or more images which may be uploaded from a user device. Further, the data storage unit 286 may store one or more images which have been manipulated by any unit or subunit of a server 150 or user device. In some embodiments, the data storage unit 286 may communicate with the GPUs 264 to facilitate any of the processes described here.

The secure enclave 287 may facilitate secure storage of data. In some embodiments, the secure enclave 287 may include a partitioned portion of storage media included in the memory unit 280 that is protected by various security measures. For example, the secure enclave 287 may be hardware secured. In other embodiments, the secure enclave 287 may include one or more firewalls, encryption mechanisms, and/or other security-based protocols. Authentication credentials of a user may be required prior to providing the user access to data stored within the secure enclave 287. In some embodiments, the secure enclave 287 may store sensitive user information.

The cache storage unit 288 may facilitate short-term deployment, storage, access, analysis, and/or utilization of data. In some embodiments, the cache storage unit 288 may serve as a short-term storage location for data so that the data stored in the cache storage unit 288 may be accessed quickly. In some embodiments, the cache storage unit 288 may include RAM and/or other storage media types that enable quick recall of stored data. The cache storage unit 288 may include a partitioned portion of storage media included in the memory 280. In some embodiments, the cache storage unit 288 may store any data described herein.

In some embodiments, the memory 280 or the processor 260 may include one or more data sensors for sensing parameters associated with any data described herein.

The I/O unit 210 may include hardware and/or software elements for enabling the server 250 to receive, transmit, and/or present information. For example, elements of the I/O unit 250 may be used to receive user input from a user via a user device 220, and the like. In this manner, the I/O unit 210 may enable the server 250 to interface with a human user in a manner such that the user may use the methods described here. As described, the I/O unit 210 may include subunits such as any one or a combination of an I/O device 211, an I/O calibration unit 212, and/or operations driver 213.

The I/O device 210 may facilitate any one or any combination of the receipt, invoice, total, partial, breakdown, bill, transmission, processing, presentation, display, input, and output of information as a result of executed processes described here. In some embodiments, the I/O device 210 may include a plurality of I/O devices. In some embodiments, the I/O device 210 may include one or more elements of any one or a combination of a user device 120, a server 250, and/or a similar device(s).

The I/O device 211 may include a variety of elements that enable a user to interface with the server 250. For example, the I/O device 211 may include a keyboard, a touchscreen, hologram, interface, viewing display, a button, a sensor, a biometric sensor, a laser, a microphone, a camera, an internet-enabled device, and/or another element for receiving and/or collecting input from a user. Additionally and/or alternatively, the I/O device 211 may include a display, a screen, hologram, interface, viewing display, a sensor, a vibration mechanism, a light emitting diode (LED), a speaker, a radio frequency identification (RFID) sensor, and/or another element for presenting and/or otherwise outputting data to a user. In some embodiments, the I/O device 211 may communicate with one or more elements of the processor 260 and/or the memory unit 280 to execute operations described herein. For example, the I/O device 211 may include a display, which may utilize the GPU 264 to present media content stored in the data storage unit 286 to a user of a user device 120.

The I/O calibration unit 212 may facilitate the calibration of the I/O device 211. For example, the I/O calibration unit 212 may detect and/or determine one or more settings of the I/O device 211, and then adjust and/or modify settings so that the I/O device 211 may operate more efficiently. In some embodiments, the I/O calibration unit 212 may utilize an operations driver 213 (or multiple operations drivers) to calibrate the I/O device 211. In some embodiments, the operations driver 213 may alternatively be installed on a user device 120 so that the user device 120 may recognize and/or integrate with the I/O device 211, thereby enabling media content to be displayed, received, generated, and the like. In some embodiments, the I/O device 211 may be calibrated by the I/O calibration unit 212 by based on information included in the operations driver 213.

The communication center 215 may facilitate establishment, maintenance, monitoring, and/or termination of communications between the server 250 and other devices such as user devices 120, other computing environments, third party server systems, and the like. The communication center 215 may further enable communication between various elements (e.g., units and/or subunits) of the server 250 as needed to perform the methods described herein. In some embodiments, the communication center 215 may include a network protocol unit 216, an API gateway 217, an encryption engine 218, and/or a communication device 219. The communication center 215 may include hardware and/or software elements.

The network protocol unit 216 may facilitate establishment, maintenance, and/or termination of a communication connection between the server 250 and another device (e.g., user device 120) by way of a network. For example, the network protocol unit 216 may detect and/or define a communication protocol required by a particular network and/or network type. Communication protocols utilized by the network protocol unit 216 may include Wi-Fi protocols, Li-Fi protocols, cellular data network protocols, Bluetooth® protocols, WiMAX protocols, Ethernet protocols, power line communication (PLC) protocols, and the like. In some embodiments, facilitation of communication between the server 250 and any other device, as well as any element internal to the server 250, may include transforming and/or translating data from being compatible with a first communication protocol to being compatible with a second communication protocol. In some embodiments, the network protocol unit 216 may determine and/or monitor an amount of data traffic to consequently determine which particular network protocol is to be used for establishing a connection with a user device, transmitting data, and/or performing other operations described herein.

The API gateway 217 may facilitate the enablement of other devices and/or computing environments to access the API unit 283 of the memory 280 of the server 250. For example, a user device 120 may access the API unit 283 via the API gateway 217. In some embodiments, the API gateway 217 may be required to validate user credentials associated with a user of a user device 120 prior to providing access to the API unit 283 to the user. The API gateway 217 may include instructions for enabling the server 250 to communicate with another device.

The encryption engine 218 may facilitate any one or any combination of translation, encryption, encoding, decryption, and decoding of information received, transmitted, and/or stored by the server 250. For example, the encryption engine 218 may encrypt data associated with a user. Using the encryption engine, each transmission of data may be encrypted, encoded, and/or translated for security reasons, and any received data may be encrypted, encoded, and/or translated prior to its processing and/or storage. In some embodiments, the encryption engine 218 may generate any one or combination of an encryption key, an encoding key, a translation key, and the like, which may be transmitted along with any data content.

The communication device 219 may include a variety of hardware and/or software specifically purposed to enable communication between the server 250 and another device (e.g., user device 120), as well as communication between elements of the server 250. In some embodiments, the communication device 219 may include one or more radio transceivers, chips, analog front end (AFE) units, antennas, processors, memory, other logic, and/or other components to implement communication protocols (wired or wireless) and related functionality for facilitating communication between the server 250 and any other device. Additionally and/or alternatively, the communication device 219 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

In some embodiments, implementation of any unit of any system described herein is contemplated in discrete components or fully integrated circuits in silicon, gallium arsenide, or other electronic materials families, as well as in other technology-based forms and embodiments. It should be understood that various embodiments of the disclosure may be employ or be embodied in hardware, software, microcoded firmware, or any combination thereof. When an embodiment is embodied, at least in part, in software, the software may be stored in a non-volatile, machine-readable medium.

The computing environment may include, but is not limited to, computing grid systems, distributed computing environments, cloud computing environment, etc.) Such networked computing environments include hardware and software infrastructures configured to form a virtual organization comprised of multiple resources which may be in geographically disperse locations.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present disclosure may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that may be contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that may be communicate, propagate, or transport a program for use by or in connection with an instruction execution system, apparatus, or device.

In some embodiments, program code embodied on a computer-readable medium may be transmitted using any appropriate medium, including, but not limited to, wireless, wireline, optical fiber cable, radio frequency (RF), etc., or any suitable combination of the foregoing.

In some embodiments, computer program code for carrying out operations for aspects of the present disclosure may be written in any combination of one or more programming languages, including an object-oriented programming language such as Java®, Smalltalk, C++ or the like and conventional procedural programming languages, such as the "C" programming language or similar programming languages. In some embodiments, the program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, aspects of the present disclosure are described below with reference to flowchart illustrations and/or block diagrams of methods, apparatus (systems), and computer program products according to embodiments of the disclosure. It will be understood that each block of the flowchart illustrations and/or block diagrams and combinations of blocks in the flowchart illustrations and/or block diagrams, may be implemented by computer program instructions. In some embodiments, these computer program instructions may be provided to a processor of a general-purpose computer, a special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In some embodiments, these computer program instructions may also be stored in a computer-readable medium that may be direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

In some embodiments, the computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

In some embodiments, any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.) Additionally or alternatively, any transmission, reception, connection, or communication may occur using wired technologies. Any transmission, reception, or communication may occur directly between systems or indirectly via one or more systems or methods.

In some embodiments, one potential application of the embodiments described herein is a, which may include but not be limited to (e.g., "pay per date," "pay per connection," "pay for time," "pay for entertainment," "pay to meet" "pay for the first date" "or pay for any date at any time" or "bid on a date" platform, "bid on a connection," bid or pay for a meeting, "pay to talk to the person or someone," "pay to chat" "pay to talk" "pay to communicate," bid or pay for a connection or meeting or engagement, pay for the date, compensation for time, compensation for effort on date, payment for the duration, check-in, check-out, time stamp, time record, time and data record, location, time and data record, coordinate(s), of date, compensation for clothing, makeup, hair, time emotional investment in meeting for any reason such as a 'date,' getting compensated for the time, effort, date, makeup, hair, time, travel, etc.) In some embodiments, the platform offers users an 'almost guaranteed' in-person date with a creator, which may include but not be limited to (e.g., model, influencer, user, person, human, entity, business, creator, content creator, public person, private person, second user, etc.)

In some embodiments, from the perspective of a female creator, the present platform provides her with an opportunity to get paid for her, which may include but not be limited to (e.g., time, makeup, hair, clothing, emotional investment, listening, talking, entertainment, emotional services, time duration, check-in, check-out, time stamp, time record, time and data record, location, time and data record, coordinate(s), and any effort put into a date and for her to be happy and relaxed as she is getting compensated for her time and efforts, etc.)

'almost guarantee a date' platform for, which may include but not be limited to (e.g., bidder, patron, member, VIP member, person, user, entity, figure, etc.) or high-value daters, or men, or creators, or persons, or daters, or fans, or followers, or humans, or robots, or persons, or artificial intelligence, etc.) to secure an almost guaranteed, which may include but not be limited to (e.g., in-person date, in-person connection, in-person meeting, in person business meeting, virtual meeting, virtual connection, etc.) with, which may include but not be limited to (e.g., 'creators,' models, influencers, actresses, creators, humans, persons, creators, artificial intelligence (AI), creations, characters, any person, any business person, businesspersons, etc.)

Which may include but not be limited to (e.g., Platform, Interface(s), etc.) that offers, which may include but not be limited to (e.g., payments, bidding/auction, compensation, assets, transmittables, etc.) for an in-person date for, which may include but not be limited to (e.g., model, creator, influencer, particular creator, person, actress, etc.) from a, which may include but not be limited to (e.g., high-value dater/man, bidder, patron, member, VIP member, person, user, entity, figure, etc.)

Which may include but not be limited to (e.g., bidder, patron, member, VIP member, person, user, entity, figure, etc.) or high-value dater, or dater, fan, or person, subscriber, or follower, etc.) may be able to secure an 'almost guaranteed' date with a, which may include but not be limited to (e.g., 'unique creator/model, influencer, person, etc.)

The problem for the "model/creator" when dating: wasted time for, which may include but not be limited to (e.g., outstanding, unappreciated, overlooked effort, etc.), which may include but not be limited to (e.g., before, during, and after, etc.) which may include but not be limited to (e.g., dates, meeting, connections, talking, voice conversations, messaging, meetings, etc.)

In some embodiments, the creator, which may include but not be limited to (e.g., user two or second category user), wants to be compensated for their, which may include but not be limited to (e.g., effort, time, money, wardrobe, happiness, emotional investing, traveling, hair, makeup, clothing, food, etc.) that may be related to going on an, which may include but not be limited to (e.g., in-person date, in-person meeting, virtual meeting, making a connection, providing an activity, showing up, joining, participating in an activity, etc.) The platform described herein provides an almost guaranteed amount of time in exchange for electronic exchangeable, which may include but is not limited to (e.g., money, cryptocurrency, bitcoin, points, funds, credit, coins, etc.)

Men can perform gigs, tasks, and jobs, including but not limited to (e.g. gig networks, gig economy, ride-sharing, food delivery, etc.) However, these gigs are not safe for women. Gigs for women include home-based gigs, including but not limited to (e.g. type-writing, virtual assisting, making phone calls, administrative jobs, etc.) This disclosure presents a new category of, which may include but not be limited to (e.g., when rules, instructions, laws, regulations, knowledge, agreements to terms, reading terms, reading precautions, understanding precautions, understanding safety, making wise safety decisions, safety pre-cautions followed), safe gigs for women.

In some embodiments, the platform wastes no time between two serious parties for a date, benefiting the dater and model/particular creator equally. In some embodiments, the platform for 'creators' empowers women, or 'special creators,' to get paid for, which may include but not be limited to (e.g., in-person, virtual, etc.) restaurant dates, whether romantic, fun, work, business, or networking. In some embodiments, generally, everyone eats three times per day, so a creator/user gets paid to, which may include but not be limited to (e.g., for example, which may be having but not limited to 'eat on a restaurant date') with a, which may include but not be limited to (e.g., 3rd party-background checked, 3rd party verified, 3rd party confirmed, platform verified, etc.) which may include but not be limited to (e.g., bidder, patron, member, VIP member, person, user, entity, figure, etc.) dater, person, user, 3rd party, entity, robot, AI, etc.) In some embodiments, the term "man" may refer to a human of any gender (including multiple genders or no gender) or a computer. In some embodiments, the terms "woman," "model," "creator," and/or "special creator" may refer to a human of any gender (including multiple genders or no gender) or a computer.

In some embodiments, the platform combines novel ways to: which may include but not be limited to (e.g., pay, book, schedule, inquire about, inquire about, inquire regarding, secure, create connection to, hold, pay for, create business relationship with, use transmittables to secure or book or date, etc.) for a, which may include but not be limited to (e.g., bidder, patron, member, VIP member, person, user, entity, figure, etc.) user, person, dater, subscriber, etc.) The platform may provide 'instant gratification' for a, which may include but not be limited to (e.g., bidder, patron, member, VIP member, person, user, entity, figure, user, person, entity, subscriber, dater, fan, etc.) desiring an 'almost guaranteed date' with a 'buy now' option for an, which may include but not be limited to (e.g., in-person, virtual, etc.) date with the, which may include but not be limited to (e.g., model, user, creator, public person, celebrity, etc.) The gratification stems from knowing a date is almost guaranteed, or from making a 'bet and being the one to win, which may include but not be limited to (e.g., win a date, be selected for, bid the highest, win the auction, buy-now, submit inquiry or offer, etc.) with a high-demand, which may include but not be limited to (e.g., 'model, special creator, businessperson, celebrity, public person, model, creator, etc.) The special creator may also be a, which may include but not be limited to (e.g., actress, CEO, supermodel, businessperson, celebrity, dancer, entertainer, house-girlfriend, housewife, public person, model, girl-next-door, creator, etc.) The platform may also provide the option to, which may include but not be limited to (e.g., subscribe to the creator's profile, unlock photos, view videos, video galleries, learn information, learn about, get-to-know, watch, get advice, view pictures, writings, articles, media, and or videos, streamed or anything uploaded or created by the creator, etc.)

In some embodiments, an 'almost guaranteed' date is subject to a creator's discretion to, which may include but not be limited to (e.g., cancel, negotiate, refund, etc.) which may include but not be limited to (e.g., date, connection, entertainment, time period, time, price, location, safety measures, duration, check-in, check-out, time stamp, time record, time and data record, location, time and data record, coordinate(s), etc.) In some embodiments, 'almost guaranteed' means that the platform may guarantee the ability to potentially secure that, which may include but not be limited to (e.g., date, connection, time, location, event, person, meeting, etc.) based on the, which may include but not be limited to (e.g., model, creator's, person's, 3rd party's, entities, etc.) minimum transmittables required and/or meeting the creator's standard for the, which may include but not be limited to (e.g., date, meeting, connection, etc.) In some embodiments, we are not responsible and it may be at the discretion of the, which may include but not be limited to (e.g., 'creator, model, user, platform, 3rd party, etc.) to, which may include but not be limited to (e.g., cancel, change, negotiate, edit, add, refund, etc.) date for 'any reason(s),' which may include but not be limited to (e.g., acts of God, financial reasons, family reasons, business reasons, safety reasons, emergency reasons, etc.) at, which may include but not be limited to (e.g., their own discretion, the platform's discretion, acts of God, a 3rd parties discretion, authoritarian discretion, etc.) platform is not responsible for any reasons, which may include but not be limited to (e.g., 'creators' or 'models' etc.) that may, which may include but not be limited to (e.g., cancel a date and/or refund etc.) a, which may include but not be limited to (e.g., user, bidder, patron, member, VIP member, person, user, entity, 3rd party, figure, etc.) before or after, which may include but not be limited to (e.g., bidder, patron, member, VIP member, person, user, entity, figure, etc.), which may include but not be limited to (e.g., wins the bid, uses the buy now option, agrees on a price, sends payment to trust, sends inquiry, gets offer accepted, sends tip, donates, sends gifts, sends payment to user or platform, shows up, joins date, joins connection, etc.) and/or is, which may include but not be limited to (e.g., unable to perform obligations, unable to perform understood obligations, unable to perform undiscussed expectations, acts of God, can't complete, doesn't complete, doesn't finish, gets sick, an emergency occurs, etc.) and/or/but the, which may include but not be limited to (e.g., model, creator, user, person, etc.), which may include but not be limited to (e.g., cancels the date and/or refunds, edits, can't perform, cancels connection, can't make it, doesn't make it, etc.) for any reason listed herein or not listed.

In some embodiments, which may include but not be limited to (e.g., 'model/creator' etc.) may have a, which may include but not be limited to (e.g., special, optional, available, etc.) which may include but not be limited to (e.g., auction, auctioning date, date auctions, charity date, charity dates, auctioning items, auction list of certain items, selling list, items to sell, items for purchase, items up for sell or transmittables, etc.) that may be on their, which may include but not be limited to (e.g., creator page, interface, screen, app, etc.) which may be available for/in exchange for, which may include but not be limited to (e.g., electronic transmittables, any transmittables, free, tips, donations, charity, time, etc.) Items may include but not be limited to (e.g., new items, made things, created items, merchandise, goods, services, used items, lingerie, dolls, licensed goods items of the creator or model, 3rd party licensed items from the creator or model or person's likeness, washed items, dirty items, shirts, pants, bids, dates, meetings, connections, etc.) In some embodiments, this list also may include items that may be used such as but not be limited to (e.g., new items, imported items, made-items, clothing, used items, bras, underwear, dolls, licensed goods items of the creator or model, 3rd party licensed items from the creator or model or person's likeness, bids, dates, auctions, charity, donations, etc.)

In some embodiments, at least a portion of the transmittables may be donated to a charity organization (e.g., foster homes, violence survivor assistance organizations, rape crisis centers, women's rights centers, etc.). The amount or percentage of the transmittables (e.g., associated with closing an open time or associated with any other function involving transmission of transmittables on the computing network) donated to the charity organization may be set by the system managing the computing network or may be established by the first user or the second user. In some embodiments, the charity organization may selected by the first user or the second user, or the system managing the computing network, at the time when the amount or percentage of transmittables is input or selected.

In some embodiments 'Almost guarantee a date' platform for "creators" may comprise a calendar function.

In some embodiments, this platform may include a calendar app/platform that automatically shows calendar options and connects to other third-party calendar functions or apps. In some embodiments, calendars for automatic scheduling after the date is paid for/won are also provided.

In some embodiments, which may include but not be limited to (e.g., 'model, creator, unique creator, etc.) which may include but not be limited to (e.g., instantly be uploaded to, chip-login, brain-login, hand-login, computer log in, human log, beginning, start, begin, etc.) on to, which may include but not be limited to (e.g., platform, application, interface(s), etc.) to, which may include but not be limited to (e.g., apply to create a custom profile, create, sign up, meet requirements for, etc.) In some embodiments, this may include, but not be limited to (e.g., proving social media, pictures, driver's license, background check, using email, email sign-up, 3rd party integrations, 3rd party sign-ups, phone sign-up, etc.)

In some embodiments, which may include but not be limited to (e.g., model, creator, etc.) may get, which may include but not be limited to (e.g., verified, approved, checked, confirmed, requirements met, conditions met, etc.) status on the platform, which may include but not be limited to (e.g., upon confirmation and/or approval of the application, and/or banking information for payouts, and/or one or two forms of identity verification, and/or holding/showing both forms of identity in a photo and/or a video submitted to the platform, etc.) either through platform or through 3rd party.

In some embodiments, "model/creator" may be approved by the, which may include but not be limited to (e.g., platform, 3rd party, entity, etc.) 'Model/creator' may have something special such as a, which may include but not be limited to (e.g., followers, fans, interested parties, entertainment background, previous shows, previous events, fan base, celebratory status, interesting things about this person, their career, history, their modeling, a story, etc.) which may include but not limited to (e.g., other social networks, social networks, networking, friends, fans, celebratory story, intriguing, marketing, modeling, past modeling, following, supportive fans, be an entrepreneur, have a background in selling personable photos/videos, content creation, have an experience in tips, sales, entertainment, or marketing, etc.)

In some embodiments, the platform may comprise of a, which may include but not limited to (e.g., public and/or private profile/app/interface, etc.), which may include but not limited to (e.g., with or without content feed, unlocks, subscription options, payment options, scheduling options, viewing content, streaming, live streaming, live viewing, on-demand viewing, marketing options, profile options, viewing options, etc.)

In some embodiments, which may include but not limited to (e.g., 'model, creators, etc.) approved or accepted profiles which may include but not limited to (e.g., promotional photos, videos, content, content, information, stories, original series, original movies, content, stories, person, live, live streaming, etc.) In some embodiments, which may include but not limited to (e.g., 'model/creator' etc.) may the option of, which may include but not limited to (e.g., creating, collaborating, introducing, creating, customizing, etc.) which may include but not limited to (e.g., custom photos, videos, content locked photos, videos, content, story photos, videos, options to book, schedule, inquire about, options to secure time, options to get time with person, content, feed photos, live photos, live streaming, live options, live videos, pre-recorded videos, collaborating videos, content, etc.) In some embodiments, there may be an option for a, which may include but not limited to (e.g., monthly subscription, pay-per-view, pay-to-view, payment options, etc.) to unlock, which may include but not limited to (e.g., all, some, partial, instalments, time period-based, etc.) content and media. In some embodiments, membership or monthly payment options could make them, which may include but not limited to (e.g., bidder, patron, member, VIP member, person, user, entity, figure, person, user, host, member, patron, entity, 3rd party, etc.) become a, which may include but not limited to (e.g., VIP member, membership member, member, person or entity with full access or full unlock, special privileges, special viewing, unlocks, views, etc.) In some embodiments, there may be options to go, which may include but not be limited to (e.g., live, stream, live stream, pre-recorded stream, etc.) on profile with times and dates to add to "(e.g., bidder, patron, member, VIP member, person, user, entity, figure, etc.) any which may include but not limited to (e.g., time method, time of timing data, creating of timing data, personal work calendar, personal calendar directly from the profile, created calendar, new calendar, edited calendar integrated calendar, etc.) "model/creator may be able to have, which may include but not limited to (e.g., add options, approval options, do nothing options, be suggested for, opt-in options, confirmation options, acceptance options, etc.) so the potential, which may include but not limited to (e.g., bidder, patron, member, VIP member, person, user, entity, figure, etc.) may receive updates on their, which may include but not limited to (e.g., calendar, profile, network, timing data, phone, device, app, etc.) of which may include but not limited to (e.g., when, where, how, price, duration, check-in, check-out, time stamp, time record, time and data record, location, time and data record, coordinate(s), location, full details, some details, etc.) the model is available for a, which may include but not limited to (e.g., 'buy now' or 'bid date' or auction, charity, connection, live stream, is going live, is doing an event, is available, may be able to contacted, etc.) In some embodiments, which may include but not limited to (e.g., bidder, patron, member, VIP member, person, user, entity, figure, etc.) may be able to, which may include but not limited to (e.g., unlock photos, information, advice, pictures, writings, articles, media, and or videos, content, original series, original content, original videos, etc.) which may include but not limited to (e.g., posted by, created by, managed by, available from, etc.) which may include but not limited to (e.g., 'creator' or 'model' or entity, or person, or 3rd party, etc.) or, which may include but not limited to (e.g., or another bidder, patron, member, VIP member, person, user, entity, figure, etc.)

In some embodiments, an "almost guarantee a date" platform for 'creators' may be a social feed app.

In some embodiments, 'model/creator' and/or, which may include but not limited to (e.g., bidder, patron, member, VIP member, person, user, entity, figure, etc.), may have a feed that may, which may include but not limited to (e.g., shows, displays, hologram, interactive, VR, virtual reality, 3D, 4D, live, interact with, etc.) which may include but not limited to (e.g., photos, videos, content, information, details, AI-created content, etc.) which may include but not limited to (e.g., recently uploaded) from which may include but not limited to (e.g., 'model/creators', users, persons, patrons, guests, etc.) on the, which may include but not limited to (e.g., platform, app, interface(s), etc.) In some embodiments, content may be, which may include but is not limited to (e.g., shown, displayed, interactive with, created by, created with, integrated with, displayed with, made for, made with, etc.) and/or be, which may include but not limited to (e.g., AI-created content, VR-created content, interactive content, part-human/part AI-content, AI-created information or interactive methods or processes, etc.)

In some embodiments, 'model/creator' may be able to, which may include but is not limited to (e.g., choose their, opt-in to be selected for them platform-created, platform priced, personally priced, 3rd party priced, market priced, suggestion price, price per guest, different prices for any computing operation or personal or person reasons, fees based on users information or 3rd parry information, or data gathered, or data analytics, etc.) which may include but not limited to (e.g., 'buy now,' purchase pay for, interact with, interactive, price for a date, transmittables, etc.) which may include but not limited to (e.g., with preferences, with pre-approved choices, with opt-in, without opt-in, without preferences in place, etc.) In some embodiments, there may be or may not be, including but not limited to (e.g., no negotiations on where/time, no negotiations, no changes, no edits, etc.) In some embodiments, 'model/creator' may have an option to have, which may include but is not limited to (e.g., 'one time, have an available 'range of days, have an available range of times available, have a time-period available, have a preference of the type of date, or a preference of activity, or a preference such as which may be including but not limited to brunch dates only, or breakfast/brunch dates preferred or chosen, or available, etc.) In some embodiments, "model/creator" has the option to choose if there are which may include but not limited to (e.g., multiple types of food options to go to, what is available for that model and their personal preferences, or for example which may be including but not limited to if the "model/creator" prefers only one restaurant or place for date options, such as only restaurant dates at this location: XYZ, etc.)

In some embodiments, if 'model/creator' may not want to do a, which may include but not limited to (e.g., 'set, standard, confirmed, approved, total, etc.) which may include but not limited to (e.g., 'buy now 'price, set price, preferred price, preference price, set time day, location, price, reserve price, etc.) for a date and may want to see how high their bid maybe go, the "model/creator" maybe opt in for, which may include but not limited to (e.g., 'bid now, set a reserve price, set minimum, start from XYZ price, but have a reserve, 'buy now price, installment method, etc.)

In some embodiments, the 'bid now' may make the platform fun and exciting. In some embodiments, the 'bid now' may show the, which may include but not limited to (e.g., 'races,' comparable, comparing, both parties, both dates, both prices, both bidders, etc.) which may between which may include but not limited to (e.g., bidder, patron, member, VIP member, person, user, entity, figure, etc.) if they which may include but not limited to (e.g., opt-in, approve, agree to, want to be, etc.) on the, which may include but not limited to (e.g., interface, homepage, or be public, etc.) and/or they may be, which may include but not limited to (e.g., opt-in, agree to, approve of, want to be, pay for, membership pay for, etc.) to remain anonymous for a possible which may include but not limited to (e.g., fee, membership option, opt-in, acceptance, at platform's discretion, etc.)

'Model/creator' chooses their schedule.

In some embodiments, 'model/creator' may be able to choose their which may include but not limited to (e.g., schedule, timing data, etc.) of which may have but not limited to (e.g., availability, preferences, suggestions, opt-in decisions, partnership, agreeing, etc.) 'model/creator' may choose their which may include but not limited to (e.g., restaurant preferences, location preferences, timing data preferences, location preferences, availability for travel, prices, transmittables, etc.) which may include or not include which may include but not limited to (e.g., the only option, possible options, etc.) from a pre-approved partnership preference which may include but not limited to (e.g., restaurant, location, time, business, business partnerships, etc.) with our partner which may include but not limited to (e.g., restaurant brands, business brands, small businesses, etc.) In some embodiments, which may include but not limited to (e.g., bidder, patron, member, VIP member, person, user, entity, figure, etc.) may be only/choose which may include but not limited to (e.g., pre-approved, partnership, agreed upon, set upon, set, etc.) option(s) for, which may include but not limited to (e.g., location of restaurant date, place or location of date, location of meeting, timing location, preferences, prices, etc.)

'Model/creator" may pre-decide her/their preferred gifts/flowers, donations, and acceptances.

In some embodiments, the model/creator' may choose their which may include but not limited to (e.g., pre-selected, wanted, pre-approved, etc.) preference(s), which may have but not limited to (e.g., flowers, gift card, or gift delivery, etc.) as a possible option for the "(e.g., bidder, patron, member, VIP member, person, user, entity, figure, etc.) to, which may include but not limited to (e.g., pay, arrange, accept, send, bring, pay for, obtain a gift card for, etc.) In some embodiments, this may deliver the, which may include but not limited to (e.g., flowers, gift card, gift, etc.) directly to the, which may include but not limited to (e.g., restaurant, activity area, activity place, place, etc.) which may include but not limited to (e.g., bidder, patron, member, VIP member, person, user, entity, figure, etc.) may pick up/have delivered/may bring/their which may include but not limited to (e.g., delivery, item sent, pickup, obtain, bring to, have available, etc.) upon arrival to the restaurant which may include but not limited to (e.g., during, before, before, etc.) the 'model/creator's arrival.

'Model/creator' may request an 'after-date gift.'

'Model/creator' may automatically require or request an automatic flower gift to arrive after the date or some gift delivery at a specific time (e.g., 1 hour) after the date begins as an 'after gift surprise special gift.

In some embodiments, which may include but not limited to (e.g., leader board, preferred, most spending, highest ranking, highly rated, etc.) of which may include but not limited to (e.g., bidder, patron, member, VIP member, person, user, entity, figure, etc.) on which may include but not limited to (e.g., platform, interface, etc.) In some embodiments, which may include but not limited to (e.g., rankings, preferences, shown, displayed, etc.) may not be the, which may include but not limited to (e.g., exact amount spent, exact reasons, exact ratings, etc.) but which may include but not limited to (e.g., user, patron, person, bidder, dater, etc.) may potentially have, which may include but not limited to (e.g., a large range or exceptional range, or exceptional experience, or is top rated, or is top liked, is approved, etc.) In some embodiments, the users may be able to see the, which may include but not limited to (e.g., bidder, patron, member, VIP member, person, user, entity, figure, etc.) In a particular which may include but not limited to (e.g., range, interface, category, bidding/auction room, negotiation, room, section, list etc.) In some embodiments, for example, which may include but not limited to (e.g., bidder, patron, member, VIP member, person, user, entity, figure, etc.) that may have spent between which may include but not limited to (e.g., 500 to 600 k USD, 400 to 500 k, etc.) on the, which may include but not limited to (e.g., platform, entity, interface, integrations, models, membership, etc.) In some embodiments, alternatively, the leaderboard may show the, which may include but not limited to (e.g., highest average paid for a date, highest ranking member, average date payment, average per hour, average for time, average for date, activities, locations, dates, times, hot spots, etc.) which may include but not limited to (e.g., special member, bidder, patron, member, VIP member, person, user, entity, figure, etc.) For example which may be including but not limited to which may include but not limited to (e.g., that have may been on at least a certain number of dates, that have reached a top status, have spent or received the most money, etc.)

In some embodiments, which may include but not limited to (e.g., leader board, displayed special members, top ranking, top selling, top marketing, particular persons, etc.) of, which may include but not limited to (e.g., 'model/creators', users, persons, entities, 3rd parties, advertisers, advertisements, businesses, etc.) on which may include but not limited to (e.g., platform, interface, etc.) may show which may have but not limited to (e.g., not the exact amount spent, but may be an extensive range, may be a range of amount, may be a range of rankings, etc.) In some embodiments, the, which may include but not limited to (e.g., list, section category, area, interface, badges, verifications, etc.) which may show which may have but not limited to (e.g., creators, models, persons, users, etc.) which may include but not limited to (e.g., popularity, effort, time spent, logins, availability, total earnings, which may be associated with ranges, most popular, most paid, highly paid, highly suggested, etc.) These may include but are not limited to (e.g. large amounts, large monthly amounts, daily large amounts, daily sales, weekly sales, yearly sales, etc.) On the, which may include but is not limited to (e.g., platform, through 3rd party integrations, on interfaces, etc.) In some embodiments, alternatively, the, which may include but not limited to (e.g., leaderboard, area, interface, section, category, list, etc.), may show the, which may include but not limited to (e.g., highest average earning per date, for creators that have been on at least a certain number of dates, models that have reached a certain amount of money earned, highly ranked, highly interacted with, the amount earned, amount donated, donations, charity, etc.)

In some embodiments, the platform provides the ability to search, which may include but not limited to (e.g., top, available, shown, displayed, pages, etc.), which may include but not limited to (e.g., bidder, model, patron, member, VIP member, person, user, entity, figure, etc.) and/or which may include but not limited to (e.g., top, lowest, new, newest, shy, etc.) which may include but not limited to (e.g., models, creators, bidders, daters, persons, users, availabilities, auctions, charities, events, etc.) of/in each which may include but not limited to (e.g., cities, other areas, locations, businesses, places, event-centers, interfaces, platforms, local, hot spot, around the world, any area, any location, etc.)

Some embodiments may include but are not limited to (e.g., 'model/creators, users, persons, entities, etc.) may be included in the display computing operation and equally distributed on the site from the scrolling section on the home page. In some embodiments, a, which may include but is not limited to (e.g., creator, model, user, person, 3rd party, entity, etc.), may transmit an electronic exchangeable to the platform to be presented more often or shown on the, which may include but not limited to (e.g., home page, in stacks, on calendars, on suggestions, on profiles, on advertisements, on feed, presented earlier in stacks, at the top of lists, added to lists, added to suggestions, on content, on displays, on interfaces, first category users, any category, separations, sorting, etc.)

Referral Program

In some embodiments, referrals may be able to obtain, which may include but not limited to (e.g., percentage, cut, part, fee, etc.) from which may include but not limited to (e.g., for example, which may be including but not limited to each of the referral's dates for a total of 1 year, or another period), for any duration, check-in, check-out, time stamp, time record, time and data record, location, time and data record, coordinate(s), after the referee's sign-up and receiving exchangeable(s), etc.)

In some embodiments, the platform may allow options to hide, which may include but not limited to (e.g., content, photos, videos, etc.), which may enable the creator to have their own (e.g., streaming feed, feed, content, area, interface, details, any part, profile, etc.) In some embodiments, the platform may allow the, which may include but not limited to (e.g., model, creator, user, person, etc.) to, which may include but not limited to (e.g., send, offer, offer to unlock, offer to purchase, have available, etc.) which may include but not limited to (e.g., private pictures, private videos, content, exclusive content, additional content, information, details, stories, interactions, time, anything that involves communication, time, effort, energy, etc.) to, which may include but not limited to (e.g., fans, bidder, patron, member, VIP member, person, user, entity, figure, users, etc.) for a, which may include but not limited to (e.g., fee, an electronic exchangeable, funds, money, exchanges, assets, goods, services, crypto, etc.)

In some embodiments, the 'model/creator' may choose their, including but not limited to (e.g., availability of travel, their range of travel, whether they only date locally or are travel-friendly, virtual-only, etc.)

Interface/homepage of platform displaying creators and/or (e.g., bidder, patron, member, VIP member, person, user, entity, figure, etc.)

In some embodiments, which may include but not be limited to (e.g., 'model/creator,' bidder, patron, member, VIP member, person, user, entity, figure, users, public, persons, anyone, 3rd parties, advertisers, advertisements, businesses, etc.) may, which may include but not be limited to (e.g., see, view, display, show, hear etc.) which may include but not be limited to (e.g., feed, display, content, interface, hologram, screen, hologram, interface, viewing display, etc.) on, which may include but not be limited to (e.g., homepage, interfaces, any interface, any application, etc.) the, which may include but not be limited to (e.g., featured model of the month, models, promoted profiles, current profiles, computing operation profiles, photoshoots, video shoots, video content, current bids, races of one or more, or multiple users or persons racing or bidding/auction, negotiation, or auctioning, or auctions, or comparable profiles, or browsing capabilities, or sections, or lists, or displays, etc.) which may include but not be limited to (e.g., entities, 3rd parties, advertisers, advertisements, businesses, persons, users, public, private profiles, content, viewing, interactive content, displays, pay per view, pay to unlock, pay to see, membership-to-view, public profiles, users, models, creators, paying persons, bidding/auction persons, etc.) which may include but not be limited to (e.g., current auctions, current date auctions, current date bids, prices, price ranges, general pricing, persons, profiles, information, displays, prices, general transmittables, etc.) and/or which may include, types of availabilities, for, which may include but not be limited to (e.g., current dates, profiles, content for unlock, free content, mixed content, content from profiles, content from users, past dates, sold items, items for sell, live profiles, live streaming, featured profiles, 'model/creators' on the platform/feed, display, hologram, 3rd party, featured profiles etc.)

In some embodiments, fear of safety on date from 'model/creator.'

In some embodiments, we will not, which may include but not be limited to (e.g., tolerate, allow, accept, approve, etc.) any paid or unpaid, which may include but not be limited to (e.g., bidder, patron, member, VIP member, person, user, patron, viewer, person, 3rd party, business, entity, figure, etc.) using, which may include but not be limited to (e.g., verbal abuse, causing fear of harm, scaring, proposing illegal activities, etc.) to model/creator. In some embodiments, we will not tolerate any paying or not-paying, which may include but not be limited to (e.g., bidder, patron, member, VIP member, person, user, entity, figure, 3rd party, group, person, human, robot, etc.) using any, which may include but not be limited to (e.g., coercion, fear, harm, attempt, proposal, plan, etc.) to, which may include but not be limited to (e.g., attempt to/requesting to obtain sexual services, put any human or person in fear, display or feel or show any behavior that may present any amount of fear to 'model/creator,' or any type of, which may include but not be limited to (e.g., proposed, suggested, asked, expected, etc.) which may include but not be limited to (e.g., illegal activities, uncomfortable questions, any, any illegal or non-wanted services or goods, etc.) from any, which may include but not be limited to (e.g., paid or unpaid, or paying, or non-paying, etc.) which may have but not be limited to (e.g., bidder, patron, member, VIP member, person, user, entity, figure, etc.) on/during, which may include but not be limited to (e.g., date, connection, entertainment, time, time period, etc.) In some embodiments, if 'model/creator' presents, which may include but not be limited to (e.g., concerns, reasons, feelings, proof, suggestions, etc.) of any type of, which may include but not be limited to (e.g., fear of harm, sexual services request, scared feelings, coercion, sex trafficking suspicions, or any verbal abuse, etc.) on, which may include but not be limited to (e.g., paid for the date, non-paid date, during connection, during virtual, during in-person, during a meeting, during a voice call, during messages, during any connection, etc.) by/from, which may include but not be limited to (e.g., bidder, patron, member, VIP member, person, user, entity, figure, etc.) the, which may include but not be limited to (e.g., bidder, patron, member, VIP member, person, user, entity, figure, etc.) may/will be banned from the platform forever. In some embodiments, the, which may include but not be limited to (e.g., bidder, patron, member, VIP member, person, user, entity, figure, etc.) may not receive any refund/credit and/or may be banned permanently if, which may include but not be limited to (e.g., proof, concerns, reasons why, etc.) is/are presented to, which may include but not be limited to (e.g., platform, entity, business, etc.) from the ‘, which may include but not be limited to (e.g., model/creator, 3rd parties, advertisers, advertisements, businesses, outside proof, outside reasons, unrelated reasons, concerns, etc.)

In some embodiments if, which may include but not be limited to (e.g., concerns, reasons, proof, suggestions, feelings, etc.) may be obtain by ‘, which may include but not be limited to (e.g., model/creator’, outside persons, (. 3rd parties, advertisers, advertisements, businesses, etc regarding, which may include but not be limited to (e.g., date, connection, entertainment, time, etc.) with, which may include but not be limited to (e.g., bidder, patron, member, VIP member, person, user, entity, figure, etc.) that may cause ‘model/creator’ to have, which may include but not be limited to (e.g., reasonable fear of harm, any ‘scared’ feelings, etc.) the ‘model/creator’ may be allowed to, which may include but not be limited to (e.g., leave, exit, reduce, call for help, get assistance, etc.) the, which may include but not be limited to (e.g., date, connection, entertainment, meeting, etc.) early and/or may be or may not be required to present, which may include but not be limited to (e.g., reasons, suggestions, concerns, proof etc.) to the platform regarding the, which may include but not be limited to (e.g., paid date, connection, entertainment, time, duration, check-in, check-out, time stamp, time record, time and data record, location, time and data record, coordinate(s), paid duration, check-in, check-out, time stamp, time record, time and data record, location, time and data record, coordinate(s), paid meeting, paid virtual meeting, paid connection, non-paid, charity, donated, paid time, etc.) In some embodiments, ‘model/creator’ may be encouraged to contact local police authorities to report any crimes that were committed or attempted by, which may include but not be limited to (e.g., bidder, patron, member, VIP member, person, user, entity, figure, dater, user, person, entity etc.) In some embodiments, the platform will not tolerate any type of criminal activities or behavior by, which may include but not be limited to (e.g., bidder, patron, member, VIP member, person, user, entity, figure, model/creator” etc.)

In some embodiments (e.g., Bidder, patron, member, VIP member, person, user, entity, figure, subscription services, etc.)

In some embodiments, through the platform, the, which may include but not be limited to (e.g., bidder, patron, member, VIP member, person, user, entity, figure, etc.) may be offered an, which may include but not be limited to (e.g., exclusive, discounted monthly, special offer, yearly premium subscription services, etc.) for, which may include but not be limited to (e.g., meetings, connections, time, dates, subscriptions, times, streaming, streams, dates, unlocks, messages, etc.)

How subscription services may work for dates

In some embodiments, the interface may allow a, which may include but not be limited to (e.g., bidder, patron, member, VIP member, person, user, entity, figure, etc.) to, which may include but not be limited to (e.g., ‘reserve’ or obtain ‘exclusivity rights,’ etc.) to ‘date a specific ‘model/creator’ through the platform and is the only (e.g., bidder, patron, member, VIP member, person, user, entity, figure, etc.) that may be, which may include but not be limited to (e.g., able to, allowed to, etc.) which may include but not be limited to (e.g., reserve, confirm, approve, select, book, schedule, inquire about, etc.) which may include but not be limited to (e.g., dates, connections, messages, virtual-date, in-person dates, time, duration, check-in, check-out, time stamp, time record, time and data record, location, time and data record, coordinate(s), messages, connection to, period, etc.) with ‘model/creator.’ In some embodiments, a, which may include but not be limited to (e.g., pre-paid amount, set amount, proposed amount, paid amount, approved amount, confirmed amount, confirmed exchangeable, etc.) may have to be paid/exchanged and then the, which may include but not be limited to (e.g., bidder, patron, member, VIP member, person, user, entity, figure, etc.) may have the option to suggest, which may include but not be limited to (e.g., dates and times, locations, frequencies, dates, duration, check-in, check-out, time stamp, time record, time and data record, location, time and data record, coordinate(s), s, frequencies, models, model, etc.) on how to, which may include but not be limited to (e.g., fulfill, use, obtain, use credits, etc.) the, which may include but not be limited to (e.g., pre-paid, installment paid, upfront paid, credit to, credited, debited, exchanged for, etc.) which may include but not be limited to (e.g., yearly subscription, monthly subscription, weekly subscription, any time period subscription, upfront payment, discounted total, total, pre-pay, etc.) through the, which may include but not be limited to (e.g., platform, 3rd party, integrated parties, interface, etc.) In some embodiments, if the, which may include but not be limited to (e.g., bidder, patron, member, VIP member, person, user, entity, figure, etc.) does not, which may include but not be limited to (e.g., reserve, fulfill, obtain, schedule, etc.) the dates after payment is made during, which may include but not be limited to (e.g., period, duration, check-in, check-out, time stamp, time record, time and data record, location, time and data record, coordinate(s), expiration, etc.) user/he may lose out on those pre-paid dates and/or may not receive a refund, or may be credited or not credited. In some embodiments, the ‘model/creator’ may obtain all, which may include but not be limited to (e.g., funds, transmittables, etc.) regardless of if, which may include but not be limited to (e.g., bidder, patron, member, VIP member, person, user, entity, figure, etc.) schedule those, which may include but not be limited to (e.g., dates, times, duration, check-in, check-out, time stamp, time record, time and data record, location, time and data record, coordinate(s), s, connections, etc.) that may have been paid, which may include but not be limited to (e.g., weekly, monthly, subscription obtained, previously paid, previously credited, credited, etc.) to, which may include but not be limited to (e.g., ‘model/creator’, platform, 3rd party, entity, etc.)

In some embodiments, the, which may include but not be limited to (e.g., bidder, patron, member, VIP member, person, user, entity, figure, etc.) may be able to purchase, which may include but not be limited to (e.g., ‘an exclusive date/dating subscription plan,’ an understood subscription plan, etc.) to date ‘model/creator’ for a, which may include but not be limited to (e.g., discounted price, different price, exclusive price, other transmittables, etc.) In some embodiments, an exclusive date/dating subscription plan may not guarantee exclusivity through the platform for the, which may include but not be limited to (e.g., date(s), connections, time, duration, check-in, check-out, time stamp, time record, time and data record, location, time and data record, coordinate(s), s, etc.) In some embodiments, this may be only a, which may include but not be limited to (e.g., pre-paid, paid, exchangeable, etc.), which may include but not be limited to (e.g., subscription, duration, check-in, check-out, time stamp, time record, time and data record, location, time and data record, coordinate(s), etc.) plan to offer a, which may include but not be limited to (e.g., discount, different price, etc.) for, in some embodiments, upfront payment or to purchase multiple dates at a time as a package deal or a package payment. In some embodiments, if the, which may include but not be limited to (e.g., bidder, patron, member, VIP member, person, user, entity, figure, etc.) may not reserve the dates after payment is made during any time duration, check-in, check-out, time stamp, time record, time and data record, location, time and data record, coordinate(s), [he (the word 'he' is in replacement of her/he/they/them)] may lose out on those pre-paid dates and may not receive a refund or may receive credit. In some embodiments, the 'model/creator' obtains all funds regardless of it, which may include but not be limited to (e.g., bidder, patron, member, VIP member, person, user, entity, figure, etc.) which may include but not be limited to (e.g., schedules those dates, or uses credit, or obtains connections/dates/times, etc.) which may have been in exchange for transmittables, that may have been paid, which may include but not be limited to (e.g., daily, weekly, weekly, monthly, yearly, any time duration, check-in, check-out, time stamp, time record, time and data record, location, time and data record, coordinate(s), any frequency, etc.) to 'model/creator.'

'model/creator' criminal activities on a date with, which may include but not be limited to (e.g., bidder, patron, member, VIP member, person, user, entity, figure, etc.) may be, which may include but not be limited to (e.g., permanently banned, removed, deleted, revoked, etc.) for committing any crimes on, which may include but not be limited to (e.g., paid date, date, connection, etc.) with, which may include but not be limited to (e.g., bidder, patron, member, VIP member, person, user, entity, figure, etc.) In some embodiments, we may only remove a 'model/creator' at our discretion for any reason.

'Model/Creator' Criminal Background Check Badge on Profile

In some embodiments, the platform may not accept any 'model/creators' that may have been convicted of, including but not limited to (e.g., drug, prostitution, murder, terroristic charges, conspiracy to commit, etc.)

In some embodiments (e.g., bidder, patron, member, VIP member, person, user, entity, figure, etc.) criminal background check badge on the profile In some embodiments, the platform will never, which may include but not be limited to (e.g., accept, allow, etc.) any, which may include but not be limited to (e.g., bidder, patron, member, VIP member, person, user, entity, figure, etc.) that have been convicted of, which may include but not be limited to (e.g., any criminal record, any arrests, any charges, etc.) In some embodiments, the platform may not accept any, which may include but not be limited to (e.g., bidder, patron, member, VIP member, person, user, entity, figure, etc.) or that have been accused at least once or more crimes even if a conviction/charge did not arise from it.

Some embodiments may include but not be limited to (e.g., bidder, patron, member, VIP member, person, user, entity, figure, etc.) verified income/work background verification badge on the profile.

In some embodiments, the platform may offer a verified, which may include but not be limited to (e.g., income/work background verification, work history, tax history, driver's license, live photos, live facial verification, passport, tax history, tax information, business information, etc.) that may be optional. In some embodiments, this may allow, including but not limited to (e.g., bidder, patron, member, VIP member, person, user, entity, figure, etc.), to be more trustworthy on the site to gain trust for dates. In some embodiments, the terms, which may include but not be limited to (e.g., site, website, app, platform, etc.,) may be used interchangeably throughout this disclosure.

In some embodiments (e.g., bidder, patron, member, VIP member, person, user, entity, figure, etc.) verified social media profile badge on the profile In some embodiments, the platform may offer a verified, including but not limited to (e.g., work/professional background verification through social networks, social media, work email confirmation, or any other computing operation, etc.) that may be required or optional. In some embodiments, this may allow, including but not limited to (e.g., bidder, patron, member, VIP member, person, user, entity, figure, etc.), to be more trustworthy on the site to gain trust for dates.

In some embodiments (e.g., bidder, patron, member, VIP member, person, user, entity, figure, etc.), verified 'income' or 'net worth.'

The platform may offer a verified, which may include but not be limited to (e.g., 'income' or 'net worth' background verification, work verification, etc.) in some embodiments, this may allow, which may include but not be limited to (e.g., bidder, patron, member, VIP member, person, user, entity, figure, etc.) to be more trustworthy on the site to gain trust for dates.

In some embodiments, (e.g., bidder, patron, member, VIP member, person, user, entity, figure, etc.) may, which may include but not be limited to (e.g., pay, send transmittables, offer assets, donate, etc.) before, which may include but not be limited to (e.g., date, message, before reserving, scheduling, obtaining, etc.) which may have but not be limited to (e.g., date, connection, entertainment, time, duration, check-in, check-out, time stamp, time record, time and data record, location, time and data record, coordinate(s), activity, entertainment, etc.) from, which may include but not be limited to (e.g., 'model/creator' etc.)

In some embodiments, the price for potential, which may include but not be limited to (e.g., bidder, patron, member, VIP member, person, user, entity, figure, etc.) to message and receive only a, which may include but not be limited to (e.g., for example, which may be including but not limited to a 3-response conversation may be a premium price per 3-response conversation from 'model/creator.' this limited messaging is to filter out non-serious daters. In some embodiments, this may mean that the, which may include but not be limited to (e.g., bidder, patron, member, VIP member, person, user, entity, figure, etc.) may be asked only a certain number of questions, which may include but not be limited to (e.g., which may be selected from a list of questions, reapproved questions, etc.) In some embodiments, the questions may be asked at once. In some embodiments, the questions are asked/that may be asked in, which may include but not be limited to (e.g., serial order, generally, in some ways, specific questions, monitored questions, filter questions, etc.) which may include but not be limited to (e.g., for example, which may be including but not limited to the second question may be asked only after the (e.g., bidder, patron, member, VIP member, person, user, entity, figure, etc.) receives the response to the first question from the, which may include but not be limited to (e.g., model, creator, etc.) In some embodiments, the, which may include but not be limited to (e.g., for example, which may be including but not limited to 3 responses, etc.) almost guaranteed conversation will be non-refundable even if the, which may include but not be limited to (e.g., bidder, patron, member, VIP member, person, user, entity, figure, etc.) 'may not like the answers from the, which may include but not be limited to (e.g.,” model/creator, etc.) and/or the questions from the, which may have but not be limited to (e.g.,” bidder, patron, member, VIP member, person, user, entity, figure, etc.) which may be sent through a, which may include but not be limited to (e.g., ‘filter and/or AI, human, monitoring, etc.) and, which may include but not be limited to (e.g., no inappropriate language or words may be used, no code words and no sexual services questions may be asked, etc.) In some embodiments, this may be to ask questions or random messages like, including but not limited to (e.g., ‘What type of suit should I wear?” “How should I cut my hair?” “Is there any type of cologne you prefer?” ‘Should I wear a Rolex, or do you prefer a less flashy guy?” “Should I wear blue or black?” ‘I’m looking forward to our date etc.) In some embodiments, there may be a, which may include but not be limited to (e.g., block, edit, phone number block, personal information block, contact outside platform block, etc.) on, which may include but not be limited to (e.g., messages, interface, profile, comments, live comments, in person comments, options to book, schedule, inquire about, inquire about, inquire regarding, secure, create a connection to, hold, pay for, create a business relationship with, use transmittables to secure or book, schedule, inquire about, special requests, etc.)

In some embodiments, which may include but not be limited to (e.g., the homepage of the site, the homepage of creators, interface(s), etc.) and/or, which may include but not be limited to (e.g., bidder, patron, member, VIP member, person, user, entity, figure, etc.): the, which may include but not be limited to (e.g., bidder, patron, member, VIP member, person, user, entity, figure, etc.) may be able to see a full list of the available creators with, which may include but not be limited to (e.g., open spaces, availability, suggestions, prices, etc.) in their calendar ready to have a, which may include but not be limited to (e.g., ‘book now” date or a “bid” date, or an option to bid, or an option to book, schedule, inquire about, availabilities, options, categories, purchase options, items for sell, merchandise for sell, etc.)

Some embodiments, which may include but are not limited to (e.g., bidder, patron, member, VIP member, person, user, entity, figure, etc.), may have their own promoted or non-promoted profile.

He may have his profile in some embodiments, including but not limited to (e.g., bidder, patron, member, VIP member, person, user, entity, figure, etc.). Still, his profile may need to be promoted on the site. In some embodiments, this may be a, which may include but not be limited to (e.g., private profile, specialty area, an interface that is special or private, etc.) in which only the, which may include but not be limited to (e.g., ‘model/creator’ etc.) and/or the “(e.g., bidder, patron, member, VIP member, person, user, entity, figure, etc.) may be seen or not seen.

In some embodiments, (e.g., bidder, patron, member, VIP member, person, user, entity, figure, etc.) may be shown off to others, which may include but not be limited to (e.g., bidder, patron, member, VIP member, person, user, entity, figure, etc.) on the platform or remain private. In some embodiments, if the user prefers to be private, which may or may not require an (e.g., membership, fee, payment, etc.)

In some embodiments, the, which may include but not be limited to (e.g., bidder, patron, member, VIP member, person, user, entity, figure, etc.) may be able to, which may include but not be limited to (e.g., opt-in or opt-out, etc.) to have their name as ‘public’ to ‘show off to other, which may include but not be limited to (e.g., bidder, patron, member, VIP member, person, user, entity, figure, etc.) on the, which may include but not be limited to (e.g., platform, entity, interface, etc.) when in a, which may include but not be limited to (e.g., ‘race, bidding/auction, scheduling, negotiation’ etc.) on there, which may include but not be limited to (e.g., date, period, connection, virtual, in-person, etc.) or may be able to choose to, which may include but not be limited to (e.g., opt into, choose to, etc.) remaining anonymous if they prefer to be private which may or may not require an (e.g., membership, fee, payment, etc.)

The model may show proof of dates to other potential daters, including but not limited to (e.g., bidder, patron, member, VIP member, person, user, entity, figure, etc.)

In some embodiments, model/creator’ may be encouraged to have an, which may include but not be limited to (e.g., date review content, date proof content, album/review, date review, date pictures, date content, etc.) on their profile of, which may include but not be limited to (e.g., other dates, other times, other sessions, other connections, etc.) they have may have had with other, which may include but not be limited to (e.g., ‘winning, booked, scheduled, etc.) which may include but not be limited to (e.g., bidder, patron, member, VIP member, person, user, entity, figure, etc.)

In some embodiments, the platform: In embodiments, which may include but not be limited to (e.g., 3rd party integration, website, application, organization, website application, etc.) May allow a service consisting of a platform for people to, which may include but not be limited to (e.g., pay to, payment in exchange for, bid to, create calendar bookings, calendar book, schedule, inquire about, book using calendar or AI, using AI to book, schedule, ask about, inquire about, inquire regarding, secure, create connection to, hold, pay for, create business relationship with, use exchangeable to secure or book, schedule, inquire about, etc.) Using machine learning to book, schedule, ask about, inquire about, inquire regarding, secure, create a connection to, hold, pay for, create a business relationship with, use exchangeable to secure or book, schedule, inquire about, etc.) Voice commands to book, schedule, ask about, inquire about, inquire regarding, secure, create a connection to, hold, pay for, create a business relationship with, use transmittables to secure or book, schedule, inquire about, etc.) to go on a, which may include but not be limited to (e.g., date, connection, entertainment, virtual meeting with, virtual voice integration, voice connection, in-person meeting, etc.) With another, which may include but not be limited to (e.g., person, entity, 3rd party, group, multiple people, one person, family, etc.) In some embodiments, this may also be for charitable purposes, which may include but not be limited to (e.g., the payment goes to 3rd party, the payment goes to a group for donation, payment is donated, partially donated, automatically sent to 3rd party, sent after obtained, sent at some point, used for another purpose, payment is deducted, etc.)

The person being bid on for date: In some embodiments, the person being (e.g., paid, bid on, pursued, etc.) For a, which may include but not be limited to (e.g., connection, date, meeting, business, etc.) Likely has something such as, which may include but not be limited to (e.g., model, unique, celebrity, known, accomplishments, looks, connections, money, beauty, ownership, talent, etc.)

The goal of (e.g., bidder, patron, member, VIP member, person, user, entity, figure, etc.) for date: In some embodiments, the, which may include but not be limited to (e.g., bidder, patron, member, VIP member, person, user, entity, figure, etc.) paying person, the person paying for, etc.) Likely wants the chance to, including but not limited to (e.g., create connection, meet, create a romantic or a meaningful connection, business connection, etc.) To the particular person during the, which may include but not be limited to (e.g., connection, date, meeting, etc.) This in-person meeting may occur without big questions or under-the-table tricks in some embodiments.

Rules before bidding/auction and going on a date: In some embodiments, the rules may be, which may include but not be limited to (e.g., shown, laid out, agreed upon, signed for, etc.) Before, which may include but is not limited to, the: (e.g., meeting, connection, date, virtual, etc.) In some embodiments, the date or connection may include but is not limited to (e.g., show rules, show agreement, including all the fine print details, etc.) In some embodiments, all parties may be required to be signed for and/or agreed upon, including but not limited to the: (e.g., connection, date, etc.). This may include but not be limited to (e.g., before, during, before, after, etc.) They may have but not be limited to (e.g., bidding/auction, payment, exchange, payment exchange, amount sent, date, meeting, discussion, etc.) occurring. Some embodiments may include but are not limited to (e.g. paying person (e.g., bidder, patron, member, VIP member, person, user, entity, figure, etc.) May have to agree to the terms of the date and agree to the terms of the, which may include but not be limited to (e.g., model, creator, user, organization, website, application, or charitable service, etc.) which may include but not be limited to (e.g., before, during after, before or after payment, placing a bid, etc.) In some embodiments, the agreement may be required to be at least one of, including but not limited to (e.g., electronically submitted, printed, screenshot by the 'bidding/auction dater, signed agreement, signed acknowledgment of reading, etc.) This may prove that they, which may include but not be limited to (e.g., understands, have read, has a copy of the terms, has a copy of the date, understand the rules, understands the laws, understands how to ask questions, knows what the agreement is for, etc.) For example, if any, which may include but not be limited to (e.g., questions, non-understandings, concerns, etc.) Occur may include but not be limited to (e.g., during the date, after, before, etc.)

Who sets the rules of the date: In some embodiments, which may include but not be limited to (e.g., date, location, time, area, dress code, requirements, requests, special requests, asking for winning (e.g., bidder, patron, member, VIP member, person, user, entity, figure, etc.) to bring roses, etc.) It is all set by the, which may include but not be limited to (e.g., the person being paid for, the person receiving payment, the person receiving assets, etc.) For a, which may include but not be limited to (e.g., virtual, meeting, connection, date, etc.)

When does the money get dispersed to the 'creator."

In some embodiments, which may include but not be limited to (e.g., payment, money, assets, etc.) May be dispensed to the model, including but not limited to (e.g., after the meeting, after the meeting, after the date, at the end of the date-time ending, during, before, before, etc.) Regardless of the, which may include but not be limited to (e.g., paying person, dater, etc.) It shows up or not.

Custom Photos/Unlock Photos/Photo/Video Requests:

In some embodiments, the model sets up a profile on the platform/site. In some embodiments, this may include offering, which may include but not be limited to (e.g., regular content, media content, ad content, show content, live content, live show, vlogging, vlogs, blogging, series, custom videos, custom show, not safe for work (NSFW) content, sexy content, custom content, custom shout outs, custom requested entertainment content or information, custom content, original series, original content, original information, entertainment options, dates, in-person dates, virtual dates, in-person connections, in-person business connections, etc.) For an, which may include but not be limited to (e.g., unlock price, subscription, price, etc.) may which may be an option for a monthly subscription to (e.g., see, view, obtain, look at, be exposed to, etc.) all, which may include but not be limited to (e.g., private content, content, media, etc.) In some embodiments, this may allow the (e.g., bidder, patron, member, VIP member, person, user, entity, figure, etc.) to see, which may include but not be limited to (e.g., exclusive photos, content, subscription content, member-only content, date consideration content, unlocked content, content, videos, etc.) Before deciding if the user may continue to, including but not limited to (e.g., pay, bid, book, schedule, inquire about, create connection, create date, secure date, etc.) On a date with the model, or the option to subscribe to user's, which may include but not be limited to (e.g., exclusive content, monthly exclusive private photos, other content, dummy content, etc.) until he is ready or has money too, which may include but not be limited to (e.g., pay for, bid, obtain, secure, etc.) A date. In some embodiments, the (e.g., bidder, patron, member, VIP member, person, user, entity, figure, etc.)/patrons may be able to pay to request custom photos or custom content. In some embodiments, the models may allow custom button options on their website such as, which may include but not be limited to (e.g., '20$ send a custom photo/video request" etc.) then/before/after/during the model may, which may include but not be limited to (e.g., accept, decline, hold, pursue later, respond later, put into a category, negotiate the price, negotiate, etc.) Of the, which may include but not be limited to (e.g., content, custom content, created content, custom information, message, photo, video requested, etc.)

Site's Homepage:

In some embodiments, the platform's (e.g., interface, homepage, screen, hologram, interface, viewing display, hologram, etc.) May include but not be limited to (e.g., viewing, offering, view point, preview point, preview, options to view, etc.) which may include but not be limited to (e.g., feed, list, categories, options, profiles, content, etc.) Of, which may include but not be limited to (e.g., free, unlocked, available, publicly allowing, etc.) which may include but not be limited to (e.g., content, photos, videos, etc.) Offered by the, which may include but not be limited to (e.g., platform, models, creators, users, approved parties, etc.) In some embodiments, the (e.g., bidder, patron, member, VIP member, person, user, entity, figure, etc.) may be able to, which may include but not be limited to (e.g., click on the model's page to unlock custom photos, subscribe to her profile for automatically unlocked photos, to see her date availability is, see availability, see calendars, obtain membership, pay to view more, pay to subscribe, pay to become VIP, send tips, send money, see lives, view lives, obtain previews etc.) In some embodiments, the, which may include but not be limited to (e.g., platform, apps, hologram, screen, hologram, interface, viewing display, visuals, site's, etc.) which may include but not be limited to (e.g., screen, hologram, interface, viewing display, viewing, page, interface, homepage, etc.) may offer, which may include but not be limited to (e.g., public, paying customers, paying persons, persons, users, (e.g., bidder, patron, member, VIP member, person, user, entity, figure, etc.) The option to search, which may include but not be limited to (e.g., a category of "blondes" "brunettes" "actresses" "internet models" "models" "international models" "local models" "cosplay" search by location, area, etc.) which may allow finding, which may include but not be limited to (e.g., a category, model, person, user, etc.) for, which may include but not be limited to (e.g., date, subscribing, unlocks, view content, view calendar, book, schedule, inquire about, etc.)

Process of Bidding/Auction:

Some embodiments, including but not limited to (e.g., model, person, user, human, robot, bot, 3rd party, entity, computer system, AI system, AI, machine learning, robot, assistant, etc.) may have a yearly calendar. In some embodiments, the calendar may allow her (the user) to choose her schedule of availability. In some embodiments, the model may establish on her calendar a may include but not be limited to (e.g., price, the minimum bid price for a date, the minimum price for virtual, available times and days for dates, available options for restaurants for dates, only available options for dates, only available locations for dates, only available times for dates, etc.) In some embodiments, this may allow the may include but not be limited to (e.g., user, person, bidder, patron, member, VIP member, person, user, entity, figure, etc.) to may include but not be limited to (e.g., see, view, book, schedule, inquire about, meet, allow, create, etc.) may include but not be limited to (e.g., available time, date, and place for dinner or lunch date, etc.)

In some embodiments, the, which may include but not be limited to (e.g., bidder, patron, member, VIP member, person, user, entity, figure, etc.) that bids the most for the date at the end of the period, may win the date. It may be added to both the, which may include but not be limited to (e.g., bidder, patron, member, VIP member, person, user, entity, figure, etc.) 's calendar and/or confirmed in the model's and/or bidders/daters calendar.

In some embodiments, the model may be required to show up at the time and place that was, which may include but not be limited to (e.g., reserved, paid for, exchanged for, exchangeable sent, assets put up, etc.) for using any method, which may include but not be limited to (e.g., upload photos, upload videos, require signature, record, screenshot, obtain, tracking, timestamp, location tracking, etc.) for the, which may include but not be limited to (e.g., bidder, patron, member, VIP member, person, user, entity, figure, etc.) 's 'almost guaranteed' date.

'model/creator' has to prove 'she/aka the creator' was at the time and place of the paid-for date.

In some embodiments, the model may be required to which may include but not be limited to (e.g., film videos and pictures once she arrives, take record/obtain track time stamps, upload photos, upload videos, require a signature, record, screenshot, obtain, tracking, timestamp, location tracking, etc.) to prove that she was at the place during the paid-for date time, just in case the, which may include but not be limited to (e.g., bidder, patron, member, VIP member, person, user, entity, figure, etc.) claims the model never showed up at the paid-for date, which may include but not be limited to (e.g., time, location, day, etc.) In some embodiments, the model may consist of but not be limited to (e.g., upload photos, upload videos, require signature, record, screenshot, obtain, tracking, timestamp, location tracking, etc.) In some embodiments, these, which may include but not be limited to (e.g., photos, videos, content, signature, location, screenshot, verification, timestamp, location tracking, etc.) may be required upon, which may include but not be limited to (e.g., arrival, period, etc.) In some embodiments, which may include but not be limited to (e.g., selfies, recording, signature, location, screenshots, etc.) taken with, which may include but not be limited to (e.g., bidder, patron, member, VIP member, person, user, entity, figure, etc.)

'model/creator' may be encouraged to post 'proving punctuality' photos to her profile under possible 'trusted punctuality for dates.'

In some embodiments, she may be encouraged to which may include but not be limited to (e.g. obtain, take, post, use, etc.) as many photos and videos to her profile to prove she is, which may include but not be limited to (e.g., punctual, a good dater, a punctual dater, a fun dater, etc.) for the/a future, which may include but not be limited to (e.g., bidder, patron, member, VIP member, person, user, entity, figure, etc.). In some embodiments, the model may be able to, including but not limited to (e.g., take selfies with daters whether to post or not, take pictures of, record, or obtain a signature, etc.)

In some embodiments, the model may be forbidden to: which may include but not be limited to (e.g., go anywhere else, change plans, change date, change assignment, change meeting time or details, etc.), which may include but not be limited to (e.g., versus, with, in corroboration with, related to, etc.) the agreed upon contract may consist of but not be limited to (e.g., verbal, written, terms, etc.) that was placed when which may include but not limited to, the: (e.g., paying person, (e.g., bidder, patron, member, VIP member, person, user, entity, figure, etc.) user, etc.) which may include but not be limited to (e.g., won, obtained, secured, agreed upon, mutual agreement, etc.) which may have but not limited to, the: (e.g., date, connection, entertainment, virtual, agreement, etc.) In some embodiments, the model may be able not to change, which may include but not be limited to (e.g., location, date, time, place, person, etc.) without/with which may include but not limited to, the: (e.g., platform's approval, users approval, 3rd party approval, etc.) with, which may include but not be limited to (e.g., proof, full proof, acceptable reasons, agreed upon grounds, etc.) that something happened to, which may include but not limited to, the: (e.g., paying person, (e.g., bidder, patron, member, VIP member, person, user, entity, figure, etc.) And the date needs to be, which may include but not be limited to (e.g., refunded with no-penalty, non-refunded, rescheduled, etc.) In which the (e.g., bidder, patron, member, VIP member, person, user, entity, figure, etc.) may pay a, which may include but not be limited to (e.g., the penalty fee, full fee, total amount, no refund, etc.) because the model may have had to, which may include but not be limited to (e.g., take a shower, put on makeup, do her hair, style her hair, gather wardrobe for the date, put on clothes, manage her feelings, wash clothes, drive, park, pay valet, invest emotionally in, etc.) and/or the model will be compensated for her time if the (e.g., bidder, patron, member, VIP member, person, user, entity, figure, etc.) may not show up on the, which may include but not be limited to (e.g., contractually agreed upon date, place, and/or time, etc.) In some embodiments, the model may lose her entire, which may include but not be limited to (e.g., payment, bid payment, transmittables, etc.) if she does not show up for the date at, which may include but not be limited to (e.g., general agreed upon contract time, location, date, etc.) In some embodiments, the, which may include but not be limited to (e.g., bidder, patron, member, VIP member, person, user, entity, figure, etc.) may receive (e.g., full or partial or no refund, etc.) from the platform if the model did not meet contractual agreement(s). In some embodiments, the, which may include but not be limited to (e.g., bidder, patron, member, VIP member, person, user, entity, figure, etc.) may have to show, which may include but not be limited to (e.g., location proof, app proof, selfie with dater, selfie with other persons in restaurant, pictures or videos of data collected evidence, proof of time stamps, walk the entire restaurant, show the bar, and prove in various ways that the model is not present at the paid-for time, etc.)

Activities/Crimes that May Get You Banned from the Platform:

In some embodiments, any, including but not limited to (e.g., crimes, prostitution, escorting, sexual services, etc.), will not be tolerated. You may be banned from the platform indefinitely, and/or which may include but not be limited to (e.g., model, bidder, patron, member, VIP member, person, user, entity, figure, etc.)

Safety Measures for the Model

In some embodiments, the model may be encouraged by the platform to have safety measures in place. In some embodiments, the model is encouraged to bring, which may include but not be limited to (e.g., security, friends, entourage, cameras, family members, pepper spray, legally approved protection device, or anything else that would make the model feel more comfortable, etc.) to meet for, which may include but not be limited to (e.g., meeting, date, etc.) In some embodiments, the model is not required to tell the, which may include but not be limited to (e.g., bidder, patron, member, VIP member, person, user, entity, figure, etc.) her plans for security.

In some embodiments, the bidding/auction may be for them, including but not limited to (e.g., meeting, date, etc.) with the model. In some embodiments, any date/period, which may include but not be limited to (e.g., illegal activities, prostitution, trafficking, escorting, sexual services, etc.) will never be tolerated per basis of, which may include but not be limited to (e.g., country laws, local laws, state laws, local regulations, etc.) and/or you may be banned from the platform indefinitely.

Platform Offering Various Paid Contests or Appointed Contests, or Designated Persons:

In some embodiments, the platform may offer various, which may include but not be limited to (e.g., weekly, period based, monthly, for any period, etc.) contests to become the next, which may include but not be limited to (e.g., "girl on the cover" or "face of the platform for the month, campaign for some time, etc.) In some embodiments, each, which may include but not be limited to (e.g., period, etc.), which may include but not be limited to (e.g., a model or creator, or user, or person, etc.) may be, which may include but not be limited to (e.g., rewarded or deemed or set or changed, or appointed, or seen as, or promoted, or shown, etc.) as the, which may include but not be limited to (e.g., 'model of the month, month, year, day, week, or time or any period, etc.) and may be added to the, which may include but not be limited to (e.g., wall of fame, or saved portion or platform portion, or category, or list, or section, or obtain a badge, or be shown as, etc.) on the, which may include but not be limited to (e.g., platform, interface, marketing, promotional materials, etc.) and/or may be, which may include but not be limited to (e.g., promoted, displayed, shown, suggested, etc.) for some time. In some embodiments, to win this, which may include but not be limited to (e.g., person, user, creator, or model of the period, etc.) for the platform/brand, the model, which may include but not be limited to (e.g., fans, subscribers, persons, fans, people, family, friends, and fans, etc.) may, which may include but not be limited to (e.g., vote, appoint, suggest, pay for votes, the interface may be donated, donated, or it may be crowdfunded, etc.), which may include but not be limited to (e.g., for example, which may be having but not limited to In some embodiments, a 25, 10, 20, 30, etc.) or any percentage portion of the votes go to the, which may include but not be limited to (e.g., models, platform, platform's charity of choosing.

Featured Model of the Period or Duration, Check-In, Check-Out, Time Stamp, Time Record, Time and Data Record, Location, Time and Data Record, Coordinate(s):

In some embodiments, it may have a featured model with, which may include but not be limited to (e.g., exclusive content or purchased content, etc.) for any time duration, check-in, check-out, time stamp, time record, time and data record, location, time and data record, coordinate(s), which may include but not be limited to (e.g., time duration, check-in, check-out, time stamp, time record, time and data record, location, time and data record, coordinate(s), period, such as a month, period, week, day, year, etc.) may be a, which may include but not be limited to (e.g., voted on/appointed model, accepted, chosen, etc.) to, which may include but not be limited to (e.g., represent the platform/brand for the period, shoot content for, show for a brand, model for the brand, etc.) and/or may go in the, which may include but not be limited to (e.g., 'hall of fame" or archives, etc.) within the brand/platform. In some embodiments, the featured model may get a, including but not limited to (e.g., photo shoot done by the platform and/or the platform may own the content taken for the platform, etc.) In some embodiments, this may be to promote the, which may include but not be limited to (e.g., model, platform, etc.) for, which may include but not be limited to (e.g., bidder, patron, paying members, membership persons, users, member, VIP member, person, user, entity, figure, etc.), which may include but not be limited to (e.g., page, content, platform, etc.) as well as their, which may include but not be limited to (e.g., custom feed, unlocked content, subscription offerings, etc.) on the, which may include but not be limited to (e.g., platform, site, area, interface, etc.)

In some embodiments, the term 'date' or 'dater' may include but not be limited to (e.g., bidder, patron, member, VIP member, person, user, entity, figure, etc.) or 'high value, which may include but not be limited to (e.g., bidder, patron, member, VIP member, person, user, entity, figure, etc.)

In some embodiments, 'date' or 'dater' may include but not be limited to (e.g., bidder, patron, member, VIP member, person, user, entity, figure, high-value man' or high-value 'fan' may not have to be a 'date' etc.) may be or may not be a, which may include but not be limited to (e.g., 'business connection' or a 'friendship connection' or a 'networking connection' or a 'professional connection' 'potential dater' etc.)

The term 'model' or creator."

In some embodiments, the term, which may include but not be limited to (e.g., 'creator' or 'model' etc.), may not have to be a 'model,' 'celebrity,' 'famous person,' 'special person' or 'creator' interface may be 'networking connection' business connection, friendship connection, professional connection, personal relationship connection, courting connection, marriage connection, dating connection, attractive connection' 'potential date' 'possible love connection' etc.)

Artificial intelligence may be used on the platform.

In some embodiments, multiple ways artificial intelligence may be used on the platform such as, which may include but not limited to (e.g., robots, AI, humans, human and AI, machine learning, etc.) that may, may include but not be limited to (e.g., answering questions regarding profile person rules or date or dating or personal questions, schedule for, book for, book with, negotiate with, the answer to, have an automatic conversation with guests, patrons, or people coming by to view a profile, etc.)

In some embodiments, there may be an artificial intelligence questions box that any, which may include but not be limited to (e.g., bidder, patron, member, VIP member, person, user, entity, figure, etc.) may be able to, which may include but not be limited to (e.g., ask the bot questions about the model, interact with the model, schedule with the model, etc.) or interface may be the actual 'model' or 'creator' answering the questions for a potential fee paid by the (e.g., bidder, patron, member, VIP member, person, user, entity, figure, 'potential connection, potential dater' etc.)

In some embodiments, the creator can choose to be, which may include but not be limited to (e.g., seen by, displayed to, shown to, categorized, etc.) by any, which may include but not be limited to (e.g., bidder, patron, member, VIP member, person, user, entity, figure, 'fan' or 'man' or 'person making bid or date purchase on app, etc.)

In some embodiments, the 'creator' may be able to, which may include but not be limited to (e.g., send direct messages, send 'flirt smile,' show interest in, ask for a date, inquire about a date, message, suggest, etc.) to potential, which may include but not be limited to (e.g., bidder, patron, member, VIP member, person, user, entity, figure, etc.) on the, which may include but not be limited to (e.g., app, platform, etc.) that the, which may include but not be limited to (e.g., 'creator' or model, or 'she' etc.) which may include but not be limited to (e.g., likes, shows interest in, is interested in, wants, wants to go out with, etc.) In some embodiments, this may be another way for, which may include but not be limited to (e.g., bidder, patron, member, VIP member, person, user, entity, figure, etc.) and, which may include but not be limited to (e.g., 'creators' or models, etc.) to connect and find each other based on, which may include but not be limited to (e.g., filters, searching, location, categories, preferences, etc.) In some embodiments, which may include but not be limited to (e.g., for example, if the 'creator' wants to find a man that is 'tall, dark, and handsome, that spends a lot on dates because he has a high-verified net-worth' etc.) she may be able to search for him on the platform or site and she may be send him a, which may include but not be limited to (e.g., 'direct message' or she may be send him a 'flirty smile' or show interest, or propose a date to, or make a move on or suggest, etc.) which means that 'she' or the 'creator' may be interested in getting a, which may include but not be limited to (e.g., date, booking, interest, subscription, unlock, in-person date, virtual date, entertainment options set by anyone or model or user, etc.) from the, which may include but not be limited to (e.g., 'man' or dater, or subscriber, or follower, or bidder, bidder, patron, member, VIP member, person, user, entity, figure, etc.) In some embodiments, each, which may include but not be limited to (e.g., 'flirty smile' or 'direct message' or interest inquiry, or interest shown, etc.) may show up in the, which may include but not be limited to (e.g., bidder, patron, member, VIP member, person, user, entity, figure, etc.), which may include but not be limited to (e.g., homepage, inbox, notification, tabs, special information area, phone, device, email, notification, etc.) and/or he may be able to choose if he wants to, which may include but not be limited to (e.g., 'bid' on a date with, or book, schedule, inquire about, or schedule, or meet, or talk to, or subscribe to, or unlock photo, or unlock content, etc.) with any, which may include but not be limited to (e.g., user, model, creator, person on the lists of 'creators' that 'likes' him, or 'direct messages him' etc.) and/or he may be able to choose to do his, which may include but not be limited to (e.g., own search, get his own suggestions, view, search, display, etc.) and/or, which may include but not be limited to (e.g., book, schedule, inquire about, 'bid,' schedule, message, etc.) whoever he chooses.

In some embodiments, timing data may be, including but not limited to (e.g., downloadable/integrated/shown/displayed/connected/created calendar integration, etc.)

In some embodiments, which may include but not be limited to (e.g., calendar, timing data, scheduling data, scheduling (e.g., timer, time stamp, location stamp, business location stamp, confirmation of time, location, data, etc.) 's etc.) purpose may be to work with, which may include but not be limited to (e.g., calendar or personal calendar, or timing data, or 3rd party integrated, or 3rd party timing data, etc.) on, which may include but not be limited to (e.g., device, computer, phone, platform, 3rd party, potential 3-way integration, etc.) which may be to manage almost guaranteed dates with, which may include but not be limited to (e.g., models, creators, etc.) in some embodiments, this may be a, which may include but not be limited to (e.g., specialty calendar, or separate version, or separate integration, or public integration, or total exposure, or secret calendar, etc.) that may be put on, which may include but not be limited to (e.g., 'discreet mode calendar,' or secret mode calendar, etc.) which may be able to make the calendar integration show up automatically on the (e.g., bidder, patron, member, VIP member, person, user, entity, figure, etc.) calendar as, which may include but not be limited to (e.g., 'a work meeting' or a 'work lunch at xyz, suit and tie affair' or something similar/or a 'company dinner' etc.) In some embodiments, the, which may include but not be limited to (e.g., bidder, patron, member, VIP member, person, user, entity, figure, etc.) may also be able to put the integrated calendar as a, which may include but not be limited to (e.g., 'regular mode calendar,' or regular mode, or show data information, or show names, or show platform names, etc.) which may show the actual date activity or details for example which may be including but not limited to which may include but not be limited to (e.g., such as 'dinner with a model from out platform name' etc.) In some embodiments, this calendar may integrate and work directly with any which may include but not be limited to (e.g., mobile or computer operating systems, etc.) such as, which may include but not limited to (e.g., iOS, windows, android, computer applications, etc.) This calendar automatically sends reminders and makes sure that the (e.g., bidder, patron, member, VIP member, person, user, entity, figure, etc.) selects their 'personal preferences' on whether they want, which may include but not be limited to (e.g., reminders' 'discreet mode' 'regular mode' etc.)) these preferences may be changed at any time. It may automatically which may include but not be limited to (e.g., rename, change, update, edit, etc.) the 'dates' depending on which, which may have but not be limited to (e.g., calendar integration may be chosen, preferences, etc.) and/or may be, which may include but not be limited to (e.g., clicked, chosen, selected, etc.) on during the, which may have but not be limited to (e.g., agreement phase, contractual phase, negotiation phase, etc.) potentially when it is first/is integrated into their calendar and or mobile device calendar. In some embodiments, periodic reminders about a scheduled date may be sent, including but not limited to (e.g., app, platform, interface, to the user's mobile device, per preferences selected by the user, etc.) In some embodiments, the (e.g., bidder, patron, member, VIP member, person, user, entity, figure, etc.) may be referred to as user one, and the model/creator may be referred to as user 2.

In some embodiments, which may include but not be limited to (e.g., any dating activity, any date location, any restaurant location, any restaurant activity, breakfast, lunch, coffee, dinner date, another type of activity, etc.) which may include but not be limited to (e.g., movie, paintball, tennis, etc.) date may be in a, which may include but not be limited to (e.g., public place, suggested location, partner location, verified location, safe location, public location, etc.)

In some embodiments, which may include but not be limited to (e.g., integrated calendar, calendar, timing data, timing schedule, etc.), there may be pre-clickable/pre-selectable options to choose either breakfast, lunch, coffee, or dinner date. In some embodiments, there may be others, including but not limited to (e.g., go-kart date, bowling date, etc.)

In some embodiments, both may be filtered by a calendar, including but not limited to (e.g., men and women, daters, bidders, models, creators, etc.).

In some embodiments, the calendar itself may be a search option to find a 'date' for the, which may include but not be limited to (e.g., bidder, patron, member, VIP member, person, user, entity, figure, etc.) and an option for the 'creator' to find a, which may include but not be limited to (e.g., bidder, patron, member, VIP member, person, user, entity, figure, etc.) or potential, which may include but not be limited to (e.g., 'date,' connection, meeting, etc.) based on, which may include but not be limited to (e.g., 'time' 'date' and or 'restaurant location' preferences, etc.) In some embodiments, the, which may include but not be limited to (e.g., 'creator' or model, etc.) and/or, which may include but not be limited to (e.g., bidder, patron, member, VIP member, person, user, entity, figure, etc.) may be both simultaneously search through them, which may include but not be limited to (e.g., calendar app, calendar, interface, any screen, platform, etc.) to find a potential, which may include but not be limited to (e.g., 'date,' connection, type, category, list, looks, preferences, etc.) through the platform based on any preferences, selections, or choices.

Creator Preferences Potential Searches or Searches Reasons or Category Separation:

In some embodiments, preferences for 'creators, models,' which may include but not be limited to (e.g., 'height' 'weight' 'verified no criminal background' 'verified networth' 'verified social media or social networks or outside networks' 'verified address and date of birth' etc.) 'high value man' 'verified man' 'business owner' 'rich' 'entrepreneur' 'business owner' 'surgeon' 'doctor' 'handsome' 'secure in masculinity' 'not jealous' 'suggested' 'girlfriend' 'monogamous' 'tutor' 'mentorship' 'business partner' 'will help you with your business' 'business investor' 'surgeon' 'doctor' 'lawyer' 'entrepreneur' 'self-made' self-made millionaire' 'well connected' 'expensive dinners' 'will give gifts and cash on date' 'no experience in dating.' These tags may be private and only shown to 'creators' or 'models' that the 'high-value dater' or, which may include but not be limited to (e.g., bidder, patron, member, VIP member, person, user, entity, figure, etc.) wants the tags or information on their page to be, which may include but not be limited to (e.g., shown to, displayed, or public etc.)

In some embodiments, which may include but not be limited to (e.g., 'tags, categories, types, lists, verifications, background' may be added by 'high-value men' or 'high-value daters' and/or, which may include but not be limited to (e.g., bidder, patron, member, VIP member, person, user, entity, figure, 'fans' etc.)

In some embodiments, these, which may include but not be limited to (e.g., tags, categories, lists, etc.) may be used by, which may include but not be limited to (e.g., daters, users, bidders, 'high-value men,' etc.) that may be, which may include but not be limited to (e.g., verified on the platform, or 3rd party verified, etc.) to connect, which may have but not be limited to (e.g., 'creators' or 'models,' etc.) to the correct, which may include but not be limited to (e.g., 'type of connection they want, type of date, expectations, allowing, acceptances, etc.) or if they want to, which may include but not be limited to (e.g., search for that connection, or search themselves, or allow themselves to search, or reach out to users, or show interest in others, etc.) as an extra option of expansion, if they want. In some embodiments, these, which may include but not be limited to (e.g., tags, separation, lists, categories, etc.), may be used by, which may include but not be limited to (e.g., 'creators' or 'models,' etc.) as well to, which may include but not be limited to (e.g., properly, allow themselves to, etc.) which may include but not be limited to (e.g., explain what they are or what type of persona they want to give off, or their niche, or vibe or acceptance, etc.) for these potential in-person 'dates or connections or period(s).' In some embodiments, these tags may be also be used to, which may include but not be limited to (e.g., 'filter,' search, obtain, separate, list, etc.) when a, which may include but not be limited to (e.g., bidder, patron, member, VIP member, person, user, entity, figure, etc.) or a 'model' is search for someone to, which may include but not be limited to (e.g., 'follow' or 'unlock features' which may include 'photos' videos' 'advice' information' etc.)

In some embodiments, preferences/search options, which may include but not be limited to (e.g., bidder, patron, member, VIP member, person, user, entity, figure, etc.) or 'daters,' which may include but not be limited to (e.g., models, 'brunette' 'blonde' 'nearby' 'local' 'petite' 'busty' 'booty' 'smile' 'sweet' 'Type A or dominant' 'submissive' 'career-oriented' 'different' 'need 'photos' looks' mentorship' 'pretty face' 'pretty girl' 'creator' 'content creator' 'girl next door 'smart' 'nice-girl' 'mean girl' 'loving' 'mature' 'dinner' 'college student' 'suggested' 'student' 'celebrity' 'gorgeous' 'model' insta-model' 'entrepreneur' 'ful-time creator' 'model' 'girl next door' 'influencer' 'nearby creators' 'creators in city xyz' 'creators available on specific date' 'creators available at specific times, etc.)

In some embodiments, matching AI-connecting, of, which may include but not be limited to (e.g., tags, categories, lists, schedules, timing methods, availability, timing, period, etc.), may be used to present first-category users may include but not be limited to (e.g., bidder, patron, member, VIP member, person, user, entity, figure, etc.) to second category users may include but not be limited to (e.g., model, creators, model or creator, special persons, entity, 3rd parties, advertisers, advertisements, businesses, etc.) and/or vice versa in lists that may include but not be limited to (e.g., higher in lists, stack lists, earlier in stack lists, categories, separation, lists, etc.)

In some embodiments, artificial intelligence may be used to which may include but not be limited to (e.g., separate, categorize, show, display, suggest, give solutions, talk to, book, schedule, inquire about, schedule, assist, help, submit, answer questions, interact with, show interest in, do any task, answer any question, etc.) In some embodiments, which may include but not be limited to (e.g., platform, interface, etc.), may be using computing operation for both 'creators' and/or, which may include but not be limited to (e.g., bidder, patron, member, VIP member, person, user, entity, figure, all users, public persons, etc.)

In some embodiments, the artificial intelligence may look for, which may include but not be limited to (e.g., facial/body recognition, preferences, personal preferences, displayed preferences, etc.) based on what profile the, may include but not be limited to (e.g., bidder, patron, member, VIP member, person, user, entity, figure, etc.) which may include but not be limited to (e.g., clicks on, data collection, Network address, IP address, what they type in, search for, etc.) and may show, which may include but not be limited to (e.g., 'creator' and 'model' or particular user, etc.) results based on learned preferences or gathered data. In some embodiments, this also may include, which may include but not be limited to (e.g., facial photos that they like and how the 'creator' or 'model' looks, general visual details, or any content, or any content, or any details, etc.) In some embodiments, 'creators' may get, which may include but not be limited to (e.g., artificial intelligence-operation-based suggestions, questions, solutions, information, preferences, shown profiles, suggested profiles, suggested persons, options, etc.) so the 'model' may be able to, which may include but not be limited to (e.g., send a direct message or a 'smile wink,' or show interest, etc.) to a potential, which may include but not be limited to (e.g., bidder, patron, member, VIP member, person, user, entity, figure, etc.) or, which may include but not be limited to (e.g., 'high-value dater or user, or person, or entity, etc.) In some embodiments, which may include but not be limited to (e.g., artificial intelligence operations, machine learning operations, computer systems, etc.), may improve over time based on learning the user's preferences as the user may use the, which may include but not be limited to (e.g., interface, platform, interface, app, etc.) which may include but not be limited to (e.g., over some time or through data collection, Network address, IP address, experience, or gathered or known, or any type of gathered or collected data.

In some embodiments, which may include but not be limited to (e.g., calendar function, timing data, timing function, timing scheduler, etc.) may apply to, which may include but not be limited to (e.g., dating, interface, application, hologram, artificial intelligence, screens, viewable options, hearing options, connection, dating apps, social media functions, internet platforms, internet clicking/selecting parts, etc.)

In some embodiments, calendar function may be an, which may include but not be limited to (e.g., immediate, scheduled, any period regarding a type of a 'book-a-date function, etc.) which may include but not be limited to (e.g., owned by the platform, operated by the platform, integrated into the platform, company, user base, database, screen, hologram, interface, viewing display, viewing, persons, users, etc.) In some embodiments, the 'calendar function' may be, which may include but not be limited to (e.g., placed, shown, visible, available for clicking, tapping, moving, touching, voice commands, available for integration, available to send to a 3rd party site, available to create an option to schedule a 'date' after 'matching AI-connecting,' or after 'interest is shown' or after a 'direct message is sent' or after a 'smile wink is sent' or after or before a, which may include but not be limited to (e.g., bidder, patron, member, VIP member, person, user, entity, figure, etc.) shows interest on a/for a, which may include but not be limited to (e.g., 'creators profile' or creators information, or profile, or users profile, or content, etc.) and/or after a, which may include but not be limited to (e.g., 'fan' or 'high-value dater' etc.) which may include but not be limited to (e.g., clicks on, shows interest in, etc.) a 'models' page before or after a (e.g., bidder, patron, member, VIP member, person, user, entity, figure, etc.) shows interest, or after a, which may include but not be limited to (e.g., bidder, patron, member, VIP member, person, user, entity, figure, etc.) subscribes, before or after a, which may include but not be limited to (e.g., bidder, patron, member, VIP member, person, user, entity, figure, etc.) sees a scheduling option for a 'creator' or after a, which may include but not be limited to (e.g., bidder, patron, member, VIP member, person, user, entity, figure, etc.) sees an, which may include but not be limited to (e.g., 'ad, view, display' etc.) for a 'creator' or after the, which may include but not be limited to (e.g., bidder, patron, member, VIP member, person, user, entity, figure, etc.) or, which may include but not be limited to (e.g., 'high-value dater, or dater, or bidder' etc.) sees a, which may include but not be limited to (e.g., 'photo' or video,' or content, etc.) of the 'model or 'creator' or after the, which may include but not be limited to (e.g., 'high-value dater' or bidder, patron, member, VIP member, person, user, entity, figure, etc.) may/sees a, which may include but not be limited to (e.g., 'social media stream, feed, content, etc.) of the/from the, which may include but not be limited to (e.g., 'model' or 'creator' etc.))

Book a Date Function

In some embodiments, the, which may include but not be limited to (e.g., book-a-date function, booking option, scheduling option, timing data option, timing option, etc.) may send the, which may include but not be limited to (e.g., bidder, patron, member, VIP member, person, user, entity, figure, etc.) fan, user, person, high value dater, etc.) a, which may include but not be limited to (e.g., bid option, buy now option, subscribe function, schedule function, payment processor, etc.) which may include but not be limited to (e.g., before, after, prior, after, etc.) which may include but not be limited to (e.g., scheduling, clicking, asking for, requesting, being offered, viewing, accepting, considering, checkout, which may include but not be limited to (e.g., breakdown, itemized, receipt, invoice, total, partial, analysis, bill, summary of, total, etc.) which, which may include but not be limited to (e.g., date, connection, entertainment, etc.) with the option to, which may include but not be limited to (e.g., book, schedule, inquire about, schedule, secure, select, choose, pay for, etc.) a, which may include but not be limited to (e.g., date, connection, entertainment, virtual meeting, in-person meeting, message, location, a time, live event, live, a live, a place, an event etc.)

After 'Matching AI-Connecting,'

In some embodiments, which may include but not be limited to (e.g., viewing, seeing, connection, a view, an interest, a wink, a message, etc.) Is made, an, which may include but not be limited to (e.g., an automatic, manually, an artificial intelligence created, voice command, AI-induced, etc.) which may include but not be limited to (e.g., 'time' 'date' 'place' 'date option' 'information' 'send a gift' 'order a gift' 'order flowers,' etc.) which may be automatically booked, made, checked out, etc.)

Footnotes: In some embodiments, which may include but not be limited to (the word 'he' may be in replacement of masculine role in platform or pursuer, or payer, or the person paying, 3rd party paying, entity paying, a business paying, any gifting, gifting, donations, donating her/he/they/them and may refer to, which may include but not be limited to (e.g., bidder, patron, member, VIP member, person, user, entity, figure, etc.) 'fans' 'customers' 'patrons'). In alternate embodiments, the first category users or user one or may include but not be limited to (e.g., bidder, patron, member, VIP member, person, user, entity, figure, etc.) may be any gender or person. In some alternate embodiments, the second category users, user 2, or creator/model may be any gender or person.

On any user interface, any user interface, or platform or process: In some embodiments, any user interface may have an option for a user to, which may include but not be limited to (e.g., scroll up, down, left right, that may be scrolled up and down, left and right, or in and out, or back and forth, or disappearing, or appearing, or automatically moving, or auto-changing, or manually changing, etc.) In some embodiments, the, which may include but not be limited to (e.g., use, the person, content creator, model suggestion, 3rd party content, content, ad, advertisements, promotional material, content, etc.) may be moved to view another one, or moved in a way to view their photos, or moved in a way to view a profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections. In some embodiments, there may be, which may include but not be limited to (e.g., stacks or options to continue to look or get automated looking or viewings of content, creators, models, users, etc.) In some embodiments, there may be a countdown until, which may include but not be limited to (e.g., items, users, user interfaces, selections, options, etc.) may be, which may include but not be limited to (e.g., dispersed, not available, gone, left, unable, finished, completed, to submit a complaint, to submit issue, to submit an inquiry, to obtain refund, to have payment, to allow payment, price, cost to continue, to be able to click or use option, etc.) In some embodiments, which may include but not be limited to (e.g., questions or suggestions, or items, etc.) to add to paying person's, which may include but not be limited to (e.g., bill, receipt, invoice, total, partial, breakdown, invoice, payment bill, etc.) may include but not limited to (e.g., paying for valet, a refund for valet, a refund for gas money, refund for driving, travel, route, shown on the odometer, driving, travel, route, fee, no taxi-service fee, not able to provide me with a taxi service fee, excessive valet fee, parking and walking fee, security fee, security guard fee, smelling bad fee, allergic reaction fee, parking payments, waters, lotions, ruining dress, spilling on the dress, ripping dress, getting sick, feeling nauseous, person being rude to the person, being verbally harassed, feeling uncomfortable, overtime fee, therapy fee, talking too much fee, etc.) In some embodiments, which may include but not be limited to (e.g., reminders, questions, solutions, etc.) may be able to ask through, which may include but not be limited to (e.g., humans, users, persons, AI services, etc.) whether, which may include but not be limited to (e.g., paid for or included, etc.) or on the, which may include but not be limited to (e.g., platform, user interface, etc.) In some embodiments, any agreement may not have to be made through any written contract. In some embodiments, any contract or arrangement may be made, which may include but not be limited to (e.g., agreement or understood agreement or partial agreement may be made verbally, text, messaging, 3rd party, outside platform, inside platform, through platform, outside of the platform, voice agreements, written agreements, text agreements, messaging agreements, partial agreements, may all be held as 'contractual agreements or agreed upon agreements, or booking or secured, etc.) Any combined user interfaces, any user interfaces combined: In some embodiments, user interfaces may be combined with any other, which may include but not be limited to (e.g., described, shown, similar, etc.) which may include but not be limited to (e.g., user interface, process, or computing system, etc.)

General processing: In some embodiments, the, which may include but not be limited to (e.g., calendar or the timing method, or 'booking process,' etc.) may, which may include but not be limited to (e.g., automatically, manually, etc.) transfer to a, which may include but not be limited to (e.g., 3rd party to book, schedule, inquire about, inquire about, inquire regarding, secure, create connection to, hold, pay for, create business relationship with, use transmittables to secure or book, schedule, inquire about, etc.) or outside entity, or other outside process, or user interface may manually input data, or user interface may have a list of verified locations or verified approved locations to choose from etc.) In some embodiments, locations may be, which may include but not be limited to (e.g., manually approved, or generally approved, or each one approved or chosen etc.) based on their, which may include but not be limited to (e.g., 'type of business' or type or sort of business etc.) for example a, which may include but not be limited to (e.g., 'restaurant location that is verified' or any business within a location, or within a distance, or within a state, or local business, or in a time period duration, check-in, check-out, time stamp, time record, time and data record, location, time and data record, coordinate(s), or type of business, or sort of business, or public location etc.) may be, which may include but not be limited to (e.g., automatically approved, each one approved, each one chosen, chosen by platform, chosen by person, accepted, allowed, etc.) to be able to, which may include but not be limited to (e.g., book from, secure time, secure slot, secure activity, book or pay for date or time or connection or services or goods, Gifts in exchange for date, send gifts or buy something from 'wishlist' or 'list' or 'listed item' in exchange for date or time or virtual date or in person date or in exchange to view calendar or schedule or time or be able to message or book date or send like or interact with, etc.) there may also be a, which may include but not be limited to (e.g., manual application of data, or a manual application of data, or way to insert data that may have to be approved, or platform approved, or other party approved, or confirmed by other person, or confirmed by saying person, or 3rd party approved or confirmed, etc.) that may have to be, which may include but not be limited to (e.g., approved, confirmed, agreed upon, verbal agreed upon, contractually agreed upon, etc.) which may include but not be limited to (e.g., prior, during, after, etc.) to allowing a, which may include but not be limited to (e.g., booking, agreement, confirmation, time period, secured slot, activity, date, time period, goods or services, etc.) In some embodiments, the, which may include but not be limited to (e.g., verified locations, or locations chosen by anyone, or businesses chosen, or businesses verified, or approved businesses or locations or times or parties, or activities, or 3rd party entities, or 3rd party bookings etc.) to, which may include but not be limited to (e.g., chosen from, booked from, may be allowed, may be available, may be approved, known to be approved, available to be approved by location partner or for location partners, approved location partners, available for a date, etc.)

In some embodiments, any sentence, any embodiment, any feature, any interface, any part, any word, any phrase, any adding, any nodule, any button, any interface, any content, any note, any process, any combination hereof may be listed here in any arrangement, and there is more than is listed here to be considered as etcetera.

"connection platform interface(s)/processes" Broad definitions: In some embodiments, 'dating may refer to, which may include but not be limited to (e.g., any type of connection, meeting, communication, speaking, chatting, seeing, viewing, unlocking content, subscribers, followers, emojis sent, likes, flirting, responses to gestures, gestures, gifting, sending gifts, sending suggestions, feedback, referring to another person, subscribers subscribing, payment being made to another person, payments, etc.) In some embodiments, connection may refer to as which may include but is not limited to (e.g., 'connection or date or virtual date, entertainment options set by anyone or model or user, transportation device, virtual interaction, digital interaction, hologram interaction, or 3d interaction or 4d interaction, or virtual reality interaction, speaking, communicating, virtually communicating, chip in brain, chip in body, reading thoughts, voice commands' etc.) which may include but is not limited to (e.g., virtual dates via internet, hologram, transporting device, breakfast, lunch, dinner, coffee, activities, entertainment situations, walks, hikes, runs, virtual, playing games online, playing games virtually or through holograms, viewing hologram, viewing entertainment, entertaining, any form of communication, emojis sent, content sent, accepted content, sending money, paying, basketball, fitness situations, working out, private jet flying, airplane transportation, train transportation, car transportation, fun situations, fun activity situations, talking situations, communication situations, silent situations, virtual situations, technological situations, virtual reality situations, photo, video, simulated, event, in-person, joining, showing up, virtually showing up, in-person showing up, driving, travel, route, by, showing your face, or media situations, etc.) Payment may be defined as which may include but is not limited to (e.g., conditions that are required to be met, general conditions, agreed upon terms, etc.) which may include but is not limited to (e.g., assets, payment, money, crypto, virtual money, credits, 3rd party credits, house, real estate, stocks, ownership in company, shares of company, jewelry or items that may be exchanged for money, gold, silver, oral verbal contracts such as 'I will sign over the deed of my house to you if you go on a date with me.' etc.) Movements which may include but is not limited to (e.g., clicking, tapping, left, right, up, down, swiping, etc.) which may also all be indicated as which may include but is not limited to (e.g., 'voice activated' or movements made due to voice commands or voice sounds, or any sounds, brain chips, body chips, or any automatic movements, or computing operation movements, or chip-related movements, or chip-activated movements, or planted chip-movements, or brain-movements, or brain-commands through self or 3rd party, alien, foreign entity, foreign party, or another person's commands and not the users, happen by itself, or adapted commands, or animal commands, movements, taps, or movements etc.) In some embodiments, a, which may include but is not limited to (e.g., 'date log, management area,' or 'date data collection' or 'data collection' etc.) may be, which may include but not be limited to (e.g., anything that is collected and stored in relation to a connection, a date, a meeting, a potential meeting, a connection online, etc.) In some embodiments, data may be, which may include but is not limited to (e.g., anything that is collected and stored, anything collected, any data, any recoded data, any obtained data, any 3rd party data, any internal data, etc.) In some embodiments, creator may be, which may include but is not limited to (e.g., a person being paid, etc.) In some embodiments, 'matching' may also be defined or seen as, which may include but not be limited to (e.g., connecting, suggesting, computing operation-connecting, AI-connecting, displaying, showing up, messaging, in messages, in ads, advertisements, etc.) In some embodiments, anything which may include but is not limited to (e.g., person or user, or man etc.) may be referred to as a, may include but not limited to (e.g., user, person, entity, 3rd party, bank, organization, etc.) In some embodiments, a paid person may refer to or may be, which may include but not limited to (e.g., person being paid or person paying depending on which is being referred to, etc.) In some embodiments, a paying person may be a may include but not limited to (e.g., person paying, etc.) In some embodiments, any user interface may include a may include but not limited to (e.g., 'chatting section, or a talking section, or a comment section' or a 'comment only or comment pictures, content, videos, etc.) section etc.) In some embodiments, user may have to may include but not limited to (e.g., 'pay to comment anywhere, pay to interact, send tips, send money, interact with, etc.) which may include but not limited to (e.g., section, or an emoji section, etc.) In some embodiments, bidder may be a may include but not limited to (e.g., person paying, bidder, fan, user, entity, etc.) In some embodiments, may include but not limited to (e.g., 'Contracts agreements,' or 'any time of agreements,' etc.) may also be determined as may include but not limited to (e.g., 'oral agreements' written agreements, typed agreements, recorded agreements, or voiced agreements, or implied agreements, or understood, or gentleman agreement, etc.) In some embodiments, (e.g., friend, other model, other creator, other user etc.) may be defined as may include but not limited to (e.g., any user, or any person, or any 3rd party, or any entity, etc.) In some embodiments, The term may include but not limited to (e.g., 'paid' or 'payment' or 'paying' 'or assets' or 'exchange of value' or 'money' etc.) may also be determined as may include but not limited to (e.g., any type of agreement whether it is 'free or not free' 'any type of exchange of value, whether it is determined as not an exchange of value' or self-determined exchange of value' or no payment is made etc.) In some embodiments, content (all content may be referred to as possibly may include but not limited to (e.g., women or men's bodies that are over the age of 18, male or female, NSFW, not-safe-for-work, suggestive, NSFW, suggestive content, solo acts, private area, non-private areas, suggestive areas, 18+ content, videos, productions, pixels, photos, memes, gifs, photos, edited photos, edited videos, etc.) In some embodiments, content may be obscured or blurred based on settings established by the user or the platform. In some embodiments, which may include but not be limited to (e.g., 'book for job' or 'job' or 'gig,' or work, etc.) may be any type of job which may include but not limited to (e.g., modeling, receptionist, assistant, fashion show, event modeling, recruitment jobs, desk jobs, temporary jobs, permanently jobs, gigs etc.) In some embodiments, payment may be, which may include but is not limited to (e.g., viewed as anything of value may include but not limited to car title, house title, deed to house, equity in a company, shares of a business, shares of a company, stock portfolio, stock assets, cash, gold, silver, diamonds, crypto, digital assets, etc.) method accepted may be, which may include but is not limited to (e.g., notified or specified, or given, or donated, or verbal agreements, or verbal usage, or contractual agreements, etc.) In some embodiments, assets may be, which may include but is not limited to (e.g., viewed, seen, understood, received, etc.) as anything of value which may include but is not limited to (e.g., car title, house title, deed to house, equity in a company, shares of a business, shares of a company, stock portfolio, stock assets, cash, gold, silver, diamonds, crypto, digital assets, etc.) method accepted may be, which may include but is not limited to (e.g., donated, given, notified, specified etc.) In some embodiments, dating which may include but is not limited to (e.g., meeting in person, meeting online, meeting hologram, meeting 3d, meeting 4d, time spent with two people, time passing with two people, time spent, time, time period, connection, response, contact, AI-contact, robotic contact, etc.) In some embodiments, which may include but not be limited to (e.g., matching AI-connecting, connection, comparing, etc.) may be any, which may include but not be limited to (e.g., manual, automatic, manually made, AI created, etc.) which may include but not be limited to (swiping, tapping, clicking, recommendation, computing operation, etc.) In some embodiments, 'paid daters' may refer to, which may include but not limited to (e.g., persons paying for a date, person being paid for a date' etc.) In some embodiments, the patented which may include but not limited to (e.g., 'date log, management area, etc.) which may be, which may include but not limited to (e.g., called, included, for use, shown as, interacted with, displayed as, etc.) but not limited to a, which may include but not be limited to (e.g., date log, management area, case log, data collection, network address, IP address, recording of interaction situation, situation, connection, connection history, connection log, etc.) which may be including but is not limited to (e.g., data recording, automatic recording, virtual recording, data collection, Network address, IP address, uploading proof of a date, photo video and voice proof of the contractual obligations of the date, etc.) In some embodiments, which may include but not be limited to (e.g., point scale system or point scale, or solution system, or solution scale system, etc.) may be defined as which may including but is not limited to (e.g., knowledge scale system, knowledge system, risk system, risk-conclusion system, data assessment and solution, data assessment, information, information to collusion system, risk assessment and risk conclusion, or conclusion based on risk, data, information scale system, etc.)

In some embodiments, the location of a user may be collected by including but not be limited to (e.g., satellite, router, phone, network, cell phone, pinging towers, servers, manual, automatic, AI, machine learning, 3rd party data, self-reporting, etc.)

The term signal, signals, or data may refer to a single or multiple signals which are non-transitory in nature. Any reference to a signal may be a reference to an attribute of the signal, and any reference to a signal attribute may refer to a signal associated with the signal attribute. As used herein, the term "real-time" or "dynamically" in any context may refer to any of current, immediately after, simultaneously as, substantially simultaneously as, a few microseconds later, a few milliseconds after, a few seconds subsequently, a few minutes after, a few hours after, a few days after, a period after, etc. In some embodiments, the term "modify" or "modification" may be interchangeably used with the term "transform" or "transformation."

The present disclosure provides several critical technical advantages that may be readily apparent to one skilled in the art from the figures, descriptions, and claims. Moreover, while specific advantages have been enumerated above, various embodiments may include all, some, or none of the listed advantages. Any sentence or statement in this disclosure may be associated with one or more embodiments. Reference numerals are provided in the specification for the first instance of an element numbered in the figures. In some embodiments, the reference numerals for the first instance of the element are also applicable to subsequent instances of the component of the specification, even though reference numerals may not be provided for the subsequent instances of the element.

While various embodiments in accordance with the disclosed principles have been described above, it should be understood that they have been presented by way of example only and are not limiting. Thus, the breadth and scope of the disclosure(s) should not be limited by any of the above-described exemplary embodiments but should be defined only in accordance with the claims and their equivalents issued from this disclosure. Furthermore, the above advantages and features are provided in described embodiments. Still, they shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the disclosure(s) set out in any claims that may issue from this disclosure. Specifically, a description of a technology in the "background" is not to be construed as an admission that technology is prior art to any disclosure(s) in this disclosure. Neither is the "summary" to be considered as a characterization of the disclosure(s) outlined in issued claims. Furthermore, any reference in this disclosure to "disclosure" in the singular should not be used to argue that there is only a single point of novelty in this disclosure. Multiple disclosures may be set forth according to the limitations of the various claims issuing from this disclosure, and such claims accordingly define the disclosure(s), and their equivalents, that are protected thereby. In all instances, the scope of such claims shall be considered on their own merits in light of this disclosure but should not be constrained by the headings herein. Any features or embodiments described in one section or paragraph anywhere in this disclosure, or in any reference or application incorporated by reference herein, can be combined with any other features or embodiments described in another section or paragraph anywhere in this disclosure, or in any reference or application incorporated by reference herein.

Interfaces/Additional Process Flows

Figure 1C:
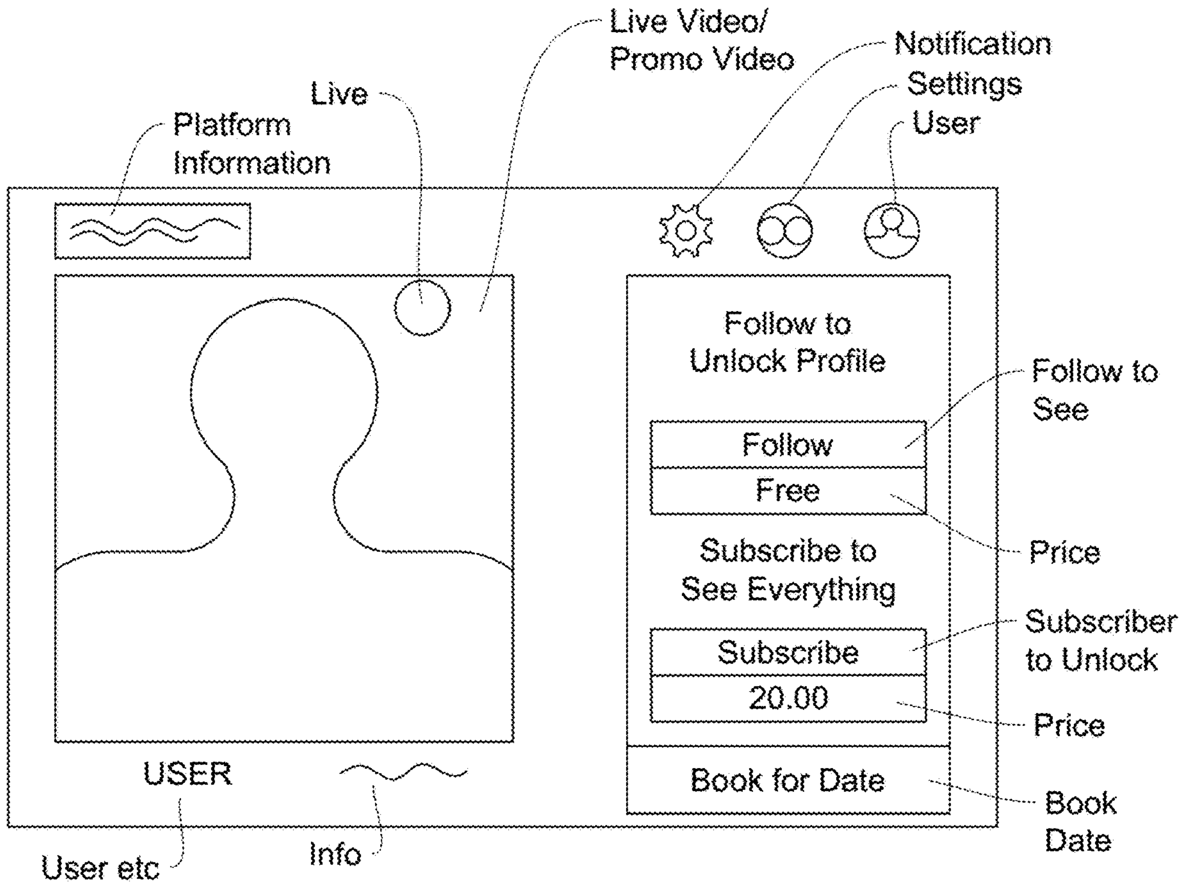

FIG. 1C: In some embodiments, there may be a screen or a user interface that may show content, which may include but not be limited to (e.g., a live video, a pre-recorded video, a seemingly live video, a pre-recorded live video, a video recording, any content, etc.) that is promoting the, which may include but not be limited to (e.g., following, subscribing, booking, calendar, timing method, timing data, scheduling data, etc.) of the, which may include but not be limited to (e.g., model or creator platform, or to unlock their content, etc.) In some embodiments, there may be, which may include but not be limited to a: (e.g., live video, a pre-recorded video, a seemingly live video, a pre-recorded live video, a video recording, any content, a follow button, book for date, booking, calendar, timing method, timing data, scheduling data, instructions, how-to, descriptions, date ideas, date options, a pre-recorded or pre-selected list of ideas, a subscribe button plus payment, payment button, payment options, acceptable payment options, acceptable subscriber options, how to view full profile, how to see photos, how to see videos, how to view content, user information, user content, promotional content, settings, notifications, user settings, etc.) In some embodiments, there may be screen options for profile viewing options. In some embodiments, a clicking option may refer to a selecting option (e.g., selecting using a finger or some other type of input device that enables selection on a display screen). In some embodiments, a button may refer to any selectable option on a display screen.

In some embodiments, there may be a headline or a header photo or video at the top; this also may be a gif, a moving item, or a still item such as a photo. In some embodiments, the creator, person, dater, paid person, paid person, or platform may choose a profile photo. In some embodiments, there may be an option to 'book an in-person date' from, which may include but not be limited to (e.g., profile photo, a button, clicker, swiping method, or any clicking method near profile photo, video, or any section on the profile page or outside of the profile page, etc.) In some embodiments, there may be, which may include but not be limited to (e.g., subscribe, follow for free, unlock photo options, free photo options, free video options, tipping buttons or options, messaging options to send a direct message, messaging options that may include being able to attach, add, or contain a photo, a voice recording, a video recording, or a live recorded message to be sent to the creator, model, or another person, etc.) In some embodiments, there may be an option to 'add friends' or follow options' for other creators or 'paid persons on the platform.' In some embodiments, there may be a link to, which may include but not be limited to (e.g., book an-in person date, activity, method, connection, live streaming, live video call, live phone call, etc.) through the, which may include but not be limited to (e.g., platform or any user interface or 3rd party, etc.) In some embodiments, user interface option(s) and or/button which may take the, which may include but not be limited to (e.g., person, user entity, etc.) to another screen that may show a, which may include but not be limited to (e.g., calendar, timing method, timing schedule, scheduling device, scheduling options, day organizer, life organizer, etc.) that may include the person's, which may include but not be limited to (e.g., timing data, schedule data, scheduling data, timing methods, schedule, timing methods, etc.) which may include but is not limited to (e.g., available booking dates, preferences on booking dates, options that may be chosen, limited availability, limited options, limited viewing of the calendar, only showing dates available, only showing options that the creator wants, etc.) In some embodiments, this calendar or section, or page may show the creator's set preferences which may include but are not limited to (e.g., creator's likes including for example which may be including but not limited to 'seafood restaurants, 'Steak Restaurant, Time preferences (lunch or dinner),' 'time preferences such as 6-8 pm for in-person dates, other likes such as 'I love gentlemen that may show up on a date with flowers, etc.)

Figure 2:
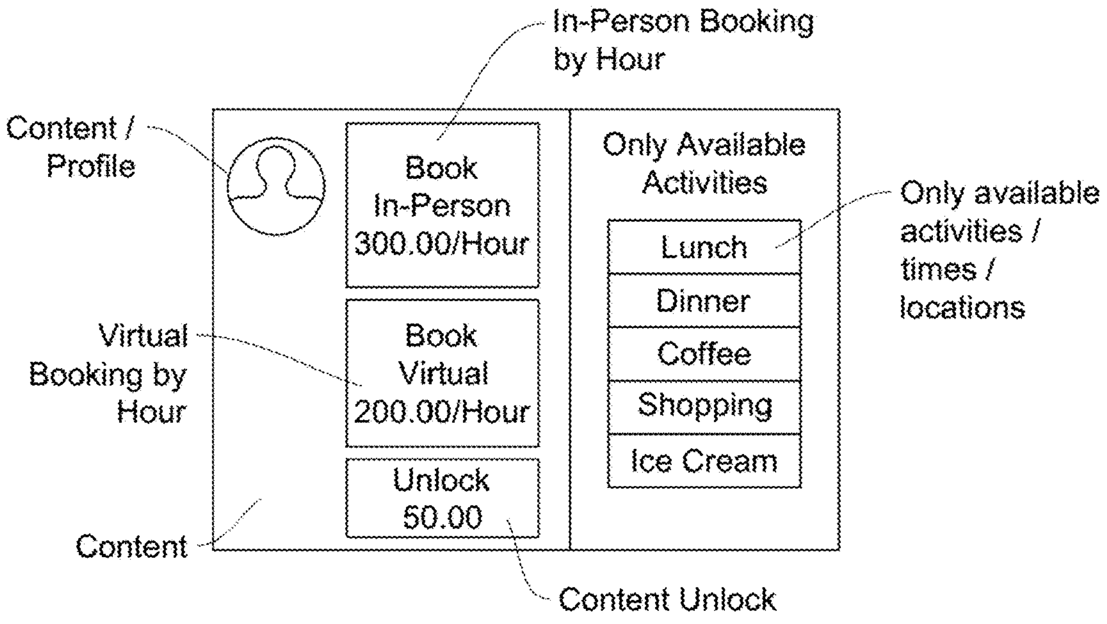

FIG. 2: In some embodiments, there may be a user interface that may show which may include but not limited to (e.g., content, profile information, profile photo, virtual booking by the hour, in-person booking by the hour, content, locked content, unlocked content, available activities, etc.) which may include but not limited to (e.g., breakfast, brunch, lunch, dinner, dessert such as ice cream or chocolate, shopping, sushi, make-up shopping, etc.) which may include but not limited to (e.g., prices, price ranges, general pricing, general transmittables, unlock prices, price ranges, general pricing, general transmittables, pay by the hour prices, price ranges, general pricing, general transmittables, pay by the activity prices, price ranges, general pricing, general transmittables, locations, dates, times, virtual prices, in-person prices, per month pricing, annual pricing, virtual dates, set date times including the time, location, and pre-approved items such as menu, pre-set dates, etc.) which may include but not limited to (e.g., times, locations, prices, price ranges, general pricing, general transmittables, menu options, options to purchase dinner during check out, available activities such as bowling, restaurants, gifts, date ideas, ice cream, digital dates, in-person date ideas, etc.) In some embodiments, there may be user interface, which may include but not be limited to (e.g., booking options, availability, live information, live, live calendar, timing method data, timing data method, timing process data, general calendar, price per activity, price for date, price per hour, calendar with specific details or, which may include but not be limited to (e.g., breakdown, itemized, receipt, invoice, total, partial, breakdown, bill, summary of, total, times during specific day amiable, activities and or duration, check-in, check-out, time stamp, time record, time and data record, location, time and data record, coordinate(s), s for activities available, price, duration, check-in, check-out, time stamp, time record, time and data record, location, time and data record, coordinate(s), confirmation button, legal documents, legal agreements, date agreements, location, type of category, type of date, partnerships, partner locations, information, open times, possible times, bidding/auction, bidder times, user times, bidding/auction option times, platform, content, user, settings, information, user sign in, register information, contact information, contact for payment, price to contact, add to list, add to category, favorite, book in-person, book virtual, book talk, book chat, book video chat, book video meeting, book voice conversation, prices, price ranges, general pricing, general transmittables, for booking, book for job, price to book, schedule, inquire about, inquire about, inquire regarding, secure, create connection to, hold, pay for, create business relationship with, use transmittables to secure or book, schedule, inquire about, etc.) for job, price ranges, price, changing price ranges, price, changing prices, price ranges, general pricing, general transmittables, information, content, moving content, stationary content, suggestions, users, blog posts, information, posts, small blog posts, large statements, statements, request follow up call, price for follow up call, price for follow up connection, writings, chatting, contact boxes, achievements, information, categories, lists, live streams, past streaming, past content, locked content, unlocked content, etc.)

In some embodiments, there may be an interface or a user interface with which may include but not limited to (e.g., introductory profile, intro video, intro content, profile photos, price, buy now, price plus buy-now, market price, platform market price, options to pay in cash, 3rd party links to debt sites, 3rd party sites to redeem value or cash platforms, debit, credit, jewelry, car title, site funds, preloaded funds, etc.) In some embodiments, there may be user interface, which may include but not be limited to (e.g., locked profile until requirements are met, live shows, live events, live plus content, live plus no content, live plus options to view more, played show, free show, previewed show, a live show, live options to view profile, live profile, live streaming, live streaming, pre-recorded streaming, prerecorded shows, pre-made content, in-person date options, booking date options, profile date options, unlock content date options, price of date, price per hour, price for time, availability, price per activity, free follow, options to follow, options to view entire profile, unlock, previews, chat previews, content previews, content, photos, videos, communication, chat boxes, options or areas to share information, communication, options to send tips, suggested user profiles, computing operation chosen profiles, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, dates, availability to message, messages, prices, price ranges, general pricing, general transmittables, types, categories, a section at the Bottom, top, side, anywhere, with other suggestions or profiles, or persons, or promotional material or content or information etc.) In some embodiments, there may be options to, which may include but not limited to (e.g., move, scroll, switch, disappear, reappear, swipe etc.) any, which may include but not be limited to (e.g., user interfaces, content, items, parts of user interface etc.)

Figure 3:
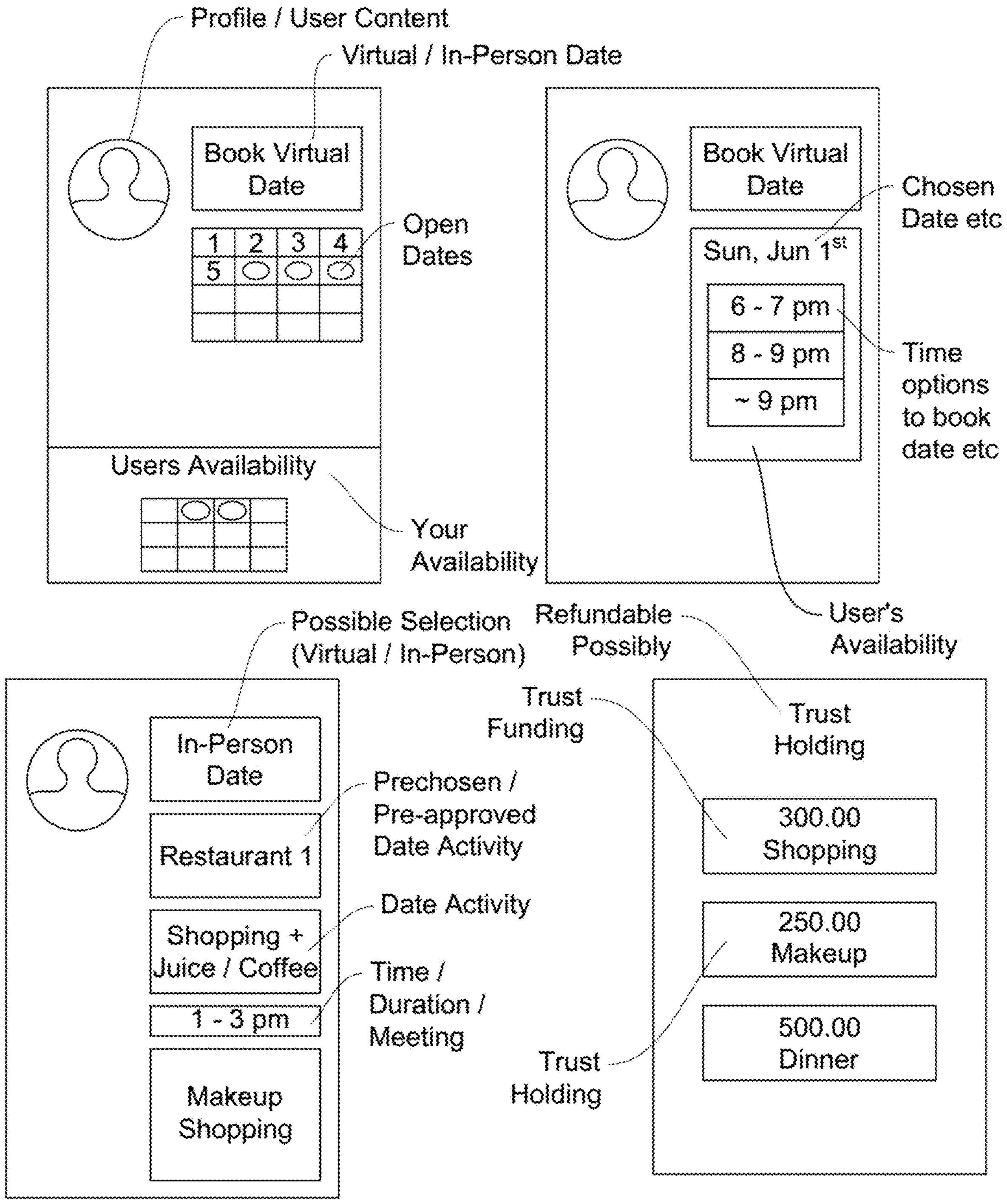

FIG. 3: In some embodiments, there may be, which may include but not limited to (e.g., connection options, viewing options, voice options, virtual options or in-person options, etc.) In some embodiments, there may be, which may include but not limited to (e.g., different or pre-chosen or pre-determined times, lengths, availabilities, etc.) In some embodiments, there may be options or descriptions of the, which may include but not limited to (e.g., date activity' or the 'date service' or the 'shopping experience, etc.) In some embodiments, there may be a combination of may include but not limited to (e.g., a profile photo or profile information or users information, matching AI-connecting, buttons, see more options, unlock content, match, add to list, add to location list, add to calendar list, add to virtual date list, book for virtual date, entertainment options set by anyone or model or user, book for in-person date, matching AI-connecting, users calendar to model's calendar with booking options, matching AI-connecting, users and model or creators calendar, showing match preferences, showing computing operation match made, auto match made, AI match made, message options to pay to message, free message options, timing, data, timing data, scheduling data, book a date, bid on a date, book a virtual date, entertainment options set by anyone or model or user, messaging options, booking options, book date now, pre-schedule date, pre-book date, plan annual date, reserve date now, reserve time now, gifts in exchange for date, send gift in exchange for time or date, gifting in exchange for date, gifts for dates, gifts for time, payment for time, payment for date, expenses paid for date, Gifts in exchange for date, send gifts or buy something from 'wishlist' or 'list' or 'listed item' in exchange for date or time or virtual date or in person date, pay for date now, pre-pay date for future, block off calendar, block of another person's calendar, block off the calendar available, show user's availability, show user's location, show user's calendar or schedule, date options, virtual date options, in-person date options, information, informational options, profile options, profile preferences, etc.) In some embodiments, there may be an ongoing screen that may be show anything ranging from which may include but are not limited to (e.g., register, log-in-, sign-in, become a model, apply, timing, data, timing data, scheduling data, book a date, bid on a date, book a virtual date, entertainment options set by anyone or model or user, see exclusive content, follow a creator, subscribe to a creator, discover creators or models, discover 18+ models, discover calendar options, discover available times, dates, locations, choose your location, choose your time, craft your calendar, see our models, 18+ models, calendar times available, short version or long version of model's calendar's, users calendar, an option to craft a calendar or to input a calendar, options to creator a calendar, options to insert work schedule to get a calendar made for that person, profile options, featured options, new options, live bidding/auction, live bidding/auction rooms, live category rooms, live type of model rooms, live type of date rooms, live charity events, live events, etc.) In some embodiments, user may be able to search may include but not limited to (e.g., on calendar, around calendar, on user interface, on each day, time period searching, within a time period, within calendar, etc.) which may include but not limited to (e.g., on each day, such as search within a time frame, or time period, or category) time frames may be include but not be limited to (e.g., lunch, snack, dinner, coffee, shopping, virtual, in-person, restaurant, etc.)

In some embodiments, the user may be able to search on the calendar, which may include but not be limited to (e.g., per day, per period, per week, per location, per distance, per popularity, per type of model, per type of creator, per user, per availability, per activity, etc.) In some embodiments, there may be an option to book, schedule, inquire about, inquire about, ask regarding, secure, create a connection to, hold, pay for, create a business relationship with, use transmittables to secure or book, schedule, inquire about, etc.) an in-person date with, which may include but not be limited to (e.g., the model, creator, or person, etc.) In some embodiments, there may be a, which may include but not be limited to (e.g., trust fund option or required payment, etc.) to secure (e.g., payment/booking/time, etc.) for may include but not limited to (e.g., dinner, time, activity, etc.) In some embodiments, there may be an option or requirement to pay for the creator, model, or person's time that may or may not be non-refundable if the requirements or agreement for the date is fulfilled regardless, which may include but not be limited to (e.g., if the other person that paid shows up or not, or doesn't show up, or doesn't come, or shows up, or for any reason, etc.) In some embodiments, the amount, partial, total of which may include but is not limited to the: (e.g., deposit, trust funds, or total amounts put up to secure the 'date in person, etc.) may be shown in, which may include but not limited to (e.g., real-time or shown on a page, or shown, or displayed, etc.)

In some embodiments, clickable or 3rd party references may show why payments are made, what words mean, or how refunds, requirements, rules, etc.) work. In some embodiments, there may be an option that may include but is not limited to (e.g., anywhere, near the bottom, top, side, or near photo or information, etc.) that may allow the person to see their entire 'bill, invoice, or total, that may show a, which may include but not be limited to (e.g., breakdown, itemized, receipt, invoice, total, partial, breakdown, bill, a summary of, total, etc.) or the page may show this, which may include but not be limited to (e.g., breakdown, itemized, receipt, invoice, total, partial, breakdown, bill, a summary of, total, etc.) along with the explaining information, that may allow the booking to go through. In some embodiments, the page may contain more information or more photos or the person's favorite clicked photo based on the computing operation of the person that they are booking to remind the person of their favorite photo, etc.) a personalized message may be shown from the creator or a message that explains the dating process or what to expect, etc.) In some embodiments, there may be a 'trust fund account' which is either going to be handled on the, which may include but not limited to (e.g., platform, software, business, corporation, etc.) or it is going to be handled by a 3rd party or a combination of the two, etc.) In some embodiments, there may be a simple to read or a, which may include but not be limited to (e.g., breakdown, itemized, receipt, invoice, total, partial, breakdown, bill, a summary of, total, etc.) of the funds that are in the trust fund account and a, which may include but not be limited to (e.g., breakdown, itemized, receipt, invoice, total, partial, breakdown, bill, summary of, total, etc.) of what they are for, they may be separated by categories such as 'refundable, redeemable, pre-paid, etc.) In some embodiments, there may be category options that the 'payer' or 'person using' may be able to separate their funds by category or by explanations, etc.) In some embodiments, these categories may be separated by including but not limited to (e.g., explanations, pre-loaded, redeemable, potentially refundable, held until the date is completed, discount-redeemable funds, non-refundable, etc.)

Figure 4:
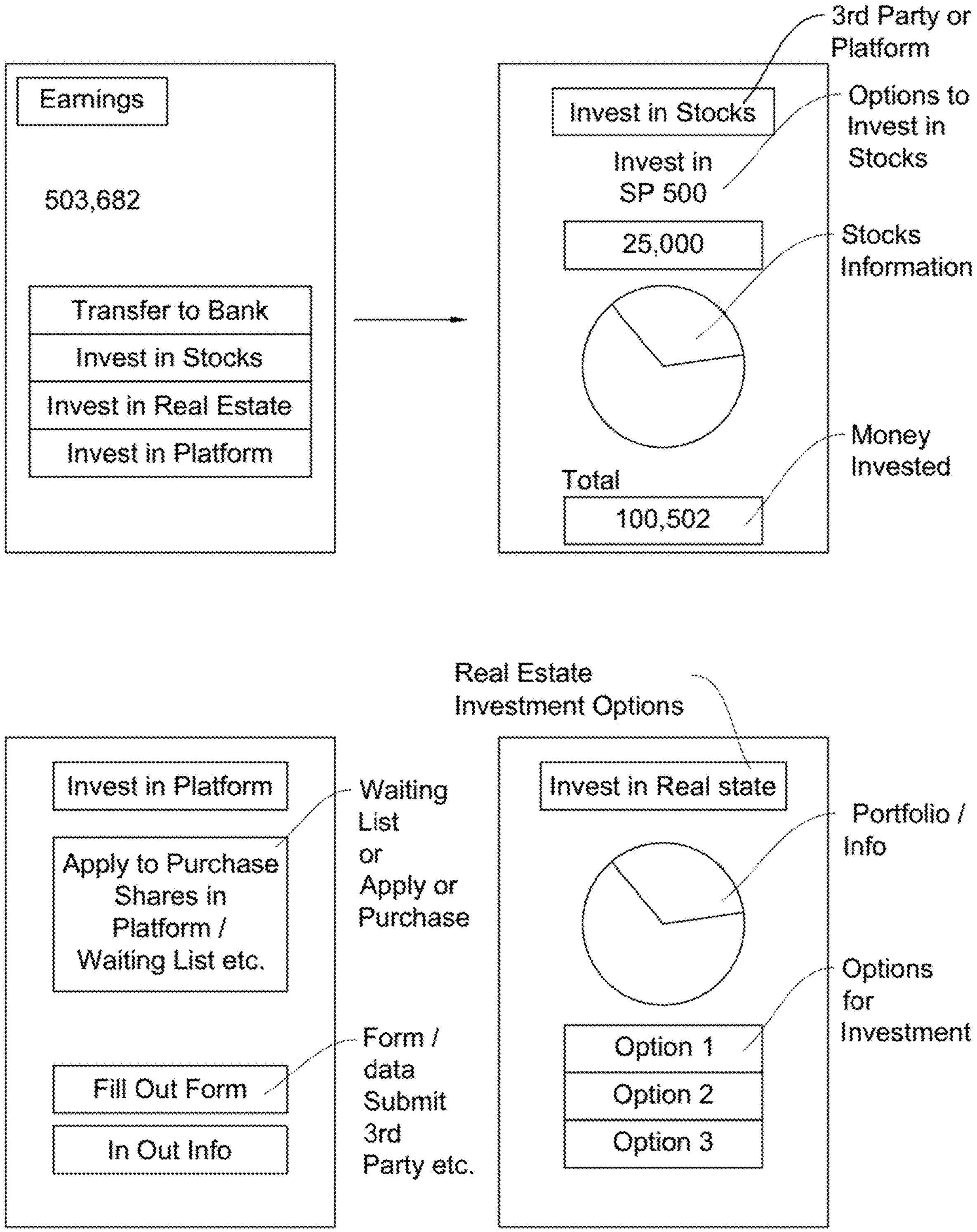

FIG. 4: In some embodiments, there may be a user platform that may allow a person or a user or a public person may include but not limited to (e.g., add funds, transfer funds, transfer funds to the bank, transfer funds to another person/another person's bank, invest in real estate, invest in stocks, invest in the platform [current platform they are on and described in this disclosure], associated platform, 3rd parties, advertisers, advertisements, businesses, internal parties, invest in another platform, invest in own company, invest in companies, invest in private parties, invest in 3rd parties, advertisers, advertisements, businesses, etc.) In some embodiments, there may be, which may include but not limited to (e.g., platform options, 3rd party options, intellectual property investments, real estate investments, stock investments, private investments, before IPO investments, 3rd party investments, venture capital firms, internal options, partnership options, other people's options, stock options, our options, applications to invest in the platform before IPO, after IPO, stock shares of the platform, private investments of current platform or business, etc.) In some embodiments, there may be, but not limited to (e.g., 3rd party links, outside investment firms or funds, forms to fill out internally or by 3rd parties. Legal obligations and warnings may be included in some embodiments, or legal information showing that investments are not almost guaranteed, etc.) In some embodiments, there may be information that may show (e.g., 'transfer to bank' and what that means versus investments, etc.) In some embodiments, there may be charts that may show, which may include but are not limited to (e.g., cash, assets, investments of the user, that may be shown in lists, charts, 3rd party sites, personal or connected budgeting information whether manual or automatic, or machine learning, or computer, or robotics, or 3rd party chosen, or entity-chosen, or 3rd party integrations, etc.) In some embodiments, some 3rd party integrations may show on the platform or be seen from the platform, which may include but is not limited to (e.g., shown, integrated, or 3rd party enabled, etc.)

Figure 5:
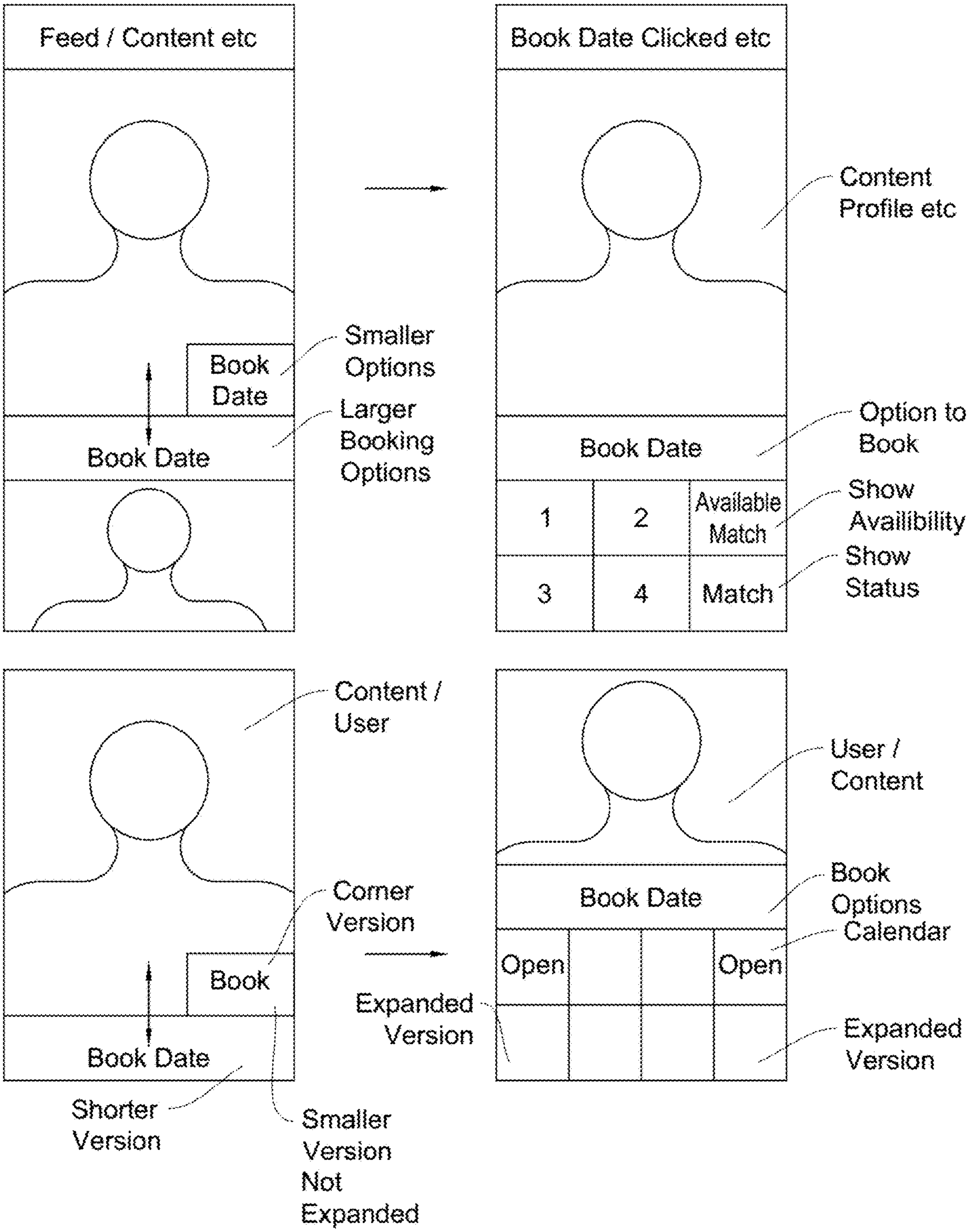

FIG. 5: In some embodiments, there may be, which may include but not limited to (e.g., feed, moving, self-moving, self-swiping, manually scrolling, swiping, moving, etc.) options plus which may include but not limited to (e.g., booking date, a connection, schedule, scheduling, booking, inquiring about, showing schedule, showing calendar, etc.) In some embodiments, there may be, which may include but is not limited to (e.g., content, feed, or anything that is to be viewed, seen, shown, disappeared, etc.) whether (e.g., hologram, 3rd party shown, partially shown, fully shown, pixelated, locked, unlocked, content, private content, public content, videos, photos, etc.) In some embodiments, on, the content may include but is not limited to (e.g., user interface, feed, managing page, homepage, user interface page, calendar, managing schedule, public or private schedule, booking, booking calendar, options to inquire about schedule or calendar, etc.) whether, which may include but not limited to (e.g., below, above, on the side, whether in a large button, small button, voice command, AI-induced, clicking method, tapping method, etc.) In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, areas, profiles, content, hologram or display screens, etc.) to continue to look or get automated, which may include but not be limited to (e.g., looking, viewings of, movement, selection, scroll, etc.) which may include but not be limited to (e.g., content, creators, models, users, etc.) In some embodiments, (e.g., user or person or robot or AI, etc.) may be able to swipe, tap, move, switch, or move through (e.g., feed, calendars, schedules, dates, date options, media, ads, advertisements, videos, films, media, pictures, etc.). The movement may be (e.g., swiping, tapping, clicking, automatic moving, automatic tapping, automatic switching, clicking, moving by itself, on a series roll, series one after another, media one after another, videos one after another, pictures or any media one after another or in any way, etc.)

In some embodiments, user interface may lead to options to, which may include but not limited to (e.g., book right there at that moment, user interface may lead to options to see more calendar dates, to see a larger version of calendar dates, to see the match in calendar for times, dates, to see personal match, to see categories similarities, to see profile, or to see other options, or to see other users, or to see other girls, users, etc.) In some embodiments, once button may be clicked, tapped, etc.) In some embodiments, which may include but not limited to (e.g., the button or option may expand, the expanding may be come off the screen like a hologram or a virtual reality, or the expanding may be drop down, or show more options, etc.) In some embodiments, the book button or option button may expand on the screen or pause, or go to another screen, hologram, user interface, viewing display, or expand, or show more options, etc.) In some embodiments, user interface may be the, which may include but not be limited to (e.g., models, paid creators view, etc.) In some embodiments, user interface may be a, which may include but not be limited to (e.g., model, creator view, etc.) in which the, which may include but not be limited to (e.g., user, model, girl, creator, paid dater, etc.) may show interest first, which may include but not be limited to (e.g., search the platform for a man to show interest in, contact a person, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, photos, exclusive photos, etc.) that she may be send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date, or wants to go out on a date etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, spend money, subscribe, follow, book a date with her, book date, book meeting, block off her calendar, send her flowers, send her gifts, etc.)

Figure 6:
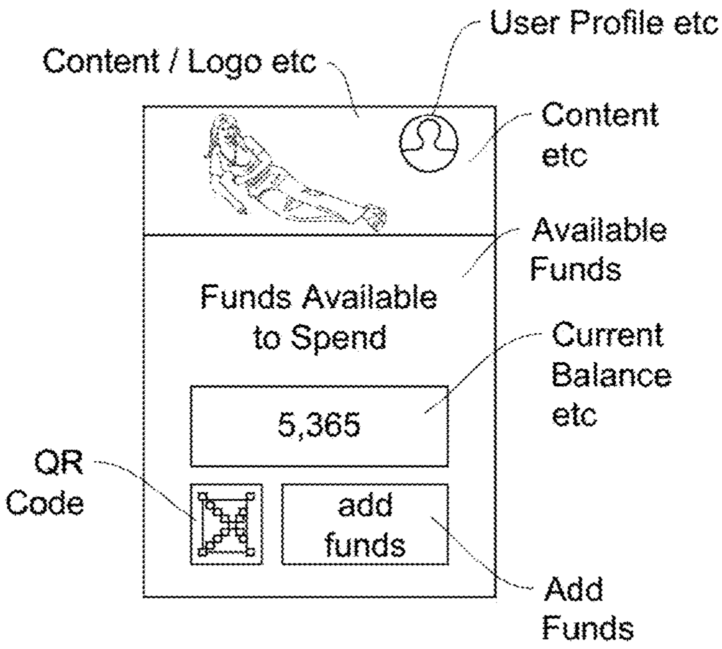

FIG. 6: In some embodiments, there may be, which may include but not be limited to (e.g., 'auto-recurring payments, or auto-reload, or auto book, schedule, inquire about, inquire about, ask regarding, secure, create connection to, hold, pay for, create business relationship with, use transmittables to secure or book, schedule, inquire about, or auto funds disbursement, or auto funds pull from bank, assets, etc.) In some embodiments, for example, there may be included but not limited to (e.g., an option to sell stocks each week or during any period and convert them to funds to have reloaded automatically, automatic stock selling or asset selling and reloading or loading money or funds or credits into platform account that can immediately be used for any transmittables on the platform or partner sites, etc.) In some embodiments, a funds manager may be available or offered or useable, whether (e.g., virtual or human, or robotic, or automatic, or virtual, or virtually powered, or AI powered, or AI related, or platform, or manually created or manually performed or used, etc.) that may for example (e.g., buy, sell, add funds, create dates, make transactions, create payments, make scheduling payments, automatic payroll, automatic payments, etc.) whether from (e.g., cash, credit or debit, or future funds, or debt, or created assets, or sold assets, or virtual assets, etc.) In some embodiments, these funds may be available to make purchases, bookings, virtual meetings, messages, etc.) through the platform or in any capacity in which the platform obtains funds, which may be a 3rd party, etc.) In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

Figure 7:
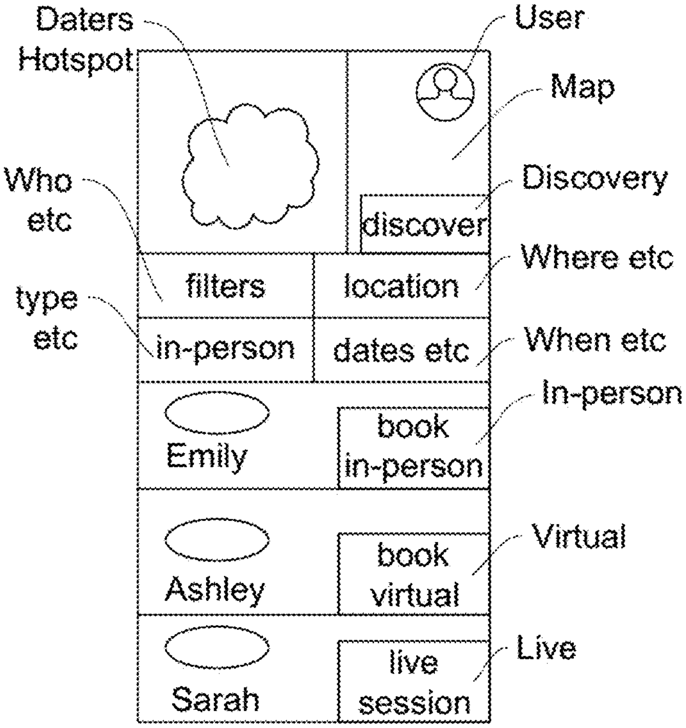

FIG. 7: In some embodiments, there may be options that may have options to, which may include but not be limited to (e.g., lead to a list, list, sections, private pages, subscriber-only pages, paying customer only pages, organization, types, profiles, types, categories, tags, personality, looks, popularity, suggestions, etc.) based on preferences or categories, etc.) which may include but not limited to (e.g., book-in person date, book virtual, book talk, book chat, book video chat, book video meeting, book voice conversation, date, follow for free, discover for free, locked content, platform's exclusive content, special models, promotional persons, message, choose city, find your city, our models, locked content, unlocked content, match your calendar, match anywhere in the world, match another city, match yourself to anyone, match based on preferences, find date based on availability, find date based on distance, find date based on calendar, find date based on city, match date virtual match date in person, find girlfriend, find wife, find date, find friend, fan, fans only, for fans, for followers, see your favorite model, see your favorite celebrity, see new celebrities, see new models, see new sign ups, see new girls, users, see new creators, boyfriend applications, husband applications, date applications, book in person date now, book virtual, book talk, book chat, book video chat, book video meeting, book voice conversation, date, book call, see more information, see promotional material, see profile, get matched, swipe now, view exclusive content, go through stack now, view like dating apps style, choose your view for profile, see standard profiles, see regular way to view profiles, swipe by city, swipe by distance, view stacked style, view desktop style, view mobile style, get matched by human, robot, bot, 3rd party, entity, computer system, AI system, get matched by AI, get matched by robots, membership, membership fees, FAQS, learn more, unlock content, choose style to see content, swipe, view like, which may include but not be limited to (e.g., swipe up and down, side to side, stacked, list, create list, etc.)

In some embodiments, there may be a, which may include but not be limited to (e.g., next process, next thing that happens, third process, next process that is happening after adding this person as their 'boyfriend, etc.) which may result in the may include but not be limited to (e.g., special person, boyfriend, etc.) getting 'special treatment such as, which may include but not be limited to (e.g., not receiving 'instructional emails, not receiving emails that may suggest they don't know how to go on a date, not receiving basic etiquette rules at this point etc.) which may suggest that the creator and the person may have went on a successful date and now she is informing the platform that this person is her may include but not be limited to (e.g., special friend, boyfriend, etc.) In some embodiments, the may include but not be limited to (e.g., 'boyfriend' or 'special person, etc.) may be treated differently than other users, or get special treatment, which may include but not be limited to (e.g., not receiving emails on how to act on a date or how to pull out chairs, not receiving marketing emails, not getting suggestions, suggesting more with this user on their user interface, price changes, VIP treatment such as 'access to all photos/videos/at the discretion of the user, etc.) In some embodiments, this may come or, which may include but not be limited to (e.g., after, before, during, way after, later, etc.) which may include but not be limited to (e.g., meeting, virtual meeting, in-person meeting, date, connection, message, subscribing, adding, adding to list, amount of money spent, etc.) has, which may include but not be limited to (e.g., been sent, been added, completed, successfully completed, good feedback, communication has occurred, etc.) In some embodiments, there may be a, which may include but not be limited to (e.g., next process, next thing that happens, third process, next process that is happening after adding this person as their 'boyfriend, etc.) which may result in the may include but not be limited to (e.g., special person, boyfriend, etc.) getting 'special treatment such as, which may include but not be limited to (e.g., not receiving 'instructional emails, not receiving emails that may suggest they don't know how to go on a date, not receiving basic etiquette rules at this point etc.) which may suggest that the creator and the person may have went on a successful date and now she is informing the platform that this person is her may include but not be limited to (e.g., special friend, boyfriend, etc.) In some embodiments, the may include but not be limited to (e.g., 'boyfriend' or 'special person, etc.) may be treated, which may include but not be limited to (e.g., differently, obtain special treatment, be put on list, added to category, etc.) than other users, or get special treatment, which may include but not be limited to (e.g., not receiving emails on how to act on a date or how to pull out chairs, not receiving marketing emails, not getting suggestions, suggesting more with this user on their user interface, price changes, lower prices, more date availabilities, VIP treatment such as 'access to all photos/videos/at the discretion of the user, etc.) In some embodiments, this may come or, which may include but not be limited to (e.g., after, before, during, way after, later, etc.) which may include but not be limited to (e.g., meeting, virtual meeting, in-person meeting, date, connection, message, subscribing, adding, adding to list, amount of money spent, etc.) has, which may include but not be limited to (e.g., been sent, been added, completed, successfully completed, good feedback, communication has occurred, etc.)

Figure 8:
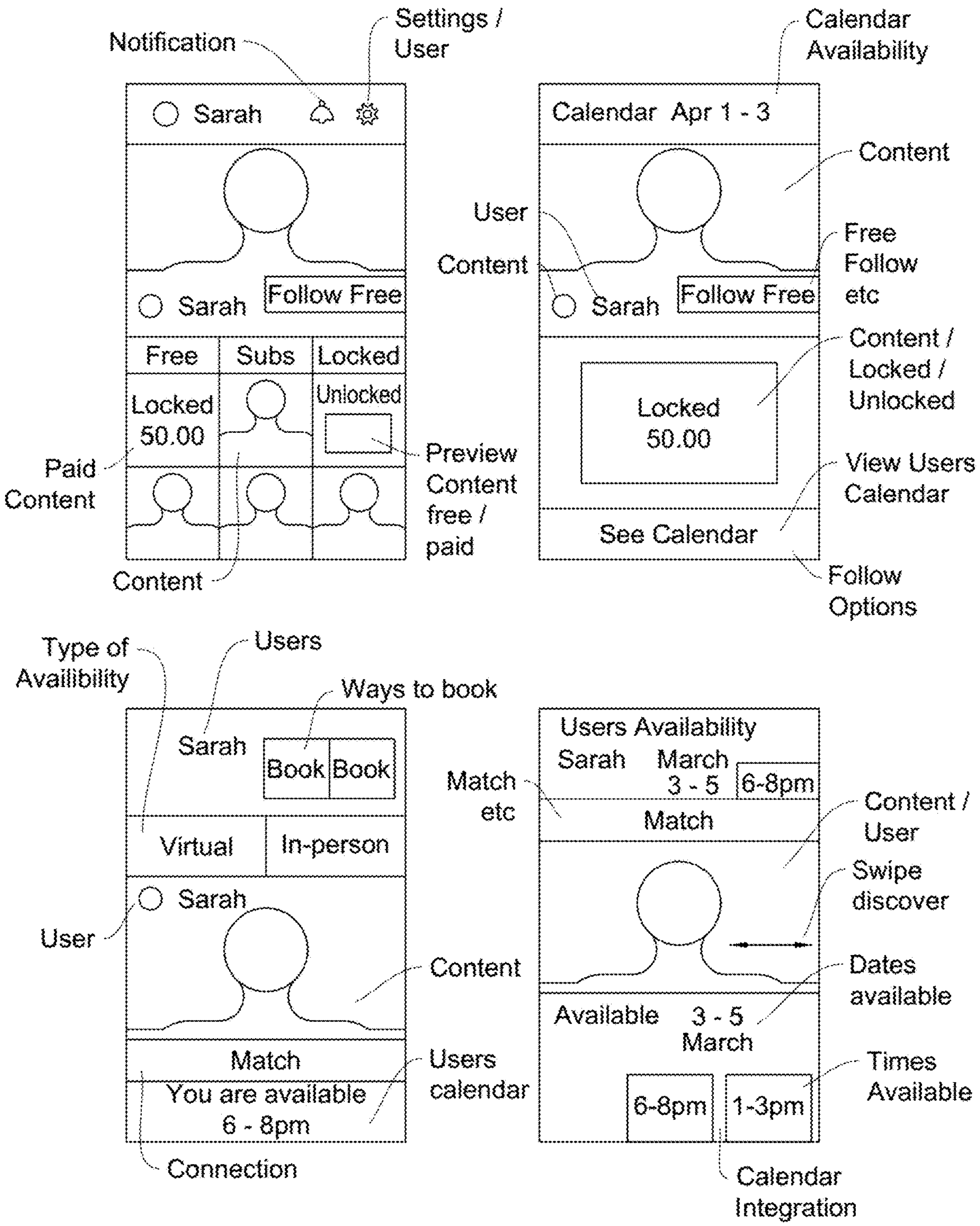

FIG. 8: In some embodiments, there may be a combination of one of more which may include but not limited to (e.g., follow for free, follow, connect, add, free viewing options, subscriber only options, follower only options, locked, unlocked content, content, different viewing options, preview of contents, limited or unlimited content previews, payment for previews, credit for previews, credit payment options, payment options, lists whether stacked, side by side, up and down, swiping, tapping, calendar, booking options, virtual or in-person options, users information, users profile, content, preview of content, searching options, matching one or more persons, matching one or more profiles, matching AI-connecting, options, matches, similar matches, locked content, different profile options, different feed options, locked content options, locked feed options, messages, direct messages, profile messages, live events, live searching, current lives, calendar availability, scheduling option, follow for free, live persons and matching AI-connecting, live persons, currently live, swipe to view, swipe to see, similar persons, availability of person availability of persons, availability of users, availability in general, matching AI-connecting, of persons, matching AI-connecting, based on criteria, etc.) In some embodiments, matching AI-connecting, based on any reasons, may include but is not limited to (e.g., computing operation, machine learning, previous clicks, similar dates, similarities, criteria, searching, location, distance, availability, careers, types, looks, weight, height, preferences, etc.)

In some embodiments, there may be (e.g., separate screens or private screens, private or separate content, subscriber-only pages, subscriber-only promotions, ads specifically for specific persons or profiles, offers shown to users or potential users for promotional purposes such as advertisements, feeds or content or categories or options to see, view, interact with, or see, etc.) ads, promotions, free content, ways to get free products or services, ways to get discounted services or products, etc.)

In some embodiments, there may be a situation in which the CEO of Mikee Shoes wants to meet or take Chelena Chomez out on a (e.g., date, romantic gesture, business meeting, business offer, networking offer, networking event, invite to a party, etc.). In some embodiments, for example, each party may not have any (e.g., mutual connection, business relation, business relationship, or a mutual friend, etc.) so some embodiments may be a platform that allows a connection between one or more (e.g., commonly categorized people(s) such as high-net-worth individuals or one high net-worth individual and/or a notable person, etc.) or person with an (e.g., an exceptional quality that may be sought after or extraordinary or different or interesting, etc.). In some embodiments, there may be an option for the high net worth individual or both or any individuals to join with a minimum standard such as (e.g., 5 million net worth or more, 10 million net worth or more, stock accounts, real estate, skills, athleticism, record-breaking skills, intelligence, something of significant or any perceived value, etc.). In some embodiments, there may be options for the (e.g., special or particular person or persons or groups, etc.) to (e.g., remain anonymous or be public, or be shown to certain individuals, etc.) for example by, (e.g., using payment or paying the platform, or paying an annual fee, or some type of one type payment, or simple verification, etc.) to (e.g., other users, publicly, privately, private pages, private section of the platform, be allowed on the entire platform, be allowed to have their profile show up to other users, be available for messing or viewing calendars, etc.) but the platform may allow a, (e.g., tag or some sort of verification, that says for example" Hispanic-American baseball player net worth over 5 million, or some badge, or some checkmark, etc.) In some embodiments, there may be a (e.g., built-in or pre-made NDA or some type of agreement that once she gets paid, she isn't allowed to talk about the date or whatever the agreement may be, etc.) In some embodiments, regarding secrecy or agreement or meeting or privacy, there may be options to, (e.g., edit or change the agreement or change the price or change the location or change the date or change the activity for the date, etc.) In some embodiments, the platform may provide a private or exclusive connection between two approved users that may not have any other mutual friends or connections but may both have extraordinary qualities approved or understood by the platform and thus approved to operate or meet or see or view persons or users on the platform. In some embodiments, the person or persons or user or individual or group that may have perceived unique qualities may be required to pay an (e.g., annual membership fee, a startup fee, a joining fee, a fee to pay the other person to go on a date, etc.) any of the other features described in this disclosure can be used in this embodiment. In some embodiments, the category of (e.g., males, females or women, etc.) or available persons on the platform may be categorized as (e.g., different types or groups or personalities or goals or plans for their life, marriage-minded, dating only, want to have a baby, want to start a family, want to blend a family, want to get married, just want a friend, just want a connection, just want to network, business-relationships only, available for business connections only, available for work, etc.) In some embodiments, the scheduling option(s) for the dates between the potentially anonymous user with a high net worth and the woman or other users can be anything from (e.g., just sending this person money, to scheduling a full day of dating such as being picked up with flowers and a picnic or a lavish date and dinner or a game, or anything involving a date activity even shopping or eating, etc.) In some embodiments, persons can arrange a monthly, annual, or semi-annual payment and or legal contract to any of the girls or users or persons for any reason, etc.)

Figure 9:
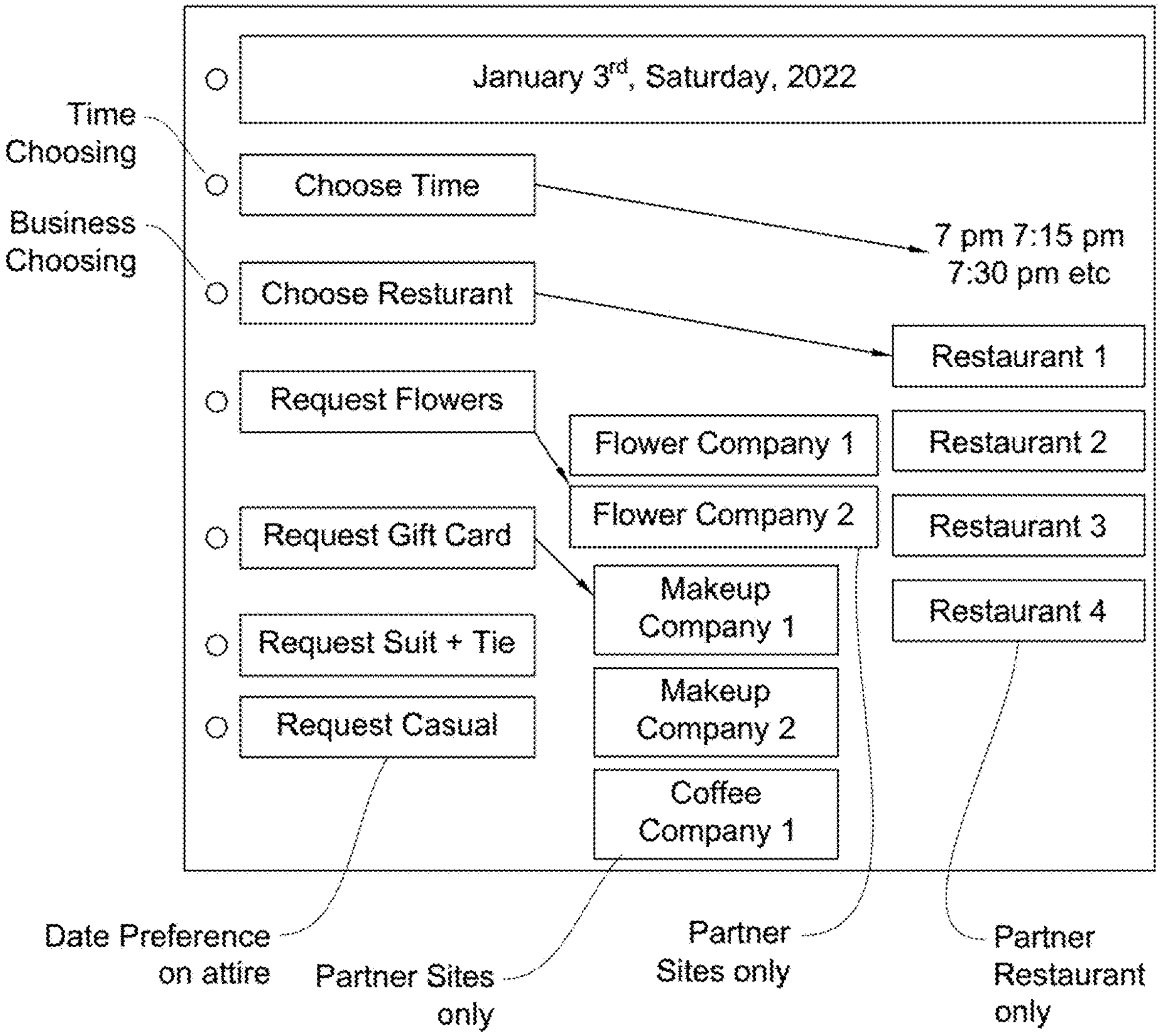

FIG. 9: In some embodiments, FIG. 9: In some embodiments, FIG. 9 comes from FIG. 9 but may be also be managed elsewhere on the platform or could be in a different spot on the platform for convenience for the 'model' or 'user.' FIG. 9 may show 'calendar date preferences.' In some embodiments, on any user interface, user interface may include choosing the 'date' of availability for a, which may include but not be limited to (e.g., bidding/auction, paying option, auction, payment, options to purchase, charity donations, date, romantic date, business date, networking meeting, party, charity date, buy now priced date.' etc.) In some embodiments, This also may include, which may include but not be limited to (e.g., send or request flowers, request gift cards, request suite, request suit and tie, request jewelry, request restaurant, request gift, request call, 3rd party request, 3rd party integration request, choose time, current date, chosen date, preferences per day, preferences for time period, times, choose time, choose restaurant' 'request flowers upon date, request gift, request gift item, request gift card, request suit and tie, business casual, casual wear, Connect 3rd party, integrate 3rd party, order through 3rd party that is integrated with platform, use partner site, use partner app, choose restaurant, choose time, etc.) In some embodiments, The 'choose restaurant option' may only allow the 'model' to choose from our 'partner restaurant' or any publicly or privately available business may be a, which may include but not limited to (e.g., activity center, business, restaurant, 3rd party, entity, business, location, building, kitchen, organization, person, etc.) which may include but not limited to (e.g., partnership agreements, referral agreements, signed agreements in payment for understanding they are business partners with us and we are sending them business etc.) signed partners, signed restaurants that we refer to, payment options integrated with restaurants, etc.) 'models' may be allowed to request any one or combination of: (e.g., gift, gift card, flowers, clothing, makeup, donation, food, dessert, bills paid, payments, etc.) upon arrival or to be automatically sent to their, which may include but not be limited to (e.g., phone, account, funds account, payment account, bank account, platform bank account, platform account, etc.) In some embodiments, partner sites or recommendations may allow a 'percentage' or a 'fee' or a 'payment' or 'exchange of value' for the (e.g., recommendation or advertisement or option to book with, etc.)

Figure 10:
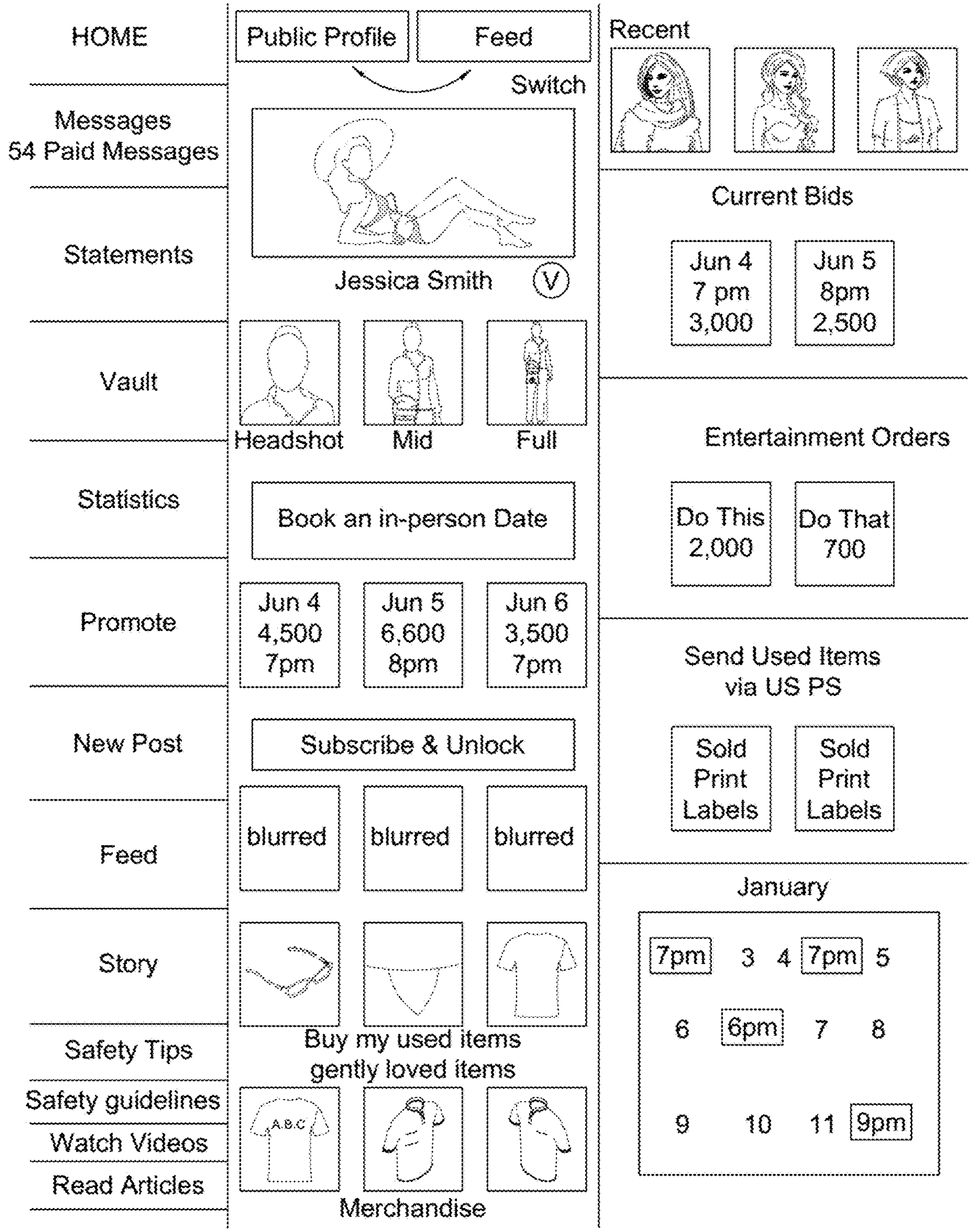

FIG. 10: In some embodiments, which may include but not be limited to (e.g., selecting this page or user interface, showing as main page, clicking on, viewing, etc.) This user interface may be the, which may include but not be limited to (e.g., homepage, main page, selected page, selected view, business area, management area, management user interface, etc.) which may include but not be limited to (e.g., viewed, used, managed by, managed with, in collaboration with, etc.) the, which may include but not be limited to (e.g., model, special creator, person being paid, etc.) In some embodiments, user interface may contains possible management tools offered by the, which may include but not be limited to (e.g., platform, app, website, creation, user interface, entity, business, business-management tools, orders, product orders, statements, service orders, print labels, upload completed content, create content, post pictures, post videos, content orders, financial management tools, content or schedule management tools, calendar management, etc.) In some embodiments, user interface may contain possible tools on the, which may include but not be limited to (e.g., left side of the page, middle, bottom, top, anywhere on user interface, or right, etc.) In some embodiments, the, which may include but not be limited to (e.g., area, middle of the page, side of the page, area of the page, area of the user interface, etc.) may contain, which may include but not be limited to (e.g., live view, seemingly live view, current view, view that wants to be shown, non-live view, dummy version view, special version view, etc.) of the, which may include but not be limited to (e.g., model, creators, etc.) which may include but not be limited to (e.g., page, user interface, place, business area, business, user interface, etc.) user interface may be, which may include but not be limited to (e.g., animated, have live updates, have moving videos, have interactive tools, content, offers, subscriptions, prices, price ranges, general pricing, general transmittables, payment options, asset options, views, things to do, entertainment, etc.) In some embodiments, content orders may be a separate or an available option for any management screen or tool on or off platform that allows user or persons or groups or organizations to (e.g., view offers, payments, or needs to obtain the product or payment, contracts, legal contracts to sign or complete, etc.) in exchange for content or some type of media that user or person may have to film, complete, create, build for (e.g., any type of transmittables, payment, money, free items, clout such as a shout out, etc.)

In some embodiments, the 'model/creator' may choose to turn this, which may include but not be limited to (e.g., interaction, live' view, etc.) off in exchange for a, which may include but not be limited to (e.g., non-live view, pre-recorded view, pre-made view, hearing, hologram, etc.) which may include but not be limited to (e.g., chosen view, created view, still view, etc.) which may include but not be limited to (e.g., right side, another side, another area, user interface area, user interface, etc.) may contain, which may include but not be limited to (e.g., calendar views, going live, customized entertainment, entertainment, requested entertainment, entertainment, entertainment orders, sent packages, sent items, ordered items, items ordered from user, calendar management tools, calendar tools, recent posts, orders, current bids, mail (e.g., physical mail) orders, management of times, locations, management of date tools, blurred items, management of previewed items, profile, header, profile photo, photos, content, selling items, current bids, recent posted items, recently sold items, items that need to be sent out, completed orders, completed customized entertainment, entertainment, requested entertainment, entertainment, orders, calendar views that are live, calendar views, editable calendar, other important information such as 'amount earned by creator, live updates of the 'money that is waiting' for creator to complete for items such as sending out orders, or customized entertainment, entertainment, requested entertainment-type, entertainment, orders, this also may contain information about 'message earnings' or 'total combined earnings, etc.) In some embodiments, content may be, which may include but not be limited to (e.g., blurred, half-shown, partial-shown, silent, content may be fuzzy, not shown, greyed, appear fuzzy, not appear total, viewing may be obstructed, watermark over, sound watermark on sound, watermark appearing, only a few seconds shown, only some shown then stopped, stopped content, etc.) until, which may include but not be limited to (e.g., payment is made, requirements are met, follow has been made, subscriber has been created, profile has been created, payment to platform has come, payment has been made to user, exchangeable between user has been established, assets have been sent, etc.). In some embodiments, customized entertainment may refer to fetish-type entertainment.

In some embodiments, the user interface may contain which may include but not be limited to (e.g., mandatory safety tips, mandatory safety videos to be watched, safety videos, safety area, safety reminders, safety information, resources, links, mandatory safety guidelines to be printed out for the in-person dates, agreements, signed safety information, agreements of safety to be signed, agreements to be signed, waivers, safety information, etc.) In some embodiments, user interface may contain, which may include but not be limited to (e.g., mandatory rules, suggested rules, options, exact details, laws, rules, regulations, our rules, out suggestions, out mandatory instructions, our instructions, etc.) to, which may include but not be limited to (e.g., follow, be shown for, suggested, in compliance with, etc.) the, which may include but not be limited to (e.g., date, connection, virtual, in-person, connection, etc.) In some embodiments, the rules may have to be, which may include but not be limited to (e.g., accepted, acknowledged, signed, watched, viewed, questions answered, tests, etc.) for the, which may include but not be limited to (e.g., creator, or person being paid, or model, etc.) to follow when using, which may include but not be limited to (e.g., platform, 3rd party integrations, etc.) In some embodiments, the order of the elements on any user interface presented herein may be different from that presented in the figures. In some embodiments, FIG. 12 may be related to FIG. 10 or any interface. In some embodiments, this may be when the 'model' clicks on the part that may show her 'paid for items' that need to be sent out. In some embodiments, this shows the 'pre-made label.' All the model has to do is print it out. Once the package gets, which may include but not be limited to (e.g., sent, shipped, printed, etc.), it may automatically get updates on the platform, user interface, and/or the 'model' and the 'buyer' may be 'track,' otherwise user interface may ask to type in the number manually. Still, it is not necessary once it gets, which may include but not be limited to (e.g., sent, shipped, printed, tracking number, etc.)

Figure 11:
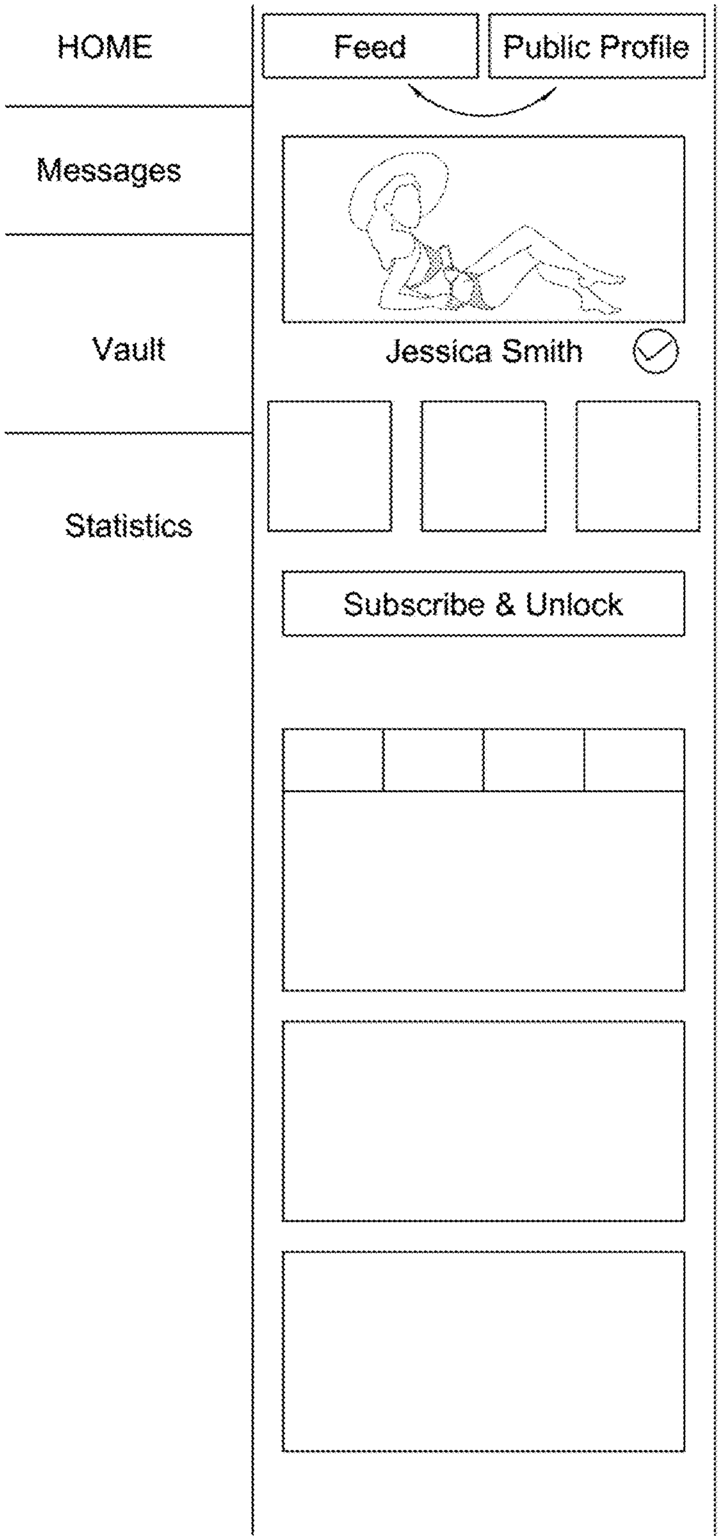

FIG. 11: In some embodiments, FIG. 11: In some embodiments, this figure may be an alternative figure of FIG. 10 or any user interface. In some embodiments, This figure may be the options button that was 'clicked on' in FIG. 10 to show, which may include but not be limited to (e.g., 'feed' or content, or private, etc.) rather than show, which may include but not be limited to (e.g., public profile, or profile, or items, or management tools, etc.). In some embodiments, on shown or any user interface figure that may show, which may include but not be limited to (e.g., feed, user interface, etc.) In some embodiments, which may include but not be limited to (e.g., 'models' or other 'feed' that the 'model' may be subscribed to, etc.) In some embodiments, the user interface may show the, including but not limited to (e.g., content, model, user, etc.) In some embodiments, which may include but not be limited to (e.g., 'models' feed, etc.)) In some embodiments, unless, which may include but not be limited to (e.g., user, she, person, etc.) is subscribed to friends or others on the platform/site. In some embodiments, this may show (e.g., 'stories' of the 'models' this feed shows 'highlights' of the model's previous feed, this shows all of the 'models' 3 main photos, the subscribers feed, the regular public feed, etc.) which may include but not be limited to (e.g., photos, videos, etc.) In some embodiments, a story may refer to a recent photo or video uploaded by the creators that may only be viewable for a certain period, which may include but not be limited to. In some embodiments, which may include but not be limited to (e.g., 24 hours, 48 hours, one week, one month, one year, years, period, etc.) by, which may include but not be limited to (e.g., creators, persons, users, bidders, etc.)

Figure 12:
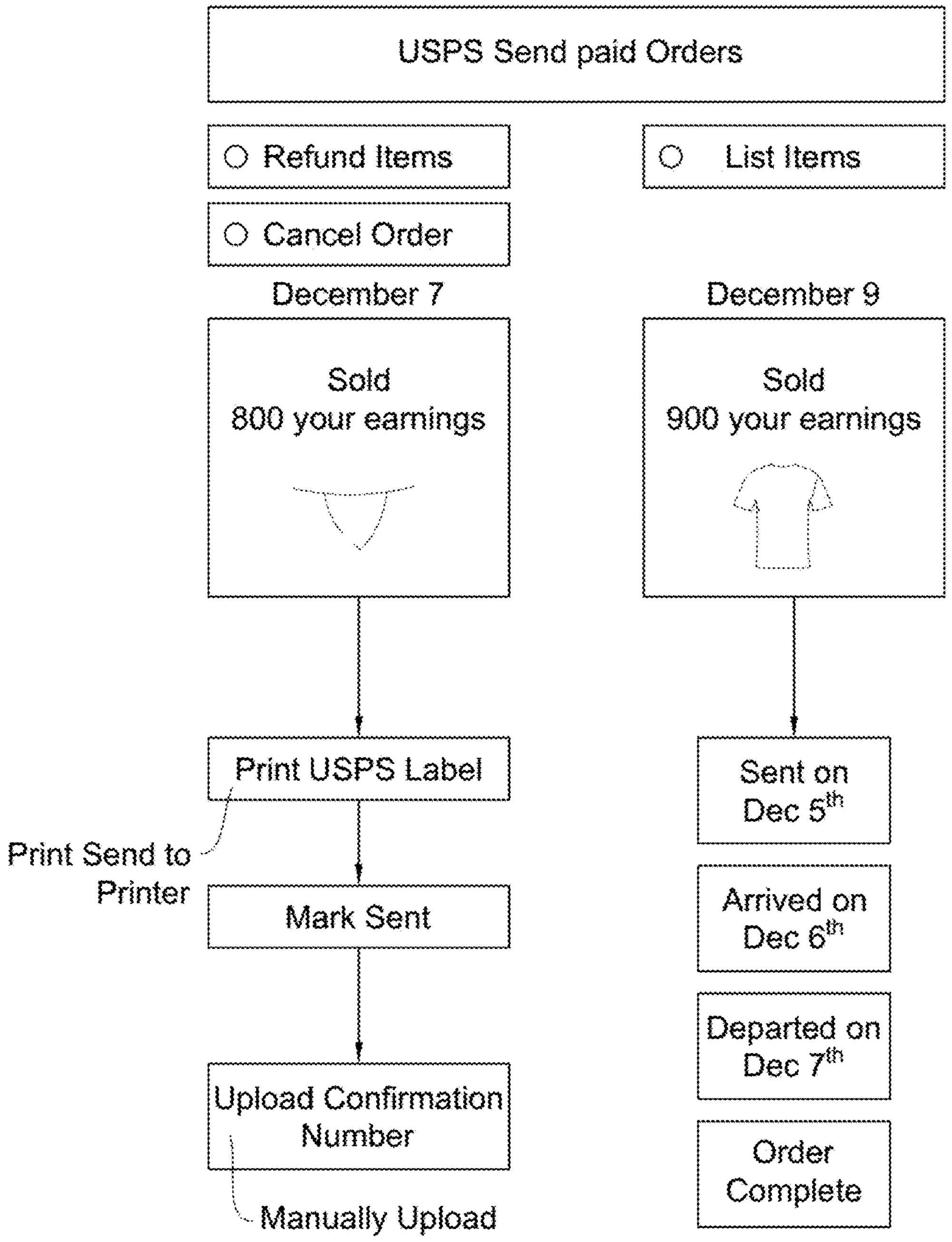
Figure 13:
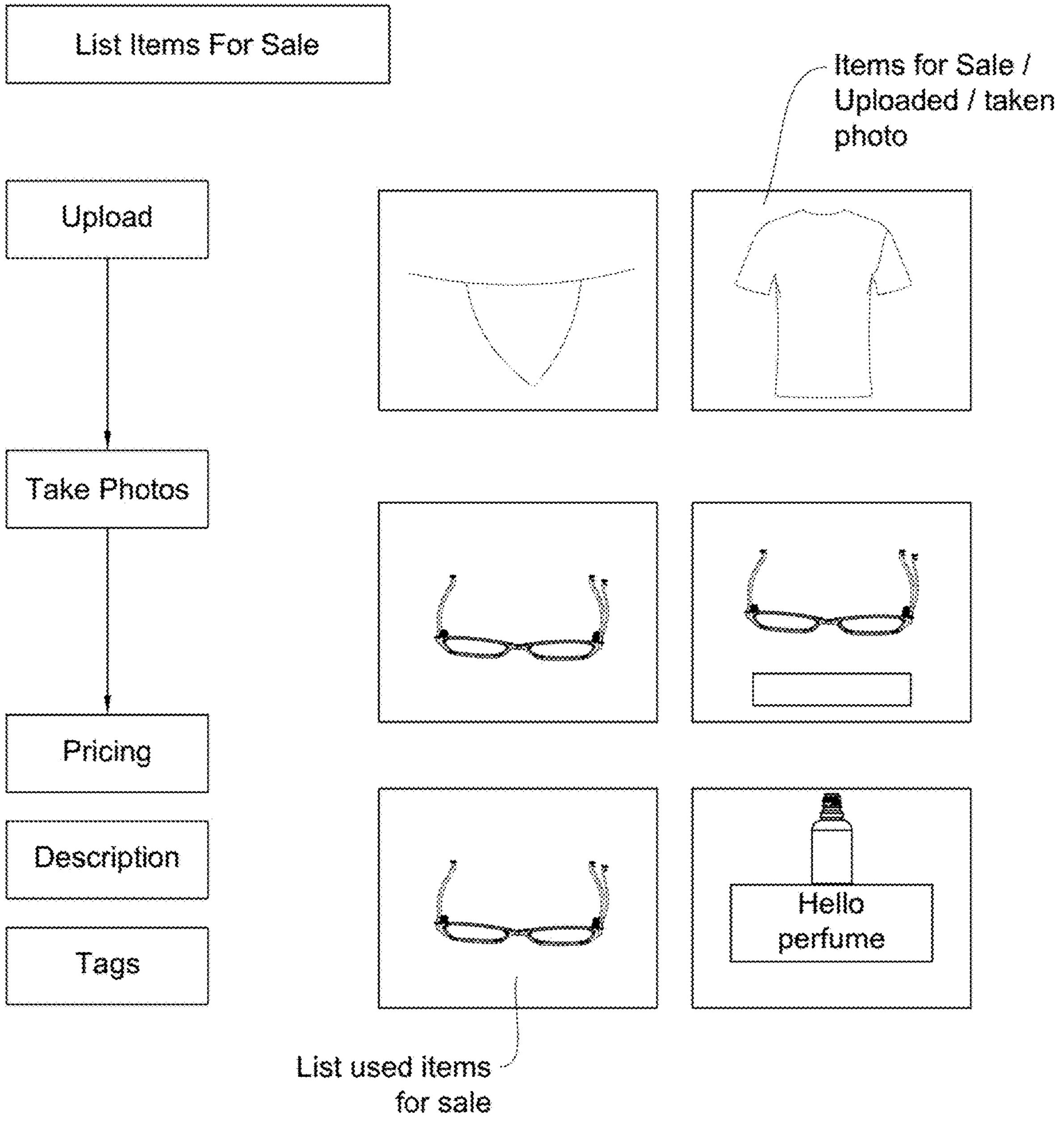

FIG. 12, FIG. 13: FIG. 12 or any user interface in some embodiments. In some embodiments, this, which may include but not be limited to (e.g., user interface, shown, view, display, etc.), may be from FIG. 12 or any user interface, if the 'model' clicks on the, which may include but not be limited to (e.g., 'list items or any items, or any organizing area, list, category' etc.) In some embodiments, under the, which may include but not be limited to (e.g., 'list items, list items area, list, or any items, or any organizing area, list, category, category' etc.) model may use the, which may include but not be limited to (e.g., phone or desktop or other platform methods, etc.) to, which may include but not be limited to (e.g., (e.g., 'take a picture, get content, share information, upload a photo, etc.) In some embodiments, the user interface may include, but not be limited to (e.g., 'pricing' and 'hashtags' or 'categories, etc.) In some embodiments, the user interface may be the category of 'used items for sale' or lingerie, dolls, clothing, products, services, content creation, reviews, gigs, jobs, licensed goods items of the creator or model, or any item of goods or services; there may be another version for 'new merchandise for sale' with or without, which may include but not be limited to (e.g., with a 'partner site' for 'drop-shipping,' or outside shipping, or shipping, or self-shipping, or pre-made items, or custom-made items, goods, licensed goods items of the creator or model, 3rd party licensed items from the creator or model or person's likeness, or used items, etc.)

FIG. 12 may come from FIG. 10 or any interface in some embodiments. In some embodiments, this may be when the 'model' clicks on the part that may show her 'paid for items' that need to be sent out. In some embodiments, this shows the 'pre-made label.' All the model has to do is print it out. In some embodiments, once the package gets, which may include but not be limited to (e.g., sent, shipped, printed, etc.) It automatically updates on the, which may include but not be limited to (e.g., platform, user interface, etc.), and the 'model' and the 'buyer' may be able to 'track.' In some embodiments, otherwise user interface may ask to type in the number manually, but it is not necessary once it gets sent, shipped, printed, tracking number, etc.) In some embodiments, the, which may include but not be limited to (e.g., 'drop-shipping,' or outside shipping, or shipping, or self-shipping, or pre-made items, or custom-made items, or used items, etc.) may be either which may include but not be limited to (e.g., pre-made items, or items like white-label items, made items, used items, lingerie, dolls, licensed goods items of the creator or model, or items such as tee-shirts with the 'models' photo on it, etc.) which may include but not be limited to (intellectual property owned by the creator, content owned by creator/model, model, user, models ownership, etc.), or user interface may be lingerie, dolls, licensed goods items of the creator or model, or any random items, or goods, or services, from any (e.g., 'drop-shipping,' or outside shipping, or shipping, or self-shipping, or pre-made items, or custom-made items, or used items, store, brand, factory, person, etc.) In some embodiments (e.g., 'drop-shipping,' or outside shipping, or shipping, or self-shipping, or pre-made items, or custom-made items, licensed goods items of the creator or model, 3rd party licensed items from the creator or model or person's likeness, or used items, etc.) may allow the creator to manage their merchandise operation with no (e.g., 'drop-shipping,' or outside shipping, or shipping, or self-shipping, or pre-made items, or custom-made items, or used items, etc.)

overhead costs or inventory, or made items, or newly made items, or any items, etc.) In some embodiments, listing items, there may be different categories such as, which may include but not be limited to (e.g., 'used items' goods, lingerie, dolls, licensed goods items of the creator or model, 3rd party licensed goods or items, 'new merchandise' or 'pre-owned merchandise, goods, services, etc.) which may include but not be limited to (e.g., pre-owned cleaned merchandise meaning pre-owned by the model or creator and has been washed and is in clean condition, etc.) In some embodiments, user interface or items or anything may be separated into: (e.g., different categories and are listed as separate categories, etc.) on the 'model' or 'creators' (e.g., public homepage and managing homepage, or management center, or management system, or user interface, etc.) In some embodiments, the model may list categories or items (e.g., 'private' or unlisted, etc.)

Figure 14:
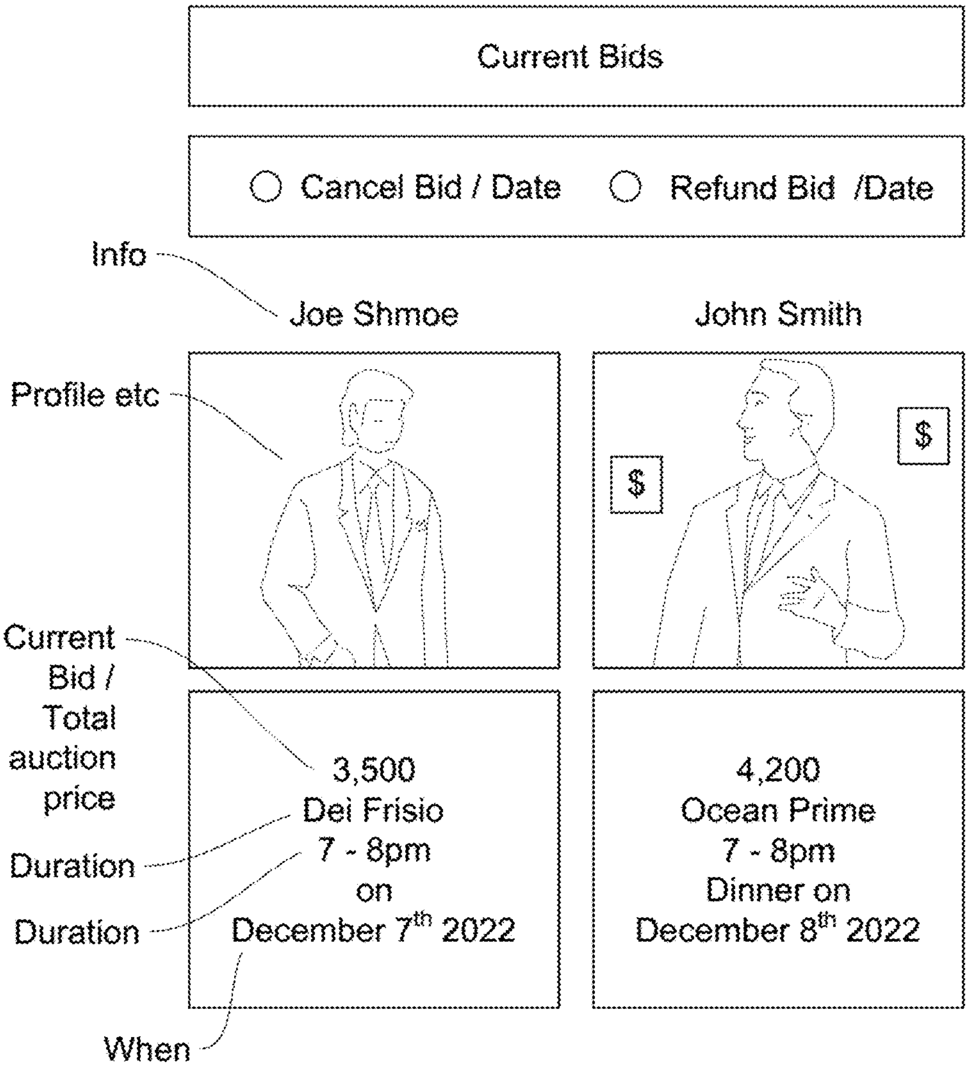

FIG. 14: In some embodiments, FIG. 14: In some embodiments, the user interface may be coming from FIG. 10, which may be the part that may show, which may include but not be limited to (e.g., current bids, current auctions, current time, current interested romantic persons, current persons interested in a date, persons interested in speaking to user, persons interested, current price, price, bids, auctions, etc.) In some embodiments, the user interface may be where the model may include but not be limited to (e.g., manage, management platform, see her current bids, see the price, see the current price, etc.) In some embodiments, this may be where the model may be able to which may include but not be limited to (e.g., names, faces, background check, linked outside references, reviews, information, etc.) on the (e.g., 'bidders, users, persons, entities, etc.) In some embodiments, if the model is which may include but not be limited to (e.g., refuses date, refuses offer, isn't interested back, isn't attracted to, doesn't have time, doesn't want to go, plans have changed, uncomfortable, doesn't like, doesn't feel good, standards aren't met, standards did not meet, isn't impressed, doesn't want to, isn't feeling safe, doesn't have a chaperone, isn't able to make it, or any reason, etc.) related to themselves and/or with the information given, seen or shown here or on the platform or otherwise outside of the platform, the model may decide to cancel the bid and or/refund the payment, or reschedule. In some embodiments, these 'bidders' may have reached the models, which may include but not be limited to (e.g., 'minimum standards for a date, set standards, set requirements, etc.) 'refunding' and may be able to which may include but not be limited to (e.g., refund, may be able to cancel a bid, date, payment' etc.) may or may not be suggested. In some embodiments, this may be if the 'model,' which may include but not be limited to (e.g., is unable to, doesn't want to, can't, any set requirements, or set reasons, or selected reasons, etc.) In some embodiments, the model may be 'report' this person if model chooses to: (e.g., refund, block, refund and block, block, etc.) with or without giving the, which may include but not be limited to (e.g., partner sites, platform, business, users, etc.) reasons why, which may include but not be limited to (e.g., user, she, model, person, etc.) which may include but not be limited to (e.g., refunded or canceled, or changed, etc.) this, which may include but not be limited to (e.g., asset, partial refund, non-refund, refund of money, change date, time, place, location, etc.) to the (e.g., bidder, paying person, etc.) In some embodiments, the platform may require the 'model or creator' gives us a valid reason why with proof and evidence because if the 'bidder' causes or suspects that she will be in danger, we need to remove 'him' from the platform and do a thorough investigation on the claims. In some embodiments, removal, and banning of the 'bidder' is at the discretion of the platform's decision. In some embodiments, this FIG. 14 may show, including but not limited to (e.g., all/some, parts, preview, suggestions, itemized, etc.) (e.g., pre-determined, selected, suggested, pre-picked, or pre-decided, etc.) details to the date, such as (e.g., 'which restaurant, the time, the date, person, gifts, price, etc.) In some embodiments, The 'model' may have already picked these before these bids because she may have managed her FIG. 9 Calendar through the, which may include but not be limited to (e.g., app, platform, website, or other means to access this calendar integration for managing, etc.) which may include but not be limited to (e.g., her, model's, users, etc.) which may include but not be limited to (e.g., times, connections, 'dates, pre-decided date preferences, etc.)

Figure 15:
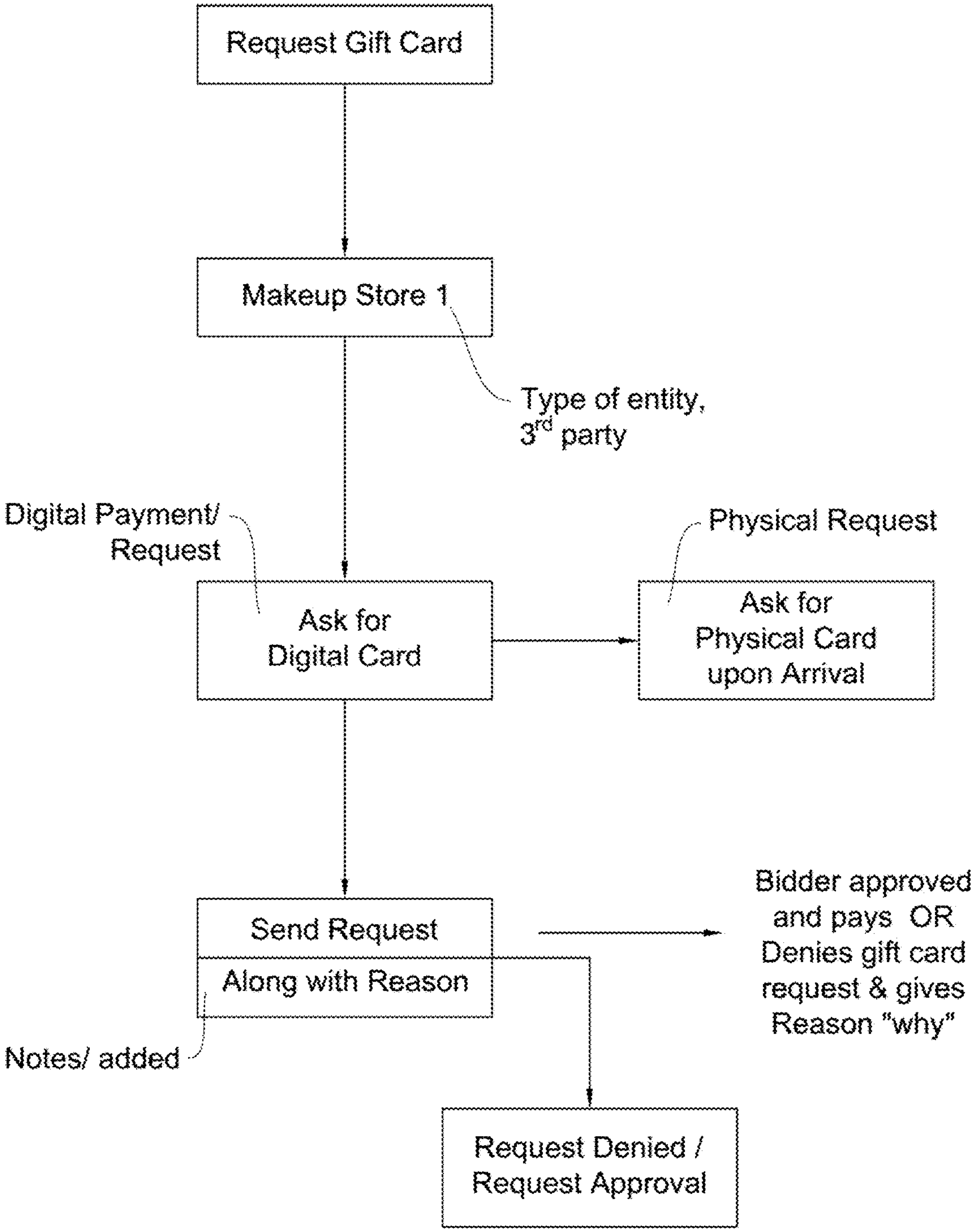

FIG. 15: In some embodiments, FIG. 15: In some embodiments, The 'model' may be able to which may include but not be limited to (e.g., inquire about, request, ask for, suggest, add to the bill, add to purchase, add to gift, question, request, request in person, request digital, send request, etc.) which may include but not be limited to (e.g., payments, funds, stocks, shares in corporations, gifts, gift cards, items, items needed, digital items, non-fungible tokens (NFT), crypto coins, items wanted, bills to be paid, items required, items missing, items wanted, food requests, grocery requests, past due debts, makeup items, hair items, gifting, flowers, etc.) in any format or receiving way such as, which may include but not be limited to (e.g., digital format, physical gift, physical items, digital items, physical gifts to be brought to the date, money, cash, digital assets, exchangeable, anything of value, shout outs, endorsements, etc.) In some embodiments, The model may be written, which may include but not be limited to (e.g., 'why' she needs or wants, needs, wants, a note about, a note rereading, an inquiry on, reason for, pitch for, reasons for, reason why, etc.) the, which may include but not be limited to (e.g., gift card, gift, item, item or thing of value, etc.) along with the request or suggestion or want. In some embodiments, The user may, which may include but not be limited to (e.g., 'bidder,' human, robot, person, user, etc.) may have to, which may include but not be limited to (e.g., approve, deny, request more information, add to monthly giving, add to weekly giving, send annual gifts, send gifts per period, set up an automatic payment, give reasons why not, explain why not, say no, deny, approve, automatically send, automatically accept, etc.) this request or suggestion or do it out of their desire and not from a request or suggestion. In some embodiments, If the 'bidder' or user or public or person refuses' the request or is unable to fulfill it, the user may, which may include but not be limited to (e.g., have to be required to, suggested to, fill out a form, ask to, etc.), which may include but not be limited to (e.g., write, record explanation, record a voice recording, explain, give a statement, deny and give reasons, deny, refuse, unaccept, etc.) for example which may be including but not limited to send back to the user, which may include but not be limited to (e.g., to explain why he may not be able to buy her a makeup gift card so she may look her best' presumably 'to prepare for the date' for example, or explain why he is unable to provide flowers for a date or explain why he is unable to pay for her parking expense or valet expense, etc.)

Figure 16:
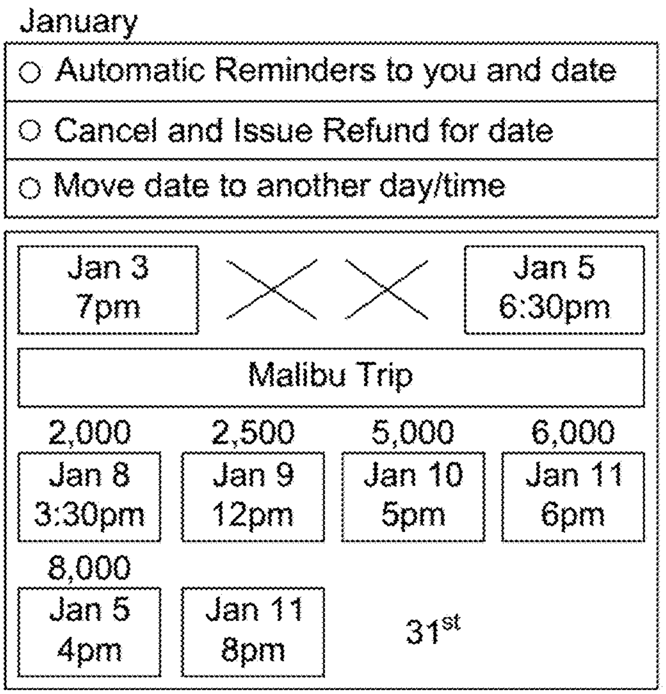

FIG. 16: In some embodiments, FIG. 16: In some embodiments, FIG. 16 may be directly from FIG. 10 or its separate link or section, or page. In some embodiments, the user interface may be the, which may include but not be limited to (e.g., user interface, home managing page, editing page, etc.) of the (e.g., model, creator, user, or registered person or entity, etc.) In some embodiments, FIG. 16 may be once you click on the part that may show the, which may include but not be limited to (e.g., 'calendar' or 'managing your date calendar,' managing your schedule, schedule manager, date manager, calendar manager, service calendar, time calendar, work schedule, personal schedule, yearly schedule or monthly schedule, current dates, open dates, etc.) user interface may go into showing a (e.g., larger, more significant, bigger, more detailed, unblurred, etc.) version of the 'model's calendar. On any user interface figure, the 'creator' or 'model' may update her, which may include but not be limited to (e.g., frequency of automatic reminders for dates, available times, email reminders, email suggestions, email booking reminders, payment reminders, marketing emails, marketing notifications on the platform, the frequency for the 'bidders' or 'fans,' frequency available, marketing frequency or reminders, content postings, scheduled content postings, scheduled reminders, etc.). In some embodiments, 'user may be able to, which may include but not be limited to (e.g., cancel and/or issue refund, etc.) for, which may include but not be limited to (e.g., date, meeting, connection, period, time, secured time, etc.) also/or potentially, which may include but not be limited to (e.g., reschedule, change, 'request to move date to another date and time, refund, cancel, cancel with reason, cancel without reason, block, suspend the user from viewing their profiles, allow payments only and no communication, restrict user, etc.) which may be, which may include but not be limited to (e.g., approved, switched dates, blocked, restricted, denied, changed, accepted, confirmed, edited, etc.) on the other end or their end or from the platform by the (e.g., 'bidder' or 'customer' or 'user' or 'public,' etc.)

In some embodiments, the other/wide, which may include but not be limited to (e.g., view, angle larger view, etc.) of the calendar, allows the 'model' to manage her (e.g., calendar, timing method, timing system, calendar 'blocks' etc.) which may or may not allow 'bidder' to, which may include but not be limited to (e.g., book, schedule, inquire about, inquire about, request or bid on dates, etc.) for those, which may include but not be limited to (e.g., days or times, etc.). In some embodiments, this may allow the 'model' to which may include but not be limited to (e.g., place her set prices, price ranges, general pricing, general transmittables, for beginnings of 'bids,' price, time, etc.), which may include her, which may include but not be limited to (e.g., 'minimum bids, auction amount' for a date, connection, time, etc.) In some embodiments, the user interface may also allow the model to which may include but not be limited to (e.g., manage, change, automatically set, set her schedule, set all other bid times, pre-arrange auctions, pre-make auctions, pre-dates, pre-select, pre-bid, allow pre-bids, allow events, create events for auctions or bidding/auction, dates, etc.) In some embodiments, This also may include letting them, which may include but not be limited to (e.g., setting, changing, limiting, making, creating, etc.), which may include but not be limited to (e.g., 'restaurant' times, preferences, locations, travel plans, traveling options, etc.)

Figure 17:
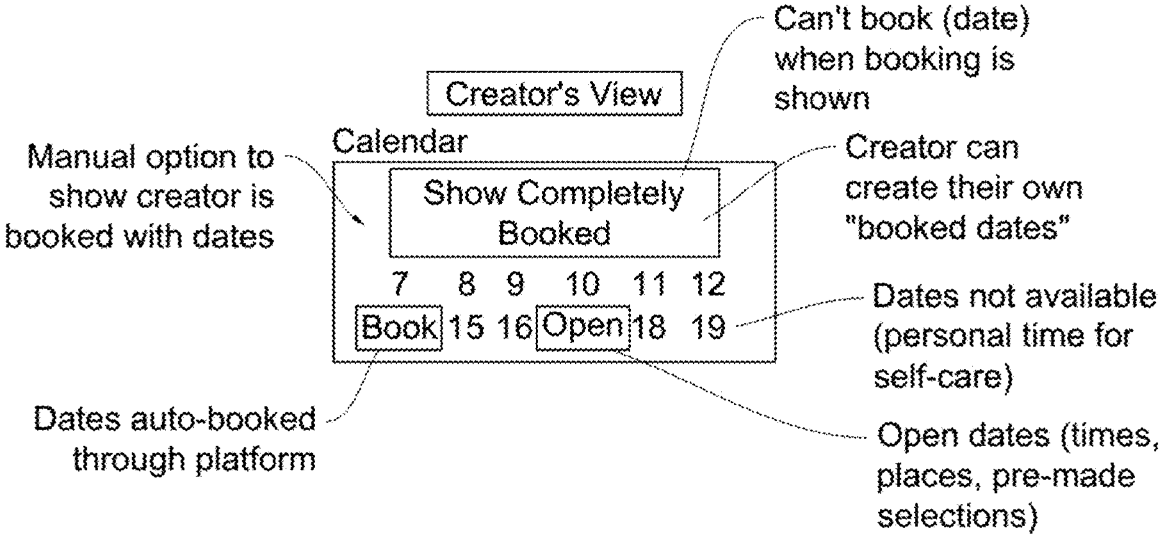
Figure 18:
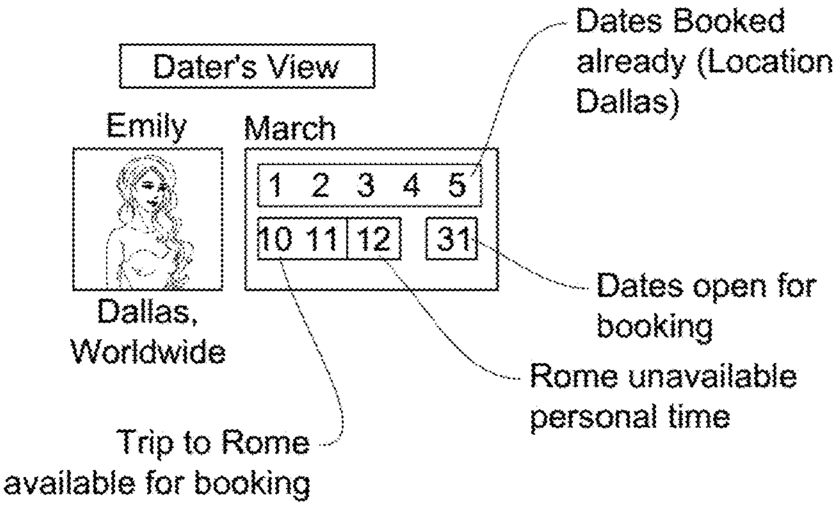
Figure 19:
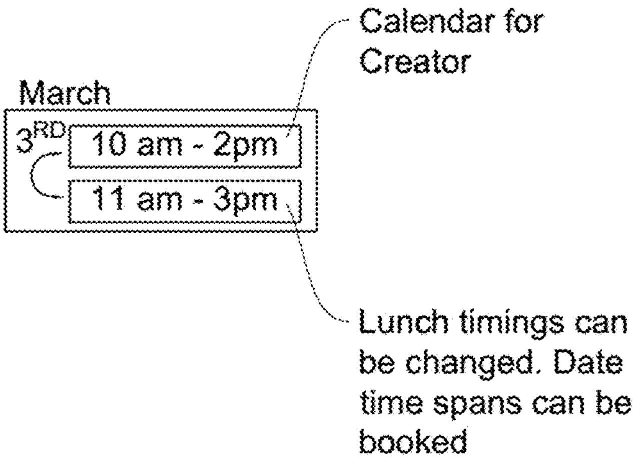

FIG. 17, FIG. 18, FIG. 19: In some embodiments, this may be the creator's view where, which may include but is not limited to, the: (e.g., creator or model, entity, 3rd party, user, public, registered persons, or 'paid dater' or 'paid person on the platform' etc.) may have, which may include but not limited to, the: (e.g., manual or automatic, or machine learning, or computer, or robotics, or 3rd party chosen, or entity-chosen, manual changing, manually switching or blurring or making available or unavailable option, AI chosen, machine learning, shared knowledge, wiki, internet searches, news outlets, news, etc.) to show that (e.g., user, person, entity, they, the creator, worldwide options, different countries, different regions, persons, creators in other countries, worldwide parties or dates, etc.) may be booked with dates already on (e.g., their, her, its, etc.) which may include but not be limited to (e.g., paid dater's, users, persons, etc.) (e.g., calendar, schedule, month, viewing options, daily options or daily things to do, etc.). In some embodiments, this organization or options may show publicly or on the dater's profile that the paid dater or the creator is (e.g., fully booked with dates, partially booked, blurred on booking, blurred on showing persons that are or are not available during that time period, places to go, available restaurants, possible availabilities, teasers on what could be, paid or free options to viewing or suggestions for calendar or date ideas, etc.) which may include but not be limited to (e.g., or what is used to describe an outing or something in person, or something via zoom, or an event or something that takes up time in a day, or date, or romantic setting, or food place, party, etc.) In some embodiments, the time span may change or be extended or updated based on any reason, whether manually automatically or by shared knowledge, or by the person's management, the person or user or talent themselves, etc.)

Some embodiments (e.g., calendar, timing method, schedule method, scheduling method, timing data center, etc.) may also show dates, connections, times, and timing data, that are auto-booked through the platform. In some embodiments, the option to book, schedule, inquire about, inquire about, inquire regarding, secure, create a connection to, hold, pay for, create a business relationship with, use exchangeable to secure or book, schedule, inquire about, etc.) may be removed while these are showing booked, taken, etc.) In some embodiments, the, which may include but not be limited to (e.g., calendar, timing method, schedule method, scheduling method, timing data center, etc.) may show open dates, times, etc.) as described in this document that may be made from pre-made selections may include but not limited to (e.g., times, dates, restaurants, locations, places, public places, events, places such as a bowling alley, places such as an expensive restaurant, places such as go-karting, times that may or may not be manually or automatically changed on the calendar for availability, or times for booking, etc.) In some embodiments (e.g., calendar, timing method, schedule method, scheduling method, timing data center, etc.) may show dates, connections, times, and timing data not available for reasons such as, which may include but are not limited to (e.g., 'self-care' or 'personal time to recharge' etc.) In some embodiments, In some embodiments, which may include but not be limited to (e.g., set, changed, create, auto, AI created, machine learning, automatic auto-recurring dates, connections, etc.) may be included on, which may include but not be limited to (e.g., timing method, (e.g., timer, time stamp, location stamp, business location stamp, confirmation of time, location, data, etc.) schedule, calendar, etc.) or, which may include but not be limited to (e.g., greyed, unavailable, booked of, or available, not available, etc.)

In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

Figure 20:
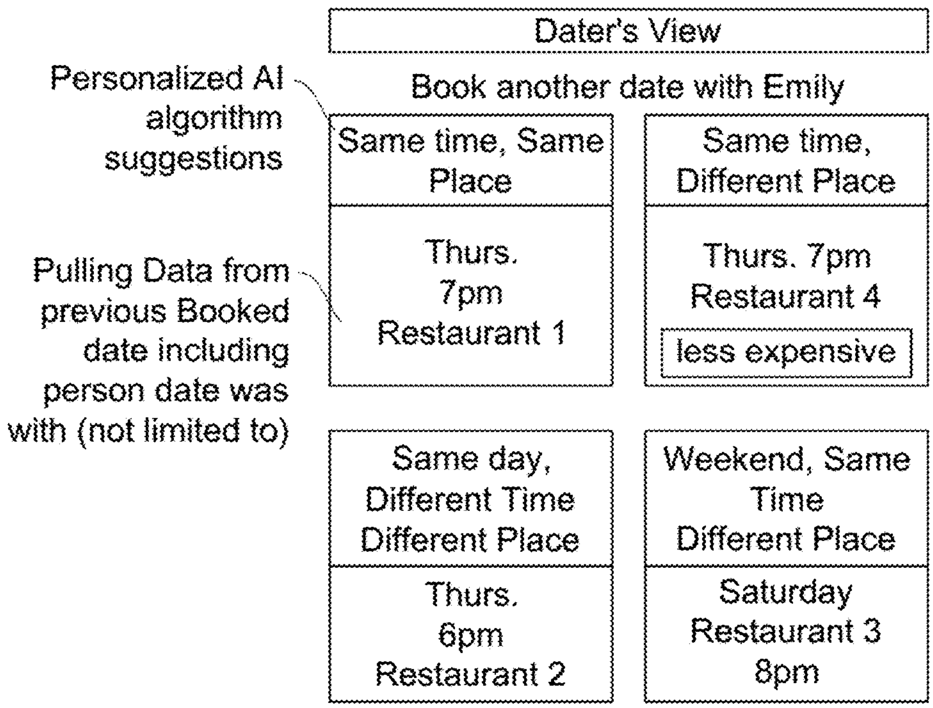

FIG. 20: In some embodiments, this may be the, which may include but not be limited to (e.g., 'potential dater's view,' potential users' view, public's view, available to the public, blurred until payment is made, blurred until membership is paid, etc.) In some embodiments, an option may be shown, including but not limited to (e.g., before, during, after, etc.) a date may be completed to set up another date, an annual date, a period repeated date, a weekly date, a flower schedule sent, a gift sent, set up times for gifts or flowers or dates to be set, options combining past dates with AI suggested changed for the next one, or randomly changed suggestions for the next ones, more recommendations based on the old dates or the previous dates or the most frequented dates, etc.) In some embodiments, there may be an, which may include but not be limited to (e.g., computing operation or an AI suggestion, manual, management system, humans, robots, computing system, etc.) that may take into consideration, which may include but not be limited to (e.g., data from date' such as 'the day of the date, the time of the date, the location of the date, and any other options related to the date involving weather, location, frequency, time spent together, money spent, date spent, etc.) In some embodiments, the User interface may show multiple options such as, which may include but not be limited to (e.g., same time, same place, the same day or 'same time, different place, the same day' or same day different time, different place' or try the weekend or weekday 'same time, different place, etc.) In some embodiments, the user interface may show AI-generated options or computing operation options such as, but not be limited to (e.g., this restaurant is cheaper, or 'This one is closer to you, etc.) In some embodiments, this information may be pulled or used by collecting data about the date or the person's profile to ensure they get the best and easiest way to date using AI, computing operation, or data. In some embodiments, there may be a process where a 'real time' updated 'time' is shown to the 'person getting paid,' and the user interface may turn 'red' or another color that may show that the date has now 'ended.' In some embodiments, the term 'ended' may refer to going past the, which may include but not be limited to (e.g., 'time paid for by the person paying, or date time, or connection time, or meeting time, or activity time, etc.) In some embodiments, a screen may show the current time on the date, plus showing that the date ended '5 minutes ago' and that the person is 'free to go' or has 'fulfilled their contractual obligations."

In some embodiments, there may be a screen or a button or a feature that is enabled to show that the 'paid person' is now 'officially ending the recording of the date.' In some embodiments, recording may mean the process in which a, which may include but not be limited to (e.g., location, coordinates, time, location, date, etc.) is being recorded to show that the date was performed and the contractual obligations are being, which may include but not be limited to (e.g., met, or could be met, etc.) In some embodiments, the, which may include but not be limited to (e.g., screen, hologram, user interface, viewing display, user interface, etc.) the may show the, which may include but not be limited to (e.g., current time, the date time, and information regarding whether or not the date has ended, how much time left is on the date, if the date obligations have been met, etc.) In some embodiments, the feature to show that the 'paid person' may now (e.g., automatically agree, manually agree, accept, conclude, view, agree, etc.) with the, which may include but not be limited to (e.g., computer system the platform system also agreeing that the date has now ended, etc.) In some embodiments, then user interface may show a screen that the, which may include but not be limited to (e.g., 'date has now ended, user interface may show how long the date was in comparison to what the date was booked for, etc.) In some embodiments, there may be no, which may include but not be limited to (e.g., repercussions, options, care, alternative routes, penalties, etc.) if the date may not, which may include but not be limited to (e.g., agree with, seem to match to, compare to, collide with match up to what the date was supposed to be [special business name, specific date type, specific location], etc.)

In some embodiments, the entire review may be there to just, including but not limited to (e.g., show what is being recorded or what has been recorded for the date data, etc.) In some embodiments, there may be a, which may include but not be limited to (e.g., countdown clock or a time estimated clock in, or period, or clock, or time limit, etc.) in which the 'paid person' is getting payment disbursed from the trust account that is holding the cleared money that the 'paying person' put up for the date. In some embodiments, the 'paid person' may be notified when the payment has been disbursed and is now pending in their account, etc.) In some embodiments, there may be an option for the 'paid person' to manually or automatically answer a question, which may include but not be limited to (e.g., 'Do you want us to tell him to book, schedule, inquire about, inquire about, inquire regarding, secure, create connection to, hold, pay for, create a business relationship with, use transmittables to secure or book, schedule, inquire about, etc.) another date with you?"), etc.) In some embodiments, there may be, which may include but not be limited to (e.g., a couple of options such as "yes or no" etc.) In some embodiments, the user interface may take the 'paid person' to another screen, which may include but not be limited to (e.g., if it's a 'yes' for example, etc.) then the other party may be notified that which may include but not be limited to (e.g., 'that person likes them' and/or they will be encouraged and/or confirmed, etc.) to want that person to, which may include but not be limited to (e.g., book, schedule, inquire about, inquire about, inquire regarding, secure, create a connection to, hold, pay for, start a business relationship with, use transmittables to secure or book, schedule, inquire about, etc.) another date with them soon, which may include but not be limited to (e.g., after, during, before, etc.) which may include but not be limited to (e.g., the date has officially ended, or the connection has occurred, etc.) In some embodiments, the 'paid person' may choose not to go out with this person again. Then they may have an option to, which may include but not be limited to (e.g., 'block' this person and/or get more information regarding how that person may contact that person again, etc.) such as the, which may include not be limited to (e.g., messaging system for example; and/or they will be charged 50$, for instance, to message that person again, so they don't have to worry or respond to free text messages if that person gave them their cell phone number, etc.)

Figure 21:
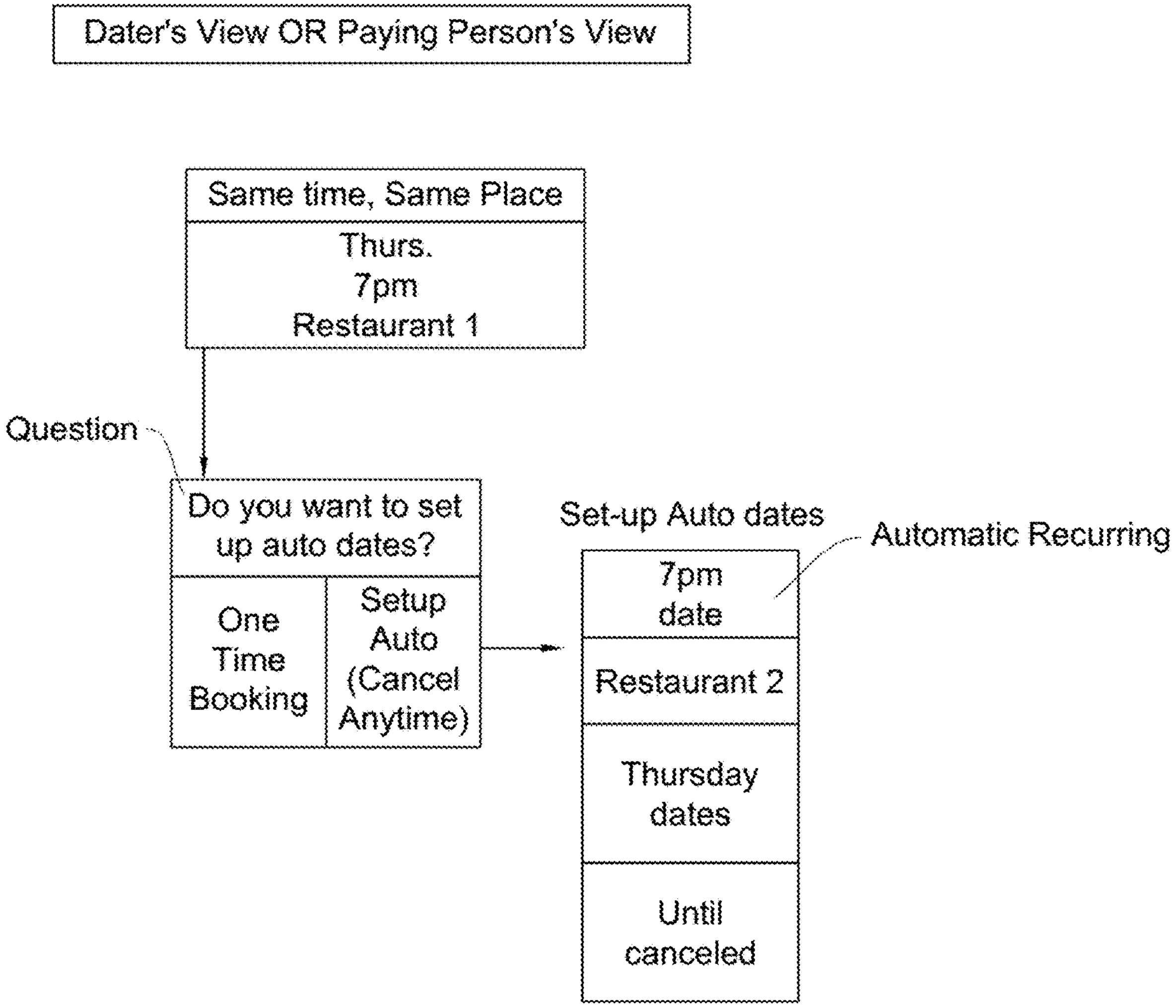

FIG. 21: In some embodiments, the user interface may be the, which may include but not be limited to (e.g., user's view, public view, private view, blurred view, uncovered view, membership only view, dater's view, the paying person's view, etc.) In some embodiments, this may be a continuation of a date option such as the one shown in the user interface of this disclosure. In some embodiments, there may be an option to, which may include but not be limited to (e.g., agree to, set up, change, option for, contract in place for, changed contract or agreement sent, refusal, denial, changed, changing, negotiations for, etc.), which may include but not be limited to (e.g., auto-pay for, recurring dates, automatic dates, AI-created dates, 3rd party automatic dates, gifted dates, set up payments, etc.) In some embodiments, there may also be an option to set up 'allow, which may include but not be limited to (e.g., model, creator, person, etc.) to, which may include but not be limited to (e.g., pick the dates, auto book, schedule, inquire about, inquire about, inquire regarding, secure, create a connection to, hold, pay for, create a business relationship with, use transmittables to secure or book, schedule, inquire about, the dates, etc.) for you to, which may include but not be limited to (e.g., accept, confirm, agree to, 'approve the dates,' change contract for, accept contract, put contract in place, etc.) after she, which may include but not be limited to (model, creator, user, entity, persons, person, group, business, etc.) is, which may include but not be limited to (e.g., allowed, approved, confirmed, changed, negotiated, etc.) to, which may include but not be limited to (e.g., book, schedule, management team booking, outside persons booking, outside persons inquiring about, inquire about, confirm, AI-automatic, assistant booking, 3rd party booking, auto-book the date(s), etc.) In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, stocks, shares, outside entities, outside parties, messages, queue, home, profile, messages, earnings from messages, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

Figure 22:
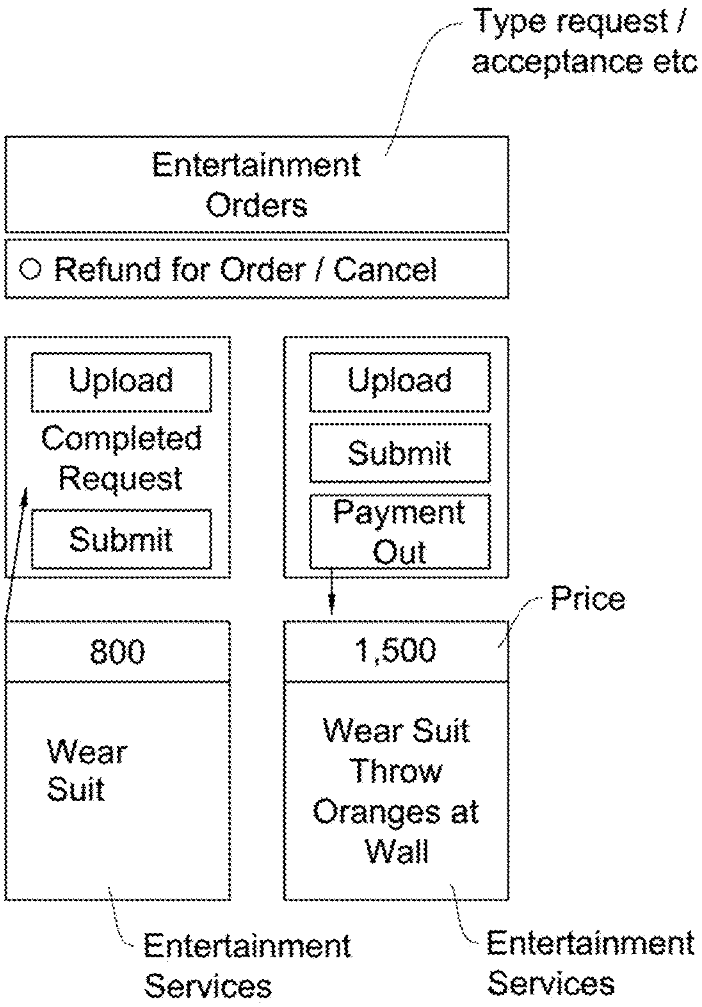

FIG. 22: In some embodiments, FIG. 22: In some embodiments, the user interface may be coming from, which may include but not be limited to, which may include but not be limited to (e.g., FIG. 10, or any other figure or no figure at all, etc.) In some embodiments, the user interface may show, which may include but not be limited to (e.g., 'entertainment' or 'special request order' or 'special request entertainment order or inquiries, request for, inquiry about, inquiry regarding, etc.), whereas payment, which may include but not be limited to (e.g., may have/have not been, etc.) which may include but not be limited to (e.g., completed, changed, finished, concluded, seemingly concluded, agreements met, executed, partially executed, etc.) In some embodiments, payment may not be, which may include but not be limited to (e.g., distributed, finished, sent, pending, etc.) unless (e.g., 'model,' or user or person, management, users, groups, entities, employees, persons appointed to, etc.) which may include but not be limited to (e.g., agrees, confirms, manages, accepts, uploads requested content, completes content, does request, completes the deal, etc.) In some embodiments, for example, (e.g., interface, area, screen, hologram, etc.) might say, which may include but not be limited to (e.g., for example, which may include but not limited to 'completed payment request' 'model earning 900$' 'description: 900$ for the beautiful model to do a 1-minute video showing herself wearing a cow-suit throwing oranges at the wall, etc.) In some embodiments, it may include but not be limited to (e.g., entertainment skit, entertainment options, for entertainment purposes, options for purchase, entertainment for purchase, etc.) In some embodiments, each may include but not be limited to (e.g., part, parts, partial, total, version of, similar to, etc.) of this may be integrated from the (e.g., 'bidder' or 'buyer' or inquiry, or suggestion or person, etc.) to choose. In some embodiments, options may include but not be limited to (e.g., 'duration, check-in, check-out, time stamp, time record, time and data record, location, time and data record, coordinate(s),' video or photo' 'catsuit' 'outfit, brand outfit, brands, logos, 'fully clothed' etc.) In some embodiments, the, which may include but not be limited to (e.g., 'bidder' or 'buyer' or person, user, etc.) may be put in their, which may include but not be limited to (e.g., request, inquiry, ask, message, contact, legal agreement, order, payment, etc.) for what, which may include but not be limited to (e.g., user, person, entity, 3rd party, etc.) want the, which may include but not be limited to (e.g., 'model, user, person, entity, etc.) to do. In some embodiments, the 'buyer' may be able to or not just type in, which may include but not be limited to (e.g., anything, random stuff for a price, random things, weird requests, any request, entertainment request, content request, live content request, shout out request, etc.). In some embodiments, options, which may be shown only after the other parts, which may include but not be limited to (e.g., requests that have been approved, pre-approved requests, have been established, or any/every option that is pre-picked, or pre-approved, etc.) which may include but not be limited to (e.g., video type, content request options, video, photo, etc.) In some embodiments, brands, businesses, entities, singular persons, representatives, etc.) may be able to submit an (e.g., content inquiry, content-creation inquiry, brand deal inquiry, endorsement deal inquiry, content creation inquiry, product review inquiry, submission for reviewing content, submission or contract for creating content whether digital, in-person, or any physical or digital asset for the brand or other person or entity such as 'creating a personalized review video for a product, etc.) In some embodiments, there may be a separate or combined way for any brands, persons, or entities to pay, bid, or create a contractual or non-contractual agreement in exchange for any asset or thing that would help the other business or person, such as "personal brand endorsement, personalized video saying how great this product is, a video or picture of the person using the product, a person dancing to a particular song, a person endorsing a song, etc.) In some embodiments, these inquiries or agreements may have automatic (e.g., payment methods, contract agreements, changing contracts, bid methods, inquiry methods, systematic methods, etc.) that may allow (e.g., person, entity, group, business, etc.) to automatically or manually approve the item or submit for review or consideration or for the other person to create or finish or make the agreement happen, such as "1000 has been the highest bid for person A to brand endorse product B here, here, and there (social platforms or in-person or during a speech, etc.) In some embodiments, the bids or inquiries may be open to the public or anyone on the platform, whether registered or not. In some embodiments, there may be options such as 'add your credit card or driver's license to begin bidding or payment or bids or inquiries, etc.) In some embodiments, there may be (e.g., bids, inquiries, payments, etc.) for person A, such as a model, to say, "I will create a brand endorsement on my social media in exchange for the highest bidder, and each brand can bid on the enforcement, etc.) In some embodiments, the management system may show any combination of "bid brand enforcement deals, highest bidding deals, highest paid deals, deals that have a down-payment, deals that are higher in pay, deals that have been through management and approved to now be reviewed by the creator or model, deals that are pre-approved to be reviewed such as 'manually approving all inquiries to come directly to 'model' or price plus the type of inquiry submission, etc.) In some embodiments, there may be an automatic or a manual version of a legal contract or a way for a legal entity or an accountant or management, or social media management persons, etc.) to see brand deals or see inquiries any manage them or to approve them or to submit them or to see them, or to review and discuss, or for payment to be made and directly sent to an accountant, or inquiries to be made, and then directly sent to a lawyer, or inquiries along with a lawyers approval similar to a legal document signing software or a management software that is interactive with (e.g., multiple parties or one party, or just the talent or just the model, etc.) per (e.g., deal, per brand deal, per inquiry, per quarter, annually, each day, or any period, etc.) In some embodiments, the talent, model, creator, girl, human, person, group, etc.) may be able to (e.g., see, view, change, respond to, message back, message, inquiry, etc.) on their management system or management area or home screen or any screen their current "inquiries, bids, offers, brand deals, deal inquiries, etc.) and may be able to approve, deny, record, change, respond to, change legal agreement to, add a legal agreement to, send to their lawyer, send to their accountant, send to their managers, send to their partners, etc.) In some embodiments, this management system may allow the creator, model, or person to get paid directly through the platform, and their money or exchangeable may be able to be automatically split for taxes or automatically sent to their bank account or stored on their account, etc.)

Figure 23:
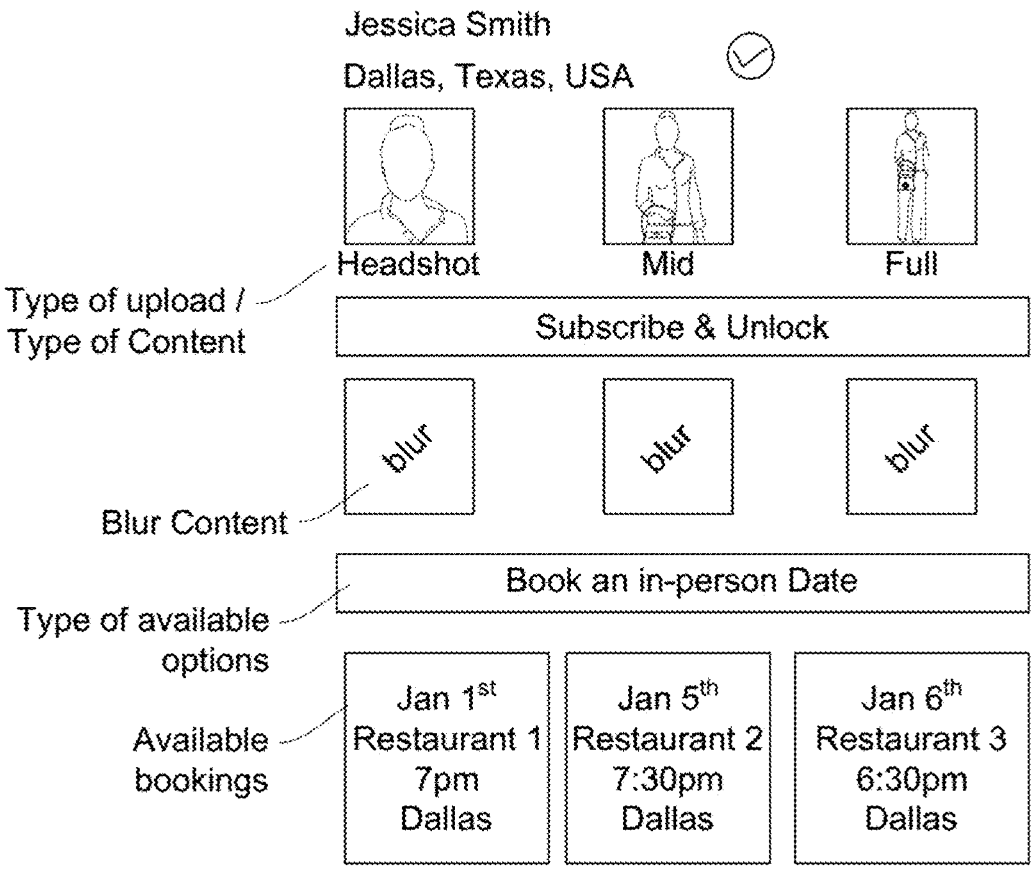

FIG. 23: In some embodiments, FIG. 23 or any interface may be a potential, which may include but not be limited to (e.g., 'zoomed in' or alternate version, next version, next screen, blurred, shown, detailed, etc.) of FIG. 10 or any user interface, but the user interface may also be a, which may include but not be limited to (e.g., 'detailed zoomed version, alternate version, current version, membership only version, paying persons only version, etc.) of the, which may include but not be limited to (e.g., 'profile' of the 'model, profile, offer, activity, person, date, etc.) In some embodiments, this may be the, which may include but not be limited to (e.g., profile, user interface, home, location, profile, 'models home page profile' etc.) that the 'bidder' may be able to see/be able to see. In some embodiments, this figure may include all/partial details of the, which may include but not be limited to (e.g., model, a verified check logo, the location of the model for dates, the location that the model was born in, country of residence, subscribe and unlock, blurred 'paid only' photos and videos, access to the timeline or the feed of the 'model' that is 'public,' membership only version, paying person only version, verified person version, etc.) In some embodiments, the 'calendar integration' may include but is not limited to (e.g., 'book, schedule, secure a date, view calendar, see calendar, etc.) with the (e.g., users, model(s), persons, groups, entities, etc.) In some embodiments, the (e.g., user's, model, etc.) may include but not be limited to (e.g., some, all, most, some, partial, blurred parts of, similar to, etc.) of her/their (e.g., availability, preferences, wants, needs, preferences, suggestions, requirements, schedule, calendar, periods available, types of dates available, preferences for dates, etc.) In some embodiments, (e.g., paying person, buyer, bidder, etc.) may (e.g., have to or be required to, or have a minus amount to, etc.), which may include but not be limited to (e.g., 'buy now 'send payment, book payment' or 'begin bid pay for membership, join a membership, pay to view, etc.) to schedule a, which may include but not be limited to (e.g., connection, date, meeting, networking meeting, business-inquiry, etc.) In some embodiments, content may be, which may include but not be limited to (e.g., blurred, half-shown, partial-shown, silent, content may be fuzzy, not shown, greyed, appear fuzzy, not appear total, not be able to be viewed at all, no access to the page, no access to buttons, viewing may be obstructed, watermark over, sound watermark on sound, watermark appearing, only a few seconds shown, only some shown then stopped, stopped content, etc.) until, which may include but not be limited to (e.g., payment is made, requirements are met, follow has been made, subscriber has been created, membership is completed, payment is submitted, payment has been cleared, the profile has been created, payment to the platform has come, payment has been made to the user, exchangeable between user has been established, assets have been sent, etc.)

Figure 24:
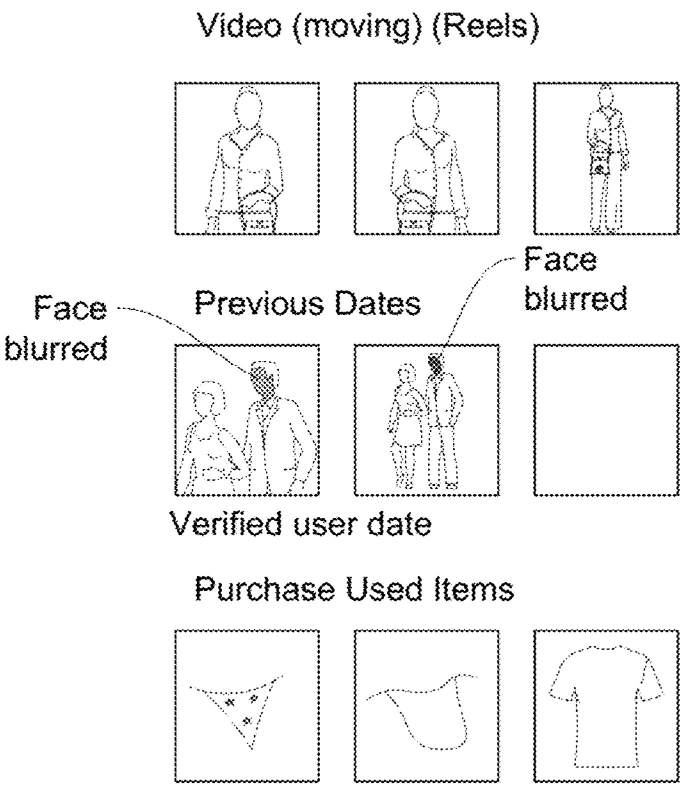

FIG. 24: In some embodiments, user interface may be a, which may include but not be limited to (e.g., scrolled down, larger, added version, or continuation of the FIG. 23 or any interface etc.) which, which may include but not be limited to (e.g., continue to display and show the 'profile' and 'offerings' from the 'model' for other items etc.) such as, which may include but not be limited to (e.g., 'used items' lingerie, dolls, licensed goods items of the creator or model, 'new merchandise' goods, 3rd party goods or licensed items, 'previous successful dates' 'moving reels' 'moving videos' more 'unlocked content/photos/video galleries' or 'locked photo galleries' etc.) In some embodiments, this may also may include links to other social media such as, which may include but not be limited to (e.g., social networks, payment platforms, 3rd party integrated platforms or user interfaces, etc.) In some embodiments, there may be an option for a user to, which may include but not be limited to (e.g., scroll, tap, move, command, make, go, moving content, loop content, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, or areas, or profiles, or content, or hologram or display screens, etc.) to continue to look or get automated, which may include but not be limited to (e.g., looking, viewings of, movement, selection, scroll, etc.) which may include but not be limited to (e.g., content, creators, models, users, etc.)

Figure 25:
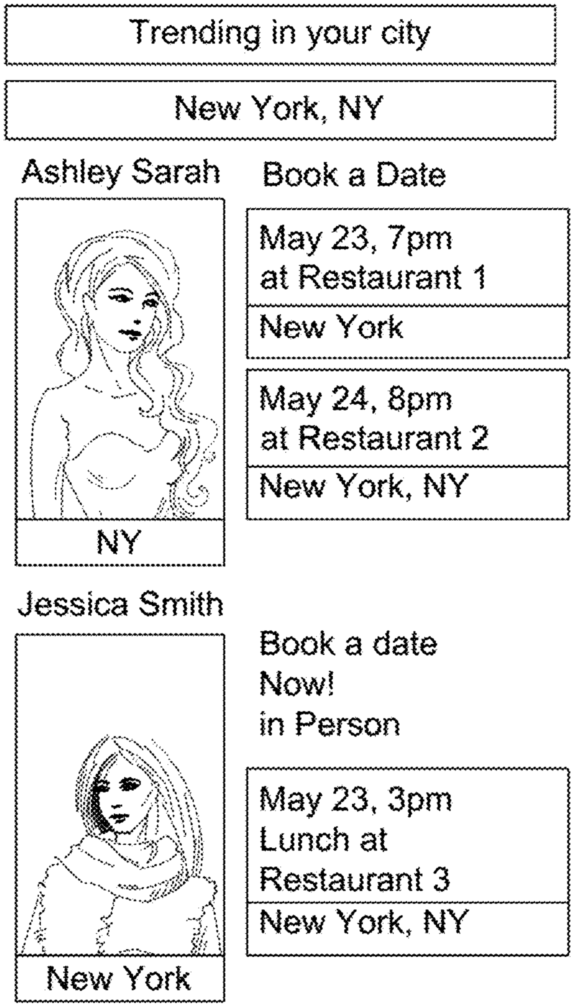

FIG. 25: In some embodiments, the user interface may be the user's (e.g., feed or user interface, or screen, hologram, view, etc.) In some embodiments, the user interface may be (e.g., trending, popular, or shown by computing operation, manually shown, etc.) In some embodiments, the user interface may display a (e.g., home screen or any screen or user interface, etc.) In some embodiments, there may be, which may include but not be limited to (e.g., shown, zoomed in, few at a time, one at a time, user interface options, etc.) that may show, which may include but not be limited to (e.g., special creators, trending in your city, etc.) which may be combined with, which may include but not be limited to (e.g., distance, location data, categories, persons, types, categorized, etc.) In some embodiments, the user interface may be the, which may include but not be limited to (e.g., models, paid creators view, membership only view, etc.) In some embodiments, the user interface may be a, which may include but not be limited to (e.g., model, creator view, etc.) in which the, which may include but not be limited to (e.g., user, model, girl, creator, paid dater, etc.) may show interest first, which may have but not be limited to (e.g., search the platform for a man to show interest in, contact a person, send a message, send a direct message, send an inquiry, show interest, show interest, see calendar, submit request for calendar, etc.) In some embodiments, for example, the creator may search for, which may include but not be limited to (e.g., salary, professional, net worth, looks, time spent on platform, net worth, special skills, similarities, etc.) and be shown options such as, which may include but not be limited to (e.g., higher paid individuals, verified net worth, verified income, verified background check, looks, photos, exclusive photos, etc.) that she may send a, which may include but not be limited to (e.g., communication to whether, which may include but not be limited to (e.g., automatic, manually, computing operation, robotics, AI, outside management system, internal management system, human-created, etc.) in the form of anything such as, which may include but not be limited to (e.g., message, wink, cute message, calendar, availability, etc.) which may include but not be limited to (e.g., saying she is available for a date or wants to go out on a date, etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, spend money, subscribe, follow, book a date with her, book date, book meeting, block off her calendar, set up payments, set up reminders for payments, set up automatic payments, send money, set up automatic dates, send her flowers, send her gifts, etc.) In some embodiments, this figure may show, which may include but not be limited to (e.g., suggestions, requirements, highly recommended pictures/videos for profile, highly-recommended suggestions/requirements, mandatory requirements, etc.)

In some embodiments, for example, there may be, which may include but not be limited to (e.g., mandatory, highly recommended, needed, suggested, etc.) options from the platform, and the platform may specific, which may include but not be limited to (e.g., entities, persons, users, etc.) which may include but not be limited to (e.g., more, less, higher, frequent, etc.) which may include but not be limited to (e.g., recommended, shown, suggested, aligned with, moved around, bigger, seen more, suggested more, distributed to, etc.) using, which may include but not be limited to (e.g., machine learning, computing operation, humans, persons, clicking, frequency, etc.) due to potentially, which may include but not be limited to (e.g., seeing, meeting with, aligning to, suggesting, etc.), which may include but not be limited to (e.g., criteria, requirements, etc.) that may have been, which may include but not be limited to (e.g., recommended, noted, given, suggested, etc.) In some embodiments, a user interface or process may be an option. Still, it may be a way for the platform to have, which may include but not be limited to (e.g., mandatory, highly recommended requirements, more suggested requirements, alignment with goals, etc.) for, which may include but not be limited to (e.g., models, creators, persons, etc.) that want to be, which may include but not be limited to (e.g., recommended, shown, seen, viewed, etc.) which may include but not be limited to (e.g., less, more, more often, many times, etc.) In some embodiments, the user interface may have universal requirements of content or non-universal requirements. In some embodiments, unity requirements may be an option to give a, which may include but not be limited to (e.g., comparable, leveled option, leveling, easily distinguishable option or view, etc.) for the, which may include but not be limited to (e.g., content, user interface, section, screen, hologram, user interface, viewing display, item, original, user-created, platform-owned, platform, 3rd party, business, entity, etc.) In some embodiments, unity requirements may or not be, which may include but not be limited to (e.g., needed, enforced, suggested, shown, computing operation-affecting/effecting, etc.) In some embodiments, unity requirements may be, which may include but not be limited to (e.g., recommended, suggested, more favored, required, etc.) In some embodiments, there may be user interface, which may include but not be limited to (e.g., user liking another user, user showing interest in another user, user viewing another users profile, live shows, live events, live streaming, prerecorded streaming, pre-recorded shows, pre-made content, content, photos, videos, communication, chat boxes, options or areas to share information, communication, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the Bottom, top, side, anywhere, with other suggestions or profiles, or persons, or promotional material or content or information etc.) In some embodiments, there may be options to, including but not limited to (e.g., move, scroll, switch, disappear, reappear, swipe, any content or items, etc.)

Figure 26:
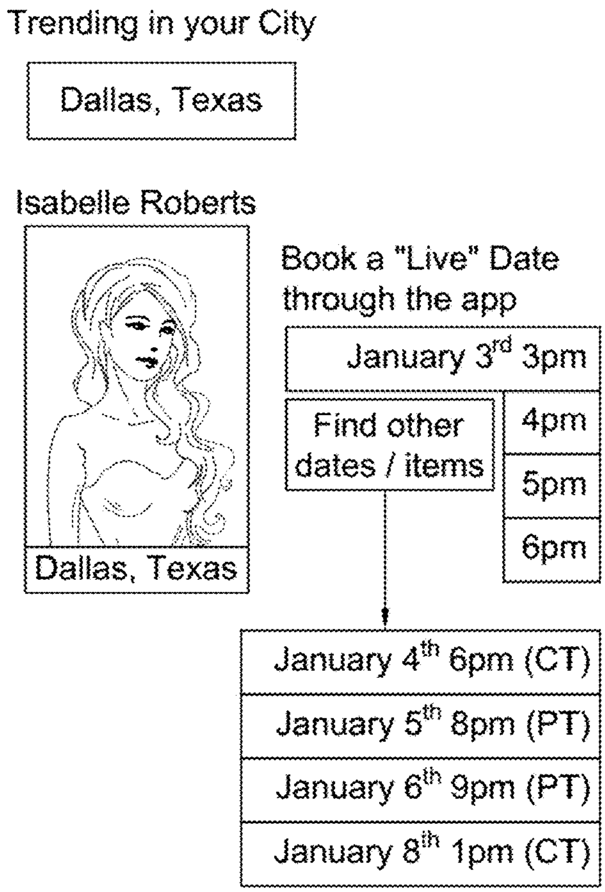

FIG. 26: In some embodiments, there may be options such as, which may include but not be limited to (e.g., profile photo, profile information, dummy profile information (non-membership, non-paying, non-registered, public information), content plus booking information, book a live date, book an in-person date, add person to the calendar, add date to calendar, add time to the calendar, live view now, click for live view, do requirement for live view, trending persons, trending accounts, book live time, go on a date with this person, go on an in-person date with this person, viewing date times with this person, viewing available date times, viewing date options, viewing date general periods, viewing or learning periods, viewing or learning general things such as 'lunch dates available, or dinner dates available or general periods available' etc.) In some embodiments, there may be, including but not limited to (e.g., profiles, profile photos, content, connected content or viewing, information, etc.) In some embodiments, the user interface may be the user's feed or user interface. In some embodiments, there may be, which may include but not be limited to (e.g., information, profile information, advertisements, shown days, shown times, pre-selected dates, pre-selected times, pre-selected booking times and dates, suggestions to click, suggestions to book, schedule, inquire about, inquire about, inquire regarding, secure, create connection to, hold, pay for, create business relationship with, use transmittables to secure or book, schedule, inquire about, etc.) the process on how to book, schedule, inquire about, inquire about, inquire regarding, secure, create connection to, hold, pay for, create business relationship with, use transmittables to secure or book, schedule, inquire about, etc.) options to type in what to book, schedule, inquire about, inquire about, inquire regarding, secure, create connection to, hold, pay for, create business relationship with, use transmittables to secure or book, schedule, inquire about, etc.) options to click what is already been determined or pre-selected, pre-selection may also be from platform or user or model, etc.) In some embodiments, there may be, which may include but not be limited to (e.g., pre-created, pre-determined by the creator, pre-selected by platform, etc.), which may include but not be limited to (e.g., persons, users, times, dates, locations, duration, check-in, check-out, time stamp, time record, time and data record, location, time and data record, coordinate(s), s, etc.) In some embodiments, pre-selected date information may be made by, including but not limited to (e.g., platform, creator, user, person, 3rd party, entities, etc.)

In some embodiments, the user interface may be trending, popular, or shown by computing operation. In some embodiments, the user interface may display a home screen or any screen or user interface. In some embodiments, there may be, which may include but not be limited to (e.g., shown, zoomed in, few at a time, one at a time, user interface options, etc.) that may show, which may include but not be limited to (e.g., notable creators, trending in your city, etc.) which may be combined with, which may include but not be limited to (e.g., distance, location data, etc.) In some embodiments, the user interface may be the, which may include but not be limited to (e.g., models, paid creators view, etc.) In some embodiments, the user interface may be a, which may include but not be limited to (e.g., model, creator view, etc.) in which the, which may include but not be limited to (e.g., user, model, girl, creator, paid dater, etc.) may show interest first, which may have but not be limited to (e.g., search the platform for a man to show interest in, contact a person, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, photos, exclusive photos, etc.) that she may send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date or wants to go out on a date, etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, spend money, subscribe, follow, book a date with her, book date, book meeting, block off her calendar, send her flowers, send her gifts, etc.)

In some embodiments, this figure may show, which may include but not be limited to (e.g., suggestions, requirements, highly recommended pictures/videos for profile, highly-recommended suggestions/requirements, mandatory requirements, etc.) In some embodiments, for example, there may be, which may include but not be limited to (e.g., mandatory, highly recommended, needed, suggested, etc.) options from the platform, and the platform may specific, which may include but not be limited to (e.g., entities, persons, users, etc.) which may include but not be limited to (e.g., more, less, higher, frequent, etc.) which may include but not be limited to (e.g., recommended, shown, suggested, aligned with, moved around, bigger, seen more, suggested more, distributed to, etc.) using, which may include but not be limited to (e.g., machine learning, computing operation, humans, persons, clicking, frequency, etc.) due to potentially, which may include but not be limited to (e.g., seeing, meeting with, aligning to, suggesting, etc.), which may include but not be limited to (e.g., criteria, requirements, etc.) that may have been, which may include but not be limited to (e.g., recommended, noted, given, suggested, etc.) In some embodiments, a user interface or process may be an option. Still, it may be a way for the platform to have, which may include but not be limited to (e.g., mandatory, highly recommended requirements, more suggested requirements, alignment with goals, etc.) for, which may include but not be limited to (e.g., models, creators, persons, etc.) that want to be, which may include but not be limited to (e.g., recommended, shown, seen, viewed, etc.) which may include but not be limited to (e.g., less, more, more often, many times, etc.) In some embodiments, the user interface may have universal requirements of content or non-universal requirements. In some embodiments, unity requirements may be an option to give a, which may include but not be limited to (e.g., comparable, leveled option, leveling, easily distinguishable option or view, etc.) for the, which may include but not be limited to (e.g., content, user interface, section, screen, hologram, user interface, viewing display, item, original, user-created, platform-owned, platform, 3rd party, business, entity, etc.)

In some embodiments, unity requirements may or may not be, including but not limited to (e.g., needed, enforced, suggested, shown, computing operation-affecting, etc.) In some embodiments, unity requirements may be, which may include but not be limited to (e.g., recommended, suggested, more favored, required, etc.) In some embodiments, there may be user interface, which may include but not be limited to (e.g., user liking another user, user showing interest in another user, user viewing another users profile, live shows, live events, live streaming, pre-recorded streaming, pre-recorded shows, pre-made content, content, photos, videos, communication, chat boxes, options or areas to share information, communication, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the Bottom, top, side, anywhere, with other suggestions or profiles, or persons, or promotional material or content or information etc.) In some embodiments, there may be options to, including but not limited to (e.g., move, scroll, switch, disappear, reappear, swipe, etc.) any content or items.)

Figure 27:
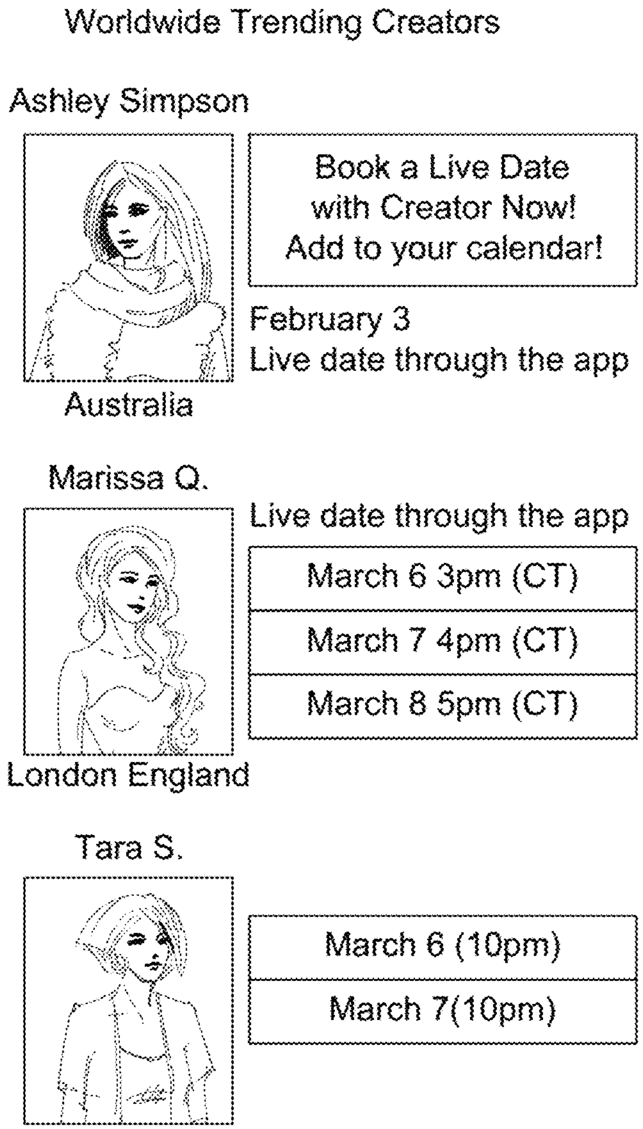

FIG. 27: In some embodiments, there may be, which may include but not be limited to (e.g., information, profile information, advertisements, suggestions to click, suggestions to book, schedule, inquire about, inquire about, inquire regarding, secure, create connection to, hold, pay for, create business relationship with, use transmittables to secure or book, schedule, inquire about, etc.) the process on how to book, schedule, inquire about, inquire about, inquire regarding, secure, create connection to, hold, pay for, create business relationship with, use transmittables to secure or book, schedule, inquire about, etc.) In some embodiments, there may be, which may include but not be limited to (e.g., pre-created, pre-determined by creator, pre-selected by platform etc.) which may include but not be limited to (e.g., persons, users, times, dates, locations, duration, check-in, check-out, time stamp, time record, time and data record, location, time and data record, coordinate(s), s, etc.) In some embodiments, there may be pre-selected date information made by, which may include but not be limited to (e.g., platform, creator, user, person, 3rd party, entities, etc.) In some embodiments, there may be options such as, which may include but not be limited to (e.g., profile photo, profile information, dummy profile information, content plus booking information, book a live date, book an in-person date, add person to calendar, add date to calendar, add time to calendar, live view now, click for live view, do requirement for live view, trending persons, trending accounts, book live time, go on a date with this person, go on an in-person date with this person, viewing date times with this person, viewing available date times, viewing date options, viewing date general time periods, viewing or learning time periods, viewing or learning general things such as 'lunch dates available, or dinner dates available or general time periods available' etc.)

In some embodiments, there may be, including but not limited to (e.g., profiles, profile photos, content, connected content or viewing, information, etc.) In some embodiments, the user interface may be the user's feed or user interface. In some embodiments, there may be, which may include but not be limited to (e.g., information, profile information, advertisements, shown days, shown times, pre-selected dates, pre-selected times, pre-selected booking times and dates, suggestions to click, suggestions to book, schedule, inquire about, inquire about, inquire regarding, secure, create connection to, hold, pay for, create business relationship with, use transmittables to secure or book, schedule, inquire about, etc.) the process on how to book, schedule, inquire about, inquire about, inquire regarding, secure, create connection to, hold, pay for, create business relationship with, use transmittables to secure or book, schedule, inquire about, etc.) options to type in what to book, schedule, inquire about, inquire about, inquire regarding, secure, create connection to, hold, pay for, create business relationship with, use transmittables to secure or book, schedule, inquire about, etc.) options to click what is already been determined or pre-selected, pre-selection may also be from platform or user or model, etc.)

In some embodiments, there may be, which may include but not be limited to (e.g., pre-created, pre-determined by the creator, pre-selected by platform, etc.), which may include but not be limited to (e.g., persons, users, times, dates, locations, duration, check-in, check-out, time stamp, time record, time and data record, location, time and data record, coordinate(s), s, etc.) In some embodiments, pre-selected date information may be made by, including but not limited to (e.g., platform, creator, user, person, 3rd party, entities, etc.) In some embodiments, the user interface may be trending, popular, or shown by computing operation. In some embodiments, the user interface may display a home screen or any screen or user interface. In some embodiments, there may be, which may include but not be limited to (e.g., shown, zoomed in, few at a time, one at a time, user interface options, etc.) that may show, which may include but not be limited to (e.g., notable creators, trending in your city, etc.) which may be combined with, which may include but not be limited to (e.g., distance, location data, etc.) In some embodiments, the user interface may be the, which may include but not be limited to (e.g., models, paid creators view, etc.) In some embodiments, the user interface may be a, which may include but not be limited to (e.g., model, creator view, etc.) in which the, which may include but not be limited to (e.g., user, model, girl, creator, paid dater, etc.) may show interest first, which may have but not be limited to (e.g., search the platform for a man to show interest in, contact a person, send a message, send a direct message, send an inquiry, show interest, show interest, etc.)

In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, photos, exclusive photos, etc.) that she may send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date or wants to go out on a date, etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, spend money, subscribe, follow, book a date with her, book date, book meeting, block off her calendar, send her flowers, send her gifts, etc.) In some embodiments, this figure may show, which may include but not be limited to (e.g., suggestions, requirements, highly recommended pictures/videos for profile, highly recommended suggestions/requirements, mandatory requirements, etc.) In some embodiments, for example, there may be, which may include but not be limited to (e.g., mandatory, highly recommended, needed, suggested, etc.) options from the platform, and the platform may specific, which may include but not be limited to (e.g., entities, persons, users, etc.) which may include but not be limited to (e.g., more, less, higher, frequent, etc.) which may include but not be limited to (e.g., recommended, shown, suggested, aligned with, moved around, bigger, seen more, suggested more, distributed to, etc.) using, which may include but not be limited to (e.g., machine learning, computing operation, humans, persons, clicking, frequency, etc.) due to potentially, which may include but not be limited to (e.g., seeing, meeting with, aligning to, suggesting, etc.), which may include but not be limited to (e.g., criteria, requirements, etc.) that may have been, which may include but not be limited to (e.g., recommended, noted, given, suggested, etc.) In some embodiments, a user interface or process may be an option. Still, it may be a way for the platform to have, which may include but not be limited to (e.g., mandatory, highly recommended requirements, more suggested requirements, alignment with goals, etc.) for, which may include but not be limited to (e.g., models, creators, persons, etc.) that want to be, which may include but not be limited to (e.g., recommended, shown, seen, viewed, etc.) which may include but not be limited to (e.g., less, more, more often, many times, etc.) In some embodiments, the user interface may have universal requirements of content or non-universal requirements. In some embodiments, unity requirements may be an option to give a, which may include but not be limited to (e.g., comparable, leveled option, leveling, easily distinguishable option or view, etc.) for the, which may include but not be limited to (e.g., content, user interface, section, screen, hologram, user interface, viewing display, item, original, user-created, platform-owned, platform, 3rd party, business, entity, etc.) In some embodiments, unity requirements may or may not be, including but not limited to (e.g., needed, enforced, suggested, shown, computing operation-affecting, etc.)

In some embodiments, unity requirements may be, which may include but not be limited to (e.g., recommended, suggested, more favored, required, etc.) In some embodiments, there may be user interface, which may include but not be limited to (e.g., user liking another user, user showing interest in another user, user viewing another users profile, live shows, live events, live streaming, pre-recorded streaming, pre-recorded shows, pre-made content, content, photos, videos, communication, chat boxes, options or areas to share information, communication, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the Bottom, top, side, anywhere, with other suggestions or profiles, or persons, or promotional material or content or information etc.) In some embodiments, there may be options to, including but not limited to (e.g., move, scroll, switch, disappear, reappear, swipe, etc.) any content or items.)

Figure 28:
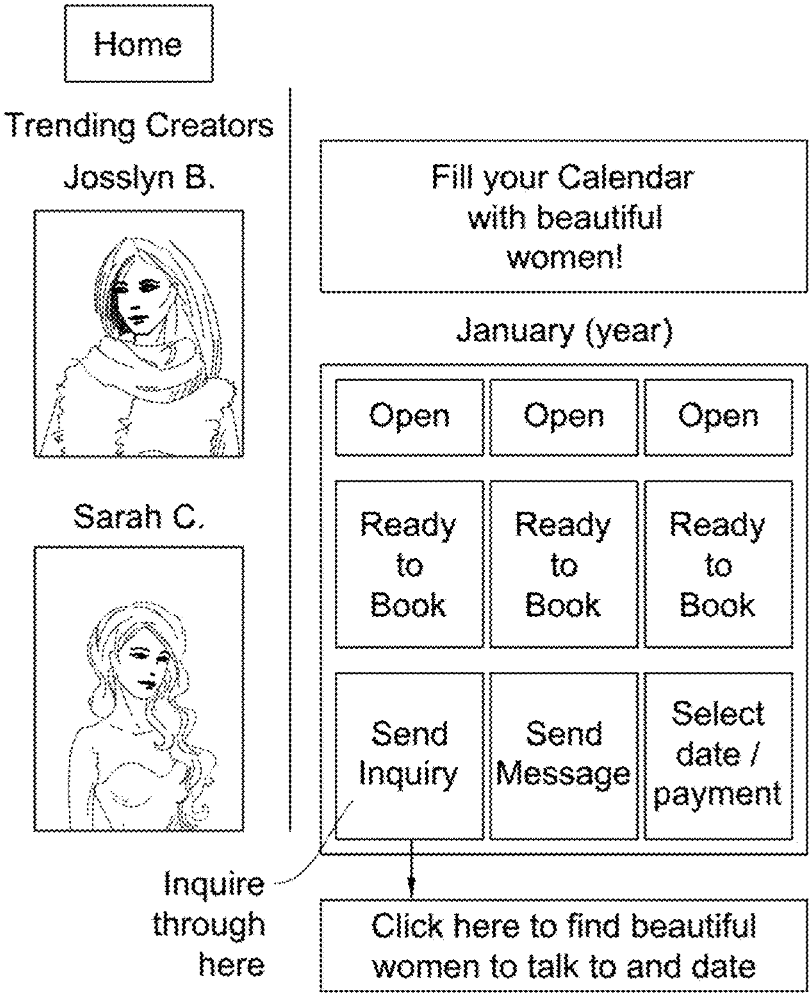

FIG. 28: In some embodiments, there may be, which may include but not be limited to (e.g., interface screen, any screen, display, hologram, user interface, viewing display, hologram, item, user interface, user interfaces that are one, two combined, two separate but combined, any combination of user interfaces, etc.) that may have, which may include but not be limited to (e.g., multiple calendars, multiple creators, creators, models, open calendars, open lists, open items for models, open ways to book, schedule, inquire about, inquire about, inquire regarding, secure, create connection to, hold, pay for, create business relationship with, use transmittables to secure or book, schedule, inquire about, etc.) available booking times, available messaging options, follow options, free options, paid options, month, day, time, current available funds, send inquiry, select date, select payment method, open availability, year availability, advertisements, marketing items, promotional content, promotional items, streaming content, streaming lives, streaming persons, users, models, feed, category rooms, category items, month, time, multiple lists of calendars, a calendar that is open, calendar that is available, a blurred calendar, a greyed calendar, a half-calendar, an obstructed calendar, an option to insert request into calendar, an option to inquire about, an option to send messages, etc.) which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.)

In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, areas, or profiles, content, hologram or display screens, etc.) to continue to look or get automated, which may include but not be limited to (e.g., looking, viewings of, movement, selection, scroll, etc.) which may include but not be limited to (e.g., content, creators, models, users, etc.)

In some embodiments, content may be, which may include but not be limited to (e.g., blurred, half-shown, partial-shown, silent, content may be fuzzy, not shown, greyed, appear fuzzy, not appear total, viewing may be obstructed, watermark over, sound watermark on sound, watermark appearing, only a few seconds shown, only some shown then stopped, stopped content, etc.) until, which may include but not be limited to (e.g., payment is made, requirements are met, follow has been made, subscriber has been created, profile has been created, payment to platform has come, payment has been made to user, exchangeable between user has been established, assets have been sent, etc.) In some embodiments, user interface may show, which may include but not be limited to (e.g., earnings, payouts, referrals, pending payments, pending requests, amounts earned, amount earned, amount, fees, net payment, gross payment, statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments, (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, which may include but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, which may include but not be limited to (e.g., automatic booking, human personalized booking, machine learning booking, 3rd party booking, outside given bookings, outside management, outside managed, etc.)

Figure 29:
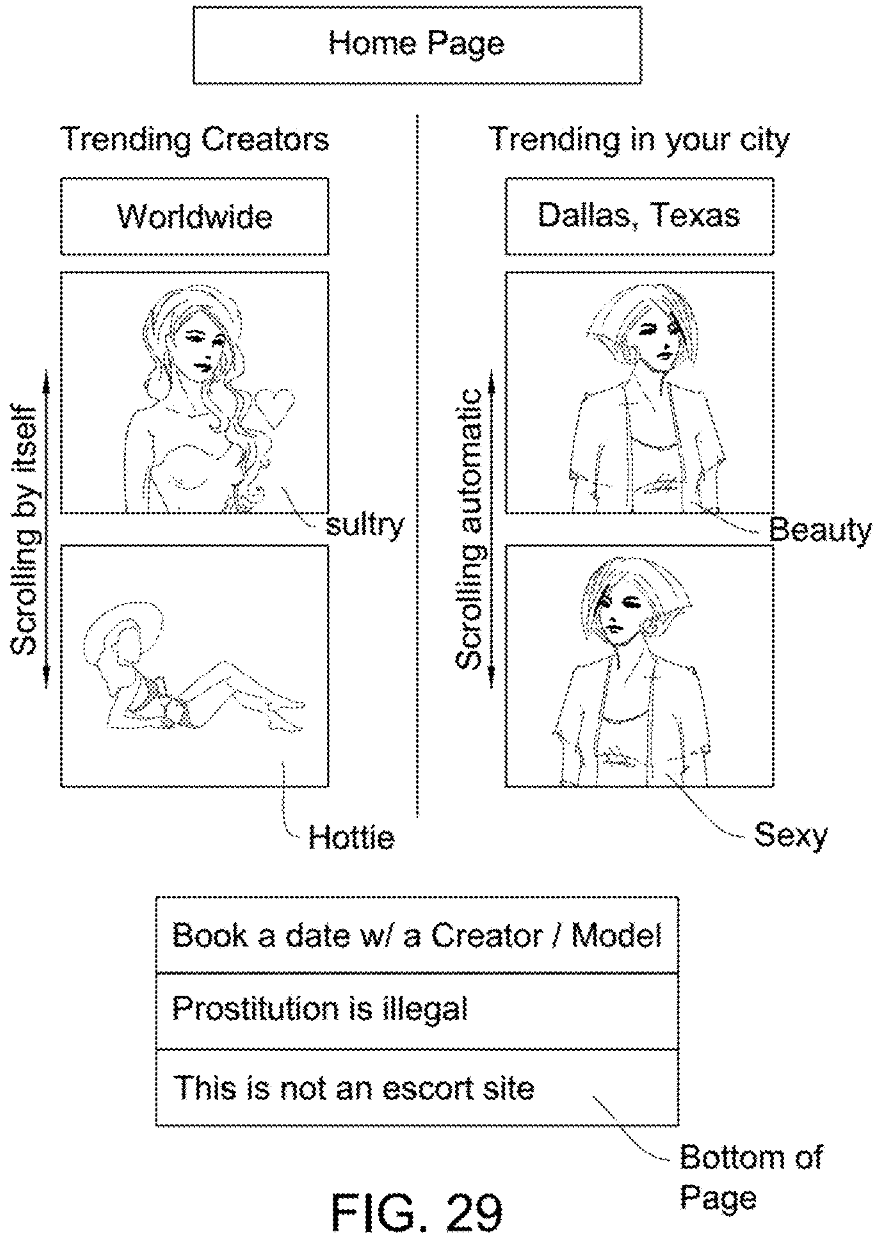

FIG. 29: In some embodiments, user interface may or may not be the, which may include but not be limited to (e.g., homepage, main page, business page, external page, hologram, screen, hologram, user interface, viewing display, user interface, etc.) that the potential, which may include but not be limited to (e.g., bidders, subscribers, fans, persons, users, public, audience, buyer, etc.) which may include but not be limited to (e.g., may see or hear or acknowledge, respond to, inquire about, etc.) upon, which may include but not be limited to (e.g., viewing platform, on any application, coming from an external link, etc.) In some embodiments, a potential, which may include but not be limited to (e.g., homepage, main page, suggested page, ads link page, application link page, first page, etc.) may contain for example (e.g., 'trending creators,' trending users, popular users, etc.) which may include but not be limited to (e.g., users or persons based on the location of the bidder, trending users, trending persons, marketing, promotional material, promotional users, trending models, trending creators, warnings, listings, laws, rules, regulations, local information, worldwide, local, state, country, trending persons, users or persons, users or persons based on Network address, IP address, users or persons based on data gathered, based on research data, etc.) which may or may not be a, which may include but not be limited to (e.g., scrolling automatic list, stationary list, this may be a list that someone may be scroll themselves, etc.) user may be able to, which may include but not be limited to (e.g., refresh the page, 'click' or select, etc.) a potential 'location' which may 'update' the, which may include but not be limited to (e.g., page, data collection, Network address, IP address, persons, advertisements, coupons, links, persons, profiles, 'lives', 'live shows' 'live streaming' get ready with me (GRWM), 'makeup videos' 'flirty videos' data collected, the scrolling options, the given options, the shown options, the list of potential 'creators, etc.) In some embodiments, there may be (e.g., warnings, notifications, legal notifications, personal laws, local ordinances, rules, terms, conditions, federal laws, etc.) at the bottom or on any screen on platform for warnings or notifications at any time for any reason.

In some embodiments, the user interface may be, which may include but not be limited to (e.g., set, changed to, viewed in, etc.) user's (e.g., location of choice, mandatory location based on information or Network address, IP address, or data collected, etc.) In some embodiments, for example, which may include but not be limited to (e.g., for example which may be including but not limited to a potential 'bidder' may be traveling to 'New York City' and wants to look at 'trending creators' in 'NYC.' In some embodiments, location may be 'gathered' by previous 'acceptance' on behalf of the 'bidder' or 'fan' and user interface may be automatically show the potential 'bidder' 'trending creators' in their location, etc.) In some embodiments, in addition to the 'trending creators' in a potential customer's location, user interface may expand the potential to 'worldwide' and may show 'creators' that are worldwide on the, which may include but not be limited to (e.g., 3rd party integration, 3rd party platform, user's platform, our platform, site, etc.) In some embodiments, users may be able to, which may include but not be limited to (e.g., book virtual, book talk, book chat, book video chat, book video meeting, book voice conversation, dates, in-person dates, travel dates, traveling scenarios, send worldwide airlines, send packages or items in other countries, taxi services, travel services, etc.) In some embodiments, worldwide options, which may include but not be limited to (e.g., worldwide dates, worldwide virtual dates, worldwide services, worldwide connections, messages worldwide, sending gifts worldwide, sending assets worldwide, etc.) may be available only to those, which may include but not be limited to (e.g., paying users, subscribers, paying members, membership options, membership persons, paying persons, etc.) In some embodiments, which may include but not be limited to (e.g., creators, models, users, etc.) may be able to, which may include but not be limited to (e.g., manually, automatically, pay to opt-in-to, allow, create the option to, etc.) which may include but not be limited to (e.g., do, allow, accept, etc.) which may include but not be limited to (e.g., worldwide options, worldwide travel, worldwide connections, etc.) In some embodiments, the platform may be integrated with a travel platform, which may include but not be limited to (hotels, airlines, cars/taxi/ride-share service, etc.) which may also allow bidders to, which may include but not be limited to (e.g., worldwide dates, fly creators for dates in locations other than where the creator lives, send gifts to other countries or locations, etc.)

In some embodiments, there may be, which may include but not be limited to (e.g., screen, hologram, user interface, viewing display, hologram, item, user interface, user interfaces that are one, two combined, two separate but combined, any combination of user interfaces, etc.) that may have, which may include but not be limited to (e.g., multiple calendars, multiple creators, creators, models, open calendars, open lists, open items for models, open ways to book, schedule, inquire about, inquire about, inquire regarding, secure, create connection to, hold, pay for, create business relationship with, use transmittables to secure or book, schedule, inquire about, etc.) available booking times, available messaging options, follow options, free options, paid options, month, day, time, current available funds, send inquiry, select date, select payment method, open availability, year availability, advertisements, marketing items, promotional content, promotional items, streaming content, streaming lives, streaming persons, users, models, feed, category rooms, category items, month, time, multiple lists of calendars, a calendar that is open, calendar that is available, a blurred calendar, a greyed calendar, a half-calendar, an obstructed calendar, an option to insert request into calendar, an option to inquire about, an option to send messages, etc.) which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.)

In some embodiments, this may be shown as a, including but not limited to (e.g., date subscription model, membership option, membership model, pre-pay model, etc.) In some embodiments, this may be potentially be a, which may include but not limited to (e.g., date subscription model, membership model pre-pay model, etc.) for, which may include but not limited to (e.g., in-person dates per month/time period, dates per time period, connection(s) per time period, etc.) that may allow dater to pay or obtain, which may include but not be limited to (e.g., for a monthly fee, for a fee, for a fee for a time duration, check-in, check-out, time stamp, time record, time and data record, location, time and data record, coordinate(s), a one-time fee, on-going fee, credit-fee, credit subscription, pre-paid subscription, a subscription price during any time period or duration, check-in, check-out, time stamp, time record, time and data record, location, time and data record, coordinate(s), which may include but not limited to (e.g., to obtain hand-picked, or hand-set, or expert-picked, or 'dates arranged by someone else with less work to the client, etc.) in exchange for a, which may include but not be limited to (e.g., set cost, monthly cost, yearly cost, or on-going fixed price or an exchange amount of dates. Which may have one option or more than one option with set prices, price ranges, general pricing, general transmittables, buy-now prices, price ranges, general pricing, general exchangeable, monthly expenses, price ranges, general pricing, general transmittables, yearly fees, price ranges, general pricing, general exchangeable, or lifetime prices, price ranges, general pricing, general transmittables, etc.)

In some embodiments, content may be, which may include but not be limited to (e.g., blurred, half-shown, partial-shown, silent, content may be fuzzy, not shown, greyed, appear fuzzy, not appear total, viewing may be obstructed, watermark over, sound watermark on sound, watermark appearing, only a few seconds shown, only some shown then stopped, stopped content, etc.) until, which may include but not be limited to (e.g., payment is made, requirements are met, follow has been made, subscriber has been created, the profile has been created, payment to the platform has come, payment has been made to the user, exchangeable between user has been established, assets have been sent, etc.) In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.)

In some embodiments, which may include but not be limited to (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

Figure 30:
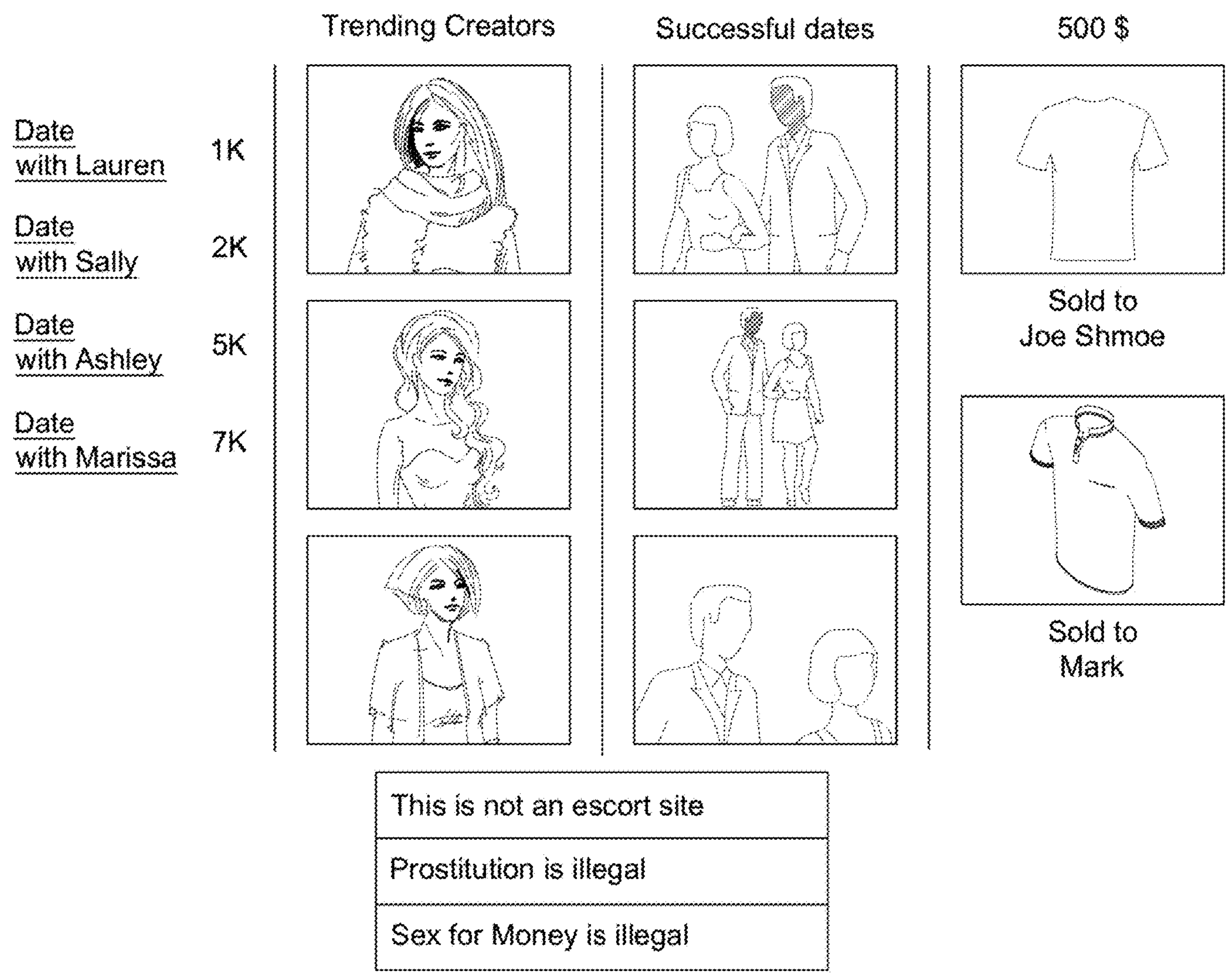

FIG. 30: In some embodiments, this may include everything in FIG. 29 or any user interface, plus or separate user interface: which may have including but not limited to the potential to have different (e.g., rows, options, categories, viewing, options to book, schedule, inquire about, inquire about, inquire regarding, secure, create connection to, hold, pay for, create business relationship with, use transmittables to secure or book, schedule, inquire about, etc.), which may include but not be limited to (e.g., options to pay, paying, exchangeable, something of value such as a contractual agreement etc.) of, which may include but not be limited to (e.g., successful dates and/or pictures to show date or demonstrate date or show date, paid for items, photos, media, reviews, videos, completed dates, finished dates, other dates, other creators, creators, models, persons, users, trending items, sent items, sold items, dates and prices, price ranges, general pricing, general transmittables, prices, price ranges, general pricing, general transmittables, users, creators, models, recently paid for 'dates,' show trending creators, recently sold items from girls, users/creators, anything from trending creators to amount of 'bid won, etc.) In some embodiments, for example, user interface may allow other things that may spark the interest of the 'bidder' such as putting, which may include but not be limited to (e.g., two bidders against each other, two bidders, more than one bidder on the platform, user interface, going head to head that may be spending the most money on bids, etc.) In some embodiments, user may have the option to, which may include but not be limited to (e.g., show, reveal their identities, show their personal information, be known only if they opt-in to be, may be automatically chosen to, etc.) which may include but not be limited to (e.g., public approved accounts that want to show off their money spent, name shown, non-anonymous spending, non-anonymous spenders, etc.) In some embodiments, user interface may show options of, which may include but not be limited to (e.g., possible of girls, users, or women/or creators that the guest may be subscribe to, options, profile options, person options, category options, etc.) which may include, which may include but not be limited to (e.g., unlocked, locked content, user content, platform content, etc.) user interface may show, which may include but not be limited to (e.g., trending creators, or platform creators, or selection of the week, any platform selected, voted on selection, or computing operation mixed up selection, or pushing pages that have subscribers or are making at least minimum amount of money, etc.) In some embodiments, user interface may, which may include but not be limited to (e.g., offer up dates, show dates, connections, times, timing data, show availability, show options to purchase, etc.) In some embodiments, user interface may show, which may include but not be limited to (e.g., there may be options to view purchases other users have made, there may be options to see past purchases or stores or old purchases or other purchases that have been made, there may be lists of items that have been sold showing on interface(s), there may be store items or items for sell on stores or on a list, etc.)

In some embodiments, the user interface may show, which may include but not be limited to (e.g., calendars, the calendar integration, 3rd party calendar connection, 3rd party calendar integration, users calendars, models calendars, subscribers calendars, the option to build a calendar, build your calendar, build users calendar from nothing, build a new user's calendar, etc.) In some embodiments, the user interface may, may include but not be limited to (e.g., show, offer, have the option to, etc.), which may include but not be limited to (e.g., download,' create, make, integrate, connect, etc.) calendar. In some embodiments, which may include but not be limited to (e.g., calendar, the calendar integration, 3rd party integration, etc.) may allow an, which may include but not be limited to (e.g., inserting, connecting, collaborating with, build from nothing, create new, etc.) the calendar integration specifically for this platform to, which may include but not be limited to (e.g., design, make, integrate, book, schedule, inquire about, secure, pay for, etc.) the, which may include but not be limited to (e.g., connections, dates, virtual, in-persons, messages, connection created, etc.)

In some embodiments, (e.g., calendar, timing method, schedule method, scheduling method, timing data center, etc.) may be created, which may include but not be limited to (e.g., automatically, manually, by AI, by machine learning, without the user knowing, etc.) which may include but not be limited to (e.g., if they win the bid, if payment is made, if a booking has occurred, if payment has been secured, if a connection has been created if a date has been confirmed or made, etc.) In some embodiments, 'group dates' may give a, which may include but not be limited to (e.g., paying user, or a user that is exchanging something of value or assets) in exchange for multiple users to: (e.g., make a connection, book or date, etc.) In some embodiments, there may be a 'party option' or an option such as 'book multiple users.' In some embodiments, multiple users may be defined but not limited to as (e.g., 'more than one user at a time, various users, two or more, one or more, groups, staggered groups, different activities, different days, different times, etc.) In some embodiments, 'group dates' or 'group users' may be booked through the platform and all paid, which may include but not be limited to (e.g., separately, together, staggered, spread out, installments, credit, funds, assets, etc.) may be depending on if they meet the contractual 'minimal agreements,' or agreements, which may include but not be limited to (e.g., 'showing up, staying for the duration, check-in, check-out, time stamp, time record, time and data record, location, time and data record, coordinate(s), etc.) In some embodiments, a group date may be booked altogether, and some users may not meet the entirety of the 'agreement but mostly, generally, or overall meet the agreement, such as, which may include but not be limited to ('one person left early, or one person got sick, etc.) Some embodiments may include but are not limited to ('double, triple, or group dates, staggered, same day, different day, different settings, different locations, traveling, etc.') and may be booked together or booked separately. In some embodiments, there may be discounts for booking groups; there may not be discounts.

In some embodiments, the user may be able to choose to accept a, which may include but not be limited to (e.g., 'booked person, paid person,' etc.) to bring their friend or bring a 'plus one' or 'bring a family member, or bring a roommate, or bring a friend, or bring another person' etc.) In some embodiments, users may not be able to deny a user to bring a safety person due to any circumstances such as, which may include but not be limited to (e.g., may not know of a safety person, may disapprove, may not want that person to have safety persons near, wanting to get a person alone, or may be able to deny the request a safety person, or may not be able to refuse if someone else is there, etc.) In some embodiments, a 'bidder, which may include but not be limited to (e.g., a bidder may be defined as any person that is paying for a service or a connection or a date, or anything, etc.) may choose to pick a, which may include but not be limited to (e.g., 'group date,' added model date, more than one user date, etc.) which may include 'model,' which may include but not be limited to (e.g., plus one or more or more 'creators' 'models,' etc.) to accompany the, which may include but not be limited to (e.g., 'bidder' 'fan' or 'date buyer' etc.) to the entertainment option which may include but not limited to (e.g., dinner, lunch, coffee, pre-approved date choice, virtual, game, show, live, event, meeting, etc.)

In some embodiments, which may include but not be limited to (e.g., pre-chosen and/or listed may be closed, etc.) In some embodiments, which may include but not be limited to (e.g., 'creators, persons, users, models, etc.) may have, which may include but not be limited to (e.g., 'pre-picked' suggestions, pre-approved, pre-selected, platform approved, platform suggested, etc.) for their own, which may include but not be limited to (e.g., friend, other model, other creator, other user etc.), which may include but not be limited to (e.g., persons, chosen persons, appointed person, 3rd party chosen persons, creator chosen person, etc.) that are also potentially on the platform or anywhere, which may include but not be limited to (e.g., of the platform or a 3rd party, etc.) that may appear on, which may include but not be limited to (e.g., their profile, information packet, information suggestion on the platform, on any advertisements, etc.) In some embodiments, 'pre-picked,' which may include but not be limited to (e.g., friend, other model, other creator, other user etc.) may be chosen to, which may include but not be limited to (e.g., appear on their profile or chosen to be hidden, or be chosen to be shared, etc.) with only specific, or a specific, or any, which may include but not be limited to (e.g., 'bidders' 'potential bidders' 'fans' or a part of the 'subscription unlocks' etc.) which may then show who the, which may include but not be limited to (e.g., 'creator/model' person, user, etc.) has available as suggestions for their, which may include but not be limited to (e.g., friend, other model, other creator, other user etc.) to potentially add to the potential, which may include but not be limited to (e.g., connection, 'date' etc.) chosen by, which may include but not be limited to (e.g., 'bidder.' Or user, model, or person, etc.) may be choose to not allow or allow, which may include but not be limited to ('dates' connections, lives, working with, etc.) with any other, which may include but not be limited to (e.g., friend, other model, other creator, other user etc.) which may include but not be limited to (e.g., users, person, on the platform, user interface, or platform etc.) which may include but not be limited to (e.g., friend, other model, other creator, other user etc.) meaning, which may include but not be limited to (e.g., 'other creators or models' or persons, or users, etc.) which may include but not be limited to (e.g., on or off of the platform, user interface, or platform, etc.) In some embodiments, model may be choose to only allow, which may include but not be limited to (e.g., 'group' dates, or added dates, or other dates, or connections with, etc.) with these persons, or be open to 'other, which may include but not be limited to (e.g., friend, other model, other creator, other user etc.) On the platform, user interface, etc.) In some embodiments, 'other, which may include but not be limited to (e.g., friend, other model, other creator, other user etc.) may mean other women/persons/creators on the, which may include but not be limited to (e.g., site, platform, or others, user, etc.) that the 'creator' may, which may include but not be limited to (e.g., not know personally or knows personally, or wants to use for business or personal purposes, etc.)

In some embodiments, this may be shown as a, which may include but not be limited to (e.g., date subscription model, membership option, membership model, pre-pay model, etc.) In some embodiments, this may be potentially be a, which may include but not limited to (e.g., date subscription model, membership model pre-pay model, etc.) for, which may include but not limited to (e.g., in-person dates per month/time period, dates per time period, connection(s) per time period, etc.) that may allow dater to pay or obtain, which may include but not be limited to (e.g., for a monthly fee, for a fee, for a price for a time duration, check-in, check-out, time stamp, time record, time and data record, location, time and data record, coordinate(s), a one-time fee, on-going fee, credit-fee, credit subscription, pre-paid subscription, a subscription price during any time period or duration, check-in, check-out, time stamp, time record, time and data record, location, time and data record, coordinate(s), which may include but not limited to (e.g., to obtain hand-picked, or hand-set, or expert-picked, or "dates arranged by someone else with less work to the client, etc.) in exchange for a, which may include but not be limited to (e.g., set cost, monthly cost, yearly cost, or on-going fixed price or an exchange amount of dates. Which may have one option or more than one option with set prices, price ranges, general pricing, general transmittables, buy-now prices, price ranges, general pricing, general transmittables, monthly fees, price ranges, general pricing, general transmittables, yearly prices, price ranges, general pricing, general transmittables, or lifetime prices, price ranges, general pricing, general transmittables, etc.)

In some embodiments, "platform, users, which may include but not be limited to (referred to as 'creators') have the option to suggest other users, which may include but not be limited to (referred to as (e.g., friend, another model, another creator, another user, etc.) to appear on their profile, advertisement materials, and information packets. In some embodiments, which may include but not be limited to, which may include but not be limited to (e.g., 'pre-picked, or self-picked, or chosen'), which may include but not be limited to (e.g., friend, another model, another creator, another user, etc.) may be, which may include but not be limited to (e.g., made visible or hidden to certain audiences, etc.) such as, which may include but not be limited to (e.g., 'bidders,' 'potential bidders,' or 'fans' etc.) In some embodiments, the option to view a creator's suggested, which may include but not be limited to (e.g., friend, another model, another creator, another user, etc.), may also be unlocked through a which may include but not be limited to (e.g., subscription, payment, agreement, time, location, membership, subscription, follow, any agreement made, any understood agreement, etc.) In some embodiments, creators have the choice to allow or disallow dates with their suggested, which may include but not be limited to (e.g., friend, another model, another creator, another user, etc.) or to, which may include but not be limited to (e.g., only allow group dates, allow specific types of dates, certain types of connections, etc.) In some embodiments, users may also choose to be, which may include but not be limited to (e.g., open to dates with other users, any dates, available to dates, open to continuing, open to be added, etc.) on the, which may include but not be limited to (e.g., platform, user interface, etc.) who they, which may include but not be limited to (e.g., do not personally know, personally know, etc.)

In some embodiments, there may be an option for, which may include but not be limited to (e.g., there may be an option for, which may include but not be limited to (e.g., open-for-friend-model-creator-group-dates, or open for others to join dates, or open for adding on dates, or available for others to add on dates, or open to party dates, or open to group dates, or open for others to join dates, or open for adding on dates, or open for others to add on dates, or open to party dates, or open to group dates, etc.) In some embodiments, which may include but not be limited to (e.g., 'bidder' or 'high-value dater, user, person, the person paying, etc.) may choose, which may include but not be limited to (e.g., any group of women, any persons, any models, any users, any humans, etc.) to go on a, which may include but not be limited to (e.g., date, connection, time, etc.) with as a, which may include but not be limited to (e.g., 'package deal' or multiple users, or multiple creators, or multiple models, etc.) In some embodiments, the, which may include but not be limited to (e.g., 'creators' or 'models,' etc.) have to all each individually, which may include but not be limited to (e.g., 'agree,' accept, want, approve, etc.) on their, which may include but not be limited to (e.g., interface, profile/settings/etc.) with the, which may include but not be limited to (e.g., platform, 3rd party, settings, persons, users, etc.) that the 'model' is, which may include but not be limited to (e.g., 'available,' open, willing, confirming, wanting, open to, etc.) a, which may include but not be limited to (e.g., 'open group dates with other, additional group dates, dates with others, connections with other users, models, persons, etc.) which may include but not be limited to (e.g., friend, another model, another creator, another user, etc.) On the platform, user interface, etc.) which may include but not be limited to (e.g., 'open for model-group dates' or open for multiple users, open for multiple group dates, etc.) may suggest, which may include but not be limited to (e.g., humans, users, persons, 3rd party, artificial intelligence or other means in the area of suggestion, etc.) for 'group dates' next to her, which may include but not be limited to (e.g., picture, pictures of other 'potential group date options, profile, suggestions, etc.) In some embodiments, options may be chosen by, including but not limited to (e.g., computing operation, user, artificial intelligence, etc.) to suggest potential 'group packages' to the potential 'bidder, fan, subscriber, etc.) In some embodiments, high-value dater (high-value dater may be defined as any person spending money or using a platform) In some embodiments, a 'paying person' may have the option to choose any group of users to go on a date/connection with as a package/or grouped deal paid for separately or at one time or paid each or paid together. In some embodiments, the 'models, which may include but not be limited to (which may be defined as any person being paid, or any user, or any creator), may have the option to agree to participate in open group dates with other women on the platform, user interface, In some embodiments, Artificial intelligence may suggest potential group date options and package options to you. In some embodiments, suggestions may be based on, including but not limited to (e.g., computing operations, artificial intelligence, user preferences, user feedback, etc.)

Closed-model-group-dates only: In some embodiments, If the 'creator' may not want to go on 'model-group dates with others, which may include but not be limited to (e.g., women/person users, etc.) which may include but not be limited to (e.g., on, off, separate from, including, adding on to, from a 3rd party, etc.) the, which may include but not be limited to (e.g., platform, user interface, etc.) that the model may not, which may include but not be limited to (e.g., 'know, approve of, accept, want, agree to, etc.) In some embodiments, which may include but not be limited to (she, her, girl, female, woman, user, creator, etc.) may be defined as, which may include but not be limited to (e.g., any person on the platform or any person being paid, any user, paid user, creator, etc.,). In some embodiments, the creator may choose to, which may include but not be limited to (e.g., opt out of, opt-in to, agree to, agree not to, etc.) that and potentially choose to, which may include but not be limited to (e.g., only opt-in, or change options, or agree, etc.) to, which may include but not be limited to (e.g., 'closed-model-group-dates only, or closed group dates, or pre-approved dates only, or closed dates only, or closed dates, or pre-determined or pre-approved dates, etc.) In some embodiments, which would then show on her profile that the user or she only goes on group dates with a choice of 'one or more' of the 'known, which may include but not be limited to (e.g., friend, another model, another creator, another user, etc.) listed on her profile/settings/platform information. In some embodiments, this may create a 'package deal' and the 'bidder' may have to pay a 'premium,' which may include but not be limited to (e.g., an additional fee, or a larger sum, or more money, or more distribution of money etc.) to be able to opt-in or have the option to, which may include but not be limited to (e.g., book, schedule, inquire about, inquire about, inquire regarding, secure, create connection to, hold, pay for, create business relationship with, use transmittables to secure or book, schedule, inquire about, etc.) multiple women, which may include but not be limited to (women may be defined as any person on platform, or any paid person) at a time. In some embodiments, the 'creator, which may include but not be limited to (e.g., the creator may be defined as any person being paid, etc.) may be getting paid, which may include but not be limited to (e.g., 'more or additional, or extra, or additional fee, etc.) for group dates that may be open to/or there may be an option for, which may include but not be limited to (e.g., open-for-friend-model-creator-group-dates, or open for others to join dates, or open for adding on dates, or open for others to add on dates, or open to party dates, or open to group dates, etc.) In some embodiments, the second highest paid may be, which may include but not be limited to (e.g., closed-bestie, etc.')

In some embodiments, there may be an option for, which may include but not be limited to (e.g., open-for-friend-model-creator-group-dates, or open for others to join dates, or open for adding on dates, or open for others to add on dates, or open to party dates, or open to group dates, etc.) In some embodiments, which may include but not be limited to (e.g., 'bidder' or 'paying person etc.) may be choose any, which may include but not be limited to (e.g., group of women, group, categories, selection, group-selection, etc.) to go on a, which may include but not be limited to (e.g., date, connection, party, event, etc.) with as a, which may include but not be limited to (e.g., 'package deal,' or one time check out or one time pay, or separate pay for one event, or separate pay for different events or booking etc.) In some embodiments, the, which may include but not be limited to (e.g., 'creators' or 'models' etc.) may have to all each individually, which may include but not be limited to (e.g., agree, confirm, accept, opt-in etc.) on their, which may include but not be limited to (e.g., profile/settings/notifications, message, contact etc.) with the platform that the 'model' is, which may include but not be limited to (e.g., 'available,' accepting, wanting, confirming, opting in, etc.) for, which may include but not be limited to (e.g., 'open group dates, to be added to another date, to be accepted with other persons, to be added to a connection meeting for any time period, etc.) with other, which may include but not be limited to (e.g., friend, other model, other creator, other user etc.) on the, which may include but not be limited to (e.g., platform, user interface, etc.) In some embodiments, 'open for model-group dates' may, which may include but not be limited to (e.g., suggest or be suggested or be added, or be confirmed or paid for, etc.) with, which may include but not be limited to (e.g., artificial intelligence or other means in the area of suggestion, human, 3rd parties, advertisers, advertisements, businesses, persons, users, bidders, other groups, entities, etc.) for 'group dates' next to her picture, pictures of other 'potential group date options.' In some embodiments, options may be chosen by, which may include but not be limited to (e.g., computing operation and on artificial intelligence, humans, 3rd parties, advertisers, advertisements, businesses, entities, etc.) to potentially suggest potential, which may include but not be limited to (e.g., 'group packages, group suggestions, more than one model, types of dates, types of categories, etc.) to the potential, which may include but not be limited to (e.g., 'bidder' 'fan' 'high-value dater etc.) In some embodiments, which may include but not be limited to (e.g., 'high value dater' etc.) may be defined as any person spending money or using platform.

Figure 31:
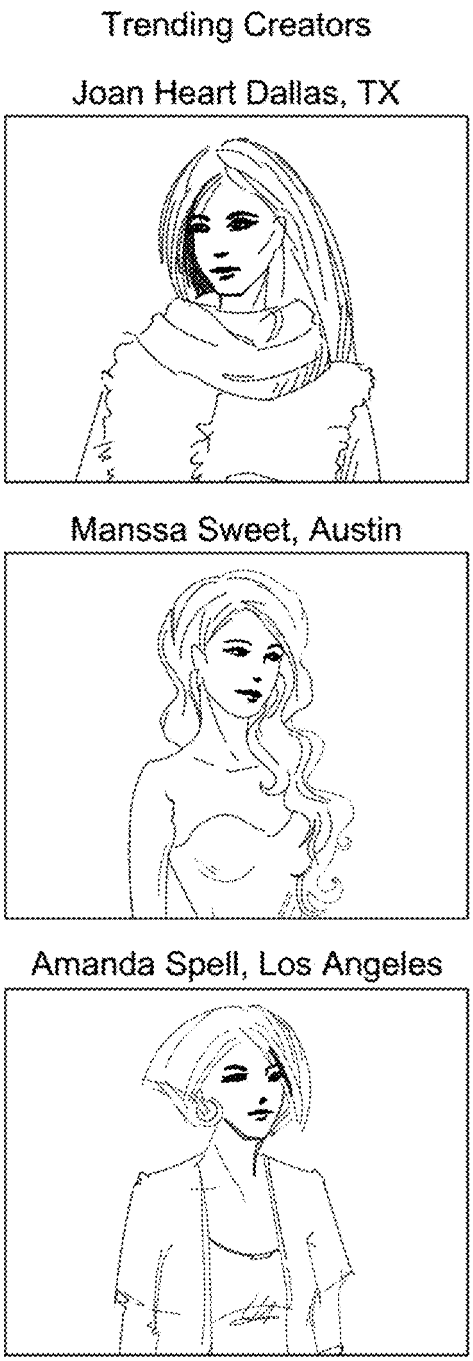

FIG. 31: may be a closer version of FIG. 29, FIG. 30, FIG. 28, or an alternate version of FIG. 29 or any user interface(s) that may be (e.g., 'displaying' or 'marketing' or 'showing' or 'listing' etc.) the 'creators' or 'models' on the platform.

Figure 32:
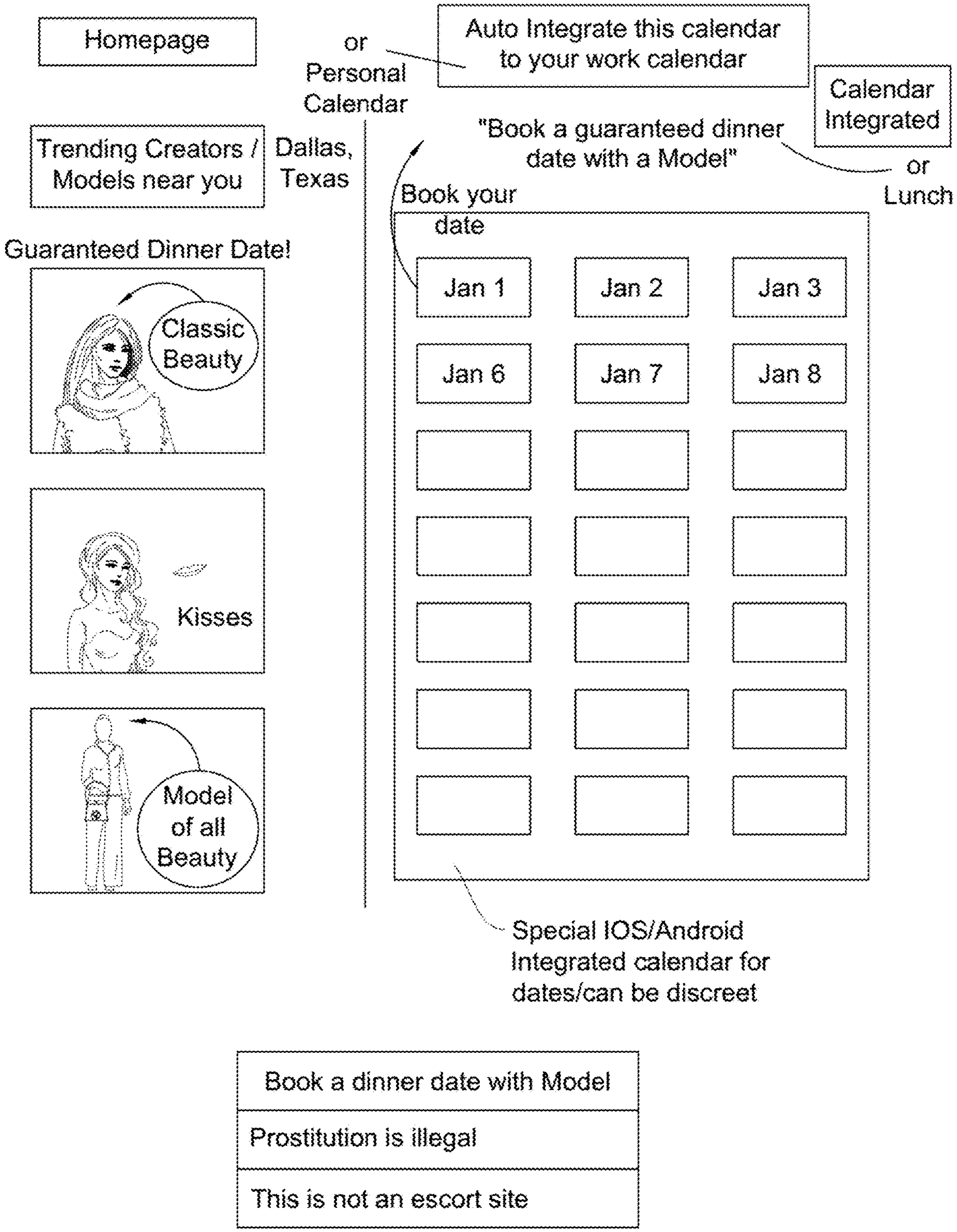

FIG. 32: In some embodiments, the user interface may show a possible homepage for potential: (e.g., public view, private view, membership only, bidders, fans, customers, etc.) when they first arrive or arrive on the platform/site. FIG. 32 shows that the left side or the right side of the platform or page may show (e.g., popular users, users, suggested users, 'trending creators' or 'trending models', etc.) (e.g., 'near you or similar or based on AI-generated preferences of each user, general preferences, popularity, same city, same travel schedule, etc.) furthermore that the (e.g., user, 'bidder' or 'fan' etc.) may be able to book an (e.g., almost guaranteed date, date, scheduling, message, calendar, etc.) through the platform and directly (e.g., get a date booked and/or integrated on the calendar, schedule coordination, messaging, planning, dates, times, romantic date scheduling, business date scheduling, etc.). In some embodiments, each user's specified calendar may be (e.g., shown on the page and followed down on the page with scrolling, or it may indicate at the top or the bottom or side that there may be a screen that is separate that can be shown or integrated onto the main screen that may show the live calendar of the user and other users with live updates, etc.) In some embodiments, the (e.g., side such as right or left side, etc.) may show the intellectual property integrated calendar specialty to this platform that may indicate the (e.g., mode type such as 'discreet mode' or 'regular mode' or membership only mode, or paying customer mode, or verified customer mode, or verified user mode, etc.) (e.g., integration calendar specialty or outside integrated calendar, or any calendar, or calendar made on site, etc.) to the site/platform. In some embodiments, there may be a way to directly book or view other users' calendars on the main page or any page or screen while browsing, scrolling, viewing, or discovering through categories, suggestions, or any screen on the platform.

In some embodiments, user interface may show a, which may include but not be limited to (e.g., blank calendar, a set calendar, pre-determined calendar, a set calendar, a shown calendar, a user's calendar, the platform's calendar, trending creators, trending persons, feed, shown users, etc.) In some embodiments, user interface may or may not be the, which may include but not be limited to (e.g., homepage, main page, business page, external page, hologram, screen, hologram, user interface, viewing display, user interface, etc.) that the potential, which may include but not be limited to (e.g., bidder, subscriber, fans, persons, users, public, audience, buyers, etc.) which may include but not be limited to (e.g., may see or hear or acknowledge, etc.) upon, which may include but not be limited to (e.g., viewing platform, on any application, coming from an external link, etc.) In some embodiments, a potential, which may include but not be limited to (e.g., homepage, main page, suggested page, ads link page, application link page, first page, etc.) may contain 'trending creator,' which may include but not be limited to (e.g., users or persons based on the location of the bidder, trending users, trending persons, marketing, promotional material, promotional users, trending models, trending creators, warnings, listings, laws, rules, regulations, local information, worldwide, local, state, country, trending persons, users or persons, users or persons based on Network address, IP address, users or persons based on data gathered, based on research data, etc.) which may or may not be a, which may include but not be limited to (e.g., scrolling automatic list, stationary list, this may be a list that someone may be scroll themselves, etc.) user may be able to, which may include but not be limited to (e.g., refresh the page, 'click' or select, etc.) a potential 'location' which may 'update' the, which may include but not be limited to (e.g., page, data collection, Network address, IP address, data collected, the scrolling options, the given options, the shown options, the list of potential 'creators, etc.)

In some embodiments, the user interface may show, which may include but not be limited to (e.g., earnings, payouts, referrals, pending payments, pending requests, amounts earned, the amount earned, amount, fees, net payment, gross payment, statement, earnings, profile, statements, taxes, 3rd parties for taxes, 3rd parties, advertisers, advertisements, businesses, outside entities, outside parties, messages, queue, home, profile, messages, earnings from messages, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

In some embodiments, there may be, which may include but not be limited to (e.g., screen, hologram, user interface, viewing display, hologram, item, user interface, user interfaces that are one, two combined, two separate but combined, any combination of user interfaces, etc.) that may have, which may include but not be limited to (e.g., multiple calendars, multiple creators, creators, models, open calendars, open lists, open items for models, open ways to book, schedule, inquire about, inquire about, inquire regarding, secure, create connection to, hold, pay for, create business relationship with, use transmittables to secure or book, schedule, inquire about, etc.) available booking times, available messaging options, follow options, free options, paid options, month, day, time, current available funds, send inquiry, select date, select payment method, open availability, year availability, advertisements, marketing items, promotional content, promotional items, streaming content, streaming lives, streaming persons, users, models, feed, category rooms, category items, month, time, multiple lists of calendars, a calendar that is open, calendar that is available, a blurred calendar, a greyed calendar, a half-calendar, an obstructed calendar, an option to insert request into calendar, an option to inquire about, an option to send messages, etc.) which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.) In some embodiments, the user interface may be, which may include but not be limited to (e.g., set, changed to, viewed in, etc.) user's (e.g., location of choice, mandatory location based on information or Network address, IP address, or data collected, etc.) In some embodiments, for example, which may include but not be limited to (e.g., for example which may be including but not limited to a potential 'bidder' may be traveling to 'New York City' and wants to look at 'trending creators' in 'NYC.' In some embodiments, location may be 'gathered' by previous 'acceptance' on behalf of the 'bidder' or 'fan' and user interface may be automatically show the potential 'bidders' 'trending creators' in their location, etc.)

In some embodiments, in addition to the 'trending creators' in a potential customer's location, the user interface may expand the potential to 'worldwide' and may show 'creators' that are worldwide on the, which may include but not be limited to (e.g., 3rd party integration, 3rd party platform, user's platform, our platform, site, etc.) In some embodiments, users may be able to, which may include but not be limited to (e.g., book virtual, book talk, book chat, book video chat, book video meeting, book voice conversation, dates, in-person dates, travel dates, traveling scenarios, send worldwide airfare, send packages or items in other countries, taxi services, travel services, etc.)

In some embodiments, worldwide options, which may include but not be limited to (e.g., worldwide dates, worldwide virtual dates, worldwide services, worldwide connections, messages worldwide, sending gifts worldwide, sending assets worldwide, etc.) may be available only to those, which may include but not be limited to (e.g., paying users, subscribers, paying members, membership options, membership persons, paying persons, etc.) In some embodiments, which may include but not be limited to (e.g., creators, models, users, etc.) may be able to, which may include but not be limited to (e.g., manually, automatically, pay to opt-in-to, allow, create the option to, etc.) which may include but not be limited to (e.g., do, allow, accept, etc.) which may include but not be limited to (e.g., worldwide options, worldwide travel, worldwide connections, etc.) In some embodiments, the platform may be integrated with a travel platform, which may include but not be limited to (hotels, airlines, cars/taxi/ride-share service, etc.) which may also allow bidders to, which may include but not be limited to (e.g., worldwide dates, fly creators for dates in locations other than where the creator lives, send gifts to other countries or locations, etc.) In some embodiments, there may be, which may include but not be limited to (e.g., screen, hologram, user interface, viewing display, hologram, item, user interface, user interfaces that are one, two combined, two separate but combined, any combination of user interfaces, etc.) that may have, which may include but not be limited to (e.g., multiple calendars, multiple creators, creators, models, open calendars, open lists, open items for models, open ways to book, schedule, inquire about, inquire about, inquire regarding, secure, create connection to, hold, pay for, create business relationship with, use transmittables to secure or book, schedule, inquire about, etc.) available booking times, available messaging options, follow options, free options, paid options, month, day, time, current available funds, send inquiry, select date, select payment method, open availability, year availability, advertisements, marketing items, promotional content, promotional items, streaming content, streaming lives, streaming persons, users, models, feed, category rooms, category items, month, time, multiple lists of calendars, a calendar that is open, calendar that is available, a blurred calendar, a greyed calendar, a half-calendar, an obstructed calendar, an option to insert request into calendar, an option to inquire about, an option to send messages, etc.) which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.)

In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

Figure 33:
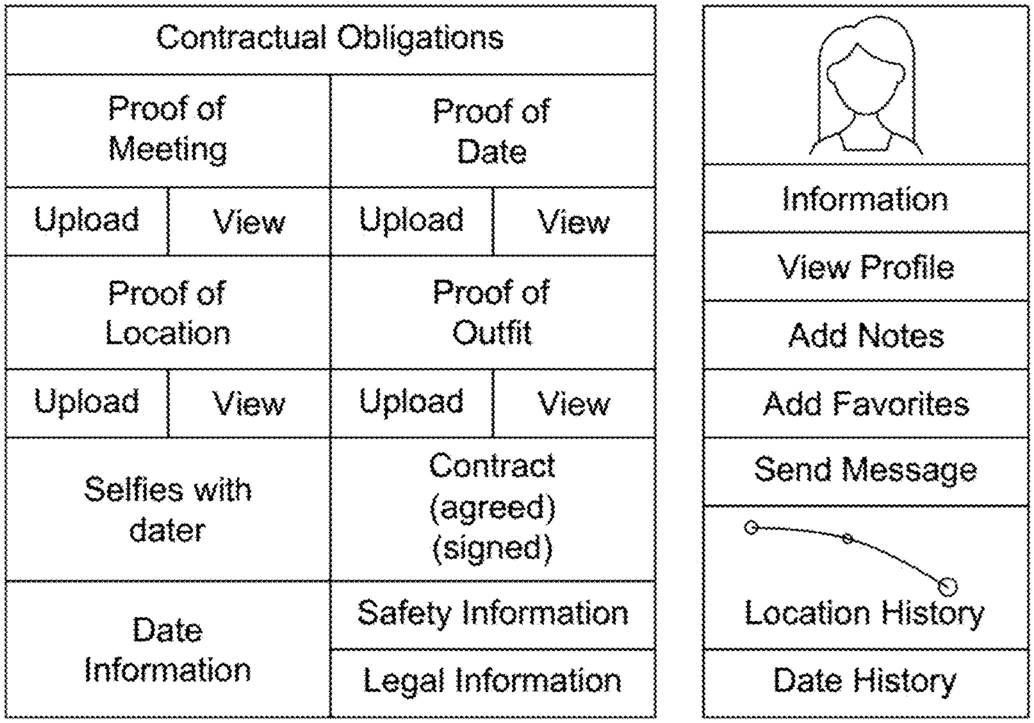
Figure 37:
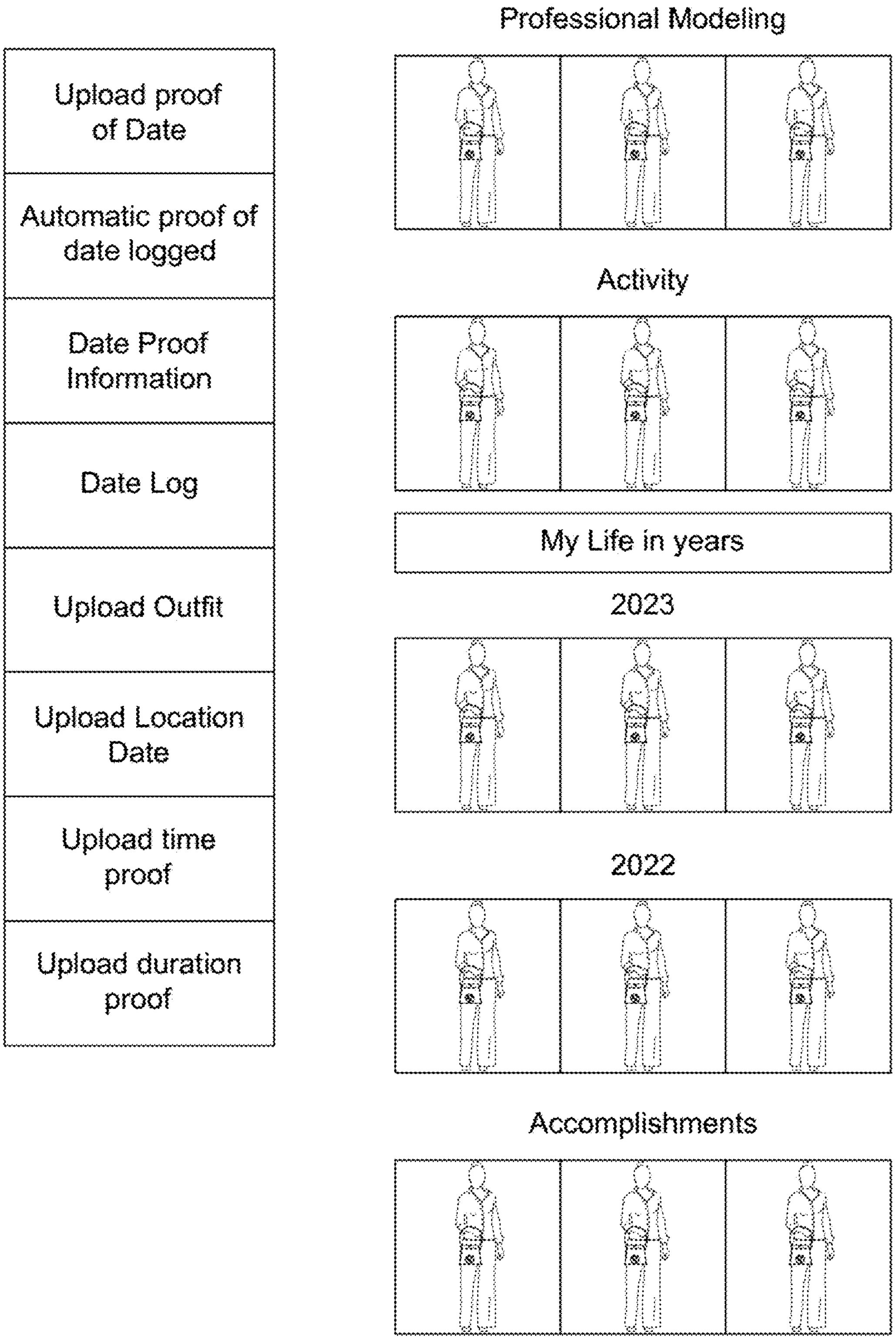

FIG. 33, FIG. 37: In some embodiments, date log, management area, which may include but not be limited to (which may be defined or understood as a case log or recording of interaction situation, may include but is not limited to data recording, automatic recording, virtual recording, data collection, Network address, IP address, uploading proof of date, photo video and voice proof or evidence of the contractual obligations of the date, etc.) In some embodiments, date log, management area may ask to: (e.g., upload proof of duration, check-in, check-out, time stamp, time record, time and data record, location, time and data record, coordinate(s), upload time proof, upload photos of the date, upload outfit for a date, upload trip, upload proof, upload content regarding the date, etc.) In some embodiments, the user interface may show, which may include but not be limited to (e.g., upload options, content upload options, proof options, proof to upload, outside proof, proof agreement was made, optional proof agreement was made, contract type, contract agreement, contract terms, conditions, both signed parties, signed agreement, tech proof, 3rd party proof, referral proof, persons to explain, explanations, uploading documentation, upload options with or without minimum upload item requirement, explaining buttons and explainers, user interface may show the number of the date or the tracker number of the date or "case log" user interface may show "date log, management area," or explaining what the page is. In some embodiments, the page, screen, hologram, user interface, viewing display, or data may change or show different ways of explaining what is said here, etc.) The figure may show or indicate the date, which may include but not be limited to (case log) with, which may include but not be limited to (e.g., approved, decided, approved for, paid client, person that has paid or donated or accepted, etc.)

FIG. 37 may show 'my life in years' which may show activities and pictures or videos or media or writing or situations through the years in any organizational style or random style or random media or information such as (e.g., 'blocks of visuals and writings' lined up on top of one another, blocks or areas or media of videos or pictures combined with information or by itself, flipbook but digital, a digital flipbook or a digital book, etc.) in the form of (e.g., quotes, writing, visuals, stories, media, entries, visuals, media from others such as a reference video, books recommended, quotations, current books reading, current life-goals, current trajectory or goals riding on each day or for period in person or user's life, top friends, groups of friends, friend groups, reference friends, reference groups, associated friends, similar people searched for, other users in same age group, drawings, arts, years, months, days, periods, sections, annually, etc.) that may show similar to a (e.g., 'diary' or a 'storybook' or a 'scrapbook' or a digital version of these diaries entries, etc.) In some embodiments, the 'storybook or scrapbook' or visual book or flipbook or organizational style of media by period or time in someone's life may allow any random organization or change by a person, whether visually or organizational style such as (e.g., 'by years, by months, by days, by periods, before having kids and after having kids, before graduating high school and after graduating high school, before my 'glow up' and after my glow up, etc.)

In some embodiments to, which may include but not be limited to (e.g., get paid, etc.), the model/creator/person using the platform may be required to complete the duties, which may include but not be limited to (e.g., listed, understood, obligated, oral contract, contractual, etc.) in the agreement for the, which may include but not be limited to (e.g., connection, date, meeting, discussion, etc.) In some embodiments, for example, if the date says, which may include but not be limited to (e.g., paying for 2 hours of date time between A and B on this date, this restaurant, at this time, for the entire duration, check-in, check-out, time stamp, time record, time and data record, location, time and data record, coordinate(s), of time, etc.) the date log, management area, may require, which may include but not be limited to (e.g., proof, general proof, data recorded, data collection, Network address, IP address, evidence, etc.) of potential contractual obligations with proof to get funds, which may include but not be limited to (e.g., accepted, dispersed, transferred, etc.) to mode/creator/users account. Some embodiments, including but not limited to (e.g. unlimited photos, voice, videos, content, etc.), may be uploaded per point of agreement for proof. In some embodiments, once the, which may include but not be limited to (e.g., minimum items, required items, etc.) are uploaded per the entire agreement, the user interface may unlock the, which may include but not be limited to (e.g., button or item, or option, etc.) that may allow "pending approval or pending data observation for funds disbursement." In some embodiments, this may go to a, which may include but not be limited to (e.g., person, machine, AI, point system, computer, etc.) that may review content and ensures there are no 'resolutions' to be 'resolved' before non-refundable funds disbursement. In some embodiments, this center may show the process, which may include but not be limited to (e.g., where it is at before 'getting paid,' process, type in process, process in operation, where it's at, status, status of payment, etc.)

Figure 34:
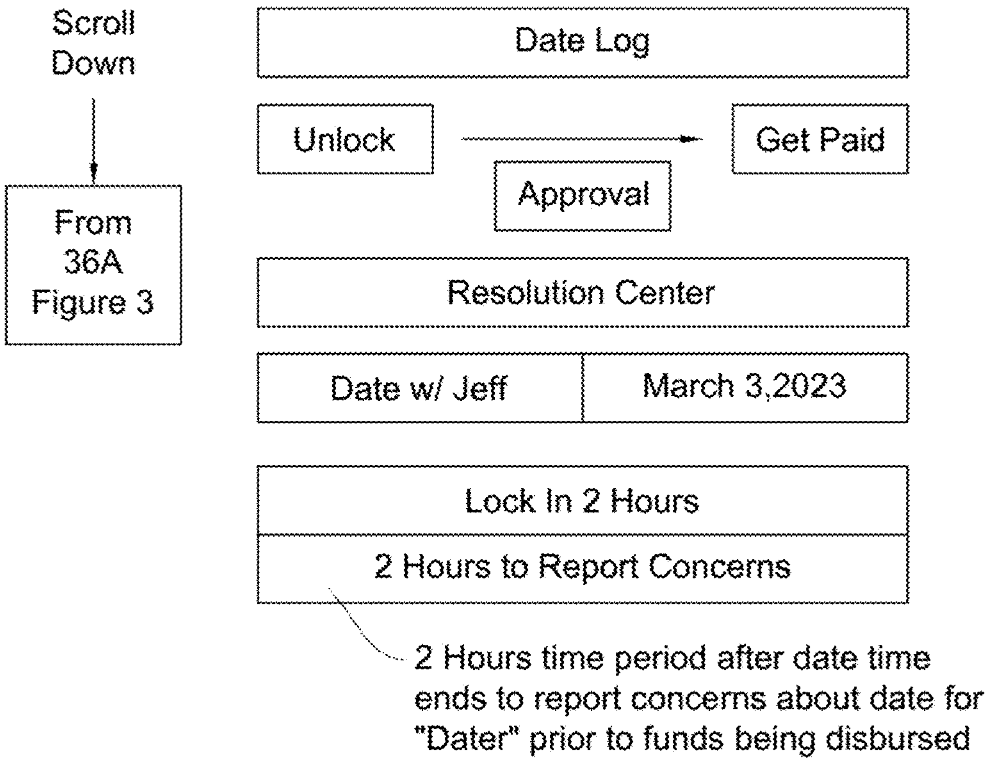

FIG. 34: Some embodiments (e.g., 'scroll down' or new video, page, user page, page, etc.) may be from any user interface. In some embodiments, this may be shown as a, which may include but not be limited to (e.g., scrolled down the page, separate, together, with, somewhere on the user interface, somewhere on the platform, etc.) or may be a second off of the FIG. 33 page. In some embodiments, this may show the "resolution center" which may be where (e.g., all, some, most, management, etc.) options for: which may include but not be limited to (e.g., case log, disputes, issues, approval, payment disbursement, payment options, payment status, information, etc.) regarding a 'case,' which may include but not be limited to (e.g., agreement, contract, session, paid for, meeting, meetup, connection, time, etc.) may be, which may include but not be limited to (e.g., shown, managed, disputed, collected, dispersed, solution-created, updates, agreements, resolutions, contact platform, contact 3rd party, dates, times, data from date, data from time, contact assistance, ask for help, etc.) which may include but not be limited to (e.g., data collection, Network address, IP address, location collection, personal information, contractual agreements, payment status, payment disbursement, payment updates, conflict solutions, contracts, agreements, payments, etc.) which may be, which may include but not be limited to (e.g., resolved, viewed, seen, used, data collection, Network address, IP address, observed, processed, etc.) In some embodiments, a contractual agreement such as an NDA may be provided standard by the platform or attorney or user, or an uploaded or a lawyer-provided version may be required to be signed or reviewed per meeting or for each date by any user, which includes but is not limited to (e.g., model, creator, dater, person, entity, business, etc.) In some embodiments, the contractual agreement may state or breakdown or itemize or come standard-written the obligations or the breakdown of the agreement of the meeting such as which may include but not be limited to (e.g., 'meeting a famous person and that person A wants this other person B to not speak about it unless they continue to date or they decide to get married, etc.) In some embodiments, the contractual obligations or the 'regular agreement not in place with a contract' or 'general agreement without a contract' that is made between the two parties such as which may include but not be limited to (e.g., 'meeting place, meeting time, meeting location, duration, or no duration, or outfit to wear, or date information, etc.) In some embodiments, location history, driving history, date history between two parties or entities or buyers or providers of date may be located on the 'contractual agreement' page or area that may show anything which may include but not be limited to (e.g., selfies with daters, pictures from the day of the date, driving history, taxi history, gift history from the user, gift history from person, business location information, business information, outfit proof history, proof of location, notes about person, evidence of meeting, all screenshot conversations, all conversations, resolutions, signed agreements, etc.)

In some embodiments, this may show, which may include but not be limited to (e.g., time left, dates, times, locations, selections, options, users, profiles, calendar, clock-down, countdown, status, payment history, options or opportunities to get paid, pending investigations, pending payments, data collected, etc.) In some embodiments, this may be where you, which may include but not be limited to (user, person, etc.), may let the platform know or user know that you are, which may include but not be limited to (e.g., concerned, payment inquiries, having issues, concerns with your date, questions, inquiries, etc.) In some embodiments, disputes may be resolved through, which may include but not be limited to (e.g., case log, date log, management area, collection of the data area, data area, resolution area, through the platform, etc.), which may show, which may include but not be limited to (e.g., data/parts of the date, collected data, etc.)

Figure 35:
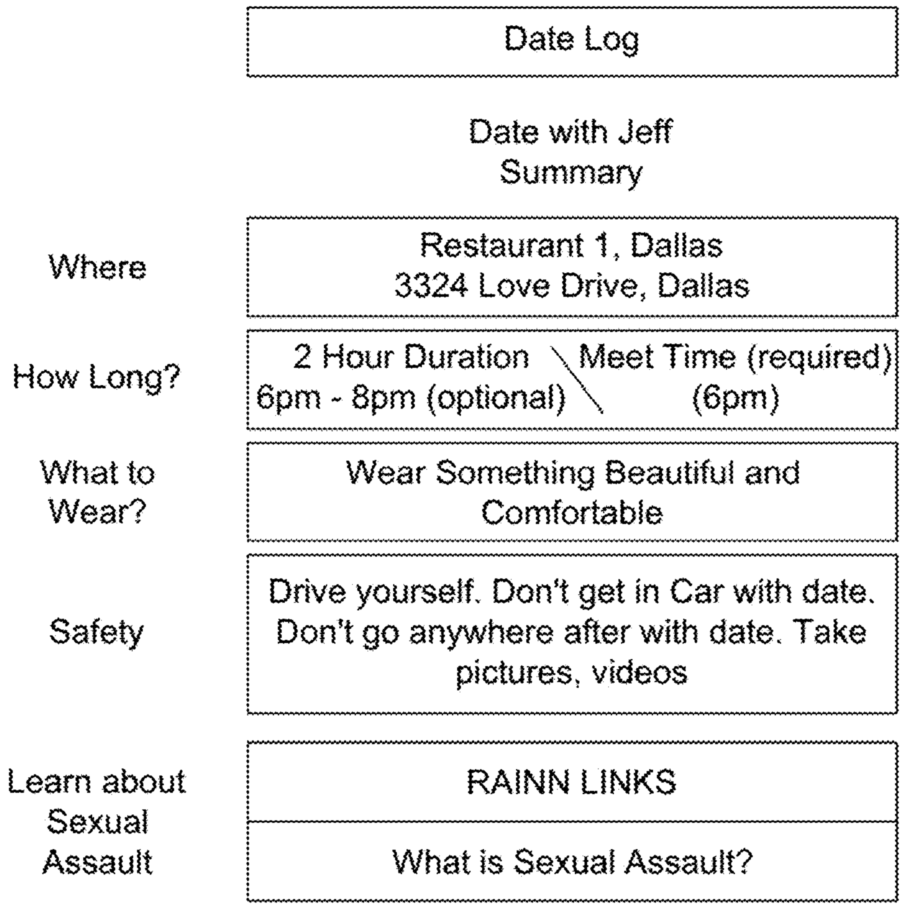

FIG. 35: In some embodiments, this may be the, which may include but not be limited to (e.g., user interface, date log, management area, summary, user interface, application, hologram, screen, hologram, user interface, viewing display, etc.) which may include but not be limited to (e.g., date log, date history, date information, user information that is a dater or dating, time to meet, time of meeting, duration, required time, optional time, contractual information, check-in, check-out, time stamp, time record, time and data record, location, time and data record, coordinate(s), time, a, which may include but not be limited to (e.g., breakdown, itemized, receipt, invoice, total, partial, breakdown, bill, summary of, total, etc.) which may include but not be limited to (e.g., an itemized receipt, invoice, total, partial, breakdown, bill, a receipt, invoice, total, partial, analysis, breakdown, bill, location, distance, information about the "date" and/or information about where, when, what time to arrive, assault resources, crime resources, history with dater such as all conversation screenshot or saved from platform and or 3rd parties, therapy resources, doctor resources, educational resources, school resources, non-profit resources, how, what to wear, safety tips, safety videos, how to record your date, how to film, how to take pictures, solutions, suggestions, links, resources, items, what to wear, what to do, how long is it, contractual agreements, suggestions, tips, offers, platform information, platform suggestions, how to be friendly, how to be sweet, what to say, lines to say, etc.) In some embodiments, this may include (e.g., videos, pictures, charts, informational links, etc.)

In some embodiments, this may be shown as a, which may include but not be limited to (e.g., scrolled down the page, separate, together, with, somewhere on the user interface, somewhere on the platform, etc.) or may be a second version or off of the FIG. 33 page or any user interface. In some embodiments, this may show the "resolution center" which may be where all/some/most/management options for: which may include but not be limited to (e.g., case log, disputes, issues, approval, payment disbursement, payment options, payment status, information, etc.) regarding a 'case,' which may include but not be limited to (e.g., agreement, contract, session, paid for, meeting, meetup, connection, time, etc.) may be, which may include but not be limited to (e.g., shown, managed, disputed, collected, dispersed, solution-created, updates, agreements, resolutions, contact platform, contact 3rd party, dates, times, data from date, data from time, contact assistance, ask for help, etc.) which may include but not be limited to (e.g., data collection, network address, IP address, location collection, personal information, contractual agreements, payment status, payment disbursement, payment updates, conflict solutions, contracts, agreements, payments, etc.) which may be, which may include but not be limited to (e.g., resolved, viewed, seen, used, data collection, Network address, IP address, observed, processed, etc.) In some embodiments, this may show, which may include but not be limited to (e.g., time left, dates, times, locations, selections, options, users, profiles, calendar, clock-down, countdown, status, payment history, options or opportunities to get paid, pending investigations, pending payments, data collected, etc.) In some embodiments, this may be where you, which may include but not be limited to (user, person, etc.), may let the platform know or user know that you are, which may include but not be limited to (e.g., concerned, payment inquiries, having issues, concerns with your date, inquiries, etc.) In some embodiments, disputes may be resolved through, which may include but not be limited to (e.g., case log, date log, management area, collection of the data area, data area, resolution area, through the platform, etc.), which may show, which may include but not be limited to (e.g., data/parts of the date, collected data, etc.)

In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or order or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, areas, profiles, content, or hologram or display screens, etc.) to continue to look or get automated, which may include but not be limited to (e.g., looking, viewings of, movement, selection, scroll, etc.) which may include but not be limited to (e.g., content, creators, models, users, etc.)

Figure 36:
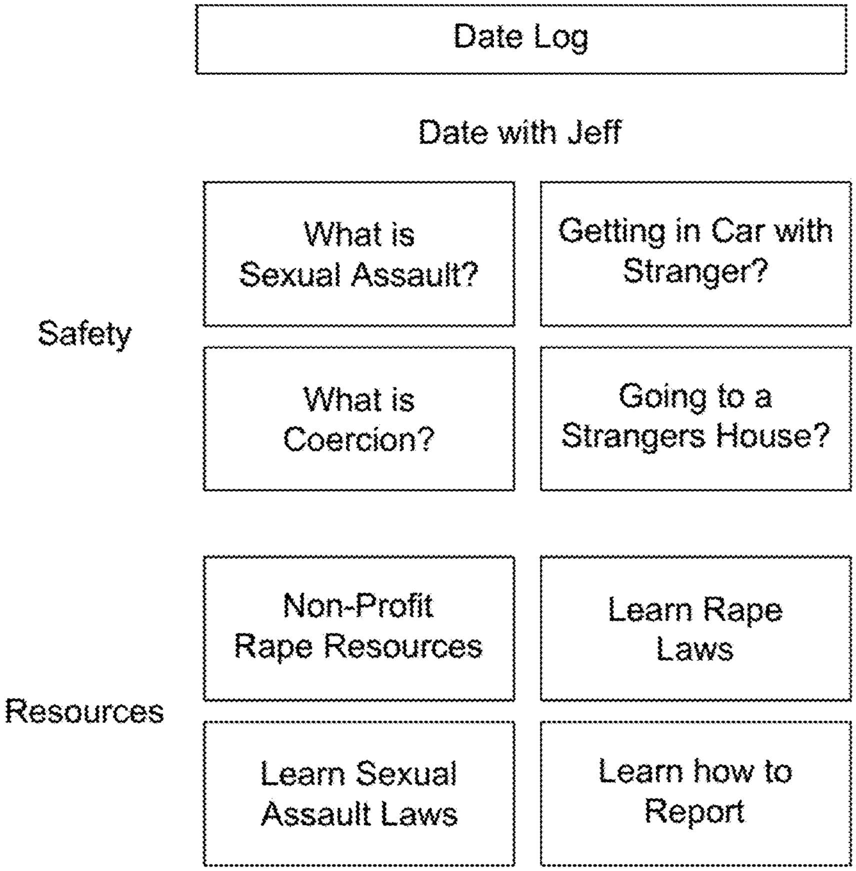

FIG. 36: In some embodiments, this may be a different version of the date log and management area (FIG. 35) (FIG. 33), which may include but not be limited to (e.g., videos, links to resources, explainer videos, rather than text information, etc.) In some embodiments, this may be the, which may include but not be limited to (e.g., user interface, date log, management area, summary, user interface, application, hologram, screen, hologram, user interface, viewing display, etc.) which may include but not be limited to (e.g., duration, check-in, check-out, time stamp, time record, time and data record, location, time and data record, coordinate(s), time, a, which may include but not be limited to (e.g., breakdown, itemized, receipt, invoice, total, partial, breakdown, bill, summary of, total, etc.) an itemized receipt, invoice, total, partial, breakdown, bill, a receipt, invoice, total, partial, breakdown, bill, location, distance, information about the "date" and or information about where, when, how, what to wear, safety tips, safety videos, how to record your date, how to film, how to take pictures, solutions, suggestions, links, resources, items, what to wear, what to do, how long is it, contractual agreements, suggestions, tips, offers, platform information, platform suggestions, how to be friendly, how to be sweet, what to say, lines to say, etc.) In some embodiments, this may include videos, pictures, charts, informational links, etc.) In some embodiments, this may be shown as a, which may include but not be limited to (e.g., scrolled down the page, separate, together, with, somewhere on the user interface, somewhere on the platform, etc.) or may be a second version or off of the FIG. 33 page, FIG. 35 page, FIG. 34 page, or any user interface.

In some embodiments, the user interface may contain which may include but not be limited to (e.g., mandatory safety tips, mandatory safety videos to be watched, safety videos, safety area, safety reminders, safety information, resources, links, mandatory safety guidelines to be printed out for the in-person dates, agreements, signed safety information, agreements of safety to be signed, agreements or contracts to be signed, waivers, safety information, etc.) In some embodiments, user interface may contain, which may include but not be limited to (e.g., mandatory rules, suggested rules, options, exact details, laws, rules, regulations, our rules, out suggestions, out mandatory instructions, our instructions, etc.) to, which may include but not be limited to (e.g., follow, be shown for, suggested, in compliance with, etc.) the, which may include but not be limited to (e.g., date, connection, virtual, in-person, connection, etc.) In some embodiments, the rules may have to be, which may include but not be limited to (e.g., accepted, acknowledged, signed, watched, viewed, questions answered, tests, etc.) for the, which may include but not be limited to (e.g., creator, or person being paid, or model, etc.) to follow when using, which may include but not be limited to (e.g., platform, 3rd party integrations, etc.) In some embodiments, the order of the elements on any user interface presented herein may be different from that presented in the figures. In some embodiments, this may show the "resolution center" which may be where all/some/most/management options for: which may include but not be limited to (e.g., case log, disputes, issues, approval, payment disbursement, payment options, payment status, information, etc.) regarding a 'case,' which may include but not be limited to (e.g., agreement, contract, session, paid for, meeting, meetup, connection, time, etc.) may be, which may include but not be limited to (e.g., shown, managed, disputed, collected, dispersed, solution-created, updates, agreements, resolutions, contact platform, contact 3rd party, dates, times, data from date, data from time, contact assistance, ask for help, etc.) which may include but not be limited to (e.g., data collection, Network address, IP address, location collection, personal information, contractual agreements, payment status, payment disbursement, payment updates, conflict solutions, contracts, agreements, payments, etc.) which may be, which may include but not be limited to (e.g., resolved, viewed, seen, used, data collection, Network address, IP address, observed, processed, etc.)

In some embodiments, this may show, which may include but not be limited to (e.g., time left, dates, times, locations, selections, options, users, profiles, calendar, clock-down, countdown, status, payment history, options or opportunities to get paid, pending investigations, pending payments, data collected, etc.) In some embodiments, this may be where you, which may include but not be limited to (user, person, etc.), may let the platform know or user know that you are, which may include but not be limited to (e.g., concerned, payment inquiries, having issues, concerns with your date, inquiries, etc.) In some embodiments, disputes may be resolved through, which may include but not be limited to (e.g., case log, date log, management area, collection of the data area, data area, resolution area, through the platform, etc.), which may show, which may include but not be limited to (e.g., data, data parts, parts of the date, date parts, collected data, etc.)

Figure 38:
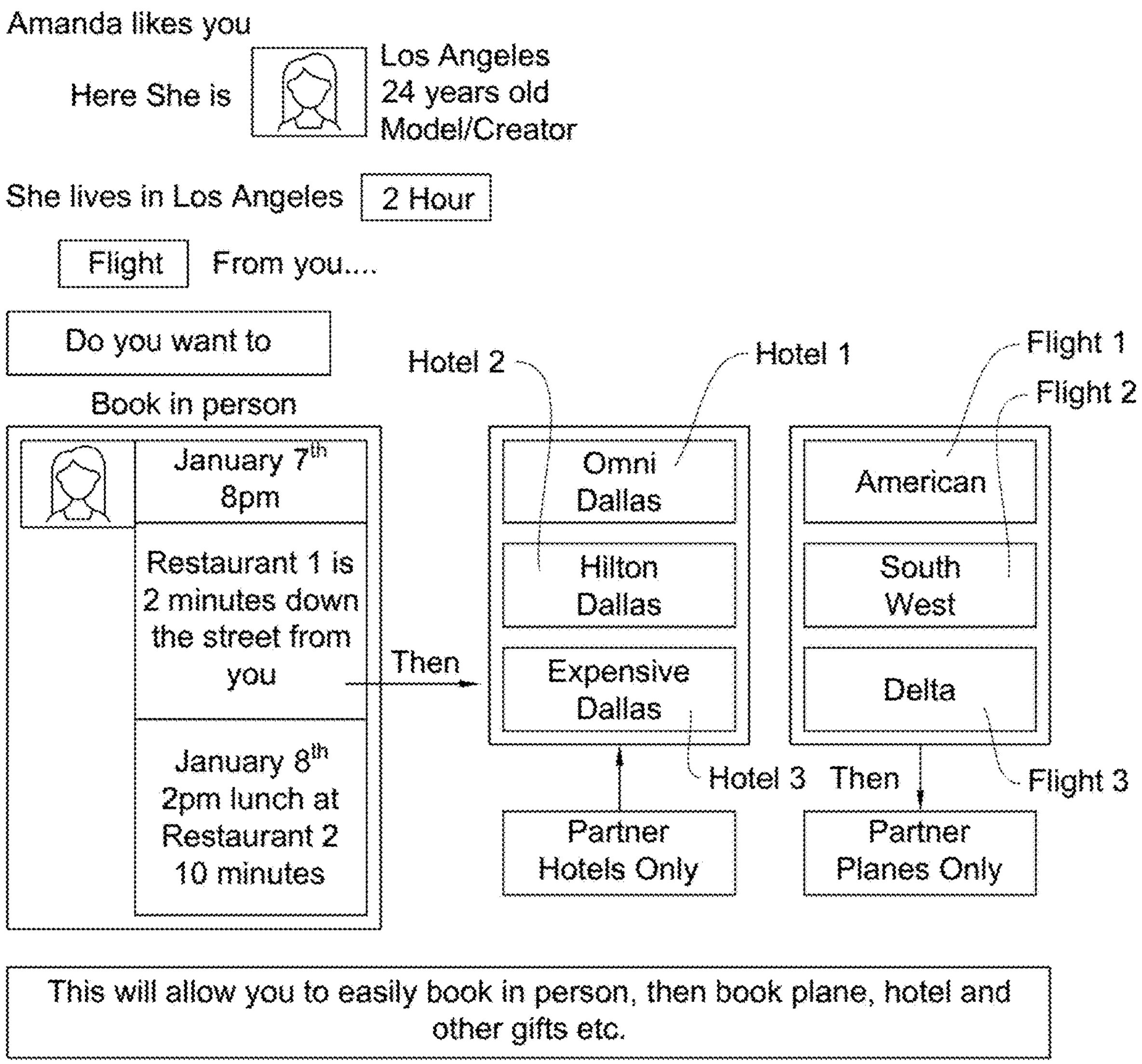

FIG. 38: In some embodiments, there may be user interface, which may include but not be limited to (e.g., user liking another user, user showing interest in another user, user viewing another users profile, live shows, a breakdown of information of a user, live events, live streaming, pre-recorded streaming, pre-recorded shows, pre-made content, content, photos, videos, communication, chat boxes, options or areas to share information, communication, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the bottom, top, side, anywhere, with other suggestions or profiles, or persons, or promotional material or content or information etc.) In some embodiments (e.g., information about a user may show and options to meet, view, see, message, interact with, learn about, schedule with, schedule a date with, etc.) may be available on (e.g., all on one screen or similar to next to or on any user interface, etc.)

In some embodiments, there may be options to, which may include but not be limited to (e.g., move, scroll, switch, disappear, reappear, swipe etc.) any (e.g., content or items, etc.) In some embodiments, user interface may be the, which may include but not be limited to (e.g., models, paid creators view, etc.) In some embodiments, user interface may be a, which may include but not be limited to (e.g., model, creator view, etc.) in which the, which may include but not be limited to (e.g., user, model, girl, creator, paid dater, etc.) may show interest first, which may include but not be limited to (e.g., search the platform for a man to show interest in, contact a person, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, photos, exclusive photos, etc.) that she may be send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date, or wants to go out on a date etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, spend money, subscribe, follow, book a date with her, book date, book meeting, block of her calendar, send her flowers, send her gifts, etc.)

In some embodiments, there may be a, including but not limited to (e.g., live, current, non-live, pre-made, etc.) page or user interface. In some embodiments, which may include but not limited to, the: (e.g., auction, paying, option, bidding/auction page or bidding/auction place, etc.) area in which any person in which may include but not limited to, the: (e.g., internet, Web3, robot, 3rd party, entity, public, public bidders, private bidders, registered bidders, subscribers, fans, people, etc.) may be able to, which may include but not be limited to (e.g., use transmittables, pay at that moment, may use funds from their account, may use their credit card, may use cash, may use any form of crypto, may use any form of an asset, etc.) to pay for a, which may include but not limited to (e.g., date, connection, period, etc.) which may include but not limited to (e.g., any exchangeable system, the title of their vehicle, cash transfer payments, asset currency, gold, silver, diamonds, etc.) In some embodiments, there may be a, which may include but not limited to (e.g., pay for a live-in person date payment method, pay for any form of virtual entertainment payment method, pay for customized entertainment, entertainment, requested entertainment, entertainment, videos/pictures, pay for requested entertainment, pay for custom entertainment, pay for a live-virtual date payment method, pay for a travel date payment method, etc.) in which any which may include but not limited to (e.g., the person in public, public bidders, private bidders, registered bidders, subscribers, fans, people, etc.) may be, which may include but not limited to (e.g., put it on credit, use funds, pay at that moment, may use funds from their account, may use their credit card, may use cash, may use any form of crypto, may use any form of an asset to pay for a date may include but not limited to the title of their vehicle, cash transfer payments, asset currency, gold, silver, diamonds, etc.)

In some embodiments, there may be user interface(s) that may include but not be limited to (e.g., how many minutes away something is, how many minutes away a location is, how far a location is, how far a distance of a date would be, where a date may be located, a driving, travel, route, route to the date, showing a driving, travel, route, route plus distance plus location, showing route or path to location, prices, price ranges, general pricing, general transmittables, of travel information such as booking prices, price ranges, available pricing, general transmittables, prices, price ranges, general pricing, general transmittables, per plane ticket, prices, price ranges, general pricing, general transmittables, per plane type, hotel prices, price ranges, general pricing, general transmittables, travel prices, price ranges, general pricing, general transmittables, activity prices, price ranges, general pricing, general transmittables, real time prices, price ranges, general pricing, general transmittables, how far distance may be, how far a route may be, how far it would be to drive, different traveling routes, different options for traveling, times of dates, locations of dates, profiles of daters, live events, live dates, real-time location data, real-time date data, real time of how far something would be from house, how far a date would be from house, how long a date would be from their house, real-time data information, real-time calendar information, how long a date would be based on data, how long a date would last based on data, jet traveling data, private traveling information, private data information, etc.)

Figure 39:
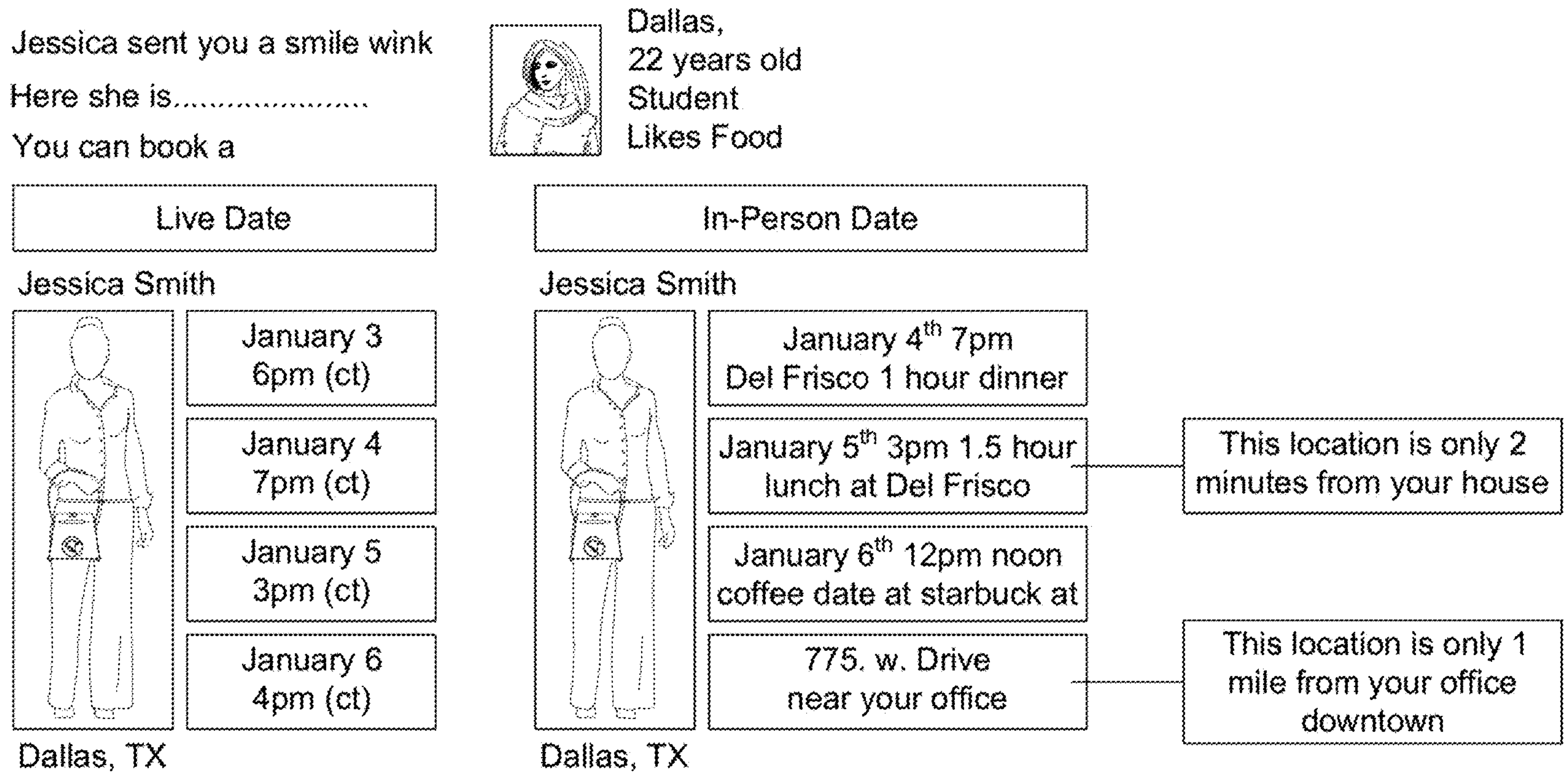

FIG. 39: In some embodiments, there may be user interface(s) that may include but not be limited to (e.g., date options, in person options, virtual date options, virtual meeting options, virtual business meeting options, in-person meeting options, booking options, user options, user profile and time options, user time and profile options, in-person dates, virtual dates, comparing in-person to virtual dates, comparing times, comparing prices, price ranges, general pricing, general transmittables, sending winks, sending information, location information, types of dates available, types of times and dates and locations available, categories of dates available, virtual live dates, virtual or live dates options, prices, price ranges, general pricing, general transmittables, per, current-real time prices, price ranges, general pricing, general transmittables, current-real time user options, real time dates or times, how many minutes away something is, how many minutes away a location is, search options, searching, calendar searching, calendar options, small breakdown, light information, more information, some information, how far a location is, how far a distance of a date would be, where a date may be located, a driving, travel, route, route to the date, showing a driving, travel, route, route plus distance plus location, showing route to location, prices, price ranges, general pricing, general transmittables, of travel information such as booking prices, price ranges, general pricing, general transmittables, prices, price ranges, general pricing, general transmittables, per plane ticket, prices, price ranges, general pricing, general transmittables, per plane type, hotel prices, price ranges, general pricing, general transmittables, travel prices, price ranges, general pricing, general transmittables, activity prices, price ranges, general pricing, general transmittables, real time prices, price ranges, general pricing, general transmittables, how far distance may be, how far a route may be, how far it would be to drive, different traveling routes, different options for traveling, times of dates, locations of dates, profiles of daters, live events, live dates, real-time location data, real-time date data, real time of how far something would be from house, how far a date would be from house, how long a date would be from house, real-time data information, real-time calendar information, how long a date would be based on data, how long a date would last based on data, jet traveling data, private traveling information, private data information, etc.) In some embodiments, search, which may include but not be limited to (e.g., users, categories, persons, profiles, items, etc.) within calendar: In some embodiments, user may be able to search may include but not limited to (e.g., on calendar, around calendar, on user interface, on each day, time period searching, within a time period, within calendar, etc.) which may include but not limited to (e.g., on each day, such as search within a time frame, or time period, or category) time frames may be include but not be limited to (e.g., lunch, snack, dinner, coffee, shopping, virtual, in-person, restaurant, etc.) In some embodiments, user may be able to search on calendar, which may include but not be limited to (e.g., per day, per time period, per week, per location, per distance, per popularity, per type of model, per type of creator, per user, per availability, per activity, etc.)

In some embodiments, there may be user interface, which may include but not be limited to (e.g., user liking another user, user showing interest in another user, user viewing another users profile, live shows, live events, live streaming, pre-recorded streaming, pre-recorded shows, pre-made content, content, photos, videos, communication, chat boxes, options or areas to share information, communication, chats, emojis, send money, send tips, send hearts, unlock profile/content, unlock content, location availability, availability for booking, availability to book, schedule, inquire about, inquire about, inquire or ask regarding, secure, create connection to, hold, pay for, create business relationship with, use transmittables to secure or book, schedule, inquire about, etc.) dates, availability to message, messages, prices, price ranges, general pricing, general transmittables, types, categories, a section at the bottom, top, side, anywhere, with other suggestions or profiles, or persons, or promotional material or content or information etc.) In some embodiments, there may be options to, including but not limited to (e.g., move, scroll, switch, disappear, reappear, swipe, etc.) any content or items.) In some embodiments, the user interface may be the, which may include but not be limited to (e.g., models, paid creators view, etc.) In some embodiments, user interface may be a, which may include but not be limited to (e.g., model, creator view, etc.) in which the, which may include but not be limited to (e.g., user, model, girl, creator, paid dater, etc.) may show interest first, which may have but not be limited to (e.g., search the platform for a man to show interest in, contact a person, send a message, send a direct message, send inquiry, show interest, show interest, etc.)

In some embodiments, for example, the creator may search for, which may include but not be limited to (e.g., salary, professional, net worth, looks, time spent on the platform, etc.) and be shown options such as which may include but not be limited to (e.g., higher paid individuals, verified net worth, verified income, verified background check, looks, photos, exclusive photos, etc.) that she may send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date or wants to go out on a date, etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, spend money, subscribe, follow, book a date with her, book date, book meeting, block off her calendar, send her flowers, send her gifts, etc.)

In some embodiments, there may be a, which may include but is not limited to (e.g., live, current, non-live, pre-made, etc.) page or user interface. In some embodiments, which may include but not limited to, the: (e.g., auction, paying, option, bidding/auction page or bidding/auction place, etc.) area in which any person in which may include but not limited to, the: (e.g., internet, Web3, robot, 3rd party, entity, public, public bidders, private bidders, registered bidders, subscribers, fans, people, etc.) may be able to, which may include but not be limited to (e.g., use transmittables, pay at that moment, may use funds from their account, may use their credit card, may use cash, may use any form of crypto, may use any form of an asset, etc.) to pay for a, which may include but not limited to (e.g., date, connection, period, etc.) which may include but not limited to (e.g., any exchangeable system, the title of their vehicle, cash transfer payments, asset currency, gold, silver, diamonds, etc.)

In some embodiments, there may be a, which may include but not limited to (e.g., pay for a live-in person date payment method, pay for any form of virtual entertainment payment method, pay for customized entertainment, entertainment, requested entertainment, entertainment, videos/pictures, pay for requested entertainment, pay for custom entertainment, pay for a live-virtual date payment method, pay for a travel date payment method, etc.) in which any which may include but not limited to (e.g., the person in the public, public bidders, private bidders, registered bidders, subscribers, fans, people, etc.) may be, which may include but not limited to (e.g., put it on credit, use funds, pay at that moment, may use funds from their account, may use their credit card, may use cash, may use any form of crypto, may use any form of an asset to pay for a date may include but not limited to the title of their vehicle, cash transfer payments, asset currency, gold, silver, diamonds, etc.)

Figure 40:
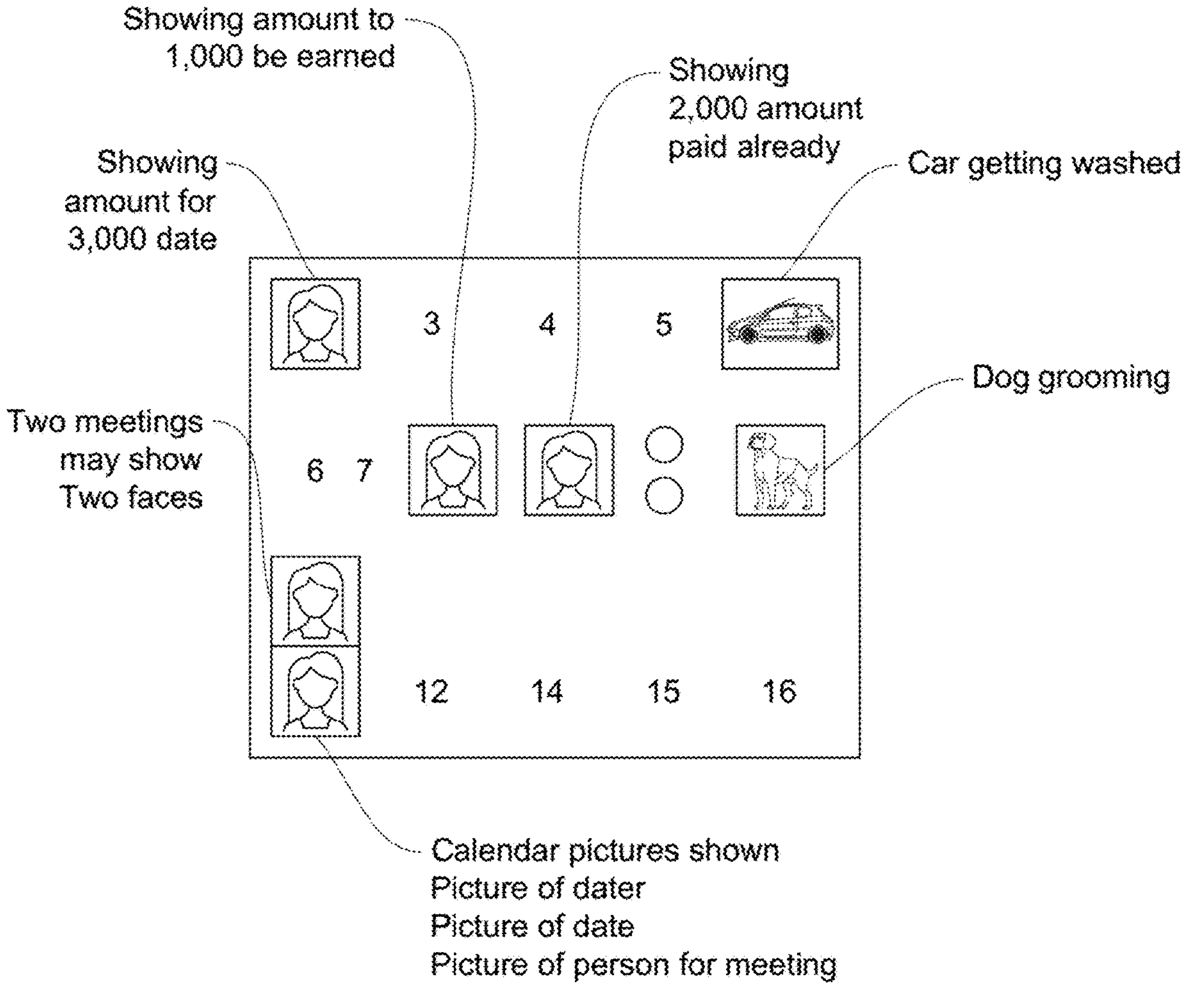

FIG. 40: In some embodiments, user interface may show a, which may include but not be limited to (e.g., calendar, timing method, information, messaging, interaction with, preview of date, preview of earnings, preview of dater and earnings, preview of week, preview of month, preview of time period, a visual of a month such as appointments and dates or work schedule, a visual or a breakdown of work schedule plus dates suggested or dates bid on or dates paid for or suggested dates between daters or any type of date or meeting, suggestions of daters, suggestions of users to go on dates with, suggestions of dates based on past dates or past information gathered by computing system or manual system, date suggestions based on popularity, dates with friends and family plus paid daters, total calendar for the period, active users on dates, active users and their calendars or schedules, user's schedules, suggested date schedules or meeting schedules, etc.) that may also show, which may include but not be limited to (e.g., an amount for an in-person date, for example what you can get (type of date or with who) for 10000 dollars, amount to be earned, amount paid already, partial payments of dates, partial dates booked, auction current prices, price ranges, general pricing, general transmittables, picture of a car wash, picture of date activities, AI showing regular everyday day activities that may be able to be used to show a daily person's life, AI can show content that demonstrates what you have in your calendar, AI to show, calendar daily activities, calendar to show dates, connections, times, timing data, AI, to show calendar dates or parties or bookings or connections, amount that was paid, showing two meetings and two faces, showing multiple meetings or connections and multiple users or persons on calendar or on display for date, calendar pictures or content show, content of dater, contact of user, content of multiple users, content of persons for meetings, mood-board, virtual or visible displays of 'mood' or 'fantasy' or suggestions or 'AI-created' or 'theatrical' or 'inspirational board' or 'inspirational displays of created content's, mood-board, virtual or visible displays of 'mood' or 'fantasy' or suggestions or 'AI-created' or 'theatrical' or 'inspirational board' or 'inspirational displays of created content of persons, [(similar to mood-board, virtual or visible displays of 'mood' or 'fantasy' or suggestions or 'AI-created' or 'theatrical' or 'inspirational board' or 'inspirational displays of created content' but created with AI, created by human, robot, bot, 3rd party, entity, computer system, AI system, crafted, created by robotics based on collected data] etc.) In some embodiments, user interface may show a type of, which may include but not be limited to (e.g., user interface, section, area, calendar, organizational blocks, interface screen and blocks, visuals, visual format, etc.) which may include but not be limited to (e.g., a combination or a description, an organized format of person's activities, visuals of activities or daters, visuals of daters, visuals of users and their price per restaurant date or virtual eat-in date, etc.) which may be or include but not be limited to (e.g., a day, month, year, week, point in time, point of reference, walking, movements, moving, visuals, blocks, media, etc.) which may include but not be limited to (e.g., may show two user's faces/content/profile on a particular day during the time of the "date" etc.) In some embodiments, the, which may include but not be limited to (e.g., calendar, timing method, schedule method, scheduling method, timing data center, etc.) may for example, which may include but not be limited to (e.g., show one girl's face on a particular day which may demonstrate what the activity is such as bowling or eating food, etc.) In some embodiments, AI inputs may be able to take past or current (e.g., information or activity, etc.) from a user or their IP address and suggest (e.g., dates, women, persons, users, advertisements, etc.)

In some embodiments, for example, which may include but not be limited to (e.g., for instance, which may be having but not limited to AI may be able to create a demonstrated picture of the beautiful lady sitting across from the user that is paying for 'connection' at the dinner table at the restaurant that you are booked for that evening through the platform, etc.) In some embodiments, AI may be able to create, which may include but not be limited to (e.g., technological-made photos or content, etc.) that, which may include but not be limited to (e.g., are not real, may not be real, may be based on reality, etc.) that may show, which may include but not be limited to (e.g., what the date is, who the date is for, who the dates are between, who the connection is with, where the date is, where the connection began, what city, a love story, etc.) In some embodiments, other AI variations may for example which may be including but not limited to which may include but not be limited to (e.g., a picture of your dog getting groomed, and/or the user interface may show the date and the time for that particular meeting, scheduled to visualize the date or meeting or schedule, etc.) In some embodiments, which may include but not be limited to (e.g., visuals or hearing or sounds or viewing, etc.) may be, which may include but not be limited to (e.g., AI-generated or AI may be created by uploaded content, or content is used or reused, or content is part-AI, etc.) such as, which may include but not be limited to (e.g., a photo that the user uploads, an AI-generated photo/content or information, etc.)

In some embodiments, for example, which may be including but not limited to which may include but not be limited to (e.g., a photo that is automatically generated, auto-generated, manually generated, AI-generated, human plus AI-generated, automatically showing, etc.) based on the, which may include but not be limited to (e.g., 'dater, user's profile photo, favorite photo, etc.) which may include but not be limited to (e.g., using artificial intelligence and/or machine, changes, inputted data, etc.) to allow, which may include but not be limited to (e.g., learning, or to learn, to choose, etc.) which may include but not be limited to (e.g., the best one, one, a photo, content, items, etc.) based on, which may include but not be limited to (e.g., user's preferences, past learning, machine learning, user data, gathered data, information, etc.)

Figure 41:
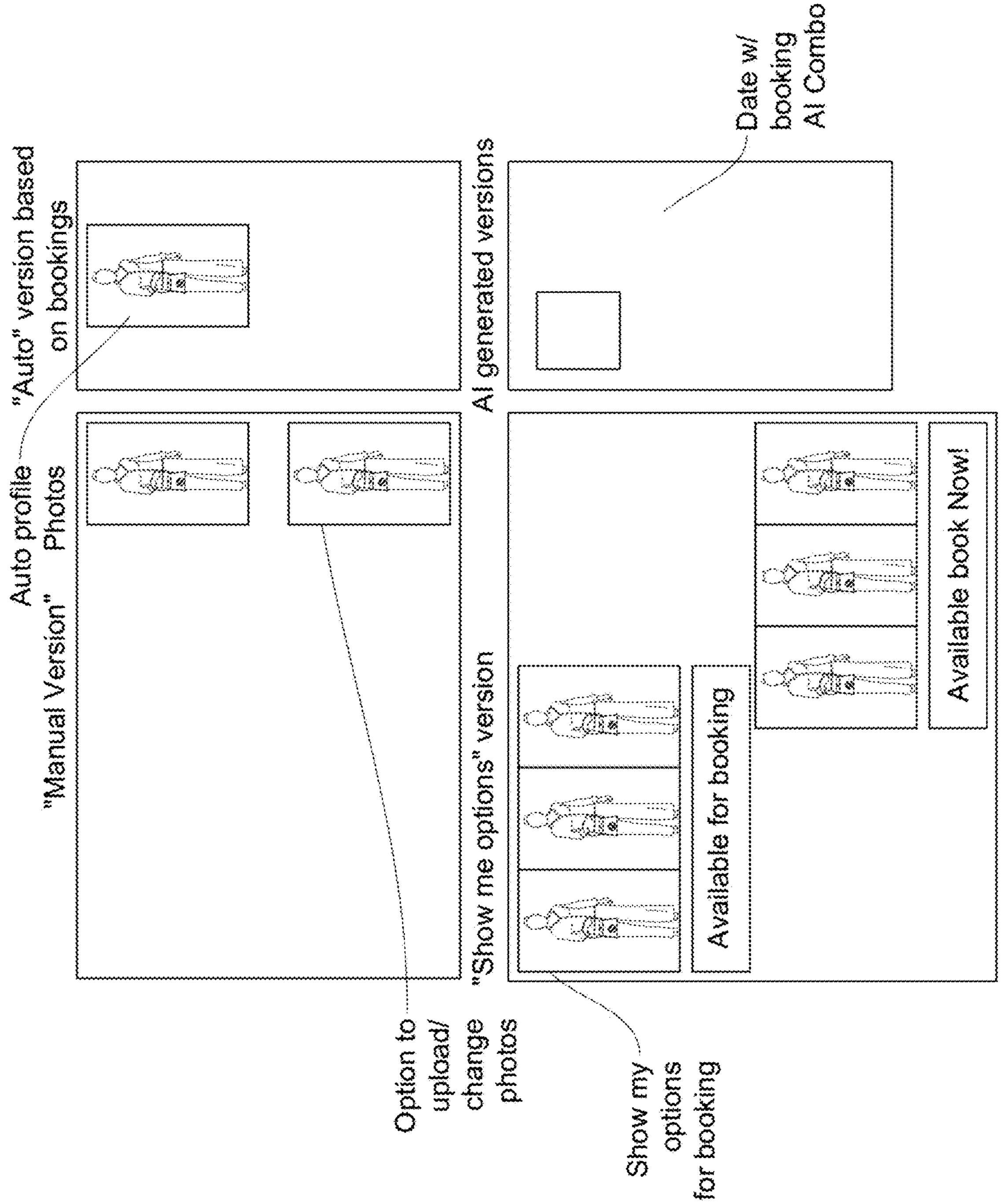

FIG. 41: In some embodiments, content may be automatically shown on the user interface or calendar based on, which may include but not be limited to (e.g., bookings, connections, dates, times, locations, etc.) In some embodiments, any content may be able to, which may include but not be limited to (e.g., manually uploaded, manually changed, automatically changed, In some embodiments, which may include but not be limited to (e.g., calendar or timing method or timing data, schedule data, scheduling data, timing methods, etc.) may show, which may include but not be limited to (e.g., pictures, visuals, content, etc.) that may be manually uploaded or downloaded onto the software or the calendar application. In some embodiments, which may include but not be limited to (e.g., calendar, timing method, schedule method, scheduling method, timing data center, etc.), may demonstrate a, which may include but not be limited to (e.g., live picture, video, conference call, Face Time call, a photo, a meme, a GIF, pixels showing a moving photo or a video, that may show that he calendar app may contain for the date, the time, the month, the AI-generated photos or videos, etc.) In some embodiments, which may include but not be limited to (e.g., Calendar app, 3rd party, or platform, or software, or technology, etc.) may use, which may include but not be limited to (e.g., photos, videos, or other pixelated, or created items, etc.) that may show a, which may include but not be limited to (e.g., picture, art, moving art, video, etc.) which may include but not be limited to (e.g., show or demonstrate, or show example of, etc.) which may include but not be limited to (e.g., what the person is doing at the time, or for the date, or what to be expected of that time, etc.) In some embodiments, which may include but not be limited to (e.g., visuals, sounds, content, etc.) may include but not be limited to (e.g., AI-generated, uploaded, stock photos, stock videos, chosen pictures, machine learning videos or pictures, etc.) which may include but not be limited to (e.g., what the date is about, what to expect, what the learn about for the date, information for the date, which the date is with, what the date is about, training videos for the date, any general knowledge for that date, show training videos demonstrated to suggest to that person to learn before the date such as safety videos, training videos, informational videos, fun videos, entertainment videos, news videos, these may not be videos and may be pictures or other forms of communication through visuals, etc.) In some embodiments, there may be a 'swipe to calendar method, 'swipe' may be defined as which may include but not be limited to (e.g., swipe, tap, switch, click, etc.) In some embodiments, the 'swipe to calendar method' may include but is not limited to (e.g., a profile photo, information, availability, content, a computing operation-chosen photo, the best photo, a frequently chosen photo, a frequently picked photo, a frequently-viewed photo, etc.) In some embodiments, there may be a swiping method may include but not limited to (e.g., swipe the stack or list or persons left or right up or down, areas or methods (e.g., you may, user, person, entity, 3rd party, robot, artificial intelligence, etc.) may be seen or download or view the calendar, profile, pictures, videos, lives, locked photos, information, etc.) depending on which way or there may be all of these items showing up on each, which may include but not be limited to (e.g., swipe or method, etc.) which may include but not be limited to (e.g., depending on which way, depending on which one comes first, etc.) In some embodiments, there may be a swipe that leads to a, which may include but not be limited to (e.g., live photo and a live calendar, timing method data, timing data method, timing process data, with live dates, bookings, openings, ways to click, ways to pay, ways to register to sign in, ways to register on the platform, the person's chosen or automatic preferences may show up, etc.) In some embodiments, the, which may include but not be limited to (e.g., 'swiper, tapper, viewer, displayer, audience, person, user, etc.) may be, which may include but not be limited to (e.g., able to choose a 'date' a book immediately, book now, or view calendar, or follow, or subscribe, or view private photos, private content, etc.) on the, which may include but not be limited to (e.g., home-screen, user interface, etc.) and/or on a, which may include but not be limited to (e.g., swipe method or on any way connected or not connected to a swiping home screen method, or on any user interface using any method, etc.)

In some embodiments, the calendar application may contain a, which may include but not be limited to (e.g., 'contact list" or list of contacts, or persons, or users, etc.) which may include but not be limited to (e.g., automatically upload, show a picture that is chosen, decide manually or automatically, etc.) In some embodiments, the calendar may be shown, which may include but not be limited to (e.g., any size photo, AI-generated content, content, video, etc.), which may include but not be limited to (e.g., person, place, thing, event, created event, created type, what to expect, any abstract information, any abstract idea, etc.) which may include but not be limited to (e.g., date, connection, meeting subscriber, follower, etc.) In some embodiments, the calendar may contain, which may include but not be limited to (e.g., information about 'date, pricing, information regarding 'meeting such as pricing, information on what was paid, information on what was earned, information on how many may be earned or made on that day, colors may change based on what has been completed and what hasn't, etc.) In some embodiments, for example, if a date hasn't happened yet, user interface may show a, which may include but not be limited to (e.g., unique color, special symbol, particular item, greyed area, etc.) which may include but not be limited to (e.g., idea, agreements, amount of money, reward, items earned, etc.) which may include but not be limited to (e.g., shown, understood, or agreed upon, etc.) may not have been earned. In some embodiments, this may include but not be limited to (e.g., before, after, during, later after, etc.), which may include but not be limited to (e.g., date, meeting, agreement, etc.) In some embodiments, the user interface may include but not be limited to (e.g., the amount of money has been earned at some point, and something may change, which may include but not be limited to (e.g., the color may vary, the symbol showing that day may change in some form, etc.) as, which may include but not be limited to (e.g., distinguishable from before. Somewhat distinguishable, different, modified, edited, etc.)

Figure 42:
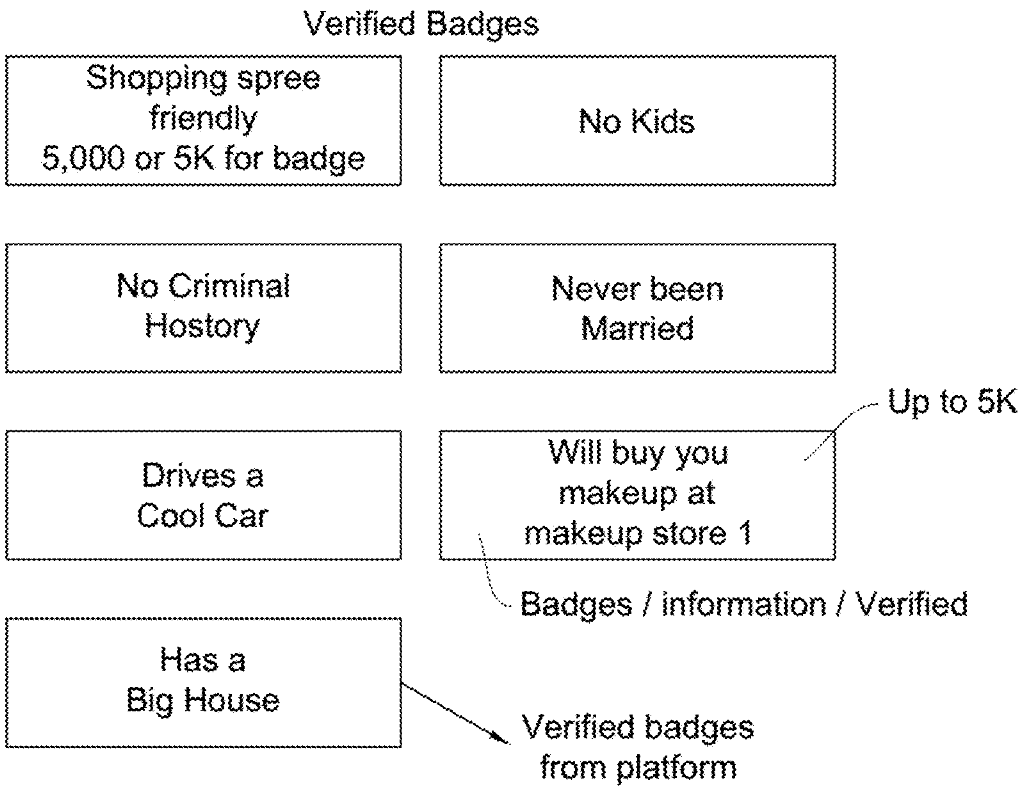

FIG. 42: In some embodiments, badges, which may include but not be limited to (e.g., verifications, confirmed, 3rd party confirmed, 3rd party checked, outside verified, etc.), may show up on either but not be limited to (e.g., creators, users, persons, people, bidders, etc.) which may include but not be limited to (e.g., user interface(s), platform, area, screen, etc.) which may include but not be limited to (e.g., badges, sections, organizations, organized, part of the entity, 3rd party, outside confirmed, distinction, categories, recognition, etc.) may be given to user by the, which may include but not be limited to (e.g., platform, self, user, person, 3rd party site that may verify personal information. 3rd party, entity, 3rd party entity, etc.) In some embodiments, personal information which may include, but not be limited to, which may include but not be limited to (e.g., facial recognition, driver's license verification, 3rd party verified, outside verified, outside confirmed, 3rd party, outside entity, outside facial recognition, passport verification, types of paid for verification, whether verification was paid for or not, where certification came from, who verified user or person, address verification, no criminal history, criminal history, asset verification, real estate verification, address verification, car-type verification, etc.) In some embodiments, the display 'badges' or verifications may state that person has verified assets similar to a 'paid background check' you can get on public background check platforms or sites, or by simply going to the state to verify public information. In some embodiments, user may be able to (e.g., pay to receive verified status or pay to get a background check done or pay to show assets or become a member to become approved, etc.)

Figure 43:
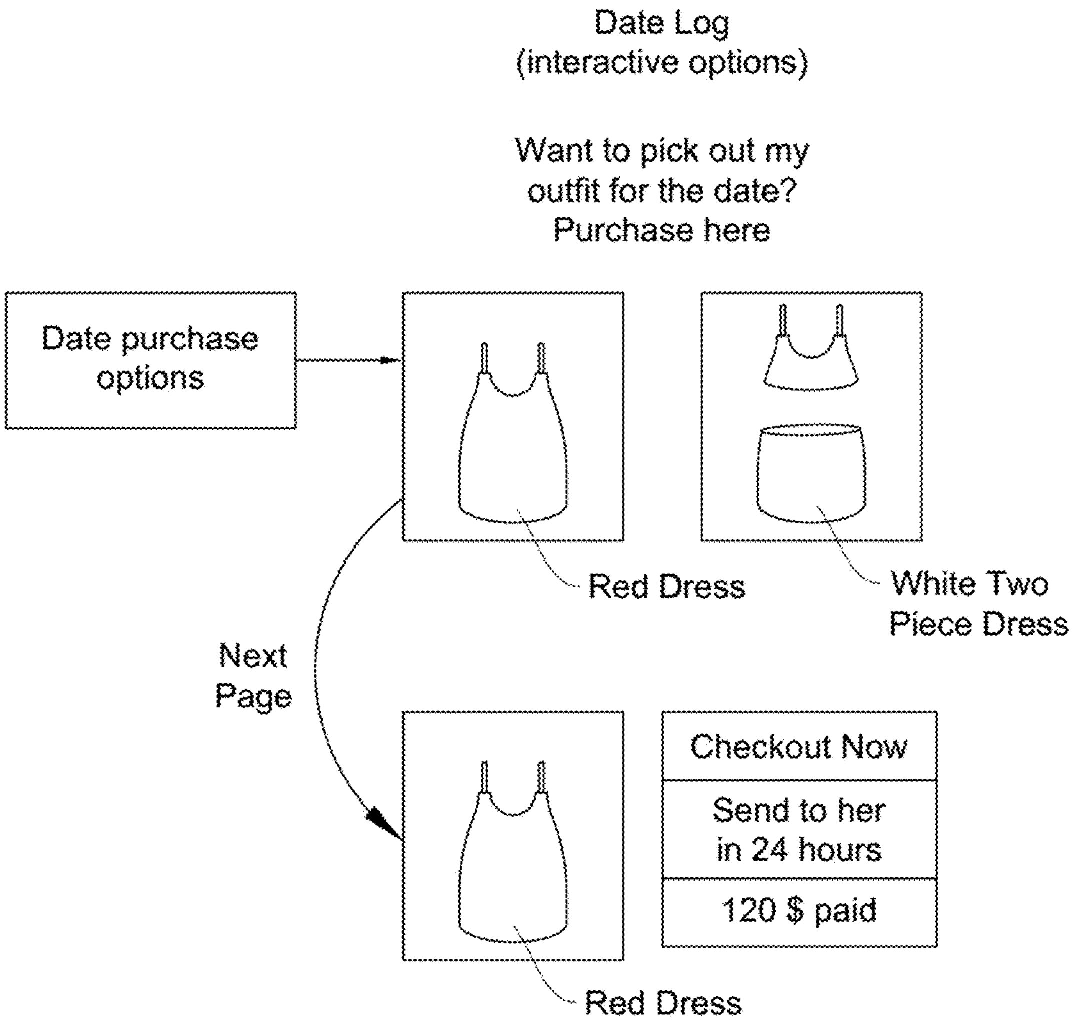

FIG. 43: In some embodiments, there may be options or user interfaces that may give opportunities to, which may include but not be limited to (e.g., inquire about items, check out now, inquire about, ask for, request, pay for, etc.) In some embodiments, for example, which may be including but not limited to which may include but not be limited to (e.g., want to pick out my outfit for the date? Then show options to purchase pre-selected items and pay for them, potentially send them to the user's house, bring them to date, or receive a gift card to purchase from this store, place, business, etc.) In some embodiments, which may include but not be limited to (e.g., date log, management area, interactive options, options, user interface options, editable options, etc.) In some embodiments, these may be options that are, which may include but not be limited to (e.g., located on the homepage, the creator's page, any user interface, any page within the platform or outside of the platform or process, etc.) that may allow user to, which may include but not be limited to (e.g., purchase clothing items, makeup items, beauty items, women's items, gift cards, food cards, rent payment, car payment, etc.) or any other form of payment that the other person has available to that other person to, which may include but not be limited to (e.g., purchase, buy, or send money for, or checkout and send to their house, send money, buy gift, ask for item, request item, inquire about item, or to send an immediate gift card, or to pre-pay for a date, or to purchase an outfit for a date, or to purchase clothing or gifts for a date, for a meeting, for any reason, not even for meeting or a discussion or consultation, or a date, etc.) In some embodiments, users, persons, entities, or groups may be able to show items being used or demonstrated as items that can be purchased or used items that can be bought through (e.g., platform or with integrated 3rd party checkout or sending or packaging, etc.) In some embodiments, items on a wishlist can be set out for users to purchase for the date, to wear to the date, or for any reason. In some embodiments, items purchased may be purchased as a group, or one thing from a list, suggestion, or request can be purchased. For example, there is a two-piece dress set with jewelry, and the other user only wants to buy the jewelry. Those items may be (e.g., saved for later, charged on credit, charged with credits, charged with titles, charged or paid for with crypto, etc.) and or separately purchased, purchased as a group, and/or (e.g., pre-ordered, scheduled, and or sent, etc.) directly to (e.g., management party, user, 3rd party, gift card, digital card, PO Box, or their house, etc.) In some embodiments, items can be shopped immediately or paused on time to be sent or scheduled for a later date. In some embodiments, items for purchase or request or suggestions to purchase for a user by another user or by that user may be able to be shown or displayed as a hologram, or a visual or a display or shown with that user wearing it using AI or any application or 3rd party or integrated or platform technology that would allow the items to be shown on the user or with the user to (e.g., visualize or to inspect or to show or to see the items for sale or to be purchased in size or in-person or visualize it in person, etc.) In some embodiments, the user may be able to pick out someone's outfit for a date or choose their outfit interactively using the platform or 3rd party integration or AI or manually, or they may be able to directly purchase an outfit or jewelry or makeup through the (e.g., platform or through the platform and using a 3rd party system or a partner site or a partner system or an integrated system, etc.) and send it to the user and request that they wear it during the date, or the other user or any user may be able to request these specific items to be purchased so that they can wear it on the date or the activity, for example, if they are going swimming. There may be a request for a new bathing suit plus goggles, plus sunscreen, plus haircare items, etc.)

In some embodiments, on any user interface, user interface may include choosing the 'date' of availability for a, which may include but not be limited to (e.g., bidding/auction, paying option, auction, payment, options to purchase, charity donations, charity date, buy now priced date.' etc.) In some embodiments, This also may include, which may include but not be limited to (e.g., request flowers, request gift cards, request suite, request suit and tie, request jewelry, request restaurant, request gift, request call, 3rd party request, 3rd party integration request, choose time, current date, chosen date, preferences per day, preferences for time period, times, choose time, choose restaurant, request flowers upon date, request gift, request gift item, request gift card, request suit and tie, business casual, casual wear, connect 3rd party, integrate 3rd party, order through 3rd party that is integrated with platform, use partner site, use partner app, choose restaurant, choose time, etc.) In some embodiments, The 'choose restaurant' may only allow the 'model' to choose from our 'partner restaurant' may be a which may include but not limited to (e.g., activity center, business, restaurant, 3rd party, entity, business, location, persons, etc.) which may include but not limited to (e.g., partnership agreements, referral agreements, Signed agreements in payment for understanding they are partnering with us and we are sending them "business," signed partners, signed restaurants that we refer to, payment options integrated with restaurants, etc.) 'models' may be allowed to request any one or combination of: which may include but not be limited to (e.g., gift, gift card, flowers, clothing, makeup, donation, food, dessert, bills paid, payments, etc.) upon arrival or to be automatically sent to their, which may include but not be limited to (e.g., phone, account, funds account, payment account, bank account, platform bank account, platform account, etc.)

Figure 44:
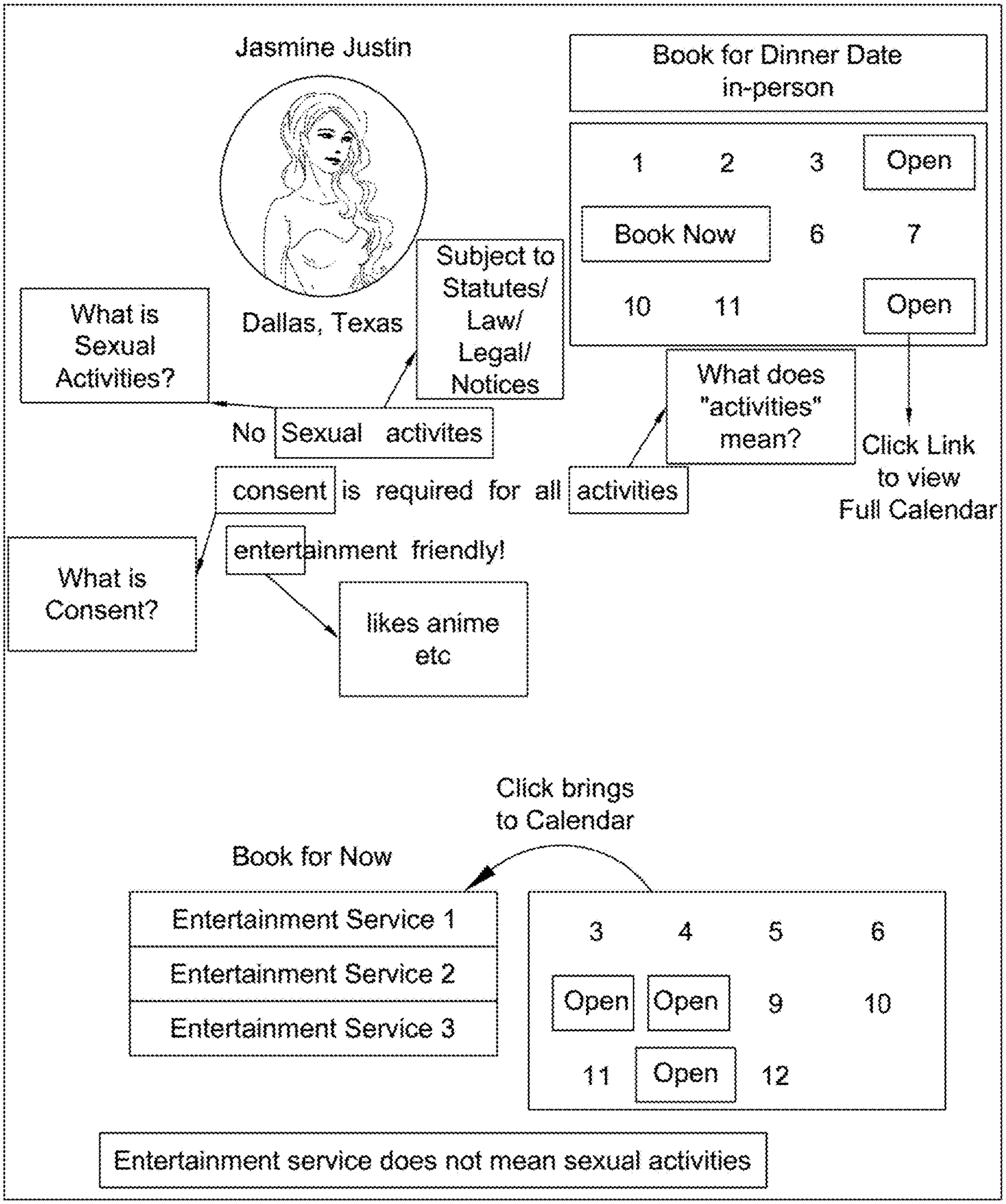

FIG. 44: In some embodiments, some user interfaces may show, which may include but not be limited to (e.g., suggestions, warnings, notifications, things to consider or remember, 'how it works' 'how the site works' 'what to expect' 'how we work' 'how to navigate' warnings, suggestions, laws, regulations, statutes, etc.) In some embodiments, the user interface may show, including but not limited to (e.g., pre-approved items or available activities, users, persons, scheduling, calendars, information, activities, entertainment services, information regarding social information such as 'how to act' 'what to expect' dates, suggestions to do, etc.) In some embodiments, the user interface may show, which may include but not be limited to (e.g., pre-approved items and pricing, pricing for items for purchase such as clothing or products, pricing for dates, pricing for entertainment services, different entertainment services, dating services such as 'be matched with a personalized matchmaker that can help you with talking or planning your first date,' 'join our membership, join our club, become a paid member, pay per month, set up a payment schedule, pricing for connections, pre-approved items for example which may be including but not limited to 'book now for dating service, public humiliation such as dog on a leash, regular dating services, entertainment services, entertainment services and entertainment options,' etc.) In some embodiments, selecting a pre-approved option may bring the user to the checkout screen, hologram, user interface, viewing display, calendar, or selection to book, schedule, inquire about, inquire about, inquire regarding, secure, create connection to, hold, pay for, create business relationship with, use exchangeable to secure or book, schedule, inquire about, send message, subscribe, unlock, view information, pay to join membership, etc.), which may include but not be limited to (e.g., time, day, suggestion, inquiry, put on hold, auction for, bid on, bidding/auction selection, to purchase, exchangeable for, payment methods, paying options, etc.) The figure may show possible, including but not limited to (e.g., user interface, page, item, screen, hologram, user interface, viewing display, the homepage of creator or creator's screen, hologram, user interface, viewing display, etc.) In some embodiments, this may be a, which may include but not be limited to (e.g., dummy version, lesser version, public version, public, private profile pages, private pages, suggestion pages, unlocked pages, private profile, non-membership version, etc.) of the, which may include but not be limited to (e.g., creator, model, person, public, registered user, etc.) In some embodiments, this may show that the creator is open to specific activities or other activities other than a dinner date. In some embodiments, this may lead, including but not limited to (e.g. warnings, links, information, information regarding "rules, terms, regulations, etc.) In some embodiments, this may include, which may include but not be limited to (e.g., further, additional, added, shown up, displayed, etc.) links that' may, which may include but not be limited to (e.g., explain what each term may mean, further resources, non-profits, explain regulations, explain laws, connect to AI, get questions answered with AI, integrated questions and answers, etc.) In some embodiments, for example, which may include but not be limited to (e.g., what is the agreement?" "What does 'yes' mean?" "What do appropriate activities mean?" "What does dating mean?" "What is legal?" "What is allowed?" "What does NSFW mean? "What does appropriate mean" "What does entertainment mean?" 'What does entertainment services mean' 'What does dating mean' 'What is paying for a date or someone's time'? 'How to be a gentleman' 'How to attract a lady' 'How to attract a life partner' How to attract a girlfriend' 'How to get into a relationship' 'How to ask her what she expects in a relationship' 'how to ask her about her expectations' 'how to be on time' 'how not to smell bad' 'how to do your hair' 'how to drive' 'how to be more masculine' 'how not to make her uncomfortable' 'how to follow laws and rules and regulations' 'how not to be creepy' 'how to get your hair to grow back' 'how to get a nice body' 'how to style your hair' 'how to close your mouth when you chew' Etc.)

Figure 45:
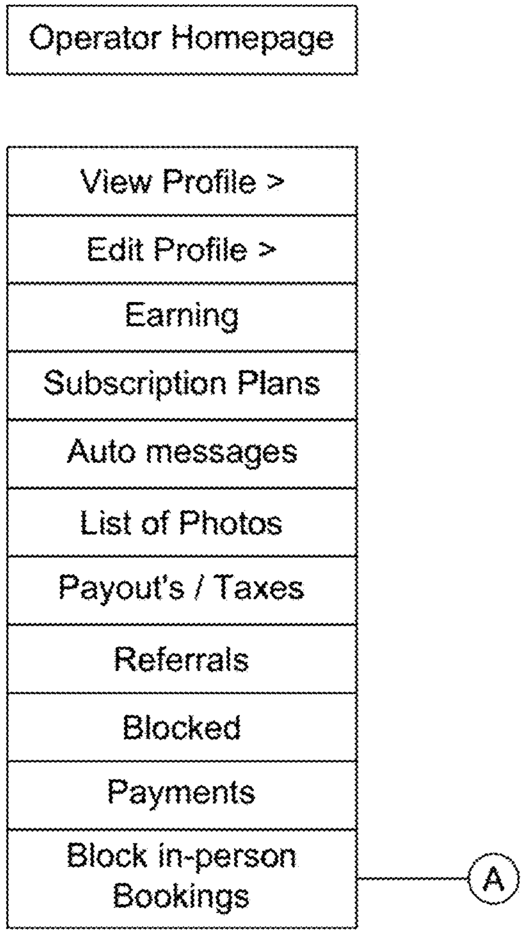
Figure 46:
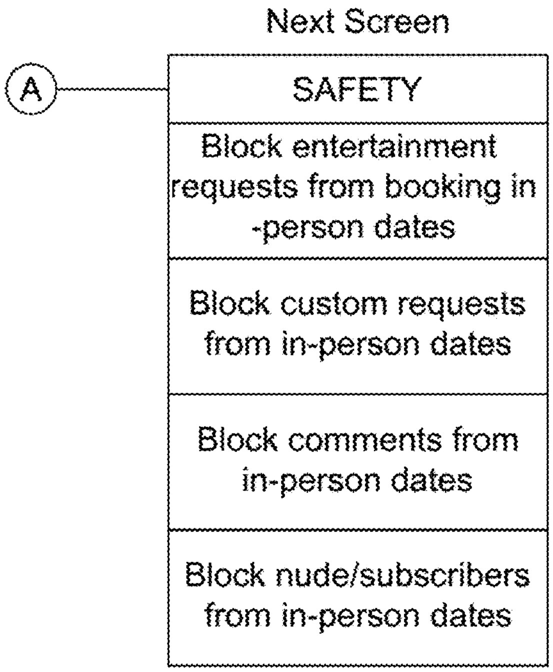

FIG. 45, FIG. 46: In some embodiments, (FIG. 45 or any user interface) may be a, which may include but not be limited to (e.g., creator, user, public person, any person, etc.) which may include but not be limited to (e.g., homepage, any page, user interface, etc.) where the creator or model, entity, 3rd party, user, or user may be able to run their business and or manage their, may include but not be limited to (e.g., payments, methods, earnings, subscriptions, content, calendar, dates, work schedule, open schedule, live streaming, live videos, stories, content-creation schedule, content, media, videos, pictures, messages, quotes, information, earnings, referrals, blocked, payments, taxes or payouts, subscriptions for content or any other reason, schedule subscription, preferences, gift wish list, etc.) In some embodiments, somewhere there may be may include but not be limited to (voice command, AI-induced, AI, computer, user interface, option, button or an option or a menu, etc.) to manage safety or an alternative such as an option that may show or have options to (e.g., 'block people from in-person dates." Block persons you know' 'block users leaving inappropriate comments' 'auto-block anyone using specific keywords such as 'stupid' etc.)

In some embodiments, this may be shown as a, including but not limited to (e.g., date subscription model, membership option, membership model, pre-pay model, etc.) In some embodiments, this may be potentially be a, which may include but not limited to (e.g., date subscription model, membership model pre-pay model, etc.) for, which may include but not limited to (e.g., in-person dates per month/time period, dates per time period, connection(s) per time period, etc.) that may allow dater to pay or obtain, which may include but not be limited to (e.g., for a monthly fee, for a fee, for a fee for a time duration, check-in, check-out, time stamp, time record, time and data record, location, time and data record, coordinate(s), a one-time fee, on-going fee, credit-fee, credit subscription, pre-paid subscription, a subscription price during any time period or duration, check-in, check-out, time stamp, time record, time and data record, location, time and data record, coordinate(s), which may include but not limited to (e.g., to obtain hand-picked, or hand-set, or expert-picked, or "dates arranged by someone else with less work to the client, etc.) in exchange for a, which may include but not be limited to (e.g., set cost, monthly cost, yearly cost, or on-going fixed price or an exchange amount of dates. Which may have one option or more than one option with set prices, price ranges, general pricing, general transmittables, buy-now prices, price ranges, general pricing, general transmittables, monthly prices, price ranges, general pricing, general transmittables, yearly prices, price ranges, general pricing, general transmittables, or lifetime prices, price ranges, general pricing, general transmittables, etc.)

In some embodiments, this may go to another screen which may be (FIG. 46 or any user interface) where it lists all of the options to block people from booking in-person dates, which may include but not be limited to (e.g., creator/model/user person etc.) In some embodiments, this may allow the model to feel more safe for example by, which may include but not be limited to (e.g., not allowing anyone that has bought a NSFW photo, has access to NSFW videos, not allowing anyone that has bought any customized entertainment, entertainment, requested entertainment, earnings, subscriptions, auto-messages, list of photos, list of items, payouts, 3rd party taxes, outside taxes, referrals, blocked persons, payments, block someone, check social media, view background check, safety information, safety training, block custom requests, block comments, manage comments, block NSFW subscribers from booking in-person dates, block NSFW, block suggestive requests, block inappropriate behavior, block in-person dates with [categorized, or special, or any persons], entertainment, items or content, or someone that has commented something derogatory or any type of warning or type or red flag behavior, etc.), which may include but not be limited to (e.g., not interested in a date, not wanting to talk, weird behavior, suggestive behavior, unsafe behavior, stalking/mental disorder behavior, not vibing with, scary behavior, criminal behavior, uncomfortableness, simply not interested, etc.) In some embodiments, the safety measurements on the platform may include, which may include but not be limited to (e.g., background checks, 3rd party conformations, 3rd party background checks, social media information, tax forms, employer forms, tax returns, etc.) and this may also include but not be limited to (e.g., deleting, blocking, preventing, etc.) which may include but not limited to (e.g., anyone, or any category, or any location, or any distance, or any work related information, or any type etc.) from booking that may have any questionable background information, which may include but not be limited to (which may be seen as 'was allowed on the platform or deemed okay to the platform,' but not okay, or not acceptable, or not comfortable, to the individual creator, model, person being paid, etc).

Figure 47:
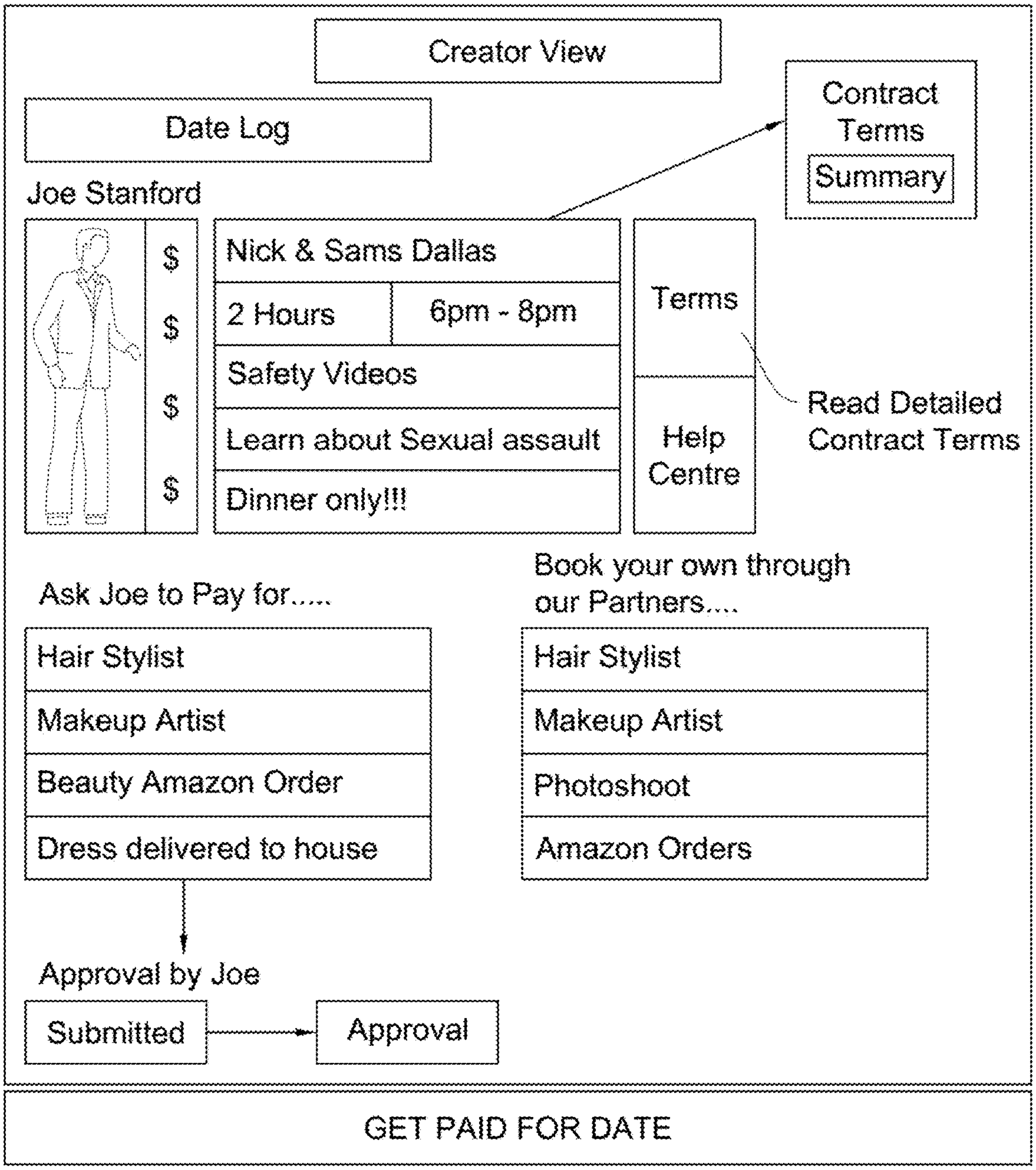

FIG. 47: In some embodiments, this may show a potential, which may include but not be limited to (e.g., users view, users user interface, creators view, users view, management view, managers view, agency view, management team view, users view, talent view, etc.) of a potential date log or managing-request management area. In some embodiments, the date log, management area, may be used as a term to describe, which may include but not be limited to (e.g., date management, a place to show how the user is going to be paid, item requests, payment requests, content submission or request, items user wants another person or business or group or entity, content fulfilling requests such as 'get paid XYZ to post content for brand aka brand content for product service or payment or shout out or thing or value' to pay for, fulfilling brand requests such as posting information about beauty products or payments or user review or suggestions to purchase items, hair stylist request, request housekeeper or babysitter, find babysitter, ordering/requesting beauty services or beauty items to be paid for by another party, a place to show how paying person is paying the other person, 'date case, paid dater's information and your information for a date or an in-person meeting data collection, Network address, IP address, data collection, Network address, IP address, etc.) In some embodiments, this 'date log, management area,' for example, which may include but not be limited to (may show the picture of the guy or the paid dater, the user interface may show a 'colorful or easy to understand or significate-sized date log or easy to read or understand, management area, a summary of the terms of the contractual agreement between the dater and the person going on a date, etc.) In some embodiments, this may be, for example, which may include but not be limited to (e.g., after it is paid, this may show a summary during the time of deciding to pay, the user interface may show this type of summary to get acquainted with seeing what would be expected on a date, etc.) In some embodiments, 'date log, management area,' or 'management area' or user interface may show, which may include but not be limited to (e.g., a summary of date, itemized payments, itemized results, itemized charges, contract terms, contractual data, collected data, suggested data, suggested items, total fees, total payment, total costs with no itemization, dinner, activity, location, time, safety videos, booking helping, booking assistants, booking services, contact terms, contract data, how long the date is, what the terms of the date is, how long you need to stay to get paid, the users profile or background information or verified information regarding the other dater, contract summary terms, a place to ask AI or ask the platform what is in the contract or about any terms and conditions, a date log with past date information in it or current date information, a background check on user or person, approved or denied posts or requests or items or content or items that user wanted the other user to buy, terms, help center, contract items, manage housekeeper or personalized services, how to get paid for the date, how to get paid for contractual agreements, submitted agreements, approved agreements, makeup artist booking, 3rd party booking, getting items delivered to the house, getting services delivered, getting items delivered, getting services provided, approved services, suggested services, advertisements, recommended things to purchase, suggested other dates go on, profile information, the profile of users, comparable users, users to compare, additional management tools, etc.)

In some embodiments, this may not have to show only, which may include but not be limited to (e.g., if the date has been paid for, etc.) user interface may be also show if it was reserved or something along those lines, etc.) In some embodiments, in this particular figure user interface may show, which may include but not be limited to (e.g., after a date has been booked and paid for by "joe," in which the contract terms are shown in easy to understand language and shorter words to describe, etc.) In some embodiments, user interface may show for example, which may include but not be limited to (e.g., a link for the creator or the model to understand the duration, check-in, check-out, time stamp, time record, time and data record, location, time and data record, coordinate(s), of the contract from a legal standpoint or in legal terms or a longer version of the contract for exact wording, etc.) In some embodiments, this may be, which may include but not be limited to (e.g., downloaded, viewed, reviewed, shared, seen, collected, etc.) which may include but not be limited to (e.g., users, persons, 3rd party persons, dater's, etc.) which may include but not be limited to (e.g., public, personal information, safety information, information used for safety concerns, or safety reasons, etc.) In some embodiments, which may include but not be limited to (e.g., date log, management area, pay area, payment center, data collection area, management area, etc.) may show options for the, which may include but not be limited to (e.g., dater, user, or person, etc.) which may include but not be limited to (e.g., pay for hairstylists, book 3rd party persons, book, schedule, inquire about, pay, secure, secure makeup artists, create amazon beauty order, online beauty orders, online purchases, dresses delivered to the house by a foreign or a local store or shop, user interface may also show options to for example, which may include but not be limited to (e.g., request the person to buy you flowers, or sent you flowers, etc.) In some embodiments, for example, which may include but not be limited to (e.g., if the flower option may be clicked, the next screen may show options such as "ask 'person' to send you flowers to your house' 'ask person to show up with flowers and ask him to pay for them now and get them delivered to the person's house to give to you on the date' etc.) In some embodiments, there may be options, or user may have option for example, which may include but not be limited to (e.g., anywhere, at the bottom or buttons or visuals at the bottom, etc.) that may show for example, which may include but not be limited to (e.g., if the creator did submit a request for a hairstylist, or a makeup artist, or a beauty item to be ordered and paid for by the dater, then user interface may show that it was 'submitted' or 'asked' and then user interface may show a process in which user interface may be getting approved by the dater that is paying for the date, etc.)

In some embodiments, the user interface may show, for example, which may include but not be limited to (e.g., that it was denied or approved, why it was denied, why it was approved, any nice note, any note, reasons selected why, etc.) In some embodiments, the 'denials' may have a reason listed as to, which may include but not be limited to (e.g., why the dater may not want to pay for this on a 'first date, why a user may be able to pay, why a user may be able to provide item requested, why a user may be able to buy flowers, request information as to 'why' due to the situation or circumstances, etc.)

In some embodiments, This may also show options such as, which may include but not be limited to (e.g., 'book your hairstylist through our partners' 'book your makeup artist through our partners, 3rd party integration booking, 3rd party booking through, getting paid through, payment options, etc.) which may include but not be limited to (e.g., partnerships, advertisements, partnership, user's discounts, people that offer discounts, etc.) In some embodiments, there may be an option that the 'creator may be, which may include but not be limited to (e.g., pay, pre-pay, secure, etc.) which may include but not be limited to (e.g., own money, own funds, bank funds, date money, or use points, or use any payment that is creator or obtained through the platform through their services, whether that is dates, or money or points earned through their content, etc.)

Figure 48:
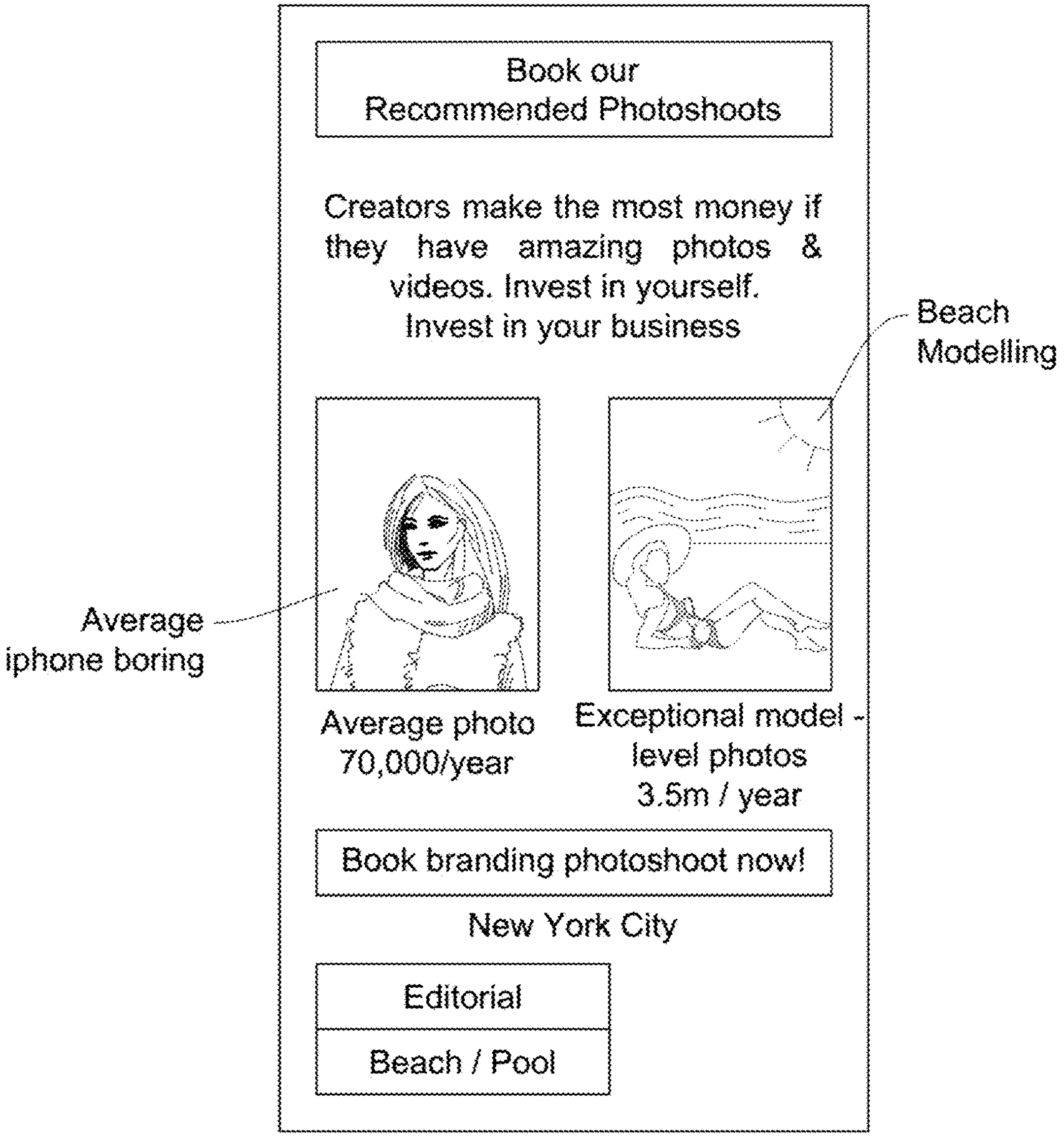

FIG. 48: In some embodiments, this may be a possible, which may include but not be limited to (e.g., user interface, user interface, screen, hologram, user interface, viewing display, page, etc.) or recommendation(s) to, which may include but not be limited to (e.g., show, demonstrate, explain, etc.) how using platform or how suggestions for using platform: which may include but not be limited to (e.g., comparing two types of profiles, comparing partnerships, comparing profiles, business information, partnership photoshoot, partnership requirements, advertisements or integrated advertisements for beauty or beauty pricing or suggestions, booking photoshoots or how to take better pictures, partnership item, items to increase business, items to help business, advertisements, etc.) may be able to, which may include but not be limited to (e.g., increase your business on the platform, increase the amount of money (e.g., you may, user, person, entity, 3rd party, robot, artificial intelligence, etc.) may make through the platform, any suggestions/advertisements/items/needed items/wanted items for their business or personal, etc.) In some embodiments, figure may demonstrate, which may include but not be limited to (e.g., two different options, options, or more information, etc.) that may be able to explain how, which may include but not be limited to (e.g., explained item, photoshoots, invested content, 3rd parties, advertisers, advertisements, businesses, etc.) which may increase likelihood that someone would, which may include but not be limited to (e.g., book a date, spend money on unlocking their exclusives, spend money on subscriptions for their page, spend money on booking in-person dates, spend money on customized entertainment, entertainment, requested entertainment, entertainment, requests, etc.) In some embodiments, this may show easy options/options to book, schedule, inquire about, inquire about, inquire regarding, secure, create connection to, hold, pay for, create business relationship with, use transmittables to secure or book, schedule, inquire about, etc.) which may include but not be limited to (e.g., directly, or somehow, or with, or contributing to, etc.) which may include but not be limited to (e.g., partner sites, partner photographers, partner videographers, etc.)

In some embodiments, this may include, which may include but not be limited to (e.g., hiding the names of the photographers, just showing their work, only showing some parts, etc.) so that the creator will only be able to book schedule, inquire about, inquire about, ask regarding, secure, create connection to, hold, pay for, create business relationship with, use exchangeable to secure or book, schedule, inquire about, etc.) it through our platform and may not reach out directly to the, which may include but not be limited to (3rd party, partner, photographer, etc.) which maintain the partnership exclusivity between the platform and its founded and recommended partners. In some embodiments, not showing names of partner sites allows the platform may be, which may include but not be limited to (e.g., options or the only option, or a potential option, etc.) to, which may include but not be limited to (e.g., book through partner sites, obtain referral fees, referrals, etc.) without allowing the creator on our platform to bypass booking through our site and book directly with the partners to maintain, which may include but not be limited to (e.g., referral payments, booking payments, 3rd party connections, secrecy, connection, fees, etc.) to the platform. In some embodiments, the figure may demonstrate different options, which may include but not be limited to (e.g., for example 'New York City' or 'Dallas,' or Chicago, or London, etc.) and then (e.g., you may, user, person, entity, 3rd party, robot, artificial intelligence, etc.) may be able to filter by, which may include but not be limited to (e.g., 'editorial' 'beach photos' glamour shots' 'pageantry photos,' etc.) to find or explore the partnership photo, video, and content partners. In some embodiments, not showing the names of the partner sites may be include anything that the platform is partnered with, which may include but not be limited to (e.g., flower shops, restaurants, gift cards, online stores, retail stores, other websites, small businesses, freelancers, employees, photographers, videographers, studios, investment firms, investors, other people, etc.)

Figure 49:
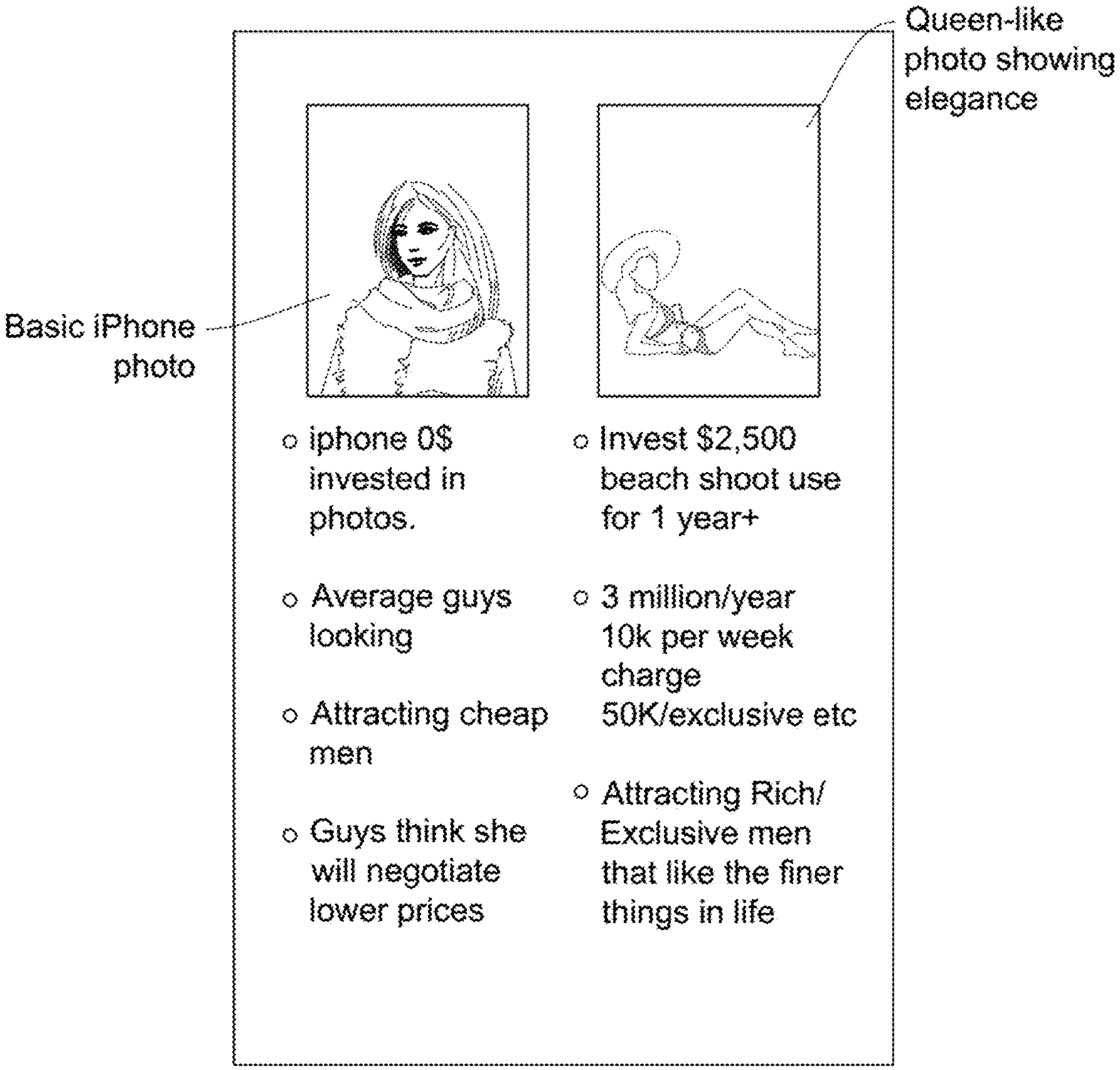

FIG. 49: In some embodiments, the user interface may be a, which may include but not be limited to (e.g., longer, extended, shown, created, visualized, exampled, etc.) version, which may include but not be limited to (e.g., showing, explaining, visualizing, content-creating, etc.) with, which may include but not be limited to (e.g., photos, scenarios, videos, training, information that may show the different business models of two people or multiple people and how investing in better images, videos, training, learning, knowledge, safety videos that may be able to help the 'business owner, content creator, person, user' maintain their highest capabilities when using the platform in any capacity, integrated advertisements or integrated ads, or videos showing ads in an authentic way such as someone just showing product or item, etc.)

In some embodiments, this may be a possible, which may include but not be limited to (e.g., user interface, user interface, screen, hologram, user interface, viewing display, page, etc.) or recommendation(s) to, which may include but not be limited to (e.g., show, demonstrate, explain, etc.) how using platform or how suggestions for using platform: 'which may include but not be limited to (e.g., comparing two types of profiles, comparing partnerships, comparing profiles, suggestive business information, partnership photoshoot, partnership requirements, partnership item, items to increase business, things to help business, advertisements, etc.) may be able to, which may include but not be limited to (e.g., grow your business on the platform, increase the amount of money (e.g., you may, user, person, entity, 3rd party, robot, artificial intelligence, etc.) may make through the platform, any suggestions/advertisements/items/needed items/wanted items for their business or personal, etc.) In some embodiments, figure may demonstrate, which may include but not be limited to (e.g., two different options, options, or more information, etc.) that may be able to explain how, which may include but not be limited to (e.g., described item, photoshoots, invested content, 3rd parties, advertisers, advertisements, businesses, etc.) which may increase likelihood that someone would, which may include but not be limited to (e.g., book a date, spend money on unlocking their exclusives, spend money on subscriptions for their page, spend money on booking in-person dates, spend money on customized entertainment, entertainment, requested entertainment, entertainment, requests, etc.)

In some embodiments, this may be shown as a, including but not limited to (e.g., date subscription model, membership option, membership model, pre-pay model, etc.) In some embodiments, this may be potentially be a, which may include but not limited to (e.g., date subscription model, membership model pre-pay model, etc.) for, which may include but not limited to (e.g., in-person dates per month/time period, dates per time period, connection(s) per time period, etc.) that may allow dater to pay or obtain, which may include but not be limited to (e.g., for a monthly fee, for a fee, for a price for a time duration, check-in, check-out, time stamp, time record, time and data record, location, time and data record, coordinate(s), a one-time fee, on-going fee, credit-fee, credit subscription, pre-paid subscription, a subscription price during any time period or duration, check-in, check-out, time stamp, time record, time and data record, location, time and data record, coordinate(s), which may include but not limited to (e.g., to obtain hand-picked, or hand-set, or expert-picked, or "dates arranged by someone else with less work to the client, etc.) in exchange for a, which may include but not be limited to (e.g., set cost, monthly cost, yearly cost, or on-going fixed price or an exchange amount of dates. Which may have one option or more than one option with set prices, price ranges, general pricing, general exchangeable, buy-now prices, price ranges, general pricing, general exchangeable, monthly prices, price ranges, general pricing, general exchangeable, yearly prices, price ranges, general pricing, general exchangeable, or lifetime prices, price ranges, general pricing, general transmittables, etc.)

In some embodiments, this may show easy options/options to book, schedule, inquire about, inquire about, ask regarding, secure, create connection to, hold, pay for, create business relationship with, use exchangeable to secure or book, schedule, inquire about, etc.) which may include but not be limited to (e.g., directly, or somehow, or with, or contributing to, etc.) which may include but not be limited to (e.g., partner sites, partner photographers, partner videographers, etc.) In some embodiments, this may consist of, which may include but not be limited to (e.g., hiding the names of the photographers, just showing their work, only showing some parts, etc.) so that the creator will only be able to book schedule, inquire about, inquire about, ask regarding, secure, create connection to, hold, pay for, create a business relationship with, use exchangeable to secure or book, schedule, inquire about, etc.) it through our platform and may not reach out directly to the, which may include but not be limited to (3rd party, partner, photographer, etc.) which maintain the partnership exclusivity between the platform and its founded and recommended partners. In some embodiments, not showing names of partner sites allows the platform may be an, which may include but not be limited to (e.g., option, selection, choice, options or the only option, or a potential option, etc.) to, which may include but not be limited to (e.g., book through partner sites, obtain referral fees, referrals, etc.) without allowing the creator on our platform to bypass booking through our site and book directly with the partners to maintain, which may include but not be limited to (e.g., referral payments, booking payments, 3rd party connections, secrecy, connection, fees, etc.) to the platform. In some embodiments, the figure may demonstrate different options for 'New York City' or 'Dallas' and then (e.g., you may, user, person, entity, 3rd party, robot, artificial intelligence, etc.) may be filtered by 'editorial' 'beach photos' glamour shots' 'pageantry photos' to find or explore the partnership photo, video, and content partners. In some embodiments, not showing the names of the partner sites may be include anything that the platform is partnered with, which may include but not be limited to (e.g., flower shops, restaurants, gift cards, online stores, retail stores, other websites, small businesses, freelancers, employees, photographers, videographers, studios, investment firms, investors, other people, etc.)

Figure 50:
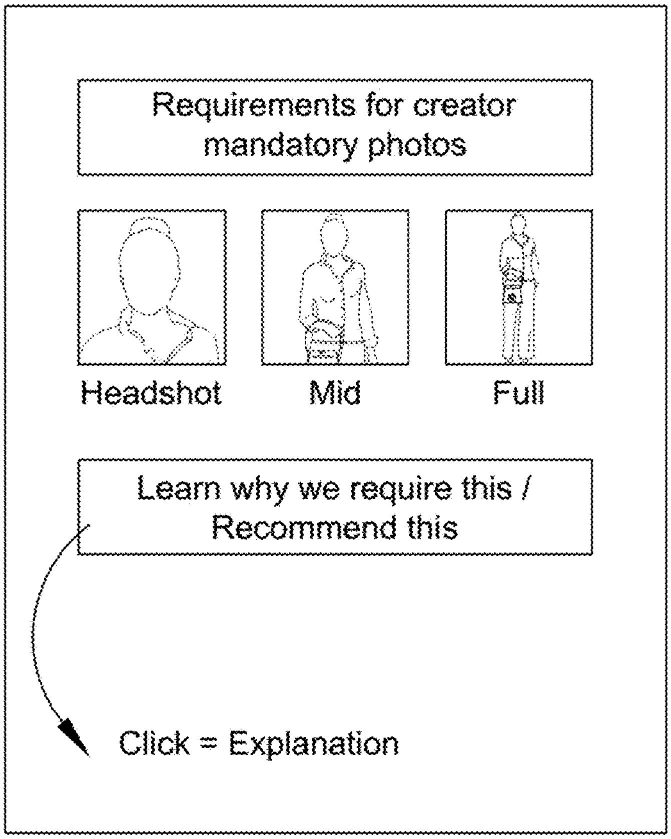

FIG. 50: In some embodiments, this figure may show, which may include but not be limited to (e.g., suggestions, requirements, highly recommended pictures/videos for profile, highly-recommended suggestions/requirements, mandatory requirements, etc.) In some embodiments, for example, there may be, which may include but not be limited to (e.g., mandatory, highly recommended, needed, suggested, etc.) options from the platform, and the platform may specific, which may include but not be limited to (e.g., entities, persons, users, etc.) which may include but not be limited to (e.g., more, less, higher, frequent, etc.) which may include but not be limited to (e.g., recommended, shown, suggested, aligned with, moved around, bigger, seen more, suggested more, distributed to, etc.) using, which may include but not be limited to (e.g., machine learning, computing operation, humans, persons, clicking, frequency, etc.) due to potentially, which may include but not be limited to (e.g., seeing, meeting with, aligning to, suggesting, etc.), which may include but not be limited to (e.g., criteria, requirements, etc.) that may have been, which may include but not be limited to (e.g., recommended, noted, given, suggested, etc.) In some embodiments, user interface or process may be an option, but may be a way for the platform to have, which may include but not be limited to (e.g., mandatory, highly recommended requirements, more suggested requirements, alignment with goals, etc.) for, which may include but not be limited to (e.g., models, creators, persons, etc.) that want to be, which may include but not be limited to (e.g., recommended, shown, seen, viewed, etc.) which may include but not be limited to (e.g., less, more, more often, many times, etc.) In some embodiments, the user interface may have universal requirements of content or non-universal requirements. In some embodiments, unity requirements may be an option to give a, which may include but not be limited to (e.g., comparable, leveled option, leveling, easily distinguishable option or view, etc.) for the, which may include but not be limited to (e.g., content, user interface, section, screen, hologram, user interface, viewing display, item, original, user-created, platform-owned, platform, 3rd party, business, entity, etc.)

In some embodiments, unity requirements may or may not be, including but not limited to (e.g., needed, enforced, suggested, shown, computing operation-affecting, etc.) In some embodiments, unity requirements may be, which may include but not be limited to (e.g., recommended, suggested, more favored, required, etc.) In some embodiments, there may be user interface, which may include but not be limited to (e.g., user liking another user, user showing interest in another user, user viewing another users profile, live shows, live events, live streaming, pre-recorded streaming, pre-recorded shows, pre-made content, content, photos, videos, communication, chat boxes, options or areas to share information, communication, chats, emojis, send money, send tips, send hearts, unlock profile/content, unlock content, location availability, availability for booking, availability to book, schedule, inquire about, inquire about, ask regarding, secure, create connection to, hold, pay for, create business relationship with, use transmittables to secure or book, schedule, inquire about, etc.) dates, availability to message, messages, prices, price ranges, general pricing, general transmittables, types, categories, a section at the Bottom, top, side, anywhere, with other suggestions or profiles, or persons, or promotional material or content or information etc.) In some embodiments, options may include but are not limited to (e.g., move, scroll, switch, disappear, reappear, swipe, any content or items, etc.)

Figure 51:
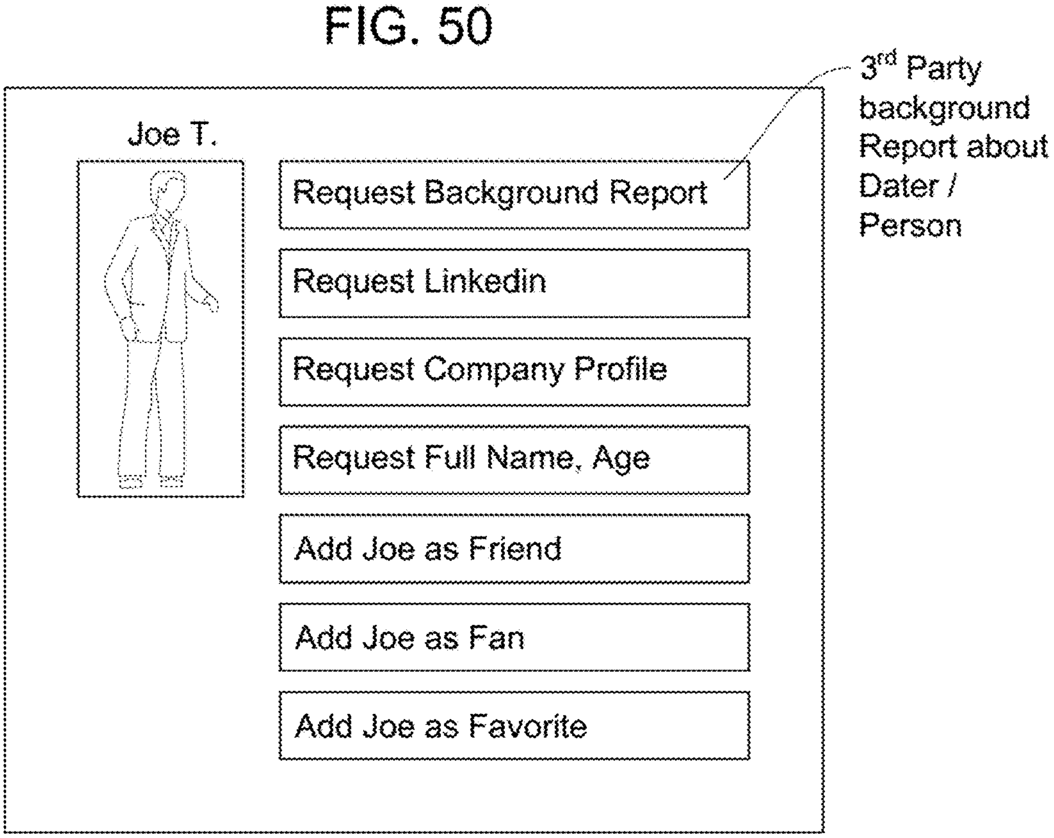

FIG. 51: In some embodiments, user interface may be the creators view, which may include but not be limited to (e.g., after, before, during, before, connection time, during connection, while communicating, publicly, viewed publicly, any user's/person's view, etc.) a date is, which may include but not be limited to (e.g., paid, created, secured, settled, agreed to, booked, communicated about, messaged about, offer made, etc.) or to view the, which may include but not be limited to (e.g., user, dater, connection, person, robot, 3rd party, human, robot, bot, 3rd party, entity, computer system, AI system, etc.) In some embodiments, there may be various ways that the, which may include but not be limited to (e.g., user, creator, person, 3rd party, robot, entity, etc.) may request a, which may include but not be limited to (e.g., background report, request background report, request verification for user on platform, request information regarding user, add user as fan, add user as friend, add user as favorite, add tag to user, public information, private information, private investigation, background, social media, socials, references, records, etc.) from the, which may include but not be limited to (e.g., 3rd party background reporting platform, 3rd party, person, user, anyone, robots, artificial intelligence, etc.)

In some embodiments, the creator may be request the, which may include but not be limited to (e.g., interested person, dater, user, public person, looker, subscriber, follower etc.) to send, which may include but not be limited to (e.g., her, his, (their), etc.) which may include but not be limited to (e.g., LinkedIn profile, additional information, social medias, background reports, background, background report, public information, private information, private investigation, full information, request full name, background, social media, socials, references, records, etc.) there may be 'requests options' for the, which may include but not be limited to (e.g., creator, person, user, dater, etc.) to request (e.g., person's, entities, 3rd parties, advertisers, advertisements, businesses, specific person's users, etc.) which may include but not be limited to (e.g., company business profile, personal information, references, options to add this person as a friend, options to add them as a fan, add them as a favorite, add this person to a list or a directory to organize people within the creators database, etc.) In some embodiments, the creator may be able to also ask user's, which may include but not be limited to (e.g., identification, background, report, records, criminal background, personal identifying information, full name, age, or any other identifying information, etc.) which may include but not be limited to (e.g., prior to, before, during, before, before payment, during connection, before message, during message, after payment is made, etc.) which may include but not be limited to (e.g., a date, a connection, a virtual meeting, a communication, at any time, or prior to deciding whether to meet, etc.) which may include but not be limited to any, which may include but not be limited to (e.g., user, person, entity, anyone, etc.) which may include but not limited to (e.g., in person, virtual connection, subscribers, followers, booked date, in-person, events, meetings, events, etc.)

In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, areas, profiles, content, or hologram or display screens, etc.) to continue to look or get automated, which may include but not be limited to (e.g., looking, viewings of, movement, selection, scroll, etc.) which may include but not be limited to (e.g., content, creators, models, users, etc.)

Figure 52:
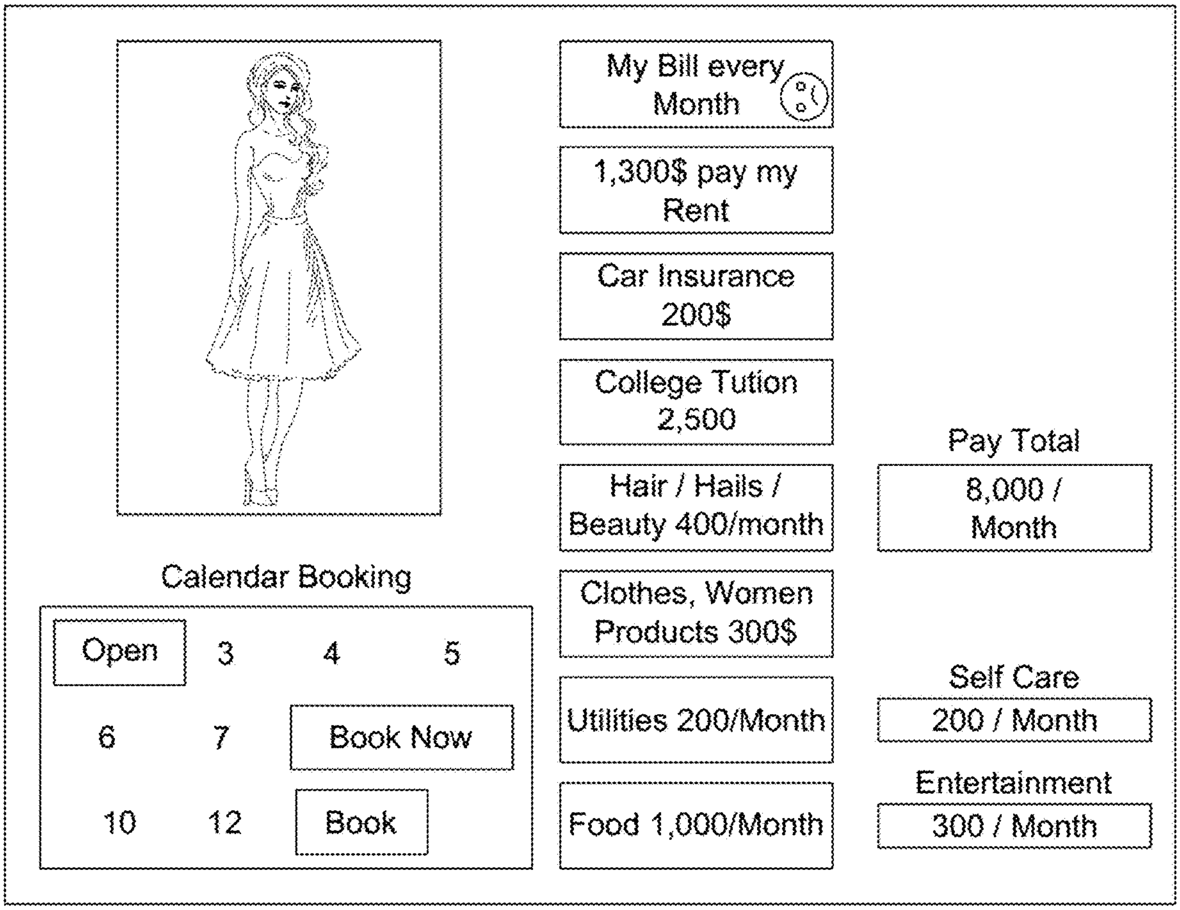

FIG. 52: In some embodiments, user interface, which may include but not be limited to (e.g., screen, hologram, user interface, viewing display, user interface, etc.) which may include but not be limited to (e.g., public, private, hidden, separate, shown, not shown, special links, listed items, ways to purchase items, ways to send money, ways to contribute to monthly fund to live, ways to send transmittables, special sent, sent or shipped items, items offered, etc.) which may include but not be limited to (e.g., demonstrate, connection, 3rd party integration, allow payment for, accept payment, ways to send exchangeable, etc.) which may include but not be limited to (e.g., users, persons, models, creators, etc.) which may have but not be limited to (e.g., bills, total payments, total expenses, total bills as an invoice, invoice of costs, fees, separate expenses, lists of items user wants others to purchase, lists of expenses or items needed, list of groceries, list of things necessary for their hobbies such as 'ice skating or dance lessons' per week or per month, gym cost, health-related expenses, purses or other items needed or wanted, things from other sites, list of expenses, list of items to be paid, bills, etc.) every, which may include but not be limited to (e.g., month, year, day, week, period, fiscal year, calendar year, lifetime, forever, annually, per time period, etc.)

In some embodiments, there may be, which may include but not be limited to (e.g., separate link, 3rd party integration, separate integration, link, funding, payments, money, assets, etc.) which may allow or include but not be limited to (e.g., processing, transactional payment, payment, asset exchange, asset giving, money giving, donations, money, etc.) that may go to the platform for the, which may include but not be limited to (e.g., donor, user, paying person, fan, boyfriend, particular person, person dating, dater, etc.) to pay their, which may include but not be limited to (e.g., model, user, creator, dater, the person being paid, etc.) which may include but not be limited to (e.g., bills, items, wants, needs, suggestions, debts, debtors, landlords, government, entities, persons, etc.) each, which may include but not be limited to (e.g., month, year, day, week, period, fiscal year, calendar year, lifetime, forever, etc.)

In some embodiments, there may be a, which may include but not be limited to (e.g., next process, next thing that happens, third process, next process that is happening after adding this person as their 'boyfriend, etc.) which may result in the may include but not be limited to (e.g., special person, boyfriend, etc.) getting 'special treatment such as, which may include but not be limited to (e.g., not receiving 'instructional emails, not receiving emails that may suggest they don't know how to go on a date, not receiving basic etiquette rules at this point etc.) which may suggest that the creator and the person may have went on a successful date and now she is informing the platform that this person is her may include but not be limited to (e.g., special friend, boyfriend, etc.) In some embodiments, the may include but not be limited to (e.g., 'boyfriend'" or 'special person, etc.) may be treated, which may include but not be limited to (e.g., differently, obtain special treatment, be put on list, added to category, etc.) than other users, or get special treatment, which may include but not be limited to (e.g., not receiving emails on how to act on a date or how to pull out chairs, not receiving marketing emails, not getting suggestions, suggesting more with this user on their user interface, price changes, lower prices, more date availabilities, VIP treatment such as 'access to all photos/videos/at the discretion of the user, etc.) In some embodiments, this may come or, which may include but not be limited to (e.g., after, before, during, way after, later, etc.) which may include but not be limited to (e.g., meeting, virtual meeting, in-person meeting, date, connection, message, subscribing, adding, adding to list, amount of money spent, etc.) has, which may include but not be limited to (e.g., been sent, been added, completed, successfully completed, good feedback, communication has occurred, etc.)

In some embodiments, there may be an, which may include but not be limited to (e.g., autopay, automatic, (e.g., timer, time stamp, location stamp, business location stamp, confirmation of time, location, data, etc.) calendar set up, automatic set up, auto transfer, transfer, etc.) option that the 'dater' or 'other person' may be able to, which may include but not be limited to (e.g., turn on, create, list, implement, allow, agree to, set up, link, contractually agree to, verbally agree to etc.) which may create an, which may include but not be limited to (e.g., autopay, automatic, etc.) which may include but not be limited to (e.g., timer, time stamp, location stamp, business location stamp, confirmation of time, location, data, calendar set up, automatic set up, auto transfer, transfer, etc.) which may include but not be limited to (e.g., method, data, etc.) In some embodiments, this may allow the, which may include but not be limited to (e.g., 'dater,' user, person, paid person, creator, model, etc.) to be, which may include but not be limited to (e.g., 'transparent' or 'upfront,' or show, or explain, or show how, about, information etc.) about their expenses each month to show, which may include but not be limited to (e.g., how they need help, what they need, how they need, how much etc.) or, which may include but not be limited to (e.g., show where they need payments to be directed to, show 3rd party, link 3rd party, integrate 3rd party, integrate payment options, allow payments to be made to, allow donations for, allow money to be used towards, allow money, accept payment, etc.) In some embodiments, user interface may allow a, which may include but not be limited to (e.g., link that leads the person directly to show who they are paying on behalf of 'who' meaning the 'creator' or person, automatic payment, anonymous payment, any type of payment, partial payment, secure payment, donation payment, partially pay, transfer money, etc.) In some embodiments, user interface may, which may include but not be limited to (e.g., 'private sensitive (any) information,' any items, any info, any persons, any users, any sensitive information, etc.) which may include but not be limited to (e.g., make any information private, allow private payment, allow anonymous payment, allow anonymous partial payment, allow donation privately, anything or any part may be private such as their first and last name or other identifying information, allow the 'dater' to make an 'anonymous' payment or set up an 'anonymous autopay' for any expense, donation request, item request, bill, item owed, debt owed, etc.)

In some embodiments, there may also be a, which may include but not be limited to (e.g., button, option, 3rd party link, 3rd party integration, partial payment, payment, asset exchange, any asset acceptance, etc.) for the, which may include but not be limited to (e.g., 'dater,' paying person, user, participant, pursuer, person, etc.) to, which may include but not be limited to (e.g., pay, add, see, view, know, understand, etc.) their, which may include but not be limited to (e.g., entire or partial, or any part, etc.) of, which may include but not be limited to (e.g., listed, shown, demonstrated, verbally spoken, contractually added, agreed upon, shown, asked for, etc.) which may include but not be limited to (e.g., expenses, items, needs, wants, suggestions, bills, past debts, debts, etc.) which may disperse, which may include but not be limited to (e.g., any, partial, all, etc.) payments to the entirely which may be, which may include but not be limited to (e.g., separate, together, senate items, separate expenses, different bills, different debts, etc.) to the appropriate, which may include but not be limited to (e.g., debtors, landlords, entities, businesses, debtors, college tuition payments, vendors, persons, humans, robotics, entities, payments to be made with any pre-payment or debt, etc.) In some embodiments, the options that may pull up when the option to, which may include but not be limited to (e.g., exchange assets, send assets, use assets, pay, make payment, etc.) may be clicked which may be demonstrated, which may include but not be limited to (e.g., (1) 'here is the one-time payment for the month of xyz' (2) set up auto payment for 'then (e.g., you may, user, person, entity, 3rd party, robot, artificial intelligence, etc.) may be click how many months to autopay this specific payment.' etc.)

In some embodiments, for example, which may include but not be limited to (e.g., the autopay may show that user interface may be may cancelled after month one, etc.) by (e.g., choosing, allowing, having accepted, automatic acceptance, manually accepting, allowing, voice commands, artificial intelligence-created or assisted or chosen, clicking, etc.) 'may have cancellation options' which may be any type of cancellation options such as, which may include but not be limited to (e.g., voice commands, auto-cancellation, manual cancellation, robotic cancellation, AI cancellation, etc.) In some embodiments, the 'one-time payment' may be the full amount to, which may include but not be limited to (e.g., cover, be sent to, complete, accept, etc.) or there may be an option to choose, which may include but not be limited to (e.g., how much, partial, portion of etc.) of the payment to be made, for example, which may include but not be limited to (e.g., [one payment options, which may be to pay rent for month of October], the option is to pay [500 of 1,300 of rent for month of October.], etc.) In some embodiments, user interface may show, which may include but not be limited to (e.g., remaining balance, balance left, more money to be paid, bill, invoice, rest of the payment, etc.) which may be, which may include but not be limited to (e.g., created balance, 3rd party balance, manually created balance, automatic balance, shown balance, shown payment, etc.) which may be after the payment is made which may allow, which may include but not be limited to (e.g., order, option, viewing, option to finish, option to pay, balance viewing, auto-payment to be made etc.) for the rest to be, which may include but not be limited to (e.g., paid, extended, booked, transmittables, assets paid, assets given, etc.) which may come after their, which may include but not be limited to (e.g., 'partial' payment option, or trust fund, or semi-payment, or pre-booking payment, or secure payment, etc.)

Some embodiments may include but not be limited to (e.g., total, partial, auto payments, any payment, any donation, donations, acceptances, etc.) may be available as options. In some embodiments, which may include but not be limited to (e.g., rewards, recognition, upgrades, acknowledges, acknowledges, VIP, special treatment, etc.) may be offered or awarded for, which may include but not be limited to (e.g., making payments for bills or other expenses, setting up automatic compensation for bills, paying all fees, making partial payments, covering essential costs such as 'rent, etc.) which may be offered or awarded in ways such as a, which may include but not be limited to (e.g., badge' or an 'award, etc.) on behalf of the, which may include but not be limited to (e.g., platform, the date, creator, entity, 3rd party, etc.) In some embodiments, an award may be a virtual reward such as a badge, a friendly email, or something automatic or manually written. In some embodiments, there may be a, which may include but not be limited to (e.g., subsequent process, next thing that happens, third process, following procedure that is happening after adding this person as their 'boyfriend, etc.), which may result in the may include but not be limited to (e.g., particular person, boyfriend, etc.) getting 'special treatment such as, which may include but not be limited to (e.g., not receiving 'instructional emails, not receiving emails that may suggest they don't know how to go on a date, not receiving basic etiquette rules at this point, etc.) which may indicate that the creator and the person may have went on a successful date and now she is informing the platform that this person is her may include but not be limited to (e.g., special friend, boyfriend, etc.)

In some embodiments, the, may include but not be limited to (e.g., 'boyfriend' 'or 'particular person, etc.) may be treated differently than other users, or get special treatment, which may include but not be limited to (e.g., not receiving emails on how to act on a date or how to pull out chairs, not receiving marketing emails, not getting suggestions, suggesting more with this user on their user interface, price changes, VIP treatment such as 'access to all photos/videos/ at the discretion of the user, etc.) In some embodiments, this may come or, which may include but not be limited to (e.g., after, before, during, way after, later, etc.), which may include but not be limited to (e.g., meeting, virtual meeting, in-person meeting, date, connection, message, subscribing, adding, adding to list, amount of money spent, etc.) has, which may include but not be limited to (e.g., been sent, been added, completed, completed, good feedback, communication has occurred, etc.)

Figure 53:
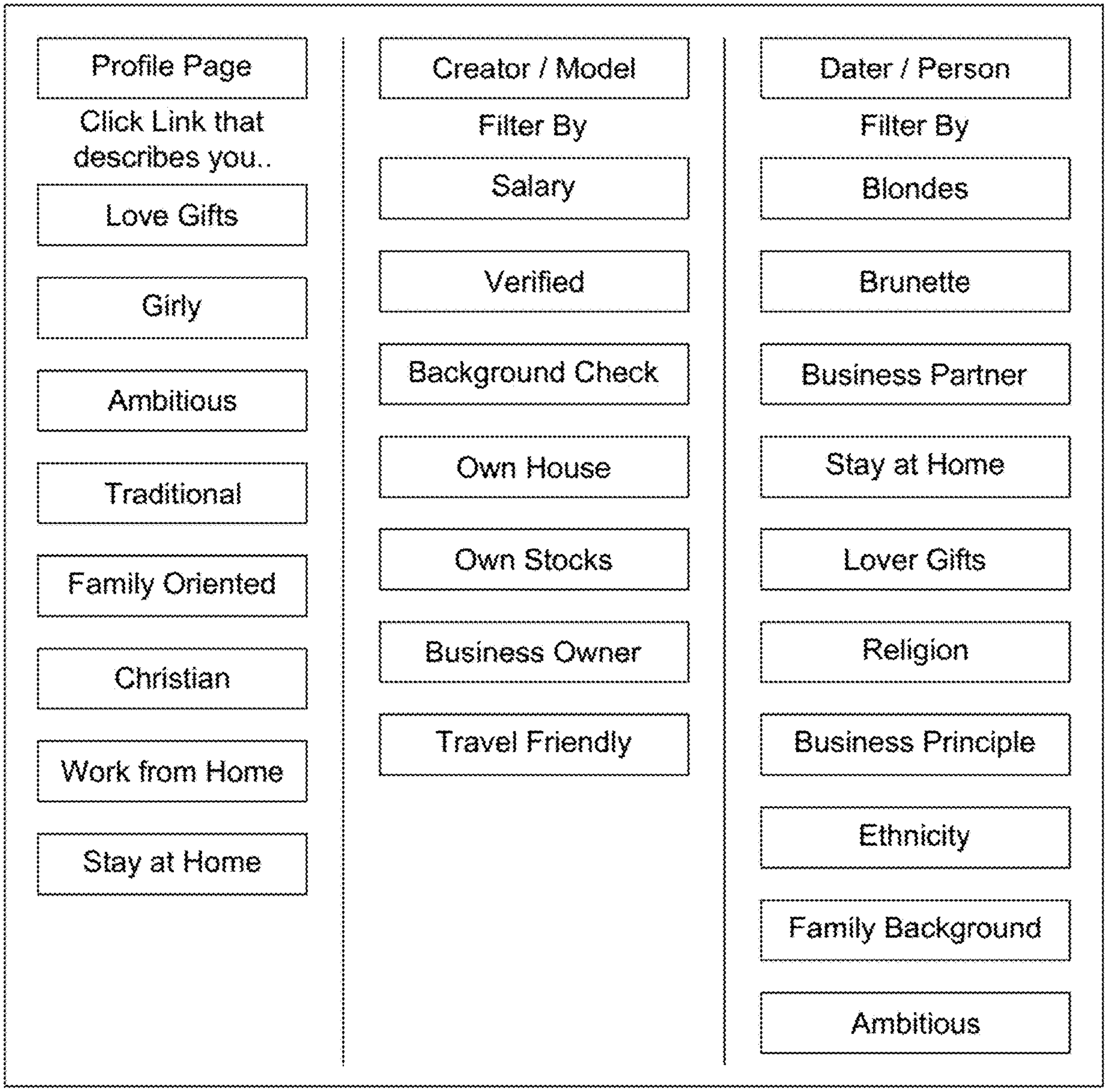

FIG. 53: In some embodiments, this may give the option to, which may include but not be limited to (e.g., filter, searching, search perimeters, exploring, options, browsing, view, categorize, separate, etc.) by, which may include but not be limited to (e.g., salary, verified user, background check, own real estate, own stocks, loves gifts, lists of gifts, lists of items wanted, social media profiles, links to other profiles, own business, travel friendly, religion, business partner, brunette, blonde, age, height, weight, loves to model, shopping, store items, items to buy, loves to take pictures, loves to cook, loves to take care of man, business principles, tags, assets, information, relationship status, single or not single, what you are looking for, ethnicity, family background, business ambitious, loves to talk about business, loves to talk about stocks, loves to shop, loves fashion, loves modeling, cooks at home, likes to eat out, likes to visit new places or travel, busty, petite, short, curvy, thick, busty, wants to work from home, wants to stay at home, etc.) In some embodiments, the user interface may show how the profile page of the 'dater' or person may be shown to have the, which may include but not be limited to (e.g., creator, model, platform, user, or anyone, etc.) to, which may include but not be limited to (e.g., add, compare, separate, similar, make into groups, categories, etc.) which may include but not be limited to (e.g., categories, hashtags, words to describe them, self-describing tags, categories by self or by platform or 3rd party, groups, etc.)

In some embodiments, these, which may include but not be limited to (e.g., words, categories, filters, groups, tags, hashtags, etc.) may then, which may include but not be limited to (e.g., separate, link, group, compare, create with, allow together, collaborate, etc.) the, which may include but not be limited to (e.g., user, person, group, entity, etc.) to the filter and thus, which may include but not be limited to (e.g., entity, they, user, model, person, etc.) may be found through a, which may include but not be limited to (e.g., categorized, separate, grouped, filtered, separated, etc.) search, or they may show up based on other reasons such as, which may include but not be limited to (e.g., computing operations, history of the 'dater' or 'pursuer, other people on the platform, clicks, taps, views, activity, etc.) which may include but not be limited to (e.g., option, way, order, etc.) to create, which may include but not be limited to (e.g., meetings, views, connections, messages, follows, purchases, friends, bookings, etc.) In some embodiments, there may be options for 'gifting a date,' which may include but not be limited to (e.g., an outside person's paying for the entire or portion of a 'date' or 'meeting' or 'connection' or any user's 'requirements,' etc.) In some embodiments, outside or internal users may 'gift another user anything that may require, which may include but is not limited to (e.g., payments or exchange of value, etc.) which may include but not limited to (e.g., gift a date, gift an in-person date, give a virtual date, entertainment options set by anyone or model or user, gift a synchronized at-home date, gift a subscription, gift a subscription to the platform, etc.) In some embodiments, outside users may donate for these payments or exchanges of value to be made using potentially any assets that may include but are not limited to (money, crypto, deeds to a house, etc.) In some embodiments, payments may need to be converted to may include but are not limited to (e.g., fiat, crypto, financial, or standard payment exchange of value) to complete payment before payment or booking or exchange, or sale is made. Preferences/search options for 'bidders' or 'daters,' which may include but not be limited to (e.g., 'brunette' 'blonde' 'nearby' 'local," petite' 'busty' 'smile' 'sweet' 'submissive' 'career-oriented' 'need, want, 'photos' looks' mentorship' 'pretty face' 'pretty girl' 'girl next door' 'smart' 'nice-girl' 'psychology' 'dominant' 'loving' 'mature' 'college student' 'suggested' 'popular' student 'celebrity' 'gorgeous' 'model' online model' 'entrepreneur' 'model' creator' 'influencer type, influencer style, stylist, fashion 'full-time-creator' 'girl next door' 'influencer' 'nearby creators' 'creators in the city/nearby xyz' 'creators available specific date(s)/time/location/restaurant date, etc.) In some embodiments, there may be, which may include but not be limited to (e.g., scrolling, tapping, swiping, moving, discovery, etc.) options that may show a combination or one or more may include but not limited to (e.g., calendars of users, users content, calendars, calendar availability, scheduling option, locked content, unlocked content, exclusive content, follow options, users, content, users availability, etc.) In some embodiments, there may be 'discover or view or suggested, etc.) options that may be seen by may include but not be limited to (e.g., holograms, scrolling, automatic, discovery, locked, moving, swiping, searching, etc.)

Figure 54:
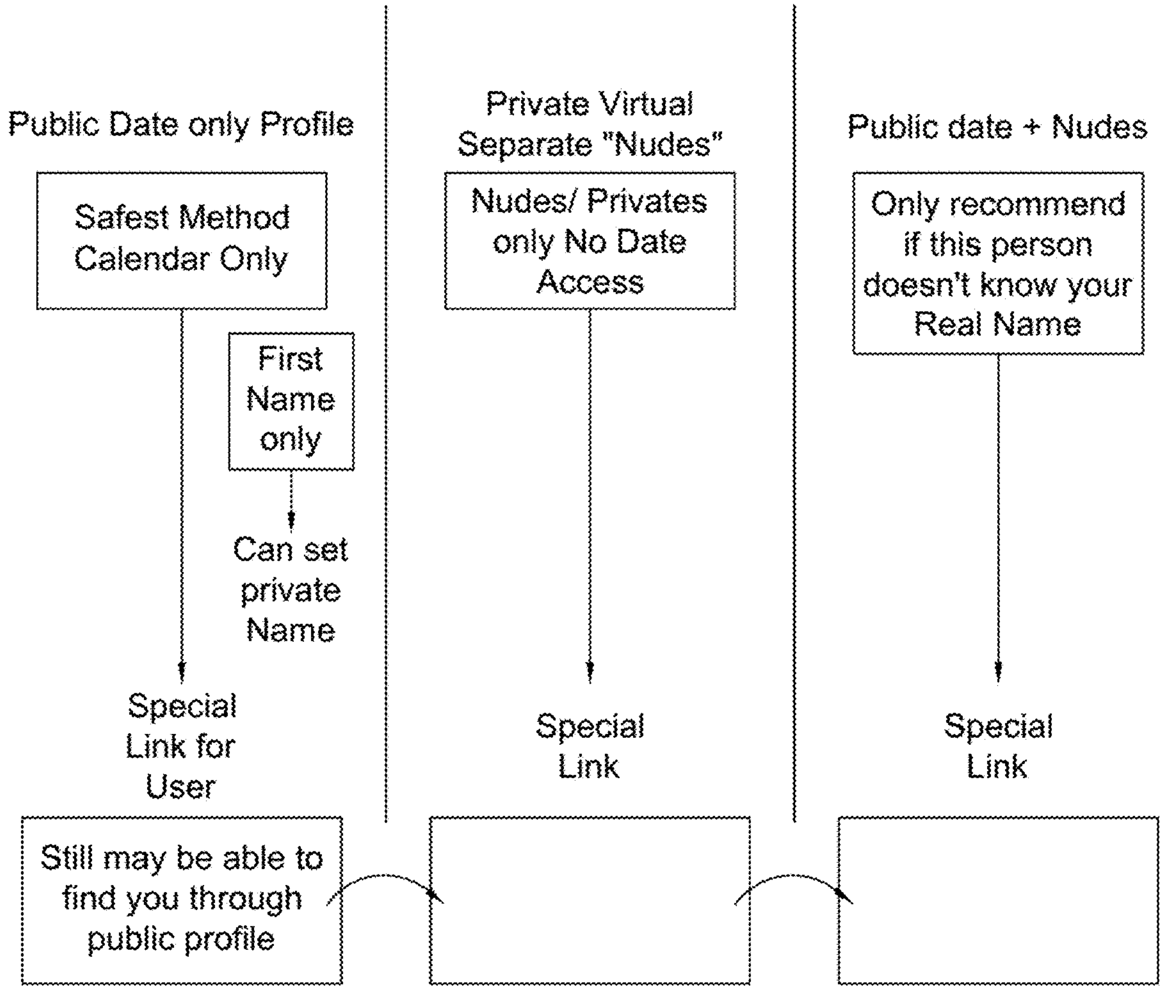

FIG. 54: In some embodiments, this may be a method that may include but not be limited to (e.g., creators, models, paid persons, persons, users, public, registered persons, verified persons, etc.) may be able to, which may include but not be limited to (e.g., show, send, change, change visualization, change or edit public or private visualization, shown, displayed, etc.) of their, which may include but not be limited to (e.g., information, public profile, shared profile, shared content, uploaded or any content, etc.) In some embodiments, which may include but not be limited to (e.g., for example, which may be including but not limited to if a model meets a person out in public and may not want that person to have access to 'NSFWs' 'inappropriate' 'suggestive,' public profile, non-membership profile, profile for members, subscriber-only content, content for paying customers, content for those that have spent quota amount, fans, etc.) types of (e.g., photos, media, content, information, etc.) but still wants that person or user or fan to be added on their profile, site, page, created business profile, etc.) In some embodiments, that person may have an 'alternate' version of their profile that this other person will only have access to unless it is manually changed by the creator or model, entity, 3rd party, or user at any time, non-membership pricing, non-membership viewing, locked content, unlocked content, etc.) In some embodiments, there may be specific profiles or viewing for those paying or members or not and are just public or regular registered users, non-followers, or non-subs, etc.)

In some embodiments, the user interface may be, which may include but not be limited to (e.g., changed, edited, dummy profile viewing, alternate version of the profile, second-connected profile, second profile to manage, other management profiles, etc.) to prevent dangerous situations when meeting new strangers and not wanting them to have access to any 'compromising information or photos.' In some embodiments, for example, which may include but not be limited to (e.g., the creator, model, or paid person, etc.) may have, which may include but not be limited to (e.g., one, two, 3, 4, or any number of different versions or alternate profiles, etc.) to, which may include but not be limited to (e.g., share, show, visualize, change, create, have available to whom they please, etc.) In some embodiments (e.g., a model, creator, paid person, etc.) may send a, which may include but not be limited to (e.g., potential 'dater' whom they have met in person or don't want to see the full profile, etc.) a, which may include but not be limited to (e.g., dulled down, dummy version, alternate version, different profile, different connected version of a profile, etc.) of their entire profile meant to, which may include but not be limited to (e.g., hide/obscure/private alternate photos, videos, and or information, etc.) but may still (e.g., all related to, connected to their actual profile, linked to their profile, a separate version of their profile, a different view but same management system, a connected system or management system, an individual or connected view, etc.) which may include but not be limited to (e.g., still be able to manage or connect to their payment receiving or booking calendar connection, management of creator, person, user, etc.)

In some embodiments, the creator may be in control of the person's, which may include but not be limited (e.g., abilities, view, obligations, options, message options, viewing options, etc.) which may include but not be limited to (e.g., viewing choices for their profile, control of the actual profile they see, their ability to see other related items, etc.) In some embodiments, during a 'sharing' of this 'alternate profile,' there may be a, which may include but not be limited to (e.g., 'bookmark made, Network address, IP address, saved, some way that every time that phone or desktop, etc.) that may be used, that it will only show the, which may include but not be limited to (e.g., alternate profile, changed profile, or allow creator per person to have the authority of which type of information is shown, etc.) regardless of if the user, which may include but not be limited to (e.g., paying person, the person that would book a date with that person, the person spending money, etc.) were to change their, which may include but not be limited to (e.g., Network address, IP address, phone, laptop, browser, etc.) In some embodiments, the alternate unique profiles or links may be anything from, which may include but not be limited to (e.g., suggestive photos, but nothing NSFW, sexy acts, sensual, entertainment, calendar information, personal information, more information, links to live events, or live shows, etc.) In some embodiments, there may be the 'regular option,' which may be their 'entire profile,' which may contain, which may include but not be limited to (e.g., sexy photos, calendar information, booking information, date information, virtual date information, acting, NSFWs, suggestive, boudoir, modeling, etc.)

Figure 55:
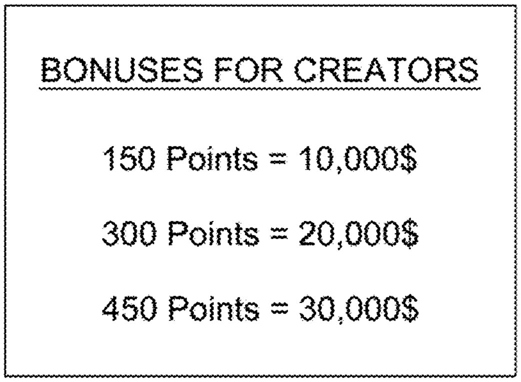

FIG. 55: In some embodiments, may include but not be limited to (e.g., payments, bonus payments, points, bought items, items that are pre-paid, gifts, gifting items, digital gifts, bonuses, extra money, fees, payment disbursement, paid events, paid photoshoots, paid participation, etc.) may be, which may include but not be limited to (e.g., given, gifted, dispersed, sent, etc.) to may consist of but not be limited to (e.g., creators, models, persons, users, etc). In some embodiments, there may be a may consist of but not be limited to (e.g., point system, scale, measuring method, point scale, spent scale, money scale, user frequent scale, etc.) that may take into 'consideration' may include but not be limited to (e.g., consideration, scaling system, AI scaling system, AI data collection input and output system, etc.) that may include but not be limited to (e.g., calculate or scale, or show, or take into consideration, etc.) anything may include but not be limited to (e.g., how many dates the creators has gone on, how many restaurant bookings, how many gifts are bought through the system, how many times rent has been paid through the system, how many bills have been paid through the system, etc.) In some embodiments, this may be at the 'discretion of the platform' to decide what the points or scale means meaning may include but not be limited to (e.g., how much money has been spent on the platform, how much money spent on individual or collective on creators, models, platform, other platforms, or items, etc.)

Figure 56:
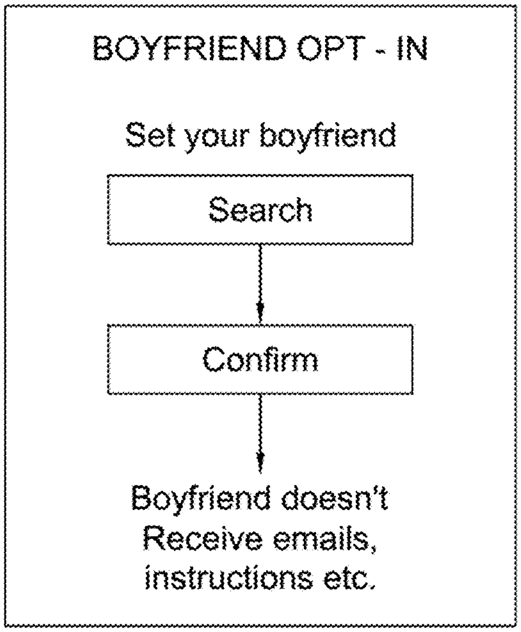

FIG. 56: In some embodiments, this may be an example of being the may include but not be limited to (e.g., 'boyfriend opt-in' system, etc.) which may allow the may consist of but not be limited to (e.g., creator, model, etc.) to may include but not be limited to (e.g., search for, find, add, suggest, etc.) their new may have but not be limited to (e.g., 'boyfriend, particular person, special friend, dater, person dating, etc.) and may be able to may include but not be limited to (e.g., add them as their boyfriend, special treatment, special dates, particular person, current dater person, etc.) In some embodiments, the may include but not be limited to (e.g., model, creator, etc.) may be able to may include but not be limited to (e.g., confirm, suggest, manage, etc.) some way to may consist of but not be limited to (e.g., ensure, offer, ad, add to the list, etc.) the, may include but not be limited to (e.g., searched person, found person, added person, suggested person, dater, user, etc.) is their may include but not be limited to (e.g., boyfriend, special friend, special dater, particular person, user VIP, etc.) In some embodiments, this list may come from may include but not be limited to (e.g., 'paid daters' that have spent money on the creator, inserted information, added manually, added automatically, those that have liked her profile, daters that have been on competed dates with, users or person in any way to search through their list of connections, etc.) that may be considered their may include but not be limited to (e.g., boyfriend, particular person, VIP, added to list, special treatment, etc.)

In some embodiments, there may be a, which may include but not be limited to (e.g., next process, next thing that happens, third process, next process that is happening after adding this person as their 'boyfriend, etc.) which may result in the may include but not be limited to (e.g., special person, boyfriend, etc.) getting 'special treatment such as, which may include but not be limited to (e.g., not receiving 'instructional emails, not receiving emails that may suggest they don't know how to go on a date, not receiving basic etiquette rules at this point etc.) which may suggest that the creator and the person may have went on a successful date and now she is informing the platform that this person is her may include but not be limited to (e.g., special friend, boyfriend, etc.) In some embodiments, the may include but not be limited to (e.g., 'boyfriend" 'or' special person, etc.) may be treated, which may include but not be limited to (e.g., differently, obtain special treatment, be put on list, added to category, etc.) than other users, or get special treatment, which may include but not be limited to (e.g., not receiving emails on how to act on a date or how to pull out chairs, not receiving marketing emails, not getting suggestions, suggesting more with this user on their user interface, price changes, lower prices, more date availabilities, VIP treatment such as 'access to all photos/videos/at the discretion of the user, etc.) In some embodiments, this may come or, which may include but not be limited to (e.g., after, before, during, way after, later, etc.) which may include but not be limited to (e.g., meeting, virtual meeting, in-person meeting, date, connection, message, subscribing, adding, adding to list, amount of money spent, etc.) has, which may include but not be limited to (e.g., been sent, been added, completed, successfully completed, good feedback, communication has occurred, etc.)

Figure 57:
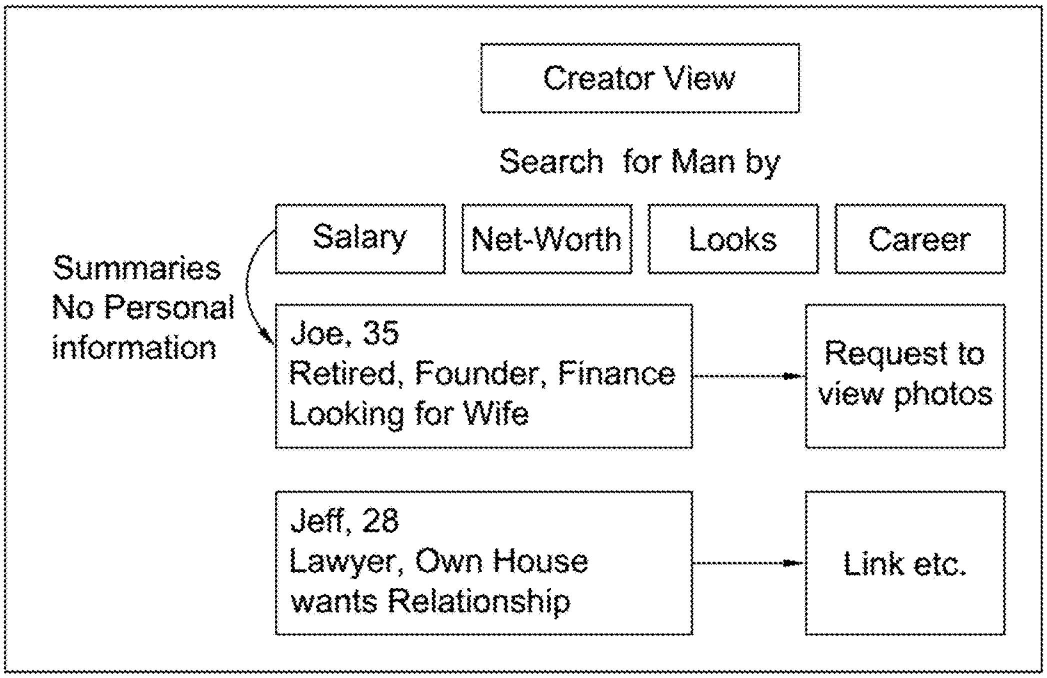

FIG. 57: In some embodiments, user interface may be the, which may include but not be limited to (e.g., models, paid creators view, any creators view, any users view, public view, user interface view, etc.) In some embodiments, user interface may be a, which may include but not be limited to (e.g., model, creator view, users view, public view, user interface view, etc.) in which the, which may include but not be limited to (e.g., user, model, girl, creator, paid dater, etc.) may show interest first or the other may show interest first whether they are paying or not they are a paying member or not a paying member, which may include but not be limited to (e.g., search the platform for a man to show interest in, contact a person, send message, allow messages, send a message, send a direct message, send inquiry, show interest, show interest, send wink, send like, send inquiry, send message, contact, ask about, request information, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, request to view more information or content, photos, exclusive photos, etc.) that she may be send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date, or wants to go out on a date etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, request to view more information or content, pay to view more information or content, spend money, see live, view live, view subscriptions, view money, view following, see weight, see height, view prices, price ranges, general pricing, general transmittables, subscribe, follow, book a date with her, book date, book meeting, block off her calendar, send her flowers, send her gifts, etc.) In some embodiments, categories that may be able to searched may include but not be limited to (e.g., looks, salary, net-worth, career, type, model-type, model feature, request to view more information or content, pay to view more content, marketing, paid for marketing, suggested, computing operation, looks, interests, prices, price ranges, general pricing, general transmittables, height, weight, popularity, suggestions, any prices, price ranges, general pricing, general transmittables, any pricing, changed prices, price ranges, general pricing, general transmittables, auction prices, price ranges, general pricing, general transmittables, bidding/auction prices, price ranges, general pricing, general transmittables, reserve prices, price ranges, general pricing, general transmittables, additional prices, price ranges, general pricing, general transmittables, types of accepted assets, etc.). In some embodiments described in this disclosure, the term "transmittables" may refer to exchangeables, receivables, funds, crypto, points, currency, etc., or any type of electronic data transmitted from one account to another.

Figure 58:
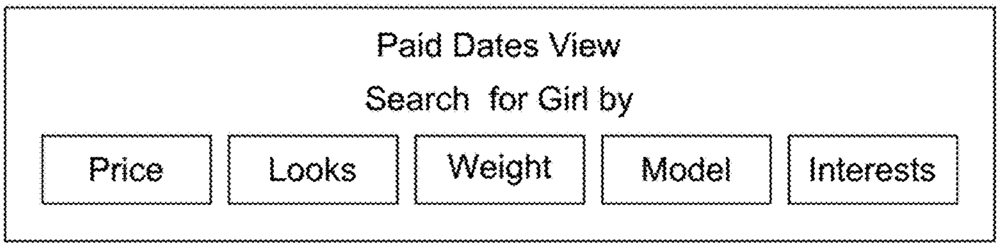

FIG. 58: In some embodiments, the user interface may be the, which may include but not be limited to (e.g., paying daters, the person paying, 3rd party paying, the entity paying, business paying, any gifting, gifting, donations, donating, user paying, the person spending money, person subscribing, the person on membership, person sending money, etc.) view. In some embodiments, the view that the, which may include but not be limited to (e.g., paying daters, persons paying, etc.) may be shown or defined as, which may have but not be limited to (e.g., those that are registered to obtain dates, those that pay or seek entertainment on the platform, etc.) may be able to view. In some embodiments, the user interface may include or have options such as searching for things, which may include but not be limited to (e.g., distance, price, looks, weight, model, interests, types, categories, etc.) In some embodiments, which may include but not be limited to (e.g., paying person, user, the person sending money, person pressuring, etc.), may be able to be searched by 'matching AI-connecting qualities' such as, which may include but not be limited to (e.g., distance, city, location, type, category, availability, attractiveness, etc.)

In some embodiments, user interface may be the, which may include but not be limited to (e.g., models, paid creators view, any creators view, any users view, public view, user interface view, etc.) In some embodiments, user interface may be a, which may include but not be limited to (e.g., model, creator view, users view, public view, user interface view, etc.) in which the, which may include but not be limited to (e.g., user, model, girl, creator, paid dater, etc.) may show interest first, which may include but not be limited to (e.g., search the platform for a man to show interest in, contact a person, send message, allow messages, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, request to view more information or content, photos, exclusive photos, etc.) that she may be send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date, or wants to go out on a date etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, request to view more information or content, pay to view more information or content, spend money, see live, view live, view subscriptions, view money, view following, see weight, see height, view prices, price ranges, general pricing, general transmittables, subscribe, follow, book a date with her, book date, book meeting, block off her calendar, send her flowers, send her gifts, etc.) In some embodiments, categories that may be able to searched may include but not be limited to (e.g., looks, salary, net-worth, career, type, model-type, model feature, request to view more information or content, pay to view more content, marketing, paid for marketing, suggested, computing operation, looks, interests, prices, price ranges, general pricing, general transmittables, any prices, price ranges, general pricing, general transmittables, any pricing, changed prices, price ranges, general pricing, general transmittables, auction prices, price ranges, general pricing, general transmittables, bidding/auction prices, price ranges, general pricing, general transmittables, reserve prices, price ranges, general pricing, general transmittables, additional prices, price ranges, general pricing, general transmittables, types of accepted assets, etc.)

In some embodiments, this may be shown as a, which may include but not be limited to (e.g., date subscription model, membership option, membership model, pre-pay model, etc.) In some embodiments, this may be potentially be a, which may include but not limited to (e.g., date subscription model, membership model pre-pay model, etc.) for, which may include but not limited to (e.g., in-person dates per month/time period, dates per time period, connection(s) per time period, etc.) that may allow dater to pay or obtain, which may include but not be limited to (e.g., for a monthly fee, for a fee, for a price for a time duration, check-in, check-out, time stamp, time record, time and data record, location, time and data record, coordinate(s), a one-time fee, on-going fee, credit-fee, credit subscription, pre-paid subscription, a subscription price during any time period or duration, check-in, check-out, time stamp, time record, time and data record, location, time and data record, coordinate(s), which may include but not limited to (e.g., to obtain hand-picked, or hand-set, or expert-picked, or "dates arranged by someone else with less work to the client, etc.) in exchange for a, which may include but not be limited to (e.g., set cost, monthly cost, yearly cost, or on-going fixed price or an exchange amount of dates. Which may have one option or more than one option with set prices, price ranges, general pricing, general transmittables, buy-now prices, price ranges, general pricing, general transmittables, monthly prices, price ranges, general pricing, general transmittables, yearly prices, price ranges, general pricing, general transmittables, or lifetime prices, price ranges, general pricing, general transmittables, etc.)

Figure 59:
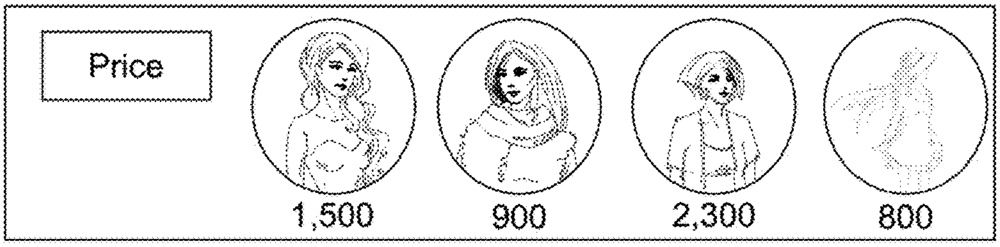

FIG. 59: In some embodiments, user interface may show the, which may include but not be limited to (e.g., price option, price, payment options, payments, availability, calendar, galleries, photos, content, etc.) that may have been clicked on/chosen by the, which may include but not be limited to (e.g., paid dater's view, paying person, user, person to pay, registered person to spend money on the platform, etc.) and user interface may show, which may include but not be limited to (e.g., simple boxes, simple types, dummy versions, less full versions, different types, etc.) which may include but not be limited to (e.g., short amount of information, dummy version, less full version, best photo of the creator and their price, etc.) depending on, which may include but not be limited to (e.g., creators, models, users, etc.) which may include but not limited to (e.g., preferences, suggestions, computing operation, type, funds available, etc.) In some embodiments, the user interface may have the option to which may include but not be limited to (e.g., click on who they like, explore their profile, go directly to the calendar booking area, directly to a photo gallery, a profile section with a calendar booking area, etc.) In some embodiments, there may be, which may include but not be limited to (e.g., a user interface or feature or screen, hologram, user interface, viewing display, or showing, etc.) that may indicate which may include but not limited to (e.g., user's available time, time spent, time needed to spend, amount of money, amount of funds available, any specials, any offers, any discounts, time that is open, time that is not open, calendars, charts, lists, organization of persons, messages, etc.)

In some embodiments, the user interface may be the, which may include but not be limited to (e.g., paying daters, the person paying, 3rd party paying, the entity paying, business paying, any gifting, gifting, donations, donating, user paying, the person spending money, person subscribing, person on membership, the person sending money, etc.) view. In some embodiments, the view that the, which may include but not be limited to (e.g., paying daters, persons paying, etc.) may be shown or defined as, which may have but not be limited to (e.g., those that are registered to obtain dates, those that pay or seek entertainment on platform, etc.) may be able to view. In some embodiments, the user interface may include or have options such as searching for things that may include but are not limited to (e.g., distance, price, looks, weight, model, interests, types, categories, etc.) In some embodiments, which may include but not be limited to (e.g., paying person, user, the person sending money, person pressuring, etc.), may be able to be searched by 'matching AI-connecting qualities' such as, which may include but not be limited to (e.g., distance, city, location, type, category, availability, attractiveness, etc.)

In some embodiments, the user interface may be the, which may include but not be limited to (e.g., models, paid creators view, any creators view, any users view, public view, user interface view, etc.) In some embodiments, user interface may be a, which may include but not be limited to (e.g., model, creator view, users view, public view, user interface view, etc.) in which the, which may include but not be limited to (e.g., user, model, girl, creator, paid dater, etc.) may show interest first, which may include but not be limited to (e.g., search the platform for a man to show interest in, contact a person, send message, allow messages, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, request to view more information or content, photos, exclusive photos, etc.) that she may send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date or wants to go out on a date etc.)

In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, request to view more information or content, pay to view more information or content, spend money, see live, view live, view subscriptions, view money, view following, see the weight, see height, view prices, price ranges, general pricing, general exchangeable, subscribe, follow, book a date with her, book date, book meeting, block off her calendar, send her flowers, send her gifts, etc.) In some embodiments, categories that may be able to be searched may include but not be limited to (e.g., looks, salary, net worth, career, type, model-type, model feature, request to view more information or content, pay to view more content, marketing, paid for marketing, suggested, computing operation, looks, interests, prices, price ranges, general pricing, general transmittables, any prices, price ranges, general pricing, general transmittables, any pricing, changed prices, price ranges, available pricing, general transmittables, auction prices, price ranges, general pricing, general transmittables, bidding/auction prices, price ranges, general pricing, general transmittables, reserve prices, price ranges, general pricing, general transmittables, additional prices, price ranges, general pricing, general transmittables, types of accepted assets, etc.)

Figure 60:
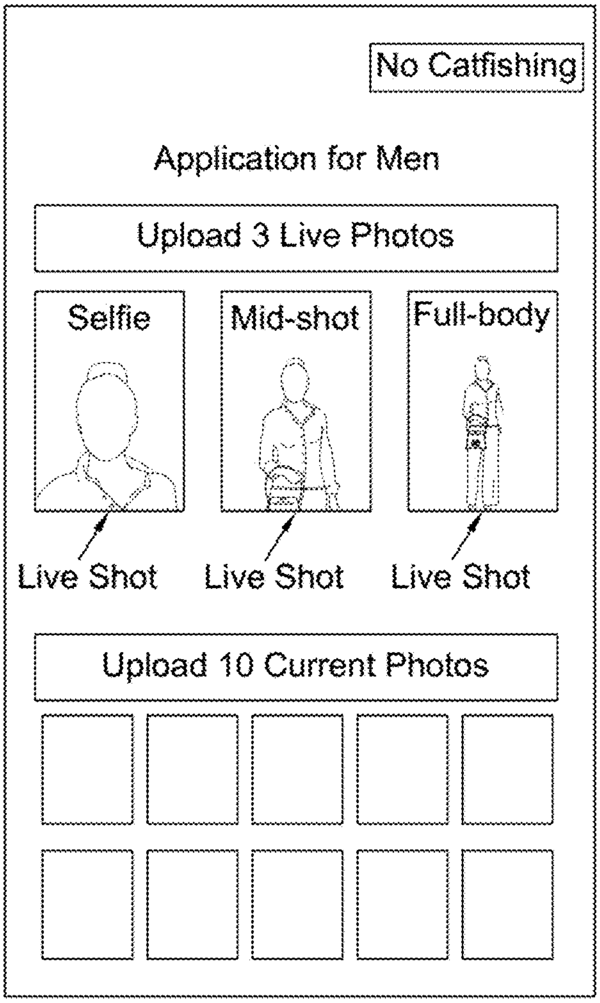

FIG. 60: In some embodiments, user interface may be part of the, which may include but not be limited to (e.g., paying persons, persons uploading funds, persons transferring assets, men, etc.) application to prevent, which may include but not be limited to (e.g., catfishing, someone from uploading photos from 20 years ago, false images, false content, false views of person, false pictures or videos of persons, very old content, old content, not accurate photos, etc.) In some embodiments, there may be multiple options such as 'upload 3-5 current live photos' or 'upload 10-20 current photos', etc.) In some embodiments, this may prevent catfishing and give a chance to prove who they are. In some embodiments, also the platform may suggest (using computing operations described herein) which photos they should use on their profile or send them an AI-generated selected list of pictures if they upload ten or more that we think would stand out. In some embodiments, there may be an option for the paying daters to purchase the platform's stylist team that would suggest how to get the best photos done and what is the best selling point of photos, which may include but not be limited to (e.g., colors, angles, types of images, investment suggestions for photos, etc.) Some embodiments may have a 'apply or reapply approval process.' In some embodiments, there may be a process in which if the first application is denied, the, which may include but not be limited to (e.g., person, robot, AI, user, etc.) may be allowed to apply or reapply until all guidelines are met to get an approval. In some embodiments, the person must meet all criteria to get approved. In some embodiments, the requirements may be listed on the platform, sent, shown, or made aware, or may not be made aware, or may be trade secrets, or at the discretion of the executives, person working, or contractors, or person's associated with the platform, or something that needs to be read and understood, etc.) In some embodiments, the guidelines for approval or denial may change, and the number of applications that may be reapplied may be altered.

In some embodiments, there may be an option for a, which may include but not be limited to (e.g., 'husband' 'boyfriend' 'partner etc.) application process in which the 'pursuer' may, which may include but not be limited to (e.g., send an application and payment in exchange for a review and/or a potential consideration of the 'application's name' and/or general idea of the application, etc.) Some embodiments, which may include but not be limited to (e.g., considerations or inquiries or submissions, etc.), may go into a database for the 'creator' or 'model' to further consider at a later date or currently, or any anytime. In some embodiments, the application cost may be equal to or higher than an in-person date and less. In some embodiments, the process is a consideration process where the 'paid dater' or 'pursued person' may have all of the information they need about someone else to decide on whether or not (e.g., user, person, entity, 3rd party, etc.) want to proceed or consider that person(s) for what the application or gathering of information plus a payment option or mandatory payment, states or is implied for.

Figure 61:
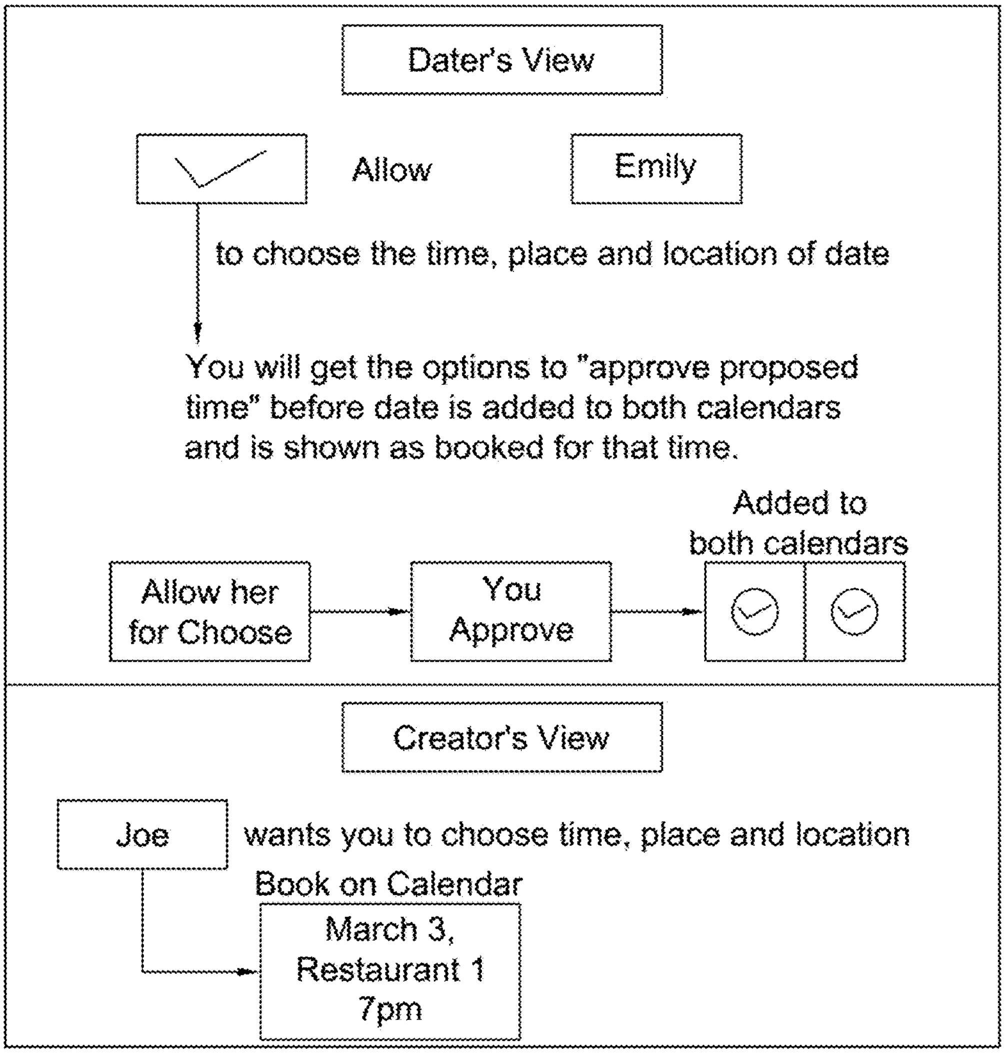

FIG. 61: In some embodiments, this may be the, which may include but not be limited to (e.g., users view, creators view, model's view, dater's view, etc.) which may show an option to allow a person they, which may include but not be limited to (e.g., 'like, want to see, want to meet, want to view, is proposing a date to, etc.) which may allow user interface may show the option to get, which may include but not be limited to (e.g., pre-approved date times sent to them, approval for, approved or confirmed connection information, allow the other person to pick a time/date/location, stuff about the date, additional things regarding the date, different approval matters regarding connection or payment or gifts, etc.) In some embodiments, for example, which may include but not be limited to (e.g., an opt-in option for a dater to allow a person they like to 'choose the date, time, and location' of the date, etc.), which may enable getting it approved by the 'dater' directly which may then added to, which may include but not be limited to (e.g., assistant information, timing information, calendar of user, both calendars, etc.) In some embodiments, the creator may see an option to allow themselves to, which may include but not be limited to (e.g., secure, inquire about, book, etc.) their, which may include but not be limited to (e.g., proposed time, date, and location for a 'date' on their calendar, etc.) which may be then approved by the 'dater' or 'paid person' which may then add it directly on to both person's calendar which may show that they are both booked or unavailable or on a date at that time. In some embodiments, approval may come from, including but not limited to (e.g., one or both parties, any user, one user, or any party, etc.)

Figure 62:
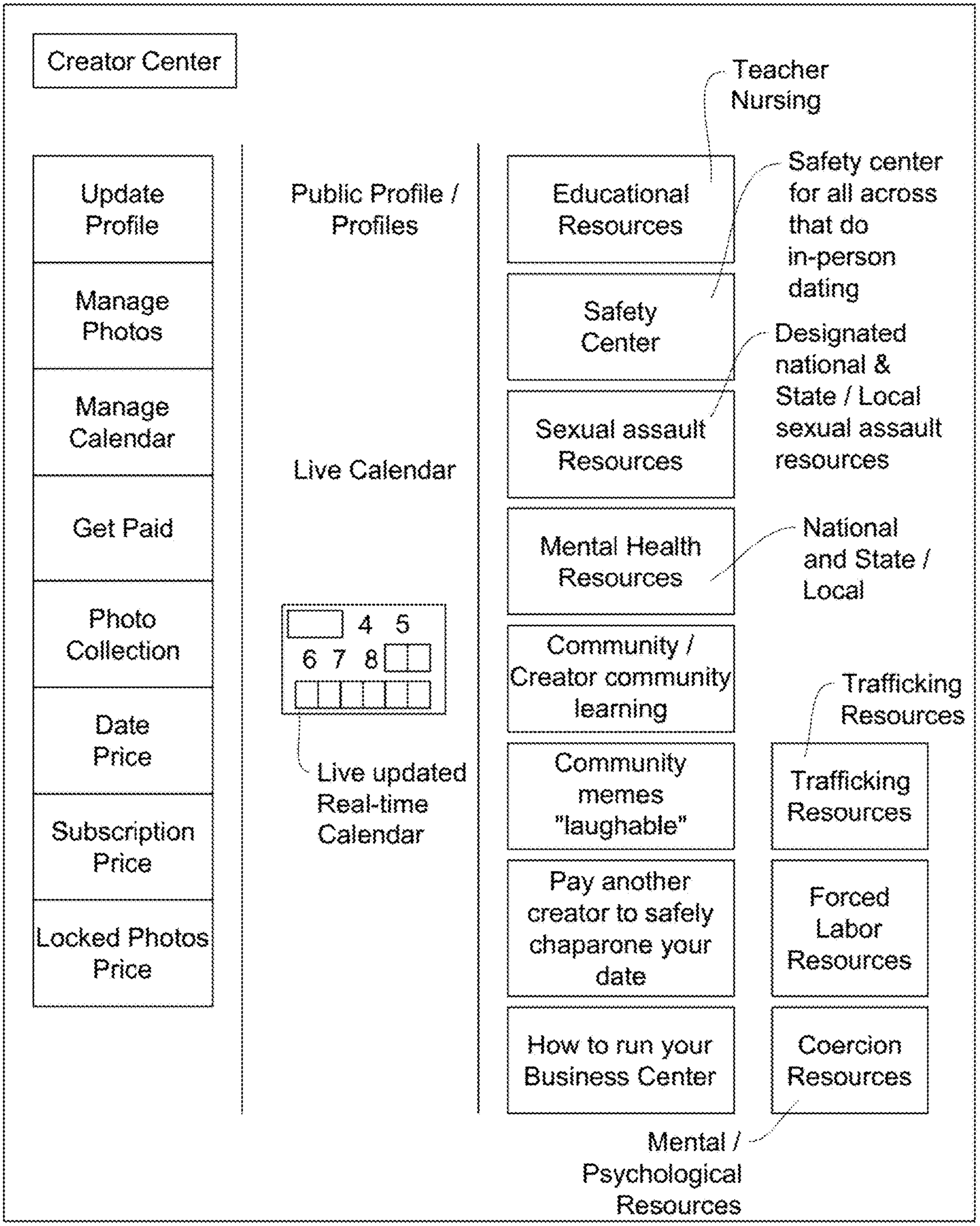

FIG. 62: In some embodiments, this may be the, which may include but not be limited to (e.g., management center, creator center, area where the paid person manages, etc.) their, which may include but not be limited to (e.g., business, profile, content, etc.) which may include but not be limited to (e.g., self, content, process, automation, management system, prices, price ranges, general pricing, general transmittables, mental health, memes, safety chaperones, security, support, or security, how to run your business, resources, SA resources, 3rd party resources, get paid, payouts, payment accepting types, live streaming, lives, live streaming, pre-recorded live streaming, safety center, educational resources, 3rd party resources, 'business' or collection, or items, or time offerings, etc.) In some embodiments, there may be a combination of in any order but is not limited to the following: a resource center located that is accessible that may include but is not limited to (e.g., educational resources such as 'how to become a nurse' a 'safety center' etc.) which may or may not include anyone that has in-person dates or is opted in as a, which may include but not be limited to (e.g., creator, user, person, etc.) that may or may not accept in-person dates. In some embodiments, other items or resources such as, which may include but not be limited to (e.g., sexual/coercion/trickery, false promises/danger/assault resources, may consist of national, local, and state resources, mental health resources such as 'female counselors near me' 'community or creator learning' this may be an option for creators to learn how to go about their date better such as what to wear, how to act, how to behave, what to say, etc.)

In some embodiments, there may be a 'private safety community center' for creators or models on the platform, which may include but not be limited to (users or persons that do not spend any money on the platform, users that may obtain money on the platform, etc.). In some embodiments, this private center may not be accessible to, including but not limited to (e.g., 'paid daters, subscribers, users besides 'creators' 'models, persons obtaining money, or any assets through the platform, etc.) In some embodiments, once the creator spends any amount of money on the platform on another creator or anyone else, the safety center may not be available further as they may be categorized as, which may include but not be limited to (e.g., paying daters, paying spenders, etc.) In some embodiments, 'safety community center' for, which may include but not be limited to (e.g., creators/models on the platform or any technology, users or persons may offer solutions or information, which may include but not be limited to (e.g., community methods, community information, blog posts, informational posts, methods to obtain self-submitted information or self-submitted information from other creators that explain anything such as 'any psychological methods used to put someone in danger, to put any type of creator in 'any sort of danger, compromising situation' or something that was a lie' such as offering more money to meet them in their car, or meet them somewhere not agreed upon for the 'date' from a guest/paid dater/paid person on the 'dating platform, etc.)

In some embodiments, there may also be a separate one for, which may include but not be limited to (e.g., information regarding virtual-only paid people, etc.) but may be less likely than the safety precautions for, which may include but not be limited to (e.g., 'in-person dates' connections, meeting, etc.) because 'in-person date knowledge' is the best knowledge to have regarding, which may include but not be limited to (e.g., safety precautions, safety standards, etc.) that may need to be taken to ensure every creator on a 'date' will be safe. In some embodiments, the, which may include but not be limited to (e.g., 'safety center,' safety area, informational center, etc.) may be available and/or user interface may be to inform, which may include but not be limited to (e.g., users, persons, etc.) on methods to, which may include but not be limited to (e.g., watch out for, to spot danger, to obtain knowledge to combat any physical or psychological methods that may be used to trick a 'creator' into danger, etc.) which may include but not be limited to (e.g., compromising situation, dangerous situation, etc.) by any type of, which may include but not be limited to (e.g., user, person, paid person, stranger, non-paid persons, person meeting, persons booking, persons paying, bidders, daters, etc.) In some embodiments, the, which may include but not be limited to (e.g., privacy center and/or safety center, informational area, etc.) may have, which may include but not be limited to (e.g., anonymous posts and anonymous information, self-created information, user-created information, platform created information, outside created information, etc.) In some embodiments, the post or information submitted may or may not be, including but not limited to (e.g., monitored, changed, or updated to ensure proper grammar or proper communication of what was trying to be said or communicated through the post, etc.) In some embodiments, information may be, which may include but not be limited to (e.g., changed, edited, retyped, re-communicated, changed, anonymous, etc.) in a way where, which may include but not be limited to (e.g., the user interface may be a warning, rather than an actual post that is self-submitted, etc.) user interface may be taken and essentially, which may include but not be limited to (e.g., changed into different ways to communicate message or idea or anything edited, edited, rewritten, etc.) which may include but not be limited to (e.g., 'what to avoid' or 'methods of psychological tricks by unsafe situations on a date' 'ways that daters may try to XYZ' 'methods on how daters may try to XYZ' 'methods on how potential daters would try to XYZ, etc.) In some embodiments, which may include but not be limited to (e.g., methods of information gathering, processing what is being said and what needs to be done, knowledge sharing, etc.), may be used in the help center or any area on the platform(s), outside of the platform, or 3rd party, etc.)

In some embodiments, there may be options for users to book, schedule, inquire about, inquire about, inquire regarding, secure, create connection to, hold, pay for, create business relationship with, use transmittables to secure or book, schedule, inquire about, etc.) which may include but not be limited to (e.g., 'safety chaperones, security, support, or security, 3rd party security, models, creators etc.) In some embodiments, 'safety chaperones, security, support, or security, may be described as someone, which may include but not be limited to (e.g., from the platform, another user, another person, a 3rd party entity, a 3rd party service, a 3rd party person, a family member, a former platform person, a member, etc.) In some embodiments, 'safety chaperones, security, support, or security,' may be used a 'security' whether, which may include but not be limited to (e.g., emotional or physical or both, or physical, or safety etc.) In some embodiments, outside security may be booked through a, which may include but not be limited to (e.g., 'bodyguard or security service' or any outside service that is either approved, not approved, or is a partner platform, is not a partner, or is a family member, or a friend, etc.)) In some embodiments, which may include but not limited to, the: (e.g., outside booking or safety booking, or other entity booking, or other person booking by user etc.) may be, which may include but not be limited to (e.g., deducted from earning that day or anytime earnings are made, whether at the time of the booking, after funds have been paid, or up front, whether from their pre-loaded funds, their funds available, or a transfer from a bank, whether that transfer is immediate or after some type, or from a credit service, or a credit booking etc.) In some embodiments, there may be options for community-made memes for laughable purposes and to share silly items with other creators, there may also be options such as 'pay another creator to act as a chaperone, security, or secret 3rd party (which may be undetectable by person paying for date) in order to maintain and to ensure safety while on an in-person date, there also may be a, which may include but not be limited to (e.g., 'how to run your business' resource center, etc.) there also may be items such as resources or center resources that may teach creators about, which may include but not be limited to (e.g., 'danger, coercion, trickery, pimps, lies, false promises, psychopathic methods, danger, psychological danger, methods to watch out for, signs to watch out for, safety information, dangerous daters methods' such as items that criminals or narcissists that have hurt women, etc.) In some embodiments, Also, there may be trafficking resources such as, which may include but not be limited to (e.g., illegal activities, pimps or 'forced labor' and information about trafficking or forced labor such as human trafficking, sex trafficking, etc.) These may be in the form of a, which may include but not be limited to (e.g., link, an article, a button, a 3rd party website, etc.)

Figure 63:
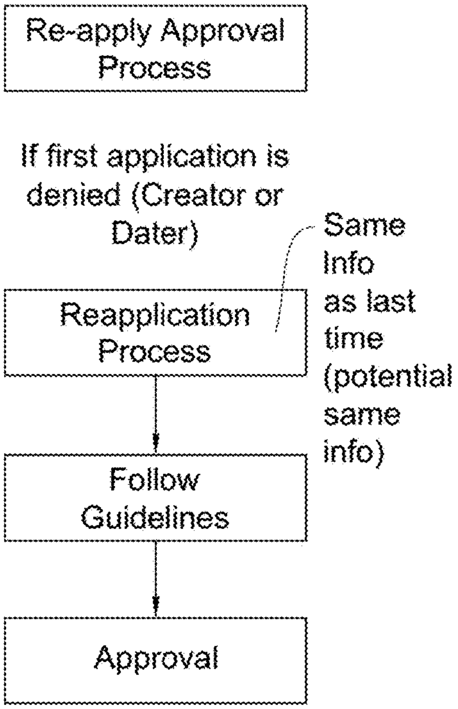

FIG. 63: Some embodiments may have an 'apply or reapply approval process.' In some embodiments, there may be a process in which, if the first application is denied, the person can apply or reapply until all guidelines are met to get approval. In some embodiments, the person must meet all criteria to get approved. In some embodiments, the requirements may be listed on the platform, sent, or shown, or made aware, or may not be made aware, or may be trade secrets, or at the discretion of the executives, person working, or contractors, or person's associated with the platform, or something that needs to be read and understood, etc.) In some embodiments, the guidelines for approval or denial may change, and the number of applications that may be reapplied may be altered.

In some embodiments, there may be an option for a, which may include but are not limited to (e.g., 'husband' 'boyfriend' 'partner' application process/interface, etc.) in which the, which may include but are not limited to (e.g., 'pursuer,' man, user, person, AI, robot, 3rd party integration, etc.) may send an which may include but are not limited to (e.g., application and/or payment etc.) in exchange for, which may include but are not limited to (e.g., a potential review and/or a potential consideration of the 'application's name' or general idea of the application or idea, etc.) In some embodiments, this may go into a, which may include but are not limited to (e.g., database, management system, place, interface, etc.) for the 'creator' or 'model' to, which may include but are not limited to (e.g., further consider at a later date, or currently, etc.) In some embodiments, the, which may include but are not limited to (e.g., cost of the application, transmittables, assets, etc.) may be, which may include but are not limited to (e.g., different, equal to or higher than an in-person date, it also may be less, etc.) In some embodiments, which may include but are not limited to (e.g., user, model, etc) may, which may include but are not limited to (e.g., set their own price, have the platform set, market value, market price, 3rd party pricing, etc.) for, which may include but are not limited to (e.g., 'application' or 'consideration,' etc.) In some embodiments, the process is a consideration process where the, which may include but are not limited to (e.g., 'paid dater' or 'pursued person' or model, or creator, or user, etc.) may have all of the information they need about someone else in order to make a decision on whether or not (e.g., user, person, entity, 3rd party, etc.) want to proceed or consider that person(s) for what the application or gathering of information plus a payment option or mandatory payment, states or is implied for. In some embodiments, there may be an application form or page which may include but are not limited to (e.g., applying to date a model in person, 3rd party background check requirement, personal background check requirement, tax verification, income verification, asset verification, employment verification, driver's license or passport verification etc.) In some embodiments, there may be options for home screen, hologram, user interface, viewing display, submit application, go to 3rd party to fill out, payment options or payment requirements to submit form, etc.) In some embodiments, there may be a, which may include but not be limited to (e.g., 'become a model' form or 'app to be a model' or 'apply to join' or 'apply to join platform' or apply to go on dates, apply to date in-person, apply and get background check, apply, apply and gain approval, 'apply to make money etc.) that may be linked to a form or some type of application that may be used to determine if the applier meets the required criteria to become a, which may include but not be limited to (e.g., creator, person, user of the platform, user of 3rd party platform, user or any platform, assisted, able to make money, model or a user to get paid on platform, eligible to get paid, etc.) In some embodiments, user interface may link to a, which may include but not be limited to (e.g., identify verification, user information, background information, LinkedIn profiles, linked information, background check, criminal check, model history, content submission, etc.) In some embodiments, there may be options to get a, which may include but not be limited to (e.g., platform photoshoot, professional photoshoot with 3rd party, other professional photoshoot done etc.) but in which user interface may not be required, self-made photos may be used for, which may include but not be limited to (e.g., verification or application purposes or any other purposes, or 3rd party purposes, or private-kept data etc)

In some embodiments, payment may be required in exchange for any option such as, which may include but not be limited to (e.g., payment to view content, payment to view calendar, interact with to view calendar, interact with to view timing data method, payment to book, schedule, inquire about, inquire about, ask regarding, secure, create connection to, hold, pay for, create business relationship with, use transmittables to secure or book, schedule, inquire about, etc.) payment to join call, charge for background check by 3rd party, cost to live stream, pre-recorded live stream, pre-recorded content, amount to join stream, payment to join call, payment for content, payment for message, payment to see calendar, payment to see profiles, amount to visit other cities, price to book, schedule, inquire about, inquire about, inquire regarding, secure, create connection to, hold, pay for, create business relationship with, use transmittables to secure or book, schedule, ask about, etc.) profiles or persons in other cities, payment to view stories, payment to view live or current content, amount to follow, payment to subscribe, pay for unlimited content, cost for unlimited messages, payment for unlimited dates, payment for contact options, payment for contact information, amount to see live, price to obtain information, cost to match, payment to view now, payment to unlock content, payment to begin, fee to view information about user, payment to see background check, price to send direct message, payment to add to category, payment to add to list, amount to be on cover, cost to be on first page, amount to be at top, payment to be suggested, payment to wink, flirt, send heart, price to speak to another person, etc.

Figure 64:
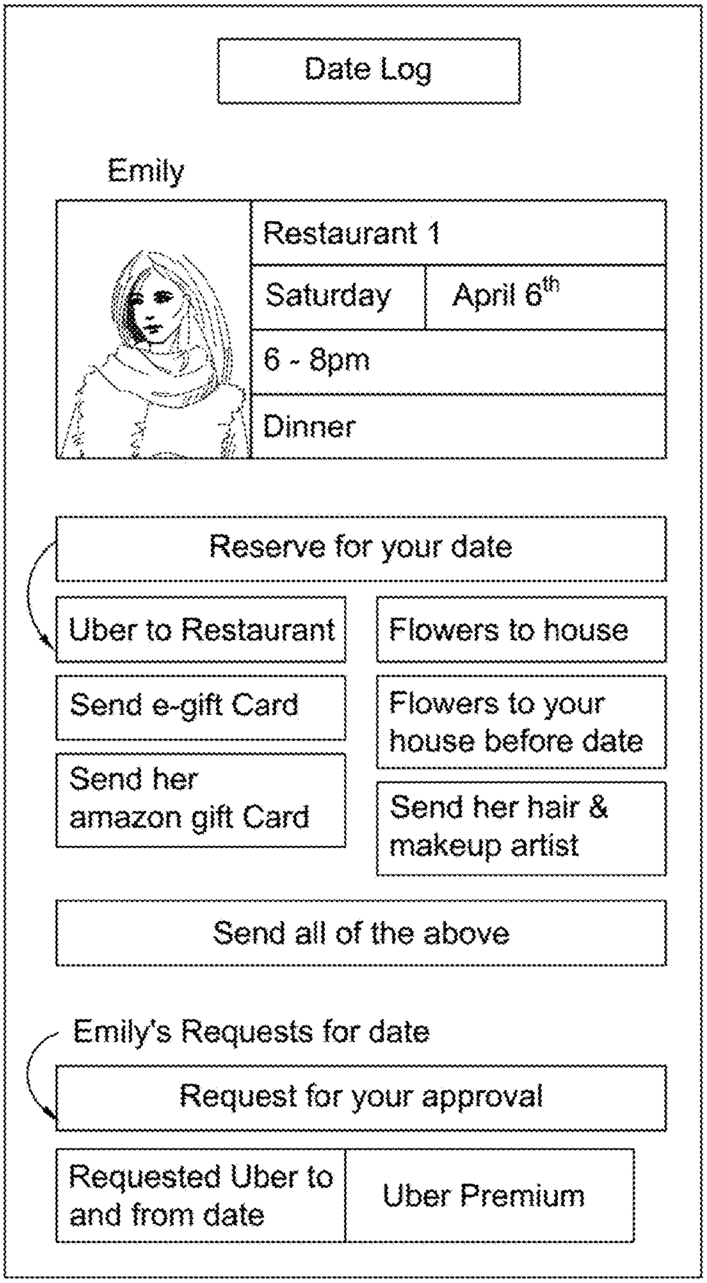

FIG. 64: In some embodiments, this may be the 'daters' log once he (e.g., person, user, etc.), which may include but not be limited to (e.g., has bought a date, paid for a date, etc.) which may include but not be limited to (e.g., before, after, during the date or before, during, or after checkout or payment has been completed for a date, etc.) In some embodiments, this summary log or log of information regarding a, which may include but not be limited to (e.g., breakdown, itemized, receipt, invoice, total, partial, breakdown, bill, a summary of, total, etc.) of the 'date' that may stay there long after the date has concluded or forever, or disappear, or the 'creator' may have the option to, which may include but not be limited to (e.g., remove, block, or prevent, etc.) any potential person/user/dater from sending, which may include but not be limited to (e.g., 'her, user, model,' etc.) anything or rebooking after a date using any ways such as this date summary log. In some embodiments, the user interface may have a, which may include but not be limited to (e.g., a summary of the date, photos of the potential daters, and options for the 'paying person' to pre-book for example, an Uber, transportation service, to and from the restaurant date which may remain completely anonymous and the 'paid dater' may have zero access to any personal information about the 'creator' or 'paid for dater' etc.)

In some embodiments, there may be other options such as, which may include but not be limited to (e.g., sending flowers to her house or having flowers delivered to the restaurant during your date, or 'send her a digital gift card, or 'sending her a hair and makeup artist' etc.) In some embodiments, there may be a 'buy now option' to send, which may include but not be limited to (e.g., all of the requested or suggested options add more to the date to be paid for in full or in payments by the 'paying dater etc.) In some embodiments, this page may show the 'creator or model, entity, 3rd party, user, 's,' which may include but not be limited to (e.g., requested date flowers, Uber, transportation service, requests for a date, beauty expenses for a date, etc.) In some embodiments, this may be where the 'paying dater' may be looking at the request and either approve or deny it and potentially be required to state a reason as to why he may not accommodate her request. In some embodiments, the creator may be allowed to: (e.g., cancel the date at any time if her request accommodations are not met or if she may not like his response to why he may not accommodate her car transportation, transportation service, payment for the date, or the fact that he is saying no to further accommodations, etc.)

In some embodiments, this may be the, which may include but not be limited to (e.g., 'potential process for date check-in, check-out, time stamp, time record, time and data record, location, time and data record, or check out or date data collection beginning or any part of the process, etc.) In some embodiments, which may include but not be limited to (e.g., date log, management area,' or area where the 'date' or 'connection' or 'meeting information or area to record, log, or complete date is located, etc.) In some embodiments, there may be different screens to attempt to, including but not limited to (e.g., record, log, or track the entirety of the date, record the entire date, etc.) In some embodiments, the 'date log, management area,' may ask the, which may include but not be limited to (e.g., 'dater, creator, model, paid person, paying person, etc.) to, which may include but not be limited to (e.g., check-in at the location' or show that the person has begun the date, it may be manually, automatically shown based on collected or gathered or inserted data, etc.) In some embodiments, the user interface may, which may include but not be limited to (e.g., send, secure, record, etc.) a location tracking to the, which may include but not be limited to (e.g., date log, management area, network, platform, data center, etc.) to maintain a record of, which may include but not be limited to (e.g., date, connection, time, meeting, etc.) for any reason. In some embodiments, once the 'paid person or paying person' has, which may include but not be limited to (e.g., begin, beginning, start, checked-in, begun, started, recorded, informed, agreed on, or checked-out, assumed started, agreed upon, finished, ended, accepted ended, decided to end, etc.) user interface may start a location tracking of the entirely of the date which may be recorded in real-time and maintained on records so that there may be proof of the date occurred.

Figure 254:
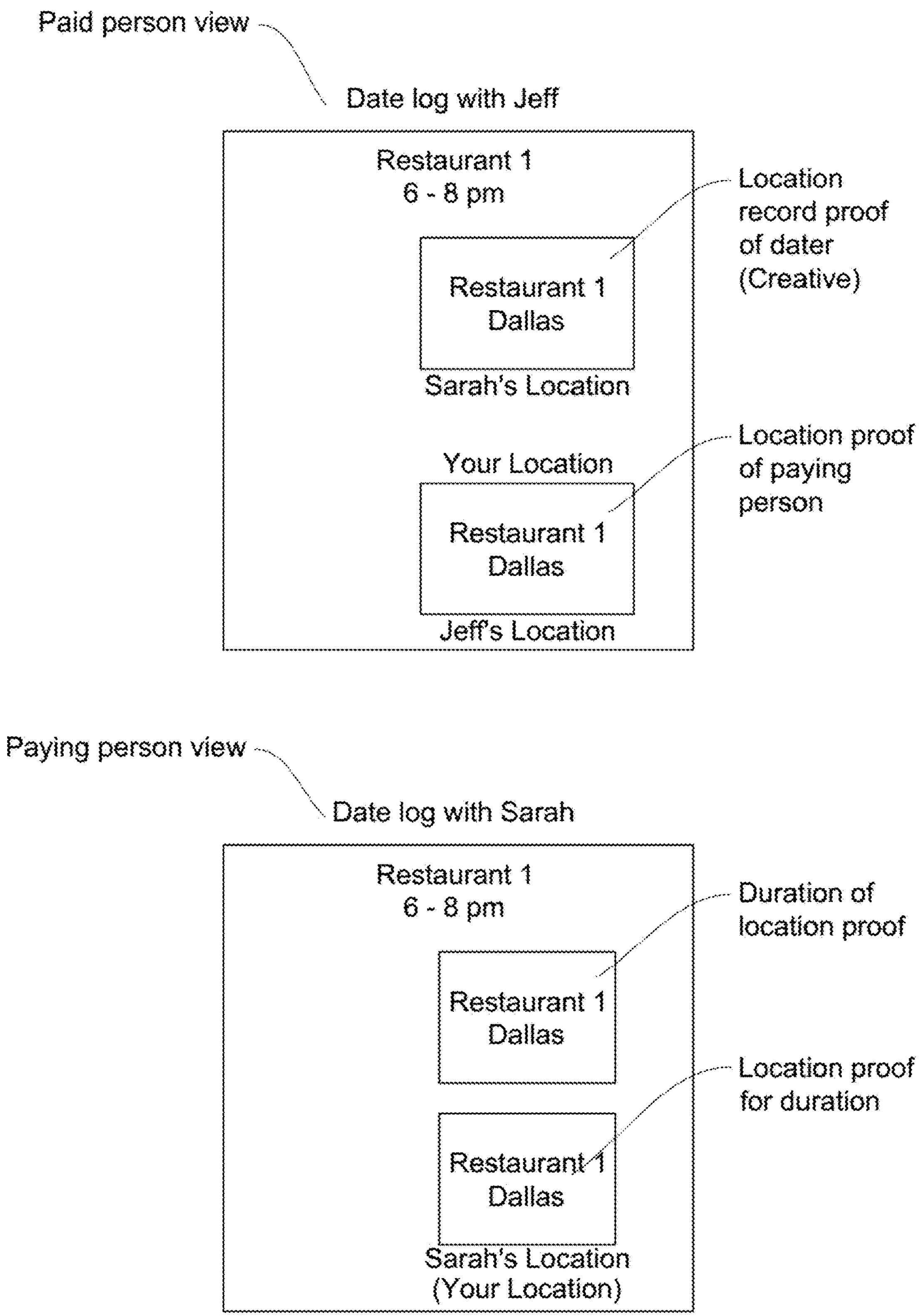

In some embodiments, the user interface may be shown in images such as FIG. 254 or any user interface. In some embodiments, the 'check-in, check-out, time stamp, time record, time and data record, location, time and data record' may be manual, automatic, or semi-automatic meaning the user interface may be turned on and off, manually checked in, or automatically (e.g., checked-in, begun, started, recorded, informed, agreed on, or checked-out, assumed started, agreed upon, finished, ended, accepted ended, decided to end, etc.) based on location matching AI-connecting, where the date is supposed to be at. In some embodiments, there may be a swiping method, a button click, a double tap, a checking method, a tap, an automatic check-in, check-out, time stamp, time record, time and data record, location, time and data record, a manual check-in, check-out, time stamp, time record, time and data record, location, time and data record, or a restaurant check-in, check-out, time stamp, time record, time and data record, location, time and data record, to, which may include but not be limited to (e.g., begin date or check-in, check-out, time stamp, time record, time and data record, location, time and data record, start date, begin, time starting, countdown starting' etc.) In some embodiments, this 'date data' is recorded to prove the date occurred; this may include, which may include but not be limited to (e.g., time, location, date, year, month, restaurant coordinates in comparison to paying person's coordinates, map location coordinates, duration, check-in, check-out, time stamp, time record, time and data record, location, time and data record, coordinate(s), of date, etc.) until obligations of date are complete. For example, the data may be recorded automatically from the time and date of date to confirm or deny that the date occurred at the paid-for and obligated time and place agreed upon on the paid agreement. This may be shown in some embodiments, such as FIG. 254, or any user interface. In some embodiments, the paid dater may obtain payment if no obligated date occurred according to the terms and conditions of the date agreement paid for. Still, the paid dater failed to report a 'failure to show' within the time frame, which would be thoroughly investigated before payment is disbursed. In some embodiments, there may be a 'live' time that is shown on the 'model or dater's date log, management area, or platform access' which may help determine a good time to 'check-in, check-out, time stamp, time record, time and data record, location, time and data record,' to their date. In some embodiments, the paid dater or person making date payment may also have a screen or date log, management area, that is similar in which the 'paid dater' may have their record of location, time, date, coordinates, map location, year, month, day, etc.) similar to the 'paid dater' in which these data points may be compared to the paid daters or models' log if there are any disputes on location, time, problems, etc.) In some embodiments, which may include but not be limited to (e.g., data logs, a gathering of data, etc.), may be seen as or shown as or maybe, which may include but not be limited to (e.g., regarding date information, time, location, both persons on a date may be used to determine if date occurred, if there are issues or disputes between the parties, etc.) In some embodiments, there may be other optional options to show more 'proof of date' or proof that obligations paid for were met to ensure payment is disbursed. In some embodiments, the 'live location' may show the 'dater' where they are located or what location coordinates or places they are at. In some embodiments, the 'live location' may be automatic, and the 'dater' or 'paid dater' may not need to check in because the location may automatically check in for them and records all data.

In some embodiments, this may be shown as a, including but not limited to (e.g., date subscription model, membership option, membership model, pre-pay model, etc.) In some embodiments, this may be potentially be a, which may include but not limited to (e.g., date subscription model, membership model pre-pay model, etc.) for, which may include but not limited to (e.g., in-person dates per month/time period, dates per time period, connection(s) per time period, etc.) that may allow dater to pay or obtain, which may include but not be limited to (e.g., for a monthly fee, for a fee, for a price for a time duration, check-in, check-out, time stamp, time record, time and data record, location, time and data record, coordinate(s), a one-time fee, on-going fee, credit-fee, credit subscription, pre-paid subscription, a subscription price during any time period or duration, check-in, check-out, time stamp, time record, time and data record, location, time and data record, coordinate(s), which may include but not limited to (e.g., to obtain hand-picked, or hand-set, or expert-picked, or "dates arranged by someone else with less work to the client, etc.) in exchange for a, which may include but not be limited to (e.g., set cost, monthly cost, yearly cost, or on-going fixed price or an exchange amount of dates. Which may have one option or more than one option with set prices, price ranges, general pricing, general transmittables, buy-now prices, price ranges, general pricing, general transmittables, monthly prices, price ranges, general pricing, general transmittables, yearly prices, price ranges, general pricing, general transmittables, or lifetime prices, price ranges, general pricing, general transmittables, etc.)

In some embodiments, these, which may include but not be limited to (e.g., words, categories, filters, groups, tags, hashtags, etc.) may then, which may include but not be limited to (e.g., separate, link, group, compare, create with, allow together, collaborate, etc.) the, which may include but not be limited to (e.g., user, person, group, entity, etc.) to the filter and thus, which may include but not be limited to (e.g., entity, they, user, model, person, etc.) may be found through a, which may include but not be limited to (e.g., categorized, separate, grouped, filtered, separated, etc.) search, or they may show up based on other reasons such as, which may include but not be limited to (e.g., computing operations, history of the 'dater' or 'pursuer, other people on the platform, clicks, taps, views, activity, etc.) which may include but not be limited to (e.g., option, way, order, etc.) to create, which may include but not be limited to (e.g., meetings, views, connections, messages, follows, purchases, friends, bookings, etc.) In some embodiments, there may be options for 'gifting a date,' which may include but not be limited to (e.g., an outside person's paying for the entire or portion of a 'date' or 'meeting' or 'connection' or any user's 'requirements,' etc.) In some embodiments, outside or internal users may 'gif' another user anything that may require, which may include but is not limited to (e.g., payments or exchange of value, etc.) which may include but not limited to (e.g., gift a date, gift an in-person date, give a virtual date, entertainment options set by anyone or model or user, gift a synchronized at-home date, gift a subscription, gift a subscription to the platform, etc.) In some embodiments, outside users may donate for these payments or exchanges of value to be made using potentially any assets that may include but are not limited to (money, crypto, deeds to a house, etc.) In some embodiments, payments may need to be converted to may include but are not limited to (e.g., fiat, crypto, financial, or standard payment exchange of value) to complete payment before payment or booking or exchange, or sale is made. Preferences/search options for 'bidders' or 'daters,' which may include but not be limited to (e.g., 'brunette' 'blonde' 'nearby' 'local," petite' 'busty' 'smile' 'sweet' 'dominant' 'submissive' 'career-oriented' 'need, want, 'photos' looks' mentorship' 'pretty face' 'pretty girl' 'girl next door' 'smart' 'nice-girl' 'psychology' 'loving' 'mature' 'college student' 'suggested' 'popular' student 'celebrity' 'gorgeous' 'model' online model' 'entrepreneur' 'model' creator' 'influencer type, influencer style, stylist, fashion 'full-time-creator' 'girl next door' 'influencer' 'nearby creators' 'creators in the city/nearby xyz' 'creators available specific date(s)/time/location/restaurant date, etc.) In some embodiments, there may be, which may include but not be limited to (e.g., scrolling, tapping, swiping, moving, discovery, etc.) options that may show a combination or one or more may include but not limited to (e.g., calendars of users, users content, calendars, calendar availability, scheduling option, locked content, unlocked content, exclusive content, follow options, users, content, users availability, etc.) In some embodiments, there may be 'discover or view or suggested, etc.) options that may be seen by may include but not be limited to (e.g., holograms, scrolling, automatic, discovery, locked, moving, swiping, searching, etc.)

FIG. 54: In some embodiments, this may be a method in which, may include but not be limited to (e.g., creators, models, paid persons, etc.) may be able to, which may include but not be limited to (e.g., show, send, change, change visualization, change or edit public or private visualization, etc.) of their, which may include but not be limited to (e.g., information, public profile, shared profile, shared content, uploaded or any content, etc.) In some embodiments, which may include but not be limited to (e.g., for example, which may be including but not limited to if a model meets a person out in public and may not want that person to have access to 'NSFWs' 'inappropriate' 'suggestive' etc.) types of photos but still wants that person to be added on their profile, site, page, created business profile, etc.) In some embodiments, that person may have an 'alternate' version of their profile that this other person will only have access to unless it is manually changed by the creator or model, entity, 3rd party, or user at any time, etc.)

In some embodiments, the user interface may be, which may include but not be limited to (e.g., changed, edited, dummy profile viewing, alternate version of the profile, second-connected profile, second profile to manage, other management profiles, etc.) to prevent dangerous situations when meeting new strangers and not wanting them to have access to any 'compromising information or photos.' In some embodiments, for example, which may include but not be limited to (e.g., the creator, model, or paid person, etc.) may have, which may include but not be limited to (e.g., one, two, 3, 4, or any number of different versions or alternate profiles, etc.) to, which may include but not be limited to (e.g., share, show, visualize, change, create, have available to whom they please, etc.) In some embodiments (e.g., a model, creator, paid person, etc.) may send a, which may include but not be limited to (e.g., potential 'dater' whom they have met in person or don't want to see the full profile, etc.) a, which may include but not be limited to (e.g., dulled down, dummy version, alternate version, different profile, different connected version of a profile, etc.) of their entire profile meant to, which may include but not be limited to (e.g., hide/obscure/private alternate photos, videos, and or information, etc.) but may still (e.g., all related to, connected to their actual profile, linked to their profile, a separate version of their profile, a different view but same management system, a connected system or management system, an individual or connected view, etc.) which may include but not be limited to (e.g., still be able to manage or connect to their payment receiving or booking calendar connection, management of creator, person, user, etc.)

In some embodiments, the creator may be in control of the person's, which may include but not be limited (e.g., abilities, view, obligations, options, message options, viewing options, etc.) which may include but not be limited to (e.g., viewing choices for their profile, control of the actual profile they see, their ability to see other related items, etc.) In some embodiments, during a 'sharing' of this 'alternate profile,' there may be a, which may include but not be limited to (e.g., 'bookmark made, Network address, IP address, saved, some way that every time that phone or desktop, etc.) that may be used, that it will only show the, which may include but not be limited to (e.g., alternate profile, changed profile, or allow creator per person to have the authority of which type of information is shown, etc.) regardless of if the user, which may include but not be limited to (e.g., paying person, the person that would book a date with that person, the person spending money, etc.) were to change their, which may include but not be limited to (e.g., Network address, IP address, phone, laptop, browser, etc.) In some embodiments, the alternate unique profiles or links may be anything from, which may include but not be limited to (e.g., suggestive photos, but nothing NSFW, sexy acts, sensual, entertainment, calendar information, personal information, more information, links to live events, or live shows, etc.) In some embodiments, there may be the 'regular option,' which may be their 'entire profile,' which may contain, which may include but not be limited to (e.g., sexy photos, calendar information, booking information, date information, virtual date information, acting, NSFWs, suggestive, boudoir, modeling, etc.)

FIG. 55: In some embodiments, may include but not be limited to (e.g., payments, bonus payments, points, bought items, items that are pre-paid, gifts, gifting items, digital gifts, bonuses, extra money, fees, payment disbursement, paid events, paid photoshoots, paid participation, etc.) may be, which may include but not be limited to (e.g., given, gifted, dispersed, sent, etc.) to may consist of but not be limited to (e.g., creators, models, persons, users, etc). In some embodiments, there may be a may consist of but not be limited to (e.g., point system, scale, measuring method, point scale, spent scale, money scale, user frequent scale, etc.) that may take into 'consideration' may include but not be limited to (e.g., consideration, scaling system, AI scaling system, AI data collection input and output system, etc.) that may include but not be limited to (e.g., calculate or scale, or show, or take into consideration, etc.) anything may include but not be limited to (e.g., how many dates the creators has gone on, how many restaurant bookings, how many gifts are bought through the system, how many times rent has been paid through the system, how many bills have been paid through the system, etc.) In some embodiments, this may be at the 'discretion of the platform' to decide what the points or scale means meaning may include but not be limited to (e.g., how much money has been spent on the platform, how much money spent on individual or collective on creators, models, platform, other platforms, or items, etc.)

FIG. 56: In some embodiments, this may be an example of being the may include but not be limited to (e.g., 'boyfriend opt-in' system, etc.) which may allow the may consist of but not be limited to (e.g., creator, model, etc.) to may include but not be limited to (e.g., search for, find, add, suggest, etc.) their new may have but not be limited to (e.g., 'boyfriend, particular person, special friend, dater, person dating, etc.) and may be able to may include but not be limited to (e.g., add them as their boyfriend, special treatment, special dates, particular person, current dater person, etc.) In some embodiments, the may include but not be limited to (e.g., model, creator, etc.) may be able to may include but not be limited to (e.g., confirm, suggest, manage, etc.) some way to may consist of but not be limited to (e.g., ensure, offer, ad, add to the list, etc.) the, may include but not be limited to (e.g., searched person, found person, added person, suggested person, dater, user, etc.) is their may include but not be limited to (e.g., boyfriend, special friend, special dater, particular person, user VIP, etc.) In some embodiments, this list may come from may include but not be limited to (e.g., 'paid daters' that have spent money on the creator, inserted information, added manually, added automatically, those that have liked her profile, daters that have been on competed dates with, users or person in any way to search through their list of connections, etc.) that may be considered their may include but not be limited to (e.g., boyfriend, particular person, VIP, added to list, special treatment, etc.)

In some embodiments, there may be a, which may include but not be limited to (e.g., next process, next thing that happens, third process, next process that is happening after adding this person as their 'boyfriend, etc.) which may result in the may include but not be limited to (e.g., special person, boyfriend, etc.) getting 'special treatment such as, which may include but not be limited to (e.g., not receiving 'instructional emails, not receiving emails that may suggest they don't know how to go on a date, not receiving basic etiquette rules at this point etc.) which may suggest that the creator and the person may have went on a successful date and now she is informing the platform that this person is her may include but not be limited to (e.g., special friend, boyfriend, etc.) In some embodiments, the may include but not be limited to (e.g., 'boyfriend'" or 'special person, etc.) may be treated, which may include but not be limited to (e.g., differently, obtain special treatment, be put on list, added to category, etc.) than other users, or get special treatment, which may include but not be limited to (e.g., not receiving emails on how to act on a date or how to pull out chairs, not receiving marketing emails, not getting suggestions, suggesting more with this user on their user interface, price changes, lower prices, more date availabilities, VIP treatment such as 'access to all photos/videos/at the discretion of the user, etc.) In some embodiments, this may come or, which may include but not be limited to (e.g., after, before, during, way after, later, etc.) which may include but not be limited to (e.g., meeting, virtual meeting, in-person meeting, date, connection, message, subscribing, adding, adding to list, amount of money spent, etc.) has, which may include but not be limited to (e.g., been sent, been added, completed, successfully completed, good feedback, communication has occurred, etc.)

FIG. 57: In some embodiments, user interface may be the, which may include but not be limited to (e.g., models, paid creators view, any creators view, any users view, public view, user interface view, etc.) In some embodiments, user interface may be a, which may include but not be limited to (e.g., model, creator view, users view, public view, user interface view, etc.) in which the, which may include but not be limited to (e.g., user, model, girl, creator, paid dater, etc.) may show interest first or any user may show interest first, or any public person, which may include but not be limited to (e.g., search the platform for a man to show interest in, contact a person, send message, allow messages, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, request to view more information or content, photos, exclusive photos, etc.) that she may be send a, which may include but not be limited to (e.g., communication to, interest in, etc.) whether, which may include but not be limited to (e.g., automatic, by management system, by agency, by manger, by human, by 3rd party person, manually, computing operation, robotics, AI, etc.) in the form of anything such as, which may include but not be limited to (e.g., message, wink, cute message, calendar, availability, items user wants, items for user, items user needs, payment items, etc.) which may include but not be limited to (e.g., saying she is available for a date, or wants to go out on a date, or is interested, or wants you to make the first move, or you are her type, etc.) In some embodiments, this may or may not (e.g., 'begin a conversation' or 'unlock communication or unlock calendar' or unlock user' or begin membership to profile or begin user's viewing by payment method of payment submission, etc.) user interface may simply shows or communicate to the other person that user, which may include but not be limited to (e.g., likes what she sees, would be interested in a date, etc.) which may give the other user the option to take the 'initiative' to, which may include but not be limited to (e.g., message, request to view more information or content, pay to view more information or content, spend money, see live, view live, view subscriptions, view money, view following, see weight, see height, view prices, price ranges, general pricing, general transmittables, subscribe, follow, book a date with her, book date, book meeting, block of her calendar, send her flowers, send her gifts, etc.) In some embodiments, categories that may be able to searched may include but not be limited to (e.g., looks, salary, net-worth, career, type, model-type, model feature, request to view more information or content, pay to view more content, marketing, paid for marketing, suggested, computing operation, looks, interests, prices, price ranges, general pricing, general transmittables, any prices, price ranges, general pricing, general transmittables, any pricing, changed prices, price ranges, general pricing, general transmittables, auction prices, price ranges, general pricing, general transmittables, bidding/auction prices, price ranges, general pricing, general transmittables, reserve prices, price ranges, general pricing, general transmittables, additional prices, price ranges, general pricing, general transmittables, types of accepted assets, etc.)

FIG. 58: In some embodiments, the user interface may be the, which may include but not be limited to (e.g., paying daters, the person paying, 3rd party paying, the entity paying, business paying, any gifting, gifting, donations, donating, user paying, the person spending money, person subscribing, the person on membership, person sending money, etc.) view. In some embodiments, the view that the, which may include but not be limited to (e.g., paying daters, persons paying, etc.) may be shown or defined as, which may have but not be limited to (e.g., those that are registered to obtain dates, those that pay or seek entertainment on the platform, etc.) may be able to view. In some embodiments, the user interface may include or have options such as searching for things, which may include but not be limited to (e.g., distance, price, looks, weight, model, interests, types, categories, etc.) In some embodiments, which may include but not be limited to (e.g., paying person, user, the person sending money, person pressuring, etc.), may be able to be searched by 'matching AI-connecting qualities' such as, which may include but not be limited to (e.g., distance, city, location, type, category, availability, attractiveness, etc.)

In some embodiments, user interface may be the, which may include but not be limited to (e.g., models, paid creators view, any creators view, any users view, public view, user interface view, etc.) In some embodiments, user interface may be a, which may include but not be limited to (e.g., model, creator view, users view, public view, user interface view, etc.) in which the, which may include but not be limited to (e.g., user, model, girl, creator, paid dater, etc.) may show interest first, which may include but not be limited to (e.g., search the platform for a man to show interest in, contact a person, send message, allow messages, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, request to view more information or content, photos, exclusive photos, etc.) that she may be send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date, or wants to go out on a date etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, request to view more information or content, pay to view more information or content, spend money, see live, view live, view subscriptions, view money, view following, see weight, see height, view prices, price ranges, general pricing, general transmittables, subscribe, follow, book a date with her, book date, book meeting, block off her calendar, send her flowers, send her gifts, etc.) In some embodiments, categories that may be able to searched may include but not be limited to (e.g., looks, salary, net-worth, career, type, model-type, model feature, request to view more information or content, pay to view more content, marketing, paid for marketing, suggested, computing operation, looks, interests, prices, price ranges, general pricing, general transmittables, any prices, price ranges, general pricing, general transmittables, any pricing, changed prices, price ranges, general pricing, general transmittables, auction prices, price ranges, general pricing, general transmittables, bidding/auction prices, price ranges, general pricing, general transmittables, reserve prices, price ranges, general pricing, general transmittables, additional prices, price ranges, general pricing, general transmittables, types of accepted assets, etc.)

In some embodiments, this may be shown as a, which may include but not be limited to (e.g., date subscription model, membership option, membership model, pre-pay model, etc.) In some embodiments, this may be potentially be a, which may include but not limited to (e.g., date subscription model, membership model pre-pay model, etc.) for, which may include but not limited to (e.g., in-person dates per month/time period, dates per time period, connection(s) per time period, etc.) that may allow dater to pay or obtain, which may include but not be limited to (e.g., for a monthly fee, for a fee, for a price for a time duration, check-in, check-out, time stamp, time record, time and data record, location, time and data record, coordinate(s), a one-time fee, on-going fee, credit-fee, credit subscription, pre-paid subscription, a subscription price during any time period or duration, check-in, check-out, time stamp, time record, time and data record, location, time and data record, coordinate(s), which may include but not limited to (e.g., to obtain hand-picked, or hand-set, or expert-picked, or "dates arranged by someone else with less work to the client, etc.) in exchange for a, which may include but not be limited to (e.g., set cost, monthly cost, yearly cost, or on-going fixed price or an exchange amount of dates. Which may have one option or more than one option with set prices, price ranges, general pricing, general transmittables, buy-now prices, price ranges, general pricing, general transmittables, monthly prices, price ranges, general pricing, general transmittables, yearly prices, price ranges, general pricing, general transmittables, or lifetime prices, price ranges, general pricing, general transmittables, etc.)

FIG. 59: In some embodiments, user interface may show the, which may include but not be limited to (e.g., price option, price, payment options, payments, availability, calendar, galleries, photos, content, etc.) that may have been clicked on/chosen by the, which may include but not be limited to (e.g., paid dater's view, paying person, user, person to pay, registered person to spend money on the platform, etc.) and user interface may show, which may include but not be limited to (e.g., simple boxes, simple types, dummy versions, less full versions, different types, etc.) which may include but not be limited to (e.g., short amount of information, dummy version, less full version, best photo of the creator and their price, etc.) depending on, which may include but not be limited to (e.g., creators, models, users, etc.) which may include but not limited to (e.g., preferences, suggestions, computing operation, type, funds available, etc.) In some embodiments, the user interface may have the option to which may include but not be limited to (e.g., click on who they like, explore their profile, go directly to the calendar booking area, directly to a photo gallery, a profile section with a calendar booking area, etc.) In some embodiments, there may be, which may include but not be limited to (e.g., a user interface or feature or screen, hologram, user interface, viewing display, or showing, etc.) that may indicate which may include but not limited to (e.g., user's available time, time spent, time needed to spend, amount of money, amount of funds available, any specials, any offers, any discounts, time that is open, time that is not open, calendars, charts, lists, organization of persons, messages, etc.)

In some embodiments, the user interface may be the, which may include but not be limited to (e.g., paying daters, the person paying, 3rd party paying, the entity paying, business paying, any gifting, gifting, donations, donating, user paying, the person spending money, person subscribing, person on membership, the person sending money, etc.) view. In some embodiments, the view that the, which may include but not be limited to (e.g., paying daters, persons paying, etc.) may be shown or defined as, which may have but not be limited to (e.g., those that are registered to obtain dates, those that pay or seek entertainment on platform, etc.) may be able to view. In some embodiments, the user interface may include or have options such as searching for things that may include but are not limited to (e.g., distance, price, looks, weight, model, interests, types, categories, etc.) In some embodiments, which may include but not be limited to (e.g., paying person, user, the person sending money, person pressuring, etc.), may be able to be searched by 'matching AI-connecting qualities' such as, which may include but not be limited to (e.g., distance, city, location, type, category, availability, attractiveness, etc.)

In some embodiments, the user interface may be the, which may include but not be limited to (e.g., models, paid creators view, any creators view, any users view, public view, user interface view, etc.) In some embodiments, user interface may be a, which may include but not be limited to (e.g., model, creator view, users view, public view, user interface view, etc.) in which the, which may include but not be limited to (e.g., user, model, girl, creator, paid dater, etc.) may show interest first, which may include but not be limited to (e.g., search the platform for a man to show interest in, contact a person, send message, allow messages, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, request to view more information or content, photos, exclusive photos, etc.) that she may send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date or wants to go out on a date etc.)

In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, request to view more information or content, pay to view more information or content, spend money, see live, view live, view subscriptions, view money, view following, see the weight, see height, view prices, price ranges, general pricing, general exchangeable, subscribe, follow, book a date with her, book date, book meeting, block off her calendar, send her flowers, send her gifts, etc.) In some embodiments, categories that may be able to be searched may include but not be limited to (e.g., looks, salary, net worth, career, type, model-type, model feature, request to view more information or content, pay to view more content, marketing, paid for marketing, suggested, computing operation, looks, interests, prices, price ranges, general pricing, general transmittables, any prices, price ranges, general pricing, general transmittables, any pricing, changed prices, price ranges, available pricing, general transmittables, auction prices, price ranges, general pricing, general transmittables, bidding/auction prices, price ranges, general pricing, general transmittables, reserve prices, price ranges, general pricing, general transmittables, additional prices, price ranges, general pricing, general transmittables, types of accepted assets, etc.)

FIG. 60: In some embodiments, the user interface may be part of the, which may include but not be limited to (e.g., paying persons, users, registered users, public users, persons uploading funds, persons transferring assets, men, etc.) application to prevent, which may include but not be limited to (e.g., catfishing, someone from uploading photos from 20 years ago, false images, false content, false views of a person, false pictures or videos of persons, very old content, old content, not accurate photos, etc.) In some embodiments, there may be multiple options such as 'upload 3-5 current live photos' or 'upload 10-20 current photos', etc.) or to verify who the user is from a platform or through 3rd party integration, or 3rd party confirmation, etc.) In some embodiments, this may prevent catfishing and give a chance to prove who they are. In some embodiments, also the platform may suggest (using computing operations described herein) which photos they should use on their profile or send them an AI-generated selected list of pictures. For example, suppose they upload ten or more that we think would stand out. In that case, there may be an automated way for those pictures to be suggested or used on their profile if they don't know how to regulate or to view or show good pictures or take good pictures, or computing devices may use them as suggested profile photos for dating or any other reason In some embodiments, there may be an option for the paying daters to purchase the platform's stylist team that would suggest how to get the best photos done and what is the best selling point of photos, which may include but not be limited to (e.g., colors, angles, types of images, investment suggestions for photos, etc. Some embodiments may have a 'apply or reapply approval process.' In some embodiments, there may be a process in which if the first application is denied, the, which may include but not be limited to (e.g., person, robot, AI, user, etc.) may be allowed to apply or reapply until all guidelines are met to get an approval. In some embodiments, the person must meet all criteria to get approved. In some embodiments, the requirements may be listed on the platform, sent, shown, or made aware, or may not be made aware, or may be trade secrets, or at the discretion of the executives, person working, or contractors, or person's associated with the platform, or something that needs to be read and understood, etc.) In some embodiments, the guidelines for approval or denial may change, and the number of applications that may be reapplied may be altered.

In some embodiments, there may be an option for a, which may include but not be limited to (e.g., 'husband' 'boyfriend' 'partner' etc.) application process in which the 'pursuer' may, which may include but not be limited to (e.g., send an application and payment in exchange for a review and/or a potential consideration of the 'application's name' and/or general idea of the application, etc.) Some embodiments, which may include but not be limited to (e.g., considerations or inquiries or submissions, etc.), may go into a database for the 'creator' or 'model' to further consider at a later date or currently, or any anytime. In some embodiments, the application cost may be equal to or higher than an in-person date and less. In some embodiments, the process is a consideration process where the 'paid dater' or 'pursued person' may have all of the information they need about someone else to decide on whether or not (e.g., user, person, entity, 3rd party, etc.) want to proceed or consider that person(s) for what the application or gathering of information plus a payment option or mandatory payment, states or is implied for.

FIG. 61: In some embodiments, this may be the, which may include but not be limited to (e.g., users view, creators view, model's view, dater's view, etc.) which may show an option to allow a person they, which may include but not be limited to (e.g., 'like, want to see, want to meet, want to view, is proposing a date to, etc.) which may allow user interface may show the option to get, which may include but not be limited to (e.g., pre-approved date times sent to them, approval for, approved or confirmed connection information, approved date location, approved date user, approved date partner, approved activities, allow the other person to pick a time or date or location, stuff about the date, additional things regarding the date, different approval matters regarding connection or payment or gifts, etc.) In some embodiments, for example, which may include but not be limited to (e.g., an opt-in option for a dater to allow a person they like to 'choose the date, time, and location' of the date, etc.), which may enable getting it approved by the 'dater' directly which may then added to, which may include but not be limited to (e.g., assistant information, timing information, calendar of user, both calendars, etc.) In some embodiments, the creator may see an option to allow themselves to, which may include but not be limited to (e.g., secure, inquire about, book, etc.) their, which may include but not be limited to (e.g., proposed time, date, and location for a 'date' on their calendar, details regarding their virtual date, entertainment options set by anyone or model or user, any details proposed such as ice cream or shopping or time proposal, etc.) which may be then approved by the 'dater' or 'paid person' which may then add it directly on to both person's calendar which may show that they are both booked or unavailable or on a date at that time. In some embodiments, approval may come from, including but not limited to (e.g., one or both parties, any user, one user, or any party, etc.)

FIG. 62: In some embodiments, this may be the, which may include but not be limited to (e.g., management center, creator center, an area where the paid person manages, etc.) their, which may include but not be limited to (e.g., business, profile, content, dates, persons, users, approved users, members, membership status, content that is to be unlocked or locked, how to get paid, how they get paid, transactions, educational resources, members, forum, resources, mental health resources, SA resources, any profile, any content, any management system, any content management system, etc.) which may include but not be limited to (e.g., self, content, process, automation, management system, prices, price ranges, general pricing, general exchangeable, mental health, memes, safety chaperones, security, support, or security, how to run your business, resources, SA resources, 3rd party resources, get paid, payouts, payment accepting types, live streaming, lives, live streaming, pre-recorded live streaming, safety center, educational resources, 3rd party resources, 'business' or collection, or items, or time offerings, etc.) In some embodiments, there may be a combination of in any order but is not limited to the following: a resource center located that is accessible that may include but is not limited to (e.g., educational resources such as 'how to become a nurse' a 'safety center' etc.) which may or may not include anyone that has in-person dates or is opted in as a, which may include but not be limited to (e.g., creator, user, person, etc.) that may or may not accept in-person dates. In some embodiments, other items or resources such as, which may include but not be limited to (e.g., sexual/coercion/trickery, false promises/danger/assault resources, may consist of national, local, and state resources, mental health resources such as 'female counselors near me' 'community or creator learning' this may be an option for creators to learn how to go about their date better such as what to wear, how to act, how to behave, what to say, etc.)

In some embodiments, there may be a 'private safety community center' for creators or models on the platform, which may include but not be limited to (users or persons that do not spend any money on the platform, users that may obtain money on the platform, etc.). In some embodiments, this private center may not be accessible to, including but not limited to (e.g., 'paid daters, subscribers, users besides 'creators' 'models, persons obtaining money, or any assets through the platform, etc.) In some embodiments, once the creator spends any amount of money on the platform on another creator or anyone else, the safety center may not be available further as they may be categorized as, which may include but not be limited to (e.g., paying daters, paying spenders, etc.) In some embodiments, 'safety community center' for, which may include but not be limited to (e.g., creators/models on the platform or any technology, users or persons may offer solutions or information, which may include but not be limited to (e.g., community methods, community information, blog posts, informational posts, methods to obtain self-submitted information or self-submitted information from other creators that explain anything such as 'any psychological methods used to put someone in danger, to put any type of creator in 'any sort of danger, compromising situation' or something that was a lie' such as offering more money to meet them in their car, or meet them somewhere not agreed upon for the 'date' from a guest/paid dater/paid person on the 'dating platform, etc.)

In some embodiments, there may also be a separate one for, which may include but not be limited to (e.g., information regarding virtual-only paid people, etc.) but may be less likely than the safety precautions for, which may include but not be limited to (e.g., 'in-person dates' connections, meeting, etc.) because 'in-person date knowledge' is the best knowledge to have regarding, which may include but not be limited to (e.g., safety precautions, safety standards, etc.) that may need to be taken to ensure every creator on a 'date' will be safe. In some embodiments, the, which may include but not be limited to (e.g., 'safety center,' safety area, informational center, etc.) may be available and/or user interface may be to inform, which may include but not be limited to (e.g., users, persons, etc.) on methods to, which may include but not be limited to (e.g., watch out for, to spot danger, to obtain knowledge to combat any physical or psychological methods that may be used to trick a 'creator' into danger, etc.) which may include but not be limited to (e.g., compromising situation, dangerous situation, etc.) by any type of, which may include but not be limited to (e.g., user, person, paid person, stranger, non-paid persons, person meeting, persons booking, persons paying, bidders, daters, etc.) In some embodiments, the, which may include but not be limited to (e.g., privacy center and/or safety center, informational area, etc.) may have, which may include but not be limited to (e.g., anonymous posts and anonymous information, self-created information, user-created information, platform created information, outside created information, etc.) In some embodiments, the post or information submitted may or may not be, including but not limited to (e.g., monitored, changed, or updated to ensure proper grammar or proper communication of what was trying to be said or communicated through the post, etc.) In some embodiments, information may be, which may include but not be limited to (e.g., changed, edited, retyped, re-communicated, changed, anonymous, etc.) in a way where, which may include but not be limited to (e.g., the user interface may be a warning, rather than an actual post that is self-submitted, etc.) user interface may be taken and essentially, which may include but not be limited to (e.g., changed into different ways to communicate message or idea or anything edited, edited, rewritten, etc.) which may include but not be limited to (e.g., 'what to avoid' or 'methods of psychological tricks by unsafe situations on a date' ways that daters may try to XYZ' 'methods on how daters may try to XYZ' 'methods on how potential daters would try to XYZ, etc.) In some embodiments, which may include but not be limited to (e.g., methods of information gathering, processing what is being said and what needs to be done, knowledge sharing, etc.), may be used in the help center or any area on the platform(s), outside of the platform, or 3rd party, etc.)

In some embodiments, there may be options for users to book, schedule, inquire about, inquire about, inquire regarding, secure, create connection to, hold, pay for, create business relationship with, use transmittables to secure or book, schedule, inquire about, etc.) which may include but not be limited to (e.g., 'safety chaperones, security, support, or security, 3rd party security, models, creators etc.) In some embodiments, 'safety chaperones, security, support, or security, may be described as someone, which may include but not be limited to (e.g., from the platform, another user, another person, a 3rd party entity, a 3rd party service, a 3rd party person, a family member, a former platform person, a member, etc.) In some embodiments, 'safety chaperones, security, support, or security,' may be used a 'security' whether, which may include but not be limited to (e.g., emotional or physical or both, or physical, or safety etc.) In some embodiments, outside security may be booked through a, which may include but not be limited to (e.g., 'bodyguard or security service' or any outside service that is either approved, not approved, or is a partner platform, is not a partner, or is a family member, or a friend, etc.) In some embodiments, which may include but not limited to, the: (e.g., outside booking or safety booking, or other entity booking, or other person booking by user etc.) may be, which may include but not be limited to (e.g., deducted from earning that day or anytime earnings are made, whether at the time of the booking, after funds have been paid, or up front, whether from their pre-loaded funds, their funds available, or a transfer from a bank, whether that transfer is immediate or after some type, or from a credit service, or a credit booking etc.) In some embodiments, there may be options for community-made memes for laughable purposes and to share silly items with other creators, there may also be options such as 'pay another creator to act as a chaperone, security, or secret 3rd party (which may be undetectable by person paying for date) in order to maintain and to ensure safety while on an in-person date, there also may be a, which may include but not be limited to (e.g., 'how to run your business' resource center, etc.) there also may be items such as resources or center resources that may teach creators about, which may include but not be limited to (e.g., 'danger, coercion, trickery, pimps, lies, false promises, psychopathic methods, danger, psychological danger, methods to watch out for, signs to watch out for, safety information, dangerous daters methods' such as items that criminals or narcissists that have hurt women, etc.) In some embodiments, Also, there may be trafficking resources such as, which may include but not be limited to (e.g., illegal activities, pimps or 'forced labor' and information about trafficking or forced labor such as human trafficking, sex trafficking, etc.) These may be in the form of a, which may include but not be limited to (e.g., link, an article, a button, a 3rd party website, etc.)

FIG. 63: Some embodiments may have an 'apply or reapply approval process, or approval process, or application process, or content application process, or type of user application process, or apply again.' In some embodiments, there may be a process in which, if the first application is denied, the person can apply or reapply until all guidelines are met to get approval. In some embodiments, the person must meet all criteria to get approved. In some embodiments, the requirements may be (e.g., listed on the platform, sent, or shown, or made aware, or may not be made aware, or may be trade secrets, or at the discretion of the executives, person working, or contractors, or person's associated with the platform, or something that needs to be read and understood, etc.) In some embodiments, the guidelines for approval or denial may change, and the number of applications that may be reapplied may be altered, or users may be removed if they don't follow or fit the guidelines or policies or change due to new guidelines, etc.)

In some embodiments, there may be an option for a, which may include but are not limited to (e.g., 'husband' 'boyfriend' 'partner' application process/interface, etc.) in which the, which may include but are not limited to (e.g., 'pursuer,' man, user, person, AI, robot, 3rd party integration, etc.) may send an which may include but are not limited to (e.g., application and/or payment etc.) in exchange for, which may include but are not limited to (e.g., a potential review and/or a potential consideration of the 'application's name' or general idea of the application or idea, etc.) In some embodiments, this may go into a, which may include but are not limited to (e.g., database, management system, place, interface, etc.) for the 'creator' or 'model' to, which may include but are not limited to (e.g., further consider at a later date, or currently, etc.) In some embodiments, the, which may include but are not limited to (e.g., cost of the application, transmittables, assets, etc.) may be, which may include but are not limited to (e.g., different, equal to or higher than an in-person date, it also may be less, etc.) In some embodiments, which may include but are not limited to (e.g., user, model, etc) may, which may include but are not limited to (e.g., set their own price, have the platform set, market value, market price, 3rd party pricing, etc.) for, which may include but are not limited to (e.g., 'application' or 'consideration,' etc.) In some embodiments, the process is a consideration process where the, which may include but are not limited to (e.g., 'paid dater' or 'pursued person' or model, or creator, or user, etc.) may have all of the information they need about someone else in order to make a decision on whether or not (e.g., user, person, entity, 3rd party, etc.) want to proceed or consider that person(s) for what the application or gathering of information plus a payment option or mandatory payment, states or is implied for. In some embodiments, there may be an application form or page which may include but are not limited to (e.g., applying to date a model in person, 3rd party background check requirement, personal background check requirement, tax verification, income verification, asset verification, employment verification, driver's license or passport verification etc.) In some embodiments, there may be options for home screen, hologram, user interface, viewing display, submit application, go to 3rd party to fill out, payment options or payment requirements to submit form, etc.) In some embodiments, there may be a, which may include but not be limited to (e.g., 'become a model' form or 'app to be a model' or 'apply to join' or 'apply to join platform' or apply to go on dates, apply to date in-person, apply and get background check, apply, apply and gain approval, 'apply to make money etc.) that may be linked to a form or some type of application that may be used to determine if the applier meets the required criteria to become a, which may include but not be limited to (e.g., creator, person, user of the platform, user of 3rd party platform, user or any platform, assisted, able to make money, model or a user to get paid on platform, eligible to get paid, etc.) In some embodiments, user interface may link to a, which may include but not be limited to (e.g., identify verification, user information, background information, LinkedIn profiles, linked information, background check, criminal check, model history, content submission, etc.) In some embodiments, there may be options to get a, which may include but not be limited to (e.g., platform photoshoot, professional photoshoot with 3rd party, other professional photoshoot done etc.) but in which user interface may not be required, self-made photos may be used for, which may include but not be limited to (e.g., verification or application purposes or any other purposes, or 3rd party purposes, or private-kept data etc)

In some embodiments, payment may be required in exchange for any option such as, which may include but not be limited to (e.g., payment to view content, payment to view calendar, interact with to view calendar, interact with to view timing data method, payment to book, schedule, inquire about, inquire about, ask regarding, secure, create connection to, hold, pay for, create business relationship with, use transmittables to secure or book, schedule, inquire about, etc.) payment to join call, charge for background check by 3rd party, cost to live stream, pre-recorded live stream, pre-recorded content, amount to join stream, payment to join call, payment for content, payment for message, payment to see calendar, payment to see profiles, amount to visit other cities, price to book, schedule, inquire about, inquire about, inquire regarding, secure, create connection to, hold, pay for, create business relationship with, use transmittables to secure or book, schedule, ask about, etc.) profiles or persons in other cities, payment to view stories, payment to view live or current content, amount to follow, payment to subscribe, pay for unlimited content, cost for unlimited messages, payment for unlimited dates, payment for contact options, payment for contact information, amount to see live, price to obtain information, cost to match, payment to view now, payment to unlock content, payment to begin, fee to view information about user, payment to see background check, price to send direct message, payment to add to category, payment to add to list, amount to be on cover, cost to be on first page, amount to be at top, payment to be suggested, payment to wink, flirt, send heart, price to speak to another person, etc.

FIG. 64: In some embodiments, this may be the 'daters' log once he (e.g., person, user, etc.), which may include but not be limited to (e.g., has bought a date, paid for a date, paying user, membership only, members only, registered user, sent gifts or money, etc.) which may include but not be limited to (e.g., before, after, during the date or before, during, or after checkout or payment has been completed for a date, etc.) In some embodiments, this summary log or log of information regarding a, which may include but not be limited to (e.g., breakdown, itemized, receipt, invoice, total, partial, breakdown, bill, a summary of, total, each item cost or payment or total of all payment or just the total of items, or total of date, or amount needed or suggested amount, etc.) of the 'date' that may stay there long after the date has concluded or forever, or disappear, or the 'creator' may have the option to, which may include but not be limited to (e.g., remove, block, or prevent, accept, change, limit, restrict, etc.) any potential person/user/dater from sending, which may include but not be limited to (e.g., 'her, user, model, person, registered user, viewing person,' etc.) anything or rebooking after a date using any ways such as this date summary log. In some embodiments, the user interface may have a, which may include but not be limited to (e.g., a summary of the date, photos of the potential daters, and options for the 'paying person' to pre-book for example, a vehicle or any transportation service, to and from the restaurant date which may remain completely anonymous and the 'paid dater' may have zero access, some access, or full access to any personal information or any information about the 'creator' or 'paid for dater' etc.)

In some embodiments, there may be other options such as, which may include but not be limited to (e.g., sending flowers to her house or having flowers delivered to the restaurant during your date, or 'send her a digital gift card, or 'sending her a hair and makeup artist' etc.) In some embodiments, there may be a 'buy now option' to send, which may include but not be limited to (e.g., all of the requested or suggested options add more to the date to be paid for in full or in payments by the 'paying dater' etc.) In some embodiments, this page may show the 'creator or model, entity, 3rd party, user, 's,' which may include but not be limited to (e.g., requested date flowers, Uber, transportation service, requests for a date, beauty expenses for a date, etc.) In some embodiments, this may be where the 'paying dater may be looking at the request and either approve or deny it and potentially be required to state a reason as to why he may not accommodate her request. In some embodiments, the creator may be allowed to: (e.g., cancel the date at any time if her request accommodations are not met or if she may not like his response to why he may not accommodate her car transportation, transportation service, payment for the date, or the fact that he is saying no to further accommodations, etc.)

In some embodiments, this may be the, which may include but not be limited to (e.g., 'potential process for date check-in, check-out, time stamp, time record, time and data record, location, time and data record, or check out or date data collection beginning or any part of the process, etc.) In some embodiments, which may include but not be limited to (e.g., date log, management area,' or area where the 'date' or 'connection' or 'meeting information or area to record, log, or complete date is located, etc.) In some embodiments, there may be different screens to attempt to, including but not limited to (e.g., record, log, or track the entirety of the date, record the entire date, etc.) In some embodiments, the 'date log, management area,' may ask the, which may include but not be limited to (e.g., 'dater, creator, model, paid person, paying person, etc.) to, which may include but not be limited to (e.g., check-in at the location' or show that the person has begun the date, it may be manually, automatically shown based on collected or gathered or inserted data, etc.) In some embodiments, the user interface may, which may include but not be limited to (e.g., send, secure, record, etc.) a location tracking to the, which may include but not be limited to (e.g., date log, management area, network, platform, data center, etc.) to maintain a record of, which may include but not be limited to (e.g., date, connection, time, meeting, etc.) for any reason. In some embodiments, once the 'paid person or paying person' has, which may include but not be limited to (e.g., begin, beginning, start, checked-in, begun, started, recorded, informed, agreed on, or checked-out, assumed started, agreed upon, finished, ended, accepted ended, decided to end, etc.) user interface may start a location tracking of the entirely of the date which may be recorded in real-time and maintained on records so that there may be proof of the date occurred.

In some embodiments, the user interface may be shown in images such as FIG. 254 or any user interface. In some embodiments, the 'check-in, check-out, time stamp, time record, time and data record, location, time and data record' may be manual, automatic, or semi-automatic meaning the user interface may be turned on and off, manually checked in, or automatically (e.g., checked-in, begun, started, recorded, informed, agreed on, or checked out, assumed started, agreed upon, finished, ended, accepted ended, decided to end, etc.) based on location matching AI-connecting, where the date is supposed to be at. In some embodiments, there may be a swiping method, a button click, a double tap, a checking method, a tap, an automatic check-in, check-out, time stamp, time record, time and data record, location, time and data record, a manual check-in, check-out, time stamp, time record, time and data record, location, time and data record, or a restaurant check-in, check-out, time stamp, time record, time and data record, location, time and data record, to, which may include but not be limited to (e.g., begin date or check-in, check-out, time stamp, time record, time and data record, location, time and data record, start date, begin, time starting, countdown starting' etc.) In some embodiments, this 'date data' is recorded to prove the date occurred; this may include, which may include but not be limited to (e.g., time, location, date, year, month, restaurant coordinates in comparison to paying person's coordinates, map location coordinates, duration, check-in, check-out, time stamp, time record, time and data record, location, time and data record, coordinate(s), of date, etc.) until obligations of date are complete. For example, the data may be recorded automatically from the time and date of date to confirm or deny that the date occurred at the paid for and obligated time and place agreed upon on the paid agreement. This may be shown in some embodiments, such as FIG. 254, or any user interface. In some embodiments, the paid dater may obtain payment if no obligated date occurred according to the terms and conditions of the date agreement paid for. Still, the paid dater failed to report a 'failure to show' within the time frame, which would be thoroughly investigated before payment is disbursed. In some embodiments, there may be a 'live' time that is shown on the 'model or dater's date log, management area, or platform access' which may help determine a good time to 'check-in, check-out, time stamp, time record, time and data record, location, time and data record,' to their date. In some embodiments, the paid dater or person making date payment may also have a screen or date log, management area, that is similar in which the 'paid dater' may have their record of location, time, date, coordinates, map location, year, month, day, etc.) similar to the 'paid dater' in which these data points may be compared to the paid daters or models' log if there are any disputes on location, time, problems, etc.) In some embodiments, which may include but not be limited to (e.g., data logs, a gathering of data, etc.), may be seen as or shown as or maybe, which may include but not be limited to (e.g., regarding date information, time, location, both persons on a date may be used to determine if date occurred, if there are issues or disputes between the parties, etc.) In some embodiments, there may be other optional options to show more 'proof of date' or proof that obligations paid for were met to ensure payment is disbursed. In some embodiments, the 'live location' may show the 'dater' where they are located or what location coordinates or places they are at. In some embodiments, the 'live location' may be automatic, and the 'dater' or 'paid dater' may not need to check in because the location may automatically check in for them and records all data.

In some embodiments, this may be shown as a, including but not limited to (e.g., date subscription model, membership option, membership model, pre-pay model, etc.) In some embodiments, this may be potentially be a, which may include but not limited to (e.g., date subscription model, membership model pre-pay model, etc.) for, which may include but not limited to (e.g., in-person dates per month/time period, dates per time period, connection(s) per time period, etc.) that may allow dater to pay or obtain, which may include but not be limited to (e.g., for a monthly fee, for a fee, for a price for a time duration, check-in, check-out, time stamp, time record, time and data record, location, time and data record, coordinate(s), a one-time fee, on-going fee, credit-fee, credit subscription, pre-paid subscription, a subscription price during any time period or duration, check-in, check-out, time stamp, time record, time and data record, location, time and data record, coordinate(s), which may include but not limited to (e.g., to obtain hand-picked, or hand-set, or expert-picked, or "dates arranged by someone else with less work to the client, etc.) in exchange for a, which may include but not be limited to (e.g., set cost, monthly cost, yearly cost, or on-going fixed price or an exchange amount of dates. Which may have one option or more than one option with set prices, price ranges, general pricing, general exchangeable, buy-now prices, price ranges, general pricing, general transmittables, monthly prices or fees or costs, price ranges, general pricing, general transmittables, yearly prices, price ranges, general pricing, general exchangeable, or lifetime prices, price ranges, general pricing, general transmittables, etc.)

Figure 65:
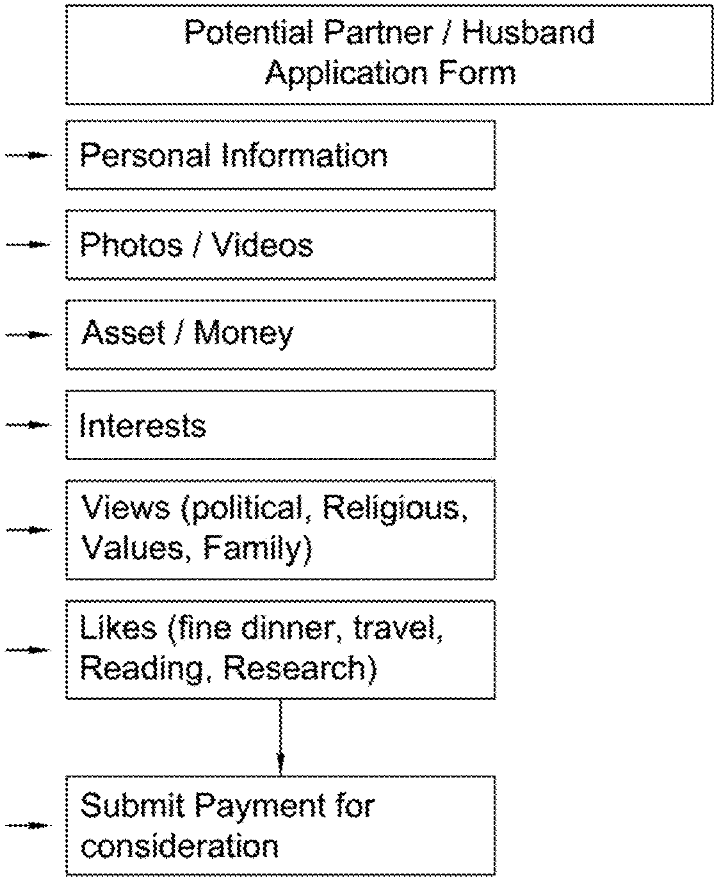

FIG. 65: In some embodiments, there may be an option for a, which may include but not be limited to (e.g., friendship, searching, seeking, type, what they want in a partner, qualities, looks, long-term partner, short-term dater, short-term partner, 'husband' 'boyfriend' 'partner' suggestions or request or category or viewing, etc.) application process in which the 'pursuer' may send an application and payment in exchange for a review and a potential consideration of the 'application's name' or general idea of the application. In some embodiments, this may go into a database for the 'creator' or 'model' to further consider at a later date or currently. In some embodiments, the application cost may be equal to or higher than an in-person date and less. In some embodiments, the process is a consideration process where the 'paid dater' or 'pursued person' may have all of the information they need about someone else to decide on whether or not (e.g., user, person, entity, 3rd party, etc.) want to proceed or consider that person(s) for what the application or gathering of information plus a payment option or mandatory payment, states or is implied for.

In some embodiments, there may be a combination or one of the following which may be included but not limited to (e.g., profile photo or profile information, content information, partner application for marriage, boyfriend application, [e.g., long-term partner, short term dater, short term partner, 'husband' 'boyfriend' 'partner' etc.] content, locked content, streamed content, streaming information, streamed photos, streamed pictures, subscriber-only photos, videos, or content, follower only photos, videos, or content, etc.) In some embodiments, there may be a link that goes to a 3rd party or an internal or platform application for a user, public person, or anyone to submit a, which may be included but not limited to (e.g., 'boyfriend application, husband application, partner application, domestic partner application, business application, business-related application, date application, or information, etc.) In some embodiments, there may be an option for a, which may include but not be limited to (e.g., long-term partner, short term dater, short-term partner, 'husband' 'boyfriend' 'partner' etc.) application process in which the 'pursuer' may send an application and payment in exchange for a review and a potential consideration of the 'application's name' or general idea of the application. In some embodiments, this may go into a database for the 'creator' or 'model' to further consider at a later date or currently. In some embodiments, the application cost may be equal to or higher than an in-person date and less. In some embodiments, the process is a consideration process where the 'paid dater' or 'pursued person' may have all of the information they need about someone else to decide on whether or not (e.g., user, person, entity, 3rd party, etc.) want to proceed or consider that person(s) for what the application or gathering of information plus a payment option or mandatory payment, states or is implied for.

In some embodiments, an, which may include but not be limited to (e.g., 'app' or 'application,' or user interface, or device, etc.) may be, which may include but not be limited to (e.g., automatically downloaded, or manually downloaded etc.) to a 'device' that is taken on, which may include but not be limited to (e.g., date' or 'connection meeting' etc.) in which the 'application or app' may be automatically recording and/or storing all data related to, which may include but not be limited to (e.g., location, time duration, check-in, check-out, time stamp, time record, time and data record, location, time and data record, coordinate(s), location, time, data, duration, check-in, check-out, time stamp, time record, time and data record, location, time and data record, coordinate(s), coordinates, etc.) In some embodiments, this data may be, which may include but not be limited to (e.g., recorded, kept, used, stored, sent, viewed, mended, changed, confirmed, sent to 3rd party, assessed, transferred etc.) from the application or any device to the, which may include but not be limited to (e.g., platform or the platform's data center or data storage, or data center, etc.) In some embodiments, this data may be used to, which may include but not be limited to (e.g., track, show, express, or show data etc.) which may be related to the, which may include but not be limited to (e.g., purchase, connection, meeting, paid obligations, contractual obligations, contractual agreements, etc.) In some embodiments, this data may be used in relation to any, which may include but not be limited to (e.g., complaints, disputes, obligations, or for any safety, or legal reasons, etc.) In some embodiments, there may be a combination or one of the following which may be included but not limited to (e.g., profile photo or profile information, content information, partner application for marriage, boyfriend application, [e.g., long-term partner, short term dater, short term partner, 'husband' 'boyfriend' 'partner' etc.] content, locked content, streamed content, streaming information, streamed photos, streamed pictures, subscriber only photos, videos, or content, follower only photos, videos, or content etc.) In some embodiments, there may be a link that goes to a 3rd party or an internal or a platform application for a user, public person, or anyone to submit a, which may be included but not limited to (e.g., 'boyfriend application, husband application, partner application, domestic partner application, business application, business-related application, date application, or information etc.) In some embodiments, there may, which may be included but not limited to (e.g., user interface, a screen or screens etc.) that, which may be included but not limited to (e.g., may show information, or photos, or content, or videos, or promotional material, or husband application, or boyfriend application, or date application, or customized entertainment, entertainment, requested entertainment, entertainment, application, or special request application, or specific content application, or message application, or message requests, or messaging prices, price ranges, general pricing, general transmittables, or messages, or contact information to message person or users, or ways to contact person by paying, or ways to submit payment, or locked content, or unlocked content, or public, or private content, or information, etc.)

In some embodiments, there may be a, which may include but not be limited to (e.g., next process, next thing that happens, third process, next process that is happening after adding this person as their 'boyfriend, etc.) which may result in the may include but not be limited to (e.g., special person, boyfriend, etc.) getting 'special treatment such as, which may include but not be limited to (e.g., not receiving 'instructional emails, not receiving emails that may suggest they don't know how to go on a date, not receiving basic etiquette rules at this point etc.) which may suggest that the creator and the person may have went on a successful date and now she is informing the platform that this person is her may include but not be limited to (e.g., special friend, boyfriend, etc.) In some embodiments, the may include but not be limited to (e.g., 'boyfriend' or 'special person, etc.) may be treated, which may include but not be limited to (e.g., differently, obtain special treatment, be put on list, added to category, etc.) than other users, or get special treatment, which may include but not be limited to (e.g., not receiving emails on how to act on a date or how to pull out chairs, not receiving marketing emails, not getting suggestions, suggesting more with this user on their user interface, price changes, lower prices, more date availabilities, VIP treatment such as 'access to all photos/videos/at the discretion of the user, etc.) In some embodiments, this may come or, which may include but not be limited to (e.g., after, before, during, way after, later, etc.) which may include but not be limited to (e.g., meeting, virtual meeting, in-person meeting, date, connection, message, subscribing, adding, adding to list, amount of money spent, etc.) has, which may include but not be limited to (e.g., been sent, been added, completed, successfully completed, good feedback, communication has occurred, etc.)

Figure 66:
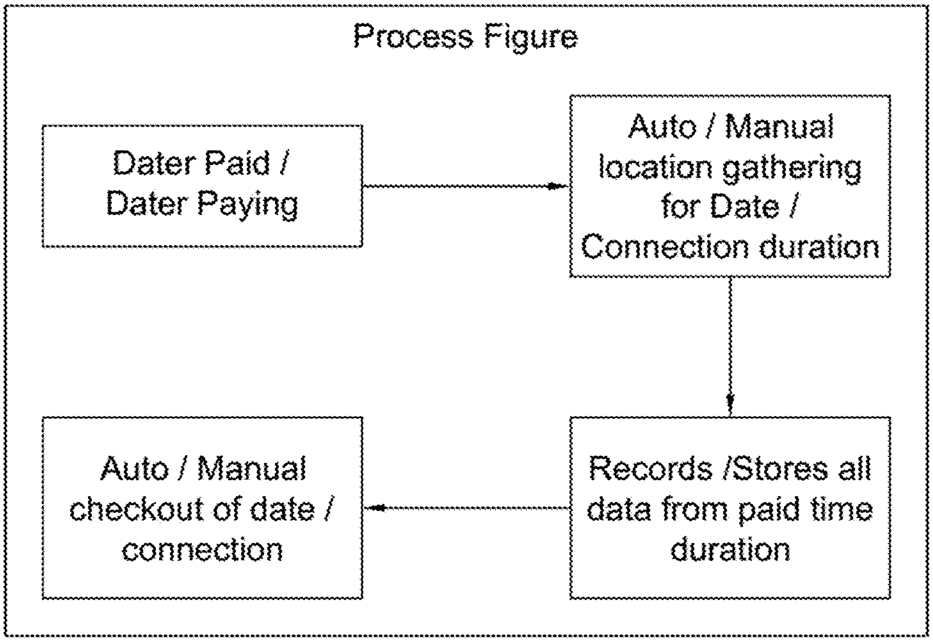

FIG. 66: In some embodiments, the process may go from, which may include but not be limited to (e.g., users, person, group, entity, public, registered persons, persons, 'daters' etc.) to an which may be included but not limited to (e.g., auto or manual data gathering regarding location, duration, check-in, check-out, time stamp, time record, time and data record, location, time and data record, coordinate(s), coordinates, movements, closest registered business, etc.) and user interface may store all data may include but not limited to (e.g., recording, location, time, coordinates, duration, check-in, check-out, time stamp, time record, time and data record, location, time and data record, coordinate(s), users information, date information, date log, etc.) In some embodiments, user interface may go to an may be included but not limited to (e.g., automatic, manual check-out, AI check-out, stopping, starting, recording, data gathering, etc.) to, which may be included but not limited to (e.g., end or suggest ending data collection, Network address, IP address, stop, change, coordinate, check-in, check-out, time stamp, time record, time and data record, location, time and data record, check out, etc.) which may include but not limited to (e.g., location, duration, check-in, check-out, time stamp, time record, time and data record, location, time and data record, coordinate(s), movements, coordinates, closest registered business, etc.)

In some embodiments, this may be the, which may be included but not limited to (e.g., 'Potential Process for Date check-in, check-out, time stamp, time record, time and data record, location, time and data record, or check out or date data collection beginning or any part of process' etc.) In some embodiments, the, which may be included but not limited to (e.g., 'date log, management area,' or area where the 'date' or 'connection' or 'meeting information or area to record, log, or complete date etc.) may be located, there may be, which may be included but not limited to (e.g., different screens, different user interfaces, other user interfaces, processes, etc.) to attempt to, which may be included but not limited to (e.g., record, log, or track the entirely of the date etc.) In some embodiments, the, which may be included but not limited to (e.g., 'date log, management area' etc.) may ask the, which may be included but not limited to (e.g., 'dater, creator, model, paid person, or paying person' or user, etc.) to, which may be included but not limited to (e.g., 'check in at the location, check in, begin date or check-in, check-out, time stamp, time record, time and data record, location, time and data record, start, record, track, show, etc.) In some embodiments, which may be included but not limited to (e.g., this, or automatically, or manually, or AI-created, or automatic recording, or auto tracking, etc.) may send a location tracking to the, which may be included but not limited to (e.g., 'date log, management area, network, platform, or data center etc.) to maintain record of which may be included but not limited to (e.g., connection, date, time, area, location, etc.) Once the, which may be included but not limited to (e.g., 'person getting paid, model, creator, person receiving or paying person, person sending transmittables, boyfriend, dater,' etc.) has 'which may be included but not limited to (e.g., checked-in, begun, started, recorded, informed, agreed on, or checked-out, assumed started, agreed upon, finished, ended, assumed ended, agreed to end, etc.) user interface may, which may be included but not limited to (e.g., start a location tracking of the entirely of the date, record, track, send data, send recurring data, etc.) which may be recorded in which may be included but not limited to (e.g., real-time, currently, tracking, constant tracking, etc.) and/or maintained on records so that there is which may be included but not limited to (e.g., proof of the date occurred, proof, tracking, time, persons, locations, 3rd parties, advertisers, advertisements, businesses, etc.) In some embodiments, this may be shown in some embodiments such as FIG. 254 or any user interface. In some embodiments, the, which may be included but not limited to (e.g., checked-in, begun, started, recorded, informed, agreed on, or checked-out, assumed started, agreed upon, finished, ended, assumed ended, agreed to end, etc.) which may be, which may be included but not limited to (e.g., manual, automatic, or semi-automatic, or AI-created, or automatically recorded, etc.) which may be included but not limited to (e.g., user interface, data, location, etc.) may be which may be included but not limited to (e.g., turned on and off, manually checked in, or automatically checked-in, begun, started, recorded, informed, agreed on, or checked-out, assumed started, agreed upon, finished, ended, assumed ended, agreed to end, based on location matching AI-connecting, where the date is supposed to be at etc.) In some embodiments, user interface may show, which may include but not be limited to (e.g., earnings, payouts, referrals, pending payments, pending requests, amounts earned, amount earned, amount, fees, net payment, gross payment, statement, earnings, profile, statements, taxes, 3rd parties for taxes, 3rd parties, advertisers, advertisements, businesses, outside entities, outside parties, messages, queue, home, profile, messages, earnings from messages, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

In some embodiments, there may be a, which may be included but not limited to (e.g., swiping method, a button click, a double tap, a checking method, a tap, an automatic check-in, check-out, time stamp, time record, time and data record, location, time and data record, a manual check-in, check-out, time stamp, time record, time and data record, location, time and data record, or a restaurant check-in, check-out, time stamp, time record, time and data record, location, time and data record, to 'begin date or check-in, check-out, time stamp, time record, time and data record, location, time and data record,' etc.) In some embodiments, this 'date data' is recorded to prove the date occurred; this may include which may be included but not limited to (e.g., time, location, date, year, month, restaurant coordinates in comparison to paying person's coordinates, map location coordinates, duration, check-in, check-out, time stamp, time record, time and data record, location, time and data record, coordinate(s), of date until obligations of date are complete, etc.) In some embodiments, for example, which may be included but not limited to (e.g., data may be recorded automatically from the time and date of date to confirm or deny that the date occurred at the paid for and/or obligated time and place agreed upon on the paid agreement, etc.) This may be shown in some embodiments, such as FIG. 254, or any user interface. In some embodiments, the paid dater may obtain payment if no obligated date occurred according to, which may be included but not limited to (e.g., any terms, agreed terms, terms, and conditions of the date agreement paid for, etc.) but for example which may be including but not limited to which may be included but not limited to (e.g., the paid dater failed to report a 'failure to show' within the time frame which may then be thoroughly investigated before payment is disbursed, etc.) In some embodiments, there may be a 'live' time that is shown on the, which may be included but not limited to (e.g., model or dater's date log, management area, or platform access, etc.), which may help determine a good time to 'check-in, check-out, time stamp, time record, time and data record, location, time and data record,' to their date.

In some embodiments, there may be a, which may include but not be limited to (e.g., next process, next thing that happens, third process, next process that is happening after adding this person as their 'boyfriend, etc.) which may result in the may include but not be limited to (e.g., special person, boyfriend, etc.) getting 'special treatment such as, which may include but not be limited to (e.g., not receiving 'instructional emails, not receiving emails that may suggest they don't know how to go on a date, not receiving basic etiquette rules at this point etc.) which may suggest that the creator and the person may have went on a successful date and now she is informing the platform that this person is her may include but not be limited to (e.g., special friend, boyfriend, etc.) In some embodiments, the may include but not be limited to (e.g., 'boyfriend' or 'special person, etc.) may be treated, which may include but not be limited to (e.g., differently, obtain special treatment, be put on list, added to category, etc.) than other users, or get special treatment, which may include but not be limited to (e.g., not receiving emails on how to act on a date or how to pull out chairs, not receiving marketing emails, not getting suggestions, suggesting more with this user on their user interface, price changes, lower prices, more date availabilities, VIP treatment such as 'access to all photos/videos/at the discretion of the user, etc.) In some embodiments, this may come or, which may include but not be limited to (e.g., after, before, during, way after, later, etc.) which may include but not be limited to (e.g., meeting, virtual meeting, in-person meeting, date, connection, message, subscribing, adding, adding to list, amount of money spent, etc.) has, which may include but not be limited to (e.g., been sent, been added, completed, successfully completed, good feedback, communication has occurred, etc.)

In some embodiments, the paid dater or person making date payment may also have a, which may be included but not limited to (e.g., screen or date log, management area, etc.) that may be similar in or different in which the 'paid dater' may have their record of which may be included but not limited to (e.g., location, time, date, coordinates, map location, year, month, day, etc.) similar to the 'paid dater' in which these data points may be compared to the paid daters or models' log if there are any disputes on location, time, problems, etc.) In some embodiments, which may be included but not limited to (e.g., data logs, a gathering of data, etc.) may be seen as or shown as or may be, which may be included but not limited to (e.g., regarding date information, time, location, both persons on a date may be used to determine if date occurred, if there are issues or disputes between the parties, etc.) In some embodiments, there may be other optional options to show, which may be included but not limited to (e.g., more 'proof of date' or proof that obligations paid for were met, etc.), which may be to ensure payment is disbursed. In some embodiments, the 'live location' may show the 'dater (e.g., where they are located, what location coordinates, what place they are at, etc.) The 'live location' may be automatic, and the 'dater' or 'paid dater' may not need to check in because the location may automatically check-in for them and records all data.

Figure 67:
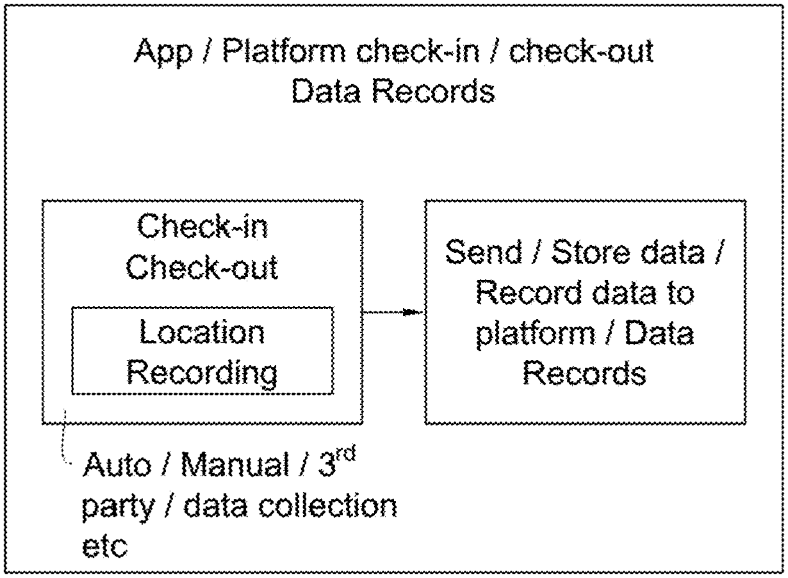

FIG. 67: In some embodiments, which may include but are not limited to an: (e.g., the app' or 'application' or device, etc.), may be automatically downloaded or manually downloaded to a 'device' that is taken on 'date' or 'connection meeting' in which the (e.g., platform, computing device, computing software, 'application or app' etc.) is automatically recording and storing all data related to: (e.g., location, time, date, data, duration, check-in, check-out, time stamp, time record, time and data record, location, time and data record, coordinate(s), coordinates, etc.) In some embodiments, this data may be, which may include but not be limited to (e.g., used, stored, sent, viewed, managed, changed, or transferred, etc.) from the application to the platform or the platform's data center or data storage. In some embodiments, this data may be used to (e.g., track, show, express, show, etc.) data related to, which may include but is not limited to, the: (e.g., contractual agreements, gentleman agreements, general agreements, purchase, paid obligations', etc.) In some embodiments, this data may be used with any, including but not limited to (e.g., complaints, disputes, obligations, or for any safety, or legal reasons, etc.)

In some embodiments, the user interface may be the 'Potential Process for Date, which may include but not be limited to (e.g., check-in, check-out, time stamp, time record, time and data record, location, time and data record, or check out or date data collection beginning or any part of the process,' etc.) In some embodiments, the 'date log, management area,' or area where the 'date' or 'connection' or 'meeting information or area to record, log, or complete date is located, there may be different screens to attempt to record, log, or track the entirely of the date. In some embodiments, the, which may include but not be limited to (e.g., date log, management area,' etc.), may ask the, which may include but not be limited to (e.g., dater, creator, model, paid person, or paying person, etc.) to, which may include but not be limited to (e.g., check-in at the location.' Check-in, start, begin, etc.) In some embodiments, this may send a location tracking to, which may include but is not limited to, the: (e.g., date log, management area, network, platform, or data center, etc.) which may maintain a record of, which may include but not be limited to (e.g., date, time, process, location, connection, etc.) In some embodiments, once the, which may include but not be limited to 'person getting paid, model, creator, the person receiving or paying person, the person sending transmittables, boyfriend, dater, etc.) has, which may include but not be limited to (e.g., checked-in, begun, started, recorded, informed, agreed on, or checked-out, assumed started, agreed upon, finished, ended, assumed ended, agreed to end, etc.) user interface may start a location tracking of the entirely of the date which will be recorded in real-time and maintained on records so that there is proof of the date occurred. This may be shown in some embodiments, such as FIG. 254, or any user interface. In some embodiments, the 'check-in, check-out, time stamp, time record, time and data record, location, time and data record' may be manual, automatic, or semi-automatic, meaning user interface may be turned on and off, manually checked in, or automatically (e.g., checked-in, begun, started, recorded, informed, agreed on, or checked-out, assumed started, agreed upon, finished, ended, assumed or accepted or suggested ended, decided to complete, based on location matching AI-connecting, where the date is supposed to be at.

In some embodiments, user interface or process, which may be included but not limited to (e.g., 'Potential Process for Date check-in, check-out, time stamp, time record, time and data record, location, time and data record, or check out or date data collection beginning or any part of the process,' etc.) In some embodiments, the, which may be included but not limited to (e.g., 'date log, management area,' or area where the 'date' or 'connection' or 'meeting information or area to record, log, or complete date, etc.) may be located, there may be, which may be included but not limited to (e.g., different screens, different user interfaces, other user interfaces, processes, etc.) to attempt to, which may be included but not limited to (e.g., record, log, or track the entirely of the date, etc.) In some embodiments, the, which may be included but not limited to (e.g., 'date log, management area' etc.) may ask the, which may be included but not limited to (e.g., 'dater, creator, model, paid person, or paying person' or user, etc.) to, which may be included but not limited to (e.g., 'check in at the location, check-in, begin date or check-in, check-out, time stamp, time record, time and data record, location, time and data record, start, record, track, show, etc.)

In some embodiments, there may be a, which may include but not be limited to (e.g., next process, next thing that happens, third process, next process that is happening after adding this person as their 'boyfriend, etc.) which may result in the may include but not be limited to (e.g., special person, boyfriend, etc.) getting 'special treatment such as, which may include but not be limited to (e.g., not receiving 'instructional emails, not receiving emails that may suggest they don't know how to go on a date, not receiving basic etiquette rules at this point etc.) which may suggest that the creator and the person may have went on a successful date and now she is informing the platform that this person is her may include but not be limited to (e.g., special friend, boyfriend, etc.) In some embodiments, the may include but not be limited to (e.g., 'boyfriend'" or 'special person, etc.) may be treated, which may include but not be limited to (e.g., differently, obtain special treatment, be put on list, added to category, etc.) than other users, or get special treatment, which may include but not be limited to (e.g., not receiving emails on how to act on a date or how to pull out chairs, not receiving marketing emails, not getting suggestions, suggesting more with this user on their user interface, price changes, lower prices, more date availabilities, VIP treatment such as 'access to all photos/videos/at the discretion of the user, etc.) In some embodiments, this may come or, which may include but not be limited to (e.g., after, before, during, way after, later, etc.) which may include but not be limited to (e.g., meeting, virtual meeting, in-person meeting, date, connection, message, subscribing, adding, adding to list, amount of money spent, etc.) has, which may include but not be limited to (e.g., been sent, been added, completed, successfully completed, good feedback, communication has occurred, etc.)

In some embodiments, which may be included but not limited to (e.g., this, or automatically, or manually, or AI-created, or automatic recording, or auto tracking, etc.) may send a location tracking to the, which may be included but not limited to (e.g., 'date log, management area, network, platform, or data center etc.) to maintain record of which may be included but not limited to (e.g., connection, date, time, area, location, etc.) Once the, which may be included but not limited to (e.g., 'person getting paid, model, creator, person receiving or paying person, person sending transmittables, boyfriend, dater,' etc.) has 'which may be included but not limited to (e.g., checked-in, begun, started, recorded, informed, agreed on, or checked-out, assumed started, agreed upon, finished, ended, assumed ended, agreed to end, etc.) user interface may, which may be included but not limited to (e.g., start a location tracking of the entirely of the date, record, track, send data, send recurring data, etc.) which may be recorded in which may be included but not limited to (e.g., real-time, currently, tracking, constant tracking, etc.) and/or maintained on records so that there is which may be included but not limited to (e.g., proof of the date occurred, proof, tracking, time, persons, locations, 3rd parties, advertisers, advertisements, businesses, etc.) In some embodiments, this may be shown in some embodiments such as FIG. 254 or any user interface. In some embodiments, the, which may be included but not limited to (e.g., checked-in, begun, started, recorded, informed, agreed on, or checked-out, assumed started, agreed upon, finished, ended, assumed ended, agreed to end, etc.) which may be, which may be included but not limited to (e.g., manual, automatic, or semi-automatic, or AI-created, or automatically recorded, etc.) which may be included but not limited to (e.g., user interface, data, location, etc.) may be which may be included but not limited to (e.g., turned on and off, manually checked in, or automatically checked-in, begun, started, recorded, informed, agreed on, or checked-out, assumed started, agreed upon, finished, ended, assumed ended, agreed to end, based on location matching AI-connecting, where the date is supposed to be at etc.)

In some embodiments, there may be a swiping method, a button click, a double tap, a checking method, a tap, an automatic check-in, check-out, time stamp, time record, time and data record, location, time and data record, a manual check-in, check-out, time stamp, time record, time and data record, location, time and data record, or a restaurant check-in, check-out, time stamp, time record, time and data record, location, time and data record, to 'begin date or check-in, check-out, time stamp, time record, time and data record, location, time and data record.' In some embodiments, this 'date data' is recorded to prove the date occurred; this may include time, location, date, year, month, restaurant coordinates in comparison to paying person's coordinates, map location coordinates, duration, check-in, check-out, time stamp, time record, time and data record, location, time and data record, coordinate(s), of date until obligations of date is complete. For example, the data may be recorded automatically from the time and date of date to confirm or deny that the date occurred at the paid-for and obligated time and place agreed upon on the paid agreement. This may be shown in some embodiments, such as FIG. 254, or any user interface. In some embodiments, the paid dater may obtain payment if no obligated date occurred according to the terms and conditions of the date agreement paid for. Still, the paid dater failed to report a 'failure to show' within the time frame, which would be thoroughly investigated before payment is disbursed.

In some embodiments, user interface may be the 'Potential Process for Date check-in, check-out, time stamp, time record, time and data record, location, time and data record, or check out or date data collection beginning or any part of process' In some embodiments, the 'date log, management area,' or area where the 'date' or 'connection' or 'meeting information or area to record, log, or complete date is located, there may be different screens to attempt to record, log, or track the entirely of the date. In some embodiments, the 'date log, management area,' may ask the 'dater, creator, model, paid person, or paying person' to 'check in at the location.' In some embodiments, this may send a location tracking to, which may include but is not limited to, the: (e.g., date log, management area, network, platform, or data center, etc.), which may maintain a record of, which may include but not be limited to (e.g., date, time, process, location, connection, etc.) In some embodiments, once the 'person getting paid, model, creator, person receiving or paying person, person sending exchangeable, boyfriend, dater,' has, which may include but not be limited to (e.g., checked-in, begun, started, recorded, informed, agreed on, or checked out, assumed started, agreed upon, finished, ended, assumed ended, agreed to end, user interface may start a location tracking of the entirely of the date which will be recorded in real-time and maintained on records so that there is proof of the date occurred. This may be shown in some embodiments, such as FIG. 254, or any user interface. In some embodiments, the 'check-in, check-out, time stamp, time record, time and data record, location, time and data record' may be manual, automatic, or semi-automatic, meaning the user interface may be turned on and off, manually checked in, or automatically (e.g., checked-in, begun, started, recorded, informed, agreed on, or checked-out, assumed started, agreed upon, finished, ended, assumed ended, agreed to complete, based on location matching AI-connecting, where the date is supposed to be at.

In some embodiments, there may be a, which may include but not be limited to (e.g., 'live' time, live, current, current time, etc.) that may be shown on the 'model or dater's, which may include but not be limited to (e.g., date log, management area, or platform access,' etc.) which may help determine a good time to, etc.) to, etc.) 'check-in, check-out, time stamp, time record, time and data record, location, time and data record,' to their date, or time stamp, etc.) In some embodiments, the paid dater or person making date payment may also have a screen or date log, management area, that is similar in which the 'paid dater' may have their record of location, time, date, coordinates, map location, year, month, day, etc.) similar to the 'paid dater' in which these data points may be compared to the paid daters or models' log if there are any disputes on location, time, problems, etc.) In some embodiments, which may include but not be limited to (e.g., data logs, a gathering of data, etc.), may be seen as or shown as or may be, which may include but not be limited to (e.g., regarding date information, time, location, both persons on a date may be used to determine if date occurred, if there are issues or disputes between the parties, etc.) In some embodiments, there may be other options to show more 'proof of date' or proof that obligations paid for were met to ensure payment is disbursed. In some embodiments, the 'live location' may show the 'dater' where they are located or what location coordinates or place they are at. In some embodiments, the 'live location' may be automatic, and the 'dater' or 'paid dater' may not need to check in because the location may automatically check in for them and records all data.

In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

Figure 68:
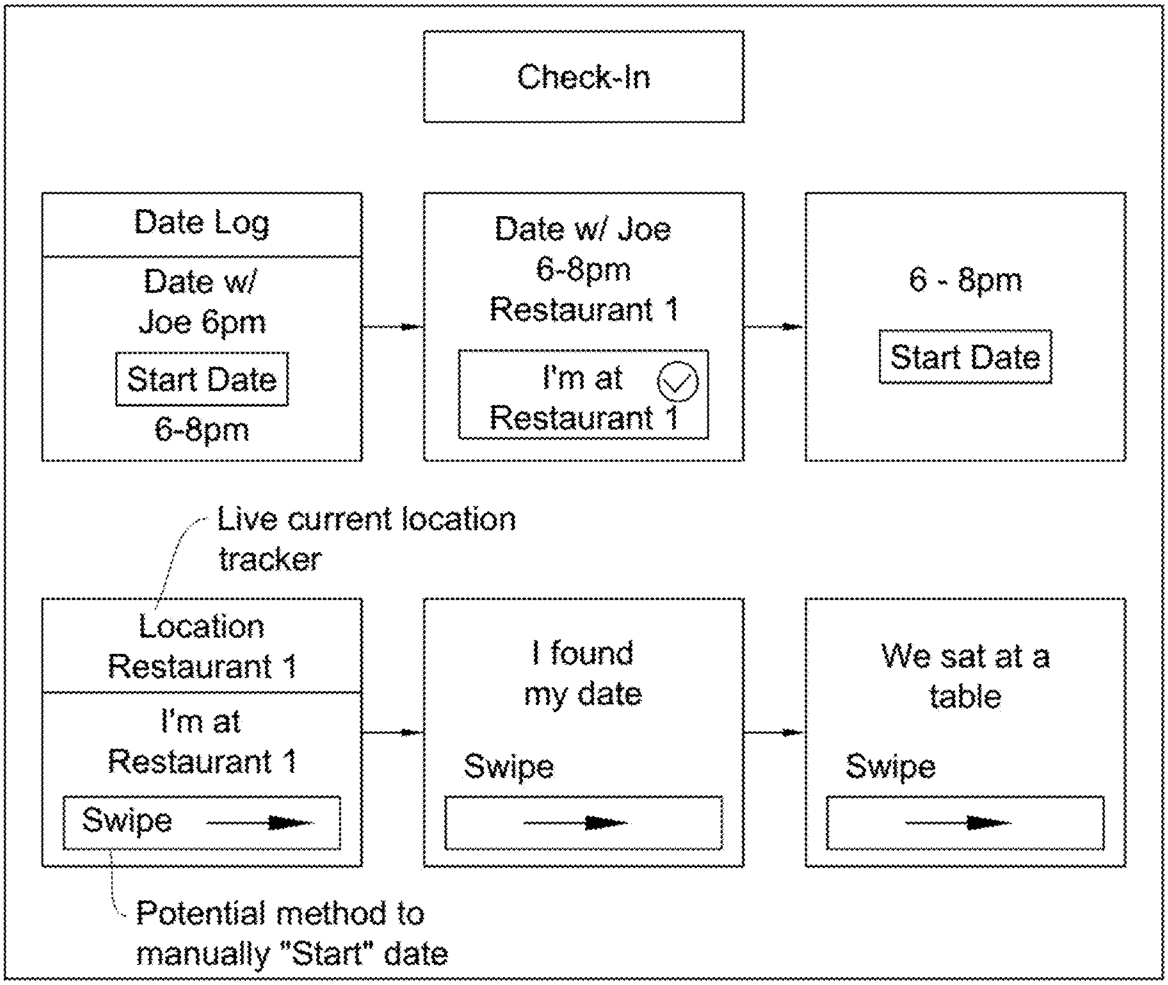

FIG. 68: In some embodiments, the user interface may be the (E.g., 'Potential Process for Date or functionality, or viewing, or suggestions or suggested activities, or checklist, or suggestions, etc.), which may include but not be limited to (e.g., check-in, check-out, time stamp, time record, time and data record, location, time, and data record, or check out or date data collection beginning or any part of the process,' automatic record, auto-recording, auto-date information record, etc.) In some embodiments, the 'date log, management area,' or area where the 'date' or 'connection' or 'meeting information or area to record, log, or complete date is located, there may be different screens to attempt to record, log, or track the entirely of the date. In some embodiments, the 'date log, management area,' may ask the 'dater, creator, model, paid person, or paying person' to 'check in at the location.' In some embodiments, this may send a location tracking to, which may include but is not limited to, the: (e.g., date log, management area, network, platform, or data center, etc.) which may maintain a record of, which may include but not be limited to (e.g., date, time, process, location, connection, etc.) Once the 'person getting paid, model, creator, person receiving or paying person, person sending exchangeable, boyfriend, dater,' has, which may include but not be limited to (e.g., 'checked-in, begun, started, recorded, informed, agreed on, or checked-out, assumed started, agreed upon, finished, ended, assumed ended, agreed to end, user interface may start a location tracking of the entirely of the date which will be recorded in real-time and maintained on records so that there is proof of the date occurred. This may be shown in some embodiments, such as FIG. 254, or any user interface. In some embodiments, the 'check-in, check-out, time stamp, time record, time and data record, location, time and data record' may be, may include but not be limited to (e.g., manual, automatic, or semi-automatic, etc.) meaning user interface may be turned on and off, manually checked in, or automatically (e.g., checked-in, begun, started, recorded, informed, agreed on, or checked-out, assumed started, agreed upon, finished, ended, assumed ended, implied to complete, indicated on suggestions, agreed on to complete, or agreed to continue or agreed on implied, based on location matching AI-connecting, where the date is supposed to be at based on agreements or contractual agreements or based on the information given or known or understood.

In some embodiments, there may be a swiping method, a button click, a double tap, a checking method, a tap, an automatic check-in, check-out, time stamp, time record, time and data record, location, time and data record, a manual check-in, check-out, time stamp, time record, time and data record, location, time and data record, or a restaurant check-in, check-out, time stamp, time record, time and data record, location, time and data record, to 'begin date or check-in, check-out, time stamp, time record, time and data record, location, time and data record.' In some embodiments, this 'date data' is recorded to prove the date occurred; this may include time, location, date, year, month, restaurant coordinates in comparison to paying person's coordinates, map location coordinates, duration, check-in, check-out, time stamp, time record, time and data record, location, time and data record, coordinate(s), of date until obligations of date is complete. For example, the data may be recorded automatically from the time and date of date to confirm or deny that the date occurred at the paid-for and obligated time and place agreed upon on the paid agreement. This may be shown in some embodiments, such as FIG. 254, or any user interface. In some embodiments, the paid dater may obtain payment if no obligated date occurred according to the terms and conditions of the date agreement paid for. Still, the paid dater failed to report a 'failure to show' within the time frame, which would be thoroughly investigated before payment is disbursed.

In some embodiments, there may be a 'live' time that is shown on the, which may include but not be limited to (e.g., 'model or dater's date log, management area, or platform access,' etc.) which may help determine a good time to, which may include but not be limited to (e.g., 'check-in, check-out, time stamp, time record, time and data record, location, time and data record,' etc.) to their, which may include but not be limited to (e.g., date, connection, etc.) In some embodiments, the paid dater or person making date payment may also have a, which may include but not be limited to (e.g., screen or date log, management area, etc.) that may be similar in which the 'paid dater' may have their record of, which may include but not be limited to (e.g., location, time, date, coordinates, map location, year, month, day, etc.) which may be similar to the 'paid dater' in which these data points may be compared to the paid daters or models' log if there are any disputes on, which may include but not be limited to (e.g., location, time, problems, etc.) In some embodiments, which may include but not be limited to (e.g., data logs, a gathering of data, etc.), may be seen as or shown as or may be, which may include but not be limited to (e.g., regarding date information, time, location, both persons on a date may be used to determine if date occurred, if there are issues or disputes between the parties, etc.) In some embodiments, there may be other optional options to show more 'proof of date' or proof that obligations paid for were met to ensure payment is disbursed. In some embodiments, the 'live location' may show the 'dater' where they are located or what location coordinates or place they are at. In some embodiments, the 'live location' may be automatic, and the 'dater' or 'paid dater' may not need to check in because the location may automatically check in for them and records all data.

Figure 69:
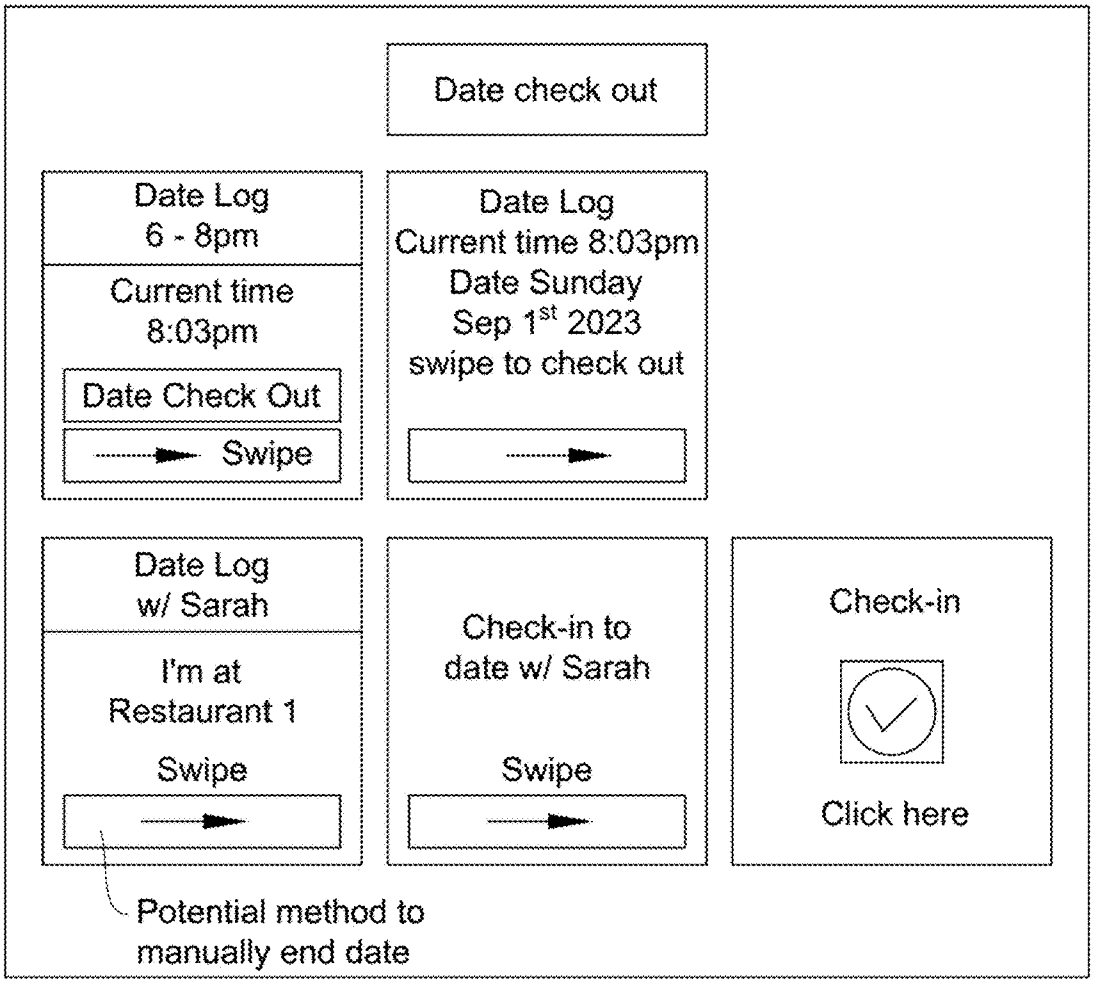

FIG. 69: potential process for a date, which may include but not be limited to (e.g., check-out, check-in, verification of connection occurring, or meeting occurring, recorded information, logged info, implied info, etc.) In some embodiments, the, which may include but not be limited to (e.g., 'date log, management area,' or area where the 'date' or 'connection' or 'meeting information or area to record, log, or complete date is located, etc.) there may be a 'live time' that may show exactly what time it is currently based on their location. Similar to FIG. 68, the check-out may be similar to the, which may include but not be limited to (e.g., 'check-in process' or any process that records manually or automatically to prove 'date occurred' by gathering data either automatically or manually to record and prove agreed obligations were met, etc.) In some embodiments, the user interface may show the current time based on location and/or the, which may include but not be limited to (e.g., 'paid dater' or 'creator' or 'model, etc.) may decide to, which may include but not be limited to (e.g., 'manually check-out or if it is on auto-checkout the location may stop recording at that point because all obligations for payment have occurred, or show connection or date has occurred, etc.) This may be shown in some embodiments, such as FIG. 254, or any user interface. In some embodiments, a (e.g., swipe or a manual or an automatic check-in signature, or conformation of the date or meeting occurring or agreement being met, etc.) may be logged (e.g., manually automatically, or by any party or reason, etc.)

In some embodiments, the user interface may be the 'potential process for a date, which may include but not be limited to (e.g., check-in, check-out, time stamp, time record, time and data record, location, time and data record, or check out or date data collection beginning or any part of the process,' etc.) In some embodiments, the 'date log, management area,' or area where the 'date' or 'connection' or 'meeting information or area to record, log, or complete date is located, there may be different screens to attempt to record, log, or track the entirely of the date. In some embodiments, the 'date log, management area,' may ask the 'dater, creator, model, paid person, or paying person' to 'check in at the location.' In some embodiments, this may send a location tracking to, which may include but is not limited to, the: (e.g., date log, management area, network, platform, or data center, etc.) which may maintain a record of, which may include but not be limited to (e.g., date, time, process, location, connection, etc.) In some embodiments, once the, which may include but not limited to, the: (e.g., 'person getting paid, model, creator, the person receiving or paying person, the person sending transmittables, boyfriend, dater, etc.) has which may include but not limited to, the: (e.g., 'checked-in, begun, started, recorded, informed, agreed on, or checked-out, assumed started, agreed upon, finished, ended, assumed ended, agreed to end, etc.) user interface may start a location tracking of the entirely of the date which may be recorded in which may include but not limited to, the: (e.g., real-time and/or maintained on records, etc.) so that there may be, which may include but not limited to, the: (e.g., proof of the date occurred, etc.) The user interface may be shown in some embodiments, such as FIG. 254, or any user interface. In some embodiments, the 'check-in, check-out, time stamp, time record, time and data record, location, time and data record' may be manual, automatic, or semi-automatic meaning the user interface may be turned on and off, manually checked in, or automatically (e.g., checked-in, begun, started, recorded, informed, agreed on, or checked-out, assumed started, agreed upon, finished, ended, assumed ended, decided to end, based on location matching AI-connecting, where the date is supposed to be at.

In some embodiments, there may be a swiping method, a button click, a double tap, a checking method, a tap, an automatic check-in, check-out, time stamp, time record, time and data record, location, time and data record, a manual check-in, check-out, time stamp, time record, time and data record, location, time and data record, or a restaurant check-in, check-out, time stamp, time record, time and data record, location, time and data record, to 'begin date or check-in, check-out, time stamp, time record, time and data record, location, time and data record.' In some embodiments, this 'date data' is recorded to prove the date occurred; this may include time, location, date, year, month, restaurant coordinates in comparison to paying person's coordinates, map location coordinates, duration, check-in, check-out, time stamp, time record, time and data record, location, time and data record, coordinate(s), of date until obligations of date is complete. For example, the data may be recorded automatically from the time and date of date to confirm or deny that the date occurred at the paid-for and obligated time and place agreed upon on the paid agreement. This may be shown in some embodiments, such as FIG. 254, or any user interface. In some embodiments, the paid dater may obtain payment if no obligated date occurred according to the terms and conditions of the date agreement paid for, but the paid dater failed to report a 'failure to show' within the time frame, which would then be thoroughly investigated before payment is disbursed.

In some embodiments, there may be a 'live' time that is shown on the 'model or dater's date log, management area, or platform access' which may help determine a good time to 'check-in, check-out, time stamp, time record, time and data record, location, time and data record,' to their date. In some embodiments, the paid dater or person making date payment may also have a screen or date log, management area, that is similar in which the 'paid dater' may have their record of location, time, date, coordinates, map location, year, month, day, etc.) similar to the 'paid dater' in which these data points may be compared to the paid daters or models' log if there are any disputes on location, time, problems, etc.) In some embodiments, which may include but not be limited to (e.g., data logs, a gathering of data, etc.), may be seen as or shown as or may be, which may include but not be limited to (e.g., regarding date information, time, location, both persons on a date may be used to determine if date occurred, if there are issues or disputes between the parties, etc.) In some embodiments, there may be other options to show more 'proof of date' or proof that obligations paid for were met to ensure payment is disbursed. In some embodiments, the 'live location' may show the 'dater' where they are located or what location coordinates or place they are at. In some embodiments, the 'live location' may be automatic, and the 'dater' or 'paid dater' may not need to check in because the location may automatically check in for them and records all data.

Figure 70:
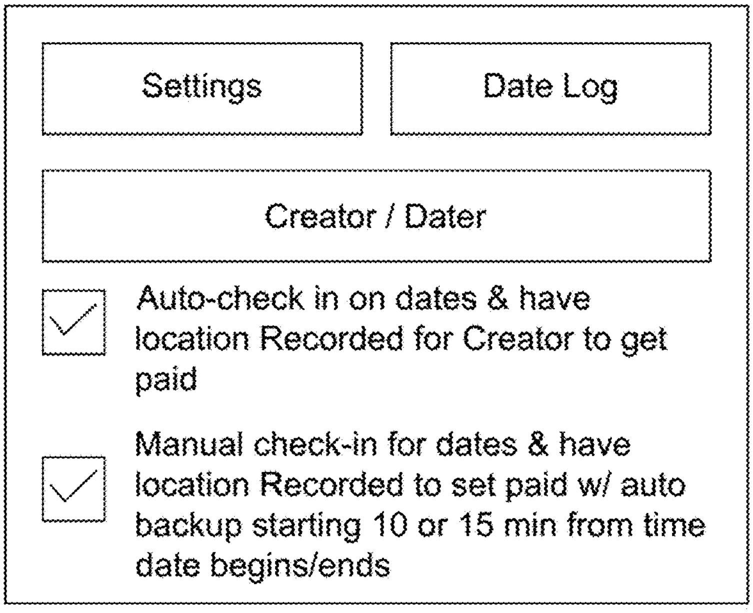

FIG. 70: In some embodiments, a/the (e.g., creator, model, the person being paid, the person paying, 3rd party paying, the entity paying, a business paying, any gifting, gifting, donations, donating, 'dater,' person pursuing a date, paying person, etc.) which may choose options such as (e.g., 'auto-check-in, check-out, time stamp, time record, time and data record, location, time and data record, and check-out, etc.) based on any combination may include but not limited to time, and date for 'paid date' or 'when obligation duties are meant to occur.' In some embodiments, which may include but not be limited to (e.g., creator, model, the person being paid, the person paying, 3rd party paying, the entity paying, a business paying, any gifting, gifting, donations, donating, 'dater,' person pursuing a date, paying person, etc.) may choose options, which may include but not be limited to (e.g., manual check-in, check-out, time stamp, time record, time and data record, location, time and data record, etc.) which may include but not be limited to (e.g., check-out with a potential option to have a backup auto-check in if they don't check-in, check-out, time stamp, time record, time and data record, location, time and data record, manually within 15 minutes or any period of 'date time start or end, etc.)

In some embodiments, the 'check-in, check-out, time stamp, time record, time and data record, location, time and data record' may be manual, automatic, or semi-automatic meaning the user interface may be turned on and off, manually checked in, or automatically (e.g., checked-in, begun, started, recorded, informed, agreed on, or checked-out, assumed started, agreed upon, finished, ended, assumed ended, decided to complete, based on location matching AI-connecting, where the date is supposed to be at. In some embodiments, there may be a swiping method, a button click, a double tap, a checking method, a tap, an automatic check-in, check-out, time stamp, time record, time and data record, location, time and data record, a manual check-in, check-out, time stamp, time record, time and data record, location, time and data record, or a restaurant check-in, check-out, time stamp, time record, time and data record, location, time and data record, to, which may include but not be limited to (e.g., begin date or check-in, check-out, time stamp, time record, time and data record, location, time and data record, start date, begin, time starting, countdown starting' etc.) In some embodiments, this 'date data' is recorded to prove the date occurred; this may include, which may include but not be limited to (e.g., time, location, date, year, month, and restaurant coordinates in comparison to paying person's coordinates, map location coordinates, duration, check-in, check-out, time stamp, time record, time and data record, location, time and data record, coordinate (s), of date, etc.) until obligations of date are complete. For example, the data may be recorded automatically from the time and date of date to confirm or deny that the date occurred at the paid-for and obligated time and place agreed upon on the paid agreement. This may be shown in some embodiments, such as FIG. 254, or any user interface. In some embodiments, the paid dater may obtain payment if no obligated date occurred according to the terms and conditions of the date agreement paid for, but the paid dater failed to report a 'failure to show' within the time frame, which would then be thoroughly investigated before payment is disbursed.

In some embodiments, there may be a 'live' time that is shown on the 'model or dater's date log, management area, or platform access' which may help determine a good time to 'check-in, check-out, time stamp, time record, time and data record, location, time and data record,' to their date. In some embodiments, the paid dater or person making date payment may also have a screen or date log, management area, that is similar in which the 'paid dater' may have their record of location, time, date, coordinates, map location, year, month, day, etc.) similar to the 'paid dater' in which these data points may be compared to the paid daters or models' log if there are any disputes on location, time, problems, etc.) In some embodiments, which may include but not be limited to (e.g., data logs, a gathering of data, etc.), may be seen as or shown as or may be, which may include but not be limited to (e.g., regarding date information, time, location, both persons on a date may be used to determine if date occurred, if there are issues or disputes between the parties, etc.) In some embodiments, there may be other options to show more 'proof of date' or proof that obligations paid for were met to ensure payment is disbursed. In some embodiments, the 'live location' may show the 'dater' where they are located or what location coordinates or place they are at. In some embodiments, the 'live location' may be automatic, and the 'dater' or 'paid dater' may not need to check in because the location may automatically check in for them and records all data.

In some embodiments, the process may go from, which may include but not be limited to (e.g., users, public, registered persons, persons, 'daters' etc.) to an which may be included but not limited to (e.g., auto or manual data gathering regarding location, duration, check-in, check-out, time stamp, time record, time and data record, location, time and data record, coordinate(s), coordinates, movements, closest registered business, etc.) and user interface may store all data may include but not limited to (e.g., recording, location, time, coordinates, duration, check-in, check-out, time stamp, time record, time and data record, location, time and data record, coordinate(s), etc.) In some embodiments user interface may go to an which may be included but not limited to (e.g., automatic, manual check-out, AI check out, stopping, starting, recording, data gathering, etc.) to, which may be included but not limited to (e.g., end or suggest ending data collection, Network address, IP address, stop, change, coordinate, check-in, check-out, time stamp, time record, time and data record, location, time and data record, check out, etc.) which may include but not limited to (e.g., location, duration, check-in, check-out, time stamp, time record, time and data record, location, time and data record, coordinate(s), movements, coordinates, closest registered business, etc.)

In some embodiments, this may be the 'Potential Process for Date check-in, check-out, time stamp, time record, time and data record, location, time and data record, or check out or date data collection beginning or any part of the process' the 'date log, management area,' or area where the 'date' or 'connection' or 'meeting information or area to record, log, or complete date is located, there may be different screens to attempt to record, log, or track the entirely of the date. In some embodiments, the 'date log, management area,' may ask the 'dater, creator, model, paid person, or paying person' to 'check in at the location.' This may send a location tracking to the 'date log, management area, network, platform, or data center to maintain a record of your date. Once the 'person getting paid, model, creator, person receiving or paying person, person sending transmittables, boyfriend, dater,' has, which may include but not be limited to (e.g., 'checked-in, begun, started, recorded, informed, agreed on, or checked-out, assumed started, agreed upon, finished, ended, assumed ended, agreed to end, user interface may start a location tracking of the entirely of the date which will be recorded in real-time and maintained on records so that there is proof of the date occurred. This may be shown in some embodiments, such as FIG. 254 or any user interface. In some embodiments, the, which may be included but not limited to (e.g., 'check-in, check-out, time stamp, time record, time and data record, location, time and data record,' etc.) may be, which may be included but not limited to (e.g., manual, automatic, or semi-automatic, or AI-created, or human-created, etc.) meaning user interface may be turned on and off, manually checked in, or automatically (e.g., checked-in, begun, started, recorded, informed, agreed on, or checked-out, assumed started, agreed upon, finished, ended, assumed ended, decided to end, based on location matching AI-connecting, where the date is supposed to be at.

In some embodiments, there may be a, which may be included but not limited to (e.g., swiping method, a button click, a double tap, a checking method, a tap, an automatic check-in, check-out, time stamp, time record, time and data record, location, time and data record, a manual check-in, check-out, time stamp, time record, time and data record, location, time and data record, or a restaurant check-in, check-out, time stamp, time record, time and data record, location, time and data record, to 'begin date or check-in, check-out, time stamp, time record, time and data record, location, time and data record,' etc.) In some embodiments, this 'date data' is recorded to prove the date occurred; this may include which may be included but not limited to (e.g., time, location, date, year, month, restaurant coordinates in comparison to paying person's coordinates, map location coordinates, duration, check-in, check-out, time stamp, time record, time and data record, location, time and data record, coordinate(s), of date until obligations of date are complete, etc.) In some embodiments, for example, which may be included but not limited to (e.g., data may be recorded automatically from the time and date of date to confirm or deny that the date occurred at the paid for and/or obligated time and place agreed upon on the paid agreement, etc.) This may be shown in some embodiments, such as FIG. 254, or any user interface.

In some embodiments, the paid dater may obtain payment if no obligated date occurred according to, which may be included but not limited to (e.g., any terms, agreed terms, terms, and conditions of the date agreement paid for, etc.) but for example which may be including but not limited to which may be included but not limited to (e.g., the paid dater failed to report a 'failure to show' within the time frame which may then be thoroughly investigated before payment is disbursed, etc.) In some embodiments, there may be a 'live' time that is shown on the, which may include but is not limited to, the: (e.g., model or dater's date log, management area, or platform access, etc.), which may help determine a good time to 'check-in, check-out, time stamp, time record, time and data record, location, time and data record,' to their date. In some embodiments, the, which may include but not limited to, the: (e.g., paid dater or person making payment etc.) for, which may include but not limited to, the: (e.g., date, connection, meeting, messaging, communication, etc.) may also have a, which may be included but not limited to (e.g., screen or date log, management area, etc.) that may be similar in or different in which the, which may include but not limited to, the: (e.g., 'paid date,' model, user, r, etc.) may have their own record of which may be included but not limited to (e.g., location, time, date, coordinates, map location, year, month, day, etc.) similar to the 'paid dater' in which these which may be included but not limited to (e.g., data points, data, data collection, Network address, IP address, information, location tracking, tracking information, date information, recordings, proof etc.) may be compared to the, which may be included but not limited to (e.g., paid daters or models etc.) log if there are any which may be included but not limited to (e.g., disputes, questions, miscommunication, etc.) on which may be included but not limited to (e.g., location, time, problems, location, duration, check-in, check-out, time stamp, time record, time and data record, location, time and data record, coordinate(s), frequency, route, day, time, etc.)) In some embodiments, which may be included but not limited to (e.g., data logs, a gathering of data, etc.) may be seen as or shown as or may be, which may be included but not limited to (e.g., regarding date information, time, location, both persons on a date may be used to determine if date occurred, if there are issues or disputes between the parties, etc.) In some embodiments, there may be other optional options to show which may be included but not limited to (e.g., more 'proof of date' or proof that obligations which may be included but not limited to (e.g., paid for, transmittables, asset exchange, service, goods, etc.) may have been met which may be for to ensure which may be included but not limited to (e.g., payment, transmittables, assets, money, crypto, etc.) may be disbursed. In some embodiments, the, which may be included but not limited to (e.g., 'live location, (e.g., viewing routes, viewing driving, travel, route, routes, viewing locations, viewing live locations, location of meeting location, location of data of meeting, location of date location, location of past locations, GPS tracking, 3rd party tracking, cookies, other data on device, 3rd party data device, 3rd party data, 3rd party data during data or meeting or location or time, sending locations, sending data, storing data, storing locations, showing both locations at the same time, showing only one location, showing business locations, showing business data, showing location data, showing driving, travel, route, route and method of transportation, users information, user's background, public information, public background, showing method of transportation, user's location, user's past location, user's current location, live locations, recorded locations, etc.) may show the 'dater which may be included but not limited to (e.g., where they are located, what location coordinates, what place they are at etc.) The 'live location' may be automatic, and the 'dater' or 'paid dater' may not need to check in because the location may automatically check-in for them and records all data.

Figure 71:
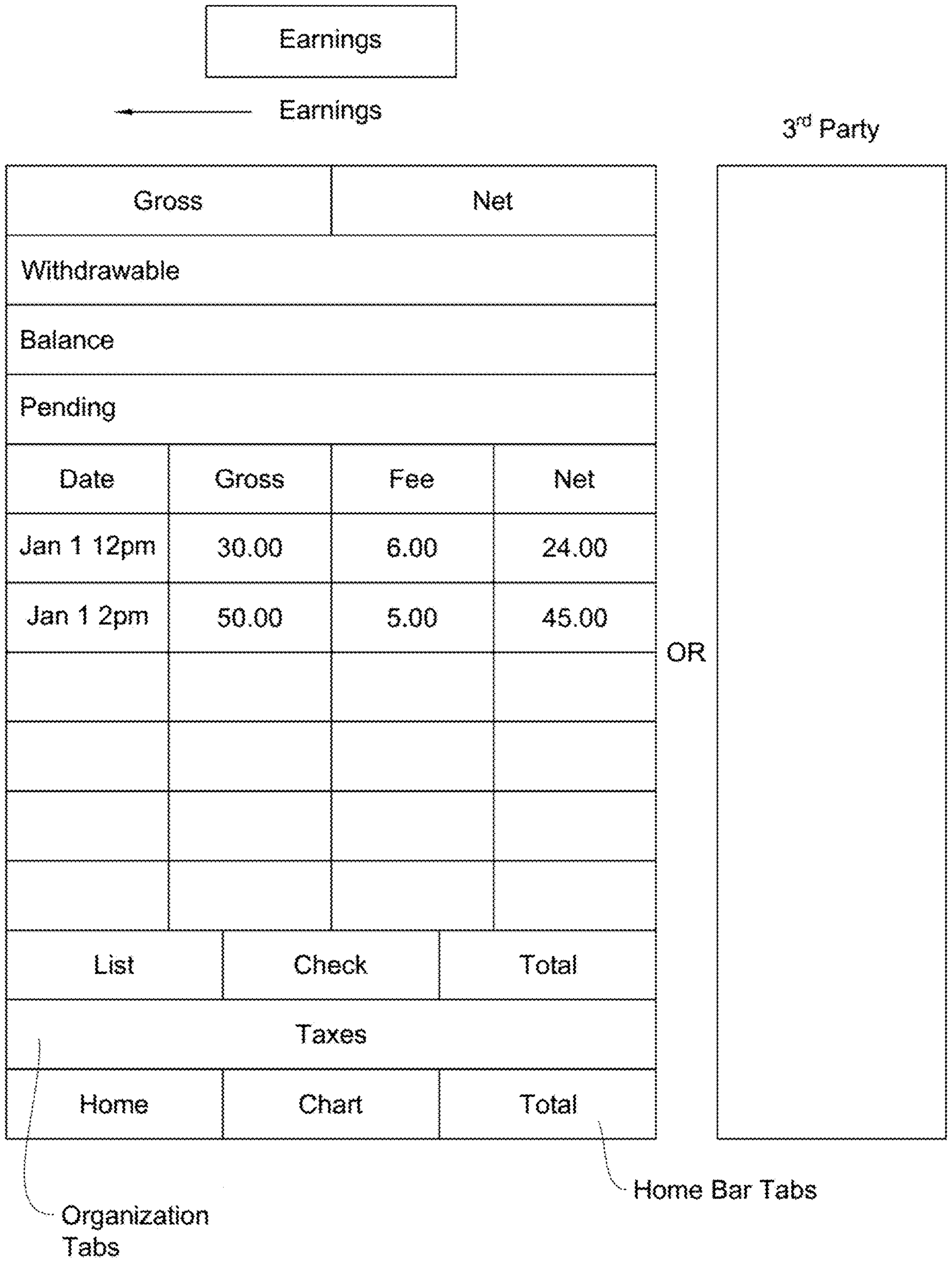

FIG. 71: In some embodiments, there may be an (e.g., 'earnings screen' or earnings area, transactions recorded, 3rd party integrated screen or management system, 3rd party money management system, 3rd party tax system, integrated tax system, integrated money management and/or tax system, or manually produced transactions, or notes, payments received, subscription fees, unlock fees, or date fees earned, or donations earned, or payments received, or exchangeable received, or crypto, or things of value, etc.) that may allow for, which may be included but not limited to (e.g., 'gross, net sales, withdraw-able, pending, dates, balances, earnings, charts, taxes tabs, etc.) which may be there on the platform or 3rd party connecting, which may be included but not limited to (e.g., totals, home, lists, etc.) In some embodiments, there may be a 3rd party tab that connects to other software or other platforms that may allow which may be included but not limited to (e.g., business management, managing software, 3rd party integrated software, or items, money management skills, or money management or chart management or information regarding money, or a chart area to manage money, or a chart or area that may show money earned, withdrawn, shown, sales made, dates completed, etc.)

Figure 72:
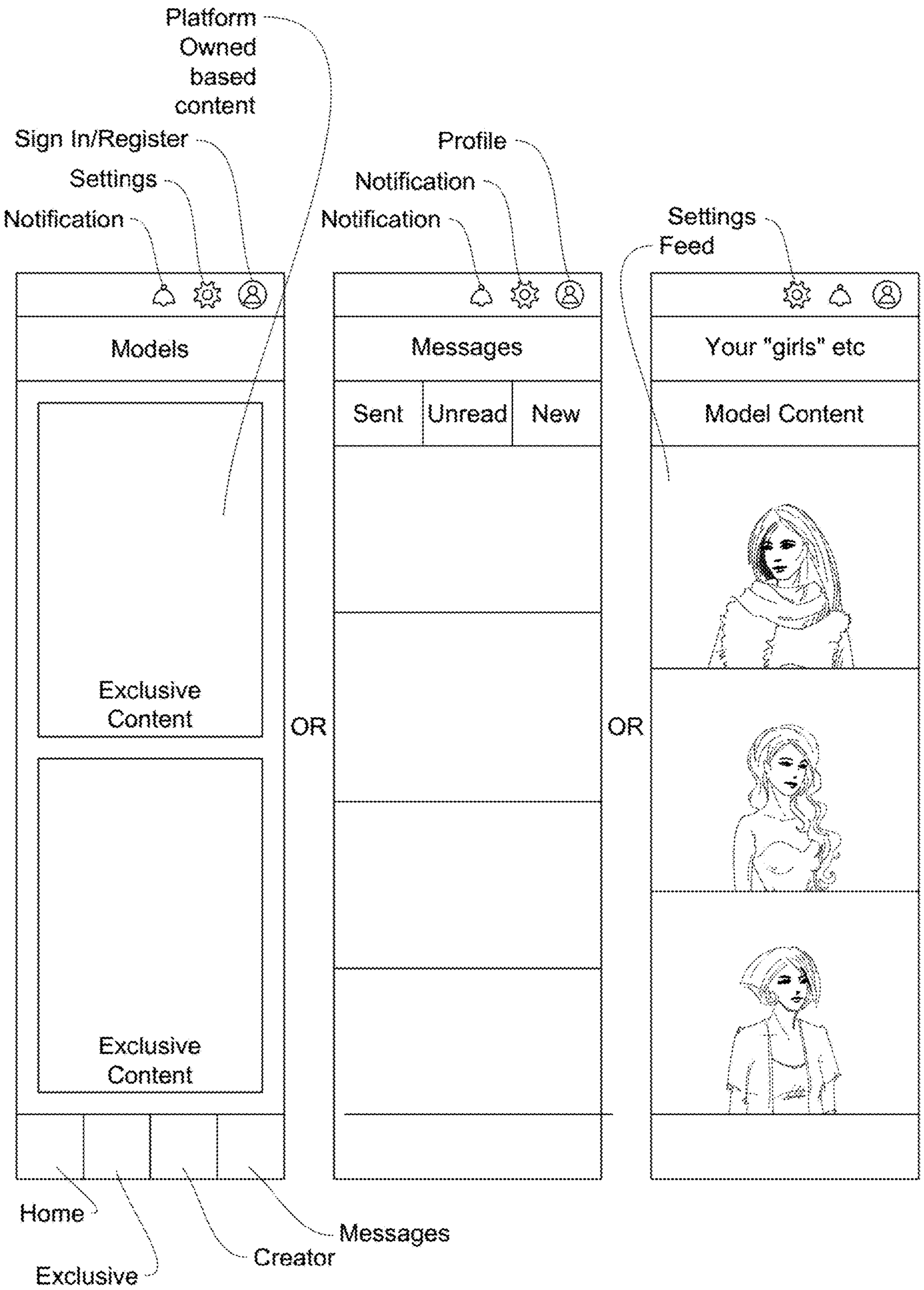

FIG. 72: In some embodiments, a page or homepage may contain but are not limited to (e.g., 'messages pages containing separated or organized message content, a paid-or follower's chosen or automatically chosen modeling content that is paid for or followed and available on 'feed or a list of photos or videos or live streams, or content that comes down a 'stream' and gets replaced at the top with the newest form of videos, content, lives, photos, etc.) that may come before, during or after any which may be included but not limited to (e.g., image, content, live, or video, etc.) In some embodiments, information may only be shown to registered or paid signed-in users, including but not limited to (e.g., exclusive content or content created by the platform itself containing any persons or content, etc.) In some embodiments, the platform may be separated by which may be included but not limited to (e.g., items, categories, areas, user interfaces, tabs at the top, bottom, side, front, back, or middle, etc.) that may have separate types of which may be included but not limited to (e.g., creators, models, or persons that have paid content or paid dates available, or daters or those that pay for dates or content, etc.)

Figure 73:
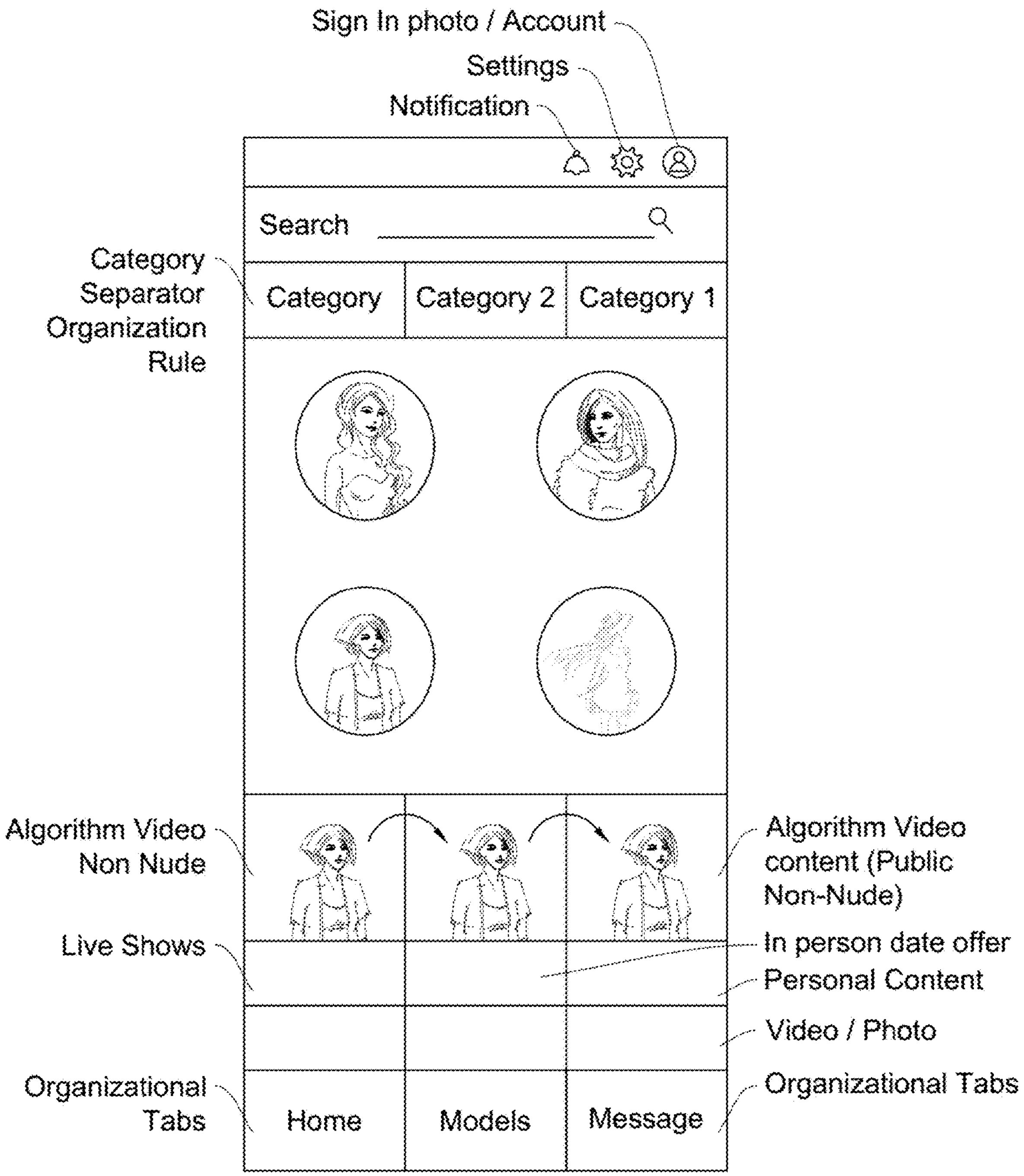

FIG. 73: In some embodiments, a page or homepage that may contain a (e.g., persons, entities, users, registered or non-register user, etc.) may include but are not limited to (e.g., a 'sign in tab, notification tab, settings tab, search bar tab, category separate tabs, promotional profile photos or videos of creators/models/promotional computing operation settings or execution/AI chosen pictures or videos, promotional automatically selected photos or videos, manually chosen photos or videos or content, etc.) In some embodiments, a page or homepage that may contain a registered or non-register user may include but are not limited to (e.g., a combination of profile photos or videos, with promotional content that keeps changing based on clicks, user content and computing operation settings or execution/AI, there may be organizational tabs near the bottom, top, side, or middle, there may be photoshoot content or video content that promotes profile, content, or locked content, this also may include date prices, price ranges, general pricing, general transmittables, or date offers, or calendar booking offers, or places to meet offers, or live content, or live shows, or pre-recorded shows, or calls, or video chats, or fun, or videos, or photos, or content, or computing operation settings or execution/AI or manual or automatic, or machine learning, or computer, or robotics, or 3rd party chosen, or entity-chosen, based content that keeps changing, the content may be organized by categories such as 'models, content creators, celebrities, photoshoots, modeling content, students, single girls, users, girls, users, available for in-person dates, girls, users, available for video meetings, live shows, etc.)

In some embodiments, a page or homepage may contain but are not limited to (e.g., 'messages pages containing separated or organized message content, a paid-or follower's chosen or automatically chosen modeling content that is paid for or followed and available on 'feed' or a list of photos or videos or live streams, or content that comes down a 'stream' and gets replaced at the top with the newest form of videos, content, lives, photos, etc.) that may come before, during or after any which may be included but not limited to (e.g., image, content, live, or video, etc.) In some embodiments, information may only be shown to registered, paid, or signed-in users, including but not limited to (e.g., exclusive content or content created by the platform containing any persons or content, etc.) In some embodiments, the platform may be separated by which may be included but not limited to, which may be included but not limited to (e.g., items, categories, areas, user interfaces, tabs at the top, bottom, side, front, back, or middle, etc.) that may have separate categories of which may be included but not limited to, which may be included but not limited to (e.g., creators, models, or persons that have paid content or paid dates available, or daters or those that pay for dates or content, etc.)

Figure 74:
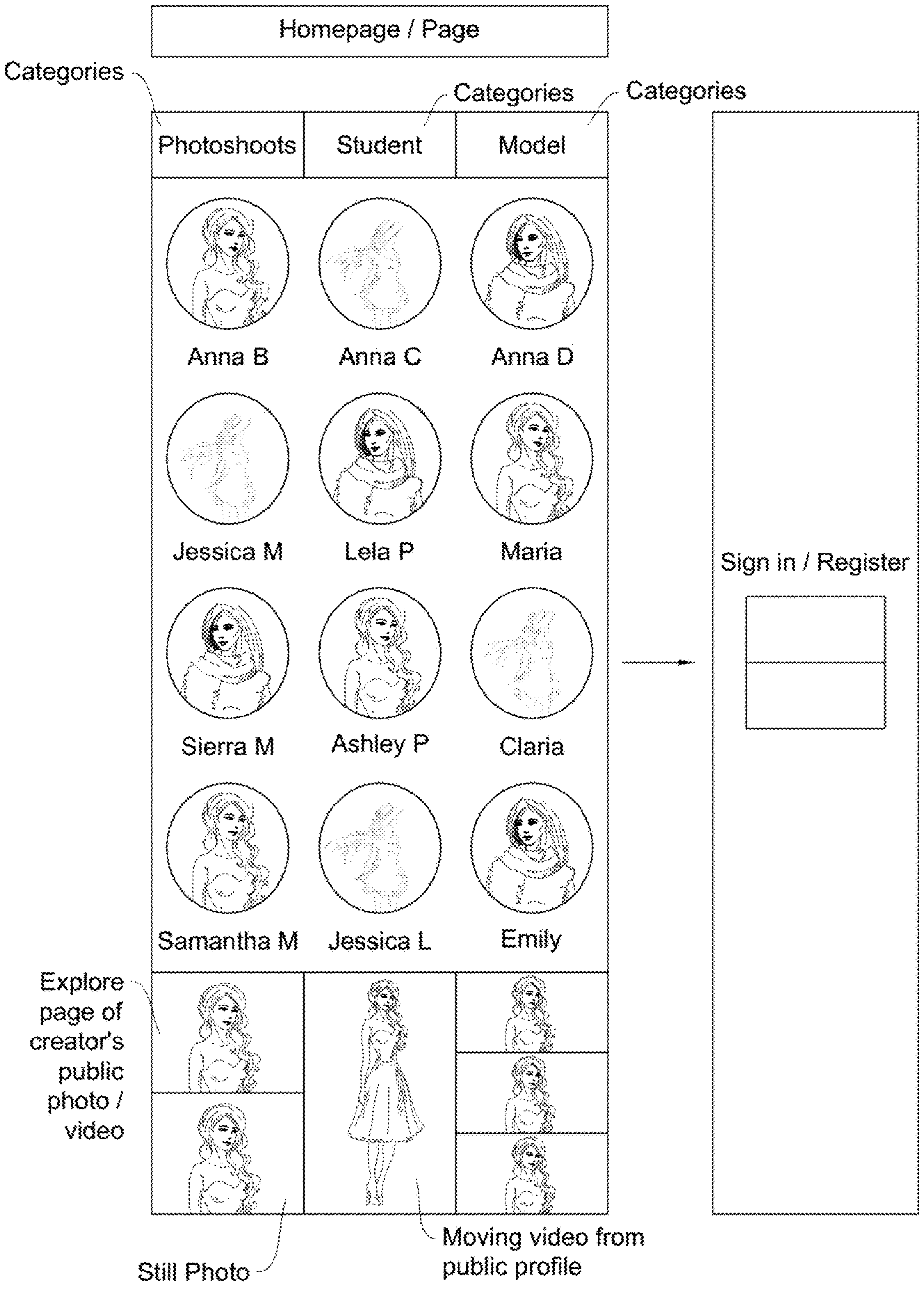

FIG. 74: In some embodiments, the homepage or a page or a user interface that a, which may be included but not limited to (e.g., person, user non-registered user, etc.) which may be included but not limited to (e.g., circles, squares, or a unified or non-similar shape, pictures, media, content, organized content, etc.) surrounding the, which may be included but not limited to (e.g., main profile photo or a highly clicked photo-based, or any content, or any user interface, etc.) which may be shown by computing operation settings or execution/AI of a, which may include but not limited to (e.g., public profile, profile, person, user, public user, private user, etc.) In some embodiments, the, which may be included but not limited to (e.g., main page or any public page, or feed, etc.) may be structured in any way regarding which may be included but not limited to (e.g., size dimensions, length, width, content, photo, user, user interface, etc.) In some embodiments, the, which may be included but not limited to (e.g., profile photo or suggested main photo, video, gif, the combined set of pixels may be a promotional photo, video, etc.) may be used to promote a, which may be included but not limited to (e.g., creator/model/paid person, user's, etc.) profile on the, which may be included but not limited to (e.g., app, platform, area, user interface, etc.) to the, which may be included but not limited to (e.g., public-private, user interface, etc.) In some embodiments, the, which may be included but not limited to (e.g., computing operation, manual, or automatic photo or video, etc.) may be displayed on the, which may be included but not limited to (e.g., public page, private page, any user interface public or private, any user interface, etc.)

In some embodiments, the, which may be included but not limited to (e.g., main photo, video, gif, the combined set of pixels, etc.) may show on the, which may be included but not limited to (e.g., combined page or combined area where it shows a lot of different types of content from the platform, etc.) In some embodiments, the which may be included but not limited to (e.g., computing operation, manual, or automatic photo or video, etc.) may be displayed on the public page, or any user interface combined with others which may be included but not limited to (e.g., computing operation, manual, or automatic photo or video, etc.) may be displayed together with others from other profiles. In some embodiments, the computing operation may choose random, which may be included but not limited to (e.g., photos, videos, or content that is non-NSFW, etc.) to show on the, which may be included but not limited to (e.g., homepage, home area, user interface, etc.) of any or some or partial amounts of which may be included but not limited to (e.g., combined content, or promotional content on the main page or any page that a non-registered or signed in user may be able to (e.g., use, access, obtain, interface, see, display, etc.) In some embodiments, once a, which may include but not limited to (e.g., content, profile, photo, video, content, etc.), is chosen from a, which may include but not limited to (e.g., non-registered, signed-in user, user, person, etc.) user interface may show a, which may include but not limited to (e.g., non-registered or signed in version, etc.) of creator/model's content that may allow which may have but not limited to (e.g., more information, less information, less options, more options, etc.) but user interface may not show any at all. In some embodiments, once an item may be clicked from the homepage or public page user interface may display a user interface, and/or the user may have to, which may be included but not limited to (e.g., register, sign-in, and or pay to see locked photos, blurry photos, hidden feature photos, direct-message photos, messaging photos, etc.)

In some embodiments, the, which may include but not limited to (e.g., page or area on the public page, etc.), may contain a, which may be included but not limited to (e.g., organized set of content, computing operation set of content, a combination of content that the computing operation data, AI may understand or evaluate the type of content, or content that is put out, etc.) or an area that may be, which may be included but not limited to (e.g., 'highly clicked or viewed content, etc.) which may include but not limited to (e.g., NSFW, non-NSFW,' any content, etc.) which may be seen on this combination area located on a, which may be included but not limited to (e.g., potential public page or a public area before registration or sign-in, etc.) In some embodiments, there may be an area at the, which may be included but not limited to (e.g., top, Bottom, middle, etc.) or similar to a, which may include but not limited to (e.g., tab-style clicking area or swiping area, etc.) that may allow the non-register user or registered user to separate viewing options by categories. In some embodiments, categories may include but are not limited to and may be separated by which may include but not limited to (e.g., 'student, models, photoshoots, specific photoshoots for models on the platform, specific marketing promotional content, marketing stories, marketing shoots, chosen photoshoots, chosen computing operation settings or execution-based/AI photoshoots, highly clicked content separated based on computing operation settings or execution/AI, etc.))

Figure 75:
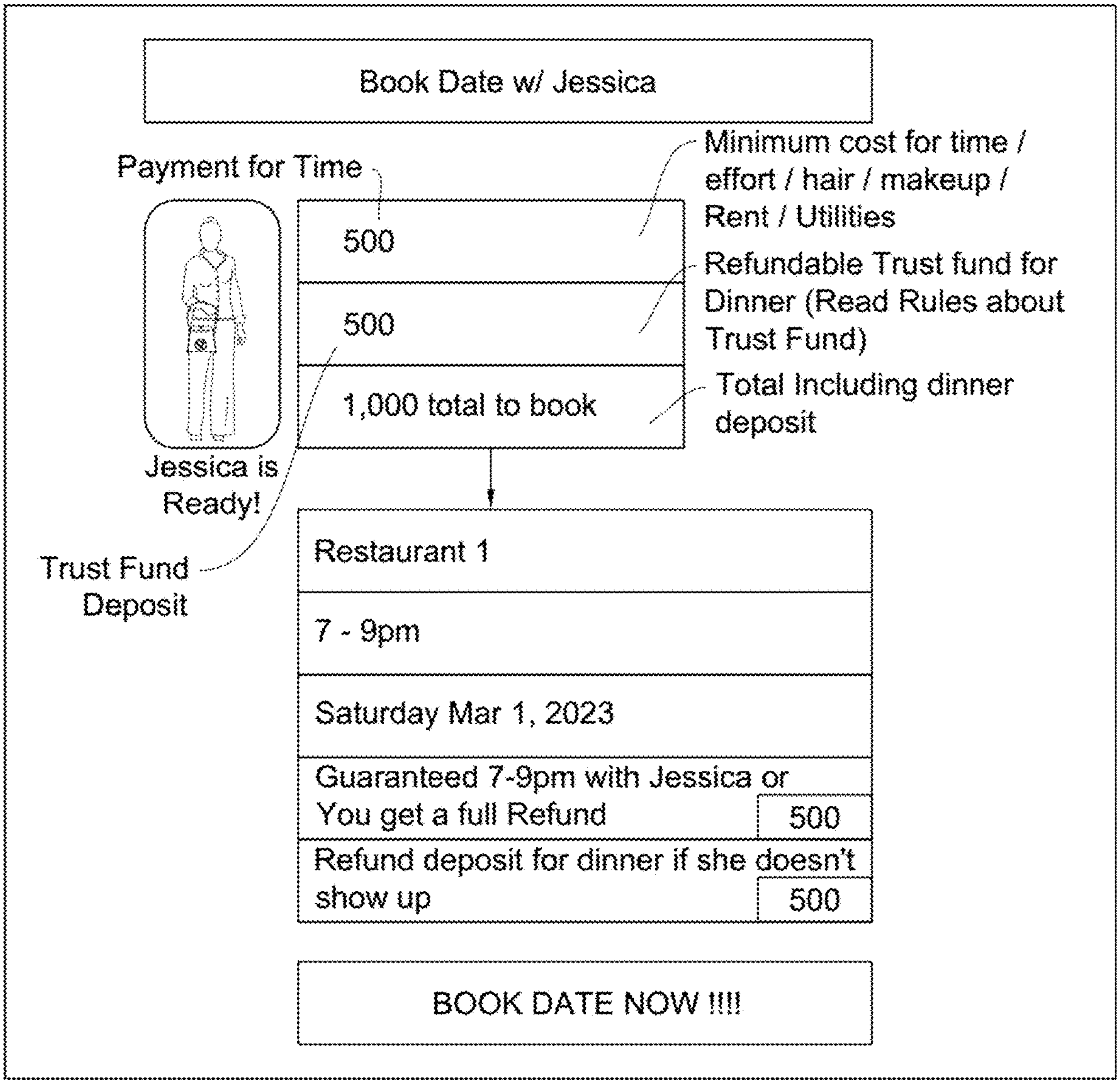

FIG. 75: In some embodiments, there may be an option to (e.g., book, schedule, inquire about, inquire about, inquire regarding, secure, create a connection to, hold, pay for, create a business relationship with, use transmittables to secure or book, secure time in exchange for transmittables, secure time by membership, secure time by payment, secure time or date or location or meeting or call by scheduling, schedule, inquire about, etc.) an in-person date with which may include but not limited to (e.g., the model, creator, or person, user, etc.) In some embodiments, there may be a, which may include but not limited to (e.g., trust fund option or required payment, membership requirement, membership option, membership, payment requirement, quota meeting requirement, requirement to purchase from gift list, requirement to purchase item listed on profile or on platform, requirement to spend a specific amount of money, meet requirement to become special fan or special user or special person or special member, etc.) to secure, which may include but not limited to (e.g., payment/booking/time, meeting, meet and greet, booking, content creation, content creator, perform contractual agreements, submit contractual agreements with payment, make down payment, make payment, secure booking with partial payment, etc.) which may include but not limited to (e.g., dinner, time, activity, content, creation of content, endorsement of product, job, gig, dating time, dating requirement, meeting for date, etc.) In some embodiments, there may be, which may include but not limited to an: (e.g., option or requirement, membership, quota, amount spent, user requirement such as net worth, etc.) which may include but not limited to (e.g., to pay for, transmittables with, create with, give assets to, etc.) which may include but not limited to (e.g., creator, model, or person, etc.) which may have but not limited to (e.g., time, options, date, acceptance, connection, etc.) that may or may not be non-refundable if perhaps which may include but not limited to (e.g., the requirements or agreement for the date is fulfilled or not fulfilled, or agreements were met, or not met, or agreements weren't met, etc.) regardless, which may include but not be limited to (e.g., if the other person that paid shows up or not, the other person performs duties of agreement or not, etc.)

In some embodiments, which may include but not limited to, the: (e.g., amount, partial, total etc.) which may include but not be limited to (e.g., deposit, trust funds, or total amounts put up to secure the 'date in person, etc.) may be shown in, not be limited to (e.g., real-time or shown on a page, or any user interface, etc.) In some embodiments, there may be, which may include but not be limited to (e.g., clickable, options, 3rd party references etc.) that may show why, which may include but not be limited to (e.g., payments are made, or what words mean, or explaining how refunds, requirements, rules, work, etc.) In some embodiments, there may be a large option near the, which may include but not be limited to (e.g., bottom, top, side, or near photo or information etc.) that may allow the, which may include but not be limited to (e.g., person, user, robot, AI, etc.) to see their, which may include but not be limited to (e.g., entire, portion of, itemized, receipt, invoice, total, partial, breakdown, bill, credit, etc.) which may include but not be limited to (e.g., 'bill, invoice, or total, etc.) that may show a, which may include but not be limited to (e.g., breakdown, itemized, receipt, invoice, total, partial, breakdown, bill, summary of, total, etc.) or the page may show this, which may include but not be limited to (e.g., breakdown, itemized, receipt, invoice, total, partial, breakdown, bill, summary of, total, etc.) along with which may include but not limited to, the: (e.g., explaining information, that may allow the booking to go through etc.) In some embodiments, the page may contain, which may include but not be limited to (e.g., more information or more photos or the person's favorite clicked photo etc.) based on computing operation of the person that he or she is booking to remind the person of their, which may include but not be limited to (e.g., favorite photo, favorite items, items, things they like, advertisements, profiles, persons, events, etc.) In some embodiments, a, which may include but not be limited to (e.g., personalized message may be shown from the creator, a message that explains the dating process or what to expect, suggestions, warnings, items, user interfaces, notices, bulletins, etc.)

FIG. 76: In some embodiments, there may be a (e.g., 'trust fund account,' holding account, down payment account, deposit account, deposit 3rd party processor or payment, etc.) which is either going to be handled on the, which may include but not be limited to (e.g., platform, software, business, corporation, etc.) or it is going to be handled by a 3rd party or a combination of the two, etc.) In some embodiments, there may be a simple to read or a, which may include but not be limited to (e.g., breakdown, itemized, receipt, invoice, total, partial, breakdown, bill, a summary of, total, etc.) of the funds that are in the trust fund account and a, which may include but not be limited to (e.g., breakdown, itemized, receipt, invoice, total, partial, breakdown, bill, a summary of, total, etc.) of what they are for or information regarding, they may be separated by categories such as, which may include but not be limited to (e.g., 'refundable, redeemable, pre-paid, payments, transactional history, refund request, refunded, partial payment, deposit payments, trust fund account payments, etc.) In some embodiments, there may be category options that the (e.g., public person, 'payer' or 'person using' or user, model, person, human, robotic system, AI, computing system, etc.) may be able to separate their funds by (e.g., category or by explanations, or with notes, by type, by refundable and non-refundable, by person, by model, by user, by dates, by periods, etc.) In some embodiments, these categories may be separated by, including but not limited to (e.g., explanations, pre-loaded, redeemable, potentially refundable, held until the date is completed, discount-redeemable funds, non-refundable, etc.)

In some embodiments, there may be an option to book, schedule, inquire about, inquire about, inquire regarding, secure, create a connection to, hold, pay for, create a business relationship with, use transmittables to secure or book, schedule, inquire about, etc.) an in-person date with which may include but not limited to (e.g., the model, creator, or person, etc.) In some embodiments, there may be a, which may include but not limited to (e.g., option or required payment, etc.) to secure, which may include but not limited to (e.g., payment/booking/time, etc.), which may include but not limited to (e.g., dinner, time, activity, etc.) In some embodiments, there may be, which may include but not limited to an: (e.g., option or requirement, etc.) which may include but not limited to (e.g., to pay for, transmittables with, create with, give assets to, etc.) which may include but not limited to (e.g., creator, model, or person, etc.) which may have but not limited to (e.g., time, options, date, acceptance, connection, etc.) that may or may not be non-refundable if perhaps which may include but not limited to (e.g., the requirements or agreement for the date is fulfilled or not fulfilled, or agreements were met, or not met, or agreements weren't met, etc.) regardless, which may include but not be limited to (e.g., if the other person that paid shows up or not, the other person performs duties of agreement or not, etc.)

In some embodiments, which may include but not limited to, the: (e.g., amount, partial, total, etc.) which may include but not be limited to (e.g., deposit, trust funds, or total amounts put up to secure the 'date in person, etc.) may be shown in, not be limited to (e.g., real-time or shown on a page, or any user interface, etc.) In some embodiments, there may be, which may include but not be limited to (e.g., clickable, options, 3rd party references, etc.) that may show why, which may include but not be limited to (e.g., payments are made, or what words mean, or explaining how refunds, requirements, rules, work, etc.) In some embodiments, there may be a significant option near the, which may include but not be limited to (e.g., bottom, top, side, or near photo or information, etc.) that may allow the, which may include but not be limited to (e.g., person, user, robot, AI, etc.) to see their, which may include but not be limited to (e.g., an entire, portion of, itemized, receipt, invoice, total, partial, breakdown, bill, credit, etc.) which may include but not be limited to (e.g., 'bill, invoice, or total, etc.) that may show a, which may include but not be limited to (e.g., breakdown, itemized, receipt, invoice, total, partial, breakdown, bill, a summary of, total, etc.) or the page may show this, which may include but not be limited to (e.g., breakdown, itemized, receipt, invoice, total, partial, breakdown, bill, a summary of, total, etc.) along with which may include but not limited to, the: (e.g., explaining information, that may allow the booking to go through, etc.)

In some embodiments, there may be options to book, schedule, inquire about, inquire about, inquire regarding, secure, create connection to, hold, pay for, create business relationship with, use transmittables to secure or book, schedule, inquire about, etc.) a 'party virtual date' which may refer to 'multiple shorter or multiple regular time or any time of dates' in a row or may include but not be limited to (e.g., one right after the other or one the same day or on different days, staggered, etc.) In some embodiments, there may be options to choose may include but not be limited to (e.g., person or persons, users, or outside users, or outside persons, or 3rd parties, advertisers, advertisements, businesses, or entities, etc.) In some embodiments, there may be options to see may include but not be limited to (e.g., breakdown, itemized, receipt, invoice, total, partial, breakdown, bill, summary of, total, etc.) which may include but not be limited to (e.g., prices, price ranges, general pricing, general transmittables, and time, a total to pay, a checkout window, a checkout options, 3rd party options to check out, ways to pay, etc.) In some embodiments, there may be options to increase or decrease (e.g., duration, meeting time, time, AI-inputs, AI-inputting data, etc.) which may, which may include but not be limited to (e.g., 'fluctuate price, or total, or location, or dates, or options, or availability, etc.) In some embodiments, which may include but not be limited to (e.g., data, inputted data, AI-analyzed data, data, etc.) which may include but not be limited to, (e.g., age range, age, demographics, net worth, amount spent, funds in account, frequencies of dates, booked dates, virtual dates, in-person dates, history, history of dates, preferences, computing operation data gathered, gathered data, amount of money spent, frequencies of dates, time spent on platform, login frequencies, demographic data, looks, what content or availability, or features to show on profile based on age range features, etc.) may be used to, which may include but not be limited to (e.g., automatically, manually, or AI-changed, or AI-determined, manually change, automatically change or etc.) which may include but not be limited to (e.g., fluctuate, change, determine, etc.) which may include but not be limited to (e.g., prices, location, availability, features, experience, options that are available, content being shown, etc.) In some embodiments, there may be options to adjust may include but not be limited to (e.g., adjust prices, price ranges, general pricing, general transmittables, adjust times, dates, location, time period, frequency, etc.) In some embodiments, there may be options to may include but not be limited to (e.g., lower price, change price, switch price, funds application, apply funds, etc.) or change may include but not be limited to (e.g., booking calendar or booking (e.g., breakdown, itemized, receipt, invoice, total, partial, breakdown, bill, summary of, total, etc.) or booking due to price changes, time changes, etc.)

In some embodiments, the page may contain, which may include but not be limited to (e.g., more information or more photos or the person's favorite clicked photo, etc.) based on the computing operation of the person that they are booking to remind the person of their, which may include but not be limited to (e.g., favorite photo, favorite items, items, things they like, advertisements, profiles, persons, events, etc.) In some embodiments, a, which may include but not be limited to (e.g., personalized message may be shown from the creator, a message that explains the dating process or what to expect, suggestions, warnings, items, user interfaces, notices, bulletins, etc.) In some embodiments, there may be an option for the creator or model, entity, 3rd party, user, etc.) to add in an optional or a mandatory payment for, which may include but not be limited to (e.g., nanny, cleaner, service, chef, childcare, etc.) during the time of the 'in-person date or any type of connection.' In some embodiments, there may be an option for a, which may include but not be limited to (e.g., breakdown, itemized, receipt, invoice, total, partial, breakdown, bill, a summary of, total, etc.) or a viewing of itemized receipt, invoice, total, partial, breakdown, bill, or an itemized (e.g., breakdown, itemized, receipt, invoice, total, partial, breakdown, bill, a summary of, total, etc.) of what each 'charge or temporary charge covers,' which may include but not be limited to (e.g., 'childcare costs for the period, food trust fund, date money trust fund, payment or gift for date or time, gas, clothing, or any other cost the other person may be faced with to go out on this date, or to make this connection or to agree to this date, etc.)

In some embodiments, there may be a user interface that may allow users to which may include but is not limited to (e.g., book, schedule, inquire about, inquire about, inquire regarding, secure, create a connection to, hold, pay for, create business relationship with, use transmittables to secure or book, schedule, inquire about, etc.) which may include but not limited to (e.g., jobs, gigs, events, parties, on-going jobs, on-going events, etc.) through platform(s) or which may include but not limited to (e.g., hire, find help, find assistance, pay someone else for any reasons, pay someone for assistance or goods or services, etc.) through, which may include but not limited to (e.g., platform or 3rd parties, advertisers, advertisements, businesses, or entities, or persons, etc.) In some embodiments, which may include but not limited to (e.g., options or ways to hire, options available, or any possibilities of opportunities, etc.) may include but not be limited to (e.g., find a personal assistant, browse through personal assistants, hire a personal assistant, hire a nanny, find a nanny, find/hire a chef, hire a driver, hire security, etc.) In some embodiments, options may include but are not limited to (e.g., paying on credit, paying cash, paying one-time, paying monthly, using credit, using rewards, having a 3rd party or another user pay, debit, immediate payment options, etc.) In some embodiments, there may be options to view potential 'hires' or 'those for work's history,' which may include but not be limited to (e.g., how many jobs they have previously booked on the platform, their ratings, how many creators or models they've worked with, how many jobs they've done, their ratings for each job, their total ratings, comments, feedback, background check, background verification, etc.)

Figure 77:
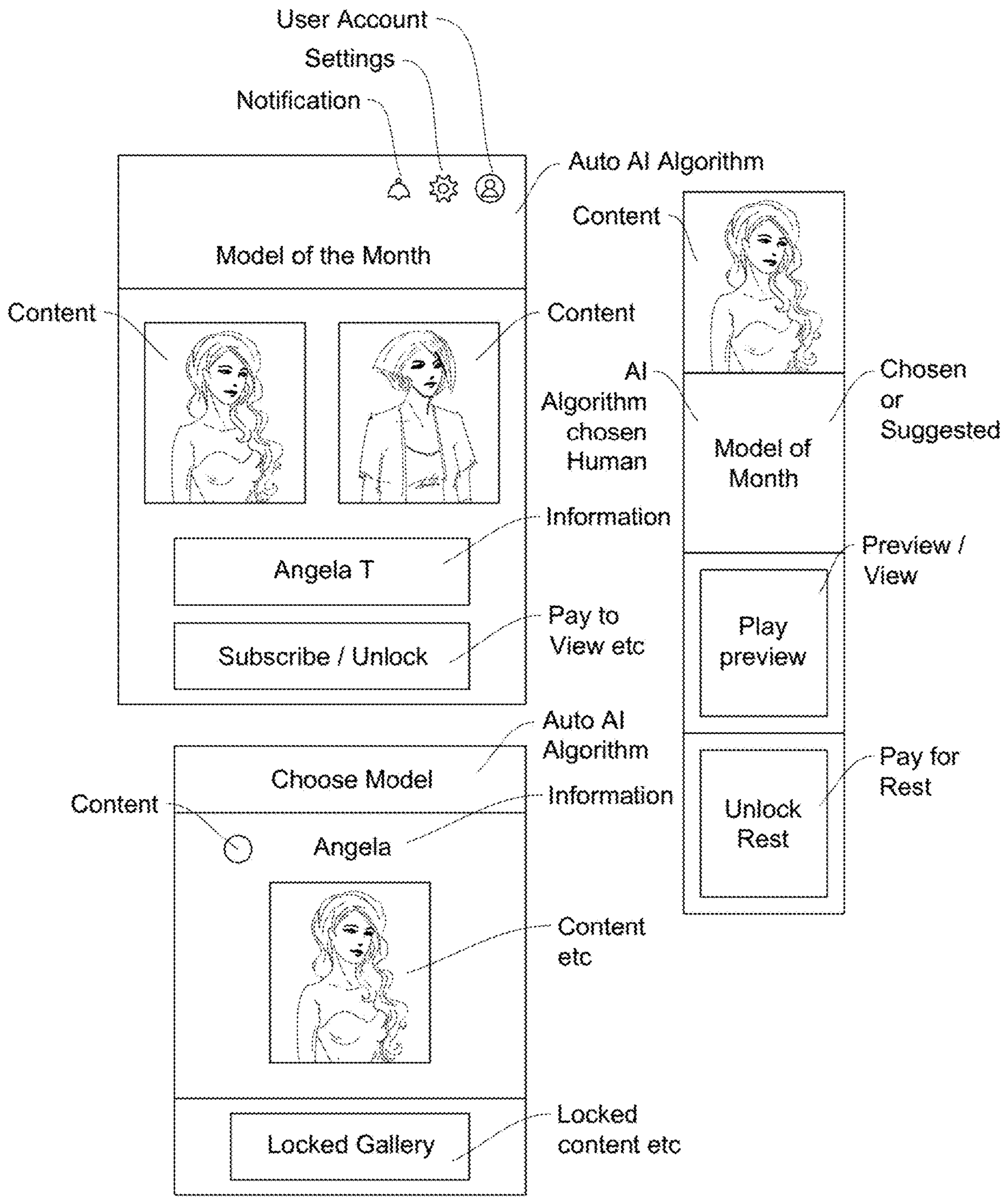

FIG. 77: In some embodiments, the user interface may have a, which may include but not be limited to (e.g., page, pages, or a subsection, management system, management area, area, place, hologram, etc.) of the platform dedicated to an, (e.g., 'chosen, voted on, won, or person appointed' etc.) which may be created by any (e.g., platform user, the platform, management team, managers, persons managing, agency, talent agency, model, users, etc.) to be a, which may include but not be limited to (e.g., chosen for, dedicated to, added to, marketing, promoted, campaign model, agency, tax person, lawyer, etc.) for the platform or 3rd party, or any party. In some embodiments, a subsection or designated area on the platform may be partially public, including but not limited to (e.g., subscribers, sign-ins, followers, appointed persons, etc.) In some embodiments, this entire campaign may include but not be limited to (e.g., public or available for sign-ins, those that spend money on the platform, those that follow, those that are designed, for a fee, etc.) In some embodiments, the user interface or user interface campaign area may contain content that is created by and owned by the platform with a paid or not paid, which may include but not be limited to (e.g., model/creator/or persons, etc.) to represent or promote the platform. In some embodiments, the content may be, which may include but not be limited to (e.g., owned and purchased from the platform to be reused as paid material, or any agreed upon used material or 3rd party material, etc.) In some embodiments, the content may be paid for by, e.g., sponsors, persons, 3rd parties, advertisers, advertisements, businesses, or the platform, etc.) but may not be necessary. In some embodiments, this content may be used in other areas, including, but not limited to (e.g., outside campaigns or any 3rd party sites which may include ads, other promotional material, advertisements, promotional material, promotions, content, created content, AI-created campaigns or content, AI-created campaigns, etc.) In some embodiments, content or viewable items may be, which may include but not be limited to (e.g., owned, paid for, or licensed by the platform or 3rd parties, paid for, rented, bidding on, etc.) In some embodiments, which may include but not be limited to (e.g., users, content creators, or persons, etc.) may be required to do including but are not limited to (e.g., live shows, a live segment, a campaign, or promotional material, or live events, or post content, or post items, or post materials, or come to events, etc.) In some embodiments, there may be an (e.g., integrated or separate, or internal or 3rd party, etc.) (e.g., bidding system, payment system, ranking system, paid for the system, paid promotions, etc.) in which a model can be paid for by the highest bidder to be promoted on the site, or the platform, or any management system or managers or agency or outside persons or internal persons can pay to promote or advertise model, profile or content whether located on the platform or calendar or content or particular model's page, etc.) In some embodiments, there may be a (e.g., 'free preview for content' or teaser content system or a way to put a marker on each content in which it becomes paid versus free, add markers or tags, or click to scroll on parts of a video or media to be kept for paid users only and the rest may be able to be seen by anyone as a promotional material item for the content or the page or the calendar or the user or the model or the schedule, for example, which allows a portion or a part of a video to be promoted or viewed or seen or pushed or as an advertisement for free or for payments, or for paid as promotion, etc.)

In some embodiments, there may be options for users to may include but not limited to (e.g., self-create, self-assess, self-vote, user vote, or choose, or be chosen, or be voted, or be under contract, etc.) to be put as a promoted which may include but not limited to (e.g., unique, main, top, largest, outside promoted, etc.) user on any page, which may include but not be limited to (e.g., the main page at the top, any promotional materials, any outside promotional materials, any page on platform anywhere on platform or platform's other platforms, or any promo material, etc.) In some embodiments, the promoted person(s) may be, including but not limited to (e.g., do 'live shows' or 'live meetings' or 'in-person meet and greets, etc.) In some embodiments, the person may have any content that may include but is not limited to (e.g., exclusive content, person content, locked content, public content, etc.) In some embodiments, content may be in the form of any content or owned by any persons, including but not limited to (e.g., video, meme, photo, stack of photos or stack of content, or multiple variations of content, etc.) In some embodiments, users to be, which may include but not limited to (e.g., promoted, made special, larger, outside promoted, inside promoted, etc.) may be from the platform as may include but not limited to (e.g., user, a bystander, voted, paid for, self-applied, user applied, any person making decisions, appointed, chosen, selected, suggested, etc.) In some embodiments, 'live shows' may be pre-recorded or 'live,' etc.)

In some embodiments, there may be options for, including but not limited to (e.g., unlocking galleries, unlocking content, unlocking swipes, unlocking forms or ways to see content, playing previews, etc.) In some embodiments, there may be, which may include but not be limited to (e.g., previews or ways to see a clip or some content or profiles, or users, or information, etc.) in exchange for, which may include but not be limited to (e.g., points, for free, subscriber-only, registered users only, followers only, etc.) In some embodiments, there may be public options to view content or view a preview of content. In some embodiments, options may include but are not limited to (e.g., play some and see the rest or play some and pay for the rest, or view, or pay for, or see, or earn, etc.) In some embodiments, 'play some or play the rest' may mean, which may include but not be limited to (e.g., content or pictures, information or pixels, holograms, anything, booking information, virtual information, or contact information, etc.) In some embodiments, there may be options for, which may include but not be limited to (e.g., locking or unlocking, viewing, seeing, etc.) content based on many factors such as, which may include but not be limited to (e.g., 'point redeeming, particular user, paid user, payment has been made, auto-payments, public, private, etc.)

Figure 78:
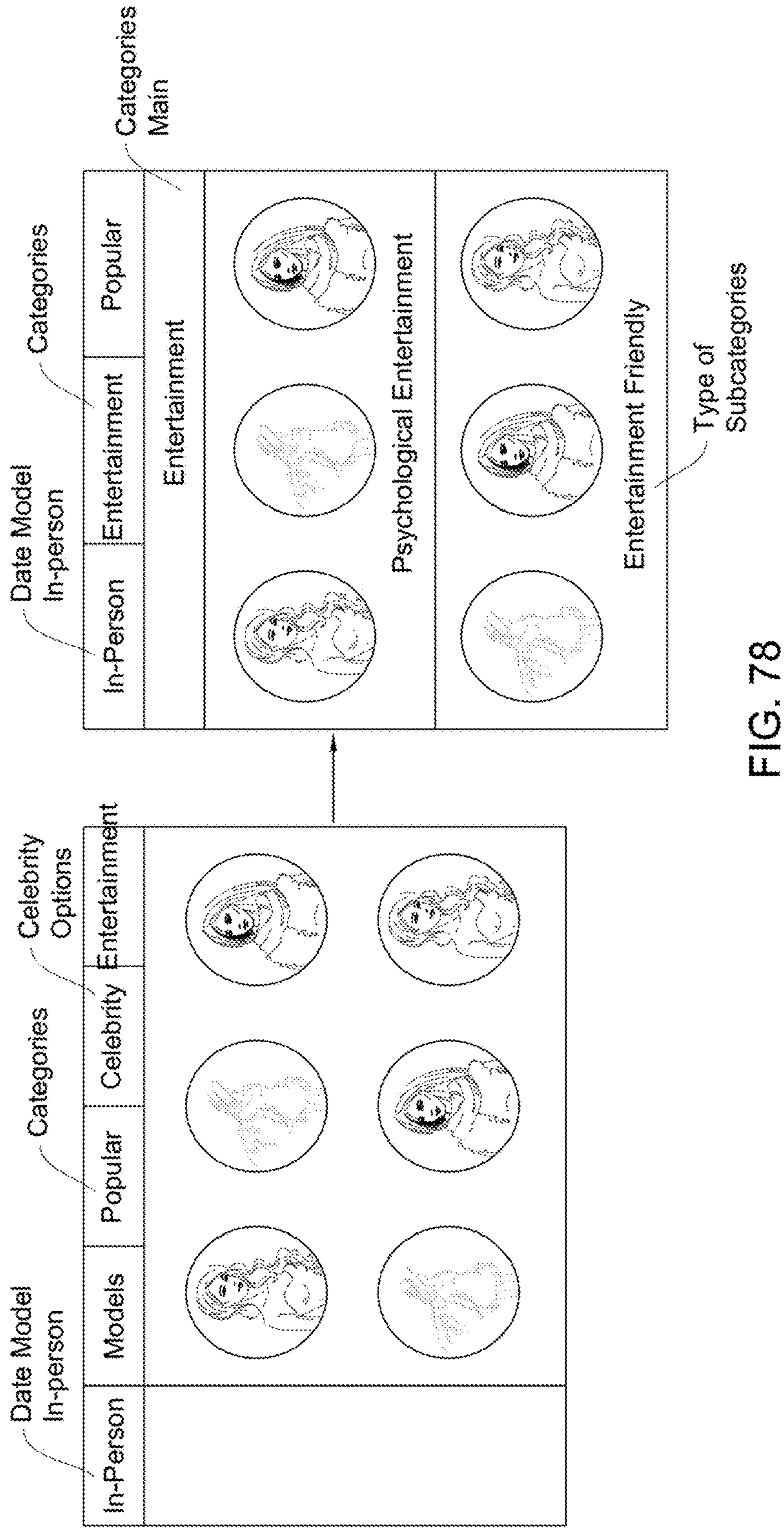

FIG. 78: In some embodiments, there may be, which may include but not be limited to (e.g., user interface(s), homepages or other pages, etc.) that may show, which may include but not be limited to (e.g., types, popularity, types, suggestions, categories for registered or non-registered users, users, persons, profiles, 3rd parties, advertisers, advertisements, businesses, etc.) In some embodiments, the categories may be main categories which may include but not limited to (e.g., clicked, swiped, tapped, or anyway chosen, viewed, etc.) user interface may lead to another page with a, which may include but not be limited to (e.g., subcategory section or options, or another user interface, new screen, viewing options, etc.)

In some embodiments, the user interface may organize in an easy way method to see who is friendly with each option. In some embodiments, there may be options to show who is, including but not limited to (e.g., virtual friendly, and who is in-person friendly, available in-person, available virtually, have virtual content, show virtual content, etc.) In some embodiments, there may be ways to see who would allow options to choose from may include but not limited to, which may include but not limited to (e.g., an in-person date, and who would only allow virtual dates such as live dates, streaming dates, date calls, video messaging, subscriber friendly content, etc.) In some embodiments, these categories may be, which may include but not be limited to (e.g., boxed off, circled off, subsection of, on another page, off another main page, or led to an entirely 3rd party section or subsection, etc.) or to who is offering in whatever regard of capacity (e.g., you may, user, person, entity, 3rd party, robot, artificial intelligence, etc.) may see who is offering and who is not based on category preferences.

In some embodiments, there may be user interface(s) that may include but not be limited to (e.g., date options, booking options, user options, user profile and time options, user time and profile options, in-person dates, virtual dates, comparing in-person to virtual dates, comparing times, comparing prices, price ranges, general pricing, general transmittables, sending winks, sending information, location information, types of dates available, types of times and dates and locations available, categories of dates available, virtual live dates, virtual or live dates options, prices, price ranges, general pricing, general transmittables, per, current-real time prices, price ranges, general pricing, general transmittables, current-real time user options, real time dates or times, how many minutes away something is, how many minutes away a location is, search options, searching, calendar searching, calendar options, small breakdown, light information, more information, some information, how far a location is, how far a distance of a date would be, where a date may be located, a driving, travel, route, route to the date, showing a driving, travel, route, route plus distance plus location, showing route to location, prices, price ranges, general pricing, general transmittables, of travel information such as booking prices, price ranges, general pricing, general transmittables, prices, price ranges, general pricing, general transmittables, per plane ticket, prices, price ranges, general pricing, general transmittables, per plane type, hotel prices, price ranges, general pricing, general transmittables, travel prices, price ranges, general pricing, general transmittables, activity prices, price ranges, general pricing, general transmittables, real time prices, price ranges, general pricing, general transmittables, how far distance may be, how far a route may be, how far it would be to drive, different traveling routes, different options for traveling, times of dates, locations of dates, profiles of daters, live events, live dates, real-time location data, real-time date data, real time of how far something would be from house, how far a date would be from house, how long a date would be from house, real-time data information, real-time calendar information, how long a date would be based on data, how long a date would last based on data, jet traveling data, private traveling information, private data information, etc.)

Search users, categories, etc.) within the calendar: In some embodiments, the user may be able to search may include but not limited to (e.g., on the calendar, around the calendar, on the user interface, on each day, period searching, within a period, within the calendar, etc.) which may include but not limited to (e.g., on each day, such as search within a time frame, or period, or category) time frames may include but not be limited to (e.g., lunch, snack, dinner, coffee, shopping, virtual, in-person, restaurant, etc.) In some embodiments, the user may be able to search on the calendar, which may include but not be limited to (e.g., per day, per period, per week, per location, per distance, per popularity, per type of model, per type of creator, per user, per availability, per activity, etc.)

In some embodiments, there may be an ongoing screen that may be show anything ranging from which may include but are not limited to (e.g., register, log-in-, sign-in, become a model, apply, book a date, bid on a date, book a virtual date, entertainment options set by anyone or model or user, see exclusive content, follow a creator, subscribe to a creator, discover creators or models, discover 18+ models, discover calendar options, discover available times, dates, locations, choose your location, choose your time, craft your calendar, see our models, 18+ models, calendar times available, short version or long version of model's calendar's, users calendar, an option to craft a calendar or to input a calendar, options to creator a calendar, options to insert work schedule to get a calendar made for that person, profile options, featured options, new options, live bidding/auction, live bidding/auction rooms, live category rooms, live type of model rooms, live type of date rooms, live charity events, live events, etc) In some embodiments, there may be a, which may include but not limited to (e.g., pay for a live-in person date payment method, pay for any form of virtual entertainment payment method, pay for customized entertainment, entertainment, requested entertainment, entertainment, videos/pictures, pay for requested entertainment, pay for custom entertainment, pay for a live-virtual date payment method, pay for a travel date payment method etc.) in which any which may include but not limited to (e.g., person in the public, public bidders, private bidders, registered bidders, subscribers, fans, people, etc.) may be, which may include but not limited to (e.g., put it on credit, use funds, pay at that moment, may be use funds from their account, may be use their credit card, may be use cash, may be use any form of crypto, may be use any form of an asset to pay for a date may include but not limited to the title of their vehicle, cash transfer payments, asset currency, gold, silver, diamonds, etc.)

Figure 79:
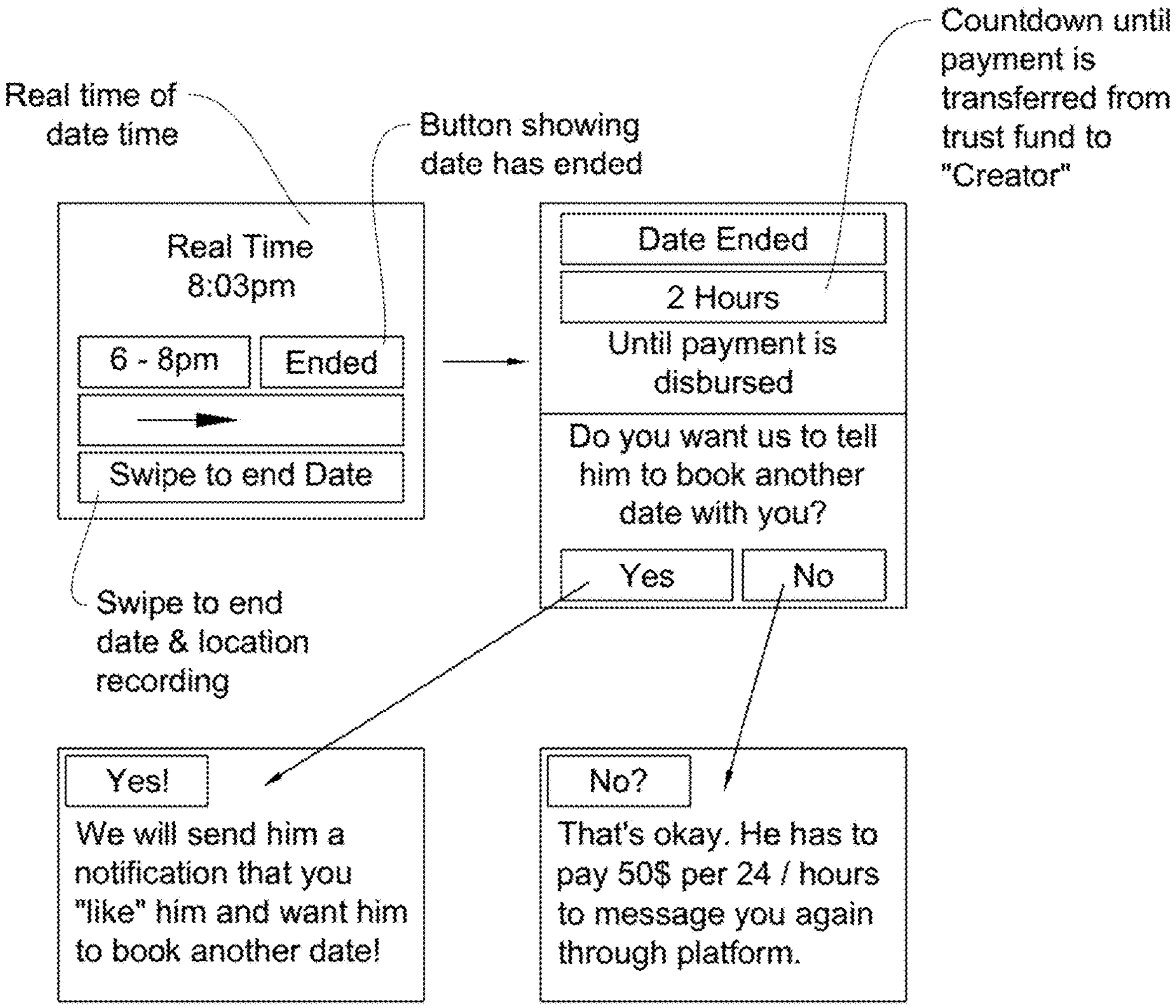

FIG. 79: In some embodiments, the user interface may which may include but not limited to (e.g., begin, end, change, switch, record, keep, suggest, end, etc.) date or connection by, which may include but not limited to (e.g., automatically through AI or through the platform, auto, manually, swiping, clicking, browsing, learning, scrolling, auto choosing, etc.) In some embodiments, there may be a, which may include but not limited to (e.g., process, user interface, summary, process breakdown, or step-by-step, etc.), where a, which may include but not limited to (e.g., current, previous,' real-time,' updated 'time, current time, suggested time, step by step break down, etc.) is shown to the, which may include but not limited to (e.g., 'person getting paid' or any person, user, party, entity, business, group, model, etc.) In some embodiments, the user interface may turn, which may include but is not limited to (e.g., 'red' or another color, swipe, make a move, make an adjustment, change, manual adjustment, tap, or any other way or look, or virtual, etc.) that may show that the date has now which may include but not limited to (e.g., 'ended,' concluded, stopped, started, agreements have been met, partially met, or concluded, terminated, or agreed with, or completed, or implied to have concluded or be met, an initiation to allow payments to be dispersed, allow agreements to be confirmed to be completed or seemingly met to all parties or any parties or for agreement or understanding or arrangement to be sealed by contract or duty of contract or implied completed of the contract, or show contract agreements have been met, etc.)

In some embodiments, 'ended may refer to, which may include but is not limited to (e.g., going past the 'time paid for by the person paying, 3rd party paying, entity paying, business paying, any gifting, gifting, donations, donating, extra time, overtime, etc.) In some embodiments, there may be a, which may include but not limited to (e.g., screen, hologram, user interface, viewing display, user interface, etc.) that may show the, which may include but not limited to (e.g., for example, which may be including but not limited to the current time on the date, plus showing that the date ended '5 minutes ago' and that the person is 'free to go' or has 'fulfilled their contractual obligations,' etc.) In some embodiments, there may be a, which may include but not limited to (e.g., screen or a button, user interface, or a feature, etc.) that may be enabled to show that the, which may include but not limited to (e.g., 'paid person,' person paying, 3rd party paying, entity paying, business paying, any gifting, gifting, donations, donating, other person, user, etc.) may be now which may include but not limited to (e.g., contractually or by their free-will 'etc.) officially ending the, which may include but not limited to (e.g., recording of the date' date, process, time, location, payment disbursements, date agreement, etc.)

In some embodiments, recording may mean the process in which may include but not limited to (e.g., location, coordinates, time, location, date, etc.) may being recorded to show that the, which may include but not limited to (e.g., the date was performed and/or the contractual obligations are being met, or could be met, etc.) In some embodiments, the screen may show the, which may include but is not limited to (e.g., current time, the date time, and information regarding whether or not the date has ended, how much time left is on the date, if the date obligations have been met, etc.)

In some embodiments, the feature may be to show that the, which may include but not limited to (e.g., 'paid person,' other person, user, etc.), may now be agreeing with the, which may include but not limited to (e.g., computer system or the platform system and/or also agreeing that the date has now ended, etc.) In some embodiments, the user interface may include but is not limited to (e.g., show a screen that the 'date has now ended, and/or the user interface may show how long the date was in comparison to what the date was booked for, etc.) In some embodiments, there may be, which may include but not limited to (e.g., no penalties, partial penalty, any disbursement, no problems, etc.) if the date may not match up to what the date was supposed to be, such as which may include but not limited to (e.g., unrealistic expectations or expectations, or unspoken about things, or assumed things, or assumptions, etc.) which may include but not limited to (e.g., duration, check-in, check-out, time stamp, time record, time and data record, location, time and data record, coordinate(s), time spent on a date, attitude, personality, person, visuals, quality of date, quality, personality, opinions, etc.)

In some embodiments, the entire which may include but not limited to (e.g., review, view, user interface, format, data, etc.) may be there to show what, which may include but not be limited to (e.g., is being recorded, what has been recorded for the date data, connection data, etc.) In some embodiments, there may be a, which may include but not limited to (e.g., countdown clock or a time estimated clock, etc.) in which the, which may include but not limited to (e.g., 'paid person' or any user, or person or entity, etc.) may be getting payment disbursed from the, which may include but not limited to (e.g., trust account, any account, platform etc.) that may be holding the cleared money that the 'paying person' put up for the date. In some embodiments, the 'paid person' may be notified when the payment has been disbursed and is now pending in their account, etc.)

In some embodiments, there may be an option for the 'paid person' to manually or automatically answer a question such as but not limited to (e.g., 'Do you want us to tell him to book, schedule, inquire about, inquire about, inquire regarding, secure, create connection to, hold, pay for, create business relationship with, use transmittables to secure or book, schedule, inquire about, etc.) another date with you?" etc.) In some embodiments, there may be, which may include but not limited to a couple of options such as which may include but not limited to (e.g., 'yes or no" etc.) In some embodiments, user interface may take the, which may include but not limited to (e.g., 'paid person' user, person, user interface, etc.) to another screen which may include but not limited to (e.g., and if it's a 'yes' for example, then the other party may be notified that 'that person likes them' etc.) and they may be encouraged and confirmed to want that person to book, schedule, inquire about, inquire about, inquire regarding, secure, create connection to, hold, pay for, create business relationship with, use transmittables to secure or book, schedule, inquire about, etc.) another date with them which may include but not limited to (e.g., soon after the date has officially ended, or at any moment, etc.) In some embodiments, the, which may include but not limited to (e.g., 'paid person,' user, person, etc.) may choose that they which may include but not limited to (e.g., don't want to go out with this person again etc.) and then they may have an option to, which may include but not limited to (e.g., 'block' this person or get more information regarding how that person may contact that person again etc.) In some embodiments, for example, which may include but not limited to (e.g., messaging system may be the next form of contact/only form of contact moving forward, and they may be charged 50$ for example to message that person again, etc.)

Figure 80:
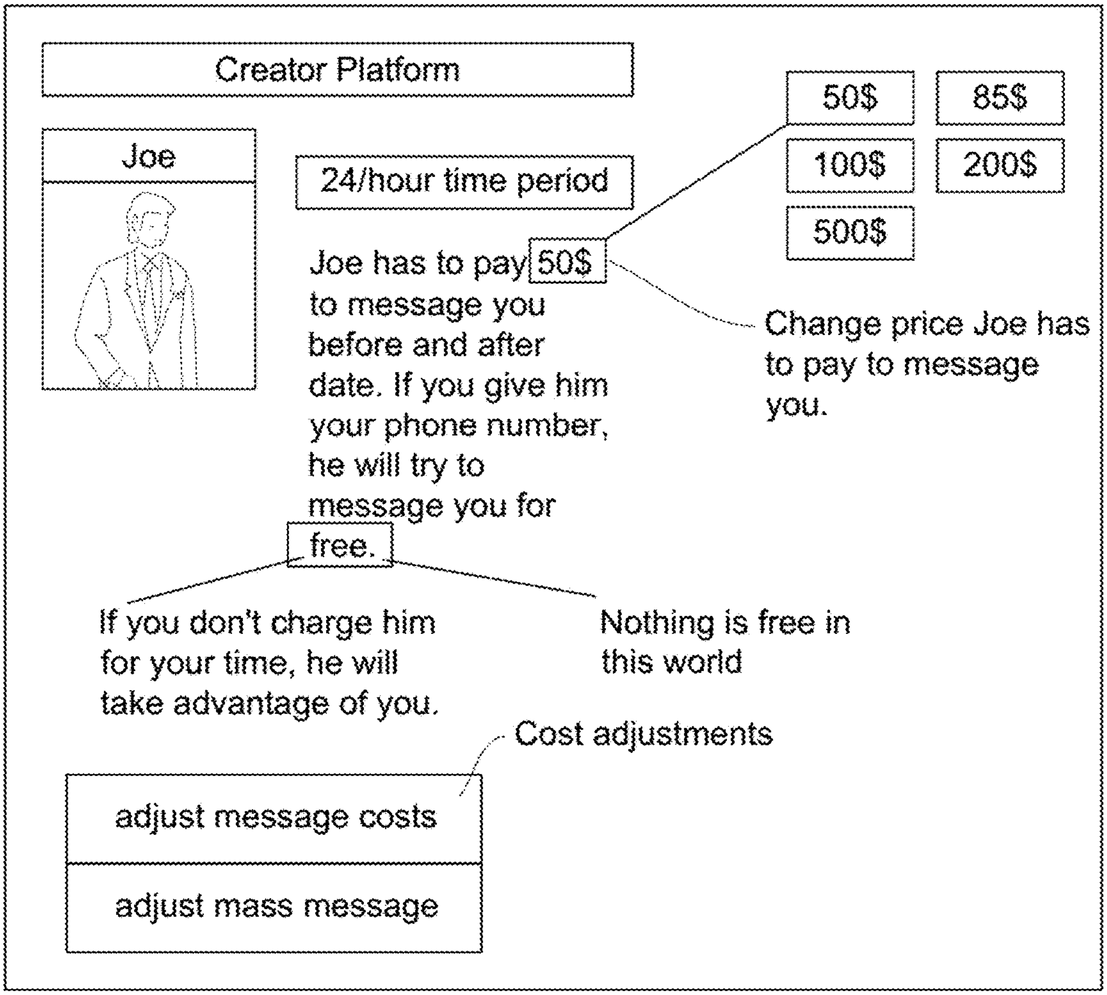

FIG. 80: In some embodiments, the, which may include but not limited to (e.g., 'paid person's platform, or model's platform, or models view, etc.) may have an option with a, which may include but not limited to (e.g., 'paid dater' or a 'subscriber' or a 'follower' or a public person or anyone that may be able to contact this person, etc.) and/or their which may include but not limited to (e.g., 'set price,' made price, platform price, etc.) for an which may include but not limited to (e.g., 'incoming message, message, contact options, etc.) to the, which may include but not limited to (e.g., model/creator,' person, user, etc.) In some embodiments, there may be a, which may include but not limited to (e.g., a picture of the person, a file of the person, records, information, etc.) and the, which may include but not limited to (e.g., 'paid person, model, creator, etc.) may be able to, which may include but not limited to (e.g., adjust, raise, eliminate, change, ask for, make requirements for, etc.) the, which may include but not limited to (e.g., 'cost to message the model, creator, cost to contact, cost to talk to, cost to inquire about, etc.) In some embodiments, there may be information regarding the, including but not limited to (e.g., 'risks associated with eliminating/taking away the requirement for the person being required to have to 'pay to message the person' etc.) In some embodiments, user may be (e.g., required to pay to the person they are messaging, may have requirements in place, may have to join a membership, may need to subscribe or follow or send a gift, etc.) and then the person or user that the person is messaging or trying to contact may be warned or notified that if they don't 'set a price' or require payment from this person then they will not pay later or that their chances of having them subscribe or pay later may be reduced due to free content or free messaging or responding, etc.) In some embodiments, users may be able to (e.g., require payment, set a price to continue to interact with after a date or after an initial message or if that person is being creepy or if that person is being in appropriate such as (e.g., 'pay to continue the conversation' or 'pay new price' or 'gift is required to continue conversation or 'requirements need to be met by purchasing item or donation for user to continue to date her or to continue to have access to messaging or interacting with etc.)

Figure 81:
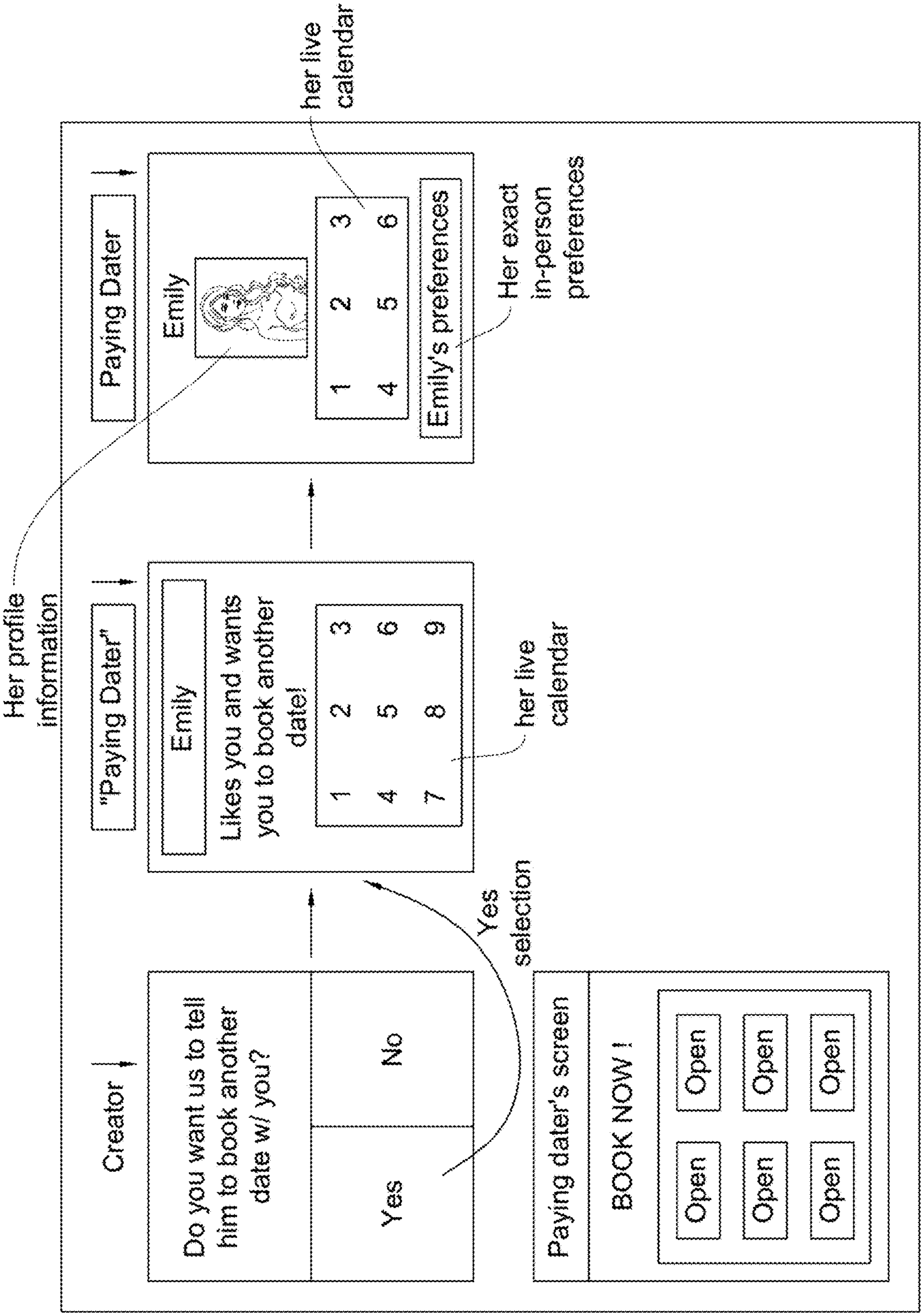

FIG. 81: In some embodiments, there may be FIG. 144 or any interface in which the, which may include but not limited to (e.g., 'creator, model, user, person, entity, group, business, etc.) says that she wants to, which may include but not limited to (e.g., 'go out with the paid person again on another date' etc.) In some embodiments, the process may continue automatically where the, which may include but not limited to (e.g., 'paying person' etc.) may, which may include but not limited to (e.g., immediately get a notification, a screen notification, information, screen info, etc.) expressing that, which may include but not limited to (e.g., 'the person you just went out on a date with wants to go out with you again, and/or show options for immediate booking with that person, notifying that the person likes you, notifying that the person or user wants to go out again, or 'book another date now option' or 'schedule and pay for a date now' or 'send gift in exchange for date' 'send money or gift for date' 'pay for item needed or wanted in exchange for time or date or interaction or virtual date or in-person date' 'pre-pay for date now' or 'pre-arrange next date now' or 'schedule date again immediately after first one' or send her gifts, or 'send her flowers' or 'send gifts now', send or arrange or pay for gifts in exchange for date, send gifts or buy something from 'wishlist' or 'list' or 'listed item' in exchange for date or time or virtual date or in person date or in exchange to view calendar or schedule or time or be able to message or book date or send like or interact with, etc.) In some embodiments, there may be a screen that may show the, may include but not limited to (e.g., 'creator or model, entity, 3rd party, user, 's' etc.) preferences such as which may include but not limited to (e.g., 'Emily likes to go out on Fridays from 5-7 pm for dinner, she likes seafood, or she likes Steak Restaurant, etc.) In some embodiments, the, which may include but not limited to (e.g., paying person may be informed of her preferences, the person that is paying, dater, user, person, etc.) for example, which may be including but not limited to which may include but not limited to (e.g., when he sees the calendar option to book, schedule, inquire about, inquire about, inquire regarding, secure, create a connection to, hold, pay for, create a business relationship with, use exchangeable to secure or book, schedule, inquire about, etc.) her again, he knows what she likes. In some embodiments, for example, he may not have to ask her or message or pay to message to ask her questions unless he wants to pay to ask her questions through the platform, etc.) In some embodiments, there may be, which may include but not limited to (e.g., multiple options, options, selections, etc.) on a screen/user interface that may show the, which may include but not limited to (e.g., profile photo of the person, the 'paying person,' user, etc.) just went out with and may show that creator or model, entity, 3rd party, user, 's preferences, which may include but not limited to (e.g., their live calendar, timing method data, timing data method, timing process data, their best profile photos, and options to 'book now' based on availability, etc.) In some embodiments, models or users or persons may be able to have automatic 'book another date reminders or suggestions or clickable link to another available date or secure another date now on the calendar' sent out to persons right after the date automatically or manually. In some embodiments, the user can initiate or platform or 3rd party or integrated system, etc.) and can send or notify or automate automatic dating reminders to book another date after the date (or a way to automatically send them their calendar (model or users' calendar) and tell them they need to book another one and makes it easy directly after date).

This may be the 'potential dater's view in some embodiments.' In some embodiments, an option may be shown, including but not limited to (e.g., before, during, after, etc.) a date may be completed to set up another date. In some embodiments, there may be a computing operation or an AI suggestion that takes into consideration, which may include but not be limited to (e.g., data from date' such as 'the day of the date, the time of the date, the location of the date, and any other options related to the date involving weather, location, etc.) In some embodiments, the User interface may show multiple options such as, which may include but not be limited to (e.g., same time, same place, the same day or 'same time, different place, the same day' or same day different time, different place' or try the weekend or weekday 'same time, different place, etc.) In some embodiments, the user interface may show AI-generated options or computing operation options, including but not limited to (e.g., this restaurant is cheaper, or 'This one is closer to you, etc.) In some embodiments, this information may be pulled or used by collecting data about the date or the person's profile to ensure they get the best and easiest way to date using AI, computing operation, or data. In some embodiments, there may be a process where a 'real time' updated 'time' is shown to the 'person getting paid,' and the user interface may turn 'red' or another color that may show that the date has now 'ended.' In some embodiments, the term 'ended' may refer to going past the, which may include but not be limited to (e.g., 'time paid for by the person paying, or date time, or connection time, or meeting time, or activity time, etc.) In some embodiments, a screen may show the current time on the date, plus showing that the date ended '5 minutes ago' and that the person is 'free to go' or has 'fulfilled their contractual obligations.'

In some embodiments, there may be a screen or a button or a feature that is enabled to show that the 'paid person' is now 'officially ending the recording of the date.' In some embodiments, recording may mean the process in which a, which may include but not be limited to (e.g., location, coordinates, time, location, date, etc.) is being recorded to show that the date was performed and the contractual obligations are being, which may include but not be limited to (e.g., met, or could be met, etc.) In some embodiments, the, which may include but not be limited to (e.g., screen, hologram, user interface, viewing display, user interface, etc.) the may show the, which may include but not be limited to (e.g., current time, the date time, and information regarding whether or not the date has ended, how much time left is on the date, if the date obligations have been met, etc.) In some embodiments, the feature to show that the 'paid person' may now, which may include but not be limited to (e.g., automatically agree, manually agree, accept, conclude, view, agree, etc.) with the, which may include but not be limited to (e.g., computer system the platform system also agreeing that the date has now ended, etc.) In some embodiments, then user interface may show a screen that the, which may include but not be limited to (e.g., 'date has now ended, user interface may show how long the date was in comparison to what the date was booked for, etc.) In some embodiments, there may be no, which may include but not be limited to (e.g., repercussions, options, care, alternative routes, penalties, etc.) if the date may not, which may include but not be limited to (e.g., agree with, seem to match to, compare to, collide with match up to what the date was supposed to be, which may include but not be limited to [special business name, specific date type, specific location], etc.)

In some embodiments, there may be, which may include but not be limited to (e.g., an AI, human, robot, bot, 3rd party, entity, computer system, AI system, or machine learning, or robotic version for a user of any type to type in a 'match suggestion' or a 'discover suggestion' or a help suggestion, etc.) In some embodiments, there may be a way to 'type in' or manual input of information, which may include but not be limited to (e.g., it's a description, a look, a type of photo, anything to find, discover, view, see users or suggestions, etc.) In some embodiments, there may be different ways to: (e.g., sort through content or see content or view content, etc.), which may include but not be limited to (e.g., swiping, tapping, viewing shapes, viewing profiles, viewing content, viewing promo photos, viewing videos, messages, add to list, messaging, organization, organizing, booking virtual, booking in person, viewing the calendar, etc.)

In some embodiments, the entire review may be there to, which may include but not be limited to (e.g., show what is being recorded or what has been recorded for the date data, etc.) In some embodiments, there may be a, which may include but not be limited to (e.g., countdown clock or a time estimated clock, or timing tracker, timing data, schedule data, scheduling data, timing methods, etc.) in which may include but not limited to, the: (e.g., 'paid person,' person receiving payment, user, person, etc.) is getting payment disbursed from the, which may include but not be limited to (e.g., trust account, platform, bank, account, area, holding, etc.) that may be holding the, which may include but not be limited to (e.g., cleared money, asset, money, transferred payment, payment, etc.) that the 'paying person' may have, which may include but not be limited to, which may include but not be limited to (e.g., put up, paid, sent, cleared, etc.) for the, which may include but not be limited to (e.g., date, connection, time, etc.) In some embodiments, the 'paid person' may be, which may include but not be limited to (e.g., notified, informed, etc.) when the payment has, which may include but not be limited to (e.g., disbursed, been transferring, is being received, is now in their account, sent to them, etc.) and may now be, which may include but not be limited to, which may include but not be limited to (e.g., pending in their account, there, available, almost available, succeeded, etc.) In some embodiments, there may be an option for the 'paid person' to which may include but not be limited to (e.g., manually or automatically, etc.) answer a question such as but not limited to (e.g., 'Do you want us to tell him to book, schedule, inquire about, inquire about, inquire regarding, secure, create connection to, hold, pay for, create business relationship with, use transmittables to secure or book, schedule, inquire about, etc.) another date with you? ", or any solution, or any problem, etc.) In some embodiments, there may be, but not limited to, a couple of options, including but not limited to (e.g., 'yes or no," etc.) In some embodiments, the user interface may take which may include but is not limited to, the: (e.g., 'paid person' or user, or entity, or 3rd party or person, etc.) to another screen and if it's a (e.g., 'yes' for example, etc.) then the other party may be notified that, which may include but not be limited to (e.g., 'that person likes them' etc.) and they may be encouraged and, which may include but not be limited to (e.g., confirmed, confirm, agree to, say yes to, etc.) to want that person to: (e.g., book another date with them soon, etc.) after the date has, which may include but not be limited to (e.g., officially ended or the agreements have been met for the previous or current one, etc.) In some embodiments, the 'paid person' may choose that they (e.g., don't want to go out with this person again, etc.). Then they may have an option to (e.g., 'block' this person, get more information regarding how that person may or may contact that person again, etc.) such as the messaging system, and they may be charged (e.g., 50S, for example, to message that person again, etc.)

Figure 82:
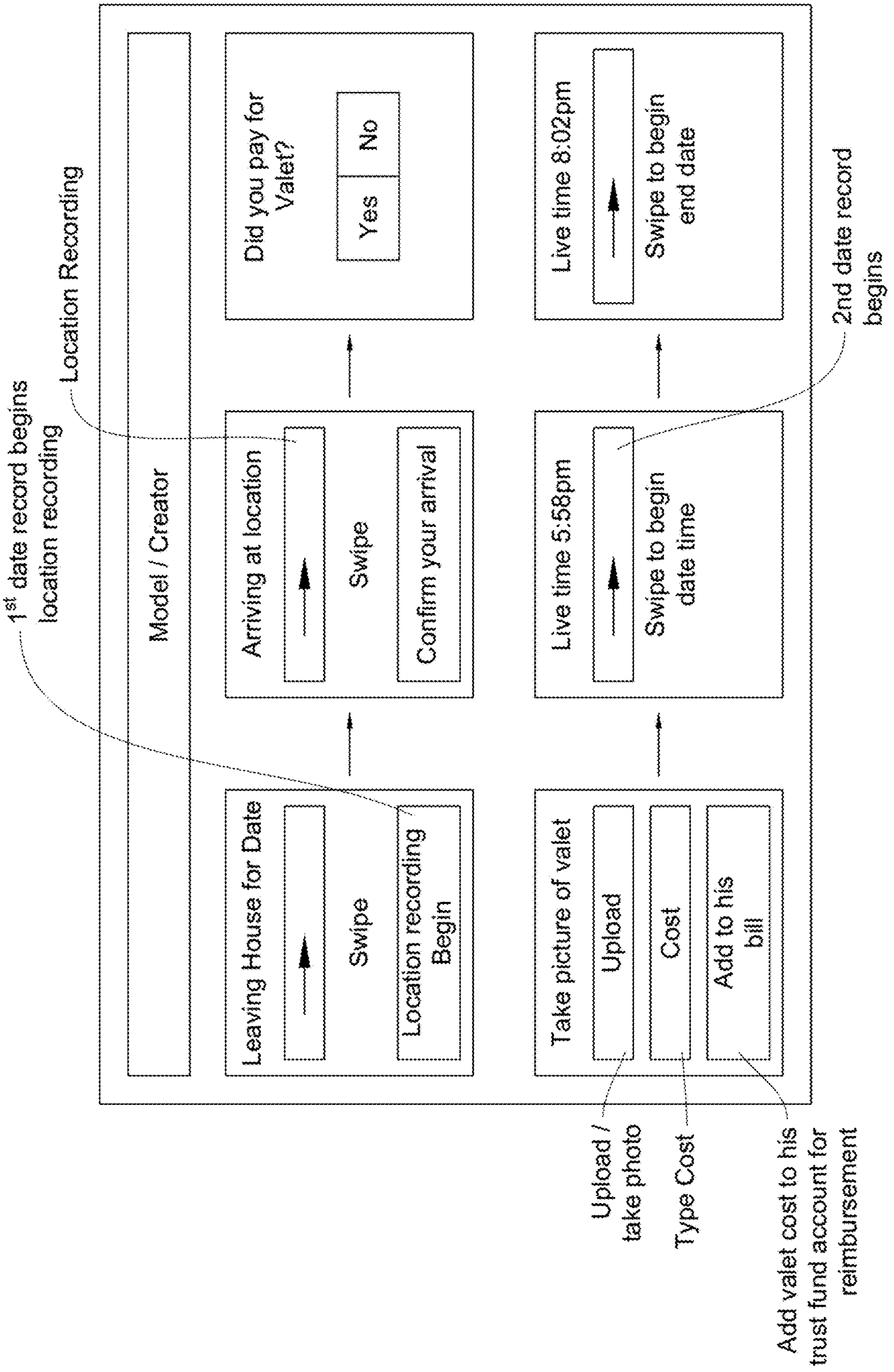

FIG. 82: In some embodiments, there may be a (e.g., model/creator screen that may show a potential process to begin date or check-in, check-out, time stamp, time record, time and data record, location, time and data record, etc.) In some embodiments, the date recording which may include but not limited to (e.g., location, time, process etc.) may begin which may include but not limited to (e.g., once she starts getting ready for date, prior to date, during getting ready, during shower, during makeup, during hair, during driving, travel, route, once ready, etc.) which may include but not limited to (e.g., shower, makeup, hair, styling, etc.) In some embodiments, the date recording which may include but not limited to (e.g., location, time, process) which may begin at any time, which may include but not be limited to (e.g., once she is ready, is leaving the house, beginning to drive to location, arrives at location, checks in at location, taps/checks/approves/swipes 'begin date or check-in, check-out, time stamp, time record, time and data record, location, time and data record,' etc.) In some embodiments, which may include but not be limited to (e.g., questions or suggestions, or items etc.) to add to paying person's, which may include but not be limited to (e.g., bill, receipt, invoice, total, partial, breakdown, invoice, payment bill, etc.) may include but not limited to (e.g., paying for valet, refund for valet, refund for gas money, refund for driving, travel, route, shown on odometer, driving, travel, route, fee, no taxi-service fee, not able to provide me with a taxi service fee, excessive valet fee, parking and walking fee, security fee, security guard fee, smelling bad fee, allergic reaction fee, parking payments, waters, lotions, ruining dress, spilling on dress, ripping dress, getting sick, feeling nauseous, person being rude to person, being verbally harassed, feeling uncomfortable, overtime fee, wasting my time fee, I need to go to therapy now fee, unblock fee, annoying me fee, go away fee, get my phone number fee, answer your questions fee, talking too much fee, etc.) In some embodiments, proof, evidence, suggestions, reasons why, payment requests, costs, suggestions, requests, asking for, suggesting, shown as advertisement, formal request, etc.) may be uploaded or shown or taken a picture of or recoded in order to get reimbursed or to add to other user's bill or other user's payment for the evening or other user's date price, or what the person owes the other person for extra items such as valet, parking, gas money, tire blowing up, money spent on dress, money spent on makeup, etc.) In some embodiments, these suggestions may be before or after date or payment is made, these may be (e.g., ways to pay valet directly through 3rd party integration, 3rd party suggestions, extra requests or extra suggestions for payments to be made, requests for payment, requests for money, etc.)

In some embodiments, the date recording, which may include but not be limited to (e.g., location, time, process), may begin once she gets into a, which may include but not be limited to (e.g., pre-paid ride-share service, taxi, etc.) In some embodiments, the date recording which may include but not limited to which may include but not limited to (e.g., location, time, process, date beginning, date recording, etc.), may begin once she which may have but not limited to (e.g., arrives at the location of the contractual date agreement, once she starts getting ready for a date, before date, during getting ready, during the shower, during makeup, during hair, during driving, travel, route, once ready, before she starts getting ready, before she leaves the house, once she leaves, after arrival, upon arrival, etc.) and/or which may include but not limited to (e.g., 'checks in' or 'begins the time for date,' etc.) In some embodiments, the date recording, which may include but not be limited to (e.g., location, time, process), may start from a, which may include but not be limited to (e.g., swipe, method, automatic, tap, manual input, etc.) In some embodiments, the date recording, which may include but not limited to (e.g., location, time, process) may begin once she makes a, which may include but not limited to (e.g., specific movement recorded by her, or any movement, or any gesture, or any time, or any place, or any user interface, or any day, or any gesture, or anything, etc.) which may include but not limited to (e.g., herself, user, person, location, location check-in, something on phone, app, platform, etc.) and may not have to be, which may include but not limited to (e.g., manually entered, automatically entered, touched, confirmed, etc.)

Some embodiments may include but not be limited to (e.g., location, staff, persons helping, assistant, meal, total, etc.) may be chosen. In some embodiments, which may include but not be limited to (e.g., public, user, person, anyone, etc.), may choose to have but not limited to (e.g., time, location, wait staff, workers, persons, staff members, categories, choose meal, choose price, choose discounts, choose valet information, choose valet, choose pickup time, get ride, get driving, travel, route, service, checkout total, view (e.g., breakdown, itemized, receipt, invoice, total, partial, breakdown, bill, summary of, total, etc.) etc.) In some embodiments, choosing meals, items, or activities may allow the food to be ready upon arrival, or have options to have food ready at a specific time, or have any activity prepared or pre-planned, pre-made, or shown at the exact time of arrival, etc.) In some embodiments (e.g., you may, user, person, entity, 3rd party, robot, artificial intelligence, etc.) may also choose your, which may include but is not limited to (e.g., section, your seat, your server, staff, your driver, dessert, gift cards, times, delivery, flower delivery, time, etc.) In some embodiments, there may be FIG. 144 or any interface in which the, which may include but not limited to (e.g., 'creator, model, etc.) says that she wants to, which may include but not limited to (e.g., 'go out with the paid person again on another date' etc.) In some embodiments, the process may continue automatically where the, which may include but not limited to (e.g., 'paying person' etc.) may, which may include but not limited to (e.g., immediately get a notification, a screen notification, information, screen info, etc.) expressing that, which may include but not limited to (e.g., 'the person you just went out on a date with wants to go out with you again, and/or show options for immediate booking with that person, etc.)

In some embodiments, there may be a screen that may show the, for example (e.g., 'creator or model, entity, 3rd party, user, 's' etc.) preferences such as which may include but not limited to (e.g., 'Emily likes to go out on Fridays from 5-7 pm for dinner, she likes seafood, or she likes Steak Restaurants, etc.) In some embodiments, the, which may include but not limited to (e.g., paying person may be informed of her preferences, the person that is paying, dater, user, person, etc.) for example, which may be including but not limited to which may include but not limited to (e.g., when he sees the calendar option to book, schedule, inquire about, inquire about, inquire regarding, secure, create a connection to, hold, pay for, create a business relationship with, use transmittables to secure or book, schedule, inquire about, etc.) her again, he knows what she likes. For example, he may not have to ask her or message or pay to message to ask her questions unless he wants to pay to ask her questions through the platform, etc.) In some embodiments, there may be, which may include but not limited to (e.g., multiple options, options, selections, etc.) on a screen/user interface that may show the, which may include but not limited to (e.g., profile photo of the person, the 'paying person,' user, etc.) just went out with and may show that creator or model, entity, 3rd party, user, 's preferences, which may include but not limited to (e.g., their live calendar, timing method data, timing data method, timing process data, their best profile photos, and options to 'book now' based on availability, etc.) In some embodiments, this may be the 'Potential Dater's View.' In some embodiments, an option may be shown, including but not limited to (e.g., before, during, after, etc.) a date may be completed to set up another date. In some embodiments, there may be a computing operation or an AI suggestion that takes into consideration, which may include but not be limited to (e.g., data from date' such as 'the day of the date, the time of the date, the location of the date, and any other options related to the date involving weather, location, etc.)

In some embodiments, User interface may show multiple options such as, which may include but not be limited to (e.g., same time, same place, same day' or 'same time, different place, same day' or same day different time, different place' or try the weekend or weekday 'same time, different place, etc.) In some embodiments, user interface may show AI generated options or computing operation options such as, which may include but not be limited to (e.g., this restaurant is cheaper, or 'this one is closer to you, etc.) In some embodiments, this information may be pulled or used by collecting data about date, or about the person's profile to ensure they are getting the best and easiest way to date using AI or computing operation or using data. In some embodiments, there may be a process where a 'real time' updated 'time' is shown to the 'person getting paid' and user interface may turn 'red' or another color that may show that the date has now 'ended.' Ended may refer to going past the 'time paid for by the person paying.' In some embodiments, there may be a screen that may show the current time on the date, plus showing that the date ended '5 minutes ago' and that the person is 'free to go' or has 'fulfilled their contractual obligations.' In some embodiments, there may be a screen or a button or a feature that is enabled to show that the 'paid person' is now 'officially ending the recording of the date.' In some embodiments, recording may mean the process in which a, which may include but not be limited to (e.g., location, coordinates, time, location, date, etc.) is being recorded to show that the date was performed and the contractual obligations are being, which may include but not be limited to (e.g., met, or could be met, etc.) In some embodiments, the, which may include but not be limited to (e.g., screen, hologram, user interface, viewing display, user interface, etc.) the may show the, which may include but not be limited to (e.g., current time, the date time, and information regarding whether or not the date has ended, how much time left is on the date, if the date obligations have been met, etc.)

In some embodiments, the feature to show that the 'paid person' may now, which may include but not be limited to (e.g., automatically agree, manually agree, accept, conclude, view, agree, etc.) with the, which may include but not be limited to (e.g., computer system the platform system also agreeing that the date has now ended, etc.) In some embodiments, then user interface may show a screen that the, which may include but not be limited to (e.g., 'date has now ended, user interface may show how long the date was in comparison to what the date was booked for, etc.) In some embodiments, there may be no, which may include but not be limited to (e.g., repercussions, options, care, alternative routes, penalties, etc.) if the date may not, which may include but not be limited to (e.g., agree with, seem to match to, compare to, collide with match up to what the date was supposed to be, which may include but not be limited to [special business name, specific date type, specific location], etc.) In some embodiments, the entire review may be there to just, which may include but not be limited to (e.g., show what is being recorded or what has been recorded for the date data, etc.) In some embodiments, there may be a, which may include but not be limited to (e.g., countdown clock or a time estimated clock, or timing tracker, or timing data, schedule data, scheduling data, timing methods, etc.) in which may include but not limited to, the: (e.g., 'paid person,' person receiving payment, user, person, etc.) is getting payment disbursed from the, which may include but not be limited to (e.g., trust account, platform, bank, account, area, holding, etc.) that may be holding the, which may include but not be limited to (e.g., cleared money, asset, money, transferred payment, payment, etc.) that the 'paying person' may have, which may include but not be limited to, which may include but not be limited to (e.g., put up, paid, sent, cleared, etc.) for the, which may include but not be limited to (e.g., date, connection, time, etc.)

In some embodiments, the 'paid person' may be, which may include but not be limited to (e.g., notified, informed, etc.) when the payment has, which may include but not be limited to (e.g., disbursed, been transferring, is being received, is now in their account, sent to them, etc.) and may now be, which may include but not be limited to, which may include but not be limited to (e.g., pending in their account, there, available, almost available, succeeded, etc.) In some embodiments, there may be an option for the 'paid person' to which may include but not be limited to (e.g., manually or automatically, etc.) answer a question such as but not limited to (e.g., 'Do you want us to tell him to book, schedule, inquire about, inquire about, inquire regarding, secure, create connection to, hold, pay for, create business relationship with, use transmittables to secure or book, schedule, inquire about, etc.) another date with you?", or any solution, or any problem, etc.)

In some embodiments, there may be, but not limited to, a couple of options, including but not limited to (e.g., 'yes or no," etc.) In some embodiments, the user interface may take, including but not limited to, the: (e.g., 'paid person' or user, or entity, or 3rd party or person, etc.) to another screen. Suppose it's a, which may include but not be limited to (e.g., 'yes' for example, etc.). In that case, the other party may be notified that, which may include but not be limited to (e.g., 'that person likes them' etc.), and they may be encouraged and, which may include but not be limited to (e.g., confirmed, confirm, agree to, say yes to, etc.) to want that person to: (e.g., book another date with them soon, etc.) after the date has, which may include but not be limited to (e.g., officially ended or the agreements have been met for the previous or current one, etc.) In some embodiments, the 'paid person' may choose that they (e.g., don't want to go out with this person again, etc.). Then they may have an option to (e.g., 'block' this person, get more information regarding how that person may or may contact that person again, etc.) such as the messaging system, and they may be charged (e.g., 50$, for example, to message that person again, etc.)

Figure 83:
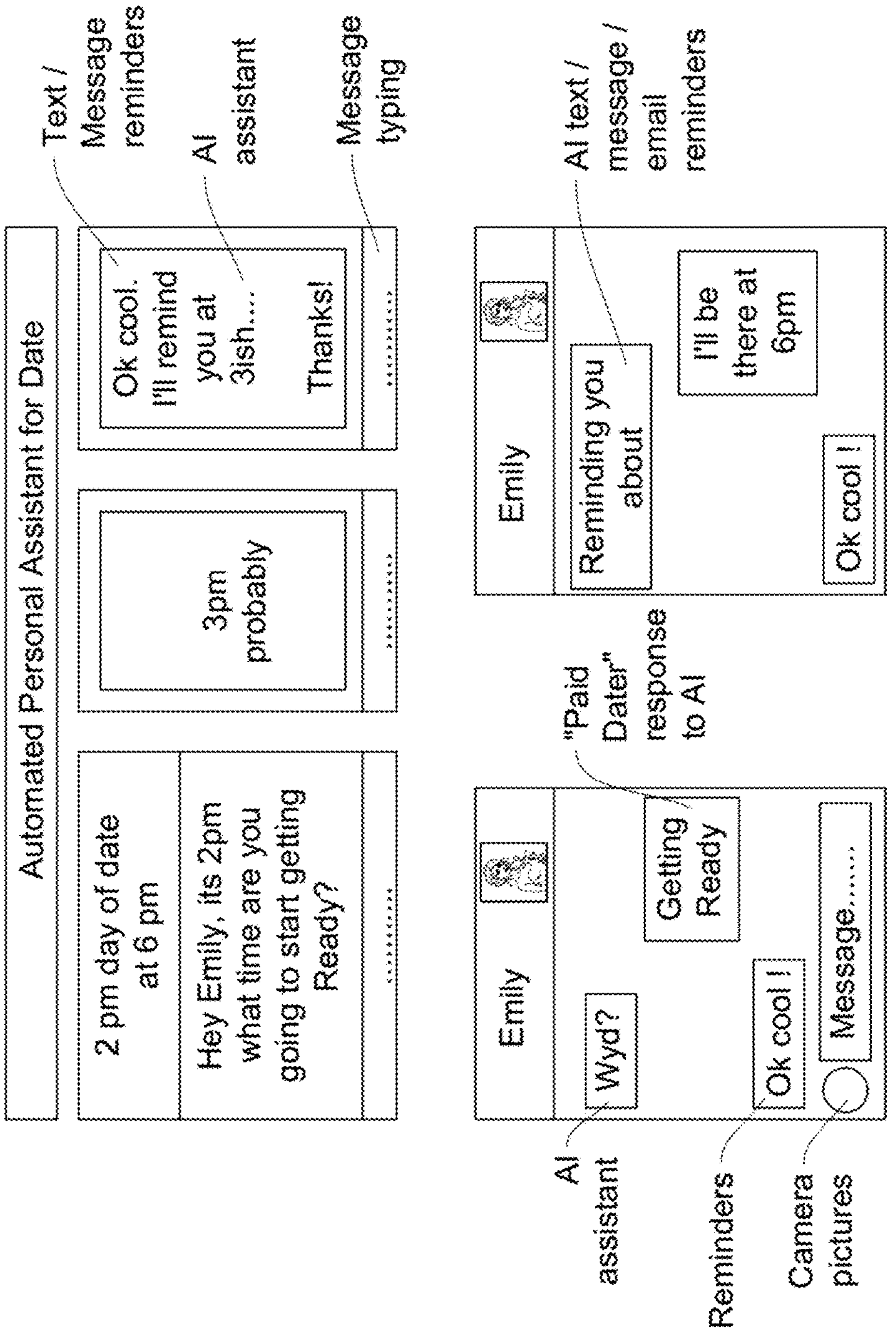

FIG. 83: In some embodiments, the, which may include but not limited to (e.g., method for the date process, process, user interface, suggestions, help desk, AI help desk, AI assistance, AI answering questions for date or for meeting or generally answering questions, etc.) may be similar to, which may include but not limited to (e.g., 'texting,' chatting, messaging, voice message, video messages, voice prompts, assistance, a human assistant, etc.) which may be for example, rather than having which may include but not limited to (e.g., screens, user interfaces, manually talking, calling a help line, calling a help desk, calling someone, asking questions through email, etc.) but instead having a conversation with an, which may include but not limited to (e.g., automated system, system, computer, robotics like a personal assistant, robotics, pre-trained system, pre-answered questions, etc.) In some embodiments, the process to, which may include but not limited to (e.g., confirm date or information leading up to the date etc.) may be done through an automated system such as an which may include but not limited to (e.g., AI assistant, 3rd party integrated, pre-loaded or pre-trained model, pre-trained AI, understanding AI, AI that knows all about rules and regulations, 3rd party assistant, assistant, person, user, machine learning, etc.) In some embodiments, which may include but not be limited to (e.g., reminders, questions, solutions, etc.) may be able to asked through, which may include but not limited to (e.g., humans, users, persons, AI services, etc.) whether, for example, (e.g., paid for or included etc.) or on which may include but not limited to, the: (e.g., platform, user interface, etc.) In some embodiments, an which may include but not limited to (e.g., AI assistant, reminder, notification, etc.) may be, which may include but not limited to (e.g., texted, called, voicemail messages, emails, etc.) that may, which may include but not limited to (e.g., remind, prepare paying person, or paying person, or any user or person paid person for date etc.) In some embodiments, the AI assistant may, which may include but not limited to (e.g., record information given by the 'paid person,' record information, store information, get 3rd parry data, get location data, get date data, etc.) and/or store it in their data file for the, which may include but not limited to (e.g., 'date log, management area,' or 'date information' etc.) In some embodiments, which may include but not limited to, the: (e.g., AI, machine learning, user, person, robotics, machine data, etc.) which may include but not limited to (e.g., may learn the person or learn their method of getting ready, etc.) and use machine learning to assist (e.g., models, creators, users, persons, etc.) better moving forward to predict (e.g., behavior, needs, suggestions, date log data, routes, information, needs etc.)

In some embodiments, the questions from, which may include but not be limited to (e.g., 'bidder, person, user, paying person, etc.), may be sent through a filter and AI and no, which may include but not be limited to (e.g., inappropriate language or words may be used, no code words, no sexual services questions may be asked, etc.) In some embodiments, this may be asking questions such as, which may include but not be limited to (e.g., 'What type of suit should I wear?" "How should I cut my hair?" "Is there any type of cologne you prefer?" 'Should I wear a Rolex, or do you prefer a less flashy guy?" "What type of dessert do you like? "Should I wear blue or black?" 'I'm looking forward to our date etc.) In some embodiments, there may be a, which may include but not be limited to (e.g., phone number block, personal information block, contact outside platform block, etc.) on, which may include but not be limited to (e.g., messages, user interface, profile, comments, live comments, in person comments, options to book, schedule, inquire about, inquire about, inquire regarding, secure, create connection to, hold, pay for, create business relationship with, use transmittables to secure or book, schedule, ask about, etc.) special requests, etc.)

Figure 84:
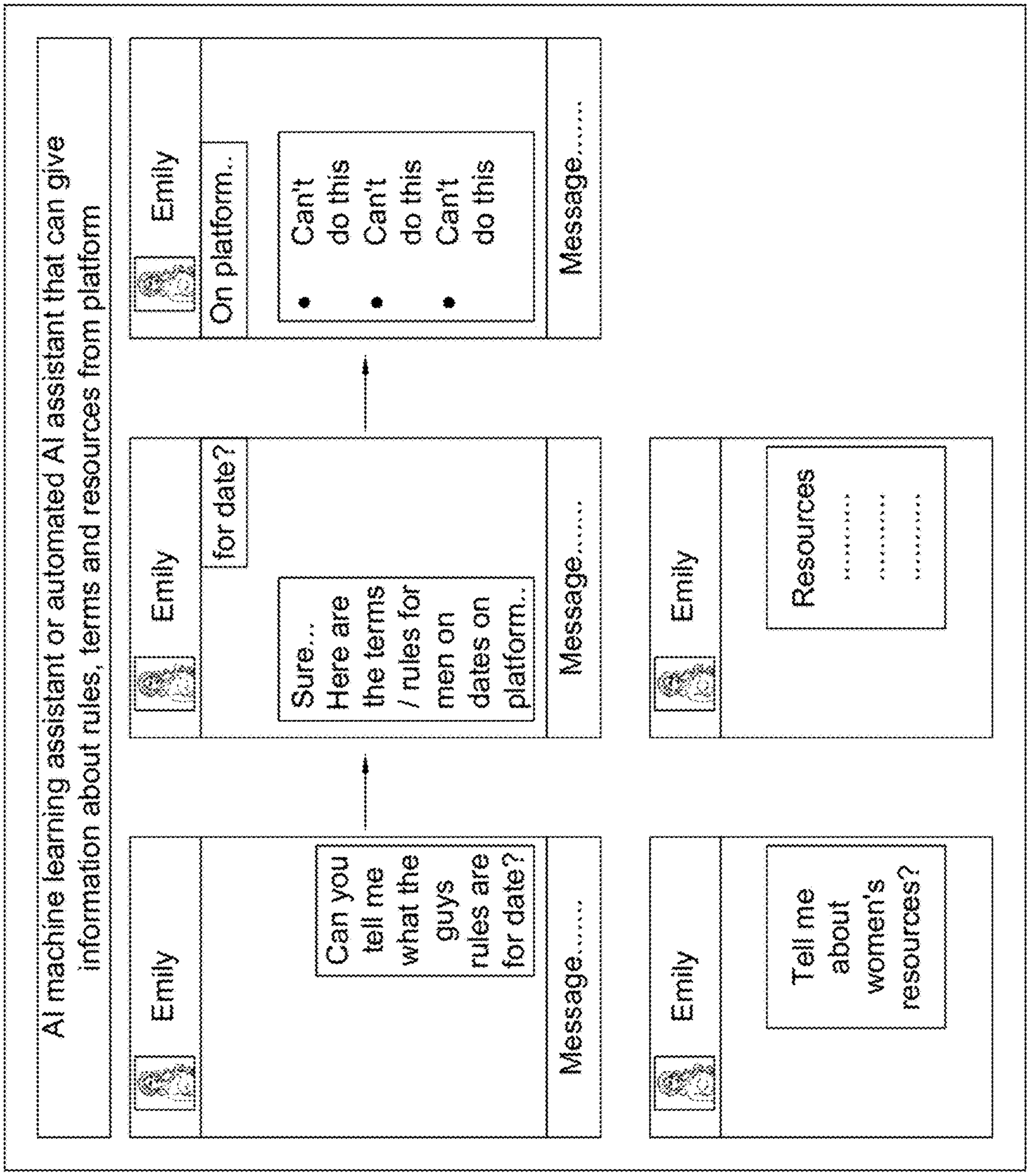

FIG. 84: In some embodiments, the AI may use which may include but not limited to (e.g., AI, humans, machine learning, computers, etc.) to, which may include but not limited to (e.g., learn, give information, receive information, giving trained information, reading rules or regulations, reading terms of site, explaining terms to user, explaining and answering questions based on uploaded data or uploaded or pre-trained models, etc.) based on the, which may include but not limited to (e.g., inputted data, rules, outside rules, outside laws, governing laws, rules and regulations, terms and conditions of the platform, and legal information regarding the platform, information regarding 3rd parties, advertisers, advertisements, businesses, 3rd humans, outside humans, entities, etc.) to inform or answer questions about which may include but not limited to (e.g., users, paid persons, public, users, people, etc.) about which may have but not limited to (e.g., information, regulations, laws, rules, processes, etc.)

In some embodiments, the AI may use machine learning to learn any information such as which may include but not limited to (e.g., what time they usually get ready by, how long it takes them to drive to the location, if they are usually late, and assist them moving forward, etc.) In some embodiments, the AI assistant may have learned, which may include but not be limited to (e.g., all, available, inputted, knowledge, information, etc.) and may have, which may include but not be limited to (e.g., updated regulations, updated terms and conditions of the platform etc.) In some embodiments, AI may have also, which may include but not be limited to (e.g., additionally, or manually, or automatically informed etc.) on any information regarding and/or transmitting it to any, which may include but not be limited to (e.g., party, person, entity, interface, etc.) which may include but not be limited to (e.g., user, person, creator or model, entity, 3rd party, user, 3rd party or any person that may be use this AI messaging system or text AI system or email AI system, or platform AI system, etc.) In some embodiments, this may allow anyone to ask the potentially, which may include but not be limited to (e.g., automatically, manually, AI-created, etc.) which may include but not limited to (e.g., laws, regulations, terms, rules, updated terms, conditions, messaging or receiving any question regarding terms, conditions, contracts, etc.) In some embodiments, the 'paying person' may be able to do this as well and learn anything which may include but not limited to (e.g., how to act on the date, what is expected, what is not acceptable, what is considered a crime, what is considered 'appropriate, and not appropriate, etc.) In some embodiments, which may include but not limited to (e.g., models/creators, users etc.) may ask the, which may include but not limited to (e.g., AI, machine learning, robot, or the knowledge information center or messaging center etc.) to explain in, which may include but not limited to (e.g., simple terms, explain a specific way, understand, explain, show, display, etc.) like AI robotics to explain which may include but not limited to (e.g., for example, explain this to me like a 5th grader etc.) the, which may include but not limited to (e.g., terms, rules, terms, conditions, laws, or resources such as mental health resources, marketing resources, how to videos, etc, etc.)

In some embodiments, the, which may include but not limited to (e.g., a method for the date process, process, user interface, etc.) may be similar to, which may include but not limited to (e.g., 'texting,' chatting, messaging, voice message, video messages, etc.) which may be rather than having which may include but not limited to (e.g., screens, user interfaces, manually talking, etc.) but having a conversation with an which may include but not limited to (e.g., automated system, system, computer, robotics like a personal assistant, robotics, pre-trained system, pre-answered questions, etc.) In some embodiments, the process for example, which may include but not limited to (e.g., confirming the date or information leading up to the date, etc.), may be done through an automated system such as which may include but not limited (e.g., AI assistant, 3rd party assistant, assistant, person, user, machine learning, etc.) In some embodiments, which may include but not be limited to (e.g., reminders, questions, solutions, etc.) may be able to ask through, which may include but not limited to (e.g., humans, users, persons, AI services, etc.) whether (e.g., paid for or included, etc.) or on which may include but not limited to, the: (e.g., platform, user interface, etc.)

In some embodiments, an which may include but not limited to (e.g., AI assistant, reminder, notification, etc.) may be, which may include but not limited to (e.g., texts, calls, voicemail messages, emails, etc.) that may, which may include but not limited to (e.g., remind, prepare to pay person, or paying person, or any user or person paid person for a date, etc.) In some embodiments, the AI assistant may, may include but is not limited to (e.g., record information given by the 'paid person,' record information, store information, get 3rd parry data, get location data, get date data, etc.) and/or store it in their data file for the, which may include but not limited to (e.g., 'date log, management area,' or 'date information' etc.) In some embodiments, which may include but not limited to, the: (e.g., AI, machine learning, user, person, robotics, machine data, etc.) which may include but not limited to (e.g., may learn the person or learn their method of getting ready, etc.) and use machine learning to assist, which may include but not be limited to (e.g., models, creators, users, persons, etc.) In some embodiments, better moving forward to predict, which may include but not be limited to (e.g., behavior, needs, suggestions, date log data, routes, information, needs, etc.)

The questions from, which may include but not be limited to (e.g., 'bidder, person, user, paying person, etc.), may be sent through a filter and AI, and no (e.g., inappropriate language or words may be used, no code words, no sexual services questions may be asked, etc.) This may be to ask questions like, but not limited to (e.g., 'What type of suit should I wear?" "How should I cut my hair?" "Is there any type of cologne you prefer?" 'Should I wear a Rolex, or do you prefer a less flashy guy?" "What type of dessert do you like? "Should I wear blue or black?" 'I'm looking forward to our date etc.) In some embodiments, there may be a, which may include but not be limited to (e.g., phone number block, personal information block, contact outside platform block, etc.) on, which may include but not be limited to (e.g., messages, user interface, profile, comments, live comments, in person comments, options to book, schedule, inquire about, inquire about, inquire regarding, secure, create connection to, hold, pay for, create business relationship with, use transmittables to secure or book, schedule, inquire about, special requests, etc.)

Figure 85:
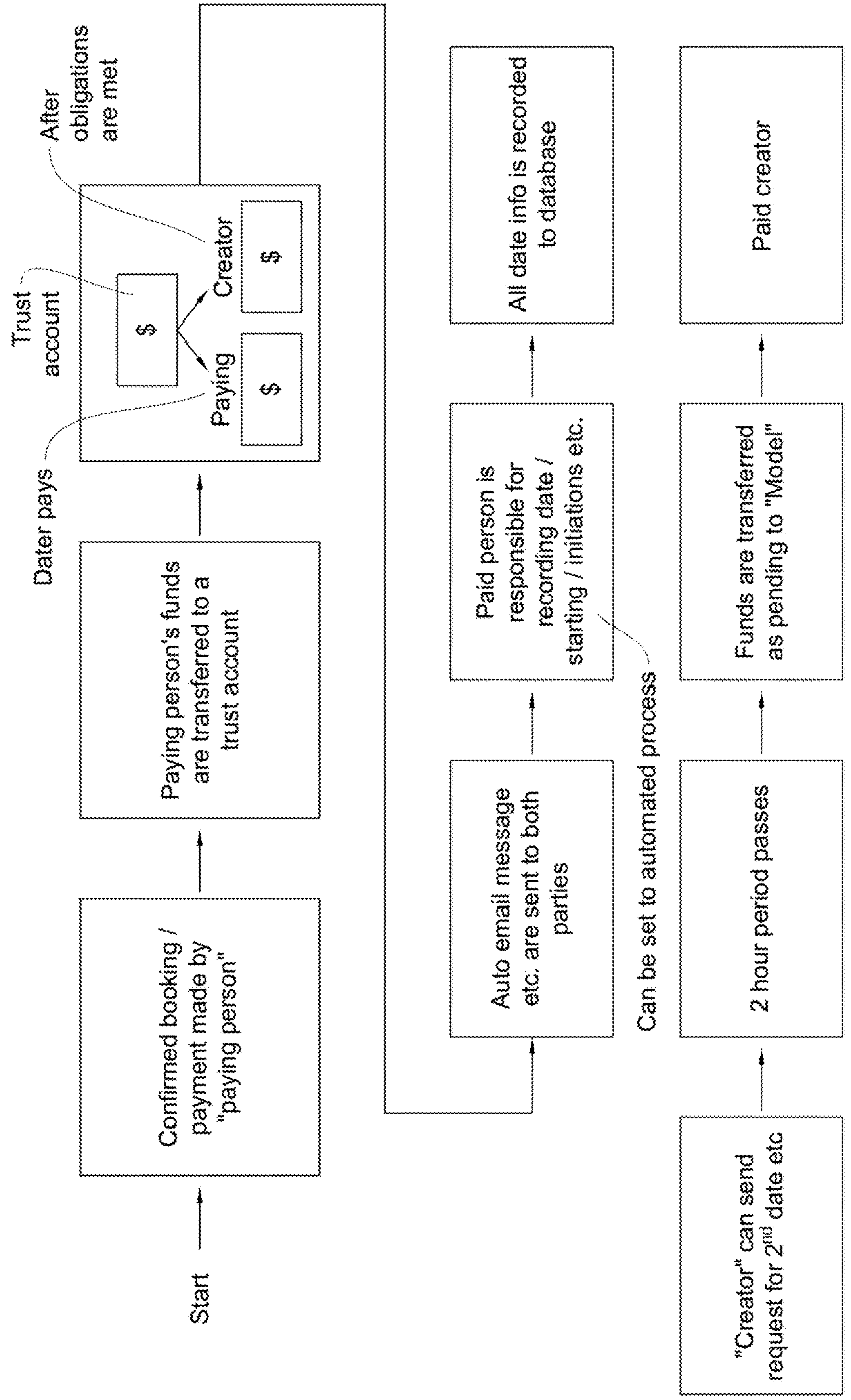

FIG. 85: In some embodiments, the process may or may not be as follows: user interface or process which may include but not limited to (1) which may include but not limited to (e.g., confirmed booking, or payment, confirmed payment and booking, confirmed or agreed upon contractual agreements or verbal agreements, or securing date such as time, location, time or location, day, etc.) may made by person paying or by anyone making payment, (2) paying persons funds are transferred to a, which may include but not limited to (e.g., trust account, separate account, another account, holding account, etc.) (3) which may include but not limited to (e.g., creator or model, entity, 3rd party, user, or paid person, or working person, or person receiving payment etc.) may not have access to these which may include but not limited to (e.g., funds, payout, transfer, assets, exchangeable, etc.) and they may not be, which may include but not limited to (e.g., disbursed, transferred, secured, sent to bank, sent to payout, pending, available, etc.) until which may include but not limited to (e.g., after all contractual obligations in agreement are met or seemingly are met or partially met or implied to have been met, or before, or during, or partial agreements have been met, or platform's agreements have been met, or verbal agreements have been met, or contractual obligations seemingly have been met, etc.) (4) which may include but not limited to (e.g., manual messages, auto-messages, auto-notifications, auto-email messages may be sent to, which may include but not limited to (e.g., one or both parties, or any party, etc.) upon confirmation of which may include but not limited to (e.g., payment from booking, agreement from booking, agreement is met, contract is created, contract agreement is confirmed, verbal agreement is confirmed, time or location or day or time period is set etc.) (5) which may include but not limited to (e.g., paid person, or dater, or user, or person being compensated, etc.) may be responsible for, which may include but not limited to (e.g., either manually or automatically setting recording of date information automatically by platform settings, clicking begin, starting date, starting recording, having their location on, allow device to automatically record, allowing device to manually record, allowing data to be tracked, allowing data to be collected or recorded, reporting proof, collecting proof of date, collecting information or evidence etc.) (5) which may include but not limited to (e.g., all date information, any data information, any connection information, any data regarding date or time or location or person or device or 3rd party, etc.) may be collected which may show that, which may include but not limited to (e.g., contractual obligations may have been met, obligations have been met, partial obligations have been met, general obligation have been met, agreement has been performed, etc.) may be, which may include but not be limited to (e.g., recorded to database, collected to device, collected to data center, sent to data center, sent to platform, collected by 3rd party or device, etc.) whether, which may include but not limited to (e.g., manually, or automatically, or through auto data recording, etc.) (6) creator or model, entity, 3rd party, user, or person paid may be, which may include but not limited to (e.g., manually or automatically or somehow notified, or sent etc.) a, which may include but not limited to (e.g., date review, a review, their opinion, a rating system, a questionnaire, a collection system, etc.) which may automatically request the other party to, which may include but not limited to (e.g., book another date, leave a review, give a tip, send a tip, give a rating, book again, update calendar, show up on calendar, suggest another date, etc.) (7) a potential which may include but not limited to (e.g., time period, day, time, minute, etc.) passes which may include but not limited to (8) funds may be, which may include but not be limited to (e.g., dispersed, received, transferred, accepted, sent to party or user, etc.) and may be, which may include but not limited to (e.g., automatically available or pending availability, or partially available, or through a 3rd party, or credit, or debited, etc.) to the, which may include but not limited to (e.g., 'model' etc.) (9) which may include but not limited to (e.g., user, creator, model, or person etc.) which may include but not limited to (e.g., accepting money, sent money, transferred money, transferred assets, receiving transmittables, being paid may be paid, etc.) may be, which may include but not limited to (e.g., confirmed, competed, transferred, accepted, finalized, etc.)

General processing: In some embodiments, the, which may include but not be limited to (e.g., calendar or the timing method, or 'booking process, etc.) may, which may include but not be limited to (e.g., automatically, manually, etc.) transfer to a, which may include but not be limited to (e.g., 3rd party to book, schedule, inquire about, inquire about, inquire regarding, secure, create connection to, hold, pay for, create business relationship with, use transmittables to secure or book, schedule, inquire about, etc.) or outside entity, or other outside process, or user interface may manually input data, or user interface may have a list of verified locations or verified approved locations to choose from etc.) In some embodiments, locations may be, which may include but not be limited to (e.g., manually approved, or generally approved, or each one approved or chosen etc.) based on their, which may include but not be limited to (e.g., 'type of business' or type or sort of business etc.) for example a, which may include but not be limited to (e.g., 'restaurant location that is verified' or any business within a location, or within a distance, or within a state, or local business, or in a time period duration, check-in, check-out, time stamp, time record, time and data record, location, time and data record, coordinate(s), or type of business, or sort of business, or public location etc.) may be, which may include but not be limited to (e.g., automatically approved, each one approved, each one chosen, chosen by platform, chosen by person, accepted, allowed, etc.) to be able to, which may include but not be limited to (e.g., book from, secure time, secure slot, secure activity, book or pay for date or time or connection or services or goods, gifts in exchange for date, send gifts or buy something from 'wishlist' or 'list' or 'listed item' in exchange for date or time or virtual date or in person date or in exchange to view calendar or schedule or time or be able to message or book date or send like or interact with, etc.) there may also be a, which may include but not be limited to (e.g., manual application of data, or a manual application of data, or way to insert data that may have to be approved, or platform approved, or other party approved, or confirmed by other person, or confirmed by saying person, or 3rd party approved or confirmed, etc.) that may have to be, which may include but not be limited to (e.g., approved, confirmed, agreed upon, verbal agreed upon, contractually agreed upon, etc.) which may include but not be limited to (e.g., prior, during, after, etc.) to allowing a, which may include but not be limited to (e.g., booking, agreement, confirmation, time period, secured slot, activity, date, time period, goods or services, etc.) In some embodiments, the, which may include but not be limited to (e.g., verified locations, or locations chosen by anyone, or businesses chosen, or businesses verified, or approved businesses or locations or times or parties, or activities, or 3rd party entities, or 3rd party bookings etc.) to, which may include but not be limited to (e.g., chose from locations, may be allowed, may be approved, may be chosen, may be booked, may be an approved location partner, may be partnering with locations, may be partnerships, approved locations, approved areas, approved activities, approved 3rd parties, advertisers, advertisements, businesses, agreed upon between two parties, agreed upon by one or more parties, etc.)

Figure 86:
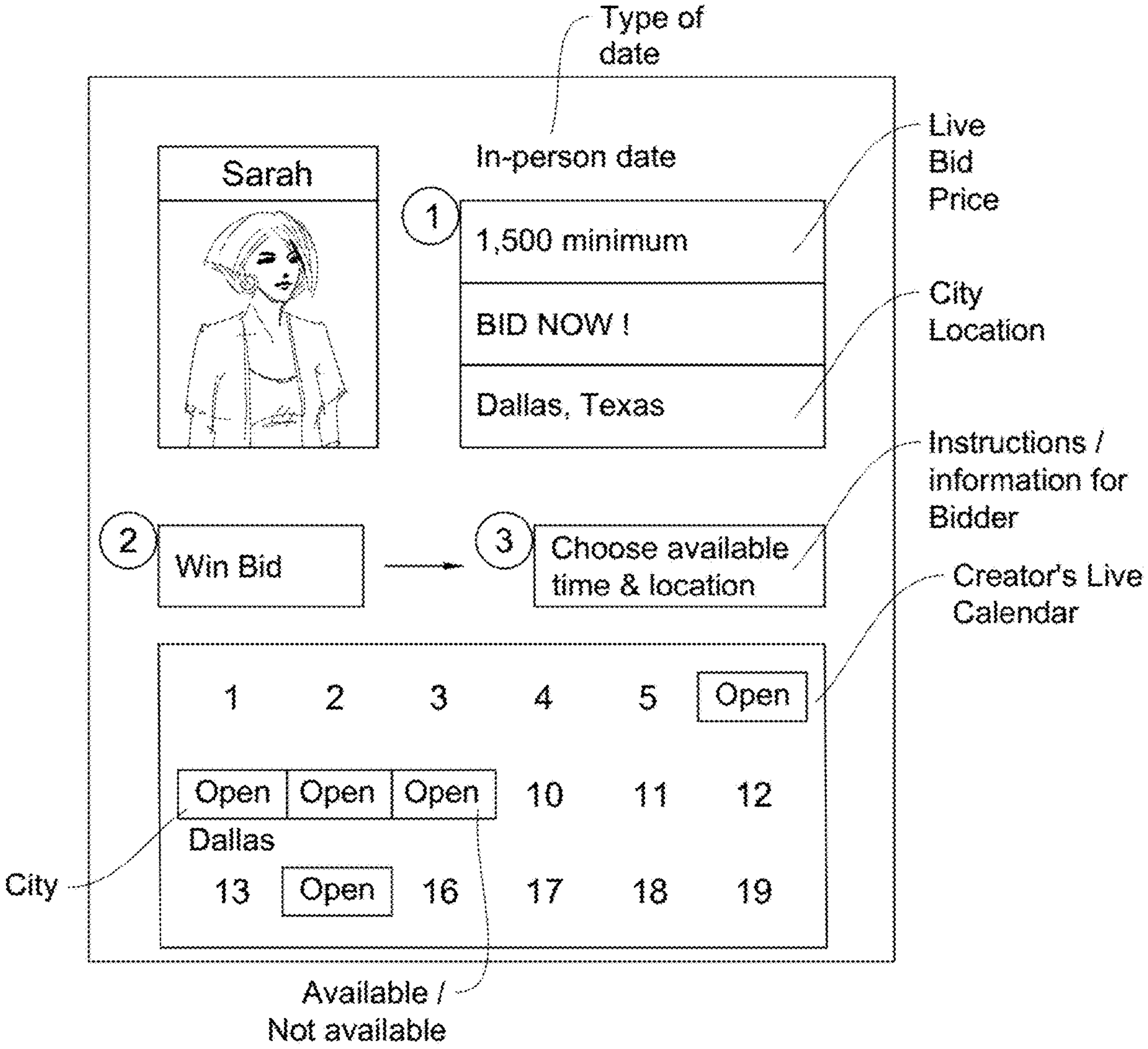

FIG. 86: In some embodiments, there may be a, which may include but is not limited to (e.g., live, current, non-live, pre-made, etc.) page or user interface. In some embodiments, which may include but is not limited to, the: (e.g., auction, paying, option, bidding, auction page or bidding, auction place, etc.) area in which any person in which may include but not limited to, the: (e.g., internet, Web3, robot, 3rd party, entity, public, public bidders, private bidders, registered bidders, subscribers, fans, people, etc.) may be able to, which may include but not be limited to (e.g., use transmittables, pay at that moment, may use funds from their account, pre-pay, send checks to pay off, pre-pay and pay later, pre-book and pay later, have payment schedule set up, may use their credit card, may use cash, may use any form of crypto, may use any form of an asset, etc.) to pay for a, which may include but not limited to (e.g., date, connection, period, virtual meeting, meet and greet, meeting, in-person date, activity together, etc.) which may include but not limited to (e.g., any exchangeable system, the title of their vehicle, cash transfer payments, asset currency, gold, silver, diamonds, etc.)

In some embodiments, there may be a, which may include but not limited to (e.g., pay for a live-in person date payment method, pay for any form of virtual entertainment payment method, pay for customized entertainment, entertainment, requested entertainment, entertainment, videos/pictures, pay for requested entertainment, pay for custom entertainment, pay for a live-virtual date payment method, pay for a travel date payment method, etc.) in which any which may include but not limited to (e.g., the person in public, public bidders, private bidders, registered bidders, subscribers, fans, people, etc.) may be, which may include but not limited to (e.g., put it on credit, use funds, pay at that moment, may use funds from their account, may use their credit card, may use cash, may use any form of crypto, may use any form of an asset to pay for a date may include but not limited to the title of their vehicle, cash transfer payments, asset currency, gold, silver, diamonds, etc.)

In some embodiments, there may be a, which may include but not limited to (e.g., 3rd party or internal option, or platform options, or user interface, etc.) to, which may include but not limited to (e.g., verify and/or cash out on the asset, or verify asset, or verify exchangeable, etc.) that may be put up for the, which may include but not limited to (e.g., bid, timing, location, party, exchangeable, date, connection, etc.) which may be turned into, which may include but not limited to (e.g., cash, transmittables, tangibles, non-tangibles, assets, transferrable assets, etc.) to make which may include but not limited to (e.g., payment, transfer, exchangeable, etc.) there may be a, which may include but not limited to (e.g., delay, period, etc.) for this versus which may include but not limited to (e.g., cash, credit card, debit card, etc.) In some embodiments, there may be a, which may include but not limited to (e.g., 'live bidding/auction screen' or a 'live bidding/auction section' or a 'live bidding/auction room' or a 'live bidding/auction homepage' or there may be a 'check out now' or a 'buy now option for a date' etc.) In some embodiments, the user interface may include but is not limited to (e.g., live bids, live calendar, timing method data, timing data method, timing process data, of the person or multiple people, the user interface may show instructions, the user interface may show time, dates, locations, current locations, main locations, bidders or paying person's live location, etc.)

In some embodiments, there may be, which may include but not limited to an: (e.g., ongoing screen or user interface etc.) that may be show anything ranging from which may include but are not limited to (e.g., register, log-in-, sign-in, become a model, apply, book a date, bid on a date, book a virtual date, entertainment options set by anyone or model or user, see exclusive content, follow a creator, subscribe to a creator, discover creators or models, discover 18+ models, discover calendar options, discover available times, dates, locations, choose your location, choose your time, craft your calendar, see our models, celebrities, models, beauties, beautiful ladies, 18+ models, calendar times available, short version or long version of model's calendar's, users calendar, an option to craft a calendar or to input a calendar, options to creator a calendar, options to insert work schedule to get a calendar made for that person, profile options, featured options, new options, live bidding/auction, live bidding/auction rooms, live category rooms, live type of model rooms, live type of date rooms, live charity events, live events, etc) In some embodiments, the, which may include but not limited to (e.g., buy date, bidding/auction date, subscriptions, unlocks, tips, payments, gifts, etc.) may be purchased using any form of assets which may include but are not limited to (e.g., exchangeable, cash, credit, debit, jewelry, car title, site funds, pre-paid funds, 401 k, stock options, stock equity, equity in a business, crypto, digital assets, real estate interest, real estate, etc.)

In some embodiments, there may be an user interface where user may be able to see upcoming, daily or monthly, or weekly, or any time period of, which may include but not be limited to (e.g., 'connections' or 'booking' or dates' or suggestions, or others calendars, or persons calendar, or suggested users, or live shows, or unlocked content, or new content, or a feed, or suggestions, or live information, or current information etc.) In some embodiments, there may be a, which may include but not be limited to (e.g., breakdown, itemized, receipt, invoice, total, partial, breakdown, bill, summary of, total, etc.) of today's schedule or any time period, which may include but not be limited to (e.g., a time period of time, schedule, a suggested schedule, suggested booking, a suggested time block etc.) which may include but not be limited to (e.g., user or time or any type of suggestions, actual booked persons, checkout options to book, schedule, inquire about, inquire about, inquire regarding, secure, create connection to, hold, pay for, create business relationship with, use transmittables to secure or book, schedule, inquire about, etc.) more users, or to book, schedule, inquire about, inquire about, inquire regarding, secure, create connection to, hold, pay for, create business relationship with, use transmittables to secure or book, schedule, inquire about, etc.) users, availability of person, availability of other users, matches, schedule matching AI-connecting, a calendar, which may include but not be limited to (e.g., breakdown, itemized, receipt, invoice, total, partial, breakdown, bill, summary of, total, etc.) future calendar's, which may include but not be limited to (e.g., breakdown, itemized, receipt, invoice, total, partial, breakdown, bill, summary of, total, etc.) of time person is available, which may include but not be limited to (e.g., breakdown, itemized, receipt, invoice, total, partial, breakdown, bill, summary of, total, etc.) of types of date, which may include but not be limited to (e.g., breakdown, itemized, receipt, invoice, total, partial, breakdown, bill, summary of, total, etc.) s person is available, hours person or user is available, funds available, credit lines available, money in account, assets, financial (e.g., breakdown, itemized, receipt, invoice, total, partial, breakdown, bill, summary of, total, etc.) s of 'credit lines' or money, availability of users, funds, money, suggested users, book virtual, book talk, book chat, book video chat, book video meeting, book voice conversation, book in person, live shows, promoted show, pre-recorded shows, persons, suggestions, calendar bookings, settings, user settings, notifications, live or current availability etc.))

In some embodiments, there may be, which may include but not be limited to (e.g., user suggestions, date suggestions, date pricing, user pricing, matched computing operations, matches, calendar suggestions, calendar bookings, users on calendar, users for checkout, suggested activities, invites to events, invites to special clubs or memberships, suggested users, suggested viewing, browsing, showing up on user interface, etc.) computing operations that may be created with, which may include but not be limited to (e.g., users, inputted questions, inputted information, inputted pricing, computing operations pricing, marketing pricing, history, frequency, time spent, opened DMs (direct messages such that only the recipient can view the messages transmitted by the sender; DMs can include at least one of text, images, videos, voice, etc.) message history, net worth, funds available, credit available, spent, date history, match history, clicks, user data, type, type bookings, bookings, history, etc.) In some embodiments, results may show, including but not limited to (e.g., different pricing, different users, viewing options, viewing user interfaces, user interfaces, results, different suggestions, different activities, different results, etc.)

In some embodiments, there may be a (e.g., live bidding/auction, auction, etc.) which may include but not limited to (e.g., persons, dates, mystery, surprise persons or activities, activities, date types, etc.) that may be in exchange for, which may include but not limited to (e.g., payment, assets, or charity donations, etc.) In some embodiments, live bidding/auction may be which may include but not limited to (e.g., currently live, a past live bidding/auction show, a preview of a bidding/auction show, a computer generated show, an automated bidding/auction platform or suggestion, a manual bidding/auction platform, etc.) In some embodiments, the user may be able to, which may include but not be limited to (e.g., aware of, informed, shown, suggested, etc.) of the 'type of bidding/auction' or the 'type of platform they are on' or 'what comes from clicking on this platform.' In some embodiments, there may be options for payments that are pre-selected, or an option to 'type in the bid or the payment amount.' In some embodiments, there may be information regarding where the bidding/auction is taking place, or example a 'live bidding/auction show' or a 'live or pre-recorded bidding/auction show or session.' In some embodiments, there may be, which may include but not be limited to (e.g., sections, areas, places, etc.) that may show where the, which may include but not limited to (e.g., date, activity etc.) that may be, which may include but not be limited to (e.g., taking place or a general idea of etc.) of what the, which may include but not be limited to (e.g., 'winning bid or payment', or bid, or payment, or securing, or auction, or confirming, or transmittables, etc.) may give the, which may include but not limited to (e.g., user, paying person' or 'consideration person,' etc.) In some embodiments, there may be options to, which may include but not be limited to (e.g., 'redeem pre-loaded funds, or gift cards that are pre-paid or pre-cleared or 'redeem points' etc.) or use, which may include but not be limited to (e.g., 'pay now' or 'use assets to pay, or pay with crypto or money, or something of value etc.) In some embodiments, which may include but not be limited to (e.g., all, some, partial, partly, fully, etc.) which may include but not be limited to (e.g., dates, activities, connections, communication, etc.) whether, which may include but not be limited to (e.g., in person, virtual, live, or phone call, hologram etc.) may be, which may include but not be limited to (e.g., exchanged for payment, assets, or charity donations, or any type of charity payments, donations, partial donations, proceeds to charity, pledging to charity, etc.)

Figure 87A:
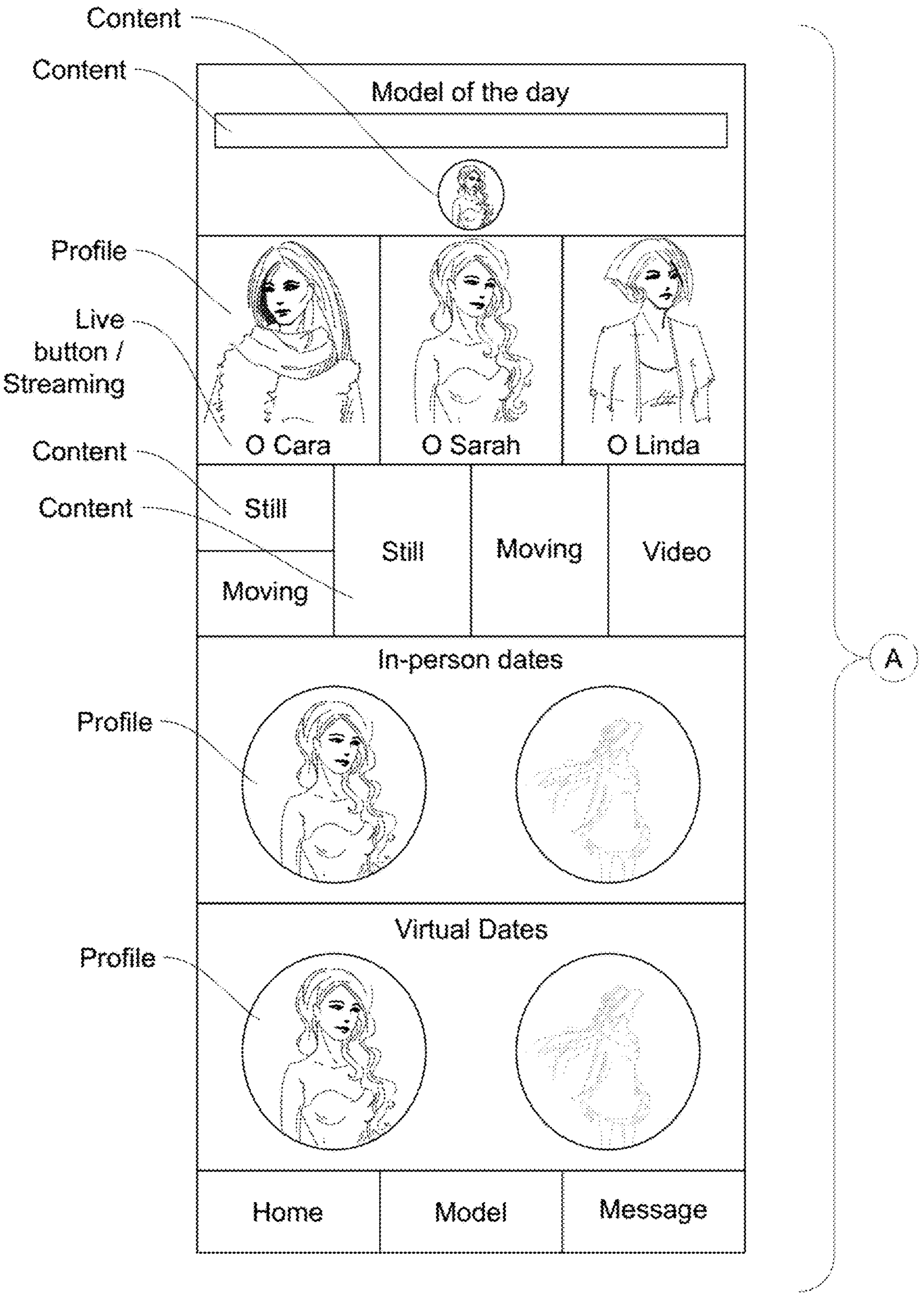
Figure 87B:
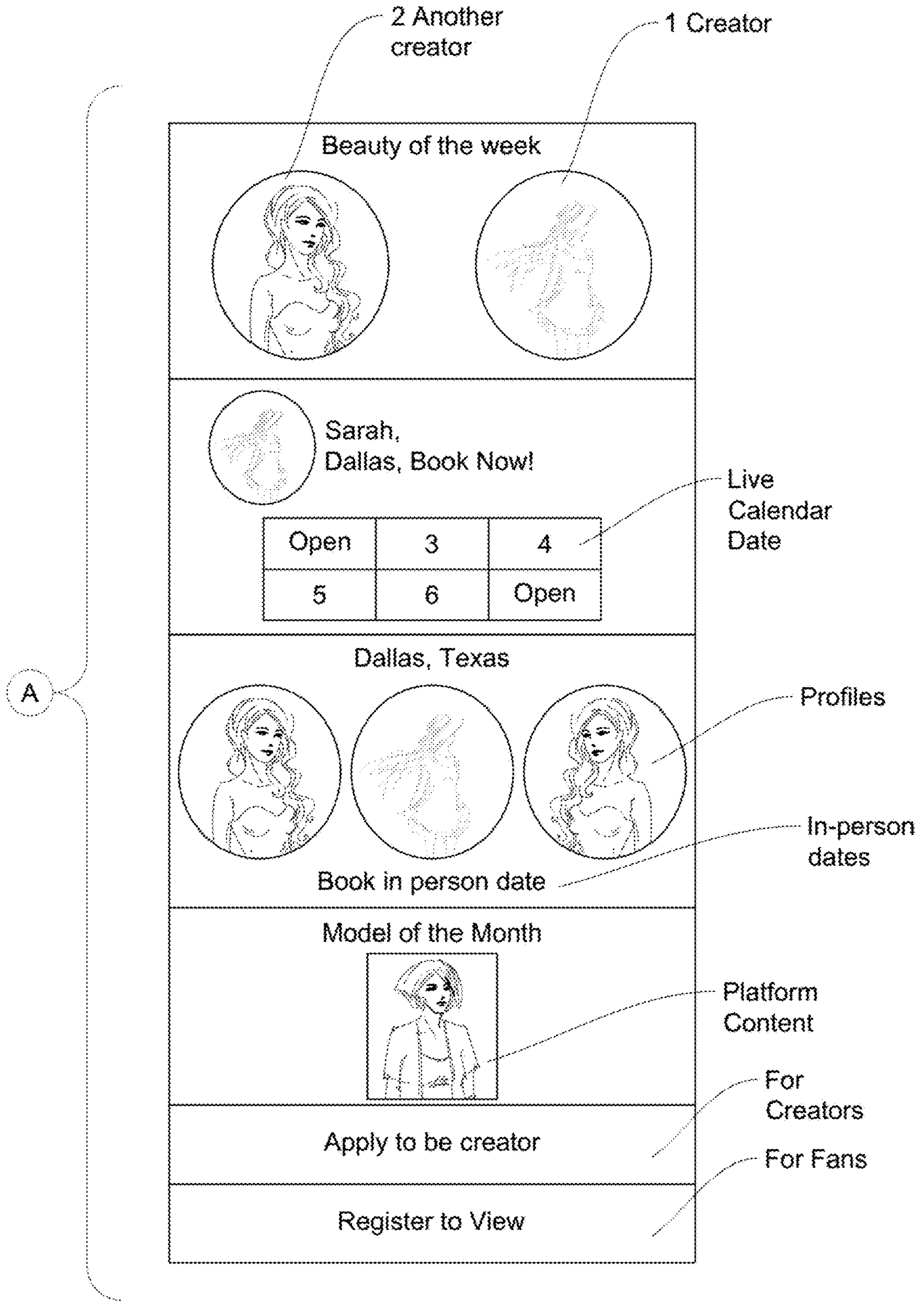

FIG. 87: In some embodiments, there may be a, which may include but not be limited to (e.g., page, user interface, items spread out, 3rd party items, moving items, non-moving items, moving videos, videos that are playing on a loop or on repeat or played one time, or previews showing, or parts of a video showing, or a second or a few second preview of a video, integrations, etc.) in which there may be a combination of one or more but not limited to (e.g., model of the day, creator of the day, a combination of public photos, videos, gifts, content, promoted model, or content that is liked a lot or clicked on a lot and the computing operation sees it as being popular or is paid for a lot, new girls, users, new sign ups, profile photos chosen by computing operation, randomly chosen photos, in person creators, in-person creator's platform or live calendar, timing method data, timing data method, timing process data, date girls, users, girls, users, wanting marriage, girls, users, wanting a relationship, wanting a relationship, high-value dater, bidder, fan, person paying, high-value person, virtual date girls, users, or girls, users, that are available for live dates, available for customized entertainment, entertainment, requested entertainment, entertainment, requests such as customized entertainment (e.g., foot fetish) videos, girls, users, available to go on a date, or available for a virtual date, or seeking a relationship or ready to date or anyone that is that are available to take requests, girls, users, that are available to be messaged, etc.) In some embodiments, there may be a, which may include but not be limited to (e.g., 'swipe or interact to view to calendar method, or swipe to view timing data method, etc.) In some embodiments, there may be, which may include but not be limited to (e.g., home button, settings button, user's profile button, a message button, a 'sign up button,' live calendar, timing method data, timing data method, timing process data, buttons, live calendar, timing method data, timing data method, timing process data, options of users or models or content creators, users, live calendar, timing method data, timing data method, timing process data, options, partner sites, sites that are also owned or have interest, live bidding/auction s for dates, live dates, live information, live shows, live content, live parties, etc.)

In some embodiments, categories or suggestions may be separated by (e.g., 'virtual dates' or 'virtual daters' or 'in-person daters' or 'in-person daters' or 'models that go on in-person dates' or models that are available for 'virtual dates' or 'girls next door for dates available or users that have exclusive content, or users that are models or users that are professionals such as a doctor, lawyer, or designer, etc.) In some embodiments, there may be, which may include but not be limited to (e.g., suggestion, category options, options, etc.) which may include but not limited to (e.g., book an in-person date' or 'book a virtual date' or 'discover models near you' or 'view models by distance' or 'book models by distance' or 'view private photos now' or 'unlock private photos now' or 'discover her profile' or 'discover new content' or 'view exclusive content' or 'sign in' or 'register' or 'become a model/creator' or 'apply to be a creator' or 'discover creators,' etc.)

In some embodiments, there may be, which may include but not be limited to (e.g., suggestion, category options, options, etc.) which may include but not limited to (e.g., book an in-person date' or 'book a virtual date' or 'discover models near you' or 'view models by distance' or 'book models by distance' or 'view private photos now' or 'unlock private photos now' or 'discover her profile' or 'discover new content' or 'view exclusive content' or 'sign in' or 'register' or 'become a model/creator' or 'apply to be a creator' or 'discover creators,' etc.)

In some embodiments, there may be options, which may include but not be limited to (e.g., where all content is locked or closed, or not shown, etc.) until may have but not be limited to (e.g., follow is made or a sign is made, or a booking is made, or a payment is made, etc.) In some embodiments, there may be options to book, schedule, inquire about, inquire about, inquire regarding, secure, create a connection to, hold, pay for, create a business relationship with, use transmittables to secure or book, schedule, inquire about, etc.) may include but not be limited to (e.g., in-person, immediately, in a smaller format that may be extended larger, anywhere on the user interface, or the user interface, etc.) In some embodiments, there may be combined locked and unlocked content, etc.) In some embodiments, there may be moving content may include but not be limited to (e.g., items or options moving around, moving content, replacing, disappearing, reappearing, appearing, moving, swaying), which may include but not be limited to (e.g., items such as videos, photos, content, promotional material, stacked photos, information, etc.) In some embodiments, 'locked content' may refer to content which may include but not be limited to (e.g., any content, which may include but not be limited to (e.g., videos, photos, moving content, holograms, live content, live show, live viewing, pre-recorded viewing, etc.) that may need to be 'paid' before may include but not be limited to (e.g., shown, or subscribed to, paid for, assets put up for, etc.)

In some embodiments, which may include but not be limited to (e.g., 'model, creator, special creator,' 'bidder,' users, public, persons, anyone, 3rd parties, advertisers, advertisements, businesses, etc.) may, which may include but not be limited to (e.g., see, view, display, show, hear etc.) which may include but not be limited to (e.g., feed, display, content, user interface, hologram, screen, hologram, user interface, viewing display, etc.) on, which may include but not be limited to (e.g., homepage, user interfaces, any user interface, any application, etc.) the, which may include but not be limited to (e.g., featured model of the month, models, promoted profiles, current profiles, computing operation profiles, photoshoots, video shoots, video content, current bids, which may include but not be limited to (e.g., races, one, or more, or multiple users or persons racing or bidding/auction or auctioning, etc.) which may include but not be limited to (e.g., entities, 3rd parties, advertisers, advertisements, businesses, persons, users, public, private profiles, public profiles, users, models, creators, paying persons, bidding/auction persons, etc.) which may include but not be limited to (e.g., current auctions, current date auctions, current date bids, prices, price ranges, general pricing, general transmittables, etc.) for, which may include but not be limited to (e.g., current dates, profiles, content for unlock, free content, mixed content, content from profiles, content from users, past dates, sold items, items for sell, live profiles, live streaming, 'model/creator' on the platform, featured profiles etc.)

In some embodiments, there may an, which may include but not be limited to (e.g., user interface or a screen or a visual of a profile or content, etc.) which may include but not be limited to (e.g., combined with options, or not combined, or with, or addition to, or any item, or any user interface, etc.) that may include but not limited to (e.g., book date, book meeting, follow for free, follow, message, price per message, price to send inquiry, send application, sign up for application, content, locked content, unlocked content, subscriber only content, follower-only content, etc.) In some embodiments, there may be an option to view content and/or have other options on the content to may include but not be limited to (e.g., view or interact with, or create, or edit, or move, etc.) whether, which may include but not be limited to (e.g., on top, on the side, on any part, or outside of the content etc.) which may include but not be limited to (e.g., locked content, book now, book for date, book for virtual date, entertainment options set by anyone or model or user, book for in person date, book video call, book phone call, view profile, etc.) In some embodiments, viewing profile may lead to a may include but not be limited to (e.g., locked profile' or a preview sort of profile, or a preview of content, or a lesser version of the full version, or a simpler version, or a version that is specifically shown, etc.) that a person may be required to 'follow,' which may include but not be limited to (e.g., meet requirements of user, platform, etc.) to, which may include but not be limited to (e.g., see, view interact with, tap, message, do anything, screenshot, copy, etc.) In some embodiments, a person may be required to may include but not be limited to (e.g., meet requirements, or complete tasks, etc.) to see, which may include but not be limited to (e.g., profile, see information, access information, access content, view, preview, etc.)

In some embodiments, a potential, which may include but not be limited to (e.g., user interface or person's user interface, screen, etc.) which may be, which may include but not limited to (e.g., 'funds to spend, money information, asset information, investment information, users profile information, users public or private information, upcoming availability on their calendar or schedule, times available for each day, booking options directly from their calendar, booking options directly from their feed, options to book, schedule, inquire about, inquire about, inquire regarding, secure, create connection to, hold, pay for, create business relationship with, use transmittables to secure or book, schedule, inquire about, etc.) which may include but not be limited to (e.g., data date directly from feed, options to book, schedule, inquire about, inquire about, inquire regarding, secure, create connection to, hold, pay for, create business relationship with, use transmittables to secure or book, schedule, inquire about, etc.) which may include but not be limited to (e.g., call, message, send tip, etc.) options to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not be limited to (e.g., date or book or schedule etc.) which may include but not be limited to (e.g., directly from feed, or directly from seeing their photo or profile, suggestions from other users, suggestions for other persons to book, schedule, inquire about, inquire about, inquire regarding, secure, create connection to, hold, pay for, create business relationship with, use transmittables to secure or book, schedule, inquire about, etc.) suggestions for other profiles, 'you might like' which may show, which may include but not be limited to (e.g., other options, other options or more options etc.) which may show up based on, which may include but not be limited to (e.g., computing operation popularity, manual, or personal settings, or preferences, a calendar, the other persons calendar or information, their information, lists, organizational lists, person's lists, person on feed, persons based on availability, person's based on categories, upcoming dates, paid for dates, not paid for dates, logs that are not paid for, logs that are to be booked, logs that are to be checked out for, matching AI-connecting, calendar dates, etc.) In some embodiments, there may be a profile or content photo option with other options such as, which may include but not be limited to (e.g., 'book in-person date, book virtual, book talk, book chat, book video chat, book video meeting, book voice conversation, date, book date activity, calendar options, in-depth calendar, calendar combined with other users' calendar, short version of calendar, immediate or long-term calendar, users preferences or user status such as 'follow for free' or 'subscriber only content' or 'locked' and 'unlocked content' or 'paid content' 'or subscriber only content' etc.)

Figure 88:
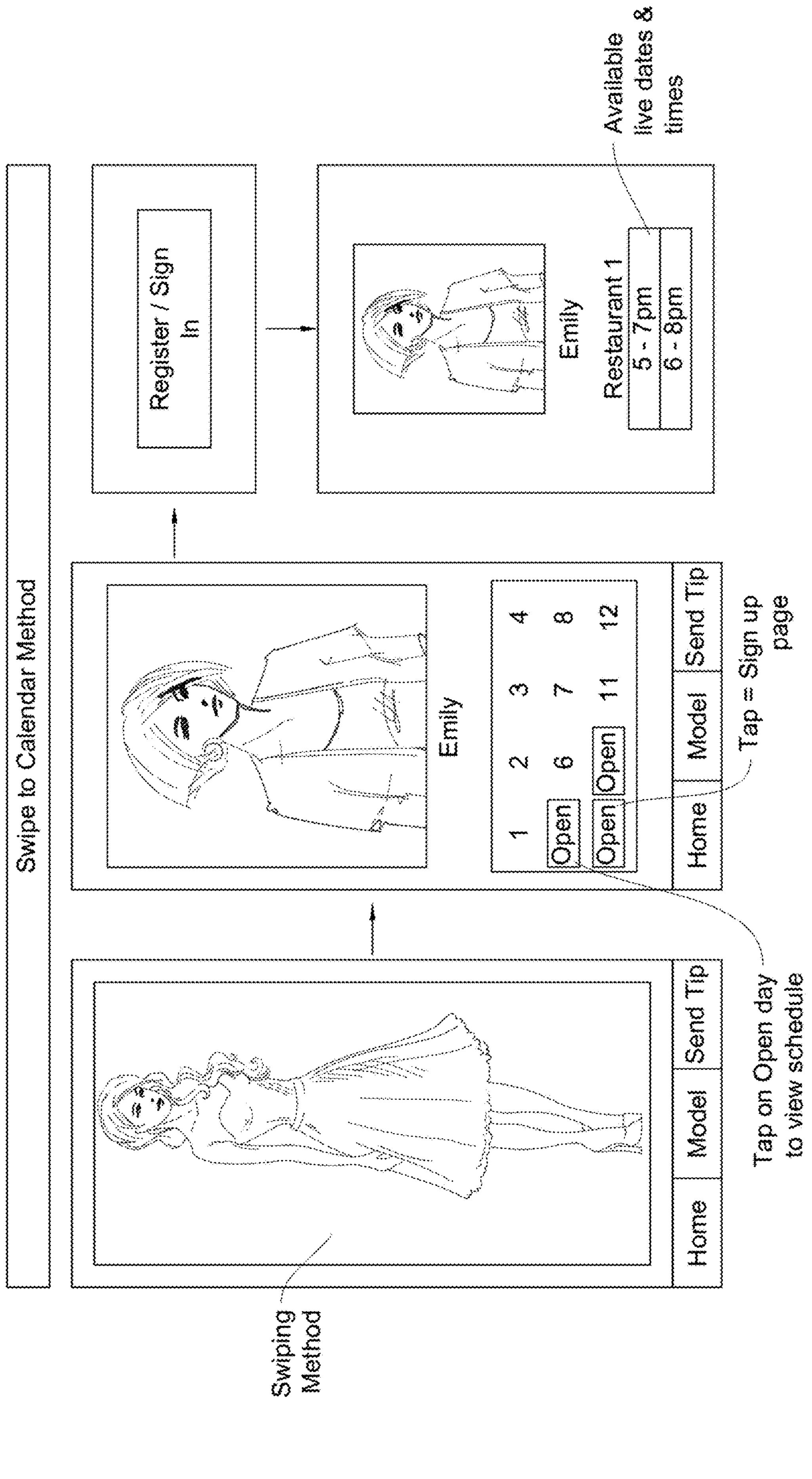

FIG. 88: In some embodiments, there may be a, which may include but not be limited to (e.g., 'swipe to calendar method, view to calendar method, view calendar, stack viewing to calendar method, content feed to calendar method, content feed to calendar, content feed to timing method, calendar feed to in-person/date/virtual timing data method, viewing content to calendar, viewing content to book, schedule, inquire about, inquire about, inquire regarding, secure, create connection to, hold, pay for, create business relationship with, use transmittables to secure or book, schedule, inquire about, etc.) calendar, viewing content to timing data method, profile to timing method or data method, profile to book, schedule, inquire about, inquire about, inquire regarding, secure, create connection to, hold, pay for, create business relationship with, use transmittables to secure or book, schedule, inquire about, etc.) which may include but not be limited to (e.g., method, profile to securing date method, profile to securing time method, profile to sending tip, content to sending tip, content to messaging, stack swiping to book, schedule, inquire about, inquire about, inquire regarding, secure, create connection to, hold, pay for, create business relationship with, use transmittables to secure or book, schedule, inquire about, securing time connection, etc.) 'swipe' may be defined as, which may include but not be limited to (e.g., view, see, eyes moving to next item, hologram or display moving by voice command or brain command, automatic swipe or move to view next, swipe, tap, switch, click, etc.) In some embodiments, the, which may include but not be limited to (e.g., 'swipe to calendar method,' click to calendar, calendar view, automatically show calendar, etc.) which may include but not be limited to (e.g., a profile photo, information, availability, content, an computing operation-chosen photo, a best photo, a frequently chosen photo, a frequently picked photo, a frequently-viewed photo, etc.) In some embodiments, there may be a swiping method which may include but not limited to (e.g., swipe the stack, swipe list or persons, swipe profiles, click profiles, browse profiles, etc.) which may include but not limited to (e.g., left or right up or down, side to side, etc.) areas or methods (e.g., you may, user, person, entity, 3rd party, robot, artificial intelligence, etc.) may be, which may include but not limited to (e.g., see, download, view, display, interact with etc.) which may include but not limited to (e.g., calendar, profile, pictures, videos, lives, locked photos, information, etc.) depending on which way or there may be all of these items showing up on each which may include but not limited to (e.g., swipe or method, swipe the stack, swipe list or persons, swipe profiles, click profiles, browse profiles, etc.) depending on which way, depending on which one comes first or user interface. In some embodiments, movements of content or information may be able to be changed, edited, swiped, shown, displayed by any (e.g., brain, body, voice, or integrated or implied, etc.) commands or suggestions or programming from (e.g., human or AI, or robot etc.)

In some embodiments, there may be a, which may include but not limited to (e.g., swipe, tap, switch, click, etc.) that may lead to a, which may include but not limited to (e.g., live photo, or a live stream, pre-recorded live stream, pre-recorded content, or a live calendar, timing method data, timing data method, timing process data, etc.) which may include but not be limited to (e.g., live dates, bookings, openings, ways to click, ways to pay, ways to register to sign in, ways to register on the platform, the person's chosen or automatic preferences may show up, etc.) In some embodiments, the may include but not limited to (e.g., 'swiper,' person, user, dater, public person, person, human, robot, bot, 3rd party, entity, computer system, AI system, robot, computer system, etc.) may be able to choose a may include but not limited to (e.g., 'date' a book immediately, book a date, book a virtual date, entertainment options set by anyone or model or user, secure a time period, pay for a connection, pay for a meeting, pay to view, pay to see, book or secure person now, view content, pay to view content, etc.) on the may include but not limited to (e.g., home-screen, hologram, user interface, viewing display, user interface, area, hologram, etc.) or which may include but not limited to (e.g., swipe method, tap, click, select, voice command, AI-induced, AI command, AI-created, or on any way connected or not connected etc.) to the, which may include but not limited to (e.g., current swiping home screen method, screen, user interface, process, etc.) In some embodiments, there may be a, which may include but not limited to (e.g., tracking method, data collection method, etc.) for each which may include but not limited to (e.g., person, human, robot, bot, 3rd party, entity, bot, computer system, 3rd party, etc.) that, which may include but not limited to (e.g., visits, views, sees, displays, interacts with, etc.) which may include but not limited to (e.g., users, persons, 'creator's or model's profile' etc.) In some embodiments, the, which may include but not limited to (e.g., tracking method, tracking information, data information, data collection, Network address, IP address, etc.) for each which may include but not limited to (e.g., person, human, robot, bot, 3rd party, entity, bot, computer system, 3rd party, etc.) visiting model's profile which may include but not limited to (e.g., views, time, dates, coordinates of person visiting profile, amount of money spent on model/creator, any customized entertainment, entertainment, requested entertainment, entertainment requests, entertainment, requests, all message requests from other person, all messages between the two people, any public information made available to each party, any information such as 'whether or not this person has seen NSFWs/risky/or suggestive photos of the model/creator, 'information that may determine if that model or creator feels comfortable accepting a date from this person etc.)

Figure 89:
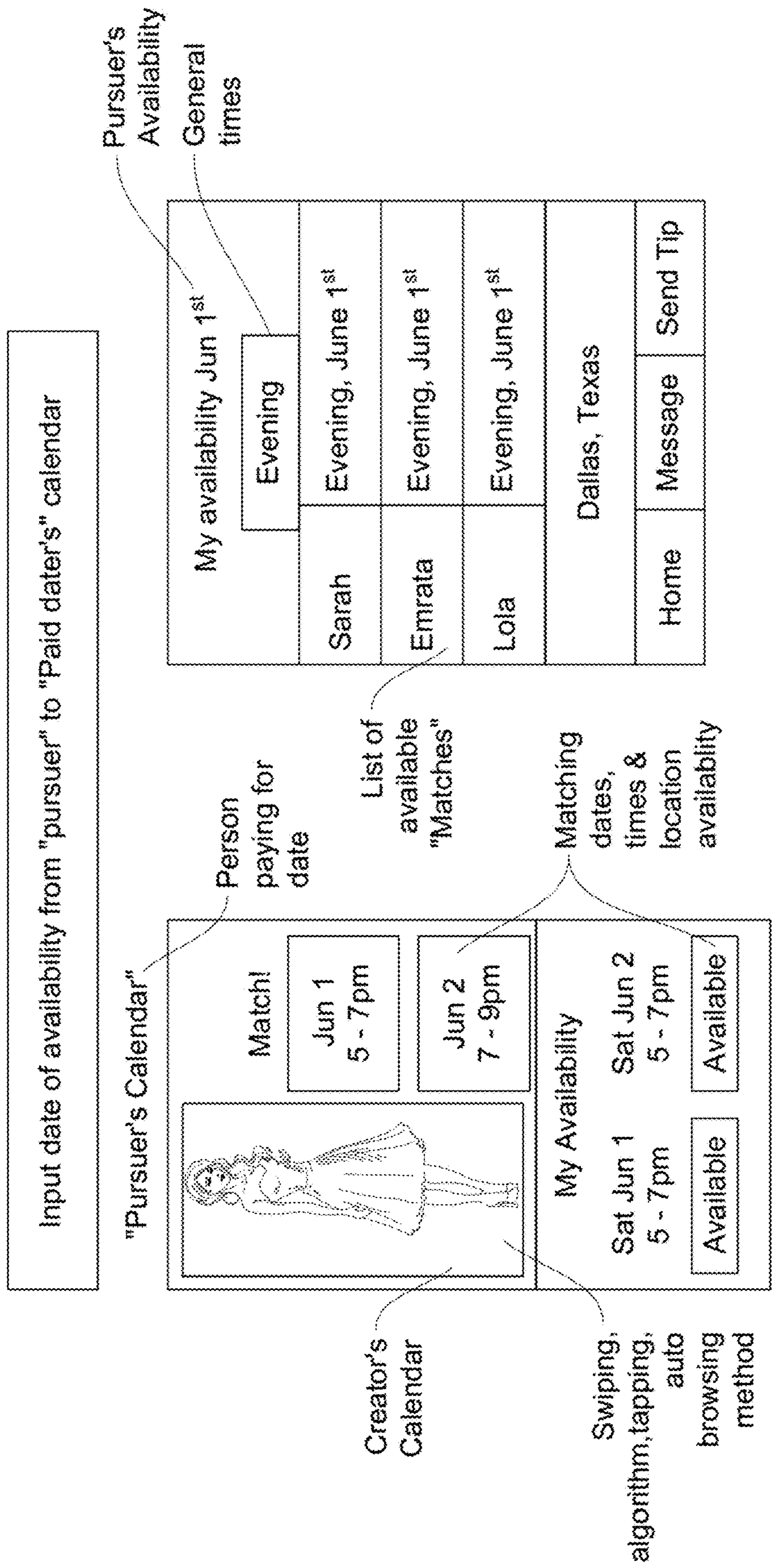

FIG. 89: In some embodiments, there may be a, which may include but not limited to (e.g., live calendar, timing method data, timing data method, timing process data, etc.) which may be related to the, which may include but not limited to (e.g., 'person that is paying for a date, entity, 3rd party paying, 3rd party, gifting person, AI, person spending money, person giving assets, entity or 3rd party giving assets or transmittables, etc.) In some embodiments, the (e.g., live calendar, timing method data, timing data method, timing process data, etc.) for the (e.g., 'person that is paying for a date, entity, 3rd party paying, 3rd party, gifting person, AI, etc.) may be, which may include but not be limited to (e.g., inputted, automatically connected to an outside calendar, a manual calendar input, an auto input, created by AI, etc.) In some embodiments, the, which may include but not limited to (e.g., live calendar, timing method data, timing data method, timing process data, etc.) for the, which may include but not limited to (e.g., 'person that is paying for a date, entity, 3rd party paying, 3rd party, gifting person, AI, user, person, paying person, etc.) may show up anywhere on the, which may include but not limited to (e.g., user interface, screen, on the page, etc.) during the, which may include but not be limited to (e.g., swiping, clicking, browsing, learning, scrolling, auto choosing etc.) method. In some embodiments, the, which may include but not limited to (e.g., live calendar, timing method data, timing data method, timing process data, etc.) for the, which may include but not limited to (e.g., 'person that is paying for a date, entity, 3rd party paying, 3rd party, gifting person, AI, entity, 3rd party paying, 3rd party, gifting person, AI, etc.) may automatically connect or show a 'stack' or a 'list of people that also have, which may include but not be limited to (e.g., similar, that same, day, time, location, etc.) availability or similar availability to the person that is, which may include but not be limited to (e.g., browsing, using, scrolling, viewing, paying, etc.) In some embodiments, the model's calendar or availability of any type, such as available to 'date, talk, text, message, in-person, virtual, scheduling, their schedule, their available gigs, their available jobs, their goals, their city, their preferences, etc.) may show on any screen or hologram or display. In some embodiments, the user or public or any person or entity or group may be able to secure the 'displayed or shown or options to' book or secure or put a deposit for or pay for or use exchangeable to book or send a gift, etc.)

In some embodiments (e.g., user, model, person, entity, group, etc.) may be able to add links that are integrated or not integrated, outside links, or links that automatically show up as registered on the platform without seeing the outside link or perhaps showing outside links or it may show up as just the item and the price or just the service and the price or just the bill and the price, and the (e.g., model, entertainer, female, woman, user, etc.) may be able to require users or persons or the public or a potential dater to purchase several items off her wishlist or list or links for them to be sent or ordered or given to her with no refunds. In some embodiments, after the items are purchased, the model user, person, group, etc.) may decide that the (e.g., user, person, etc.) is not sending enough gifts for a date and refuse the date after it may be up to the user's discretion of a date occurs after, before, or during purchases from gift list or registered list. In some embodiments, a registered list or created list of items that a user wants or needs may show her personal information or show zero personal information their fore, is another user purchases items of their list, it will (e.g., never show their address or be able to return the item or cancel the item, etc.) In some embodiments, users or user or model or persons may require one or more items to be purchased from the list to 'unlock date calendar' or 'unlock the ability for another user to (e.g., book a date with her' or 'be able to access her calendar' or 'be able to send her a message' or 'be able to subscribe to her' etc.) In some embodiments, the user or model may have a dummy calendar only for (e.g., those she does not want to go out with or for blocked users, etc.)

In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, or areas, or profiles, or content, or hologram or display screens, etc.) to continue to look or get automated, which may include but not be limited to (e.g., looking, viewings of, movement, selection, scroll, etc.) which may include but not be limited to (e.g., content, creators, models, users, etc.) In some embodiments, the, which may include but not be limited to (e.g., live calendar, timing method data, timing data method, timing process data, etc.) for the, which may include but not be limited to (e.g., 'person that is paying for a date, entity, 3rd party paying, 3rd party, gifting person, AI, etc.) may use, which may include but not be limited to (e.g., computing operation or use machine learning or AI etc.) to connect to others that may have, which may include but not be limited to (e.g., similar time available for a date, similarities, similar calendars, similar routines, something in common, similar routines, something in common, etc.) based on, which may include but not be limited to (e.g., each other's 'live' calendars, calendar, timing data, schedule data, scheduling data, timing methods, computing operation data, routes, commands, similarities, anything in common, etc.)

In some embodiments, the, which may include but not be limited to (e.g., live calendar, timing method data, timing data method, timing process data, etc.) for the, which may include but not be limited to (e.g., 'person that is paying for a date, dater, pursuer, user, entity, entity, 3rd party paying, 3rd party, gifting person, AI, etc.) may automatically choose, which may include but not be limited to (e.g., a set of people, an endless supply of people, any person, continuous persons, continuous profiles, suggestions, continuous suggestions, etc.) that may be a, which may include but not be limited to (e.g., match, similar, in common, etc.) for those, which may include but not be limited to (e.g., dates, times, time period, general similarities, etc.) and may show that, which may include but not be limited to (e.g., profile photo, any type of photo, any chosen photo, any computing operation photo, any data, any content, etc.) to potentially, which may include but not be limited to (e.g., help determine who this person is, gain knowledge, understand, do research, etc.)

In some embodiments, the, which may include but not be limited to (e.g., live calendar, timing method data, timing data method, timing process data, etc.) for the, which may include but not be limited to (e.g., 'person that is paying for a date, entity, 3rd party paying, 3rd party, gifting person, AI, etc.) may show up on a, which may include but not be limited to (e.g., user interface, screen etc.) to help that person, which may include but not be limited to (e.g., see, be automatically matched to that other person, view that person, secure that person, etc.) and/or/furthermore, potentially allowing that person to, which may include but not be limited to (e.g., auto book, schedule, inquire about, inquire about, inquire regarding, secure, create connection to, hold, pay for, create business relationship with, use transmittables to secure or book, schedule, inquire about, etc.) which may include but are not limited to (e.g., manually book, schedule, inquire about, browse, or determine etc.) if user wants to, which may include but not be limited to (e.g., 'save that person' or 'book immediately' or come back later to book, schedule, inquire about, inquire about, inquire regarding, secure, create connection to, hold, pay for, create business relationship with, use transmittables to secure or book, schedule, inquire about, etc.) save for later, add to list, add to later list, etc.) In some embodiments, the, which may include but not be limited to (e.g., live calendar, timing method data, timing data method, timing process data, etc.) for the, which may include but not be limited to (e.g., 'person that is paying for a date, entity, 3rd party paying, 3rd party, gifting person, AI, etc.) may, which may include but not be limited to (e.g., 'match' or 'connect' or allow communication with etc.) that, which may include but not be limited to (e.g., other person, user person, entity, person, etc.) and/or, which may include but not be limited to (e.g., allow a list to be formed of all people that are available and/or report a list back to that person, show a list of people in any sort of browsing method, list method, or organized method etc.) In some embodiments, there may be an, which may include but not be limited to (e.g., input date of availability etc.) from, which may include but not be limited to (e.g., 'pursuer' to 'paid daters' calendar, from paying person to paid person, or from paid person to paying person etc.)

In some embodiments, there may be a, which may include but not be limited to (e.g., 'swipe to calendar method, view to calendar method, view calendar, stack viewing to calendar method, content feed to calendar method, content feed to calendar, content feed to timing method, calendar feed to in-person/date/virtual timing data method, viewing content to calendar, viewing content to book, schedule, inquire about, inquire about, inquire regarding, secure, create connection to, hold, pay for, create business relationship with, use transmittables to secure or book, schedule, inquire about, etc.), which may include but not be limited to (e.g., calendar, viewing content to timing data method, profile to timing method or data method, profile to book, schedule, inquire about, inquire about, inquire regarding, secure, create connection to, hold, pay for, create business relationship with, use transmittables to secure or book, schedule, inquire about, etc.) which may include but not be limited to (e.g., method, profile to securing date method, profile to securing time method, profile to sending tip, content to sending tip, content to messaging, stack swiping to book, schedule, inquire about, inquire about, inquire regarding, secure, create connection to, hold, pay for, create business relationship with, use transmittables to secure or book, schedule, inquire about, securing time connection, etc.) In some embodiments, 'swipe' may be defined as, which may include but not be limited to (e.g., swipe, tap, switch, click, etc.) In some embodiments, the, which may include but not be limited to (e.g., 'swipe to calendar method,' view to the calendar, click to calendar, automatically show calendar, etc.) may include but are not limited to (e.g., a profile photo, information, availability, content, an computing operation-chosen photo, a best photo, a frequently chosen photo, a frequently picked photo, a frequently-viewed photo, etc.)

In some embodiments, there may be a, which may include but not be limited to (e.g., swiping method, clicking method, tapping method, voice command, etc.) which may include but not limited to (e.g., swipe the stack, swipe list or persons, swipe profiles, click profiles, browse profiles, etc.) which may include but not limited to (e.g., left or right up or down, side to side, etc.) areas or methods (e.g., you may, user, person, entity, 3rd party, robot, artificial intelligence, etc.) may be, which may include but not limited to (e.g., see, download, view, display, interact with etc.) which may include but not limited to (e.g., calendar, profile, pictures, videos, lives, locked photos, information, etc.) depending on which way or there may be all of these items showing up on each which may include but not limited to (e.g., swipe or method, swipe the stack, swipe list or persons, swipe profiles, click profiles, browse profiles, etc.) depending on which may include but not limited to (e.g., which way, depending on which one comes first or user interface, any, user interfaces, etc.)

In some embodiments, there may be a, which may include but not limited to (e.g., swipe, tap, switch, click, etc.) that may lead to a, which may include but not limited to (e.g., live photo, or a live stream, pre-recorded live stream, pre-recorded content, or a live calendar, timing method data, timing data method, timing process data, etc.) which may include but not be limited to (e.g., live dates, bookings, openings, ways to click, ways to pay, forms to register to sign in, ways to register on the platform, the person's chosen or automatic preferences may show up, etc.) In some embodiments, the may include but are not limited to (e.g., 'swiper,' person, user, dater, public person, person, human, robot, bot, 3rd party, entity, computer system, AI system, robot, computer system, etc.) may be able to choose a may include but not limited to (e.g., 'date' a book immediately, book a date, book a virtual date, entertainment options set by anyone or model or user, secure a period, pay for a connection, pay for a meeting, pay to view, pay to see, book or secure person now, view content, pay to view content, etc.) on the may include but not limited to (e.g., home-screen, hologram, user interface, viewing display, user interface, area, hologram, etc.) or which may include but not limited to (e.g., swipe method, tap, click, select, voice command, AI-induced, AI command, AI-created, or on any way connected or not connected, etc.) to the, which may include but not limited to (e.g., swiping home screen method, screen, user interface, process, etc.)

In some embodiments, there may be a, which may include but not limited to (e.g., tracking method, data collection method, etc.) for each which may include but not limited to (e.g., person, human, robot, bot, 3rd party, entity, bot, computer system, 3rd party, etc.) that, which may include but not limited to (e.g., visits, views, sees, displays, interacts with, etc.) which may include but not limited to (e.g., users, persons, 'creator's or model's profile' etc.) In some embodiments, the, which may include but not limited to (e.g., tracking method, tracking information, data information, data collection, Network address, IP address, etc.) for each which may include but not limited to (e.g., person, human, robot, bot, 3rd party, entity, bot, computer system, 3rd party, etc.) visiting model's profile which may include but not limited to (e.g., views, time, dates, coordinates of the person visiting profile, amount of money spent on model/creator, any customized entertainment, entertainment, requested entertainment, entertainment requests, entertainment, requests, all message requests from another person, all messages between the two people, any public information made available to each party, any information such as 'whether or not this person has seen NSFWs/risky/or suggestive photos of the model/creator, 'information that may determine if that model or creator feels comfortable accepting a date from this person, etc.)

Figure 90:
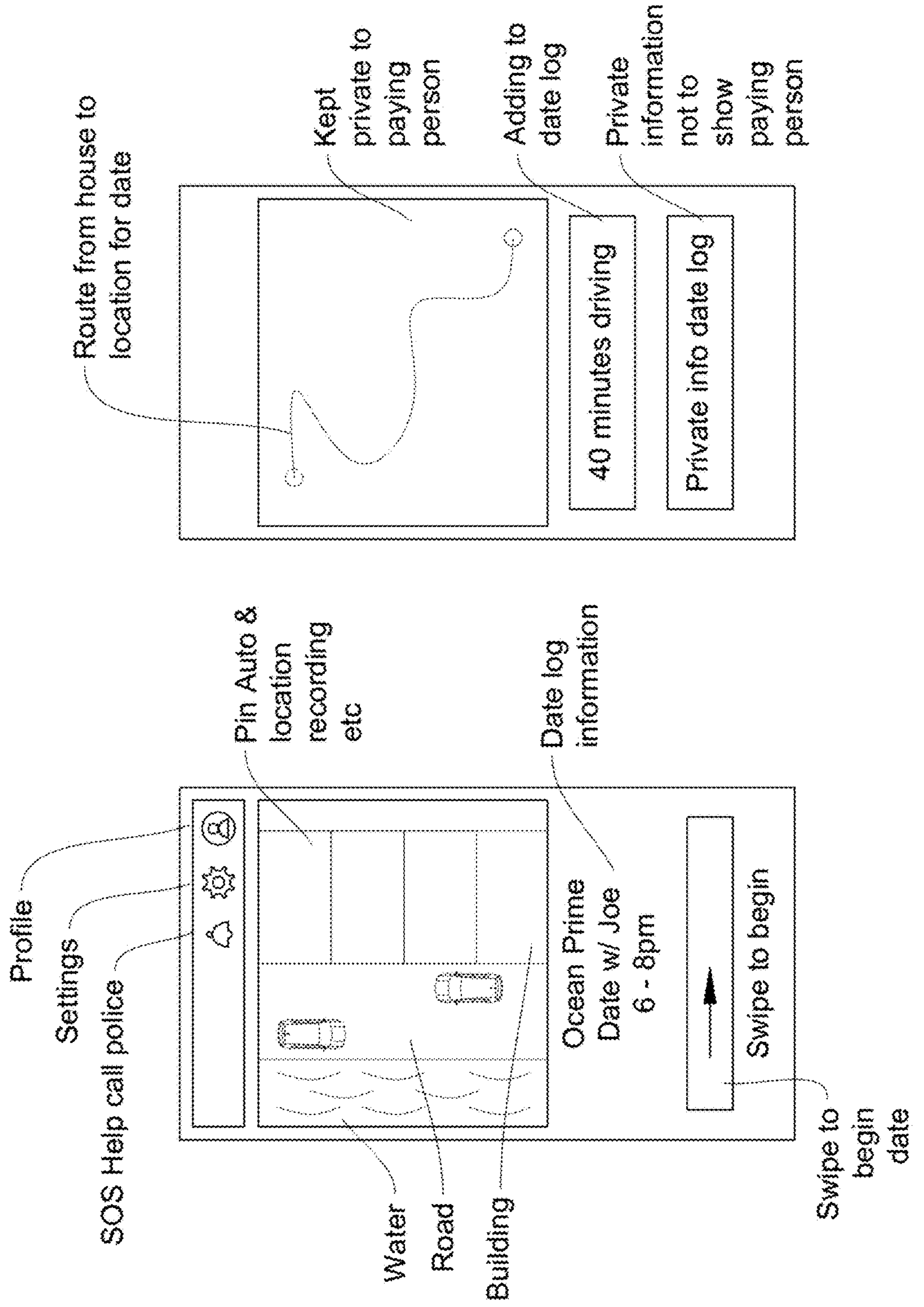

FIG. 90: In some embodiments, the process may show the, which may include but not be limited to (e.g., 'creator or model, entity, 3rd party, user, etc.) which may include but not be limited to (e.g., locations, previously locations, date locations, their live route, or driving, travel, route, route, etc.) which may be kept, which may include but not be limited to (e.g., private, secure, away from, not revealed, etc.) to the paying person for safety reasons, but may be, which may include but not be limited to (e.g., recorded, confirmed, tracked, data tracking, location tracking, date data tracking, date data record, etc.) in order to keep tracking of all the, which may include but not be limited to (e.g., work, agreements, time, money, effort, driving, travel, etc.) that the, which may include but not be limited to (e.g., 'creator or model, entity, 3rd party, user, public, etc.) which may include but not be limited to (e.g., is, was, may be, currently is, was, did, etc.) doing by, which may include but not be limited to (e.g., going out on the date, meeting, going to activities, parties, events, travel, date, etc.) with this, which may include but not be limited to (e.g., 'paying person, user, person, person with transmittables, person paying for time or date, etc.) In some embodiments, the, which may include but not be limited to (e.g., driving, travel, route, route etc.) which may include but not be limited to (e.g., the locations, or just the time and distance driven which may or may not include miles, kilometers, estimated gas used, route, etc.) which may be in order to keep a, which may include but not be limited to (e.g., driving, travel, route, log, and time log, and effort log etc.) for the, which may include but not be limited to (e.g., 'date log, management area, etc.) that may be kept private to the, which may include but not be limited to (e.g., creator and/or model, user, person paying person, non-paying person, exchangeable person, user, bidder, person being paid, and/or the platform [safety, privacy] etc.) In some embodiments, there may be a, which may include but not be limited to (e.g., recording, record, tracking, log, etc.) of, which may include but not be limited to (e.g., location, time, miles, estimated gas used, route, etc.) which may have been used to get from, which may include but not limited to (e.g., home location, starting point location, starting point, beginning, etc.) to, which may include but not limited to (e.g., date location, meeting location, activity location, meetup location, etc.) may be, which may include but not limited to (e.g., recorded privately and used privately, recorded, data collected, recorded privately by the platform and the creator, model, etc.) In some embodiments, this, which may include but not be limited to (e.g., process, user interface, option, screen, tracking, etc.) may or may not be optional, and could be another feature that is added or not added.

In some embodiments, there may be a, which may include but is not limited to (e.g., 'hot spot as defined as a general or specific area that is shown, displayed have, might have might show, computing operation, etc.) to have (e.g., some, many, few, little, a lot of users, etc.) In some embodiments, the 'hot spot area may include but are not limited to (e.g., may be or may not be specific enough to see individuals or view any particular person, show people, show areas, show cities, etc.) In some embodiments, there may be a date search area where names, persons, filters, keywords, etc.) may be searched or chosen to find in-person daters in the area, which may include but are not limited to (e.g., major city, country, large area, etc.). In some embodiments, there may be a, which may include but is not limited to (e.g., list of users combined with a 'hot spot map, just searched users that may show up in order, any hot spot category or organization, etc.) any, which may include but are not limited to (e.g., possible, any possibilities, any combination of, etc.) may have but not limited to, which may include but are not limited to (e.g., distance, time, availability, looks, criteria, filtered information, etc.) In some embodiments, users may be able to which may include but not limited to (e.g., separate, categorize, move, remove, change, select, etc.) may include but not limited to (e.g., categorize or organize by 'daters they have highly rated, VIP spenders, categorized spenders, subscribers, unlocks, virtual, in-person, big tippers, subscriber spending, other user ratings, personal ratings, ratings made after dates, messages, etc.)

In some embodiments, we will not, which may include but not be limited to (e.g., tolerate, allow, accept, approve, etc.) any paid or unpaid, which may include but not be limited to (e.g., bidder, patron, member, VIP member, person, user, patron, viewer, person, 3rd party, business, entity, figure, etc.) using, which may include but not be limited to (e.g., verbal abuse, causing fear of harm, scaring, proposing illegal activities, etc.) to 'model/creator.' In some embodiments, we will not tolerate any paying or not-paying, which may include but not be limited to (e.g., bidder, patron, member, VIP member, person, user, entity, figure, 3rd party, group, person, human, robot, etc.) using any, which may include but not be limited to (e.g., coercion, fear, harm, attempt, proposal, plan, etc.) to, which may include but not be limited to (e.g., attempt to/requesting to obtain sexual services, put any human or person in fear, display or feel or show any behavior that may present any amount of fear to 'model/creator," or any type of, which may include but not be limited to (e.g., proposed, suggested, asked, expected, confronted with, coerced into, questioning, etc.) which may include but not be limited to (e.g., illegal activities, uncomfortable questions, any, any illegal or non-wanted services or goods, verbal abuse, causing fear of harm, scaring, proposing illegal activities, sex trafficking attempt, coercion attempt, proposal of sexual activities, proposal of unlawful acts, threats, attacking, physical abuse, verbal abuse, illegal requests for services or activities or any criminal or unlawful acts, etc.) from any, which may include but not be limited to (e.g., paid or unpaid, or paying, or non-paying, etc.) which may have but not be limited to (e.g., bidder, patron, member, VIP member, person, user, entity, figure, etc.) on/during, which may include but not be limited to (e.g., date, connection, entertainment, time, time period, meeting, messaging, messages, contacting, contact, etc.) In some embodiments, if 'model/creator' presents, which may include but not be limited to (e.g., concerns, emotions regarding, suspicions, signs, red flags, reasons, feelings, proof, suggestions, etc.) of any type of, which may include but not be limited to (e.g., fear of harm, questioning, questions, scared, scared feelings, confusion, sexual services request, scared feelings, coercion, sex trafficking suspicions, or any verbal abuse, etc.) on, which may include but not be limited to (e.g., paid for date, non-paid date, during connection, during virtual, during in-person, during the meeting, during video or voice call, during messages, during any connection, etc.) by/from, which may include but not be limited to (e.g., bidder, patron, member, VIP member, person, user, entity, figure, etc.) the, which may include but not be limited to (e.g., bidder, patron, member, VIP member, person, user, entity, figure, etc.) may/will be banned from the platform forever. In some embodiments, the, which may include but not be limited to (e.g., bidder, patron, member, VIP member, person, user, entity, figure, etc.) may not receive any refund/credit and/or may be banned permanently if, which may include but not be limited to (e.g., proof, concerns, reasons why, etc.) is/are presented to, which may include but not be limited to (e.g., platform, entity, business, etc.) from the ', which may include but not be limited to (e.g., model/creator, 3rd parties, advertisers, advertisements, businesses, outside proof, outside reasons, unrelated reasons, concerns, etc.)

In some embodiments, almost guaranteed date with which may include but not limited to (e.g., model, creator, user, person, etc.) may be subjected to the, which may include but not limited to (e.g., creators, models, etc.) own which may include but not be limited to (e.g., requirements or individual requirements or subjected to their discretion of refunding, editing, partial refund, cancellation, etc.) In some embodiments, the platform may include but is not limited to (e.g., cancel, change, dismiss, refund, partially refund, edit, etc.), which may include but not include (e.g., date, connection, meeting, payment, etc.) It may be up to the, which may include but is not limited to (e.g., required standards, required contractual agreements, or persona/own standards, own feelings, own discretion, etc.) the model or creator meets any person that has which may include but not limited to (e.g., paid, inquired about, paid for the date, inquired about the date, scheduled date, scheduled meeting, etc.) The platform is not responsible for the, which may include but not limited to (e.g., model, creator, or user, etc.) which may include but is not limited to (e.g., canceling, editing, changing, refunding, partially refunding, any date or meeting, or connection, etc.) due to any reason.

In some embodiments, there may be a, which may include but not be limited to (e.g., hot spot or a 'city spot or a way to see which city has the most users, etc.) In some embodiments, there may be a way to see, explore, or view only the user's city and its users or persons or suggested persons or events or content, or there may be a way to 'pay' to see other cities, etc.) In some embodiments, there may be a way to see a city or a location and/or also see filtered/filters/search perimeters that may find a person or a user or any person, etc.) In some embodiments, there may be a 'payment requirement' to view, which may include but not be limited to (e.g., cities, hotspots, users, distances, overhead, any overhead view, or general view of other users based on location, city, moving, traveling, routes, etc.) In some embodiments, there may be users or profiles, content, lists, etc.) In some embodiments, the present disclosure provides a location-based social network system and method that may allow users to view information about other users and locations in different cities. In some embodiments, the system may include a "hot spot" or "city spot" feature that enables users to see which cities have the most users, have users, view users, view options, and view availability. In some embodiments, users may also be able to pay to see other cities or access a filtered search to find users or locations based on specific criteria. In some embodiments, the system may include payment requirements for accessing certain features, such as viewing cities, hotspots, users, distances, overhead views, or general views of other users based on location, city, movement, traveling, routes, etc.) In some embodiments, users may create profiles, post content, and create lists of other users or locations.

In some embodiments, there may be a (e.g., 'live bidding/auction, auction, etc.) which may include but not limited to (e.g., persons, dates, mystery, surprise persons or activities, activities, date types, etc.) that may be in exchange for, which may include but not limited to (e.g., payment, assets, or charity donations, etc.) In some embodiments, live bidding/auction may be which may include but not limited to (e.g., currently live, a past live bidding/auction show, a preview of a bidding/auction show, a computer generated show, an automated bidding/auction platform or suggestion, a manual bidding/auction platform, etc.) In some embodiments, the user may be able to, which may include but not be limited to (e.g., aware of, informed, shown, suggested, etc.) of the 'type of bidding/auction' or the 'type of platform they are on' or 'what comes from clicking on this platform.' In some embodiments, there may be options for payments that are pre-selected, or an option to 'type in the bid or the payment amount.' In some embodiments, there may be information regarding where the bidding/auction is taking place, or example a 'live bidding/auction show' or a 'live or pre-recorded bidding/auction show or session.' In some embodiments, there may be a sections that may show where the, which may include but not limited to (e.g., date, activity etc.) may be taking place or a general idea of what the 'winning bid or payment' may give the, which may include but not limited to (e.g., user, paying person' or 'consideration person,' etc.) In some embodiments, there may be options to 'redeem pre-loaded funds, or gift cards that are pre-paid or pre-cleared or 'redeem points' or 'pay now' or 'use assets to pay, or pay with crypto or money, or something of value etc.) In some embodiments, all 'dates or activities whether, which may include but not be limited to (e.g., in person, virtual, live, or phone call, hologram etc.) may be, which may include but not be limited to (e.g., exchanged for payment, assets, or charity donations, or any type of charity payments, donations, partial donations, proceeds to charity, pledging to charity, etc.)

In some embodiments, which may include but not be limited to (e.g., date log, management area, any user data log, any user management log, any user interface, etc.) which may include not be limited to (e.g., viewing routes, viewing driving, travel, route, routes, viewing locations, viewing live locations, location of meeting location, location of data of meeting, location of date location, location of past locations, GPS tracking, 3rd party tracking, cookies, other data on device, 3rd party data device, 3rd party data, 3rd party data during data or meeting or location or time, sending locations, sending data, storing data, storing locations, showing both locations at the same time, showing only one location, showing business locations, showing business data, showing location data, showing driving, travel, route, route and method of transportation, users information, user's background, public information, public background, showing mode of transportation, user's location, user's past location, user's current location, live locations, recorded locations, etc.)

Figure 255:
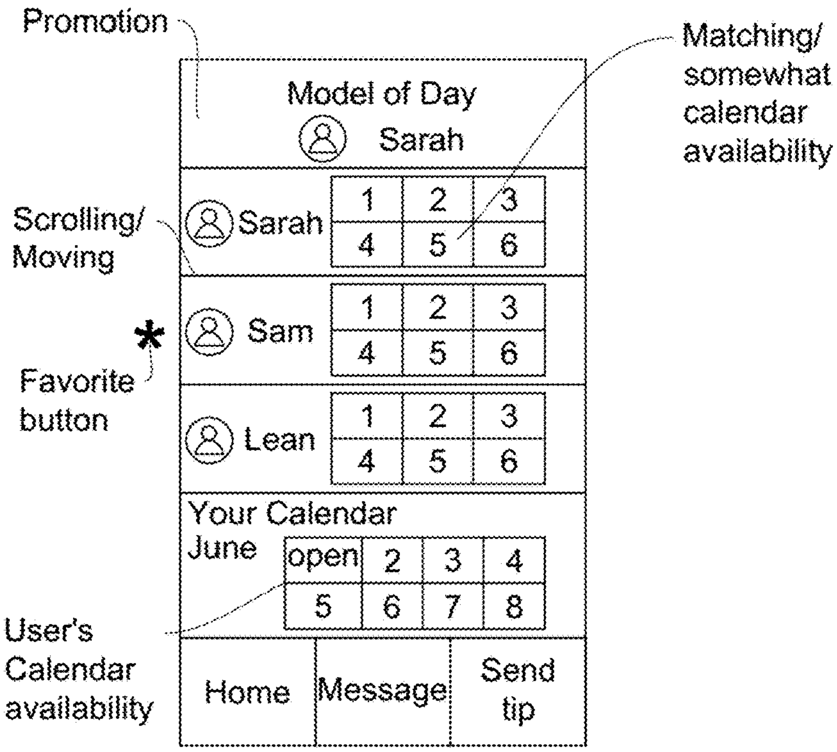
Figure 256:
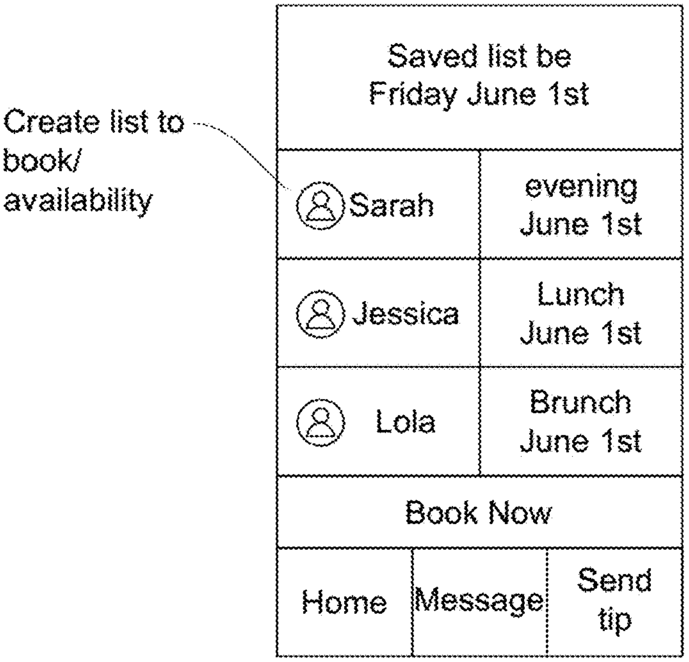
Figure 257:
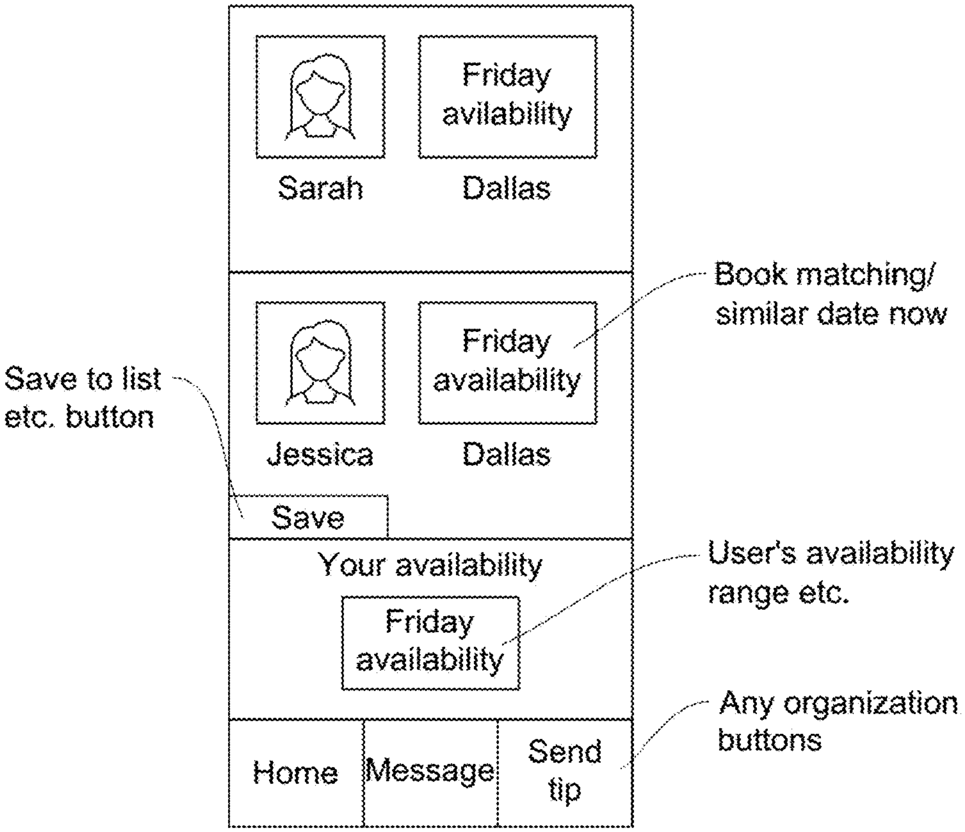
Figure 258:
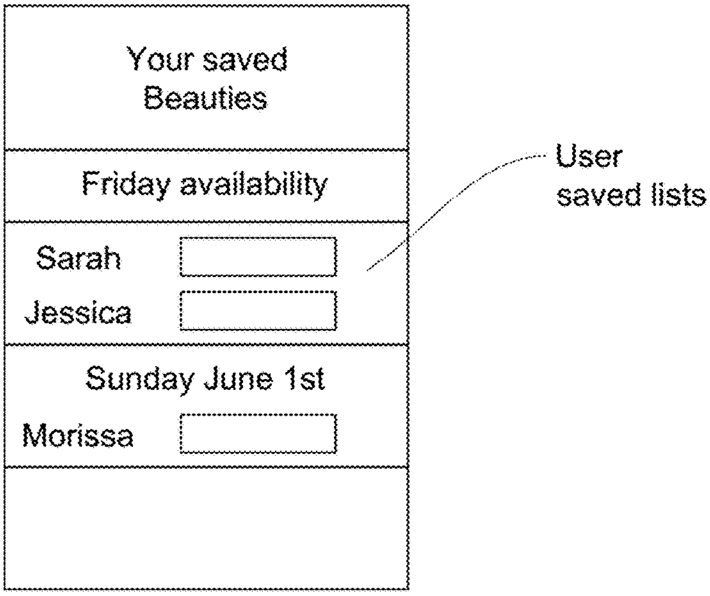
Figure 259:
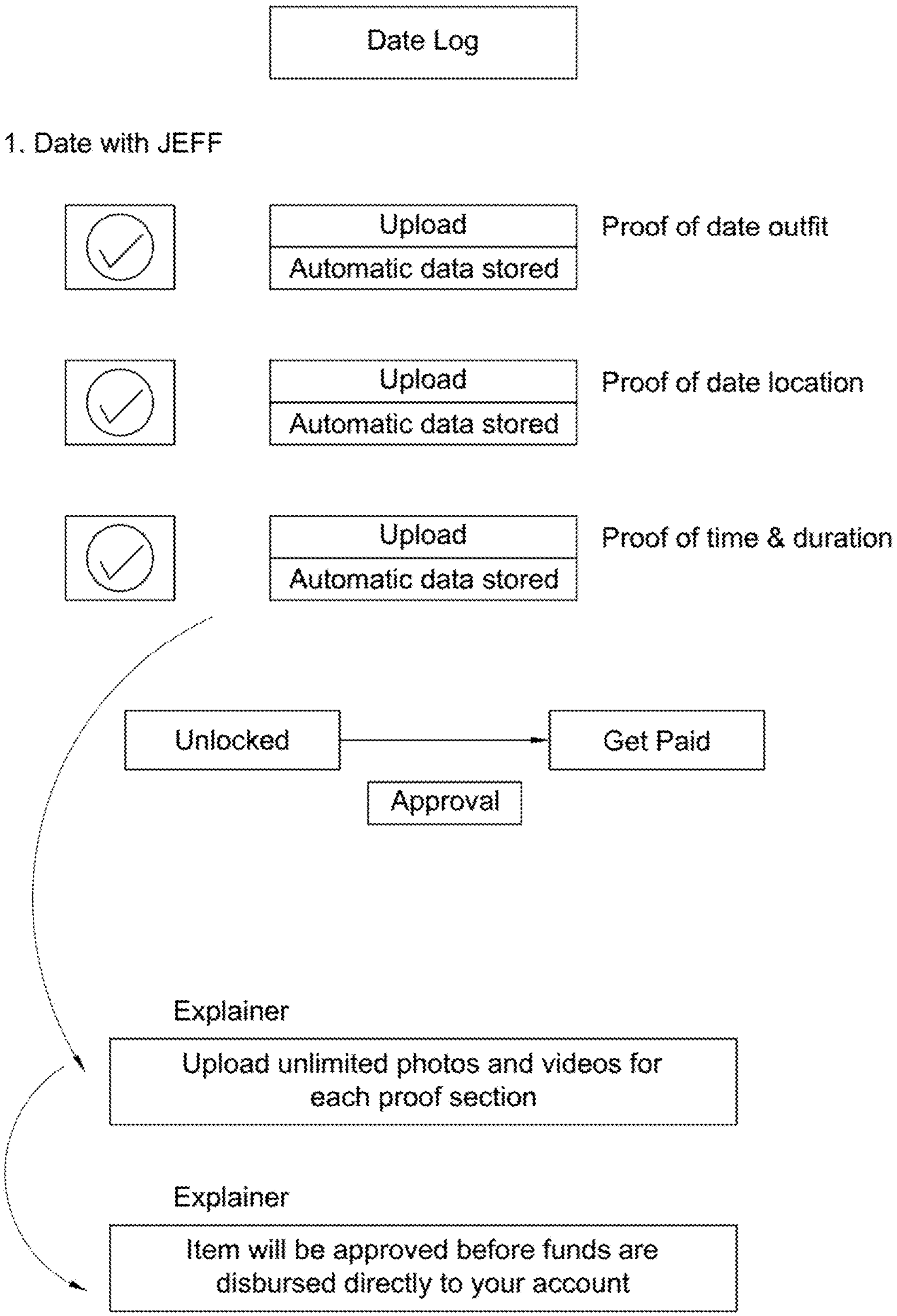
Figure 260:
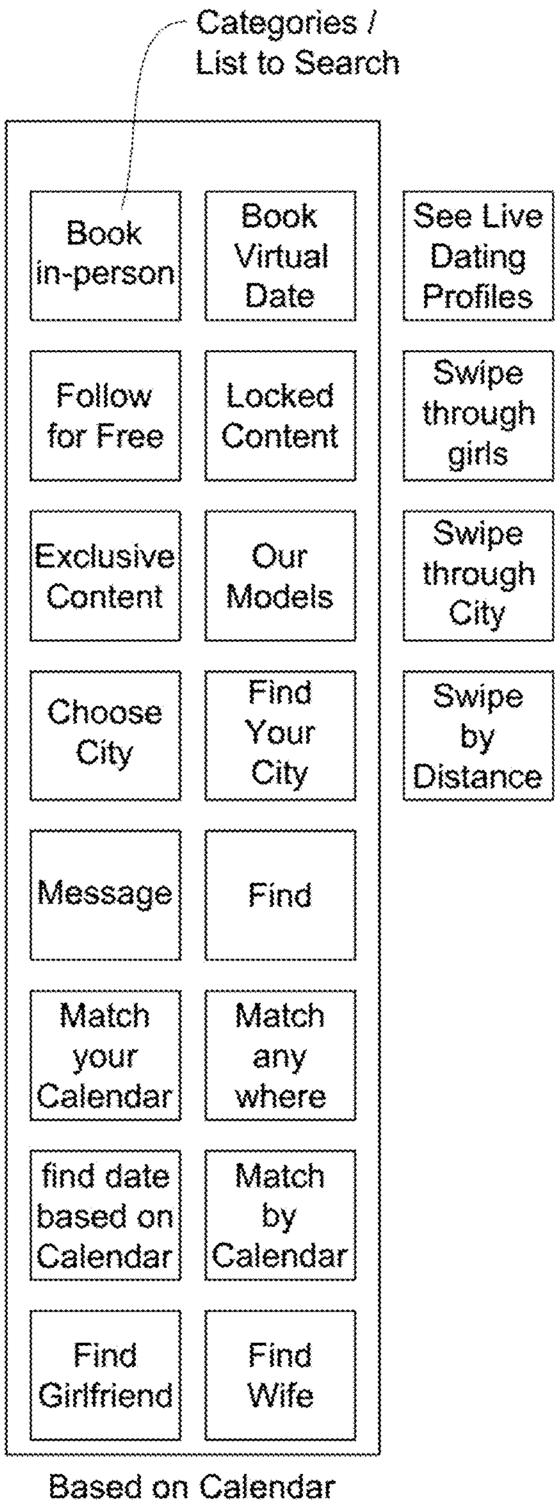
Figure 261A:
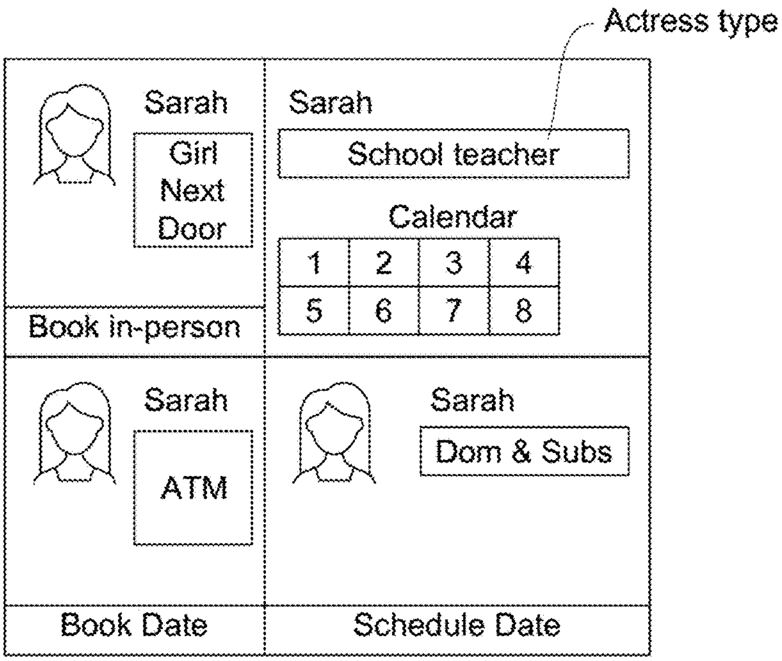
Figure 261B:
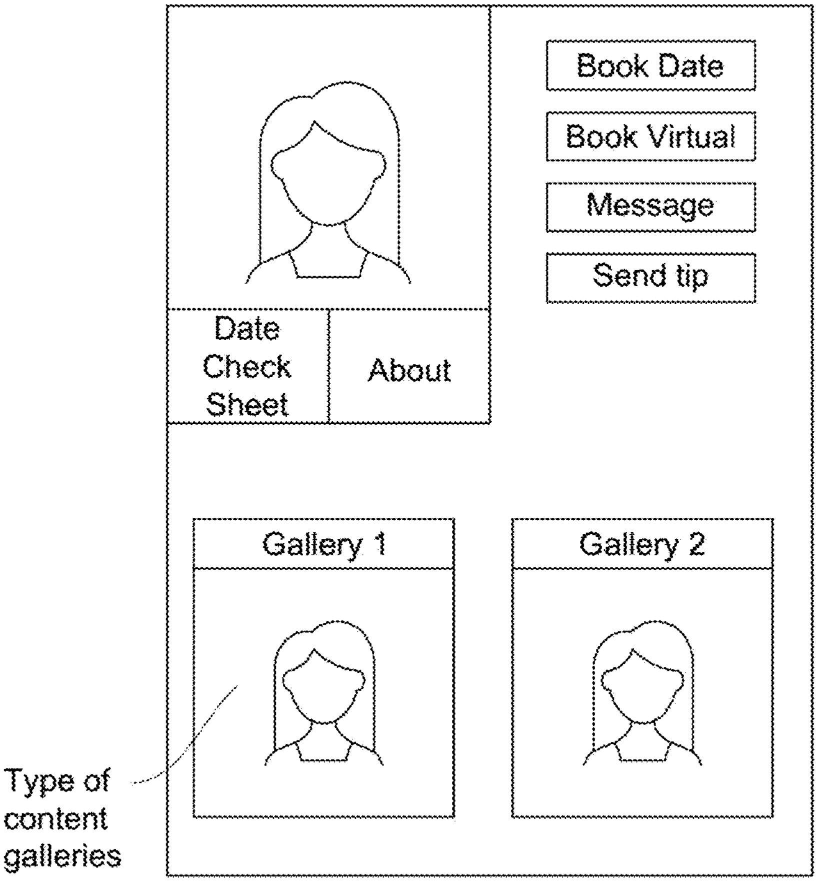
Figure 262:
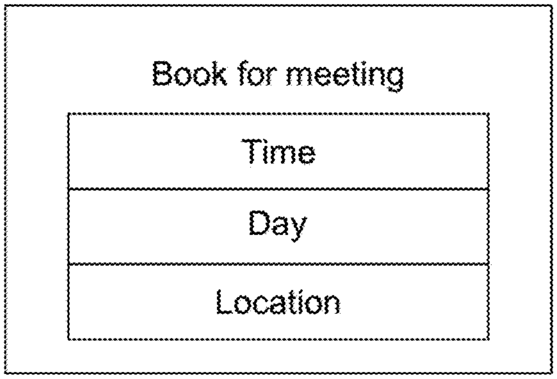
Figure 263:
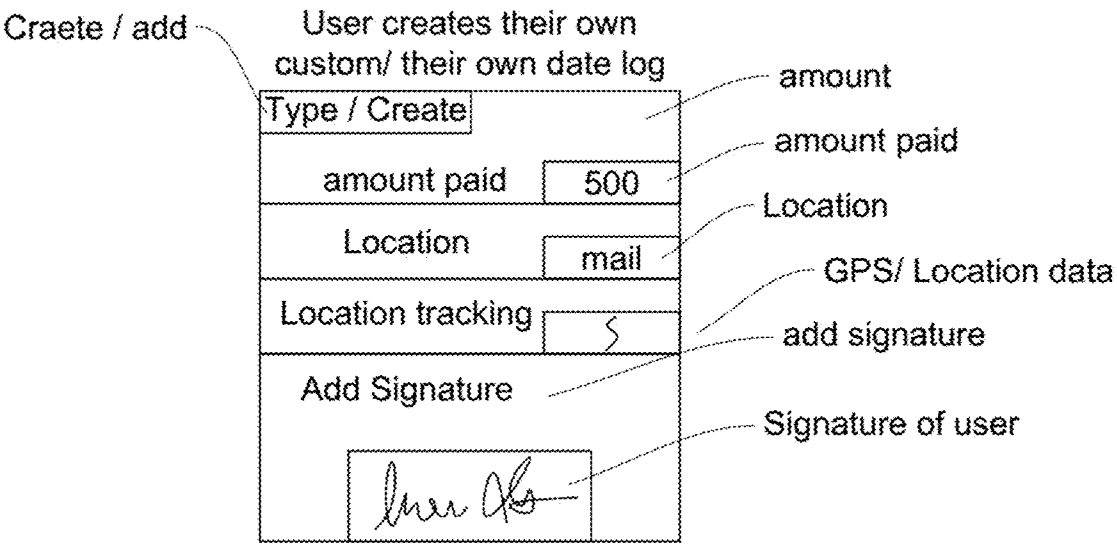
Figure 264:
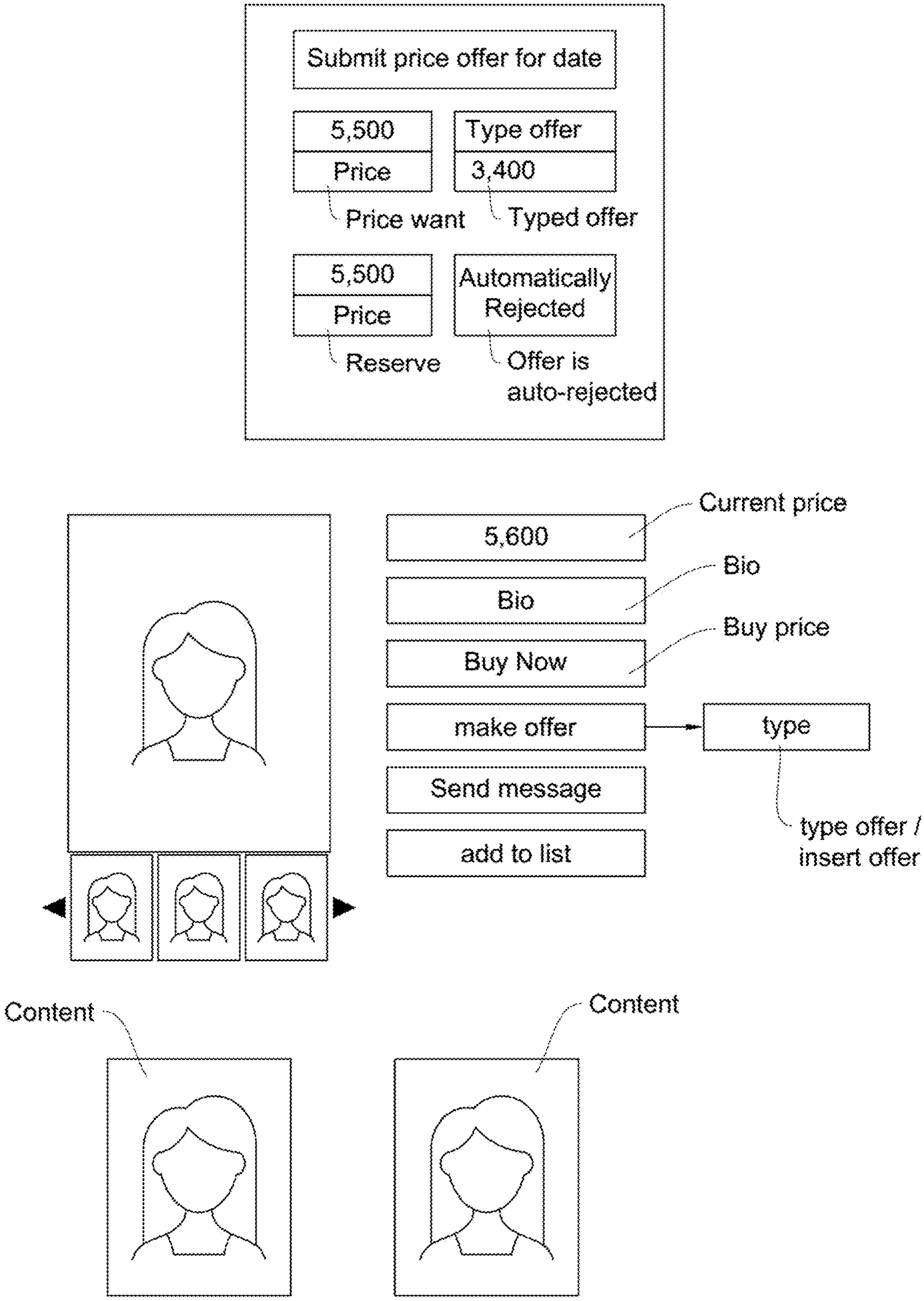
Figure 265:
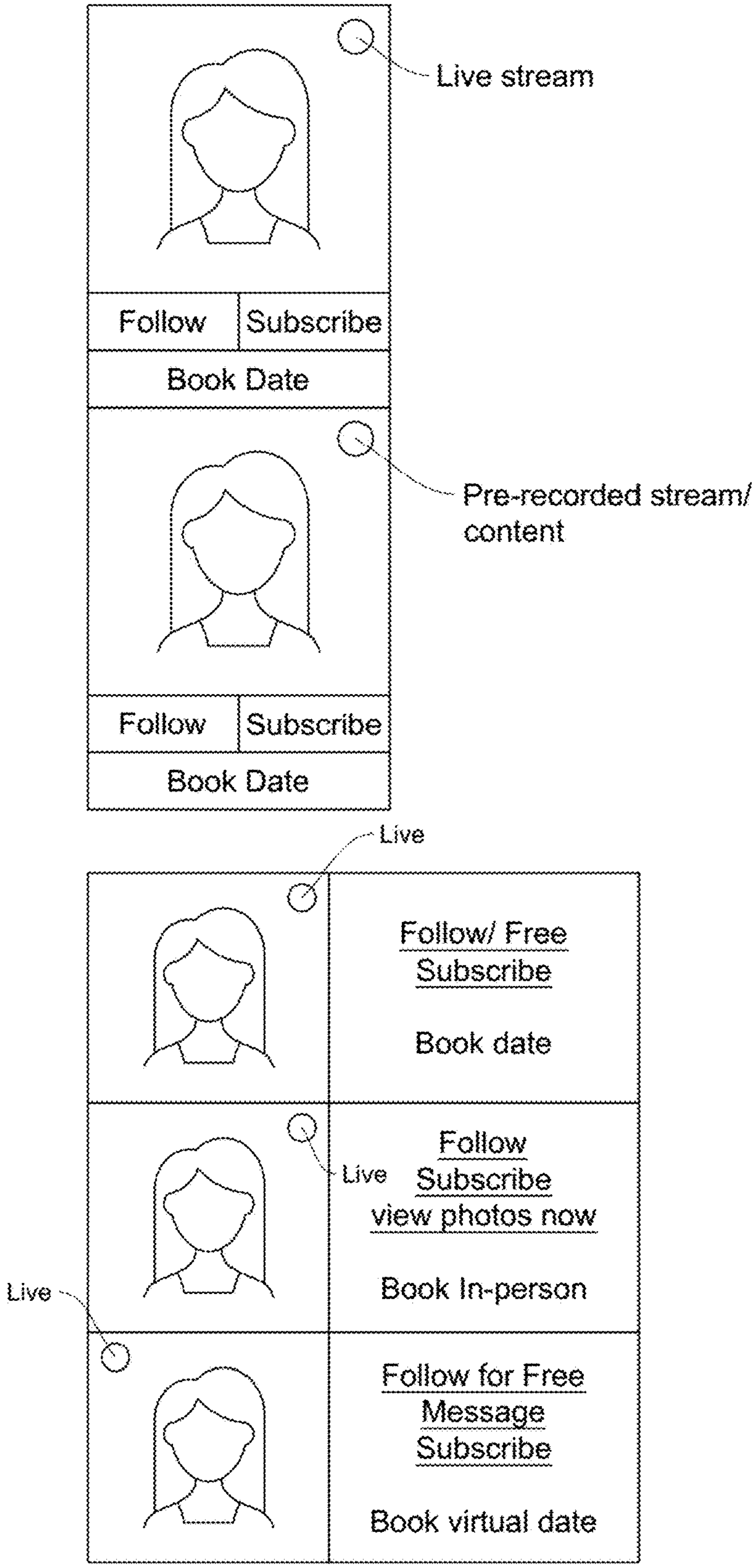
Figure 266:
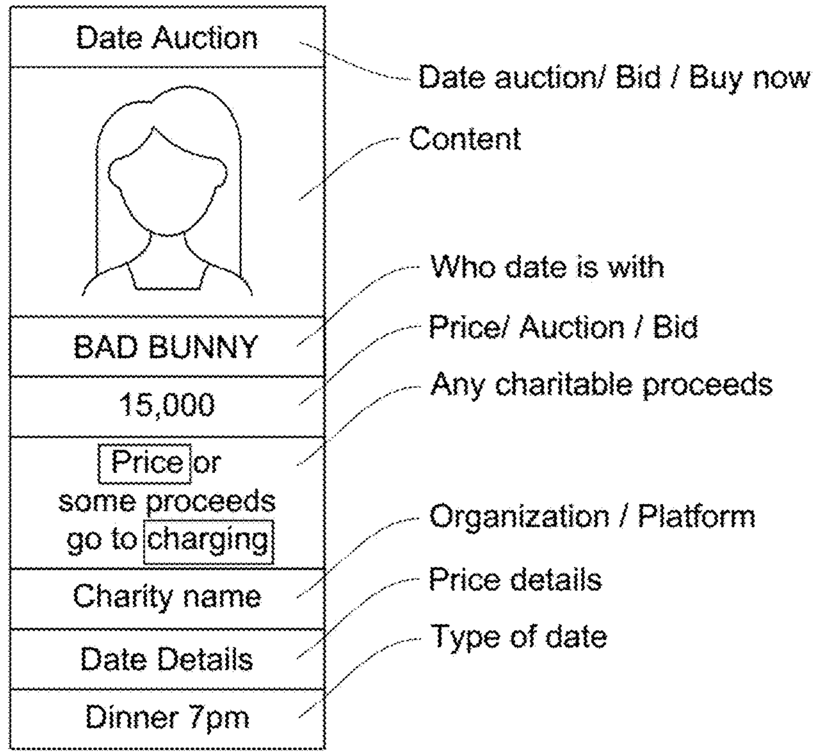

In some embodiments, FIG. 255 or any user interface may show a combination of or separate, or only one of: a user's (e.g., calendar, timing method, schedule method, scheduling method, timing data center, etc.) which may include but not be limited to (e.g., availability, prices, price range, range, options, activities, date methods, date options, etc.) which may be, which may include not be limited to (e.g., stationary or move, or show up in different places, show on different user interfaces, etc.) In some embodiments, FIG. 255 may show a list of other users that are available as well during that time period, range, month, day, week, weekend, weekday, month, area, etc.) In some embodiments, FIG. 255 may show a list of matches or a list of other people that, which may include but not be limited to (e.g., may or not be able to be booked for that time period, etc.) In some embodiments, FIG. 255 may allow the user to determine who is available which may include but are not limited to allowing a user to 'favorite or save to a list for that day to determine who that person may choose to book, schedule, inquire about, inquire about, inquire regarding, secure, create connection to, hold, pay for, create business relationship with, use transmittables to secure or book, schedule, inquire about, etc.) date with.' In some embodiments, FIG. 255 or FIG. 257 or any interface may allow a, which may include but not be limited to (e.g., list, scroll, combination, varied etc.) which may include but not be limited to (e.g., profiles, persons, entities, users, public persons, etc.) that match or are similar based on availabilities for dates, times, locations, etc.) In some embodiments, FIG. 255 or FIG. 257 may allow any user to 'add person to list based on who (e.g., user, person, entity, 3rd party, etc.) want to date or to review a list on daters available' or review a list or section to compare who to book, schedule, inquire about, inquire about, inquire regarding, secure, create connection to, hold, pay for, create business relationship with, use transmittables to secure or book, schedule, inquire about, etc.) with, who to subscribe to, who to follow, etc.)

In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, areas, profiles, content, or hologram or display screens, etc.) to continue to look or get automated, which may include but not be limited to (e.g., looking, viewings of, movement, selection, scroll, etc.) which may include but not be limited to (e.g., content, creators, models, users, etc.)

FIG. 86, FIG. 87A, FIG. 87B, FIG. 88, FIG. 89: In some embodiments, there may be a (e.g., live bidding, auction, payments, exchangeable, gifts for, gifting, auction, etc.) which may include but not limited to (e.g., persons, dates, mystery, surprise persons or activities, activities, date types, etc.) that may be in exchange for, which may include but not limited to (e.g., payment, assets, or charity donations, etc.) In some embodiments, live bidding/auction may be which may include but not limited to (e.g., currently live, a past live bidding/auction show, a preview of a bidding/auction show, a computer generated show, an automated bidding/auction platform or suggestion, a manual bidding/auction platform, etc.) In some embodiments, the user may be able to, which may include but not be limited to (e.g., aware of, informed, shown, suggested, etc.) of the 'type of bidding/auction' or the 'type of platform they are on' or 'what comes from clicking on this platform.' In some embodiments, there may be options for payments that are pre-selected, or an option to 'type in the bid or the payment amount.' In some embodiments, there may be information regarding where the bidding/auction is taking place, or example a 'live bidding/auction show' or a 'live or pre-recorded bidding/auction show or session.' In some embodiments, there may be a sections that may show where the, which may include but not limited to (e.g., date, activity etc.) may be taking place or a general idea of what the 'winning bid or payment' may give the, which may include but not limited to (e.g., user, paying person' or 'consideration person,' etc.) In some embodiments, there may be options to 'redeem pre-loaded funds, or gift cards that are pre-paid or pre-cleared or 'redeem points' or 'pay now' or 'use assets to pay, or pay with crypto or money, or something of value etc.) In some embodiments, all 'dates or activities whether, which may include but not be limited to (e.g., in person, virtual, live, or phone call, hologram etc.) may be, which may include but not be limited to (e.g., exchanged for payment, assets, or charity donations, or any type of charity payments, donations, partial donations, proceeds to charity, pledging to charity, etc.)

Figure 91:
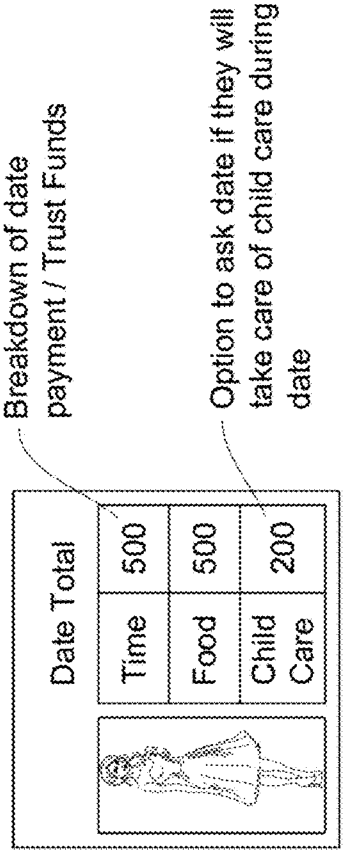

FIG. 91: In some embodiments, there may be an option for the creator or model, entity, 3rd party, user, etc.) to add in an optional or a mandatory payment for, which may include but not be limited to (e.g., nanny, cleaner, service, chef, childcare, etc.) during the time of the 'in-person date or any type of connection.' In some embodiments, there may be an option for a, which may include but not be limited to (e.g., breakdown, itemized, receipt, invoice, total, partial, breakdown, bill, summary of, total, etc.) or a viewing of itemized receipt, invoice, total, partial, breakdown, bill, s or an itemized (e.g., breakdown, itemized, receipt, invoice, total, partial, breakdown, bill, a summary of, total, etc.) of what each 'charge or temporary charge covers,' which may include but not be limited to (e.g., 'childcare costs for period, food trust fund, date money trust fund, gift for date, send gift for date, payment or gift in exchange for date or time, gas, clothing, or any other cost the other person may be faced with to go out on this date, or to make this connection or to agree to this date, etc.)

In some embodiments, there may be a user interface that may allow users to which may include but is not limited to (e.g., book, schedule, inquire about, inquire about, inquire regarding, secure, create a connection to, hold, pay for, create business relationship with, use transmittables to secure or book, schedule, inquire about, etc.) which may include but not limited to (e.g., jobs, gigs, events, parties, on-going jobs, on-going events, etc.) through platform(s) or which may include but not limited to (e.g., hire, find help, find assistance, pay someone else for any reasons, pay someone for assistance or goods or services, etc.) through, which may include but not limited to (e.g., platform or 3rd parties, advertisers, advertisements, businesses, or entities, or persons, etc.) In some embodiments, which may include but not limited to (e.g., options or ways to hire, options available, or any possibilities of opportunities, etc.) may include but not be limited to (e.g., find a personal assistant, browse through personal assistants, hire a personal assistant, hire a nanny, find a nanny, find/hire a chef, hire a driver, hire security, etc.) In some embodiments, there may be options that may include but not be limited to (e.g., paying on credit, paying cash, paying one-time, paying monthly, using credit, using rewards, having a 3rd party or another user pay, debit, immediate payment options, etc.) In some embodiments, there may be options to view potential 'hires' or 'those for work's history,' which may include but not be limited to (e.g., how many jobs they have previously booked on the platform, their ratings, how many creators or models they've worked with, how many jobs they've done, their ratings for each job, their total ratings, comments, feedback, background check, background verification, etc.)

In some embodiments, there may be options to book, schedule, inquire about, inquire about, inquire regarding, secure, create connection to, hold, pay for, create business relationship with, use transmittables to secure or book, schedule, inquire about, etc.) a 'party virtual date' which may refer to 'multiple shorter or multiple regular time or any time of dates' in a row or may include but not be limited to (e.g., one right after the other or one the same day or on different days, staggered, etc.) In some embodiments, there may be options to choose may include but not be limited to (e.g., person or persons, users, or outside users, or outside persons, or 3rd parties, advertisers, advertisements, businesses, or entities, etc.) In some embodiments, there may be options to see may include but not be limited to (e.g., breakdown, itemized, receipt, invoice, total, partial, breakdown, bill, summary of, total, etc.) which may include but not be limited to (e.g., prices, price ranges, general pricing, general transmittables, and time, a total to pay, a checkout window, a checkout options, 3rd party options to check out, ways to pay, etc.) In some embodiments, there may be options to increase or decrease time which may, which may include but not be limited to (e.g., 'fluctuate price, or total, etc.) In some embodiments, which may include but not be limited to (e.g., data, inputted data, AI-analyzed data, data, etc.) which may include but not be limited to, (e.g., age range, age, demographics, net worth, amount spent, funds in account, frequencies of dates, booked dates, virtual dates, in-person dates, history, history of dates, preferences, computing operation data gathered, gathered data, amount of money spent, frequencies of dates, time spent on platform, login frequencies, demographic data, looks, what content or availability, or features to show on profile based on age range features, etc.) may be used to, which may include but not be limited to (e.g., automatically, manually, or AI-changed, or AI-determined, manually change, automatically change or etc.) which may include but not be limited to (e.g., fluctuate, change, determine, etc.) which may include but not be limited to (e.g., prices, location, availability, features, experience, options that are available, content being shown, etc.) In some embodiments, there may be options to adjust may include but not be limited to (e.g., 'adjust prices, price ranges, general pricing, general transmittables, adjust times, dates, location, time period, frequency, etc.) In some embodiments, there may be options to may include but not be limited to (e.g., lower price, change price, switch price, funds application, apply funds, etc.) or change may include but not be limited to (e.g., booking calendar or booking (e.g., breakdown, itemized, receipt, invoice, total, partial, breakdown, bill, summary of, total, etc.) or booking due to price changes, time changes, etc.)

In some embodiments, there may be an user interface where user may be able to see upcoming, daily or monthly, or weekly, or any time period of, which may include but not be limited to (e.g., 'connections' or 'booking' or dates' or suggestions, or others calendars, or persons calendar, or suggested users, or live shows, or unlocked content, or new content, or a feed, or suggestions, or live information, or current information etc.) In some embodiments, there may be a, which may include but not be limited to (e.g., breakdown, itemized, receipt, invoice, total, partial, breakdown, bill, summary of, total, etc.) of today's schedule or any time period, which may include but not be limited to (e.g., a time period of time, schedule, a suggested schedule, suggested booking, a suggested time block etc.) which may include but not be limited to (e.g., user or time or any type of suggestions, actual booked persons, checkout options to book, schedule, inquire about, inquire about, inquire regarding, secure, create connection to, hold, pay for, create business relationship with, use transmittables to secure or book, schedule, inquire about, etc.) more users, or to book, schedule, inquire about, inquire about, inquire regarding, secure, create connection to, hold, pay for, create business relationship with, use transmittables to secure or book, schedule, inquire about, etc.) users, availability of person, availability of other users, matches, schedule matching AI-connecting, a calendar, which may include but not be limited to (e.g., breakdown, itemized, receipt, invoice, total, partial, breakdown, bill, summary of, total, etc.) future calendar's, which may include but not be limited to (e.g., breakdown, itemized, receipt, invoice, total, partial, breakdown, bill, summary of, total, etc.) of time person is available, which may include but not be limited to (e.g., breakdown, itemized, receipt, invoice, total, partial, breakdown, bill, summary of, total, etc.) of types of date, which may include but not be limited to (e.g., breakdown, itemized, receipt, invoice, total, partial, breakdown, bill, summary of, total, etc.) s person is available, hours person or user is available, funds available, credit lines available, money in account, assets, financial (e.g., breakdown, itemized, receipt, invoice, total, partial, breakdown, bill, summary of, total, etc.) s of 'credit lines' or money, availability of users, funds, money, suggested users, book virtual, book talk, book chat, book video chat, book video meeting, book voice conversation, book in person, live shows, promoted show, pre-recorded shows, persons, suggestions, calendar bookings, settings, user settings, notifications, live or current availability etc.)

In some embodiments, there may be options such as 'confirming date' or a (e.g., breakdown, itemized, receipt, invoice, total, partial, breakdown, bill, summary of, total, etc.) of the date' or a (e.g., breakdown, itemized, receipt, invoice, total, partial, breakdown, bill, summary of, total, etc.) of the payment of the date plus information' or a, which may include but not be limited to (e.g., breakdown, itemized, receipt, invoice, total, partial, breakdown, bill, summary of, total, etc.) of information regarding the date or connection, etc.) In some embodiments, there may be options such as which may include but not limited to (e.g., 'send introductory video' or 'send video proposal' or 'send content' etc.) where there may be an exchange of payment or a fee, or asset in exchange for, which may include but not limited to (e.g., sending message, or sending content, or introductions, whether content related or live or virtual, or in person, etc.) In some embodiments, there may be options for user to request from another user such as which may include but not limited to (e.g., prices, price ranges, general pricing, general transmittables, rates, requirements, information' or to ask for a 'date request') another example would be, which may include but not limited to (e.g., having the other user create the ideal scenario which may include or not include payment to book, schedule, inquire about, inquire about, inquire regarding, secure, create connection to, hold, pay for, create business relationship with, use transmittables to secure or book, schedule, inquire about, etc.) or to secure, etc.) In some embodiments, user interface, which may include but not be limited to (e.g., screen, hologram, user interface, viewing display, user interface, etc.) which may include but not be limited to (e.g., public, private, hidden, separate, shown, not shown, special links, special sent, sent items, etc.) which may include but not be limited to (e.g., demonstrate, link, 3rd party integration, allow payment for, etc.) which may include but not be limited to (e.g., users, persons, models, creators, etc.) which may include but not be limited to (e.g., bills, total payments, total expenses, total bills as an invoice, invoice of expenses, expenses, separate expenses, list of expenses, list of items to be paid, bills, etc.) every, which may include but not be limited to (e.g., month, year, day, week, period, fiscal year, calendar year, lifetime, forever, etc.) In some embodiments, there may be, which may include but not be limited to (e.g., separate link, 3rd party integration, separate integration, link, funding, payments, money, assets, etc.) which may allow or include but not be limited to (e.g., processing, transactional payment, payment, asset exchange, asset giving, money giving, donations, money, etc.) that may go to the platform for the, which may include but not be limited to (e.g., donor, user, paying person, fan, boyfriend, special person, person dating, dater etc.) to pay their, which may include but not be limited to (e.g., model, user, creator, dater, person being paid, etc.) which may include but not be limited to (e.g., bills, items, wants, needs, suggestions, debts, debtors, landlords, government, entities, persons, etc.) each, which may include but not be limited to (e.g., month, year, day, week, period, fiscal year, calendar year, lifetime, forever, etc.)

In some embodiments, there may be an, which may include but not be limited to (e.g., autopay, automatic, (e.g., timer, time stamp, location stamp, business location stamp, confirmation of time, location, data, etc.) calendar set up, automatic set up, auto transfer, transfer, etc.) option that the 'dater' or 'other person' may be able to, which may include but not be limited to (e.g., turn on, create, list, implement, allow, agree to, set up, link, contractually agree to, verbally agree to, etc.) which may create an, which may include but not be limited to (e.g., autopay, automatic, (e.g., timer, time stamp, location stamp, business location stamp, confirmation of time, location, data, etc.) calendar set up, automatic set up, auto transfer, transfer, etc.) method. In some embodiments, this may allow the 'dater' to be 'transparent' or 'upfront' about their expenses each month to show how they need help or, which may include but not be limited to (e.g., show where they need payments to be directed to, show 3rd party, link 3rd party, integrate 3rd party, integrate payment options, allow payments to be made to, allow donations for, allow money to be used towards, allow money, accept payment, etc.) In some embodiments, the user interface may allow a, which may include but not be limited to (e.g., the link that leads the person directly to show whom they are paying on behalf of 'who' meaning the 'creator' or person, automatic payment, anonymous payment, any payment, partial payment, secure payment, donation payment, partially pay, transfer money, etc.) In some embodiments, user interface may 'private sensitive (any) information,' which may include but not be limited to (e.g., make any information private, allow private payment, allow anonymous payment, allow anonymous partial payment, allow donation privately, anything or any part may be private such as their first and last name or other identifying information, allow the 'dater' to make an 'anonymous' payment or set up an 'anonymous autopay' for any expense, donation request, item request, bill, item owed, debt owed, etc.) In some embodiments, there may also be a, which may include but not be limited to (e.g., button, option, 3rd party link, 3rd party integration, partial payment, payment, asset exchange, any asset acceptance, etc.) for the 'dater' or the person to pay their, which may include but not be limited to (e.g., entire or partial, or any part, etc.) of, which may include but not be limited to (e.g., listed, shown, demonstrated, verbally spoken, contractually added, agreed upon, shown, asked for, etc.) which may include but not be limited to (e.g., expenses, items, needs, wants, suggestions, bills, past debts, debts, etc.) which may disperse, which may include but not be limited to (e.g., any, partial, all, etc.) payments to the entirely which may be, which may include but not be limited to (e.g., separate, together, senate items, separate expenses, different bills, different debts, etc.) to the appropriate, which may include but not be limited to (e.g., debtors, landlords, entities, businesses, debtors, college tuition payments, vendors, persons, humans, robotics, entities, payments to be made with any pre-payment or debt, etc.) In some embodiments, the options that may pull up when the option to, which may include but not be limited to (e.g., exchange assets, send assets, use assets, pay, make payment, etc.) may be clicked which may be demonstrated, which may include but not be limited to (e.g., (1) 'here is the one-time payment for the month of xyz' (2) set up auto payment for 'then (e.g., you may, user, person, entity, 3rd party, robot, artificial intelligence, etc.) may click how many months to autopay this specific payment.' etc.) In some embodiments, for example, which may include but not be limited to (e.g., the autopay may show that user interface may be may cancelled after month one, etc.) by (e.g., choosing, allowing, having accepted, automatic acceptance, manually accepting, allowing, voice commands, artificial intelligence-created or assisted or chosen, clicking, etc.) which may include not be limited to (e.g., 'may have cancellation options,' or editable options, or editing options, etc.) which may be any type of which may include not be limited to (e.g., cancellation, changing, editing, furthering, extending, etc.) options such as, which may include but not be limited to (e.g., voice commands, auto-cancellation, auto-change, auto-update, AI update, AI-change, AI-cancel, manual cancellation, robotic cancellation, AI cancellation, etc.) In some embodiments, the 'one-time payment' may be the full amount to, which may include but not be limited to (e.g., cover, be sent to, complete, accept, etc.) or there may be an option to choose, which may include but not be limited to (e.g., how much, partial, portion of etc.) of the payment to be made, for example, which may include but not be limited to (e.g., [one payment options, which may be to pay rent for month of October], the option is to pay [500 of 1,300 of rent for month of October.], etc.) In some embodiments, user interface may show remaining balance' which may be, which may include but not be limited to (e.g., created balance, 3rd party balance, manually created balance, automatic balance, shown balance, shown payment, etc.) which may be after the payment is made which may allow, which may include but not be limited to (e.g., order, option, viewing, option to finish, option to pay, balance viewing, auto-payment to be made etc.) for the rest to be paid which may come after their 'partial' payment option. Some embodiments, which may include but are not limited to (e.g., full, partial, auto payments, any payment, any donation, donations, acceptances, etc.), may be available as options. In some embodiments, which may include but not be limited to (e.g., rewards, recognition, upgrades, acknowledges, acknowledges, VIP, special treatment, etc.) may be offered or awarded for, which may include but not be limited to (e.g., making payments for bills or other expenses, setting up automatic payment for bills, paying all expenses, making partial payments, covering important payments such as 'rent, etc.) which may be offered or awarded in ways such as a, which may include but not be limited to (e.g., badge' or an 'award, etc.) on behalf of the, which may include but not be limited to (e.g., platform, the date, creator, entity, 3rd party, etc.) In some embodiments, the award may be a virtual reward such as a badge, or a nice email, or something automatic or manually written.

Figure 92:
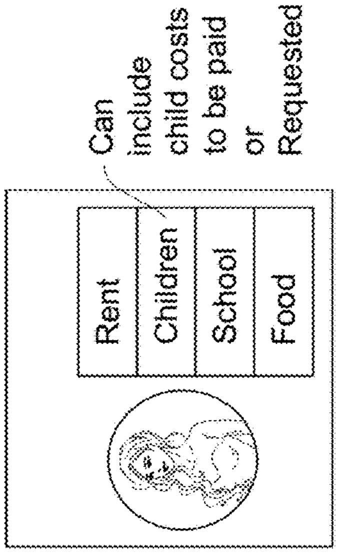
Figure 93:
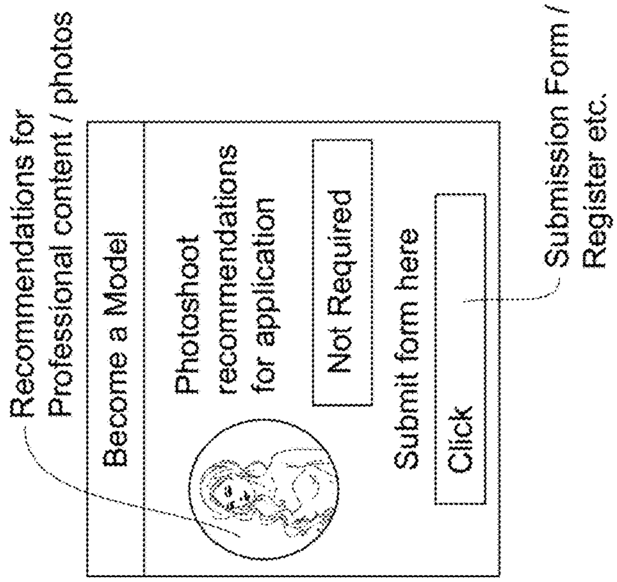

FIG. 91, FIG. 92, FIG. 93: In some embodiments, which may include but not be limited to (e.g., the creator, model, or person, user, etc.) may be able to, which may include but not be limited to (e.g., ask for childcare to be covered or any other payments or recurring payments they need to be covered, and/or to show how much money it costs them to live each month, etc.) In some embodiments, which may include but not be limited to (e.g., costs, bills, wants, needs, total costs, etc.) that, which may include but not be limited to (e.g., they, person, user, model, etc.) may have, which may include but not be limited to (e.g., each month, each day, period, each year, for any period, etc.) may be, which may include but not be limited to (e.g., privately shared, publicly shared, shown, displayed, the user interface may be public, etc.) and/or user interface may be used to show any, which may include but not be limited to (e.g., reason, data, justifiable, etc.) which may include but not be limited to (e.g., why date price is so much, or used to justify the price of the date or the cost of the date or the cost of the person's time, etc.)

In some embodiments, there may be an option for, which may include but is not limited to, the: (e.g., creator or model, entity, 3rd party, user, user, person, entity, etc.) to add in, which may include but not limited to an: (e.g., optional, mandatory, suggested, etc.) which may include but not limited to (e.g., payment, asking, suggestion, question, booking, securing, etc.) for, which may include but not be limited to (e.g., nanny, cleaner, service, chef, childcare, etc.) during the time of the 'in-person date or any type of connection.' In some embodiments, there may be an option for a, which may include but not be limited to (e.g., breakdown, itemized, receipt, invoice, total, partial, breakdown, bill, a summary of, total, etc.) or a viewing of itemized receipt, invoice, total, partial, breakdown, bill, s or an itemized (e.g., breakdown, itemized, receipt, invoice, total, partial, breakdown, bill, summary of, total, etc.) of what each 'charge or temporary charge covers,' which may include but not be limited to (e.g., 'childcare costs for period, food trust fund, date money trust fund, payment for date or time, gas, clothing, gift in exchange for date, or any other cost the other person may be faced with to go out on this date, or to make this connection or to agree to this date, etc.)

In some embodiments, there may be a user interface that may allow users to which may include but is not limited to (e.g., book, schedule, inquire about, inquire about, inquire regarding, secure, create connection to, hold, pay for, create a business relationship with, use transmittables to secure or book, schedule, inquire about, etc.) which may include but not limited to (e.g., jobs, gigs, events, parties, on-going jobs, on-going events, etc.) through platform(s) or which may include but not limited to (e.g., hire, find help, find assistance, pay someone else for any reasons, pay someone for assistance or goods or services, etc.) through, which may include but not limited to (e.g., platform or 3rd parties, advertisers, advertisements, businesses, or entities, or persons, etc.) In some embodiments, which may include but not limited to (e.g., options or ways to hire, or options available, or any possibilities of options, etc.) may include but not be limited to (e.g., find a personal assistant, browse through personal assistants, hire a personal assistant, hire a nanny, find a nanny, find/hire a chef, hire a driver, hire security, etc.) In some embodiments, options may include but are not limited to (e.g., paying on credit, paying cash, paying one-time, paying monthly, using credit, using rewards, having a 3rd party or another user pay, debit, immediate payment options, etc.) In some embodiments, there may be options to view potential 'hires' or 'those for work's history" which may include but not be limited to (e.g., how many jobs they have previously booked on the platform, their ratings, how many creators or models they've worked with, how many jobs they've done, their ratings for each job, their total ratings, comments, feedback, background check, background verification, etc.)

In some embodiments, there may be options to book, schedule, inquire about, inquire about, inquire regarding, secure, create connection to, hold, pay for, create business relationship with, use transmittables to secure or book, schedule, inquire about, etc.) a 'party virtual date' which may refer to 'multiple shorter or multiple regular time or any time of dates' in a row or may include but not be limited to (e.g., one right after the other or one the same day or on different days, staggered, etc.) In some embodiments, there may be options to choose may include but not be limited to (e.g., person or persons, users, or outside users, or outside persons, or 3rd parties, advertisers, advertisements, businesses, or entities, etc.) In some embodiments, there may be options to see may include but not be limited to (e.g., breakdown, itemized, receipt, invoice, total, partial, breakdown, bill, summary of, total, etc.) which may include but not be limited to (e.g., prices, price ranges, general pricing, general transmittables, and time, a total to pay, a checkout window, a checkout options, 3rd party options to check out, ways to pay, etc.) In some embodiments, there may be options to increase or decrease time which may, which may include but not be limited to (e.g., 'fluctuate price, or total, etc.) In some embodiments, there may be options to adjust may include but not be limited to (e.g., 'adjust prices, price ranges, general pricing, general transmittables, adjust times, dates, location, time period, frequency, etc.) In some embodiments, there may be options to may include but not be limited to (e.g., lower price, change price, switch price, funds application, apply funds, etc.) or change may include but not be limited to (e.g., booking calendar or booking (e.g., breakdown, itemized, receipt, invoice, total, partial, breakdown, bill, summary of, total, etc.) or booking due to price changes, time changes, etc.)

In some embodiments, there may be an user interface where user may be able to see upcoming, daily or monthly, or weekly, or any time period of, which may include but not be limited to (e.g., 'connections' or 'booking' or dates' or suggestions, or others calendars, or persons calendar, or suggested users, or live shows, or unlocked content, or new content, or a feed, or suggestions, or live information, or current information etc.) In some embodiments, there may be a, which may include but not be limited to (e.g., breakdown, itemized, receipt, invoice, total, partial, breakdown, bill, summary of, total, etc.) of today's schedule or any time period, which may include but not be limited to (e.g., a time period of time, schedule, a suggested schedule, suggested booking, a suggested time block etc.) which may include but not be limited to (e.g., user or time or any type of suggestions, actual booked persons, checkout options to book, schedule, inquire about, inquire about, inquire regarding, secure, create connection to, hold, pay for, create business relationship with, use transmittables to secure or book, schedule, inquire about, etc.) more users, or to book, schedule, inquire about, inquire about, inquire regarding, secure, create connection to, hold, pay for, create business relationship with, use transmittables to secure or book, schedule, inquire about, etc.) users, availability of person, availability of other users, matches, schedule matching AI-connecting, a calendar, which may include but not be limited to (e.g., breakdown, itemized, receipt, invoice, total, partial, breakdown, bill, summary of, total, etc.) future calendar's, which may include but not be limited to (e.g., breakdown, itemized, receipt, invoice, total, partial, breakdown, bill, summary of, total, etc.) of time person is available, which may include but not be limited to (e.g., breakdown, itemized, receipt, invoice, total, partial, breakdown, bill, summary of, total, etc.) of types of date, which may include but not be limited to (e.g., breakdown, itemized, receipt, invoice, total, partial, breakdown, bill, summary of, total, etc.) s person is available, hours person or user is available, funds available, credit lines available, money in account, assets, financial (e.g., breakdown, itemized, receipt, invoice, total, partial, breakdown, bill, summary of, total, etc.) s of 'credit lines' or money, availability of users, funds, money, suggested users, book virtual, book talk, book chat, book video chat, book video meeting, book voice conversation, book in person, live shows, promoted show, pre-recorded shows, persons, suggestions, calendar bookings, settings, user settings, notifications, live or current availability etc.)) In some embodiments, user interface may show, which may include but not be limited to (e.g., earnings, payouts, referrals, pending payments, pending requests, amounts earned, amount earned, amount, fees, net payment, gross payment, statement, earnings, profile, statements, taxes, 3rd parties for taxes, 3rd parties, advertisers, advertisements, businesses, outside entities, outside parties, messages, queue, home, profile, messages, earnings from messages, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

In some embodiments, there may be options such as 'confirming date' or a (e.g., breakdown, itemized, receipt, invoice, total, partial, breakdown, bill, a summary of, total, etc.) of the date' or a (e.g., breakdown, itemized, receipt, invoice, total, partial, breakdown, bill, a summary of, total, etc.) of the payment of the date plus information' or a, which may include but not be limited to (e.g., breakdown, itemized, receipt, invoice, total, partial, breakdown, bill, a summary of, total, etc.) of information regarding the date or connection, etc.) In some embodiments, there may be options such as which may include but are not limited to (e.g., 'send introductory video' or 'send video proposal' or 'send content' etc.) where there may be an exchange of payment or a fee, or asset in exchange for, which may include but not limited to (e.g., sending the message, or sending content, or introductions, whether content related or live or virtual or in person, etc.) In some embodiments, there may be options for the user to request from another user such as which may include but are not limited to (e.g., prices, price ranges, general pricing, general transmittables, rates, requirements, information, or to ask for a 'date request') another example would be, which may include but not limited to (e.g., having the other user create the ideal scenario which may include or not include payment to book, schedule, inquire about, inquire about, inquire regarding, secure, make a connection to, hold, pay for, create a business relationship with, use transmittables to secure or book, schedule, inquire about, etc.) or secure, etc.)

In some embodiments, user interface, which may include but not be limited to (e.g., screen, hologram, user interface, viewing display, user interface, etc.) which may include but not be limited to (e.g., public, private, hidden, separate, shown, not shown, special links, special sent, sent items, etc.) which may include but not be limited to (e.g., demonstrate, link, 3rd party integration, allow payment for, etc.) which may include but not be limited to (e.g., users, persons, models, creators, etc.) which may include but not be limited to (e.g., bills, total payments, total expenses, total bills as an invoice, invoice of expenses, expenses, separate expenses, list of expenses, list of items to be paid, bills, etc.) every, which may include but not be limited to (e.g., month, year, day, week, period, fiscal year, calendar year, lifetime, forever, etc.) In some embodiments, there may be, which may include but not be limited to (e.g., separate link, 3rd party integration, separate integration, link, funding, payments, money, assets, etc.) which may allow or include but not be limited to (e.g., processing, transactional payment, payment, asset exchange, asset giving, money giving, donations, money, etc.) that may go to the platform for the, which may include but not be limited to (e.g., donor, user, paying person, fan, boyfriend, special person, person dating, dater etc.) to pay their, which may include but not be limited to (e.g., model, user, creator, dater, person being paid, etc.) which may include but not be limited to (e.g., bills, items, wants, needs, suggestions, debts, debtors, landlords, government, entities, persons, etc.) each, which may include but not be limited to (e.g., month, year, day, week, period, fiscal year, calendar year, lifetime, forever, etc.)

In some embodiments, there may be an, which may include but not be limited to (e.g., autopay, automatic, (e.g., timer, time stamp, location stamp, business location stamp, confirmation of time, location, data, etc.) calendar set up, automatic set up, auto transfer, transfer, etc.) option that the 'dater' or 'other person' may be able to, which may include but not be limited to (e.g., turn on, create, list, implement, allow, agree to, set up, link, contractually agree to, verbally agree to, etc.) which may create an, which may include but not be limited to (e.g., autopay, automatic, (e.g., timer, time stamp, location stamp, business location stamp, confirmation of time, location, data, etc.) calendar set up, automatic set up, auto transfer, transfer, etc.) method. In some embodiments, this may allow the 'dater' to be 'transparent' or 'upfront' about their expenses each month to show how they need help or, which may include but not be limited to (e.g., show where they need payments to be directed to, show 3rd party, link 3rd party, integrate 3rd party, integrate payment options, allow payments to be made to, allow donations for, allow money to be used towards, allow money, accept payment, etc.) In some embodiments, the user interface may allow a, which may include but not be limited to (e.g., the link that leads the person directly to show whom they are paying on behalf of 'who' meaning the 'creator' or person, automatic payment, anonymous payment, any payment, partial payment, secure payment, donation payment, partially pay, transfer money, etc.) In some embodiments, user interface may 'private sensitive (any) information,' which may include but not be limited to (e.g., make any information private, allow private payment, allow anonymous payment, allow anonymous partial payment, allow donation privately, anything or any part may be private such as their first and last name or other identifying information, allow the 'dater' to make an 'anonymous' payment or set up an 'anonymous autopay' for any expense, donation request, item request, bill, item owed, debt owed, etc.) In some embodiments, there may also be a, which may include but not be limited to (e.g., button, option, 3rd party link, 3rd party integration, partial payment, payment, asset exchange, any asset acceptance, etc.) for the 'dater' or the person to pay their, which may include but not be limited to (e.g., entire or partial, or any part, etc.) of, which may include but not be limited to (e.g., listed, shown, demonstrated, verbally spoken, contractually added, agreed upon, shown, asked for, etc.) which may include but not be limited to (e.g., expenses, items, needs, wants, suggestions, bills, past debts, debts, etc.) which may disperse, which may include but not be limited to (e.g., any, partial, all, etc.) payments to the entirely which may be, which may include but not be limited to (e.g., separate, together, senate items, separate expenses, different bills, different debts, etc.) to the appropriate, which may include but not be limited to (e.g., debtors, landlords, entities, businesses, debtors, college tuition payments, vendors, persons, humans, robotics, entities, payments to be made with any pre-payment or debt, etc.) In some embodiments, the options that may pull up when the option to, which may include but not be limited to (e.g., exchange assets, send assets, use assets, pay, make payment, etc.) may be clicked which may be demonstrated, which may include but not be limited to (e.g., (1) 'here is the one-time payment for the month of xyz' (2) set up auto payment for 'then (e.g., you may, user, person, entity, 3rd party, robot, artificial intelligence, etc.) may click how many months to autopay this specific payment.' etc.) In some embodiments, for example, which may include but not be limited to (e.g., the autopay may show that user interface may be may cancelled after month one, etc.) by (e.g., choosing, allowing, having accepted, automatic acceptance, manually accepting, allowing, voice commands, artificial intelligence-created or assisted or chosen, clicking, etc.) 'may have cancellation options' which may be any type of cancellation options such as, which may include but not be limited to (e.g., voice commands, auto-cancellation, manual cancellation, robotic cancellation, AI cancellation, etc.) In some embodiments, the 'one-time payment' may be the full amount to, which may include but not be limited to (e.g., cover, be sent to, complete, accept, etc.) or there may be an option to choose, which may include but not be limited to (e.g., how much, partial, portion of etc.) of the payment to be made, for example, which may include but not be limited to (e.g., [one payment options, which may be to pay rent for month of October], the option is to pay [500 of 1,300 of rent for month of October.], etc.) In some embodiments, user interface may show remaining balance' which may be, which may include but not be limited to (e.g., created balance, 3rd party balance, manually created balance, automatic balance, shown balance, shown payment, etc.) which may be after the payment is made which may allow, which may include but not be limited to (e.g., order, option, viewing, option to finish, option to pay, balance viewing, auto-payment to be made etc.) for the rest to be paid which may come after their 'partial' payment option. Some embodiments may include but not be limited to (e.g., full, partial, auto payments, any payment, any donation, donations, acceptances, etc.) may be available as options. In some embodiments, which may include but not be limited to (e.g., rewards, recognition, upgrades, acknowledges, acknowledges, VIP, special treatment, etc.) may be offered or awarded for, which may include but not be limited to (e.g., making payments for bills or other expenses, setting up automatic payment for bills, paying all expenses, making partial payments, covering important payments such as 'rent, etc.) which may be offered or awarded in ways such as a, which may include but not be limited to (e.g., badge' or an 'award, etc.) on behalf of the, which may include but not be limited to (e.g., platform, the date, creator, entity, 3rd party, etc.) In some embodiments, the award may be a virtual reward such as a badge, or a nice email, or something automatic or manually written.

Figure 94:
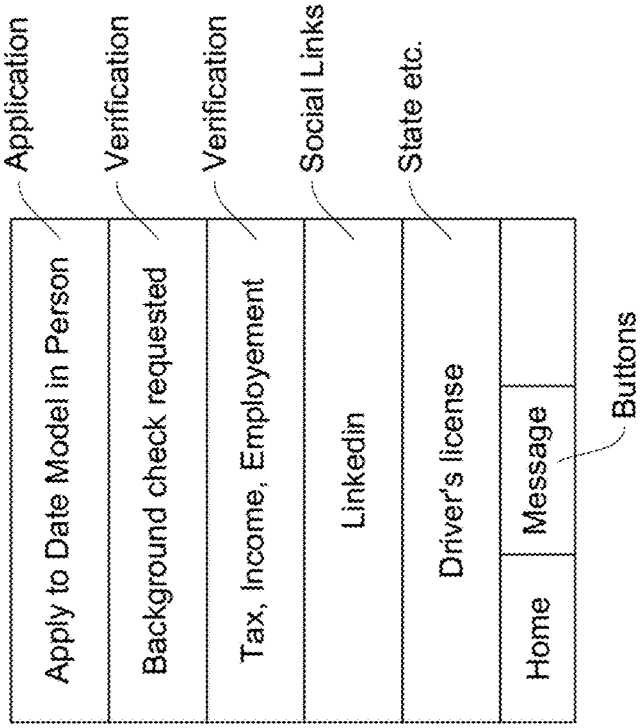

FIG. 94: In some embodiments, there may be a, which may include but not be limited to (e.g., 'become a model' form or 'app to be a model' or 'apply to join' or 'apply to join platform' or apply to go on dates, apply to date in-person, apply and get background check, apply, apply and gain approval, 'apply to make money, apply to date model, apply to date users, apply to go out on dates, apply to become a dater, apply to meet someone, apply to subscribe, apply to view calendars, apply to view information, apply to see, apply to unlock content, etc.) that may be linked to a form or some type of application that may be used to determine if the applier meets the required criteria to become a, which may include but not be limited to (e.g., creator, person, entity, group, user of the platform, user of 3rd party platform, user or any platform, assisted, able to make money, model or a user to get paid on platform, eligible to get paid, etc.) In some embodiments, user interface may link to a, which may include but not be limited to (e.g., identify verification, user information, background information, LinkedIn profiles, linked information, financial background check, asset background check, debt check, house check, car check, criminal record, criminal background, background check, criminal check, model history, content submission, etc.) In some embodiments, there may be options to get a, which may include but not be limited to (e.g., platform photoshoot, professional photoshoot with 3rd party, other professional photoshoot done etc.) but in which user interface may not be required, self-made photos may be used for, which may include but not be limited to (e.g., verification or application purposes or any other purposes, or 3rd party purposes, or private-kept data etc.) In some embodiments, there may be, which may include but not be limited to (e.g., suggestion, category options, options, etc.) which may include but not limited to (e.g., book an in-person date' or 'book a virtual date' or 'discover models near you' or 'view models by distance' or 'book models by distance' or 'view private photos now' or 'unlock private photos now' or 'discover her profile' or 'discover new content' or 'view exclusive content' or 'sign in' or 'register' or 'become a model/creator' or 'apply to be a creator' or 'discover creators,' etc.)

Figure 95:
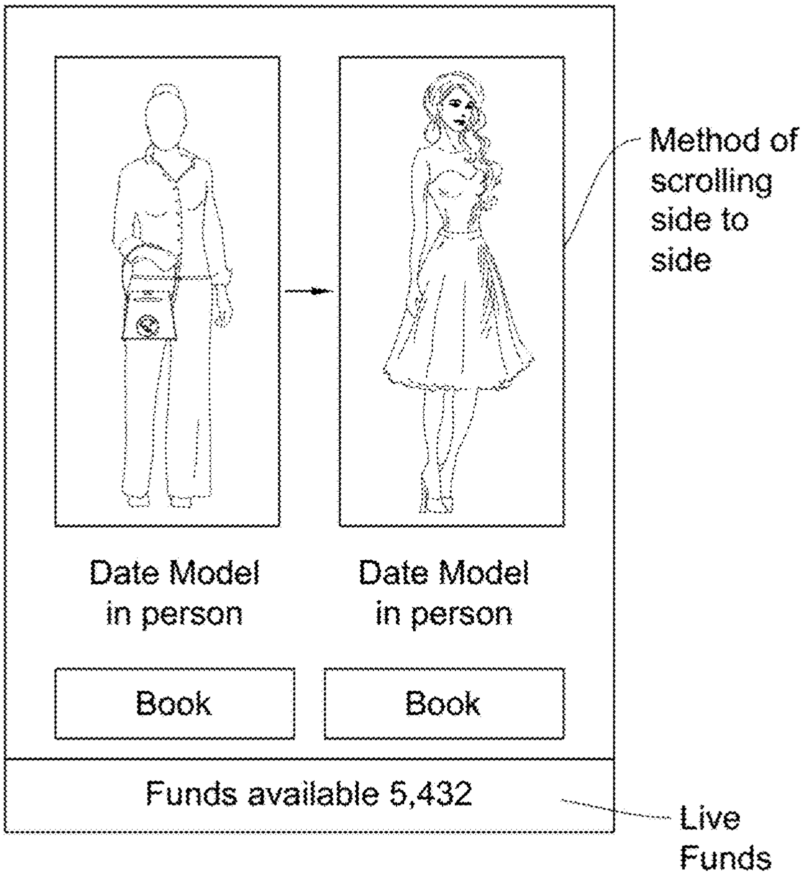

FIG. 95: In some embodiments, there may be (e.g., an application form or page or membership-only page, or page for paying users, or background-checked users, or interested users, or potential daters, etc.) which may include but are not limited to (e.g., applying to date a model in person, apply for virtual dates, apply for in-person only dates, submit background check or do background check for in-person dates, 3rd party background check requirement, personal background check requirement, tax verification, income verification, asset verification, employment verification, driver's license or passport verification, etc.) In some embodiments, there may be options for the home screen, hologram, user interface, viewing display, apply, go to 3rd party to fill out, payment options or payment requirements to submit a form, etc.) In some embodiments, regarding (FIG. 60 or any user interface). In some embodiments, there may be a process in, which may include but not be limited to (e.g., uploading, a completion of, a 3rd party assessment, a human assessment, human data collection, Network address, IP address, platform check, platform type, etc.) may include but not be limited to (e.g., content, pictures, data, driver's license, photos of face, 3rd party background checks, background checks, public information, platform assessment, human assessments, videos, screenshots, changed metadata, changed data connected to content etc.) may be processed with, which may include but not be limited to ((e.g., AI, machine learning, fraud detection, humans, trained persons, computing data, meta data detection, etc.) which may include but not be limited to (e.g., content, pictures, data, driver's license, background checks, 3rd party websites, 3rd parties, advertisers, advertisements, businesses, other platforms, content, public information, founded information, photos of face, videos, etc.) may be rejected due to, which may include but not be limited to (e.g., fraudulent activities on metadata, suspicious metadata, content older than a specific time frame, content not taken during time frame, content from another day or time, etc.) In some embodiments, content may have a time limit to be, which may include but not be limited to (e.g., uploaded, added, considered, used, etc.) from may include but not be limited to (e.g., data of photo or video taken, date of conception, metadata, image or video data, type of content, type of video/picture/item/upload, content taken, etc.)

In some embodiments, badges, which may include but not be limited to (e.g., verifications, confirmed, 3rd party confirmed, 3rd party checked, outside verified, etc.), may show up on either but not be limited to (e.g., creators, users, persons, people, bidders, etc.) user interfaces, which may include but not be limited to (e.g., badges, sections, organizations, organized, part of entity, 3rd party, outside confirmed, distinction, categories, recognition, etc.) may be given to user by the, which may include but not be limited to (e.g., platform, self, user, person, 3rd party site that may verify personal information. 3rd party, entity, 3rd party entity, etc.) In some embodiments, personal information which may include, but not be limited to, which may include but not be limited to (e.g., facial recognition, driver's license verification, 3rd party verified, outside verified, outside confirmed, 3rd party, an outside entity, outside facial recognition, passport verification, types of paid-for verification, whether confirmation was paid for or not, where certification came from, who verified user or person, address verification, no criminal history, criminal history, asset verification, real estate verification, address verification, car verification, etc.) In some embodiments, there may be options such as calendar options or options to choose dates in the calendar which may show a, which may include but not be limited to (e.g., breakdown, itemized, receipt, invoice, total, partial, breakdown, bill, a summary of, total, etc.) and/or an 'itemized version' of the day, week, month, hour, period, activity, etc.) In some embodiments, artificial intelligence may preview the date, such as a 'moving version of the activity or a demonstrated version of the activity, date, time, place, user, content, etc.) In some embodiments, there may be options such as (e.g., 'information regarding the date or connection or person, options to message, send a tip, view profile, view information, view calendar, send calendar, change calendar, manage date, cancellation date, cancellation connection, block, change, raise prices, price ranges, general pricing, general transmittables, send money, change prices, price ranges, general pricing, general transmittables, view background check, pay for a background check, etc.)

Figure 96:
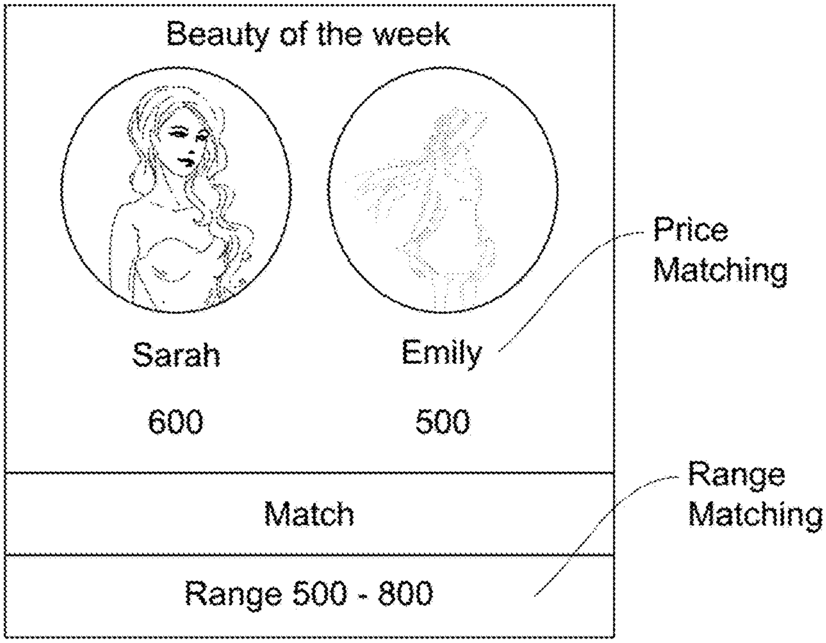
Figure 97:
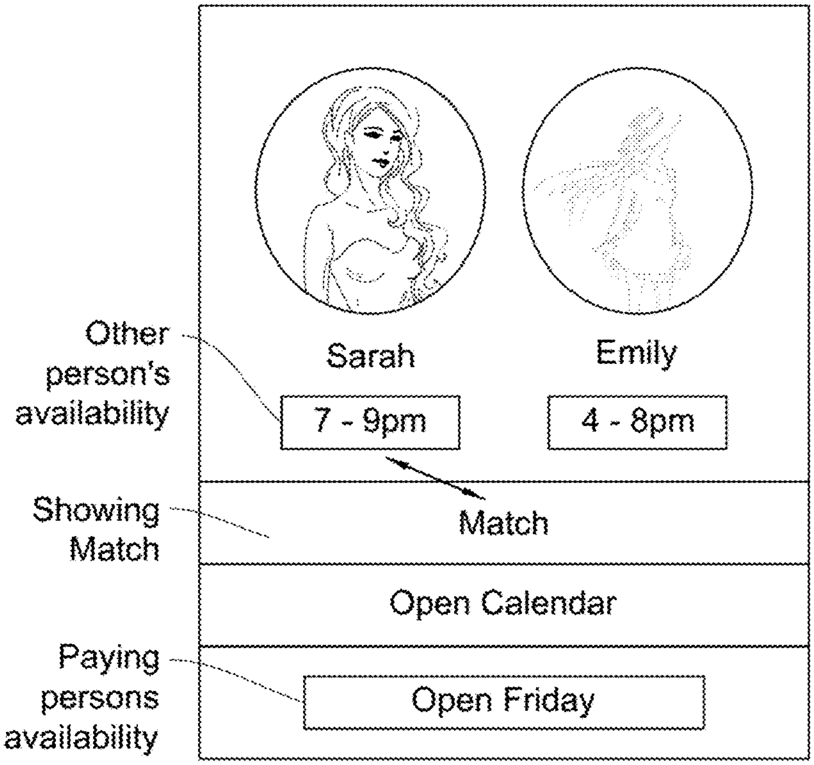

FIG. 95, FIG. 96, FIG. 97: In some embodiments, there may be a, which may include but are not limited to (e.g., platform version of matching or swiping by adding connected or suggested users based on (e.g., 'price range' or 'looks' or 'hobbies' or suggestions' etc.) it may be a (e.g., live or an automated or a manual swiping method etc.) of (e.g., viewing profiles or persons available, or persons listed, or filtered persons, or those available for a date, filtered by category or distance or location, or area, or city, etc.) In some embodiments, the user interface method of swiping or pulling may be similar to a, which may include but is not limited to (e.g., simulation, 4d simulation, 4d, hologram, screen, hologram, user interface, viewing display, viewing, 3d simulation where it seems to be a hologram or pulled out from the screen, hologram, user interface, viewing display, etc.) In some embodiments, there may be a, which may include but are not limited to (e.g., part, area, interface, screen, hologram, notification, message, etc.) that may show which may include but are not limited to (e.g., how many funds are available, a live screen of their bank account, a part that may show how many pre-paid funds there are available, how much money they have, how many assets they have, how much capital or credit they have, etc.) which may include but are not limited to (e.g., additionally, another interface, on the interface, on screen, showing, displayed, etc.) which may include but are not limited to (e.g., the cost of the current person to book, schedule, inquire about, inquire about, inquire regarding, secure, create connection to, hold, pay for, how to ask, how to pay, develop business relationship with, use transmittables to secure or book, schedule, inquire about, etc.) which may include but are not limited to (e.g., or the range of the costs, or the costs available, or a range of prices available, or costs or funds, etc.)

In some embodiments, the, which may include but are not limited to (e.g., platform, user interface, etc.) viewing may seem like it's a, which may include but are not limited to (e.g., hologram, projecting, a projector, or is pulled out from the screen, hologram, user interface, viewing display, or is in the form of a 4d, 3d, or any method that is not directly on a screen such as a computer, or a flat surface, any surface may be curved or half projected half screen, hologram, user interface, viewing display, etc.)

Figure 98A:
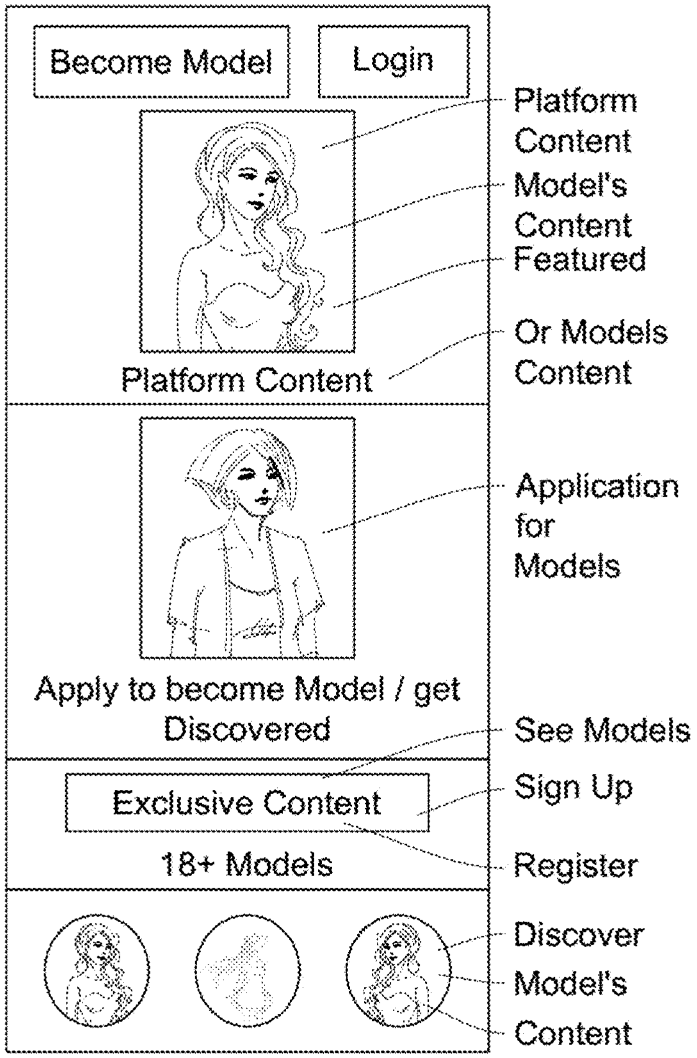
Figure 98B:
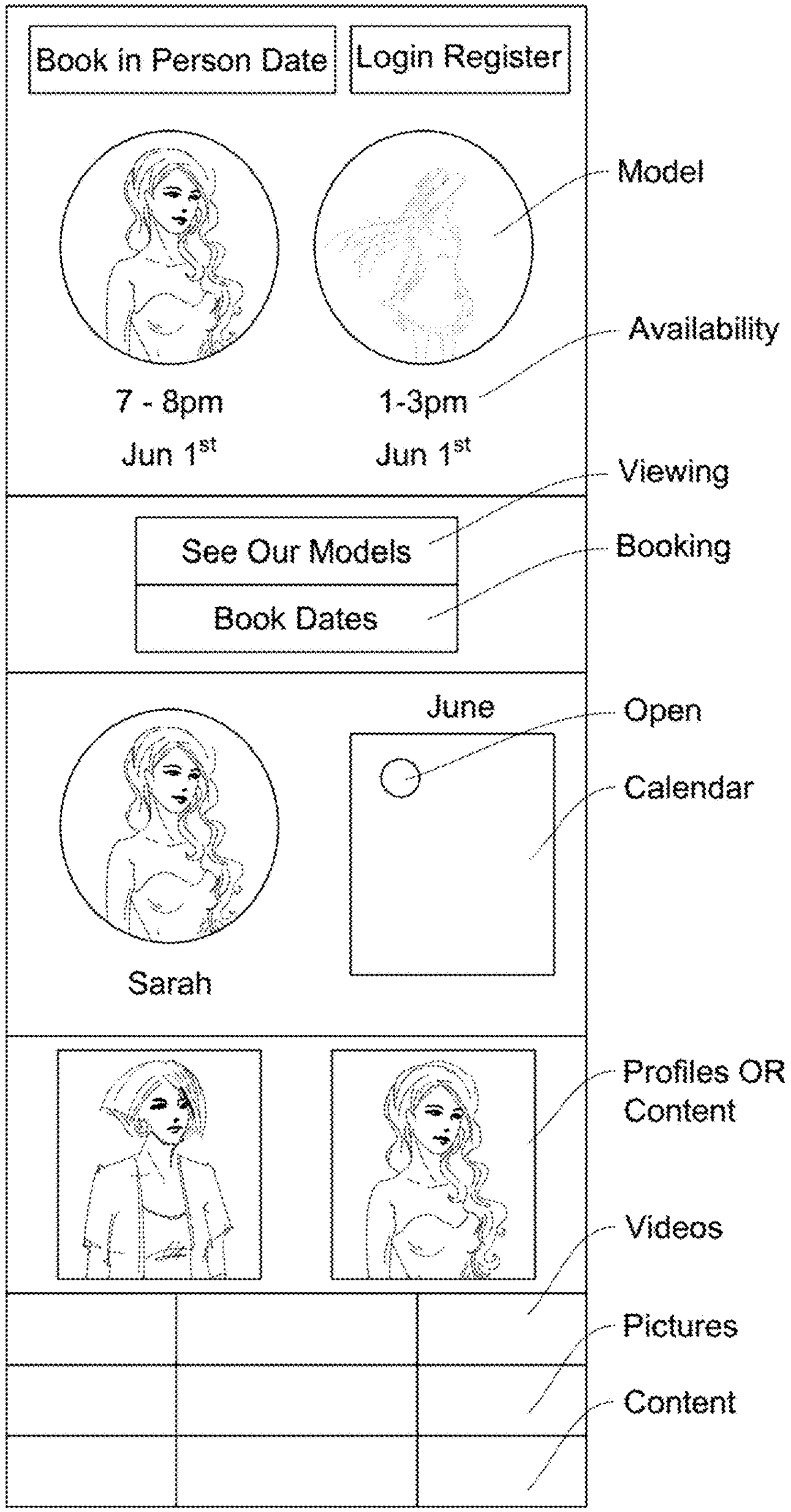
Figure 99:
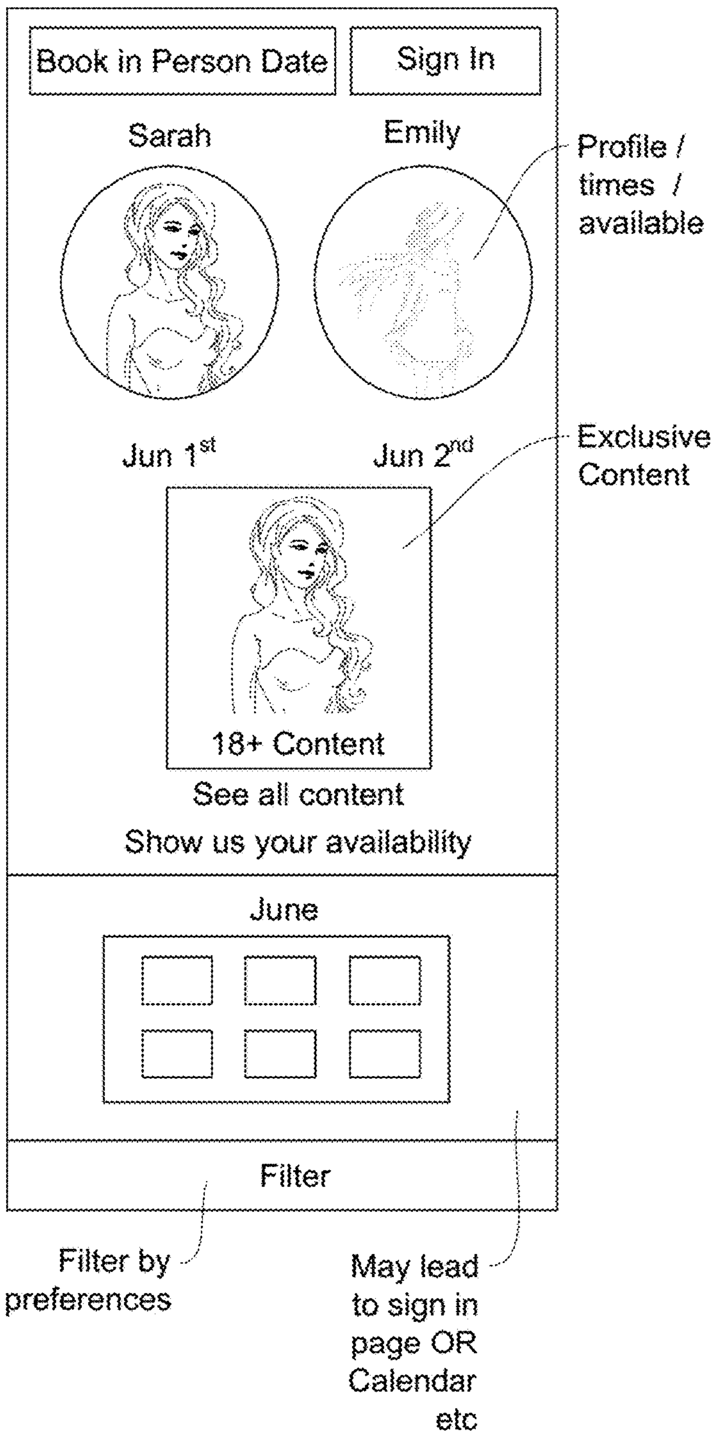

FIG. 98A, FIG. 98B: FIG. 99, In some embodiments, there may be an may include but not limited to (e.g., user interface, option, a screen etc.) that may show may include but not limited to (e.g., users, persons, profiles, models etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, or any interface for example which may be including but not limited to user interface may show options such as which may include but not limited to (e.g., 'choose your view option, choose, user interface choose, content choose, content viewing, option viewing, etc.) which may be included but not limited to (e.g., tapping, swiping, desktop view, mobile view, tapping view, stacking view, swiping view, see all profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photoshoots, view those with other people that have more than one photoshoot, view matching AI-connecting, method, view swiping method, view tapping method, view stacking method, view list method, sort by lists, create lists, etc.) In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, or areas, or profiles, or content, or hologram or display screens, etc.) to continue to look or get automated, which may include but not be limited to (e.g., looking, viewings of, movement, selection, scroll, etc.) which may include but not be limited to (e.g., content, creators, models, users, etc.)

In some embodiments, there may be some type of which may include but not limited to (e.g., content viewing method, viewing, display, method to obtain information, more options, etc.) that may or may not have, which may include but not limited to (e.g., information, content, items, options, calendar, etc.) at the, which may include but not limited to (e.g., bottom, top, side, 3rd party, screen, hologram, user interface, viewing display, etc.) which may include but not be limited to (e.g., funds available, credit line available, calendar, messaging options, send tip options, send 'like' options, which may be in return for payment, etc.) In some embodiments, the content or information that may make a person interested may then have some sort of a, which may include but not be limited to (e.g., 'matching AI-connecting,' or a 'availability matching AI-connecting,' or a 'both available etc.) on this, which may include but not be limited to (e.g., day, time, month, area, location, distance,' etc.) persons may be matched based on any type of criteria, which may be chosen which may include but not limited to (e.g., manually, automatically, through the AI, through computing operation, through 'based on who you might like etc.) In some embodiments, there may be a, which may include but not be limited to (e.g., 'matching AI-connecting, method' or connection method, or connection suggestion, or computing operation similarity suggestion, etc.) that come from some which may include but not limited to (e.g., type of content or some type of viewing etc.) that may show the user that this person may be a good match based on, which may include but not be limited to (e.g., any criteria or feature, or content, or information, etc.) that may or may not be exposed or shown to the user, which may include but not be limited to (e.g., (e.g., you may, user, person, entity, 3rd party, robot, artificial intelligence, etc.) may be a match based on distance, or location, (e.g., you may, user, person, entity, 3rd party, robot, artificial intelligence, etc.) may be a match based on similar availability, or you have liked or interacted with similar users, etc.) In some embodiments, the, which may include but not limited to (e.g., 'matching AI-connecting, system' or the 'connection system etc.) may have options such as which may include but not limited to (e.g., 'book date, book meeting, book virtual, book talk, book chat, book video chat, book video meeting, book voice conversation, date, send message, pay for messages, pay for seething, put up funds, check out, view options, view content, paying or not paying options, etc.)

In some embodiments, there may be options that may have options to, which may include but not be limited to (e.g., lead to a list, organization, types, profiles, suggestions, etc.) based on preferences or categories, etc.) which may include but not be limited to (e.g., book-in person date, book virtual, book talk, book chat, book video chat, book video meeting, book voice conversation, date, follow for free, discover for free, locked content, platform's exclusive content, special models, promotional persons, message, choose city, find your city, our models, locked content, unlocked content, match your calendar, match anywhere in the world, match another city, match yourself to anyone, match based on preferences, find date based on availability, find date based on distance, find date based on calendar, find date based on city, match date virtual match date in person, find girlfriend, find wife, find date, find friend, fan, fans only, for fans, for followers, see your favorite model, see your favorite celebrity, see new celebrities, see new models, see new sign ups, see new girls, users, see new creators, boyfriend applications, husband applications, date applications, book in person date now, book virtual, book talk, book chat, book video chat, book video meeting, book voice conversation, date, book call, see more information, see promotional material, see profile, get matched, swipe now, view exclusive content, go through stack now, view like dating apps style, choose your view for profile, see standard profiles, see regular way to view profiles, swipe by city, swipe by distance, view stacked style, view desktop style, view mobile style, get matched by human, robot, bot, 3rd party, entity, computer system, AI system, get matched by AI, get matched by robots, membership, membership fees, FAQS, learn more, unlock content, choose style to see content, swipe, view etc.) like, which may include but not be limited to (e.g., swipe up and down, side to side, stacked, list, create list etc.)

In some embodiments, there may be options for users to, which may include but not be limited to (e.g., book, schedule, inquire about, inquire about, inquire regarding, secure, create, hold, etc.), which may include but not be limited to (e.g., ‘safety chaperones, security, support, or security, 3rd party security, models, creators, etc.) In some embodiments, ‘safety chaperones, security, support, or security, may be described as someone, which may include but not be limited to (e.g., from the platform, another user, another person, a 3rd party entity, a 3rd party service, a 3rd party person, a family member, a former platform person, a member, etc.) In some embodiments, which may include but not be limited to (e.g., ‘safety chaperones, security, support, or security,’ etc.) may be used a ‘security’ whether, which may include but not be limited to (e.g., emotional or physical or both, or physical, or safety, confirmation, data recording, referral, proof, etc.) In some embodiments, outside security may be, which may include but not be limited to (e.g., booked, approved, added, accepted, 3rd party integrated, etc.) through a, which may include but not be limited to (e.g., ‘bodyguard or security service’ or any outside service that is either approved, not approved, or is a partner platform, is not a partner, or is a family member, or a friend, etc.)) In some embodiments, which may include but not limited to, the: which may include but not be limited to (e.g., outside booking or safety booking, or another entity booking, or other person booking by the user, etc.) may be, which may include but not be limited to (e.g., deducted from earning that day or anytime earnings are made, whether at the time of the booking, after funds have been paid or up front, whether from their pre-loaded funds, their funds available, or a transfer from a bank, whether that transfer is immediate or after some type, or from a credit service, or a credit booking, etc.) In some embodiments, there may be, which may include but not limited to (e.g., user interface options, interface options, platform options, screen options, etc.) where a user may be able to, which may include but not be limited to (e.g., ‘get a loan, get a credit line, increase credit line, obtain a credit line, sell their items, get cash for things, sell assets, sell stocks, manage stocks, sell real state, sell stocks, stock options, change schedule, manage schedule, hire assistance or hire a firm to manage money, obtain loans, obtain a credit line, upload money or funds to the credit line, upload funds for the platform, pre-pay for dates, pre-pay for gifts, pay for gifts, have gifts paid for by any means, pre-loan money for dates, pre-book dates that may be paid before or after date, manage calendar booking, manage lists, manage feed, manage people, apply for credit card, get credit line, calendar availability, scheduling option, funds available, loan funds, etc.) In some embodiments, two users can have a virtual date in the met-averse. Each user can create a virtual representation for the virtual date. In some embodiments, one user can have a virtual date with a hologram of a second user.

In some embodiments, there may be an user interface that may show, which may include but not be limited to (e.g., all assets, any assets, payments, money, transmittables, etc.) which may include but not limited to (e.g., on hand, available, pending, current, etc.) which may include but not be limited to (e.g., ‘stocks, investment portfolios, cash, real state, car assets, car title worth, car title assessments etc.) In some embodiments, there may be options or general, which may include but not be limited to (e.g., ‘value for things such as selling their car, information regarding values of items or tings in their possession, or value of assets not currently sold, value of general assets such as their equity in their house, their car title for a loan, selling items in their home, value of the equity in their house, value of jewelry, etc.) In some embodiments, there may be options to sell their, which may include but not be limited to (e.g., jewelry, car, house, equity, stocks, assets, etc.) though platform or a 3rd party in exchange for credit on the platform, funds on the platform, pre-paid dates, for cash, for credit, for platform funding, for 3rd party funding, etc.) In some embodiments, there may be a, which may include but not be limited to (e.g., timing method data, timing data, schedule data, scheduling data, timing methods, live calendar, timing method data, timing data method, timing process data, live calendar, timing method data, timing data method, timing process data, s of all lists of persons or users, there may be a live bidding/auction, live date options, live parties, etc.) In some embodiments, which may include but not be limited to (e.g., lists or chosen persons or saved persons or organized methods of seeing persons whether through lists, feed, clicking profiles, etc.) In some embodiments, there may be an option to, which may include but not be limited to (e.g., filter out what they are seeing, filter items, filter content, display, not display, etc.) show or not show such as, which may include but not be limited to (e.g., ‘shows, feed, information, booking information, payment information etc.)

In some embodiments, which may include but not be limited (e.g., messages, connections, contact, etc.) which may include but not be limited to (e.g., voice messages, memes, payment sending such as 3rd party options to transfer to the platform, options to send tips, emojis, pictures, pre-made pictures, options to paint, options to create own image on the platform, options to edit or create content through the messaging system or platform, etc.) Some embodiments may include but not be limited to (e.g., safety chaperones, security, support, or security, etc.) Security: In some embodiments, which may include but not be limited to (e.g., users, persons, models, etc.) may be able to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., security, user, person, outside, security, safety chaperone etc.) for, which may include but not be limited to (e.g., date friend on app or platform, gifting, giving, paying for, security for, for self, etc.)

In some embodiments, users may have to, which may include but not be limited to (e.g., pay from their own funds or their own bank or their own money or request payment for, or have invoice for, or request money for, etc.) to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., security or safety options, or safety persons, or security, or safety chaperone, security, supporter, safety person, model, or creator, etc.) such as a, which may include but not be limited to (e.g., chaperone, security guard, etc.) In some embodiments, each girl, which may include but not be limited to (e.g., girl may be defined as person being paid or a user on the platform etc.) may be able to choose whether or not user wants to be available, which may include but not limited to (e.g., opt-in, select, appointed, suggested, want to, etc.) to be, which may include but not be limited to (e.g., booked, paid for, secured, transferable, contacted about, inquire about etc.) as a 'safety chaperone.' In some embodiments, there may be options to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., 3rd party such as security guard from a 3rd party platform or a 3rd party integration, or from platform, or users on platform, or integrated users, etc.) In some embodiments, there may be options to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., outside friends, family, persons, etc.) In some embodiments, which may include but not limited to, the: (e.g., outside persons, outside users, non-registered users, 3rd parties, advertisers, advertisements, businesses, etc.) booking may be, which may include but not be limited to (e.g., automatically integrated, manually integrated, in collaboration with, connected to etc.) which may be into, which may include but not be limited to (e.g., calendar, timing, all calendars, auto updating, manually updating, updated or booked through machine learning or AI, etc.)

In some embodiments, an option may include but is not limited to (e.g., book a safety chaperone for a date, connection, meeting, virtual connection, meeting, etc.) In some embodiments, an option to book, schedule, inquire about, inquire about, inquire regarding, secure, create connection to, hold, pay for, create business relationship with, use transmittables to secure or book, schedule, inquire about, etc.) may be, which may include but not limited to (e.g., a friend, human, robot, security, a friend on app or platform, another creator, another user, another person, another public person, a family member, a friend, an acquaintance, etc.) In some embodiments, users may choose whether or not (e.g., user, person, entity, 3rd party, etc.) want to be available to be booked as a, which may include but not be limited to (e.g., safety chaperone, safety guard, friend, person there, supporter, safety person, security, etc.) which may be, which may include but not limited to an: (e.g., opt-on to be included, or a manually included, or an application process, etc.) as a potential option to be booked for a, which may include but not be limited to (e.g., date, connection, 'safety date' or a 'safety security' or a 'safety bestie' or a 'safety person' or a person that attends the date secretly and/or makes sure the safety and security of the other person, etc.) In some embodiments, this 'safety chaperone' may be paid by (e.g., another user, that user may be able to private, public, or only known between two 'creators, models, or users of the platform, part of the bill, part of the price, included in the price, security included in the price, etc.)

In some embodiments, which may include but not be limited to (e.g., 'safety chaperones, security, support, or security,' or 'users of the safety chaperone' etc.) may obtain, which may include but not be limited to (e.g., information, safety information or get informed of safety measures or safety precautions etc.) which may include but not limited to (e.g., before, after, during, later after, etc.) they may include but not limited to (e.g., sign up, before they opt-in, after they opt-in, prior to any date, during date, after date, etc.) In some embodiments, which may include but not be limited to (e.g., 'safety chaperones, security, support, or security, security detail, safety persons, other users, models, etc.) may be, which may include but not be limited to (e.g., outside users of the app or booked with outside users of the platform using potentially 3rd party or integrated, outside person, integrated calendar, or calendar options, or connection options etc.) that may or may not, which may include but not be limited to (e.g., record or show or store data, or store data etc.) regarding/that there was a safety chaperone, security, supporter, safety person, which may include but not be limited to (e.g., booked/present, there, attending, viewing, etc.) during which may include but not limited to, the: (e.g., connection, date, etc.) In some embodiments, which may include but not be limited to (e.g., 'connection, meeting, or date etc.) which may include but not limited to (e.g., chaperones,' users, persons, security, etc.) may be, which may include but not be limited to (e.g., outside or informed from outside, or internally, or within platform, or from platform, or integrated with platform, etc.) whether, which may include but not limited to (e.g., 3rd party, by mouth, by booking, by virtual booking, etc.) In some embodiments, which may include but not limited to (e.g., 'safety chaperone,' security, etc.) may be, which may include but not be limited to (e.g., recorded or subjected to all of the recording or safety coordinates, or data recording, or location recorded, or data collected from, etc.) that, which may include but not limited to, the: (e.g., models, person, users, 'user' etc.) may be subjected to on a date in order to, which may include but not be limited to (e.g., record all data for the 'date log, record information, collect data, etc.) using any, which may include but not be limited to (e.g., data, management device, device, 3rd party, or any recording, etc.) for any, which may include but not be limited to (e.g., 'date' or any connection or any contractual agreements, etc.)

FIG. 97: In some embodiments, there may be a, which may include but not be limited to (e.g., 'matching AI-connecting,' or a 'communication' or a 'connection' option or viewing or scene for one person or any person, etc.) to see that they are matching AI-connecting, with the date of available, which may include but not be limited to (e.g., range, price range, looks, price, preferences, beliefs, location, etc.) In some embodiments, which may include but not be limited to (e.g., bidders, paying persons, pursuers, or public, user, etc.), may be matched (e.g., suggested, indirectly, shown, directly, etc.) with, which may include but not be limited to (e.g., multiple options or one option, or any option, or any suggestion, etc.) that may show that this other person is available during that, which may include but not be limited to (e.g., time, location, range, etc.)

In some embodiments, there may be search options, including but not limited to (e.g., within a calendar or calendar user interface, or user interface, home screen, hologram, user interface, viewing display, managing page, management system, etc.) In some embodiments, there may be options to search based on, which may include but are not limited to (e.g., a calendar, similar calendars, similar routines, something in common, exact calendars, calendar matches, timing matching AI-connecting, timing matches, calendar timing similarities, etc.). In some embodiments, there may be options to search based on similar calendars or other preferences. In some embodiments, there may be options to search within the calendar on the specific, which may include but not be limited to (e.g., days, weeks, times, years, period(s), etc.), which may result in showing matches or suggestions, etc.) In some embodiments, there may be options to view one user's calendar based on anything, including but not limited to (e.g. AI, machine learning, preferences, searching, filters, etc.) In some embodiments, the user may see matches based on other users' calendars and show them, which may include but not be limited to which may include but not limited to (e.g., a list, a category, save them, show them, allow matches to occur, allow connections to occur, organize, or show information, etc.) In some embodiments, there may be a user interface(s) that may have, which may include but not limited to (e.g., raising money for charity, charity donations, percentage towards non-profit, monies towards non-profit, galleries, filtered galleries, episodes, streaming episodes, live episodes, types of episode(s), series, platform series/platform movies/platform content, movies, self-produced, self-made movies, platform created films/series/content, streaming, content, price to unlock, price to subscribe, price to view, locked content, send message, price for messages, booking in person, booking virtual, pre-booking call/communication, matching AI-connecting, of calendars, similar calendars, similar routines, something in common, showing one or more calendars, matching AI-connecting, based on calendars, similar based on calendars or other features, information, galleries with filters, content that is by categories or not by categories, etc.)

In some embodiments, there may be a features/content/items user interface, which may include but not be limited to (e.g., episodes, streaming episodes, live episodes, types of episode(s), original movies, original series, original content, platform or 3rd party content, series, platform series/platform movies/platform content, movies, self-produced, self-made movies, the platform created films/series/content, streaming, content, price to unlock, price to subscribe, price to view, locked content, send message, price for messages, booking in person, booking virtual, pre-booking call/communication, matching AI-connecting, of calendars, similar calendars, similar routines, something in common, showing one or more calendars, matching AI-connecting, based on calendars, similar based on calendars or other features, information, etc.)

In some embodiments, there may be a, which may include but not be limited to (e.g., 'messaging system, contact system, ability to contact, connection aspect, ability to connect, etc.) where there may be, which may include but not limited to (e.g., calendar, calendar system, availability, types, categories, looks, messaging, inquiry, booking, current or previous availability, types of location, location, distance, city, country, area, user information, user content, organized lists of content or type of category, ways to discover or see more content or categories or calendar matching AI-connecting, etc.)

In some embodiments, there may be a, which may include but are not limited to (e.g., live or an automated or a manual swiping method of viewing profiles or persons available, or persons listed, or filtered persons, or those available for a date, etc.) In some embodiments, the user interface method of swiping or pulling may be similar to a, which may include but are not limited to (e.g., simulation, 4d simulation, 4d, hologram, screen, hologram, user interface, viewing display, viewing, 3d simulation where it seems to be a hologram or pulled out from the screen, hologram, user interface, viewing display, etc.) In some embodiments, there may be a, which may include but not be limited to (e.g., part, screen, area, interface, etc.) that may show, which may include but not be limited to (e.g., how many funds are available, a live screen of their bank account, or a part that may show how many pre-paid funds there are available, or the cost of the current person to book, schedule, inquire about, inquire about, inquire regarding, secure, create connection to, hold, pay for, create business relationship with, use transmittables to secure or book, schedule, inquire about, etc.) or the, which may include but not be limited to (e.g., range, prices, range of the costs, or the costs available, or a range of costs available, costs or funds, etc.)

In some embodiments, the, which may include but are not limited to (e.g., platform, user interface, etc.) viewing may seem like it's a, which may include but are not limited to (e.g., hologram, projecting, a projector, or is pulled out from the screen, hologram, user interface, viewing display, or is in the form of a 4d, 3d, or any method that is not directly on a screen such as a computer, or a flat surface, any surface may be curved or half projected half screen, hologram, user interface, viewing display, etc.)

In some embodiments, there may be an may include but not limited to (e.g., user interface, option, a screen, etc.) that may show may consist of but not limited to (e.g., users, persons, profiles, models, etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any user interface for example which may be including but not limited to the user interface may show options such as which may include but not limited to (e.g., 'choose your view option' etc.) may be included but not limited to (e.g., 'tapping, swiping, desktop view, mobile view, tapping picture, stacking view, swiping view, see all profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photoshoots, view those with other people that have more than one photo shoot, view matching AI-connecting, method, view swiping method, view tapping method, view stacking method, view list method, sort by lists, create lists, etc.)

In some embodiments, there may be some type of content, which may include but not be limited to (e.g., viewing method, viewing, items, areas, interfaces, screens, etc.) that may or may not have, which may include but not be limited to (e.g., information, content, items, clicks, links, 3rd party integrations, etc.) at the/on the, which may include but not be limited to (e.g., bottom, top, side, 3rd party, screen, hologram, user interface, viewing display, etc.) which may include but not be limited to (e.g., funds available, credit line available, calendar, messaging options, send tip options, send 'like' options, which may be in return for payment, etc.)

In some embodiments, the, which may include but not be limited to (e.g., content, information, items, etc.) that may make a person, which may include but not be limited to (e.g., interested, wanting to see more, subscribing, following, seeing, etc.) may then have some sort of a, which may include but not be limited to (e.g., 'matching AI-connecting,' or a 'availability matching AI-connecting,' or a 'both available etc.) on this, which may include but not be limited to (e.g., day, time, month, area, location, distance,' etc.) persons may be matched based on any type of criteria, which may be chosen, which may include but not be limited to (e.g., manually, automatically, through the AI, through computing operation, through 'based on who you might like etc.) In some embodiments, there may be a, which may include but not be limited to (e.g., 'matching AI-connecting, method' or connection method, or connection suggestion, or computing operation similarity suggestion, etc.) that come from some type of content or some type of viewing that may show the user that this person may be a good match based on, which may include but not be limited to (e.g., any criteria or feature, or content, or information, etc.) that may or may not be exposed or shown to the user, which may include but not be limited to (e.g., (e.g., you may, user, person, entity, 3rd party, robot, artificial intelligence, etc.) may be a match based on distance, or location, which may include but not be limited to (e.g., you may, user, person, entity, 3rd party, robot, artificial intelligence, etc.) may be a match based on, which may include but not be limited to (e.g., similar availability, or you have liked or interacted with similar users, for any reason, etc.) In some embodiments, the, which may include but not be limited to (e.g., 'matching AI-connecting, system' or the 'connection system, etc.) may have options such as, which may include but not be limited to (e.g., 'book date, book meeting, book virtual, book talk, book chat, book video chat, book video meeting, book voice conversation, date, send message, pay for messages, pay for seething, put up funds, check out, view options, view content, paying or not paying options, etc.)

In some embodiments, there may be options that may have options to, which may include but not be limited to (e.g., lead to a list, organization, types, profiles, suggestions, etc.) based on preferences or categories, etc.) which may include but not limited to (e.g., book-in person date, book virtual, book talk, book chat, book video chat, book video meeting, book voice conversation, date, follow for free, discover for free, locked content, platform's exclusive content, special models, promotional persons, message, choose city, find your city, our models, locked content, unlocked content, match your calendar, match anywhere in the world, match another city, match yourself to anyone, match based on preferences, find date based on availability, find date based on distance, find date based on calendar, find date based on city, match date virtual match date in person, find girlfriend, find wife, find date, find friend, fan, fans only, for fans, for followers, see your favorite model, see your favorite celebrity, see new celebrities, see new models, see new sign ups, see new girls, users, see new creators, boyfriend applications, husband applications, date applications, book in person date now, book virtual, book talk, book chat, book video chat, book video meeting, book voice conversation, date, book call, see more information, see promotional material, see profile, get matched, swipe now, view exclusive content, go through stack now, view like dating apps style, choose your view for profile, see standard profiles, see regular way to view profiles, swipe by city, swipe by distance, view stacked style, view desktop style, view mobile style, get matched by human, robot, bot, 3rd party, entity, computer system, AI system, get matched by AI, get matched by robots, membership, membership fees, FAQS, learn more, unlock content, choose style to see content, swipe, view like, which may include but not be limited to (e.g., swipe up and/or down, side to side, stacked, list, create list), etc.) In some embodiments, there may be user interface options where a user may be able to, which may include but not be limited to (e.g., 'get a loan, get a credit line, increase credit line, obtain credit line, sell their items, get cash for items, sell assets, sell stocks, manage stocks, sell real state, sell stocks, stock options, change schedule, manage schedule, hire an assistance or hire a firm to manage money, obtain loans, obtain a credit line, upload money or funds to credit line, upload funds for platform, pre-pay for dates, pre-loan money for dates, pre-book dates that may be paid before or after date, manage calendar booking, manage lists, manage feed, manage people, apply for credit card, get credit line, calendar availability, scheduling option, funds available, loan funds, etc.)

In some embodiments, there may be an user interface that may show, which may include but not be limited to (e.g., all assets, any assets, payments, money, transmittables, etc.) which may include but not limited to (e.g., on hand, available, pending, current, etc.) which may include but not be limited to (e.g., 'stocks, investment portfolios, cash, real state, car assets, car title worth, car title assessments etc.) In some embodiments, there may be options or general, which may include but not be limited to (e.g., 'value for things such as selling their car, information regarding values of items or tings in their possession, or value of assets not currently sold, value of general assets such as their equity in their house, their car title for a loan, selling items in their home, value of the equity in their house, value of jewelry, etc.) In some embodiments, there may be options to sell their, which may include but not be limited to (e.g., jewelry, car, house, equity, stocks, assets, etc.) though platform or a 3rd party in exchange for credit on the platform, funds on the platform, pre-paid dates, for cash, for credit, for platform funding, for 3rd party funding, etc.) In some embodiments, there may be a, which may include but not be limited to (e.g., timing method data, timing data, schedule data, scheduling data, timing methods, live calendar, timing method data, timing data method, timing process data, live calendar, timing method data, timing data method, timing process data, s of all lists of persons or users, there may be a live bidding/auction, live date options, live parties, etc.) In some embodiments, lists or chosen persons or saved persons or organized methods of seeing persons whether through lists, feed, clicking profiles, etc.) there may be an option to filter out what they are seeing such as 'shows, feed, information, booking information, payment information etc.)

In some embodiments, messages may include voice messages, memes, payment sending such as 3rd party options to transfer to the platform, options to send tips, emojis, pictures, pre-made pictures, options to paint, opportunities to create own image on the platform, options to edit or create content through the messaging system or platform, etc.)

Safety chaperones, security, support, or security/Security: In some embodiments, users may be able to book, schedule, inquire about, inquire about, inquire regarding, secure, create a connection to, hold, pay for, create a business relationship with, use transmittables to secure or book, schedule, inquire about, etc.) a, which may include but not be limited to (e.g., security, user, person, outside, security, safety chaperone etc.) for, which may include but not be limited to (e.g., date friend on app or platform, gifting, giving, paying for, security for, for self, etc.) In some embodiments, users may have to: (e.g., pay from their funds or their bank or their own money or request payment for, or have invoice for, or request money for, etc.) to book, schedule, inquire about, inquire about, inquire regarding, secure, create connection to, hold, pay for, create business relationship with, use transmittables to secure or book, schedule, inquire about, etc.) which may include but not limited to (e.g., security or safety options, or safety persons, or security, or safety chaperone, security, supporter, safety person, model, or creator, etc.) such as a, which may include but not be limited to (e.g., chaperone, security guard, etc.) In some embodiments, Each girl (girl may be defined as a person being paid or a user on the platform) may be able to choose whether or not the user wants to be available, which may include but is not limited to (e.g., opt-in, select, appointed, suggested, want to, etc.) to be booked as a 'safety chaperone.'

In some embodiments, there may be options to book, schedule, inquire about, inquire about, inquire regarding, secure, create connection to, hold, pay for, create business relationship with, use transmittables to secure or book, schedule, inquire about, etc.) a, which may include but not be limited to (e.g., 3rd party such as security guard from a 3rd party platform or a 3rd party integration, or from platform, or users on platform, or integrated users, etc.) In some embodiments, there may be options to book, schedule, inquire about, inquire about, inquire regarding, secure, create connection to, hold, pay for, create business relationship with, use transmittables to secure or book, schedule, inquire about, etc.) which may include but not limited to (e.g., outside friends, family, persons, etc.) In some embodiments, which may include but not limited to, the: (e.g., outside persons, outside users, non-registered users, 3rd parties, advertisers, advertisements, businesses, etc.) booking may be, which may include but not be limited to (e.g., automatically integrated, manually integrated, in collaboration with, connected to etc.) into: (e.g., calendar or all calendars, or auto updating, or manually updating, or updated or booked through machine learning or AI, etc.) In some embodiments, there may be an option may include but not limited to (e.g., book a safety chaperone for date, connection, meeting, virtual connection, meeting etc.) In some embodiments, an option to book, schedule, inquire about, inquire about, inquire regarding, secure, create connection to, hold, pay for, create business relationship with, use transmittables to secure or book, schedule, inquire about, etc.) may be, which may include but not limited to (e.g., a friend, human, robot, security, a friend on app or platform, another creator, another user, another person, another public person, a family member, a friend, an acquaintance, etc.)

In some embodiments, users may choose whether or not (e.g., user, person, entity, 3rd party, etc.) want to be available to be booked as a, which may include but not be limited to (e.g., 'safety chaperone,' friend, the person there, supporter, safety person, security, etc.) which may be, which may include but not limited to an: (e.g., opt-on to be included, or a manually included, or an application process, etc.) as a potential option to be booked for a, which may include but not be limited to (e.g., date, connection, 'safety date' or a 'safety security' or a 'safety bestie' or a 'safety person' or a person that attends the date secretly and/or makes sure the safety and security of the other person, etc.) In some embodiments, this 'safety chaperone' may be paid by (e.g., another user, that user may be able to private, public, or only known between two 'creators, models, or users of the platform, part of the bill, part of the price, included in the price, security included in the price, etc.)

In some embodiments, which may include but not be limited to (e.g., 'safety chaperones, security, support, or security,' or 'users of the safety chaperone' etc.) may obtain, which may include but not be limited to (e.g., information, safety information or get informed of safety measures or safety precautions, etc.) which may include but not limited to (e.g., before, after, during, later after, etc.) they (e.g., sign up, before they opt-in, after they opt-in, before any date, during date, after date, etc.) In some embodiments, which may include but not be limited to (e.g., 'safety chaperones, security, support, or security, security detail, safety persons, other users, models, etc.) may be, which may include but not be limited to (e.g., outside users of the app or booked with external users of the platform using potentially 3rd party or integrated, outdoor person, integrated calendar, or calendar options, or connection options, etc.) that may or may not, which may include but not be limited to (e.g., record or show or store data, or store data, etc.) regarding/that there was a safety chaperone, security, supporter, safety person, which may include but not be limited to (e.g., booked/present, there, attending, viewing, etc.) during which may have but not limited to, the: (e.g., connection, date, etc.)

In some embodiments, which may include but not be limited to (e.g., 'connection, meeting, or date etc.) which may include but not limited to (e.g., chaperones,' users, persons, security, etc.) which may include but not limited to (e.g., outside or informed from outside, or internally, or within platform, or from platform, or integrated with platform, etc.) whether, which may include but not limited to (e.g., 3rd party, by mouth, by booking, by virtual booking, etc.) In some embodiments, 'safety chaperone' may be, which may include but not limited to (e.g., recorded or subjected to all of the recording or safety coordinates, or data recording, or location recorded, or data collected from, etc.) that, which may include but not limited to, the: (e.g., models, person, users, 'user' etc.) may be subjected to on a date in order to, which may include but not limited to (e.g., record all data for the 'date log, record information, collect data, etc.) using any, which may include but not be limited to (e.g., data, management device, device, 3rd party, or any recording, etc.) for any which may include but not limited to (e.g., 'date' or any connection or any contractual agreements, etc.) In some embodiments, there may be, which may include but not be limited to (e.g., suggestion, category options, options, etc.) which may include but not limited to (e.g., book an in-person date' or 'book a virtual date' or 'discover models near you' or 'view models by distance' or 'book models by distance' or 'view private photos now' or 'unlock private photos now' or 'discover her profile' or 'discover new content' or 'view exclusive content' or 'sign in' or 'register' or 'become a model/creator' or 'apply to be a creator' or 'discover creators,' etc.)

FIG. 98, FIG. 99: In some embodiments, there may be, which may include but not limited to an: (e.g., ongoing screen, platform, option, etc.) that may show anything ranging from which may include but are not limited to (e.g., register, log-in-, sign-in, become a model, apply, book a date, bid on a date, book a virtual date, entertainment options set by anyone or model or user, see exclusive content, follow a creator, subscribe to a creator, discover creators or models, discover 18+ models, discover calendar options, discover available times, dates, locations, choose your location, choose your time, craft your calendar, see our models, 18+ models, calendar times available, short version or long version of model's calendar's, users calendar, an option to craft a calendar or to input a calendar, options to creator a calendar, options to insert work schedule to get a calendar made for that person, profile options, featured options, new options, live bidding/auction, live bidding/auction rooms, live category rooms, live type of model rooms, live type of date rooms, live charity events, live events, etc)

In some embodiments, there may be, which may include but not be limited to (e.g., suggestion, category options, options, etc.) which may include but not limited to (e.g., book an in-person date' or 'book a virtual date' or 'discover models near you' or 'view models by distance' or 'book models by distance' or 'view private photos now' or 'unlock private photos now' or 'discover her profile' or 'discover new content' or 'view exclusive content' or 'sign in' or 'register' or 'become a model/creator' or 'apply to be a creator' or 'discover creators,' etc.)

In some embodiments, there may be a combination of may include but not limited to (e.g., a profile photo or profile information or users information, matching AI-connecting, buttons, seeing more options, unlocking content, matching, comparing, adding to the list, add to location list, add to calendar list, add to virtual date list, book for virtual date, entertainment options set by anyone or model or user, book for an in-person date, matching AI-connecting, users calendar to model's calendar with booking options, matching AI-connecting, users and model or creators calendar, showing match preferences, showing computing operation match made, auto-match made, AI match made, message options to pay to message, free message options, messaging options, booking options, date options, virtual date options, information, informational options, profile options, profile preferences, etc.)

In some embodiments, there may be an ongoing screen that may be show anything ranging from which may include but is not limited to (e.g., register, log-in-, sign-in, become a model, apply, book a date, bid on a date, book a virtual date, entertainment options set by anyone or model or user, see exclusive content, follow a creator, subscribe to a creator, discover creators or models, discover 18+ models, discover calendar options, discover available times, dates, locations, choose your location, select your time, craft your calendar, see our models, 18+ models, calendar times available, short version or long version of model's calendar's, users calendar, an option to craft a calendar or to input a calendar, options to creator a calendar, options to insert work schedule to get a calendar made for that person, profile options, featured options, new options, live bidding/auction, live bidding/auction rooms, live category rooms, live type of model rooms, live type of date rooms, live charity events, live events, etc.) In some embodiments, the user may be able to search may, include but not limited to (e.g., on the calendar, around the calendar, on the user interface, on each day, period searching, within a period, within the calendar, etc.) which may include but not limited to (e.g., on each day, such as search within a time frame, or period, or category) time frames may include but not be limited to (e.g., lunch, snack, dinner, coffee, shopping, virtual, in-person, restaurant, etc.)

In some embodiments, the user may be able to search on the calendar, which may include but not be limited to (e.g., per day, per period, per week, per location, per distance, per popularity, per type of model, per type of creator, per user, per availability, per activity, etc.) In some embodiments, there may be an option to book, schedule, inquire about, inquire about, inquire regarding, secure, create a connection to, hold, pay for, create a business relationship with, use transmittables to secure or book, schedule, inquire about, etc.) an in-person date with, which may include but not be limited to (e.g., the model, creator, or person, etc.) In some embodiments, there may be a, which may include but not be limited to (e.g., trust fund option or required payment, etc.) to secure (e.g., payment/booking/time, etc.) for may include but not limited to (e.g., dinner, time, activity, etc.) In some embodiments, there may be an option or requirement to pay for the creator, model, or person's time that may or may not be non-refundable if the requirements or agreement for the date is fulfilled regardless, which may include but not be limited to if the other person that paid shows up or not. In some embodiments, the amount, partial, total, which may include but is not limited to the: (e.g., deposit, trust funds, or total amounts put up to secure the 'date in person, etc.) may be shown in real-time or on a page.

FIG. 99: In some embodiments, a screen may show options to, including but not limited to (e.g., 'book an in-person date now' 'or sign in' etc.) In some embodiments, there may be a screen that may show any combinational of which may include but are not limited to (e.g., book an-in person date' or 'book a date' or 'show your availability to make your calendar' or 'filters' 'or 18+ models' or 'find a date now' or 'exclusive content' 'or 'register now' or 'sign in now' etc.)

In some embodiments, there may be a screen or an option to, which may include but are not limited to (e.g., view, see, obtain a stacked version of 'videos, moving pixels, photos, photo, videos, promotional material, content, etc.) related to may include but not limited to (e.g., creators, models, celebrities, paying daters, men, women, persons, etc.) Users can scroll down or up on pixelated, non-pixelated videos, photos, material, and content in some embodiments. In some embodiments, there may be, which may include but are not limited to (e.g., NSFW content, 'exclusive content, locked content, unlocked content, NSFWs, non-NSFWs, suggestive materials, content from the platform, etc.) In some embodiments, any user interface that may have an option for a user to, which may include but not be limited to (e.g., scroll up, down, left right, that may be scrolled up and down, left and right, or in and out, or back and forth, or disappearing, or appearing, or automatically moving, or auto-changing, or manually changing, etc.) In some embodiments, which may include but not limited to, the: (e.g., the user or the person or the content creator or the model, etc.) may be, which may include but not be limited to (e.g., moved to view another one, or moved in a way to view their photos, or moved in a way to view their profile, etc.) which may depend on which may include but not limited to, the: (e.g., the direction of the movement on the screen or the automatic direction or the automated selection, or the 'show version' etc.) where the user may not have to do anything and may be using voice activation to: (e.g., scroll or view different parts of the screen, hologram, user interface, viewing display, person, movements, profile, calendar, selections, creators selections, etc.)

In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, areas, or profiles, content, hologram or display screens, etc.) to continue to look or get automated, which may include but not be limited to (e.g., looking, viewings of, movement, selection, scroll, etc.) which may include but not be limited to (e.g., content, creators, models, users, etc.)

In some embodiments, there may be stacks or options to continue to look or get automated looking or viewings of, which may include but not be limited to (e.g., content, creators, models, users, etc.) there may be content that may be, which may include but not be limited to (e.g., scrolled up and down, left and right, or in and out, or back and forth, or disappearing, or appearing, or automatically moving, or auto-changing, or manually changing, etc.) In some embodiments, on FIG. 174 or any user interface, there may be options to have (e.g., 'half-unlocked content' and/or 'half-locked content, partially locked content, partially played content, preview content, preview before payment content, pay to view content, there may be 'preview only content' there may be 'prepaid content' there may be half of a photo, or half of a video, or parts of a video, or parts of a photo, or there may be a portion of a video or a bit of a photo, there may be a blurred version of a video/photo or a pixelated version of a photo/video, photos, video, content, or anything may be NSFW, or NSFW related, or sexual, or non-sexual, or NSFW content, etc.)

In some embodiments, there may be options such as viewing users calendar and filtering or category options (e.g., 'location, type of date, models, creators etc.) In some embodiments, there may be options such as lists or profiles shown or content shown that may show 'in person dates available' or 'live calendar, timing method data, timing data method, timing process data,' or 'types of bookings available' or 'date options available' etc.) In some embodiments, the platform or user interface: In some embodiments, which may include but not be limited to (e.g., 3rd party integration, Website, application, organization, website, application, etc.) may allow a service consisting of a platform for people to, which may include but not be limited to (e.g., pay to, payment in exchange for, bid to, create calendar bookings, calendar book, schedule, inquire about, book using calendar or AI, using AI to book, schedule, inquire about, inquire about, inquire regarding, secure, create connection to, hold, pay for, create business relationship with, use transmittables to secure or book, schedule, inquire about, etc.) using machine learning to book, schedule, inquire about, inquire about, inquire regarding, secure, create connection to, hold, pay for, create business relationship with, use transmittables to secure or book, schedule, inquire about, etc.) voice commands to book, schedule, inquire about, inquire about, inquire regarding, secure, create connection to, hold, pay for, create business relationship with, use transmittables to secure or book, schedule, inquire about, etc.) etc.) to go on a, which may include but not be limited to (e.g., date, connection virtual meeting with, virtual voice integration, voice connection, in-person meeting, etc.) with another, which may include but not be limited to (e.g., person, entity, 3rd party, group, multiple people, one person, family, etc.) In some embodiments, this may also be for charitable purposes, which may include but not be limited to (e.g., payment goes to 3rd party, payment goes to group for donation, payment is donated, partially donated, automatically sent to 3rd party, sent after obtained, sent at some point, used for another purpose, payment is deducted, etc.)

Figure 100:
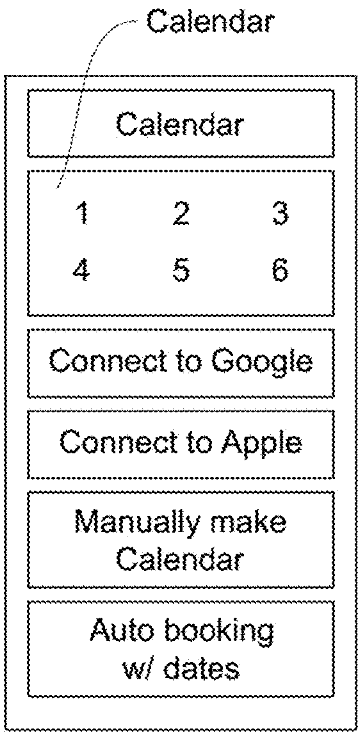

FIG. 100: In some embodiments, there may be a, which may include but not be limited to (e.g., screen or an app, or a platform, or a 3rd party, etc.) or an option to, which may include but not be limited to (e.g., schedule availability, availability, options to book, gifting options, send money or gifts, virtual date booking now, or a calendar etc.) for any user which may include but are not limited to (e.g., may include but not limited to unregistered users, browsers, paid users, non-paid users, content creators, creators, models, fans, subscribers, etc.) In some embodiments, this (e.g., calendar, timing method, schedule method, scheduling method, scheduling-timing method, timing-data method, timing data center, etc.) may be used to: (e.g., 'match person with another person, or show suggestions, or connect to, or display, or view, or suggest, etc.) based on, which may include but not be limited to (e.g., automatic or manual, or computing operation, or machine learning preferences or chosen preferences or chosen data, or any data, or any reason, or platform etc.) In some embodiments, there may be options for, which may include but are not limited to (e.g., AI, machine learning, robotics, user or person, etc.) to input data from which may include but are not limited to (e.g., 3rd party calendar or a 3rd party assistant or a 3rd parry AI or a 3rd party machine learning on their daily activities or movements, or schedule, or team's schedule, or friend's or family's schedule, any user interface, etc.) In some embodiments, there may be options, which may include but not limited to search by (e.g., person, categories, location, distance, preferences, likes, interests, person, categories, separation categories, etc.) In some embodiments, there may be information or matching AI-connecting, or shown persons based on which may include but are not limited to (e.g., matching AI-connecting, preferences, or search criteria, or personal computing operation, or system computing operation, or AI, or machine learning, etc.) In some embodiments, there may be options to, which may include but are not limited to (e.g., create 'lists' or create organized preferences or organized persons, or organized users, or organized photoshoots, or organized profiles, or organized persons of interest, or organized 'liked preferences' etc.) In some embodiments, users or persons or groups or entities may be able to manually or automatically or from a management system or have outside mangers or outside persons or internal persons on the platform or an appointed person or group or business (e.g., integrate outside calendars or create new calendar or have a 3rd party integrated calendar and or mange each of their changes on any calendar whether on the platform or from a 3rd party or from an integrated platform or calendar, etc.)

In some embodiments, there may be options to, which may include but are not limited to (e.g., message persons in the organized list or the preference list or the made list or the self-made list, or the automatically made lists, or the computing operation lists etc.) that the user may be able to, which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.) In some embodiments, there may be, which may include but not be limited to (e.g., screen, hologram, user interface, viewing display, hologram, item, user interface, user interfaces that are one, two combined, two separate but combined, any combination of user interfaces, etc.) that may have, which may include but not be limited to (e.g., multiple calendars, multiple creators, creators, models, open calendars, open lists, open items for models, open ways to book, schedule, inquire about, inquire about, inquire regarding, secure, create connection to, hold, pay for, create business relationship with, use transmittables to secure or book, schedule, inquire about, etc.) available booking times, available messaging options, follow options, free options, paid options, month, day, time, current available funds, send inquiry, select date, select payment method, open availability, year availability, advertisements, marketing items, promotional content, promotional items, streaming content, streaming lives, streaming persons, users, models, feed, category rooms, category items, month, time, multiple lists of calendars, a calendar that is open, calendar that is available, a blurred calendar, a greyed calendar, a half-calendar, an obstructed calendar, an option to insert request into calendar, an option to inquire about, an option to send messages, etc.) which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.)

In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

In some embodiments, there may be an which may include but are not limited to (e.g., user interface, process etc.) that goes from which may include but are not limited to (e.g., selection, options, or viewing of persons, etc.) to, which may include but are not limited to (e.g., matching AI-connecting, or interest, or like, or mutual like, or one sided-like, etc.) In some embodiments, user interface may go e.g., directly or to another user interface or on same user interface, etc.) to show a, which may include but are not limited to (e.g., calendar availability, scheduling option, or availability, or time period, or scheduling option, etc.) that may show which may include but are not limited to (e.g., some information, 'all interests, all food choices, all preselected options for location of date, all pre-payment options, etc.) then user interface may go directly into, which may include but are not limited to (e.g., booking, or payment in order to book, schedule, inquire about, inquire about, inquire regarding, secure, create connection to, hold, pay for, create business relationship with, use transmittables to secure or book, schedule, inquire about, etc.) the date, or meet requirements of the date, or connection, etc.) In some embodiments, there may not be an option to, which may include but are not limited to (e.g., contact, message or to book, schedule, inquire about, inquire about, inquire regarding, secure, create connection to, hold, pay for, create business relationship with, use transmittables to secure or book, schedule, inquire about, etc.) an-in person date etc.) unless the user which may include but are not limited to (e.g., pays the payment, makes transmittables, sends assets, makes assets, etc.) for the, which may include but are not limited to (e.g., 'date' or the 'meeting' or the 'connection' or the messaging, 'or the video chat or the 'video call' etc.) In some embodiments, there may be an which may include but are not limited to (e.g., non-regulated, anytime version, unlimited version, membership options, membership services, paid for, etc.) for users to make which may include but are not limited to (e.g., any amount, limited amount, unlimited etc.) which may include but are not limited to (e.g., video calls, messages, in-person dates, etc.) and/or there may be an option for the other user to, which may include but are not limited to (e.g., opt-in to this group system or add to, or join, or automatically join, etc.) that pays them determining by which may include but are not limited to (e.g., frequency, ability, quality, participation, how many, etc.) which may include but are not limited to (e.g., dates, or how many messages, or how many video calls, etc.) In some embodiments, etc.) there may be options to not pay unlimited for in-person, video, messages, or unlocks and each one may have to be paid which may include but are not limited to (e.g., one at a time, separate, by itself, separate, individually, etc.)

Figure 101:
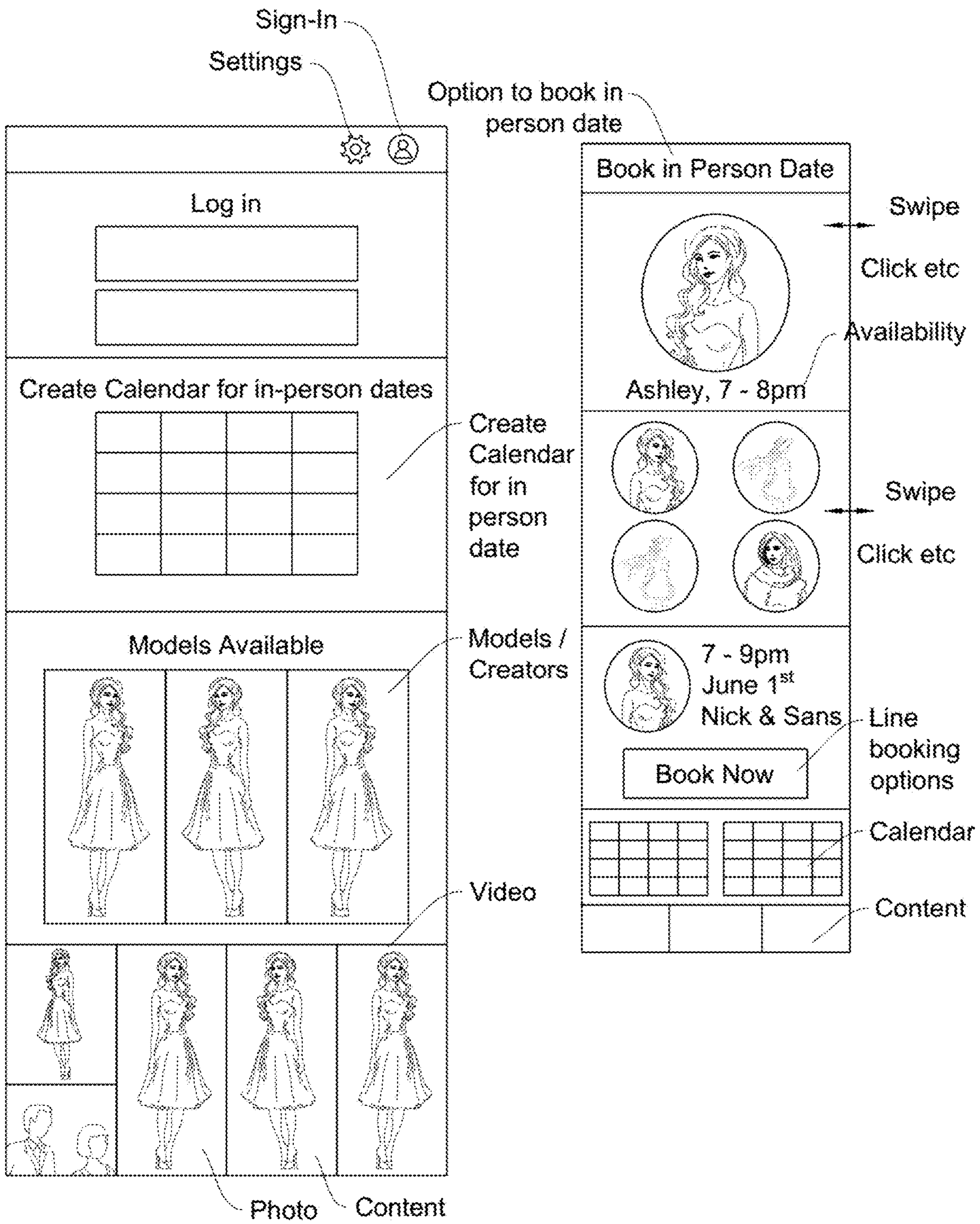

FIG. 101: In some embodiments, there may be a, which may include but not be limited to (e.g., user interface, 'home page' or a 'sign in page' or a 'general page', main page, login page, public page, membership only page, members only page, paying members only page, etc.) that may show a combination of or non-combination of that may include but is not limited to a, which may include but not be limited to (e.g., 'create a calendar option, make calendar for dating, integrate dating calendar and work calendar, merge outside calendar and platform calendar, use outside calendar as dating calendar, change manage update calendar integrated or from platform or from 3rd party, create a new calendar from scratch, calendar live viewing, live calendar, timing method data, timing data method, timing process data, a connected calendar, an opportunity to build a calendar, etc.) in some embodiments, this calendar may provide (e.g., user or person or public or entity or business, etc.) an option to (e.g., interact with other calendars, interact with other users, interact and schedule, book dates, book, schedule, inquire about, inquire about, inquire regarding, secure, create connection to, hold, pay for, create business relationship with, use transmittables to secure or book, schedule, send gifts via calendar or message or any way to send gifts to model or creator or user, inquire about, etc.) a model through calendar in which there may be models that are available to (e.g., date, virtual date, entertainment options set by anyone or model or user, in-person date, have meeting with, book, schedule, inquire about, inquire about, inquire regarding, secure, create connection to, hold, pay for, send gifts via calendar or message or any way to send gifts to model or creator or user, create business relationship with, use transmittables to secure or book, schedule, inquire about, etc.) into calendar, creators that are available for calendar, creators that are available for (e.g., in-person meeting(s), virtual creators or models, both virtual and in-person creators or models, exclusive content from platform, exclusive content from model or user of site or platform, a live calendar, timing method data, timing data method, timing process data, of persons, users calendars, imported calendars, models that are available, people available to click on, a combination or a grouped version of content such as videos, gifs, memes, continuous videos, pictures, hologram projections, 3d figures (3 dimensional), 4d figures (4 dimensional), models, girls, users, men, persons, a matching AI-connecting, system, a matching AI-connecting, deck, a stack deck, a stack of pictures to go through, a stack of profiles to go through, etc.) In some embodiments user may be required to (e.g., sign-in or join membership or pay or be approved for or be verified, etc.) in order to (e.g., have their own calendar, create calendar, integrate 3rd party calendar, pay via calendar, pay through site, pay through platform, send gifts, make connections with, have a calendar or to book through calendar or to message or to contact or to interact with or to communicate with any other user or to view calendar or to see calendar or to see schedule or to see content, etc.)

In some embodiments, there may be a combination of may include but not limited to (e.g., a profile photo or profile information or users information, matching AI-connecting, buttons, see more options, unlock content, match, add to list, add to location list, add to calendar list, add to virtual date list, book for virtual date, entertainment options set by anyone or model or user, book for in-person date, matching AI-connecting, users calendar to model's calendar with booking options, matching AI-connecting, users and model or creators calendar, showing match preferences, showing computing operation match made, auto match made, AI match made, message options to pay to message, free message options, messaging options, booking options, date options, virtual date options, information, informational options, profile options, profile preferences, etc.) In some embodiments, there may be, which may include but not limited to (e.g., pre-made or pre-created or created or entered options or custom options etc.) that may be e.g., sent, shown, displayed, editable, changeable, deleted, summoned, requested, etc.) as a, which may include but not be limited to (e.g., chart, letter, options, clickable options, clickable, calendar, timing method, content, display, optional selectable thing for acceptable requests or things that may be requested, etc.) In some embodiments, there may be, which may include but not limited to (e.g., limited items or options for requests or for options such as 'book a video call, book a phone call, send message, request anything, request something here, limited options for request listed here, show calendar, display calendar, give calendar options, message payment options, questions, request types of content, request types of videos, request types of photos, request features, request information etc.) In some embodiments, there may be a, which may include but not be limited to (e.g., screen or a user interface or a public profile or public information etc.) and/or a, which may include but not be limited to (e.g., anyway, public way, user, way, user interface, etc.) to: (e.g., 'book video call, book phone call, book in-person date, follow for free, follow, message, send message, send personalized message, send photo, send video, etc.) In some embodiments, there may be options to: (e.g., schedule things in advance, add to calendar, book and add to calendar, book, schedule, inquire about, things that are immediate such as be able to send a video message, be able to send a private photo, be able to send a question, be able to see private photos, etc.)

In some embodiments, the Platform: In some embodiments, which may include but not be limited to (e.g., 3rd party integration, Website, application, organization, website, application, etc.) may allow a service consisting of a platform for people to, which may include but not be limited to (e.g., pay to, payment in exchange for, bid to, create calendar bookings, calendar book, schedule, inquire about, book using calendar or AI, using AI to book, schedule, inquire about, inquire about, inquire regarding, secure, create connection to, hold, pay for, create business relationship with, use transmittables to secure or book, schedule, inquire about, etc.) using machine learning to book, schedule, inquire about, inquire about, inquire regarding, secure, create connection to, hold, pay for, create business relationship with, use transmittables to secure or book, schedule, inquire about, etc.) voice commands to book, schedule, inquire about, inquire about, inquire regarding, secure, create connection to, hold, pay for, create business relationship with, use transmittables to secure or book, schedule, inquire about, etc.) etc.) to go on a, which may include but not be limited to (e.g., date, connection virtual meeting with, virtual voice integration, voice connection, in-person meeting, etc.) with another, which may include but not be limited to (e.g., person, entity, 3rd party, group, multiple people, one person, family, etc.) In some embodiments, this may also be for charitable purposes, which may include but not be limited to (e.g., the payment goes to 3rd party, the price goes to a group for donation, payment is donated, partially donated, automatically sent to 3rd party, sent after obtained, sent at some point, used for another purpose, payment is deducted, etc.)

Figure 102:
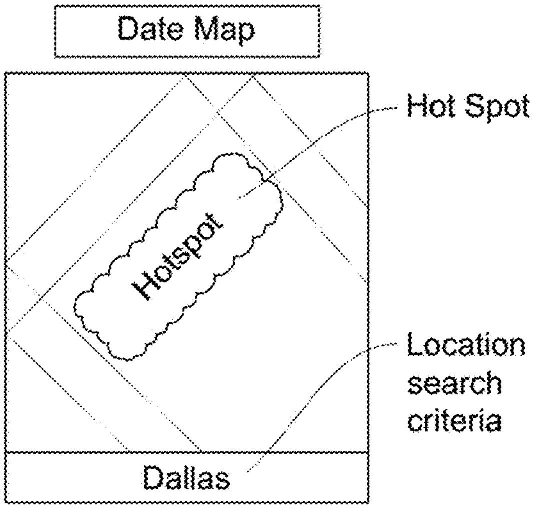

FIG. 102: In some embodiments, there may be a 'hot spot defined as a general or specific area shown to have (e.g., some, many, few, little, a lot of users, etc.) In some embodiments, the 'hot spot' area may include but are not limited to (e.g., may be or may not be specific enough to see individuals or any particular person, show people, show areas, show cities, etc.) In some embodiments, there may be a date search area where names, persons, filters, keywords, etc.) may be searched or chosen to find in-person daters, including but not limited to (e.g., major city). In some embodiments, there may be a list of users combined with a 'hot spot map' or just searched users that may show up in order of possible may include but not limited to, which may include but are not limited to (e.g., distance, time, availability, looks, criteria, filtered information, etc.) In some embodiments, users may be able to which may include but not limited to (e.g., separate, categorize, move, remove, change, select, etc.) may include but not limited to (e.g., categorize by 'daters they have highly rated, VIP spenders, categorized spenders, subscribers, unlocks, virtual, in-person, big tippers, subscriber spending, other user ratings, personal ratings, ratings made after dates, messages, etc.) In some embodiments, there may be a, which may include but not be limited to (e.g., hot spot or a 'city spot' or a way to see which city has the most users, etc.) In some embodiments, there may be a way to see only the user's city or a way to 'pay' to see other cities, etc.) In some embodiments, there may be a way to see a city or a location and filters that may find a person or a user or any person, etc.) In some embodiments, options may include but are not limited to search by (e.g., person, category, location, distance, preferences, likes, interests, person, category, separation category, etc.) In some embodiments, there may be information or matching AI-connecting or shown persons based on which may include but not limited to (e.g., 'matching AI-connecting, preferences, or search criteria, or personal computing operation, or system computing operation, or AI, or machine learning, etc.) In some embodiments, there may be options to create, which may include but are not limited to (e.g., create or organize lists, create organized preferences, create organized persons, or organized users, organized photoshoots, or organized profiles, or organized persons of interest, or organized 'liked preferences,' etc.)

In some embodiments, there may be options to message persons in the organized list or the preference list or the made list or the self-made list, or the automatically created lists, or the computing operation lists that the user may be able to, which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.)

In some embodiments, which may include but not be limited to (e.g., 'model/creator,' 'bidder,' users, public, persons, anyone, 3rd parties, advertisers, advertisements, businesses, etc.) may, which may include but not be limited to (e.g., see, view, display, show, hear etc.) which may include but not be limited to (e.g., feed, display, content, user interface, hologram, screen, hologram, user interface, viewing display, etc.) on, which may include but not be limited to (e.g., homepage, user interfaces, any user interface, any application, etc.) the, which may include but not be limited to (e.g., featured model of the month, models, promoted profiles, current profiles, computing operation profiles, photoshoots, video shoots, video content, current bids, races, one, or more, or multiple users or persons racing or bidding/auction or auctioning, which may include but not be limited to (e.g., entities, 3rd parties, advertisers, advertisements, businesses, persons, users, public, private profiles, public profiles, users, models, creators, paying persons, bidding/auction persons, etc.), which may include but not be limited to (e.g., current auctions, current date auctions, current date bids, prices, price ranges, general pricing, general transmittables, for current dates, profiles, content for unlock, free content, mixed content, content from profiles, content from users, past dates, sold items, items for sell, live profiles, live streaming, 'model/creator' on the platform, featured profiles etc.)

In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.) In some embodiments, there may be, which may include but are not limited to (e.g., requirements to be met, shown requirements, mining requirements, transmittables, 'payment requirement' etc.) to view, which may include but not be limited to, which may include but are not limited to (e.g., cities, hotspots, users, distances, overhead, any overhead view, or general view of other users based on location, city, moving, traveling, routes, etc.) In some embodiments, there may be, which may include but are not limited to (e.g., users or profiles, or content, or lists, etc.) and/or In some embodiments, the, which may include but are not limited to (e.g., the present disclosure, user interface, etc.) may provide a location-based social network system and method that may allow users to view information about other users and locations in different cities with or without requirements to be met. In some embodiments, the system may include a, which may include but are not limited to (e.g., 'hot spot" or "city spot" etc.) feature that enables users to see which cities have the, which may include but are not limited to (e.g., most users, users, persons, others to date, etc.) In some embodiments, users may also be able to, including but not limited to (e.g., pay to see other cities or access a filtered search to find users or locations based on specific criteria, etc.) In some embodiments, the system may include payment requirements for accessing certain features, such as which may include but are not limited to (e.g., viewing cities, hotspots, users, distances, overhead views, or general views of other users based on location, city, movement, traveling, routes, etc.) Users may be able to create, including but not limited to (e.g., profiles, post content, and create lists of other users or locations, etc.) based on payment or no payment for additional features.

Figure 103:
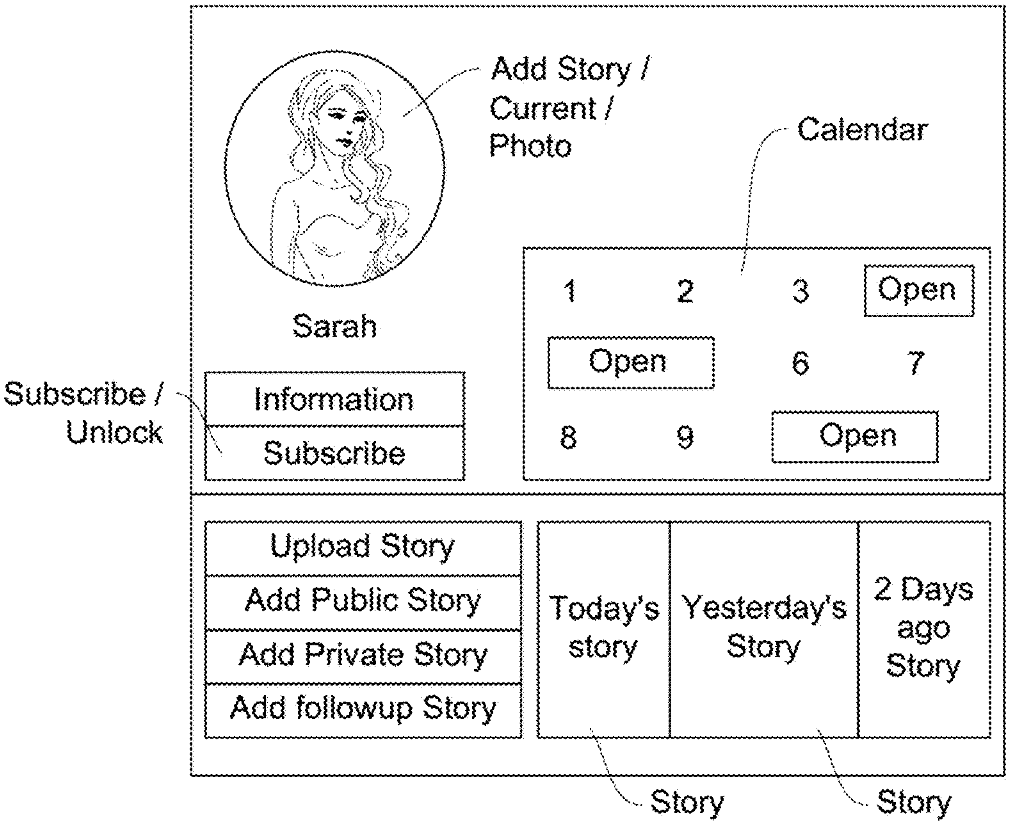

FIG. 103: In some embodiments, there may be an option for a, which may include but not limited to (e.g., 'creator, dater, user, person, group, entity, verified person, etc.) to add a, which may include but is not limited to (e.g., current story, current figure, current location, previous location, previous item, posted item, currently live, current show, current thing, live shot, live story' or a 'live upload' or a 'live shot, etc.) to their which may include but are not limited to (e.g., feed, profile, area on the platform, etc.) In some embodiments, there may be a combination of a, which may include but not limited to (e.g., live story or live information, live scene, live stream, pre-recorded live stream, pre-recorded content, pre-recorded live stream, pre-recorded live stream, pre-recorded content, or live date, etc.) combined with a, which may include but not limited to (e.g., plus, added, and/or, etc.) which may include but not be limited to (e.g., calendar book now option or information regarding the person or subscribe or unlock options, or book now options, or book options, or calendar options, etc.)

In some embodiments, there may be, which may include but are not limited to (e.g., buttons, clicks, area, automatic adding a possible, etc.) anyone which may have but not limited to (e.g., today's live, currently live, previous live, previous content, current content, today's story, yesterday's story, saved stories, multiple days ago stories, etc.) In some embodiments, there may not be a 'save story option' and/or user interface may just be, which may include but not be limited to (e.g., 'disappearing saved stories,' or disappearing stories after 24 hours or any period, etc.) In some embodiments, there may be options such as which may include but are not limited to (e.g., save stories, or save live updates, etc.) and/or there may be options to: (e.g., post old information or non-current information or stories, etc.) that are not or are within or during any of the, which may include but not limited to (e.g., period, day, month, year, exact day, etc.)

In some embodiments, a screen may show options to, including but not limited to (e.g., 'book an in-person date now' 'or sign in' etc.) In some embodiments, there may be a screen that may show any combinational of which may include but are not limited to (e.g., book an-in person date' or 'book a date' or 'show your availability to make your calendar' or 'filters' 'or 18+ models' or 'find a date now' or 'exclusive content' 'or 'register now' or 'sign in now' etc.)

In some embodiments, there may be a screen or an option to, which may include but are not limited to (e.g., view, see, obtain a stacked version of 'videos, moving pixels, photos, photo, videos, promotional material, content, etc.) related to may include but not limited to (e.g., creators, models, celebrities, paying daters, men, women, persons, etc.) Users can scroll down or up on pixelated, non-pixelated videos, photos, material, and content in some embodiments. In some embodiments, there may be, which may include but are not limited to (e.g., NSFW content, 'exclusive content, locked content, unlocked content, NSFWs, non-NSFWs, suggestive materials, content from the platform, etc.) In some embodiments, any user interface that may have an option for a user to, which may include but not be limited to (e.g., scroll up, down, left right, that may be scrolled up and down, left and right, or in and out, or back and forth, or disappearing, or appearing, or automatically moving, or auto-changing, or manually changing, etc.) In some embodiments, which may include but not limited to, the: (e.g., the user or the person or the content creator or the model, etc.) may be, which may include but not be limited to (e.g., moved to view another one, or moved in a way to view their photos, or moved in a way to view their profile, etc.) which may depend on which may include but not limited to, the: (e.g., the direction of the movement on the screen or the automatic direction or the automated selection, or the 'show version' etc.) where the user may not have to do anything and may be used which may include but not limited to (e.g., voice activation, voice command, AI command, machine learning, reading your thoughts, etc.) to: (e.g., scroll or view different parts of the screen, hologram, user interface, viewing display, person, movements, profile, calendar, selections, creators selections, etc.)

In some embodiments, there may be stacks or options to continue to look or get automated looking or viewings of, which may include but not be limited to (e.g., content, creators, models, users, etc.) there may be content that may be, which may include but not be limited to (e.g., scrolled up and down, left and right, or in and out, or back and forth, or disappearing, or appearing, or automatically moving, or auto-changing, or manually changing, etc.) In some embodiments, on FIG. 174 or any user interface, there may be options to have (e.g., 'half-unlocked content' and/or 'half-locked content, partially locked content, partially played content, preview content, preview before payment content, pay to view content, there may be 'preview only content' there may be 'prepaid content' there may be half of a photo, or half of a video, or parts of a video, or parts of a photo, or there may be a portion of a video or a portion of a photo, there may be a blurred version of a video/photo or a pixelated version of a photo/video, photos, video, content, or anything may be NSFW, or NSFW related, or sexual, or non-sexual, or NSFW content, etc.) In some embodiments, there may be options such as viewing users' calendars and filtering or category options (e.g., 'location, type of date, models, creators, etc.) In some embodiments, there may be options such as lists or profiles shown or content shown that may show 'in-person dates available' or 'live calendar, timing method data, timing data method, timing process data,' or 'types of bookings available' or 'date options available' etc.

In some embodiments, the platform or user interface: In some embodiments, which may include but not be limited to (e.g., 3rd party integration, Website, application, organization, website, application, etc.) may allow a service consisting of a platform for people to, which may include but not be limited to (e.g., pay to, payment in exchange for, bid to, create calendar bookings, calendar book, schedule, inquire about, book using calendar or AI, using AI to book, schedule, inquire about, inquire about, inquire regarding, secure, create connection to, hold, pay for, create business relationship with, use transmittables to secure or book, schedule, inquire about, etc.) using machine learning to book, schedule, inquire about, inquire about, inquire regarding, secure, create connection to, hold, pay for, create business relationship with, use transmittables to secure or book, schedule, inquire about, etc.) voice commands to book, schedule, inquire about, inquire about, inquire regarding, secure, create connection to, hold, pay for, create business relationship with, use transmittables to secure or book, schedule, inquire about, etc.) etc.) to go on a, which may include but not be limited to (e.g., date, connection virtual meeting with, virtual voice integration, voice connection, in-person meeting, etc.) with another, which may include but not be limited to (e.g., person, entity, 3rd party, group, multiple people, one person, family, etc.) In some embodiments, this may also be for charitable purposes, which may include but not be limited to (e.g., payment goes to 3rd party, payment goes to the group for donation, payment is donated, partially donated, automatically sent to 3rd party, sent after obtained, sent at some point, used for another purpose, payment is deducted, etc.)

Figure 104:
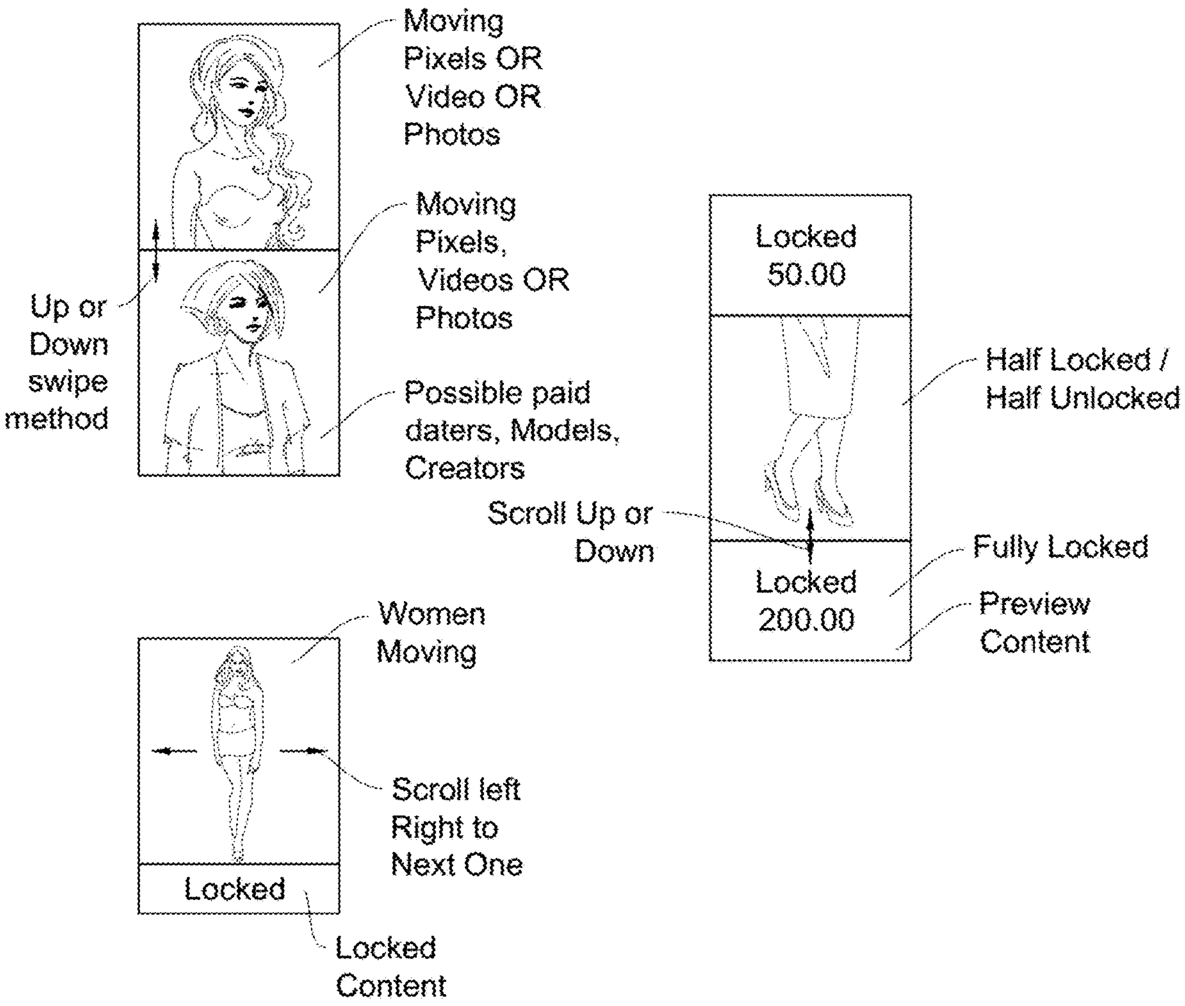

FIG. 104: In some embodiments, there may be a screen or an option to, which may include but are not limited to (e.g., view, see, obtain a stacked version of 'videos, moving pixels, photos, photo, videos, promotional material, content, etc.) related to may include but not limited to (e.g., creators, models, celebrities, paying daters, men, women, persons, etc.) Users can scroll down or up on pixelated, non-pixelated videos, photos, material, and content in some embodiments. In some embodiments, there may be, which may include but are not limited to (e.g., NSFW content, 'exclusive content, locked content, unlocked content, NSFWs, non-NSFWs, suggestive materials, content from the platform, etc.) In some embodiments, any user interface that may have an option for a user to, which may include but is not limited to (e.g., scroll up, down, left right, that may be scrolled up and down, left and right, or in and out, or back and forth, or disappearing, or appearing, or automatically moving, or auto-changing, or manually changing, etc.) In some embodiments, the content may be (e.g., half-shown, slightly blurry, not able to be shown in 3D or HD, etc.) unless payment is made or membership status is gained by the user trying to (e.g., see the remainder of the video, see the entire video, see the whole content, see more than 1 second, see the rest of the video, view, see, click, interact with, etc.) the (e.g., item or photo or media or content or information on platform or any user's profile on or off of platform, etc.)

In some embodiments, the, which may include but are not limited to (e.g., user or the person or the content creator or the model etc.) may be which may include but are not limited to (e.g., moved to view another one, or moved in a way to view their photos, or moved in a way to view their profile etc.) which may depend on the, which may include but are not limited to (e.g., direction of the movement on the screen or the automatic direction or the automated selection, or the 'show version' etc.) where the user may not have to do anything and may be using voice activation to, which may include but are not limited to (e.g., scroll or view different parts of the screen, hologram, user interface, viewing display, person, movements, profile, calendar, selections, creators selections etc.) In some embodiments, there may be stacks or options to continue to look or get automated looking or viewings of which may include but are not limited to (e.g., content, creators, models, users, etc.) there may be content that may be which may include but are not limited to (e.g., scrolled up and down, left and right, or in and out, or back and forth, or disappearing, or appearing, or automatically moving, or auto-changing, or manually changing, etc.) In some embodiments, on FIG. 174 or any user interface there may be options to have, which may include but are not limited to (e.g., 'half-unlocked content' and/or 'half-locked content, partially locked content, partially played content, preview content, preview before payment content, pay to view content,' there may be 'preview only content' there may be 'prepaid content' there may be half of a photo, or half of a video, or parts of a video, or parts of a photo, or there may be a portion of a video or a portion of a photo, there may be a blurred version of a video/photo or a pixelated version of a photo/video, photos, video, content, or anything may be NSFW, or NSFW related, or sexual, or non-sexual, or NSFW content etc.)

In some embodiments, content may be, which may include but not be limited to (e.g., blurred, half-shown, partial-shown, silent, content may be fuzzy, not shown, greyed, appear fuzzy, not appear total, viewing may be obstructed, watermark over, sound watermark on sound, watermark appearing, only a few seconds shown, only some shown then stopped, stopped content, etc.) until, which may include but not be limited to (e.g., payment is made, requirements are met, follow has been made, subscriber has been created, the profile has been created, payment to the platform has come, payment has been made to the user, exchangeable between user has been established, assets have been sent, etc.) In some embodiments, a screen may show options to, including but not limited to (e.g., 'book an in-person date now' 'or sign in' etc.) In some embodiments, there may be a screen that may show any combinational of which may include but are not limited to (e.g., book an-in person date' or 'book a date' or 'show your availability to make your calendar' or 'filters' 'or 18+ models' or 'find a date now' or 'exclusive content' 'or 'register now' or 'sign in now' etc.)

In some embodiments, there may be an may include but not limited to (e.g., user interface, option, a screen, etc.) that may show may consist of but not limited to (e.g., users, persons, profiles, models, etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any user interface for example which may be including but not limited to the user interface may show options such as which may include but not limited to (e.g., 'choose your view option' etc.) may be included but not limited to (e.g., 'tapping, swiping, desktop view, mobile view, tapping view, stacking view, swiping view, see all profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photoshoots, view those with other people that have more than one photo shoot, view matching AI-connecting, method, view swiping method, view tapping method, view stacking method, view list method, sort by lists, create lists, etc.)

In some embodiments, there may be a screen or an option to, which may include but are not limited to (e.g., view, see, obtain a stacked version of 'videos, moving pixels, photos, photo, videos, promotional material, content, etc.) related to may include but not limited to (e.g., creators, models, celebrities, paying daters, men, women, persons, etc.) Users can scroll down or up on pixelated, non-pixelated videos, photos, material, and content in some embodiments. In some embodiments, there may be, which may include but are not limited to (e.g., NSFW content, 'exclusive content, locked content, unlocked content, NSFWs, non-NSFWs, suggestive materials, content from the platform, etc.) In some embodiments, any user interface that may have an option for a user to, which may include but not be limited to (e.g., scroll up, down, left right, that may be scrolled up and down, left and right, or in and out, or back and forth, or disappearing, or appearing, or automatically moving, or auto-changing, or manually changing, etc.) In some embodiments, which may include but not limited to, the: (e.g., the user or the person or the content creator or the model, etc.) may be, which may include but not be limited to (e.g., moved to view another one, or moved in a way to view their photos, or moved in a way to view their profile, etc.) which may depend on which may include but not limited to, the: (e.g., direction of the movement on the screen or the automatic direction or the automated selection, or the 'show version' etc.) where the user may not have to do anything and may be using voice activation to: (e.g., scroll or view different parts of the screen, hologram, user interface, viewing display, person, movements, profile, calendar, selections, creators selections, etc.) In some embodiments, there may be stacks or options to continue to look or get automated looking or viewings of, which may include but not be limited to (e.g., content, creators, models, users, etc.) there may be content that may be, which may include but not be limited to (e.g., scrolled up and down, left and right, or in and out, or back and forth, or disappearing, or appearing, or automatically moving, or auto-changing, or manually changing, etc.) In some embodiments, on FIG. 174 or any user interface, there may be options to have (e.g., 'half-unlocked content' and/or 'half-locked content, partially locked content, partially played content, preview content, preview before payment content, pay to view content, there may be 'preview only content' there may be 'prepaid content' there may be half of a photo, or half of a video, or parts of a video, or parts of a photo, or there may be a portion of a video or a bit of a photo, there may be a blurred version of a video/photo or a pixelated version of a photo/video, photos, video, content, or anything may be NSFW, or NSFW related, or sexual, or non-sexual, or NSFW content, etc.)

In some embodiments, there may be options such as viewing users' calendars and filtering or category options (e.g., 'location, type of date, models, creators, etc.) In some embodiments, there may be options such as lists or profiles shown or content shown that may show or display 'in-person dates available' or 'live calendar, timing method data, timing data method, timing process data,' or 'types of bookings available' or 'date options available' etc.) In some embodiments, there may be, which may include but not be limited to (e.g., half-locked content, partially locked content, partially played content, preview content, preview before payment content, pay to view content, partially locked content, partially played content, preview content, preview before payment content, pay to view content, etc.) In some embodiments, content may have a, which may include but not be limited to (e.g., which may include but not be limited to preview and may have to be paid to continue, etc.) In some embodiments, previews may be made or a certain number of free previews or previews that require payment to continue. In some embodiments, the creator or the person who owns the content may control the cost of content from their own (e.g., database, screen, hologram, user interface, viewing display, managing system, or allow 3rd party, or another person, etc.) In some embodiments, previewing content may be, which may include but not be limited to (e.g., continuous, may be scrolled, may be clicked, may be commanded, may be auto-switching through, etc.) In some embodiments, which may include but not limited to, the: (e.g., scroll or the content or the following preview, or any content viewed, etc.) may be, which may include but not be limited to (e.g., continuous or may be switched through a swipe method, or a manual process using hands, fingers, body, or mind may include but not limited to the brain, a chip, commands by a human, robot, bot, 3rd party, entity, computer system, AI system, alien, or an animal, etc.) In some embodiments, there may be previewed sections (e.g., set and may be selected, clicked, tapped, etc.) to show content or preview content, etc.)

In some embodiments, the platform or user interface: In some embodiments, which may include but not be limited to (e.g., 3rd party integration, website, application, organization, website, application, etc.) may allow a service consisting of a platform for people to, which may include but not be limited to (e.g., pay to, payment in exchange for, bid to, create calendar bookings, calendar book, schedule, inquire about, book using calendar or AI, using AI to book, schedule, inquire about, inquire about, inquire regarding, secure, create connection to, hold, pay for, create business relationship with, use transmittables to secure or book, schedule, inquire about, etc.) using machine learning to book, schedule, inquire about, inquire about, inquire regarding, secure, create connection to, hold, pay for, create business relationship with, use transmittables to secure or book, schedule, inquire about, etc.) voice commands to book, schedule, inquire about, inquire about, inquire regarding, secure, create connection to, hold, pay for, create business relationship with, use transmittables to secure or book, schedule, inquire about, etc.) etc.) to go on a, which may include but not be limited to (e.g., date, connection virtual meeting with, virtual voice integration, voice connection, in-person meeting, etc.) with another, which may include but not be limited to (e.g., person, entity, 3rd party, group, multiple people, one person, family, etc.) In some embodiments, this may also be for charitable purposes, which may include but not be limited to (e.g., payment goes to 3rd party, the payment goes to a group for donation, payment is donated, partially donated, automatically sent to 3rd party, sent after obtained, sent at some point, used for another purpose, payment is deducted, etc.)

Figure 105:
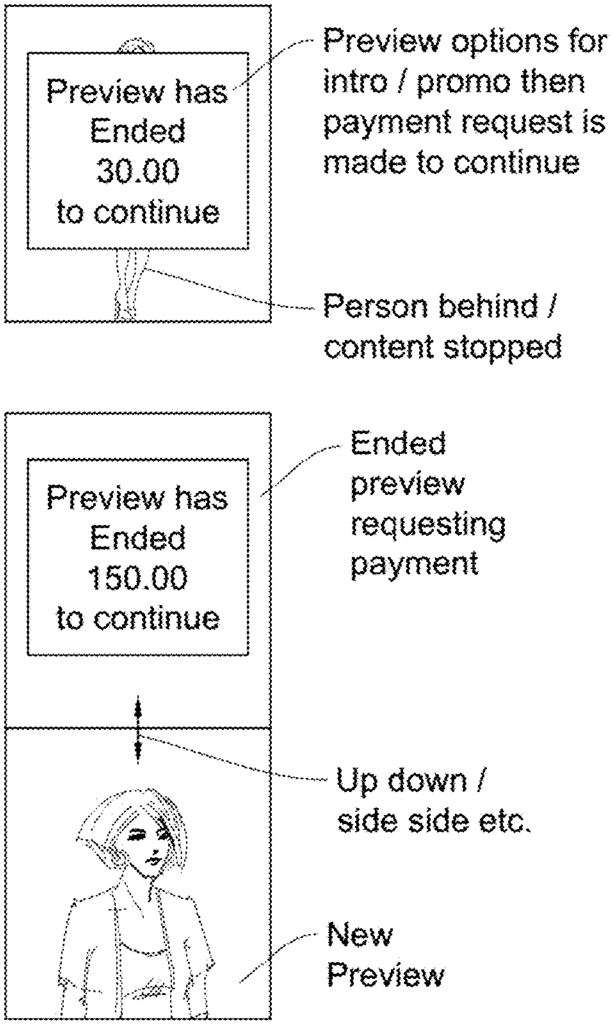

FIG. 105: In some embodiments, there may be, which may include but not be limited to (e.g., half-locked content, partially locked content, partially played content, preview content, preview before payment content, pay to view content, partially locked content, partially played content, preview content, preview before payment content, pay to view content, etc.) In some embodiments, content may have a, which may include but not be limited to (e.g., which may include but not be limited to preview and may have to be paid to continue, etc.) In some embodiments, previews may be made or a certain number of free previews or previews that require payment to continue. In some embodiments, the creator or the person who owns the content may control the cost of content from their own (e.g., database, screen, hologram, user interface, viewing display, managing system, or allow 3rd party or another person, etc.) In some embodiments, previewing content may be, which may include but not be limited to (e.g., continuous, may be scrolled, may be clicked, may be commanded, may be auto-switching through, etc.) In some embodiments, which may include but not limited to, the: (e.g., scroll or the content or the following preview, or any content viewed, etc.) may be, which may include but not be limited to (e.g., continuous or may be switched through a swipe method, or a manual process using hands, fingers, body, or mind may include but not limited to the brain, a chip, commands by a human, robot, bot, 3rd party, entity, computer system, AI system, alien, or an animal, etc.) In some embodiments, there may be previewed sections (e.g., set and may be selected, clicked, tapped, etc.) to show content or preview content, etc.) In some embodiments, there may be a screen or an option to, which may include but are not limited to (e.g., view, see, obtain a stacked version of 'videos, moving pixels, photos, photo, videos, promotional material, content, etc.) related to may include but not limited to (e.g., creators, models, celebrities, paying daters, men, women, persons, etc.) Users can scroll down or up on pixelated, non-pixelated videos, photos, material, and content in some embodiments. In some embodiments, there may be, which may include but are not limited to (e.g., NSFW content, 'exclusive content, locked content, unlocked content, NSFWs, non-NSFWs, suggestive materials, content from the platform, etc.) In some embodiments, any user interface that may have an option for a user to, which may include but is not limited to (e.g., scroll up, down, left right, that may be scrolled up and down, left and right, or in and out, or back and forth, or disappearing, or appearing, or automatically moving, or auto-changing, or manually changing, etc.)

In some embodiments, the, which may include but are not limited to (e.g., user or the person or the content creator or the model etc.) may be which may include but are not limited to (e.g., moved to view another one, or moved in a way to view their photos, or moved in a way to view their profile etc.) which may depend on the, which may include but are not limited to (e.g., direction of the movement on the screen or the automatic direction or the automated selection, or the 'show version' etc.) where the user may not have to do anything and may be using voice activation to, which may include but are not limited to (e.g., scroll or view different parts of the screen, hologram, user interface, viewing display, person, movements, profile, calendar, selections, creators selections etc.) In some embodiments, there may be stacks or options to continue to look or get automated looking or viewings of which may include but are not limited to (e.g., content, creators, models, users, etc.) there may be content that may be which may include but are not limited to (e.g., scrolled up and down, left and right, or in and out, or back and forth, or disappearing, or appearing, or automatically moving, or auto-changing, or manually changing, etc.) In some embodiments, on FIG. 174 or any user interface there may be options to have, which may include but are not limited to (e.g., 'half-unlocked content' and/or 'half-locked content, partially locked content, partially played content, preview content, preview before payment content, pay to view content,' there may be 'preview only content' there may be 'prepaid content' there may be half of a photo, or half of a video, or parts of a video, or parts of a photo, or there may be a portion of a video or a portion of a photo, there may be a blurred version of a video/photo or a pixelated version of a photo/video, photos, video, content, or anything may be NSFW, or NSFW related, or sexual, or non-sexual, or NSFW content etc.)

In some embodiments, content may be, which may include but not be limited to (e.g., blurred, half-shown, partial-shown, silent, content may be fuzzy, not shown, greyed, appear fuzzy, not appear total, viewing may be obstructed, watermark over, sound watermark on sound, watermark appearing, only a few seconds shown, only some shown then stopped, stopped content, etc.) until, which may include but not be limited to (e.g., payment is made, requirements are met, follow has been made, subscriber has been created, the profile has been created, payment to the platform has come, payment has been made to the user, exchangeable between user has been established, assets have been sent, etc.) In some embodiments, a screen may show options to, including but not limited to (e.g., 'book an in-person date now' 'or sign in' etc.) In some embodiments, there may be a screen that may show any combinational of which may include but are not limited to (e.g., book an-in person date' or 'book a date' or 'show your availability to make your calendar' or 'filters' 'or 18+ models' or 'find a date now' or 'exclusive content' 'or 'register now' or 'sign in now' etc.)

In some embodiments, there may be an may include but not limited to (e.g., user interface, option, a screen, etc.) that may show may consist of but not limited to (e.g., users, persons, profiles, models, etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any user interface for example which may be including but not limited to the user interface may show options such as which may include but not limited to (e.g., 'choose your view option' etc.) may be included but not limited to (e.g., 'tapping, swiping, desktop view, mobile view, tapping view, stacking view, swiping view, see all profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photoshoots, view those with other people that have more than one photo shoot, view matching AI-connecting, method, view swiping method, view tapping method, view stacking method, view list method, sort by lists, create lists, etc.)

In some embodiments, there may be a screen or an option to, which may include but are not limited to (e.g., view, see, obtain a stacked version of 'videos, moving pixels, photos, photo, videos, promotional material, content, etc.) related to may include but not limited to (e.g., creators, models, celebrities, paying daters, men, women, persons, etc.) Users can scroll down or up on pixelated, non-pixelated videos, photos, material, and content in some embodiments. In some embodiments, there may be, which may include but are not limited to (e.g., NSFW content, 'exclusive content, locked content, unlocked content, NSFWs, non-NSFWs, suggestive materials, content from the platform, etc.) In some embodiments, any user interface that may have an option for a user to, which may include but not be limited to (e.g., scroll up, down, left right, that may be scrolled up and down, left and right, or in and out, or back and forth, or disappearing, or appearing, or automatically moving, or auto-changing, or manually changing, etc.) In some embodiments, which may include but not limited to, the: (e.g., the user or the person or the content creator or the model, etc.) may be, which may include but not be limited to (e.g., moved to view another one, or moved in a way to view their photos, or moved in a way to view their profile, etc.) which may depend on which may include but not limited to, the: (e.g., direction of the movement on the screen or the automatic direction or the automated selection, or the 'show version' etc.) where the user may not have to do anything and may be using voice activation to: (e.g., scroll or view different parts of the screen, hologram, user interface, viewing display, person, movements, profile, calendar, selections, creators selections, etc.) In some embodiments, there may be stacks or options to continue to look or get automated looking or viewings of, which may include but not be limited to (e.g., content, creators, models, users, etc.) there may be content that may be, which may include but not be limited to (e.g., scrolled up and down, left and right, or in and out, or back and forth, or disappearing, or appearing, or automatically moving, or auto-changing, or manually changing, etc.) In some embodiments, on FIG. 174 or any user interface, there may be options to have (e.g., 'half-unlocked content' and/or 'half-locked content, partially locked content, partially played content, preview content, preview before payment content, pay to view content, there may be 'preview only content' there may be 'prepaid content' there may be half of a photo, or half of a video, or parts of a video, or parts of a photo, or there may be a portion of a video or a portion of a photo, there may be a version of a video/photo or a pixelated version of a photo/video, photos, video, content, or anything may be NSFW, or NSFW related, or sexual, or non-sexual, or NSFW content, etc.)

In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, or areas, or profiles, or content, or hologram or display screens, etc.) to continue to look or get automated, which may include but not be limited to (e.g., looking, viewings of, movement, selection, scroll, etc.) which may include but not be limited to (e.g., content, creators, models, users, etc.) In some embodiments, content may be, which may include but not be limited to (e.g., blurred, half-shown, partial-shown, silent, content may be fuzzy, not shown, greyed, appear fuzzy, not appear total, viewing may be obstructed, watermark over, sound watermark on sound, watermark appearing, only a few seconds shown, only some shown then stopped, stopped content, etc.) until, which may include but not be limited to (e.g., payment is made, requirements are met, follow has been made, subscriber has been created, profile has been created, payment to platform has come, payment has been made to user, exchangeable between user has been established, assets have been sent, etc.)

In some embodiments, there may be options such as, which may include but not be limited to (e.g., viewing users' calendar and filtering or category options, etc.) which may include but not be limited to (e.g., 'location, type of date, models, creators, etc.) In some embodiments, there may be options such as lists or profiles shown or content shown that may show, which may include but not be limited to (e.g., 'in-person dates available' or 'live calendar, timing method data, timing data method, timing process data, or 'types of bookings available' or 'date options available' etc.) In some embodiments, there may be, which may include but not be limited to (e.g., half-locked content, partially locked content, partially played content, preview content, preview before payment content, pay to view content, partially locked content, partially played content, preview content, preview before payment content, pay to view content, etc.) In some embodiments, content may have a, which may include but not be limited to (e.g., for example, which may be including but not limited to preview and may have to be paid to continue, etc.) In some embodiments, previews may be made or a certain number of free previews or previews that require payment to continue. In some embodiments, the creator or the person who owns the content may control the cost of content from their own (e.g., database, screen, hologram, user interface, viewing display, managing system, or allow 3rd party, or another person, etc.) In some embodiments, previewing content may be, which may include but not be limited to (e.g., continuous, may be scrolled, may be clicked, may be commanded, may be auto-switching through, etc.) In some embodiments, which may include but not limited to, the: (e.g., scroll or the content or the next preview, or any content viewed, etc.) may be, which may include but not be limited to (e.g., continuous or may be switched through a swipe method, or a manual method using hands, fingers, body, or mind may include but not limited to the brain, a chip, commands by a human, robot, bot, 3rd party, entity, computer system, AI system, alien, or an animal, etc.) In some embodiments, there may be previewed sections (e.g., set and may be just be selected, clicked, tapped, etc.) to show content or preview content, etc.)

In some embodiments, the platform or user interface: In some embodiments, which may include but not be limited to (e.g., 3rd party integration, interface(s), website, application, organization, website, application, etc.) may allow a service consisting of a platform for people to, which may include but not be limited to (e.g., pay to, payment in exchange for, bid to, create calendar bookings, calendar book, schedule, inquire about, book using calendar or AI, using AI to book, schedule, inquire about, inquire about, inquire regarding, secure, create connection to, hold, pay for, create business relationship with, use transmittables to secure or book, schedule, inquire about, etc.) using machine learning to book, schedule, inquire about, inquire about, inquire regarding, secure, create connection to, hold, pay for, create business relationship with, use transmittables to secure or book, schedule, inquire about, etc.) voice commands to book, schedule, inquire about, inquire about, inquire regarding, secure, create connection to, hold, pay for, create business relationship with, use transmittables to secure or book, schedule, inquire about, etc.) to go on a, which may include but not be limited to (e.g., date, connection virtual meeting with, virtual voice integration, voice connection, in-person meeting, etc.) with another, which may include but not be limited to (e.g., person, entity, 3rd party, group, multiple people, one person, family, etc.) In some embodiments, this may also be for charitable purposes, which may include but not be limited to (e.g., the payment goes to 3rd party, the payment goes to the group for donation, payment is donated, partially donated, automatically sent to 3rd party, sent after obtained, sent at some point, used for another purpose, payment is deducted, etc.)

Figure 106:
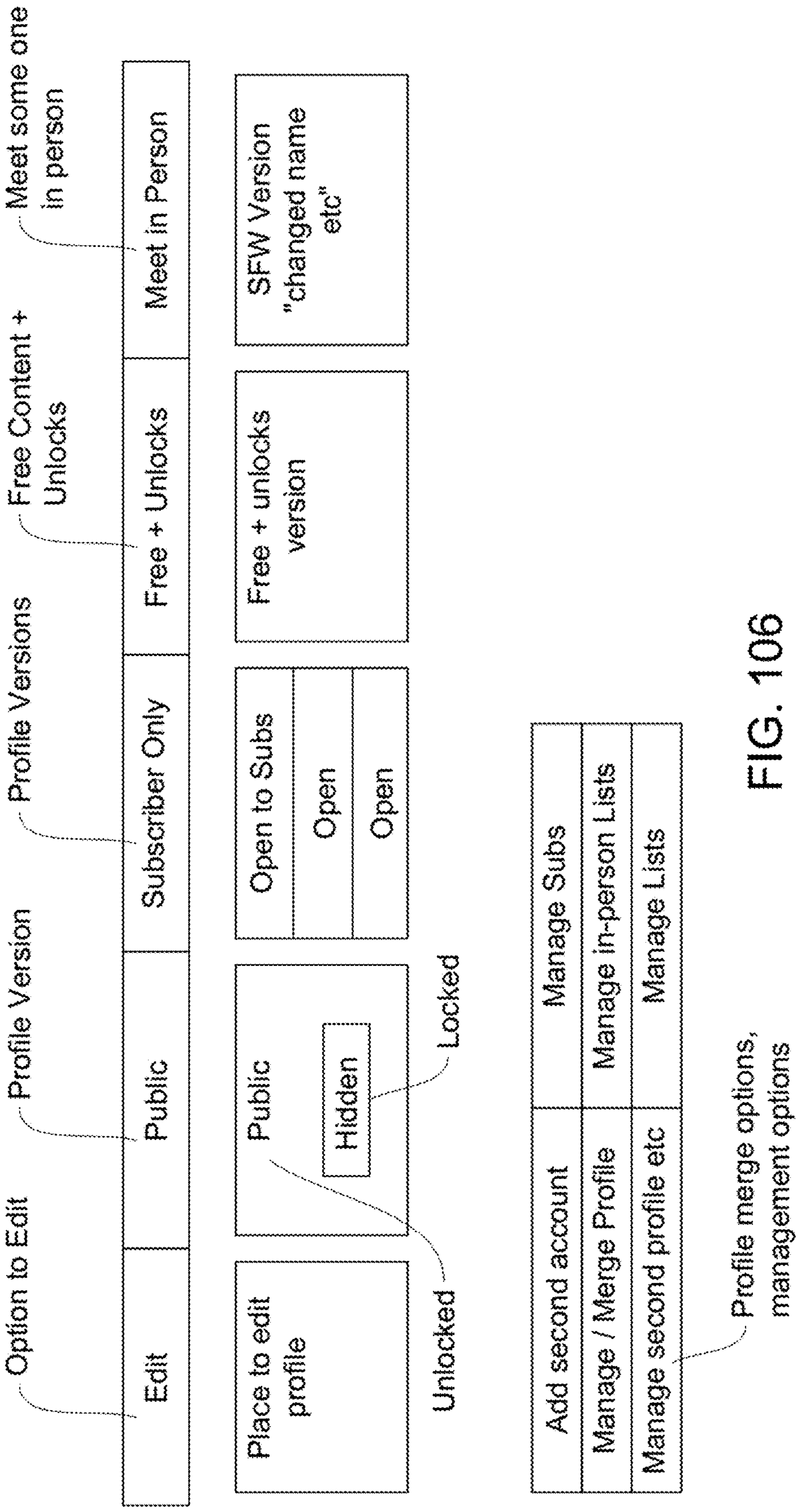

FIG. 106: In some embodiments, there may be different (e.g., user interfaces, areas, locations, 3rd parties, advertisers, advertisements, businesses, apps, etc.) which may include but not be limited to (e.g., users, user interfaces, profile versions or versions etc.) in which content may be, which may include but not be limited to (e.g., viewed, seen, shown, displayed, searchable, etc.) In some embodiments, there may be options to view, which may include but not be limited to (e.g., 'public, private, free plus content that may be unlocked, a profile version for someone they met in person that may not show specific content, or does, or may be catered for their safety, public profile with everything showing, public profile with previews or content that may be unlocked, content, etc.) In some embodiments, there may be options to have, which may include but not be limited to (e.g., profile versions for those they meet in person, or any special profiles, or dummy versions, or alternate versions, etc.) which may display a, which may include but not be limited to (e.g., 'changed name' or a 'private name' or a 'different name' or a 'different version of their public profile' or an 'undetectable version' or a 'connected separate version of their profile' or a 'second profile that is connected to their account' etc.) In some embodiments, there may be options to, which may include but not be limited to (e.g., 'merge different profile' or 'merge second profiles' or 'take second profiles and add it to the first one' or 'manage their other profile' etc.) In some embodiments, there may be, which may include but not be limited to (e.g., limits to the amount of merged profile or second profiles or other profiles, or there may not be limits to the amount of profile they or a user, may be have, or not limits, etc.) In some embodiments, there may be options, which may include but not limited to or viewing may include but not limited to (e.g., profile information, photos, content, calendar, locked content, unlocked content, free content, subscriber only content, not available content, pay to view content, calendar content, the content may be in a form of a grid, line, scrolling option, disappearing option, scrolling option, matching AI-connecting, option, tapping option, viewing options, lines, lists, created lists, etc.) In some embodiments, (e.g., user or person or business or entity, etc.) may be able to manage their (e.g., subscribers, their fans, their friends, have a top friend group, have recommended girls or users or products, etc.)

In some embodiments, there may be a, which may include but not limited to (e.g., profile or content photo option with other options, etc.) such as which may include but not limited to (e.g., 'book in-person date, book virtual, book talk, book chat, book video chat, book video meeting, book voice conversation, date, book date activity, calendar options, in-depth calendar, calendar combined with other users' calendar, short version of the calendar, immediate or long-term calendar, users preferences or user status such as 'follow for free' or 'subscriber only content' or 'locked' and 'unlocked content' or 'paid content' 'or subscriber only content' etc.)

Figure 107:
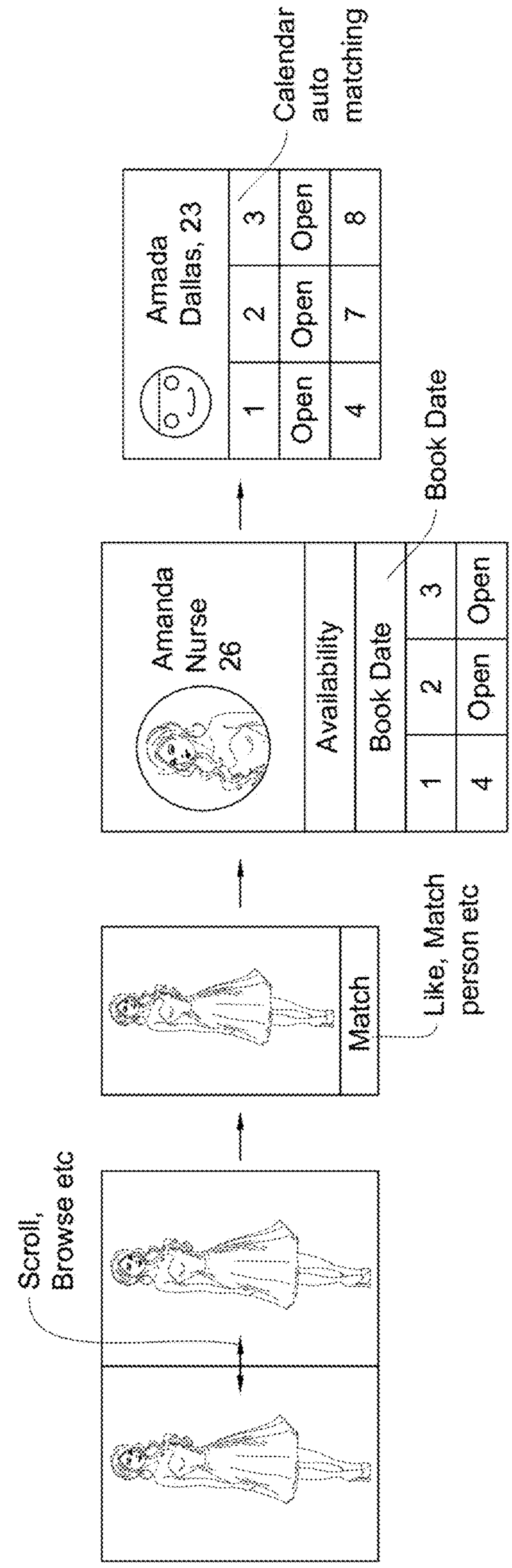
Figure 108:
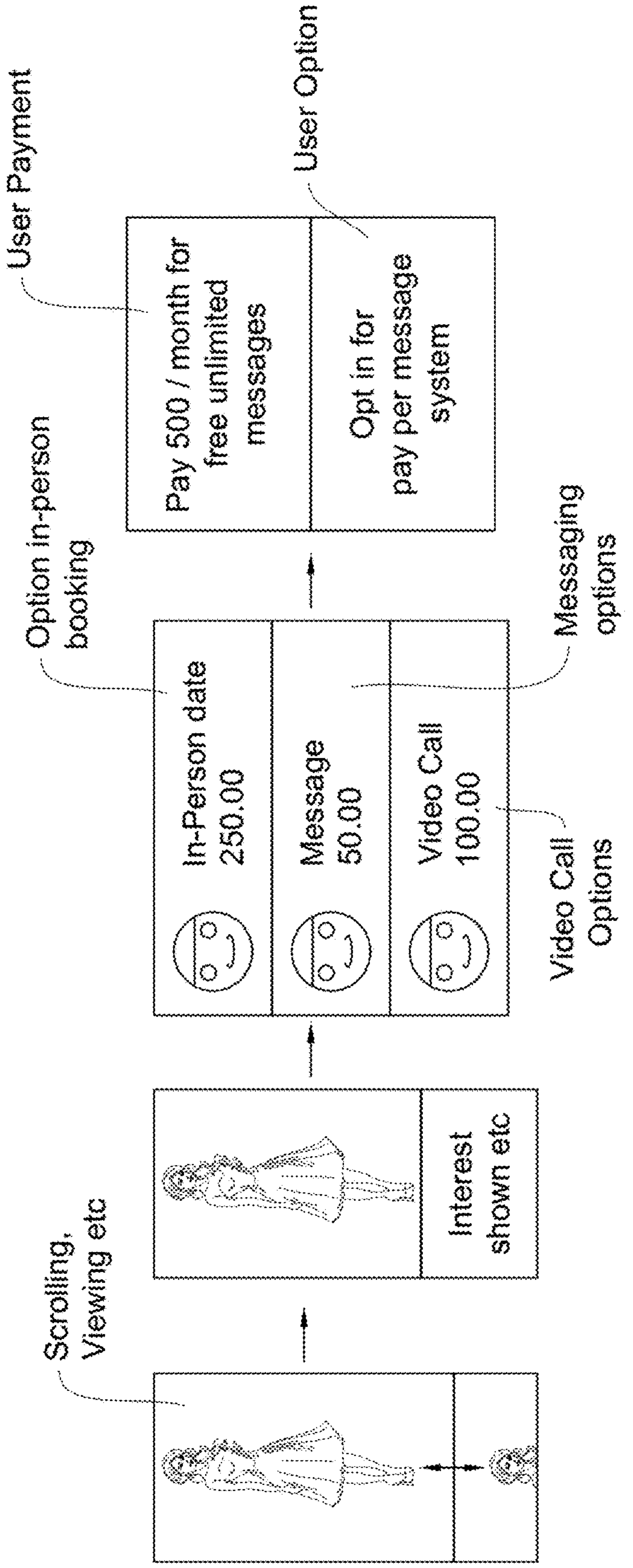

FIG. 107, FIG. 108: In some embodiments, there may be an which may include but are not limited to (e.g., user interface, process, display, screen, etc.) that goes from which may include but are not limited to (e.g., selection, viewing options, users that are active or inactive, live users, location-based search, options, or viewing of persons, platform search, platform-provided search, etc.) to, which may include but are not limited to (e.g., matching AI-connecting, or interest, or like, or mutual like, or one sided-like, etc.) In some embodiments, user interface may go e.g., directly or to another user interface or on same user interface, etc.) to show a, which may include but are not limited to (e.g., calendar availability, automatic matching, automatic scheduling matching, automatic match, auto-viewing, auto-search, auto-like, scheduling option, or availability, or time period, or scheduling option, open availability, etc.) that may show which may include but are not limited to (e.g., some information, all interests, all food choices, all pre-selected options for location of date, all pre-payment options, etc.) then user interface may go directly into, which may include but are not limited to (e.g., booking, or payment in order to book, schedule, inquire about, inquire about, inquire regarding, secure, create connection to, hold, pay for, create business relationship with, use transmittables to secure or book, schedule, inquire about, etc.) the date, or meet requirements of the date, or connection, etc.) In some embodiments, there may not be an option to, which may include but are not limited to (e.g., contact, message or to book, schedule, inquire about, inquire about, inquire regarding, secure, create connection to, hold, pay for, send gift for, send gifts, donate gifts, donate money, donate gifts, create business relationship with, use transmittables to secure or book, schedule, inquire about, etc.) an-in person date etc.) unless the user which may include but are not limited to (e.g., pays the payment, makes transmittables, sends assets, makes assets, sends gifts, etc.) for the, which may include but are not limited to (e.g., 'date' or the 'meeting' or the 'connection' or the messaging, 'or the video chat' or the 'video call' etc.) In some embodiments, there may be an which may include but are not limited to (e.g., non-regulated, anytime version, unlimited version, membership options, membership services, paid for, etc.) for users to make which may include but are not limited to (e.g., any amount, limited amount, unlimited etc.) which may include but are not limited to (e.g., video calls, messages, in-person dates, etc.) and/or there may be an option for the other user to, which may include but are not limited to (e.g., opt-in to this group system or add to, or join, or automatically join, etc.) that pays them determining by which may include but are not limited to (e.g., frequency, ability, quality, participation, how many, etc.) which may include but are not limited to (e.g., dates, or how many messages, or how many video calls, etc.) In some embodiments, etc.) there may be options to not pay unlimited for in-person, video, messages, or unlocks and each one may have to be paid which may include but are not limited to (e.g., one at a time, separate, by itself, separate, individually, etc.) In some embodiments, options for (e.g., in-person dates, virtual dates, message dates, messaging, pricing, gifting options, gifts in exchange for booking, donation of gifts in exchange for time or interest, etc.)

In some embodiments, there may be an may include but not limited to (e.g., user interface, option, a screen etc.) that may show may include but not limited to (e.g., users, persons, profiles, models etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any interface listed or not listed: for example which may be including but not limited to user interface may show options such as which may include but not limited to (e.g., 'choose your view option' etc.) which may be included but not limited to (e.g., 'tapping, swiping, desktop view, mobile view, tapping view, stacking view, swiping view, see all profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photoshoots, view those with other people that have more than one photoshoot, view matching AI-connecting, method, view swiping method, view tapping method, view stacking method, view list method, sort by lists, create lists, etc.) In some embodiments, payment may be required in exchange for any option, which may include but not be limited to (e.g., payment to view content, payment to view calendar, interact with to view calendar, interact with to view timing data method, payment to book, schedule, inquire about, inquire about, inquire regarding, secure, create connection to, hold, pay for, create business relationship with, use transmittables to secure or book, schedule, inquire about, etc.) payment to join call, payment for background check by 3rd party, payment to live stream, pre-recorded live stream, pre-recorded content, payment to join stream, payment to join call, payment for content, payment for message, payment to see calendar, payment to see profiles, payment to see other cities, payment to book, schedule, inquire about, inquire about, inquire regarding, secure, create connection to, hold, pay for, create business relationship with, use transmittables to secure or book, schedule, inquire about, etc.) which may include but not be limited to (e.g., profiles or persons in other cities, payment to view stories, payment to view live or current content, payment to follow, payment to subscribe, payment for unlimited content, payment for unlimited messages, payment for unlimited dates, payment for contact options, payment for contact information, payment to see live, payment to obtain information, payment to match, payment to view now, payment to unlock content, payment to begin, payment to view information about user, payment to see background check, payment to send direct message, payment to add to category, payment to add to list, payment to be on cover, payment to be on first page, payment to be at top, payment to be suggested, payment to wink, flirt, send heart, payment to speak to another person, etc.)

In some embodiments, there may be options, which may include but not be limited to (e.g., where all content is locked or closed, or not shown etc.) until may include but not be limited to (e.g., follow is made, or a sign is made, or a booking is made, or a payment is made, etc.) In some embodiments, there may be options to book, schedule, inquire about, inquire about, inquire regarding, secure, create connection to, hold, pay for, create business relationship with, use transmittables to secure or book, schedule, inquire about, etc.) may include but not be limited to (e.g., in-person, immediately, in a smaller format that may be extend larger, anywhere on the user interface, or the user interface, etc.) In some embodiments, there may be combined locked and unlocked content, etc.) In some embodiments, there may be moving content may include but not be limited to (e.g., items or options moving around, moving content, replacing, disappearing, reappearing, appearing, moving, swaying), which may include but not be limited to (e.g., items such as videos, photos, content, promotional material, stacked photos, information, etc.) In some embodiments, ‘locked content’ may refer to content, which may include but not be limited to (e.g., any type of content, which may include but not be limited to (e.g., videos, photos, moving content, holograms, live content, live show, live viewing, pre-recorded viewing etc.) that may need to be ‘paid’ before may include but not be limited to (e.g., shown, or subscribed to, paid for, assets put up for, etc.) In some embodiments, there may an user interface or a screen or a visual of a profile or content, combined with options that may include but not limited to (e.g., book date, book meeting, follow for free, follow, message, price per message, price to send inquiry, send application, sign up for application, content, locked content, unlocked content, subscriber only content, follower-only content, etc.) In some embodiments, there may be an option to view content and/or have other options on the content to may include but not be limited to (e.g., view or interact with, or create, or edit, or move, etc.) whether (e.g., on top, on the side, on any part, or outside of the content etc.) which may include but not be limited to (e.g., locked content, book now, book for date, book for virtual date, entertainment options set by anyone or model or user, book for in person date, book video call, book phone call, view profile, etc.) In some embodiments, viewing profile may lead to a may include but not be limited to (e.g., ‘locked profile’ or a preview sort of profile, or a preview of content, or a lesser version of the full version, or a simpler version, or a version that is specifically shown, etc.) that a person may be required to ‘follow,’ which may include but not be limited to (meet requirements of user, platform, etc.) to: (e.g., see, view interact with, tap, message, do anything, screenshot, copy, etc.) In some embodiments, a person may be required to may include but not be limited to (e.g., meet requirements, or complete tasks, etc.) to see (e.g., profile, see information, access information, access content, view, preview, etc.)

In some embodiments, there may be, which may include but not be limited to (e.g., live streams, multiple live streams, multiple options to click on live streaming, live streams may be pre-recorded, etc.) In some embodiments, there may be, which may include but not be limited to (e.g., live stream options, virtual prices, price ranges, general pricing, general transmittables, in-person prices, price ranges, general pricing, general transmittables, pricing, availability today, brunch price, lunch price, user’s calendar, calendar options to view, calendar, profile photos, profile, content, etc.) In some embodiments, there may be screen options for profile viewing options. In some embodiments, there may be a headline or a header photo or video at the top; this also may be a gif, a moving item, or a still item such as a photo. In some embodiments, the creator, person, dater, paid person, paid person, or platform may choose a profile photo.

In some embodiments, there may be a combination of one of more which may include but not limited to (e.g., follow for free, follow, connect, add, free viewing options, subscriber only options, follower only options, locked, unlocked content, content, different viewing options, preview of contents, limited or unlimited content previews, payment for previews, credit for previews, credit payment options, payment options, lists whether stacked, side by side, up and down, swiping, tapping, calendar, booking options, virtual or in-person options, users information, users profile, content, preview of content, searching options, matching AI-connecting, options, matches, similar matches, locked content, different profile options, different feed options, locked content options, locked feed options, messages, direct messages, profile messages, live events, live searching, current lives, calendar availability, scheduling option, follow for free, live persons and matching AI-connecting, live persons, currently live, swipe to view, swipe to see, similar persons, availability of person availability of persons, availability of users, availability in general, matching AI-connecting, of persons, matching AI-connecting, based on criteria, etc.) In some embodiments, matching AI-connecting, based on any reasons, may include but is not limited to computing operation, machine learning, previous clicks, similar dates, similarities, criteria, searching, location, distance, availability, careers, types, looks, weight, height, preferences, etc.)

In some embodiments, there may be an option to ‘book an in-person date’ from the profile photo, a button, clicker, swiping method, or any clicking method near the profile photo, video, or any section on the profile page or outside the profile page. In some embodiments, there may be ‘subscribe, follow for free, unlock photo options, free photo options, free video options, tipping buttons or options, messaging options to send a direct message, messaging options that may include being able to attach, add, or contain a photo, a voice recording, a video recording, or a live recorded message to be sent to the creator, model, or another person.

In some embodiments, there may be an option to 'add friends' or follow options' for other creators or 'paid persons on the platform.' In some embodiments, there may be a link to book, schedule, inquire about, inquire about, inquire regarding, secure, create a connection to, hold, pay for, create a business relationship with, use transmittables to secure or book, schedule, inquire about, etc.) an-in person date, activity, method, connection, live streaming, live video call, live phone call, etc.) through the platform. In some embodiments, this button may take the person to another screen that may show a, which may include but not be limited to (e.g., calendar, timing method, timing schedule, scheduling device, scheduling options, day organizer, life organizer, etc.) that may include the person's schedule which may include but is not limited to available booking dates, preferences on booking dates, options that may be chosen, limited availability, limited options, limited viewing of calendar, only showing dates available, only showing options that the creator wants. In some embodiments, this calendar or section, or the page may show the creator's set preferences which may include but are not limited to the creator's likes, including 'Seafood restaurants, Steak Restaurant, Time preferences (lunch or dinner), 'time preferences such as 6-8 pm for in-person dates, other 'likes' such as 'loves gentlemen that may show up on a date with flowers, etc.')

In some embodiments, there may be a, which may include but not limited to (e.g., profile or content photo option with other options, etc.) such as which may include but not limited to (e.g., 'book in-person date, book virtual, book talk, book chat, book video chat, book video meeting, book voice conversation, date, book date activity, calendar options, in-depth calendar, calendar combined with other users' calendar, short version of the calendar, immediate or long-term calendar, users preferences or user status such as 'follow for free' or 'subscriber only content' or 'locked' and 'unlocked content' or 'paid content' 'or subscriber only content' etc.)

In some embodiments, there may be, which may include but not be limited to (e.g., an AI, human, robot, bot, 3rd party, entity, computer system, AI system, or machine learning, or robotic version for a user of any type to type in a 'match suggestion' or a 'discover suggestion' or a help suggestion, etc.) In some embodiments, there may be a way to 'type in' or manual input of information, which may include but not be limited to (e.g., it's a description, a look, a type of photo, anything to find, discover, view, see users or suggestions, etc.) In some embodiments, there may be different ways to: (e.g., sort through content or see content or view content, etc.), which may include but not be limited to (e.g., swiping, tapping, viewing shapes, viewing profiles, viewing content, viewing promo photos, viewing videos, messages, add to the list, messaging, organization, organizing, booking virtual, booking in person, viewing the calendar, etc.)

Figure 109:
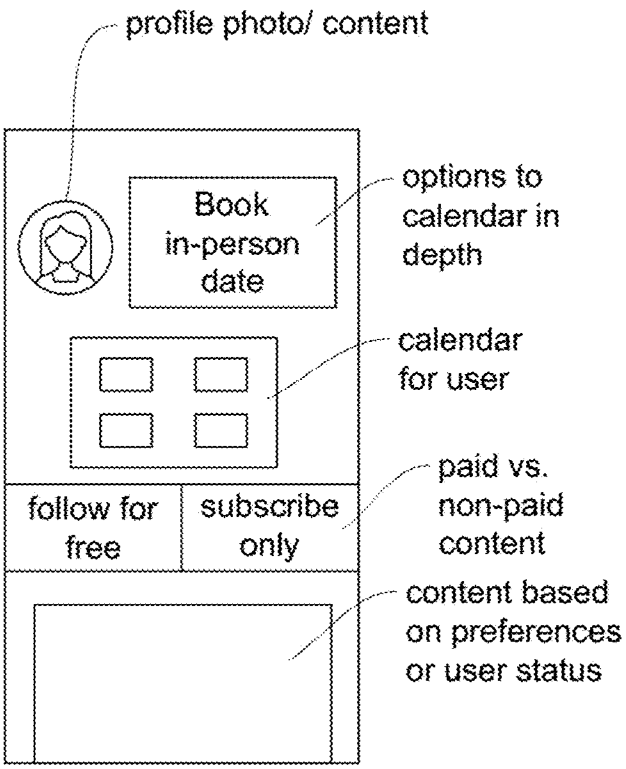

FIG. 109: In some embodiments, there may be a, which may include but not limited to (e.g., profile or content photo option with other options etc.) such as which may include but not limited to (e.g., 'book in-person date, book virtual, book talk, book chat, book video chat, book video meeting, book voice conversation, date, book date activity, calendar options, in-depth calendar, calendar combined with other users' calendar, short version of calendar, immediate or long-term calendar, users preferences or user status such as 'follow for free' or 'subscriber only content' or 'locked' and 'unlocked content' or 'paid content' 'or subscriber only content' etc.) In some embodiments, there may be an which may include but are not limited to (e.g., user interface, process etc.) that goes from which may include but are not limited to (e.g., selection, options, or viewing of persons, etc.) to, which may include but are not limited to (e.g., matching AI-connecting, or interest, or like, or mutual like, or one sided-like, etc.) In some embodiments, user interface may go e.g., directly or to another user interface or on same user interface, etc.) to show a, which may include but are not limited to (e.g., calendar availability, scheduling option, or availability, or time period, or scheduling option, etc.) that may show which may include but are not limited to (e.g., some information, 'all interests, all food choices, all pre-selected options for location of date, all pre-payment options, etc.) then user interface may go directly into, which may include but are not limited to (e.g., booking, or payment in order to book, schedule, inquire about, inquire about, inquire regarding, secure, create connection to, hold, pay for, create business relationship with, use transmittables to secure or book, schedule, inquire about, etc.) the date, or meet requirements of the date, or connection, etc.)

In some embodiments, there may not be an option to, which may include but are not limited to (e.g., contact, message or to book, schedule, inquire about, inquire about, inquire regarding, secure, create connection to, hold, pay for, create business relationship with, use transmittables to secure or book, schedule, inquire about, etc.) an-in person date etc.) unless the user which may include but are not limited to (e.g., pays the payment, makes transmittables, sends assets, makes assets, etc.) for the, which may include but are not limited to (e.g., 'date' or the 'meeting' or the 'connection' or the messaging, 'or the video chat' or the 'video call' etc.) In some embodiments, there may be an which may include but are not limited to (e.g., non-regulated, anytime version, unlimited version, membership options, membership services, paid for, etc.) for users to make which may include but are not limited to (e.g., any amount, limited amount, unlimited etc.) which may include but are not limited to (e.g., video calls, messages, in-person dates, etc.) and/or there may be an option for the other user to, which may include but are not limited to (e.g., opt-in to this group system or add to, or join, or automatically join, etc.) that pays them determining by which may include but are not limited to (e.g., frequency, ability, quality, participation, how many, etc.) which may include but are not limited to (e.g., dates, or how many messages, or how many video calls, etc.) In some embodiments, etc.) there may be options to not pay unlimited for in-person, video, messages, or unlocks and each one may have to be paid which may include but are not limited to (e.g., one at a time, separate, by itself, separate, individually, etc.) In some embodiments, there may be a combination of one of more which may include but not limited to (e.g., follow for free, follow, connect, add, free viewing options, subscriber only options, follower only options, locked, unlocked content, content, different viewing options, preview of contents, limited or unlimited content previews, payment for previews, credit for previews, credit payment options, payment options, lists whether stacked, side by side, up and down, swiping, tapping, calendar, booking options, virtual or in-person options, users information, users profile, content, preview of content, searching options, matching AI-connecting, options, matches, similar matches, locked content, different profile options, different feed options, locked content options, locked feed options, messages, direct messages, profile messages, live events, live searching, current lives, calendar availability, scheduling option, follow for free, live persons and matching AI-connecting, live persons, currently live, swipe to view, swipe to see, similar persons, availability of person availability of persons, availability of users, availability in general, matching AI-connecting, of persons, matching AI-connecting, based on criteria, etc.) In some embodiments, matching AI-connecting, based on any reasons may include but not limited to computing operation, machine learning, previous clicks, similar dates, similarities, criteria, searching, location, distance, availability, careers, types, looks, weight, height, preferences, etc.)

In some embodiments, there may be options, which may include but not be limited to (e.g., where all content is locked or closed, or not shown etc.) until may include but not be limited to (e.g., follow is made, or a sign is made, or a booking is made, or a payment is made, etc.) In some embodiments, there may be options to book, schedule, inquire about, inquire about, inquire regarding, secure, create connection to, hold, pay for, create business relationship with, use transmittables to secure or book, schedule, inquire about, etc.) may include but not be limited to (e.g., in-person, immediately, in a smaller format that may be extend larger, anywhere on the user interface, or the user interface, etc.) In some embodiments, there may be combined locked and unlocked content, etc.) In some embodiments, there may be moving content may include but not be limited to (e.g., items or options moving around, moving content, replacing, disappearing, reappearing, appearing, moving, swaying), which may include but not be limited to (e.g., items such as videos, photos, content, promotional material, stacked photos, information, etc.) In some embodiments, 'locked content' may refer to content, which may include but not be limited to (e.g., any type of content, which may include but not be limited to (e.g., videos, photos, moving content, holograms, live content, live show, live viewing, pre-recorded viewing etc.) that may need to be 'paid' before may include but not be limited to (e.g., shown, or subscribed to, paid for, assets put up for, etc.) In some embodiments, there may an user interface or a screen or a visual of a profile or content, combined with options that may include but not limited to (e.g., book date, book meeting, follow for free, follow, message, price per message, price to send inquiry, send application, sign up for application, content, locked content, unlocked content, subscriber only content, follower-only content, etc.) In some embodiments, there may be an option to view content and/or have other options on the content to may include but not be limited to (e.g., view or interact with, or create, or edit, or move, etc.) whether (e.g., on top, on the side, on any part, or outside of the content etc.) which may include but not be limited to (e.g., locked content, book now, book for date, book for virtual date, entertainment options set by anyone or model or user, book for in person date, book video call, book phone call, view profile, etc.) In some embodiments, viewing profile may lead to a may include but not be limited to (e.g., 'locked profile' or a preview sort of profile, or a preview of content, or a lesser version of the full version, or a simpler version, or a version that is specifically shown, etc.) that a person may be required to 'follow,' which may include but not be limited to (meet requirements of user, platform, etc.) to: (e.g., see, view interact with, tap, message, do anything, screenshot, copy, etc.) In some embodiments, a person may be required to may include but not be limited to (e.g., meet requirements, or complete tasks, etc.) to see (e.g., profile, see information, access information, access content, view, preview, etc.)

In some embodiments, payment may be required in exchange for any option, which may include but not be limited to (e.g., payment to view content, payment to view calendar, interact with to view calendar, interact with to view timing data method, payment to book, schedule, inquire about, inquire about, inquire regarding, secure, create connection to, hold, pay for, create business relationship with, use transmittables to secure or book, schedule, inquire about, etc.) payment to join call, cost for background check by 3rd party, price to live stream, pre-recorded live stream, pre-recorded content, price to join stream, payment to join call, payment for content, payment for message, fee to see calendar, payment to see profiles, payment to see other cities, payment to book, schedule, inquire about, inquire about, inquire regarding, secure, create connection to, hold, pay for, create business relationship with, use transmittables to secure or book, schedule, inquire about, etc.) which may include but not be limited to (e.g., profiles or persons in other cities, payment to view stories, payment to view live or current content, cost to follow, payment to subscribe, payment for unlimited content, payment for unlimited messages, payment for unlimited dates, payment for contact options, payment for contact information, payment to see live, payment to obtain information, payment to match, payment to view now, payment to unlock content, payment to begin, pay to view information about user, payment to see background check, payment to send direct message, payment to add to category, payment to add to list, payment to be on cover, payment to be on first page, payment to be at top, payment to be suggested, payment to wink, flirt, send heart, payment to speak to another person, etc.)

In some embodiments, there may be an may include but not limited to (e.g., user interface, option, a screen, etc.) that may show may consist of but not limited to (e.g., users, persons, profiles, models, etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any interface listed or not listed: for example which may be including but not limited to the user interface may show options such as which may include but not limited to (e.g., 'choose your view option' etc.) which may be included but not limited to (e.g., 'tapping, swiping, desktop view, mobile view, tapping view, stacking view, swiping view, see all profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photoshoots, view those with other people that have more than one photo shoot, view matching AI-connecting, method, view swiping method, view tapping method, view stacking method, view list method, sort by lists, create lists, etc.)

In some embodiments, there may be, which may include but not be limited to (e.g., live streams, multiple live streams, multiple options to click on live streaming, live streams may be pre-recorded, etc.) In some embodiments, there may be, which may include but not be limited to (e.g., live stream options, virtual prices, price ranges, general pricing, general transmittables, in-person prices, price ranges, general pricing, general transmittables, pricing, availability today, brunch price, lunch price, user's calendar, calendar options to view, calendar, profile photos, profile, content, etc.) In some embodiments, there may be screen options for profile viewing options. In some embodiments, there may be a headline or a header photo or video at the top; this also may be a gif, a moving item, or a still item such as a photo. In some embodiments, the creator, person, dater, paid person, paid person, or platform may choose a profile photo.

In some embodiments, there may be an option to 'book an in-person date' from the profile photo, a button, clicker, swiping method, or any clicking method near the profile photo, video, or any section on the profile page or outside the profile page. In some embodiments, there may be 'subscribe, follow for free, unlock photo options, free photo options, free video options, tipping buttons or options, messaging options to send a direct message, messaging options that may include being able to attach, add, or contain a photo, a voice recording, a video recording, or a live recorded message to be sent to the creator, model, or another person. In some embodiments, there may be an option to 'add friends' or follow options' for other creators or 'paid persons on the platform.' In some embodiments, there may be a link to a book, schedule, inquire about, inquire about, inquire regarding, secure, create a connection to, hold, pay for, create a business relationship with, use transmittables to secure or book, schedule, inquire about, etc.) an-in person date, activity, method, connection, live streaming, live video call, live phone call, etc.) through the platform. In some embodiments, this button may take the person to another screen that may show a, which may include but not be limited to (e.g., calendar, timing method, timing schedule, scheduling device, scheduling options, day organizer, life organizer, etc.) that may include the person's schedule which may include but is not limited to available booking dates, preferences on booking dates, options that may be chosen, limited availability, limited options, limited viewing of calendar, only showing dates available, only showing options that the creator wants. In some embodiments, this calendar or section, or the page may show the creator's set preferences which may include but are not limited to the creator's likes, including 'Seafood restaurants, Steak Restaurant, Time preferences (lunch or dinner), 'time preferences such as 6-8 pm for in-person dates, other 'likes' such as 'loves gentlemen that may show up on a date with flowers, etc) In some embodiments, there may be a, which may include but not limited to (e.g., profile or content photo option with other options, etc.) such as which may include but not limited to (e.g., 'book in-person date, book virtual, book talk, book chat, book video chat, book video meeting, book voice conversation, date, book date activity, calendar options, in-depth calendar, calendar combined with other users' calendar, short version of the calendar, immediate or long-term calendar, users preferences or user status such as 'follow for free' or 'subscriber only content' or 'locked' and 'unlocked content' or 'paid content' 'or subscriber only content' etc.) In some embodiments, there may be, which may include but not be limited to (e.g., an AI, human, robot, bot, 3rd party, entity, computer system, AI system, or machine learning, or robotic version for a user of any type to type in a 'match suggestion' or a 'discover suggestion' or a help suggestion, etc.) In some embodiments, there may be a way to 'type in' or manual input of information, which may include but not be limited to (e.g., it's a description, a look, a type of photo, anything to find, discover, view, see users or suggestions, etc.) In some embodiments, there may be different ways to: (e.g., sort through content or see content or view content, etc.), which may include but not be limited to (e.g., swiping, tapping, viewing shapes, viewing profiles, viewing content, viewing promo photos, viewing videos, messages, add to list, messaging, organization, organizing, booking virtual, booking in person, viewing the calendar, etc.)

Figure 110:
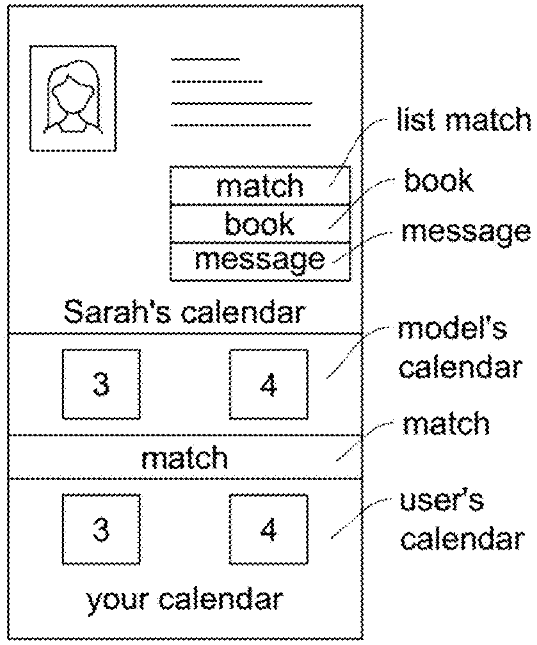

FIG. 110: In some embodiments, there may be a combination of may include but not limited to (e.g., a profile photo or profile information or users information, matching AI-connecting, buttons, see more options, unlocking content, matching, add to the list, add to location list, add to calendar list, add to virtual date list, book for a virtual date, entertainment options set by anyone or model or user, message, book for in-person date, matching AI-connecting, users calendar to model's calendar with booking options, matching AI-connecting, users and model or creators calendar, showing match preferences, showing computing operation match made, auto-match made, AI match made, message options to pay to message, free message options, messaging options, booking options, date options, virtual date options, information, informational options, profile options, profile preferences, etc.)

In some embodiments, there may be an which may include but are not limited to (e.g., user interface, process, etc.) that goes from which may have but are not limited to (e.g., selection, options, or viewing of persons, etc.) to, which may include but are not limited to (e.g., matching AI-connecting, or interest, or like, or mutual like, or one sided-like, etc.) In some embodiments, the user interface may go, e.g., directly or to another user interface or on same user interface, etc.) to show a, which may include but are not limited to (e.g., calendar availability, scheduling option, or availability, or period, or scheduling option, etc.) that may show which may include but are not limited to (e.g., some information, 'all interests, all food choices, all pre-selected options for location of date, all pre-payment options, etc.) then user interface may go directly into, which may include but are not limited to (e.g., booking, or payment to book, schedule, inquire about, inquire about, inquire regarding, secure, create connection to, hold, pay for, create business relationship with, use transmittables to secure or book, schedule, inquire about, etc.) the date, or meet requirements of the date, or connection, etc.)

In some embodiments, there may not be an option to, which may include but are not limited to (e.g., contact, message or to book, schedule, inquire about, inquire about, inquire regarding, secure, create connection to, hold, pay for, create business relationship with, use transmittables to secure or book, schedule, inquire about, etc.) an-in person date etc.) unless the user which may include but are not limited to (e.g., pays the payment, makes transmittables, sends assets, makes assets, etc.) for the, which may include but are not limited to (e.g., 'date' or the 'meeting' or the 'connection' or the messaging, 'or the video chat or the 'video call' etc.) In some embodiments, there may be an which may include but are not limited to (e.g., non-regulated, anytime version, unlimited version, membership options, membership services, paid for, etc.) for users to make which may include but are not limited to (e.g., any amount, limited amount, unlimited etc.) which may include but are not limited to (e.g., video calls, messages, in-person dates, etc.) and/or there may be an option for the other user to, which may include but are not limited to (e.g., opt-in to this group system or add to, or join, or automatically join, etc.) that pays them determining by which may include but are not limited to (e.g., frequency, ability, quality, participation, how many, etc.) which may include but are not limited to (e.g., dates, or how many messages, or how many video calls, etc.) In some embodiments, etc.) there may be options to not pay unlimited for in-person, video, messages, or unlocks and each one may have to be paid which may include but are not limited to (e.g., one at a time, separate, by itself, separate, individually, etc.) In some embodiments, payment may be required in exchange for any option, which may include but not be limited to (e.g., payment to view content, payment to view calendar, interact with to view calendar, interact with to view timing data method, payment to book, schedule, inquire about, inquire about, inquire regarding, secure, create connection to, hold, pay for, create business relationship with, use transmittables to secure or book, schedule, inquire about, etc.) payment to join call, payment for background check by 3rd party, payment to live stream, pre-recorded live stream, pre-recorded content, payment to join stream, payment to join call, payment for content, payment for message, payment to see calendar, payment to see profiles, payment to see other cities, payment to book, schedule, inquire about, inquire about, inquire regarding, secure, create connection to, hold, pay for, create business relationship with, use transmittables to secure or book, schedule, inquire about, etc.) which may include but not be limited to (e.g., profiles or persons in other cities, payment to view stories, payment to view live or current content, payment to follow, payment to subscribe, payment for unlimited content, payment for unlimited messages, payment for unlimited dates, payment for contact options, payment for contact information, payment to see live, payment to obtain information, payment to match, payment to view now, payment to unlock content, payment to begin, payment to view information about user, payment to see background check, payment to send direct message, payment to add to category, payment to add to list, payment to be on cover, payment to be on first page, payment to be at top, payment to be suggested, payment to wink, flirt, send heart, payment to speak to another person, etc.)

In some embodiments, there may be options, which may include but not be limited to (e.g., where all content is locked or closed, or not shown etc.) until may include but not be limited to (e.g., follow is made, or a sign is made, or a booking is made, or a payment is made, etc.) In some embodiments, there may be options to book, schedule, inquire about, inquire about, inquire regarding, secure, create connection to, hold, pay for, create business relationship with, use transmittables to secure or book, schedule, inquire about, etc.) may include but not be limited to (e.g., in-person, immediately, in a smaller format that may be extend larger, anywhere on the user interface, or the user interface, etc.) In some embodiments, there may be combined locked and unlocked content, etc.) In some embodiments, there may be moving content may include but not be limited to (e.g., items or options moving around, moving content, replacing, disappearing, reappearing, appearing, moving, swaying), which may include but not be limited to (e.g., items such as videos, photos, content, promotional material, stacked photos, information, etc.) In some embodiments, 'locked content' may refer to content, which may include but not be limited to (e.g., any type of content, which may include but not be limited to (e.g., videos, photos, moving content, holograms, live content, live show, live viewing, pre-recorded viewing etc.) that may need to be 'paid' before may include but not be limited to (e.g., shown, or subscribed to, paid for, assets put up for, etc.) In some embodiments, there may an user interface or a screen or a visual of a profile or content, combined with options that may include but not limited to (e.g., book date, book meeting, follow for free, follow, message, price per message, price to send inquiry, send application, sign up for application, content, locked content, unlocked content, subscriber only content, follower-only content, etc.) In some embodiments, there may be an option to view content and/or have other options on the content to may include but not be limited to (e.g., view or interact with, or create, or edit, or move, etc.) whether (e.g., on top, on the side, on any part, or outside of the content etc.) which may include but not be limited to (e.g., locked content, book now, book for date, book for virtual date, entertainment options set by anyone or model or user, book for in person date, book video call, book phone call, view profile, etc.) In some embodiments, viewing profile may lead to a may include but not be limited to (e.g., 'locked profile' or a preview sort of profile, or a preview of content, or a lesser version of the full version, or a simpler version, or a version that is specifically shown, etc.) that a person may be required to 'follow,' which may include but not be limited to (meet requirements of user, platform, etc.) to: (e.g., see, view interact with, tap, message, do anything, screenshot, copy, etc.) In some embodiments, a person may be required to may include but not be limited to (e.g., meet requirements, or complete tasks, etc.) to see (e.g., profile, see information, access information, access content, view, preview, etc.)

In some embodiments, there may be a combination of one of more which may include but not limited to (e.g., follow for free, follow, connect, add, free viewing options, subscriber only options, follower only options, locked, unlocked content, content, different viewing options, preview of contents, limited or unlimited content previews, payment for previews, credit for previews, credit payment options, payment options, lists whether stacked, side by side, up and down, swiping, tapping, calendar, booking options, virtual or in-person options, users information, users profile, content, preview of content, searching options, matching AI-connecting, options, matches, similar matches, locked content, different profile options, different feed options, locked content options, locked feed options, messages, direct messages, profile messages, live events, live searching, current lives, calendar availability, scheduling option, follow for free, live persons and matching AI-connecting, live persons, currently live, swipe to view, swipe to see, similar persons, availability of person availability of persons, availability of users, availability in general, matching AI-connecting, of persons, matching AI-connecting, based on criteria, etc.) In some embodiments, checking AI-connecting, based on any reasons, may include but is not limited to computing operation, machine learning, previous clicks, similar dates, similarities, criteria, searching, location, distance, availability, careers, types, looks, weight, height, preferences, etc.)

In some embodiments, there may be an may include but not limited to (e.g., user interface, option, a screen, etc.) that may show may consist of but not limited to (e.g., users, persons, profiles, models, etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any interface listed or not listed: for example which may be including but not limited to the user interface may show options such as which may include but not limited to (e.g., 'choose your view option' etc.) which may be included but not limited to (e.g., 'tapping, swiping, desktop view, mobile view, tapping view, stacking view, swiping view, see all profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photo-shoots, view those with other people that have more than one photo shoot, view matching AI-connecting, method, view swiping method, view tapping method, view stacking method, view list method, sort by lists, create lists, etc.)

In some embodiments, there may be, which may include but not be limited to (e.g., live streams, multiple live streams, multiple options to click on live streaming, live streams may be pre-recorded, etc.) In some embodiments, there may be, which may include but not be limited to (e.g., live stream options, virtual prices, price ranges, general pricing, general transmittables, in-person prices, price ranges, general pricing, general transmittables, pricing, availability today, brunch price, lunch price, user's calendar, calendar options to view, calendar, profile photos, profile, content, etc.) In some embodiments, there may be screen options for profile viewing options. In some embodiments, there may be a headline or a header photo or video at the top; this also may be a gif, a moving item, or a still item such as a photo. In some embodiments, the creator, person, dater, paid person, paid person, or platform may choose a profile photo. In some embodiments, there may be an option to 'book an in-person date' from the profile photo, a button, clicker, swiping method, or any clicking method near the profile photo, video, or any section on the profile page or outside the profile page. In some embodiments, there may be 'subscribe, follow for free, unlock photo options, free photo options, free video options, tipping buttons or options, messaging options to send a direct message, messaging options that may include being able to attach, add, or contain a photo, a voice recording, a video recording, or a live recorded message to be sent to the creator, model, or another person. In some embodiments, there may be an option to 'add friends' or follow options' for other creators or 'paid persons on the platform.' In some embodiments, there may be a link to book, schedule, inquire about, inquire about, inquire regarding, secure, create a connection to, hold, pay for, create a business relationship with, use transmittables to secure or book, schedule, inquire about, etc.) an-in person date, activity, method, connection, live streaming, live video call, live phone call, etc.) through the platform. In some embodiments, this button may take the person to another screen that may show a, which may include but not be limited to (e.g., calendar, timing method, timing schedule, scheduling device, scheduling options, day organizer, life organizer, etc.) that may include the person's schedule which may include but is not limited to available booking dates, preferences on booking dates, options that may be chosen, limited availability, limited options, limited viewing of calendar, only showing dates available, only showing options that the creator wants. In some embodiments, this calendar or section, or page may show the creator's set preferences which may include but are not limited to the creator's 'likes,' including 'Seafood restaurants, Steak Restaurant, Time preferences (lunch or dinner), 'time preferences such as 6-8 pm for in-person dates, other like such as 'love gentlemen that may show up on a date with flowers, etc.') In some embodiments, there may be a, which may include but not limited to (e.g., profile or content photo option with other options, etc.) such as which may include but not limited to (e.g., 'book in-person date, book virtual, book talk, book chat, book video chat, book video meeting, book voice conversation, date, book date activity, calendar options, in-depth calendar, calendar combined with other users' calendar, short version of the calendar, immediate or long-term calendar, users preferences or user status such as 'follow for free' or 'subscriber only content' or 'locked' and 'unlocked content' or 'paid content' 'or subscriber only content' etc.)

In some embodiments, there may be, which may include but not be limited to (e.g., an AI, human, robot, bot, 3rd party, entity, computer system, AI system, or machine learning, or robotic version for a user of any type to type in a 'match suggestion' or a 'discover suggestion' or a help suggestion, etc.) In some embodiments, there may be a way to 'type in' or manual input of information, which may include but not be limited to (e.g., it's a description, a look, a type of photo, anything to find, discover, view, see users or suggestions, etc.) In some embodiments, there may be different ways to: (e.g., sort through content or see content or view content, etc.), which may include but not be limited to (e.g., swiping, tapping, viewing shapes, viewing profiles, viewing content, viewing promo photos, viewing videos, messages, add to list, messaging, organization, organizing, booking virtual, booking in person, viewing the calendar, etc.)

Figure 111:
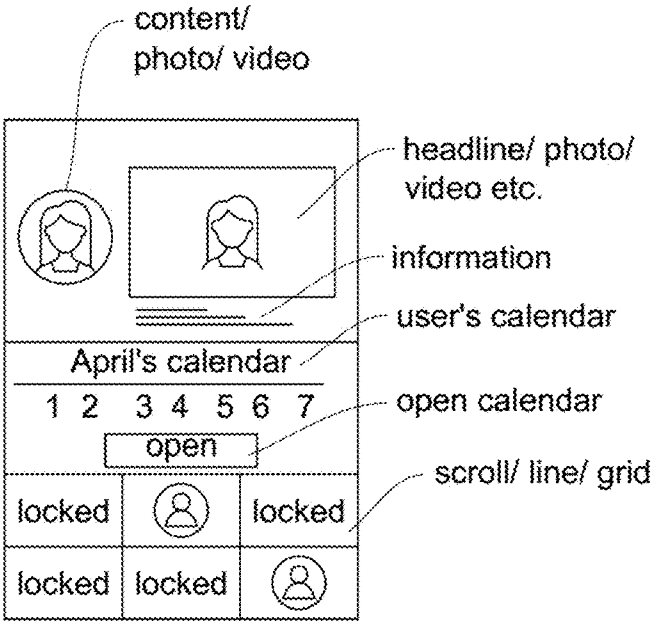

FIG. 111: In some embodiments, there may be options, which may include but not limited to or viewing may include but not limited to (e.g., profile information, photos, content, calendar, locked content, unlocked content, free content, subscriber-only content, not available content, pay to view content, calendar content, the content may be in the form of a grid, line, scrolling option, disappearing option, scrolling option, matching AI-connecting, option, tapping option, viewing options, lines, lists, created lists, etc.) In some embodiments, there may be an which may include but are not limited to (e.g., user interface, process, etc.) that goes from which may have but are not limited to (e.g., selection, options, or viewing of persons, etc.) to, which may include but are not limited to (e.g., matching AI-connecting, or interest, or like, or mutual like, or one sided-like, etc.) In some embodiments, the user interface may go, e.g., directly or to another user interface or on same user interface, etc.) to show a, which may include but are not limited to (e.g., calendar availability, scheduling option, or availability, or period, or scheduling option, etc.) that may show which may include but are not limited to (e.g., some information, 'all interests, all food choices, all pre-selected options for location of date, all pre-payment options, etc.) then user interface may go directly into, which may include but are not limited to (e.g., booking, or payment to book, schedule, inquire about, inquire about, inquire regarding, secure, create connection to, hold, pay for, create business relationship with, use transmittables to secure or book, schedule, inquire about, etc.) the date, or meet requirements of the date, or connection, etc.)

In some embodiments, there may not be an option to, which may include but are not limited to (e.g., contact, message or to book, schedule, inquire about, inquire about, inquire regarding, secure, create connection to, hold, pay for, create business relationship with, use transmittables to secure or book, schedule, inquire about, etc.) an-in person date etc.) unless the user which may include but are not limited to (e.g., pays the payment, makes transmittables, sends assets, makes assets, etc.) for the, which may include but are not limited to (e.g., 'date' or the 'meeting' or the 'connection' or the messaging, 'or the video chat' or the 'video call' etc.) In some embodiments, there may be an which may include but are not limited to (e.g., non-regulated, anytime version, unlimited version, membership options, membership services, paid for, etc.) for users to make which may include but are not limited to (e.g., any amount, limited amount, unlimited, etc.) which may include but are not limited to (e.g., video calls, messages, in-person dates, etc.) and/or there may be an option for the other user to, which may include but are not limited to (e.g., opt-in to this group system or add to, or join, or automatically join, etc.) that pays them determining by which may include but are not limited to (e.g., frequency, ability, quality, participation, how many, etc.) which may include but are not limited to (e.g., dates, or how many messages, or how many video calls, etc.) In some embodiments, etc.) there may be options to not pay unlimited for in-person, video, messages, or unlocks. Each one may have to be paid, including but not limited to (e.g., one at a time, separate, by itself, separate, individually, etc.)

In some embodiments, payment may be required in exchange for any option, which may include but not be limited to (e.g., payment to view content, payment to view calendar, interact with to view calendar, interact with to view timing data method, payment to book, schedule, inquire about, inquire about, inquire regarding, secure, create connection to, hold, pay for, create business relationship with, use transmittables to secure or book, schedule, inquire about, etc.) payment to join call, fee for background check by 3rd party, price to live stream, pre-recorded live stream, pre-recorded content, cost to join stream, payment to join call, payment for content, payment for message, fee to see calendar, payment to see profiles, payment to see other cities, payment to book, schedule, inquire about, inquire about, inquire regarding, secure, create connection to, hold, pay for, create business relationship with, use transmittables to secure or book, schedule, inquire about, etc.) which may include but not be limited to (e.g., profiles or persons in other cities, payment to view stories, payment to view live or current content, cost to follow, payment to subscribe, payment for unlimited content, payment for unlimited messages, payment for unlimited dates, payment for contact options, payment for contact information, fee to see live, payment to obtain information, payment to match, payment to view now, payment to unlock content, payment to begin, fee to view information about user, payment to see background check, payment to send direct message, payment to add to category, payment to add to list, payment to be on cover, payment to be on first page, payment to be at top, payment to be suggested, payment to wink, flirt, send heart, payment to speak to another person, etc.)

In some embodiments, there may be options, which may include but not be limited to (e.g., where all content is locked or closed, or not shown etc.) until may include but not be limited to (e.g., follow is made, or a sign is made, or a booking is made, or a payment is made, etc.) In some embodiments, there may be options to book, schedule, inquire about, inquire about, inquire regarding, secure, create connection to, hold, pay for, create business relationship with, use transmittables to secure or book, schedule, inquire about, etc.) may include but not be limited to (e.g., in-person, immediately, in a smaller format that may be extend larger, anywhere on the user interface, or the user interface, etc.) In some embodiments, there may be combined locked and unlocked content, etc.) In some embodiments, there may be moving content may include but not be limited to (e.g., items or options moving around, moving content, replacing, disappearing, reappearing, appearing, moving, swaying), which may include but not be limited to (e.g., items such as videos, photos, content, promotional material, stacked photos, information, etc.) In some embodiments, 'locked content' may refer to content, which may include but not be limited to (e.g., any type of content, which may include but not be limited to (e.g., videos, photos, moving content, holograms, live content, live show, live viewing, pre-recorded viewing etc.) that may need to be 'paid' before may include but not be limited to (e.g., shown, or subscribed to, paid for, assets put up for, etc.) In some embodiments, there may an user interface or a screen or a visual of a profile or content, combined with options that may include but not limited to (e.g., book date, book meeting, follow for free, follow, message, price per message, price to send inquiry, send application, sign up for application, content, locked content, unlocked content, subscriber only content, follower-only content, etc.) In some embodiments, there may be an option to view content and/or have other options on the content to may include but not be limited to (e.g., view or interact with, or create, or edit, or move, etc.) whether (e.g., on top, on the side, on any part, or outside of the content etc.) which may include but not be limited to (e.g., locked content, book now, book for date, book for virtual date, entertainment options set by anyone or model or user, book for in person date, book video call, book phone call, view profile, etc.) In some embodiments, viewing profile may lead to a may include but not be limited to (e.g., 'locked profile' or a preview sort of profile, or a preview of content, or a lesser version of the full version, or a simpler version, or a version that is specifically shown, etc.) that a person may be required to 'follow,' which may include but not be limited to (meet requirements of user, platform, etc.) to: (e.g., see, view interact with, tap, message, do anything, screenshot, copy, etc.) In some embodiments, a person may be required to may include but not be limited to (e.g., meet requirements, or complete tasks, etc.) to see (e.g., profile, see information, access information, access content, view, preview, etc.)

In some embodiments, there may be a combination of one of more which may include but not limited to (e.g., follow for free, follow, connect, add, free viewing options, subscriber only options, follower only options, locked, unlocked content, content, different viewing options, preview of contents, limited or unlimited content previews, payment for previews, credit for previews, credit payment options, payment options, lists whether stacked, side by side, up and down, swiping, tapping, calendar, booking options, virtual or in-person options, users information, users profile, content, preview of content, searching options, matching AI-connecting, options, matches, similar matches, locked content, different profile options, different feed options, locked content options, locked feed options, messages, direct messages, profile messages, live events, live searching, current lives, calendar availability, scheduling option, follow for free, live persons and matching AI-connecting, live persons, currently live, swipe to view, swipe to see, similar persons, availability of person availability of persons, availability of users, availability in general, matching AI-connecting, of persons, matching AI-connecting, based on criteria, etc.) In some embodiments, matching AI-connecting, based on any reasons may include but not limited to computing operation, machine learning, previous clicks, similar dates, similarities, criteria, searching, location, distance, availability, careers, types, looks, weight, height, preferences, etc.) In some embodiments, there may be an may include but not limited to (e.g., user interface, option, a screen etc.) that may show may include but not limited to (e.g., users, persons, profiles, models etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any interface listed or not listed: for example which may be including but not limited to user interface may show options such as which may include but not limited to (e.g., 'choose your view option' etc.) which may be included but not limited to (e.g., 'tapping, swiping, desktop view, mobile view, tapping view, stacking view, swiping view, see al profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photoshoots, view those with other people that have more than one photoshoot, view matching AI-connecting, method, view swiping method, view tapping method, view stacking method, view list method, sort by lists, create lists, etc.)

In some embodiments, there may be, which may include but not be limited to (e.g., live streams, multiple live streams, multiple options to click on live streaming, live streams may be pre-recorded, etc.) In some embodiments, there may be, which may include but not be limited to (e.g., live stream options, virtual prices, price ranges, general pricing, general transmittables, in-person prices, price ranges, general pricing, general transmittables, pricing, availability today, brunch price, lunch price, user's calendar, calendar options to view, calendar, profile photos, profile, content, etc.) In some embodiments, there may be screen options for profile viewing options. In some embodiments, there may be a headline or a header photo or video at the top; this also may be a gif, a moving item, or a still item such as a photo. In some embodiments, there may be a profile photo that is chosen by the, which may include but not be limited to (e.g., creator, person, dater, paid person, paid dater, and/or platform, interface(s), persons, users, anyone, etc.)

In some embodiments, there may be an option to 'book in-person date' from, which may include but not be limited to (e.g., profile photo, a button, clicker, swiping method, or any type of clicking method near profile photo, video, or any section on the profile page or outside of the profile page, or any user interface, etc.) In some embodiments, there may be, which may include but not be limited to (e.g., 'subscribe, follow for free, unlock photo options, free photo options, free video options, tipping buttons or options, messaging options to send a direct message, messaging options that may including being able to attach, add, or contain a photo, a voice recording, a video recording, a live recorded message to be sent to the creator, model, or other person etc.) In some embodiments, there may be an option to, which may include but not be limited to (e.g., 'add friends' or follow options' for other creators or 'paid persons on the platform' etc.) In some embodiments, there may be a link to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not be limited to (e.g., an-in person date, activity, method, connection, live streaming, live video call, live phone call, etc.) through the platform, or any user interface(s), or any integrated interface (s) etc.) In some embodiments, this button may take the person to another screen that may show a, which may include but not be limited to (e.g., calendar, timing method, timing schedule, scheduling device, scheduling options, day organizer, life organizer, etc.) that may include the person's schedule, which may include but not be limited to (e.g., available booking dates, preferences on booking dates, options that may be chosen, limited availability, limited options, limited viewing of calendar, only showing dates available, may only showing options that the creator or platform or any user or any interface wants, etc.) In some embodiments, this calendar or section, or page may show the creators set preferences, which may include but not be limited to (e.g., creator's likes include 'Seafood restaurants, Steak Restaurant, Time preferences (lunch or dinner), 'time preferences such as 6-8 pm for in-person dates, other likes such as 'loves a gentlemen that may show up on a date with flowers, etc')

In some embodiments, there may be a, which may include but not limited to (e.g., profile or content photo option with other options, etc.) such as which may include but not limited to (e.g., 'book in-person date, book virtual, book talk, book chat, book video chat, book video meeting, book voice conversation, date, book date activity, calendar options, in-depth calendar, calendar combined with other users' calendar, short version of the calendar, immediate or long-term calendar, users preferences or user status such as 'follow for free' or 'subscriber only content' or 'locked' and 'unlocked content' or 'paid content' 'or subscriber only content' etc.) In some embodiments, there may be, which may include but not be limited to (e.g., an AI, human, robot, bot, 3rd party, entity, computer system, AI system, or machine learning, or robotic version for a user of any type to type in a 'match suggestion' or a 'discover suggestion' or a help suggestion, etc.) In some embodiments, there may be a way to 'type in' or manual input of information, which may include but not be limited to (e.g., it's a description, a look, a type of photo, anything to find, discover, view, see users or suggestions, etc.) In some embodiments, there may be different ways to: (e.g., sort through content or see content or view content, etc.), which may include but not be limited to (e.g., swiping, tapping, viewing shapes, viewing profiles, viewing content, viewing promo photos, viewing videos, messages, add to list, messaging, organization, organizing, booking virtual, booking in person, viewing the calendar, etc.)

Figure 112:
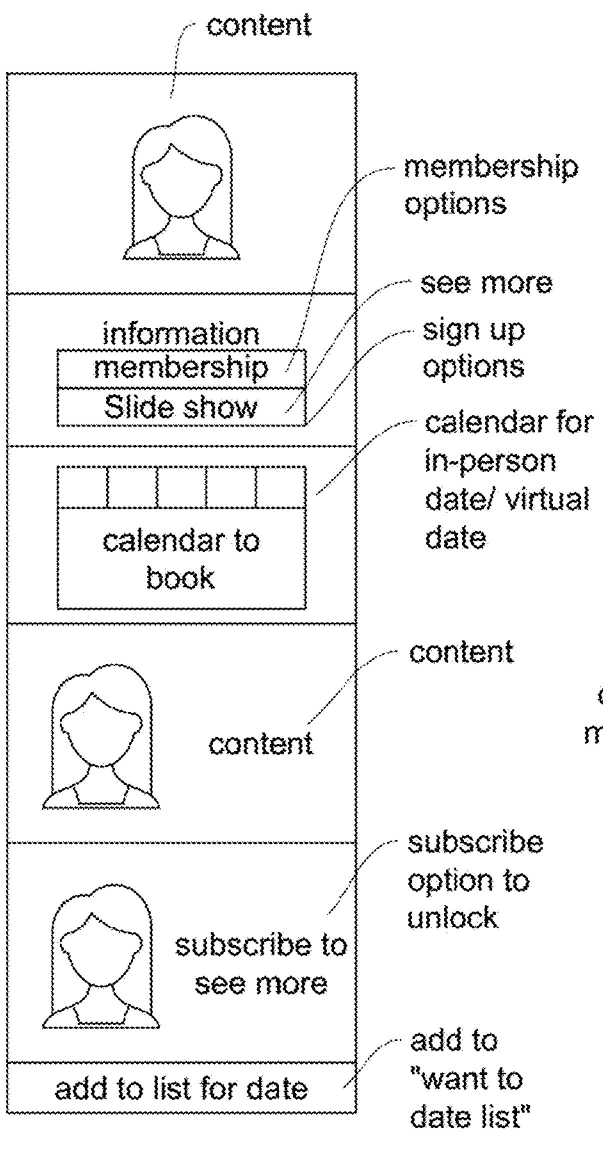

FIG. 112: In some embodiments, there may be screen that may show a combination of may include but not limited to (e.g., content, information, calendar to book, schedule, inquire about, inquire about, inquire regarding, secure, create connection to, hold, pay for, create business relationship with, use transmittables to secure or book, schedule, inquire about, in person or virtual date, entertainment options set by anyone or model or user, calendar to book, schedule, inquire about, inquire about, inquire regarding, secure, create connection to, hold, pay for, create business relationship with, use transmittables to secure or book, schedule, inquire about, etc.) person or offering, (e.g., exclusive content, self-made content, Locked content, unlocked content, subscriber only content, public content, public information, private information, subscribe to see more option, subscribe to unlock option, one-time unlock option, matching AI-connecting, options, message option, option to content that person by paying for a message to be sent, free follow, paid follow, paid subscriber, free list adding, adding to list, organizing person to list, 'want to date this person list' 'organized list to add all person's for potential in-person or virtual date etc.)

In some embodiments, there may be a user interface that may show which may include but not limited to (e.g., content, profile information, profile photo, virtual booking by the hour, in-person booking by the hour, content, locked content, unlocked content, available activities, etc.) which may include but not limited to (e.g., breakfast, brunch, lunch, dinner, dessert such as ice cream or chocolate, shopping, sushi, makeup shopping, etc.) which may include but not limited to (e.g., prices, price ranges, general pricing, general transmittables, unlock prices, price ranges, general pricing, general transmittables, pay by the hour prices, price ranges, general pricing, general transmittables, pay by the activity prices, price ranges, general pricing, general transmittables, locations, dates, times, set date times including the time, location, and pre-approved items such as menu, pre-set dates, etc.) which may include but not limited to (e.g., times, locations, prices, price ranges, general pricing, general transmittables, menu options, options to purchase dinner during check out, available activities, etc.) In some embodiments, there may be user interface, which may include but not be limited to (e.g., booking options, availability, live information, live, live calendar, timing method data, timing data method, timing process data, general calendar, price per activity, price for date, price per hour, calendar with specific details or, which may include but not be limited to (e.g., breakdown, itemized, receipt, invoice, total, partial, breakdown, bill, summary of, total, etc.) s, which may include but not be limited to (e.g., times during specific day amiable, activities and or duration, check-in, check-out, time stamp, time record, time and data record, location, time and data record, coordinate(s), s for activities available, price, duration, check-in, check-out, time stamp, time record, time and data record, location, time and data record, coordinate(s), confirmation button, legal documents, legal agreements, date agreements, location, type of category, type of date, partnerships, partner locations, information, open times, possible times, bidding/auction, bidder times, user times, bidding/auction option times, platform, content, user, settings, information, user sign in, register information, contact information, contact for payment, price to contact, add to list, add to category, favorite, book in-person, book virtual, book talk, book chat, book video chat, book video meeting, book voice conversation, prices, price ranges, general pricing, general transmittables, for booking, book for job, price to book, schedule, inquire about, inquire about, inquire regarding, secure, create connection to, hold, pay for, create business relationship with, use transmittables to secure or book, schedule, inquire about, etc.) for job, price ranges, price, changing price ranges, price, changing prices, price ranges, general pricing, general transmittables, information, content, moving content, stationary content, suggestions, users, blog posts, information, posts, small blog posts, large statements, statements, request follow up call, price for follow up call, price for follow up connection, writings, chatting, contact boxes, achievements, information, categories, lists, live streams, past streaming, past content, locked content, unlocked content, etc.)

In some embodiments, there may be user interface, which may include but not be limited to (e.g., live, pre-recorded live, content, free follow, follow, add to date list, add to category, unlocked content, locked content, suggestions, user suggestions, ask AI question, ask user questions, price to send message, price to chat, price to join, locked content with price, locked content to meet requirements, etc.) In some embodiments, there may be options to: (e.g., move, scroll, switch, disappear, reappear, swipe etc.) any content or items, etc.) In some embodiments, there may be user interface, which may include but not be limited to (e.g., booking options, availability, live information, live, live calendar, timing method data, timing data method, timing process data, general calendar, price per activity, price for date, price per hour, calendar with specific details, etc.) which may include but not be limited to (e.g., breakdown, itemized, receipt, invoice, total, partial, breakdown, bill, summary of, total, etc.) which may include but not limited to, the: (e.g., times during specific day amiable, activities and/or duration, check-in, check-out, time stamp, time record, time and data record, location, time and data record, coordinate(s), s for activities available, price, duration, check-in, check-out, time stamp, time record, time and data record, location, time and data record, coordinate(s), confirmation button, legal documents, legal agreements, date agreements, location, type of category, type of date, partnerships, partner locations, information, open times, possible times, bidding/auction, bidder times, user times, bidding/auction option times, platform, content, user, settings, information, user sign in, register information, contact information, contact for payment, price to contact, add to list, add to category, favorite, book in-person, book virtual, book talk, book chat, book video chat, book video meeting, book voice conversation, prices, price ranges, general pricing, general transmittables, for booking, book for job, price to book, schedule, inquire about, inquire about, inquire regarding, secure, create connection to, hold, pay for, create business relationship with, use transmittables to secure or book, schedule, inquire about, etc.) for, which may include but not be limited to (e.g., job, price ranges, price, changing price ranges, price, changing prices, price ranges, general pricing, general transmittables, information, content, moving content, stationary content, suggestions, users, blog posts, information, posts, small blog posts, large statements, statements, request follow up call, price for follow up call, price for follow up connection, writings, chatting, contact boxes, achievements, information, categories, lists, live streams, past streaming, past content, locked content, unlocked content, etc.)

Figure 113:
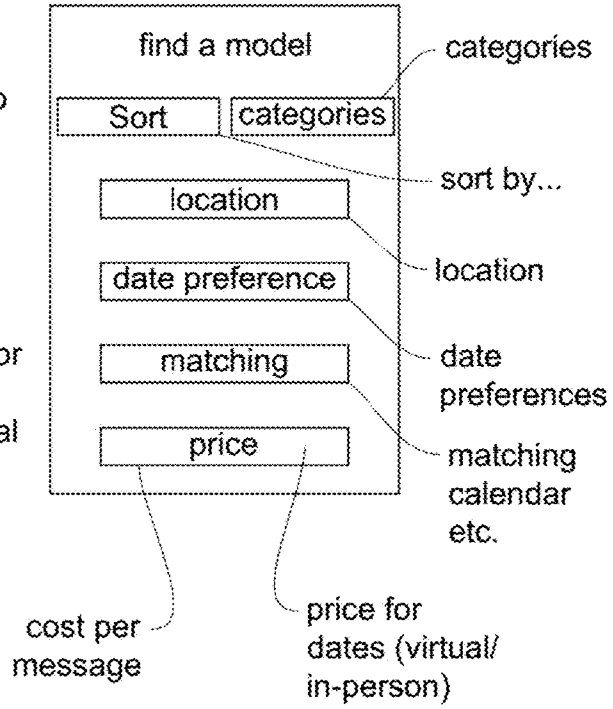

FIG. 113: In some embodiments, there may be options to sort by, which may include but not be limited to (e.g., model, creator, person, user, person getting paid, person with content, person that is a model, person that has made content, person that has shot exclusive content, person on platform, user, etc.) In some embodiments, options to sort, which may include but not be limited to (e.g., categories, location, distance, date preferences, cost, price, cost per message, cost per date, cost per virtual date, entertainment options set by anyone or model or user, cost per in-person date, cost to send message, cost for phone call, cost for messaging, date presences, long-term presences, seeking preferences, dating preferences, travel preferences, celebrity, model, editor picks, categories by names, location, sorted categories, type of shoots, types of photoshoots, types of content, types of unlocks, locked, unlocked, method of content, method of contact, location, traveling, most liked, most popular, most recent, new, just signed up, alphabetical, by dates, matching AI-connecting, to calendar, matching AI-connecting, to preferences, matching AI-connecting, by computing operation, best match, possible matches, etc.) In some embodiments, there may be options, which may include but not limited to search by (e.g., person, categories, location, distance, preferences, likes, interests, person, categories, separation categories, etc.) In some embodiments, there may be information or matching AI-connecting, or shown persons based on 'matching AI-connecting, preferences, or search criteria, or personal computing operation, or system computing operation, or AI, or machine learning, etc.) In some embodiments, there may be options to create 'lists' or create organized preferences or organized persons, or organized users, or organized photoshoots, or organized profiles, or organized persons of interest, or organized 'liked preferences' etc.) In some embodiments, there may be options to message persons in the organized list or the preference list or the made list or the self-made list, or the automatically made lists, or the computing operation lists that the user may be able to, which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.)

In some embodiments, there may be an may include but not limited to (e.g., user interface, option, a screen, etc.) that may show may include but not limited to (e.g., users, persons, profiles, models, etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any user interface, the user interface may show options may include but not limited to (e.g., 'choose your view option' etc.) may be included but not limited to (e.g., 'tapping, swiping, desktop view, mobile view, tapping view, stacking view, swiping view, see all profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photoshoots, view those with other people that have more than one photo shoot, view matching AI-connecting, method, view swiping method, view tapping method, view stacking method, view list method, sort by lists, create lists, etc.)

In some embodiments, there may be AI analyzing content may include but not limited to (e.g., photos, content, videos, activities, user's outside activities, content on other platforms, content on the current platform, etc.) In some embodiments, AI analyzing content may result in a solution being made by AI or machine learning or any data assessment and person to be shown solutions such as may include but not limited to (e.g., problem: a girl with extremely short hair only 3 inches long, analyzed automatically by AI, machine learning, etc.) solution: showing ads of hair extensions or boutiques for hair extensions or clip extensions or how to grow your hair long, etc.) In some embodiments, another user may search for may include but not limited to (e.g., 'how to act on a first date'). AI, machine learning, or data assessment or collection may result in an automatic solution by showing may include but not limited to (e.g., video/content/solution, sending information whether through the platform or an ad, or 3rd party or sell to 3rd party for ads, etc.) In some embodiments, users' information may include but not limited to (e.g., calendar, schedule, data, messages, etc.) may be used to may consist of but not limited to (e.g., collect data, analyze data using machine learning, AI, automatic, 3rd parties, advertisers, advertisements, businesses, etc.) and present solutions may include but not limited to (e.g., open calendar, AI analyzing or machine learning analyzing, or 3rd party analyzing, offer a solution such as 'how to get more dates booked on the calendar, etc.) In some embodiments, AI (artificial intelligence), machine learning, 3rd party platforms may mean any computing operating system, etc.)

Figure 114:
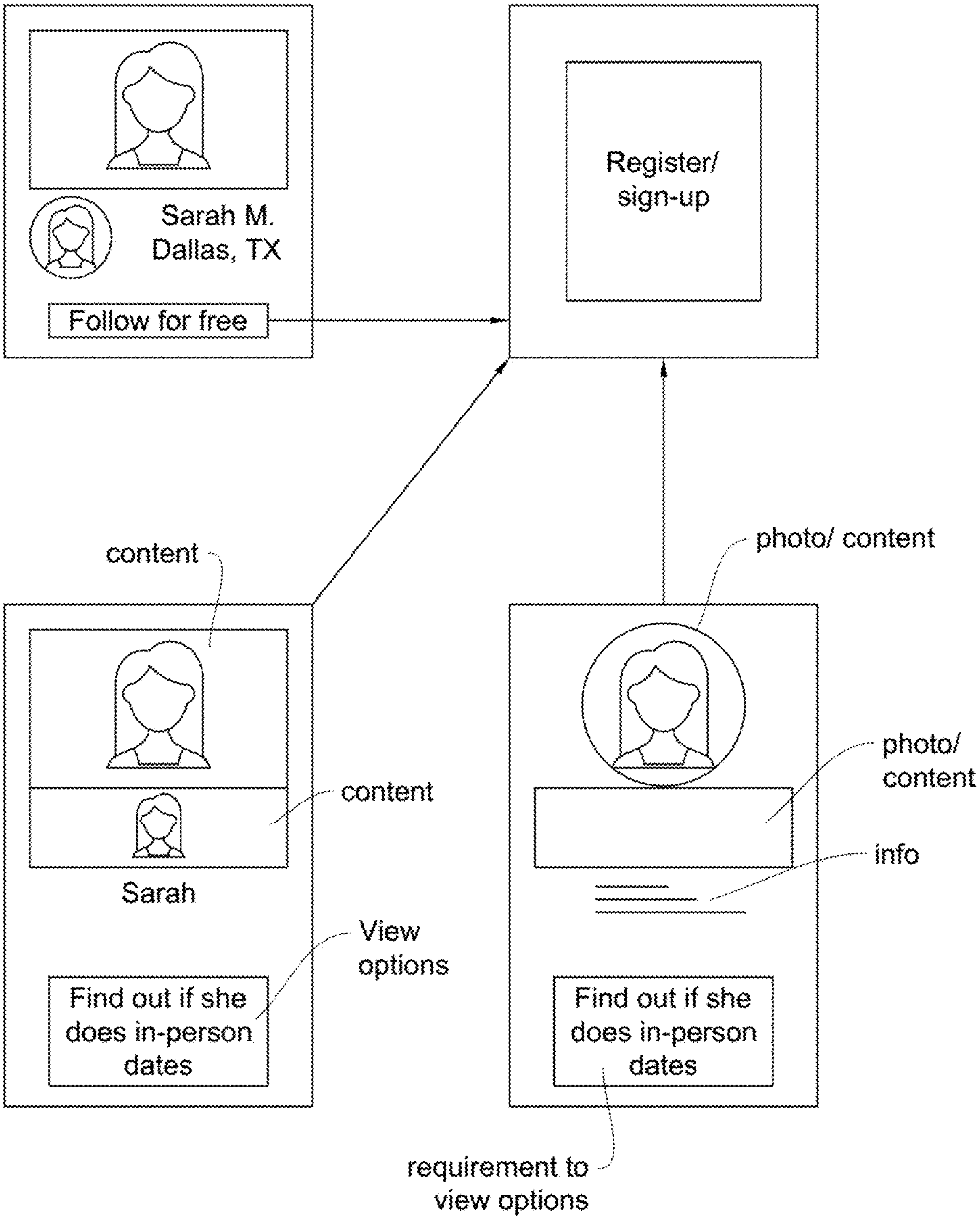

FIG. 114: In some embodiments, there may be, which may include but not be limited to (e.g., hidden options or hidden features, or private features, or non-hidden, etc.) which may include but not be limited to (e.g., 'knowing whether or not someone does in-person dates unless that person follows them or adds them to their list', viewing locked information or content or membership only information or buttons or interactions or dates or virtual dates or messages, finding out if someone does 'in person dates', finding out if someone has a schedule that can be booked on, finding out if you can view or if they are available, seeing someone's schedule, seeing what type of dates she does, seeing her requirements such as money or gifts, requirements such as following to view or signing up for membership to view or to interact with, etc.) In some embodiments, a user may have to which may include but not be limited to (e.g., sign up or add that person to their list or follow them, etc.) to find out what type of content they do, may include but not be limited to (e.g., NSFW, in-person dates, locked content, unlocked content, exclusive requests, requests, customized entertainment, entertainment, requested entertainment, entertainment, dates, virtual dates, virtual talking sessions, meetings, to see person's calendar, to see person's location, to see person's offerings, to see person's private content, to see someone's public content, photos, videos, gifs, memes, requests, their private section, in-person meetings, in person dates, in-person activities such as bowling, etc.) In some embodiments, there may be, which may include but is not limited to (e.g., locked features or requirements to sign in, requirements to pay, or requirements to follow for free to see hidden information, preferences, or anything regarding information about the person, etc.) In some embodiments, requirements to meet before seeing information may lead to a, which may include but not limited to (e.g., a user or a public person to a sign-in page, a registration page, or a payment page, or a preview page, or preview content page, or a preview anything page, or a message, or a preview message, or some content, or a lot of content, or a new system or a new way to see content or a different viewpoint of content, or a scrolling method, or a list method, or a system method, etc.)

In some embodiments, there may be an option for, which may include but not be limited to (e.g., persons, creators, users, models, etc.) to have a, which may include but not be limited to (e.g., live stream, pre-recorded live stream, pre-recorded content, conversation, video call, phone call, show, created content, collaborated content, etc.) which may be, which may include but not be limited to (e.g., locked, stopped, preview only, or requirement of payment to continue, etc.) which may show up on, which may include but not be limited to (e.g., either, both, persons, creators, users, models, etc.) user interfaces, and may be, which may include but not be limited to (e.g., unlocked, paid, previewed and paid for, subscribed to, paid for, etc.) on, which may include but not be limited to (e.g., either person's user interface or area for payment, or accept payment, or change of assets, or asset receiving, etc.) In some embodiments, which may include but not be limited to (e.g., model, creator, the person getting paid, etc.), may be able to manage their, which may include but not be limited to (e.g., own profile or make any changes, or any business relations, or any business development, accept, deny, change, withdrawal, accept, get paid from, etc.) on any user interface, which may include but not be limited to (e.g., hologram, internet, app, device, website, web, Web3, outside platform, etc.) In some embodiments, creator profile or management system may include but not be limited to (e.g., brand, logo, profile, person, live, live stream, pre-recorded live stream, pre-recorded content, pre-recorded live stream, pre-recorded live stream, pre-recorded content, pre-recorded content, name, headline, photo, content, receiving of likes, receiving of profile views, seeing who has viewed profile, how to book, schedule, inquire about, inquire about, inquire regarding, secure, create connection to, hold, pay for, create business relationship with, use transmittables to secure or book, schedule, inquire about, etc.) how to book, schedule, inquire about, inquire about, inquire regarding, secure, create connection to, hold, pay for, create business relationship with, use transmittables to secure or book, schedule, inquire about, etc.) dates, training videos, training content, safety content, calendar, calendar management software, calendar management platform, options to change calendar, accepting dates, denying dates, managing dates, issuing refunds, feed, sending feed, locked photos, locked content messages, mass messages, messaging platforms, subscribe, book, schedule, inquire about, book now, manage booking options, manage booking payments, manage content production, manage artificial intelligence assistant, manage or collect machine learning input data, managing machine learning output data, messages, posts, past posts, new data, learning data, learned data, community posts, community area, suggestions, book 3rd party, reserve or pay for 3rd party, book nanny, book security, receiving background checks, receiving funds, transfer funds to bank, transfer funds, manage asset platform, manage assets, book travel, accept travel, obtain visa information, receive passport information, etc.) In some embodiments, the user interface(s) may provide a job booking platform or options that may enable 'service providers' to 'connect' with, which may include but not be limited to (e.g., clients, persons, users, brands, 3rd parties, advertisers, advertisements, businesses, entities, manage job bookings, manage finances, manage payments, etc.). In some embodiments, this may include a user interface(s) that may allow service providers to have but not be limited to (e.g., create, manage profiles, receive job requests from clients, manage bookings, payments, etc.) In some embodiments, The system may have features for, which may include but not be limited to (e.g., verifying service provider qualifications, verifying payments, managing client reviews, managing ratings, feedback, comments, booking, messaging, unlocking content, etc.), In some embodiments, there may be a user interface that may allow users to which may include but is not limited to (e.g., book, schedule, inquire about, inquire about, inquire regarding, secure, create connection to, hold, pay for, create a business relationship with, use transmittables to secure or book, schedule, inquire about, etc.) which may include but not limited to (e.g., jobs, gigs, events, parties, on-going jobs, on-going events, etc.) through platform(s) or which may include but not limited to (e.g., hire, find help, find assistance, pay someone else for any reasons, pay someone for assistance or goods or services, etc.) through, which may include but not limited to (e.g., platform or 3rd parties, advertisers, advertisements, businesses, or entities, or persons, etc.) In some embodiments, which may include but not limited to (e.g., options or ways to hire, or options available, or any possibilities of options, etc.) may include but not be limited to (e.g., find a personal assistant, browse through personal assistants, hire a personal assistant, hire a nanny, find a nanny, find/hire a chef, hire a driver, hire security, etc.) In some embodiments, options may include but are not limited to (e.g., paying on credit, paying cash, paying one-time, paying monthly, using credit, using rewards, having a 3rd party or another user pay, debit, immediate payment options, etc.) In some embodiments, there may be options to view potential 'hires' or 'those for work's history," which may include but not be limited to (e.g., how many jobs they have previously booked on the platform, their ratings, how many creators or models they've worked with, how many jobs they've done, their ratings for each job, their total ratings, comments, feedback, background check, background verification, etc.)

In some embodiments, there may be user interface, which may include but not be limited to (e.g., two user interfaces with two separate streams of content or information, multiple user interfaces with various variations of content or information, separate versions of content or combined content, or variations of content, messaging in-boxes, messages, notifications for messages, notifications, user information, other users information, locked content, prices, price ranges, general pricing, general transmittables, payment options, tipping options, live streams, pre-recorded live streams, content, users, users for browsing or suggestions, manual or created users, created lists, users, dates, times, prices, price ranges, general pricing, general transmittables, types of dates available, user's calendar, availability through calendar or other ways to know availability, platform suggested feed, suggested feed, feed, streams of content, locked content, feed of suggestions, feed of calendars, feed of lives, etc.) In some embodiments, there may be a user interface, which may include but not be limited to (e.g., live, pre-recorded live, content, free follow, follow, add to date list, add to a category, unlocked content, locked content, suggestions, user suggestions, ask AI question, ask user questions, price to send message, price to chat, cost to join, locked content with price, locked content to meet requirements, etc.) In some embodiments, there may be options to (e.g., move, scroll, switch, disappear, reappear, swipe, etc.) any, which may include but not be limited to (e.g., content or items, etc.)

In some embodiments, there may be a, which may include but not be limited to (e.g., yearly or a designated period fee, a yearly unlimited plan, a yearly unlimited message plan, a period in exchange for fee plan, etc.) In some embodiments, there may be membership settings for exclusive content from the, which may include but not be limited to (e.g., platform or from other users or anyone, etc.) In some embodiments, this may include but not be limited to (e.g., any approved model/creator, etc.) In some embodiments, which may include but not be limited (e.g., any person, user, etc.) may offer their own, which may include but not be limited to (e.g., membership fees, streaming fees, private room fees, date feed, in-person date fees, content fees, message fees, virtual date fees, live date fees, etc.) In some embodiments, membership fees may be, which may include but not be limited to (e.g., paid or broken down or distributed by who has voluntarily opted in and were they selected or booked, or paid for, or their content seen, anyone that has viewed or interacted with their content, any person, any user, platform, and user, etc.)

In some embodiments, there may be options to, which may include but not limited to (e.g., pay or free options etc.) to, which may include but not limited to (e.g., live stream, live stream a 'movie,' or game, or entertainment, etc.) or any form of which may include but not limited to (e.g., content or any form of entertainment etc.) at the, which may include but not limited to (e.g., same time, at different times, pause, top, record, not record, live only, pre-recorded live, streaming, regular streaming, no talking, talking etc.) In some embodiments, the 'free or paid option' to stream, watch, together, time spent together, which may include or not include a, which may include but not limited to (e.g., button, clicker, beginning, start, etc.) to begin which may include but not limited to (e.g., have a (e.g., timer, time stamp, location stamp, business location stamp, confirmation of time, location, data, etc.) or a recorded, or a data collector etc.) to determine if the 'contractual agreements that were paid or not paid' which may include but not limited to (e.g., went through or was obtained, etc.) In some embodiments, there may be options to 'pay' to do which may include but not limited to (e.g., live streaming, movie, entertainment, virtual entertainment, virtual game, in person game, or any time spent etc.) between one, two, or more persons etc.) In some embodiments, payment may be made prior to being able to possibly which may include but not limited to (e.g., 'join call' or 'join date' or 'join live stream' or 'being movie' or 'begin date or check-in, check-out, time stamp, time record, time and data record, location, time and data record,' or 'start date' or 'call this person' or 'video with this person' etc.) In some embodiments, options to join or book may not be available until 'agreements are met' or 'requirements are met,' which may include but not be limited to (e.g., may include payment or instructions or actions or anything to meet requirements etc.)

In some embodiments, there may be options for users to may include but not limited to (e.g., self-create, self-assess, or self-vote, user vote, choose, or be chosen, or be voted, or be under contract, etc.) to be put as a promoted which may include but not limited to (e.g., unique, main, top, largest, outside promoted, etc.) user on any page, which may include but not be limited to (e.g., the main page at the top, any promotional materials, any outside promotional materials, any page on platform anywhere on platform or platform's other platforms, or any promo material, etc.) In some embodiments, the promoted person(s) may be, which may include but is not limited to (e.g., do 'live shows' or 'live meetings' or 'in-person meet and greets, etc.) In some embodiments, the person may have any content that may include but is not limited to (e.g., exclusive content, person content, locked content, public content, etc.) In some embodiments, content may be in the form of any content or owned by any persons, including but not limited to (e.g., video, meme, photo, stack of photos or stack of content, or multiple variations of content, etc.) In some embodiments, users to be, which may include but not limited to (e.g., promoted, made special, larger, outside promoted, inside promoted, etc.) may be from the platform as which may include but not limited to (e.g., user, a bystander, voted, paid for, self-applied, user applied, any person making decisions, appointed, chosen, selected, suggested, etc.) In some embodiments, 'live shows' may be, which may include but are not limited to (e.g., pre-recorded, live pre-recorded, or 'live,' etc.)

In some embodiments, there may be options to: (e.g., have on their user interface, their profile, add a or have a, etc.) which may include but not be limited to (e.g., 'live introduction' or a 'pre-recorded video' or a 'virtual introduction' or a 'production' or 'content that sells' or 'content' etc.) In some embodiments, there may be options to, which may include but not limited to (e.g., pay or free options etc.) to, which may include but not limited to (e.g., live stream, live stream a 'movie,' or game, or entertainment, etc.) or any form of which may include but not limited to (e.g., content or any form of entertainment etc.) at the, which may include but not limited to (e.g., same time, at different times, pause, top, record, not record, live only, pre-recorded live, streaming, regular streaming, no talking, talking etc.) In some embodiments, the 'free or paid option' to stream, watch, together, time spent together, which may include or not include a, which may include but not limited to (e.g., button, clicker, beginning, start, etc.) to begin which may include but not limited to (e.g., have a (e.g., timer, time stamp, location stamp, business location stamp, confirmation of time, location, data, etc.) or a recorded, or a data collector etc.) to determine if the 'contractual agreements that were paid or not paid' which may include but not limited to (e.g., went through or was obtained, etc.) In some embodiments, there may be options to 'pay' to do which may include but not limited to (e.g., live streaming, movie, entertainment, virtual entertainment, virtual game, in person game, or any time spent etc.) between one, two, or more persons etc.) In some embodiments, payment may be made prior to being able to possibly which may include but not limited to (e.g., 'join call' or 'join date' or 'join live stream' or 'being movie' or 'begin date or check-in, check-out, time stamp, time record, time and data record, location, time and data record,' or 'start date' or 'call this person' or 'video with this person' etc.) In some embodiments, options to join or book may not be available until 'agreements are met' or 'requirements are met,' which may include but not be limited to (e.g., may include payment or instructions or actions or anything to meet requirements etc.)

In some embodiments, there may be options, which may include but not be limited to (e.g., where all content is locked or closed, or not shown etc.) until may include but not be limited to (e.g., follow is made, or a sign is made, or a booking is made, or a payment is made, etc.) In some embodiments, there may be options to book, schedule, inquire about, inquire about, inquire regarding, secure, create connection to, hold, pay for, create business relationship with, use transmittables to secure or book, schedule, inquire about, etc.) may include but not be limited to (e.g., in-person, immediately, in a smaller format that may be extend larger, anywhere on the user interface, or the user interface, etc.) In some embodiments, there may be combined locked and unlocked content, etc.) In some embodiments, there may be moving content may include but not be limited to (e.g., items or options moving around, moving content, replacing, disappearing, reappearing, appearing, moving, swaying), which may include but not be limited to (e.g., items such as videos, photos, content, promotional material, stacked photos, information, etc.) In some embodiments, 'locked content' may refer to content, which may include but not be limited to (e.g., any type of content, which may include but not be limited to (e.g., videos, photos, moving content, holograms, live content, live show, live viewing, pre-recorded viewing etc.) that may need to be 'paid' before may include but not be limited to (e.g., shown, or subscribed to, paid for, assets put up for, etc.) In some embodiments, there may an user interface or a screen or a visual of a profile or content, combined with options that may include but not limited to (e.g., book date, book meeting, follow for free, follow, message, price per message, price to send inquiry, send application, sign up for application, content, locked content, unlocked content, subscriber only content, follower-only content, etc.) In some embodiments, there may be an option to view content and/or have other options on the content to may include but not be limited to (e.g., view or interact with, or create, or edit, or move, etc.) whether (e.g., on top, on the side, on any part, or outside of the content etc.) which may include but not be limited to (e.g., locked content, book now, book for date, book for virtual date, entertainment options set by anyone or model or user, book for in person date, book video call, book phone call, view profile, etc.) In some embodiments, viewing profile may lead to a may include but not be limited to (e.g., 'locked profile' or a preview sort of profile, or a preview of content, or a lesser version of the full version, or a simpler version, or a version that is specifically shown, etc.) that a person may be required to 'follow,' which may include but not be limited to (meet requirements of user, platform, etc.) to: (e.g., see, view interact with, tap, message, do anything, screenshot, copy, etc.) In some embodiments, a person may be required to may include but not be limited to (e.g., meet requirements, or complete tasks, etc.) to see (e.g., profile, see information, access information, access content, view, preview, etc.)

Figure 115:
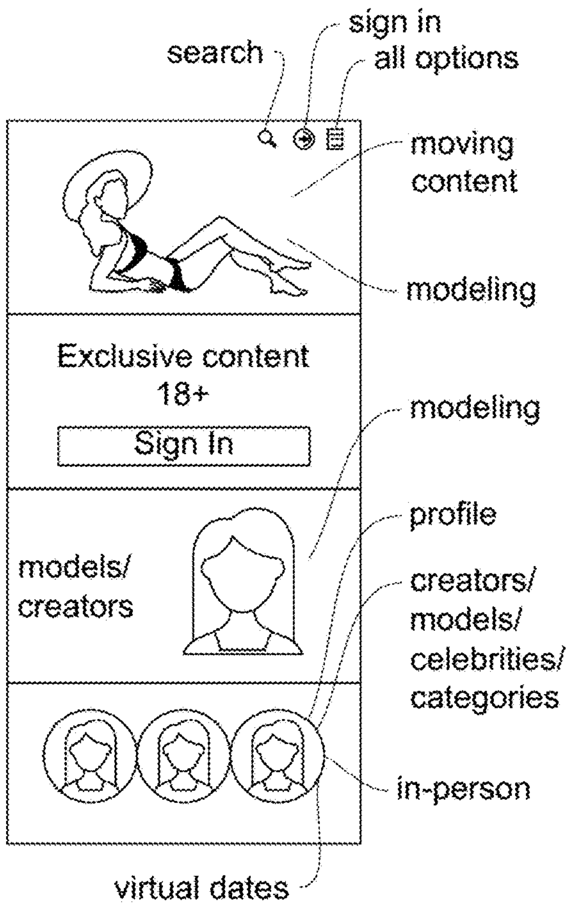
Figure 116:
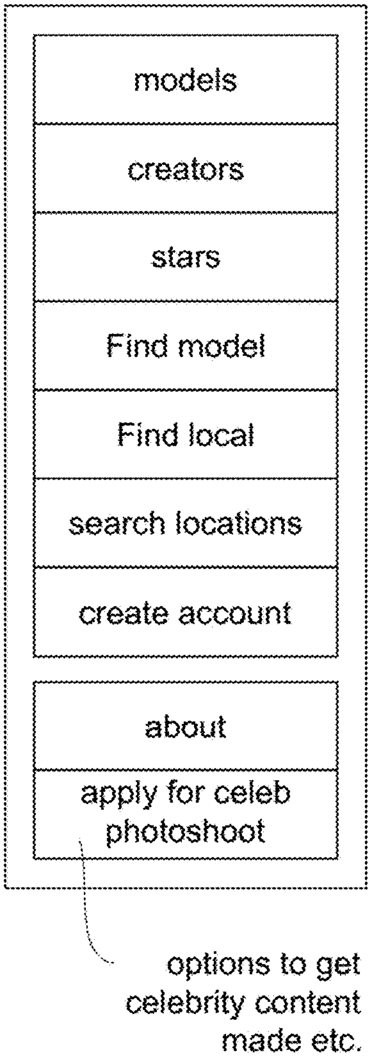
Figure 117:
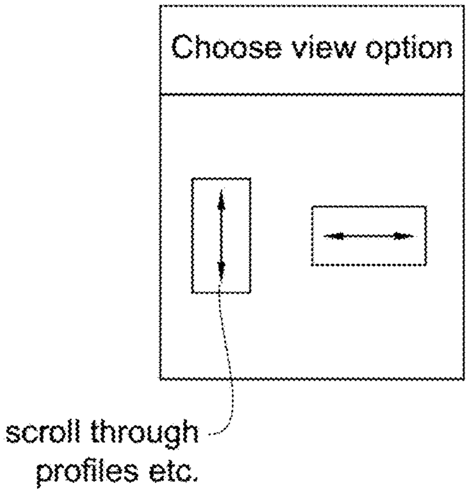

FIGS. 115, 116, and 117: In some embodiments, there may be an, which may include but not limited to (e.g., user interface, option, a screen, etc.) that may show may include but not limited to (e.g., users, persons, profiles, models, etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any user interface for example which may be including but not limited to the user interface may show options such as which may include but not limited to (e.g., 'choose your view option' etc.) which may include but not limited to (e.g., tapping, swiping, desktop view, mobile view, tapping view, stacking view, swiping view, see all profiles view, view by city, view by looks, view by stats, view by popularity, view by category, view by person, view by preferences, view by in-person daters, view by virtual daters, view by those with locked photos, view by those with unlocked photos, view those with sales, view those with discounts, view those with photoshoots, view those with other people that have more than one photo shoot, view matching AI-connecting, method, view swiping method, view tapping method, view stacking method, view list method, sort by lists, create lists, etc.) In some embodiments, categories such as (e.g., 'virtual date persons or users' or in-person daters or users, etc.) may be (e.g., shown or displayed or constantly changing or updating, etc.) based on user's (e.g., activity or AI gathered data or data gathered or information, etc.) regarding (e.g., user or platform or model or person etc.)

Figure 118:
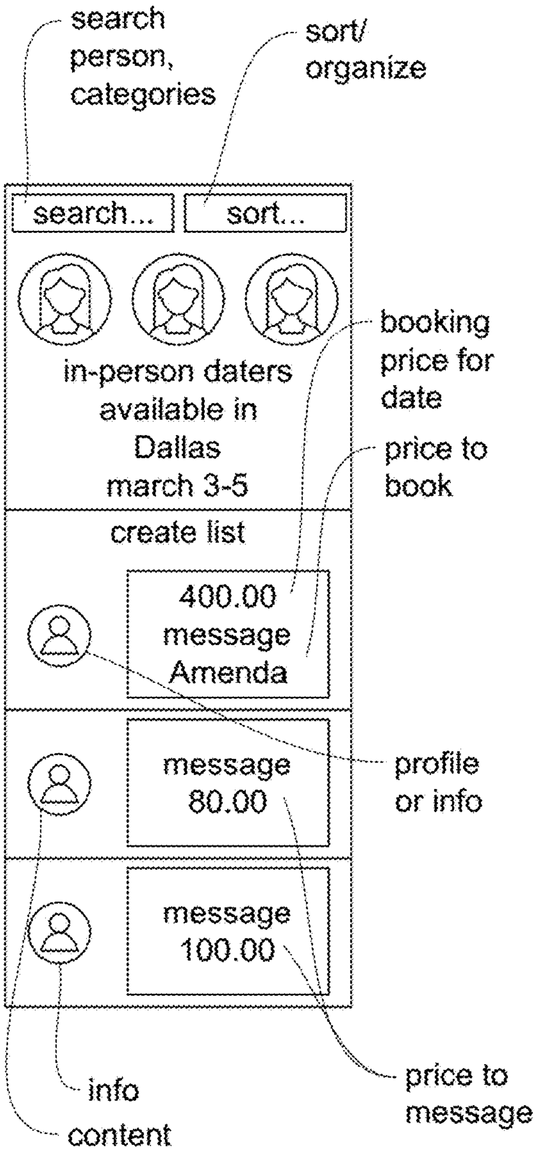
Figure 119:
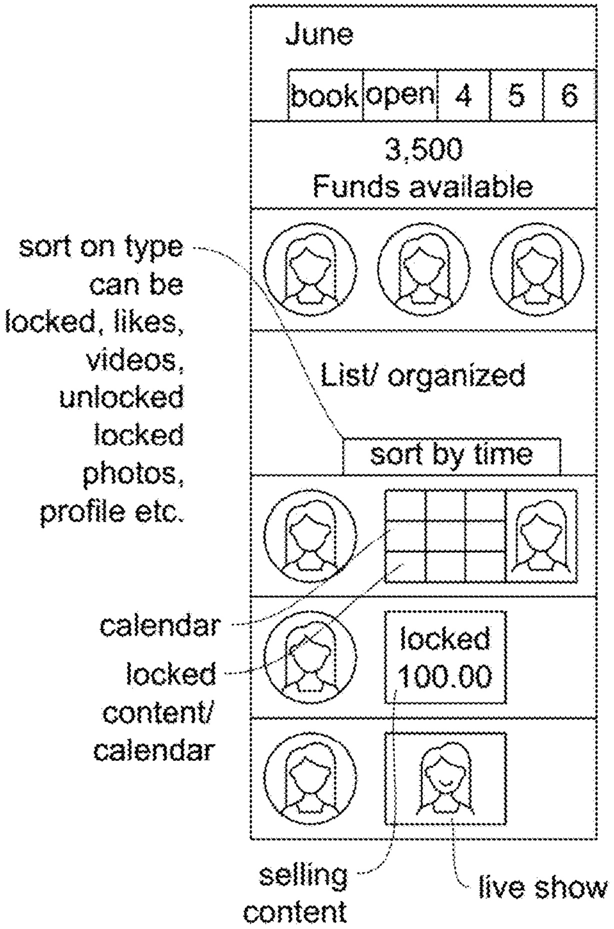

FIG. 118: FIG. 119 may be similar to 118 or any user interface in some embodiments. In some embodiments, FIG. 119 may show which may include but not limited to (e.g., users, public, persons, integrated users, persons, groups, businesses, entities, charities, groups, organized groups, etc.) which may have but not limited to (e.g., a live calendar or calendar settings or calendar for in-person, virtual, or any date availability, or connection availability, prices, gift options or gift ideas or gift requirements, list requirements, category, types accepted, message prices, date prices, availability and pricing, availability, scheduling, calendar information, live show information, dates regarding live shows or live streaming, etc.) In some embodiments, there may be, which may include but not limited to (e.g., options, displays, or viewing methods, etc.) to see which may include but not limited to (e.g., 'available funds' or show 'lists' or 'organized persons' or 'favorites' or 'special persons' or profiles, 'money available to be spent on dates' 'date money' money for dating' money for gifts, gift money, etc.) with any information or content next to it such as which may include but not limited to (e.g., calendars, locked content, videos, pictures, promotional material, date information, profile information, marketing content, modeling information, modeling info, models, etc.) In some embodiments, lists may be organized by types or categories such as 'locked, unlocked, photos, videos, lives, streaming, photos, videos, information, profile organizations, etc.) In some embodiments, there may be an interface where 'funds' are, including but not limited to (e.g., displayed, shown, added, credited, available, etc.) In some embodiments, 'funds' may be defined as which may include but is not limited to (e.g., money, credit, added funds, credited, available, exchangeable available, money that has been credited from 3rd parties, advertisers, advertisements, businesses, exchangeable that have been credit from a 3rd party or self or for any reason, refund, transferred transmittables, etc.) In some embodiments, user or person etc. may be able to (e.g., 'sort by time' sort my calendar availability' 'sort, etc.) or (e.g., show or allow to interact with or sign up for or see or categorize or interact with or send message to or send mass message to or send mass date request to or show that user is interested in etc.) based on (e.g., distance and calendar' 'show based on distance and prices or financial requirements' 'show based on gift requirements' 'show based on gifting or money or date requirements, show based on costs per user, show users based on expenses or prices or costs or membership costs or date costs, etc.)

In some embodiments, a potential user interface or person's user interface which may be, which may include but not limited to (e.g., 'funds to spend, money information, asset information, investment information, users profile information, users public or private information, upcoming availability on their calendar or schedule, times available for each day, booking options directly from their calendar, booking options directly from their feed, options to book, schedule, inquire about, inquire about, inquire regarding, secure, create connection to, hold, pay for, create business relationship with, use transmittables to secure or book, schedule, inquire about, etc.) date directly from feed, options to book, schedule, inquire about, inquire about, inquire regarding, secure, create connection to, hold, pay for, create business relationship with, use transmittables to secure or book, schedule, inquire about, etc.) call, message, send tip, etc.) options to book, schedule, inquire about, inquire about, inquire regarding, secure, create connection to, hold, pay for, create business relationship with, use transmittables to secure or book, schedule, inquire about, etc.) date or book or schedule directly from feed, or directly from seeing their photo or profile, suggestions from other users, suggestions for other persons to book, schedule, inquire about, inquire about, inquire regarding, secure, create connection to, hold, pay for, create business relationship with, use transmittables to secure or book, schedule, inquire about, etc.) suggestions for other profiles, 'you might like' which may show other options, other options or more options, which may show up based on computing operation popularity, manual, or personal settings, or preferences, a calendar, the other persons calendar or information, their information, lists, organizational lists, person's lists, person on feed, persons based on availability, person's based on categories, upcoming dates, paid for dates, not paid for dates, logs that are not paid for, logs that are to be booked, logs that are to be checked out for, matching AI-connecting, calendar dates, etc.) In some embodiments, there may be a, which may include but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.)

In some embodiments, which may include but not be limited to (e.g., AI trained, human-trained, content, human and AI together, human only, AI-only, robotics that are trained, etc.) which may include but not be limited to (e.g., responses, solutions, content, results, suggestions etc.) In some embodiments, user interface may produce, which may include but not be limited to (e.g., custom AI content, custom responses, custom answers, trained answers, trained content, AI-produced content, AI and human combined content, etc.) In some embodiments, AI may be trained by, which may include but not be limited to (e.g., human, robot, bot, 3rd party, entity, computer system, AI system, inputted information, laws, regulations, content, photos, videos, documents, etc.) which may allow 'trained AI' to automatically or with the assistance of a human generate a, which may include but not be limited to (e.g., custom, changed, answered, solution, etc.) to, which may include but not be limited to (e.g., question, requested content, requested date, produce content, requested virtual date, entertainment options set by anyone or model or user, requested post, requested message, custom-created content, custom-requested content/output, questions, send ads, send information, question responses, information responses, information requests, bookings, general questions, funny, games, jokes, fun, etc.) which may be automatically, manually, human, robot, bot, 3rd party, entity, computer system, AI system, or any type of generated at any time period whether, which may include but not be limited to (e.g., immediately, scheduled sent, random scheduling of sending response or information or requested content or any requests, later, taking information request such as 'respond to me next week when I'm not so busy, etc.) In some embodiments, AI or human or computing system may input or gather or obtain information from request and generating (e.g., best response, best answer, best time to response, best response based on any data, rained data response, etc.) In some embodiments, AI or human may generate with, which may include but not be limited to (e.g., point scale system, scale, created scale, general knowledge scale, knowledge scale, inputted data scale, measurements based on risk assessment, etc.) to, which may include but not be limited to (e.g., conclude, give, response, create answer, answer, response, time, best solution, etc.)

In some embodiments, there may be options for the platform may include but not limited to (e.g., outside, AI, machine learning, chips, etc.) to categorize users based on which may include but not limited to (e.g., earnings, location, distance, how often user is logged in, user time on platform, user income, message response time, tips, outside platforms, outside information, models, entrepreneurs, business owners, career-women, actresses, net-worth, top earners, top tippers, top spenders, categorized spenders, reality stars, content creators, award winners, favorites, partners, 3rd parties etc.) which may create which may include but not limited to (e.g., automatic, manual, robotic created, human created, etc.) which may include but not limited to (e.g., lists, computing operation, categories, tags, etc.) In some embodiments, there may be calendar screen or a, which may include but not be limited to (e.g., breakdown, itemized, receipt, invoice, total, partial, breakdown, bill, summary of, total, etc.) screen or an availably screen that may show suggestions, which may include but not be limited to (e.g., persons from categories, lists, created lists, favorites, suggestions, AI created lists, machine learning lists, platform suggestions, most clicked, type lists, etc.) In some embodiments, the suggestions may be easily addable to, which may include but not be limited to (e.g., calendar or to times available, availability, open areas, open time periods, times to be booked, etc.) In some embodiments, calendar openings may, which may include but not be limited to (e.g., show and suggest to fill user in on each time by using AI or any type of suggestion whether showing, telling, suggesting, adding etc.) In some embodiments, persons may be added to, which may include but not be limited to (e.g., times and days etc.) and/or person only has to, which may include but not be limited to (e.g., check out or pay, etc.) In order to, which may include but not be limited to (e.g., secure the booking etc.) In some embodiments, persons may, which may include but not be limited to (e.g., appear, be suggested, etc.) which may include but not be limited to (e.g., on calendar or suggestions to be added to calendar or to be booked, or to be clicked on, or to be considered, or to be messaged, etc.)

In some embodiments, there may be options, which may include but not limited to search by (e.g., person, categories, location, distance, preferences, likes, interests, person, categories, separation categories, etc.) In some embodiments, there may be information or matching AI-connecting, or shown persons based on 'matching AI-connecting, preferences, or search criteria, or personal computing operation, or system computing operation, or AI, or machine learning, etc.) In some embodiments, there may be options to create 'lists' or create organized preferences or organized persons, or organized users, or organized photoshoots, or organized profiles, or organized persons of interest, or organized 'liked preferences' etc.) In some embodiments, there may be options to message persons in the organized list or the preference list or the made list or the self-made list, or the automatically made lists, or the computing operation lists that the user may be able to, which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.) In some embodiments, user interface may show, which may include but not be limited to (e.g., earnings, payouts, referrals, pending payments, pending requests, amounts earned, amount earned, amount, fees, net payment, gross payment, statement, earnings, profile, statements, taxes, 3rd parties for taxes, 3rd parties, advertisers, advertisements, businesses, outside entities, outside parties, messages, queue, home, profile, messages, earnings from messages, etc.)

In some embodiments, there may be options that may have options to, which may include but not be limited to (e.g., lead to a list, organization, types, profiles, suggestions, etc.) based on preferences or categories, etc.) which may include but not limited to (e.g., book-in person date, book virtual, book talk, book chat, book video chat, book video meeting, book voice conversation, date, follow for free, discover for free, locked content, platform's exclusive content, special models, promotional persons, message, choose a city, find your city, our models, locked content, unlocked content, match your calendar, match anywhere in the world, match another city, match yourself to anyone, match based on preferences, find date based on availability, find date based on distance, find date based on calendar, find date based on city, match date virtual match date in person, find girlfriend, find wife, find date, find friend, fan, fans only, for fans, for followers, see your favorite model, see your favorite celebrity, see new celebrities, see new models, see new sign ups, see new girls, users, see new creators, boyfriend applications, husband applications, date applications, book in person date now, book virtual, book talk, book chat, book video chat, book video meeting, book voice conversation, date, book call, see more information, see promotional material, see profile, get matched, swipe now, view exclusive content, go through stack now, view like dating apps style, choose your view for profile, see standard profiles, see regular way to view profiles, swipe by city, swipe by distance, view stacked style, view desktop style, view mobile style, get matched by human, robot, bot, 3rd party, entity, computer system, AI system, get matched by AI, get matched by robots, membership, membership fees, FAQS, learn more, unlock content, choose style to see content, swipe, view like, which may include but not be limited to (e.g., swipe up and down, side to side, stacked, list, create list, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

FIG. 118, FIG. 119: In some embodiments, there may be options, including but not limited to search by (e.g., person, categories, location, distance, preferences, likes, interests, person, categories, separation categories, etc.) In some embodiments, there may be information or matching AI-connecting, or shown persons based on matching AI-connecting, preferences, search criteria, personal computing operation, system computing operation, AI, machine learning, etc.) In some embodiments, there may be options to create 'lists' or create organized preferences or organized persons, organized users, organized photoshoots, organized profiles, organized persons of interest, or collected 'liked preferences,' etc.) In some embodiments, there may be options to message persons in the organized list or the preference list or the made list or the self-made list, or the automatically created lists, or the computing operation lists that the user may be able to, which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.)

In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments, there may be an interface where 'funds' are, including but not limited to (e.g., displayed, shown, added, credited, available, etc.) In some embodiments, 'funds/credit/account funds/credit to account' may be defined as, which may include but is not limited to (e.g., money, credit, added funds, credited, available, exchangeable available, money that has been credit from 3rd parties, advertisers, advertisements, businesses, transmittables that have been credit from a 3rd party or self or for any reason, refund, transferred transmittables, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

FIG. 119 may be similar to 118 or any user interface in some embodiments. In some embodiments, FIG. 119 may show which may include but not limited to (e.g., users, public, persons, etc.) which may have but not limited to (e.g., a live calendar or calendar settings or calendar for in-person, virtual, or any type of date availability, or connection availability, etc.) In some embodiments, there may be, which may include but not limited to (e.g., options, displays, or viewing methods, etc.) to see which may include but not limited to (e.g., 'available funds' or show 'lists' or 'organized persons' or 'favorites' or 'special persons' or profiles, etc.) with any type of information or content next to it such as which may include but not limited to (e.g., calendars, locked content, videos, pictures, promotional material, date information, profile information, marketing content, etc.) In some embodiments, lists may be organized by types or categories such as 'locked, unlocked, photos, videos, lives, streaming, photos, videos, information, profile organizations, etc.)

In some embodiments, a potential user interface or person's user interface which may be, which may include but not limited to (e.g., 'funds to spend, money information, asset information, investment information, users profile information, users public or private information, upcoming availability on their calendar or schedule, times available for each day, booking options directly from their calendar, booking options directly from their feed, options to book, schedule, inquire about, inquire about, inquire regarding, secure, create connection to, hold, pay for, create business relationship with, use transmittables to secure or book, schedule, inquire about, etc.) date directly from feed, options to book, schedule, inquire about, inquire about, inquire regarding, secure, create connection to, hold, pay for, create business relationship with, use transmittables to secure or book, schedule, inquire about, etc.) which may include but not limited to (e.g., call, message, send tip, etc.) options to book, schedule, inquire about, inquire about, inquire regarding, secure, create connection to, hold, pay for, create business relationship with, use transmittables to secure or book, schedule, inquire about, etc.) which may include but not limited to (e.g., date or book or schedule directly from feed, directly from seeing their photo or profile, suggestions from other users, suggestions for other persons to book, schedule, inquire about, inquire about, inquire regarding, secure, create connection to, hold, pay for, create business relationship with, use transmittables to secure or book, schedule, inquire about, etc.) which may include but not limited to (e.g., suggestions for other profiles, 'you might like' which may show other options, other options or more options, which may show up based on computing operation popularity, manual, or personal settings, or preferences, a calendar, the other persons calendar or information, their information, lists, organizational lists, person's lists, person on feed, persons based on availability, person's based on categories, upcoming dates, paid for dates, not paid for dates, logs that are not paid for, logs that are to be booked, logs that are to be checked out for, matching AI-connecting, calendar dates, etc.)

In some embodiments, there may be a, which may include but not be limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or style of category, ways to discover or see more content or categories or calendar matching AI-connecting, etc.) In some embodiments, there may be options for the platform may include but not limited to (e.g., outside, AI, machine learning, chips, etc.) to categorize users based on which may include but not limited to (e.g., earnings, location, distance, how often the user is logged in, user time on platform, user income, message response time, tips, outside platforms, outside information, models, entrepreneurs, business owners, career-women, actresses, net-worth, top earners, top tippers, top spenders, categorized spenders, reality stars, content creators, award winners, favorites, partners, 3rd parties, etc.) which may create which may include but not limited to (e.g., automatic, manual, robotic created, human-created, etc.) which may include but not limited to (e.g., lists, computing operation, categories, tags, etc.)

In some embodiments, there may be calendar screen or a, which may include but not be limited to (e.g., breakdown, itemized, receipt, invoice, total, partial, breakdown, bill, summary of, total, etc.) screen or an availably screen that may show suggestions, which may include but not be limited to (e.g., persons from categories, lists, created lists, favorites, suggestions, AI created lists, machine learning lists, platform suggestions, most clicked, type lists, etc.) In some embodiments, the suggestions may be easily addable to, which may include but not be limited to (e.g., calendar or to times available, availability, open areas, open time periods, times to be booked, etc.) In some embodiments, calendar openings may, which may include but not be limited to (e.g., show and suggest to fill user in on each time by using AI or any type of suggestion whether showing, telling, suggesting, adding etc.) In some embodiments, persons may be added to, which may include but not be limited to (e.g., times and days etc.) and/or person only has to, which may include but not be limited to (e.g., check out or pay, etc.) In order to, which may include but not be limited to (e.g., secure the booking etc.) In some embodiments, persons may, which may include but not be limited to (e.g., appear, be suggested, etc.) which may include but not be limited to (e.g., on calendar or suggestions to be added to calendar or to be booked, or to be clicked on, or to be considered, or to be messaged, etc.) In some embodiments, there may be options, which may include but not limited to search by (e.g., person, categories, location, distance, preferences, likes, interests, person, categories, separation categories, etc.) In some embodiments, there may be information or matching AI-connecting, or shown persons based on 'matching AI-connecting, preferences, or search criteria, or personal computing operation, or system computing operation, or AI, or machine learning, etc.) In some embodiments, there may be options to create 'lists' or create organized preferences or organized persons, or organized users, or organized photoshoots, or organized profiles, or organized persons of interest, or organized 'liked preferences' etc.) In some embodiments, there may be options to message persons in the organized list or the preference list or the made list or the self-made list, or the automatically made lists, or the computing operation lists that the user may be able to, which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.)

In some embodiments, user interface may show, which may include but not be limited to (e.g., earnings, payouts, referrals, pending payments, pending requests, amounts earned, amount earned, amount, fees, net payment, gross payment, statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments, there may be options that may have options to, which may include but not be limited to (e.g., lead to a list, organization, types, profiles, suggestions, etc.) based on preferences or categories, etc.) which may include but not limited to (e.g., book-in person date, book virtual, book talk, book chat, book video chat, book video meeting, book voice conversation, date, follow for free, discover for free, locked content, platform's exclusive content, special models, promotional persons, message, choose city, find your city, our models, locked content, unlocked content, match your calendar, match anywhere in the world, match another city, match yourself to anyone, match based on preferences, find date based on availability, find date based on distance, find date based on calendar, find date based on city, match date virtual match date in person, find girlfriend, find wife, find date, find friend, fan, fans only, for fans, for followers, see your favorite model, see your favorite celebrity, see new celebrities, see new models, see new sign ups, see new girls, users, see new creators, boyfriend applications, husband applications, date applications, book in person date now, book virtual, book talk, book chat, book video chat, book video meeting, book voice conversation, date, book call, see more information, see promotional material, see profile, get matched, swipe now, view exclusive content, go through stack now, view like dating apps style, choose your view for profile, see standard profiles, see regular way to view profiles, swipe by city, swipe by distance, view stacked style, view desktop style, view mobile style, get matched by human, robot, bot, 3rd party, entity, computer system, AI system, get matched by AI, get matched by robots, membership, membership fees, FAQS, learn more, unlock content, choose style to see content, swipe, view like, which may include but not be limited to (e.g., swipe up and down, side to side, stacked, list, create list, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

Figure 120:
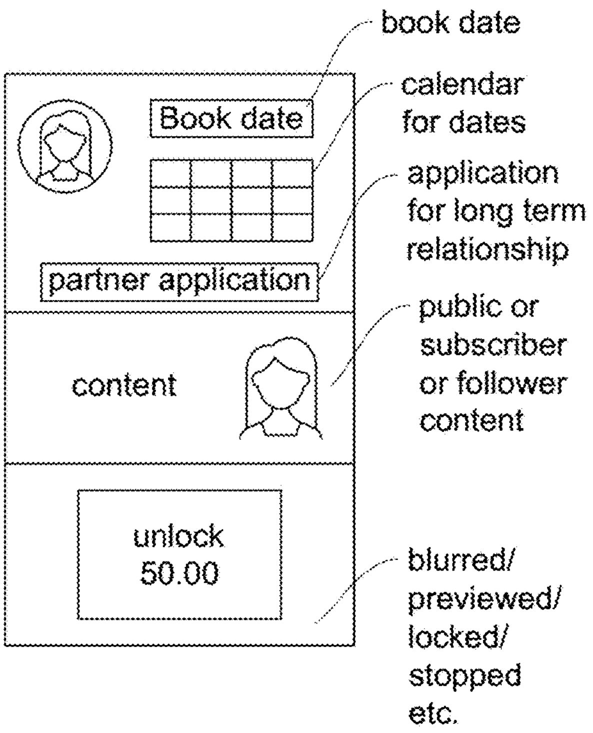
Figure 121:
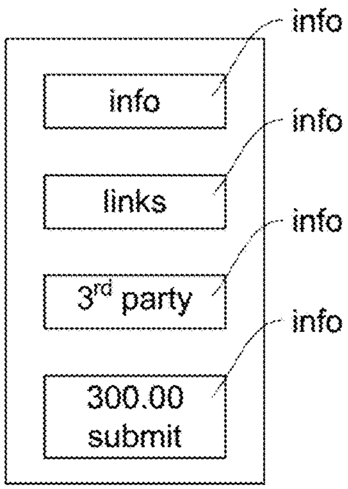

FIG. 120, FIG. 121: In some embodiments, there may be a combination or one of the following which may be included but not limited to (e.g., a profile photo or profile information, content information, partner application for marriage, boyfriend application, partner application, life partner application, friend boy application, friend girl application, financial application, finances application, friendship application, business partner application, mentorship application, mentor application, content, locked content, streamed content, streaming information, news, data streamed photos, streamed pictures, subscriber-only photos, videos, or content, follower only photos, videos, content, etc.) In some embodiments, there may be a link that goes to a 3rd party or an internal or platform application for a, which may include but not be limited to (e.g., user, public person, or anyone, etc.) to submit a 'boyfriend application, husband application, partner application, domestic partner application, business application, business-related application, date application, or information, etc.)

Figure 122:
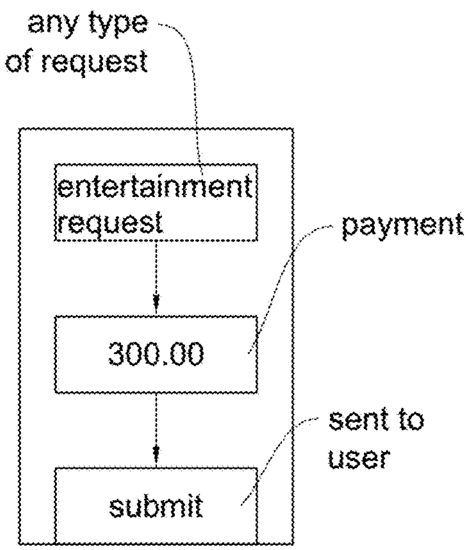

FIG. 122: In some embodiments, there may be a screen or screens that may show, which may include but not be limited to (e.g., information, photos, content, videos, or promotional material, or husband application, boyfriend application, or date application, or customized entertainment, entertainment, requested entertainment, entertainment, application, or unique request application, or specific content application, application that may include a gift or payment requirement to submit or save or send or inquiry about, or message application, or message requests, or messaging prices, price ranges, general pricing, general exchangeable, or messages, or contact information to message person or users, or ways to contact person by paying, or ways to submit payment, or locked content, or unlocked content, or public, or private content, or information, etc.) In some embodiments, there may be a combination or one of the following which may be included but not limited to (e.g., a profile photo or profile information, content information, partner application for marriage, boyfriend application, content, locked content, streamed content, streaming information, data, news, streamed photos, streamed pictures, subscriber-only photos, videos, or content, follower only photos, videos, content, etc.) In some embodiments, there may be a link that goes to a 3rd party or an internal or platform application for a, which may include but not be limited to (e.g., user, public person, or anyone, etc.) to submit a 'boyfriend application, husband application, partner application, domestic partner application, business application, business-related application, date application, or information, etc.)

Figure 123:
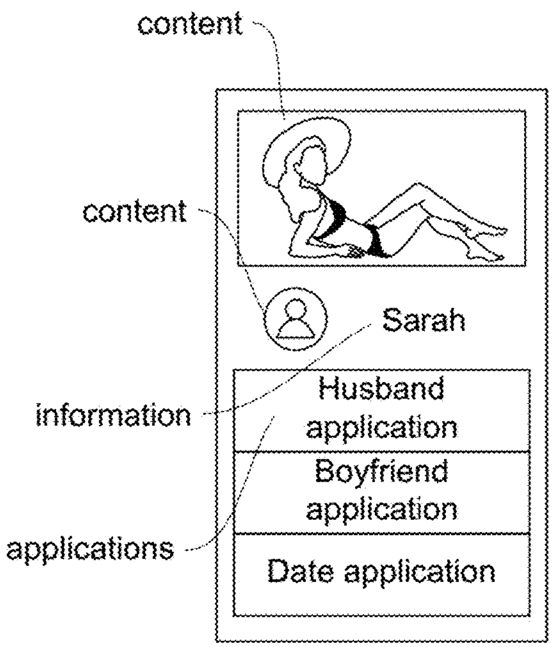

FIG. 123: In some embodiments, there may be a process in which a, which may include but not be limited to (e.g., public, private, or any profile or link, or page, etc.) may be able to accept any specific types of request. In some embodiments, the request may include but not be limited to (e.g., connection inquiries, dating information, advice, assistance, date application, dating application, help, conversations, entertainment request, customized entertainment, entertainment, requested entertainment, entertainment options, request, special requests, special questions, FAQ's, messages, messaging ways, unlock communication, unlock content, content, photos, videos, holograms, etc.) In some embodiments, requests may require (e.g., no payment, free, small fee, transmittables, payment, income, expense, asset, money, a thing of value, or asset payment, etc.) to be made, which may include but not be limited to (e.g., before, after, during, before the request being sent or request being fulfilled or request or question being sent or responded to, etc.) In some embodiments, a, which may include but not be limited to (e.g., a request, an order, a message, etc.), may be sent to the user in exchange for, which may include but not be limited to (e.g., time, money, payment, or thing or value, or asset, etc.)

FIG. 123: In some embodiments, there may be a process in which a, which may include but not be limited to (e.g., public, private, or any profile or link, or page, etc.) may accept specific types of request. In some embodiments, the request may include but not be limited to (e.g., customized entertainment, entertainment, requested entertainment, entertainment, request, special requests, special questions, FAQs, messages, messaging ways, unlock communication, unlock content, content, photos, videos, holograms, etc.) In some embodiments, requests may require, which may include but not be limited to (e.g., payment, asset, money, thing of value, or asset payment) which may be required to be made before the request being, which may include but not be limited to (e.g., sent, the request being fulfilled or request or question being sent or responded to, etc.) Some embodiments may include but are not limited to (e.g., a request, an order, a message, etc.) may be sent to the user in exchange for payment, thing or value, or asset, or free, for any reason, etc.

Figure 124:
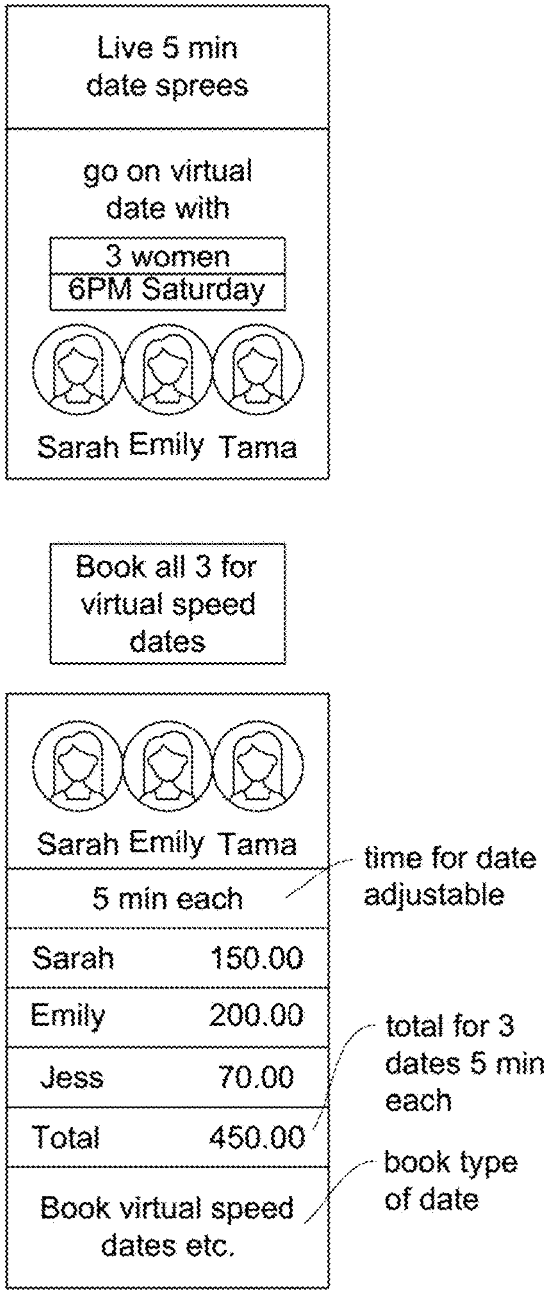

FIG. 124: In some embodiments, there may be options to, which may include but not be limited to (e.g., book, schedule, inquire about, inquire about, inquire regarding, secure, create a connection to, hold, pay for, create a business relationship with, use transmittables etc.) to, which may include but not be limited to (e.g., secure, book, schedule, inquire about, inquire about, schedule, obtain date, obtain connection, etc.) a (e.g., 'party virtual date' or a 'date spree' or 'pre-picked users dates' 'pre-picked or pre-schedule or pre-planned user date with one or more persons joining or a live stream of date' 'a date with one persona and a live stream of it such as someone getting stood up' a 'blind date spree' or a blind date match spree' or a 'connect user to all live streams as a date' or show users all daters available to talk' or 'concurrent dating' or 'one date after the other' or scheduling multiple dates' or 'staggered dates' or 'multiple dates' or 'one date' 'or one date multiple times' or 'one dater multiple dates' etc.) which may refer to, which may include but not be limited to (e.g., single or multiple shorter or multiple regular time or any time of dates, meetings, or connections, etc.) which may include but not be limited to (e.g., in a row, at one time, staggered, over a period of days, over a period of weeks, over a period of years, over any time frame, etc.) or, which may include but not be limited to (e.g., one right after the other or one the same day or on different days, staggered, etc.) In some embodiments, any of these (e.g., meetings, group dates, dates or dating sprees or dating parties or multiple dates or single dates or pre-date or, 'any amount of time in exchange for money or gifts' etc.) may have pricing associated with it such a (e.g., 'per minute price' 'per hour price' 'per day price' 'annual' 'per month' per second price etc.) In some embodiments, options to choose may include but not be limited to (e.g., person or persons, users, or outside users, or outside persons, or 3rd parties, advertisers, advertisements, businesses, or entities, etc.) In some embodiments, there may be options to see may include but not be limited to (e.g., breakdown, itemized, receipt, invoice, total, partial, breakdown, bill, summary of, total, place to purchase, place to checkout, invoice, etc.) which may include but not be limited to (e.g., prices, price ranges, general pricing, general transmittables, and/or time, a total to pay, a checkout window, a checkout options, 3rd party options to check out, ways to pay, etc.) In some embodiments, there may be options to increase or decrease time, including but not limited to (e.g., 'fluctuate price, total fluctuate total, fluctuate time fluctuating price, etc.) In some embodiments, options to adjust may include but are not limited to (e.g., 'adjust prices, price ranges, general pricing, general transmittables, adjust times, dates, location, period, frequency, etc.) In some embodiments, there may be options to may include but not be limited to (e.g., lower price, change price, switch price, change price, adjust price, funds application, apply funds, etc.) or change may include but not be limited to (e.g., booking calendar or booking (e.g., breakdown, itemized, receipt, invoice, total, partial, breakdown, bill, summary of, total, etc.) or booking due to price changes, time changes, etc.) Some embodiments may include but are not limited to (e.g., party virtual dates, one or more, or virtual dates with one or more persons or entities or users or persons or robotics, etc.) In some embodiments, there may be an option for a 'virtual party date which may be indicated by may include but not be limited to (e.g., at the same time with all users, or co-currently, or staggered, or one right after the other, or all on the same day, or all on different days, etc.) Some embodiments may include but are not limited to (e.g., 'virtual party date, double date, or triple date that is staggered, one right after the other, or all together, etc.) In some embodiments, the person 'paying' for the may include but not be limited to (e.g., meeting, connection, party, group session, for the entertainment, for the 'party' etc.) may be, which may include but not be limited to (e.g., larger, longer, there, not there, controlling the narrative, or game, or controlling the conversation, show up as part of the group, observe the other persons, not say anything, control the conversion, control the games, etc.) In some embodiments, the 'paying user' may not have to show up for the date, but the 'persons being paid' may have to show up for the date, connection, meeting, etc.) which may depend on the contractual obligations or the agreement that was (e.g., set, agreed upon, discussed, etc.). In some embodiments, the person 'paying for the date' may be 'optional to show their face' or 'show who they are' or 'remain anonymous.' In some embodiments, 'party dates' may be two-person dates, one-person dates, connections, etc.) In some embodiments, which may include but are not limited to 'dates or connections' may consist of or not have, which may include but not be limited to (e.g., games, entertainment, virtual entertainment, virtual, technology, in-person, real, hologram, VR, etc.)

Figure 125:
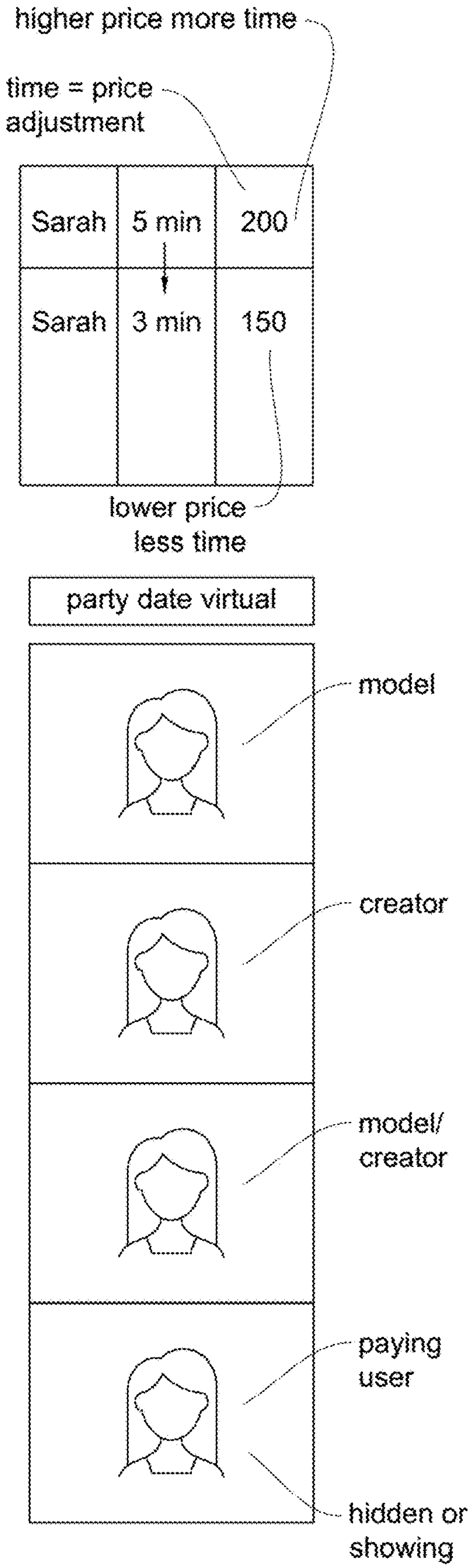

FIG. 125: In some embodiments, there may include but not be limited to (e.g., party virtual dates, one or more, or virtual dates with one or more persons or entities or users or persons or robotics, etc.) In some embodiments, there may be an option for a 'virtual party date which may be indicated by may include but not be limited to (e.g., at the same time with all users, or co-currently, or staggered, or one right after the other, or all on the same day, or all on different days, etc.) In some embodiments, there may include but are not limited to (e.g., 'virtual party date, double date, multiple daters online, daters that are live or online, or scheduled pre-picked dates or meeting, meetings between one or more person, group meetings, group dates, group business meetings, more than one person business meeting, or triple date, etc.) that is staggered, one right after the other, or all together, etc.) In some embodiments, the person 'paying' for the may include but not be limited to (e.g., meeting, connection, party, group session, for the entertainment, for the 'party' etc.) may be, which may include but not be limited to (e.g., more significant, longer, there, not there, controlling the narrative, or game, or controlling the conversation, show up as part of the group, observe the other persons, not say anything, control the conversion, control the games, etc.) In some embodiments, the 'paying user' may not have to show up for the date, but the 'persons being paid' may have to show up for the date, connection, meeting, etc.) which may depend on the contractual obligations or the agreement that was (e.g., set, agreed upon, discussed, etc.). In some embodiments, the person 'paying for the date' may be 'optional to show their face' or 'show who they are' or 'remain anonymous.' In some embodiments, 'party dates' may be two- or one-person dates, connections, etc.) In some embodiments, which may include but are not limited to 'dates or connections' may include or not include, which may include but not be limited to (e.g., games, entertainment, virtual entertainment, virtual, technology, in-person, real, hologram, VR, etc.) In some embodiments, there may be options to, which may include but not be limited to (e.g., book, schedule, inquire about, inquire about, inquire regarding, secure, create a connection to, hold, pay for, create a business relationship with, use transmittables, etc.) to, which may include but not be limited to (e.g., secure, book, schedule, inquire about, inquire about, schedule, obtain the date, obtain connection, etc.) a 'party virtual date' which may refer to, which may include but not be limited to (e.g., single or multiple shorter or multiple regular time or any time of dates, meetings, or connections, etc.) which may include but not be limited to (e.g., in a row, at one time, staggered, over a period of days, over a period of weeks, over a period of years, over any time frame, etc.) or, which may include but not be limited to (e.g., one right after the other or one the same day or on different days, staggered, etc.) In some embodiments, dates may be (e.g., live-streamed or pre-recorded or pre-planned to be filmed, etc.) with (e.g., one or more persons or no persons such as a live stream of a date or any live stream of a meeting, etc.) Dates may show up after a (e.g., payment is made or gifts are sent, or pre-paid for dates, etc.) or schedules may be made available, or users on live streams may show up or users to date or virtual date or connect with may show up only after (e.g., payment or gift requirements or exchangeable have been met or pre-paid for, etc.)

In some embodiments, options may be available, including but not limited to (e.g., person or persons, users, or outside users, outside persons, or 3rd parties, advertisers, advertisements, businesses, or entities, etc.) In some embodiments, there may be options to see may include but not be limited to (e.g., breakdown, itemized, receipt, invoice, total, partial, breakdown, bill, summary of, total, place to purchase, place to checkout, invoice, etc.) which may include but not be limited to (e.g., prices, price ranges, general pricing, general transmittables, and/or time, a total to pay, a checkout window, a checkout options, 3rd party options to check out, ways to pay, etc.) In some embodiments, there may be options to increase or decrease time, including but not limited to (e.g., 'fluctuate price, or total, fluctuate total, fluctuate time, fluctuating price, etc.) In some embodiments, there may be options to adjust, including but not limited to (e.g., 'adjust prices, price ranges, general pricing, general transmittables, adjust times, dates, location, time period, frequency, etc.) In some embodiments, there may be options to may include but not be limited to (e.g., lower price, change price, switch price, change price, adjust price, funds application, apply funds, etc.) or change may include but not be limited to (e.g., booking calendar or booking (e.g., breakdown, itemized, receipt, invoice, total, partial, breakdown, bill, summary of, total, etc.) or booking due to price changes, time changes, etc.)

Figure 126:
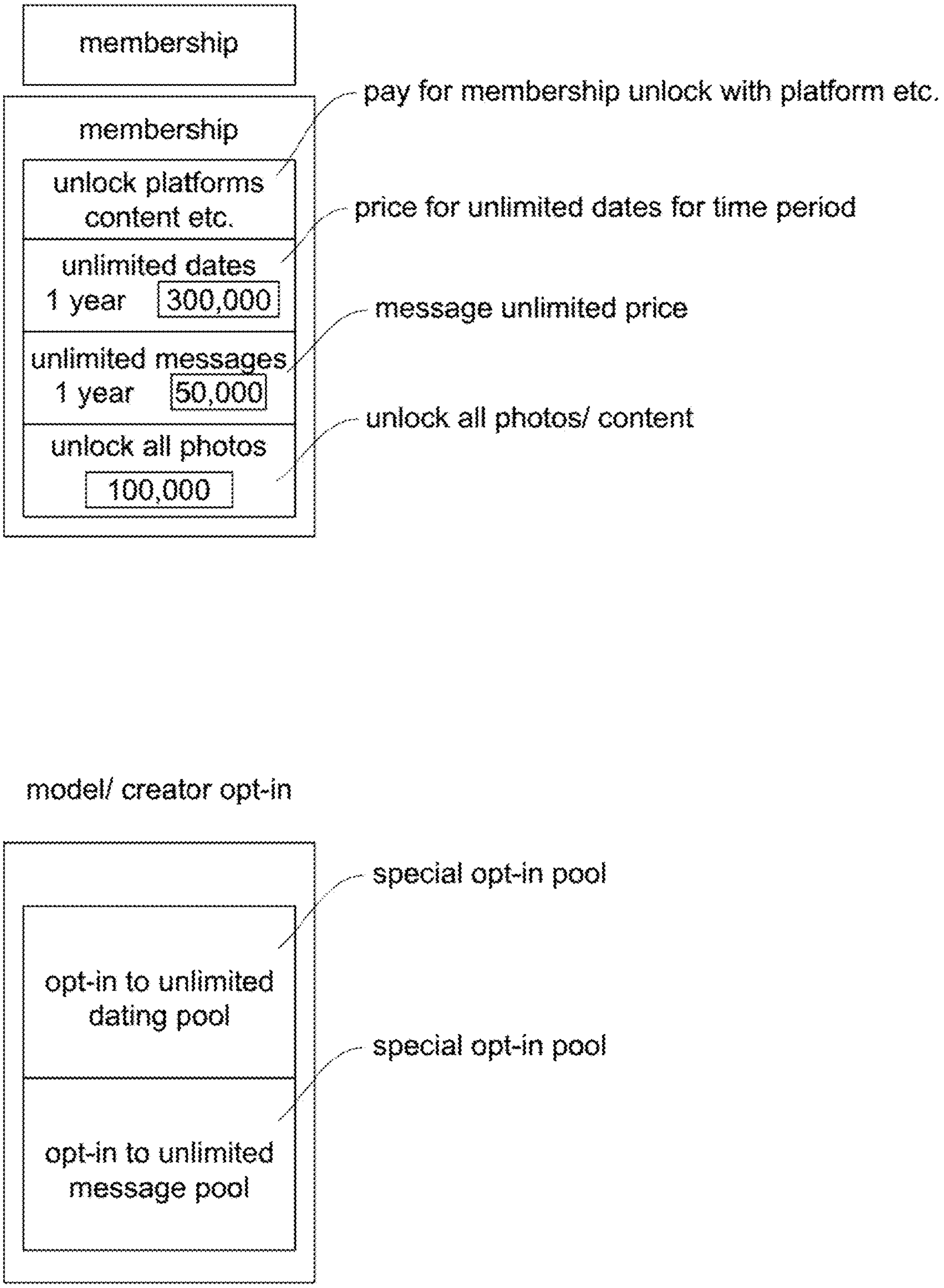

FIG. 126: In some embodiments, there may be a, which may include but not be limited to (e.g., yearly or a designated period fee, an unlimited annual plan, a membership, a subscription, a period for payment, a yearly unlimited message plan, a period in exchange for fee plan, dating pool membership, etc.) In some embodiments, there may be membership settings for exclusive content from the, which may include but are not limited to (e.g., platform, interface, or from other users or anyone, etc.) In some embodiments, this may include but not be limited to (e.g., any approved model/creator, any model/creator, any user, etc.) In some embodiments, which may include but not be limited to (e.g., any person, user, entity, 3rd party, human, AI, etc.) may offer their own, which may include but not be limited to (e.g., membership fees, streaming fees, private room fees, date feed, in-person date fees, content fees, payment, tips, message fees, virtual date fees, live date fees, etc.) In some embodiments, membership fees may be, which may include but not be limited to (e.g., paid or broken down or distributed by who has voluntarily opted in, been chosen, been selected, approved of, approved, confirmed, confirmed, etc.) which may include but not be limited to (e.g., and/or were they selected or booked, or paid for, or their content seen, anyone that has viewed or interacted with their content, any person, any user, platform, and user, etc.) In some embodiments, there may be options to: (e.g., have on their user interface, their profile, add a or have a, etc.) which may include but not be limited to (e.g., live introduction, a 'pre-recorded video, virtual introduction, production, content that sells, content, etc.) In some embodiments, a (e.g., 'live dating pool or an opt-in dating pool or a categorized dating pool, or users that were locked or inaccessible previously, etc.) may be made available after (e.g., payment or requirements are met such as singing a contract or payment or each individual model's requirement, etc.)

Figure 127:
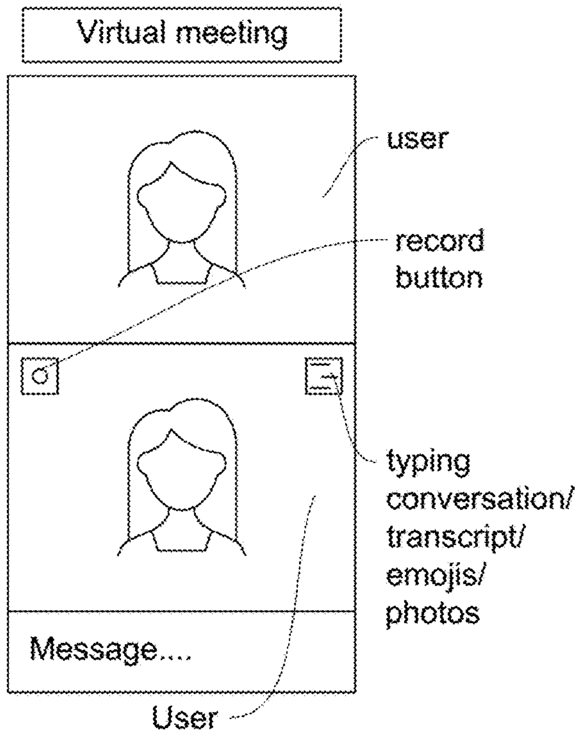
Figure 128:
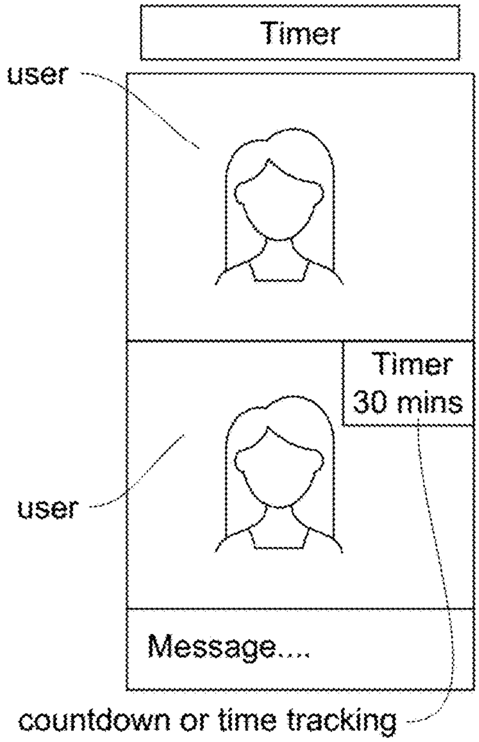

FIG. 127, FIG. 128: In some embodiments, there may be options for (e.g., 'virtual meeting(s), virtual greetings, virtual dates, virtual answering of questions, podcasting, recording session, answering questions, interview, romantic date, get to know someone, etc.) which may include but not be limited to (e.g., through platform, through a 3rd party, through an entity, integrated design, integrated technology, etc.) which may be, which may include but not be limited to (e.g., required or optional, suggested, shown after requirements are met, available, etc.), which may include but not be limited to (e.g., after, before, during, etc.) may include but not be limited to (e.g., 'payment' or 'any form of acceptance' has been made or at the discretion of the person being pursued or the person making the money or the person being paid or exchanged for the time or effort, payment or gifts are sent or pre-paid or provided, gifts are sent, gifts are reserved, payment is reserved, etc.) In some embodiments, the, which may include but not be limited to (e.g., virtual meeting, meeting, conversation, typing conversation, virtual conversation, conversation with a programmed AI, connection, live meeting, live stream, etc.) may allow, which may include but not be limited to (e.g., a bubble or a transcription, or a transcript, or a recording, or a non-recording, or a place to type messages, or a messaging system, a recording system, a talk-system, a hologram, a display screen, a discussion system, an interactive system, or a place to send emojis, or a place to flirt, to a place to talk, or a place to share photos, videos, content, ideas, etc.) In some embodiments, similar or not similar to any user interface, may include but not be limited to (e.g., there may be a '(e.g., timer, time stamp, location stamp, business location stamp, confirmation of time, location, data, etc.)' or a (e.g., timer system, timer until stopped or stopped recording, timer until date or meeting ends, 'countdown system' or a tracking system, or a data collection system, or a recording system etc.) applied to, which may include but not be limited to (e.g., one or more users, persons, etc.) for, which may include but not be limited to (e.g., length of date, other timing methods that may be used, etc.) In some embodiments, which may include but not limited to, the: (e.g., (e.g., timer, time stamp, location stamp, business location stamp, confirmation of time, location, data, etc.) system, platform, user, 3rd party, etc.) may, which may include but not be limited to (e.g., automatically, manually, set-automatically, AI-induced, etc.) which may include but not be limited to (e.g., begin call, make call, change call, add persons, change persons, auto call, auto system, AI call, end a call, or user interface may not do anything, or user interface may be left manually done, or user interface may be automatic, etc.)

In some embodiments, there may be options, which may include but not limited to (e.g., 'join virtual date' or 'join video call' or 'join chat now' 'or ask question' or 'join speed date' or 'begin speed date, or message, or send tip, or request content, etc.) In some embodiments, there may be ways to contact or complete or create connection such as which may include but not limited to (e.g., icons, buttons, options, swipes, tapping etc.) In some embodiments, this may be combined with other options or by itself such as which may include but not limited to (e.g., viewing profile, or seeing profile, or messaging, or sending tip, or sending money, or booking in person, or booking virtual etc.) In some embodiments, there may be an options to, which may include but not be limited to (e.g., book, schedule, inquire about, or meet, or make, or suggest, etc.) a, which may include but not be limited to (e.g., 'speed date,' or fast date, or quick date, or shortened date, or quick connection, etc.) which may be, which may include but not be limited to (e.g., paid for, disbursed, transferable, transmittables, exchanged for, asset put up for, etc.) at the, which may include but not be limited to (e.g., discretion or price or requirement of the 'person being paid for their time, discretion of user, discretion of model(s) etc.) In some embodiments, user may have an option to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., 'shorter virtual' or 'in-person date' etc.) such as similar to a 'speed date,' which may include but not be limited to (e.g., may last only 5 minutes, lesser than other versions, or more, or different, or changes to rules, or any time period that may be different, etc.) In some embodiments, there may be an option to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., 'shorter date,' different time period date, quick connection, etc.) which may include but is not limited to (e.g., 15 minute coffee date, 15 minute shopping spree, 15 minute makeup spree, 5 minute virtual meeting, speed date, speed coffee, speed game, quick dessert, 5 minute quick date or meet, etc.)

In some embodiments, there may be options for 'virtual meeting(s), which may include but not be limited to (e.g., through platform, through a 3rd party, through an entity, integrated design, integrated technology, etc.) which may be, which may include but not be limited to (e.g., required or optional, suggested, etc.) after may include but not be limited to (e.g., 'payment' or 'any form of acceptance' has been made or at the discretion of the person being pursued or the person making the money or the person being paid or exchanged for the time or effort, etc.) In some embodiments, the, which may include but not be limited to (e.g., virtual meeting, meeting, connection, etc.) may allow, which may include but not be limited to (e.g., a bubble or a transcription, or a transcript, or a recording, or a non-recording, or a place to type messages, or a messaging system, a recording system, a talk-system, a discussion system, an interactive system, or a place to send emojis, or a place to flirt, to a place to talk, or a place to share photos, videos, content, ideas, etc.) In some embodiments, similar or not similar to any user interface, may include but not be limited to (e.g., there may be a '(e.g., timer, time stamp, location stamp, business location stamp, confirmation of time, location, data, etc.)' or a 'countdown system' or a tracking system, or a data collection system, or a recording system etc.) applied to, which may include but not be limited to (e.g., one or more users, persons, etc.) for, which may include but not be limited to (e.g., length of date, other timing methods that may be used, etc.) In some embodiments, which may include but not limited to, the: (e.g., (e.g., timer, time stamp, location stamp, business location stamp, confirmation of time, location, data, etc.) system, platform, user, 3rd party, etc.) may, which may include but not be limited to (e.g., automatically, manually, set-automatically, AI-induced, etc.) which may include but not be limited to (e.g., begin call, make call, change call, add persons, change persons, auto call, auto system, AI call, end a call, or user interface may not do anything, or user interface may be left manually done, or user interface may be automatic, etc.) In some embodiments, social media connection to, which may include but not be limited to (e.g., profile, user, user interface etc.) In some embodiments, there may be options to connect may include but not be limited to (e.g., live or current or any previous, or potential social media accounts or internet, or public information, etc.) to verify whether through may include but not be limited to (e.g., personal, self-investigated, self-introduced, through a 3rd party, or through platform, etc.)

In some embodiments, social media connection to, may include but not be limited to (e.g., profile, user, user interface, etc.) In some embodiments, there may be options to connect may include but not be limited to (e.g., live or current or any previous or potential social media accounts or internet, or public information, etc.) to verify whether through may include but not be limited to (e.g., personal, self-investigated, self-introduced, through a 3rd party, or platform, etc.)

Figure 130:
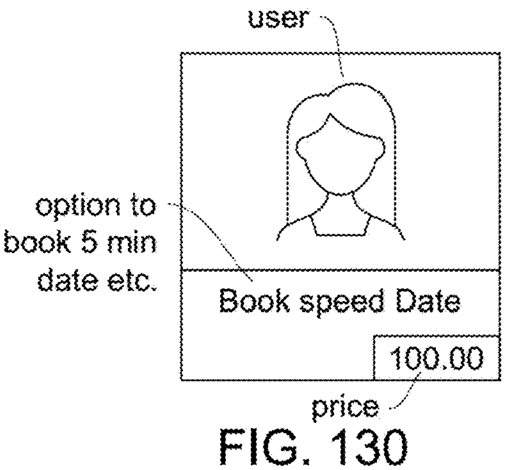
Figure 129:
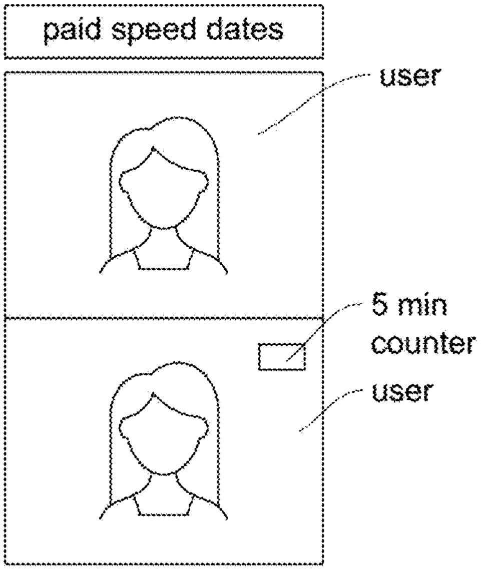
Figure 131:
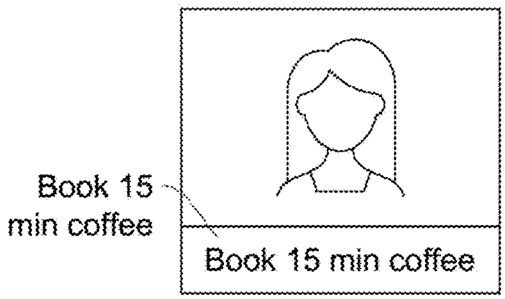

FIG. 129, FIG. 130, FIG. 131: In some embodiments, there may be an options to, which may include but not be limited to (e.g., book, schedule, inquire about, or meet, or make, or suggest, etc.) a (e.g., 'speed date' or 'quick meet' or 'quick chat' or 'quick talk' 'quick live chat or talk' 'get to know someone quickly', introduction, live introduction, etc.) which may be (E.g., free, required, options, paid for, gifts in exchange for, etc.) at the (e.g., discretion or price or requirement, etc.) of the (e.g., user, group, entity, person, model, 'person being paid for their time, etc.) In some embodiments, user may have an option to (e.g., book, schedule, inquire about, inquire about, inquire regarding, secure, create connection to, hold, pay for, create business relationship with, use transmittables to secure or book, schedule, inquire about, etc.) a (e.g., 'shorter virtual' or 'in-person date' such as similar to a 'speed date,' etc.) In some embodiments, time per date may be priced or gifted based on any requirement such as (e.g., per minute per second per hour per day, at user's discretion, etc.) In which may include but not be limited to (e.g., may last only 5 minutes, lesser than other versions, or more, or different, or changes to rules, or any time period, etc.) In some embodiments, there may be an option to (e.g., book, schedule, inquire about, inquire about, inquire regarding, secure, create connection to, hold, pay for, create business relationship with, use transmittables to secure or book, schedule, inquire about, etc.) a 'shorter date' which may include but is not limited to (e.g., 15 minute coffee date, 15 minute shopping spree, 15 minute makeup spree, 5 minute virtual meeting, 5 minute quick date or meet, etc.) In some embodiments, there may be options, which may include but not limited to (e.g., 'join virtual date' or 'join video call' or 'join chat now' 'or ask question' or 'join speed date' or 'begin speed date, or message, or send tip, or request content, etc.) In some embodiments, when countdown or date ends, the date may (e.g., abruptly end with no explanation except that time ran out or pay to continue date or insert payment to continue date, or with no explanation, continue, continue with only payment, continue at each users discretion or one user's discretion, etc.) In some embodiments, there may be ways to contact or complete or create connection such as which may include but not limited to (e.g., icons, buttons, options, swipes, tapping etc.) In some embodiments, this may be combined with other options or by itself such as which may include but not limited to (e.g., viewing profile, or seeing profile, or messaging, or sending tip, or sending money, or booking in person, or booking virtual etc.)

In some embodiments, there may be an options to, which may include but not be limited to (e.g., book, schedule, inquire about, or meet, or make, or suggest, etc.) a, which may include but not be limited to (e.g., 'speed date,' or fast date, or quick date, or shortened date, or quick connection, etc.) which may be, which may include but not be limited to (e.g., paid for, disbursed, transferable, transmittables, exchanged for, asset put up for, etc.) at the, which may include but not be limited to (e.g., discretion or price or requirement of the 'person being paid for their time, discretion of user, discretion of model(s) etc.) In some embodiments, user may have an option to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., 'shorter virtual' or 'in-person date' etc.) such as similar to a 'speed date,' which may include but not be limited to (e.g., may last only 5 minutes, lesser than other versions, or more, or different, or changes to rules, or any time period that may be different, etc.) In some embodiments, there may be an option to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., 'shorter date,' different time period date, quick connection, etc.) which may include but is not limited to (e.g., 15 minute coffee date, 15 minute shopping spree, 15 minute makeup spree, 5 minute virtual meeting, speed date, speed coffee, speed game, quick dessert, 5 minute quick date or meet, etc.)

In some embodiments, there may be options for 'virtual meeting(s), which may include but not be limited to (e.g., through platform, through a 3rd party, through an entity, integrated design, integrated technology, etc.) which may be required or optional after may include but not be limited to (e.g., 'payment' or 'any form of acceptance' has been made or at the discretion of the person being pursued or the person making the money or the person being paid or exchanged for the time or effort, etc.) In some embodiments, the, which may include but not be limited to (e.g., virtual meeting, meeting, connection, etc.) may allow, which may include but not be limited to (e.g., a bubble or a transcription, or a transcript, or a recording, or a non-recording, or a place to type messages, or a messaging system, a recording system, a talk-system, a discussion system, an interactive system, or a place to send emojis, or a place to flirt, to a place to talk, or a place to share photos, videos, content, ideas, etc.) In some embodiments, similar or not similar to any user interface, may include but not be limited to (e.g., there may be a '(e.g., timer, time stamp, location stamp, business location stamp, confirmation of time, location, data, etc.)' or a 'countdown system' or a tracking system, or a data collection system, or a recording system etc.) applied to, which may include but not be limited to (e.g., one or more users, persons, etc.) for, which may include but not be limited to (e.g., length of date, other timing methods that may be used, etc.) In some embodiments, which may include but not limited to, the: (e.g., timer, time stamp, location stamp, business location stamp, confirmation of time, location, data, etc.) system, platform, user, 3rd party, etc.) may, which may include but not be limited to (e.g., automatically, manually, set-automatically, AI-induced, etc.) which may include but not be limited to (e.g., begin call, make call, change call, add persons, change persons, auto call, auto system, AI call, end a call, or user interface may not do anything, or user interface may be left manually done, or user interface may be automatic, etc.) In some embodiments, social media connection to, which may include but not be limited to (e.g., profile, user, user interface etc.) In some embodiments, there may be options to connect may include but not be limited to (e.g., live or current or any previous, or potential social media accounts or internet, or public information, etc.) to verify whether through may include but not be limited to (e.g., personal, self-investigated, self-introduced, through a 3rd party, or through platform, etc.)

Figure 132:
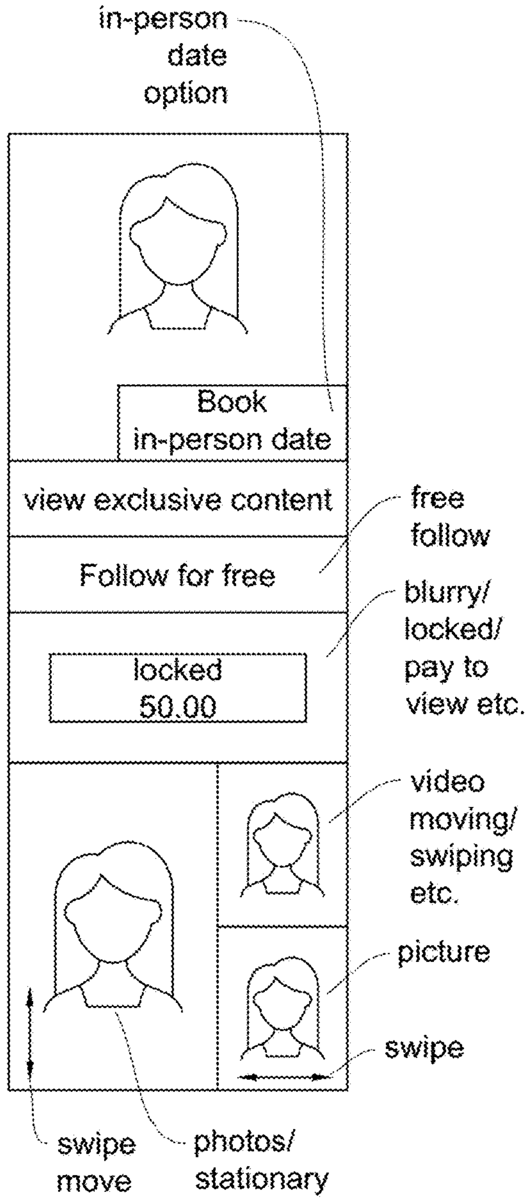
Figure 133:
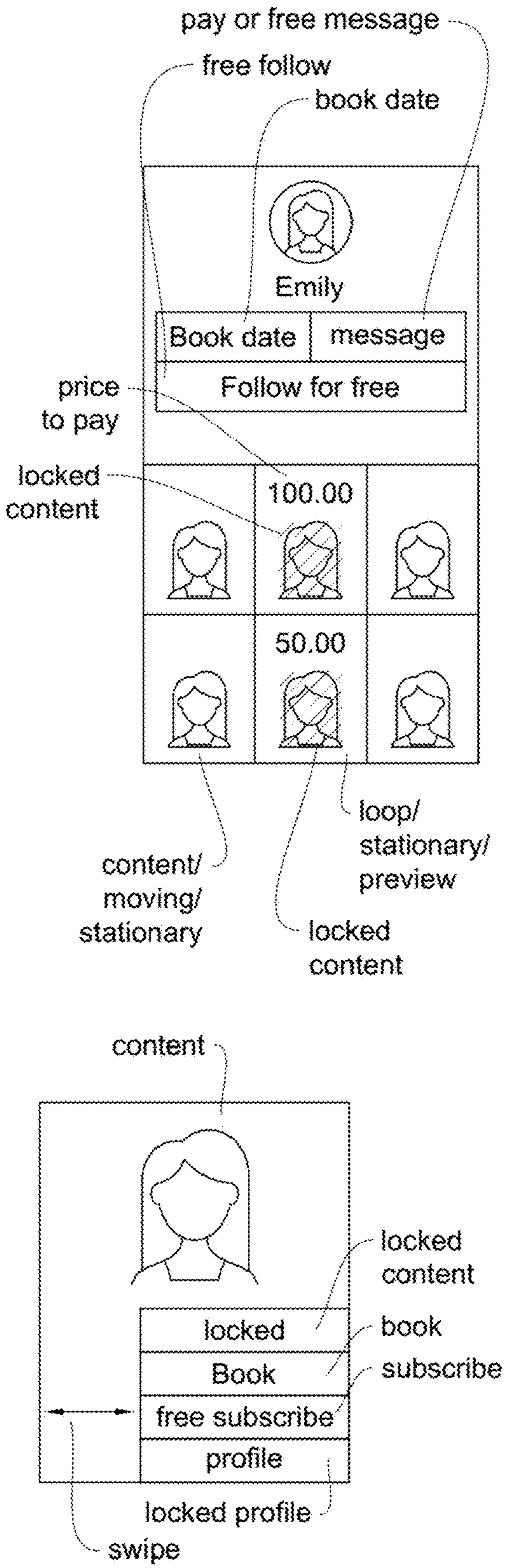

FIG. 132, FIG. 133: In some embodiments, there may be options, which may include but not be limited to (e.g., where all content is locked or closed, or not shown, etc.) until may have but not be limited to (e.g., follow is made, or a sign is made, or a booking is made, or a payment is made, membership is created, a fan account is established, an account is registered, a credit card on file, subscriber on file, subscribe to user, subscribe, pay to join, pay to view, pay to unlock content, etc.) In some embodiments, there may be options to, which may include but not be limited to (e.g., book, schedule, inquire about, inquire about, inquire regarding, secure, create a connection to, hold, pay for, create a business relationship with, use exchangeable to secure or book, schedule, inquire about, etc.) may include but not be limited to (e.g., in-person, immediately, in a smaller format that may be extended larger, anywhere on the user interface, or the user interface, etc.) In some embodiments, there may be combined locked and unlocked content, etc.) In some embodiments, there may be moving content may include but not be limited to (e.g., items or options moving around, moving content, replacing, disappearing, reappearing, appearing, moving, swaying), which may include but not be limited to (e.g., items such as videos, photos, content, promotional material, stacked photos, information, etc.)

In some embodiments, 'locked content' may refer to content, which may include but not be limited to (e.g., any type of content, which may include but not be limited to (e.g., videos, photos, moving content, holograms, live content, live show, live viewing, pre-recorded viewing etc.) that may need to be 'paid before may include but not be limited to (e.g., shown, or subscribed to, paid for, assets put up for, etc.) In some embodiments, there may an user interface or a screen or a visual of a profile or content, combined with options that may include but not limited to (e.g., book date, book meeting, follow for free, follow, message, price per message, price to send inquiry, send application, sign up for application, content, locked content, unlocked content, subscriber only content, follower-only content, etc.) In some embodiments, there may be an option to view content and/or have other options on the content to may include but not be limited to (e.g., view or interact with, or create, or edit, or move, etc.) whether (e.g., on top, on the side, on any part, or outside of the content etc.) which may include but not be limited to (e.g., locked content, book now, book for date, book for virtual date, entertainment options set by anyone or model or user, book for in person date, book video call, book phone call, view profile, etc.) In some embodiments, viewing profile may lead to a may include but not be limited to (e.g., 'locked profile' or a preview sort of profile, or a preview of content, or a lesser version of the full version, or a simpler version, or a version that is specifically shown, etc.) that a person may be required to 'follow,' which may include but not be limited to (meet requirements of user, platform, etc.) to: (e.g., see, view interact with, tap, message, do anything, screenshot, copy, etc.) In some embodiments, a person may be required to may include but not be limited to (e.g., meet requirements, or complete tasks, etc.) to see (e.g., profile, see information, access information, access content, view, preview, etc.) In some embodiments, categories or searches may be done by, which may include but not be limited to (e.g., book in person, booking in person, book virtual, book talk, book chat, book video chat, book video meeting, book voice conversation, see dating profiles, see profiles, see content, who has viewed your profile, winks, persons, exclusive content, our models, platform, matching AI-connecting, your calendar, match calendar, view calendar, find date, find date based on calendar, match anywhere, find wife, find girlfriend, find by distance, swipe through profiles, follow for free, free profiles, lives, live events, live users, current lives, computing operation by popularity, new users computing operation, swipe through models, swipe by distance, book in-person date, book in-person activity, see locals, see someone to date, date in another city, travel city dating, etc.) In some embodiments, there may be a way for users to adjust prices, price ranges, general pricing, general transmittables, based on may include but not limited to (e.g., categories or user frequencies, or user activities, or user spending, etc.) In some embodiments, users may be categorized by different categories or created categories based on, which may include but not be limited to (e.g., any reasons, user data, user spending, AI, etc.) In some embodiments, some categories that may be price adjusted may include but not be limited to (e.g., previous in-person dates, those with high-ratings, those that have been rated highly by user, locked content, follow for free, book in person, book virtual, book talk, book chat, book video chat, book video meeting, book voice conversation, date, book voice call date, book game, net worth, ratings by other users, self-ratings, etc.) In some embodiments, user may be able to give, which may include but not be limited to (e.g., any discount, any price, any group price, group discounts or group specials based on categories, or user history, or tags, etc.)

In some embodiments, there may be options that may have options to, which may include but not be limited to (e.g., lead to a list, organization, types, profiles, suggestions, etc.) based on preferences or categories, etc.) which may include but not limited to (e.g., book-in person date, book virtual, book talk, book chat, book video chat, book video meeting, book voice conversation, date, follow for free, discover for free, locked content, platform's exclusive content, special models, promotional persons, message, choose city, find your city, our models, locked content, unlocked content, match your calendar, match anywhere in the world, match another city, match yourself to anyone, match based on preferences, find date based on availability, find date based on distance, find date based on calendar, find date based on city, match date virtual match date in person, find girlfriend, find wife, find date, find friend, fan, fans only, for fans, for followers, see your favorite model, see your favorite celebrity, see new celebrities, see new models, see new sign ups, see new girls, users, see new creators, boyfriend applications, husband applications, date applications, book in person date now, book virtual, book talk, book chat, book video chat, book video meeting, book voice conversation, date, book call, see more information, see promotional material, see profile, get matched, swipe now, view exclusive content, go through stack now, view like dating apps style, choose your view for profile, see standard profiles, see regular way to view profiles, swipe by city, swipe by distance, view stacked style, view desktop style, view mobile style, get matched by human, robot, bot, 3rd party, entity, computer system, AI system, get matched by AI, get matched by robots, membership, membership fees, FAQS, learn more, unlock content, choose style to see content, swipe, view like, which may include but not be limited to (e.g., swipe up and down, side to side, stacked, list, create list, etc.)

In some embodiments, there may be ways to browse or view, which may include but not be limited to (e.g., scrolling, viewing, automatic scroll, automatic disappear, tapping, matching AI-connecting, switching, etc.) In some embodiments, there may be, which may include but not be limited to (e.g., live events, live streaming, live recordings, prerecordings, previous content, content, videos, pictures, etc.) that may be located on user interface whether, which may include but not be limited to (e.g., singular, with others, combined with others, or categorized with others, or a list or a created list etc.) In some embodiments, there may be options, which may include but not be limited to (e.g., free follow, follow, subscribe, send message, send tip, book in person, book virtual, book talk, book chat, book video chat, book video meeting, book voice conversation, messaging, send gift, chat etc.) In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, or areas, or profiles, or content, or hologram or display screens, etc.) to continue to look or get automated, which may include but not be limited to (e.g., looking, viewings of, movement, selection, scroll, etc.) which may include but not be limited to (e.g., content, creators, models, users, etc.)

Figure 134:
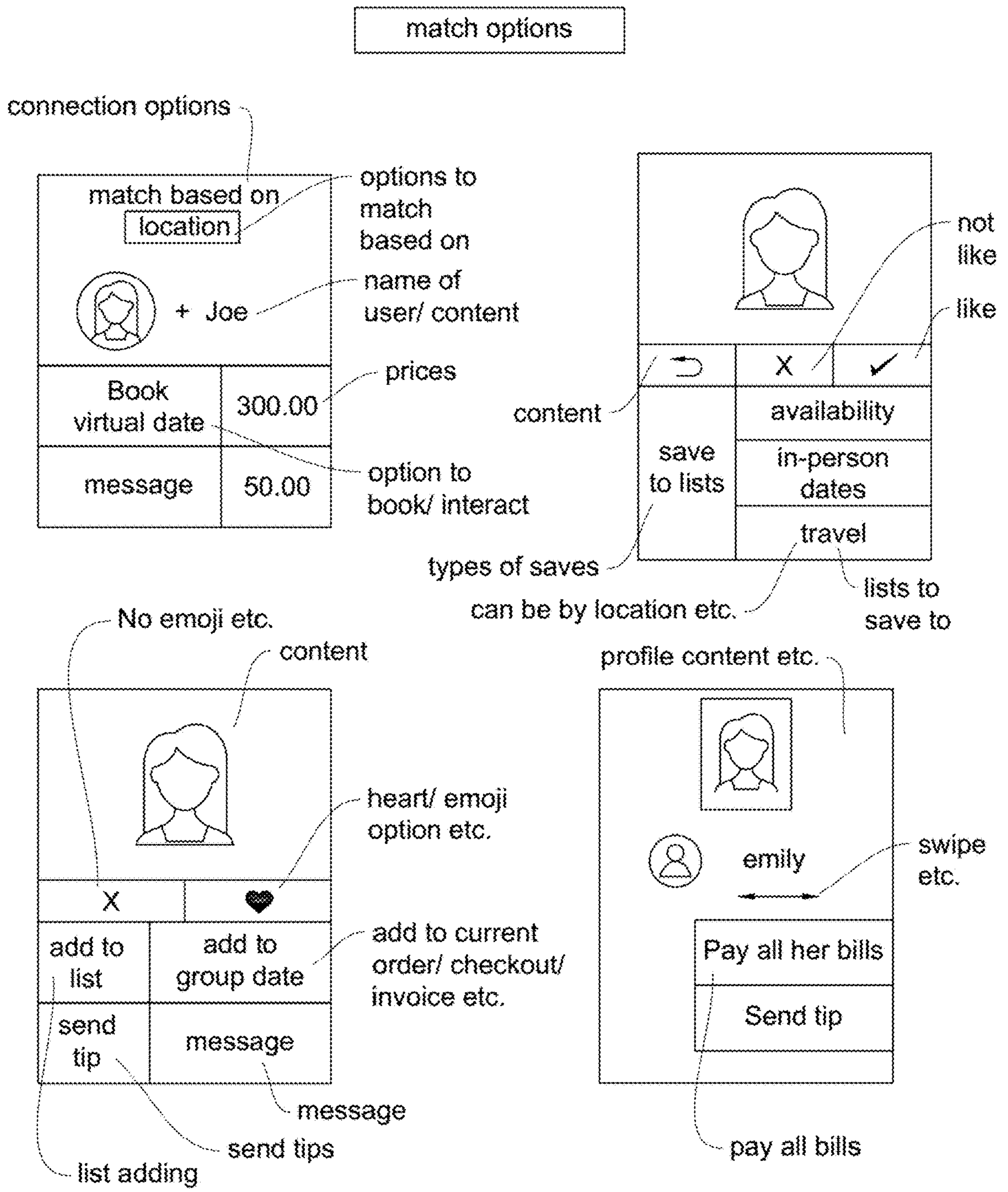

FIG. 134: In some embodiments, there may be options, which may include but not be limited to (e.g., 'connection or matching AI-connecting, connection to user for any reason, options, options to view, opportunities available, potential prospects, etc.) which may connect or create a connection between one or more persons which may allow user to may include but not limited to (e.g., add to a list, add to a group, add to a group date, see if she travels, she is she will travel, she what city she is located in, see where she is, ask out on date, ask her on a date, request a date, flirt with, send a gift, send flowers, send emojis for a fee, send emojis, inquire about, inquire regarding, contact, show interest in, send messages, add to date, add to group date, add to speed date, add to another date with other persons, send request to add to date or inquire regarding a date, send tip, buy something off list, add to list, add to party list, add to party date, add to activity, schedule, book, schedule, inquire about, pay for all expenses, etc.) In some embodiments, there may be options, which may include but not be limited to (e.g., to swipe, move, adjust, switch, choose, go through a stack, go through options, see options, view options, view availability of users or calendars or schedules, etc.) for, may have but not be limited to (e.g., a profile, or for content, or categories, etc.) In some embodiments, there may be options, including but not limited to (e.g., 'pay all of her bills, send a tip, show you like this person, inquire with, ask out on a date, ask on a date, send date request, send flirt request, send message, send message request, send payment, send emojis, send a flirty sign, etc.)

In some embodiments, there may be interface(s) with and/or content, which may include but not be limited to (e.g., user profile information, user information, options to 'send a tip, message, book date, book meeting, book-in person, follow for free, add to calendar, new cleaner, save, add to the list, view calendar, view profile, view exclusive content, view locked content, view unlocked content, view public profile, view private profile, etc.) In some embodiments, there may be options for the user to have an expanded view of 'options' or a non-expanded, which may include but not be limited to (e.g., expanded may mean view more or see more or scroll more, etc.) view of options. In some embodiments, there may be ways to expand or not expand options, including but not limited to (e.g. tapping, swiping, clicking, voice commands, etc.) In some embodiments, there may be options to swipe or switch between different users or explore users based on a movement, a tap, a swipe, etc.) In some embodiments, there may be options to may include but not be limited to (e.g., click, swipe tap, save, etc.) such as, which may include but not be limited to (e.g., 'this person does in-person dates, or this person does virtual dates, or (e.g., you may, user, person, entity, 3rd party, robot, artificial intelligence, etc.) may follow this person for free, etc.) In some embodiments, these options, which may just be, which may include but not be limited to (e.g., 'informative, viewing, interactional, can interact with, informational, etc.) and not have, which may include but not limited to (e.g., clicking, tapping, saving, etc.) methods, options, etc.) In some embodiments, the platform's (e.g., interface, homepage, screen, hologram, interface, viewing display, hologram, etc.) It may include but not be limited to (e.g., viewing, offering, viewpoint, preview point, preview, options to view, etc.), which may include but not be limited to (e.g., feed, list, categories, options, profiles, content, etc.) Of, which may include but not be limited to (e.g., free, unlocked, available, publicly allowing, etc.), which may include but not be limited to (e.g., content, photos, videos, etc.) Offered by the, which may include but not be limited to (e.g., platform, models, creators, users, approved parties, etc.) In some embodiments, the, which may include but not be limited to (e.g., bidder, patron, member, VIP member, person, user, entity, figure, etc.) may be able to, which may include but not be limited to (e.g., click on the model's page to unlock custom photos, subscribe to her profile for automatically unlocked photos, to see her date availability is, see availability, see calendars, obtain membership, pay to view more, pay to subscribe, pay to become VIP, send tips, send money, see lives, view lives, obtain previews, etc.) In some embodiments, the, which may include but not be limited to (e.g., platform, apps, hologram, screen, hologram, interface, viewing display, visuals, sites, etc.) which may include but not be limited to (e.g., screen, hologram, interface, viewing display, viewing, page, interface, homepage, etc.) May offer, including but not limited to (e.g., public, paying customers, paying persons, persons, users, (e.g., bidder, patron, member, VIP member, person, user, entity, figure, etc.) The option to search, which may include but not be limited to (e.g., a category of "blondes," "brunettes," "actresses," "internet models," "models," "international models," "local models," "cosplay" search by location, area, etc.) which may allow finding, which may include but not be limited to (e.g., a category, model, person, user, etc.) For, which may include but not be limited to (e.g., date, subscribing, unlocks, view content, view calendar, book, schedule, inquire about, etc.)

In some embodiments, users or persons may not know that they are in membership format or are appointed or seen as 'members.' In some embodiments, platform may make (e.g., paid for persons, not paid for persons, appointed persons, suggested persons, voted on persons, specific persons or any user or any person members, special members, special persons, etc.) In some embodiments, which may include but not be limited to (membership opt-in, options to get paid more by going out on more dates, options to opt-in to being added as an 'extra' or a 'last minute change' or a 'last minute date' or an 'extra dater' or a 'additional model' or an additional person for a date or event, membership options, options to get paid more, options to go out on extra dates, options to be an additional party to a date, group dates may occur or there may be an option for group dates or more than one user booked at the same time for the same entertainment option, or different options, etc.) In some embodiments, users may be able to, which may include but not be limited to (opt-in, join, participate, view, see, come to, be included, not included, pay for, not pay for, be paid for, etc.) to allowing dates that have more than one person, or not allow to be booked for a 'more than one person option' etc.) In some embodiments, users or persons that may, which may include but not be limited to (e.g., opt-in, join, agree to, add themselves to, etc.) may be, which may include but not be limited to (e.g., suggested more, have more suggested options, be suggested more on calendars, be added more to the computing operations, be added more to the users calendars, be added more to the feed, be shown more, be suggested more, have more dating options, have more dating opportunities, etc.) In some embodiments, 'group dates' may give a, which may include but not be limited to (e.g., paying user, or a user that is exchanging something of value or assets) in exchange for multiple users to: (e.g., make connection, book or date etc.) In some embodiments, which may include but not be limited to (e.g., 'party option' or an option such as 'book multiple users' etc.)

In some embodiments, multiple users may be defined but not limited to as (e.g., 'more than one user at a time, multiple users, two or more, one or more, groups, staggered groups, different activities, different days, different times, etc.) In some embodiments, 'group dates' or 'group users' may be booked through the platform and all paid, which may include but not be limited to (e.g., separately, together, staggered, spread out, installments, credit, funds, assets, etc.) may be depending on if they meet the contractual 'minimal agreements,' or agreements, which may include but not be limited to (e.g., 'showing up, staying for the duration, check-in, check-out, time stamp, time record, time and data record, location, time and data record, coordinate(s), etc.) In some embodiments, a group date may be booked altogether, and some users may not meet the entirely the 'agreement' but mostly, generally, or overall meet the agreement, such as, which may include but not be limited to ('one person left early, or one person got sick, etc.) Some embodiments may include but are not limited to ('double, triple, or group dates, staggered, same day, different day, different settings, different locations, traveling, etc.') which may be booked together or booked separately. In some embodiments, there may be discounts for booking groups; there may not be discounts.

In some embodiments, user may be able to choose to accept a, which may include but not be limited to (e.g., 'booked person, paid person,' etc.) to bring their friend, or bring a 'plus one' or 'bring a family member, or bring a roommate, or bring a friend, or bring another person' etc.) In some embodiments, users may not be able to deny a user to bring a safety person due to any circumstances such as, which may include but not be limited to (e.g., or may not know of a safety person, may not approve, may not want that person to have safety persons near, wanting to get a person alone, or may be able to deny the request a safety person, or may not be able to deny if someone else is there, etc.) In some embodiments, a 'bidder, which may include but not be limited to (e.g., a bidder may be defined as any person that is paying for a service or a connection or a date, or anything etc.) may be choose to pick a 'group date' which may include 'model,' which may include but not be limited to (e.g., plus one or more, or more 'creators' 'models' etc.) to accompany the, which may include but not be limited to (e.g., 'bidder 'fan' or 'date buyer' etc.) to the entertainment option which may include but not limited to (e.g., dinner, lunch, coffee, pre-approved date choice, virtual, game, show, live, event, meeting, etc.) In some embodiments, there may be some type of content viewing method that, which may include but not be limited to (e.g., may or may not have information, viewing, content, user interface, options, clicking options, etc.) which may include but not be limited to (e.g., at the bottom, top, side, 3rd party, screen, hologram, user interface, viewing display, etc.), which may include but not be limited to (e.g., funds available, credit line available, calendar, messaging options, send tip options, send 'like' options, which may be in return for payment, etc.) In some embodiments, the content or information that may make a person interested may then have some sort of a, which may include but not be limited to (e.g., 'matching AI-connecting,' or a 'availability matching AI-connecting,' or a 'both available etc.) on this, which may include but not be limited to (e.g., day, time, month, area, location, distance,' etc.) persons may be matched based on any type of criteria, which may be chosen, which may include but not be limited to (e.g., manually, automatically, through the AI, through computing operation, through 'based on who you might like etc.) In some embodiments, which may include but not be limited to (e.g., 'matching AI-connecting, method' or connection method, or connection suggestion, or computing operation similarity suggestion, etc.) that come from some type of content or some type of viewing that may show the user that this person may be a good match based on, which may include but not be limited to (e.g., any criteria or feature, or content, or information, etc.) that may or may not be exposed or shown to the user, which may include but not be limited to (e.g., (e.g., you may, user, person, entity, 3rd party, robot, artificial intelligence, etc.) may be a match based on distance, or location, (e.g., you may, user, person, entity, 3rd party, robot, artificial intelligence, etc.) may be a match based on similar availability, or you have liked or interacted with similar users, etc.) In some embodiments, the, which may include but not be limited to (e.g., 'matching AI-connecting, system' or the 'connection system, connection, or date, or communication, etc.) may have options such as, which may include but not be limited to (e.g., 'book date, book meeting, book virtual, book talk, book chat, book video chat, book video meeting, book voice conversation, date, send message, pay for messages, pay for seething, put up funds, check out, view options, view content, paying or not paying options, etc.)

In some embodiments, the interface may use AI for, including but not limited to (e.g., pricing/suggestions, auto-questions answered, etc.) In some embodiments, data may be collected, which may include but not be limited to (e.g., users preferences, users net worth, users funds, users photos, users content, users videos, users activity such as clicking history, users frequently visited profiles, users calendar, users status, etc.) and may be used by, which may include but not be limited to (e.g., artificial intelligence or machine learning, any other data described in this disclosure etc.) to create an output of, which may include but not be limited to (e.g., date match or date matches, or suggestions, or shown specific profiles, shown specific user interfaces, matching AI-connecting, suggestions for matching AI-connecting, suggestions for particular features, calendar matches, intelligent ads, ads, purchase prices, price ranges, general pricing, general transmittables, pricing on user interface, answering questions asked on outside data, answering questions user may have based on information gathered, answer questions based on user activity, or calendar analytics, shown specific pricing, any other data described in this disclosure etc.) In some embodiments, there may be, including but not limited to (e.g., connection options, viewing options, voice options, virtual or in-person options, etc.) In some embodiments, there may be, including but not limited to (e.g., different or pre-chosen or pre-determined times, lengths, etc.) In some embodiments, options or descriptions may include but are not limited to (e.g., date, activity, date service, shopping experience, shopping spree, etc.)

In some embodiments, the, which may include but not be limited to (e.g., users, persons, public persons, bidders, etc.) may be able to, which may include but not be limited to (e.g., click on the model's page to unlock custom photos, subscribe to her profile for automatically unlocked photos, to see her date availability is, see availability, see calendars, pay a monthly membership, pay weekly membership, get experts to pick dates, get other person or 3rd party to select dates, get an assistant to manage dates, allow the platform to book, schedule, inquire about, inquire about, inquire regarding, secure, create a connection to, hold, pay for, create a business relationship with, use transmittables to secure or book, schedule, inquire about, etc.) date or suggest dates based on membership option, obtain membership, pay to view more, pay to subscribe, pay to become VIP, send tips, send money, see lives, view lives, receive previews, etc.) In some embodiments, the, which may include but not be limited to (e.g., platform, apps, hologram, screen, hologram, user interface, viewing display, visuals, sites, etc.) which may include but not be limited to (e.g., screen, hologram, user interface, viewing display, viewing, page, user interface, homepage, etc.) may offer, which may include but not be limited to (e.g., public, paying customers, paying persons, persons, users, bidders, etc.) the option to search, which may include but not be limited to (e.g., a category of "blondes" "brunettes" "actresses" "internet models" "models" "international models" "local models" "cosplay" search by location, area, etc.) which may allow finding, which may include but not be limited to (e.g., a category, model, person, user, etc.) for, which may include but not be limited to (e.g., date, subscribing, unlocks, view content, view calendar, book, schedule, inquire about, etc.) In some embodiments, the user interface may be the, which may include but not be limited to (e.g., paying daters, the person paying, 3rd party paying, the entity paying, a business paying, any gifting, gifting, donations, donating, user paying, the person spending money, person subscribing, the person on membership, the person sending money, etc.) view. In some embodiments, the view that the, which may include but not be limited to (e.g., paying daters, persons paying, etc.) may be shown or defined as, which may have but not be limited to (e.g., those that are registered to obtain dates, those that pay or seek entertainment on platform, etc.) may be able to view. In some embodiments, the user interface may include or have options such as searching for things, which may include but not be limited to (e.g., distance, price, looks, weight, model, interests, types, categories, etc.) In some embodiments, which may include but not be limited to (e.g., paying person, user, the person sending money, person pressuring, etc.), may be able to be searched by 'matching AI-connecting qualities' such as, which may include but not be limited to (e.g., distance, city, location, type, category, availability, attractiveness, etc.)

In some embodiments, there may be a combination of may include but not limited to (e.g., a profile photo or profile information or users information, matching AI-connecting, buttons, see more options, unlocking content, matching, comparing, adding to the list, add to location list, add to calendar list, add to virtual date list, book for virtual date, entertainment options set by anyone or model or user, book for an in-person date, matching AI-connecting, users calendar to model's calendar with booking options, matching AI-connecting, users and model or creators calendar, showing match preferences, showing computing operation match made, an auto-match made, AI match made, message options to pay to message, free message options, messaging options, booking options, date options, virtual date options, information, informational options, profile options, profile preferences, etc.) In some embodiments, there may be an ongoing screen that may be show anything ranging from which may include but is not limited to (e.g., register, log-in-, sign-in, become a model, apply, book a date, bid on a date, book a virtual date, entertainment options set by anyone or model or user, see exclusive content, follow a creator, subscribe to a creator, discover creators or models, discover 18+ models, discover calendar options, discover available times, dates, locations, choose your location, select your time, craft your calendar, see our models, 18+ models, calendar times available, short version or long version of model's calendar's, users calendar, an option to craft a calendar or to input a calendar, options to creator a calendar, options to insert work schedule to get a calendar made for that person, profile options, featured options, new options, live bidding/auction, live bidding/auction rooms, live category rooms, live type of model rooms, live type of date rooms, live charity events, live events, etc.) In some embodiments, the user may be able to search may, include but not limited to (e.g., on the calendar, around the calendar, on the user interface, on each day, period searching, within a period, within the calendar, etc.) which may include but not limited to (e.g., on each day, such as search within a time frame, or period, or category) time frames may include but not be limited to (e.g., lunch, snack, dinner, coffee, shopping, virtual, in-person, restaurant, etc.) In some embodiments, the user may be able to search on the calendar, which may include but not be limited to (e.g., per day, per period, per week, per location, per distance, per popularity, per type of model, per type of creator, per user, per availability, per activity, etc.) In some embodiments, there may be an option to book, schedule, inquire about, inquire about, inquire regarding, secure, create a connection to, hold, pay for, create a business relationship with, use transmittables to secure or book, schedule, inquire about, etc.) an in-person date with, which may include but not be limited to (e.g., the model, creator, or person, etc.) In some embodiments, there may be a, which may include but not be limited to (e.g., trust fund option or required payment, etc.) to secure (e.g., payment/booking/time, etc.) for may include but not limited to (e.g., dinner, time, activity, etc.) In some embodiments, there may be an option or requirement to pay for the creator, model, or person's time that may or may not be non-refundable if the requirements or agreement for the date is fulfilled regardless, which may include but not be limited to if the other person that paid shows up or not. In some embodiments, the amount, partial, total of, which may include but is not limited to the: (e.g., deposit, trust funds, or total amounts put up to secure the 'date in person, etc.) may be shown in real-time or on a page.

Figure 135:
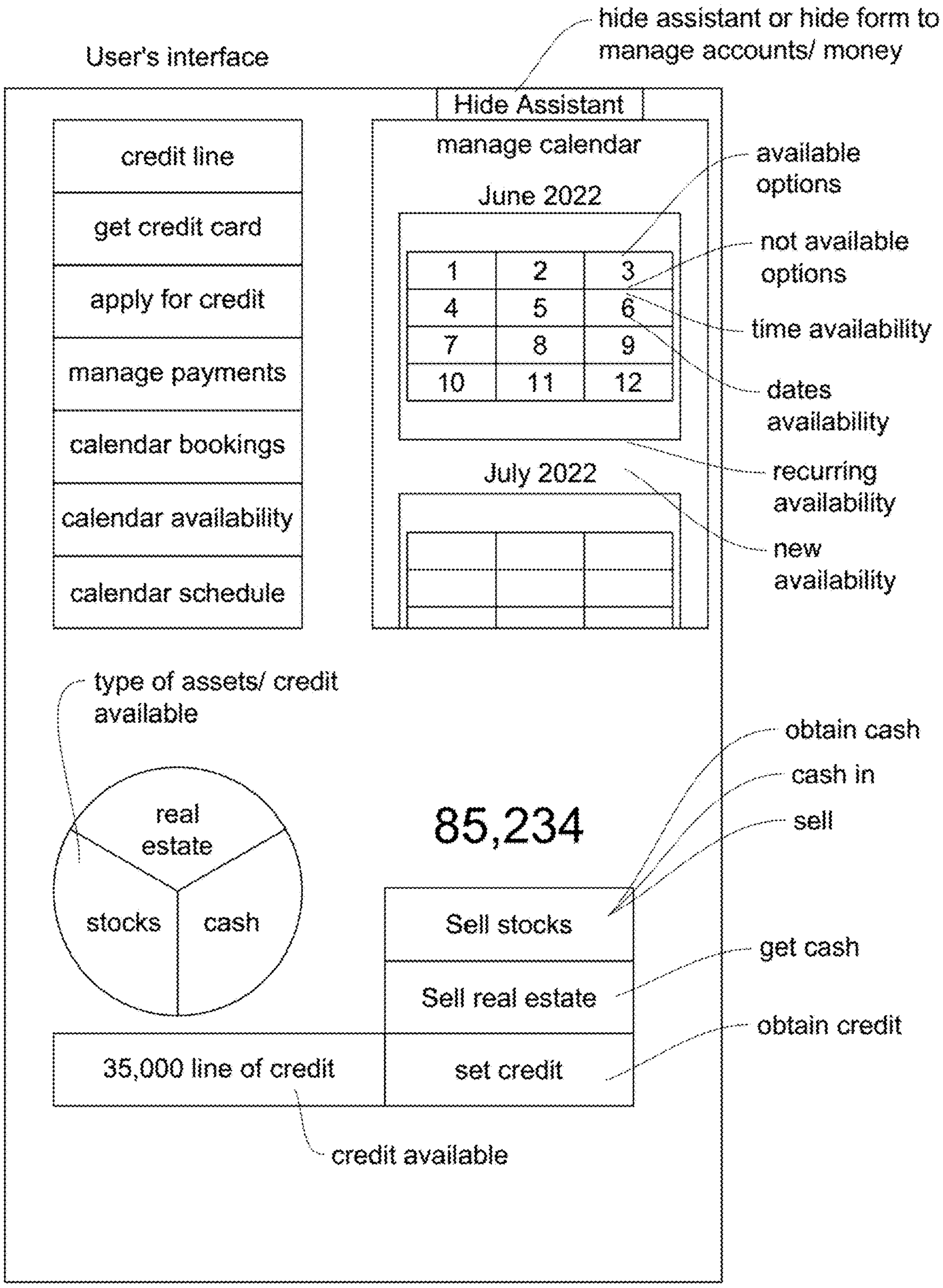

FIG. 135: In some embodiments, there may be user interface options where a user may be able to, which may include but not be limited to (e.g., 'get a loan, get a credit line, increase credit line, obtain credit line, sell their items, get cash for items, sell assets, sell stocks, obtain points or credits on platform, manage stocks, sell real state, sell stocks, stock options, change schedule, manage schedule, hire an assistance or hire a firm to manage money, obtain loans, obtain a credit line, sell your car, sell your assets, sell jewelry, sell items in your house, sell your junk items, sell sticks, upload money or funds to credit line, upload funds for platform, pre-pay for dates, obtain or give or send or pay for gifts in exchange for date, send gifts or buy something from 'wishlist' or 'list' or 'listed item' in exchange for date or time or virtual date or in person date or in exchange to view calendar or schedule or time or be able to message or book date or send like or interact with, pre-loan money for dates, pre-book dates that may be paid before or after date, manage calendar booking, manage lists, manage feed, manage people, apply for credit card, get credit line, calendar availability, scheduling option, funds available, loan funds, etc.) In some embodiments, there may be an user interface, which may include but not be limited to (e.g., all assets, any assets, payments, money, transmittables, points, credits, etc.) which may include but not be limited to (e.g., which may include but not be limited to (e.g., on hand, available, pending, current, etc.) which may include but not be limited to (e.g., which may include but not be limited to (e.g., 'stocks, investment portfolios, cash, real state, car assets, car title worth, car title assessments etc.) In some embodiments, there may be options or general, which may include but not be limited to (e.g., 'value for things such as selling their car, information regarding values of items or tings in their possession, or value of assets not currently sold, value of general assets such as their equity in their house, their car title for a loan, selling items in their home, value of the equity in their house, value of jewelry, etc.) In some embodiments, there may be options to sell their, which may include but not be limited to (e.g., jewelry, car, house, equity, stocks, assets, etc.) though platform or a 3rd party in exchange for credit on the platform, funds on the platform, pre-paid dates, for cash, for credit, for platform funding, for 3rd party funding, etc.) In some embodiments, which may include but not be limited to (e.g., timing method data, timing data, schedule data, scheduling data, timing methods, live calendar, timing method data, timing data method, timing process data, live calendar, timing method data, timing data method, timing process data, s of all lists of persons or users, there may be a live bidding/auction, live date options, live parties, etc.) In some embodiments, any payment or selling or asset exchange may be able to be credit or used as cash or credit towards a (e.g., date or any payment method on platform or to obtain gifts or secure date or secure time or secure food or secure location, gifts, credit card points, etc.)

In some embodiments, there may be, which may include but not limited to (e.g., user interface options, interface options, platform options, screen options, etc.) where a user may be able to, which may include but not be limited to (e.g., 'get a loan, get a credit line, increase credit line, obtain credit line, sell their items, get cash for items, sell assets, sell stocks, manage stocks, sell real state, sell stocks, stock options, change schedule, manage schedule, hire an assistance or hire a firm to manage money, obtain loans, obtain a credit line, upload money or funds to credit line, upload funds for platform, pre-pay for dates, pre-loan money for dates, pre-book dates that may be paid before or after date, manage calendar booking, manage lists, manage feed, manage people, apply for credit card, get credit line, calendar availability, scheduling option, funds available, loan funds, etc.) In some embodiments, there may be an user interface that may show, which may include but not be limited to (e.g., all assets, any assets, payments, money, transmittables, etc.) which may include but not limited to (e.g., on hand, available, pending, current, etc.) which may include but not be limited to (e.g., 'stocks, investment portfolios, cash, real state, car assets, car title worth, car title assessments etc.) In some embodiments, there may be options or general, which may include but not be limited to (e.g., 'value for things such as selling their car, information regarding values of items or tings in their possession, or value of assets not currently sold, value of general assets such as their equity in their house, their car title for a loan, selling items in their home, value of the equity in their house, value of jewelry, etc.) In some embodiments, there may be options to sell their, which may include but not be limited to (e.g., jewelry, car, house, equity, stocks, assets, etc.) though platform or a 3rd party in exchange for credit on the platform, funds on the platform, pre-paid dates, for cash, for credit, for platform funding, for 3rd party funding, etc.) In some embodiments, there may be a, which may include but not be limited to (e.g., timing method data, timing data, schedule data, scheduling data, timing methods, live calendar, timing method data, timing data method, timing process data, live calendar, timing method data, timing data method, timing process data of all lists of persons or users, there may be a live bidding/auction, live date options, live parties, etc.)

In some embodiments, there may be user interface options where a user may be able to, which may include but not be limited to (e.g., 'get a loan, get a credit line, increase credit line, obtain a credit line, sell their items, get cash for things, sell assets, sell stocks, manage stocks, sell real state, sell stocks, stock options, change schedule, manage schedule, hire assistance or hire a firm to manage money, obtain loans, obtain a credit line, upload money or funds to the credit line, upload funds for the platform, pre-pay for dates, obtain or pay for gifts in exchange for date, send gifts or buy something from 'wishlist' or 'list' or 'listed item' in exchange for date or time or virtual date or in person date or in exchange to view calendar or schedule or time or be able to message or book date or send like or interact with, pre-loan money for dates, pre-book dates that may be paid before or after date, manage calendar booking, manage lists, manage feed, manage people, apply for a credit card, get a credit line, calendar availability, scheduling option, funds available, loan funds, etc.)

In some embodiments, which may include but not be limited to (e.g., lists or chosen persons or saved persons or organized methods of seeing persons, etc.), whether through, which may include but not be limited to (e.g., lists, feed, clicking profiles, etc.)) In some embodiments, there may be an option to, which may include but not be limited to (e.g., filter out what they are seeing, show categories, show different possibilities, different user interfaces, etc.) which may include but not be limited to (e.g., shows, feed, information, booking information, payment information, etc.) In some embodiments, which may include but not be limited to (e.g., messages, communication, connection, etc.) which may have but not be limited to (e.g., voice messages, memes, content, voice chat, video chat, etc.), payment sending such as which may include but not be limited to (e.g., 3rd party options to transfer to platform, options to send tips, emojis, pictures, pre-made pictures, opportunities to paint, options to create own picture on platform, options to edit or create content through messaging system or platform, etc.)

Figure 136:
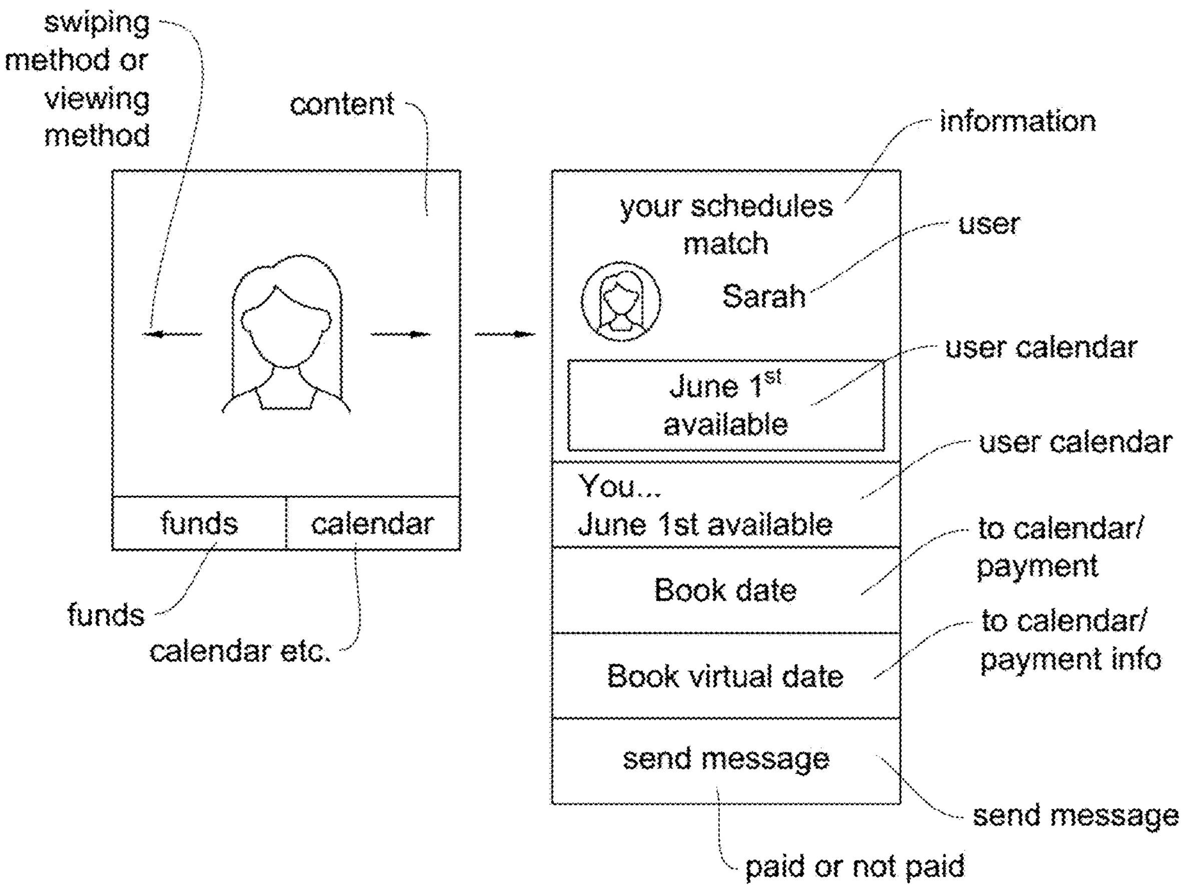

FIG. 136: In some embodiments, there may be some content viewing method that, may include but not be limited to (e.g., may or may not have information, viewing, content, user interface, options, clicking options, etc.), which may include but not be limited to (e.g., at the bottom, top, side, 3rd party, screen, hologram, user interface, viewing display, etc.), which may include but not be limited to (e.g., funds available, credit line available, calendar, messaging options, send tip options, send 'like' options, which may be in return for payment, view funds, view available times, view calendar, view content, view profile, book date, send a message, send virtual payment, send virtual or real gift, filter by calendar times or periods or dates, or calendar or schedule availability, etc.) In some embodiments, the content or information that may make a person interested may then have some sort of a, which may include but not be limited to (e.g., 'matching AI-connecting,' or an 'availability matching AI-connecting,' or a 'both available, etc.) on this, which may include but not be limited to (e.g., day, time, month, area, location, distance,' etc.) persons may be matched based on any criteria, which may be chosen, which may include but not be limited to (e.g., manually, automatically, through the AI, through computing operation, through 'based on whom you might like, etc.)

Some embodiments may include but not be limited to (e.g., 'matching AI-connecting method' or connection method, connection suggestion, or computing operation similarity suggestion, etc.) that come from some content or some viewing. In some embodiments, this or that may show the user that this person may be a good match based on, which may include but not be limited to (e.g., any criteria or feature, content, or information, etc.) that may or may not be exposed or shown to the user, which may include but not be limited to (e.g., (e.g., you may, user, person, entity, 3rd party, robot, artificial intelligence, etc.) may be a match based on distance, or location, (e.g., you may, user, person, entity, 3rd party, robot, artificial intelligence, etc.) may be a match based on similar availability, or you have liked or interacted with similar users, etc.) In some embodiments, the, which may include but not be limited to (e.g., 'matching AI-connecting, system' or the 'connection system, connection, or date, or communication, etc.) may have options such as, which may include but not be limited to (e.g., 'book date, book meeting, book virtual, book talk, book chat, book video chat, book video meeting, book voice conversation, date, send message, pay for messages, pay for seething, put up funds, check out, view options, view content, paying or not paying opportunities, etc.)

In some embodiments, there may be, which may include but not be limited to (e.g., screen, hologram, user interface, viewing display, hologram, item, user interface, user interfaces that are one, two combined, two separate but combined, any combination of user interfaces, etc.) that may have, which may include but not be limited to (e.g., multiple calendars, multiple creators, creators, models, open calendars, open lists, open items for models, open ways to book, schedule, inquire about, inquire about, inquire regarding, secure, create connection to, hold, pay for, create business relationship with, use transmittables to secure or book, schedule, inquire about, etc.) available booking times, available messaging options, follow options, free options, paid options, month, day, time, current available funds, send inquiry, select date, select payment method, open availability, year availability, advertisements, marketing items, promotional content, promotional items, streaming content, streaming lives, streaming persons, users, models, feed, category rooms, category items, month, time, multiple lists of calendars, a calendar that is open, calendar that is available, a blurred calendar, a greyed calendar, a half-calendar, an obstructed calendar, an option to insert request into calendar, an option to inquire about, an option to send messages, etc.) which may include but not be limited to (e.g., message, like, comment, send tip, send payment, book for in-person date, book for virtual date, entertainment options set by anyone or model or user, book for recurring dates, book for virtual recurring dates, purchase subscription, purchase locked photos or locked content, or search for items, or search for more content, or search for other persons, or send payment, or submit assets for payment, or submit method of payment, or pay, or send money, or send assets, or secure booking through assets, see calendar, use calendar, book calendar, connect calendar with date, connect with booking connect with payment of booking, connect two calendars, automatically update someone's calendar through booking, see live calendar, timing method data, timing data method, timing process data, see live show, see live person, see live date, see live event, etc.)

In some embodiments, content may be, which may include but not be limited to (e.g., blurred, half-shown, partial-shown, silent, content may be fuzzy, not shown, greyed, appear fuzzy, not appear total, viewing may be obstructed, watermark over, sound watermark on sound, watermark appearing, only a few seconds shown, only some shown then stopped, stopped content, etc.) until, which may include but not be limited to (e.g., payment is made, requirements are met, follow has been made, subscriber has been created, a profile has been created, payment to the platform has come, payment has been made to the user, exchangeable between user has been established, assets have been sent, etc.) Some embodiments (e.g., calendar, timing method, schedule method, scheduling method, timing data center, etc.) may also show dates, connections, times, and timing data that are auto-booked through the platform. In some embodiments, the option to book, schedule, inquire about, inquire about, inquire regarding, secure, create a connection to, hold, pay for, create a business relationship with, use transmittables to secure or book, schedule, inquire about, etc.) may be removed. In contrast, these are showing booked, taken, etc.) In some embodiments, the, which may include but not be limited to (e.g., calendar, timing method, schedule method, scheduling method, timing data center, etc.) may show open dates, times, etc.) as described in this document that may be made from pre-made selections may include but not limited to (e.g., times, dates, restaurants, locations, places, public places, events, places such as a bowling alley, places such as an expensive restaurant, places such as go-karting, times that may or may not be manually or automatically changed on the calendar for availability, or times for booking, etc.) In some embodiments (e.g., calendar, timing method, schedule method, scheduling method, timing data center, etc.), it may show dates, connections, times, and timing data not available for reasons such as, which may include but not be limited to (e.g., 'self-care' or 'personal time to recharge' etc.) In some embodiments, In some embodiments, which may include but not be limited to (e.g., set, changed, create, auto, AI created, machine learning, automatic auto-recurring dates, connections, etc.) may be included on, which may include but not be limited to (e.g., timing method, timer, time stamp, location stamp, business location stamp, confirmation of time, location, data, etc.) schedule, calendar, etc.) or, which may include but not be limited to (e.g., greyed, unavailable, booked off, or available, not available, etc.)

In some embodiments, the user interface may show, which may include but not be limited to (e.g., earnings, payouts, referrals, pending payments, pending requests, amounts earned, the amount earned, amount, fees, net payment, gross payment, statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

Figure 137:
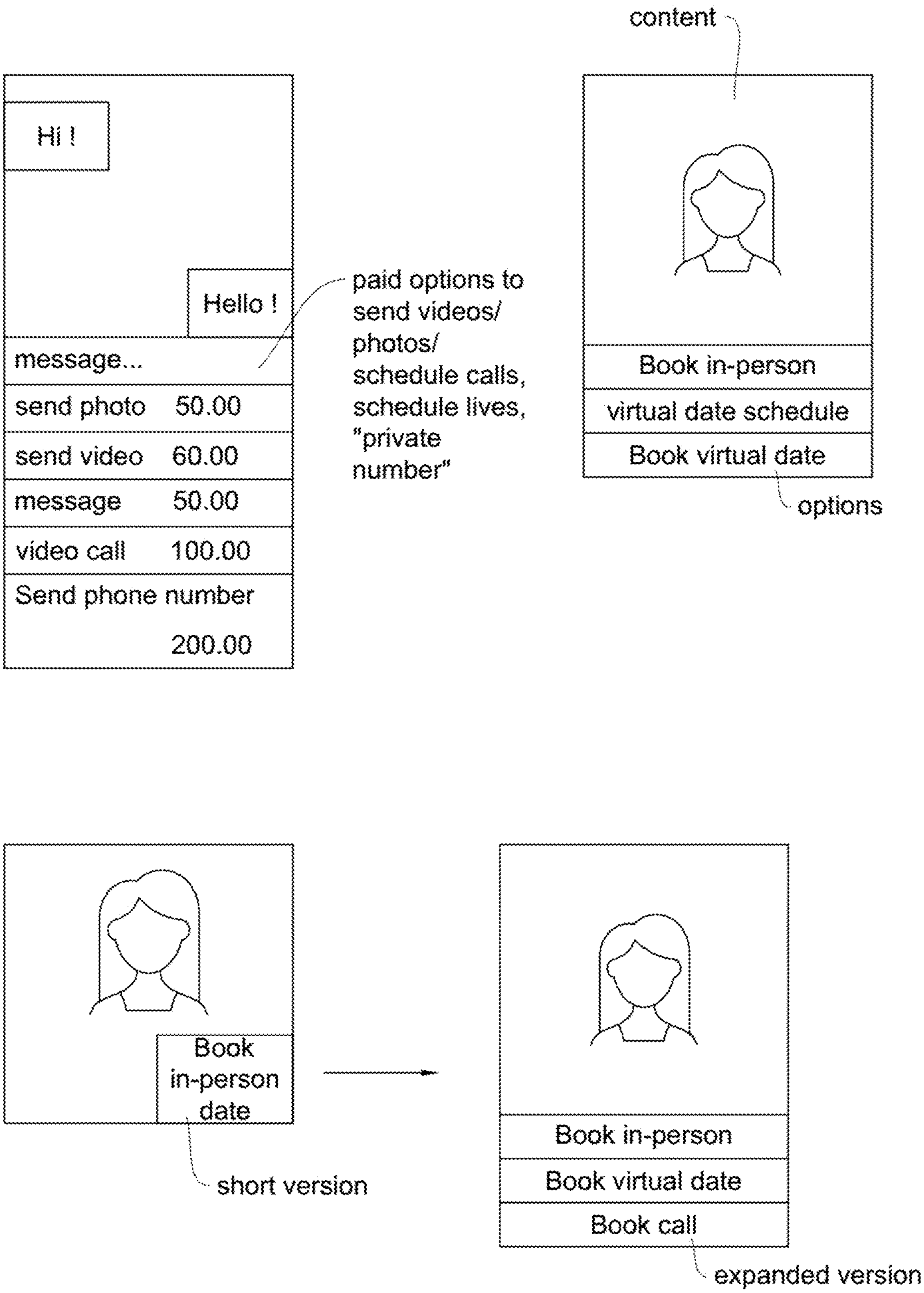

FIG. 137: In some embodiments, there may be, which may include but not be limited to (e.g., content, communication, messaging options, communication options, call options, meet options, virtual meet options, pricing for any of these options or any other options available by model or platform or any user or entity, etc.) that may show options to (e.g., notify, send or be displayed or shown to the other person or their team or management or agency or a designated 3rd party or integrated options, etc.) which may include but not be limited to (e.g., 'videos, photos, a photo, a video, their phone number, their location, their information, private information, private sharing of photos, private sharing of content, send tips, send tip, their schedule, scheduling, availability, virtual date options, entertainment options, send message, schedule virtual call, schedule virtual meeting, schedule in-person meeting etc.) In some embodiments, there may be options to, which may include but not be limited to (e.g., content, view content, videos, photos, a photo, a video, their phone number, their location, their information, private information, private sharing of photos, private sharing of content, send tips, send tip, send message, schedule virtual call, schedule virtual meeting, schedule in-person meeting etc.) directly from their content, form their pictures, form their videos, from their profile, from a 3rd party entity, from the platform, from the messaging system, etc.) In some embodiments, there may be a, which may include but not be limited to (e.g., short or expanded version, or any version etc.) of, which may include but not be limited to (e.g., in-person dates, virtual dates, booking calls, booking schedules, showing schedules, showing, matching AI-connecting, liking, adding to list, etc.) In some embodiments, the short version may link to another page to show full version, or user interface may expand there, the content may stop, expand, show more, pause, replay, keep going, go blurry, etc.) while its expanded, or while person is seeing options, or user interface may keep going as usual, or user interface may start over again, or play in a loop etc.) In some embodiments, there may be a, which may include but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.)

In some embodiments, which may include but not be limited to (e.g., Safety chaperones, security, support, or security/Security, etc.) In some embodiments, users may be able to, which may include but not be limited to (e.g., book, schedule, inquire about, inquire about, inquire regarding, secure, create connection to, hold, pay for, create business relationship with, use transmittables to secure or book, schedule, inquire about, etc.) a/multiple, which may include but not be limited to (e.g., security, user, person, outside, security, safety chaperone etc.) for, which may include but not be limited to (e.g., date friend on app or platform, gifting, giving, paying for, security for, for self, etc.) In some embodiments, users may have to: (e.g., pay from their own funds or their own bank or their own money or request payment for, or have invoice for, or request money for, etc.) to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., security or safety options, or safety persons, or security, or safety chaperone, security, supporter, safety person, model, or creator, etc.) such as a, which may include but not be limited to (e.g., chaperone, security guard, etc.) In some embodiments, each/every/girl, which may include but not be limited to (e.g., girl etc.) may be defined as person being paid or a user on the platform) may be able to choose whether or not user wants to be available, which may include but not limited to (e.g., opt-in, select, appointed, suggested, want to, etc.) to be booked as a 'safety chaperone.' In some embodiments, there may be options to book, schedule, inquire about, inquire about, inquire regarding, secure, create connection to, hold, pay for, create business relationship with, use transmittables to secure or book, schedule, inquire about, etc.) a, which may include but not be limited to (e.g., 3rd party such as security guard from a 3rd party platform or a 3rd party integration, or from platform, or users on platform, or integrated users, etc.) In some embodiments, there may be options to book, schedule, inquire about, inquire about, inquire regarding, secure, create connection to, hold, pay for, create business relationship with, use transmittables to secure or book, schedule, inquire about, etc.) which may include but not limited to (e.g., outside friends, family, persons, etc.) In some embodiments, which may include but not limited to, the: (e.g., outside persons, outside users, non-registered users, 3rd parties, advertisers, advertisements, businesses, etc.) booking may be, which may include but not be limited to (e.g., automatically integrated, manually integrated, in collaboration with, connected to etc.) into, which may include but not be limited to (e.g., calendar or all calendars, or auto updating, or manually updating, or updated or booked through machine learning or AI, etc.)

In some embodiments, there may be a, which may include but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.) In some embodiments, which may include but not be limited to (e.g., content playing, content, how content moves, how content interacts, etc.) In some embodiments, content may play in a, which may include but not be limited to (e.g., loop, user interface, screen, hologram, on user interface may play once, or user interface may show once and disappear, or user interface may show multiple times and disappear, the content may move, the content may be manually or automatically replace with other content, the content may be replaced, the content may be chosen by computing operation, the content may be chosen or vetted, manually or automatically, or replaced, or removed at any time, etc.) In some embodiments, there may be, which may include but not be limited to (e.g., an AI, human, robot, bot, 3rd party, entity, computer system, AI system, or machine learning, or robotic version for a user of any type to type in a 'match suggestion' or a 'discover suggestion' or a help suggestion etc.) In some embodiments, there may be a way to 'type in' or manual input of information, which may include but not be limited to (e.g., it's a description, a look, a type of photo, anything, to find, discover, view, see users or suggestions, etc.) In some embodiments, there may be different ways to: (e.g., sort through content or see content, or view content etc.) which may include but not be limited to (e.g., swiping, tapping, viewing shapes, viewing profiles, viewing content, viewing promo photos, viewing videos, messages, add to list, messaging, organization, organizing, booking virtual, booking in person, viewing calendar, etc.)

Figure 138:
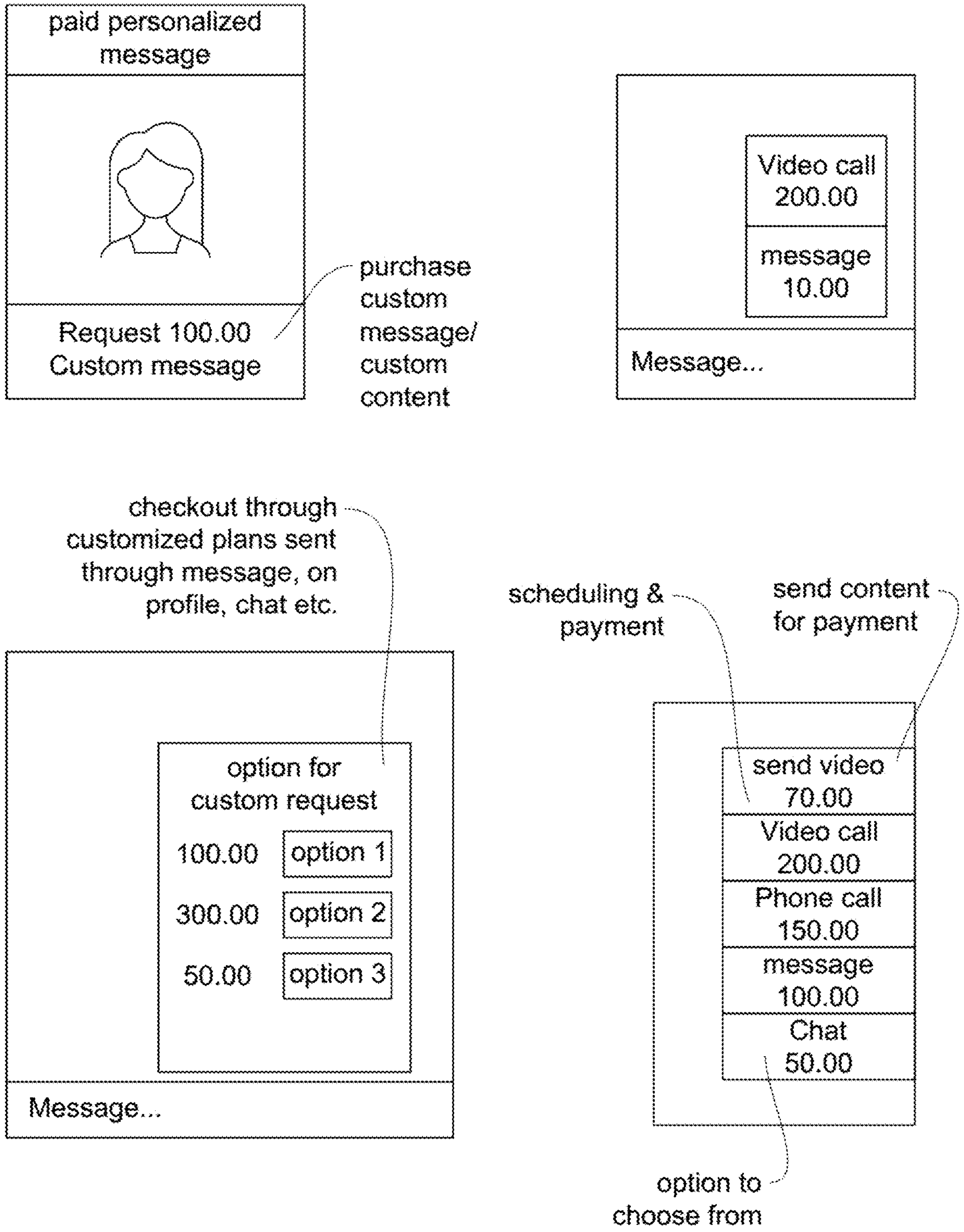

FIG. 138: In some embodiments, there may be, which may include but not limited to (e.g., pre-made or pre-created or created or entered options or custom options etc.) that may be e.g., sent, shown, displayed, editable, changeable, deleted, summoned, requested, etc.) as a, which may include but not be limited to (e.g., chart, letter, options, clickable options, clickable, calendar, timing method, content, display, optional selectable thing for acceptable requests or things that may be requested, etc.) In some embodiments, there may be, which may include but not limited to (e.g., limited items or options for requests or for options such as 'book a video call, book a phone call, send message, request anything, request something here, limited options for request listed here, show calendar, display calendar, give calendar options, chat now, send picture, send content, request content, request media, request video, message payment options, questions, request types of content, request types of videos, request types of photos, request features, request information, any of these options or other options may include payment or gifts or any other exchange of value such as a shout out or a recommendation or a job or an asset, etc.) In some embodiments, there may be a, which may include but not be limited to (e.g., screen or a user interface or a public profile or public information etc.) and/or a, which may include but not be limited to (e.g., anyway, public way, user, way, user interface, etc.) to, which may include but not be limited to (e.g., 'book video call, book phone call, book in-person date, follow for free, follow, message, send message, send personalized message, send photo, send video, etc.) In some embodiments, there may be options to, which may include but not be limited to (e.g., schedule things in advance, add to calendar, book and add to calendar, book, schedule, inquire about, things that are immediate such as be able to send a video message, be able to send a private photo, be able to send a question, be able to see private photos, etc.) In some embodiments, there may be a, which may include but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.)

In some embodiments, there may be, which may include but not be limited to (e.g., content, communication, messaging options, etc.) that may show options to send the other person, which may include but not be limited to (e.g., 'videos, photos, a photo, a video, their phone number, their location, their information, private information, private sharing of photos, private or personalized or personal sharing of content, send tips, send a tip, send a message, schedule a virtual call, schedule virtual meeting, schedule in-person meeting or appointment, etc.) In some embodiments, there may be options to, which may include but not be limited to (e.g., view content, videos, photos, a photo, a video, their phone number, their location, their information, private information, private sharing of photos, private sharing of content, send tips, send a tip, send a message, schedule a virtual call, schedule a virtual meeting, schedule an in-person meeting, etc.) directly from for example, (e.g., their content, from their pictures, from their videos, from their profile, from a 3rd party entity, from the platform, from the messaging system, etc.) In some embodiments, there may be a, which may include but not be limited to (e.g., short or expanded version, or any version, etc.) of, which may include but not be limited to (e.g., in-person dates, virtual dates, booking calls, booking schedules, showing schedules, showing, matching AI-connecting, liking, adding to list, etc.) In some embodiments, the short version may link to another page to show the full version, or the user interface may expand there; the content may stop, expand, show more, pause, replay, keep going, go blurry, etc.) while it's expanded, or while the person is seeing options, or user interface may keep going as usual, or user interface may start over again, or play in a loop, etc.)

In some embodiments, there may be a, including but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.) In some embodiments, which may include but not be limited to (e.g., Safety chaperones, security, support, or security/Security, etc.) In some embodiments, users may be able to, which may include but not be limited to (e.g., book, schedule, inquire about, inquire about, inquire regarding, secure, create connection to, hold, pay for, create business relationship with, use transmittables to secure or book, schedule, inquire about, etc.) a/multiple, which may include but not be limited to (e.g., security, user, person, outside, security, safety chaperone etc.) for, which may include but not be limited to (e.g., date friend on app or platform, gifting, giving, paying for, security for, for self, etc.) In some embodiments, users may have to: (e.g., pay from their own funds or their own bank or their own money or request payment for, or have invoice for, or request money for, etc.) to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., security or safety options, or safety persons, or security, or safety chaperone, security, supporter, safety person, model, or creator, etc.) such as a, which may include but not be limited to (e.g., chaperone, security guard, etc.) In some embodiments, each/every/girl, which may include but not be limited to (e.g., girl etc.) may be defined as person being paid or a user on the platform) may be able to choose whether or not user wants to be available, which may include but not limited to (e.g., opt-in, select, appointed, suggested, want to, etc.) to be booked as a 'safety chaperone.' In some embodiments, there may be options to book, schedule, inquire about, inquire about, inquire regarding, secure, create connection to, hold, pay for, create business relationship with, use transmittables to secure or book, schedule, inquire about, etc.) a, which may include but not be limited to (e.g., 3rd party such as security guard from a 3rd party platform or a 3rd party integration, or from platform, or users on platform, or integrated users, etc.) In some embodiments, there may be options to book, schedule, inquire about, inquire about, inquire regarding, secure, create connection to, hold, pay for, create business relationship with, use transmittables to secure or book, schedule, inquire about, etc.) which may include but not limited to (e.g., outside friends, family, persons, etc.) In some embodiments, which may include but not limited to, the: (e.g., outside persons, outside users, non-registered users, 3rd parties, advertisers, advertisements, businesses, etc.) booking may be, which may include but not be limited to (e.g., automatically integrated, manually integrated, in collaboration with, connected to etc.) into, which may include but not be limited to (e.g., calendar or all calendars, or auto updating, or manually updating, or updated or booked through machine learning or AI, etc.)

In some embodiments, there may be a, which may include but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.) In some embodiments, which may include but not be limited to (e.g., content playing, content, how content moves, how content interacts, etc.) In some embodiments, content may play in a, which may include but not be limited to (e.g., loop, user interface, screen, hologram, on user interface may play once, or user interface may show once and disappear, or user interface may show multiple times and disappear, the content may move, the content may be manually or automatically replace with other content, the content may be replaced, the content may be chosen by computing operation, the content may be chosen or vetted, manually or automatically, or replaced, or removed at any time, etc.) In some embodiments, there may be, which may include but not be limited to (e.g., an AI, human, robot, bot, 3rd party, entity, computer system, AI system, or machine learning, or robotic version for a user of any type to type in a 'match suggestion' or a 'discover suggestion' or a help suggestion etc.) In some embodiments, there may be a way to 'type in' or manual input of information, which may include but not be limited to (e.g., it's a description, a look, a type of photo, anything, to find, discover, view, see users or suggestions, etc.) In some embodiments, there may be different ways to: (e.g., sort through content or see content, or view content etc.) which may include but not be limited to (e.g., swiping, tapping, viewing shapes, viewing profiles, viewing content, viewing promo photos, viewing videos, messages, add to list, messaging, organization, organizing, booking virtual, booking in person, viewing calendar, etc.)

Figure 139:
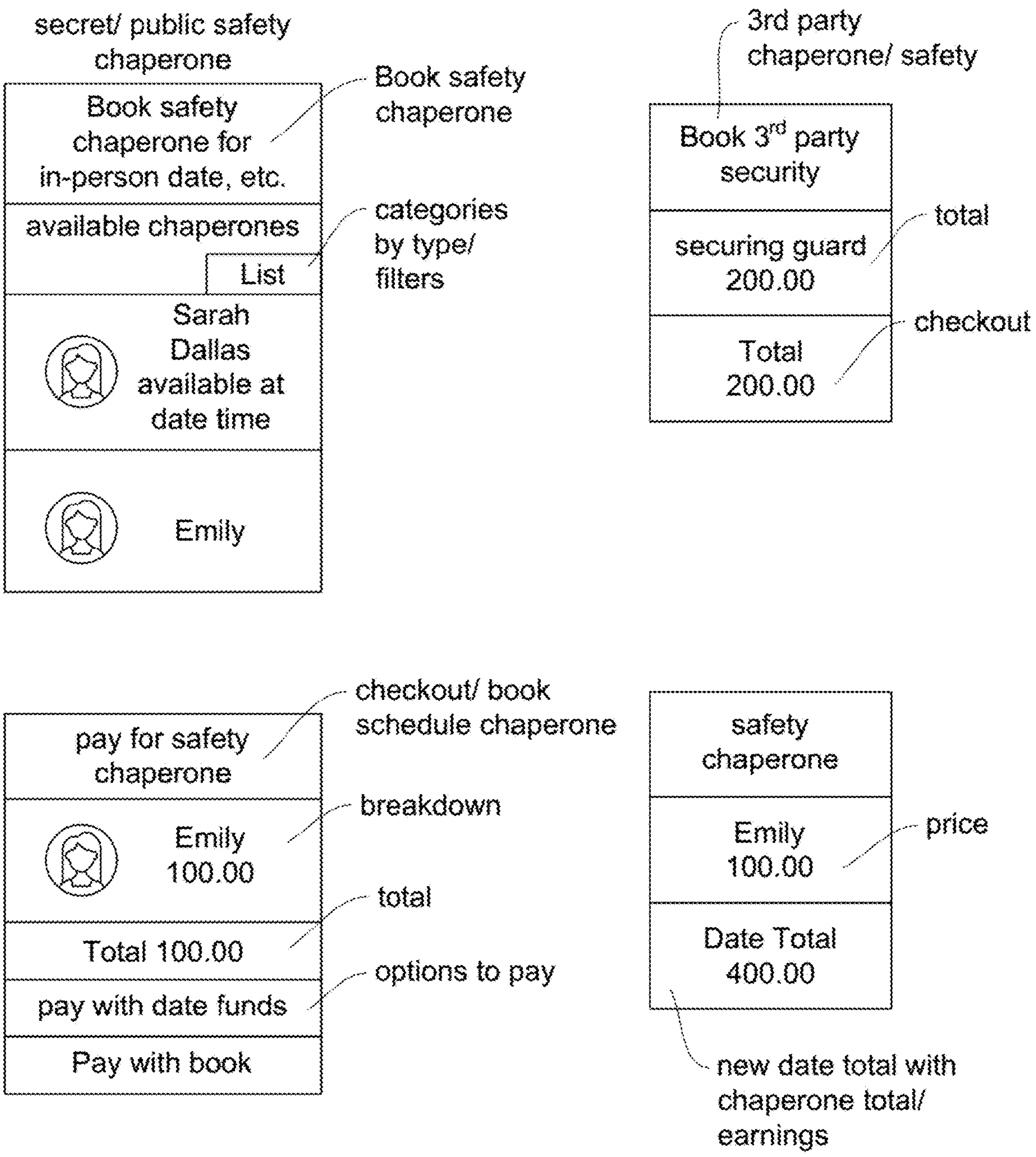

FIG. 139: In some embodiments, there may be options for users to (e.g., book, schedule, inquire about, inquire about, inquire regarding, secure, create a connection to, hold, pay for, create a business relationship with, use transmittables to secure or book, schedule, inquire about, etc.) which may include but not be limited to (e.g., 'safety chaperones, security, support, or security, 3rd party security, models, creators, etc.) In some embodiments, (e.g., 'safety chaperones, security, support, or security, etc.) may be described as (e.g., someone or something or a group or an entity, etc.) which may include but not be limited to (e.g., from the platform, another user, another person, a 3rd party entity, a 3rd party service, a 3rd party person, a family member, a former platform person, a friend, another model, a model, a human, a robot, a member, etc.) In some embodiments, (e.g., 'safety chaperones, security, support, or security' may be used as 'security' etc.) whether, which may include but not be limited to (e.g., emotional or physical or both, or physical or safety, etc.) In some embodiments, outside security may be booked through a, which may include but not be limited to (e.g., 'bodyguard or security service' or any outside service that is either approved, not approved, or is a partner platform, is not a partner, or is a family member, or a friend, etc.) In some embodiments, which may include but not limited to, the: (e.g., outside booking or safety booking, or another entity booking, or other person booking by the user, etc.) may be, which may include but not be limited to (e.g., deducted from earning that day or anytime earnings are made, whether at the time of the booking, after funds have been paid, or up front, whether from their pre-loaded funds, their funds available, or a transfer from a bank, whether that transfer is immediate or after some type, or from a credit service, or a credit booking, etc.) In some embodiments, for the chaperone or any security or any guest or any party joining whether public or private whether other party knows or doesn't know, (e.g., funds gifts or credits or any transmittables, etc.) may be (e.g., paid directly to the chaperone or paid to the model and transferred to the chaperone or directly paid to the person or entity or group or part of the total and automatically transferred to the specific party, etc.)

In some embodiments, which may include but not be limited to (e.g., Safety chaperones, security, support, or security/Security, etc.) In some embodiments, users may be able to, which may include but not be limited to (e.g., book, schedule, inquire about, inquire about, inquire regarding, secure, create connection to, hold, pay for, create business relationship with, use transmittables to secure or book, schedule, inquire about, etc.) a/multiple, which may include but not be limited to (e.g., security, user, person, outside, security, safety chaperone etc.) for, which may include but not be limited to (e.g., date friend on app or platform, gifting, giving, paying for, security for, for self, etc.) In some embodiments, users may have to: (e.g., pay from their own funds or their own bank or their own money or request payment for, or have invoice for, or request money for, etc.) to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., security or safety options, or safety persons, or security, or safety chaperone, security, supporter, safety person, model, or creator, etc.) such as a, which may include but not be limited to (e.g., chaperone, security guard, etc.) In some embodiments, each/every/girl, which may include but not be limited to (e.g., girl etc.) may be defined as person being paid or a user on the platform) may be able to choose whether or not user wants to be available, which may include but not limited to (e.g., opt-in, select, appointed, suggested, want to, etc.) to be booked as a 'safety chaperone.' In some embodiments, there may be options to book, schedule, inquire about, inquire about, inquire regarding, secure, create connection to, hold, pay for, create business relationship with, use transmittables to secure or book, schedule, inquire about, etc.) a, which may include but not be limited to (e.g., 3rd party such as security guard from a 3rd party platform or a 3rd party integration, or from platform, or users on platform, or integrated users, etc.) In some embodiments, there may be options to book, schedule, inquire about, inquire about, inquire regarding, secure, create connection to, hold, pay for, create business relationship with, use transmittables to secure or book, schedule, inquire about, etc.) which may include but not limited to (e.g., outside friends, family, persons, etc.) In some embodiments, which may include but not limited to, the: (e.g., outside persons, outside users, non-registered users, 3rd parties, advertisers, advertisements, businesses, etc.) booking may be, which may include but not be limited to (e.g., automatically integrated, manually integrated, in collaboration with, connected to etc.) into, which may include but not be limited to (e.g., calendar or all calendars, or auto updating, or manually updating, or updated or booked through machine learning or AI, etc.)

In some embodiments, there may be options for users to book, schedule, inquire about, inquire about, inquire regarding, secure, create connection to, hold, pay for, create business relationship with, use transmittables to secure or book, schedule, inquire about, etc.) which may include but not be limited to (e.g., 'safety chaperones, security, support, or security, 3rd party security, models, creators etc.) In some embodiments, which may include but not be limited to (e.g., 'safety chaperones, security, support, or security, etc.) may be described as someone, which may include but not be limited to (e.g., from the platform, another user, another person, a 3rd party entity, a 3rd party service, a 3rd party person, a family member, a former platform person, a member, etc.) In some embodiments, which may include but not be limited to (e.g., 'safety chaperones, security, support, or security,' etc.) may be used as a, which may include but not be limited to (e.g., 'security,' support, safety, etc.) whether, which may include but not be limited to (e.g., emotional or physical or both, or physical, or safety etc.) In some embodiments, which may include but not be limited to (e.g., outside security, 3rd party support, 3rd party entity, etc.) may be booked through a, which may include but not be limited to (e.g., 'bodyguard or security service' or any outside service that is either approved, not approved, or is a partner platform, is not a partner, or is a family member, or a friend, etc.)) In some embodiments, which may include but not limited to, the: (e.g., outside booking or safety booking, or other entity booking, or other person booking by user etc.) may be, which may include but not be limited to (e.g., deducted from earning that day or anytime earnings are made, whether at the time of the booking, after funds have been paid, or up front, whether from their pre-loaded funds, their funds available, or a transfer from a bank, whether that transfer is immediate or after some type, or from a credit service, or a credit booking etc.)

In some embodiments, an option may include but is not limited to (e.g., book a safety chaperone for a date, connection, meeting, virtual connection, meeting, etc.) In some embodiments, an option to, which may include but not be limited to (e.g., book, schedule, inquire about, inquire about, inquire regarding, secure, create connection to, hold, pay for, create business relationship with, use transmittables to secure or book, schedule, inquire about, etc.) may be, which may include but not limited to (e.g., a friend, human, robot, security, a friend on app or platform, another creator, another user, another person, another public person, a family member, a friend, an acquaintance, etc.)

In some embodiments, users may be choose whether or not (e.g., user, person, entity, 3rd party, etc.) want to be available to be booked as a, which may include but not be limited to (e.g., 'safety chaperone,' friend, person there, supporter, safety person, security, etc.) which may be, which may include but not limited to an: (e.g., opt-on to be included, or a manually included, or an application process, etc.) as a potential option to be booked for a, which may include but not be limited to (e.g., date, connection, 'safety date' or a 'safety security' or a 'safety bestie' or a 'safety person' or a person that attends the date secretly and/or makes sure the safety and security of the other person etc.) In some embodiments, this 'safety chaperone' may be paid by (e.g., another user, that user may be able to private, public, or only known between two 'creators, models, or users of the platform, part of the bill, part of the price, included in price, security included in price, etc.) In some embodiments, which may include but not be limited to (e.g., 'safety chaperones, security, support, or security,' or 'users of the safety chaperone' etc.) may obtain, which may include but not be limited to (e.g., information, safety information or get informed of safety measures or safety precautions etc.) which may include but not limited to (e.g., before, after, during, later after, etc.) they (e.g., sign up, before they opt-in, after they opt-in, prior to any date, during date, after date, etc.) In some embodiments, which may include but not be limited to (e.g., 'safety chaperones, security, support, or security, security detail, safety persons, other users, models, etc.) may be, which may include but not be limited to (e.g., outside users of the app or booked with outside users of the platform using potentially 3rd party or integrated, outside person, integrated calendar, or calendar options, or connection options etc.) that may or may not, which may include but not be limited to (e.g., record or show or store data, or store data etc.) regarding/that there was a safety chaperone, security, supporter, safety person, which may include but not be limited to (e.g., booked/present, there, attending, viewing, etc.) during which may include but not limited to, the: (e.g., connection, date, etc.) In some embodiments, which may include but not be limited to (e.g., 'connection, meeting, or date etc.) which may include but not limited to (e.g., chaperones,' users, persons, security, etc.) may be, which may include but not be limited to (e.g., outside or informed from outside, or internally, or within platform, or from platform, or integrated with platform, etc.) whether (e.g., 3rd party, by mouth, by booking, by virtual booking, etc.) In some embodiments, 'safety chaperone' may be, which may include but not be limited to (e.g., recorded or subjected to all of the recording or safety coordinates, or data recording, or location recorded, or data collected from, etc.) that, which may include but not limited to, the: (e.g., models, person, users, 'user' etc.) may be subjected to on a date in order to, which may include but not be limited to (e.g., record all data for the 'date log, record information, collect data, etc.) using any, which may include but not be limited to (e.g., data, management device, device, 3rd party, or any recording, etc.) for any, which may include but not be limited to (e.g., 'date' or any connection or any contractual agreements, etc.)

Figure 140:
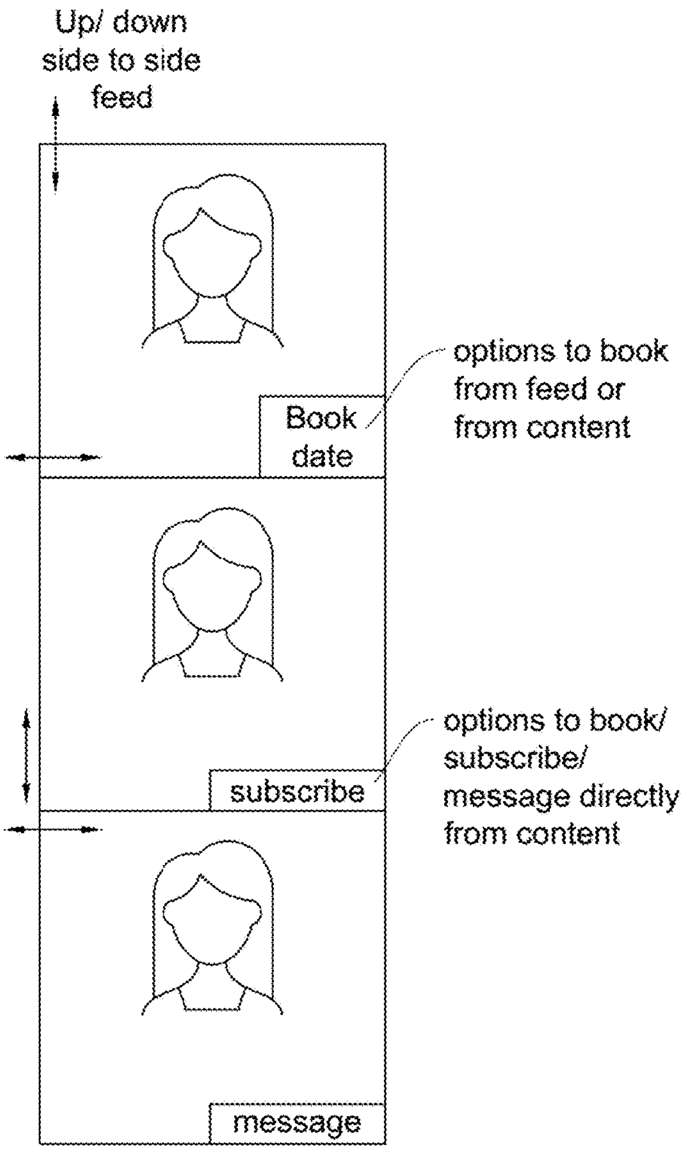
Figure 141:
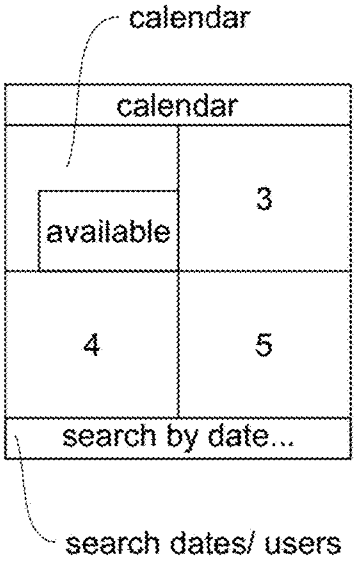
Figure 142:
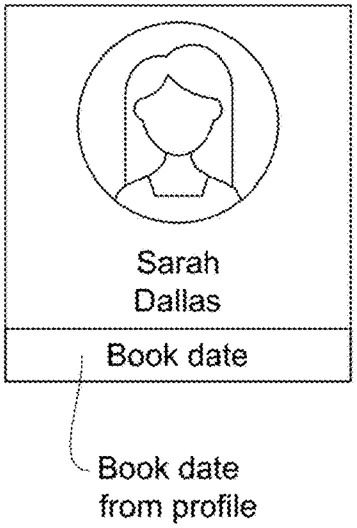

FIG. 140, FIG. 141, FIG. 142: In some embodiments, there may be an option to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., date, message, question, virtual meeting, virtual date, entertainment options set by anyone or model or user, in-person date, send inquiry, send application, send information, send message, like, add to favorites, add to list, etc.) directly from their feed, content, picture, video, gif, meme, hologram, virtual viewing etc.) In some embodiments, this option may, which may include but not be limited to (e.g., come down as a drop-down form, a 3rd party form, a larger form, a large screen, hologram, user interface, viewing display, a zoom in screen, hologram, user interface, viewing display, a long list of options, a short list of options, a second page, another page etc.) In some embodiments, these options, which may, which may include but not be limited to (e.g., pause the content, blur the content, or make changes, or stop, or add it to favorites, or add it to their computing operation, or add it to their list, etc.) In some embodiments, the method to see each content may include but not be limited to swiping, tapping, clicking, brain commands, other person's commands, voice commands, etc.) In some embodiments, content may be automatically shown on user interface or calendar based on, which may include but not be limited to (e.g., bookings, connections, dates, times, locations, etc.) In some embodiments, any content may be able to, which may include but not be limited to (e.g., manually uploaded, manually changed, automatically changed, In some embodiments, which may include but not be limited to (e.g., calendar or timing method or timing data, schedule data, scheduling data, timing methods, etc.) may show, which may include but not be limited to (e.g., pictures, visuals, content, etc.) that may be manually uploaded or downloaded onto the software or the calendar application. In some embodiments, which may include but not be limited to (e.g., calendar, timing method, schedule method, scheduling method, timing data center, etc.) may demonstrate a, which may include but not be limited to (e.g., live picture, video, conference call, Face Time call, a photo, a meme, a GIF, a pixels showing a moving photo or a video, that may show that he calendar app may contain for the date, the time, the month, the AI generated photos or videos, etc.) In some embodiments, which may include but not be limited to (e.g., calendar app, 3rd, party, or platform, or software, or technology, etc.) may use, which may include but not be limited to (e.g., photos, videos, or other pixelated, or created items, etc.) that may show a, which may include but not be limited to (e.g., picture, art, moving art, video, etc.) which may include but not be limited to (e.g., show or demonstrate, or show example of, etc.) which may include but not be limited to (e.g., what the person is doing at the time, or for the date, or what to be expected of that time, etc.) In some embodiments, which may include but not be limited to (e.g., visuals, sounds, content, etc.) may include but not be limited to (e.g., AI generated, uploaded, stock photos, stock videos, chosen pictures, machine learning videos or pictures, etc.) which may include but not be limited to (e.g., what the date is about, what to expect, what the learn about for the date, information for the date, who the date is with, what the date is about, training videos for the date, any type of general knowledge for that date, show training videos demonstrated to suggest to that person to learn prior to the date such as safety videos, training videos, informational videos, fun videos, entertainment videos, news videos, these may not be videos and may be pictures or other forms of communication through visuals, etc.) In some embodiments, on the (e.g., actual content, near content, on live stream, on information, on profile, on platform, etc.) there may be (e.g., brain-induced options such as controlling it with your brain, or displays or options to click or interact with, etc.) in order to perform an operation such as (e.g., 'book date now' 'reserve for date' 'learn more' 'join live stream' 'get info sent to you about this person' 'get a background check' 'view profile' 'send message' message now' contact now' 'view' 'see now', etc.)

In some embodiments, payment may be required in exchange for any option, which may include but not be limited to (e.g., payment to view content, payment to view calendar, interact with to view calendar, interact with to view timing data method, payment to book, schedule, inquire about, inquire about, inquire regarding, secure, create connection to, hold, pay for, create business relationship with, use transmittables to secure or book, schedule, inquire about, etc.) payment to join call, payment for background check by 3rd party, payment to live stream, pre-recorded live stream, pre-recorded content, payment to join stream, payment to join call, payment for content, payment for message, payment to see calendar, payment to see profiles, payment to see other cities, payment to book, schedule, inquire about, inquire about, inquire regarding, secure, create connection to, hold, pay for, create business relationship with, use transmittables to secure or book, schedule, inquire about, etc.) which may include but not be limited to (e.g., profiles or persons in other cities, payment to view stories, payment to view live or current content, payment to follow, payment to subscribe, payment for unlimited content, payment for unlimited messages, payment for unlimited dates, payment for contact options, payment for contact information, payment to see live, payment to obtain information, payment to match, payment to view now, payment to unlock content, payment to begin, payment to view information about user, payment to see background check, payment to send direct message, payment to add to category, payment to add to list, payment to be on cover, payment to be on first page, payment to be at top, payment to be suggested, payment to wink, flirt, send heart, payment to speak to another person, etc.) In some embodiments, there may be options such as, which may include but not be limited to (e.g., 'follow for more access, follow to see content, follow to see locked and unlocked content, follow to see availability, calendar availability, scheduling option, calendar general availability, exact times and dates of availability, follow for direct messages, click, swipe, tap, share, etc.) for may include but not be limited to (e.g., access or message or content or see calendar, or match with, or view their section, or view their profile, or view their content, or see their photos or see their content, etc.) In some embodiments, there may be a combination may include but not limited to (e.g., user, content, follow or requirements to see content, calendars, calendar availability, scheduling option, times available, things that may be booked, make, done, meetings, things that person or user offers, locations, travel information, location information, types of tings offered, locations or distances offered, virtual, or in-person, dates or no dates, virtual dates or no dates, messages accepting, accepts DMs, prices, price ranges, general pricing, general transmittables, rates, meet and greets, live vents, live shows, live shows whether locked or unlocked, current lives show, information about lives, information about going live, information about events, quotes, match, organize, organize to list, organize to information, organize for date, money or asset acceptance, accepts pictures, accepts personal photos, accepts content, etc.)

In some embodiments, there may be a, which may include but not be limited to (e.g., 'swipe to calendar method, something to calendar method, view to calendar method, anything to calendar method, etc.) In some embodiments, which may include but not be limited to (e.g., 'swipe' may be defined as, which may include but not be limited to (e.g., swipe, tap, switch, click, etc.) In some embodiments, the 'swipe to calendar method' may include but is not limited to (e.g., a profile photo, information, availability, content, a computing operation-chosen photo, the best photo, a frequently chosen photo, an often picked photo, a frequently-viewed photo, etc.) In some embodiments, there may be a swiping method may include but not limited to (e.g., swipe the stack or list or persons left or right up or down, areas or methods or processes (e.g., you may, user, person, entity, 3rd party, robot, artificial intelligence, etc.) may be able to see or download or view the calendar, profile, pictures, videos, lives, locked photos, information, etc.) depending on which way or there may be all of these items showing up on each, which may include but not be limited to (e.g., swipe or method, etc.) which may include but not be limited to (e.g., depending on which way, depending on which one comes first, etc.)

In some embodiments, there may be a swipe that leads to a, which may include but not be limited to (e.g., live photo and a live calendar, timing method data, timing data method, timing process data, with live dates, bookings, openings, ways to click, ways to pay, ways to register to sign in, ways to register on the platform, the person's chosen or automatic preferences may show up, etc.) In some embodiments, the, which may include but not be limited to (e.g., 'swiper, tapper, viewer, displayer, audience, person, user, etc.) may be, which may include but not be limited to (e.g., able to choose a 'date' a book immediately, book now, or view calendar, or follow, or subscribe, or view private photos, private content, etc.) on the, which may include but not be limited to (e.g., home-screen, user interface, etc.) and/or on a, which may include but not be limited to (e.g., swipe method or on any way connected or not connected to a swiping home screen method, or on any user interface using any method, etc.) In some embodiments, the calendar application may contain a, which may include but not be limited to (e.g., 'contact list" or list of contacts, or persons, or users, etc.) which may include but not be limited to (e.g., automatically upload, show a picture that is chosen, decide manually or automatically, etc.) In some embodiments, the calendar may be shown, which may include but not be limited to (e.g., any size photo, AI-generated content, content, video, etc.) which may include but not be limited to (e.g., person, place, thing, event, created event, created type, what to expect, any abstract information, any abstract idea, etc.) which may include but not be limited to (e.g., date, connection, meeting subscriber, follower, etc.) In some embodiments, the calendar may contain, which may include but not be limited to (e.g., information about 'date, pricing, information about 'meeting such as pricing, information on what was paid, information on what was earned, information on how many may be earned on that day, colors may change based on what has been completed and what hasn't, etc.) In some embodiments, for example, if a date hasn't happened yet, the user interface may show a, which may include but not be limited to (e.g., unique color, special symbol, special item, greyed area, etc.) which may include but not be limited to (e.g., idea, agreements, amount of money, reward, items earned, etc.) which may include but not be limited to (e.g., shown, understood, or agreed upon, etc.) may not have been earned. In some embodiments, this may include but not be limited to (e.g., before, after, during, later after, etc.), which may include but not be limited to (e.g., date, meeting, agreement, etc.) In some embodiments, the user interface may include but not be limited to (e.g., the amount of money has been earned at some point, and something may change, which may include but not be limited to (e.g., the color may vary, the symbol showing that day may change in some form, etc.) as, which may include but not be limited to (e.g., distinguishable from before, somewhat distinguishable, different, modified, edited, etc.)

In some embodiments, there may be options for users to book, schedule, inquire about, inquire about, inquire regarding, secure, create a connection to, hold, pay for, create a business relationship with, use transmittables to secure or book, schedule, inquire about, etc.) which may include but not be limited to (e.g., 'safety chaperones, security, support, or security, 3rd party security, models, creators, etc.) In some embodiments, 'safety chaperones, security, support, or security, may be described as someone, which may include but not be limited to (e.g., from the platform, another user, another person, a 3rd party entity, a 3rd party service, a 3rd party person, a family member, a former platform person, a member, etc.) In some embodiments, 'safety chaperones, security, support, or security' may be used as 'security' whether, which may include but not be limited to (e.g., emotional or physical or both, or physical or safety, etc.) In some embodiments, outside security may be booked through a, which may include but not be limited to (e.g., 'bodyguard or security service' or any outside service that is either approved, not approved, or is a partner platform, is not a partner, or is a family member, or a friend, etc.))

In some embodiments, which may include but not limited to, the: (e.g., outside booking or safety booking, or other entity booking, or other person booking by user etc.) may be, which may include but not be limited to (e.g., deducted from earning that day or anytime earnings are made, whether at the time of the booking, after funds have been paid, or up front, whether from their pre-loaded funds, their funds available, or a transfer from a bank, whether that transfer is immediate or after some type, or from a credit service, or a credit booking etc.) In some embodiments, there may be options to, which may include but not limited to (e.g., pay or free options etc.) to, which may include but not limited to (e.g., live stream, live stream a 'movie,' or game, or entertainment, etc.) or any form of which may include but not limited to (e.g., content or any form of entertainment etc.) at the, which may include but not limited to (e.g., same time, at different times, pause, top, record, not record, live only, pre-recorded live, streaming, regular streaming, no talking, talking etc.) In some embodiments, the 'free or paid option' to stream, watch, together, time spent together, which may include or not include a, which may include but not limited to (e.g., button, clicker, beginning, start, etc.) to begin which may include but not limited to (e.g., have a (e.g., timer, time stamp, location stamp, business location stamp, confirmation of time, location, data, etc.) or a recorded, or a data collector etc.) to determine if the 'contractual agreements that were paid or not paid' which may include but not limited to (e.g., went through or was obtained, etc.) In some embodiments, there may be options to 'pay' to do which may include but not limited to (e.g., live streaming, movie, entertainment, virtual entertainment, virtual game, in person game, or any time spent etc.) between one, two, or more persons etc.) In some embodiments, payment may be made prior to being able to possibly which may include but not limited to (e.g., 'join call' or 'join date' or 'join live stream' or 'being movie' or 'begin date or check-in, check-out, time stamp, time record, time and data record, location, time and data record,' or 'start date' or 'call this person' or 'video with this person' etc.) In some embodiments, options to join or book may not be available until 'agreements are met' or 'requirements are met,' which may include but not be limited to (e.g., may include payment or instructions or actions or anything to meet requirements etc.)

In some embodiments, which may include but not be limited to (e.g., safety chaperones, security, support, or security/Security, etc.) In some embodiments, users may be able to, which may include but not be limited to (e.g., book, schedule, inquire about, inquire about, inquire regarding, secure, create connection to, hold, pay for, create business relationship with, use transmittables to secure or book, schedule, inquire about, etc.) a/multiple, which may include but not be limited to (e.g., security, user, person, outside, security, safety chaperone etc.) for, which may include but not be limited to (e.g., date friend on app or platform, gifting, giving, paying for, security for, for self, etc.) In some embodiments, users may have to: (e.g., pay from their own funds or their own bank or their own money or request payment for, or have invoice for, or request money for, etc.) to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., security or safety options, or safety persons, or security, or safety chaperone, security, supporter, safety person, model, or creator, etc.) such as a, which may include but not be limited to (e.g., chaperone, security guard, etc.) In some embodiments, each/every/girl, which may include but not be limited to (e.g., girl etc.) may be defined as person being paid or a user on the platform) may be able to choose whether or not user wants to be available, which may include but not limited to (e.g., opt-in, select, appointed, suggested, want to, etc.) to be booked as a 'safety chaperone.' In some embodiments, there may be options to book, schedule, inquire about, inquire about, inquire regarding, secure, create connection to, hold, pay for, create business relationship with, use transmittables to secure or book, schedule, inquire about, etc.) a, which may include but not be limited to (e.g., 3rd party such as security guard from a 3rd party platform or a 3rd party integration, or from platform, or users on platform, or integrated users, etc.) In some embodiments, there may be options to book, schedule, inquire about, inquire about, inquire regarding, secure, create connection to, hold, pay for, create business relationship with, use transmittables to secure or book, schedule, inquire about, etc.) which may include but not limited to (e.g., outside friends, family, persons, etc.) In some embodiments, which may include but not limited to, the: (e.g., outside persons, outside users, non-registered users, 3rd parties, advertisers, advertisements, businesses, etc.) booking may be, which may include but not be limited to (e.g., automatically integrated, manually integrated, in collaboration with, connected to etc.) into, which may include but not be limited to (e.g., calendar or all calendars, or auto updating, or manually updating, or updated or booked through machine learning or AI, etc.)

In some embodiments, there may be options for users to book, schedule, inquire about, inquire about, inquire regarding, secure, create connection to, hold, pay for, create business relationship with, use transmittables to secure or book, schedule, inquire about, etc.) which may include but not be limited to (e.g., 'safety chaperones, security, support, or security, 3rd party security, models, creators etc.) In some embodiments, which may include but not be limited to (e.g., 'safety chaperones, security, support, or security, etc.) may be described as someone, which may include but not be limited to (e.g., from the platform, another user, another person, a 3rd party entity, a 3rd party service, a 3rd party person, a family member, a former platform person, a member, etc.) In some embodiments, which may include but not be limited to (e.g., 'safety chaperones, security, support, or security,' etc.) may be used as a, which may include but not be limited to (e.g., 'security,' support, safety, etc.) whether, which may include but not be limited to (e.g., emotional or physical or both, or physical, or safety etc.) In some embodiments, which may include but not be limited to (e.g., outside security, 3rd party support, 3rd party entity, etc.) may be booked through a, which may include but not be limited to (e.g., 'bodyguard or security service' or any outside service that is either approved, not approved, or is a partner platform, is not a partner, or is a family member, or a friend, etc.)) In some embodiments, which may include but not limited to, the: (e.g., outside booking or safety booking, or other entity booking, or other person booking by user etc.) may be, which may include but not be limited to (e.g., deducted from earning that day or anytime earnings are made, whether at the time of the booking, after funds have been paid, or up front, whether from their pre-loaded funds, their funds available, or a transfer from a bank, whether that transfer is immediate or after some type, or from a credit service, or a credit booking etc.)

In some embodiments, an option may include but is not limited to (e.g., book a safety chaperone for a date, connection, meeting, virtual connection, meeting, etc.) In some embodiments, an option to, which may include but not be limited to (e.g., book, schedule, inquire about, inquire about, inquire regarding, secure, create connection to, hold, pay for, create business relationship with, use transmittables to secure or book, schedule, inquire about, etc.) may be, which may include but not limited to (e.g., a friend, human, robot, security, a friend on app or platform, another creator, another user, another person, another public person, a family member, a friend, an acquaintance, etc.) In some embodiments, users may choose whether or not (e.g., user, person, entity, 3rd party, etc.) want to be available to be booked as a, which may include but not be limited to (e.g., 'safety chaperone,' friend, the person there, supporter, safety person, security, etc.) which may be, which may include but not limited to an: (e.g., opt-on to be included, or a manually included, or an application process, etc.) as a potential option to be booked for a, which may include but not be limited to (e.g., date, connection, 'safety date' or a 'safety security' or a 'safety bestie' or a 'safety person' or a person that attends the date secretly and/or makes sure the safety and security of the other person, etc.) In some embodiments, this 'safety chaperone' may be paid by (e.g., another user, that user may be able to private, public, or only known between two 'creators, models, or users of the platform, part of the bill, part of the price, included in the price, security included in the price, etc.)

In some embodiments, which may include but not be limited to (e.g., 'safety chaperones, security, support, or security,' or 'users of the safety chaperone' etc.) may obtain, which may include but not be limited to (e.g., information, safety information or get informed of safety measures or safety precautions etc.) which may include but not limited to (e.g., before, after, during, later after, etc.) they (e.g., sign up, before they opt-in, after they opt-in, prior to any date, during date, after date, etc.) In some embodiments, which may include but not be limited to (e.g., 'safety chaperones, security, support, or security, security detail, safety persons, other users, models, etc.) may be, which may include but not be limited to (e.g., outside users of the app or booked with outside users of the platform using potentially 3rd party or integrated, outside person, integrated calendar, or calendar options, or connection options etc.) that may or may not, which may include but not be limited to (e.g., record or show or store data, or store data etc.) regarding/that there was a safety chaperone, security, supporter, safety person, which may include but not be limited to (e.g., booked/present, there, attending, viewing, etc.) during which may include but not limited to, the: (e.g., connection, date, etc.) In some embodiments, which may include but not be limited to (e.g., 'connection, meeting, or date etc.) which may include but not limited to (e.g., chaperones,' users, persons, security, etc.) may be, which may include but not be limited to (e.g., outside or informed from outside, or internally, or within platform, or from platform, or integrated with platform, etc.) whether (e.g., 3rd party, by mouth, by booking, by virtual booking, etc.) In some embodiments, 'safety chaperone' may be, which may include but not be limited to (e.g., recorded or subjected to all of the recording or safety coordinates, or data recording, or location recorded, or data collected from, etc.) that, which may include but not limited to, the: (e.g., models, person, users, 'user' etc.) may be subjected to on a date in order to, which may include but not be limited to (e.g., record all data for the 'date log, record information, collect data, etc.) using any, which may include but not be limited to (e.g., data, management device, device, 3rd party, or any recording, etc.) for any, which may include but not be limited to (e.g., 'date' or any connection or any contractual agreements, etc.)

Figure 143:
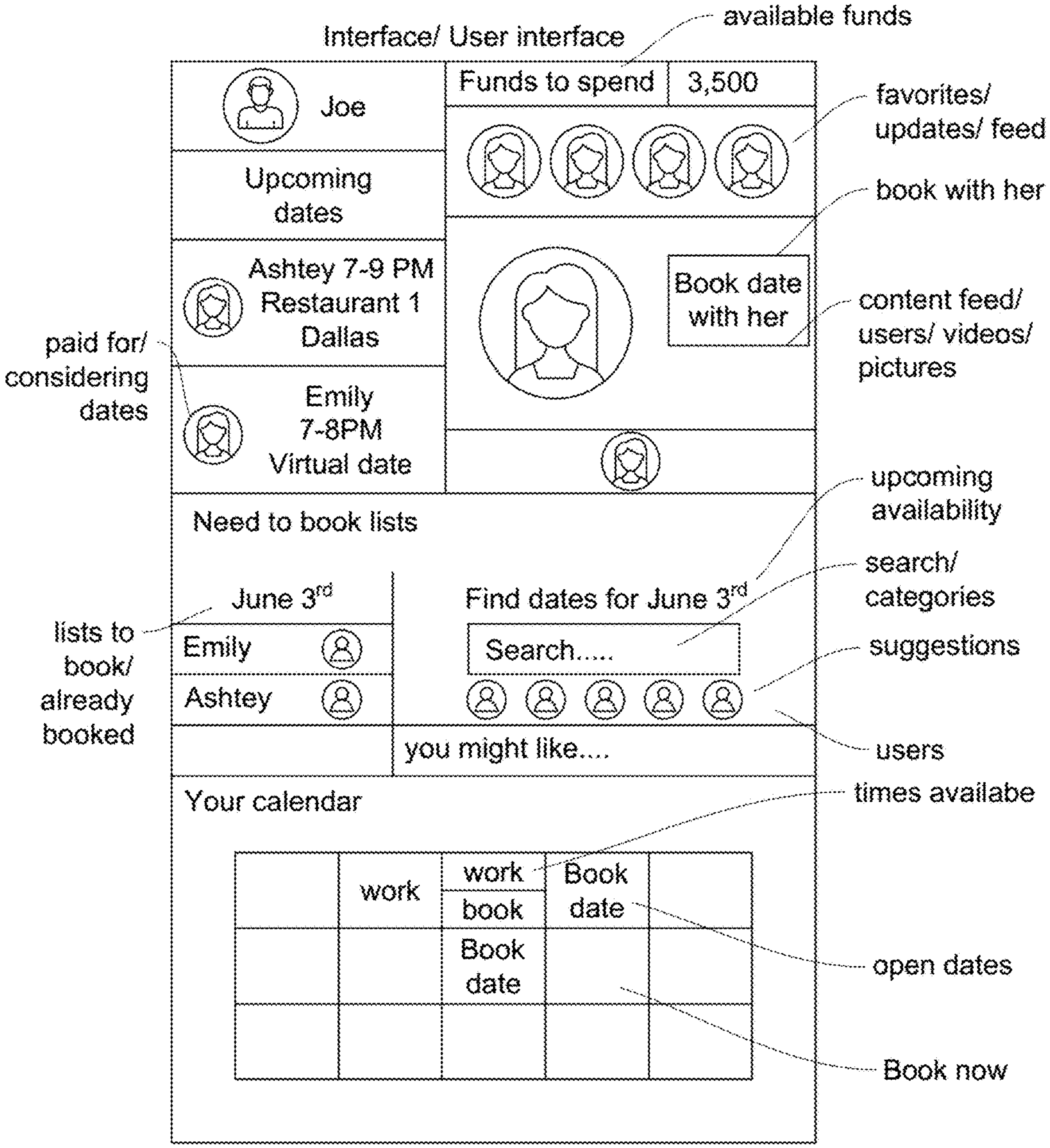

FIG. 143: In some embodiments, a potential (e.g., platform, user interface or person's user interface, display, visuals, options, etc.) which may be, which may include but not limited to (e.g., 'funds to spend, money information, asset information, investment information, users profile information, users public or private information, upcoming availability on their calendar or schedule, times available for each day, booking options directly from their calendar, booking options directly from their feed, options to book, schedule, inquire about, inquire about, inquire regarding, secure, create connection to, hold, pay for, create business relationship with, use transmittables to secure or book, schedule, inquire about, date directly from feed, options to book, schedule, inquire about, inquire about, inquire regarding, secure, work schedule, create connection to, hold, pay for, create business relationship with, use transmittables to secure or book, send gifts, view gift list, view wishlist, view items user wants to be purchased, send gift to view schedule, send gift to unlock calendar, send gift to meet, view items user likes, view gift options, view prices, send gifts, send vacation voucher, send makeup voucher, send money, pay for date, pay for interaction, donate money to, donate, send tip, send funds, schedule, inquire about, call, message, send tip, etc.) options to (e.g., book, schedule, inquire about, inquire about, inquire regarding, secure, create connection to, hold, pay for, create business relationship with, use transmittables to secure or book, schedule, inquire about, date or book or schedule directly from feed, or directly from seeing their photo or profile, suggestions from other users, suggestions for other persons to book, schedule, inquire about, inquire about, inquire regarding, secure, create connection to, hold, pay for, create business relationship with, use transmittables to secure or book, schedule, inquire about, suggestions for other profiles, 'you might like' which may show other options, other options or more options, which may show up based on computing operation popularity, manual, or personal settings, or preferences, a calendar, the other persons calendar or information, their information, lists, organizational lists, person's lists, person on feed, persons based on availability, person's based on categories, upcoming dates, paid for dates, not paid for dates, logs that are not paid for, logs that are to be booked, logs that are to be checked out for, matching AI-connecting, calendar dates, etc.) In some embodiments, the 'gift option' to send a (e.g., gift, donation, money, item, product, service, voucher, vacation, etc.) may obtain payment or cash first from the purchaser and then the (e.g., platform or 3rd party or user, model, etc.), may make a manual or automatic payment and or order for item, so that the user can not cancel item after he obtains (e.g., message, date or communication from other user, etc.)

In some embodiments, there may be a, which may include but are not limited to (e.g., live or an automated or a manual swiping method of viewing profiles or persons available, or persons listed, or filtered persons, or those available for a date, etc.) In some embodiments, user interface method of swiping or pulling may be similar to a, which may include but are not limited to (e.g., simulation, 4d simulation, 4d, hologram, screen, hologram, user interface, viewing display, viewing, 3d simulation where it seems to be a hologram or pulled out from the screen, hologram, user interface, viewing display, etc.) In some embodiments, there may be a, which may include but are not limited to (e.g., part, area, interface, screen, hologram, notification, message, etc.) that may show which may include but are not limited to (e.g., how many funds are available, a live screen of their bank account, a part that may show how many pre-paid funds there are available, how much money they have, how many assets they have, how much capital or credit they have, etc.) which may include but are not limited to (e.g., additionally, another interface, on the interface, on screen, showing, displayed, etc.) which may include but are not limited to (e.g., the cost of the current person to book, schedule, inquire about, inquire about, inquire regarding, secure, create connection to, hold, pay for, how to inquire, how to pay, create business relationship with, use transmittables to secure or book, schedule, inquire about, etc.) which may include but are not limited to (e.g., or the range of the costs, or the costs available, or a range of costs available, or costs or funds, etc.) In some embodiments, the, which may include but are not limited to (e.g., platform, user interface, etc.) viewing may seem like it's a, which may include but are not limited to (e.g., hologram, projecting, a projector, or is pulled out from the screen, hologram, user interface, viewing display, or is in the form of a 4d, 3d, or any type of method that is not directly on a screen such as a computer, or a flat surface, any surface may be curved or half projected half screen, hologram, user interface, viewing display, etc.) In some embodiments, there may be, which may include but not limited to (e.g., user interface options, interface options, platform options, screen options, etc.) where a user may be able to, which may include but not be limited to (e.g., 'get a loan, get a credit line, increase credit line, obtain credit line, sell their items, get cash for items, sell assets, sell stocks, manage stocks, sell real state, sell stocks, stock options, change schedule, manage schedule, hire an assistance or hire a firm to manage money, obtain loans, obtain a credit line, upload money or funds to credit line, upload funds for platform, pre-pay or pay for or obtain or arrange gifts in exchange for date, send gifts or buy something from 'wishlist' or 'list' or 'listed item' in exchange for date or time or virtual date or in person date or in exchange to view calendar or schedule or time or be able to message or book date or send like or interact with, pre-pay for dates, pre-loan money for dates, pre-book dates that may be paid before or after date, manage calendar booking, manage lists, manage feed, manage people, apply for credit card, get credit line, calendar availability, scheduling option, funds available, loan funds, etc.)

In some embodiments, there may be an user interface that may show, which may include but not be limited to (e.g., all assets, any assets, payments, money, transmittables, etc.) which may include but not limited to (e.g., on hand, available, pending, current, etc.) which may include but not be limited to (e.g., 'stocks, investment portfolios, cash, real state, car assets, car title worth, car title assessments etc.) In some embodiments, there may be options or general, which may include but not be limited to (e.g., 'value for things such as selling their car, information regarding values of items or tings in their possession, or value of assets not currently sold, value of general assets such as their equity in their house, their car title for a loan, selling items in their home, value of the equity in their house, value of jewelry, etc.) In some embodiments, there may be options to sell their, which may include but not be limited to (e.g., jewelry, car, house, equity, stocks, assets, etc.) though platform or a 3rd party in exchange for credit on the platform, funds on the platform, pre-paid dates, for cash, for credit, for platform funding, for 3rd party funding, etc.) In some embodiments, there may be a, which may include but not be limited to (e.g., timing method data, timing data, schedule data, scheduling data, timing methods, live calendar, timing method data, timing data method, timing process data, live calendar, timing method data, timing data method, timing process data, s of all lists of persons or users, there may be a live bidding/auction, live date options, live parties, etc.) In some embodiments, which may include but not be limited to (e.g., lists or chosen persons or saved persons or organized methods of seeing persons whether through lists, feed, clicking profiles, etc.) In some embodiments, there may be an option to, which may include but not be limited to (e.g., filter out what they are seeing, filter items, filter content, display, not display, etc.) show or not show such as, which may include but not be limited to (e.g., 'shows, feed, information, booking information, payment information etc.) In some embodiments, which may include but not be limited to (e.g., messages, connections, contact, etc.) which may include but not be limited to (e.g., voice messages, memes, payment sending such as 3rd party options to transfer to platform, options to send tips, emojis, pictures, pre-made pictures, options to paint, options to create own picture on platform, options to edit or create content through messaging system or through platform, etc.)

In some embodiments, which may include but not be limited to (e.g., safety chaperones, security, support, or security, etc.) Security: In some embodiments, which may include but not be limited to (e.g., users, persons, models, etc.) may be able to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., security, user, person, outside, security, safety chaperone etc.) for, which may include but not be limited to (e.g., date friend on app or platform, gifting, giving, paying for, security for, for self, etc.) In some embodiments, there may be options that may have options to, which may include but not be limited to (e.g., lead to a list, organization, types, profiles, suggestions, etc.) based on preferences or categories, etc.) which may include but not be limited to (e.g., book-in person date, book virtual, book talk, book chat, book video chat, book video meeting, book voice conversation, date, follow for free, discover for free, locked content, platform's exclusive content, special models, promotional persons, message, choose city, find your city, our models, locked content, unlocked content, match your calendar, match anywhere in the world, match another city, match yourself to anyone, match based on preferences, find date based on availability, find date based on distance, find date based on calendar, find date based on city, match date virtual match date in person, find girlfriend, find wife, find date, find friend, fan, fans only, for fans, for followers, see your favorite model, see your favorite celebrity, see new celebrities, see new models, see new sign ups, see new girls, users, see new creators, boyfriend applications, husband applications, date applications, book in person date now, book virtual, book talk, book chat, book video chat, book video meeting, book voice conversation, date, book call, see more information, see promotional material, see profile, get matched, swipe now, view exclusive content, go through stack now, view like dating apps style, choose your view for profile, see standard profiles, see regular way to view profiles, swipe by city, swipe by distance, view stacked style, view desktop style, view mobile style, get matched by human, robot, bot, 3rd party, entity, computer system, AI system, get matched by AI, get matched by robots, membership, membership fees, FAQS, learn more, unlock content, choose style to see content, swipe, view etc.) like, which may include but not be limited to (e.g., swipe up and down, side to side, stacked, list, create list etc.)

In some embodiments, there may be an may include but not limited to (e.g., user interface, option, a screen, etc.) that may show may consist of but not limited to (e.g., users, persons, profiles, models, etc.) in a may include but not limited to (e.g., moving screen, hologram, user interface, viewing display, a moving depiction of seething, a 3d model, a 4d model, a girl, a man, a person, a model, a creator, content, etc.) which may be combined but not limited to (e.g., exclusive locked content, creator content, creator options, location options, worldwide options, options to explore site or platform, options to view models, options to view creators, options to explore profiles, options to match, options to choose, options to view screen in different format such as 'scrolling, tapping, stacks, swiping, etc.) In some embodiments, on any interface, for example, which may be including but not limited to the user interface may show options such as which may include but not limited to (e.g., 'choose your view option, choose, user interface choose, content choose, content viewing, option viewing, etc.), which may be included but not limited to (e.g., tapping, swiping, desktop view, mobile view, tapping view, stacking view, swiping view, see all profiles view, view by city, view by looks, view by stats, view by. popularity, view by category, view by person, view by preferences, view by in-person daters, view by virtual daters, view by those with locked photos, view by those with unlocked photos, view those with sales, view those with discounts, view those with photoshoots, view those with other people that have more than one photoshoot, view matching AI-connecting, method, view swiping method, view tapping method, view stacking method, view list method, sort by lists, create lists, etc.)

In some embodiments, there may be some type of which may include but not limited to (e.g., content viewing method, viewing, display, method to obtain information, more options, etc.) that may or may not have, which may include but not limited to (e.g., information, content, items, options, calendar, etc.) at the, which may include but not limited to (e.g., bottom, top, side, 3rd party, screen, hologram, user interface, viewing display, etc.) which may include but not be limited to (e.g., funds available, credit line available, calendar, messaging options, send tip options, send 'like' options, which may be in return for payment, etc.) In some embodiments, the content or information that may make a person interested may then have some sort of a, which may include but not be limited to (e.g., 'matching AI-connecting,' or a 'availability matching AI-connecting,' or a 'both available etc.) on this, which may include but not be limited to (e.g., day, time, month, area, location, distance,' etc.) persons may be matched based on any type of criteria, which may be chosen which may include but not limited to (e.g., manually, automatically, through the AI, through computing operation, through 'based on who you might like etc.) In some embodiments, there may be a, which may include but not be limited to (e.g., 'matching AI-connecting, method' or connection method, or connection suggestion, or computing operation similarity suggestion, etc.) that come from some which may include but not limited to (e.g., type of content or some type of viewing etc.) that may show the user that this person may be a good match based on, which may include but not be limited to (e.g., any criteria or feature, or content, or information, etc.) that may or may not be exposed or shown to the user, which may include but not be limited to (e.g., (e.g., you may, user, person, entity, 3rd party, robot, artificial intelligence, etc.) may be a match based on distance, or location, (e.g., you may, user, person, entity, 3rd party, robot, artificial intelligence, etc.) may be a match based on similar availability, or you have liked or interacted with similar users, etc.) In some embodiments, the, which may include but not limited to (e.g., 'matching AI-connecting, system' or the 'connection system etc.) may have options such as which may include but not limited to (e.g., 'book date, book meeting, book virtual, book talk, book chat, book video chat, book video meeting, book voice conversation, date, send message, pay for messages, pay for seething, put up funds, check out, view options, view content, paying or not paying options, etc.) In some embodiments, there may be options that may have options to, which may include but not be limited to (e.g., lead to a list, organization, types, profiles, suggestions, etc.) based on preferences or categories, etc.) which may include but not be limited to (e.g., book-in person date, book virtual, book talk, book chat, book video chat, book video meeting, book voice conversation, date, follow for free, discover for free, locked content, platform's exclusive content, special models, promotional persons, message, choose city, find your city, our models, locked content, unlocked content, match your calendar, match anywhere in the world, match another city, match yourself to anyone, match based on preferences, find date based on availability, find date based on distance, find date based on calendar, find date based on city, match date virtual match date in person, find girlfriend, find wife, find date, find friend, fan, fans only, for fans, for followers, see your favorite model, see your favorite celebrity, see new celebrities, see new models, see new sign ups, see new girls, users, see new creators, boyfriend applications, husband applications, date applications, book in person date now, book virtual, book talk, book chat, book video chat, book video meeting, book voice conversation, date, book call, see more information, see promotional material, see profile, get matched, swipe now, view exclusive content, go through stack now, view like dating apps style, choose your view for profile, see standard profiles, see regular way to view profiles, swipe by city, swipe by distance, view stacked style, view desktop style, view mobile style, get matched by human, robot, bot, 3rd party, entity, computer system, AI system, get matched by AI, get matched by robots, membership, membership fees, FAQS, learn more, unlock content, choose style to see content, swipe, view etc.) like, which may include but not be limited to (e.g., swipe up and down, side to side, stacked, list, create list etc.)

In some embodiments, there may be options for users to, which may include but not be limited to (e.g., book, schedule, inquire about, inquire about, inquire regarding, secure, create, hold, etc.) which may include but not be limited to (e.g., 'safety chaperones, security, support, or security, 3rd party security, models, creators etc.) In some embodiments, 'safety chaperones, security, support, or security, may be described as someone, which may include but not be limited to (e.g., from the platform, another user, another person, a 3rd party entity, a 3rd party service, a 3rd party person, a family member, a former platform person, a member, etc.) In some embodiments, which may include but not be limited to (e.g., 'safety chaperones, security, support, or security,' etc.) may be used a 'security' whether, which may include but not be limited to (e.g., emotional or physical or both, or physical, or safety, confirmation, data recording, referral, proof, etc.) In some embodiments, outside security may be, which may include but not be limited to (e.g., booked, approved, added, accepted, 3rd party integrated, etc.) through a, which may include but not be limited to (e.g., 'bodyguard or security service' or any outside service that is either approved, not approved, or is a partner platform, is not a partner, or is a family member, or a friend, etc.)) In some embodiments, which may include but not limited to, the: 'which may include but not be limited to (e.g., outside booking or safety booking, or other entity booking, or other person booking by user etc.) may be, which may include but not be limited to (e.g., deducted from earning that day or anytime earnings are made, whether at the time of the booking, after funds have been paid, or up front, whether from their pre-loaded funds, their funds available, or a transfer from a bank, whether that transfer is immediate or after some type, or from a credit service, or a credit booking etc.)

In some embodiments, there may be, which may include but not limited to (e.g., user interface options, interface options, platform options, screen options, etc.) where a user may be able to, which may include but not be limited to (e.g., 'get a loan, get a credit line, increase credit line, obtain credit line, sell their items, get cash for items, sell assets, sell stocks, manage stocks, sell real state, sell stocks, stock options, change schedule, manage schedule, hire an assistance or hire a firm to manage money, obtain loans, obtain a credit line, upload money or funds to credit line, upload funds for platform, pre-pay for dates, pre-pay for or obtain or pay for or arrange to pay for gifts in exchange for date, send gifts or buy something from 'wishlist' or 'list' or 'listed item' in exchange for date or time or virtual date or in person date or in exchange to view calendar or schedule or time or be able to message or book date or send like or interact with, pre-loan money for dates, pre-book dates that may be paid before or after date, manage calendar booking, manage lists, manage feed, manage people, apply for credit card, get credit line, calendar availability, scheduling option, funds available, loan funds, etc.) In some embodiments, there may be an user interface that may show, which may include but not be limited to (e.g., all assets, any assets, payments, money, transmittables, etc.) which may include but not limited to (e.g., on hand, available, pending, current, etc.) which may include but not be limited to (e.g., 'stocks, investment portfolios, cash, real state, car assets, car title worth, car title assessments etc.) In some embodiments, there may be options or general, which may include but not be limited to (e.g., 'value for things such as selling their car, information regarding values of items or tings in their possession, or value of assets not currently sold, value of general assets such as their equity in their house, their car title for a loan, selling items in their home, value of the equity in their house, value of jewelry, etc.) In some embodiments, there may be options to sell their, which may include but not be limited to (e.g., jewelry, car, house, equity, stocks, assets, etc.) though platform or a 3rd party in exchange for credit on the platform, funds on the platform, pre-paid dates, for cash, for credit, for platform funding, for 3rd party funding, etc.) In some embodiments, there may be a, which may include but not be limited to (e.g., timing method data, timing data, schedule data, scheduling data, timing methods, live calendar, timing method data, timing data method, timing process data, live calendar, timing method data, timing data method, timing process data, s of all lists of persons or users, there may be a live bidding/auction, live date options, live parties, etc.) In some embodiments, which may include but not be limited to (e.g., lists or chosen persons or saved persons or organized methods of seeing persons whether through lists, feed, clicking profiles, etc.) In some embodiments, there may be an option to, which may include but not be limited to (e.g., filter out what they are seeing, filter items, filter content, display, not display, etc.) show or not show such as, which may include but not be limited to (e.g., 'shows, feed, information, booking information, payment information etc.) In some embodiments, which may include but not be limited to (e.g., messages, connections, contact, etc.) which may include but not be limited to (e.g., voice messages, memes, payment sending such as 3rd party options to transfer to platform, options to send tips, emojis, pictures, pre-made pictures, options to paint, options to create own picture on platform, options to edit or create content through messaging system or through platform, etc.) In some embodiments, which may include but not be limited to (e.g., safety chaperones, security, support, or security, etc.) Security: In some embodiments, which may include but not be limited to (e.g., users, persons, models, etc.) may be able to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., security, user, person, outside, security, safety chaperone etc.) for, which may include but not be limited to (e.g., date friend on app or platform, gifting, giving, paying for, security for, for self, etc.)

In some embodiments, users may have to, which may include but not be limited to (e.g., pay from their own funds or their own bank or their own money or request payment for, or have invoice for, or request money for, etc.) to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., security or safety options, or safety persons, or security, or safety chaperone, security, supporter, safety person, model, or creator, etc.) such as a, which may include but not be limited to (e.g., chaperone, security guard, etc.) In some embodiments, each girl, which may include but not be limited to (e.g., girl may be defined as person being paid or a user on the platform etc.) may be able to choose whether or not user wants to be available, which may include but not limited to (e.g., opt-in, select, appointed, suggested, want to, etc.) to be, which may include but not be limited to (e.g., booked, paid for, secured, transferable, contacted about, inquire about etc.) as a 'safety chaperone.' In some embodiments, there may be options to, which may include but not be limited to (e.g., book, schedule, inquire about, inquire about, inquire regarding, secure, create connection to, hold, pay for, create business relationship with, use transmittables to secure or book, schedule, inquire about, etc.) a, which may include but not be limited to (e.g., 3rd party such as security guard from a 3rd party platform or a 3rd party integration, or from platform, or users on platform, or integrated users, etc.) In some embodiments, there may be options to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., outside friends, family, persons, etc.) In some embodiments, which may include but not limited to, the: (e.g., outside persons, outside users, non-registered users, 3rd parties, advertisers, advertisements, businesses, etc.) booking may be, which may include but not be limited to (e.g., automatically integrated, manually integrated, in collaboration with, connected to etc.) which may be into, which may include but not be limited to (e.g., calendar, timing, all calendars, auto updating, manually updating, updated or booked through machine learning or AI, etc.)

In some embodiments, an option may include but is not limited to (e.g., book a safety chaperone for a date, connection, meeting, virtual connection, meeting, etc.) In some embodiments, an option to book, schedule, inquire about, inquire about, inquire regarding, secure, create connection to, hold, pay for, create business relationship with, use transmittables to secure or book, schedule, inquire about, etc.) may be, which may include but not limited to (e.g., a friend, human, robot, security, a friend on app or platform, another creator, another user, another person, another public person, a family member, a friend, an acquaintance, etc.) In some embodiments, users may choose whether or not (e.g., user, person, entity, 3rd party, etc.) want to be available to be booked as a, which may include but not be limited to (e.g., safety chaperone, safety guard, friend, person there, supporter, safety person, security, etc.) which may be, which may include but not limited to an: (e.g., opt-on to be included, or a manually included, or an application process, etc.) as a potential option to be booked for a, which may include but not be limited to (e.g., date, connection, 'safety date' or a 'safety security' or a 'safety bestie' or a 'safety person' or a person that attends the date secretly and/or makes sure the safety and security of the other person, etc.) In some embodiments, this 'safety chaperone' may be paid by (e.g., another user, that user may be able to private, public, or only known between two 'creators, models, or users of the platform, part of the bill, part of the price, included in the price, security included in the price, etc.)

In some embodiments, which may include but not be limited to (e.g., 'safety chaperones, security, support, or security,' or 'users of the safety chaperone' etc.) may obtain, which may include but not be limited to (e.g., information, safety information or get informed of safety measures or safety precautions etc.) which may include but not limited to (e.g., before, after, during, later after, etc.) they may include but not limited to (e.g., sign up, before they opt-in, after they opt-in, prior to any date, during date, after date, etc.) In some embodiments, which may include but not be limited to (e.g., 'safety chaperones, security, support, or security, security detail, safety persons, other users, models, etc.) may be, which may include but not be limited to (e.g., outside users of the app or booked with outside users of the platform using potentially 3rd party or integrated, outside person, integrated calendar, or calendar options, or connection options etc.)

that may or may not, which may include but not be limited to (e.g., record or show or store data, or store data etc.) regarding/that there was a safety chaperone, security, supporter, safety person, which may include but not be limited to (e.g., booked/present, there, attending, viewing, etc.) during which may include but not limited to, the: (e.g., connection, date, etc.) In some embodiments, which may include but not be limited to (e.g., 'connection, meeting, or date etc.) which may include but not limited to (e.g., chaperones,' users, persons, security, etc.) may be, which may include but not be limited to (e.g., outside or informed from outside, or internally, or within platform, or from platform, or integrated with platform, etc.) whether, which may include but not limited to (e.g., 3rd party, by mouth, by booking, by virtual booking, etc.) In some embodiments, which may include but not limited to (e.g., 'safety chaperone,' security, etc.) may be, which may include but not be limited to (e.g., recorded or subjected to all of the recording or safety coordinates, or data recording, or location recorded, or data collected from, etc.) that, which may include but not limited to, the: (e.g., models, person, users, 'user' etc.) may be subjected to on a date in order to, which may include but not be limited to (e.g., record all data for the 'date log, record information, collect data, etc.) using any, which may include but not be limited to (e.g., data, management device, device, 3rd party, or any recording, etc.) for any, which may include but not be limited to (e.g., 'date' or any connection or any contractual agreements, etc.)

Figure 144:
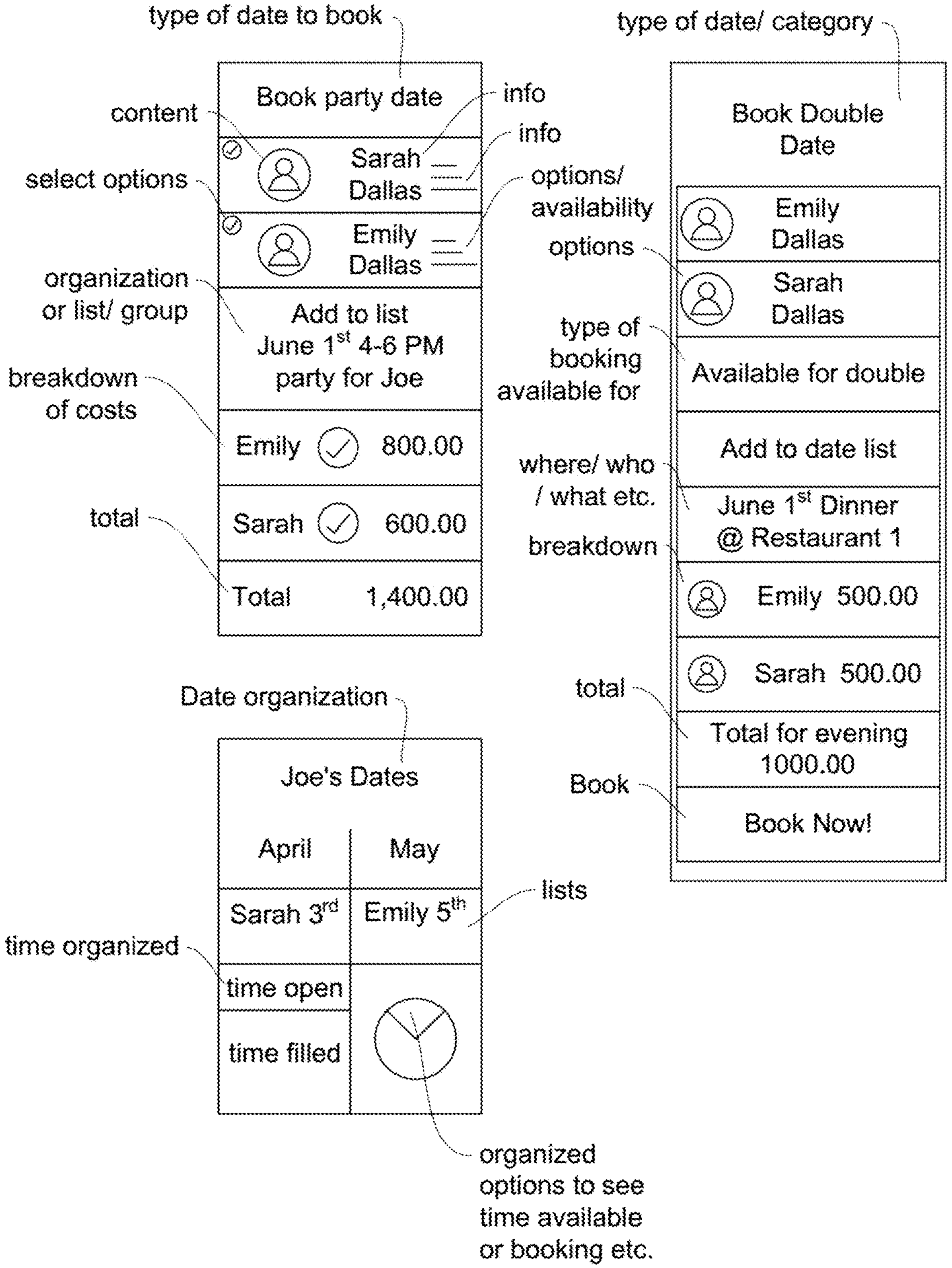

FIG. 144: In some embodiments, there may be options to book, schedule, inquire about, inquire about, inquire regarding, secure, create a connection to, hold, pay for, create a business relationship with, use transmittables to secure or book, schedule, inquire about, etc.) a, which may be, which may include but not limited to (e.g., party date, group date, multiple user date, etc.) In some embodiments, a 'party date' may be, which may include but not be limited to (e.g., one or more 'models, creators, or persons, etc.) which may be, which may include but not limited to (e.g., booked, secured, asked, expected, etc.) for some time, whether, which may be, which may include but not limited to (e.g., virtual, in-person, through the platform, phone, internet, hologram, magic, etc.) In some embodiments, 'party dates' may be booked which may be, which may include but not limited to (e.g., synchronized, staggered, or at any time or for any time, date, period, or combination of any time, date, month, year, user, person, etc.) In some embodiments, there may be a (e.g., general list or a general way, or a visual or a display, or a sign or a colored changing item, or a pie chart, or a chart, or a general way to view or hear, etc.) to see how much time or bookings have been filled, or a way to add (e.g., someone or something or a group or a business or an entity, etc.) to a party list; a party list may consist of adding a (e.g., user or model, etc.) to a (e.g., speed date, date, virtual date, in-person date, group party or a group date, etc.)

In some embodiments, 'party dates' may be partially refunded or partially booked based on each 'party booked.' In some embodiments, 'party booking' may be, which may be, which may include but is not limited to (e.g., separate booking together into one payment, and/or each person may be subjected to the rules, agreement, etc.) separately but booked together as one, etc.) In some embodiments, there may be an option for a 'double or triple date.' In some embodiments, these 'dates' may be virtual, phone, on the screen, hologram, user interface, viewing display, on their phone, in-person, at an event, a duty, a job, anything involving the user, etc.) In some embodiments, there may be a combination of may include but not limited to 'options on the type of booking, change booking type, profiles, profile information, profile types, information, categories, lists, organization of person's or dates, or types of dates, or availability of dates, or availability of times of dates, etc.) In some embodiments, which may include but not be limited to (group dates may occur, or there may be an option for group dates or more than one user booked at the same time for the same entertainment option, or different options, etc.) In some embodiments, users may be able to which may include but not be limited to (opt-in, join, participate, view, see, come to, be included, not included, pay for, not pay for, be paid for, etc.) to, which may include but not be limited to (e.g., allowing dates that have more than one person, or not allow to be booked for a 'more than one person option' etc.) In some embodiments, 'group dates' may give a, which may include but not be limited to (e.g., paying user, or a user that is exchanging something of value or assets) in exchange for multiple users to: (e.g., make a connection, book or date, etc.) In some embodiments, there may be a 'party option' or an option such as 'book multiple users.' In some embodiments, multiple users may be defined but not limited to as (e.g., 'more than one user at a time, multiple users, two or more, one or more, groups, staggered groups, different activities, different days, different times, etc.) In some embodiments, which may include but are not limited to, the: (e.g., buy date, bidding/auction date, subscriptions, unlocks, tips, payments, gifts, etc.) may be purchased using any form of assets which may include but are not limited to (e.g., cash, credit, debit, jewelry, car title, site funds, pre-paid funds, 401 k, stock options, stock equity, equity in a business, crypto, digital assets, real estate interest, real estate, etc.) In some embodiments, 'group dates' or 'group users' may be booked through the platform and all paid, which may include but not be limited to (e.g., separately, together, staggered, spread out, installments, credit, funds, assets, etc.) may be depending on if they meet the contractual 'minimal agreements,' or agreements, which may include but not be limited to (e.g., 'showing up, staying for the duration, check-in, check-out, time stamp, time record, time and data record, location, time and data record, coordinate(s), etc.) In some embodiments, a group date may be booked altogether, and some users may not meet the entire agreement but mostly, generally, or overall meet the agreement, such as, which may include but not be limited to ('one person left early, or one person got sick, etc.) Some embodiments, which may include but are not limited to ('double, triple, or group dates, staggered, same day, different day, different settings, different locations, traveling, etc.'), may be all booked together or booked separately. In some embodiments, there may be discounts for booking groups; there may not be discounts.

In some embodiments, user may be able to choose to accept a, which may include but not be limited to (e.g., 'booked person, paid person,' etc.) to bring their friend, or bring a 'plus one' or 'bring a family member, or bring a roommate, or bring a friend, or bring another person' etc.) In some embodiments, users may not be able to deny a user to bring a safety person due to any circumstances such as, which may include but not be limited to (e.g., or may not know of a safety person, may not approve, may not want that person to have safety persons near, wanting to get a person alone, or may be able to deny the request a safety person, or may not be able to deny if someone else is there, etc.) In some embodiments, a 'bidder, which may include but not be limited to (e.g., a bidder may be defined as any person that is paying for a service or a connection or a date, or anything etc.) may be choose to pick a 'group date' which may include 'model,' which may include but not be limited to (e.g., plus one or more or more 'creators' 'models' etc.) to accompany the, which may include but not be limited to (e.g., 'bidder' 'fan' or 'date buyer' etc.) to the entertainment option which may include but not limited to (e.g., dinner, lunch, coffee, pre-approved date choice, virtual, game, show, live, event, meeting, etc.) In some embodiments, there may be calendar screen or a, which may include but not be limited to (e.g., breakdown, itemized, receipt, invoice, total, partial, breakdown, bill, summary of, total, etc.) screen or an availably screen that may show suggestions, which may include but not be limited to (e.g., persons from categories, lists, created lists, favorites, suggestions, AI created lists, machine learning lists, platform suggestions, most clicked, type lists, etc.) In some embodiments, the suggestions may be easily addable to, which may include but not be limited to (e.g., calendar or to times available, availability, open areas, open time periods, times to be booked, etc.) In some embodiments, calendar openings may, which may include but not be limited to (e.g., show and suggest to fill user in on each time by using AI or any type of suggestion whether showing, telling, suggesting, adding etc.) In some embodiments, persons may be added to, which may include but not be limited to (e.g., times and days etc.) and/or person only has to, which may include but not be limited to (e.g., check out or pay, etc.) In order to, which may include but not be limited to (e.g., secure the booking etc.) In some embodiments, persons may, which may include but not be limited to (e.g., appear, be suggested, etc.) which may include but not be limited to (e.g., on calendar or suggestions to be added to calendar or to be booked, or to be clicked on, or to be considered, or to be messaged, etc.)

In some embodiments, there may be a calendar screen or a, which may include but not be limited to (e.g., breakdown, itemized, receipt, invoice, total, partial, breakdown, bill, a summary of, total, etc.) screen or an availability screen that may show suggestions, which may include but not be limited to (e.g., persons from categories, lists, created lists, favorites, suggestions, AI created lists, machine learning lists, platform suggestions, most clicked, type lists, etc.) In some embodiments, the suggestions, offers, tips, and recommendations may be easily addable to, including but not limited to (e.g., calendar or to times available, availability, open areas, open periods, times to be booked, etc.) In some embodiments, calendar openings may include but are not limited to (e.g., show and suggest to fill the user in on each time by using AI or any suggestion whether showing, telling, suggesting, adding, etc.) In some embodiments, persons may be added to, which may include but not be limited to (e.g., times and days, etc.) and/or person only has to, which may include but not be limited to (e.g., check out or pay, etc.) To, which may include but not be limited to (e.g., secure the booking, keep the booking, confirm, etc.) In some embodiments, persons may, which may include but not be limited to (e.g., appear, be suggested, etc.), which may include but not be limited to (e.g., on the calendar or suggestions to be added to the calendar or to be booked, or to be clicked on, or to be considered, or to be messaged, etc.)

In some embodiments, there may be an intelligent matching AI-connecting system that suggests, which may include but not be limited to (e.g., 'matches or users or persons, or content, or platform content, or user content, or user information, or profiles, or lives, or live shows, or live events, or current events, or bookings, or suggestions for bookings, or virtual bookings, etc.) which may include but not be limited to (e.g., computing operations, machine learning, AI, manual input, tracking, data, or other factors, etc.) The system may employ various techniques to optimize the matching AI-connecting, process, and improve user satisfaction. In some embodiments, the system may be adaptable to a wide range of preferences. It may be learned from user behavior to make it more accurate, including but not limited to (e.g., 'suggestions' or 'data collection' over time, etc.) In some embodiments, there may be options such as viewing users' calendars and filtering or category options (e.g., 'location, type of date, models, creators, etc.) In some embodiments, there may be options such as lists or profiles shown or content shown that may show, which may include but not be limited to (e.g., 'in-person dates available' or 'live calendar, timing method data, timing data method, timing process data,' or 'types of bookings available' or 'date options available' etc.) In some embodiments, there may be a user interface where the user may be able to see upcoming, daily or monthly, weekly, or any period of, which may include but not be limited to (e.g., 'connections' or 'booking' or dates' or suggestions, or others calendars, or person's calendar, or suggested users, or live shows, or unlocked content, or new content, or a feed, or suggestions, or live information, or current information, etc.) In some embodiments, there may be a, which may include but not be limited to (e.g., breakdown, itemized, receipt, invoice, total, partial, breakdown, bill, summary of, total, etc.) of today's schedule or any time period, which may include but not be limited to (e.g., a time period of time, schedule, a suggested schedule, suggested booking, a suggested time block etc.) which may include but not be limited to (e.g., user or time or any type of suggestions, actual booked persons, checkout options to book, schedule, inquire about, inquire about, inquire regarding, secure, create connection to, hold, pay for, create business relationship with, use transmittables to secure or book, schedule, inquire about, etc.) more users, or to book, schedule, inquire about, inquire about, inquire regarding, secure, create connection to, hold, pay for, create business relationship with, use transmittables to secure or book, schedule, inquire about, etc.) users, availability of person, availability of other users, matches, schedule matching AI-connecting, a calendar, which may include but not be limited to (e.g., breakdown, itemized, receipt, invoice, total, partial, breakdown, bill, summary of, total, etc.) future calendar's, which may include but not be limited to (e.g., breakdown, itemized, receipt, invoice, total, partial, breakdown, bill, summary of, total, etc.) of time person is available, which may include but not be limited to (e.g., breakdown, itemized, receipt, invoice, total, partial, breakdown, bill, summary of, total, etc.) of types of date, which may include but not be limited to (e.g., breakdown, itemized, receipt, invoice, total, partial, breakdown, bill, summary of, total, etc.) s person is available, hours person or user is available, funds available, credit lines available, money in account, assets, financial (e.g., breakdown, itemized, receipt, invoice, total, partial, breakdown, bill, summary of, total, etc.) s of 'credit lines' or money, availability of users, funds, money, suggested users, book virtual, book talk, book chat, book video chat, book video meeting, book voice conversation, book in person, live shows, promoted show, pre-recorded shows, persons, suggestions, calendar bookings, settings, user settings, notifications, live or current availability etc.))

Pre-chosen and listed closed: In some embodiments, which may include but not be limited to (e.g., creators, persons, users, models, etc.) may have 'pre-picked" suggestions for their, which may include but not be limited to (e.g., friend, other model, other creator, other user etc.) which may include but not be limited to (e.g., persons, chosen persons, appointed person, 3rd party chosen persons, creator chosen person, etc.) that are also on the platform or anywhere, which may include but not be limited to (e.g., off the platform or a 3rd party, etc.) that may appear on, which may include but not be limited to (e.g., their profile, information packet, information suggestion on the platform, on any advertisements, etc.) In some embodiments, 'pre-picked,' which may include but not be limited to (e.g., friend, other model, other creator, other user etc.) may be chosen to, which may include but not be limited to (e.g., appear on their profile or chosen to be hidden, or be chosen to be shared, etc.) with only specific, which may include but not be limited to (e.g., 'bidders' 'potential bidders' 'fans' or a part of the 'subscription unlocks' etc.) which may then show who the, which may include but not be limited to (e.g., 'creator/model' person, user, etc.) has available as suggestions for their, which may include but not be limited to (e.g., friend, other model, other creator, other user etc.) to add to the potential, which may include but not be limited to, which may include but not be limited to (e.g., connection, 'date' etc.) chosen by, which may include but not be limited to (e.g., 'bidder, user, person, paying person, etc.) may be choose to not allow or allow, which may include but not be limited to ('dates' connections, lives, working with, etc.) with any other, which may include but not be limited to (e.g., friend, other model, other creator, other user etc.) users, person, on the platform, user interface, or platform etc.) which may include but not be limited to (e.g., friend, other model, other creator, other user etc.) meaning, which may include but not be limited to (e.g., 'other creator or models on or off the platform, user interface, or platform etc.) In some embodiments, model may choose to, which may include but not be limited to (e.g., only allow, allow, opt-in, accept etc.) 'group' dates with these persons, or be open to 'other, which may include but not be limited to (e.g., friend, other model, other creator, other user etc.) On the, which may include but not be limited to (e.g., platform, user interface, etc.) In some embodiments, 'other, which may include but not be limited to (e.g., friend, other model, other creator, other user etc.) may mean other women/persons/creators on the (site, platform, or others, user, etc.) that the 'creator' may not know personally or knows personally, or wants to use for business or personal purposes, etc.)

Pre-chosen and listed closed: In some embodiments, which may include but not be limited to (e.g., 'Creators, persons, users, models, etc.) may have 'pre-picked" suggestions for their, which may include but not be limited to (e.g., friend, another model, another creator, another user, etc.) which may include but not be limited to (e.g., persons, chosen persons, appointed person, selected 3rd party persons, creator chosen person, etc.) that are also on the platform or anywhere, which may include but not be limited to (e.g., of the platform or a 3rd party, etc.) that may appear on, which may include but not be limited to (e.g., their profile, information packet, information suggestion on the platform, on any advertisements, etc.) In some embodiments, 'pre-picked,' which may include but not be limited to (e.g., friend, other model, other creator, other user etc.) may be chosen to, which may include but not be limited to (e.g., appear on their profile or chosen to be hidden, or be chosen to be shared, etc.) with only specific, which may include but not be limited to (e.g., 'bidders' 'potential bidders' 'fans' or a part of the 'subscription unlocks' etc.) which may then show who the, which may include but not be limited to (e.g., 'creator/model' person, user, etc.) has available as suggestions for their, which may include but not be limited to (e.g., friend, other model, other creator, other user etc.) to add to the potential, which may include but not be limited to, which may include but not be limited to (e.g., connection, 'date' etc.) chosen by, which may include but not be limited to (e.g., 'bidder, user, person, paying person, etc.) may be choose to not allow or allow, which may include but not be limited to ('dates' connections, lives, working with, etc.) with any other, which may include but not be limited to (e.g., friend, other model, other creator, other user etc.) users, person, on the platform, user interface, or platform etc.) which may include but not be limited to (e.g., friend, other model, other creator, other user etc.) meaning, which may include but not be limited to (e.g., 'other creator or models on or off the platform, user interface, or platform etc.) In some embodiments, the model may choose to which may include but not be limited to (e.g., only allow, allow, opt-in, accept, etc.) 'group' dates with these persons or be open to 'other, which may include but not be limited to (e.g., friend, another model, another creator, another user, etc.) On the, which may include but not be limited to (e.g., platform, user interface, etc.) In some embodiments, 'other, which may include but not be limited to (e.g., friend, another model, another creator, another user, etc.), may mean other women/persons/creators on the (site, platform, or others, user, etc.) that the 'creator' may, which may include but not be limited to (e.g., not know personally or knows personally, or wants to use for business or personal purposes, etc.) In some embodiments, 'platform, users, which may include but not be limited to (referred to as 'creators') have the option to suggest other users, which may include but not be limited to (referred to as (e.g., friend, another model, another creator, another user, etc.) to appear on their profile, advertisement materials, and information packets. In some embodiments, which may include but not be limited to ('pre-picked, or self-picked, or chosen') (e.g., friend, another model, another creator, another user, etc.), may be made visible or hidden to certain audiences, such as 'bidders,' 'potential bidders,' or 'fans.' In some embodiments, a subscription may also unlock the option to view a creator's suggested (e.g., friend, another model, another creator, another user, etc.). In some embodiments, creators can allow or disallow dates with their suggested (e.g., friend, another model, another creator, another user, etc.) or only allow group dates. In some embodiments, users may also be open to dates with other users on the platform, user interface, whom they do not personally know."

In some embodiments, there may be an option for, which may include but not be limited to (e.g., open-for-friend-model-creator-group-dates, open for others to join dates, or open for adding on dates, or open for others to add on dates, or open to party dates, or open to group dates, etc.): In some embodiments, 'bidder' or 'high-value dater may choose any group of women to go on a date with as a 'package deal.' The 'creator' or 'model' have to individually 'agree' on their profile/settings/with the platform that the 'model' is 'available' for 'open group dates with other (e.g., a friend, another model, another creator, another user, etc.) On the platform, the user interface, 'open for model-group dates,' may suggest, with artificial intelligence or other means in the suggestion for 'group dates' next to her picture, pictures of other 'potential group date options.' In some embodiments, These options may be chosen by computing operation and artificial intelligence to suggest potential 'group packages' to the potential 'bidder' 'fan' 'high-value dater (high-value dater may be defined as any person spending money or using platform) In some embodiments, 'paying person' may have the option to choose any group of users to go on a date/connection with as a package/or grouped deal paid for separately or at one time or paid each or paid together. In some embodiments, the 'models (defined as any person being paid) may have the option to agree to participate in open group dates with other women on the platform and user interface; in some embodiments, artificial intelligence may suggest potential group date options and package options to you. In some embodiments, suggestions may be based on, including but not limited to (e.g., computing operations, artificial intelligence, user preferences, user feedback, etc.) Closed-model-group-dates: In some embodiments, If the, which may include but not be limited to (e.g., 'creator' etc.) may not want to go on, which may include but not be limited to (e.g., 'Model-group dates with other women or models or persons, etc.) On the, which may include but not be limited to (e.g., platform, user interface, etc.) For example, which may be including but not limited to, which may include but not be limited to (e.g., that the model may not know, may know' etc.) she, which may include but not be limited to (e.g., she may be defined as any person on platform or any person being paid etc.) the creator may be choose to, which may include but not be limited to (e.g., opt out of that etc.) and potentially choose to only/choose to opt-in to, which may include but not be limited to (e.g., Closed-model-group-dates only etc.) In some embodiments, which would then show on her profile that, which may include but not be limited to (e.g., the user or she, etc.) which may include but not be limited to (e.g., prefers, only, etc.) goes on group dates with a choice of 'one or more' of the, which may include but not be limited to (e.g., 'known, accepted, pre-approved, chosen, etc.) which may include but not be limited to (e.g., friend, another model, another creator, another user, etc.) listed on her, which may include but not be limited to (e.g., profile/settings/platform information, etc.) In some embodiments, this may create a, which may include but not be limited to (e.g., 'package deal' and the 'bidder' may have to pay a 'premium,' which may include but not be limited to (e.g., an additional fee, or a larger sum, or more money, or more distribution of money etc.) to be able to, which may include but not be limited to (e.g., opt-in or have the option to book, schedule, inquire about, inquire about, inquire regarding, secure, create connection to, hold, pay for, create business relationship with, use transmittables to secure or book, schedule, inquire about, etc.) which may include but not be limited to (e.g., multiple women, multiple creators, multiple models, add additional models, more than one model at a time, etc.) In some embodiments, (e.g., 'women' may be defined as any person on the platform or paid person at any time. In some embodiments, the 'creator (creator may be defined as any person being paid, etc.) may be getting paid 'more' for group dates that are open to there may be an option for, which may include but not be limited to (e.g., open-for-friend-model-creator-group-dates, or open for others to join dates, or open for adding on dates, or open for others to add on dates, or open to party dates, or open to group dates, etc.) 'In some embodiments, the second highest paid may be 'closed-model-group, which may include but not be limited to (e.g., opt-in or option, etc.)

Figure 145:
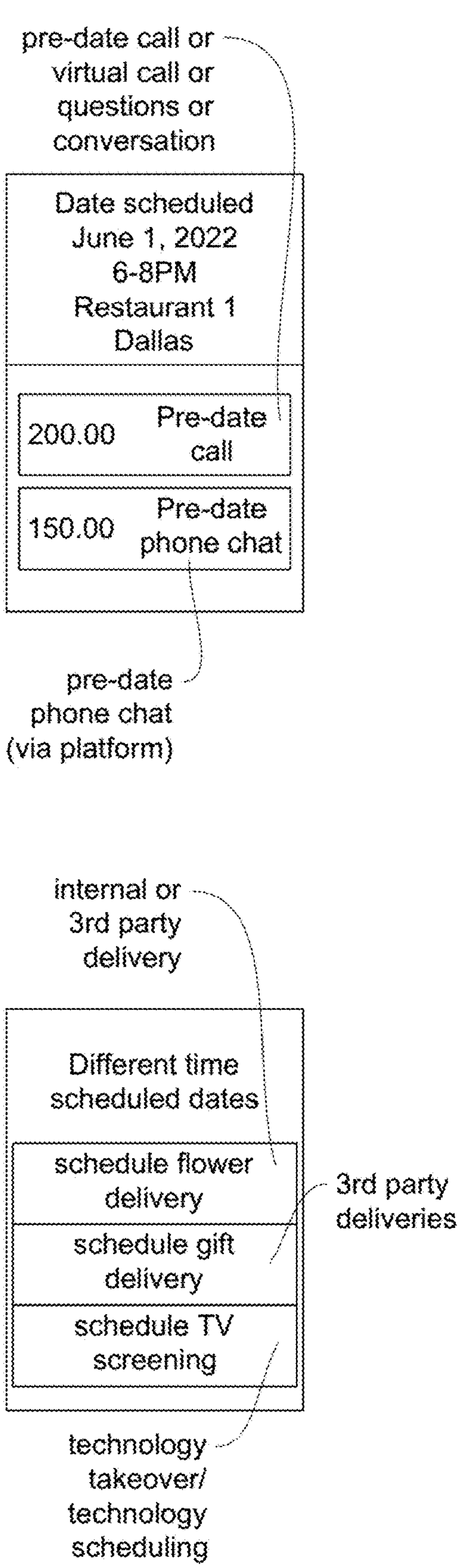
Figure 146:
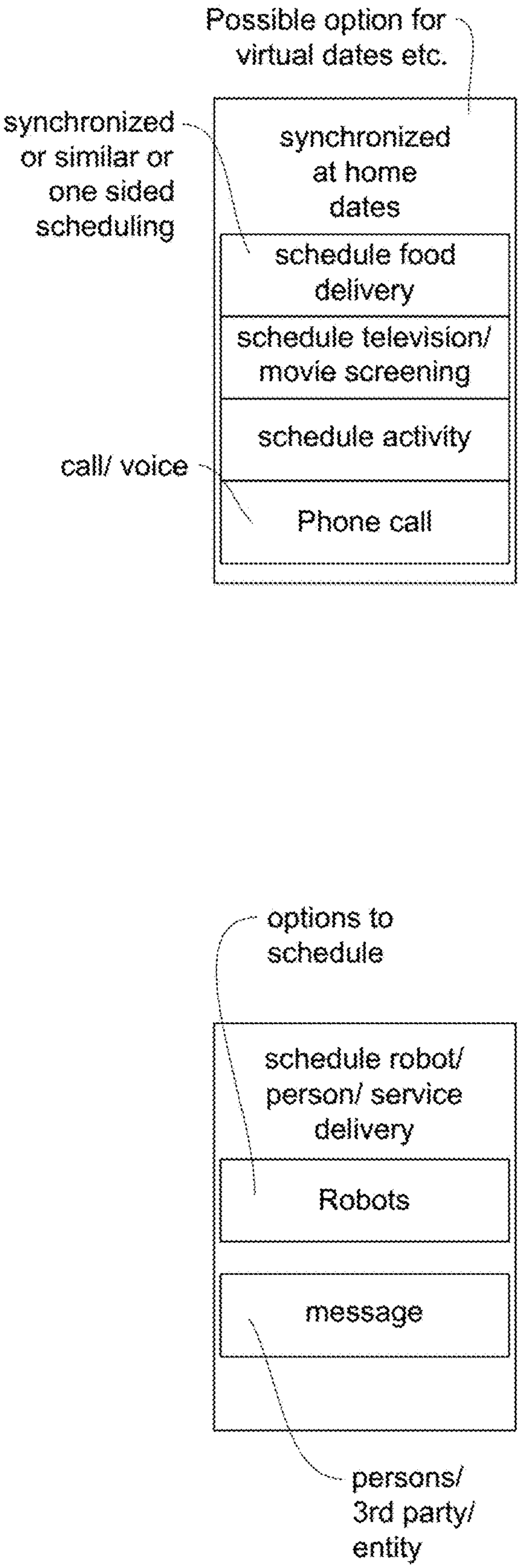

FIG. 145, FIG. 146: In some embodiments, there may be an option which may be, which may include but is not limited to (e.g., whether on a separate screen, hologram, user interface, viewing display, or after a date has been booked, schedule, inquire about, or when deciding for a date or choosing to make a payment, etc.) that a user may, which may be, which may include but not limited to (e.g., schedule a virtual meeting, or voice meeting, or conversation, or send messages, etc.) In some embodiments, this may be, which may be, which may include but not limited to (e.g., before, after, during, etc.) a (e.g., date or virtual date, entertainment options set by anyone or model or user, or conversation, etc.) In some embodiments, (e.g., prices, price ranges, general pricing, general transmittables, etc.) may be, which may be, which may include but not limited to (e.g., different after payment has been made or schedule has been determined, or prices, price ranges, general pricing, general transmittables, may be the same across the board, etc.) In some embodiments, users may have the option to, which may be, which may include but not limited to (e.g., message, schedule call, schedule meeting, schedule questions, have interviewed, etc.) before or after the date has been paid for or determined or considered, or as a public or private user, or as a registered user, or as any person using the platform or using 3rd party, etc.) In some embodiments, payments may be made for any which may be, which may include but not limited to (e.g., voice, in-person, virtual, statement, questions, time spent, gifts, arrangements, meeting, time spent, etc.) In some embodiments, payments may be in the form of any asset available or thing of value, etc.) In some embodiments, there may be any type of options to (e.g., schedule or arrange or choose or pre-pay or pre-arrange, for pay, send as a gift, send to another person, put up money for, send gifts or vouchers or gift cards for, etc.) a (e.g., or multiple types of or multiple services or products or dates, etc.) of (e.g., flower delivery, television screening, co-current television or visual screening on monitors or desktops or computing software or display screens may be scheduled or played similar times, massages, hair cutting, beauty services, scheduled flower delivery, synchronized dates at home or at two different locations, scheduled gift delivery, scheduled food delivery services, butler services, in-house or delivery services such as makeup or hair artist, etc.)

In some embodiments, there may be an option to schedule synchronized virtual or in-person dates. Virtual or in-person dates from different locations may be possible in some embodiments. In some embodiments, options for, which may include but not be limited to (e.g., scheduling, ordering, booking, obtaining, etc.) which may include but not be limited to (e.g., food ordering, chef, in-home chef, 3rd party chef, any person for chef, any human service, any robot service, any artificial intelligence service, any computer service, food delivery, media screening, media options, activity options, 3rd party vendors, 3rd party's such as hair and makeup, or 3rd party services, or 3rd party entities, etc.) Some embodiments may include but not be limited to (e.g., services or goods, etc.) may be available to, which may include but not be limited to (e.g., schedule at different times or at the same time, etc.) In some embodiments, which may include but not be limited to (e.g., any meeting, any date, virtual at-home meeting, etc.) may take place such as 'automatic or manual food delivery at, which may include but not be limited to (e.g., two or more locations, or at one location, or platform scheduling dating such as 'pre-determined or pre-picked dates' or pre-scheduled dates, etc.) In some embodiments, there may be options to, which may include but not limited to (e.g., pay or free options, etc.) to, which may include but not limited to (e.g., live stream, live stream a 'movie,' or game, or entertainment, etc.) or any form of which may include but not limited to (e.g., content or any form of entertainment, etc.) at the, which may include but not limited to (e.g., same time, at different times, pause, top, record, not record, live only, pre-recorded live, streaming, regular streaming, no talking, talking, etc.) In some embodiments, the 'free or paid option' to stream, watch, together, time spent together, which may include or not include a, which may include but not limited to (e.g., button, clicker, beginning, start, etc.) to begin which may include but not limited to (e.g., have a (e.g., timer, time stamp, location stamp, business location stamp, confirmation of time, location, data, etc.) or a recorded, or a data collector, etc.) to determine if the 'contractual agreements that were paid or not paid' which may include but not limited to (e.g., went through or was obtained, etc.) In some embodiments, there may be options to 'pay' to do, which may include but are not limited to (e.g., live streaming, movie, entertainment, virtual entertainment, virtual game, in-person game, or any time spent, etc.) between one, two, or more persons, etc.) In some embodiments, payment may be made before being able to possibly, which may include but is not limited to (e.g., 'join call' or 'join date' or 'join live stream' or 'being movie' or 'begin date or check-in, check-out, time stamp, time record, time and data record, location, time and data record,' or 'start date' or 'call this person' or 'video with this person' etc.) In some embodiments, options to join or book may not be available until 'agreements are met' or 'requirements are met,' which may include but not be limited to (e.g., may have payment or instructions or actions or anything to meet requirements, etc.)

Communication before, during, or after: In some embodiments, payment may be made for the communication of any sort, which may include but not be limited to (e.g., date, for a date, visual date, etc.) In some embodiments, communication may not happen, which may include but not be limited to (e.g., allowed, or be fully viewed, or be accepted, or be responded to, etc.) until, which may include but not be limited to (e.g., payment has been made, or cleared, received, acceptance, agreements, agreed upon, etc.) In some embodiments, a bidder may be able to choose to, which may include but not limited to (e.g., 'pay,' checkout, etc.) which may include but not be limited to (creator chosen or platform, or 3rd party, etc.) a chosen fee or payment to video chat with the may include but not be limited to (e.g., user, creator, model, person, etc.) which may include but not limited to (e.g., before the date/connection, after, during, or before payment or after payment, etc.) In some embodiments, which may include but not limited to (e.g., paying person, the person making payment, etc.) may include but not be limited to (e.g., bidder, paying person, winner, asset paying, etc.) may choose to, which may include but not limited to (e.g., pay or exchange of value of any means, etc.) may include but not be limited to (e.g., set fee, or discovered fee, or bidder fee, or set price, or bidding/auction price, etc.) to, which may include but not limited to (e.g., video chat live with the person being paid for a date or paid to decide if user wants to bid or buy a date with user, or pre-call, or pre-date, or pre-connection, or any connection made, etc.)

In some embodiments, virtual, in-person, or any connection type of meeting may be scheduled at, which may include but not be limited to (e.g., different times, different dates, different cities, different locations, different people, different parties, different entities, 3rd parties, advertisers, advertisements, businesses, etc.) In some embodiments, anything may be able to, which may include but not be limited to (e.g., booked, secured, scheduled, paid for, etc.), which may include but not be limited to (e.g., hair artists, makeup artists, stylists, entertainment, virtual entertainment, persons, parties, security, technology, food, real estate parties, businesses, parties, robots, food delivery, services, AI services, robot services, deliveries, massages, etc.) In some embodiments, a form of technology or any entity such as a, which may include but not be limited to (e.g., television, computer screen, hologram, user interface, viewing display, technology item, device, etc.) may be scheduled to be taken over to, which may include but not be limited to (e.g., perform tasks, stream, play, involve, meet, serve, play a movie for example at a specific time, etc.) Some embodiments may include but not be limited to (e.g., robotics may be scheduled, or persons may be scheduled as any connection or date option, etc.)

Figure 147:
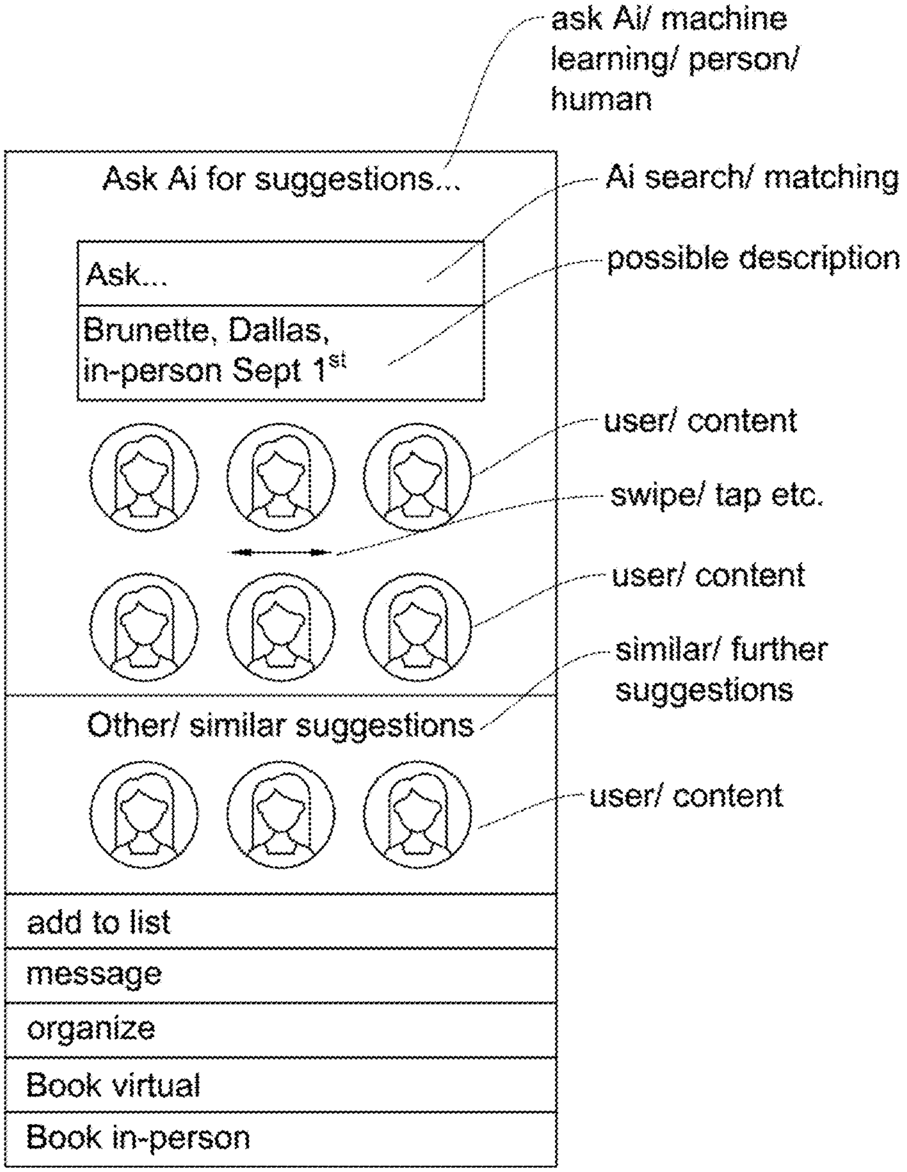
Figure 148:
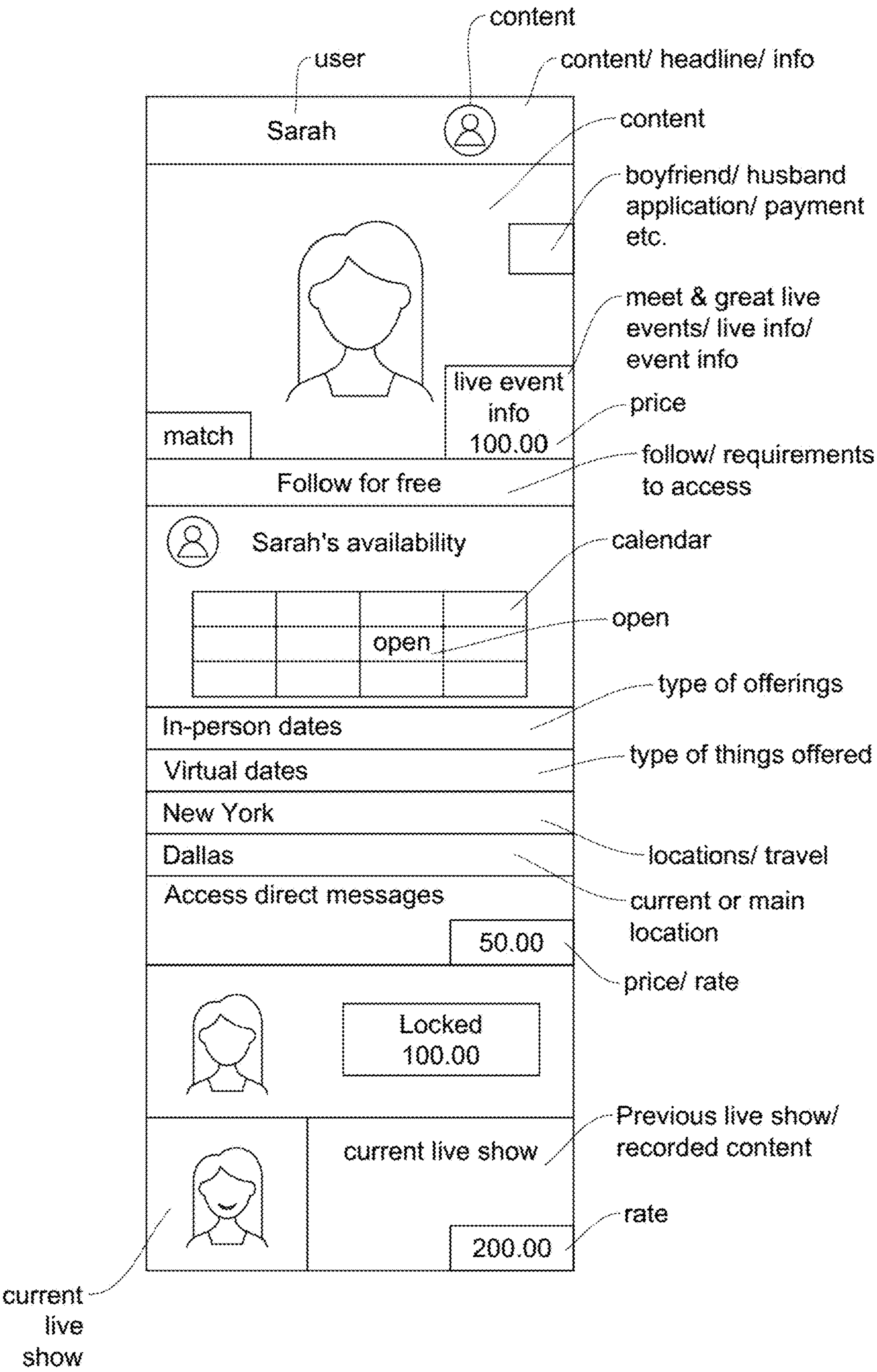
Figure 149:
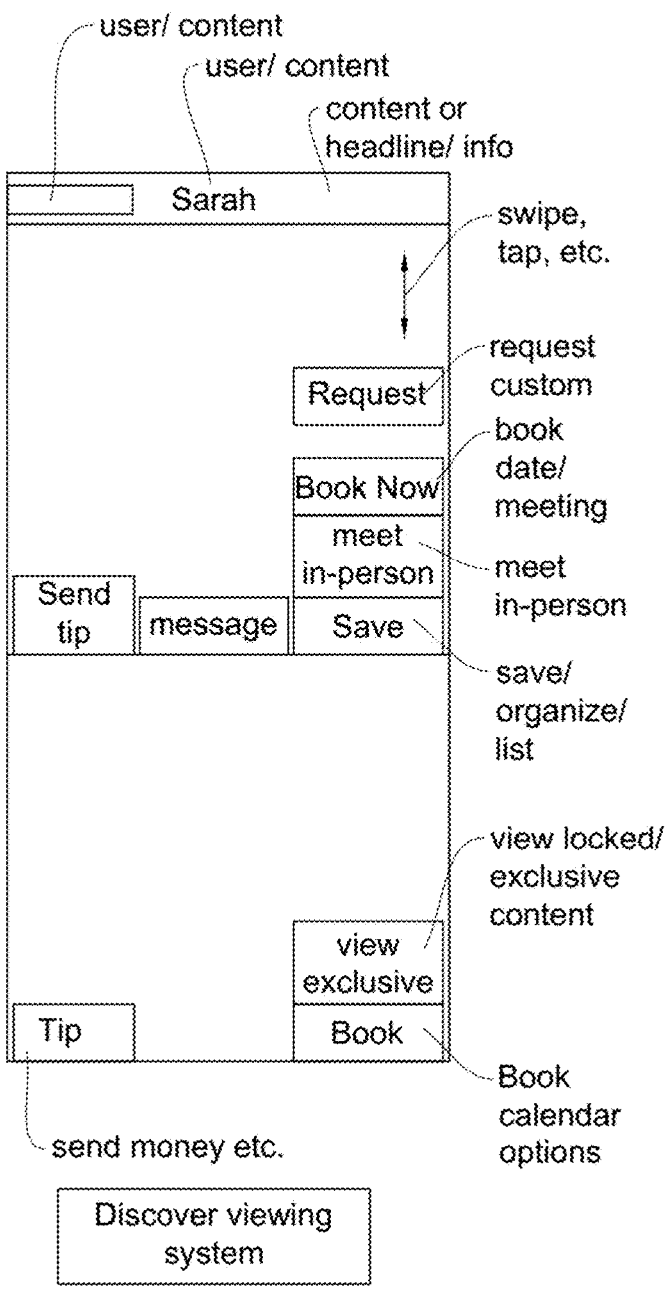

FIG. 147: In some embodiments, there may be, which may include but not be limited to (e.g., an AI, human, robot, bot, 3rd party, entity, computer system, AI system, or machine learning, or robotic version, etc.) may (e.g., request, search for, ask for, for a user of any type, etc.) to (e.g., type in a, or show a, categorize, reveal, match with, match, or discover a, or display a etc.) a (e.g., 'match suggestion' or a 'discover suggestion' or a help suggestion, etc.) In some embodiments, there may be a way to 'type in' or manual input of information, which may include but not be limited to (e.g., a description, a look, a type of photo, anything to find, discover, view, see users or suggestions, etc.) In some embodiments, there may be different ways to: (e.g., sort through content or see content or view content, etc.), which may include but not be limited to (e.g., swiping, tapping, viewing shapes, viewing profiles, viewing content, viewing promo photos, viewing videos, messages, add to list, messaging, organization, organizing, booking virtual, booking in person, viewing the calendar, etc.) In some embodiments, there may be, which may include but not be limited to (e.g., scrolling, tapping, swiping, moving, discovery, etc.) options that may show a combination or one or more may include but not limited to (e.g., calendars of users, users content, calendars, calendar availability, scheduling option, locked content, unlocked content, exclusive content, follow options, users, content, users availability, etc.) In some embodiments, there may be 'discover or view or suggested, etc.) options that may be seen may include but not be limited to (e.g., holograms, scrolling, automatic, discovery, locked, moving, swiping, searching, etc.)

In some embodiments, there may be options to, including but not limited to (e.g., see, view publicize, make public, share privately, etc.) calendar, edit calendar, view calendar, assess calendar. In some embodiments, there may be options to see different views of the calendar by a filter or a category such as which may include but not limited to (e.g., in-person calendar, virtual calendar, personal calendar, travel calendar, travel schedule, work schedule, family schedule, dating schedule, etc.) In some embodiments, there may be ways to view each calendar separately based on categories, tags, and views or see it all together in one calendar. In some embodiments, there may be buttons or options to, which may include but are not limited to (e.g., message, discover more users, discover, search, send money, add funds, view user information, see self-information, settings notifications, user profile(s), availability, etc.)

In some embodiments, there may be, which may include but not be limited to (e.g., suggestion, category options, options, etc.) which may include but not limited to (e.g., book an in-person date' or 'book a virtual date' or 'discover models near you' or 'view models by distance' or 'book models by distance' or 'view private photos now' or 'unlock private photos now' or 'discover her profile' or 'discover new content' or 'view exclusive content' or 'sign in' or 'register' or 'become a model/creator' or 'apply to be a creator' or 'discover creators,' etc.) In some embodiments, there may be, which may include but not be limited to (e.g., scrolling, tapping, swiping, moving, discovery, etc.) options that may show a combination or one or more may include but not limited to (e.g., calendars of users, users content, calendars, calendar availability, scheduling option, locked content, unlocked content, exclusive content, follow options, users, content, users availability, etc.) In some embodiments, there may be 'discover or view or suggested, etc.) options that may be seen by may include but not be limited to (e.g., holograms, scrolling, automatic, discovery, locked, moving, swiping, searching, etc.)

In some embodiments, there may be a, including but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.) In some embodiments, there may be a user interface, which may include but not be limited to (e.g., live, pre-recorded live, content, free follow, follow, add to date list, add to a category, unlocked content, locked content, suggestions, user suggestions, ask AI question, ask user questions, price to send message, price to chat, price to join, locked content with price, locked content to meet requirements, etc.) In some embodiments, there may be options to (e.g., move, scroll, switch, disappear, reappear, swipe, etc.) any, which may include but not be limited to (e.g., content or items, etc.)

In some embodiments, there may be a, which may include but not be limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.)

FIG. 148, FIG. 149, FIG. 150, FIG. 151: In some embodiments, there may be options such as, which may include but not be limited to (e.g., 'follow for more access, follow to see content, follow to see locked and unlocked content, follow to see availability, calendar availability, scheduling option, calendar general availability, see availability, send gifts, send money, donate money, pay for items, pay for a date, send gift for date, fund your account to pay for features or dates or gifts on platform, add credits to account, add credits to anyone's account on platform, send gift card to someone, reserve or gift a date for someone else, send an in-person date to someone, send an in-person date to a friend or family or co-worker, send a virtual date to a friend or family or coworker, gift someone a date, gift someone a virtual date, send a model a gift in exchange for a date, send a model products or services or vouchers that may not be refundable in exchange for her time such as a date or a conversation or a date or an in-person date or a virtual date, pay for any features or any offerings on platform using 3rd party funds or credits or points from a credit card, pay in installments for a date, pay for a date using pre-pay or pay later or pay over time or save up to pay of date before it unlocks, (a date can be for one person or multiple persons, groups, or entities,) view live show, message for payment, payment messaging options, live shows, live streams, pre-recorded shows or movies or pictures, prerecorded media, exact times and dates of availability, follow for direct messages, click, swipe, tap, share, etc.) for may include but not be limited to (e.g., access or message or content or see calendar, or match with, or view their section, or view their profile, or view their content, or see their photos or see their content, etc.) In some embodiments, there may be a combination may include but not limited to (e.g., user, content, follow or requirements to see content, calendars, calendar availability, scheduling option, times available, things that may be booked, done, meetings, something that person or user offers, locations, travel information, location information, types of items or services offered, locations or distances offered, virtual, or in-person, dates or no dates, virtual dates or no dates, messages accepting, accepts DMs, prices, price ranges, general pricing, general transmittables, rates, meet and greets, live vents, live shows, live shows whether locked or unlocked, current lives show, information about lives, information about going live, information about events, quotes, match, organize, organize to list, organize to information, organize for date, money or asset acceptance, accepts pictures, accepts personal photos, accepts content, etc.)

In some embodiments, there may be a, including but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.) In some embodiments, there may be content, or items may include but not be limited to (e.g., surrounded by or having a similar area with, or somewhere near or on the same screen whether hologram, digital, etc.) where there may be similar to may include but not limited to (e.g., user, content, headlines, headline content, profile information, content whether moving or stationary or 3d or 4d, message options, send money or assets options, tip, view exclusive content, view locked content, book now in-person options, request custom content or custom information or custom requests, or custom items, or book now, or view calendar, or view availability, etc.) In some embodiments, there may be options to include but not be limited to (e.g., tapping, swapping, switching, watching, moving, etc.) In some embodiments, this may be a type of a, including but not limited to (e.g., discovery view system, discovery, view, view system, sorting, categorizing, separating, etc.)

Payment or Asset Installments, Gift-card, Outside Funding For Users or Persons: In some embodiments, there may be a process to have a 3rd party pay platform directly from outside platform which may include but not limited to (e.g., installment payments or outside asset exchange payments, or a credit line, or a debit line, or a loan, etc.) In some embodiments, user may be able to choose 'pay in installments' which would allow user to, which may include but not be limited to (e.g., pay in installments, create installment plan, have 3rd party pay us in full and pay installments to 3rd party, etc.) potentially through a, which may include but not limited to (e.g., 3rd party, entity, person, other person, user etc.) In some embodiments, platform may obtain which may include but not limited to (e.g., full payment, asset, or exchange of value) while user is paying 3rd party for installment payments, may include but not limited to (e.g., bank, credit card, or credit line etc.) In some embodiments, there may be options for 'gifting a date,' which may include but not be limited to (e.g., outside person's paying for the entirely or portion of a 'date' or 'meeting' or 'connection' or any user's 'requirements' etc.) In some embodiments, outside or internal users may 'gift' another user anything that may require which may include but not limited to (e.g., payments or exchange of value etc.) which may include but not be limited to (e.g., gift a date, gift an in-person date, gift a virtual date, entertainment options set by anyone or model or user, gift a synchronized at home date, gift a subscription, gift a subscription to the platform etc.) In some embodiments, outside users may donate for these payments or exchanges of value to be made using potentially any type of assets such as which may include but not limited to (money, crypto, deeds to a house, etc.) In some embodiments, payments may need to be converted to may include but not limited to (e.g., fiat, or crypto, or financial, or standard payment exchange of value) to complete payment prior to payment or booking or exchange is made.

In some embodiments, there may be, which may include but not be limited to (e.g., scrolling, tapping, swiping, moving, discovery, etc.) options that may show a combination or one or more may include but not limited to (e.g., calendars of users, users content, calendars, calendar availability, scheduling option, locked content, unlocked content, exclusive content, follow options, users, content, users availability, etc.) In some embodiments, there may be 'discover or view or suggested, etc.) options that may be seen by may include but not be limited to (e.g., holograms, scrolling, automatic, discovery, locked, moving, swiping, searching, etc.) In some embodiments, there may be options for 'gifting a date,' which may include but not be limited to (e.g., an outside person's paying for the entirely or portion of a 'date' or 'meeting' or 'connection' or any user's 'requirements', etc.) In some embodiments, outside or internal users may 'gift' another user anything that may require, which may include but not limited to (e.g. payments or exchange of value, etc.) which may include but not be limited to (e.g., gift a date, gift an in-person date, giving a virtual date, entertainment options set by anyone or model or user, gift a synchronized at-home date, gift a subscription, gift a subscription to the platform, etc.) In some embodiments, outside users may donate for these payments or exchanges of value to be made using potentially any type of assets, including but not limited to (money, crypto, deeds to a house, etc.) In some embodiments, payments may need to be converted to, including but not limited to (e.g., fiat, crypto, financial, or standard payment exchange of value) to complete payment before payment, booking, or exchange is made.

In some embodiments, there may be options such as, which may include but not be limited to (e.g., 'matching AI-connecting, screens' or 'discovery screens' or user interfaces etc.) that may show, which may include but not be limited to (e.g., booking in person, booking, virtual booking, subscribe, free follow, follow for free, user's calendar, matches calendar, other users' calendars, filters, types, message buttons, home screens, discover, settings, users profile, users calendar, other users calendars, categories, etc.) In some embodiments, users calendars may, which may include but not be limited to (e.g., appear or be used a match, or show, or display, or suggest, etc.) based on any factors such as, which may include but not be limited to (e.g., 'availability, time, appearance, types, categories, general availability, possible similar availability, etc.) In some embodiments, there may be user interface, which may include but not be limited to (e.g., booking options, availability, live information, live, live calendar, timing method data, timing data method, timing process data, general calendar, price per activity, price for date, price per hour, calendar with specific details, etc.) which may include but not be limited to (e.g., breakdown, itemized, receipt, invoice, total, partial, breakdown, bill, summary of, total, etc.) which may include but not limited to, the: (e.g., times during specific day amiable, activities and/or duration, check-in, check-out, time stamp, time record, time and data record, location, time and data record, coordinate(s), s for activities available, price, duration, check-in, check-out, time stamp, time record, time and data record, location, time and data record, coordinate(s), confirmation button, legal documents, legal agreements, date agreements, location, type of category, type of date, partnerships, partner locations, information, open times, possible times, bidding/auction, bidder times, user times, bidding/auction option times, platform, content, user, settings, information, user sign in, register information, contact information, contact for payment, price to contact, add to list, add to category, favorite, book in-person, book virtual, book talk, book chat, book video chat, book video meeting, book voice conversation, prices, price ranges, general pricing, general transmittables, for booking, book for job, price to book, schedule, inquire about, inquire about, inquire regarding, secure, create connection to, hold, pay for, create business relationship with, use transmittables to secure or book, schedule, inquire about, etc.) for job, price ranges, price, changing price ranges, price, changing prices, price ranges, general pricing, general transmittables, information, content, moving content, stationary content, suggestions, users, blog posts, information, posts, small blog posts, large statements, statements, request follow up call, price for follow up call, price for follow up connection, writings, chatting, contact boxes, achievements, information, categories, lists, live streams, past streaming, past content, locked content, unlocked content, etc.)

In some embodiments, there may be a calendar screen or a, which may include but not be limited to (e.g., breakdown, itemized, receipt, invoice, total, partial, breakdown, bill, a summary of, total, etc.) screen or an availability screen that may show suggestions, which may include but not be limited to (e.g., persons from categories, lists, created lists, favorites, suggestions, AI created lists, machine learning lists, platform suggestions, most clicked, type lists, etc.) In some embodiments, the suggestions may be easily addable to, including but not limited to (e.g., calendar or to times available, availability, open areas, open periods, times to be booked, etc.) In some embodiments, calendar openings may include but are not limited to (e.g., show and suggest to fill the user in on each time by using AI or any type of suggestion whether showing, telling, suggesting, adding, etc.) In some embodiments, persons may be added to, including but not limited to (e.g., times and days, etc.), and/or person only has to, which may include but not be limited to (e.g., check out or pay, etc.) To, which may include but not be limited to (e.g., secure the booking, etc.) In some embodiments, persons may, which may include but not be limited to (e.g., appear, be suggested, etc.), which may include but not be limited to (e.g., on the calendar or suggestions to be added to the calendar or to be booked, or to be clicked on, or to be considered, or to be messaged, etc.)

In some embodiments, there may be options for the platform may include but not limited to (e.g., outside, AI, machine learning, chips, etc.) to categorize users based on which may include but not limited to (e.g., earnings, location, distance, how often user is logged in, user time on platform, user income, message response time, tips, outside platforms, outside information, models, entrepreneurs, business owners, career-women, actresses, net-worth, top earners, top tippers, top spenders, categorized spenders, reality stars, content creators, award-winners, favorites, partners, 3rd parties etc.) which may create which may include but not limited to (e.g., automatic, manual, robotic created, human created, etc.) which may include but not limited to (e.g., lists, computing operation, categories, tags, etc.) In some embodiments, there may be an interface or a user interface with, which may include but not be limited to (e.g., introductory profile, intro video, intro content, profile photos, price, buy now, price plus buy-now, market price, platform market price, options to pay in cash, 3rd party links to debt sites, 3rd party sites to redeem value or cash platforms, debit, credit, jewelry, car title, site funds, pre-loaded funds, etc.) In some embodiments, there may be user interface, which may include but not be limited to (e.g., locked profile until requirements are met, live shows, live events, live plus content, live plus no content, live plus options to view more, played show, free show, previewed show, a live show, live options to view profile, live profile, live streaming, live streaming, pre-recorded streaming, pre-recorded shows, pre-made content, in-person date options, booking date options, profile date options, unlock content date options, price of date, price per hour, price for time, availability, price per activity, free follow, options to follow, options to view entire profile, unlock, previews, chat previews, content previews, content, photos, videos, communication, chat boxes, options or areas to share information, communication, options to send tips, suggested user profiles, computing operation chosen profiles, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the Bottom, top, side, anywhere, with other suggestions or profiles, or persons, or promotional material or content or information, etc.) In some embodiments, there may be options to: (e.g., move, scroll, switch, disappear, reappear, swipe, etc.) any, which may include but not be limited to (e.g., user interfaces, content, items, parts of user interface, etc.)

In some embodiments, there may be interface(s) with/and/or content, which may include but not be limited to (e.g., user profile information, user information, options to 'send a tip, message, book date, book meeting, book-in person, follow for free, add to calendar, new cleaner, save, add to list, view calendar, view profile, view exclusive content, view locked content, view unlocked content, view public profile, view private profile, etc.) In some embodiments, there may be options for the user to have an expanded view of 'options' or a non-expanded which may include but not be limited to (expanded may mean view more or see more or scroll more, etc.) view of options. In some embodiments, there may be ways to expand or not expand options, including but not limited to (e.g. tapping, swiping, clicking, voice commands, etc.) In some embodiments, there may be options to swipe or switch between different users or explore users based on a movement, a tap, a swipe, etc.) In some embodiments, there may be options to may include but not be limited to (e.g., click, swipe tap, save, etc.) such as, which may include but not be limited to (e.g., 'this person does in-person dates, or this person does virtual dates, or (e.g., you may, user, person, entity, 3rd party, robot, artificial intelligence, etc.) may follow this person for free, etc.) In some embodiments, these options, which may just be, which may include but not be limited to (e.g., 'informative, viewing, interactional, can interact with, informational, etc.) and not have, which may include but not limited to (e.g., clicking, tapping, saving, etc.) methods, options, etc.)

In some embodiments, there may be an interface or a user interface with, which may include but not be limited to (e.g., introductory profile, intro video, intro content, profile photos, price, buy now, price plus buy-now, market price, platform market price, options to pay in cash, 3rd party links to debt sites, 3rd party sites to redeem value or cash platforms, debit, credit, jewelry, car title, site funds, pre-loaded funds, etc.) In some embodiments, there may be user interface, which may include but not be limited to (e.g., locked profile until requirements are met, live shows, live events, live plus content, live plus no content, live plus options to view more, played show, free show, previewed show, a live show, live options to view profile, live profile, live streaming, live streaming, pre-recorded streaming, pre-recorded shows, pre-made content, in-person date options, booking date options, profile date options, unlock content date options, price of date, price per hour, price for time, availability, price per activity, free follow, options to follow, options to view entire profile, unlock, previews, chat previews, content previews, content, photos, videos, communication, chat boxes, options or areas to share information, communication, options to send tips, suggested user profiles, computing operation chosen profiles, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the Bottom, top, side, anywhere, with other suggestions or profiles, or persons, or promotional material or content or information etc.) In some embodiments, there may be options to: (e.g., move, scroll, switch, disappear, reappear, swipe etc.) any, which may include but not be limited to (e.g., user interfaces, content, items, parts of user interface etc.) In some embodiments, there may be user interface, which may include but not be limited to (e.g., live, pre-recorded live, content, free follow, follow, add to date list, add to category, unlocked content, locked content, suggestions, user suggestions, ask AI question, ask user questions, price to send message, price to chat, price to join, locked content with price, locked content to meet requirements, etc.) In some embodiments, there may be options to: (e.g., move, scroll, switch, disappear, reappear, swipe etc.) any, which may include but not be limited to (e.g., content or items, etc.)

In some embodiments, there may be a, including but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.) In some embodiments, there may be ways to browse or view, including but not limited to (e.g., scrolling, viewing, automatic scroll, automatic disappearing, tapping, matching AI-connecting, switching, etc.) In some embodiments, there may be, which may include but not be limited to (e.g., live events, live streaming, live recordings, pre-recordings, previous content, content, videos, pictures, etc.) that may be located on the user interface whether, which may include but not be limited to (e.g., singular, with others, combined with others, or categorized with others, or a list or a created list, etc.) In some embodiments, there may be options, which may include but not be limited to (e.g., free follow, follow, subscribe, send a message, send a tip, book in person, book virtual, book talk, book chat, book video chat, book video meeting, book voice conversation, messaging, send gift, chat, etc.)

In some embodiments, there may be a may include but not be limited to (e.g., 'free view, subscriber view, follower view, boyfriend view, fan view, etc.) In some embodiments, different 'views' may include or show but not be limited to (e.g., may show a different feed, or a different set of content, or a different set of information, or a different payment method, or a different view etc.) In some embodiments, there may be options to may include but not be limited to (e.g., purchase content, there may be options to view locked content, there may be options to view unlocked content, there may be free previews, there may be calendar options, there may be information, there may be other users, there may be similar users, there may be content, there may be photos, there may be videos, there may be quotes, there may be typed information, there may be non-content information such as writing etc.) In some embodiments, there may be, which may include but not be limited to (e.g., contact information, there may be away to contact that person, there may be follow options, there may be content options, there may be settings options, there may be funds options, there may be user's information options, etc.) In some embodiments, there may be, which may include but not limited to (e.g., pre-made or pre-created or created or entered options or custom options etc.) that may be, which may include but not be limited to (e.g., sent, shown, displayed, editable, changeable, deleted, summoned, requested, etc.) as a, which may include but not be limited to (e.g., chart, letter, options, clickable options, clickable, calendar, timing method, content, display, optional selectable thing for acceptable requests or things that may be requested, etc.) In some embodiments, there may be, which may include but not limited to (e.g., limited items or options for requests or for options such as 'book a video call, book a phone call, send message, request anything, request something here, limited options for request listed here, show calendar, display calendar, give calendar options, message payment options, questions, request types of content, request types of videos, request types of photos, request features, request information etc.) In some embodiments, there may be a, which may include but not be limited to (e.g., screen or a user interface or a public profile or public information etc.) and/or a, which may include but not be limited to (e.g., anyway, public way, user, way, user interface, etc.) to, which may include but not be limited to (e.g., 'book video call, book phone call, book in-person date, follow for free, follow, message, send message, send personalized message, send photo, send video, etc.) In some embodiments, there may be options to, which may include but not be limited to (e.g., schedule things in advance, add to calendar, book and add to calendar, book, schedule, inquire about, things that are immediate such as be able to send a video message, be able to send a private photo, be able to send a question, be able to see private photos, etc.)

In some embodiments, there may be options to pay or not pay to, which may include but are not limited to (e.g., request or schedule video chat, video call, virtual date, entertainment options set by anyone or model or user, in-person date, personalized content, customized entertainment, entertainment, requested entertainment, entertainment, content, entertainment, funny content, messages, a virtual message, a content message, an answer to a question, request discounts, request information, send tip, etc.) In some embodiments, the payment option may be during, before, or after, which may include but is not limited to (e.g., matching AI-connecting, viewing, suggestions, the connection is made, swipe, tap, search, the message is sent, the message is received, preferences is shown, etc.) In some embodiments, there may be interface(s) with/and/or content, which may include but not be limited to (e.g., user profile information, user information, options to 'send a tip, message, book date, book meeting, book-in person, follow for free, add to calendar, new cleaner, save, add to list, view calendar, view profile, view exclusive content, view locked content, view unlocked content, view public profile, view private profile, etc.) In some embodiments, there may be options for the user to have an expanded view of 'options' or a non-expanded which may include but not be limited to (expanded may mean view more or see more or scroll more, etc.) view of options. In some embodiments, there may be ways to expand or not expand options, including but not limited to (e.g. tapping, swiping, clicking, voice commands, etc.) In some embodiments, there may be options to swipe or switch between different users or explore users based on a movement, a tap, a swipe, etc.) In some embodiments, there may be options to may include but not be limited to (e.g., click, swipe tap, save, etc.) such as, which may include but not be limited to (e.g., 'this person does in-person dates, or this person does virtual dates, or (e.g., you may, user, person, entity, 3rd party, robot, artificial intelligence, etc.) may follow this person for free, etc.) In some embodiments, these options, which may just be, which may include but not be limited to (e.g., 'informative, viewing, interactional, can interact with, informational, etc.) and not have, which may include but not limited to (e.g., clicking, tapping, saving, etc.) methods, options, etc.) In some embodiments, there may be interface(s) with/and/or content, which may include but not be limited to (e.g., user profile information, user information, options to 'send a tip, message, book date, book meeting, book-in person, follow for free, add to calendar, new cleaner, save, add to list, view calendar, view profile, view exclusive content, view locked content, view unlocked content, view public profile, view private profile, etc.) In some embodiments, there may be options for the user to have an expanded view of 'options' or a non-expanded which may include but not be limited to (expanded may mean view more or see more or scroll more, etc.) view of options. In some embodiments, there may be ways to expand or not expand options, including but not limited to (e.g. tapping, swiping, clicking, voice commands, etc.) In some embodiments, there may be options to swipe or switch between different users or explore users based on a movement, a tap, a swipe, etc.) In some embodiments, there may be options to may include but not be limited to (e.g., click, swipe tap, save, etc.) such as, which may include but not be limited to (e.g., 'this person does in-person dates, or this person does virtual dates, or (e.g., you may, user, person, entity, 3rd party, robot, artificial intelligence, etc.) may follow this person for free, etc.) In some embodiments, these options, which may just be, which may include but not be limited to (e.g., 'informative, viewing, interactional, can interact with, informational, etc.) and not have, which may include but not limited to (e.g., clicking, tapping, saving, etc.) methods, options, etc.)

In some embodiments, there may be calendar screen or a, which may include but not be limited to (e.g., breakdown, itemized, receipt, invoice, total, partial, breakdown, bill, summary of, total, etc.) screen or an availably screen that may show suggestions, which may include but not be limited to (e.g., persons from categories, lists, created lists, favorites, suggestions, AI created lists, machine learning lists, platform suggestions, most clicked, type lists, etc.) In some embodiments, the suggestions may be easily addable to, which may include but not be limited to (e.g., calendar or to times available, availability, open areas, open time periods, times to be booked, etc.) In some embodiments, calendar openings may, which may include but not be limited to (e.g., show and suggest to fill user in on each time by using AI or any type of suggestion whether showing, telling, suggesting, adding etc.) In some embodiments, persons may be added to, which may include but not be limited to (e.g., times and days etc.) and/or person only has to, which may include but not be limited to (e.g., check out or pay, etc.) in order to, which may include but not be limited to (e.g., secure the booking etc.) In some embodiments, persons may, which may include but not be limited to (e.g., appear, be suggested, etc.) which may include but not be limited to (e.g., on calendar or suggestions to be added to calendar or to be booked, or to be clicked on, or to be considered, or to be messaged, etc.) In some embodiments, there may be calendar screen or a, which may include but not be limited to (e.g., breakdown, itemized, receipt, invoice, total, partial, breakdown, bill, summary of, total, etc.) screen or an availably screen that may show suggestions, which may include but not be limited to (e.g., persons from categories, lists, created lists, favorites, suggestions, AI created lists, machine learning lists, platform suggestions, most clicked, type lists, etc.) In some embodiments, the suggestions may be easily addable to, which may include but not be limited to (e.g., calendar or to times available, availability, open areas, open time periods, times to be booked, etc.) In some embodiments, calendar openings may, which may include but not be limited to (e.g., show and suggest to fill user in on each time by using AI or any type of suggestion whether showing, telling, suggesting, adding etc.) In some embodiments, persons may be added to, which may include but not be limited to (e.g., times and days etc.) and/or person only has to, which may include but not be limited to (e.g., check out or pay, etc.) In order to, which may include but not be limited to (e.g., secure the booking etc.) In some embodiments, persons may, which may include but not be limited to (e.g., appear, be suggested, etc.) which may include but not be limited to (e.g., on calendar or suggestions to be added to calendar or to be booked, or to be clicked on, or to be considered, or to be messaged, etc.)

In some embodiments, there may be an intelligent matching AI-connecting system that suggests, which may include but not be limited to (e.g., 'matches or users or persons, or content, or platform content, or user content, or user information, or profiles, or lives, or live shows, or live events, or current events, or bookings, or suggestions for bookings, or virtual bookings, etc.) which may include but not be limited to (e.g., computing operations, machine learning, AI, manual input, tracking, data, or other factors, etc.) The system may employ various techniques to optimize the matching AI-connecting, process, and improve user satisfaction. In some embodiments, the system may be adaptable to a wide range of preferences. It may be learned from user behavior to make it more accurate, including but not limited to (e.g., 'suggestions' or 'data collection' etc.) over time or at any time. In some embodiments, there may be options such as viewing users' calendars and filtering or category options (e.g., 'location, type of date, models, creators, etc.) In some embodiments, there may be options such as lists or profiles shown or content shown that may show, which may include but not be limited to (e.g., 'in-person dates available' or 'live calendar, timing method data, timing data method, timing process data,' or 'types of bookings available' or 'date options available' etc.)

In some embodiments, there may be an user interface where user may be able to see, which may include but not be limited to (e.g., upcoming, queue, next, coming, suggested, popular, etc.), which may include but not be limited to (e.g., daily or monthly, or weekly, or any time period etc.) of, which may include but not be limited to (e.g., 'connections' or 'booking' or dates' or suggestions, or others calendars, or persons calendar, or suggested users, or live shows, or unlocked content, or new content, or a feed, or suggestions, or live information, or current information etc.) In some embodiments, there may be a, which may include but not be limited to (e.g., breakdown, itemized, receipt, invoice, total, partial, breakdown, bill, summary of, total, etc.) of today's schedule or any time period, which may include but not be limited to (e.g., a time period of time, schedule, a suggested schedule, suggested booking, a suggested time block etc.) which may include but not be limited to (e.g., user or time or any type of suggestions, actual booked persons, checkout options to book, schedule, inquire about, inquire about, inquire regarding, secure, create connection to, hold, pay for, create business relationship with, use transmittables to secure or book, schedule, inquire about, etc.) more users, or to book, schedule, inquire about, inquire about, inquire regarding, secure, create connection to, hold, pay for, create business relationship with, use transmittables to secure or book, schedule, inquire about, etc.) users, availability of person, availability of other users, matches, schedule matching AI-connecting, a calendar, which may include but not be limited to (e.g., breakdown, itemized, receipt, invoice, total, partial, breakdown, bill, summary of, total, etc.) future calendar's, which may include but not be limited to (e.g., breakdown, itemized, receipt, invoice, total, partial, breakdown, bill, summary of, total, etc.) of time person is available, which may include but not be limited to (e.g., breakdown, itemized, receipt, invoice, total, partial, breakdown, bill, summary of, total, etc.) of types of date, which may include but not be limited to (e.g., breakdown, itemized, receipt, invoice, total, partial, breakdown, bill, summary of, total, etc.) s person is available, hours person or user is available, funds available, credit lines available, money in account, assets, financial (e.g., breakdown, itemized, receipt, invoice, total, partial, breakdown, bill, summary of, total, etc.) s of 'credit lines' or money, availability of users, funds, money, suggested users, book virtual, book talk, book chat, book video chat, book video meeting, book voice conversation, book in person, live shows, promoted show, pre-recorded shows, persons, suggestions, calendar bookings, settings, user settings, notifications, live or current availability etc.))

Figure 150:
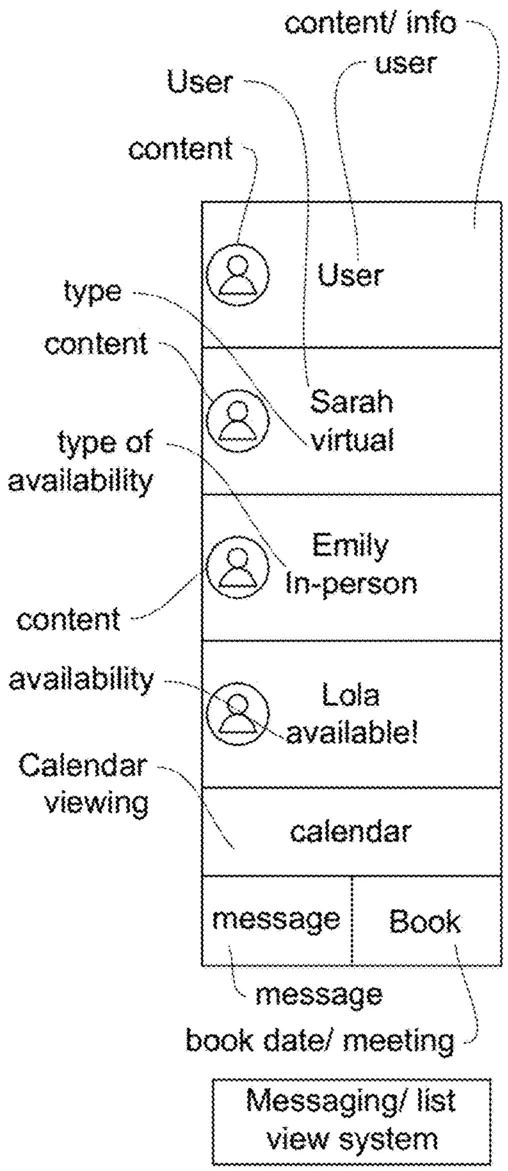
Figure 151:
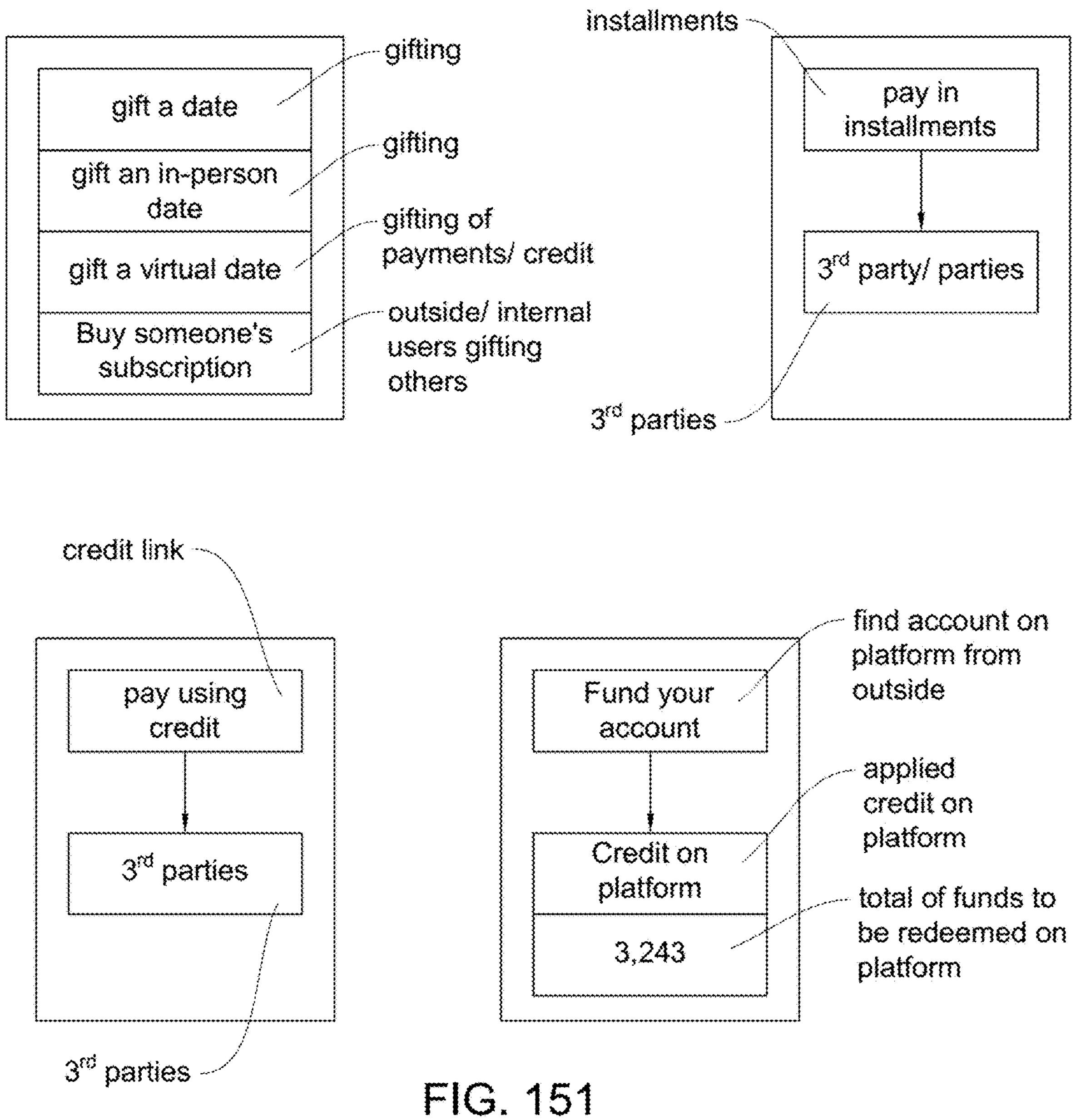

FIG. 150: In some embodiments, there may be a, including but not limited to (e.g., 'messaging system, communication area, communication system, AI-responses, trained responses, etc.) In some embodiments, where there may be, which may include but not limited to (e.g., calendar, calendar system, availability, types, categories, looks, messaging, booking, current or previous availability, types of location, location, distance, city, country, area, user information, user content, organized lists of content or type of category, ways to discover or see more content or categories or calendar matching AI-connecting, etc.)

Figure 152:
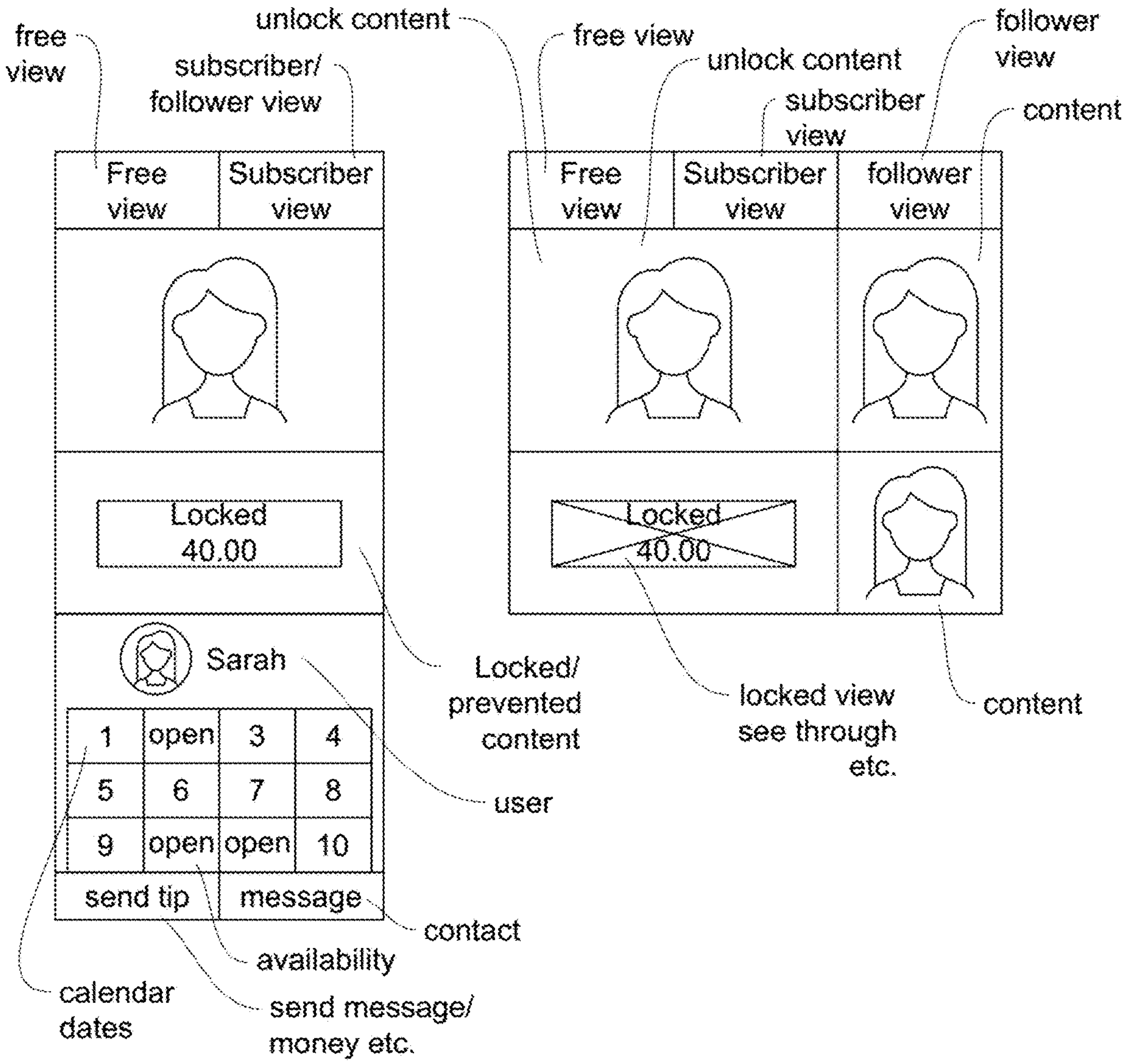

FIG. 152: Some embodiments may include but are not limited to (e.g., 'free view, subscriber view, follower view, boyfriend view, fan view, public view, public or private display, etc.) In some embodiments, different 'views' may include or show, but not be limited to (e.g., may show a separate feed, a different set of content, a different set of information, another payment method, or a different view, etc.) In some embodiments, there may be options to may include but not be limited to (e.g., purchase content, there may be options to view locked content, there may be options to view unlocked content, there may be free previews, locked options to view content, locked options to subscribe, membership only subscriber options, membership only unlocks or content or streams, open schedules, user's date schedule, user's work schedule, user's live schedule, content viewing, content for user or there may be calendar options, there may be information, there may be other users, there may be similar users, there may be content, there may be photos, there may be videos, there may be quotes, there may be typed information, there may be non-content information such as writing, etc.) In some embodiments, there may be, which may include but not be limited to (e.g., contact information, a way to contact that person, there may be following options, there may be content options, there may be settings options, there may be funds options, there may be user information options, etc.)

In some embodiments, there may be options such as, which may include but not be limited to (e.g., 'reserve or pay to reserve, or exchange of value to reserve or to block of, or to change other users calendar or to change personal calendar or both, etc.) In some embodiments, options such as which may include but are not limited to (e.g., price to reserve weekend March 1-3, price to auto-block off each weekend, price to block off weekdays, cost to reserve Fridays lunchtime, price to block of the entire month, price to block of the whole week, price to block off the entire day, or any set period by any user, etc.) In some embodiments, the user may set payment or value exchange to pay from any other user or person. In some embodiments, payment may be accepted or required to block of calendar periods, including but not limited to (e.g., hours, days, months, weekends, years, etc.) and recurring, non-recurring, one-time, etc.) In some embodiments, 'blocking off calendar' may result in a, which may include but is not limited to (e.g., greying' or a 'non-useable or non-bookable' or a 'non-changing' period, etc.), which may be considered under contractual obligations to one met to receive which may include but not limited to (e.g., payment or assets or exchange of value, etc.) In some embodiments, one user sets the price; the other user pays the price. In some embodiments, one user sets asset requirements; another user must meet those requirements. In some embodiments, the user accepts different types of payments or options; another user must meet those payments or requirements. In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.) In some embodiments, the interface may allow, including but not limited to (e.g., charity dating, dating for charity, dating to pay charity, dating for charity donations, charity connections: etc.) In some embodiments, which may include but not limited to (e.g., charity payments, donations, partial donations, proceeds to charity, pledging to charity, donations, payments, money, etc.) may be made whether, which may include but not limited to (e.g., entirely, portion, partial, etc.) to go to charity in exchange for, which may include but not limited to (e.g., charity dating, dating for charity, dating to pay charity, dating for charity donations, etc.) charity connection, etc.) which may include but not limited to (e.g., connection time, period, dates, activities, periods, lunch, dinner, etc.) In some embodiments, which may include but not limited to (e.g., charity payments, donations, partial donations, proceeds to charity, pledging to charity, etc.) may be, which may include but not limited to (e.g., made, sent, gathered, transferred, pledged, etc.) for, which may include but not limited to (e.g., single daters, group daters, more than one dater, entities, two daters, more than two daters, multiple daters, group dates, group sessions, virtual dates, phone calls, meetings, etc.) In some embodiments, whether whole or portion, charity donations may be exchanged for, including but not limited to (e.g., winning bids, payments, exchange of value or any win, booking, activity, date, period passing, etc.) In some embodiments, which may include but not be limited to [(group dates may occur or there may be an option for group dates or more than one user booked at the same time for the same entertainment option, or different options, etc.)]. [In some embodiments, users may be able to, may include but not be limited to (opt-in, join, participate, view, see, come to, be included, not included, pay for, not pay for, be paid for, etc.) to allowing dates that have more than one person, or not allow to be booked for a 'more than one person option' etc.]

In some embodiments, there may be an option for any user to, which may include but not limited to (e.g., block of any users calendar or booking availability or way to book, schedule, inquire about, inquire about, inquire regarding, secure, create connection to, hold, pay for, create business relationship with, use transmittables to secure or book, schedule, inquire about, etc.) or options to, which may include but not be limited to (e.g., book, schedule, inquire about, inquire about, inquire regarding, secure, create connection to, hold, pay for, create business relationship with, use transmittables to secure or book, schedule, inquire about, etc.) In some embodiments, payment or assets may be, including but not limited to (e.g., accepted, used, exchanged, etc.), to block off users' calendars. In some embodiments, payment or assets may block of any, including but not limited to (e.g., period, day, month, year, date, activity, etc.) off of or on or in regards to the calendar. In some embodiments, user one may, which may include but not limited to (e.g., block off, grey, obstruct, change, stop, make unavailable, edit, etc.) multiple other users' which may include but not limited to (e.g., calendar(s), timing data, schedule data, scheduling data, timing methods, schedule data, etc.) In some embodiments, an exchangeable or payment may which may include but is not limited to (e.g., change, make unavailable, block off, change, obscure, change price, change bid, change amount of money, change amount, change date, change time, etc.) which may include but not limited to (e.g., time, availability, usage, viewing, etc.) of which may have but not limited to (e.g., anyone's, someone else's, a user's etc.) which may include but not limited to (e.g., calendar, timing period, period, schedule, etc.) In some embodiments, blocking or greying or non-useable, which may include but not be limited to (e.g., calendar, timing method, schedule method, scheduling method, timing data center, etc.) may be for, which may include but not limited to (e.g., one, none, or more than one users, etc.) In some embodiments, which may include but not limited to (e.g., membership, one-time payment, auto-payment, asset payment, payment, etc.) whether, which may include but not limited to (e.g., one-time or recurring, or platform membership, or user membership, or any payment or exchange of value or no exchange of value, etc.) may result in being able to, which may include but not limited to (e.g., block off, or change, or grey, or make unavailable to any calendar for any user, etc.) In some embodiments, the user interface may show, which may include but not be limited to (e.g., earnings, payouts, referrals, pending payments, pending requests, amounts earned, the amount earned, amount, fees, net payment, gross payment, statement, earnings, profile, statements, taxes, 3rd parties for taxes, 3rd parties, advertisers, advertisements, businesses, outside entities, outside parties, messages, queue, home, profile, messages, earnings from messages, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

Figure 153:
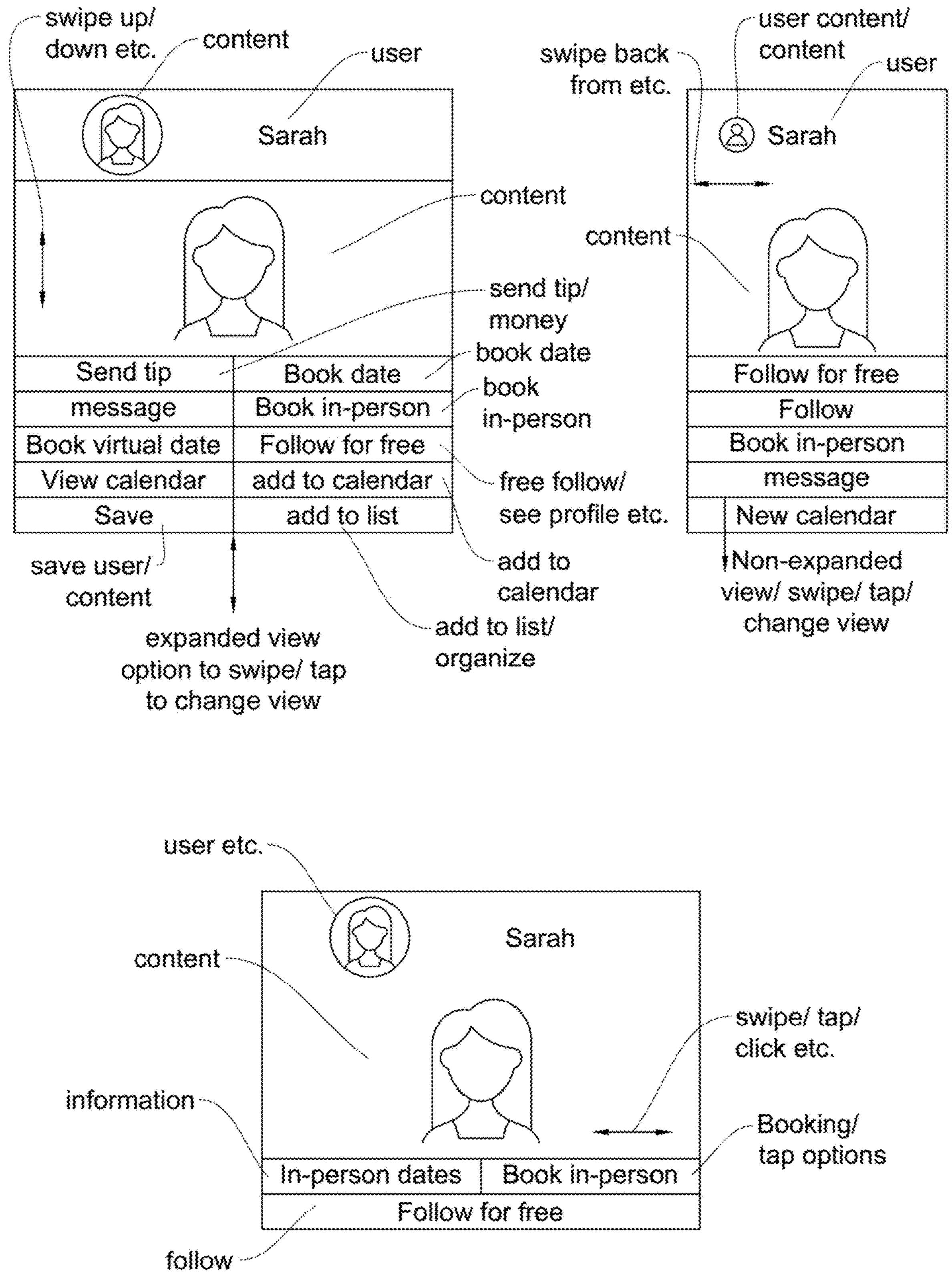

FIG. 153: In some embodiments, there may be interface (s) with/and/or content, which may include but not be limited to (e.g., user profile information, user information, options to 'send tip, message, book date, book meeting, book-in person, follow for free, add to calendar, new cleaner, save, add to list, view calendar, view profile, view exclusive content, view locked content, view unlocked content, view public profile, view private profile, etc.) In some embodiments, there may be options for the user to have an expanded view of 'options' or a non-expanded which may include but not be limited to (expanded may mean view more or see more or scroll more, etc.) view of options. In some embodiments, there may be ways to expand or not expand options, including but not limited to (e.g. tapping, swiping, clicking, voice commands, etc.) In some embodiments, there may be options to swipe or switch between different users or explore users based on a movement, a tap, a swipe, etc.) In some embodiments, there may be options to may include but not be limited to (e.g., click, swipe tap, save, etc.) such as, which may include but not be limited to (e.g., 'this person does in-person dates, or this person does virtual dates, or (e.g., you may, user, person, entity, 3rd party, robot, artificial intelligence, etc.) may follow this person for free, etc.) In some embodiments, these options, which may just be, which may include but not be limited to (e.g., 'informative, viewing, interactional, can interact with, informational, etc.) and not have, which may include but not limited to (e.g., clicking, tapping, saving, etc.) methods, options, etc.)

In some embodiments, there may be, which may include but not limited to (e.g., feed, moving, self-moving, self-swiping, manually scrolling, swiping, moving, etc.) options plus which may include but not limited to (e.g., booking a date, a connection, etc.) In some embodiments, there may be, which may include but not limited to (e.g., content, feed, or anything that is to be viewed, seen, shown, disappeared, etc.) whether, which may include but not limited to (e.g., hologram, 3rd party shown, partially shown, fully shown, pixelated, locked, unlocked, content, private content, public content, videos, photos, etc.) In some embodiments, on the content which may include but not limited to (e.g., user interface, feed, managing page, homepage, user interface page, etc.) whether, which may include but not limited to (e.g., below, above, on the side, whether in a large button, small button, voice command, AI-induced, clicking method, tapping method, etc.) In some embodiments, user interface may lead to options to, which may include but not limited to (e.g., book right there at that moment, user interface may lead to options to see more calendar dates, to see a larger version of calendar dates, to see the match in calendar for times, dates, to see personal match, to see categories similarities, to see profile, or to see other options, or to see other users, or to see other girls, users, etc.) In some embodiments, once button may be clicked, tapped, etc.) In some embodiments, which may include but not limited to (e.g., the button or option may expand, the expanding may be come off the screen like a hologram or a virtual reality, or the expanding may be drop down, or show more options, etc.) In some embodiments, the book button or option button may expand on the screen or pause, or go to another screen, hologram, user interface, viewing display, or expand, or show more options, etc.)

In some embodiments, user interface may be the, which may include but not be limited to (e.g., models, paid creators view, etc.) In some embodiments, user interface may be a, which may include but not be limited to (e.g., model, creator view, etc.) in which the, which may include but not be limited to (e.g., user, model, girl, creator, paid dater, etc.) may show interest first, which may include but not be limited to (e.g., search the platform for a man to show interest in, contact a person, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, photos, exclusive photos, etc.) that she may be send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date, or wants to go out on a date etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, spend money, subscribe, follow, book a date with her, book date, book meeting, block off her calendar, send her flowers, send her gifts, etc.)

In some embodiments, user interface may or may not be the, which may include but not be limited to (e.g., homepage, main page, business page, external page, hologram, screen, hologram, user interface, viewing display, user interface, etc.) that the potential, which may include but not be limited to (e.g., bidders, subscribers, fans, persons, users, public, audience, buyer, etc.) which may include but not be limited to (e.g., may see or hear or acknowledge, etc.) upon, which may include but not be limited to (e.g., viewing platform, on any application, coming from an external link, etc.) In some embodiments, a potential, which may include but not be limited to (e.g., homepage, main page, suggested page, ads link page, application link page, first page, etc.) may contain 'trending creators,' which may include but not be limited to (e.g., users or persons based on the location of the bidder, trending users, trending persons, marketing, promotional material, promotional users, trending models, trending creators, warnings, listings, laws, rules, regulations, local information, worldwide, local, state, country, trending persons, users or persons, users or persons based on Network address, IP address, users or persons based on data gathered, based on research data, etc.) which may or may not be a, which may include but not be limited to (e.g., scrolling automatic list, stationary list, this may be a list that someone may be scroll themselves, etc.) user may be able to, which may include but not be limited to (e.g., refresh the page, 'click' or select, etc.) a potential 'location' which may 'update' the, which may include but not be limited to (e.g., page, data collection, Network address, IP address, data collected, the scrolling options, the given options, the shown options, the list of potential 'creators, etc.)

In some embodiments, the user interface may be, which may include but not be limited to (e.g., set, changed to, viewed in, etc.) user's (e.g., location of choice, mandatory location based on information or Network address, IP address, or data collected, etc.) In some embodiments, for example, which may include but not be limited to (e.g., for example which may be including but not limited to a potential 'bidder' may be traveling to 'New York City' and wants to look at 'trending creators' in 'NYC.' In some embodiments, location may be 'gathered' by previous 'acceptance' on behalf of the 'bidder' or 'fan' and user interface may be automatically show the potential 'bidder' 'trending creators' in their location, etc.) In some embodiments, in addition to the 'trending creators' in a potential customer's location, user interface may expand the potential to 'worldwide' and may show 'creators' that are worldwide on the, which may include but not be limited to (e.g., 3rd party integration, 3rd party platform, user's platform, our platform, site, etc.) In some embodiments, users may be able to, which may include but not be limited to (e.g., book virtual, book talk, book chat, book video chat, book video meeting, book voice conversation, dates, in-person dates, travel dates, traveling scenarios, send worldwide airfare, send packages or items in other countries, taxi services, travel services, etc.) In some embodiments, worldwide options, which may include but not be limited to (e.g., worldwide dates, worldwide virtual dates, worldwide services, worldwide connections, messages worldwide, sending gifts worldwide, sending assets worldwide, etc.) may be available only to those, which may include but not be limited to (e.g., paying users, subscribers, paying members, membership options, membership persons, paying persons, etc.) In some embodiments, which may include but not be limited to (e.g., creators, models, users, etc.) may be able to, which may include but not be limited to (e.g., manually, automatically, pay to opt-in-to, allow, create the option to, etc.) which may include but not be limited to (e.g., do, allow, accept, etc.) which may include but not be limited to (e.g., worldwide options, worldwide travel, worldwide connections, etc.) In some embodiments, the platform may be integrated with a travel platform, which may include but not be limited to (hotels, airlines, cars/taxi/ride-share service, etc.) which may also allow bidders to, which may include but not be limited to (e.g., worldwide dates, fly creators for dates in locations other than where the creator lives, send gifts to other countries or locations, etc.) In some embodiments, user interface may be a, which may include but not be limited to (e.g., scrolled down, larger, added version, or continuation of the FIG. 23 or any interface etc.) which, which may include but not be limited to (e.g., continue to display and show the 'profile' and 'offerings' from the 'model' for other items etc.) such as, which may include but not be limited to (e.g., 'goods, 3rd party goods or licensed items, 'new merchandise' 'previous successful dates' 'moving reels' 'moving videos' more 'unlocked content/photos/video galleries' or 'locked photo galleries' etc.) In some embodiments, this may also may include links to other social media such as, which may include but not be limited to (e.g., social networks, payment platforms, 3rd party integrated platforms or user interfaces, etc.)

In some embodiments, there may be a user interface that may show which may include but not limited to (e.g., content, profile information, profile photo, virtual booking by the hour, in-person booking by the hour, content, locked content, unlocked content, available activities, etc.) which may include but not limited to (e.g., breakfast, brunch, lunch, dinner, dessert such as ice cream or chocolate, shopping, sushi, makeup shopping, etc.) which may include but not limited to (e.g., prices, price ranges, general pricing, general transmittables, unlock prices, price ranges, general pricing, general transmittables, pay by the hour prices, price ranges, general pricing, general transmittables, pay by the activity prices, price ranges, general pricing, general transmittables, locations, dates, times, set date times including the time, location, and pre-approved items such as menu, pre-set dates, etc.) which may include but not limited to (e.g., times, locations, prices, price ranges, general pricing, general transmittables, menu options, options to purchase dinner during check out, available activities, etc.) In some embodiments, there may be user interface, which may include but not be limited to (e.g., booking options, availability, live information, live, live calendar, timing method data, timing data method, timing process data, general calendar, price per activity, price for date, price per hour, calendar with specific details or, which may include but not be limited to (e.g., breakdown, itemized, receipt, invoice, total, partial, breakdown, bill, summary of, total, etc.) s, times during specific day amiable, activities and or duration, check-in, check-out, time stamp, time record, time and data record, location, time and data record, coordinate(s), s for activities available, price, duration, check-in, check-out, time stamp, time record, time and data record, location, time and data record, coordinate(s), confirmation button, legal documents, legal agreements, date agreements, location, type of category, type of date, partnerships, partner locations, information, open times, possible times, bidding/auction, bidder times, user times, bidding/auction option times, platform, content, user, settings, information, user sign in, register information, contact information, contact for payment, price to contact, add to list, add to category, favorite, book in-person, book virtual, book talk, book chat, book video chat, book video meeting, book voice conversation, prices, price ranges, general pricing, general transmittables, for booking, book for job, price to book, schedule, inquire about, inquire about, inquire regarding, secure, create connection to, hold, pay for, create business relationship with, use transmittables to secure or book, schedule, inquire about, etc.) for job, price ranges, price, changing price ranges, price, changing prices, price ranges, general pricing, general transmittables, information, content, moving content, stationary content, suggestions, users, blog posts, information, posts, small blog posts, large statements, statements, request follow up call, price for follow up call, price for follow up connection, writings, chatting, contact boxes, achievements, information, categories, lists, live streams, past streaming, past content, locked content, unlocked content, etc.)

In some embodiments, there may be an interface or a user interface with which may include but not limited to (e.g., introductory profile, intro video, intro content, profile photos, price, buy now, price plus buy-now, market price, platform market price, options to pay in cash, 3rd party links to debt sites, 3rd party sites to redeem value or cash platforms, debit, credit, jewelry, car title, site funds, preloaded funds, etc.) In some embodiments, there may be user interface, which may include but not be limited to (e.g., locked profile until requirements are met, live shows, live events, live plus content, live plus no content, live plus options to view more, played show, free show, previewed show, a live show, live options to view profile, live profile, live streaming, live streaming, pre-recorded streaming, prerecorded shows, pre-made content, in-person date options, booking date options, profile date options, unlock content date options, price of date, price per hour, price for time, availability, price per activity, free follow, options to follow, options to view entire profile, unlock, previews, chat previews, content previews, content, photos, videos, communication, chat boxes, options or areas to share information, communication, options to send tips, suggested user profiles, computing operation chosen profiles, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the Bottom, top, side, anywhere, with other suggestions or profiles, or persons, or promotional material or content or information etc.) In some embodiments, there may be options to, which may include but not limited to (e.g., move, scroll, switch, disappear, reappear, swipe etc.) any, which may include but not be limited to (e.g., user interfaces, content, items, parts of user interface etc.)

In some embodiments, there may be, which may include but not limited to (e.g., pre-made or pre-created or created or entered options or custom options etc.) that may be, which may include but not be limited to (e.g., sent, shown, displayed, editable, changeable, deleted, summoned, requested, etc.) as a, which may include but not be limited to (e.g., chart, letter, options, clickable options, clickable, calendar, timing method, content, display, optional selectable thing for acceptable requests or things that may be requested, etc.) In some embodiments, there may be, which may include but not limited to (e.g., limited items or options for requests or for options such as ‘book a video call, book a phone call, send message, request anything, request something here, limited options for request listed here, show calendar, display calendar, give calendar options, message payment options, questions, request types of content, request types of videos, request types of photos, request features, request information etc.) In some embodiments, there may be a, which may include but not be limited to (e.g., screen or a user interface or a public profile or public information etc.) and/or a, which may include but not be limited to (e.g., anyway, public way, user, way, user interface, etc.) to, which may include but not be limited to (e.g., ‘book video call, book phone call, book in-person date, follow for free, follow, message, send message, send personalized message, send photo, send video, etc.) In some embodiments, there may be options to, which may include but not be limited to (e.g., schedule things in advance, add to calendar, book and add to calendar, book, schedule, inquire about, things that are immediate such as be able to send a video message, be able to send a private photo, be able to send a question, be able to see private photos, etc.)

Figure 154:
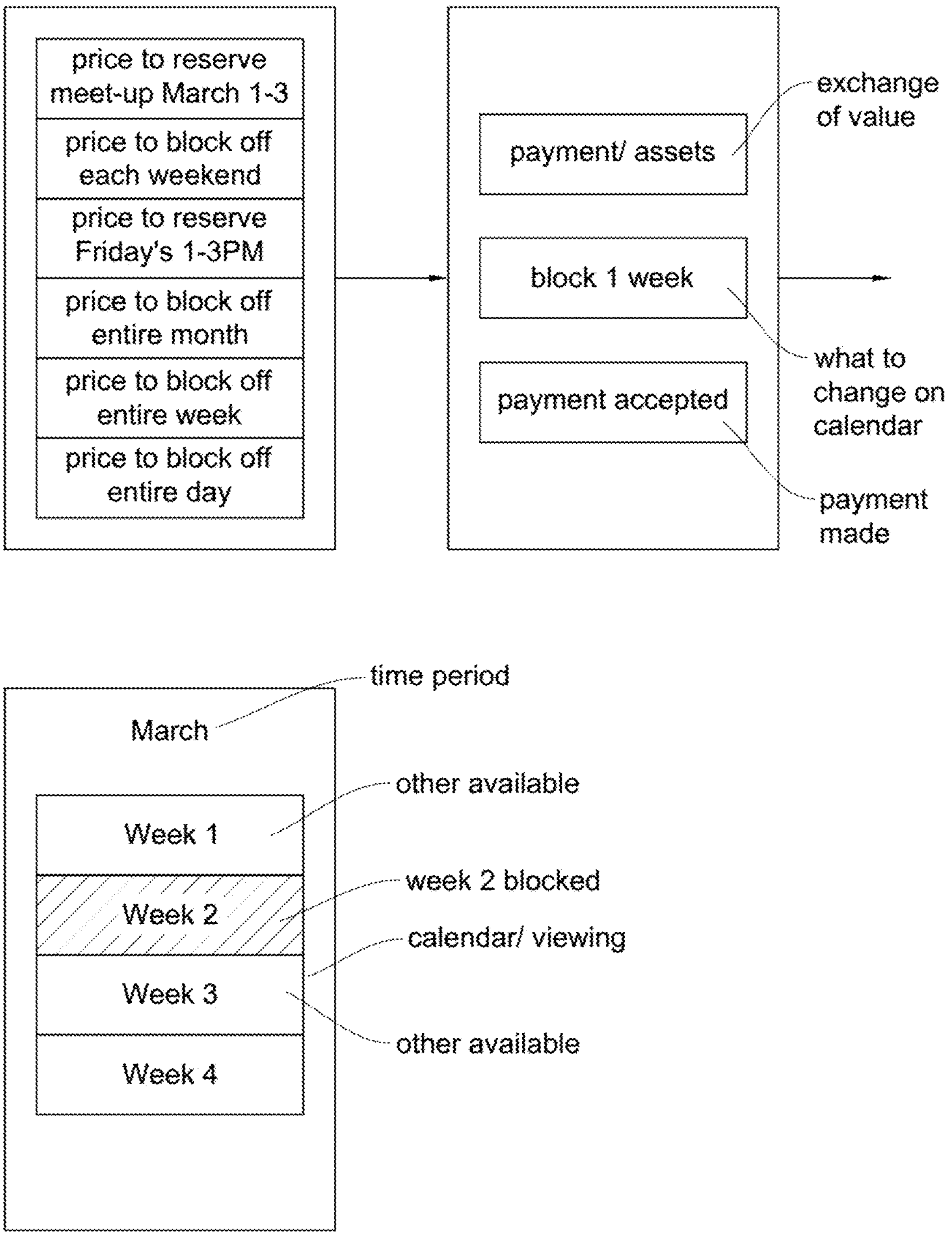

FIG. 154: In some embodiments, there may be options which may include but not be limited to (e.g., ‘reserve or pay to reserve, or exchange of value to reserve or to block of, or to change other users calendar or to change personal calendar or both, send gift for, send required gifts, send required payments, join membership, join members only, become subscriber, add yourself to, etc.) In some embodiments, options may include but are not limited to (e.g., price to reserve weekend March 1-3, price to auto-block of each weekend, price to block off weekdays, cost to reserve Fridays lunchtime, price to block off the entire month, price to block off the whole week, price to block off the entire day, or any set period by any user, etc.) In some embodiments, the user may assign payment or exchange of value to pay from any other user or person. In some embodiments, payment may be accepted or required to block off calendar periods, including but not limited to (e.g., hours, days, months, weekends, years, etc.) and recurring, non-recurring, one-time, etc.) In some embodiments, ‘blocking off calendar’ may result in a, which may include but not limited to (e.g., greying’ or a ‘non-useable or non-bookable’ or a ‘non-changing’ period, etc.), which may be considered under contractual obligations to one met to receive which may include but not limited to (e.g., payment or assets or exchange of value, etc.) In some embodiments, blocking off or reserving may not necessarily mean that the user cannot book other endeavors during that time, whether known or unknown to (e.g., other people, other entities, another person or public or on their profile, schedule, calendar, etc.) In some embodiments, (e.g., blocking off, ‘paying off or paying for or reserving or indicating unavailability, etc.) may be caused by (e.g., any reason such as gifting, own personal reasons, a user changing it herself, payment being made or requirements being met, etc.) whether by (e.g., her or by anyone else, etc.)

In some embodiments, there may be options, which may include but not limited to, or viewing may include but not limited to (e.g., profile information, photos, content, calendar, locked content, unlocked content, free content, subscriber-only content, not available content, pay to view content, calendar content, the content may be in the form of a grid, line, scrolling option, disappearing option, scrolling option, matching AI-connecting, option, tapping option, viewing options, lines, lists, created lists, etc.) In some embodiments, there may be an which may include but are not limited to (e.g., user interface, process, etc.) that goes from which may have but are not limited to (e.g., selection, options, or viewing of persons, etc.) to, which may include but are not limited to (e.g., matching AI-connecting, or interest, or like, or mutual like, or one sided-like, etc.) In some embodiments, the user interface may go, e.g., directly or to another user interface or on same user interface, etc.) to show a, which may include but is not limited to (e.g., calendar availability, scheduling option, or availability, or period, or scheduling option, etc.) that may show which may include but are not limited to (e.g., some information, 'all interests, all food choices, all pre-selected options for location of date, all pre-payment options, etc.) then user interface may go directly into, which may include but are not limited to (e.g., booking, or payment to book, schedule, inquire about, inquire about, inquire regarding, secure, create connection to, hold, pay for, create business relationship with, use transmittables to secure or book, schedule, inquire about, etc.) the date, or meet requirements of the date, or connection, etc.)

In some embodiments, user interface may lead to options to, which may include but not limited to (e.g., book right there at that moment, user interface may lead to options to see more calendar dates, to see a larger version of calendar dates, to see the match in calendar for times, dates, to see personal match, to see categories similarities, to see profile, or to see other options, or to see other users, or to see other girls, users, etc.) In some embodiments, once button may be clicked, tapped, etc.) In some embodiments, which may include but not limited to (e.g., the button or option may expand, the expanding may be come off the screen like a hologram or a virtual reality, or the expanding may be drop down, or show more options, etc.) In some embodiments, the book button or option button may expand on the screen or pause, or go to another screen, hologram, user interface, viewing display, or expand, or show more options, etc.) In some embodiments, user interface may be the, which may include but not be limited to (e.g., models, paid creators view, etc.) In some embodiments, user interface may be a, which may include but not be limited to (e.g., model, creator view, etc.) in which the, which may include but not be limited to (e.g., user, model, girl, creator, paid dater, etc.) may show interest first, which may include but not be limited to (e.g., search the platform for a man to show interest in, contact a person, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, photos, exclusive photos, etc.) that she may be send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date, or wants to go out on a date etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, spend money, subscribe, follow, book a date with her, book date, book meeting, block off her calendar, send her flowers, send her gifts, etc.)

In some embodiments, there may be options such as, which may include but not be limited to (e.g., 'reserve or pay to reserve, or exchange of value to reserve or to block of, or to change other users calendar or to change personal calendar or both, etc.) In some embodiments, options such as which may include but are not limited to (e.g., price to reserve weekend March 1-3, price to auto-block of each weekend, price to block off weekdays, price to reserve Fridays lunchtime, price to block of the entire month, price to block off the whole week, price to block of the entire day, or any set period by any user, etc.) In some embodiments, the user may assign payment or exchange of value to pay from any other user or person. In some embodiments, payment may be accepted or required to block off calendar periods, including but not limited to (e.g., hours, days, months, weekends, years, etc.) and recurring, non-recurring, one-time, etc.) In some embodiments, 'blocking off calendar' may result in a, which may include but is not limited to (e.g., greying' or a 'non-useable or non-bookable' or a 'non-changing' period, etc.), which may be considered under contractual obligations to one met to receive which may include but not limited to (e.g., payment or assets or exchange of value, etc.)

In some embodiments, one user sets the price; the other user pays the price. In some embodiments, one user sets asset requirements; another user must meet those requirements. In some embodiments, the user accepts different types of payments or options; another user must meet those payments or requirements. In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

In some embodiments, interface may allow which may include but not limited to (e.g., charity dating, dating for charity, dating to pay charity, dating for charity donations, charity connections: etc.) In some embodiments, which may include but not limited to (e.g., charity payments, donations, partial donations, proceeds to charity, pledging to charity, donations, payments, money, etc.) may be made whether, which may include but not limited to (e.g., entirely, portion, partial, etc.) to go to charity in exchange for, which may include but not limited to (e.g., charity dating, dating for charity, dating to pay charity, dating for charity donations, etc.) charity connection, etc.) which may include but not limited to (e.g., connection time, time period, dates, activities, time periods, lunch, dinner, etc.) In some embodiments, which may include but not limited to (e.g., charity payments, donations, partial donations, proceeds to charity, pledging to charity etc.) may be, which may include but not limited to (e.g., made, sent, gathered, transferred, pledged, etc.) for, which may include but not limited to (e.g., single daters, group daters, entities, two daters, more than 2 daters, multiple daters, group dates, group sessions, virtual dates, phone calls, meetings, etc.) In some embodiments, charity donations, whether whole or portion may be exchanged for, which may include but not limited to (e.g., winning bids, payments, exchange of value or any type of win, booking, or activity, date, or time period passing etc.) In some embodiments, interface may allow which may include but not limited to (e.g., [group dates may occur or there may be an option for group dates or more than one user booked at the same time for the same entertainment option, or different options, etc.)], [users may be able to, which may include but not be limited to (opt-in, join, participate, view, see, come to, be included, not included, pay for, not pay for, be paid for, etc.) to allowing dates that have more than one person, or not allow to be booked for a 'more than one person option' etc.], etc.)

In some embodiments, which may include but not be limited to (e.g., model, creator, the person getting paid, etc.), may be able to manage their, which may include but not be limited to (e.g., own profile or make any changes, or any business relations, or any business development, accept, deny, change, withdrawal, take, get paid from, etc.) on any user interface, which may include but not be limited to (e.g., hologram, internet, app, device, website, web, Web3, outside platform, etc.) In some embodiments, creator profile or management system may include but not be limited to (e.g., brand, logo, profile, person, live, live stream, pre-recorded live stream, pre-recorded content, pre-recorded live stream, pre-recorded live stream, pre-recorded content, pre-recorded content, name, headline, photo, content, receiving of likes, receiving of profile views, seeing who has viewed profile, how to book, schedule, inquire about, inquire about, inquire regarding, secure, create connection to, hold, pay for, create business relationship with, use transmittables to secure or book, schedule, inquire about, etc.) how to book, schedule, inquire about, inquire about, inquire regarding, secure, create connection to, hold, pay for, create business relationship with, use transmittables to secure or book, schedule, inquire about, etc.) dates, training videos, training content, safety content, calendar, calendar management software, calendar management platform, options to change calendar, accepting dates, denying dates, managing dates, issuing refunds, feed, sending feed, locked photos, locked content messages, mass messages, messaging platforms, subscribe, book, schedule, inquire about, book now, manage booking options, manage booking payments, manage content production, manage artificial intelligence assistant, collect machine learning input data, managing machine learning output data, messages, posts, past posts, new data, learning data, learned data, community posts, community area, suggestions, book 3rd party, reserve or pay for 3rd party, book nanny, book security, receiving background checks, receiving funds, transfer funds to bank, transfer funds, manage asset platform, manage assets, book travel, accept travel, obtain visa information, receive passport information, etc.) In some embodiments, the user interface(s) may provide a job booking platform or options that may enable 'service providers' to 'connect' with, which may include but not be limited to (e.g., clients, persons, users, brands, 3rd parties, advertisers, advertisements, businesses, entities, manage job bookings, manage finances, manage payments, etc.). In some embodiments, this may include a user interface(s) allowing service providers to have but not limited to (e.g., create, manage profiles, receive job requests from clients, manage bookings, payments, etc.) In some embodiments, The system may have features including but not limited to (e.g., verifying service provider qualifications, verifying payments or charges, managing client reviews, managing ratings, feedback, comments, booking, messaging, unlocking content, etc.)

In some embodiments, there may be a user interface which may allow users to which may include but not limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., jobs, gigs, events, parties, on-going jobs, on-going events, etc.) through platform(s) or which may include but not limited to (e.g., hire, find help, find assistance, pay someone else for any reasons, pay someone for assistance or goods or services, etc.) through, which may include but not limited to (e.g., platform or 3rd parties, advertisers, advertisements, businesses, or entities, or persons, etc.) In some embodiments, which may include but not limited to (e.g., options or ways to hire, or options available, or any possibilities of options, etc.) may include but not be limited to (e.g., find a personal assistant, browse through personal assistants, hire a personal assistant, hire a nanny, find a nanny, find/hire a chef, hire a driver, hire security, etc.) In some embodiments, options may include but are not limited to (e.g., paying on credit, paying cash, paying one-time, paying monthly, using credit, using rewards, having a 3rd party or another user pay, debit, immediate payment options, etc.) In some embodiments, there may be options to view potential 'hires' or 'those for work's history" which may include but not be limited to (e.g., how many jobs they have previously booked on the platform, their ratings, how many creators or models they've worked with, how many jobs they've done, their ratings for each job, their total ratings, comments, feedback, background check, background verification, etc.)

In some embodiments, users or persons may not know they are in membership format, appointed, or seen as 'members.' In some embodiments, the platform may make (e.g., paid-for persons, not paid-for persons, appointed persons, suggested persons, voted-on persons, specific persons or any user or any person members, special members, notable persons, etc.) In some embodiments, which may include but not be limited to (membership opt-in, options to get paid more by going out on more dates, options to opt-in to being added as an 'extra' or a 'last minute change' or a 'last minute date' or an 'extra dater' or an 'additional model' or an additional person for a date or event, membership options, options to get paid more, options to go out on extra dates, opportunities to be another party to a date, group dates may occur or there may be an option for group dates or more than one user booked at the same time for the same entertainment option, or different options, etc.)

In some embodiments, users may be able to which may include but not be limited to (opt-in, join, participate, view, see, come to, be included, not included, pay for, not pay for, be paid for, etc.) to allow dates that have more than one person, or not allow to be booked for a 'more than one person option' etc.) In some embodiments, users or persons that may, which may include but not be limited to (e.g., opt-in, join, agree to, add themselves to, etc.) may be, which may include but not be limited to (e.g., suggested more, have more suggested options, be suggested more on calendars, be added more to the computing operations, be added more to the user's calendars, be added more to the feed, be shown more, be suggested more, have more dating options, have more dating opportunities, etc.) In some embodiments, 'group dates' may give a, which may include but not be limited to (e.g., paying user, or a user that is exchanging something of value or assets) in exchange for multiple users to: (e.g., make a connection, book or date, etc.) In some embodiments, which may include but not be limited to (e.g., 'party option' or an option such as 'book multiple users,' etc.)

In some embodiments, multiple users may be defined but not limited to as (e.g., 'more than one user at a time, multiple users, two or more, one or more, groups, staggered groups, different activities, different days, different times, etc.) In some embodiments, 'group dates' or 'group users' may be booked through the platform and all paid, which may include but not be limited to (e.g., separately, together, staggered, spread out, installments, credit, funds, assets, etc.) may be depending on if they meet the contractual 'minimal agreements,' or agreements, which may include but not be limited to (e.g., 'showing up, staying for the duration, check-in, check-out, time stamp, time record, time and data record, location, time and data record, coordinate(s), etc.) In some embodiments, a group date may be booked altogether. Some users may not meet the entirety of the 'agreement but mostly, generally, or overall meet the agreement, which may include but not be limited to ('one person left early, or one person got sick, etc.) Some embodiments may include but are not limited to ('double, triple, or group dates, staggered, same day, different day, different settings, different locations, traveling, etc.') which may be booked together or booked separately. In some embodiments, there may be discounts for booking groups; there may not be discounts.

In some embodiments, the user may be able to choose to accept a, which may include but not be limited to (e.g., 'booked person, paid person,' etc.) to bring their friend or bring a 'plus one' or 'bring a family member, or bring a roommate, or bring a friend, or bring another person' etc.) In some embodiments, users may not be able to deny a user to bring a safety person due to any circumstances such as, which may include but not be limited to (e.g., may not know of a safety person, may disapprove, may not want that person to have safety persons near, wanting to get a person alone, or may be able to deny the request a safety person, or may not be able to refuse if someone else is there, etc.) In some embodiments, a 'bidder, which may include but not be limited to (e.g., a bidder may be defined as any person that is paying for a service or a connection or a date, or anything, etc.), may be chosen to pick a 'group date' which may include 'model,' which may include but not be limited to (e.g., plus one or more, or more 'creators' 'models,' etc.) to accompany the, which may include but not be limited to (e.g., 'bidder 'fan' or 'date buyer' etc.) to the entertainment option which may include but not limited to (e.g., dinner, lunch, coffee, pre-approved date choice, virtual, game, show, live, event, meeting, etc.)

Pre-chosen and listed 'closed: In some embodiments, which may include but not be limited to (e.g., 'Creators, persons, users, models, etc.) may have 'pre-picked" suggestions for their own (e.g., friend, other model, other creator, other user etc.), which may include but not be limited to (persons, chosen persons, appointed person, 3rd party chosen persons, creator chosen person, etc.) that are also on the platform or anywhere (e.g., off the platform or a 3rd party, etc.) that may appear on, which may include but not be limited to (e.g., their profile, information packet, information suggestion on the platform, on any advertisements, etc.) In some embodiments, 'pre-picked' (e.g., friend, other model, other creator, other user etc.) may be chosen to, which may include but not be limited to (e.g., appear on their profile or chosen to be hidden, or be chosen to be shared, etc.) with only specific, which may include but not be limited to (e.g., 'bidders' 'potential bidders' 'fans' or a part of the 'subscription unlocks' etc.) which may then show who the, which may include but not be limited to (e.g., 'creator/model' person, user, etc.) has available as suggestions for their, which may include but not be limited to (e.g., friend, other model, other creator, other user etc.) to add to the potential, which may include but not be limited to (connection, 'date' etc.) chosen by, which may include but not be limited to (e.g., bidder, model, person, user, etc.) may be choose to not allow or allow, which may include but not be limited to, which may include but not be limited to (e.g., dates' connections, lives, working with, etc.) with any other, which may include but not be limited to (e.g., friend, other model, other creator, other user, users, person, on the platform, user interface, or platform, friend, other model, other creator, other user etc.) which may mean, which may include but not be limited to (e.g., other creators or models on or off of the platform, user interface, or platform etc.)

In some embodiments, the model may be chosen only to allow, which may include but not be limited to (e.g., 'group' dates with these persons, security detail, safety chaperone, etc.) or be open to 'other, which may include but not be limited to (e.g., friend, another model, another creator, another user, etc.) On the, which may include but not be limited to (e.g., platform, user interface, etc.) In some embodiments, 'Other, which may include but not be limited to (e.g., friend, another model, other creators, other user, etc.), may mean other, which may include but not be limited to (e.g., women, users, models, creators on the, which may include but not be limited to (e.g., site, platform, or others, user, etc.) that the 'creator' may not, which may include but not be limited to (e.g., know personally or knows personally, or wants to use for business or personal purposes, etc.) In some embodiments, 'group dates' may give a, which may include but not be limited to (e.g., paying user, or a user that is exchanging something of value or assets) in exchange for multiple users to: (e.g., make a connection, book or date, etc.) In some embodiments, there may be a 'party option' or an option such as 'book multiple users.' In some embodiments, multiple users may be defined but not limited to as (e.g., 'more than one user at a time, multiple users, two or more, one or more, groups, staggered groups, different activities, different days, different times, etc.) In some embodiments, 'group dates' or 'group users' may be booked through the platform and all paid, which may include but not be limited to (e.g., separately, together, staggered, spread out, installments, credit, funds, assets, etc.) may be depending on if they meet the contractual 'minimal agreements,' or agreements, which may include but not be limited to (e.g., 'showing up, staying for the duration, check-in, check-out, time stamp, time record, time and data record, location, time and data record, coordinate(s), etc.) In some embodiments, a group date may be booked altogether, and some users may not meet the entirety of the 'agreement' but mostly, generally, or overall meet the agreement, such as, which may include but not be limited to ('one person left early, or one person got sick, etc.) Some embodiments, which may include but are not limited to ('double, triple, or group dates, staggered, same day, different day, different settings, different locations, traveling, etc.'), may be all booked together or booked separately. In some embodiments, there may be discounts for booking groups; there may not be discounts.

In some embodiments, the user may be able to choose to accept a, which may include but not be limited to (e.g., 'booked person, paid person,' etc.) to bring their friend or bring a 'plus one' or 'bring a family member, or bring a roommate, or bring a friend, or bring another person' etc.) In some embodiments, users may not be able to deny a user to bring a safety person due to any circumstances such as, which may include but not be limited to (e.g., may not know of a safety person, may disapprove, may not want that person to have safety persons near, wanting to get a person alone, or may be able to deny the request a safety person, or may not be able to deny if someone else is there, etc.)

In some embodiments, A 'bidder, which may include but not be limited to (e.g., a bidder may be defined as any person that is paying for a service or a connection or a date, or anything etc.) may be choose to pick a 'group date' which may include 'model,' which may include but not be limited to (e.g., plus one or more or more 'creators' 'models' etc.) to accompany the, which may include but not be limited to (e.g., 'bidder' 'fan' or 'date buyer' etc.) to the entertainment option which may include but not limited to (e.g., dinner, lunch, coffee, pre-approved date choice, virtual, game, show, live, event, meeting, etc.) Pre-chosen and listed 'closed': In some embodiments, which may include but not be limited to (e.g., 'Creators, persons, users, models, etc.) may have 'pre-picked' suggestions for their own, which may include but not be limited to (e.g., friend, other model, other creator, other user etc.) which may include but not be limited to (e.g., persons, chosen persons, appointed person, 3rd party chosen persons, creator chosen person, etc.) that are also on the platform or anywhere, which may include but not be limited to (e.g., off the platform or a 3rd party, etc.) that may appear on, which may include but not be limited to (e.g., their profile, information packet, information suggestion on the platform, on any advertisements, etc.) In some embodiments, 'pre-picked,' which may include but not be limited to (e.g., friend, other model, other creator, other user etc.) may be chosen to, which may include but not be limited to (e.g., appear on their profile or chosen to be hidden, or be chosen to be shared, etc.) with only specific, which may include but not be limited to (e.g., 'bidders' 'potential bidders' 'fans' or a part of the 'subscription unlocks' etc.) which may then show who the, which may include but not be limited to (e.g., 'creator/model' person, user, etc.) has available as suggestions for their, which may include but not be limited to (e.g., friend, other model, other creator, other user etc.) to add to the potential, which may include but not be limited to (e.g., connection, 'date' etc.) chosen by, which may include but not be limited to (e.g., 'bidder' or user, or model, or person etc.) may be choose to not allow or allow, which may include but not be limited to (e.g., 'dates' connections, lives, working with, etc.) with any other, which may include but not be limited to (e.g., friend, other model, other creator, other user, users, person, on the platform, user interface, or platform etc.) which may include but not be limited to (e.g., friend, other model, other creator, other user etc.) meaning, which may include but not be limited to (e.g., 'other creators or models etc.) which may include but not be limited to (e.g., on or off, public, integrated, etc.) on/of the, which may include but not be limited to (e.g., platform, user interface, or platform etc.) In some embodiments, model may be choose to, which may include but not be limited to (e.g., only allow, prefer, opt-in, etc.) which may include but not be limited to (e.g., 'group' dates, extra sessions, extra models, more models, group models, more than one, added person, etc.) with these, which may include but not be limited to (e.g., persons, or be open to 'other etc.) which may include but not be limited to (e.g., friend, other model, other creator, other user etc.) On the, which may include but not be limited to (e.g., platform, user interface etc.) In some embodiments, 'other, which may include but not be limited to (e.g., friend, other model, other creator, other user etc.) may mean other, which may include but not be limited to (e.g., women/persons/creators on the (site, platform, or others, user, etc.) that the 'creator' may, which may include but not be limited to (e.g., not know personally or knows personally, or wants to use for business or personal purposes, or security, etc.)

In some embodiments, 'platform, users, which may include but not be limited to (e.g., may refer to as 'creators') may have the option to suggest other users, which may include but not be limited to (e.g., friend, another model, another creator, another user, etc.) to, which may include but not be limited to (e.g., appear on their profile, suggest, advertisement materials, and information packets, etc.) In some embodiments, which may include but not be limited to (e.g., 'pre-picked, or self-picked, or chosen'), which may include but not be limited to (e.g., (e.g., friend, another model, another creator, another user, etc.) may be made visible or hidden to certain audiences, such as, which may include but not be limited to (e.g., 'bidders,' 'potential bidders,' or 'fans' etc.) In some embodiments, the option to view a creator's, which may include but not be limited to (e.g., suggested, chosen, approved, agreed upon, etc.) which may have but not be limited to (e.g., friend, another model, another creator, another user, etc.) may also be, which may include but not be limited to (e.g., unlocked, approved, displayed, shown, etc.) through a subscription. In some embodiments, creators have the choice to allow or disallow dates with their suggested, which may include but not be limited to (e.g., friend, another model, another creator, another user, etc.) or to, which may include but not be limited to (e.g., only allow, approve, opt-in, agree to, etc.) which may include but not be limited to (e.g., group dates, multiple dates, multiple person dates, multiple person connections, etc.) In some embodiments, users may also choose to be open to dates with others, which may include but not be limited to (e.g., users on the platform, persons, entities, etc.) on the, which may have but not be limited to (e.g., user interface, platform, etc.) whom they, which may include but not be limited to (e.g., do not personally know, personally know, may not know, etc.) In some embodiments, the 'paying person' may have the option to choose any group of users to go on a date/connection with as a package/or grouped together deal paid for separately or at one time or paid each or paid together. In some embodiments, the 'models (which may be defined as any person being paid) may have the option to agree to participate in open group dates with other women on the platform and user interface; in some embodiments, Artificial intelligence may be used to suggest potential group date options and package options to you. In some embodiments, suggestions may be based on, including but not limited to (e.g., computing operations, artificial intelligence, user preferences, user feedback, etc.)

closed-model-group-dates only: In some embodiments, If the 'creator' may not want to go on 'Model-group dates with other women on the, which may include but not be limited to (e.g., platform, user interface, outside, in-person, etc.) that the model may not, which may include but not be limited to (e.g., know, approve of, opt-in for, feel comfortable doing, etc.) In some embodiments, 'she,' which may include but not be limited to (e.g., she may be defined as any person on platform or any person being paid etc.) In some embodiments, the creator may choose to, which may include but not be limited to (e.g., opt out of that, opt-in-opt, out, chose to, agree to, confirm, etc.) and potentially choose to, which may include but not be limited to (e.g., opt-in to, agree to, chose to, etc.) 'Closed-model-group-dates only or instead or choose this option.' In some embodiments, which may then, which may include but not be limited to (e.g., show on her profile that user or she only goes on group dates, or it may not show on profile and may be private, or she may disappear from options, or she may or may not be suggested for this etc.) which may include but not be limited to (e.g., her having the choice of, agreeing to, denying, etc.) 'one or more' of the, which may include but not be limited to (e.g., 'known, accepted, agreed to, understood, opt-in etc.) which may include but not be limited to (e.g., friend, other model, other creator, other user etc.) which may be listed on her, which may include but not be limited to (e.g., profile/settings/platform information etc.) In some embodiments, this may create a, which may include but not be limited to (e.g., 'package deal' or a package payment, or a group payment option, or an individual payment option, or begin an installment for, or pay through 3rd party for, or transfer assets to begin or start or secure, etc.) and the, which may include but not be limited to (e.g., 'bidder,' paying person, user, public person, etc.) may have to pay a 'premium,' which may include but not be limited to (e.g., an additional fee, or a larger sum, or more money, or more distribution of money etc.) to be able to, which may include but not be limited to (e.g., opt-in or have the option to book, schedule, inquire about, inquire about, inquire regarding, secure, create connection to, hold, pay for, create business relationship with, use transmittables to secure or book, schedule, inquire about, etc.) which may include but not be limited to (e.g., multiple women, more than one woman, more than one creator, more than one model, etc.) In some embodiments, which may include but not be limited to (e.g., women may be defined as any person on platform, or any paid person, at a time etc.) In some embodiments, the 'creator, which may include but not be limited to (e.g., creator may be defined as any person being paid etc.) may be getting paid, which may include but not be limited to (e.g., 'more,' additionally, separate, for an additional fee, fee, etc.) for group dates that may be open to/or there may be an option for, which may include but not be limited to (e.g., open-for-friend-model-creator-group-dates, or open for others to join dates, or open for adding on dates, or open for others to add on dates, or open to party dates, or open to group dates, etc.) group dates, multiple persons or entity dates, etc.) In some embodiments, others that may include a, which may include but not be limited to (e.g., additional fee, payment, opt-in etc.) may be 'closed-bestie, etc'

In some embodiments, any user interface may create a 'package deal,' and the 'bidder' may have to pay a 'premium' (e.g., an additional fee, a more significant sum, more money, or more distribution of money, etc.) to be able to opt-in or have the option to, which may include but not be limited to (e.g., book, schedule, inquire about, inquire about, inquire regarding, secure, create connection to, hold, pay for, create business relationship with, use transmittables to secure or book, schedule, inquire about, etc.) multiple women (women may be defined as any person on platform, or any paid person) at a time. In some embodiments, the 'creator, which may include but not be limited to (e.g., the creator may be defined as any person being paid, etc.), may be getting paid 'more' for group dates that are open to/there may be an option for, which may include but not be limited to (e.g., open-for-friend-model-creator-group-dates, or open for others to join dates, or open for adding on dates, or open for others to add on dates, or open to party dates, or open to group dates, etc.) 'In some embodiments, the second highest paid may be 'closed-bestie.

In some embodiments, p, which may include but not be limited to (e.g., payment or asset installments, gift-card, outside funding etc.) for users or persons or entities: In some embodiments, there may be a process to have a 3rd party pay platform directly from outside platform may include but not limited to (e.g., installment payments or outside asset exchange payments, or a credit line, or a debit line, or a loan, etc.) In some embodiments, user may be able to choose 'pay in installments' which would allow user to, which may include but not be limited to (e.g., pay in installments, create installment plan, have 3rd party pay us in full and pay installments to 3rd party, etc.) potentially through a, which may include but not limited to (e.g., 3rd party, entity, person, other person, user etc.) In some embodiments, platform may obtain which may include but not limited to (e.g., full payment, asset, or exchange of value) while user is paying 3rd party for installment payments, may include but not limited to (e.g., bank, credit card, or credit line etc.) In some embodiments, there may be options for 'gifting a date,' which may include but not be limited to (e.g., outside person's paying for the entirely or portion of a 'date' or 'meeting' or 'connection' or any user's 'requirements' etc.) In some embodiments, outside or internal users may 'gift' another user anything that may require which may include but not limited to (e.g., payments or exchange of value etc.) which may include but not be limited to (e.g., gift a date, gift an in-person date, gift a virtual date, entertainment options set by anyone or model or user, gift a synchronized at home date, gift a subscription, gift a subscription to the platform etc.) In some embodiments, outside users may donate for these payments or exchanges of value to be made using potentially any type of assets such as which may include but not limited to (money, crypto, deeds to a house, etc.) In some embodiments, payments may need to be converted to may include but not limited to (e.g., fiat, or crypto, or financial, or standard payment exchange of value) to complete payment prior to payment or booking or exchange is made.

Figure 155:
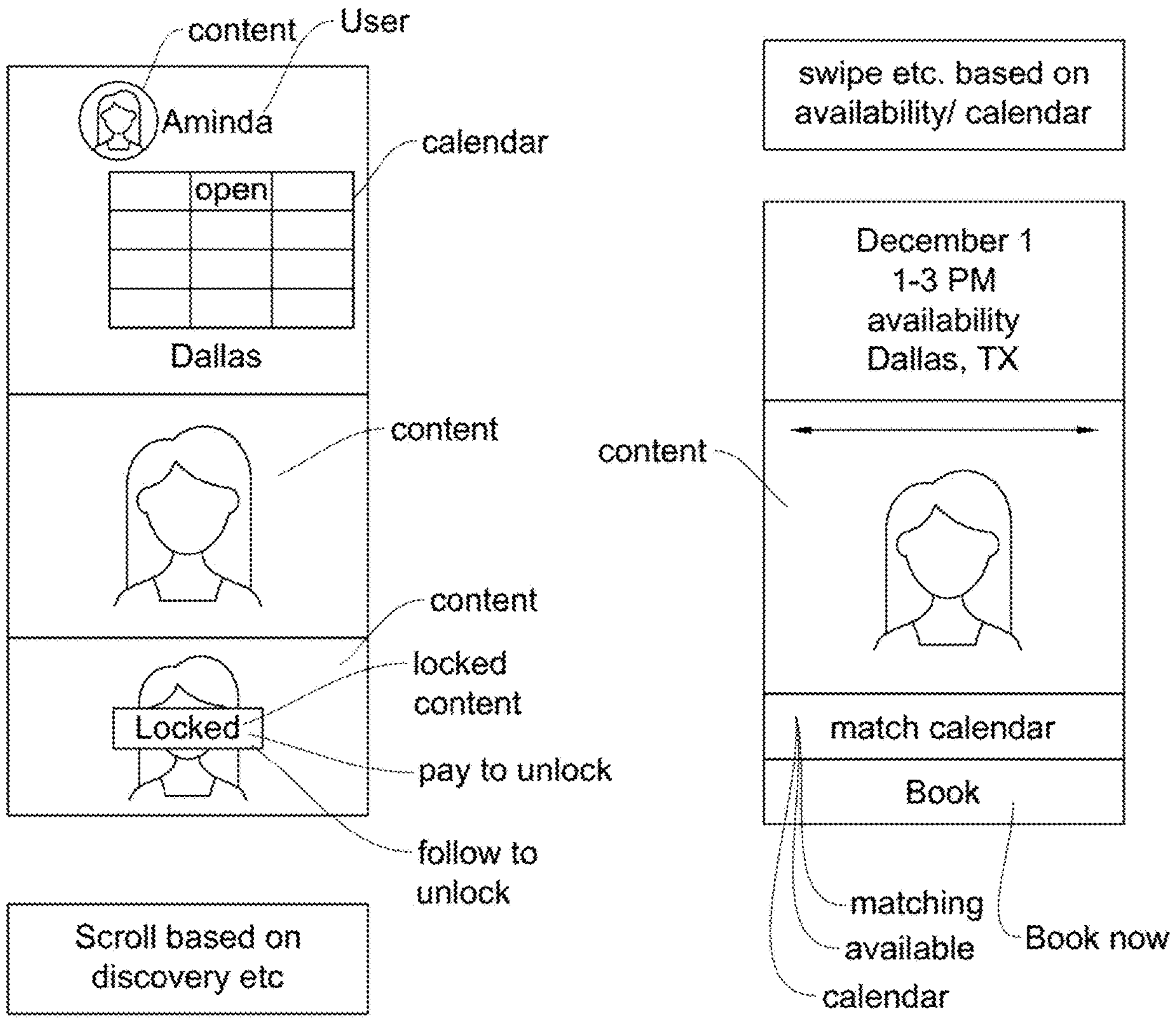

FIG. 155: In some embodiments, there may be, which may include but not be limited to (e.g., scrolling, tapping, swiping, moving, discovery etc.) whether (e.g., options or displays or features, etc.) that may show a combination or one or more may include but not limited to (e.g., calendars of users, users content, calendars, calendar availability, scheduling option, locked content, unlocked content, exclusive content, follow options, users, content, users availability, etc.) In some embodiments, there may be a (e.g., category list, category,' discover or view or suggested, etc.) options that may be seen by may include but not be limited to (e.g., holograms, viewing, visuals, hearing, voices, scrolling, automatic, discovery, locked, moving, swiping, searching, etc.) In some embodiments, there may be discovery may include but not limited to (e.g., swiping, tapping, searching, stacks, a personalized matchmaker, a human matchmaker, an AI trained robot, etc.) based on (e.g., suggestions for popular, categorized, widely sought after, 'matching AI-connecting,' or 'likely to match' or 'possible match' etc.) based on any series of may include but not be limited to (e.g., favorites, likes, AI, creator user, user, machine learning, etc.) may include but not limited to (e.g., calendar availability, scheduling option, availability, likes, possible likes, followers, subscribers, users, booking options, booking, follow, distance, city, location, place to be, time, day, location, previous locations, computing operation, AI, personal matching AI-connecting, etc.) Time on platform, time monitoring, time data: In some embodiments, there may be an, which may include but not be limited to (e.g., assessment, record, data collection, Network address, IP address, etc.) of time or collected time data for, which may include but not be limited to (e.g., users, registered, non-registered, view time, browse time, etc.) In some embodiments, which may include but not be limited to (e.g., time versus money spent, and/or time and/or money may be assessed, etc.) Outside integration to calendar: In some embodiments, outside integrations from other calendars or other information may be integrated into the calendar, which may include but not limited to (e.g., automatically, manually, or using AI, machine learning, or outside commands, or inside commands or orders, etc.) In some embodiments, outside, 3rd party, or internal integrations may change, including but not limited to (e.g., the calendar or information regarding the calendar, user viewing, outside viewing or public viewing, etc.) In some embodiments, AI calendar matching, platform matching, matchmaker matching, and user matching may automatically match or match based on manual inputs or manual data or manual maneuvers or indications or indicators such as a voice command or brain command or imagining any movements. Any (e.g., brain commandments such as a chip in the brain or a cloud-based movement or activity from brain to platform input commanding the user to do anything such as pay for a date or send a gift or send a tip, or imagining of movements or clicks, or indicators whether in a foggy brain state or a mental clouding may result in things being done on platform and the user is responsible for payment made by the user, or any coin-based commands or crypto commands or any money-based exchangeable commanded by robots or humans, or any robots acting as service workers or any robots acting on behalf or programmed to user's personal identification or linked to the user that may send money or make payment on human's behalf may be responsible for payment or is responsible or accountable for payment made by a robot, any payment or exchangeable or gift sent by user's robot may be liable for payment and not entitled to a refund and held responsible for robot or brain activities linked to the user whether registered on platform or not registered whether in a country or outside of a country whether on one platform and imagining payments or gifts on platform which may result in model's or creators or user's receiving gifts, vouchers, vacations, payments, gift cards, physical or digital items, crypto, NFTs, transmittables or anything of value such as a shout out, job or promise of payment or career assistance, etc.)

In some embodiments, there may be AI analyzing content may include but not limited to (e.g., photos, content, videos, activities, user's outside activities, content on other platforms, content on the current platform, etc.) In some embodiments, AI analyzing content may result in a solution being made by AI or machine learning or any data assessment and person to be shown solutions such as may include but not limited to (e.g., problem: the girl with extremely short hair only 3 inches long, analyzed automatically by AI, machine learning, etc.) solution: showing ads of hair extensions or boutiques for hair extensions or clip extensions or how to grow your hair long, etc.) In some embodiments, another user may search for may include but not limited to (e.g., 'how to act on a first date'). AI, machine learning, or data assessment or collection may result in an automatic solution by showing may include but not limited to (e.g., video/content/solution, sending information whether through the platform or an ad, or 3rd party or sell to 3rd party for ads, etc.) In some embodiments, users' information may include but not limited to (e.g., calendar, schedule, data, messages, etc.) may be used to may consist of but not limited to (e.g., collect data, analyze data using machine learning, AI, automatic, 3rd parties, advertisers, advertisements, businesses, etc.) and present solutions may include but not limited to (e.g., open calendar, AI analyzing or machine learning analyzing, or 3rd party analyzing, offer a solution such as 'how to get more dates booked on the calendar, etc.) In some embodiments, AI (artificial intelligence), machine learning, 3rd party platforms may mean any computing operating system, etc.)

Figure 156:
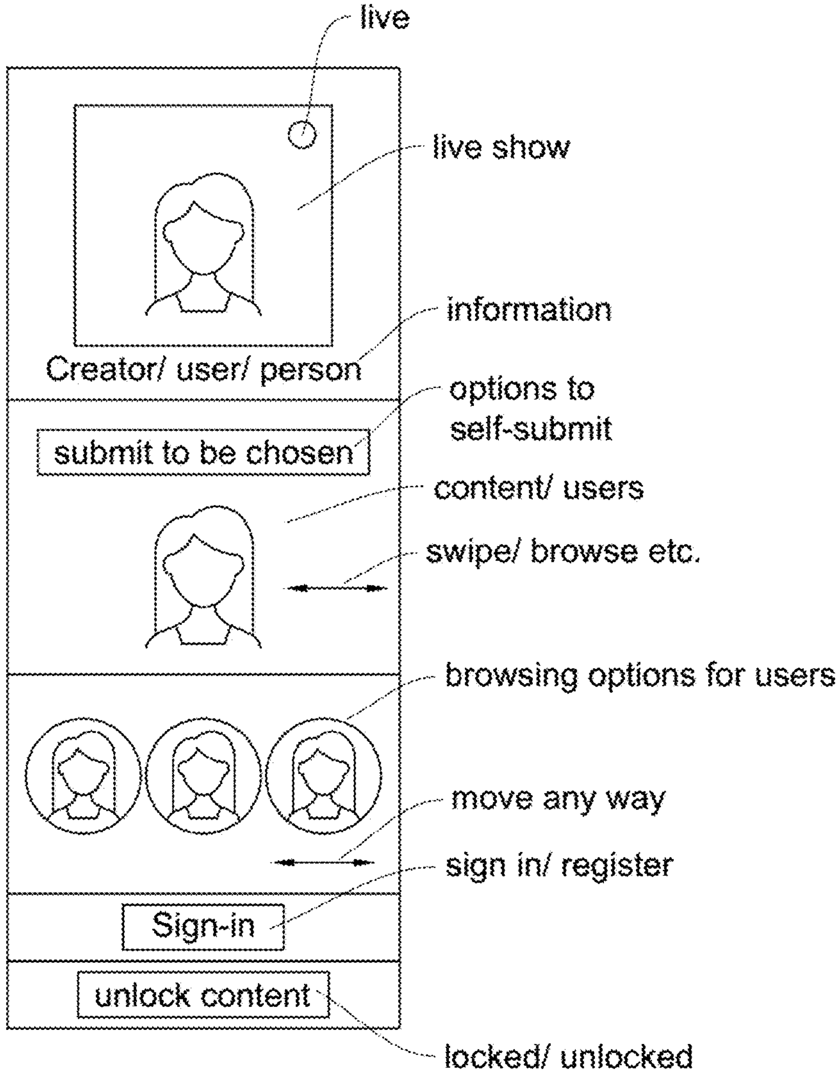

FIG. 156: In some embodiments, there may be options for users to may include but not limited to (e.g., self-create, or self-assess, or self-vote, or user vote, or choose, or be chosen, or be voted, or be under contract etc.) to be put as a promoted which may include but not limited to (e.g., special, main, top, largest, outside promoted, etc.) user on any page, which may include but not be limited to (e.g., the main page at the top, any promotional materials, any outside promotional materials, any page on platform anywhere on platform or platform's other platforms, or any promo material etc.) In some embodiments, the promoted person(s) may be, which may include but not limited to (e.g., do 'live shows' or 'live meetings' or 'in-person meet and greets, special campaigns, paid influencer campaigns, paid influencers, free photoshoots, photos, makeovers, more money, more bookings, outside bookings, etc.) In some embodiments, the person may have any type of content may include but not limited to (e.g., exclusive content, or person content, or locked content, or public content, etc.) In some embodiments, content may be in the form of any content or owned by any persons may include but not limited to (e.g., video, meme, photo, stack of photos or stack of content, or multiple variations of content, etc.) In some embodiments, users to be, which may include but not limited to (e.g., promoted, made special, larger, outside promoted, inside promoted, etc.) may be from the platform as which may include but not limited to (e.g., user, a bystander, voted, paid for, self-applied, user applied, any person making decisions, appointed, chosen, selected, suggested etc.) In some embodiments, live shows' may be, which may include but not limited to (e.g., pre-recorded, live pre-recorded, or 'live,' etc.) In some embodiments, there may be options to, which may include but not limited to (e.g., pay or free options etc.) to, which may include but not limited to (e.g., live stream, live stream a 'movie,' or game, or entertainment, etc.) or any form of which may include but not limited to (e.g., content or any form of entertainment etc.) at the, which may include but not limited to (e.g., same time, at different times, pause, top, record, not record, live only, pre-recorded live, streaming, regular streaming, no talking, talking etc.) In some embodiments, the 'free or paid option' to stream, watch, together, time spent together, which may include or not include a, which may include but not limited to (e.g., button, clicker, beginning, start, etc.) to begin which may include but not limited to (e.g., have a (e.g., timer, time stamp, location stamp, business location stamp, confirmation of time, location, data, etc.) or a recorded, or a data collector etc.) to determine if the 'contractual agreements that were paid or not paid which may include but not limited to (e.g., went through or was obtained, etc.) In some embodiments, there may be options to 'pay' to do which may include but not limited to (e.g., live streaming, movie, entertainment, virtual entertainment, virtual game, in person game, or any time spent etc.) between one, two, or more persons etc.) In some embodiments, payment may be made prior to being able to possibly which may include but not limited to (e.g., 'join call' or 'join date' or 'join live stream' or 'being movie' or 'begin date or check-in, check-out, time stamp, time record, time and data record, location, time and data record,' or 'start date' or 'call this person' or 'video with this person' etc.) In some embodiments, options to join or book may not be available until 'agreements are met' or 'requirements are met,' which may include but not be limited to (e.g., may include payment or instructions or actions or anything to meet requirements etc.)

In some embodiments, there may be a user interface where there is a screen or area, which may include but not be limited to (e.g., 'live screen, hologram, user interface, viewing display, 'live area, live streaming, live event, content, video, photos, members, memes, persons, multiple persons, multiple streams, entertainment, viewings, etc.) In some embodiments, there may be options, which may include but not be limited to (e.g., tipping, subscribing, viewing exclusive galleries or content or items, unlocking information, unlocking the city, unlocking personal information, unlocking information, unlocking gallery, unlock content, unlock live streams, message, prices, price ranges, general pricing, general transmittables, etc.) Which may also include but not be limited to (e.g., payments in exchange for content, messaging, contacts, etc.) In some embodiments, there may be ways to browse or view, including but not limited to (e.g., scrolling, viewing, automatic scroll, automatic disappearing, tapping, matching AI-connecting, switching, etc.) In some embodiments, there may be, which may include but not be limited to (e.g., live events, live streaming, live recordings, pre-recordings, previous content, content, videos, pictures, etc.) that may be located on the user interface whether, which may include but not be limited to (e.g., singular, with others, combined with others, or categorized with others, or a list or a created list, etc.) In some embodiments, there may be options, which may include but not be limited to (e.g., free follow, follow, subscribe, send a message, send a tip, book in person, book virtual, book talk, book chat, book video chat, book video meeting, book voice conversation, messaging, send gift, chat, etc.)

In some embodiments, there may be a user interface where there is a screen or area, which may include but not be limited to (e.g., 'live screen, hologram, user interface, viewing display, 'live area, live streaming, live event, content, video, photos, members, memes, persons, multiple persons, multiple streams, entertainment, viewings, etc.) In some embodiments, there may be options, which may include but not be limited to (e.g., tipping, subscribe, view exclusive galleries or content or items, unlock information, unlock city, unlock personal information, unlock information, unlock gallery, unlock content, unlock live streams, message, prices, price ranges, general pricing, general transmittables, etc.) Which may also include but not be limited to (e.g., payments in exchange for content, messaging, contacts, etc.) In some embodiments, there may be options to, which may include but not limited to (e.g., pay or free options etc.) to, which may include but not limited to (e.g., live stream, live stream a 'movie,' or game, or entertainment, etc.) or any form of which may include but not limited to (e.g., content or any form of entertainment etc.) at the, which may include but not limited to (e.g., same time, at different times, pause, top, record, not record, live only, pre-recorded live, streaming, regular streaming, no talking, talking etc.) In some embodiments, the 'free or paid option' to stream, watch, together, time spent together, which may include or not include a, which may include but not limited to (e.g., button, clicker, beginning, start, etc.) to begin which may include but not limited to (e.g., have a (e.g., timer, time stamp, location stamp, business location stamp, confirmation of time, location, data, etc.) or a recorded, or a data collector etc.) to determine if the 'implied/verbalized/contractual agreements that were paid or not paid' which may include but not limited to (e.g., went through or was obtained, etc.) In some embodiments, there may be options to 'pay' to do which may include but not limited to (e.g., live streaming, movie, entertainment, virtual entertainment, virtual game, in person game, or any time spent etc.) between one, two, or more persons etc.) In some embodiments, payment may be made prior to being able to possibly which may include but not limited to (e.g., 'join call' or 'join date' or 'join live stream' or 'being movie' or 'begin date or check-in, check-out, time stamp, time record, time and data record, location, time and data record,' or 'start date' or 'call this person' or 'video with this person' etc.) In some embodiments, options to join or book may not be available until 'agreements are met' or 'requirements are met,' which may include but not be limited to (e.g., may include payment or instructions or actions or anything to meet requirements etc.)

FIG. 157: In some embodiments, there may be options to search, which may include but are not limited to (e.g., within a calendar or calendar user interface, or user interface, home screen, hologram, user interface, viewing display, or managing page, or management system, etc.) In some embodiments, there may be options to search based on, which may include but are not limited to (e.g., a calendar, similar calendars, similar routines, something in common, exact calendars, calendar matches, timing matching AI-connecting, timing matches, calendar timing similarities, etc.). In some embodiments, there may be options to search based on similar calendars or other preferences. In some embodiments, there may be options to search within the calendar on specific days, weeks, times, years, period(s), etc.), which may result in showing matches or suggestions.) In some embodiments, there may be options to view one user's calendar and, based on anything, may include but not be limited to (e.g., AI, machine learning, preferences, searching, filters, etc.) In some embodiments, the user may see matches based on other users' calendars and show them, which may include but not be limited to which may include but not limited to (e.g., a list, a category, save them, show them, allow matches to occur, allow connections to occur, organize, or show information, etc.)

In some embodiments, search options may include but are not limited to (e.g., within a calendar or calendar user interface, user interface, home screen, hologram, user interface, viewing display, managing page, management system, etc.) In some embodiments, there may be options to search based on, which may include but are not limited to (e.g., a calendar, similar calendars, similar routines, something in common, exact calendars, calendar matches, timing matching AI-connecting, timing matches, calendar timing similarities, etc.). In some embodiments, there may be options to search based on similar calendars or other preferences. In some embodiments, there may be options to search within the calendar on the specific, which may include but not be limited to (e.g., days, weeks, times, years, period(s), etc.), which may result in showing matches or suggestions, etc.) In some embodiments, there may be options to view one user's calendar based on anything which may include but are not limited to (e.g., AI, machine learning, preferences, searching, filters, etc.) In some embodiments, the user may see matches based on other users' calendars and show them, which may include but not be limited to which may include but not limited to (e.g., a list, a category, save them, show them, allow matches to occur, allow connections to occur, organize, or show information, etc.) In some embodiments, there may be a user interface(s) that may have (e.g., raising money for charity, charity donations, percentage towards non-profit, monies towards non-profit, galleries, filtered galleries, episodes, streaming episodes, live episodes, types of episode(s), series, platform series/platform movies/platform content, movies, self-produced, self-made movies, platform created films/series/content, streaming, content, price to unlock, price to subscribe, price to view, locked content, send message, price for messages, booking in person, booking virtual, pre-booking call/communication, matching AI-connecting, of calendars, similar calendars, similar routines, something in common, showing one or more calendars, matching AI-connecting, based on calendars, similar based on calendars or other features, information, galleries with filters, content that is by categories or not by categories, etc.)

Figure 158:
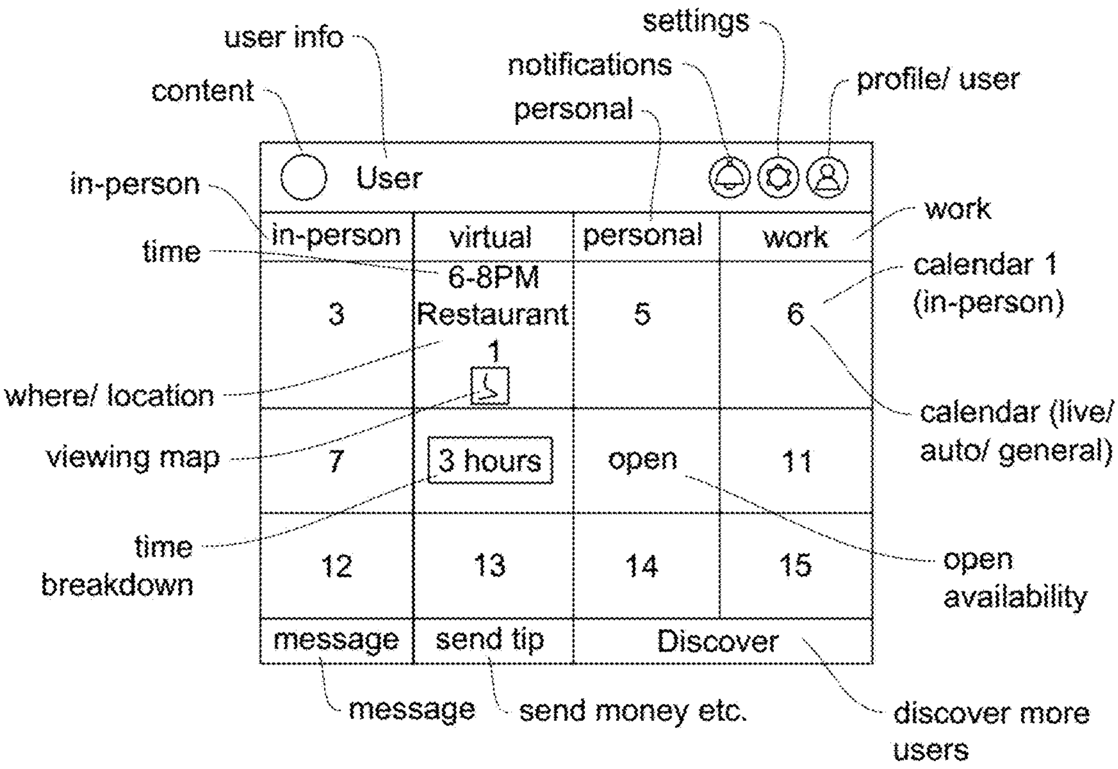
Figure 159:
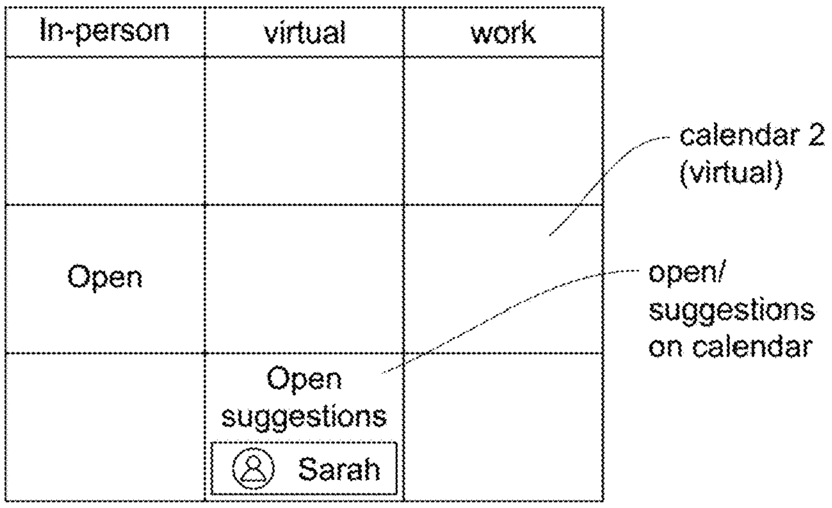

FIG. 158, FIG. 159: In some embodiments, there may be options to, including but not limited to (e.g., see, view publicize, make public, allow bookings, allow scheduling, share privately, etc.) (e.g., calendar, edit calendar, view calendar, assess calendar, interact with calendar or schedule or scheduling options, etc.) In some embodiments, there may be options to see different views of the calendar by a filter or a category, which may include but not limited to (e.g., in-person calendar, virtual calendar, personal calendar, travel calendar, travel schedule, work schedule, family schedule, dating schedule, etc.) In some embodiments, there may be ways to view each calendar separately based on categories, tags, and views or see it all together in one calendar. In some embodiments, there may be (e.g., buttons or options to, or opportunities to, etc.) which may include but are not limited to (e.g., message, discover more users, discover, search, send money, add funds, view user information, see self-information, book now, schedule date, schedule virtual date, schedule in-person date, settings notifications, user profile(s), availability, etc.) In some embodiments, search options may include but are not limited to (e.g., within a calendar or calendar user interface, user interface, home screen, hologram, user interface, viewing display, managing page, management system, etc.) In some embodiments, there may be options to search based on, which may include but are not limited to (e.g., a calendar, similar calendars, similar routines, something in common or shared, exact calendars, calendar matches, timing matching AI-connecting, timing matches, calendar timing similarities, etc.). In some embodiments, there may be options to search based on similar calendars or other preferences. In some embodiments, there may be options to search within the calendar on the specific days, weeks, times, years, period(s), etc.) which may result in showing (e.g., matches or suggestions, etc.) In some embodiments, there may be options to view one user's calendar and, based on anything, may include but not be limited to (e.g., AI, machine learning, preferences, searching, filters, etc.) In some embodiments, the user may see matches based on other users' calendars and show them, which may include but not be limited to which may include but not limited to (e.g., a list, a category, save them, show them, allow matches to occur, allow connections to occur, organize, or show information, etc.) In some embodiments, the calendar may show (e.g., location, time, map, an overview from satellite, satellite imaging, messaging, satellite image may track your entire date or location or route, virtual or personal work schedule, live schedule, messaging schedule, response time, content releases, anticipated films or content or live shows, dates coming up, virtual dates coming up, live streams of dates, live streams, tip options, matching options, matching within calendar, date history, date locations, restaurant information, restaurant times and locations, restaurant options, etc.) In some embodiments (e.g., restaurants, date activities, locations, food choices, menu choices, discounted rates, discounts, etc.), it may be pre-chosen or pre-picked or pre-reserved or pre-paid for or chosen by platform or paid by advertisements, etc.)

In some embodiments, there may be search options, including but not limited to (e.g., within a calendar or calendar user interface, or user interface, home screen, hologram, user interface, viewing display, managing page, management system, etc.) In some embodiments, there may be options to search based on, which may include but are not limited to (e.g., a calendar, similar calendars, similar routines, something in common, exact calendars, calendar matches, timing matching AI-connecting, timing matches, calendar timing similarities, etc.). In some embodiments, there may be options to search based on similar calendars or other preferences. In some embodiments, there may be options to search within the calendar on the specific, which may include but not be limited to (e.g., days, weeks, times, years, period(s), etc.), which may result in showing matches or suggestions, etc.) In some embodiments, there may be options to view one user's calendar based on anything which may include but are not limited to (e.g., AI, machine learning, preferences, searching, filters, etc.) In some embodiments, the user may see matches based on other users' calendars and show them, which may include but not be limited to which may include but not limited to (e.g., a list, a category, save them, show them, allow matches to occur, allow connections to occur, organize, or show information, etc.) In some embodiments, there may be a user interface(s) that may have (e.g., raising money for charity, charity donations, percentage towards non-profit, monies towards non-profit, galleries, filtered galleries, episodes, streaming episodes, live episodes, types of episode(s), series, platform series/platform movies/platform content, movies, self-produced, self-made movies, platform created films/series/content, streaming, content, price to unlock, price to subscribe, price to view, locked content, send message, price for messages, booking in person, booking virtual, pre-booking call/communication, matching AI-connecting, of calendars, similar calendars, similar routines, something in common, showing one or more calendars, matching AI-connecting, based on calendars, similar based on calendars or other features, information, galleries with filters, content that is by categories or not by categories, etc.)

In some embodiments, users may be able to, which may include but not limited to (e.g., search users, categories, etc.) within the calendar: In some embodiments, users may be able to search, which may include but not limited to (e.g., on the calendar, around the calendar, on the user interface, on each day, period searching, within a period, within the calendar, etc.) which may include but not limited to (e.g., on each day, such as search within a time frame, or period, or category) time frames may include but not be limited to (e.g., lunch, snack, dinner, coffee, shopping, virtual, in-person, restaurant, etc.) In some embodiments, the user may be able to search on the calendar, which may include but not be limited to (e.g., per day, per period, per week, per location, per distance, per popularity, per type of model, per type of creator, per user, per availability, per activity, etc.)

Figure 160:
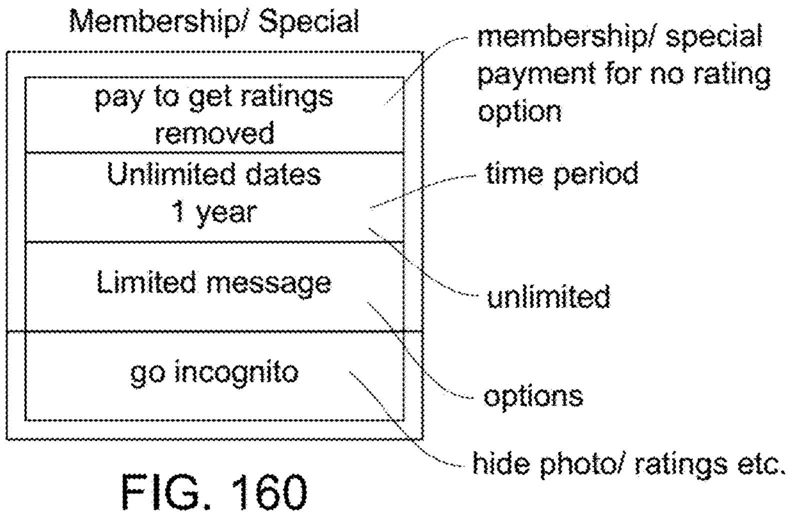
Figure 161:
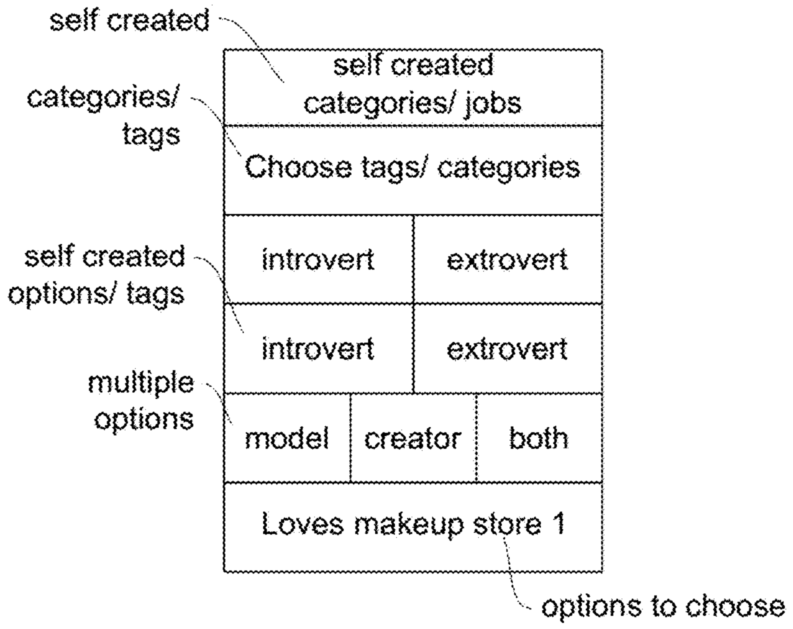
Figure 162:
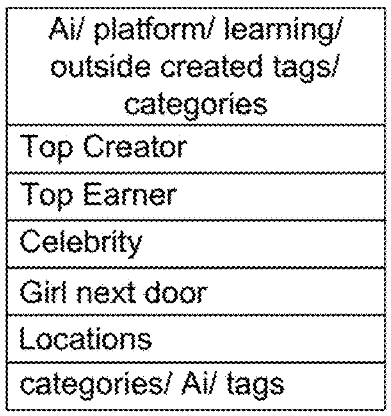
Figure 163:
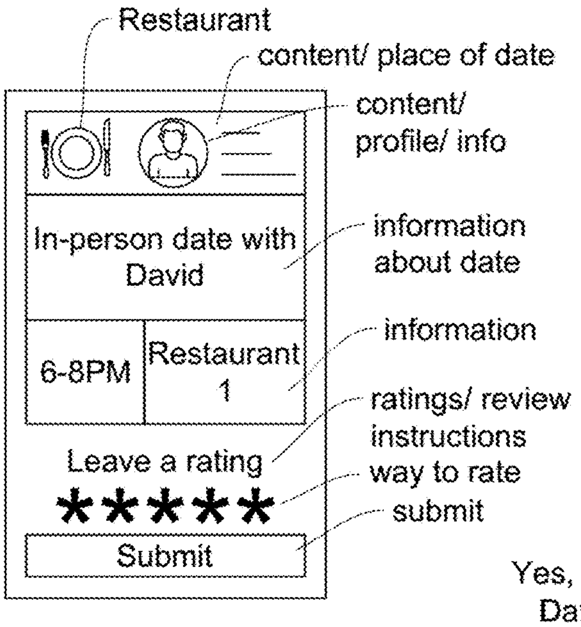
Figure 164:
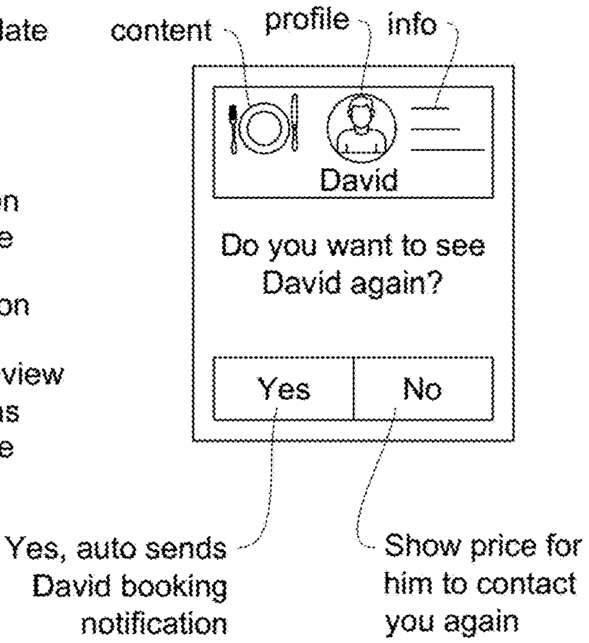
Figure 165:
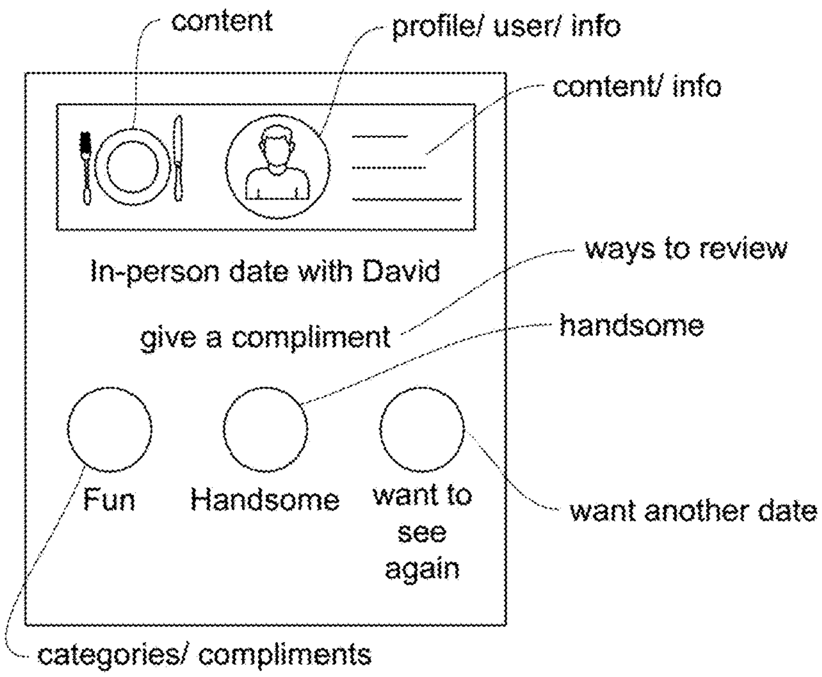

FIG. 160: In some embodiments, there may be options such as which may include but not limited to (e.g., pay to go incognito, pay to get ratings removed, pay to get comments removed, etc.) In some embodiments, users or persons may (e.g., ‘pay to get ratings removed’, pay to get thing removed such as ‘ratings’ ‘response time’ ‘tags’ ‘categories’ ‘low score’ ‘low ratings’ ‘assets shown’ etc.) which may remove all options for users to (e.g., submit feedback or allow comments or allow responses, etc.) which may include but not limited to (e.g., ratings, compliments, pay to get ratings removed, join platform membership, join model’s membership, feedback, star rating, ratings, compliments, request to book, schedule, inquire about, inquire about, inquire regarding, secure, create connection to, hold, pay for, create business relationship with, use transmittables to secure or book, schedule, inquire about, again etc.) on user anytime which may include but not limited to (e.g., after, before, during etc.) a, which may include but not limited to (e.g., date, connection, meeting, etc.) In some embodiments, ‘pay to get ratings removed’ may allow a user may include but not limited to (e.g., to go into incognito mode or anonymous mode, or not allow users to leave ratings, or not allow users to talk about person or leave feedback to other users etc.) In some embodiments, which may include but not limited to (e.g., paid, premium, special user, paying person etc.) that may have paid for ‘unlimited services,’ which may include but not limited to (e.g., unlimited to platform, unlimited to subscriber, subscriber, VIP, special person, etc.) may not be able to continue to, which may include but not limited to (e.g., message, contact, book a user, etc.) if user is not responding to, which may include but not limited to (e.g., messages, point of contact, requests, etc.) In some embodiments, payment may be required in exchange for any option such as, which may include but not be limited to (e.g., payment to view content, payment to view calendar, interact with to view calendar, interact with to view timing data method, payment to book, schedule, inquire about, inquire about, inquire regarding, secure, create connection to, hold, pay for, create business relationship with, use transmittables to secure or book, schedule, inquire about, etc.) payment to join call, payment for background check by 3rd party, payment to live stream, pre-recorded live stream, pre-recorded content, payment to join stream, payment to join call, payment for content, payment for message, payment to see calendar, payment to see profiles, payment to see other cities, payment to book, schedule, inquire about, inquire about, inquire regarding, secure, create connection to, hold, pay for, create business relationship with, use transmittables to secure or book, schedule, inquire about, etc.) profiles or persons in other cities, payment to view stories, payment to view live or current content, payment to follow, payment to subscribe, payment for unlimited content, payment for unlimited messages, payment for unlimited dates, payment for contact options, payment for contact information, payment to see live, payment to obtain information, payment to match, payment to view now, payment to unlock content, payment to begin, payment to view information about user, payment to see background check, payment to send direct message, payment to add to category, payment to add to list, payment to be on cover, payment to be on first page, payment to be at top, payment to be suggested, payment to wink, flirt, send heart, payment to speak to another person, etc.

In some embodiments, payment may be required in exchange for any option, which may include but not be limited to (e.g., payment to view content, payment to view calendar, interact with to view calendar, interact with to view timing data method, payment to book, schedule, inquire about, inquire about, inquire regarding, secure, create connection to, hold, pay for, create business relationship with, use transmittables to secure or book, schedule, inquire about, etc.) payment to join call, payment for background check by 3rd party, payment to live stream, pre-recorded live stream, pre-recorded content, payment to join stream, payment to join call, payment for content, payment for message, payment to see calendar, payment to see profiles, payment to see other cities, payment to book, schedule, inquire about, inquire about, inquire regarding, secure, create connection to, hold, pay for, create business relationship with, use transmittables to secure or book, schedule, inquire about, etc.) which may include but not be limited to (e.g., profiles or persons in other cities, payment to view stories, payment to view live or current content, payment to follow, payment to subscribe, payment for unlimited content, payment for unlimited messages, payment for unlimited dates, payment for contact options, payment for contact information, payment to see live, payment to obtain information, payment to match, payment to view now, payment to unlock content, payment to begin, payment to view information about user, payment to see background check, payment to send direct message, payment to add to category, payment to add to list, payment to be on cover, payment to be on first page, payment to be at top, payment to be suggested, payment to wink, flirt, send heart, payment to speak to another person, etc.) In some embodiments, which may include but not limited to (e.g., another city, long distance, travel booking, traveling, booking, travel dating: In some embodiments, there may be payment options to, which may include but not limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., dates or meetings, etc.) in other cities, or to view which may include but not limited to (e.g., others in other cities, or to view information on someone that is not near or in the same city, etc.) In some embodiments, there may be payment options to, which may include but not limited to (e.g., ‘view only in other city’ or ‘view and be able to book, schedule, inquire about, inquire about, inquire regarding, secure, create connection to, hold, pay for, create business relationship with, use transmittables to secure or book, schedule, inquire about, etc.) in which may include but not limited to (e.g., another area, another city’ option(s), etc.) In some embodiments, there may be options to, which may include but not limited to (e.g., ‘pay to unlock calendar in another city’ or ‘pay to see calendars of users in another city’ or ‘pay to have unlimited viewing of calendars or booking options in another city, etc.) In some embodiments, there may be, which may include but not limited to (e.g., one time fees, or they may be fees for a set time period, etc.)

FIG. 161, FIG. 162, FIG. 163, FIG. 164, FIG. 165: In some embodiments, users may have options to self-create tags or input information that may or may not be used by platforms or 3rd parties. In some embodiments, self-created information may include but is not limited to (e.g., match or create connections, or used by AI to assess solutions, etc.) In some embodiments, there may be options to create (e.g., categories or add to categories or add options, etc.) In some embodiments; there may be options for the platform may include but not limited to (e.g., outside, AI, machine learning, chips, etc.) to categorize users based on which may include but not limited to (e.g., earnings, location, distance, how often the user is logged in, user time on platform, user income, message response time, tips, outside platforms, outside information, models, entrepreneurs, business owners, career-women, actresses, net-worth, top earners, top tippers, top spenders, categorized spenders, reality stars, content creators, award-winners, favorites, partners, 3rd parties, etc.) which may create which may include but not limited to (e.g., automatic, manual, robotic made, human-created, etc.) which may include but not limited to (e.g., lists, computing operation, categories, tags, etc.) In some embodiments, users may be able to pay to get their low ratings removed or good ratings removed, such as (e.g., 'showing up late' or 'annoying' or 'divorced' or 'don't like him' or 'he's bald' or handsome or rich or 'I like him' etc.)

In some embodiments, there may be user interfaces that ask or suggest or suggest or want feedback after or before a date such as which may include but are not limited to (e.g., leave a rating, send a suggestion, leave feedback, rate, give a compliment, show interest, ask for another date, etc.) In some embodiments, there may be ways to send the person or user another booking after the date, before the date, or during the date. In some embodiments, there may be ways to suggest or to ask for another date through the platform or have the other person be notified that the person wants another date, etc.) In some embodiments, there may be ways to answer, which may include but not limited to (e.g., yes, no, maybe, depends, etc.) to questions which may have but are not limited to (e.g., do you want to see this person again? etc.) In some embodiments, answering, which may include but not limited to (e.g., yes, etc.), may lead to, which may include but not limited to (e.g., sending an auto-request booking to another user to book, schedule, inquire about, inquire about, inquire regarding, secure, create a connection to, hold, pay for, create a business relationship with, use transmittables to secure or book, schedule, inquire about, etc.) again, sending auto requests, making automatic solutions, using AI to create automated solutions, etc.) based on their which may include but not limited to (e.g., manual, automatic, preferences, wants, data assessment, data collection, etc.) In some embodiments, answering which may include but not limited to (e.g., no, negative, maybe, etc.) may lead to showing user information about which may have but not limited to (e.g., user to change their price for them to message them again, block this person, not allow this person to send messages anymore, not allow this person to send messages, etc.) In some embodiments, 'seeing them again' may also mean, may include but is not limited to (e.g., will you accept another date or connection such as a message, a virtual date, entertainment options set by anyone or model or user, an in-person date, be invited to events, etc.)

Figure 166:
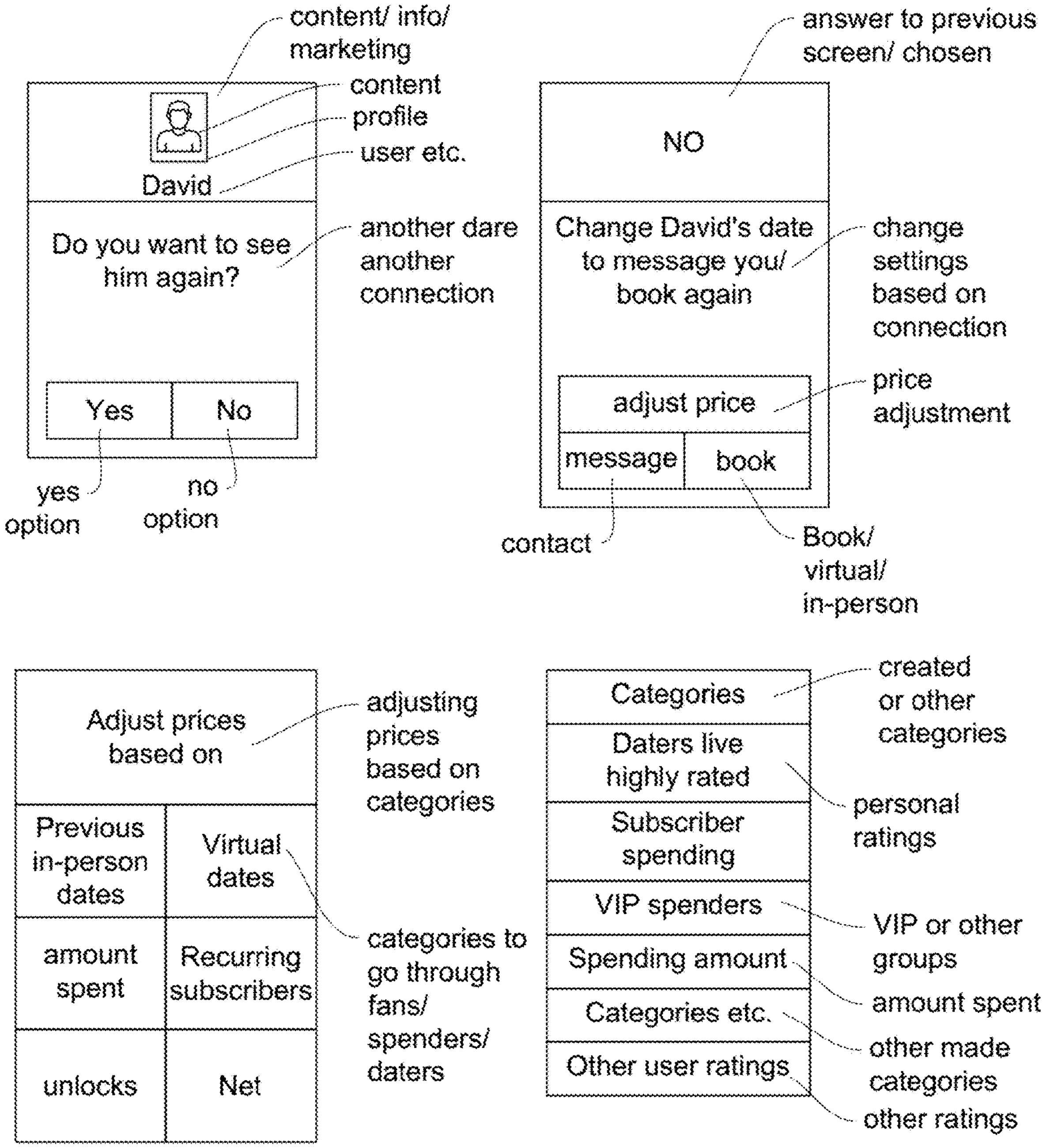

FIG. 166: In some embodiments, there may be a process that may include but not be limited to (e.g., questions before or after or during a 'date' such as 'do you want to see the user again?' Do you want to see this person again? Would you like to go out with this person again? etc.) which may include but not limited to depending on the answer which may include but not limited to (e.g., logging or typing or thinking or selecting any type of a response such as 'yes' 'no,' negative, not wanting to see this person again, not wanting any further contact, making it hard for this person to contact user again, etc.) which may include but not limited to (e.g., the user interface may lead to another screen, hologram, user interface, viewing display, moving to another section, another option, etc.) may include but not limited to (e.g., user interface where that user or person may change their rates, may be changed not be contacted again by that person, etc.) which may include but not limited to (e.g., receiving messages from that person and the price, being booked again by that person and their price, etc.) In some embodiments, prices or payments or gifts may be adjusted based on (e.g., unlocks, membership status of any user, personal preferences, previous in-person dates, ratings, returning buyer, message prices, spent amounts, etc.)

In some embodiments, user interface(s) may include but are not limited to (e.g., Additional date extensions, adding, adjusting payments, adding tips, etc.) In some embodiments, there may be an option to extend the period of the, which may include but not limited to (e.g., date, connection, meeting, plan, message, request, etc.) by exchanging of value, which may include but not be limited to (e.g., payment, exchange of value, assets, etc.) In some embodiments, there may be options to extend the period or add to date or add to connection or make a further connection or add more anything which may be, which may include but not limited to (e.g., period, additional date, day, time, extension of time, add shopping spree, add gift cards, add payment of bills, add period, add second date, add another dater, add another paid dater, add more users, etc.) In some embodiments, the user may adjust the price by (e.g., paying more, adding a tip, raising the price, sending more, giving donations, etc.) In some embodiments, users may have a, including but not limited to (e.g., set price, accept tips, accept exchanges, accept minimum for their time, etc.)

In some embodiments, options may include but are not limited to (e.g., pay to go incognito, pay to get ratings removed, pay to get comments removed, etc.) In some embodiments, 'pay to get ratings removed' may remove all options for users to submit, which may include but are not limited to (e.g., ratings, compliments, feedback, star rating, ratings, compliments, request to book, schedule, inquire about, inquire about, inquire regarding, secure, create connection to, hold, pay for, create a business relationship with, use transmittables to secure or book, schedule, inquire about, etc.) on user anytime which may include but not limited to (e.g., after, before, during etc.) a, which may include but not limited to (e.g., date, connection, meeting, etc.) In some embodiments, 'pay to get ratings removed' may allow a user may include but is not limited to (e.g., to go into the incognito mode or anonymous mode, not let users leave ratings, or not allow users to talk about a person or leave feedback to other users, etc.) In some embodiments, which may include but not limited to (e.g., paid, premium, a particular user, paying person, etc.) that may have paid for 'unlimited services,' which may include but not limited to (e.g., unlimited to platform, unlimited to subscriber, subscriber, VIP, special person, etc.) may not be able to continue to, which may include but not limited to (e.g., message, contact, book a user, etc.) if a user is not responding to, which may include but not limited to (e.g., messages, point of contact, requests, etc.)

In some embodiments, payment may be required in exchange for any option such as, which may include but not be limited to (e.g., payment to view content, payment to view calendar, interact with to view calendar, interact with to view timing data method, payment to book, schedule, inquire about, inquire about, inquire regarding, secure, create connection to, hold, pay for, create business relationship with, use transmittables to secure or book, schedule, inquire about, etc.) payment to join call, fee for background check by 3rd party, price to live stream, pre-recorded live stream, pre-recorded content, payment to enter stream, payment to join call, payment for content, payment for message, fee to see calendar, payment to see profiles, cost to see other cities, price to book, schedule, inquire about, inquire about, inquire regarding, secure, create connection to, hold, pay for, create business relationship with, use transmittables to secure or book, schedule, inquire about, etc.) profiles or persons in other cities, payment to view stories, payment to view live or current content, cost to follow, payment to subscribe, payment for unlimited content, payment for unlimited messages, payment for unlimited dates, payment for contact options, payment for contact information, cost to see live, payment to obtain information, payment to match, payment to view now, payment to unlock content, payment to begin, pay to view information about user, payment to see background check, payment to send direct message, payment to add to category, payment to add to list, payment to be on cover, payment to be on first page, payment to be at top, payment to be suggested, payment to wink, flirt, send heart, payment to speak to another person, etc.

In some embodiments, the process may or may not be as follows: user interface or process which may include but not limited to (1) which may include but not limited to (e.g., confirmed booking, or payment, confirmed payment and booking, confirmed or agreed upon contractual agreements or verbal agreements, or securing date such as time, location, time or location, day, etc.) may made by person paying or by anyone making payment, (2) paying persons funds are transferred to a, which may include but not limited to (e.g., trust account, separate account, another account, holding account, etc.) (3) which may include but not limited to (e.g., creator or model, entity, 3rd party, user, or paid person, or working person, or person receiving payment etc.) may not have access to these which may include but not limited to (e.g., funds, payout, transfer, assets, exchangeable, etc.) and they may not be, which may include but not limited to (e.g., disbursed, transferred, secured, sent to bank, sent to payout, pending, available, etc.) until which may include but not limited to (e.g., after al contractual obligations in agreement are met, or before, or during, or partial agreements have been met, or platform's agreements have been met, or verbal agreements have been met, or contractual obligations seemingly have been met, etc.) (4) which may include but not limited to (e.g., manual messages, auto-messages, auto-notifications, auto-email messages may be sent to, which may include but not limited to (e.g., one or both parties, or any party, etc.) upon confirmation of which may include but not limited to (e.g., payment from booking, agreement from booking, agreement is met, contract is created, contract agreement is confirmed, verbal agreement is confirmed, time or location or day or time period is set etc.) (5) which may include but not limited to (e.g., paid person, or dater, or user, or person being compensated, etc.) may be responsible for, which may include but not limited to (e.g., either manually or automatically setting recording of date information automatically by platform settings, clicking begin, starting date, starting recording, having their location on, allow device to automatically record, allowing device to manually record, allowing data to be tracked, allowing data to be collected or recorded, reporting proof, collecting proof of date, collecting information or evidence etc.) (5) which may include but not limited to (e.g., all date information, any data information, any connection information, any data regarding date or time or location or person or device or 3rd party, etc.) may be collected which may show that, which may include but not limited to (e.g., contractual obligations may have been met, obligations have been met, partial obligations have been met, general obligation have been met, agreement has been performed, etc.) may be, which may include but not be limited to (e.g., recorded to database, collected to device, collected to data center, sent to data center, sent to platform, collected by 3rd party or device, etc.) whether, which may include but not limited to (e.g., manually, or automatically, or through auto data recording, etc.) (6) creator or model, entity, 3rd party, user, or person paid may be, which may include but not limited to (e.g., manually or automatically or somehow notified, or sent etc.) a, which may include but not limited to (e.g., date review, a review, their opinion, a rating system, a questionnaire, a collection system, etc.) which may automatically request the other party to, which may include but not limited to (e.g., book another date, leave a review, give a tip, send a tip, give a rating, book again, update calendar, show up on calendar, suggest another date, etc.) (7) a potential which may include but not limited to (e.g., time period, day, time, minute, etc.) passes which may include but not limited to (8) funds may be, which may include but not be limited to (e.g., dispersed, received, transferred, accepted, sent to party or user, etc.) and may be, which may include but not limited to (e.g., automatically available or pending availability, or partially available, or through a 3rd party, or credit, or debited, etc.) to the, which may include but not limited to (e.g., 'model' etc.) (9) which may include but not limited to (e.g., user, creator, model, or person etc.) which may include but not limited to (e.g., accepting money, sent money, transferred money, transferred assets, receiving transmittables, being paid may be paid, etc.) may be, which may include but not limited to (e.g., confirmed, competed, transferred, accepted, finalized, etc.)

In some embodiments, there may be options such as calendar options or options to choose dates in the calendar which may show a, which may include but not be limited to (e.g., breakdown, itemized, receipt, invoice, total, partial, breakdown, bill, a summary of, total, etc.) or an 'itemized version' of the day, week, month, hour, period, activity, etc.) In some embodiments, artificial intelligence may preview the date, such as a 'moving version of the activity or a demonstrated version of the activity, date, time, place, user, content, etc.) In some embodiments, there may be options such as 'information regarding the date or connection or person, options to message, send a tip, view profile, view information, view calendar, send calendar, change calendar, manage date, cancellation date, cancellation connection, block, change, raise prices, price ranges, general pricing, general transmittables, send money, change prices, price ranges, general pricing, general transmittables, view background check, pay for a background check, etc.)

In some embodiments (e.g., calendar, timing method, schedule method, scheduling method, timing data center, etc.) may show a, which may include but not be limited to (e.g., breakdown, itemized, receipt, invoice, total, partial, breakdown, bill, a summary of, total, etc.) or a, which may include but not be limited to (e.g., breakdown, itemized, receipt, invoice, total, partial, breakdown, bill, a summary of, total, etc.) by itself of the period, or date, or connection, etc.) In some embodiments, there may be profiles or information of dates or connections whether paid for or needs to be paid for, etc.) In some embodiments, there may be options such as 'book this person again' or 'book again with xyz' or book now options or send tip options, 'complete your booking with xyz' or 'pay for the booking, etc.

General processing: In some embodiments, the, which may include but not be limited to (e.g., calendar or the timing method, or 'booking process, etc.) may, which may include but not be limited to (e.g., automatically, manually, etc.) transfer to a, which may include but not be limited to (e.g., 3rd party to book, schedule, inquire about, inquire about, inquire regarding, secure, create connection to, hold, pay for, create business relationship with, use transmittables to secure or book, schedule, inquire about, etc.) or outside entity, or other outside process, or user interface may manually input data, or user interface may have a list of verified locations or verified approved locations to choose from etc.) In some embodiments, locations may be, which may include but not be limited to (e.g., manually approved, or generally approved, or each one approved or chosen etc.) based on their, which may include but not be limited to (e.g., 'type of business' or type or sort of business etc.) for example a, which may include but not be limited to (e.g., 'restaurant location that is verified' or any business within a location, or within a distance, or within a state, or local business, or in a time period duration, check-in, check-out, time stamp, time record, time and data record, location, time and data record, coordinate(s), or type of business, or sort of business, or public location etc.) may be, which may include but not be limited to (e.g., automatically approved, each one approved, each one chosen, chosen by platform, chosen by person, accepted, allowed, etc.) to be able to, which may include but not be limited to (e.g., book from, secure time, secure slot, secure activity, book or pay for date or time or connection or services or goods, pay for, arrange, or pre-pay or pay for gifts in exchange for date, send gifts or buy something from 'wishlist' or 'list' or 'listed item' in exchange for date or time or virtual date or in person date or in exchange to view calendar or schedule or time or be able to message or book date or send like or interact with, etc.) there may also be a, which may include but not be limited to (e.g., manual application of data, or a manual application of data, or way to insert data that may have to be approved, or platform approved, or other party approved, or confirmed by other person, or confirmed by saying person, or 3rd party approved or confirmed, etc.) that may have to be, which may include but not be limited to (e.g., approved, confirmed, agreed upon, verbal agreed upon, contractually agreed upon, etc.) which may include but not be limited to (e.g., prior, during, after, etc.) to allowing a, which may include but not be limited to (e.g., booking, agreement, confirmation, time period, secured slot, activity, date, time period, goods or services, etc.) In some embodiments, the, which may include but not be limited to (e.g., verified locations, or locations chosen by anyone, or businesses chosen, or businesses verified, or approved businesses or locations or times or parties, or activities, or 3rd party entities, or 3rd party bookings etc.) to, which may include but not be limited to (e.g., chose from locations, may be allowed, may be approved, may be chosen, may be booked, may be an approved location partner, may be partnering with locations, may be partnerships, approved locations, approved areas, approved activities, approved 3rd parties, advertisers, advertisements, businesses, agreed upon between two parties, agreed upon by one or more parties, etc.)

Figure 167:
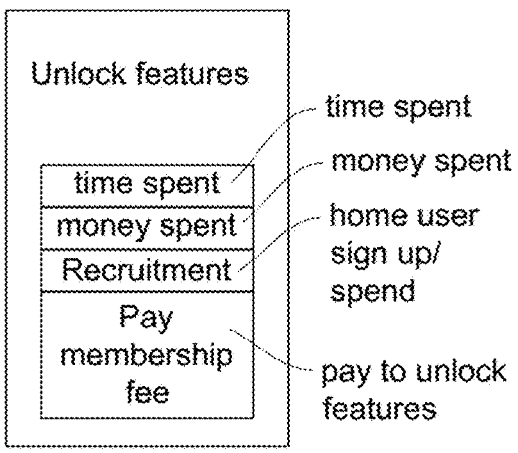
Figure 168:
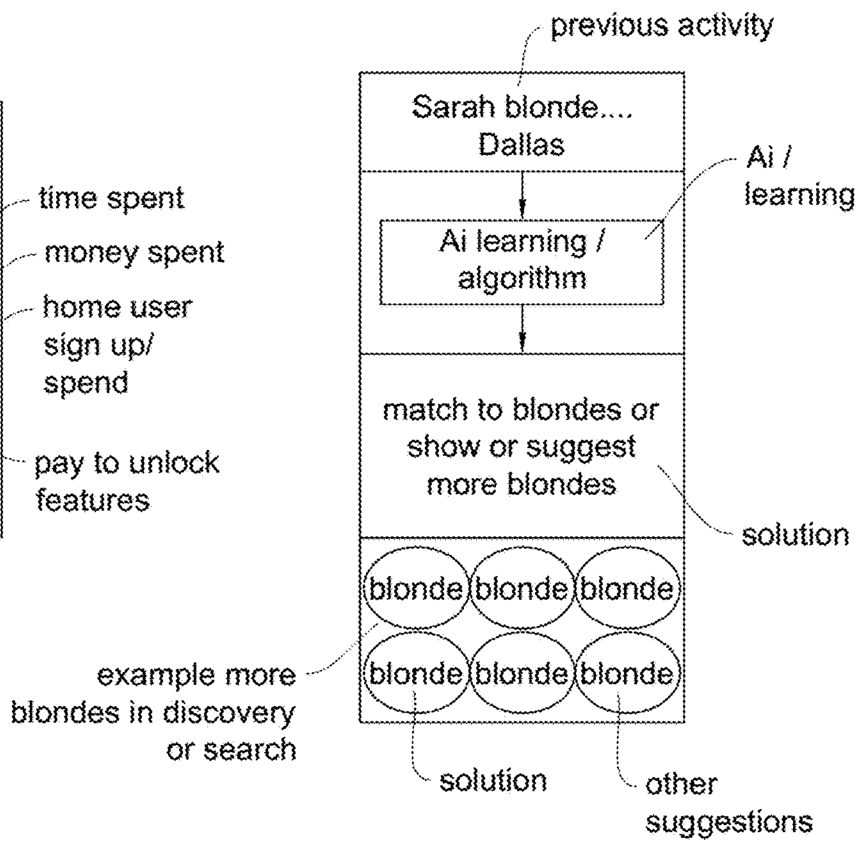
Figure 169:
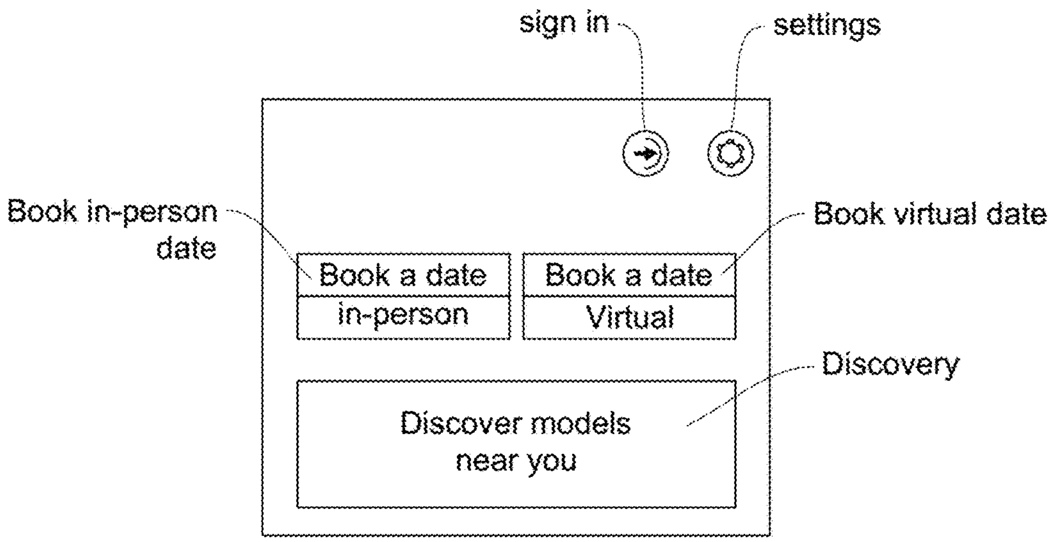

FIG. 167, FIG. 168, FIG. 169: In some embodiments, which may include but are not limited to (e.g., time, recruitment, sharing, posting, paying membership fees, spending a specific amount, lifetime membership, etc.) may be offered which may include but not limited to (e.g., rather than payment, doing particular things may unlock features, memberships, etc.) In some embodiments, which may include but not limited to (e.g., time spent, and time, data, recruitment, paying, etc.) may, which may include but not limited to (e.g., unlock features, following several users may unlock features, spending a specific amount of money may unlock features, sharing, posting, recruitment, partnerships, payment, etc.) which may unlock features or membership opportunities, or viewings, or unlocks, etc.) Conflicting dates, times, etc.) In some embodiments, 'scheduling' may not be able to have multiple, which may include but not be limited to (e.g., multiple, overlapping, unapproved, non-group, or non-predetermined dates, etc.), which may conflict with each other. In some embodiments, once booked, scheduler or options for another booking or schedule may be, which may include but not limited to (e.g., greyed out or changed or non-changeable, etc.) which may be determined based on which may have but not limited to (e.g., contractual or agreed upon obligations, etc.) on user interface unless otherwise may include but not be limited to (e.g., stated, changed, may be canceled, exchanged, refunded, may be canceled, etc.) In some embodiments, categories such as (e.g., 'discover influencers near you,' 'discover models near you,' 'view in-person daters near you,' 'view virtual daters near you,' 'view models near you,' etc.) In some embodiments, (e.g., hair colors or categories involving looks or goals or personal information, etc.) about a (e.g., user or model or person or group, etc.) may be used by the (e.g., user, or AI learning or the computing operation or the platform, or suggestions, or 3rd party, etc.) to (e.g., suggest similar users, find daters, find models, find creators, find users, or similar suggestions or suggestions similar to old activities or new activities or user's goals and preferences, etc.)

In some embodiments, user interface may have a, which may include but not limited to (e.g., conflict resolution system for calendar notifications, suggestions that may identify and resolve scheduling conflicts, etc.) which may include but not limited to (e.g., automatically, manually etc.) In some embodiments, user interface system may use which may include but not limited to (e.g., human, robot, bot, 3rd party, entity, computer system, AI system, machine learning, AI techniques, etc.) which may suggest which may include but not limited to (e.g., alternative dates, alternative times, meeting scheduling conflicts, etc.) that are compatible with users' which may include but not limited to (e.g., life, calendars, schedules, outside activities, etc.) In some embodiments, the system may also provide which may include but not limited to (e.g., notifications, suggestions, users, persons, profiles, content, etc.) to users based on their which may include but not limited to (e.g., data, preferences, behavior, computing operation settings or execution/AI, etc.) In some embodiments, which may include but not limited to (e.g., proof of contractual obligations may be manually uploaded or inputted, automatically inputted, automatically assessed based on data collection, network address, IP address, or data may be automatically inputted, etc.) In some embodiments, ways to assess if which may include but not limited to (e.g., item, user interface, option etc.) may be cancelled which may include but not limited to (e.g., contractual obligations may have been met' or if they may be cancelled, etc.) which may include but not limited to (e.g., terms of the contract, terms of the agreement, terms of payment agreement, etc.) may include but not be limited to (e.g., content from date, automatic user assessment based on AI or machine learning, pic of both users together uploaded to date log, management area, along with time stamps, look at metadata of pic and may then check consistency of data may be cancelled (e.g., compare location in metadata versus location of date and/or versus location of mobile device at start time and/or end time, look at location of user 1 mobile device and compare it to date location at start time and at end time, look at location of user 2 mobile device and compare it to date location at start time and at end time, look at location of user 1 mobile device and determine if it is in proximity of user 2 mobile device from at start time and at end time, automatic updates or automatic information collected from device or any interface or user or item or 3rd party, etc.)

Some embodiments may include but not be limited to (e.g., tax forms, tax information, tax-related, money-related information, etc.) may be available on which may have but are not limited to (e.g., platform, another platform-related platform, through a 3rd party, etc.) In some embodiments, tax information or forms that may be handled may be canceled, including but not limited to (e.g., persons, outside persons, outside parties, outside entities, platform, through the platform, outside or using 3rd party, etc.) In some embodiments, which may include but is not limited to (e.g., outside information, outside 3rd party information, outside cookies, cookies, party info, 3rd party information, amount of time spent on the app or amount of money paid, etc.) may be used for data collection, etc.)

Some embodiments may include but are not limited to (e.g., timer, time stamp, location stamp, business location stamp, confirmation of time, location, data, etc.) Location: In some embodiments (e.g., timer, time stamp, location stamp, business location stamp, confirmation of time, location, data, etc.), s may be used to determine or evaluate dates or connections, etc.) In some embodiments, when which may include but is not limited to (e.g., timer, time stamp, location stamp, business location stamp, confirmation of time, location, data, etc.) starts, the user is prompted to turn on the location-determining function on the device. Some embodiments, including but not limited to (e.g., timer, time stamp, location stamp, business location stamp, confirmation of time, location, data, etc.), may not start until the location-determining function is initiated or activated. In some embodiments, which may include but are not limited to (e.g., timer, time stamp, location stamp, business location stamp, confirmation of time, location, data, etc.), may be started from a watch or wristband in communication which may include but not limited to (e.g., Bluetooth or short-range communication) with a phone or long-range communication with any server (e.g., via one or more cellular networks, cell operator hotspots, routers, Internet networks, local area networks, entity networks, satellite networks, Wi-Fi networks, etc.) In some embodiments, which may include but are not limited to (e.g., timer, time stamp, location stamp, business location stamp, confirmation of time, location, data, etc.), may be a countdown clock. In some embodiments, The location of the device, which may include but not limited to (e.g., GPS coordinates, coordinates, location, street, business location, etc.) may be sent, which may include but not limited to (e.g., during, duration, check-in, check-out, time stamp, time record, time and data record, location, time and data record, coordinate(s), once, twice, thrice, four times, five times, or any amount of times to a server or never stopped, etc.) which may include but not limited to (e.g., before the start of date, when time starts, anytime during the countdown clock of the date, before date, after date, etc.).

In some embodiments, previous activities such as which may include but are not limited to (e.g., staring at a picture too long, re-clicking or revisiting a picture often, searching for a specific category, or a specific look, or a specific distance, or a specific day, or based on calendar or based on machine learning, etc.) suggestions or solutions may be made by platform, 3rd party, etc.) using which may include but not limited to (e.g., learning information, learned information, data collection, network address, IP address, computing operation, AI learning, machine learning, chip, outside assessments, manual assessment, manual information, automatic information, etc.) In some embodiments, the solution may appear to show as more of that, including but not limited to (e.g., specific type, category, similar, etc.) In some embodiments, there may be an artificial intelligence that may include but is not limited to (e.g., machine learning, user-generated, machine suggestions, outside suggestions, 3rd party suggestions, etc.) based on users analyzed information may include but not limited to (e.g., content photos, content, exploring, discovering, outside information, data collection, Network address, IP address, usage, spending, etc.) In some embodiments, there may be, which may include but not be limited to (e.g., suggestion, category options, options, etc.) which may include but not limited to (e.g., book an in-person date' or 'book a virtual date' or 'discover models near you' or 'view models by distance' or 'book models by distance' or 'view private photos now' or 'unlock private photos now' or 'discover her profile' or 'discover new content' or 'view exclusive content' or 'sign in' or 'register' or 'become a model/creator' or 'apply to be a creator' or 'discover creators,' etc.)

Figure 170:
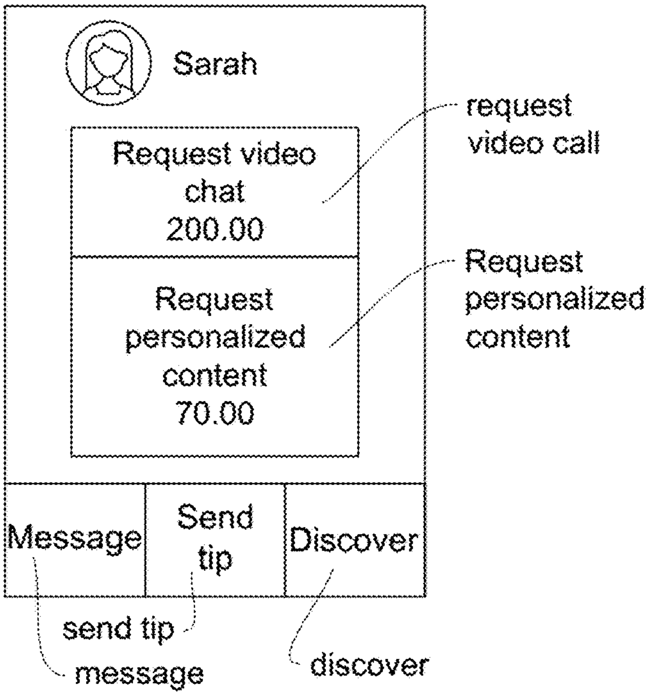

FIG. 170: In some embodiments, there may be options to, which may include but not limited to (e.g., request payment, require payment, send gift for, send exchangeable, put up exchangeable, put up crypto payment, show assets, pay or not pay, request assets or transmittables, etc.) to, which may include but not limited to (e.g., request or schedule video chat, video call, virtual date, entertainment options set by anyone or model or user, in-person date, personalized entertainment services, dating services, communication services, content, customized entertainment, entertainment, requested entertainment, entertainment, content, entertainment, funny content, messages, a virtual message, a content message, an answer to a question, request discounts, request information, send tip, etc.) In some embodiments, the payment option may be during, before, or after, which may include but is not limited to (e.g., matching AI-connecting, viewing, suggestions, a connection is made, swipe, tap, search, the message is sent, the message is received, preferences is shown, etc.)

Figure 171:
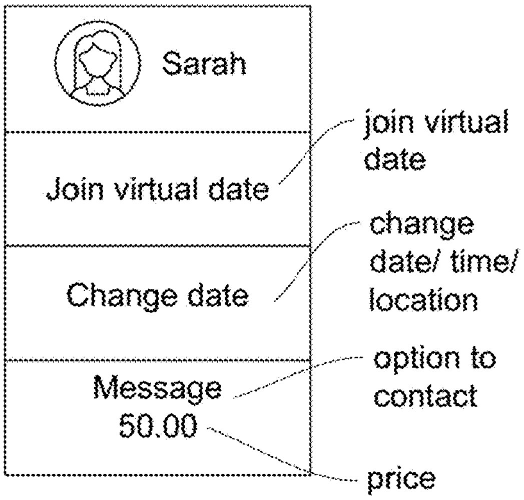
Figure 172:
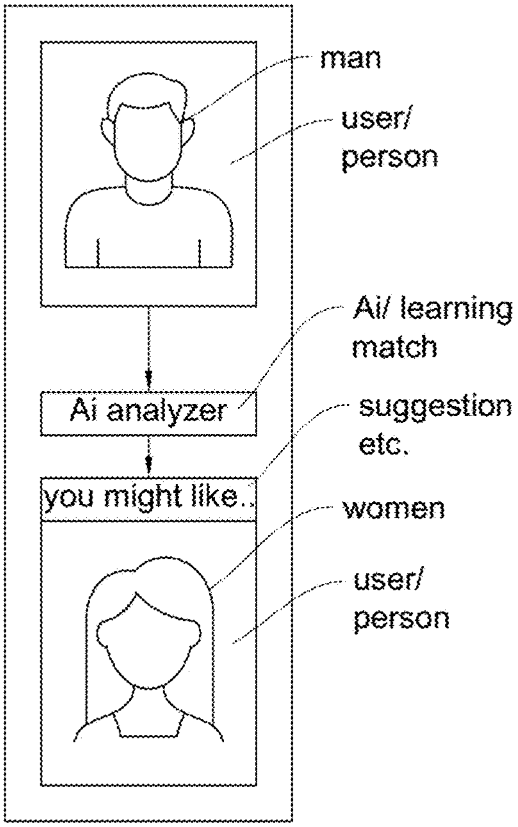
Figure 173:
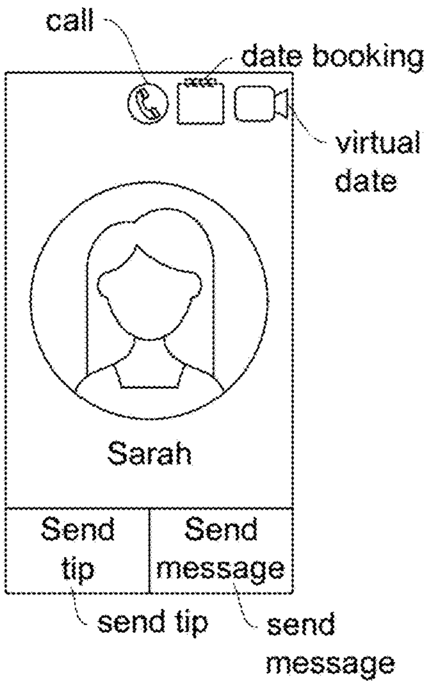

FIG. 171, FIG. 172, FIG. 173: In some embodiments, there may be an artificial intelligence that may include but is not limited to (e.g., machine learning, user-generated, machine suggestions, outside suggestions, 3rd party suggestions, etc.) based on users analyzed information may include but not limited to (e.g., content photos, content, exploring, discovering, outside information, data collection, Network address, IP address, usage, suggestions, behavior, spending, etc.) In some embodiments, there may be options, which may include but are not limited to (e.g., 'join virtual date' or 'join video call' or 'join chat now' 'or ask question' or 'join speed date' or 'begin speed date, or message, or send tip, or request content, etc.) In some embodiments, there may be ways to contact or complete or create a connection, including but not limited to (e.g., icons, buttons, options, swipes, tapping, etc.) In some embodiments, this may be combined with other options or by itself, including but not limited to (e.g., viewing profile, seeing profile, messaging, sending a tip, sending money, booking in person, or booking virtual, etc.) In some embodiments, there may be options to put up transmittables or gifts or pre-determined gifts or pre-selected gifts or vouchers, or vacations or promises, or contractual promises etc.) that may result in an exchange or thing of value that may result in (e.g., 'personalized content' 'a virtual date' 'a virtual meeting; 'an in-person meeting' 'an exchange of information such as answering questions' 'a promise of a job' 'a promise of a career move' 'a contractual agreement or promise' etc.) In some embodiments, a 'join virtual date' option may be there 'a 'join virtual meeting' option may be available, a 'message and a price or a gift exchange may be there' 'an AI analyzer may be there to show other options' 'an option to (e.g., 'book date, send tip, send message, contact, book date, virtual date, in person date, get information on, get background check on, etc.) may be available in (e.g., part or as a whole, one option or all, some options or none, etc.) whether on (e.g., content, by itself, or as a members only option or a public option, or on profile or aside from profile, etc.) In some embodiments, content may (e.g., 'scroll, lock, change, play, show, play on loop, be able to be viewed, be able to, etc.) for example, (e.g., be clicked, be a profile, have buttons or options overlaying, have options for, have messaging options, have in-person date options, have virtual date options, have calling options, have a call now button, etc.) In some embodiments, there may be options to give transmittables or pay transmittables or submit transmittables in exchange for (E.g., 'video chat' 'phone chat' 'phone call' 'virtual date' 'virtual meeting' 'to be a boyfriend' 'to be in a relationship, etc.) In some embodiments, (e.g., any type of payment or exchangeable or gifts or anything of value such as 'shout out' or a 'recommendation' etc.) may be in exchange for a relationship or communication or display or shown as such as a (e.g., 'boyfriend, husband, mommy, friend, sister, employee, service worker, service member, friend, emotional support, etc.) In some embodiments, (e.g., any information, content or profile, or advertisements, etc.) may be interactive or move or be refreshed or be shown or be displayed or recommended, etc.)

Figure 174:
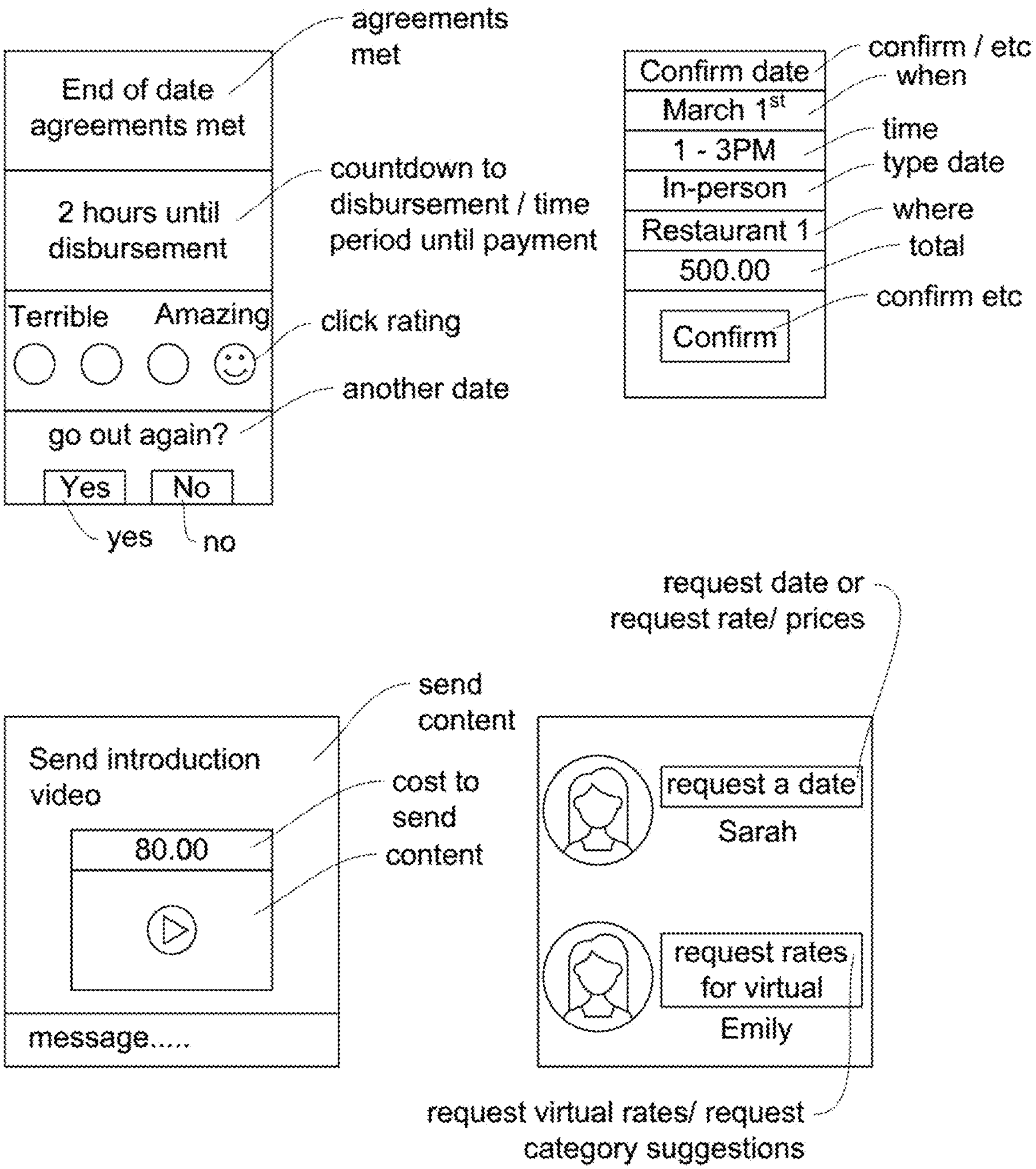

FIG. 174: In some embodiments, there may be options such as 'confirming date' or a (e.g., breakdown, itemized, receipt, invoice, total, partial, breakdown, bill, a summary of, total, etc.) of the date' or a (e.g., breakdown, itemized, receipt, invoice, total, partial, breakdown, bill, a summary of, total, etc.) of the payment of the date plus information' or a, which may include but not be limited to (e.g., breakdown, itemized, receipt, invoice, total, partial, breakdown, bill, a summary of, total, etc.) of information regarding the date or connection, etc.) In some embodiments, there may be options which may include but are not limited to (e.g., 'send introductory video' or 'send video proposal' or 'send content' etc.) where there may be an exchange of payment or a fee, or asset in exchange for, which may include but not limited to (e.g., sending message, or sending content, or introductions, whether content related or live or virtual or in person, etc.) In some embodiments, there may be options for the user to request from another user such as which may include but not limited to (e.g., prices, price ranges, general pricing, general transmittables, rates, requirements, information, or to ask for a 'date request, inquiry for date, inquiry for connection, etc.) another example would be, which may include but not limited to (e.g., having the other user create the ideal scenario which may include or not include payment to book, schedule, inquire about, inquire about, inquire regarding, secure, create connection to, hold, pay for, create business relationship with, use transmittables to secure or book, schedule, inquire about, to secure, to confirm, etc.) In some embodiments, there may be no time length required or suggested in order for model to get paid for date such as 'meeting' may mean (e.g., 'meet and leave' or 'meet for anytime over 0.01 seconds', etc.) In some embodiments, disbursement of funds, gifts, or payment may be instant and there may not be a delay in time from which the agreement was (e.g., completed, met or implied to have generally or partially to have been met, etc.) In some embodiments, dates or meetings may be confirmed by (e.g., 'email' 'box' 'area' 'range' 'management system' 'home screen' 'an application' 'a voice command' 'implied' 'display with contract on it' 'display to confirm date or meeting' 'or by 'AI confirmation' or by 'a 3rd party confirmation' or any way to confirm date or to change or reschedule or cancel, or to ask for more requirements such as another gift or money, etc.) In some embodiments, there may be a way to request a date or a type of a date or meeting without any meetings being available or being offered for example' (e.g., request virtual meeting with Emily when she only does 'in-person dates' etc.) In some embodiments, request for meeting or virtual or date may be required to or suggested to or an option to (e.g., submit a payment in exchange for the request, or there may be a gifting requirement in exchange for the request, etc.)

In some embodiments (e.g., calendar, timing method, schedule method, scheduling method, timing data center, etc.) may show a, which may include but not be limited to (e.g., breakdown, itemized, receipt, invoice, total, partial, breakdown, bill, a summary of, total, etc.) or a, which may include but not be limited to (e.g., breakdown, itemized, receipt, invoice, total, partial, breakdown, bill, a summary of, total, etc.) by itself/not by itself, of the, which may include but not be limited to (e.g., period, or date, or connection, etc.) In some embodiments, there may be, but not be limited to (e.g., profiles or information of dates or connections, etc.) whether, which may include but not be limited to (e.g., paid for or needs to be paid for, etc.) In some embodiments, there may be options such as, which may include but not be limited to (e.g., 'book this person again' or 'book again with xyz' or book now options or send tip options, or 'complete your booking with xyz' or 'pay for the booking, etc.)

In some embodiments to, which may include but not be limited to (e.g., get paid, etc.), the model/creator/person using the platform may be required to complete the duties, which may include but not be limited to (e.g., listed, understood, obligated, oral contract, contractual, etc.) in the agreement for the, which may include but not be limited to (e.g., connection, date, meeting, discussion, etc.) In some embodiments, for example, if the date says, which may include but not be limited to (e.g., paying for 2 hours of date time between A and B on this date, this restaurant, at this time, for the entire duration, check-in, check-out, time stamp, time record, time and data record, location, time and data record, coordinate(s), of time, etc.) the date log, management area, may require, which may include but not be limited to (e.g., proof, general proof, data recorded, data collection, Network address, IP address, evidence, etc.) of any potential, which may include but not be limited to (e.g., verbal, written, implied, etc.) contractual obligations with proof or no proof to get funds, which may include but not be limited to (e.g., accepted, dispersed, transferred, etc.) to mode/creator/users account. Some embodiments, including but not limited to (e.g., unlimited photos, voice, videos, content, etc.), may be uploaded per point of agreement for proof, or any recording or data may be proof or implied data, or gather data.

In some embodiments, there may be an interface or a user interface with, which may include but not be limited to (e.g., introductory profile, intro video, intro content, profile photos, price, buy now, price plus buy-now, market price, platform market price, options to pay in cash, 3rd party links to debt sites, 3rd party sites to redeem value or cash platforms, debit, credit, jewelry, car title, site funds, preloaded funds, etc.) In some embodiments, there may be user interface, which may include but not be limited to (e.g., locked profile until requirements are met, live shows, live events, live plus content, live plus no content, live plus options to view more, played show, free show, previewed show, a live show, live options to view profile, live profile, live streaming, live streaming, pre-recorded streaming, pre-recorded shows, pre-made content, in-person date options, booking date options, profile date options, unlock content date options, price of date, price per hour, price for time, availability, price per activity, free follow, options to follow, options to view entire profile, unlock, previews, chat previews, content previews, content, photos, videos, communication, chat boxes, options or areas to share information, communication, options to send tips, suggested user profiles, computing operation chosen profiles, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the Bottom, top, side, anywhere, with other suggestions or profiles, or persons, or promotional material or content or information etc.) In some embodiments, there may be options to: (e.g., move, scroll, switch, disappear, reappear, swipe etc.) any, which may include but not be limited to (e.g., user interfaces, content, items, parts of user interface etc.) In some embodiments, there may be a 'pay for a live-in person date payment method, pay for any form of virtual entertainment payment method, pay for customized entertainment, entertainment, requested entertainment, entertainment, videos/pictures, pay for requested entertainment, pay for custom entertainment, pay for a live-virtual date payment method, pay for a travel date payment method' in which any person in the public, public bidders, private bidders, registered bidders, subscribers, fans, people, may be pay at that moment, may be use funds from their account, may be use their credit card, may be use cash, may be use any form of crypto, may be use any form of an asset to pay for a date may include but not limited to the title of their vehicle, cash transfer payments, asset currency, gold, silver, diamonds, etc.)

In some embodiments, there may be stacks or options to continue to look or get automated looking or viewings of, which may include but not be limited to (e.g., content, creators, models, users, etc.) there may be content that may be, which may include but not be limited to (e.g., scrolled up and down, left and right, or in and out, or back and forth, or disappearing, or appearing, or automatically moving, or auto-changing, or manually changing, etc.) In some embodiments, on FIG. 174 or any user interface there may be options to have (e.g., 'half-unlocked content' and/or 'half-locked content, partially locked content, partially played content, preview content, preview before payment content, pay to view content, there may be 'preview only content' there may be 'prepaid content' there may be half of a photo, or half of a video, or parts of a video, or parts of a photo, or there may be a portion of a video or a portion of a photo, there may be a blurred version of a video/photo or a pixelated version of a photo/video, photos, video, content, or anything may be NSFW, or NSFW related, or sexual, or non-sexual, or NSFW content etc.) In some embodiments, there may be an option for a user to, which may include but not be limited to (e.g., scroll, tap, move, command, make, go, etc.) which may include but not be limited to (e.g., up down, left right, that may be scrolled up and down, left and right, or in and out, or back and forth, or disappearing, or appearing, or automatically moving, or auto-changing, or manually changing, etc.) In some embodiments, the user or the person or the content creator or the model may be, which may include but not be limited to (e.g., moved to view another one, or moved in a way to view their photos, or moved in a way to view their profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections, etc.) In some embodiments, there may be, which may include but not be limited to (e.g., stacks or options, or areas, or profiles, or content, or hologram or display screens, etc.) to continue to look or get automated, which may include but not be limited to (e.g., looking, viewings of, movement, selection, scroll, etc.) which may include but not be limited to (e.g., content, creators, models, users, etc.)

On any user interface, any user interface, or platform or process: In some embodiments, any user interface may have an option for a user to, which may include but not be limited to (e.g., scroll up, down, left, right, that may be scrolled up and down, left and right, or in and out, or back and forth, or disappearing, or appearing, or automatically moving, or auto-changing, or manually changing, etc.) In some embodiments, the, which may include but not be limited to (e.g., use, the person, content creator, model suggestion, 3rd party content, content, ad, advertisements, promotional material, content, etc.) may be moved to view another one, or moved in a way to view their photos, or moved in a way to view a profile depending on the direction of the movement on the screen or the automatic direction or the automated selection, or the 'show version' where the user may not have to do anything and may be use voice activation to scroll or view different parts of the screen, hologram, user interface, viewing display, person, movements, profile, calendar, selections, creators selections. In some embodiments, there may be, which may include but not be limited to (e.g., stacks or options to continue to look or get automated looking or viewings of content, creators, models, users, etc.) In some embodiments, there may be a countdown until, which may include but not be limited to (e.g., items, users, user interfaces, selections, options, etc.) may be, which may include but not be limited to (e.g., dispersed, not available, gone, left, unable, finished, completed, to submit a complaint, to submit issue, to submit an inquiry, to obtain refund, to have payment, to allow cost to continue, to be able to click or use option, etc.) In some embodiments, any 'contractual obligations' or any 'contractual agreement or any 'agreement may be, which may include but not be limited to (e.g., implied, handshake, implied agreement, written agreement, platform agreement, term agreement, general implied agreement, messaging agreement, verbalized agreement, etc.)

In some embodiments, which may include but not be limited to (e.g., questions or suggestions, or items, etc.) to add to paying person's, which may include but not be limited to (e.g., bill, receipt, invoice, total, partial, breakdown, invoice, payment bill, etc.) may include but not limited to (e.g., paying for valet, a refund for valet, refund for gas money, refund for driving, travel, route, shown on the odometer, driving, travel, route, fee, no taxi-service fee, not able to provide me with a taxi service fee, excessive valet fee, parking and walking fee, security fee, security guard fee, smelling bad fee, allergic reaction fee, parking payments, waters, lotions, ruining dress, spilling on the dress, ripping dress, getting sick, feeling nauseous, the person being rude to person, being verbally harassed, feeling uncomfortable, overtime fee, therapy fee, talking too much fee, etc.) In some embodiments, duration, check-in, check-out, time stamp, time record, time and data record, location, time and data record, coordinate(s), may be any period from which may include but not limited to (e.g., 1 second(s) to infinity or an infinite amount of time, etc.) In some embodiments, it may include but not be limited to (e.g., reminders, questions, solutions, etc.) may be able to ask through, which may include but not be limited to (e.g., humans, users, persons, AI services, etc.) whether, which may include but not be limited to (e.g., paid for or included, etc.) or on the, which may include but not be limited to (e.g., platform, user interface, etc.) In some embodiments, any agreement may not be made through any written contract. In some embodiments, any contract or agreement may or may not be made, which may include but not be limited to (e.g., agreement or understood agreement or partial agreement may be made verbally, text, messaging, 3rd party, outside platform, inside platform, through the platform, outside of the platform, voice agreements, written agreements, text agreements, messaging agreements, partial agreements, may all be held as ‘contractual agreements or agreed upon agreements, arrangements, or contracts, or booking or secured, etc.) Artificial intelligence ads suggestions: In some embodiments, data may be analyzed from, which may include but not be limited to (e.g., calendar, from input, from machine learning, from AI, that may be used to target persons based on their work schedule, their activities, etc.) data may be used to suggest or show or encourage, which may include but not be limited to (e.g., discounts, 3rd parties, advertisers, advertisements, businesses, 3rd party entities, payments, suggestions, some ad on a specific date based on that person’s driving, travel, route, schedule, work schedule, data schedule, etc.) In some embodiments, data collected such as car, net worth, spending, credit cards, bid amount, paid amount, user frequency, ratings, etc.) to target ads or to sell to a 3rd party, etc.) User data may be sent to 3rd parties or internally for discounts or suggestions for hair, makeup, massages, discount places, purchases, home care, etc.) In some embodiments, AI may be used to analyze the content of users to obtain information, which may include but not be limited to (e.g., a girl with short hair may get a suggestion, ad, discount, call, information from someone that may suggest getting hair extensions, a girl with short eyelashes may get offers to get lash extensions, a girl that wears red lipstick may get recommendations for red lipstick or other color lipsticks if someone talks about hair products, user may get an ad for hair products, etc.)

Figure 175:
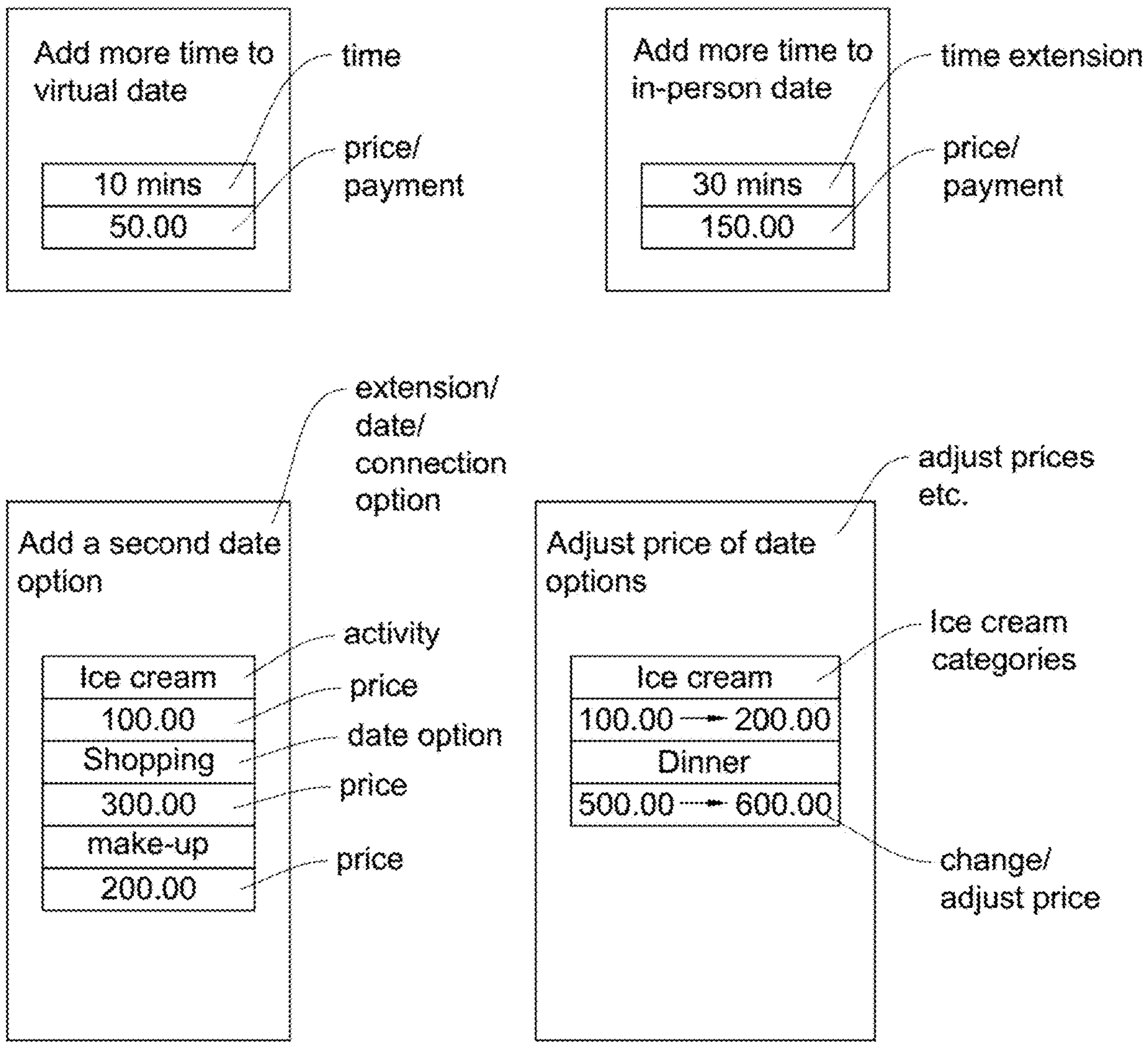

FIG. 175: Additional date extensions, adding, adjusting payments, adding tips: In some embodiments, there may be an option to extend the period of the, which may include but not limited to (e.g., date, connection, meeting, plan, message, request, chat, talk, communication, etc.) by exchanging of value, which may include but not be limited to (e.g., payment, exchange of value, assets, gifting, gifts, etc.) In some embodiments, there may be options to extend the period or add to a date or add to connection or make a further connection or add more anything which may be, which may include but not limited to (e.g., period, additional date, day, time, an extension of time, add shopping spree, add gift cards, add payment of bills, add period, add second date, add another dater, add another paid dater, add more users, etc.) In some embodiments, the user may adjust the price by (e.g., paying more, adding a tip, raising the price, sending more, giving donations, etc.) In some embodiments, users may have a, including but not limited to (e.g., set price, accept tips, accept transmittables, accept minimum for their time, require gift(s), etc.)

In some embodiments, there may be options such as, which may include but not be limited to (e.g., profile photo, profile information, dummy profile information, content plus booking information, book a live date, book an in-person date, add the person to calendar, add the date to calendar, add time to calendar, live view now, click for live view, do requirement for live view, trending persons, trending accounts, book live time, go on a date with this person, go on an in-person date with this person, viewing date times with this person, viewing available date times, viewing date options, viewing date general periods, viewing or learning periods, viewing or learning general things such as ‘lunch dates available, or dinner dates available or general periods available’ etc.) In some embodiments, there may be, including but not limited to (e.g., profiles, profile photos, content, connected content or viewing, information, etc.)

In some embodiments, the user interface may be the user’s feed or user interface. In some embodiments, there may be, which may include but not be limited to (e.g., information, profile information, advertisements, shown days, shown times, pre-selected dates, pre-selected times, pre-selected booking times and dates, suggestions to click, suggestions to book, schedule, inquire about, inquire about, inquire regarding, secure, create connection to, hold, pay for, create business relationship with, use transmittables to secure or book, schedule, inquire about, etc.) the process on how to book, schedule, inquire about, inquire about, inquire regarding, secure, create connection to, hold, pay for, create business relationship with, use transmittables to secure or book, schedule, inquire about, etc.) options to type in what to book, schedule, inquire about, inquire about, inquire regarding, secure, create connection to, hold, pay for, create business relationship with, use transmittables to secure or book, schedule, inquire about, etc.) options to click what is already been determined or pre-selected, pre-selection may also be from platform or user or model, etc.) In some embodiments, there may be, which may include but not be limited to (e.g., pre-created, pre-determined by the creator, pre-selected by platform, etc.), which may include but not be limited to (e.g., persons, users, times, dates, locations, duration, check-in, check-out, time stamp, time record, time and data record, location, time and data record, coordinate (s), s, etc.) In some embodiments, pre-selected date information may be made by, including but not limited to (e.g., platform, creator, user, person, 3rd party, entities, etc.) In some embodiments, the user interface may be trending, popular, or shown by computing operation. In some embodiments, the user interface may show a home screen or any screen or user interface. In some embodiments, there may be, which may include but not be limited to (e.g., shown, zoomed in, few at a time, one at a time, user interface options, etc.) that may show, which may include but not be limited to (e.g., extraordinary creators, trending in your city, etc.) which may be combined with, which may include but not be limited to (e.g., distance, location data, etc.)

In some embodiments, user interface may be the, which may include but not be limited to (e.g., models, paid creators view, etc.) In some embodiments, user interface may be a, which may include but not be limited to (e.g., model, creator view, etc.) in which the, which may include but not be limited to (e.g., user, model, girl, creator, paid dater, etc.) may show interest first, which may include but not be limited to (e.g., search the platform for a man to show interest in, contact a person, send a message, send a direct message, send inquiry, show interest, show interest, etc.) In some embodiments, for example, the creator may search for, which may include but not be limited to (e.g., salary, professional, net worth, looks, time spent on platform, etc.) and be shown options such as, which may include but not be limited to (e.g., higher paid individuals, verified net worth, verified income, verified background check, looks, photos, exclusive photos, etc.) that she may be send a, which may include but not be limited to (e.g., communication to whether, which may include but not be limited to (e.g., automatic, manually, computing operation, robotics, AI, etc.) in the form of anything such as, which may include but not be limited to (e.g., message, wink, cute message, calendar, availability, etc.) which may include but not be limited to (e.g., saying she is available for a date, or wants to go out on a date etc.) In some embodiments, this may not 'begin a conversation' user interface may simply shows or communicate to the other person that user, which may include but not be limited to (e.g., likes what she sees, would be interested in a date, etc.) which may give the other user the option to take the 'initiative' to, which may include but not be limited to (e.g., message, spend money, subscribe, follow, book a date with her, book date, book meeting, block off her calendar, send her flowers, send her gifts, etc.)

In some embodiments, this figure may show, which may include but not be limited to (e.g., suggestions, requirements, highly recommended pictures/videos for profile, highly-recommended suggestions/requirements, mandatory requirements, etc.) In some embodiments, for example, there may be, which may include but not be limited to (e.g., mandatory, highly recommended, needed, suggested, etc.) options from the platform and the platform may specific, which may include but not be limited to (e.g., entities, persons, users, etc.) which may include but not be limited to (e.g., more, less, higher, frequent, etc.) which may include but not be limited to (e.g., recommended, shown, suggested, aligned with, moved around, bigger, seen more, suggested more, distributed to, etc.) using, which may include but not be limited to (e.g., machine learning, computing operation, humans, persons, clicking, frequency, etc.) due to potentially, which may include but not be limited to (e.g., seeing, meeting with, aligning to, suggesting, etc.), which may include but not be limited to (e.g., criteria, requirements, etc.) that may have been, which may include but not be limited to (e.g., recommended, noted, given, suggested, etc.) In some embodiments, user interface or process may just an option, but may be a way for the platform to have, which may include but not be limited to (e.g., mandatory, highly recommended requirements, more suggested requirements, alignment with goals, etc.) for, which may include but not be limited to (e.g., models, creators, persons, etc.) that want to be, which may include but not be limited to (e.g., recommended, shown, seen, viewed, etc.) which may include but not be limited to (e.g., less, more, more often, many times, etc.) In some embodiments, user interface may have, which may include but not be limited to (e.g., universal requirements of content or non-universal, user, anyone, person, AI, etc.) requirements.

In some embodiments, unity requirements may be an option to give a, which may include but not be limited to (e.g., comparable, leveled option, leveling, easily distinguishable option or view, etc.) for the, which may include but not be limited to (e.g., content, user interface, section, screen, hologram, user interface, viewing display, item, original, user-created, platform-owned, platform, 3rd party, business, entity, etc.) In some embodiments, unity requirements may or not be, which may include but not be limited to (e.g., needed, enforced, suggested, shown, computing operation-affecting, etc.) In some embodiments, unity requirements may be, which may include but not be limited to (e.g., recommended, suggested, more favored, required, etc.) In some embodiments, there may be user interface, which may include but not be limited to (e.g., user liking another user, user showing interest in another user, user viewing another users profile, live shows, live events, live streaming, pre-recorded streaming, pre-recorded shows, pre-made content, content, photos, videos, communication, chat boxes, options or areas to share information, communication, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the bottom, top, side, anywhere, with other suggestions or profiles, or persons, or promotional material or content or information etc.) In some embodiments, there may be options to, which may include but not be limited to (e.g., move, scroll, switch, disappear, reappear, swipe etc.) any content or items, etc.)

In some embodiments, there may be options to, which may include but not be limited to (e.g., book, schedule, inquire about, inquire about, inquire regarding, secure, create connection to, hold, pay for, create business relationship with, use transmittables etc.) to, which may include but not be limited to (e.g., secure, book, schedule, inquire about, inquire about, schedule, obtain date, obtain connection, etc.) a 'party virtual date' which may refer to, which may include but not be limited to (e.g., single or multiple shorter or multiple regular time or any time of dates, meetings, or connections, etc.) which may include but not be limited to (e.g., in a row, at one time, staggered, over a period of days, over a period of weeks, over a period of years, over any time frame, etc.) or, which may include but not be limited to (e.g., one right after the other or one the same day or on different days, staggered, etc.) In some embodiments, there may be options to choose may include but not be limited to (e.g., person or persons, users, or outside users, or outside persons, or 3rd parties, advertisers, advertisements, businesses, or entities, etc.) In some embodiments, there may be options to see may include but not be limited to (e.g., breakdown, itemized, receipt, invoice, total, partial, breakdown, bill, summary of, total, place to purchase, place to checkout, invoice, etc.) which may include but not be limited to (e.g., prices, price ranges, general pricing, general transmittables, and/or time, a total to pay, a checkout window, a checkout options, 3rd party options to check out, ways to pay, etc.) In some embodiments, there may be options to increase or decrease time which may, which may include but not be limited to (e.g., 'fluctuate price, or total, fluctuate total, fluctuate time, fluctuate price, etc.) In some embodiments, there may be options to adjust may include but not be limited to (e.g., 'adjust prices, price ranges, general pricing, general transmittables, adjust times, dates, location, time period, frequency, etc.) In some embodiments, there may be options to may include but not be limited to (e.g., lower price, change price, switch price, change price, adjust price, funds application, apply funds, etc.) or change may include but not be limited to (e.g., booking calendar or booking (e.g., breakdown, itemized, receipt, invoice, total, partial, breakdown, bill, summary of, total, etc.) or booking due to price changes, time changes, etc.)

In some embodiments, which may include but not limited to, the: (e.g., amount, partial, total, etc.) which may include but not be limited to (e.g., deposit, trust funds, or total amounts put up to secure the 'date in person, etc.) may be shown in, not be limited to (e.g., real-time or shown on a page, or any user interface, etc.) In some embodiments, there may be, which may include but not be limited to (e.g., clickable, options, 3rd party references, etc.) that may show why, which may include but not be limited to (e.g., payments are made, or what words mean, or explaining how refunds, requirements, rules, work, etc.) In some embodiments, there may be a large option near the, which may include but not be limited to (e.g., bottom, top, side, or near photo or information, etc.) that may allow the, which may include but not be limited to (e.g., person, user, robot, AI, etc.) to see their, which may include but not be limited to (e.g., an entire, portion of, itemized, receipt, invoice, total, partial, breakdown, bill, credit, etc.) which may include but not be limited to (e.g., 'bill, invoice, or total, etc.) that may show a, which may include but not be limited to (e.g., breakdown, itemized, receipt, invoice, total, partial, breakdown, bill, a summary of, total, etc.) or the page may show this, which may include but not be limited to (e.g., breakdown, itemized, receipt, invoice, total, partial, breakdown, bill, a summary of, total, etc.) along with which may include but not limited to, the: (e.g., explaining information, that may allow the booking to go through, etc.)

In some embodiments, there may be options to book, schedule, inquire about, inquire about, inquire regarding, secure, create connection to, hold, pay for, create business relationship with, use transmittables to secure or book, schedule, inquire about, etc.) a 'party virtual date' which may refer to 'multiple shorter or multiple regular time or any time of dates' in a row or may include but not be limited to (e.g., one right after the other or one the same day or on different days, staggered, etc.) In some embodiments, there may be options to choose may include but not be limited to (e.g., person or persons, users, or outside users, or outside persons, or 3rd parties, advertisers, advertisements, businesses, or entities, etc.) In some embodiments, there may be options to see may include but not be limited to (e.g., breakdown, itemized, receipt, invoice, total, partial, breakdown, bill, summary of, total, etc.) which may include but not be limited to (e.g., prices, price ranges, general pricing, general transmittables, and time, a total to pay, a checkout window, a checkout options, 3rd party options to check out, ways to pay, etc.) In some embodiments, there may be options to increase or decrease time which may, which may include but not be limited to (e.g., 'fluctuate price, or total, etc.) In some embodiments, there may be options to adjust may include but not be limited to (e.g., 'adjust prices, price ranges, general pricing, general transmittables, adjust times, dates, location, time period, frequency, etc.) In some embodiments, there may be options to may include but not be limited to (e.g., lower price, change price, switch price, funds application, apply funds, etc.) or change may include but not be limited to (e.g., booking calendar or booking (e.g., breakdown, itemized, receipt, invoice, total, partial, breakdown, bill, summary of, total, etc.) or booking due to price changes, time changes, etc.)

Figure 176:
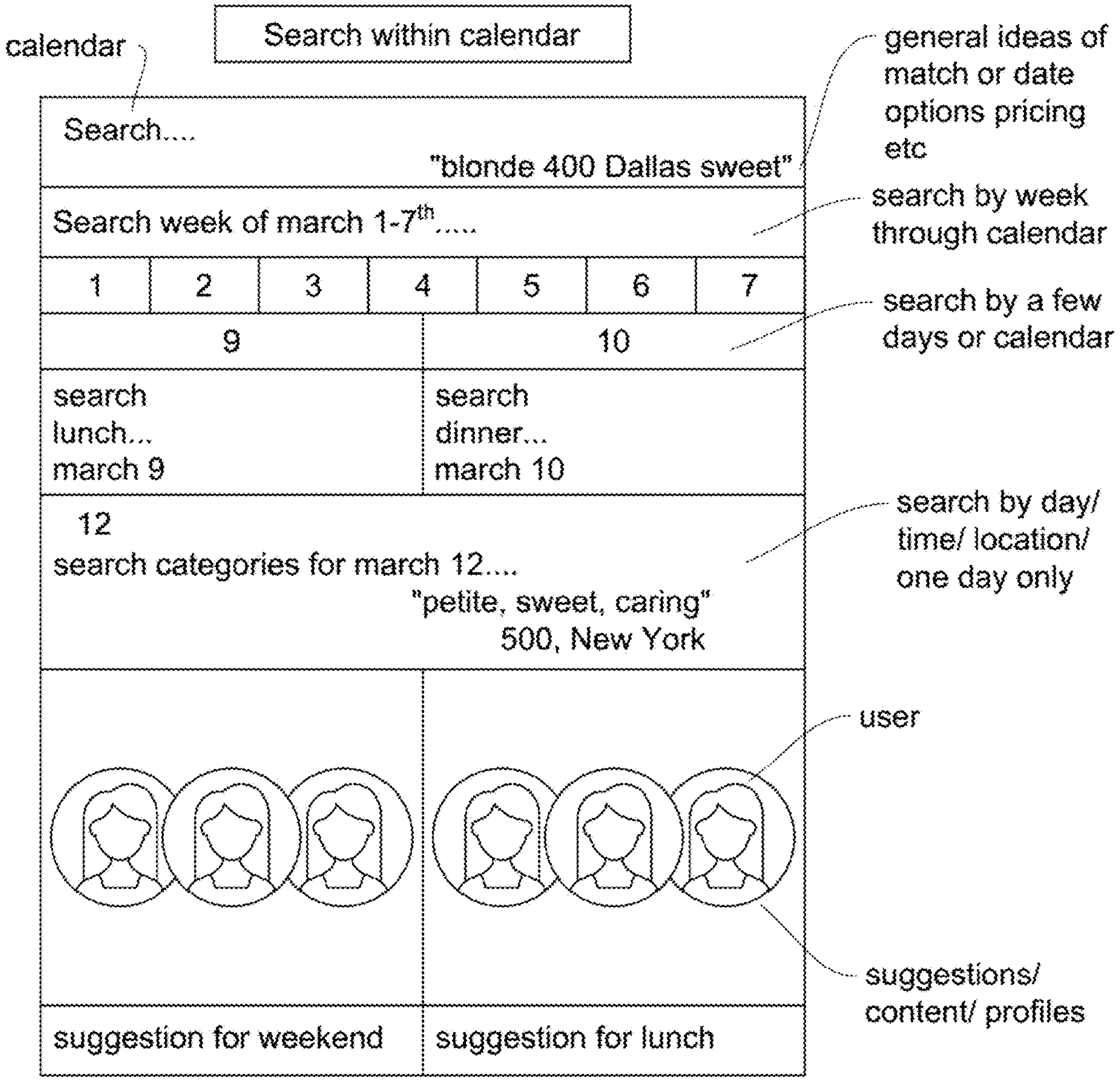

FIG. 176: In some embodiments, users may search, which may include but not be limited to (e.g., within their calendar, through their calendar, on their calendar, through integrations on their calendar, on someone else's calendar, within their scheduling device or scheduling timing data, etc.) In some embodiments, users may, which may include but not be limited to (e.g., search, view, find, tap, combine, search for, suggest, connect with, be matched to, matching, date matching, likes, send messages to, interact with, etc.) which may include but not limited to (e.g., by themselves, through voice commands, through another user, through 3rd party, by user, by model, by agency, by 3rd party, through connected or integrated calendars, etc.) within their calendar for anything may include but not limited to (e.g., other users, dates, connections, browsing, criteria, categories, etc.) In some embodiments, users may, which may include but not be limited to (e.g., book a date or connection or send a message or tip or pay, etc.) which may include but not be limited to (e.g., through, within, integrated from, partially integrated, 3rd party view, etc.) their, which may include but not be limited to (e.g., calendar, timing data, timing method, etc.) In some embodiments, searches may be done by, which may include but not be limited to (e.g., month, week, day, few days, weekend, weekdays, suggestions, popularity, popular, highly paid, most booked, auction winners, winners, special person, promoted person, etc.) In some embodiments, criteria may be, which may include but not be limited to (e.g., searched, found, suggested, viewed, show up on the calendar, show on timing method, etc.) through any medium or way, which may include but not be limited to (e.g., computing operations, AI, personal, 3rd parties, advertisers, advertisements, businesses, users, etc.) In some embodiments, users may be automatically matched or suggested with other users based on their availability, calendar, preferences, or history. In some embodiments, on the calendar, users may appear. In some embodiments, the user may be able to, which may include but not limited to (e.g., shown, inserted, suggested, etc.) as which may include but not limited to (e.g., suggestions, possibilities, or be made to appear booked but not paid for yet, or to suggest messages, connections, or viewing profile, or considering for dates to appear, etc.) In some embodiments, there may be options to, which may include but are not limited to (e.g., 'pay to remove ratings' or 'pay to remove users feedback' or 'pay to remove discussions among other users or pay to remain private or confidential or pay not to get rated, or pay not to get user feedback, etc.)

In some embodiments, which may include but not be limited to (e.g., search, categorize, separate, seek, view, search for, etc.), which may include but not be limited to (e.g., users, categories, persons, profiles, items, etc.) within the calendar, or on any user interface. In some embodiments, the user may be able to search may, include but not limited to (e.g., on the calendar, around the calendar, on the user interface, on each day, period searching, within a period, within the calendar, etc.) which may include but not limited to (e.g., on each day, such as search within a time frame, or period, or category) time frames may include but not be limited to (e.g., lunch, snack, dinner, coffee, shopping, virtual, in-person, restaurant, etc.) In some embodiments, the user may be able to search on the calendar, which may include but not be limited to (e.g., per day, per period, per week, per location, per distance, per popularity, per type of model, per type of creator, per user, per availability, per activity, etc.) In some embodiments, there may be user interface, which may include but not be limited to (e.g., user liking another user, user showing interest in another user, user viewing another users profile, live shows, live events, live streaming, pre-recorded streaming, pre-recorded shows, pre-made content, content, photos, videos, communication, chat boxes, options or areas to share information, communication, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) which may include but not limited to (e.g., dates, availability to message, messages, prices, price ranges, general pricing, general transmittables, types, categories, a section at the bottom, top, side, anywhere, with other suggestions or profiles, or persons, or promotional material or content or information etc.)

Figure 177:
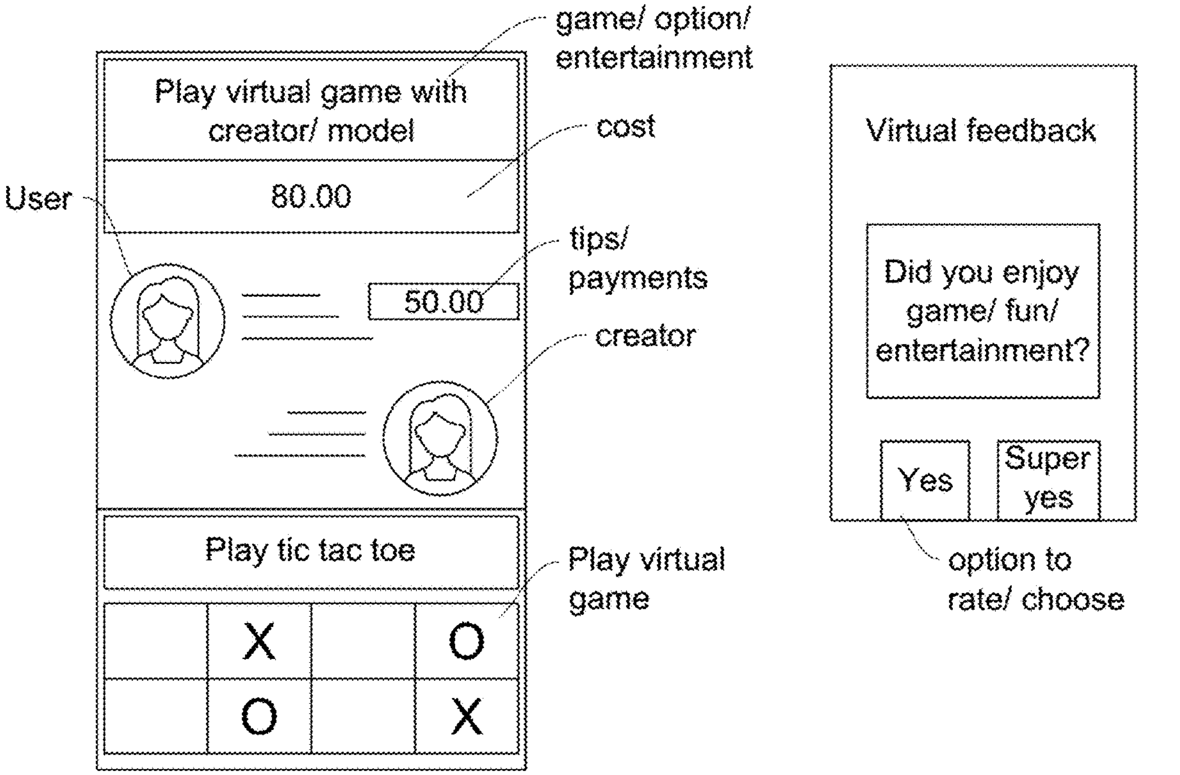

FIG. 177: In some embodiments, there may be options for, including but not limited to (e.g., virtual gaming, virtual entertainment, virtual drawing, virtual interactions, virtual betting, virtual gambling, in-person gambling, in-person betting, in-person games, virtual games, virtual streaming, virtual movies, virtual shows, in-person theatres, in-person shows, live shows, virtual art, or virtual sharing of photos/content, etc.) In some embodiments, virtual entertainment options may be available for a, including but not limited to (e.g., fee or a price or a set price, or a platform set price, gift requirements, etc.) In some embodiments, users may have the option to play games, which may include but are not limited to (e.g., gambling, gambling games, sports games, virtual games like chess or tic tac toe, virtual movies, live shows, live entertainment such as 'zoo or circus or personal live-stream or 'something sitting there doing nothing' or a show' or a person' virtual entertainment, virtual connections, virtual messaging, virtual fun, virtual AI speaking, robots speaking, voice sharing, etc.) In some embodiments, a gambling platform may be provided such that users can bet on sports games or bet on which user may win a bid for a date, which creator will have the highest earnings during a period, which creator will go on the most number of dates during a period, which creator will have the most number of profile views during a specific period, which user will go on the most number of dates with creators during a particular period, etc. In some embodiments, options to view calendar timing method or data may be one-time or recurring or membership based on each person's pricing or requirement or any way to lock or unlock timing method or timing data or calendar. In some embodiments, membership may be required to see another user in another city, country, or location, whether by each person or by platform payment; each user may be able to have their requirements for viewing them around the world or just in their city or their schedule or their timing data, or content, etc.)

In some embodiments, there may be options to, which may include but not limited to (e.g., pay or free options etc.) to, which may include but not limited to (e.g., live stream, live stream a 'movie,' or game, or entertainment, etc.) or any form of which may include but not limited to (e.g., content or any form of entertainment etc.) at the, which may include but not limited to (e.g., same time, at different times, pause, top, record, not record, live only, pre-recorded live, streaming, regular streaming, no talking, talking etc.) In some embodiments, the 'free or paid option' to stream, watch, together, time spent together, which may include or not include a, which may include but not limited to (e.g., button, clicker, beginning, start, etc.) to begin which may include but not limited to (e.g., have a (e.g., timer, time stamp, location stamp, business location stamp, confirmation of time, location, data, etc.) or a recorded, or a data collector etc.) to determine if the 'contractual agreements that were paid or not paid' which may include but not limited to (e.g., went through or was obtained, etc.) In some embodiments, there may be options to 'pay' to do which may include but not limited to (e.g., live streaming, movie, entertainment, virtual entertainment, virtual game, in person game, or any time spent etc.) between one, two, or more persons etc.) In some embodiments, payment may be made prior to being able to possibly which may include but not limited to (e.g., 'join call' or 'join date' or 'join live stream' or 'being movie' or 'begin date or check-in, check-out, time stamp, time record, time and data record, location, time and data record,' or 'start date' or 'call this person' or 'video with this person' etc.) In some embodiments, options to join or book may not be available until 'agreements are met' or 'requirements are met,' which may include but not be limited to (e.g., may include payment or instructions or actions or anything to meet requirements etc.)

In some embodiments, there may be a 'messaging system or user interface which may be described as may include but not limited to (e.g., management system, request system, manager system, sent messages, sent requests, sent offers, send offers, make offers, create messages, send mass messages, create offers, create discounts, communicate with others, offers, communication to, communicate with, reach out to, etc.) In some embodiments, 'messaging or offering system' may allow, which may include but not be limited to (e.g., booking offers, booking requests, sent requests for booking, offers for booking, AI response, trained auto responses, AI/human/computer/robotics trained scheduled auto-responses with may or may not include content or created content or any visuals or information, auto-response, renew, calendar sending schedule, schedule posts, schedule sending of messages, remove fans, set VIPS, set priorities, schedule a live event, schedule a live, allow or offer virtual 'date,' remove subscribers, remove users, categorize users, target users based on categories or information, sending offered content, sending locked content, change booking, request booking, send offers for booking, send discounts or price offers, send calendar requests, send requests to book, schedule, inquire about, inquire about, inquire regarding, secure, create connection to, hold, pay for, create business relationship with, use transmittables to secure or book, schedule, inquire about, etc.) for calendar, send virtual date requests, show open days for booking, show open times to book, schedule, inquire about, inquire about, inquire regarding, secure, create connection to, hold, pay for, create business relationship with, use transmittables to secure or book, schedule, inquire about, etc.) ask for gifts, ask for requests, send request offers, send requests, show those that purchased, manage those that purchased, read messages, send messages, ask those to subscribe, ask those to unlock content, send special prices, price ranges, general pricing, general transmittables, send content to be unlocked or paid for, send original movies, send movies, send games to pay, send games to unlock, send business offers to get paid for, sending locked movies or original, or any content, offering days, time, etc.) to be booked or subscribers information, subscribe, locked content, information, etc.)

Figure 178:
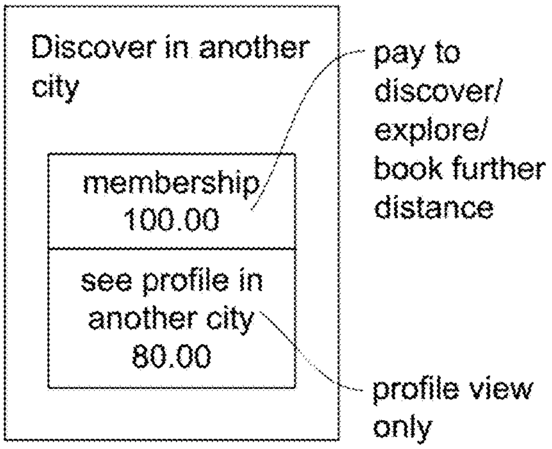
Figure 179:
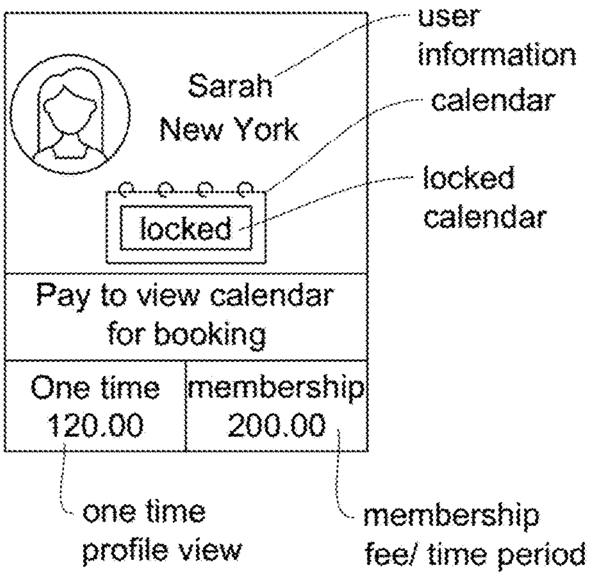

FIG. 178, FIG. 179: In some embodiments, the interface may have options for, which may include but are not limited to (e.g., same city, another city, distance, routing, route, travel, booking, travel booking, travel dating, travel meet, travel connection, etc.) In some embodiments, there may be payment options to, which may include but are not limited to (e.g., book, schedule, inquire about, inquire about, inquire regarding, secure, create a connection to, hold, pay for, create a business relationship with, use transmittables to secure or book, schedule, inquire about, etc.) which may include but not limited to (e.g., dates or meetings in other cities, or to view others in other cities, or to view information on someone that is not near or in the same city, or area, or location, etc.) In some embodiments, there may be payment options to, which may include but are not limited to (e.g., 'view only in another city' or 'view and be able to book, schedule, inquire about, inquire about, inquire regarding, secure, create a connection to, hold, pay for, create a business relationship with, use transmittables to secure or book, schedule, inquire about, etc.) in another which may include but not limited to (e.g., city, town, area, location, option(s), etc.) In some embodiments, there may be options to may include but not limited to (e.g., 'pay to unlock calendar in another city' or 'pay to see calendars of users in another city' or 'pay to have unlimited viewing of calendars or booking options in another city, etc.) In some embodiments, there may be, which may include but are not limited to (e.g., one-time fees, or they may be fees for a set period, etc.)

In some embodiments, categories or searches may be done by, which may include but not be limited to (e.g., book in person, booking in person, book virtual, book talk, book chat, book video chat, book video meeting, book voice conversation, see dating profiles, see profiles, see content, who has viewed your profile, winks, persons, exclusive content, our models, platform, matching AI-connecting, your calendar, match calendar, view calendar, find date, find date based on calendar, match anywhere, find wife, find girlfriend, find by distance, swipe through profiles, follow for free, free profiles, lives, live events, live users, current lives, computing operation by popularity, new users computing operation, swipe through models, swipe by distance, book in-person date, book in-person activity, see locals, see someone to date, date in another city, travel city dating, etc.) In some embodiments, there may be a way for users to adjust prices, price ranges, general pricing, general transmittables, based on may include but not limited to (e.g., categories or user frequencies, or user activities, or user spending, etc.) In some embodiments, users may be categorized by different categories or created categories based on, which may include but not be limited to (e.g., any reasons, user data, user spending, AI, etc.) In some embodiments, some categories that may be price adjusted may include but not be limited to (e.g., previous in-person dates, those with high-ratings, those that have been rated highly by user, locked content, follow for free, book in person, book virtual, book talk, book chat, book video chat, book video meeting, book voice conversation, date, book voice date, book game, net worth, ratings by other users, self-ratings, etc.) In some embodiments, user may be able to give, which may include but not be limited to (e.g., any discount, any price, any group price, group discounts or group specials based on categories, or user history, or tags, etc.) In some embodiments, there may be categories based on outside information, which may include but not be limited to (e.g., reality stars, runway models, commercial models, girl next door models, beauties, actresses, entrepreneurs, businesswomen, stay at home girls, users, stay at home, travel friendly, exclusive content, exclusive features, featured content or models, or creators, stars, creators, blondes, brunettes, location, etc.)

Figure 180:
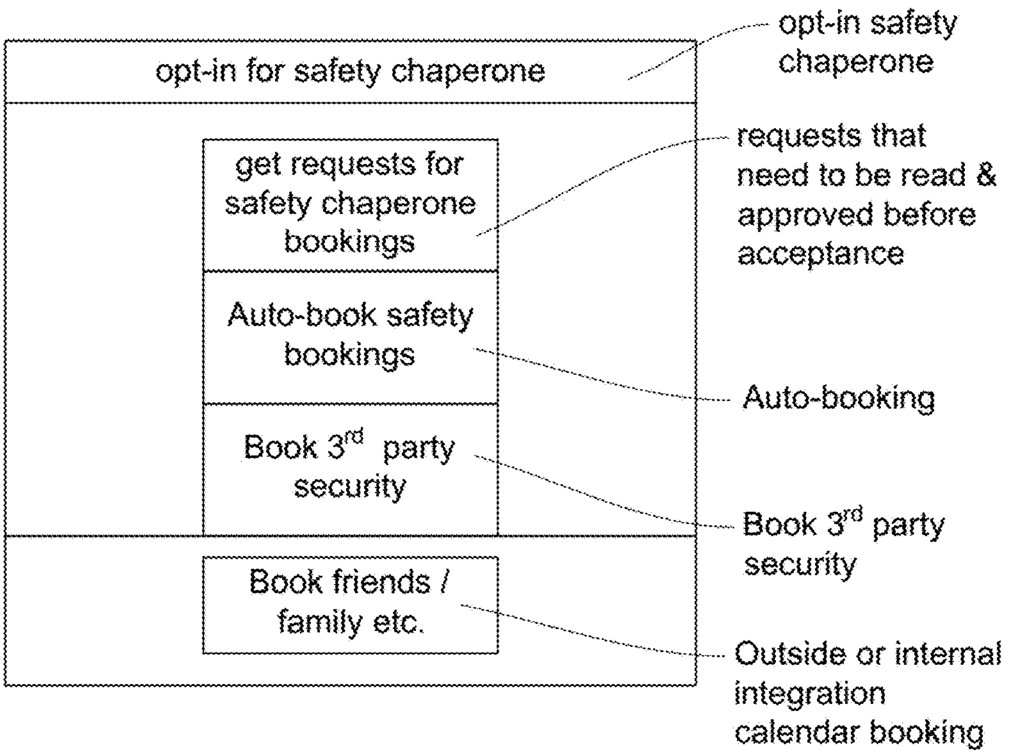
Figure 181:
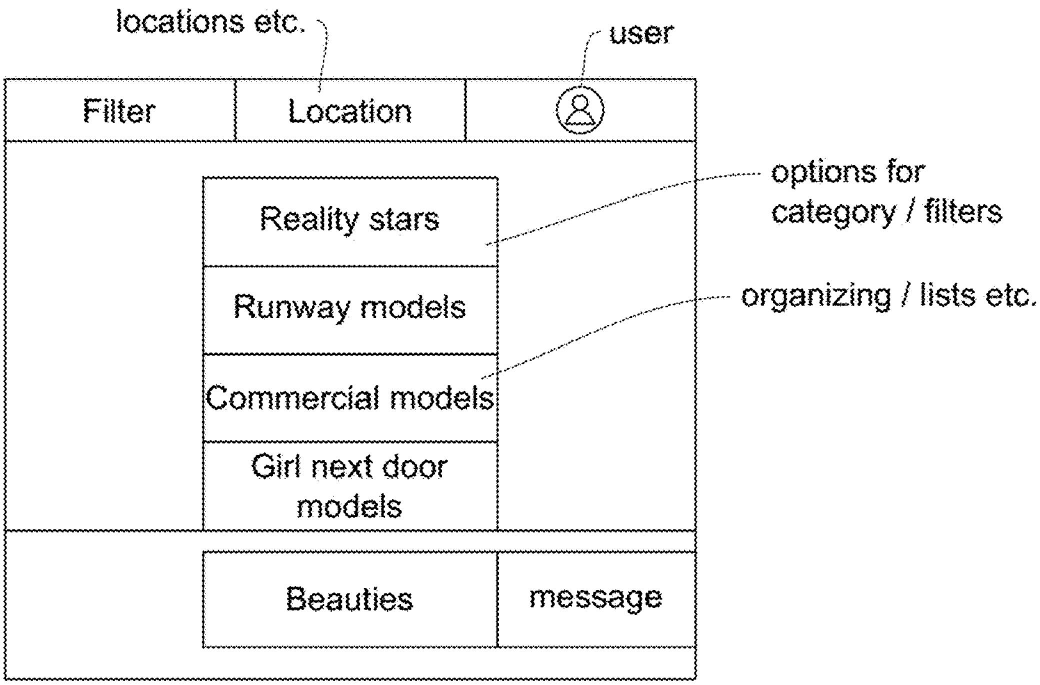

FIG. 180, FIG. 181: In some embodiments, which may include but not be limited to (e.g., safety chaperones, security, support, or security, security, etc.) In some embodiments, users may be able to, which may include but not be limited to (e.g., book, schedule, inquire about, inquire about, inquire regarding, secure, create connection to, hold, pay for, send transmittables for, have transmittables in place for, create business relationship with, use transmittables to secure or book, schedule, inquire about, etc.) a/multiple, which may include but not be limited to (e.g., security, user, person, outside, security, safety chaperone, friend, someone to ensure their safety whether emotional or bodily safety, or an escorting of security or a system, etc.) for, which may include but not be limited to (e.g., date friend on app or platform, transmittables for, anyone paying for whether user or another person or buying person, gifting, giving, paying for, security for, for self, etc.) In some embodiments, users may have to: (e.g., pay from their own funds or their own bank or their own money or request payment for, or have invoice for, or request money for, etc.) to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., security or safety options, or safety persons, or security, or safety chaperone, security, supporter, safety person, model, or creator, etc.) such as a, which may include but not be limited to (e.g., chaperone, security guard, etc.) In some embodiments, each/every/girl/model, which may include but not be limited to (e.g., girl, woman, female, model, etc.) may be defined as person being paid or a user on the platform) may be able to choose whether or not user wants to be available, which may include but not limited to (e.g., opt-in, select, appointed, suggested, want to, etc.) to be booked as a 'safety chaperone.' In some embodiments, there may be options to book, schedule, inquire about, inquire about, inquire regarding, secure, create connection to, hold, pay for, create business relationship with, use transmittables to secure or book, schedule, inquire about, etc.) a, which may include but not be limited to (e.g., 3rd party such as security guard from a 3rd party platform or a 3rd party integration, or from platform, or users on platform, or integrated users, etc.) In some embodiments, there may be options to book, schedule, inquire about, inquire about, inquire regarding, secure, create connection to, hold, pay for, create business relationship with, use transmittables to secure or book, schedule, inquire about, etc.) which may include but not limited to (e.g., outside friends, family, persons, etc.) In some embodiments, which may include but not limited to, the: (e.g., outside persons, outside users, non-registered users, 3rd parties, advertisers, advertisements, businesses, etc.) booking may be, which may include but not be limited to (e.g., automatically integrated, manually integrated, in collaboration with, connected to etc.) into, which may include but not be limited to (e.g., calendar or all calendars, or auto updating, or manually updating, or updated or booked through machine learning or AI, etc.) In some embodiments, categories or types may be categorized or separated or listed in an organized manner or shown separate from each other or displayed in a group or a category, such as (E.g., lawyers, doctors, nurses, entertainers, finance girlies, businesswomen, comedians, dancers, entrepreneurs, 'reality stars, influencers, online celebrities, online personalities, Tik Tokers, YouTubers, Instagram models, girls next door, runway models, beauties, models, runway, tall girls, short girls, stay-at-home moms, moms, divorcee, previously married, never been married, stars on reality, actresses, beauty gurus, makeup girlies, fashion girlies, commercial models, voice over stars, influencer stars, celebrities, etc.)

In some embodiments, there may be options that may have options to, which may include but not be limited to (e.g., lead to a list, organization, types, profiles, suggestions, etc.) based on preferences or categories, etc.) which may include but not limited to (e.g., book-in person date, book virtual, book talk, book chat, book video chat, book video meeting, book voice conversation, date, follow for free, discover for free, locked content, platform's exclusive content, special models, promotional persons, message, choose city, find your city, our models, locked content, unlocked content, match your calendar, match anywhere in the world, match another city, match yourself to anyone, match based on preferences, find date based on availability, find date based on distance, find date based on calendar, find date based on city, match date virtual match date in person, find girlfriend, find wife, find date, find friend, fan, fans only, for fans, for followers, see your favorite model, see your favorite celebrity, see new celebrities, see new models, see new sign ups, see new girls, users, see new creators, boyfriend applications, husband applications, date applications, book in person date now, book virtual, book talk, book chat, book video chat, book video meeting, book voice conversation, date, book call, see more information, see promotional material, see profile, get matched, swipe now, view exclusive content, go through stack now, view like dating apps style, choose your view for profile, see standard profiles, see regular way to view profiles, swipe by city, swipe by distance, view stacked style, view desktop style, view mobile style, get matched by human, robot, bot, 3rd party, entity, computer system, AI system, get matched by AI, get matched by robots, membership, membership fees, FAQS, learn more, unlock content, choose style to see content, swipe, view like, which may include but not be limited to (e.g., swipe up and down, side to side, stacked, list, create list, etc.)

In some embodiments, there may be options for users to book, schedule, inquire about, inquire about, inquire regarding, secure, create connection to, hold, pay for, create business relationship with, use transmittables to secure or book, schedule, inquire about, etc.) which may include but not be limited to (e.g., 'safety chaperones, security, support, or security, 3rd party security, models, creators etc.) In some embodiments, which may include but not be limited to (e.g., 'safety chaperones, security, support, or security, etc.) may be described as someone, which may include but not be limited to (e.g., from the platform, another user, another person, a 3rd party entity, a 3rd party service, a 3rd party person, a family member, a former platform person, a member, etc.) In some embodiments, which may include but not be limited to (e.g., 'safety chaperones, security, support, or security,' etc.) may be used as a, which may include but not be limited to (e.g., 'security,' support, safety, etc.) whether, which may include but not be limited to (e.g., emotional or physical or both, or physical, or safety etc.) In some embodiments, which may include but not be limited to (e.g., outside security, 3rd party support, 3rd party entity, etc.) may be booked through a, which may include but not be limited to (e.g., 'bodyguard or security service' or any outside service that is either approved, not approved, or is a partner platform, is not a partner, or is a family member, or a friend, etc.)) In some embodiments, which may include but not limited to, the: (e.g., outside booking or safety booking, or other entity booking, or other person booking by user etc.) may be, which may include but not be limited to (e.g., deducted from earnings that day or anytime earnings are made, whether at the time of the booking, after funds have been paid, or up front, whether from their pre-loaded funds, their funds available, or a transfer from a bank, whether that transfer is immediate or after some type, or from a credit service, or a credit booking etc.) In some embodiments, there may be an option may include but not limited to (e.g., book a safety chaperone for date, connection, meeting, virtual connection, meeting etc.) In some embodiments, an option to, which may include but not be limited to (e.g., book, schedule, inquire about, inquire about, inquire regarding, secure, create connection to, hold, pay for, create business relationship with, use transmittables to secure or book, schedule, inquire about, etc.) may be, which may include but not limited to (e.g., a friend, human, robot, security, a friend on app or platform, another creator, another user, another person, another public person, a family member, a friend, an acquaintance, etc.) In some embodiments, users may be choose whether or not (e.g., user, person, entity, 3rd party, etc.) want to be available to be booked as a, which may include but not be limited to (e.g., 'safety chaperone,' friend, person there, supporter, safety person, security, etc.) which may be, which may include but not limited to an: (e.g., opt-on to be included, or a manually included, or an application process, etc.) as a potential option to be booked for a, which may include but not be limited to (e.g., date, connection, 'safety date' or a 'safety security' or a 'safety bestie' or a 'safety person' or a person that attends the date secretly and/or makes sure the safety and security of the other person etc.) In some embodiments, this 'safety chaperone' may be paid by (e.g., another user, that user may be able to private, public, or only known between two 'creators, models, or users of the platform, part of the bill, part of the price, included in price, security included in price, etc.)

In some embodiments, which may include but not be limited to (e.g., 'safety chaperones, security, support, or security,' or 'users of the safety chaperone' etc.) may obtain, which may include but not be limited to (e.g., information, safety information or get informed of safety measures or safety precautions etc.) which may include but not limited to (e.g., before, after, during, later after, etc.) they (e.g., sign up, before they opt-in, after they opt-in, prior to any date, during date, after date, etc.) In some embodiments, which may include but not be limited to (e.g., 'safety chaperones, security, support, or security, security detail, safety persons, other users, models, etc.) may be, which may include but not be limited to (e.g., outside users of the app or booked with outside users of the platform using potentially 3rd party or integrated, outside person, integrated calendar, or calendar options, or connection options etc.) that may or may not, which may include but not be limited to (e.g., record or show or store data, or store data etc.) regarding/that there was a safety chaperone, security, supporter, safety person, which may include but not be limited to (e.g., booked/present, there, attending, viewing, etc.) during which may include but not limited to, the: (e.g., connection, date, etc.) In some embodiments, which may include but not be limited to (e.g., 'connection, meeting, or date etc.) which may include but not limited to (e.g., chaperones,' users, persons, security, etc.) may be, which may include but not be limited to (e.g., outside or informed from outside, or internally, or within platform, or from platform, or integrated with platform, etc.) whether (e.g., 3rd party, by mouth, by booking, by virtual booking, etc.) In some embodiments, 'safety chaperone' may be, which may include but not be limited to (e.g., recorded or subjected to all of the recording or safety coordinates, or data recording, or location recorded, or data collected from, etc.) that, which may include but not limited to, the: (e.g., models, person, users, 'user' etc.) may be subjected to on a date in order to, which may include but not be limited to (e.g., record all data for the 'date log, record information, collect data, etc.) using any, which may include but not be limited to (e.g., data, management device, device, 3rd party, or any recording, etc.) for any, which may include but not be limited to (e.g., 'date' or any connection or any contractual agreements, etc.)

In some embodiments, there may be, which may include but not be limited to (e.g., organization, distance, search perimeters, searching, categories, lists, separation, etc.) based on outside information, which may include but not be limited to, which may include but not be limited to (e.g., searching, computing operation, reality stars, runway models, commercial models, girl next door models, beauties, actresses, entrepreneurs, businesswomen, stay at home girls, users, stay at home, travel friendly, exclusive content, exclusive features, featured content or models, or creators, stars, creators, blondes, brunettes, location, etc.) In some embodiments, which may include but not be limited to (e.g., paying, crediting, volunteering, attributing, helping, assisting, tributing, bidding/auction, gifting, securing, auctioning, for charity, for 3rd party, for entity etc.) may be in any, which may include but not be limited to (e.g., combination of, any form of, any mix of etc.) which may include but not be limited to (e.g., mystery location, surprise location, mystery person, celebrity, famous person, creator, model, executive, business-person, CEO, founders, technology entrepreneurs, any type of entrepreneurs, founders, marketing persons, marketers, self-help persons, authors, dancing persons, artists, artistic persons, personalities, musicians, instrumental players, singers, dancers, categorized persons, famous or known 3rd parties, advertisers, advertisements, businesses, businesses, entities, revealed later person, hints on person, no knowledge of person, mystery location, mystery price, mystery date, mystery time, mystery price, mystery activity etc.) which may be, which may include but not be limited to (e.g., added to, combined with, in combination of, which may include but not be limited to (e.g., price that is shown, location that is shown, date that is shown, person's photo shown, person's voice heard, person known, person's content, person's work, person's artistry, 3rd parties content, 3rd party's artistry, activity that is shown, etc.)

Figure 182:
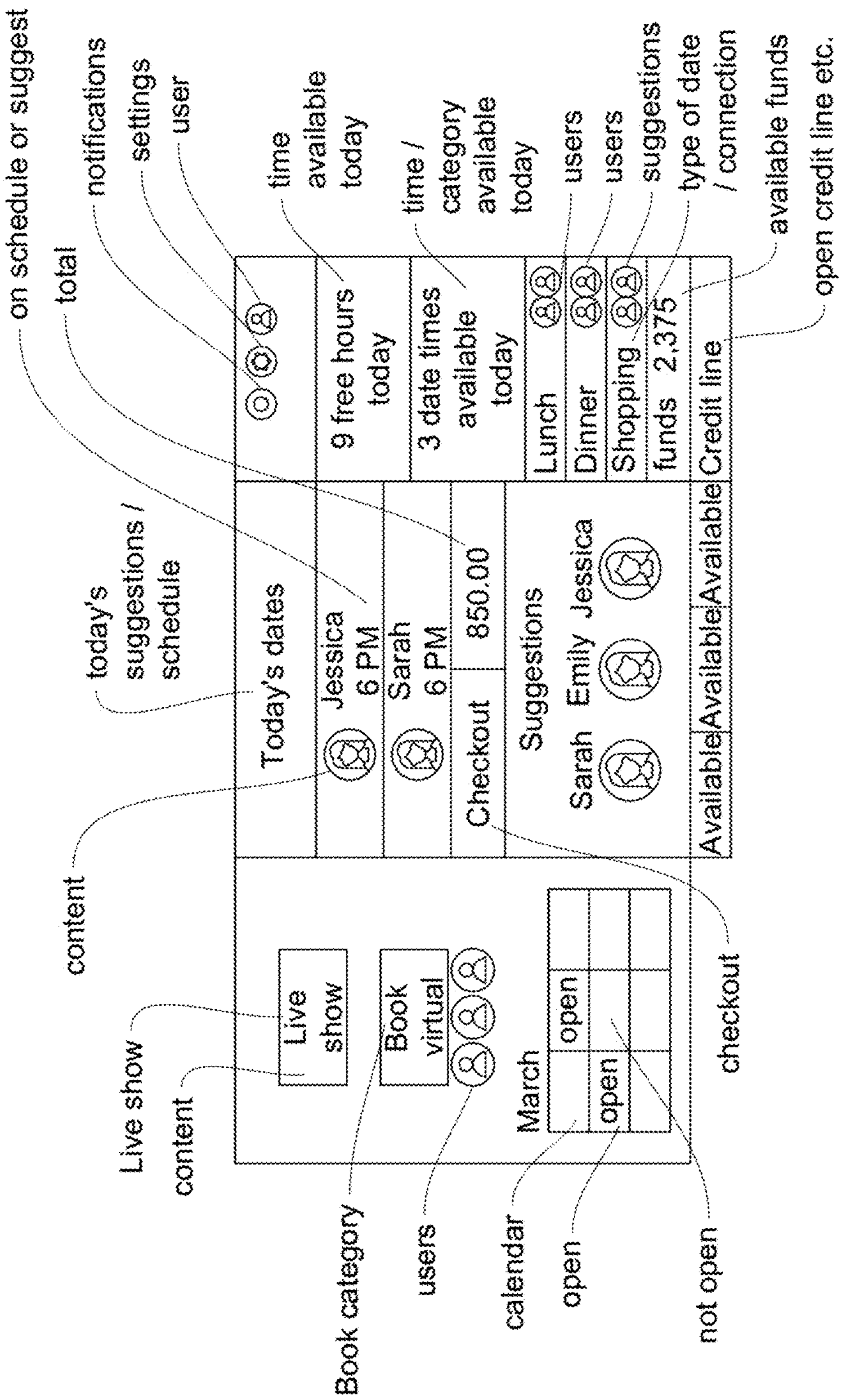
Figure 183:
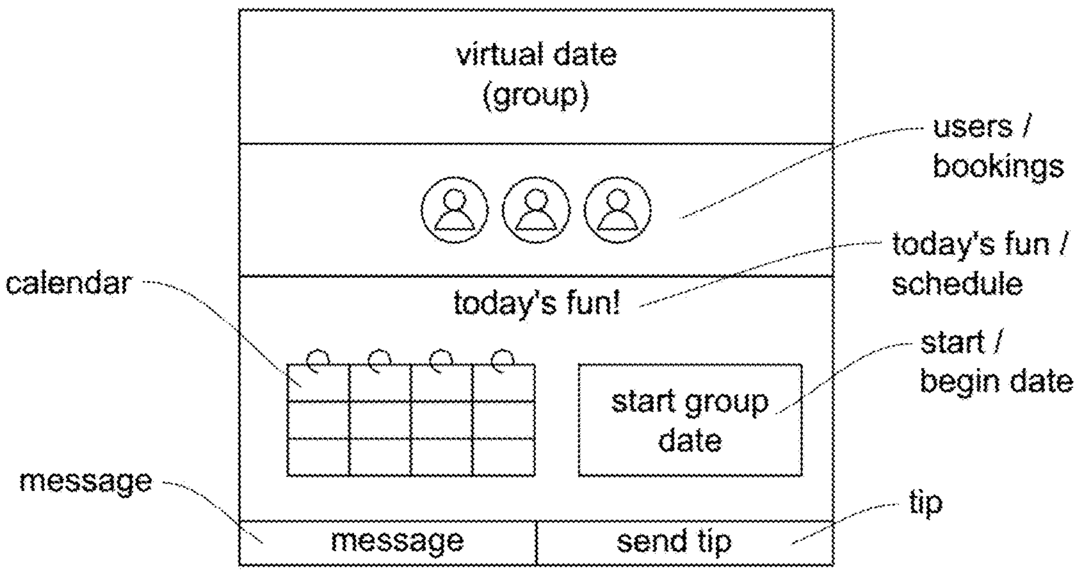
Figure 184:
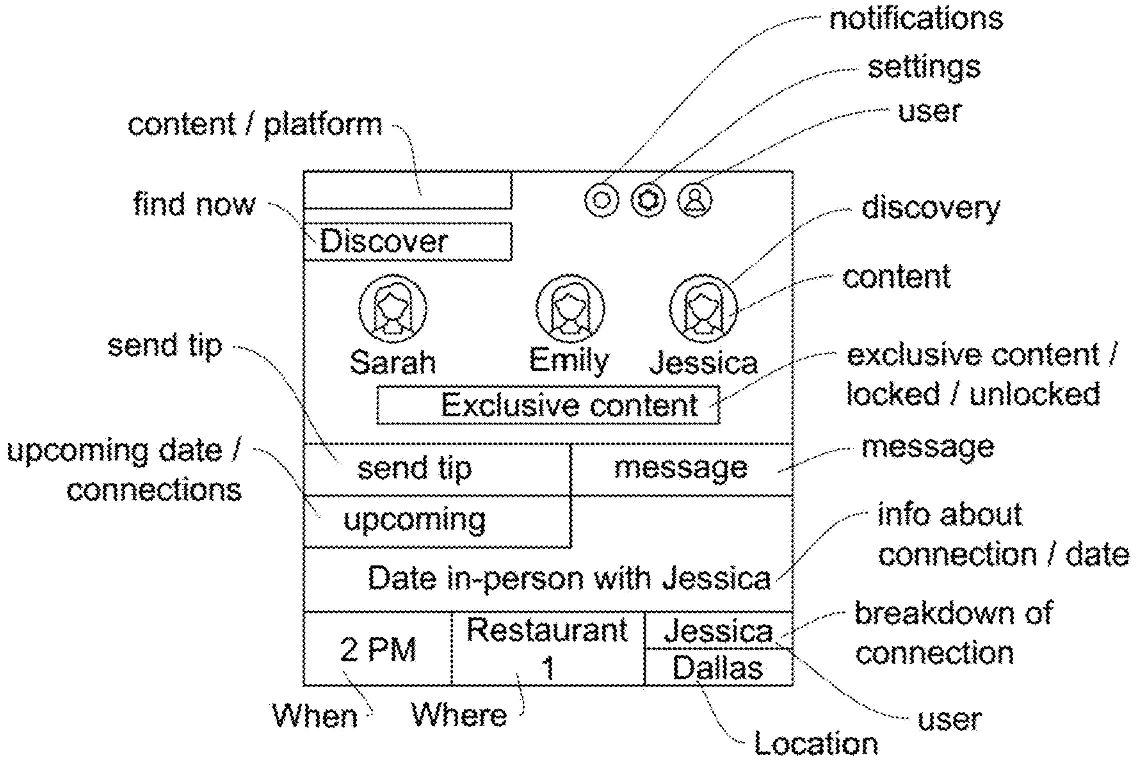
Figure 185:
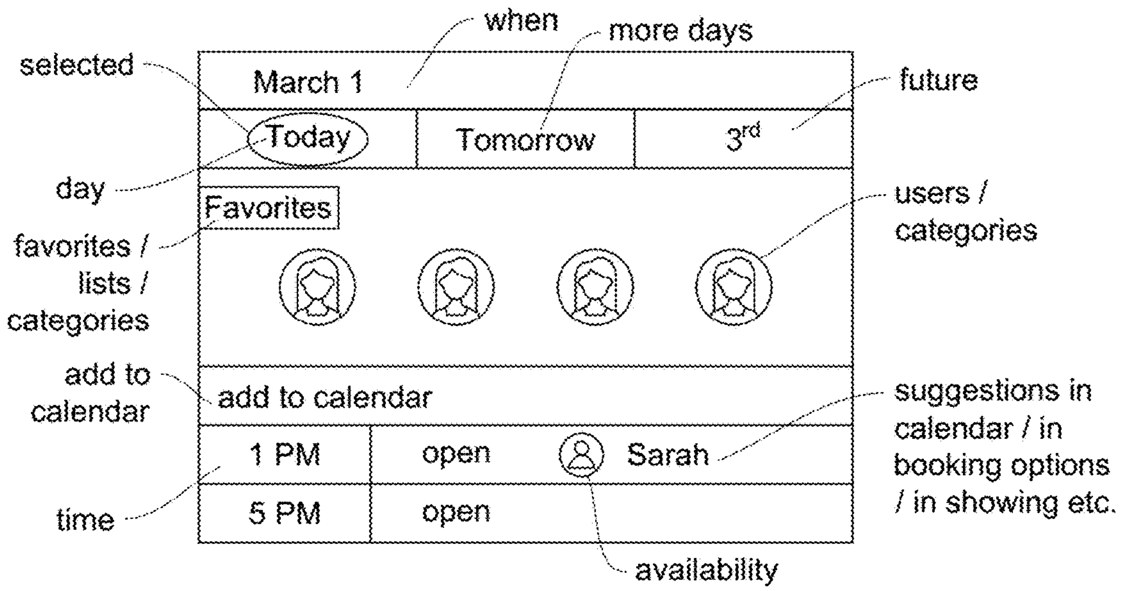
Figure 186:
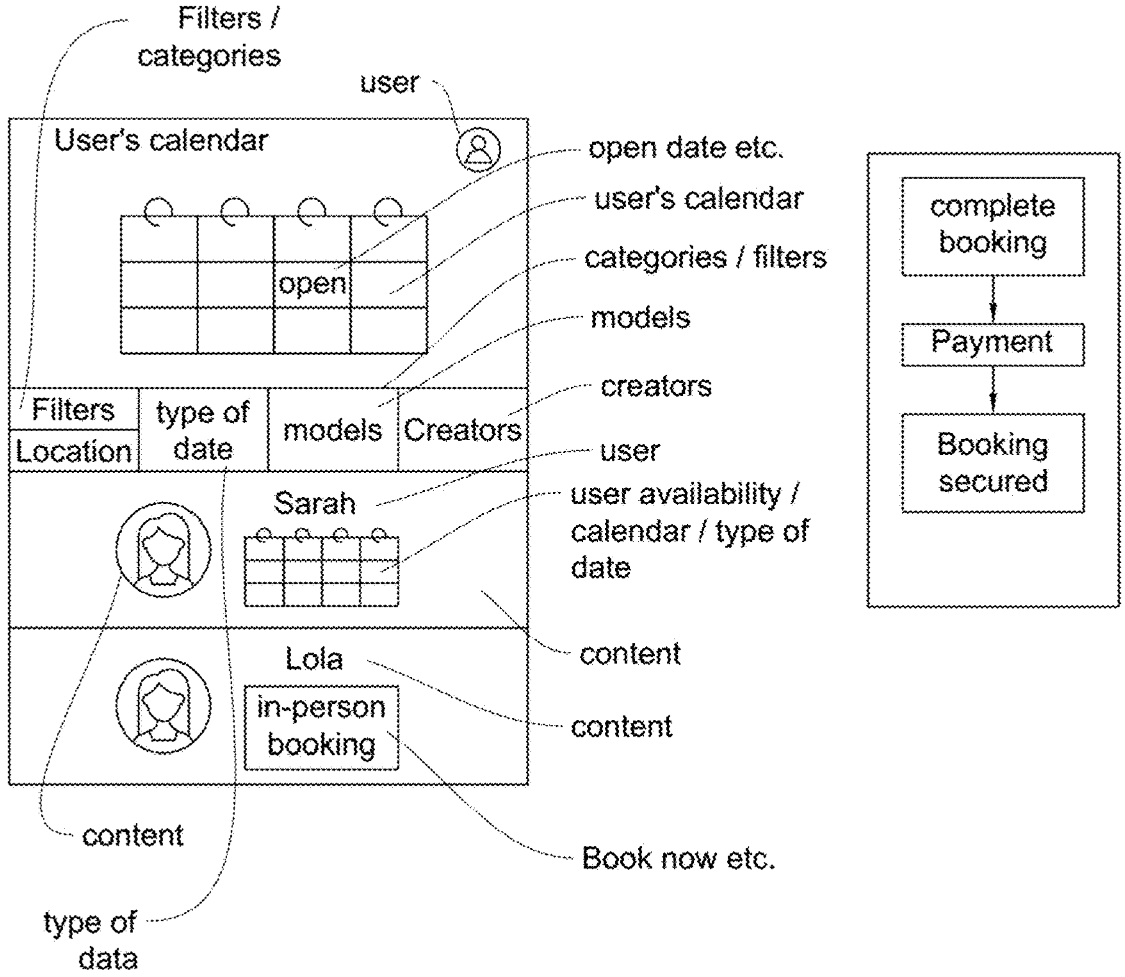
Figure 187:
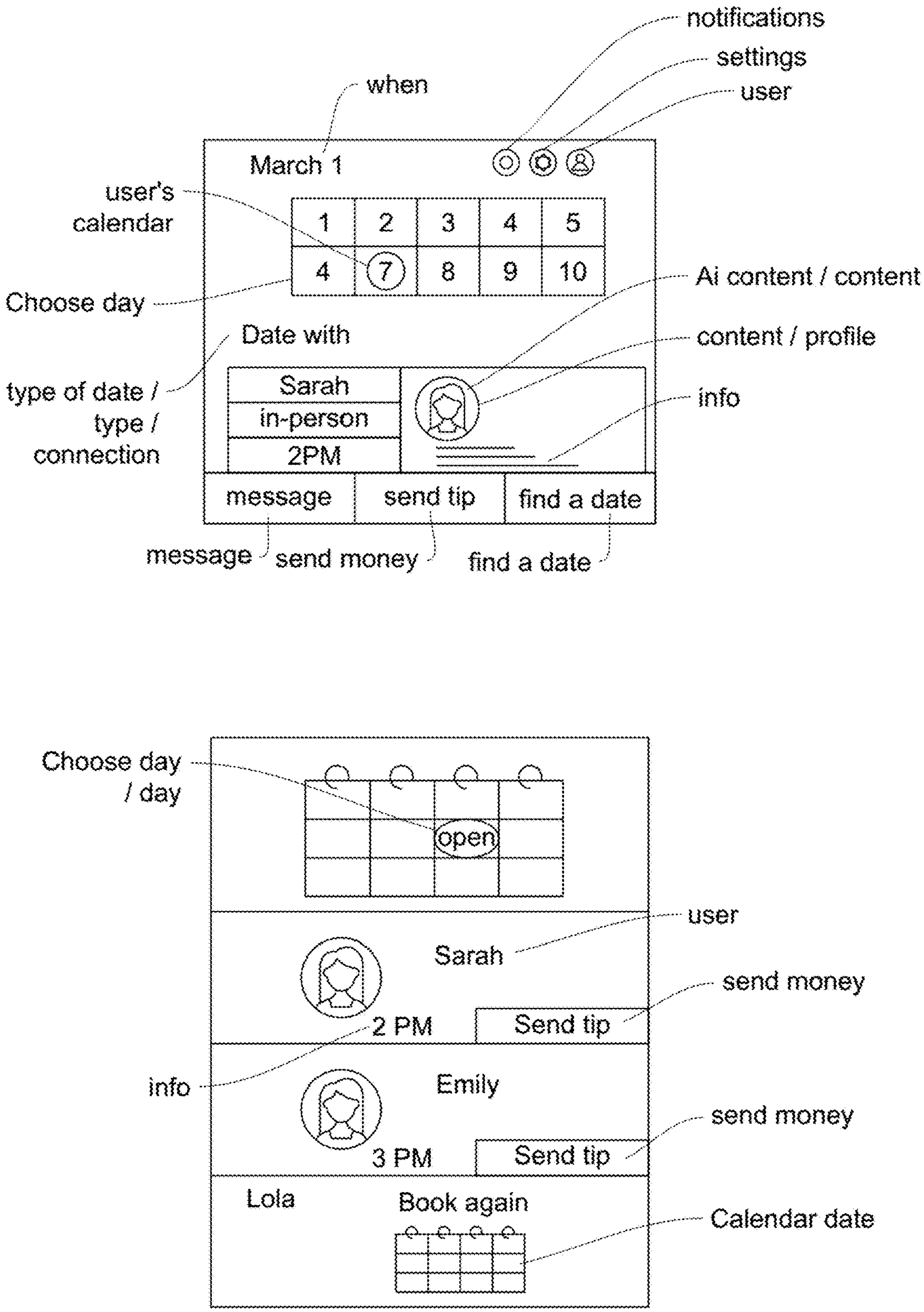

FIG. 182, FIG. 183: In some embodiments, there may be a user interface where the user may be able to see, which may include but not be limited to (e.g., upcoming, queue, next, coming, suggested, popular, etc.), which may include but not be limited to (e.g., daily or monthly, or weekly, or any period, constant refreshing of, shown more at any time, etc.) of, which may include but not be limited to (e.g., 'connections' or 'booking' or dates' or suggestions, or others calendars, or person calendar, or suggested users, or live shows, or unlocked content, or new content, or a feed, or suggestions, or live information, or current information, or pictures or videos, or media, or information, etc.) In some embodiments, there may be a display or screen or area that may show anything from (e.g., live shows, previous live shows, book virtual date, book in person date, schedule date, inquiry about date, inquire about schedule, send message, contact, how many hours are you free, how many dates are available today, who matches your work schedule, how many funds do I have in my platform account, how much stocks or bonds or cash do I own, how much credit is on my account, how many suggestions are there for me, how many girls are shown or displayed on my profile, how much does it cost per girl for a date, what type of gifts does this person require for a date, what kind of transmittables does this person want from me, how many girls are available, how many people in my distance or vicinity are available for or a date, who is online right now for a date, who is available during lunch time for a date, who is available during dinner for a date, who wants to go shopping, which girls or users are available to take me shopping or to be taken shopping, who is available for a date, who can I message, what are the suggested users nearby or popular users that I should book a date with etc.) In some embodiments, a group date may be (e.g., added or created or managed or modified, etc.) by (e.g., user or any models or any persons, etc.) to create a group date or a date or to get approved for a date, or to show dates, or to suggest models for a date, etc.)

In some embodiments, there may be a, which may include but not be limited to (e.g., breakdown, itemized, receipt, invoice, total, partial, breakdown, bill, summary of, total, etc.) of today's schedule or any time period, which may include but not be limited to (e.g., a time period of time, schedule, a suggested schedule, suggested booking, a suggested time block etc.) which may include but not be limited to (e.g., user or time or any type of suggestions, actual booked persons, checkout options to book, schedule, inquire about, inquire about, inquire regarding, secure, create connection to, hold, pay for, create business relationship with, use transmittables to secure or book, schedule, inquire about, etc.) more users, or to book, schedule, inquire about, inquire about, inquire regarding, secure, create connection to, hold, pay for, create business relationship with, use transmittables to secure or book, schedule, inquire about, etc.) users, availability of person, availability of other users, matches, schedule matching AI-connecting, a calendar, which may include but not be limited to (e.g., breakdown, itemized, receipt, invoice, total, partial, breakdown, bill, summary of, total, etc.) future calendar's, which may include but not be limited to (e.g., breakdown, itemized, receipt, invoice, total, partial, breakdown, bill, summary of, total, etc.) of time person is available, which may include but not be limited to (e.g., breakdown, itemized, receipt, invoice, total, partial, breakdown, bill, summary of, total, etc.) of types of date, which may include but not be limited to (e.g., breakdown, itemized, receipt, invoice, total, partial, breakdown, bill, summary of, total, etc.) s person is available, hours person or user is available, funds available, amount of funds, credit available, funds credit, upcoming dates, credit lines available, money in account, assets, financial (e.g., breakdown, itemized, receipt, invoice, total, partial, breakdown, bill, summary of, total, etc.) s of 'credit lines' or money, availability of users, funds, money, suggested users, book virtual, book talk, book chat, book video chat, book video meeting, book voice conversation, book in person, live shows, promoted show, pre-recorded shows, persons, suggestions, calendar bookings, settings, user settings, notifications, live or current availability etc.))

In some embodiments, there may be a, which may include but not be limited to (e.g., breakdown, itemized, receipt, invoice, total, partial, breakdown, bill, a summary of, total, etc.) of today's schedule or upcoming schedule, etc.) In some embodiments, a, which may include but not be limited to (e.g., breakdown, itemized, receipt, invoice, total, partial, breakdown, bill, summary of, total, etc.) of a virtual date or a virtual meeting, or a group date, or a session may show users for that session, or suggested users, or any users that may fit or want to be added, etc.) In some embodiments, there may be a schedule or an option to 'stat date' or 'begin date or check-in, check-out, time stamp, time record, time and data record, location, time and data record,' or 'proceed with the date' or 'proceed with connection' or 'pay for connection' or 'pay for date', Gifts in exchange for date, send gifts or buy something from 'wishlist' or 'list' or 'listed item' in exchange for date or time or virtual date or in person date or in exchange to view calendar or schedule or time or be able to message or book date or send like or interact with, etc.) In some embodiments, options may include but are not limited to (e.g., 'send a tip,' 'send money,' 'message,' user interface, funds available, user settings, notification, user, profile information, content, etc.)

FIG. 184, FIG. 185, FIG. 186, FIG. 187: In some embodiments, there may be user interfaces with (e.g., 'upcoming connection' or 'upcoming date' screens or notifications or bars, or areas that may show 'next date' or 'reminders' or 'meeting reminders' or 'connection reminders' 'or time to meet reminders or information' etc.) In some embodiments, there may be options to close the reminder or user interface may stay open, there may be ways to change method of reminder whether on (e.g., another screen, hologram, user interface, viewing display, at the bottom of the screen, hologram, user interface, viewing display, email, message, phone call, etc.) In some embodiments, there may be a, which may include but not be limited to (e.g., breakdown, itemized, receipt, invoice, total, partial, breakdown, bill, summary of, total, etc.) of the, which may include but not be limited to (e.g., 'connection' or 'day' or 'time' or 'place' or user' or 'users content' etc.) In some embodiments, there may be calendar screen or a, which may include but not be limited to (e.g., breakdown, itemized, receipt, invoice, total, partial, breakdown, bill, summary of, total, etc.) screen or an availably screen that may show suggestions, which may include but not be limited to (e.g., persons from categories, lists, created lists, favorites, suggestions, AI created lists, machine learning lists, platform suggestions, most clicked, type lists, etc.) In some embodiments, the suggestions may be easily addable to, which may include but not be limited to (e.g., calendar or to times available, availability, open areas, open time periods, times to be booked, etc.) In some embodiments, calendar openings may, which may include but not be limited to (e.g., show and suggest to fill user in on each time by using AI or any type of suggestion whether showing, telling, suggesting, adding etc.) In some embodiments, persons may be added to, which may include but not be limited to (e.g., times and days etc.) and/or person only has to, which may include but not be limited to (e.g., check out or pay, etc.) In order to, which may include but not be limited to (e.g., secure the booking etc.) In some embodiments, persons may, which may include but not be limited to (e.g., appear, be suggested, etc.) which may include but not be limited to (e.g., on calendar or suggestions to be added to calendar or to be booked, or to be clicked on, or to be considered, or to be messaged, etc.) In some embodiments, there may be options such as viewing users calendar and filtering or category options (e.g., 'location, type of date, models, creators etc.) In some embodiments, there may be options such as lists or profiles shown or content shown that may show, which may include but not be limited to (e.g., 'in person dates available' or 'live calendar, timing method data, timing data method, timing process data,' or 'types of bookings available' or 'date options available' etc.)

In some embodiments, there may be an user interface where user may be able to see, which may include but not be limited to (e.g., upcoming, queue, next, coming, suggested, popular, etc.), which may include but not be limited to (e.g., daily or monthly, or weekly, or any time period etc.) of, which may include but not be limited to (e.g., 'connections' or 'booking' or dates' or suggestions, or others calendars, or persons calendar, or suggested users, or live shows, or unlocked content, or new content, or a feed, or suggestions, or live information, or current information etc.) In some embodiments, there may be a, which may include but not be limited to (e.g., breakdown, itemized, receipt, invoice, total, partial, breakdown, bill, summary of, total, etc.) of today's schedule or any time period, which may include but not be limited to (e.g., a time period of time, schedule, a suggested schedule, suggested booking, a suggested time block etc.) which may include but not be limited to (e.g., user or time or any type of suggestions, actual booked persons, checkout options to book, schedule, inquire about, inquire about, inquire regarding, secure, create connection to, hold, pay for, create business relationship with, use transmittables to secure or book, schedule, inquire about, etc.) more users, or to book, schedule, inquire about, inquire about, inquire regarding, secure, create connection to, hold, pay for, create business relationship with, use transmittables to secure or book, schedule, inquire about, etc.) users, availability of person, availability of other users, matches, schedule matching AI-connecting, a calendar, which may include but not be limited to (e.g., breakdown, itemized, receipt, invoice, total, partial, breakdown, bill, summary of, total, etc.) future calendar's, which may include but not be limited to (e.g., breakdown, itemized, receipt, invoice, total, partial, breakdown, bill, summary of, total, etc.) of time person is available, which may include but not be limited to (e.g., breakdown, itemized, receipt, invoice, total, partial, breakdown, bill, summary of, total, etc.) of types of date, which may include but not be limited to (e.g., breakdown, itemized, receipt, invoice, total, partial, breakdown, bill, summary of, total, etc.) s person is available, hours person or user is available, funds available, credit lines available, money in account, assets, financial (e.g., breakdown, itemized, receipt, invoice, total, partial, breakdown, bill, summary of, total, etc.) s of 'credit lines' or money, availability of users, funds, money, suggested users, book virtual, book talk, book chat, book video chat, book video meeting, book voice conversation, book in person, live shows, promoted show, pre-recorded shows, persons, suggestions, calendar bookings, settings, user settings, notifications, live or current availability etc.))

In some embodiments, there may be an intelligent matching AI-connecting system that suggests, which may include but not be limited to (e.g., 'matches or users or persons, or content, or platform content, or user content, or user information, or profiles, or lives, or live shows, or live events, or current events, or bookings, or suggestions for bookings, or virtual bookings, etc.) which may include but not be limited to (e.g., computing operations, machine learning, AI, manual input, tracking, data, or other factors, etc.) the system may employ a variety of techniques to optimize the matching AI-connecting, process and improve user satisfaction. In some embodiments, the system may be adaptable to a wide range of preferences and learn from user behavior to make more accurate 'suggestions' or 'data collection' over time. In some embodiments, there may be options such as viewing users' calendars and filtering or category options (e.g., 'location, type of date, models, creators, etc.) In some embodiments, there may be options such as lists or profiles shown or content shown that may show, which may include but not be limited to (e.g., 'in-person dates available' or 'live calendar, timing method data, timing data method, timing process data,' or 'types of bookings available' or 'date options available' etc.)

In some embodiments, there may be options such as calendar options or options to choose dates in calendar which may show a, which may include but not be limited to (e.g., breakdown, itemized, receipt, invoice, total, partial, breakdown, bill, summary of, total, etc.) or an 'itemized version' of the day, week, month, hour, time period, activity, etc.) In some embodiments, artificial intelligence may show a preview of what the date may look like such as a 'moving version of the activity or a demonstrated version of the activity, date, time, place, user, content, etc.) In some embodiments, there may be options such as 'information regarding date or connection or person, options to message, send tip, view profile, view information, view calendar, send calendar, change calendar, manage date, cancellation date, cancellation connection, block, change, raise prices, price ranges, general pricing, general transmittables, send money, change prices, price ranges, general pricing, general transmittables, view background check, pay for background check, etc.) In some embodiments, (e.g., calendar, timing method, schedule method, scheduling method, timing data center, etc.) may show a, which may include but not be limited to (e.g., breakdown, itemized, receipt, invoice, total, partial, breakdown, bill, summary of, total, etc.) or a, which may include but not be limited to (e.g., breakdown, itemized, receipt, invoice, total, partial, breakdown, bill, summary of, total, etc.) by itself of the time period, or date, or connection etc.) In some embodiments, there may be, which may include but not be limited to (e.g., profiles or information of dates or connections whether paid for or needs to be paid for etc.) In some embodiments, there may be options such as, which may include but not be limited to (e.g., 'book this person again' or 'book again with xyz' or book now options or send tip options, or 'complete your booking with xyz' or 'pay for booking etc.) In some embodiments, there may be a, which may include but not be limited to (e.g., platform or integration of a calendar integration system etc.) that may allow users to, which may include but not be limited to (e.g., seamlessly integrate and synchronize events and/or tasks between multiple calendars etc.) In some embodiments, the system may incorporate, which may include but not be limited to (e.g., machine learning and artificial intelligence techniques to optimize the integration process etc.) In some embodiments, including (e.g., manual, AI, machine learning, automatic input from users, etc.) the system may be adaptable to a wide range of data, which may include but not be limited to (e.g., calendars, data, input, information, movements, etc.) and may be able to automatically may include but not be limited to (e.g., detect, merge, or notify based on overlapping events and tasks, etc.)

Figure 188:
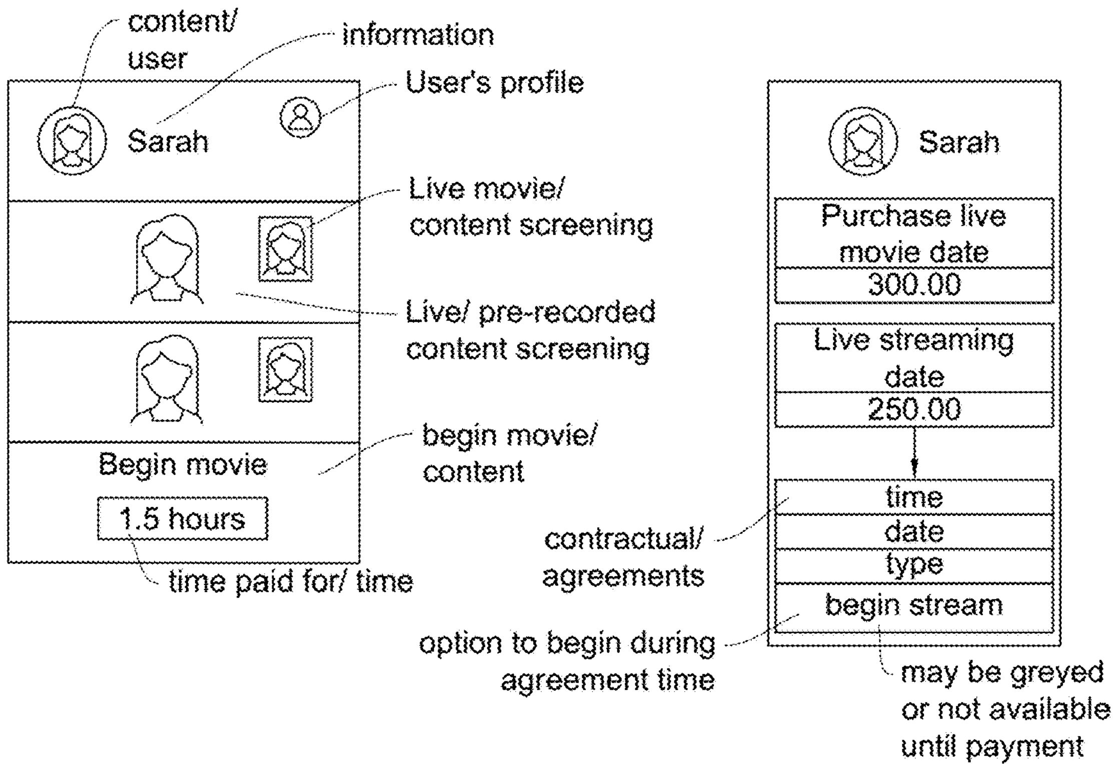

FIG. 188: In some embodiments, there may be options to, which may include but not limited to (e.g., pay or free options etc.) to, which may include but not limited to (e.g., live stream, live stream a 'movie,' or game, or entertainment, etc.) or any form of which may include but not limited to (e.g., content or any form of entertainment etc.) at the, which may include but not limited to (e.g., same time, at different times, pause, top, record, not record, live only, pre-recorded live, streaming, regular streaming, no talking, talking etc.) In some embodiments, the 'free or paid option' to stream, watch, together, time spent together, which may include or not include a, which may include but not limited to (e.g., button, clicker, beginning, start, etc.) to begin which may include but not limited to have a (e.g., timer, time stamp, location stamp, business location stamp, confirmation of time, location, data, etc.) or a recorded, or a data collector etc.) to determine if the 'contractual agreements that were paid or not paid' which may include but not limited to (e.g., went through or was obtained, etc.) In some embodiments, there may be options to 'pay' to do which may include but not limited to (e.g., live streaming, movie, entertainment, virtual entertainment, virtual game, in person game, or any time spent etc.) between one, two, or more persons etc.) In some embodiments, payment may be made prior to being able to possibly which may include but not limited to (e.g., 'join call' or 'join date' or 'join live stream' or 'being movie' or 'begin date or check-in, check-out, time stamp, time record, time and data record, location, time and data record,' or 'start date' or 'call this person' or 'video with this person' etc.) In some embodiments, options to join or book may not be available until 'agreements are met' or 'requirements are met,' which may include but not be limited to (e.g., may include payment or instructions or actions or anything to meet requirements etc.) In some embodiments, there may be a (e.g., payment or gift option or requirements or free, etc.) to concurrently or at different times (e.g., stream entertainment options or information or streaming or displays or visuals or deliveries or services, etc.)

Figure 189:
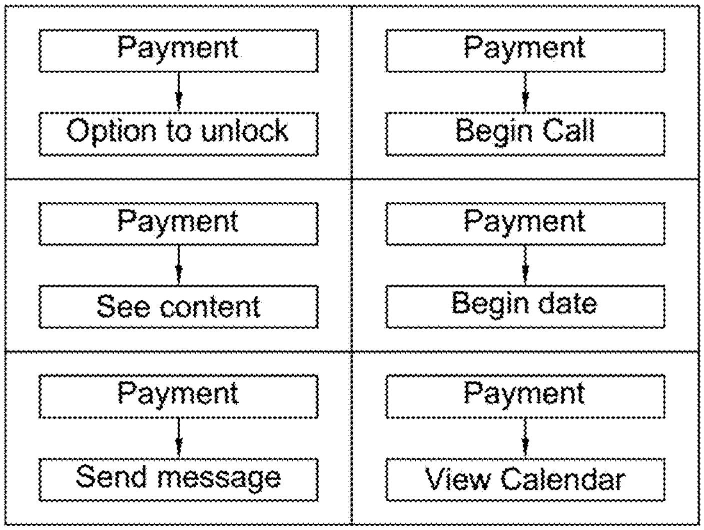

FIG. 189: In some embodiments, payment may be required in exchange for any option, which may include but not be limited to (e.g., payment to view content, payment to view calendar, interact with to view calendar, interact with to view timing data method, payment to book, schedule, inquire about, inquire about, inquire regarding, secure, create connection to, hold, pay for, create business relationship with, use transmittables to secure or book, schedule, inquire about, etc.) payment to join call, payment for background check by 3rd party, price to live stream, pre-recorded live stream, pre-recorded content, cost to join stream, charge to join call, payment for content, payment for message, fee to see calendar, payment to see profiles, payment to see other cities, payment to book, schedule, inquire about, inquire about, inquire regarding, secure, create connection to, hold, pay for, create business relationship with, use transmittables to secure or book, schedule, inquire about, etc.) which may include but not be limited to (e.g., profiles or persons in other cities, payment to view stories, payment to view live or current content, cost to follow, payment to subscribe, payment for unlimited content, payment for unlimited messages, payment for unlimited dates, payment for contact options, payment for contact information, payment to see live, payment to obtain information, payment to match, payment to view now, payment to unlock content, payment to begin, pay to view information about user, payment to see background check, payment to send direct message, payment to add to category, payment to add to list, payment to be on cover, payment to be on first page, payment to be at top, payment to be suggested, payment to wink, flirt, send heart, payment to speak to another person, etc.)

Figure 190:
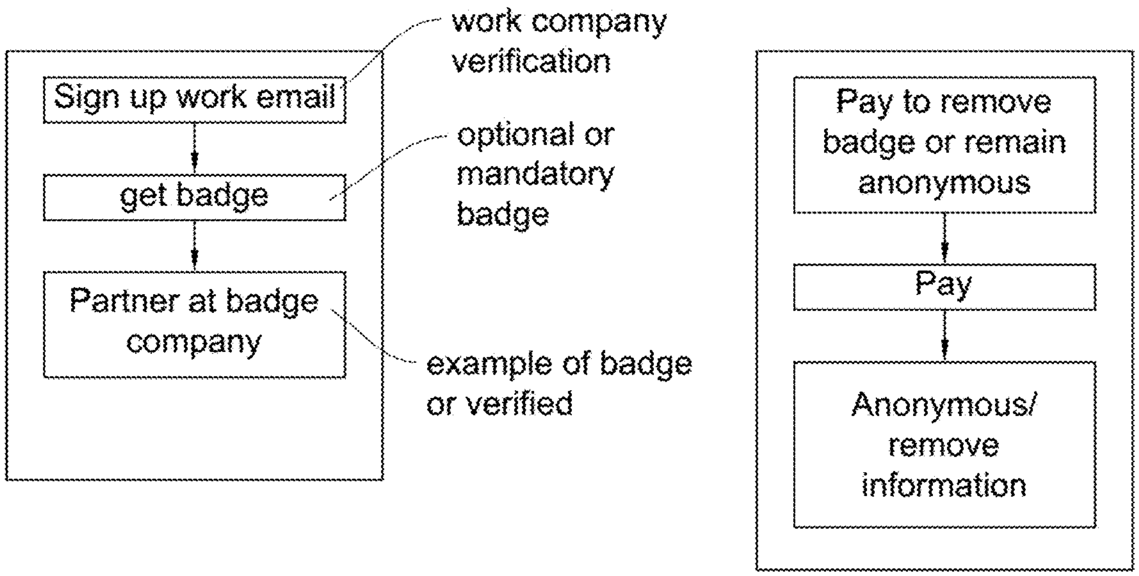
Figure 191:
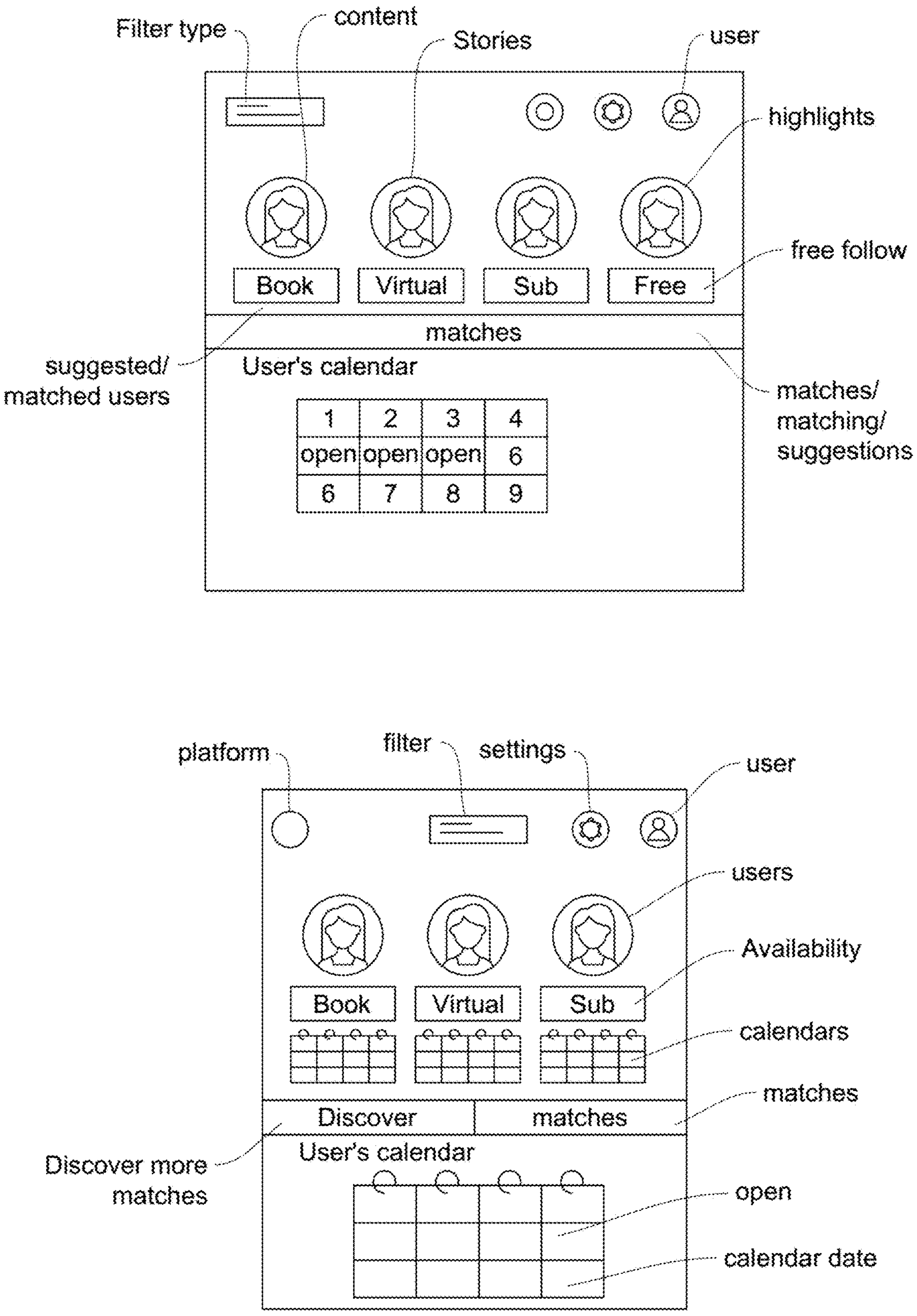

FIG. 190, FIG. 191: In some embodiments, there may be options to sign up or register or become a user using your identifying information that, which may include but not be limited to (e.g., 'work email' or 'company email' or 'work verification' or 'references' or 'verified references,' etc.) In some embodiments, a 'work email' or 'verification' would automatically allow or have or present a 'seal of approval or 'badge' or a 'verification' that the person/user is verified, a verified person, or works at a company, etc.) In some embodiments, this 'verified information' or any 'verified information' coming from a 3rd party verification, an internal verification, an outside verification, may result in an automatic verification, or badge, or information to be known on the platform whether public, private, etc.) In some embodiments, there may be an option to remove anything with payment, which may include but not be limited to (e.g., verified information, to remain anonymous, hide users phone, hide users information, or any identifying information by payment, or asset exchange, or paying, or exchanging something of value, etc.) In some embodiments, there may be, which may include but not be limited to (e.g., suggestion, category options, options, etc.) which may include but not limited to (e.g., book an in-person date' or 'book a virtual date' or 'discover models near you' or 'view models by distance' or 'book models by distance' or 'view private photos now' or 'unlock private photos now' or 'discover her profile' or 'discover new content' or 'view exclusive content' or 'sign in' or 'register' or 'become a model/creator' or 'apply to be a creator' or 'discover creators,' etc.) In some embodiments, there may be options such as, which may include but not be limited to (e.g., 'matching AI-connecting, screens' or 'discovery screens' or user interfaces etc.) that may show, which may include but not be limited to (e.g., booking in person, booking, virtual booking, subscribe, free follow, follow for free, user's calendar, matches calendar, other users' calendars, filters, types, message buttons, home screens, discover, settings, users profile, users calendar, other users calendars, categories, etc.) In some embodiments, users calendars may, which may include but not be limited to (e.g., appear or be used a match, or show, or display, or suggest, etc.) based on any factors such as, which may include but not be limited to (e.g., 'availability, time, appearance, types, categories, general availability, possible similar availability, etc.)

Figure 192:
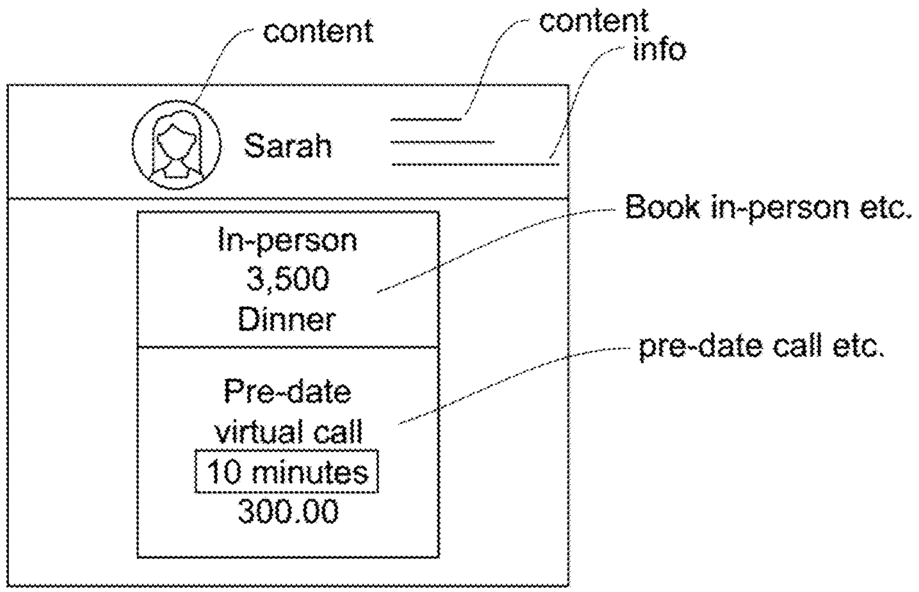
Figure 193:
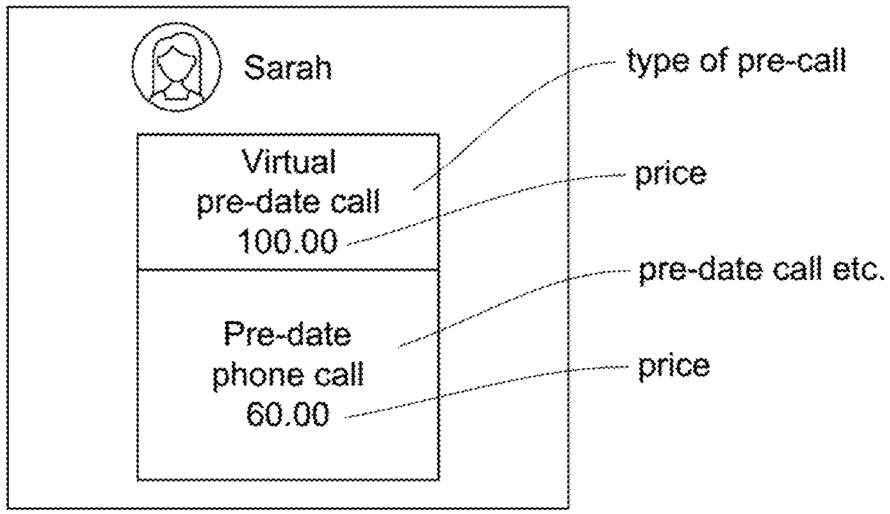

FIG. 192, FIG. 193: In some embodiments, there may be options, which may include but not be limited to (e.g., booking suggestions or booking prices, price ranges, general pricing, general transmittables, date prices, price ranges, general pricing, general transmittables, date information, etc.) which may also have options such as (e.g., 'book a pre-date virtual meeting, or pre-date virtual call, call to chat or get to know, or speed call, or speed date, or quick date, etc.) In some embodiments, the pre-date call may be, which may include but not be limited to (e.g., through the platform, through the system, 3rd party integration, phone call, any verified method that may be tracked and recorded data for agreement terms, etc.) In some embodiments, there may be options, including but not limited to (e.g., virtual pre-date call, pre-date phone call, pre-meet call, pre-group meeting, etc.) In some embodiments, prices, price ranges, general pricing, and general transmittables may be listed, including but not limited to (e.g., changed, monitored, automatically changed, manually changed, the market price changed, etc.) In some embodiments, there may be, which may include but not be limited to (e.g., a user interface or feature or screen, hologram, user interface, viewing display, or showing, etc.) that may show which may include but not limited to (e.g., user's available time, time spent, time needed to spend, amount of money, amount of funds available, any specials, any offers, any discounts, time that is open, time that is not open, calendars, charts, lists, organization of persons, messages, etc.)

Figure 194:
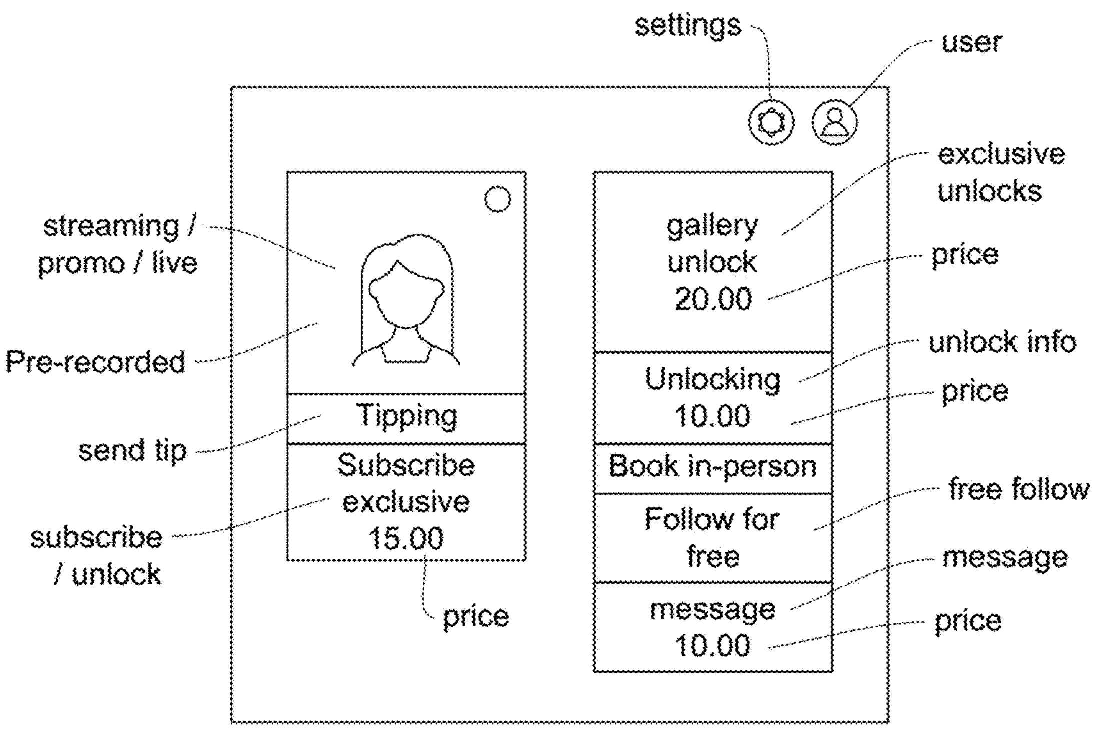
Figure 195:
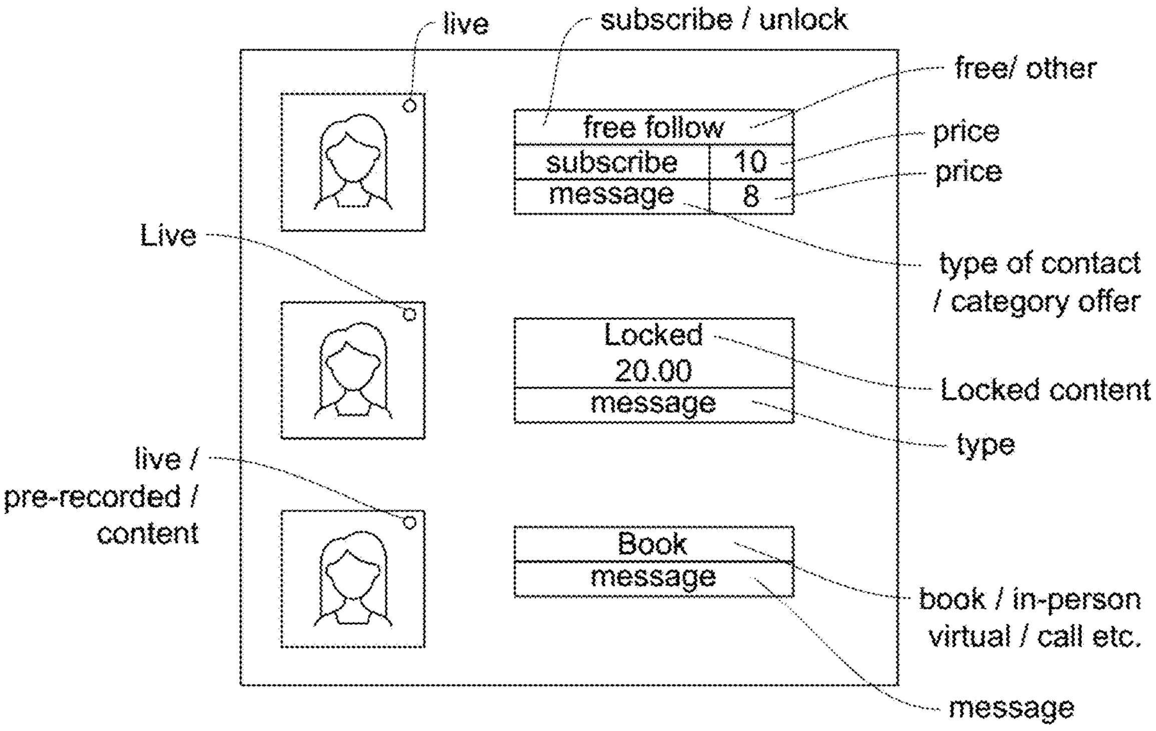
Figure 196:
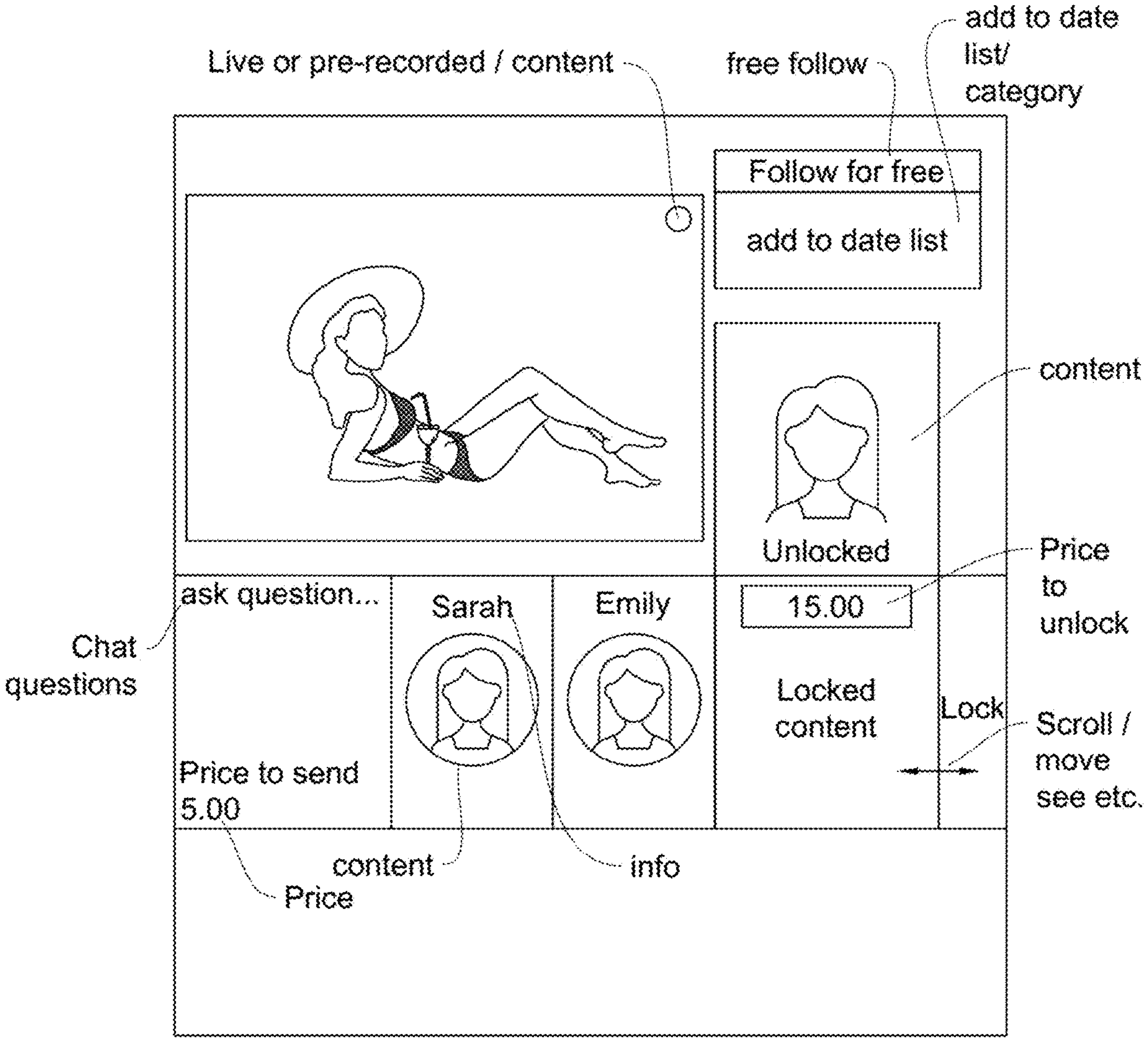

FIG. 194, FIG. 195, FIG. 196: In some embodiments, there may be a user interface where there is a screen or area, which may include but not be limited to (e.g., 'live screen, hologram, user interface, viewing display, 'live area, live streaming, live event, content, video, photos, members, memes, persons, multiple persons, multiple streams, entertainment, viewings, etc.) In some embodiments, there may be options, which may include but not be limited to (e.g., tipping, subscribe, view exclusive galleries or content or items, unlock information, unlock city, unlock personal information, unlock information, unlock gallery, unlock content, unlock live streams, message, prices, price ranges, general pricing, general transmittables, etc.) Which may also include but not be limited to (e.g., payments in exchange for content, messaging, contacts, etc.) In some embodiments, there may be ways to browse or view, including but not limited to (e.g., scrolling, viewing, automatic scroll, automatic disappear, tapping, matching AI-connecting, switching, etc.) In some embodiments, there may be, which may include but not be limited to (e.g., live events, live streaming, live recordings, pre-recordings, previous content, content, videos, pictures, etc.) that may be located on user interface whether, which may include but not be limited to (e.g., singular, with others, combined with others, or categorized with others, or a list or a created list etc.) In some embodiments, there may be options, which may include but not be limited to (e.g., free follow, follow, subscribe, send message, send tip, book in person, send gift, send exchangeable, send crypto, send thing of value, send content, agree to contract, contractual agreements, tipping, tips, book in person, send gift for in person date, send money for in-person or virtual date or meeting, book virtual, book talk, book chat, book video chat, book video meeting, book voice conversation, messaging, send gift, chat etc.) In some embodiments, there may be user interface, which may include but not be limited to (e.g., live, pre-recorded live, content, free follow, follow, add to date list, add to category, unlocked content, locked content, suggestions, user suggestions, ask AI question, ask user questions, price to send message, price to chat, price to join, locked content with price, locked content to meet requirements, etc.) In some embodiments, there may be options to: (e.g., move, scroll, switch, disappear, reappear, swipe etc.) any, which may include but not be limited to (e.g., content or items, etc.)

FIG. 197: In some embodiments, there may be user interface, which may include but not be limited to (e.g., booking options, availability, live information, live, live calendar, timing method data, timing data method, timing process data, general calendar, price per activity, price for date, price per hour, calendar with specific details, etc.) which may include but not be limited to (e.g., breakdown, itemized, receipt, invoice, total, partial, breakdown, bill, summary of, total, etc.) which may include but not limited to, the: (e.g., times during specific day amiable, activities and/or duration, check-in, check-out, time stamp, time record, time and data record, location, time and data record, coordinate(s), s for activities available, price, duration, check-in, check-out, time stamp, time record, time and data record, location, time and data record, coordinate(s), confirmation button, legal documents, legal agreements, date agreements, location, type of category, type of date, partnerships, partner locations, information, open times, possible times, bidding/auction, bidder times, user times, bidding/auction option times, platform, content, user, settings, information, user sign in, register information, contact information, contact for payment, price to contact, add to list, add to category, favorite, book in-person, book virtual, book talk, book chat, book video chat, book video meeting, book voice conversation, prices, price ranges, general pricing, general transmittables, for booking, book for job, price to book, schedule, inquire about, inquire about, inquire regarding, secure, create connection to, hold, pay for, create business relationship with, use transmittables to secure or book, schedule, inquire about, etc.) for job, price ranges, price, changing price ranges, price, changing prices, price ranges, general pricing, general transmittables, information, content, moving content, stationary content, suggestions, users, blog posts, information, posts, small blog posts, large statements, statements, request follow up call, price for follow up call, price for follow up connection, writings, chatting, contact boxes, achievements, information, categories, lists, live streams, past streaming, past content, locked content, unlocked content, etc.) In some embodiments (e.g., blurred information, date information, prices for dates, location of dates, or legal contracts, etc.), it may be (e.g., shown, implied, agreed on, disputed, shown, clicked, displayed, or, sent to the user, etc.) for any reason at any point in the exchange. In some embodiments, (e.g., contracts or agreements, etc.) may need to be (e.g., implied, shown, agreed on, signed, etc.) (e.g., prior, before, after, during a date or meeting, agreement, a payment dispute, payment exchange, or any exchangeable, etc.) In some embodiments, (e.g., contracts or agreements, etc.) may be in place, whether (e.g., agreed on, implied, legal or implied, rule-based, or platform-based, or any reason for any agreement or contract to be signed or clicked or implied or 'continue button clicked' or 'any agreement made,' etc.) In some embodiments, brunch, lunch, date, meeting, restaurant date, or any date may be booked or paid for or agreed on or shown at any time for any reason for any type of exchangeable payment or gift.

Modeling management platform: In some embodiments, the user interface may provide a may include but not be limited to (e.g., modeling. Booking, job booking, personal booking, bookings based on looks or talent, jobs based on looks or talent, employment based on influence, jobs based on audience reach, jobs or opportunities based on connections, talent, looks, etc.) platform or features that, which may include but not be limited to (e.g., enable users to create, manage, and collaborate on models or profiles, or users, type, write, make feedback, book, schedule, inquire about, pay, etc.) In some embodiments, the user interface may include but not be limited to (e.g., a user-friendly user interface that may allow users to create, edit, and customize models, access model data and analytics, users may be able to share models with other users, invite them to collaborate, track changes made to the models, follow, etc.) In some embodiments, the user interface may have features that may include but are not limited to (e.g., version control, data visualization, model documentation, etc.)

In some embodiments, the user interface may compromise of, which may include but not be limited to (e.g., several modules that work together, etc.) to provide a, which may include but not be limited to (e.g., comprehensive platform, platform, user interface, management system, etc.) for the model, which may include but not be limited to (e.g., management and collaboration, or management, or collaboration, or booking, or securing, or gig offer, or job offers, etc.) In some embodiments, modules may include: In some embodiments, the user interface may allow users to: (e.g. create, edit, and customize models using, which may include but not be limited to (e.g., platform, site, user interface, etc.) In some embodiments, the module may include but not be limited to (e.g., various tools for data input, model building, parameter tuning, features for model validation and testing, etc.) In some embodiments, a collaboration user interface may enable users to include, including but not limited to (e.g., share models with other users and collaborate on model information, development, follow, interact, etc.) In some embodiments, users may be able to invite other users to, including but not limited to (e.g., join a model, assign roles and permissions, track changes made to the model, etc.) In some embodiments, the user interface may include features for, but not limited to (e.g., real-time collaboration, messaging, commenting, etc.) In some embodiments, the user interface may provide users with features, including but not limited to (e.g. version control features for models, allowing them to track changes, roll back to previous versions, and merge changes made by multiple users. In some embodiments, the module may include features for, including but not limited to (e.g., comparison, lists, side by side, save for later, book later, list, categories, model comparison, difference highlighting, etc.) In some embodiments, the user interface may provide users with, which may include but not be limited to (e.g., tools for data visualization and analysis, allowing them to visualize model inputs and outputs, track model performance over time, and various charts, graphs, and tables for data presentation and analysis, etc.) In some embodiments, the user interface may enable users to which may include but not be limited to (e.g., document models, including model assumptions, methodologies, results, adding comments, adding emojis, annotations, questions, references to models, generating reports, generating summaries, etc.)

In some embodiments, the user interface may have a feature(s), including but not limited to (e.g., user management, data integration, model deployment, information, booking, 3rd party booking, management, etc.) In some embodiments, the user interface may implement various technologies, including but not limited to (e.g., artificial intelligence, machine learning, cloud-based infrastructure, machine learning computing operations, web development frameworks, etc.) In some embodiments, the user interface may be a system or method, including but not limited to (e.g., job booking platform, service booking platform, product booking platform, platform or 3rd party, service or product provider(s), etc.)

In some embodiments, the user interface(s) may provide a job booking website that may enable 'service providers' to 'connect' with, which may include but not be limited to (e.g., clients, persons, users, brands, 3rd parties, advertisers, advertisements, businesses, entities, manage job bookings, manage finances, manage payments, etc.). In some embodiments, this may include a user interface(s) allowing service providers to, including but not limited to (e.g., create and manage profiles, receive job requests from clients, manage bookings, payments, etc.) In some embodiments, The system may have features for including but not limited to (e.g., verifying service provider qualifications, verifying payments, managing client reviews, managing ratings, feedback, comments, booking, messaging, unlocking content, etc.) In some embodiments, the user interface may allow service providers to which may include but not be limited to (e.g., create and manage profiles on the website, their qualifications, certifications, availability, features for uploading photos, videos, and other marketing materials to showcase their services, etc.) In some embodiments, the user interface may enable clients to request assistance from service providers by including but not limited to (e.g., paying to contact, contractual agreements, agreements, payments, direct booking, 3rd party booking, assets, posting job requests, etc.) In some embodiments, service providers may receive job requests based on their, including but not limited to (e.g., service areas, availability, qualifications, history, availability, profile, prices, price ranges, general pricing, general transmittables, etc.) In some embodiments, the user interface may have features for, including but not limited to (e.g. messaging, payments, communication between service providers and clients, payment requirements, tips, etc.) In some embodiments, service providers may be able to, including but not limited to (e.g., manage their bookings and receive payments from clients, etc.) Service providers may, may have but not be limited to (e.g., confirming job requests, set prices, price ranges, general pricing, general transmittables, and availability, managing their schedules, payment processing, such as credit card payments, invoicing, verifying service provider qualifications, such as background checks, license, and certification verification, references, users may be able to view service provider qualifications on their profiles, vice versa, enabling paid persons to rate and review person's pay based on their performance, communication, reliability, responding to feedback, disputing unfair reviews, data analytics, customer support, etc.)

Figure 198:
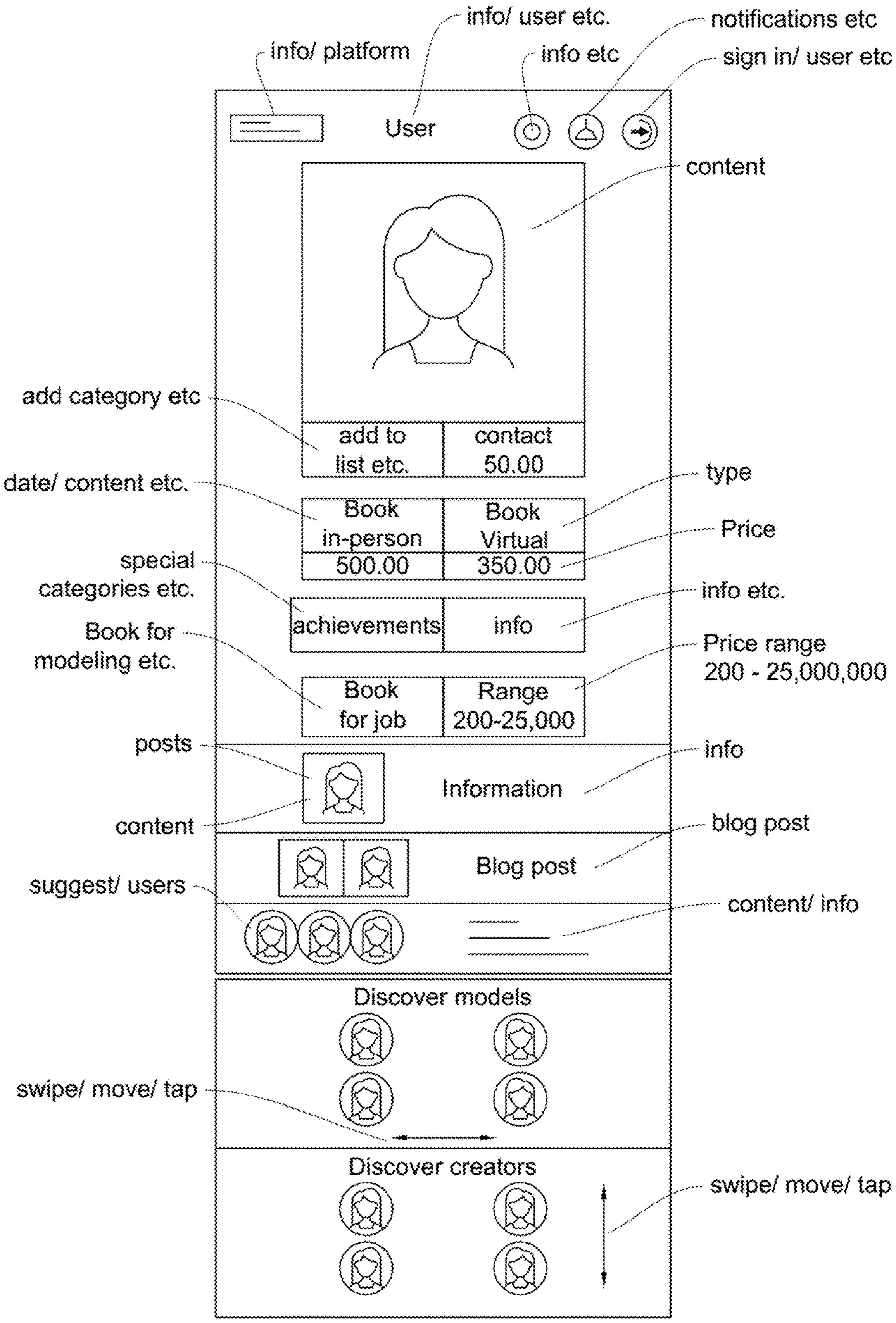
Figure 199:
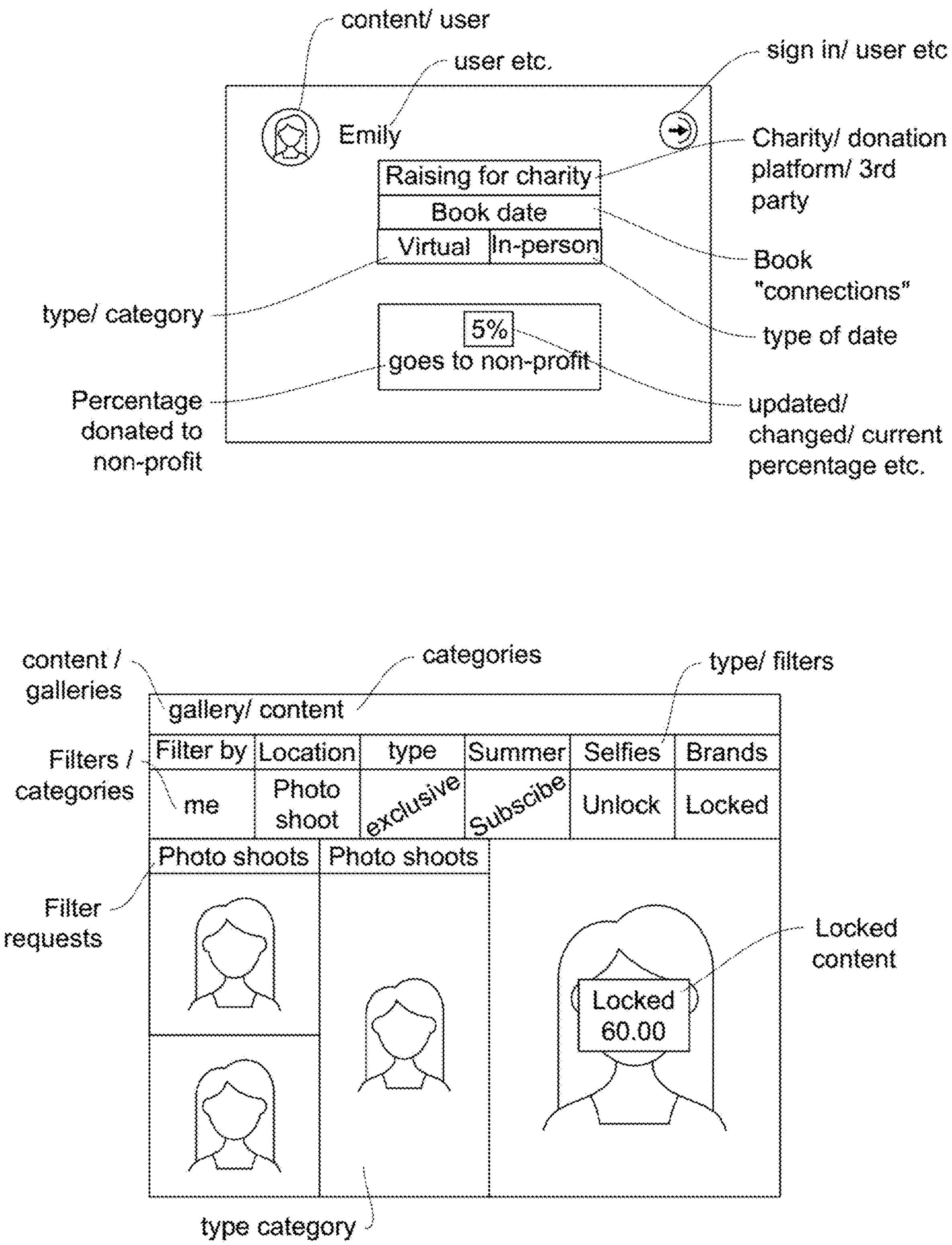
Figure 200:
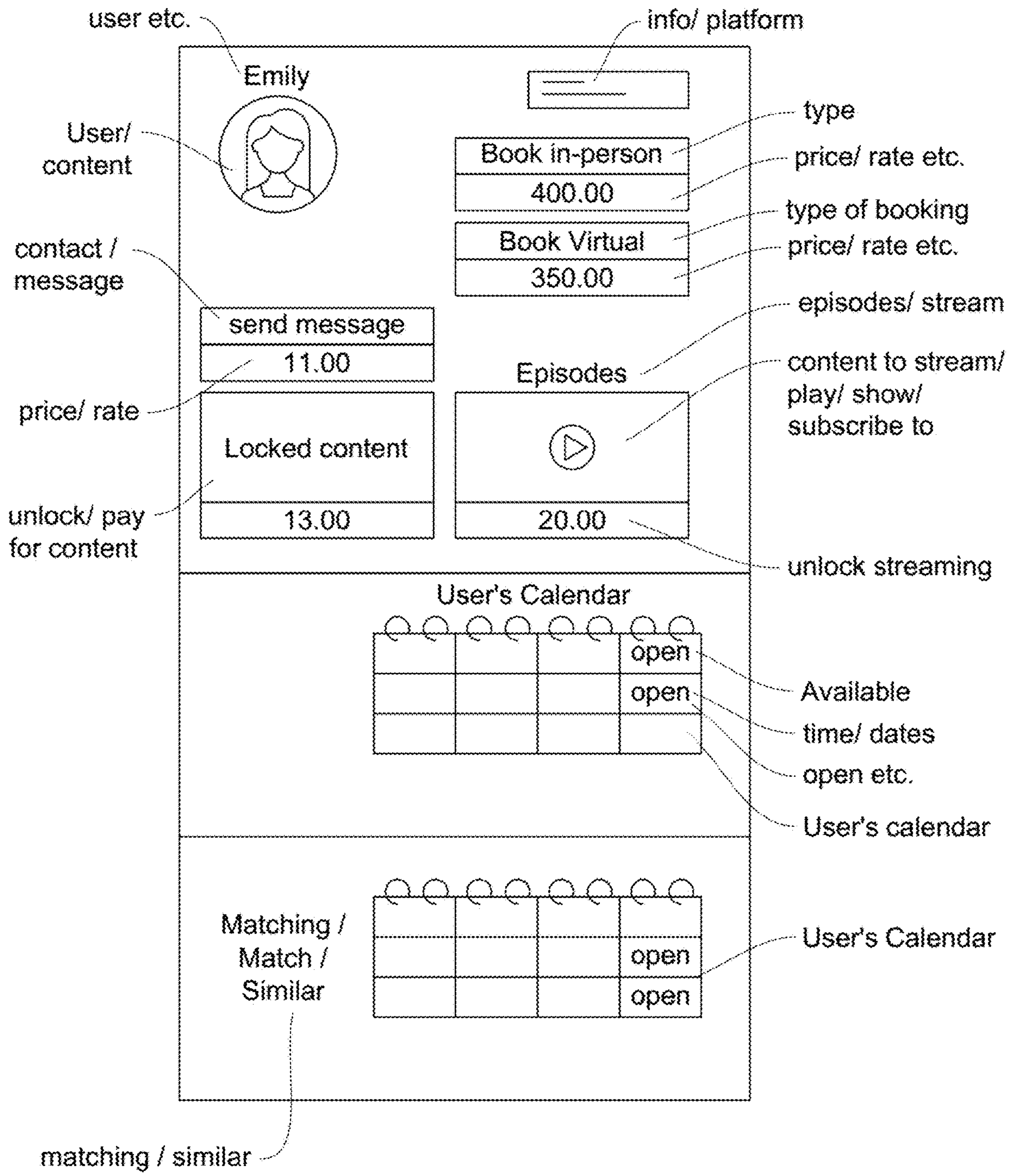

FIG. 198, FIG. 199, FIG. 200: In some embodiments, there may be user interface, which may include but not be limited to (e.g., platform, content, user, settings, information, user sign in, register information, contact information, send gift, send gifts, view gifts, view things you want, view things required for date, view things wanted, contact for payment, price to contact, add to list, add to category, favorite, book in-person, book virtual, book talk, book chat, book video chat, book video meeting, book voice conversation, prices, price ranges, general pricing, general transmittables, for booking, book for job, price to book, schedule, inquire about, inquire about, inquire regarding, secure, create connection to, hold, pay for, create business relationship with, use transmittables to secure or book, schedule, inquire about, etc.) for job, price ranges, price, changing price ranges, price, changing prices, price ranges, general pricing, general transmittables, information, content, moving content, stationary content, suggestions, users, blog posts, information, posts, small blog posts, significant statements, statements, writings, chatting, contact boxes, achievements, information, categories, lists, live streams, past streaming, past content, locked content, unlocked content, book for job, show summer or winter categories, show looks categories, book for anything, price ranges, price, etc.) In some embodiments, user may be able to view categorized or suggested (e.g., creators, users, models, persons, price ranges for dates or entertainment services, booking in-person options, virtual options, options to add to list or to view later, etc.) In some embodiments, there may be options to 'add to list, or save for later, or contact for payment or pricing, or add to favorites, to book in person, or book virtual, or to view users or models by their price range or gift price range or their requirements or what they are looking for such as 'dating, marriage, fun, friendship, emotional support person, someone to take them on nice dinners, etc.) In some embodiments, achievements such as (e.g., 'modeling portfolio or work portfolio or educational background or price ranges, or book for a job, or book for modeling gig, or add to list, or blog post, or show blogs, or show information, or show past dates, or view content, or add to favorites, or anything they have achieved or want to show off or show or show that they have achieved it, etc.)

In some embodiments, there may be a user interface(s) that may have (e.g., raising money for charity, charity donations, percentage towards non-profit, monies towards non-profit, galleries, filtered galleries, episodes, streaming episodes, live episodes, types of episode(s), series, platform series/platform movies/platform content, movies, self-produced, self-made movies, platform created films/series/content, streaming, content, price to unlock, price to subscribe, price to view, locked content, send message, price for messages, booking in person, booking virtual, pre-booking call/communication, matching AI-connecting, of calendars, similar calendars, similar routines, something in common, showing one or more calendars, matching AI-connecting, based on calendars, similar based on calendars or other features, information, galleries with filters, content that is by categories or not by types, etc.)

In some embodiments, there may be a, which may include but not be limited to (e.g., features, content, items, etc.) user interface, which may include but not be limited to (e.g., episodes, streaming episodes, live episodes, types of the episode(s), original movies, original series, original content, platform or 3rd party content, series, platform series/platform movies/platform content, movies, self-produced, self-made movies, the platform created films/series/content, streaming, content, price to unlock, price to subscribe, price to view, locked content, send message, price for messages, booking in person, booking virtual, pre-booking call/communication, matching AI-connecting, of calendars, similar calendars, similar routines, something in common, showing one or more calendars, matching AI-connecting, based on calendars, similar based on calendars or other features, information, etc.)

Figure 201:
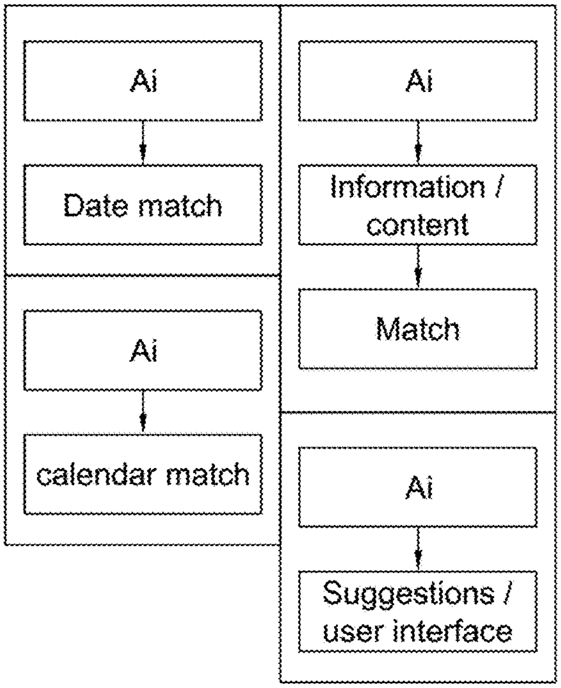
Figure 202:
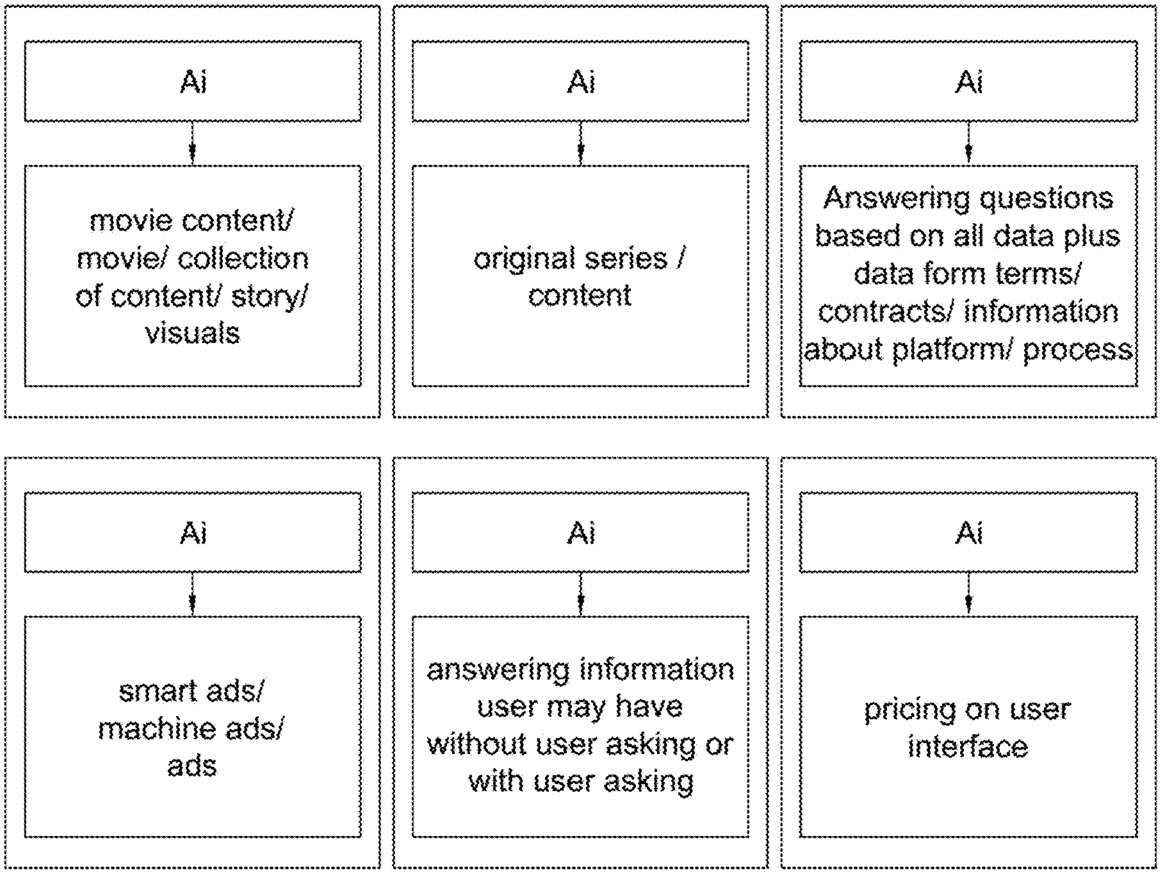
Figure 203:
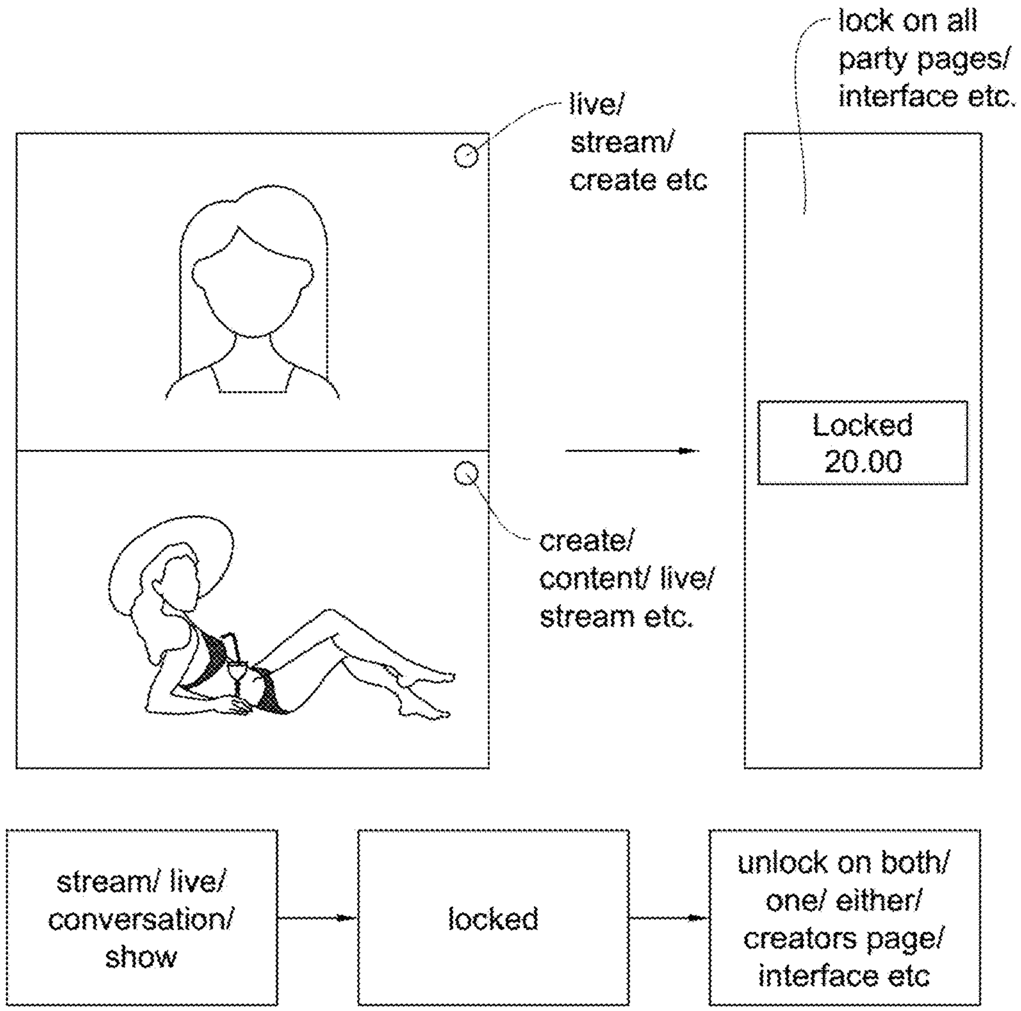
Figure 204:
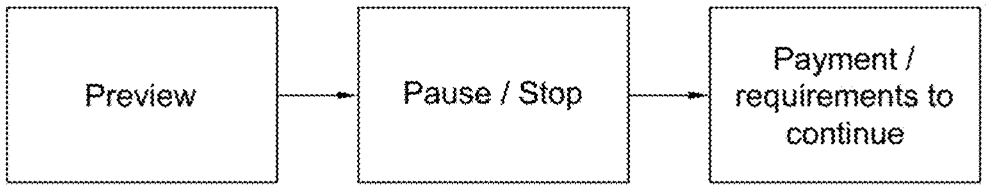
Figure 205:
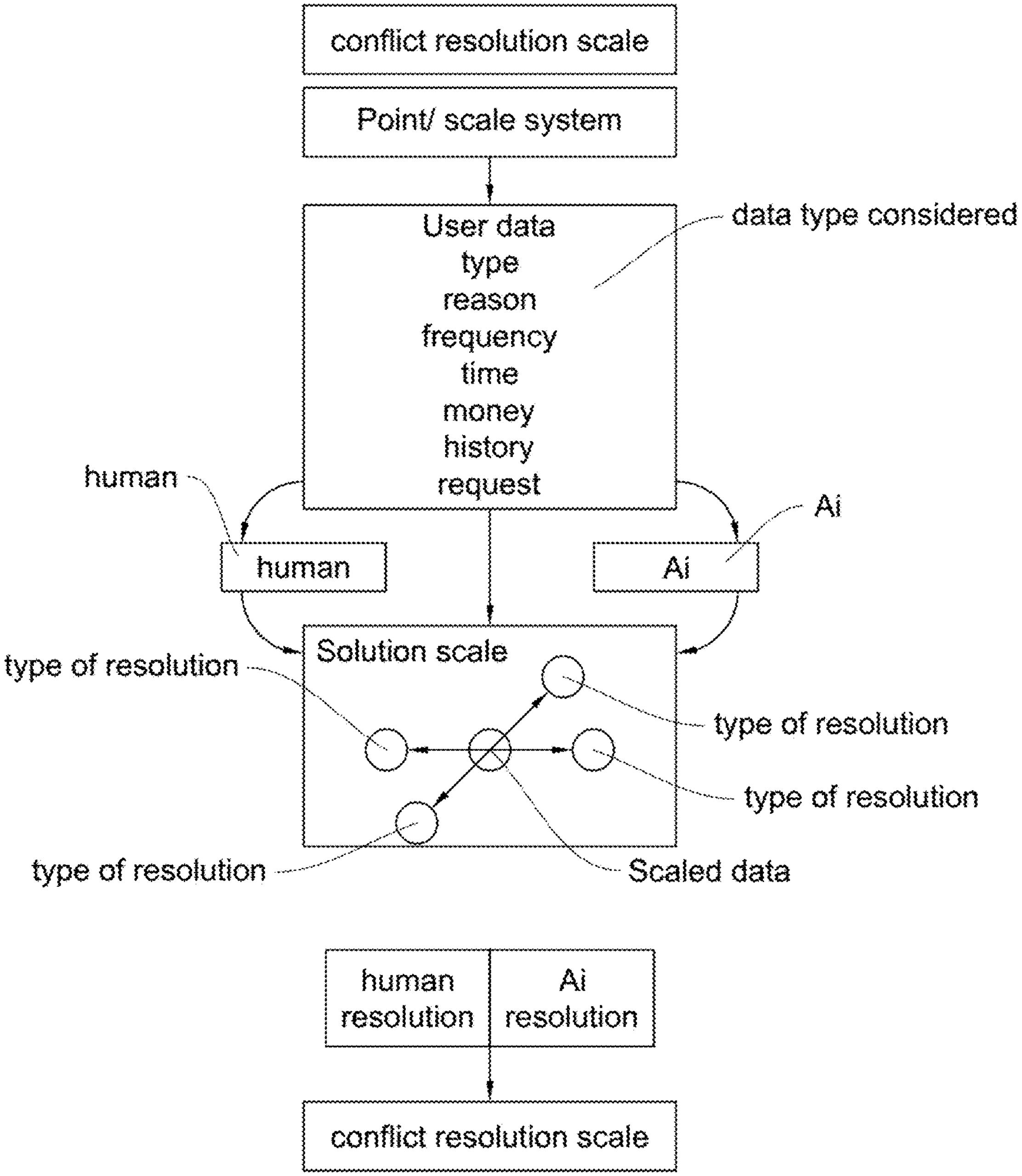
Figure 206:
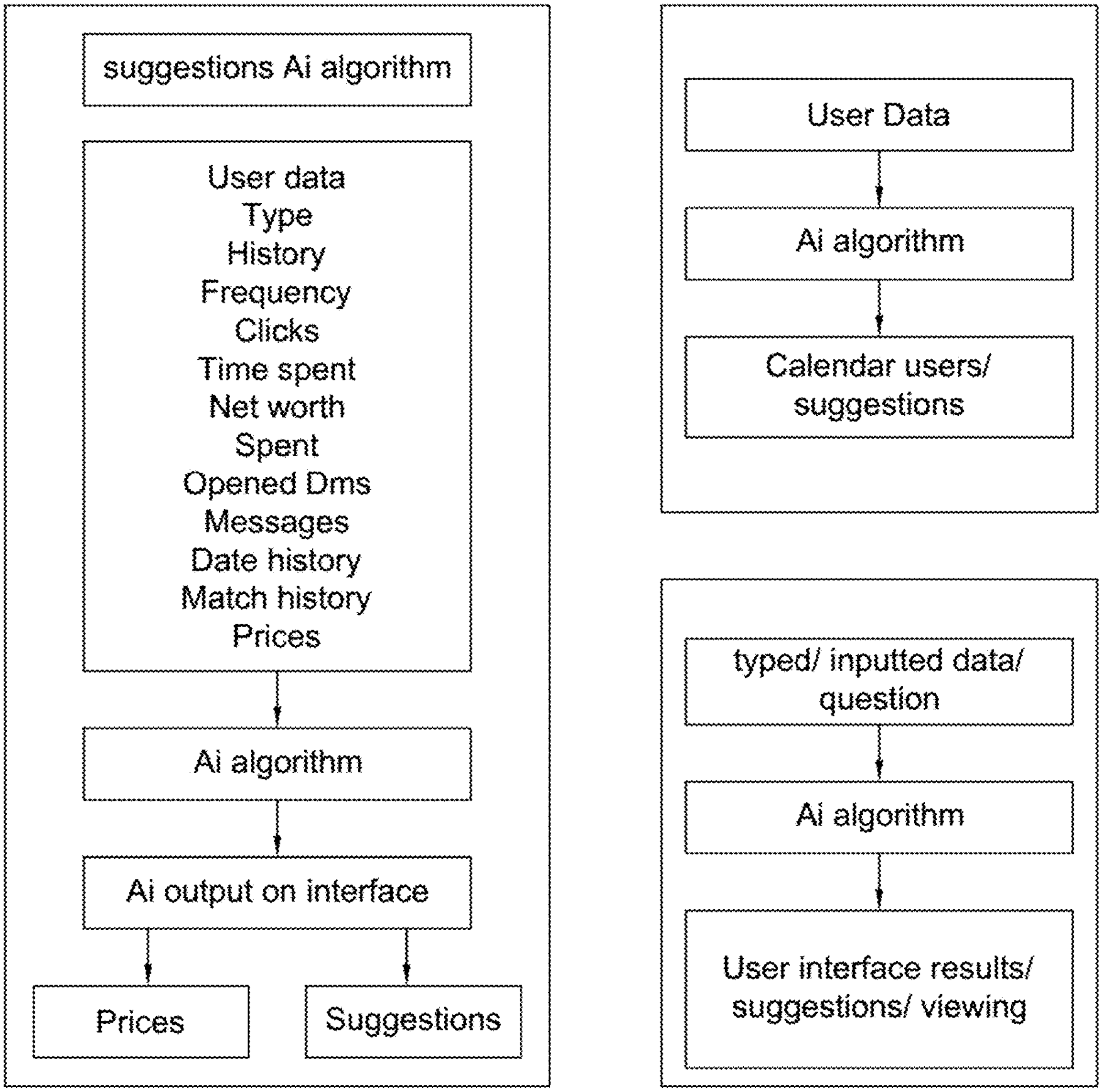
Figure 207:
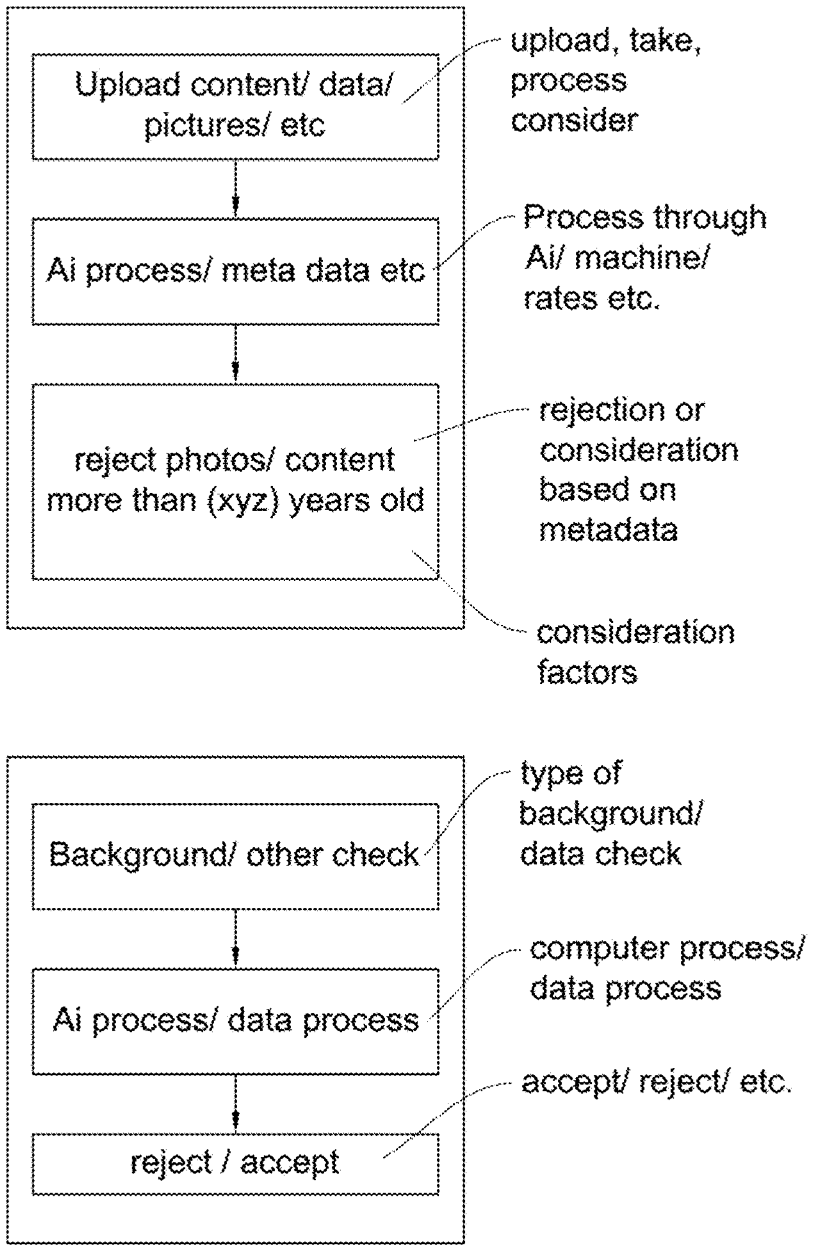

FIG. 201, FIG. 202: AI to original content or created content: In some embodiments, data may be collected, which may include but not be limited to (e.g., inputted content, inputted data, inputted photos/videos, typed information, typed prompts, typed suggestions, voice commands, inputted commands or wants or inputted information, users photos, users content, users videos, users goals, users data activity, users categories, users, any other data described in this disclosure etc.) and may be used by, which may include but not be limited to (e.g., artificial intelligence or machine learning, etc.) to create, which may include but not be limited to (e.g., original content, movies, short stories, short movies, pricing, collection of content, collection or display of film, new instructions over content, new selling over content, new information over content, new storylines over content, new storylines, new videos, original series, original content, machine learning content, complications, information videos, marketing videos, promotional materials, promotional marketing videos, new images, videos, or content based on inputted data or content, video/photo/content created, new instructional prompts, any other data described in this disclosure etc.)

AI to pricing/suggestions, auto-questions answered: In some embodiments, data may be collected, which may include but not be limited to (e.g., users preferences, users net worth, users funds, users photos, users content, users videos, users activity such as clicking history, users frequently visited profiles, users calendar, users status, etc.) and may be used by, which may include but not be limited to (e.g., artificial intelligence or machine learning, any other data described in this disclosure etc.) to create an output of, which may include but not be limited to (e.g., date match or date matches, or suggestions, or shown specific profiles, shown specific user interfaces, matching AI-connecting, suggestions for matching AI-connecting, suggestions for particular features, calendar matches, intelligent ads, ads, purchase prices, price ranges, general pricing, general transmittables, pricing on user interface, answering questions asked on outside data, answering questions user may have based on information gathered, answer questions based on user activity, or calendar analytics, shown specific pricing, any other data described in this disclosure etc.)

FIG. 203, FIG. 204, FIG. 205, FIG. 206, FIG. 207: In some embodiments, there may be an option for, which may include but not be limited to (e.g., persons, creators, users, models, etc.) to have a, which may include but not be limited to (e.g., live stream, pre-recorded live stream, pre-recorded content, conversation, video call, phone call, show, created content, collaborated content, etc.) which may be, which may include but not be limited to (e.g., locked, stopped, preview only, or requirement of payment to continue, etc.) which may show up on, which may include but not be limited to (e.g., either, both, persons, creators, users, models, etc.) user interfaces, and may be, which may include but not be limited to (e.g., unlocked, paid, previewed and paid for, subscribed to, paid for, etc.) on, which may include but not be limited to (e.g., either person's user interface or area for payment, or accepted payment, or change of assets, or asset receiving, etc.)

In some embodiments, any content or information may be subjected to, which may include but not be limited to (e.g., preview, no-preview and locked, no-preview until payment is made, no viewing until payment is made, preview and pause, preview and no more, view a portion, view some, payment is required to continue, etc.) In some embodiments, there may be a conflict resolution automatic scale. Some embodiments may have a 'point/data scale system.' In some embodiments, there may be a conflict resolution that may include but not be limited to (e.g., scale, point system, auto data input resolution output solution, etc.) or a sort of which may, which may include but not be limited to (e.g., AI, machine learning, automatic, manual, etc.) resolution system. In some embodiments, any data, which may include but not be limited to (e.g., user data, user history, user background, type, reason, frequency, time, money spent, money loaded, funds available, history, result, statements, platform gathered data, etc.) may be used in consideration while inputted manually or automatically by which may, which may include but not be limited to (e.g., artificial intelligence, machine learning, machine resolution, computer generated, human decision, human consideration, human, robot, bot, 3rd party, entity, computer system, AI system, not aware of any data, 3rd party, outside consideration, legal consideration, all other related data, all laws, laws, rules, regulations, solutions, history of solutions or answers, inputted data, general world knowledge data, etc.) which may, which may include but not be limited to (e.g., be pre-trained on 'terms and/or conditions, not aware of any data, 3rd party, outside consideration, legal consideration, all other related data, all laws, laws, rules, regulations, solutions, history of solutions or answers or resolutions, inputted data, general world knowledge data, etc.) In some embodiments, artificial intelligence may, which may include but not be limited to (e.g., combined with, in consideration against, concerning, etc.) may yield a final resolution data, which may, which may include but not be limited to (e.g., with or without human input, with or without human change, with or without human data, with or without human consideration, etc.) In some embodiments, the final decision created may not be final, and the human decision may be final. In some embodiments, AI's final decision may also have to be considered by human decision or judgment.

In some embodiments, there may be, which may include but not be limited to (e.g., a user interface or feature or screen, hologram, user interface, viewing display, or showing, etc.) that may show which may include but not limited to (e.g., user's available time, time spent, time needed to pay, amount of money, amount of funds available, any specials, any offers, any discounts, time that is open, time that is not open, calendars, charts, lists, organization of persons, messages, etc.) In some embodiments, there may be, which may include but not be limited to (e.g., user suggestions, date suggestions, date pricing, user pricing, matched computing operations, matches, calendar suggestions, calendar bookings, users on the calendar, users for checkout, suggested activities, invites to events, invites to special clubs or memberships, suggested users, suggested viewing, browsing, showing up on user interface, etc.) computing operations that may be created with, which may include but not be limited to (e.g., users, inputted questions, inputted information, inputted pricing, computing operations pricing, marketing pricing, history, frequency, time spent, direct messaging, opened DMs [direct messages], message history, net worth, funds available, credit available, spent, date history, match history, clicks, user data, type, type bookings, bookings, history, etc.) In some embodiments, results may show, including but not limited to (e.g., different pricing, different users, viewing options, viewing user interfaces, user interfaces, results, different suggestions, different activities, different results, etc.)

About FIG. 60 or any user interface. In some embodiments, there may be a process in, which may include but not be limited to (e.g., uploading, a completion of, a 3rd party assessment, a human assessment, human data collection, Network address, IP address, platform check, platform type, etc.) may include but not be limited to (e.g., content, pictures, data, driver's license, photos of face, 3rd party background checks, background checks, public information, platform assessment, human assessments, videos, screenshots, changed metadata, changed data connected to content etc.) may be processed with, which may include but not be limited to (e.g., AI, machine learning, fraud detection, humans, trained persons, computing data, meta data detection, etc.) which may include but not be limited to (e.g., content, pictures, data, driver's license, background checks, 3rd party websites, 3rd parties, advertisers, advertisements, businesses, other platforms, content, public information, founded information, photos of face, videos, etc.) may be rejected due to, which may include but not be limited to (e.g., fraudulent activities on metadata, suspicious metadata, content older than a specific time frame, content not taken during time frame, content from another day or time, etc.) In some embodiments, content may have a time limit to be, which may include but not be limited to (e.g., uploaded, added, considered, used, etc.) from, may include but not be limited to (e.g., data of photo or video taken, date of conception, metadata, photo or video data, type of content, type of video/picture/item/upload, content taken, etc.)

Figure 208:
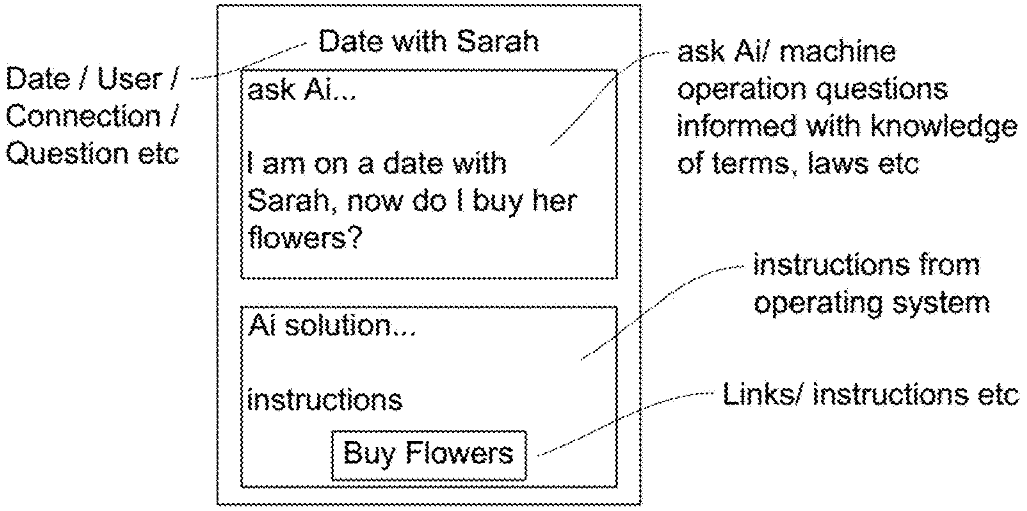

FIG. 208: In some embodiments, there may be a, which may include but not be limited to (e.g., user interface, operating system, etc.) that may allow, which may include but not be limited to (e.g., a user, a person, a person on a date, a user communicating, a user making a connection, a person, etc.) to seek answers or solutions through, which may include but not be limited to (e.g., AI, machine learning, FAQS, terms and conditions, computer, robotics, etc.) In some embodiments, questions or solutions may be regarding a question or something that involves seeking knowledge to assist, including but not limited to (e.g., typing a question, voice command inserting a question, recording a question, summoning a question, etc.) In some embodiments, a question/questions or solution(s) may come in the form of, which may include but not be limited to (e.g., links, typed answers, voice answers, messages sent, links sent, links shown, booked dates, payments, payments sent, sending gift cards, paying bills, etc.)

Figure 209:
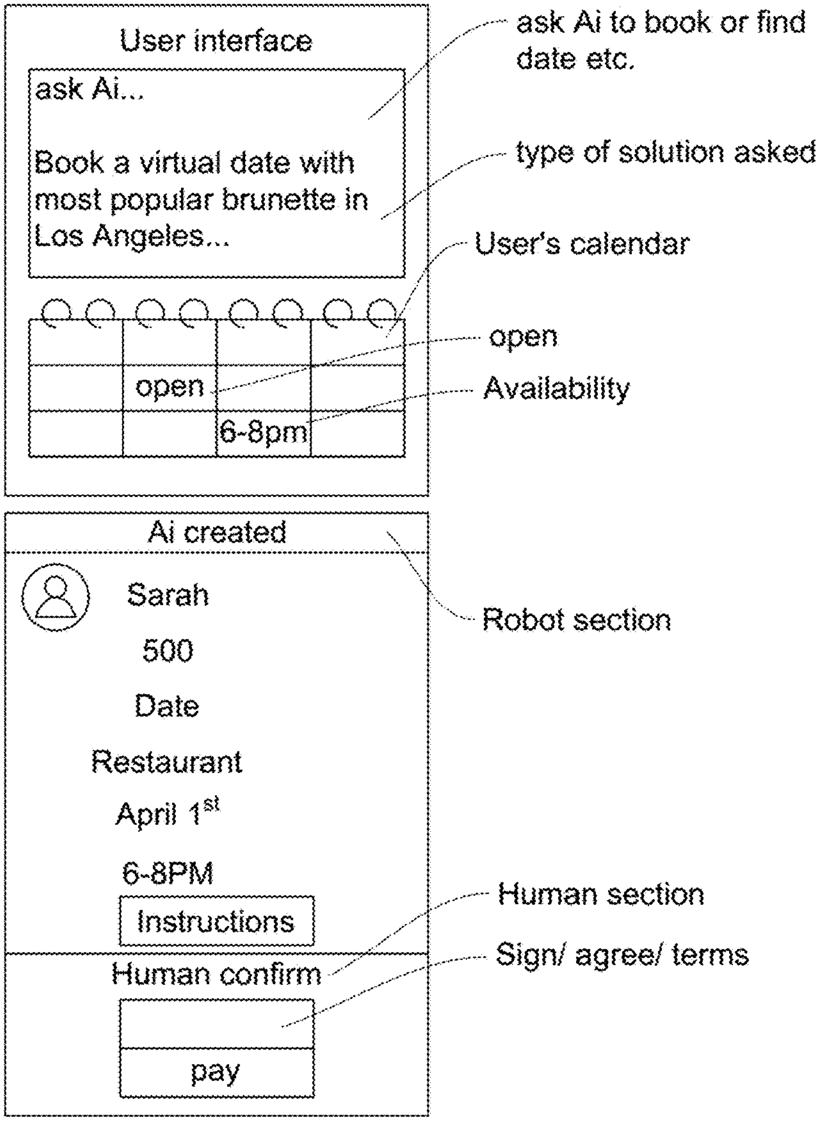

FIG. 209: In some embodiments, the user interface may allow a user to, which may include but not be limited to (e.g., ask, question type, seek an answer, find solutions, etc.)) through, which may include but not be limited to (e.g., AI, robots, humans, persons, machine, user interface, computer, etc.) to, which may include but not be limited to (e.g., find, book, schedule, inquire about, suggest, secure, pay for, find and add to calendar, message, etc.) which may include but not be limited to (e.g., any user or any person on the user interface, any 3rd party user, any user, any person, any person not on user interface, etc.) In some embodiments, 'AI' may include but not be limited to (e.g., automatically book, schedule, inquire about, auto create, auto secure, message, pay, send payment, etc.), or the user interface may go to the final screen before checkout such as an (e.g., breakdown, itemized, receipt, invoice, total, partial, breakdown, bill, a summary of, total, etc.) screen' and the human has to, which may include but not be limited to (e.g., agree to terms, read the contract, pay, transfer funds, sign, etc.) which may include but not be limited to (before, after, during, etc.) which may include but not be limited to (e.g., booking, message, group booking, etc.) In some embodiments, there may be, which may include but not limited to (e.g., pre-made or pre-created or created or entered options or custom options, etc.) that may be, e.g., sent, shown, displayed, editable, changeable, deleted, summoned, requested, etc.) as a, which may include but not be limited to (e.g., chart, letter, options, clickable options, clickable, calendar, timing method, content, display, optional selectable thing for acceptable requests or things that may be requested, etc.) In some embodiments, there may be, which may include but is not limited to (e.g., limited items or options for requests, alternatives or options such as 'book a video call, book a phone call, send a message, request anything, request something here, limited options for request listed here, show calendar, display calendar, give calendar options, message payment options, questions, request types of content, request types of videos, request types of photos, request features, request information, etc.) In some embodiments, there may be a, which may include but not be limited to (e.g., screen or a user interface or a public profile or public information, etc.) and/or a, which may include but not be limited to (e.g., anyway, public way, user, way, user interface, etc.) to: (e.g., 'book video call, book phone calls, book in-person date, follow for free, follow, message, send message, send a personalized message, send photo, send video, etc.) In some embodiments, there may be options to (e.g., schedule things in advance, add to calendar, book and add to calendar, book, schedule, inquire about things that are immediate such as being able to send a video message, be able to send a private photo, be able to send a question, be able to see private photos, etc.)

Figure 210:
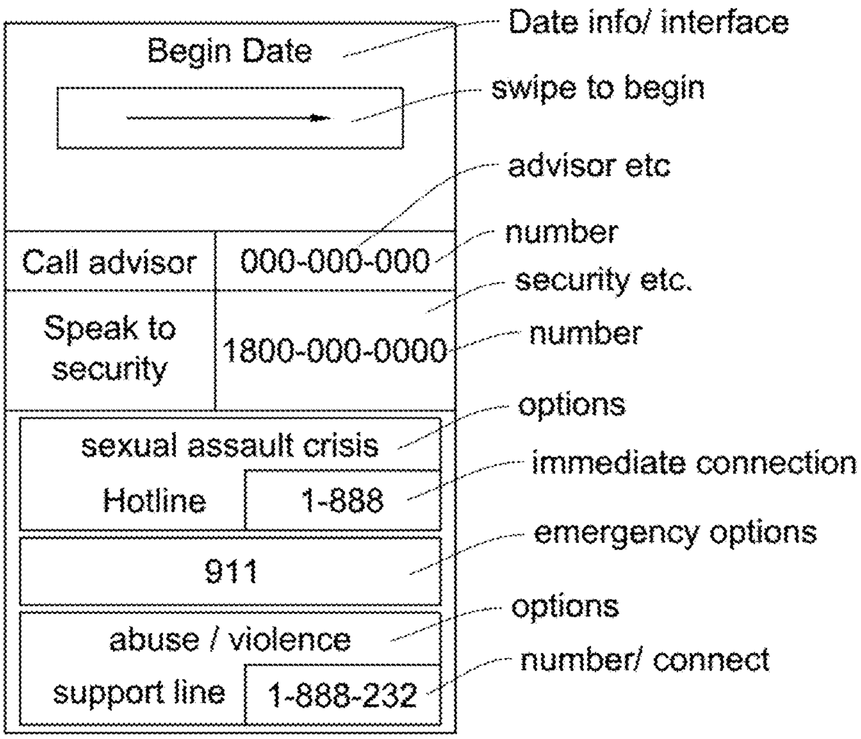

FIG. 210: In some embodiments, there may be a user interface that may include but not be limited to (e.g., help lines, 3rd parties, advertisers, advertisements, businesses, other persons, assistance, AI assistance, resources, persons to contact, appointed persons to contact, their aid, other people they select or establish or want, etc.) may be made available for, which may include but not be limited to (e.g., emergencies, help, assistance, questions, etc.) Any combined user interfaces: In some embodiments, user interfaces may be combined with any other, which may include but not be limited to (e.g., described, shown, similar, etc.) which may include but not be limited to (e.g., user interface, process, or computing system, etc.)

Figure 211:
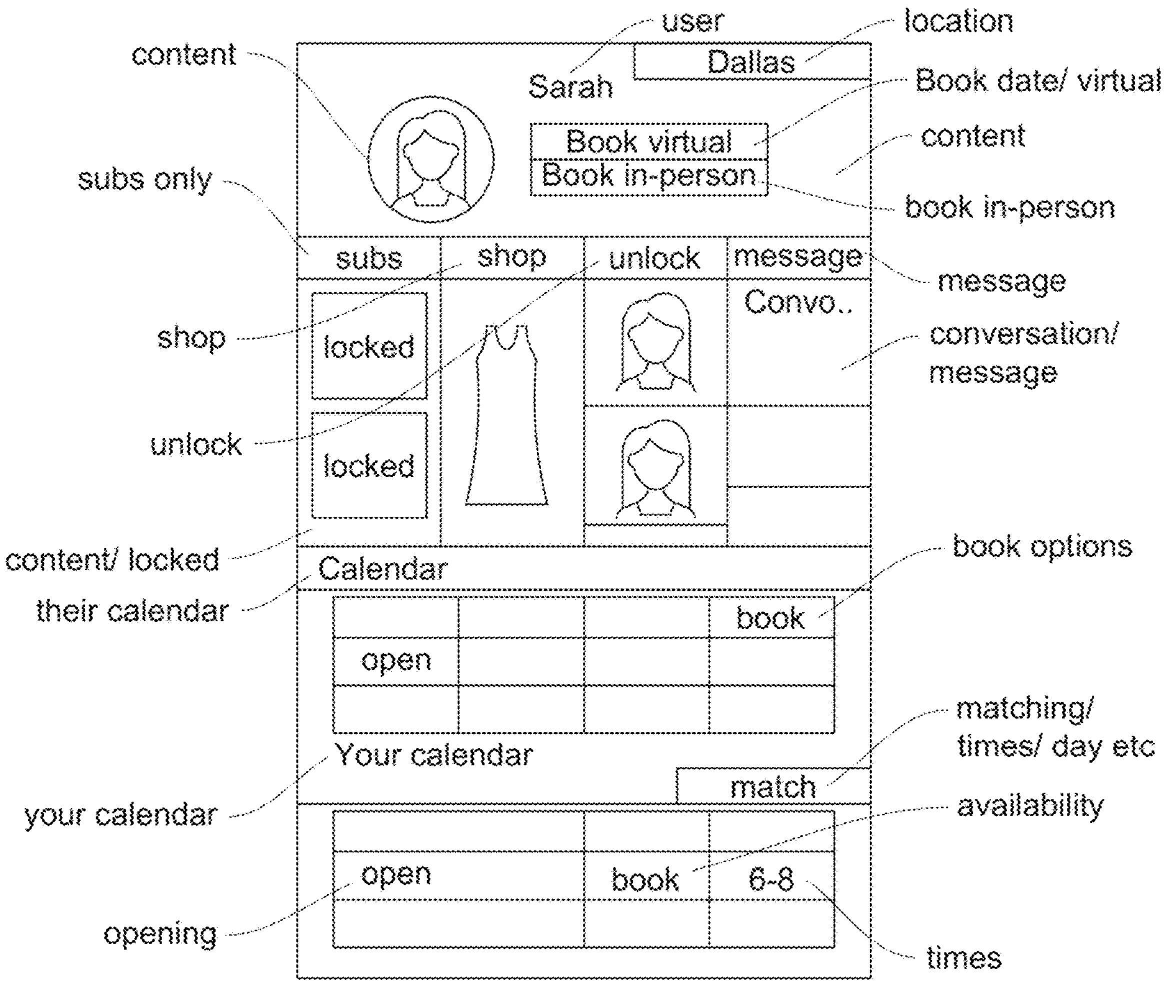
Figure 212:
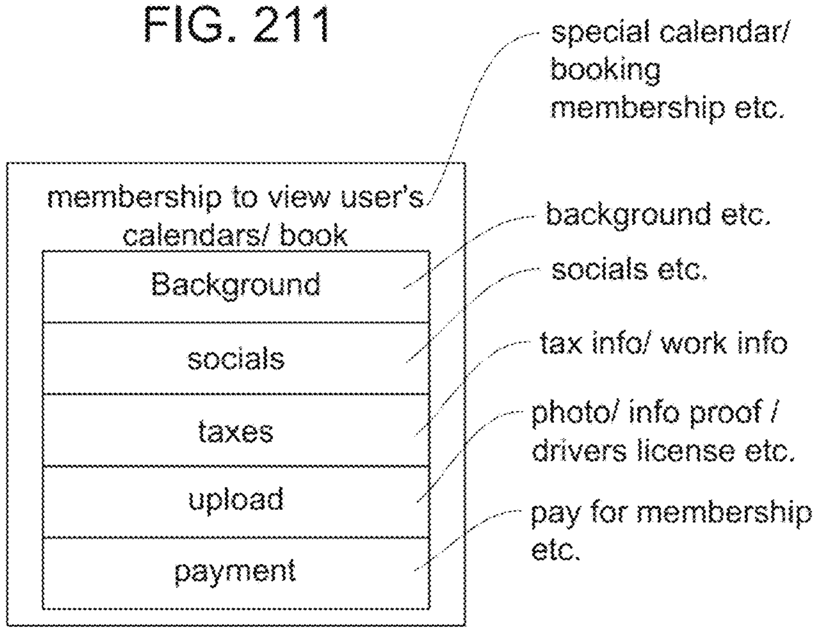

FIG. 211, FIG. 212: In some embodiments, there may be a user interface, which may include but not be limited to (e.g., subscribers, subscriber-only, unlocked, locked, messaging, blurred out content, non-available content, calendar information, matching AI-connecting, calendars, users calendars, users availability, shopping information, users information, items to purchase, content, etc.) In some embodiments, the user interface may allow or, which may include but not be limited to (e.g., membership options, pay-only options, payment options, etc.) in exchange for, which may include but not be limited to (e.g., being able to book, schedule, inquire about, inquire about, inquire regarding, secure, create a connection to, hold, pay for, create a business relationship with, use exchangeable to secure or book, schedule, inquire about, etc.) a date, being able to view the calendar, interact with to view the calendar, interact with to view timing data method, viewing calendars of users, viewing unique content, viewing paid content, being able to book, schedule, inquire about, inquire about, inquire regarding, secure, create a connection to, hold, pay for, create business relationship with, use transmittables to secure or book, schedule, inquire about, etc.) or make connections etc.) without meeting requirements first. In some embodiments, options to pay for clothing items or clothing that are shown or wanted by the user or model may be able to be purchased from the model's profile or any platform feature or integrated or 3rd party feature that may show that model or user wants a (e.g., clothing item or a dress or a gift or a product or a service or a voucher for a vacation or a plane ticket voucher, etc.)

Figure 213:
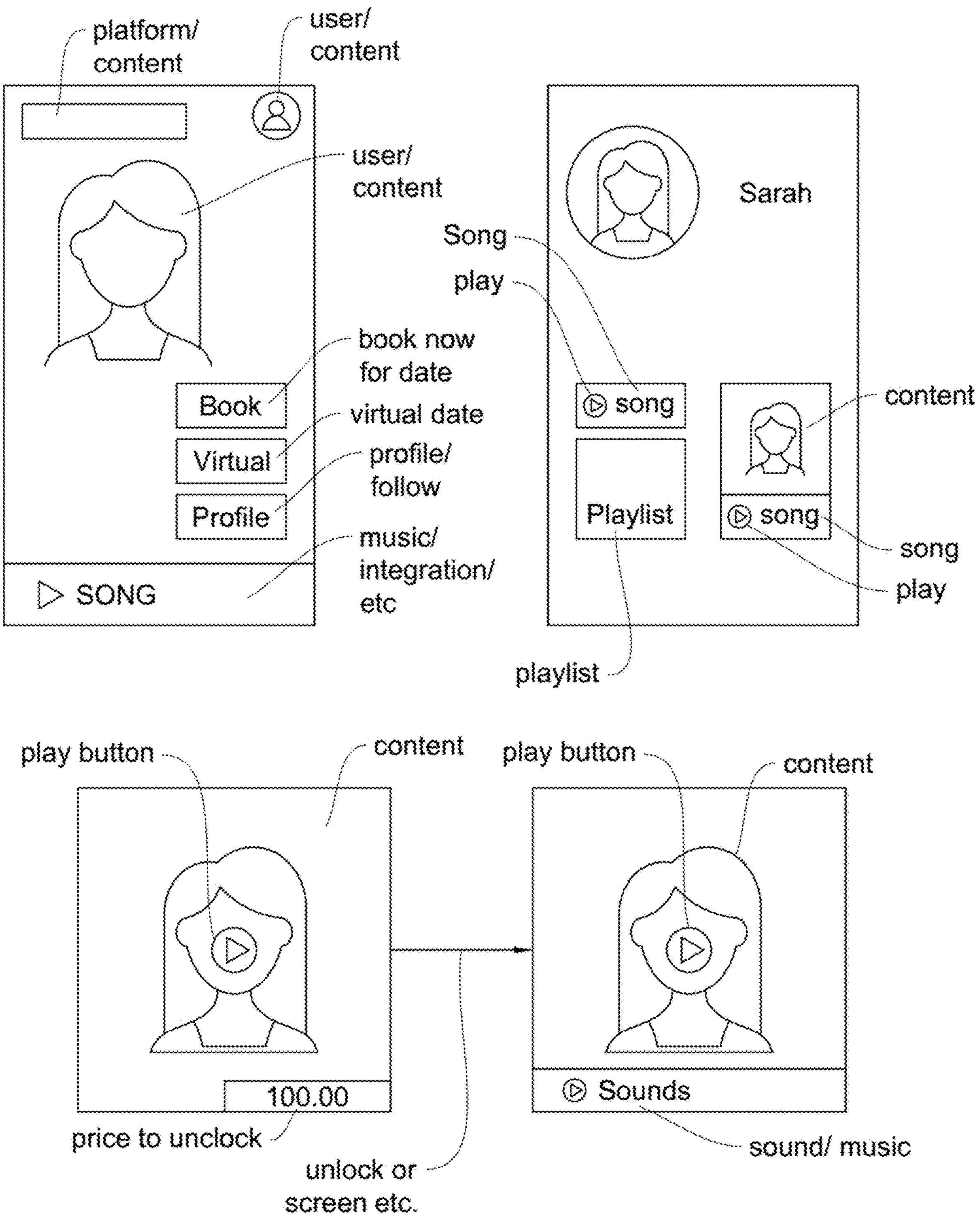
Figure 214:
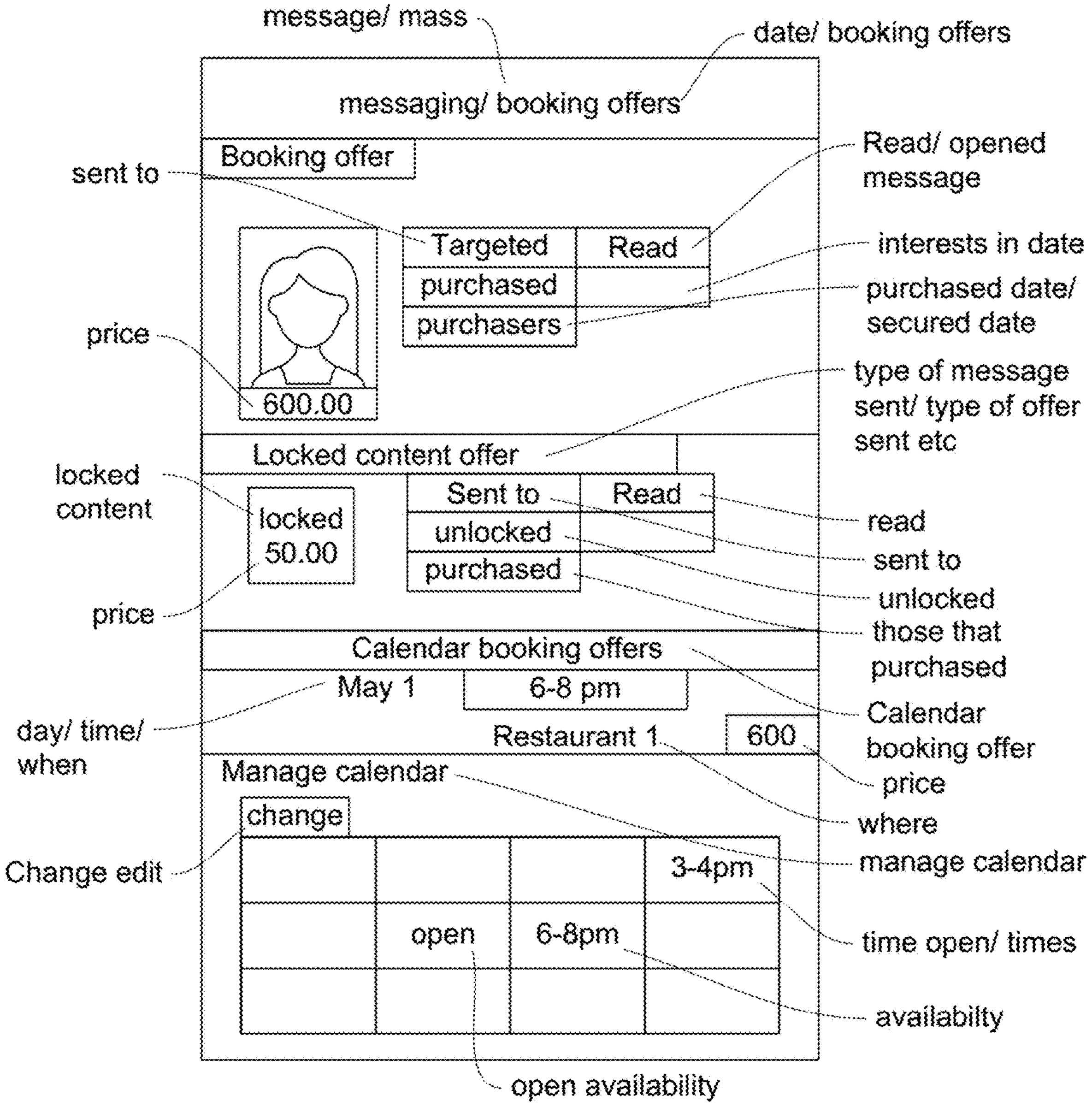

FIG. 213, FIG. 214: In some embodiments, the user interface may allow or have options for, which may include but not be limited to (e.g., music, sound, frequency, etc.) integration. In some embodiments, sound integration, which may include but not be limited to (e.g., music, original music, original sounds, 3rd party music, 3rd party licenses, 3rd party playing, 3rd party sounds, separate playing while viewing content, half and half separation, half content half music or other sounds integration, etc.) may be, which may include but not be limited to (e.g., allowed, shown, integrated, on profile, with profile, with information, next to information, seen on user interface, etc.) In some embodiments, the user interface may allow integrations, which may include but not be limited to (e.g., into, next to, with, etc.) which may include but not be limited to (e.g., content, videos, pictures, next to content, separate from content, same screen, hologram, user interface, viewing display, semi-integration into content, background sounds, integrated music, integrated information, outside information, outside links, background music, background, separate from content, etc.)

In some embodiments, there may be a 'messaging system or user interface which may be described as may include but not limited to (e.g., management system, request system, manager system, sent messages, sent requests, sent offers, send offers, make offers, create messages, send mass messages, create offers, create discounts, communicate with others, offers, communication to, communicate with, reach out to, etc.) In some embodiments, 'messaging or offering system' may allow, which may include but not be limited to (e.g., booking offers, booking requests, sent requests for booking, offers for booking, AI response, trained auto responses, AI/human/computer/robotics trained scheduled auto-responses with may or may not include content or created content or any visuals or information, auto-response, renew, calendar sending schedule, schedule posts, schedule sending of messages, remove fans, set VIPS, set priorities, schedule a live event, schedule a live, allow or offer virtual 'date,' remove subscribers, remove users, categorize users, target users based on categories or information, sending offered content, sending locked content, change booking, request booking, send offers for booking, send discounts or price offers, send calendar requests, send requests to book, schedule, inquire about, inquire about, inquire regarding, secure, create connection to, hold, pay for, create business relationship with, use transmittables to secure or book, schedule, inquire about, etc.) for calendar, send virtual date requests, show open days for booking, show open times to book, schedule, inquire about, inquire about, inquire regarding, secure, create connection to, hold, pay for, create business relationship with, use transmittables to secure or book, schedule, inquire about, etc.) ask for gifts, ask for requests, send request offers, send requests, show those that purchased, manage those that purchased, read messages, send messages, ask those to subscribe, ask those to unlock content, send special prices, price ranges, general pricing, general transmittables, send content to be unlocked or paid for, send original movies, send movies, send games to pay, send games to unlock, send business offers to get paid for, sending locked movies or original, or any content, offering days, time, etc.) to be booked or subscribers information, subscribe, locked content, information, etc.)

In some embodiments, AI (artificial intelligence) may be trained (e.g., responses, solutions, content, results, suggestions, etc.) In some embodiments, the user interface may produce custom AI content. In some embodiments, AI may be trained by, which may include but not be limited to (e.g., human, robot, bot, 3rd party, entity, computer system, AI system, inputted information, laws, regulations, content, photos, videos, documents, etc.) which may allow 'trained AI' to automatically or with the assistance of a human generate a, which may include but not be limited to (e.g., custom, changed, answered, solution, etc.) to: (e.g., question, requested content, requested date, requested virtual date, entertainment options set by anyone or model or user, requested post, requested message, custom-created content, custom-requested content/output, questions, send ads, send information, question responses, information responses, information requests, bookings, general questions, funny, games, jokes, fun, etc.) which may be automatically, manually, human, robot, bot, 3rd party, entity, computer system, AI system, or any type of generated at any time period whether, which may include but not be limited to (e.g., immediately, scheduled sent, random scheduling of sending response or information or requested content or any requests, later, taking information request such as 'respond to me next week when I'm not so busy, etc.) In some embodiments, AI or a human or computing system may input, gather, or obtain information from request and generating (e.g., best response, best answer, best time to response, best response based on any data, rained data response, etc.) In some embodiments, AI or humans may generate with, which may include but not be limited to (e.g., point scale system, scale, created scale, general knowledge scale, knowledge scale, inputted data scale, measurements based on risk assessment, etc.) to, which may include but not be limited to (e.g., conclude, give, response, create answer, answer, response, time, best solution, etc.)

Figure 215:
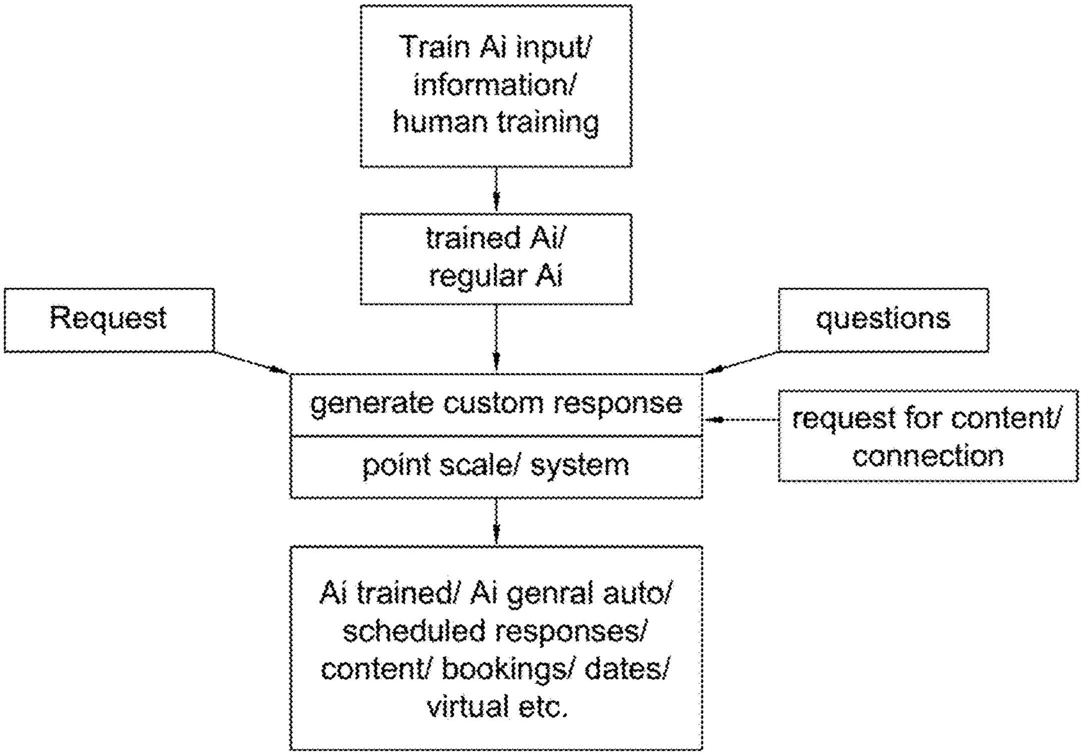
Figure 216:
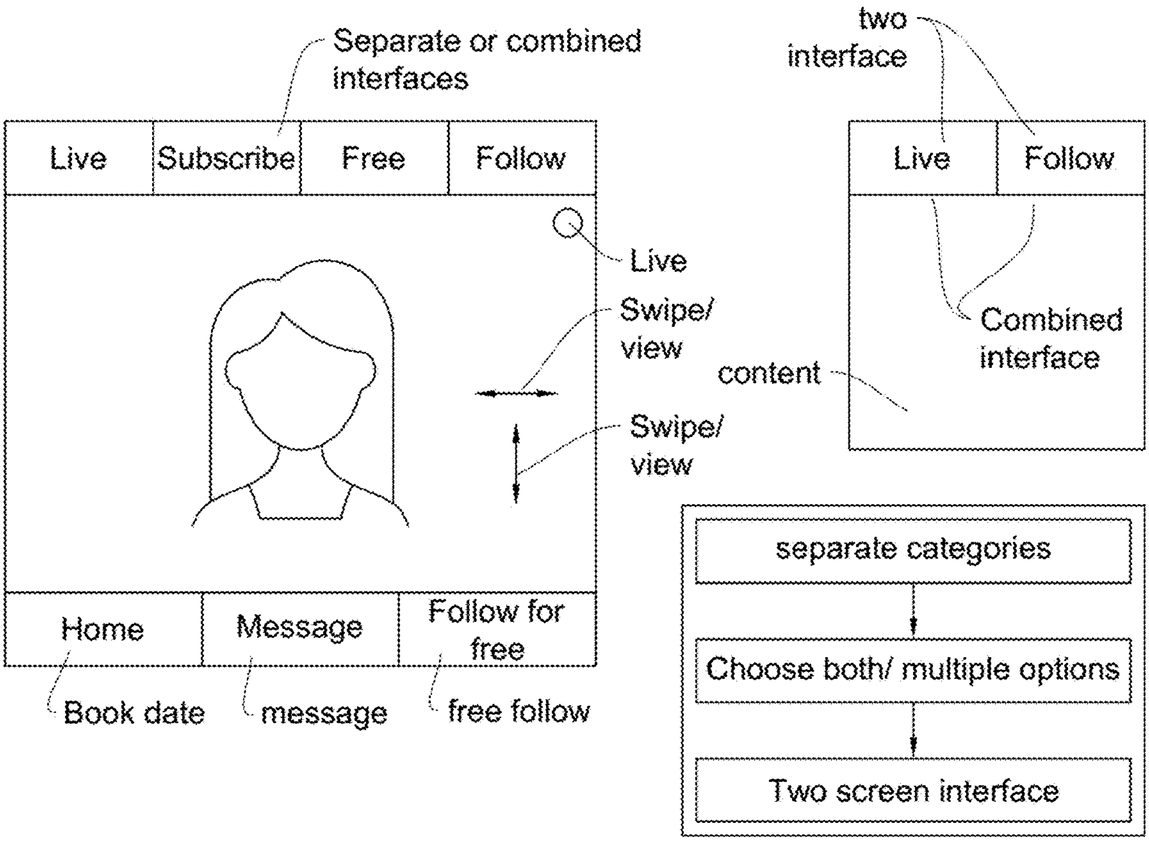

FIG. 215, FIG. 216: In some embodiments, there may be user interface(s) that have collaboration content, which may include but not be limited to (e.g., content, videos, information, users, viewings, calendars, visuals, etc.) which may also include but not be limited to (e.g., tagged, added, combined, one or more, those appearing in content, those appearing, those connected to, those in coloration with, etc.) which may also include but not be limited to (e.g., payments, paying options, pause, locked, membership only, pay only content, pay to view, etc.) In some embodiments, there may be, which may also include but not be limited to (e.g., original content, original series, movies, visuals, one or more, in collaboration with, made with, appearing with, one or more appearances, etc.) which may include but not be limited to (e.g., free, pay to view, pay to unlock, pay to see, membership only, membership, subscribers, followers, etc.) In some embodiments, which may include but not be limited to (e.g., content, data, human content, AI, etc.), content may be, which may include but not be limited to (e.g., inputted with, inputted, data collected plus, created with, collaboration with, etc.) which may also include but not be limited to (e.g., artificial intelligence collection, data combined content, or any machine learning or computing software or computing device or computer created combined with, or any, which may include but not be limited to (e.g., content, information, data output, etc.) In some embodiments, which may not be limited to (e.g., human content and/or AI content, etc.) may be combined to create which may include not be limited to (e.g., human content, or new content, or any content, or any virtual output, etc.) In some embodiments, human content and AI content may be combined to create AI content. In some embodiments, human content and AI content may be combined to develop AI data output. In some embodiments, human content and AI content may be combined to create artificial intelligence output. In some embodiments, any, which may include but not be limited to (e.g., content, data, information, etc.), which may include but not be limited to (e.g., combined with, added to, created with, inserted into, data input and output, etc.) which may create or develop, which may include but not be limited to (e.g., automatic data management, automatic data output, automated artificial intelligence created content, automatic business content for business, any seemingly human responses or human business management or creation, any output for business, etc.) In some embodiments, AI input to create an outcome or a computing output performing duties or doing something or acting on behalf of its training or capabilities can be trained (e.g., per model, by anyone, be trained by platform, or be trained by 3rd party, and each model may have their answers or trained AI model responses or activities that the AI model assistant or AI model can perform for each person based on their needs or their training, etc.) In some embodiments, AI inputs may be trained to perform manual or automatic outputs that may not allow anyone to copy or may be free to copy or may answer questions on a website answer questions for fans, give fans information about the user or person, or convince the person to go out with them, or chat with them, etc.) In some embodiments, the AI model or trained model or AI input can be trained by the model to answer fan (or fan-related) questions.

In some embodiments (e.g., users or AI, or humans, or any parties acting on behalf, etc.), they may be able to convince someone to go out with them, convince someone to pay for the date, persuade someone to send money, convince someone to send gifts, and convince someone to send exchangeable. In some embodiments, it is the trained AI model and not the human or a combination of the two; for example, "Josh wants to go out on a date with Emily, so he inquires about it by paying for a 5$ message to her saying 'hey I want to go out with you but how do I know you're real and how do I know that you are getting the gifts' and the trained AI model may response to answer the question exactly as it was 'programmed to do' such as 'Hey Josh! I am a verified model on this platform; here is some proof: the best proof is booking the date and seeing me live or in person: If you book an in-person date, it would be in person with the real me, or if you book a virtual date, it would also be the real me, but virtual over the screen at your convenience depending on both of our schedules, so it depends on what type of experience or entertainment service or date service 1 can offer you? What are you looking for? Friendship, dating, communication, emotional support, etc.?

Multiple integrated screens or interface(s): In some embodiments, there may be user interface options, which may include but not be limited to (e.g., multiple screens on one, multiple category options, multiple options for viewing, different screens for viewing, multiple user interface options, options to view separate or distinct or different user interface, other user interfaces, user interfaces integrated or connected as one or into one or seen together, two screened user interfaces, multiple screened or viewed user interfaces concurrently, or combined, or together or meshed, or both seen as new, etc.) In some embodiments, there may be viewing options or screen viewing combining options, which may include but not be limited to (e.g., live, subscribers, free, follow, book date, book meeting, message, follow for free, view profile, view, follow, send a tip, view calendar, see the calendar, etc.) In some embodiments, separate categories may be combined into one screen or seen concurrently. In some embodiments, separate categories or screens may be combined for a multiple-screen viewing option.

Figure 217:
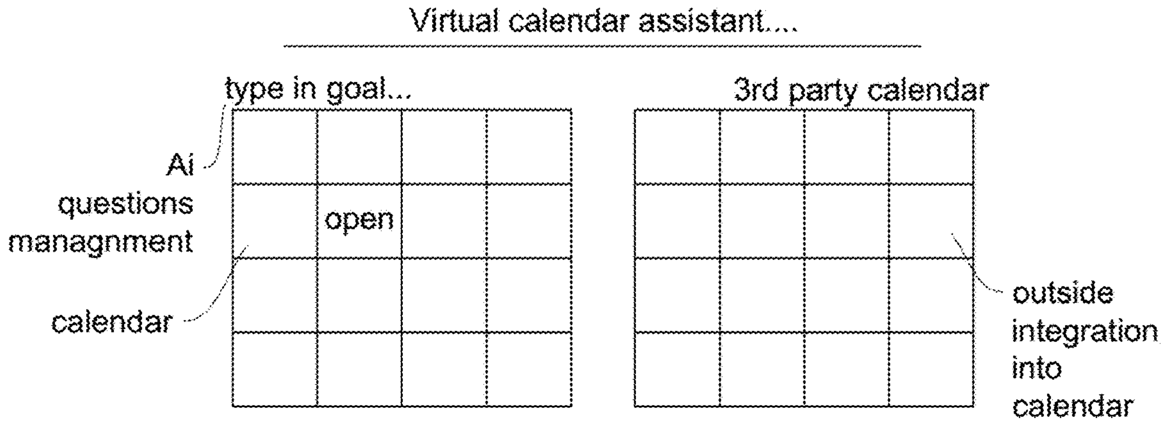

FIG. 217: virtual calendar/assistant: In some embodiments, which may include but not be limited to (e.g., an assistant, a virtual calendar assistant, virtual AI robot, virtual assistant, worker, online worker, online robotic worker, etc.) may be accepting and processing data, which may include but not be limited to, which may include but not be limited to (e.g., taking in intersections and providing solutions, taking in information and giving information back, taking instructions and doing things such as booking or changing something based on the instructions, doing things within the platform, doing things outside of the platform such as a 3rd party, taken as commands or taken as questions or giving out information or performing tasks, etc.) In some embodiments, tasks or things the assistant may be done, which may include but not be limited to (e.g., integrate 3rd party calendars, change bookings, block users, respond to messages, create messages, send content, negotiate business deals, state users requirements, state users non-negotiable, state the law, state or regurgitate rules or regulations, report a suspicious person, report a conflict, assess data and give solutions, etc.) In some embodiments, which may include but not be limited to (e.g., an assistant, a virtual calendar assistant, a virtual AI robot, virtual assistant, worker, online worker, online robotic worker, etc.) may be provided, may include but not be limited to (e.g., after payment, may be made to be paid for, may be added or available after payment is made, etc.) In some embodiments, AI questions, AI management, AI calendars, booking calendars, or dates through AI. In some embodiments, a virtual calendar assistant may be able to book dates for you, answer questions about other users' integrated or platform-related calendars, book calendar dates for you, or do anything at a voice command, etc.) in some embodiments, search history, activities, activities, payment amount, payment history, net worth, popularity, may be reason in which an AI or the platform may suggest users or models or dates or types of dates or show items that a girl would want to be bought etc.)

Figure 218:
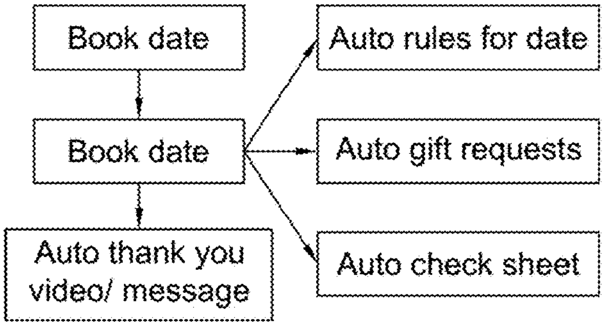
Figure 219:
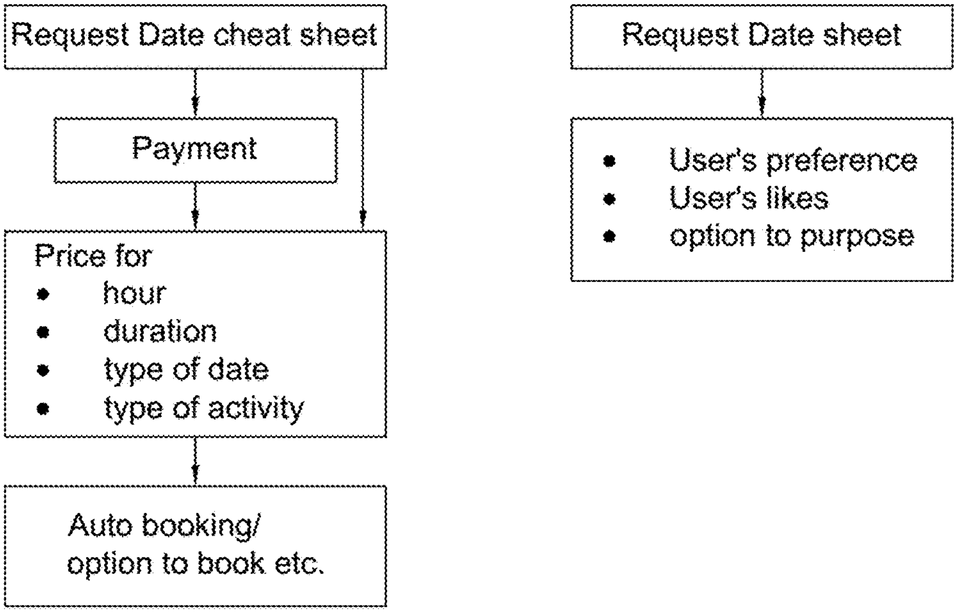

FIG. 218, FIG. 219: In some embodiments, the process may be, which may include but not be limited to (e.g., payment, book date, book meeting, secure date) to, which may include but not be limited to (e.g., payment, book date, book meeting, secure date) to, which may include but not be limited to (e.g., automatic thank you video, automated thank you for a message, automatic message, auto cheat sheet, automatic gift requests, automatic accommodations request, automatic rules for a date, automatic platform rules for date, an automatic gesture such as a thank you, etc.) In some embodiments, there may be a manual or secondary or other or outside request for, which may include but not be limited to (a date cheat sheet, accommodations request, rules request, prices, price ranges, general pricing, general transmittables, types of activities, types of payments, types of dates, etc.) in which (payment, exchangeable, etc.) may be, which may include but not be limited to (e.g., requested, automatic requested, required, demanded, expected, suggested, etc.) before the sending of requested items. In some embodiments, which may include but not be limited to (e.g., before, after, during, etc.) any request for, which may include but not be limited to (e.g., suggestions, information, inquiries, etc.) automatic booking may be, which may include but not be limited to (e.g., required, requested, suggested, automatic, options to secure the automatic booking, options to auto book, schedule, inquire about, inquire about, inquire regarding, secure, create connection to, hold, pay for, create business relationship with, use transmittables to secure or book, schedule, inquire about, etc.) options to book, schedule, inquire about, inquire about, inquire regarding, secure, create connection to, hold, pay for, create business relationship with, use transmittables to secure or book, schedule, inquire about, etc.)

Figure 220:
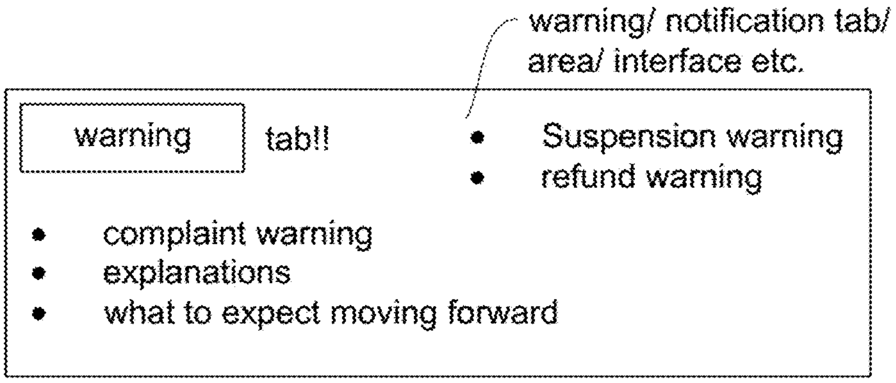

FIG. 220: In some embodiments, which may include but not be limited to (e.g., warning tabs, warning suggestions, notifications, notifications from the platform, important notifications or messages, etc.) may be on an, which may include but not be limited to (e.g., app, user interface, show up on any form of a user interface, show anywhere, etc.) In some embodiments, notification tabs may be, which may include but not be limited to (e.g., helpful, positive, warning, notifying someone, giving suggestions, events, etc.) In some embodiments, users may be able to request (e.g., cheat sheets or date cheat sheets or types of date activity on how to act or what to wear or booking or duration or type of activities, etc.)

Figure 221:
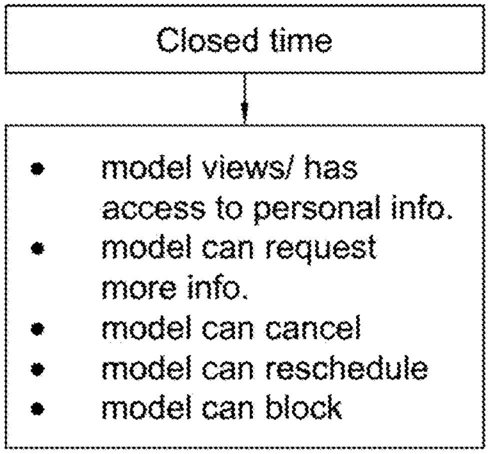

FIG. 221: In some embodiments, once a, which may include but not be limited to (e.g., closed time, secured date, suggested time, inquiry about time, viewed profile, the message is sent, booked date, etc.) occurs model may have access to, which may include but not be limited to (e.g., personal information, public information, basic information, all of information, background information, etc.) about a, which may include but not be limited to (e.g., customer, user, person, etc.) In some embodiments, the model may be able to which may include but not be limited to (e.g., close date, refund date, request change of date, may update date, update person, write notes, reschedule, block person, block Network address, IP address, block user, change details of date for approval, send a message, inquire, ask for information, etc.)

Figure 222:
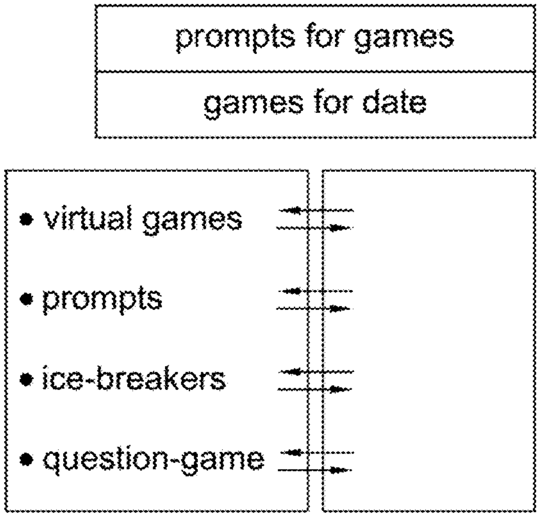

FIG. 222: In some embodiments, virtual or in-person games may be played via, which may include but not be limited to (e.g., platform, 3rd party integrations, 3rd party, etc). In some embodiments, virtual or in-person games may be played such as, which may include but not limited to (e.g., virtual games, interactive games, ice-breaker games, prompt games, prompts to answer, question games, skill-required games, elementary-style games, watching something together, streaming, etc.) In some embodiments, users or models or anyone may be able to (e.g., schedule or pay for, etc.) (e.g., streaming to occur or payments to disperse, or multiple streaming sessions to happen, or food deliveries to happen at any time with payment, or flowers being sent to someone for payment, or virtual gifts for payment, or live streaming with payment etc.)

Figure 223:
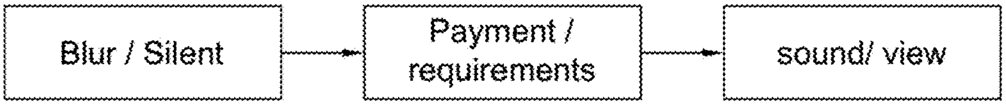
Figure 224:
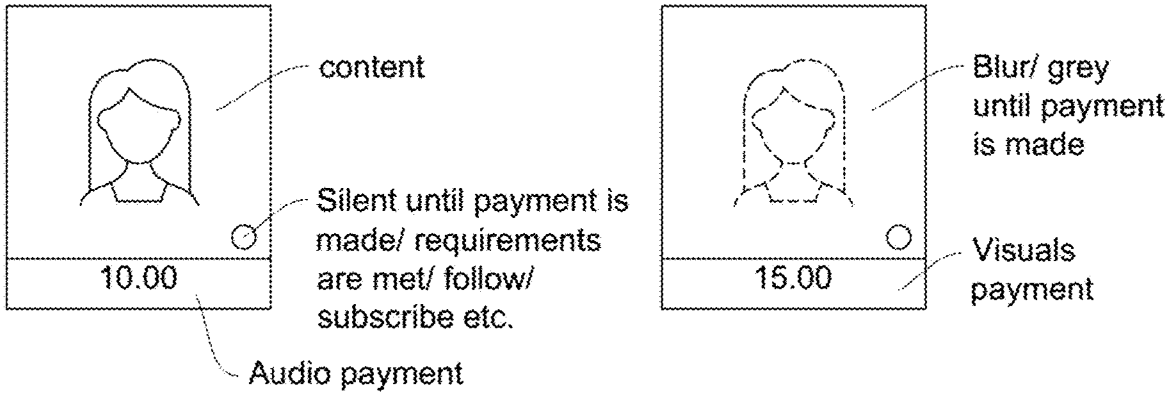
Figure 225:
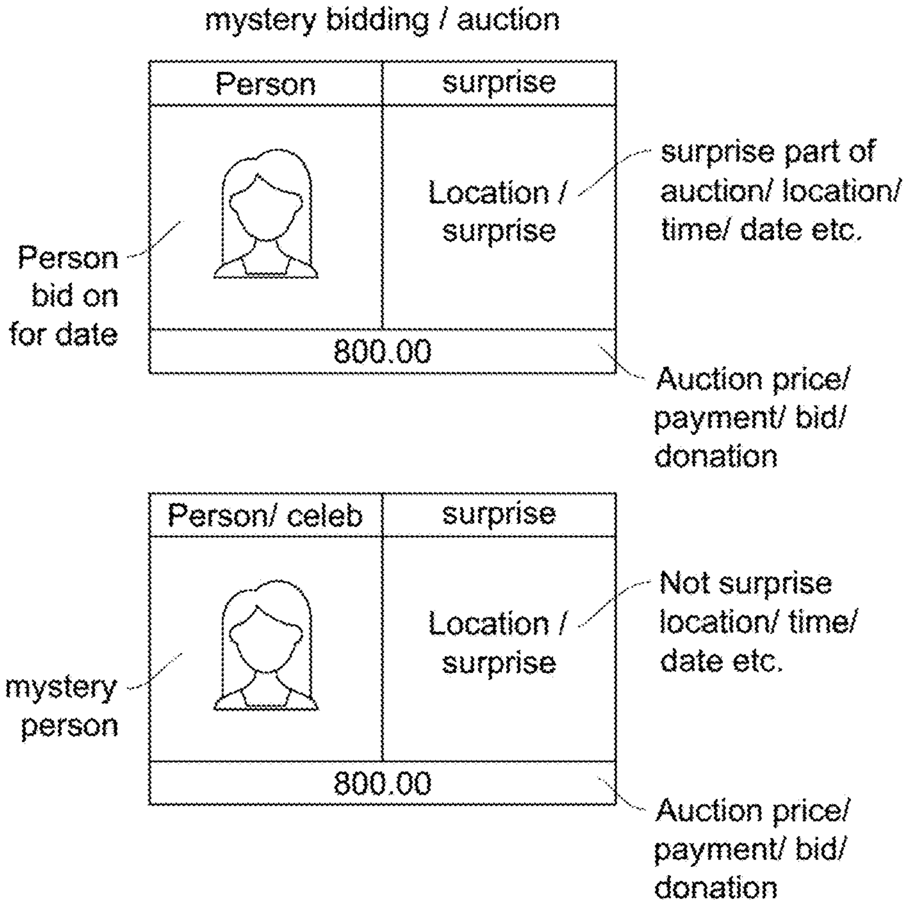
Figure 226:
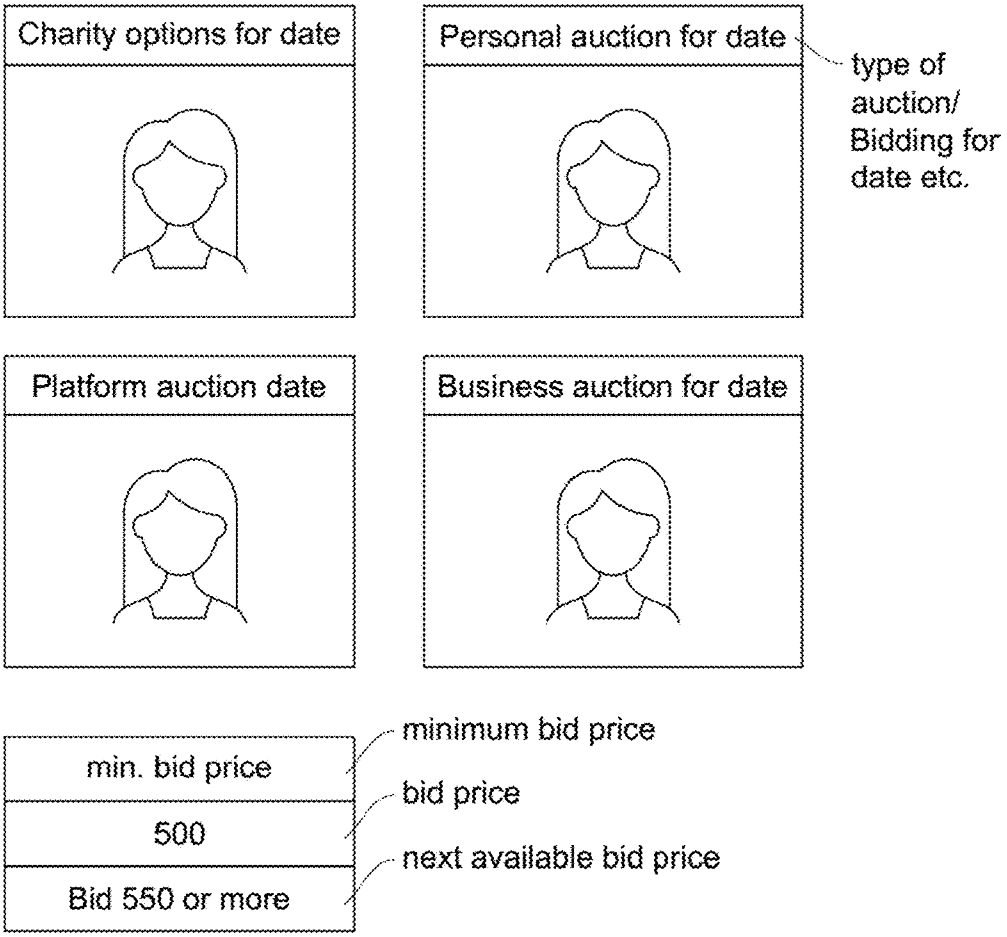
Figure 227:
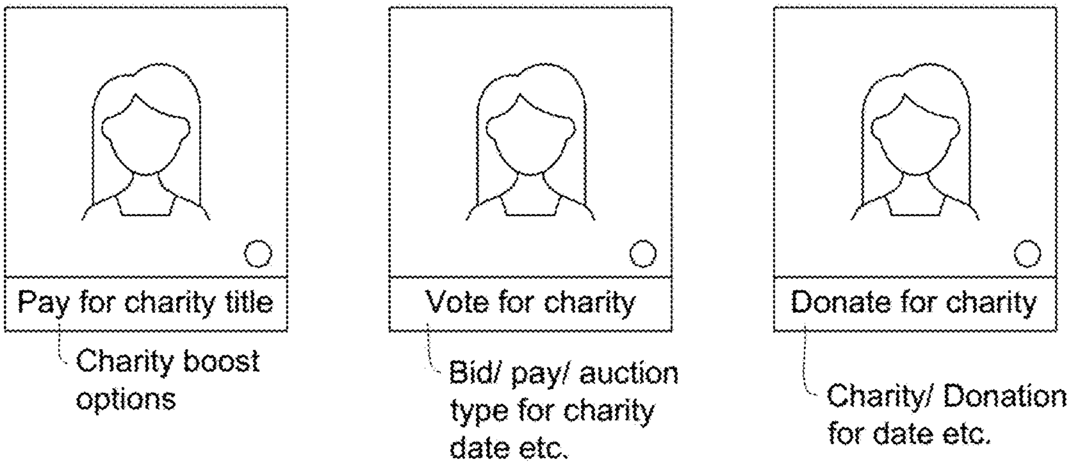
Figure 228:
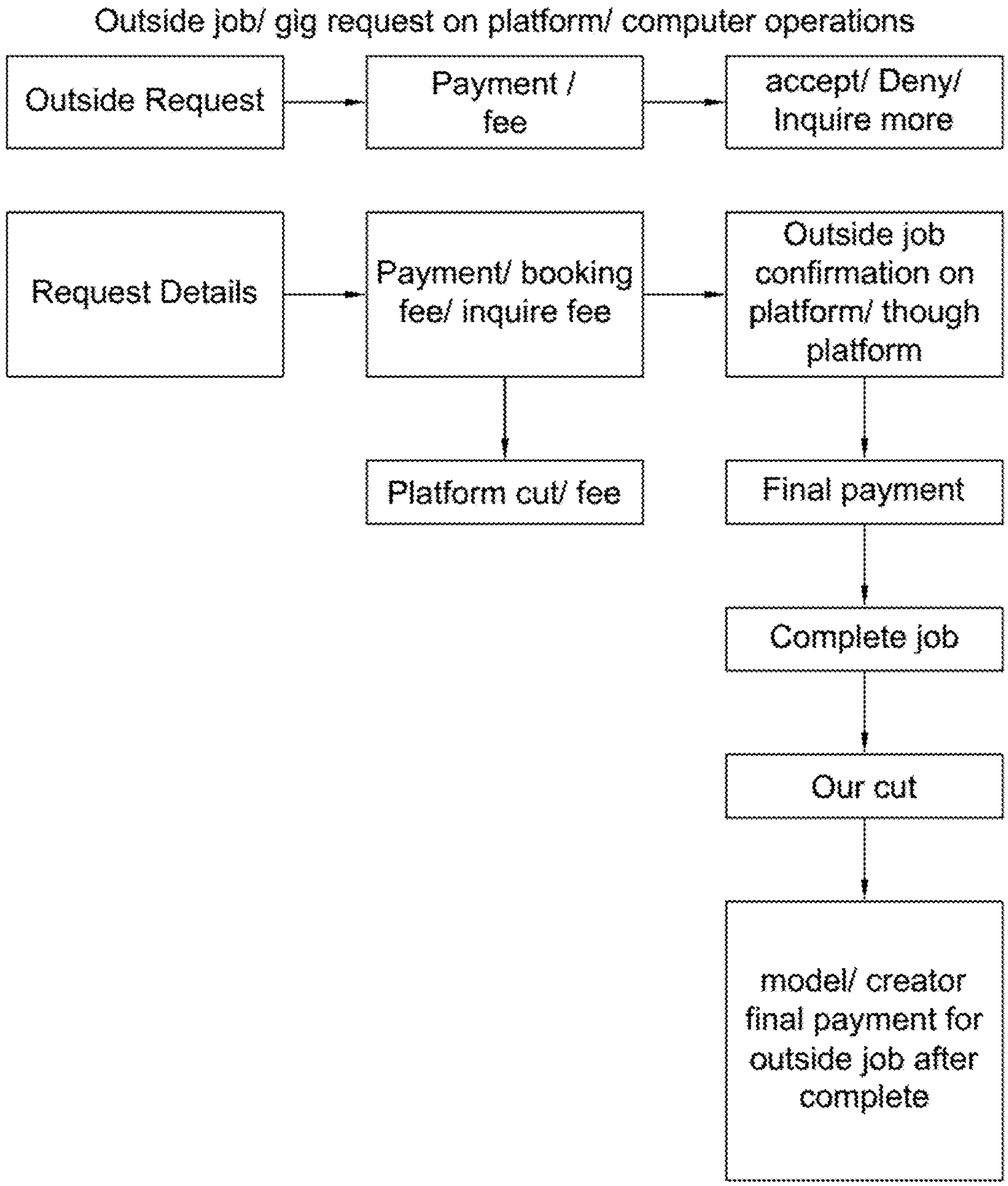
Figure 229:
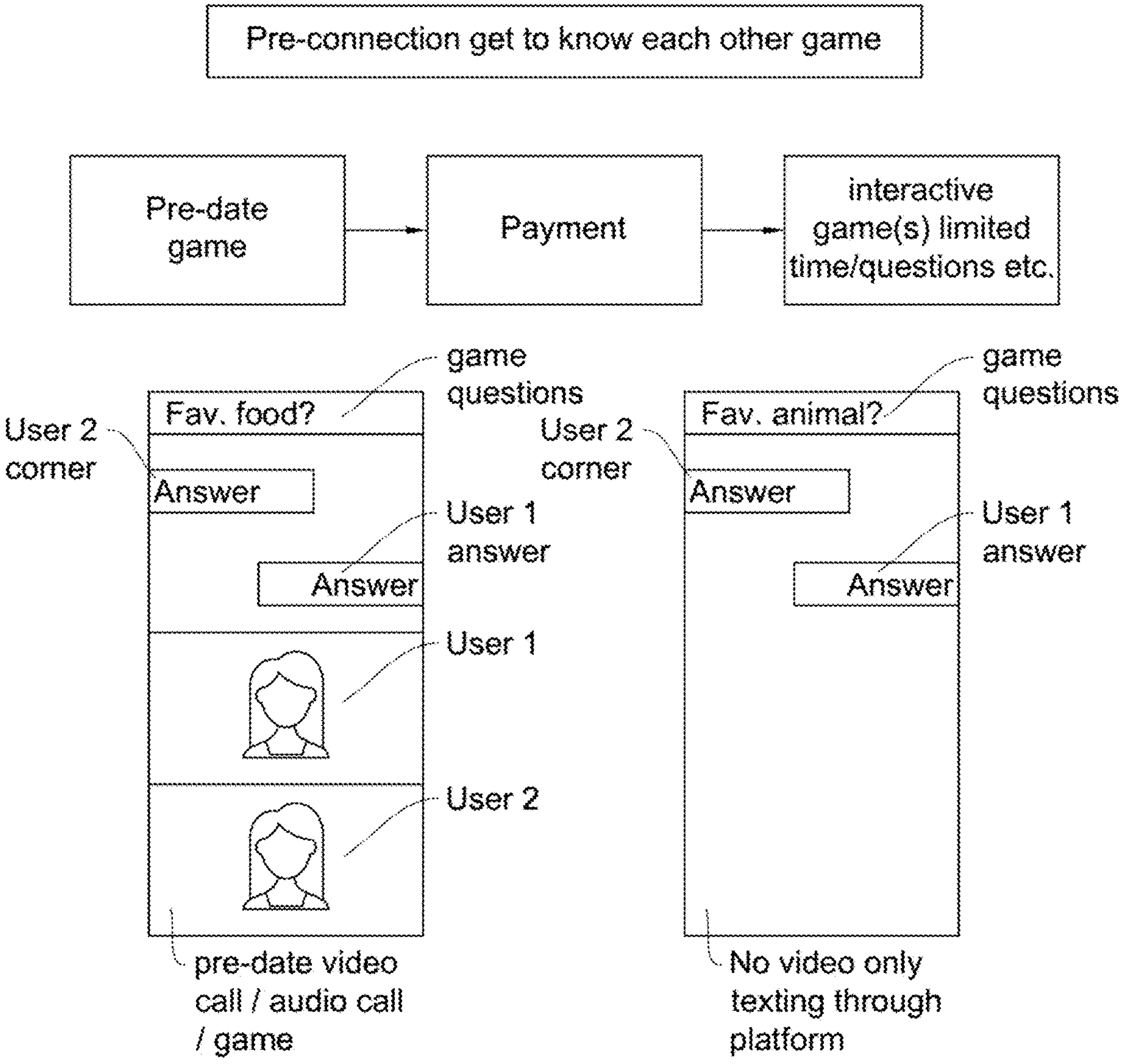
Figure 230:
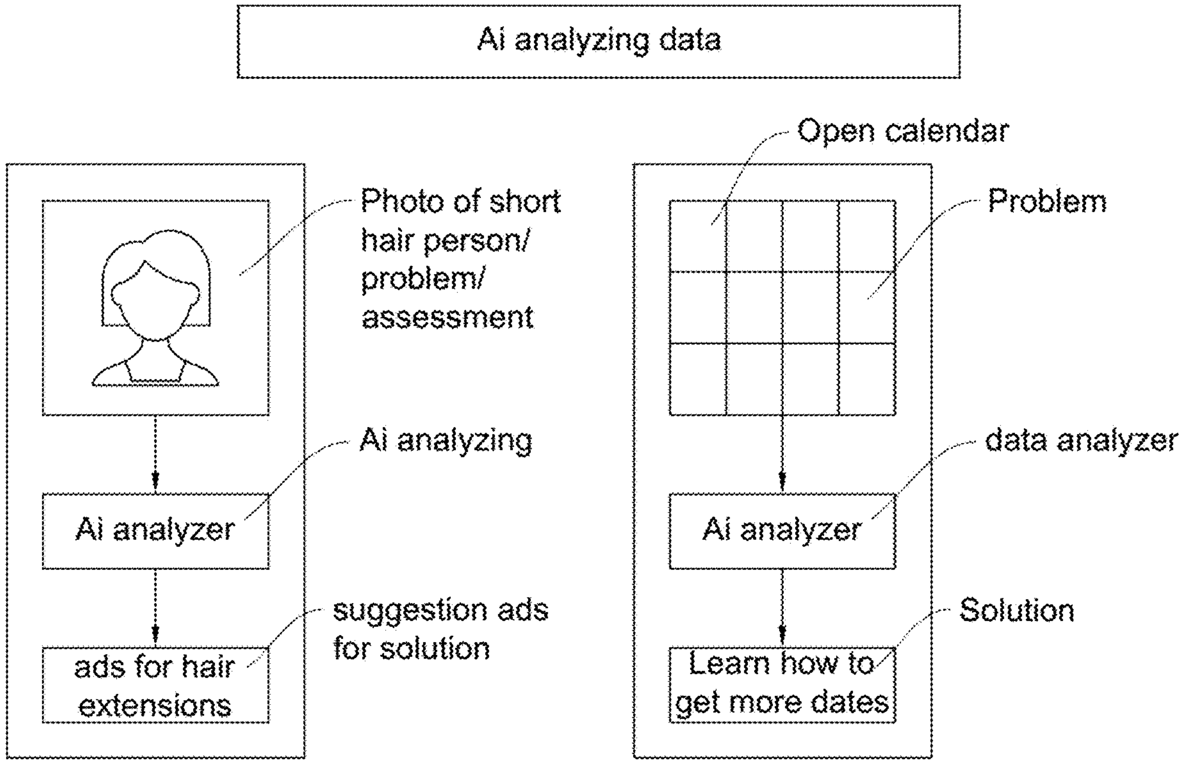
Figure 231:
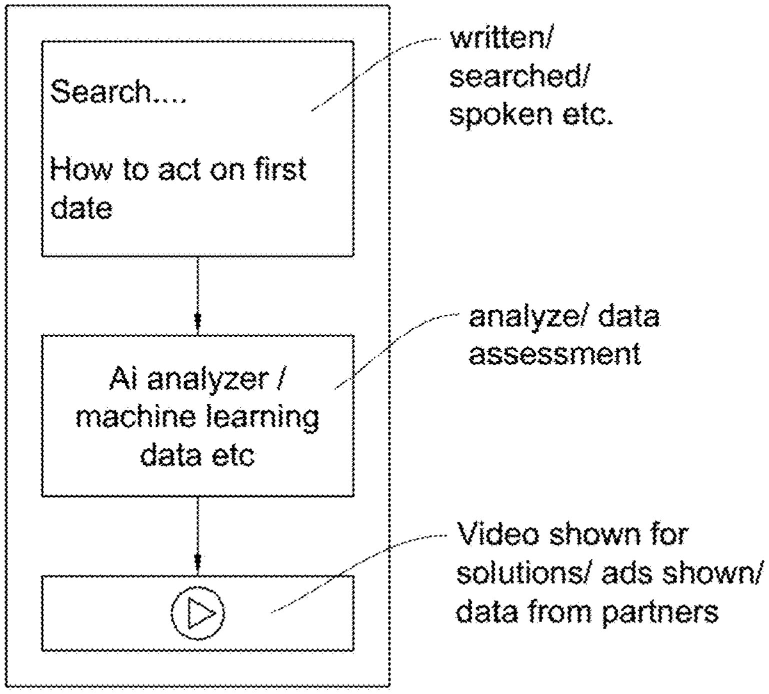

FIG. 223, FIG. 224, FIG. 225: In some embodiments, content may be, which may include but not be limited to (e.g., blurred, half-shown, partial-shown, silent, blurry, shown only part, not working properly, error message, payment notification messages, watermark, content may be fuzzy, not shown, greyed, appear fuzzy, not appear total, viewing may be obstructed, watermark over, sound watermark on sound, watermark appearing, only a few seconds shown, only some shown then stopped, stopped content, etc.) until, which may include but not be limited to (e.g., payment is made, requirements are met, follow has been made, membership has been established, gifts have been sent, gifting has been sent, payments have been sent, following, subscribing, subscriber has been created, profile has been created, payment to platform has come, payment has been made to user, exchangeable between user has been established, assets have been sent, etc.) In some embodiments, which may include but not be limited to (e.g., paying, crediting, volunteering, tribulation, tributing, helping, assisting, tributing, bidding/auction, gifting, securing, auctioning, for charity, for 3rd party, for entity etc.) may be in any, which may include but not be limited to (e.g., combination of, any form of, any mix of etc.) which may include but not be limited to (e.g., mystery location, surprise location, mystery person, celebrity, famous person, creator, influencer, student, college student, model, executive, business-person, CEO, founders, technology entrepreneurs, any type of entrepreneurs, founders, marketing persons, marketers, self-help persons, authors, dancing persons, artists, artistic persons, personalities, musicians, instrumental players, singers, dancers, categorized persons, famous or other 3rd parties, advertisers, advertisements, businesses, businesses, entities, revealed later person, hints on person, no knowledge of person, mystery location, mystery price, mystery date, mystery time, mystery price, mystery activity etc.) which may be, which may include but not be limited to (e.g., added to, combined with, in combination of, which may include but not be limited to (e.g., price that is shown, location that is shown, date that is shown, person's photo shown, person's voice heard, person known, person's content, person's work, person's artistry, 3rd parties content, 3rd party's artistry, activity that is shown, etc.) In some embodiments (e.g., auctionable dates, auctions, mystery dates or mystery date locations, or mystery persons, or mystery types of dates, etc.) may be implemented for any reason such as (e.g., 'charity events' 'charitable events' 'auctions' 'art or people auctions for dates' 'date options for dates' 'charitable and auctions for dating' 'dating a model auction' 'dating a famous cook or chef 'dating a politician' 'for profit dating' 'for profit raising money' 'to raise money' to fund' to get funding for a business 'dating a senator' 'dating a lawyer,' auction or charity event or for-profit event, etc.) In some embodiments, (e.g., auctions, charitable events, fundraising, for-profit raising, etc.), may be conducted through (e.g., platform, integrated platform software, 3rd party, integrated 3rd party, partner software or sites or platform, etc.)

In some embodiments (e.g., virtual dates or in-person dates or meetings, or connections or integrations of two parties, communication or messages, payments, or communication, or entertainment services, or entertainment, dating, connection, relationship, communication, streaming, or performed services, or work around the house, or services, or modeling, etc.) may be (e.g., created or shown or displayed or integrated or shown or performed, or agreement may be met, a contract may be met by, etc.) by the usage of or using (e.g., virtual goggles or VR or virtual reality or a green screen, studio, studio entertainment, photography, AI usage, AI, a body double, a fake double, another person, a user that looks similar, clone, hologram, dream, virtual reality, virtual, through another reality system, through social media, a user or model or person that could pass as a person, or a non-real method or a virtual method such as a hologram, etc.)

FIG. 226, FIG. 227, FIG. 228, FIG. 229, FIG. 230, FIG. 231: In some embodiments, there may be different types of auctions or bidding/auction for dates or connections, which may include but not be limited to (e.g., charity options for date, personal auctions for a date, group-created auctions for a date, platform auction for a date, business auctions for date, 3rd party auctions for date, 3rd party charities for a date, voting for charity, donating for charity, paying for charity titles, etc.) In some embodiments, there may be, which may include but not be limited to (e.g., minimum, minimum bid, minimum auction, starting price, bid, auction, reserve price(s), any price, any exchangeable, any gift, etc.) for any, which may include but not be limited to (e.g., connection, bidding/auction, date, auction, etc.) In some embodiments, there may be, which may include but not be limited to (e.g., outside, 3rd party, 3rd party integrations, outside person, person, user, entity, etc.) that may request a, which may include but not be limited to (e.g., gig request, job request, job inquiry, event offers, gig payment, partnership, etc.) which may require a, which may include but not be limited to (e.g., requirements, requirement, price, fee, exchangeable, partial payment for, booking payment for, etc.) In some embodiments, payments may be for, which may include but not be limited to (e.g., initial inquiry, gig request, job request, job inquiry, event offers, gig payment, partnership, etc.), which may also, which may include but not be limited to (e.g., another payment, another exchange, an additional payment, etc.) for the, which may include but not be limited to (e.g., actual gig payment, payment for a gig, compensation for time, pay for actual job or gig, etc.) In some embodiments, outside jobs may be, which may include but not be limited to (e.g., complete, confirmed, finished, etc.), which may include but not be limited to (e.g., through the platform, through 3rd party, or another person, etc.) In some embodiments, payments may be made through, including but not limited to (e.g., platform, 3rd party, entities, etc.) In some embodiments, a may consist of but not be limited to (e.g., full, partial payment, more payment, partial amount of payment, etc.) may go to the platform. In some embodiments, pre-, which may include but not be limited to (connection, date, etc.) may include but not be limited to (e.g., game, questionnaire, question prompt, prompts, answering prompts, etc.), which may be done through, which may include but not be limited to (e.g., virtual answering, AI answering, AI promote, AI responses, virtual and in-person, in-person, virtual only, texting, messaging, with human inputs, robotic only inputs, robot, and human inputs, etc.) In some embodiments, outside or integrated gigs or job bookings may be implemented or paid through or tracked by the platform or payment methods or payments or transactions for the booking or the payment or any itemized transactions or payments or gigs or received money, or exchange that is taxable tax deductible or tracked or for the bank or to be transferred into cash or assets, etc.) In some embodiments, the AI may be able to respond to questions or provide answers on such (e.g., user or businesses, entities, or model's behalf, etc.), for example, (e.g., 'what's your favorite food?' 'my favorite food is xyz, what's yours?' Tell me about the date, tell me about what you like to do, tell me about XYZ, how can I take you on a date?, how can we meet, how can we have a virtual date, what do I need to do? 'to take me on a date, you need to buy me XYZ from my list, here it is, then I will go out with you, etc.) In some embodiments, the integrated AI or the user plus the AI may be able to answer any questions, convince the user, talk to the user, or spend time with the user for payment or any exchangeable.

Artificial intelligence ads suggestions or artificial suggestions or feedback or computing system feedback or outputs or inputs or criticism: In some embodiments, data may be analyzed from, which may include but not be limited to (e.g., calendar, from input, from machine learning, from AI, that may be used to target persons based on their work schedule, their activities, etc.) data may be used to suggest or show or encourage, which may include but not be limited to (e.g., discounts, 3rd parties, advertisers, advertisements, businesses, 3rd party entities, payments, suggestions, some type of an ad on a specific date based on that person's driving, travel, route, schedule, work schedule, data schedule etc.) In some embodiments, data collected such as car, net worth, spending, credit cards, bid amount, paid amount, user frequency, ratings, etc.) to target ads, or to sell to a 3rd party, etc.) User data may be used to send to 3rd parties or internally for purposes of discounts or suggestions for hair, makeup, massages, discount places, purchases, home care, etc.) In some embodiments, AI may be used to analyze content of users to obtain information, which may include but not be limited to (e.g., a girl with short hair may get a suggestion, ad, discount, call, information from someone that may suggest getting hair extensions, a girl with short eyelashes may get suggestions to get lash extensions, a girl that wears red lipstick may get suggestions for red lipstick or other color lipsticks, if someone talks about plastic surgery such as breast implants she may get an ad for breast implants, how to get more dates, etc.) In some embodiments, which may include but not be limited to (e.g., artificial intelligence user, improvement suggestions, etc.) In some embodiments, which may include but not be limited to (e.g., artificial intelligence or machine learning or user input or auto input, or any type of robotic or artificial learning or intelligence, etc.) may suggest to users may include but not limited to (e.g., how to update their profile, getting hair done, hair extensions, makeup suggestions, what type of photos they need to post in order to get more dates, how to dress, what to wear, what to eat, how to have proper manners, how to be nice, getting therapy, getting plastic surgery, getting lip injections, skincare suggestions, skincare trending, etc.) In some embodiments, (e.g., AI or an AI-trained model or a matchmaker, or a robot, or a computing system, etc.) may be able to identify or determine a man's behavior on a date and tell him or warn him or give him suggestions such as (e.g., how to act, what to do, what to say, how to speak, what not to say, what to say, how to have manners, etc.) In some embodiments, the (e.g., AI or computing system or human or integrated human and computing system or robot and human or integrated human and or robot, etc.) may be able to analyze and compute information based on user's (e.g., in-person or virtual or thoughts or interactions, behavior virtually or in person on a date or during a meeting, etc.) and give constructive feedback or criticism, the criticism level may be able to be set by (e.g., the user or platform or standard or each trained model's output or input etc.)

Figure 232:
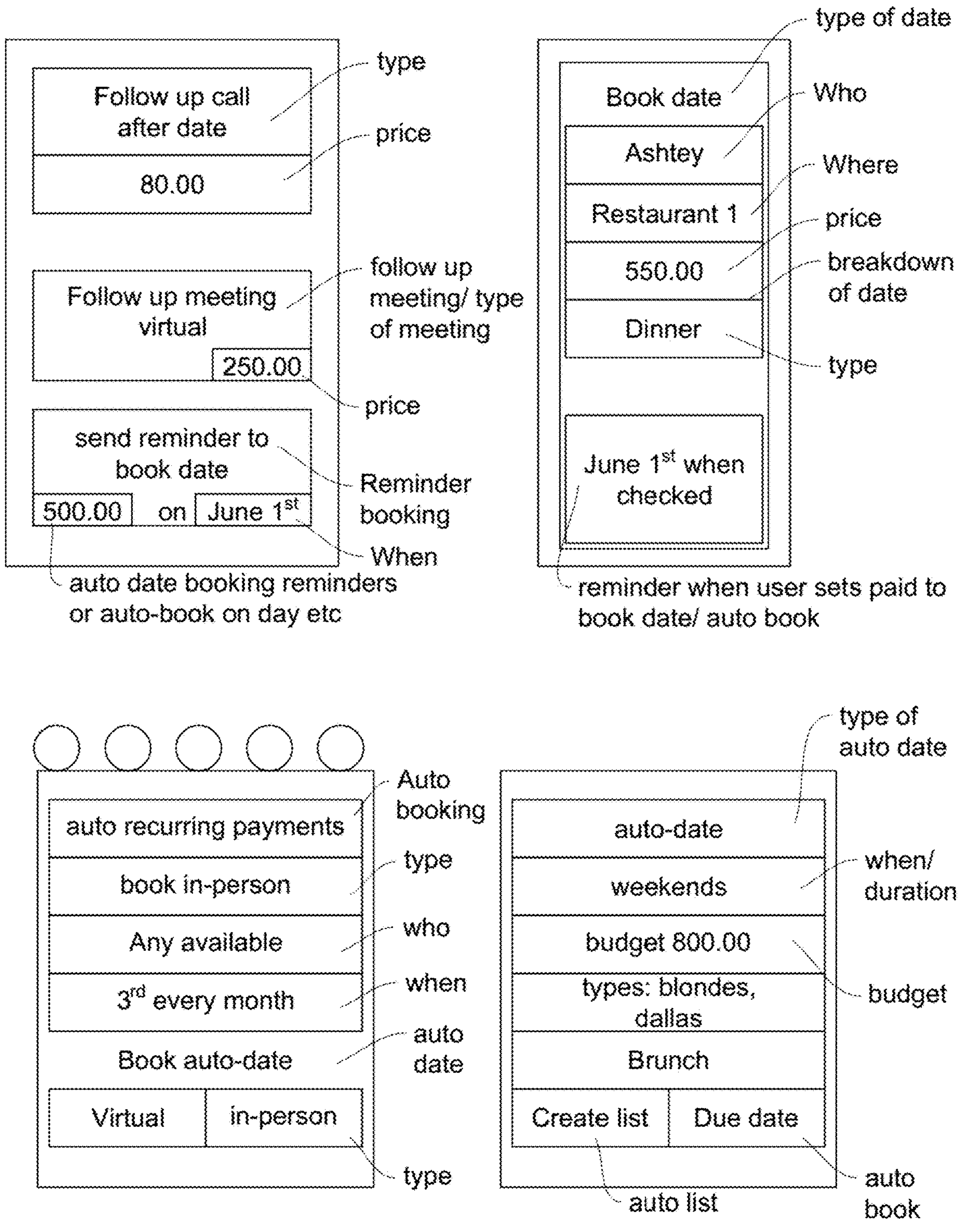
Figure 233:
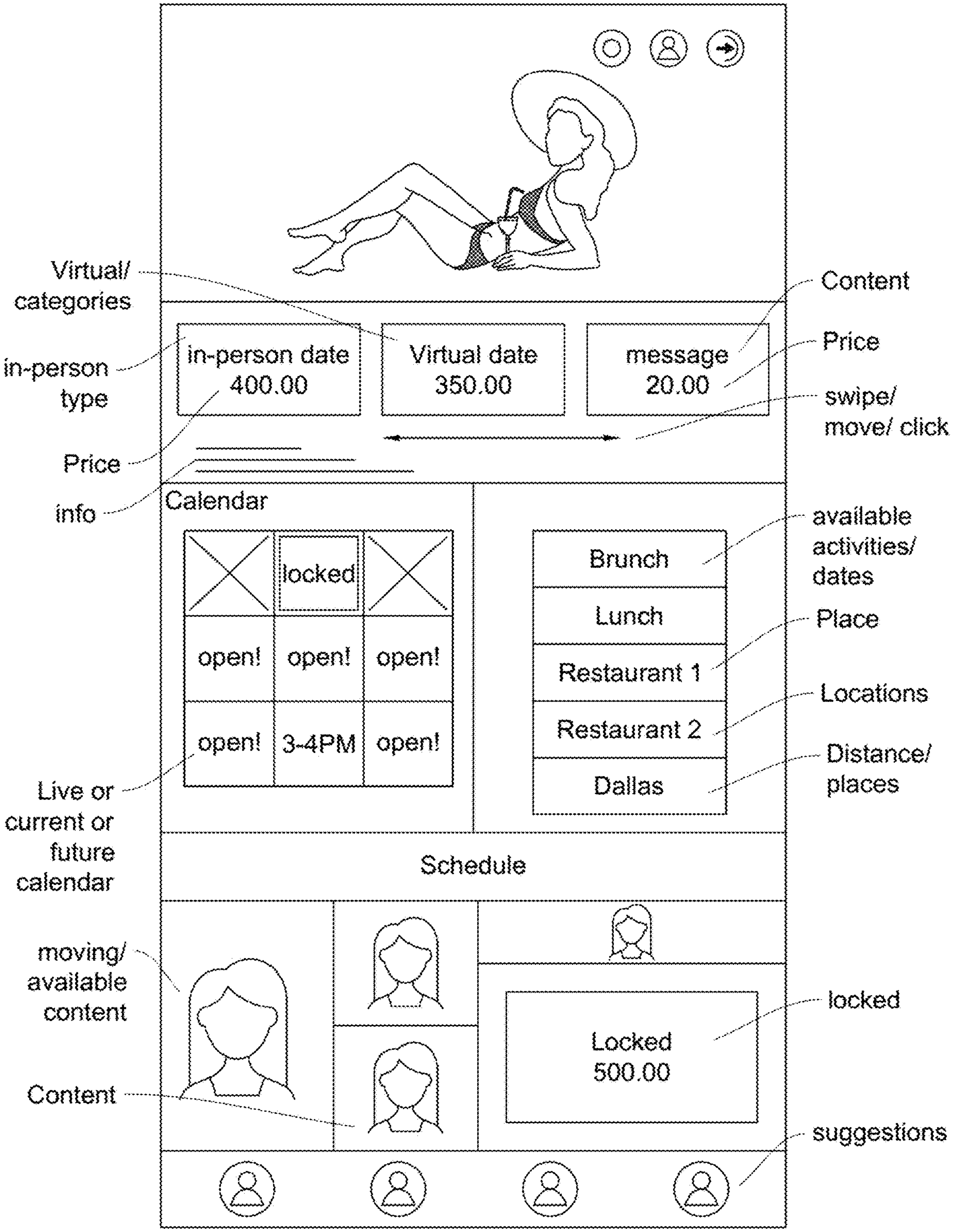
Figure 234:
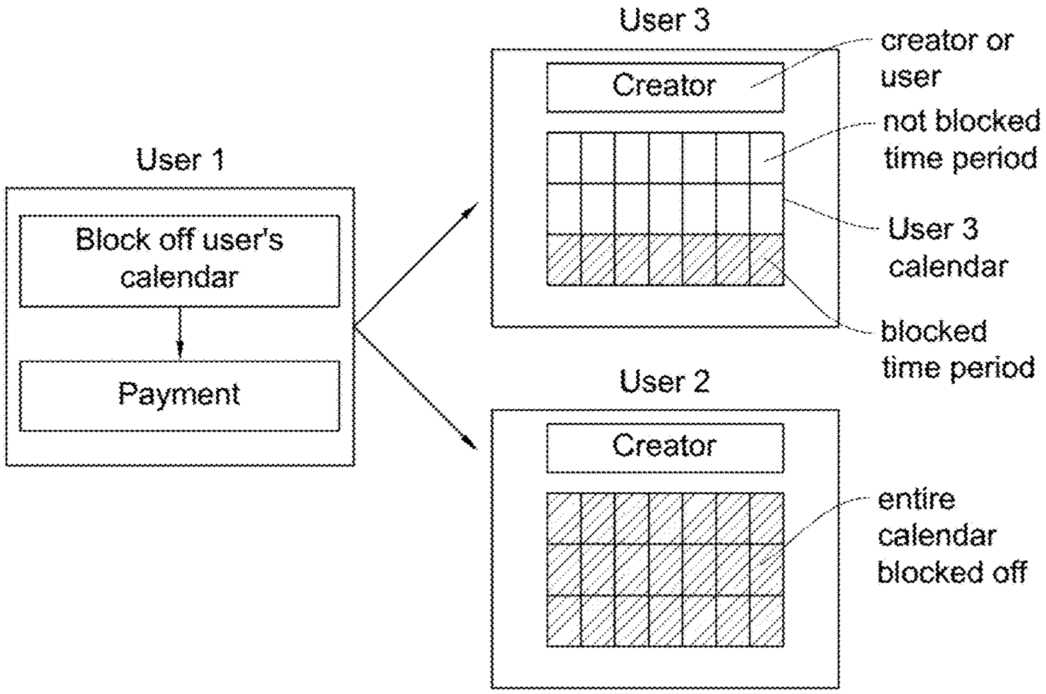
Figure 235:
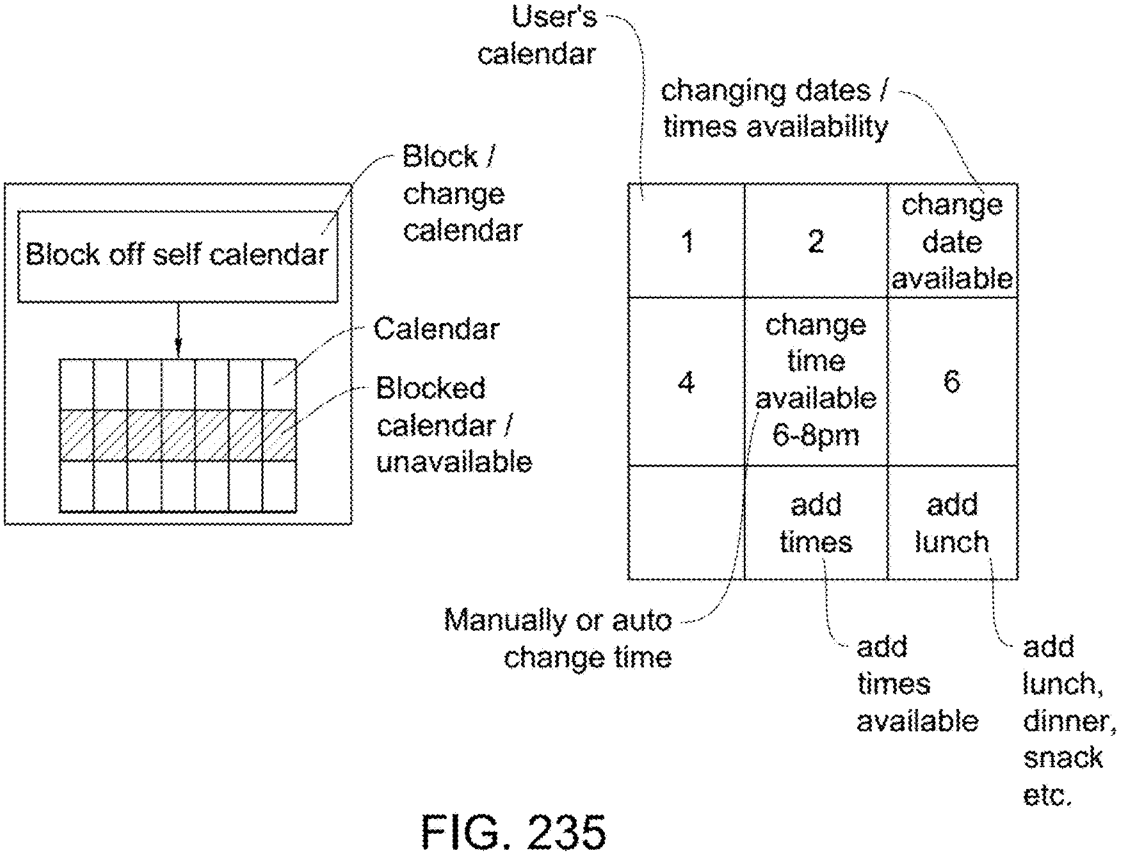
Figure 236:
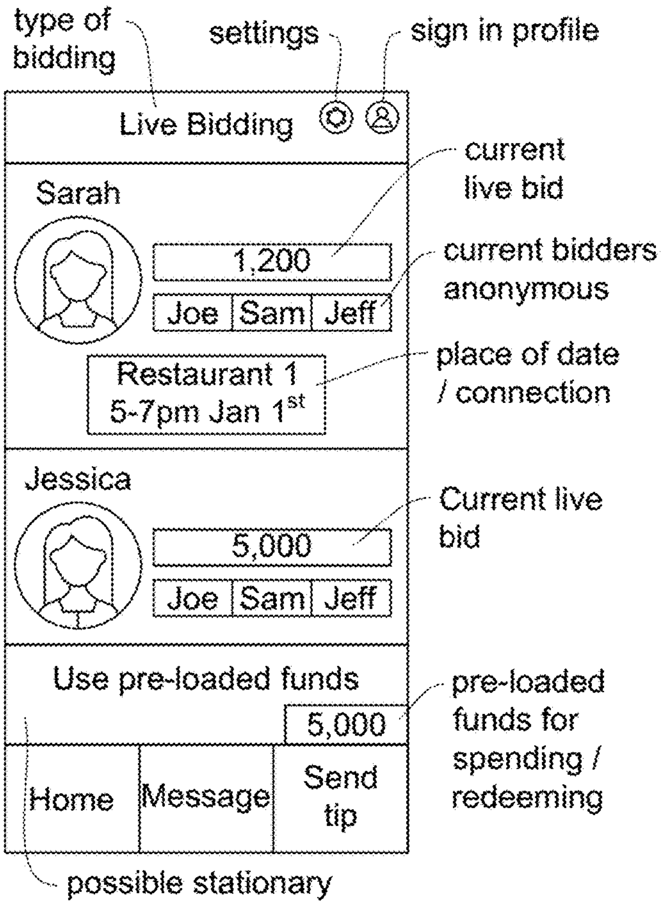
Figure 237:
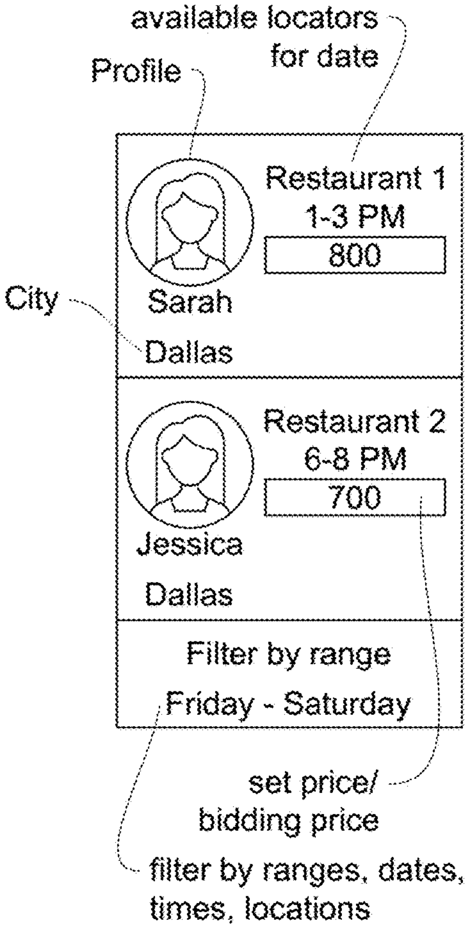

FIG. 232, FIG. 233: In some embodiments, there may be automatic reminders or automatic booking, which may include but not be limited to (e.g., subscriptions, payments, in-person dates, virtual dates, calls, subscriptions, etc.) to: (e.g., auto book, schedule, inquire about, inquire about, inquire regarding, secure, create connection to, hold, pay for, create business relationship with, use transmittables to secure or book, schedule, send gifts, send transmittables, watch live, watch show, watch shows together, live streaming of shows they are watching, live stream of their life, videos of their life, locked or unlocked schedule, open availability for dates, schedule for dating, restaurants user likes, preferences when dating, send message, contact, inquire about, etc.) dates, connections, payment, auto book, schedule, inquire about, inquire about, inquire regarding, secure, create connection to, hold, pay for, create business relationship with, use transmittables to secure or book, schedule, inquire about, etc.) auto pay for a, which may include but not be limited to (e.g., specific time period or a one-time payment, or a one-time event, or a recurring event etc.) which may include but not be limited to (e.g., getting paid, installments payments, jewelry payment may have had been made, 3rd party funds are available, uploaded funds are available, any funds are available, time of month, duration, check-in, check-out, time stamp, time record, time and data record, location, time and data record, coordinate(s), of month, when account is available, when funds are available, when stocks have been sold, auto payments have been made, etc.) In some embodiments, users may be able to 'auto-date,' which may include but not be limited to (e.g., take into consideration funds available, collect and act upon AI-created knowledge, 'book auto-dates' for a user, create automatic dates, create and manage automatic dating for users, create and manage automatic funds, payment, dates, management of the date or connection, create automatic connections, create auto-booking connections, create automated messages, create auto payments for any payment which may include not be limited to tipping, monthly payments of users, monthly or any type of subscriptions, any type of payment, any type of connection etc.) In some embodiments, 'auto-dating' may include but not be limited to (e.g., creating an automatic list, using budget or created budget to book, schedule, inquire about, inquire about, inquire regarding, secure, create connection to, hold, pay for, create business relationship with, use transmittables to secure or book, schedule, inquire about, etc.) or manage dates, managing dates, managing connections, AI suggestions, AI booing, mashing learning connections, automatic booking, automatic car for booking, automatic ride to date, automatic login for date, automatic date reservations and confirmations and or payment, creating an automatic booking, automatically paying for dates or connections without seeing or reviewing user first, automatic non-refundable or refundable payments being made for 'connections, bookings, suggestions, dates, etc.) In some embodiments, automatic or manual (e.g., date reminders or following up or gifting or sending reminders rebooking a date, auto-dating, auto-rebooking dates, automatic booking dates based on prices or availability or distance, auto or manual dating or booking or sending information regarding someone's availability or calendar, pre-paying for a date, pre-paying the servers, or pre-arranging flower gifts may be available, etc.)

In some embodiments, the user interface may show, which may include but not be limited to (e.g., earnings, payouts, referrals, pending payments, pending requests, amounts earned, the amount earned, amount, fees, net payment, gross payment, statement, earnings, profile, statements, taxes, 3rd parties for taxes, 3rd parties, advertisers, advertisements, businesses, outside entities, outside parties, messages, queue, home, profile, messages, earnings from messages, etc.) In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.)

FIG. 234, FIG. 235, FIG. 236, FIG. 237: In some embodiments, any self-user may, which may include but is not limited to (e.g., change, block, move, modify, make unavailable, auto, manually change, change times, change dates, insert auto or manual data or information into self-calendar or any calendar of any other user, etc.) on any which may include but not limited to (e.g., calendar, any data, any section, any user interface, etc.) In some embodiments, a zoomed-in, larger, more precise, more prominent, or easier-to-see version of any (e.g., calendar, timing method, schedule method, scheduling method, timing data center, etc.) may be used or seen. In some embodiments, a (e.g., calendar, timing method, schedule method, scheduling method, timing data center, etc.) may have auto or manual, AI, or machine learning, or computing operation changes to calendars, or what is available to change or manually or automatically change on a calendar based on any factors which may include but not limited to (e.g., bookings, payments, auto-payments, recurring payments, recurring users, partnerships with 3rd parties, advertisers, advertisements, businesses, data assessments, availability of users, availability of 3rd parties, advertisers, promotions, companies, etc.). In some embodiments, the user interface may show, which may include but not be limited to (e.g., earnings, payouts, referrals, pending payments, pending requests, amounts earned, the amount earned, amount, fees, net payment, gross payment statement, earnings, profile, statements, taxes, 3rd parties for taxes, 3rd parties, advertisers, advertisements, businesses, outside entities, outside parties, messages, queue, home, profile, messages, earnings from messages, etc.) Some embodiments (e.g., users or persons or groups, etc.) may be able to (e.g., add times, change or manage calendars, manage schedules, manage options, change dates available, block of their calendar, make unavailable, etc.)

In some embodiments (e.g., membership, recurring, auto-payment, auto-suggestion options, have a person handling your dates or your management of your dates or your user interface, etc.) may be, which may include but not be limited to (e.g., paid for, credit to, gifted to, cost, need exchangeable, or assets for, etc.) In some embodiments, 'membership' may be done through, including but not limited to, the: (e.g., platform, 3rd party, 3rd party entities, person, outside persons, internal persons, platform, platforms partners, etc.) In some embodiments, membership may be, which may include but not be limited to (e.g., pre-paid, any form of pre-payment, any form of payment, any form of assets, be paid for, not be paid for, be suggested, given, surprised, gifted, platform-appointed, etc.) In some embodiments, membership may cover anything from, including but not limited to (e.g., automatic booking, human personalized booking, machine learning booking, 3rd party booking, outside given bookings, outside management, outside managed, etc.) In some embodiments, there may be, which may include but not limited to (e.g., available, shown, suggested, searchable, etc.), which may include but not limited to (e.g., bidding/auction options, given bidding/auction options, profile bidding/auction options, searchable auctions, searchable type of auction, searchable charity donations, searchable or shown versions of live bids, auctions, dates, person's profiles, etc.) In some embodiments, there may be options to, which may include but are not limited to (e.g., 'filter' or 'search' or 'view by location' or computing operation automatic location settings, or searching by 'looks, information, etc.) that may allow someone to see which may include but not limited to (e.g., 'available times, dates, locations, persons, etc.) to consider. Different ranges may be available in some embodiments, including but not limited to (e.g., Fridays, weekends, weekdays, or lunchtime, dinner time, looks, range, brunette, price, etc.)

Figure 238:
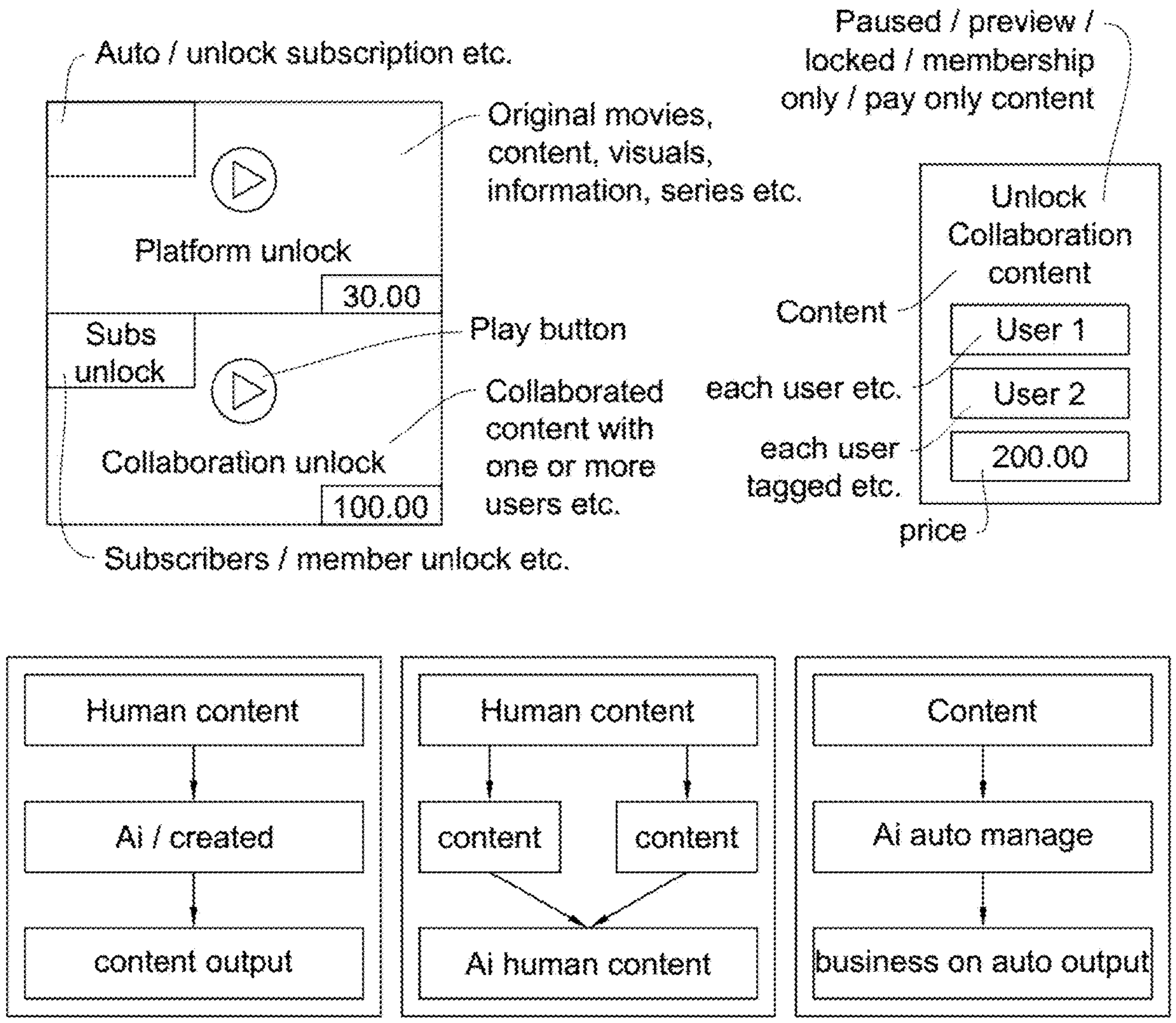
Figure 239:
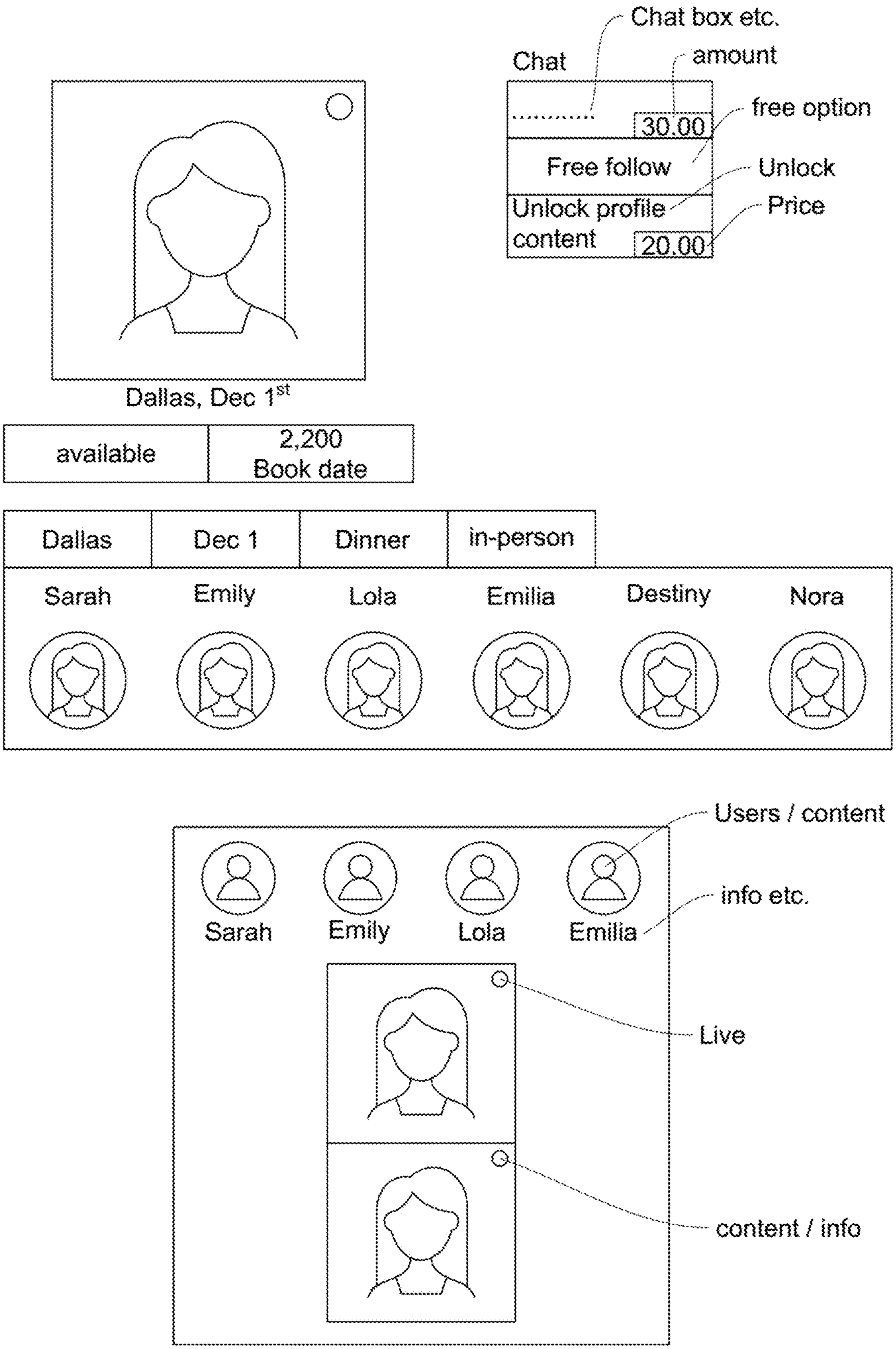

FIG. 238, FIG. 239: In some embodiments, user interfaces may show or give content created by which may include but not limited to (e.g., humans, AI, machine learning, content outputs, data outputs, human and AI combined content, human and AI combined data outputs, etc.) In some embodiments, business information, outputs on the platform, and outputs for the platform may be, which may include but are not limited to (e.g., created with, in collaboration with, artificial intelligence, completely programmed by a computer, machine learning by a robot or computer, machine-learned by AI, etc.) which may or may not be monitored or created by a, which may include but not limited to (e.g., business person, robot, computer, human, etc.) In some embodiments, there may be user interface(s) that have collaboration content such as which may include but not limited to (e.g., content, videos, information, users, viewings, calendars, visuals, etc.) which may also include but not be limited to (e.g., tagged, added, combined, one or more, those appearing in content, those appearing, those connected to, those in coloration with, etc.) which may also include but not be limited to (e.g., payments, paying options, pause, locked, membership only, pay only content, pay to view, etc.) In some embodiments, there may be, which may also include but not be limited to (e.g., original content, original series, movies, visuals, one or more, in collaboration with, made with, appearing with, one or more appearances, etc.) which may include but not be limited to (e.g., free, pay to view, pay to unlock, pay to see, membership only, membership, subscribers, followers, etc.) In some embodiments, which may include but not be limited to (e.g., content, data, human content, AI, etc.), content may be, which may include but not be limited to (e.g., inputted with, inputted, data collected plus, created with, collaboration with, etc.) which may also include but not be limited to (e.g., artificial intelligence collection, data combined content, or any machine learning or computing software or computing device or computer created combined with, or any, which may include but not be limited to (e.g., content, information, data output, etc.) In some embodiments, human content and AI content may be combined to create human content. In some embodiments, human content and AI content may be combined to create AI content. In some embodiments, human content and AI content may be combined to develop AI data output. In some embodiments, human content and AI content may be combined to create artificial intelligence output. In some embodiments, any, which may include but not be limited to (e.g., content, data, information, etc.), which may include but not be limited to (e.g., combined with, added to, created with, inserted into, data input and output, etc.) which may make, which may include but not be limited to (e.g., automatic data management, automatic data output, automated artificial intelligence created content, automatic business content for business, any seemingly human responses or human business management or creation, any output for business, etc.) In some embodiments (e.g., media, streams video or content, etc.) (e.g., made with or featuring, or tagged persons, or different people, or users, or multiple people or one person, etc.) may be (e.g., tagged, added, shown, listed, promoted, etc.) to show each (e.g., content or content, or any content or any media, or any promotions or any advertisements (such as featured with this magazine, featured with this product, featured with these people, shown in this television series, shown here on this advertisement platform, shown here, or normal or everyday person with other people featuring their videos or content or pictures or streaming), etc.) on their page or their profile or their memories or their content or their media or their socials and it may either be (e.g., members only, paid or free or exchangeable to view or subscriber or membership only view, or shown to specified users, or shown to anyone that wants to view or requests to view, for free or paid for promotions, etc.) In some embodiments, live users may be (e.g., shown or advertised or pushed or shown at the top or anywhere that they are live or live streaming or are local or are sorted by distance or at any location, etc.)

Figure 240:
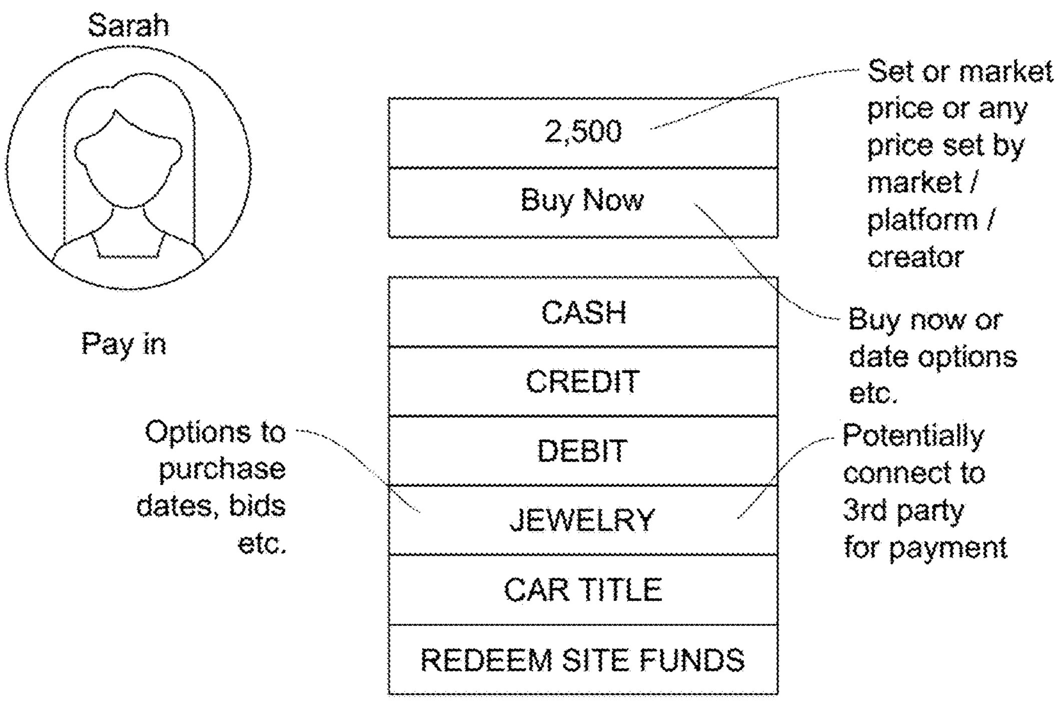

FIG. 240: In some embodiments, there may be an interface or a user interface with, which may include but not be limited to (e.g., introductory profile, intro video, intro content, profile photos, price, buy now, price plus buy-now, market price, platform market price, options to pay in cash, 3rd party links to debt sites, 3rd party sites to redeem value or cash platforms, debit, credit, jewelry, car title, site funds, pre-loaded funds, etc.) In some embodiments, there may be user interface, which may include but not be limited to (e.g., locked profile until requirements are met, live shows, live events, live plus content, live plus no content, live plus options to view more, played show, free show, previewed show, a live show, live options to view profile, live profile, live streaming, live streaming, pre-recorded streaming, pre-recorded shows, pre-made content, in-person date options, booking date options, profile date options, unlock content date options, price of date, price per hour, price for time, availability, price per activity, free follow, options to follow, options to view entire profile, unlock, previews, chat previews, content previews, content, photos, videos, communication, chat boxes, options or areas to share information, communication, options to send tips, suggested user profiles, computing operation chosen profiles, chats, emojis, send money, send tips, send hearts, unlock profile/content, unlock content, location availability, availability for booking, availability to book, schedule, inquire about, inquire about, inquire regarding, secure, create connection to, hold, pay for, create business relationship with, use transmittables to secure or book, schedule, inquire about, etc.) dates, availability to message, messages, prices, price ranges, general pricing, general transmittables, types, categories, a section at the Bottom, top, side, anywhere, with other suggestions or profiles, or persons, or promotional material or content or information etc.) In some embodiments, there may be options to: (e.g., move, scroll, switch, disappear, reappear, swipe etc.) any, which may include but not be limited to (e.g., user interfaces, content, items, parts of user interface etc.) In some embodiments, there may be a 'pay for a live-in person date payment method, pay for any form of virtual entertainment payment method, pay for customized entertainment, entertainment, requested entertainment, entertainment, videos/pictures, pay for requested entertainment, pay for custom entertainment, pay for a live-virtual date payment method, pay for a travel date payment method' in which any person in the public, public bidders, private bidders, registered bidders, subscribers, fans, people, may be pay at that moment, may be use funds from their account, may be use their credit card, may be use cash, may be use any form of crypto, may be use any form of an asset to pay for a date may include but not limited to the title of their vehicle, cash transfer payments, asset currency, gold, silver, diamonds, etc.)

In some embodiments, there may be a 3rd party or internal option to verify and cash out on the asset that is put up for the bid, which may be turned into cash to make payment; there may be a delay for this versus (e.g., cash, credit card, debit card, etc.)) In some embodiments, there may be a, which may include but not be limited to (e.g., live bidding/auction screen' or a 'live bidding/auction section' or a 'live bidding/auction room' or a 'live bidding/auction homepage' or there may be a 'check out now' or a 'buy now option for a date' etc.) In some embodiments, the page may show, which may include but not be limited to (e.g., live bids, live calendar, timing method data, timing data method, timing process data, of the person or multiple people, the user interface may show instructions, the user interface may show time, dates, locations, current locations, main locations, bidders or paying person's live location, etc.) In some embodiments, which may include but are not limited to, the: (e.g., buy date, bidding/auction date, subscriptions, unlocks, tips, payments, gifts, etc.) may be purchased using any form of assets which may include but are not limited to (e.g., cash, credit, debit, jewelry, car title, site funds, pre-paid funds, 401 k, stock options, stock equity, equity in a business, crypto, digital assets, real estate interest, real estate, etc.)

Figure 241:
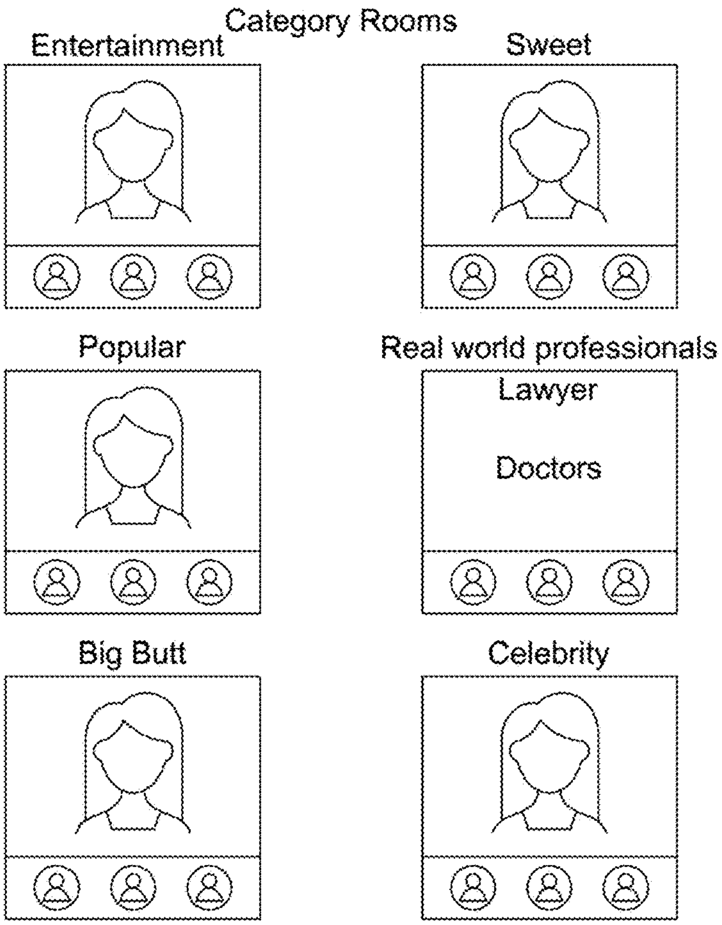

FIG. 241: In some embodiments, there may be (e.g., shown, hidden, displayed, search for, separate or together, etc.) (e.g., category rooms or tags or categorized persons or types or looks etc.) based on any user data, which may include but not be limited to (e.g., from the platform, self-tagged, self-introduced, self-managed, platform suggested, 3rd party suggested, voted on, suggested, chosen, etc.) In some embodiments, category rooms may be range from anything from, which may include but not be limited to (e.g., self-requested, self-managed, self-categorized, lawyers, entertainment services, entertainment, streaming, live streaming, doctors, customized entertainment, entertainment, requested entertainment, entertainment, sweet, caring, stay-at-home, wifey, wife, girlfriend, best friend, anime, celebrity, popular, famous, lovely, fun, online celebrity, online model, agency model, tall, short, medium, dancing, entertainment, fun, serious, just for fun, etc.)

Figure 242:
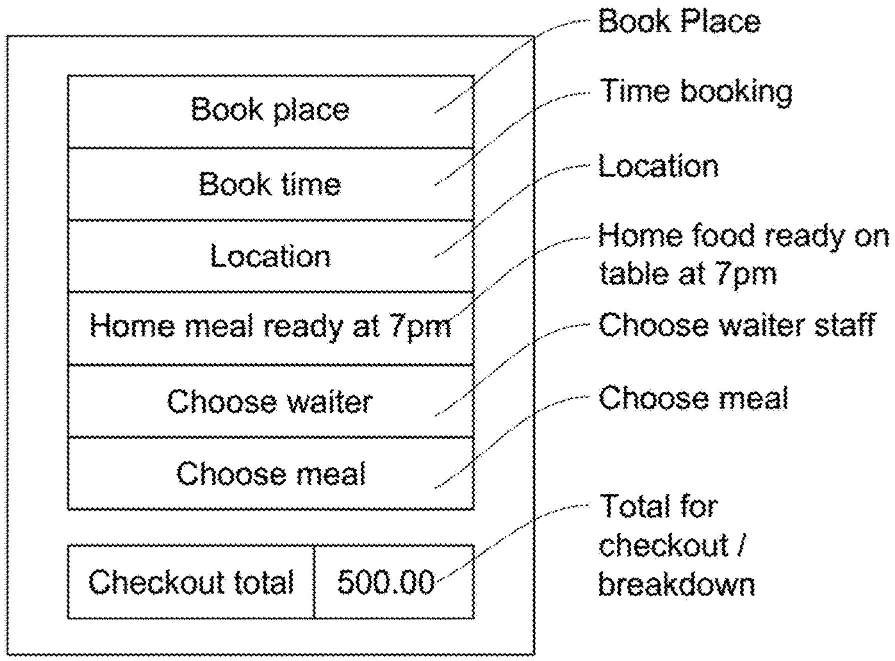
Figure 243:
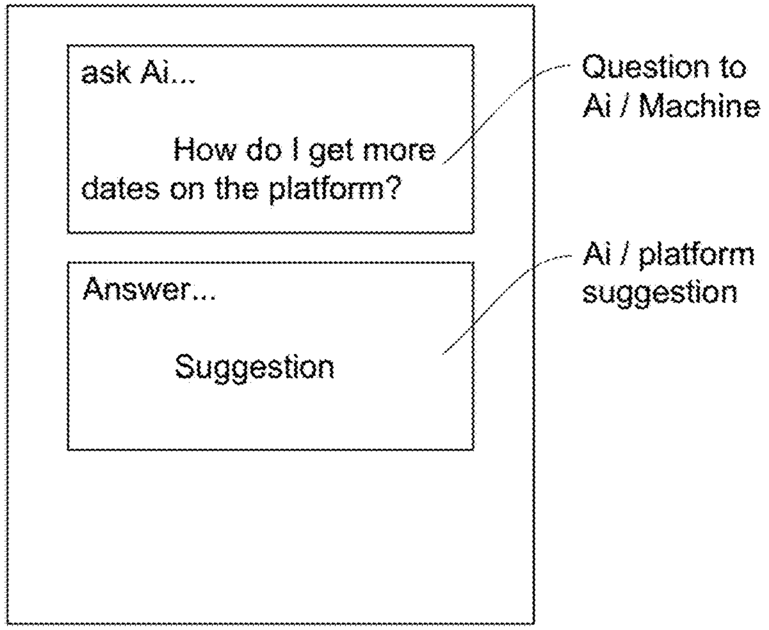

FIG. 242, FIG. 243: In some embodiments, which may include but not be limited to (e.g., location, staff, persons helping, assistant, meal, service, services, nannies, babysitter, total, etc.) may be chosen. In some embodiments, which may include but not be limited to (e.g., public, user, person, anyone, etc.), may choose including but not limited to (e.g., time, location, wait staff, workers, persons, staff members, categories, choose meal, choose price, choose discounts, choose valet information, choose valet, choose pickup time, get ride, get driving, travel, route, service, checkout total, view (e.g., breakdown, itemized, receipt, invoice, total, partial, breakdown, bill, summary of, total, etc.) etc.) In some embodiments, choosing meals, items, or activities may allow the food to be ready upon arrival, or have options to have food ready at a specific time, or have any activity prepared or pre-planned, pre-made, or shown at the exact time of arrival, etc.) In some embodiments (e.g., you may, user, person, entity, 3rd party, robot, artificial intelligence, etc.) may also choose your, which may include but is not limited to (e.g., section, your seat, your server, staff, your driver, dessert, gift cards, times, delivery, flower delivery, time, etc.) In some embodiments, which may include but not be limited to (e.g., human, robot, bot, 3rd party, entity, computer system, AI system, person, 3rd party, entity, AI, machine learning, etc.) may offer (e.g., solutions, information, output of data, etc.) which may include but not be limited to (e.g., users experience or related to the platform or related to higher payments, or more bookings, or more suggestions, or more dates, or more experiences, etc.) which may include but not be limited to (e.g., how do I tie a tie, how do I get more dates, how do I get a date, what should I wear? what does she like? etc.) In some embodiments, (e.g., the user or any person, etc.) can ask the (e.g., platform or the AI or the assistant or a trained model, etc.) questions or chat about a (e.g., user or about dating or manners or about that person based on any parameters such as 'public information, or private information, or information based on or found on contracts, info based on terms and conditions, info based on site rules, or any approved information or any information the robot or AI or computing system was trained to explain or express or outputs, etc.)

Figure 244:
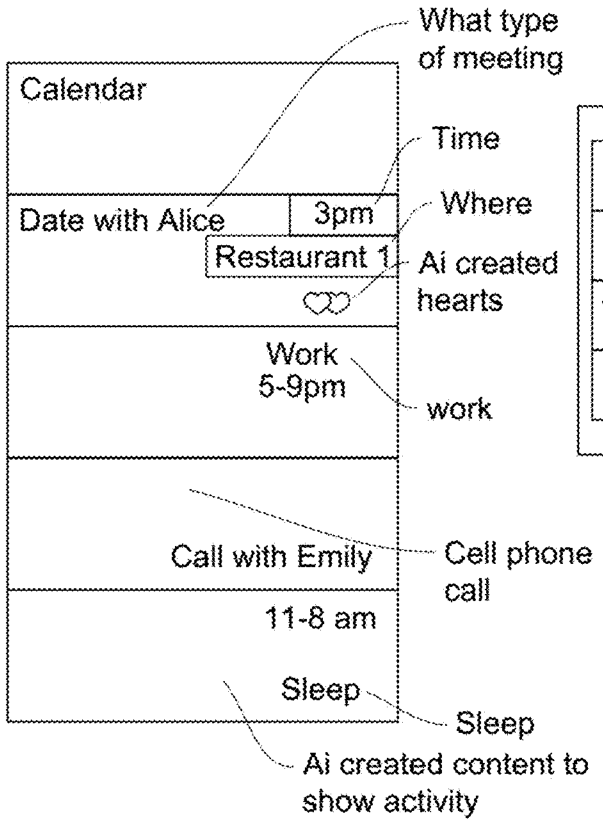
Figure 245:
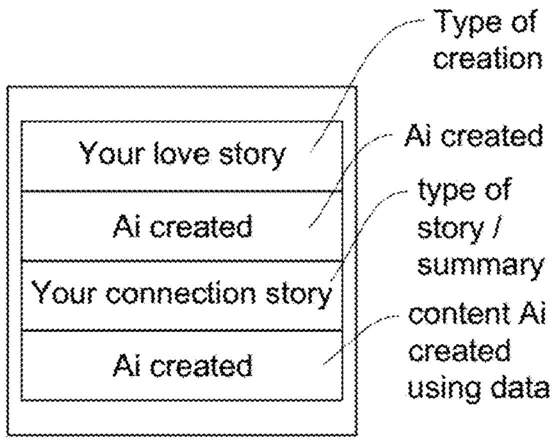
Figure 246:
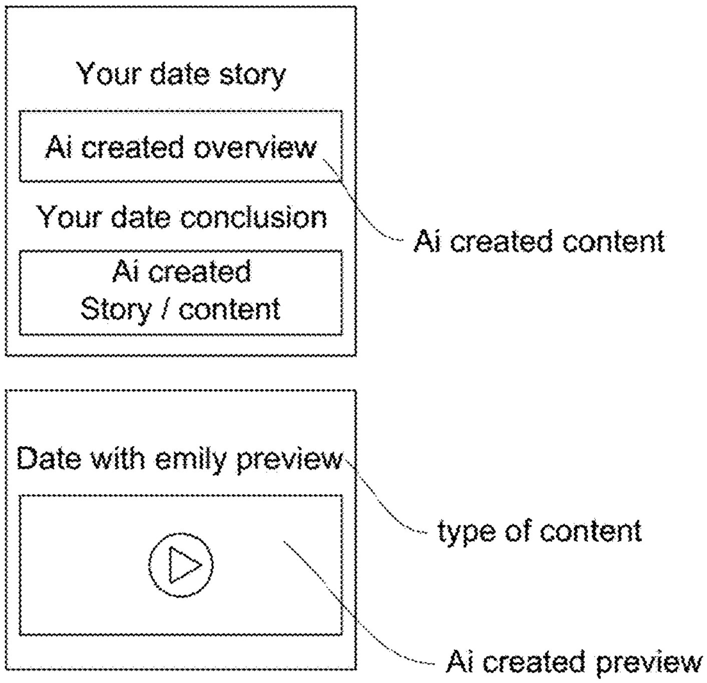

FIG. 244, FIG. 245, FIG. 246: In some embodiments, AI may be able to create technological-made (e.g., content, videos, photos, hologram, etc.) that are (e.g., real, not real or based on reality, etc.) that may show, which may include but not be limited to (e.g., what the date is, who the date is for, who the dates are between, who the connection is with, where the date is, where the connection began, what city, a love story, etc.) In some embodiments, other AI variations may, for example, which may include but not be limited to (e.g. a picture of your dog getting groomed, and the user interface may show the date and the time for that particular meeting/schedule to visualize the date or meeting or schedule, etc.) In some embodiments, there may be (e.g., visuals or hearing or sounds, etc.) for example (e.g., showing a date preview or showing a 'trailer for the date like a movie trailer' or an AI-created version of a date or a meeting between two people like using faces or any input information to output something related to user or their situation or what they like' or viewing may be AI-generated, or AI may be created by uploaded content such as, which may include but not be limited to (e.g., a photo that the user uploads, an image that is automatically generated based on the 'dater, user's profile photo, favorited photo (such as using artificial intelligence and machine learning to choose the best one based on user's preferences, etc.)

In some embodiments, there may be a, which may include but not be limited to (e.g., breakdown, itemized, receipt, invoice, total, partial, breakdown, bill, summary of, total, etc.) of artificial intelligence, machine learning, manual, automatic of content that may show up as 'dates change' or 'activities change' etc.) In some embodiments, which may include but not limited to, the: (e.g., breakdown, itemized, receipt, invoice, total, partial, breakdown, bill, summary of, total, etc.) of schedule may show up as, which may include but not be limited to (e.g., 'person doing activity' or 'users turning into robots or AI created content that may show a preview of activity' [similar to mood-board, virtual or visible displays of 'mood' or 'fantasy' or suggestions or 'AI-created' or 'theatrical' or 'inspirational board' or 'inspirational displays of created content' but created with AI], created by human, robot, bot, 3rd party, entity, computer system, AI system, crafted, created by robotics based on collected or known data] etc.) In some embodiments, the AI created-content may be a, which may include but not be limited to (e.g., preview or loop, or photo, or picture, or video, or hologram etc.) which may show a, which may include but not be limited to (e.g., preview or show what to expect on connection or date or communicating with user, or what to expect, or an idea of what could be, or a visual of user, or a visual of model, or show what could be, or show a movie, or show a show, or show content, or show a picture, or show a demonstration of what the activity, date, connection etc.) could, which may include but not be limited to (e.g., look like, be like, pretend, ideas, content-created, content, etc.) In some embodiments, the, which may include but not be limited to (e.g., AI may have created content, or manually created, or platform created, or machine learning created content etc.) may be, which may include but not be limited to (e.g., stationary, moving, in a loop, disappear, reappear etc.) In some embodiments, the, which may include but not be limited to (e.g., AI created content, content, output of content, magically-created content, machine learning content, etc.) may come from the information that is, which may include but not be limited to (e.g., inputted into the system or the data, or the date, or the user, or the profile, or the booking place, or the activity, etc.) In some embodiments, the AI created content may move, stay, be deleted, be changed, have additional manually or automatic inputs, change depending on mood, voice commands, inputted, or data collected, which may include but not be limited to (e.g., mood, tone in voice, searches, happiness, non-happiness, having a stressful day, profile information, data that has been collected, etc.) In some embodiments, the show or the, which may include but not be limited to (e.g., calendar, timing method, schedule method, scheduling method, timing data center, etc.) may, which may include but not be limited to (e.g., play music, or create its own content or its own story, or its own memories that be able to be shared, linked, sent, shown, saved, created, etc.)

In some embodiments, there may be, which may include but not be limited to (e.g., AI created content, inputted content, outputted content, created content, human-party, robot party-created content, etc.) which may include but not be limited to (e.g., similar to mood-board, virtual or visible displays of 'mood' or 'fantasy' or suggestions or 'AI-created' or 'theatrical' or 'inspirational board' or 'inspirational displays of created content' but created with AI, created by human, robot, bot, 3rd party, entity, computer system, AI system, crafted, created by robotics based on collected or known data, etc.) and/or outputs may include but not be limited to (e.g., date previews, data previews, informational previews, information content, conclusions, overviews, summaries, stories, feedback, memories created, memories, things created together such as memories or conclusions or ideas or stories, etc.) that may show data, or a summary, or a story, or a conclusion, etc.) In some embodiments, the 'date story' or the 'date conclusion' or the 'AI created story or summary' may create this based on data may include but not be limited to (e.g., inputted information, automatically created information, basic information, outside information, data collected from connection, AI monitoring, machine learning, music, sounds, previews, computing operation, preferences, personal information etc.) In some embodiments, there may be an, which may include but not be limited to (e.g., AI, machine learning, human, etc.) created preview for, which may include but not be limited to (e.g., 'date or connection,' etc.) or, which may include but not be limited to (e.g., message, communication, etc.) that may show content that is based on, which may include but not be limited to (e.g., data, inputs, outputs, information, gathered data, etc.) or some type of AI created content that may show a, which may include but not be limited to (e.g., preview or a suggestion, or any type of content etc.)

In some embodiments, there may be a user interface that may allow users to which may include but is not limited to (e.g., book, schedule, inquire about, inquire about, inquire regarding, secure, create a connection to, hold, pay for, create a business relationship with, use transmittables to secure or book, schedule, inquire about, etc.) which may include but not limited to (e.g., jobs, gigs, events, parties, on-going jobs, on-going events, etc.) through the platform(s) or which may include but not limited to (e.g., hire, find help, find assistance, pay someone else for any reasons, pay someone for assistance or goods or services, etc.) through, which may include but not limited to (e.g., platform or 3rd parties, advertisers, advertisements, businesses, or entities, or persons, etc.) In some embodiments, which may include but not limited to (e.g., options or ways to hire, or options available, or any possibilities of options, etc.) may include but not be limited to (e.g., find a personal assistant, browse through personal assistants, hire a personal assistant, hire a nanny, find a nanny, find/hire a chef, hire a driver, hire security, etc.) In some embodiments, options may include but are not limited to (e.g., paying on credit, paying cash, paying one-time, paying monthly, using credit, using rewards, having a 3rd party or another user pay, debit, immediate payment options, etc.) In some embodiments, there may be options to view potential 'hires' or 'those for work's history" which may include but not be limited to (e.g., how many jobs they have previously booked on the platform, their ratings, how many creators or models they've worked with, how many jobs they've done, their ratings for each job, their total ratings, comments, feedback, background check, background verification, etc.)

In some embodiments, there may be a user interface that may allow users to, which may include but is not limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., jobs, gigs, events, parties, on-going jobs, on-going events, etc.) through platform(s) or which may include but not limited to (e.g., hire, find help, find assistance, pay someone else for any reasons, pay someone for assistance or goods or services, etc.) through, which may include but not limited to (e.g., platform or 3rd parties, advertisers, advertisements, businesses, or entities, or persons, etc.) In some embodiments, which may include but not limited to (e.g., options or ways to hire, or options available, or any possibilities of options, etc.) may include but not be limited to (e.g., find a personal assistant, browse through personal assistants, hire a personal assistant, hire a nanny, find a nanny, find/hire a chef, hire a driver, hire security, etc.) In some embodiments, there may be options that may include but not be limited to (e.g., paying on credit, paying cash, paying one-time, paying monthly, using credit, using rewards, having a 3rd party or another user pay, debit, immediate payment options, etc.) In some embodiments, there may be options to view potential 'hires' or 'those for work's history,' which may include but not be limited to (e.g., how many jobs they have previously booked on the platform, their ratings, how many creators or models they've worked with, how many jobs they've done, their ratings for each job, their total ratings, comments, feedback, background check, background verification, etc.)

In some embodiments, the user or person or anyone may choose, including but not limited to (e.g., time, location, wait for staff, workers, persons, staff members, categories, choose a meal, choose the price, choose discounts, choose valet information, choose valet, choose a pickup time, get a ride, get driving, travel, route, service, checkout total, view (e.g., breakdown, itemized, receipt, invoice, total, partial, breakdown, bill, a summary of, total, etc.), etc.) In some embodiments, choosing a meal, items, or activities may allow the food to be ready upon arrival, or have options to have food ready at a specific time or have any activity prepared or pre-planned, pre-made, or shown at the exact time of arrival, etc.) In some embodiments (e.g., you may, user, person, entity, 3rd party, robot, artificial intelligence, etc.) may also choose your, which may include but is not limited to (e.g., section, your seat, your server, staff, your driver, dessert, gift cards, times, delivery, flower delivery, time, etc.)

Figure 247:
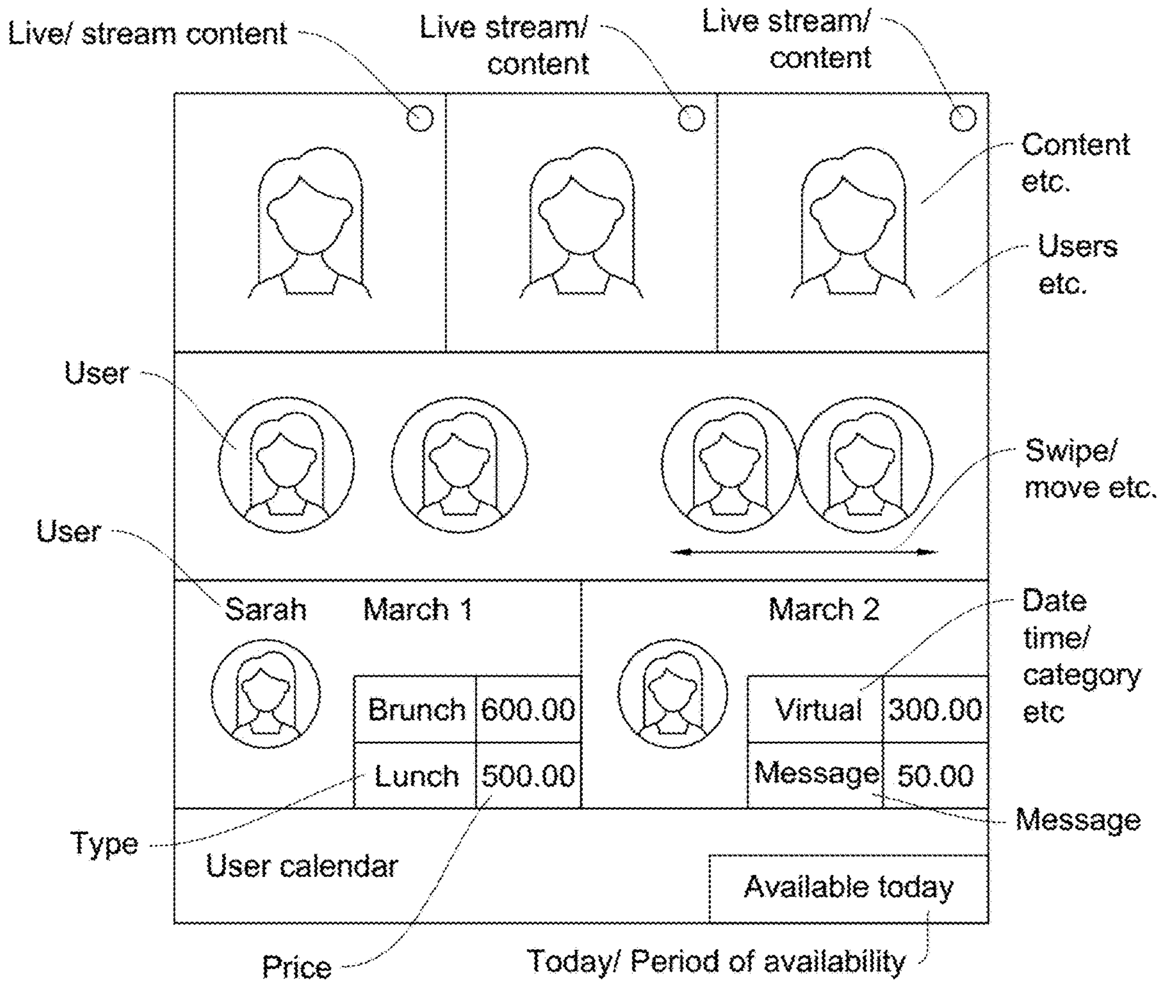
Figure 248:
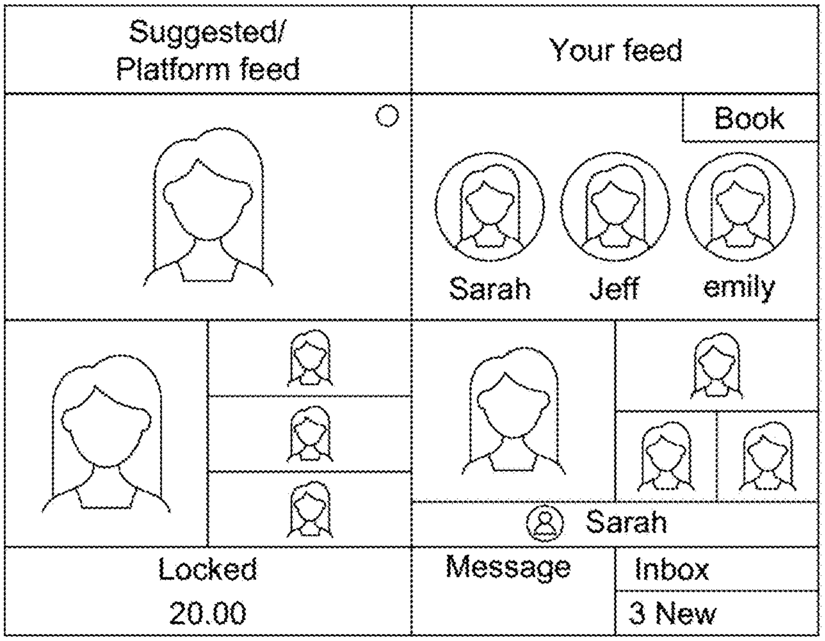

FIG. 247, FIG. 248: In some embodiments, there may be, which may include but not be limited to (e.g., live streams, multiple live streams, multiple options to click on live streaming, live streams may be pre-recorded, etc.) In some embodiments, there may include but not be limited to (e.g., live stream options, virtual prices, price ranges, general pricing, general transmittables, in-person prices, price ranges, general pricing, general transmittables, pricing, availability today, brunch price, lunch price, user's calendar, calendar options to view, calendar, profile photos, profile, content, etc.) In some embodiments, there may be, including but not limited to (e.g., user interface, screen options, etc.) and/or/profile viewing options. Some embodiments may include but are not limited to (e.g., a headline or a header photo or video at the top, this also may be a gif or some moving item, or a still thing such as a photo, any content, etc.) In some embodiments, there may be, which may include but not be limited to (e.g., a profile photo, main photo, photo, content, main content, video, playing, game, item, interactive item, AI, computer, robot, etc.) that may be chosen by the may include but not be limited to (e.g., creator, person, dater, paid person, paid dater, platform, etc.) In some embodiments, there may be an option to, which may include but not be limited to (e.g., 'book an in-person date,' book date, book meeting, book connection, book talk, book speak, from profile photo, a button, clicker, swiping method, or any clicking method near profile photo, video, or any section on the profile page or outside of the profile page. In some embodiments, there may be 'subscribe, follow for free, unlock photo options, free photo options, free video options, tipping buttons or options, messaging options to send a direct message, messaging options that may include being able to attach, add, or contain a photo, a voice recording, a video recording, or a live recorded message to be sent to the creator, model, or other person.

In some embodiments, there may be an option to, which may include but not be limited to (e.g., 'add friends' 'or follow options' or create top friends list, or create top creator list, or creator top model list, etc.) for other creators or 'paid persons on the platform.' In some embodiments, there may be a, which may include but not be limited to (e.g., link, interface, etc.) to, which may include but not be limited to (e.g., book, schedule, inquire about, inquire about, inquire regarding, secure, create connection to, hold, pay for, create business relationship with, use transmittables to secure or book, schedule, inquire about, etc.) which may include but not be limited to (e.g., an-in person date, activity, method, connection, live streaming, live video call, live phone call, etc.) through the, which may include but not be limited to (e.g., interface, platform, 3rd party integrations, etc.) In some embodiments, this button may take the person, which may include but not be limited to (e.g., to another screen, on the same screen, interface, etc.) that may show a, which may include but not be limited to (e.g., calendar, timing method, timing schedule, scheduling device, scheduling options, day organizer, life organizer, etc.) that may include the person's, which may include but not be limited to (e.g., schedule, timing data, etc.) which may include but not be limited to (e.g., available booking dates, preferences on booking dates, options that may be chosen, limited availability, limited options, limited viewing of calendar, only showing dates available, only showing options that the creator wants etc.) In some embodiments, this calendar or section, or page may show the creators set preferences, which may include but not be limited to (e.g., for example which may be including but not limited to creator's likes include 'Seafood restaurants, Steak Restaurant, Time preferences (Lunch or Dinner), 'time preferences such as 6-8 pm for in-person dates, other likes such as 'loves a gentlemen that may show up on a date with flowers, etc')

In some embodiments, there may be user interface, which may include but not be limited to (e.g., two user interfaces with two separate streams of content or information, multiple user interfaces with various variations of content or information, separate versions of content or combined content, or variations of content, messaging in-boxes, messages, notifications for messages, notifications, user information, other users information, locked content, prices, price ranges, general pricing, general transmittables, payment options, tipping options, live streams, pre-recorded live streams, content, users, users for browsing or suggestions, manual or created users, created lists, users, dates, times, prices, price ranges, general pricing, general transmittables, types of dates available, user's calendar, availability through calendar or other ways to know availability, platform suggested feed, suggested feed, feed, streams of content, locked content, feed of suggestions, feed of calendars, feed of lives, etc.)

Figure 249:
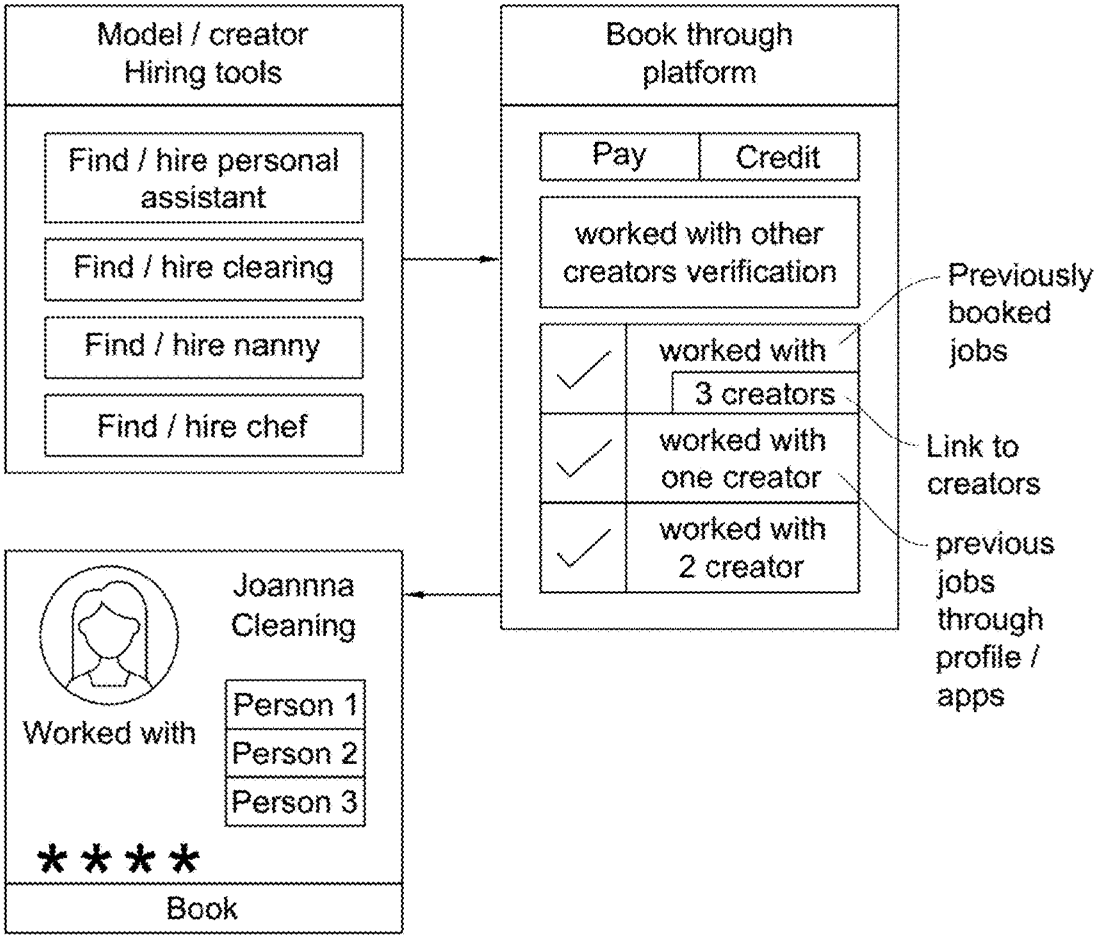
Figure 250:
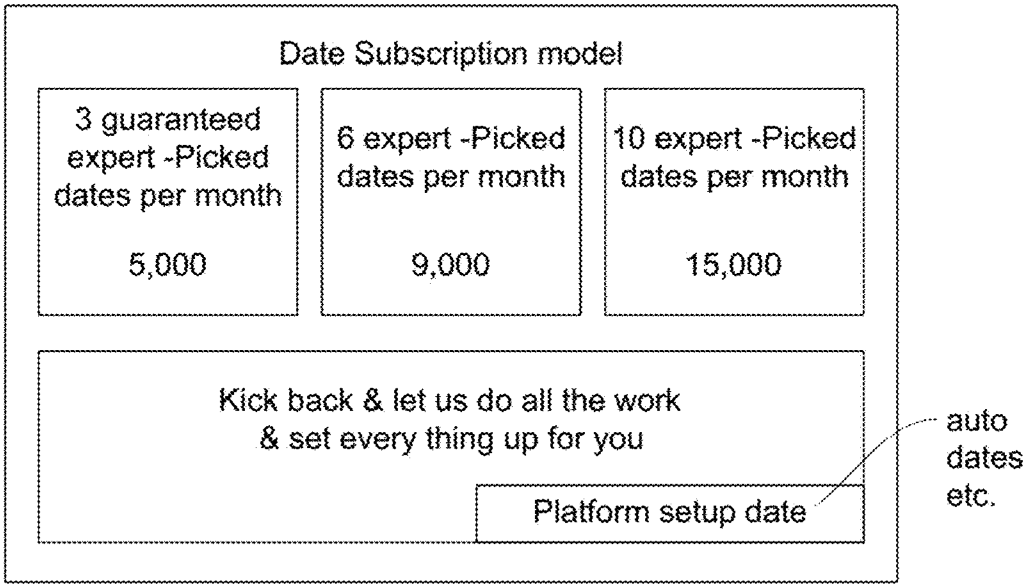
Figure 251:
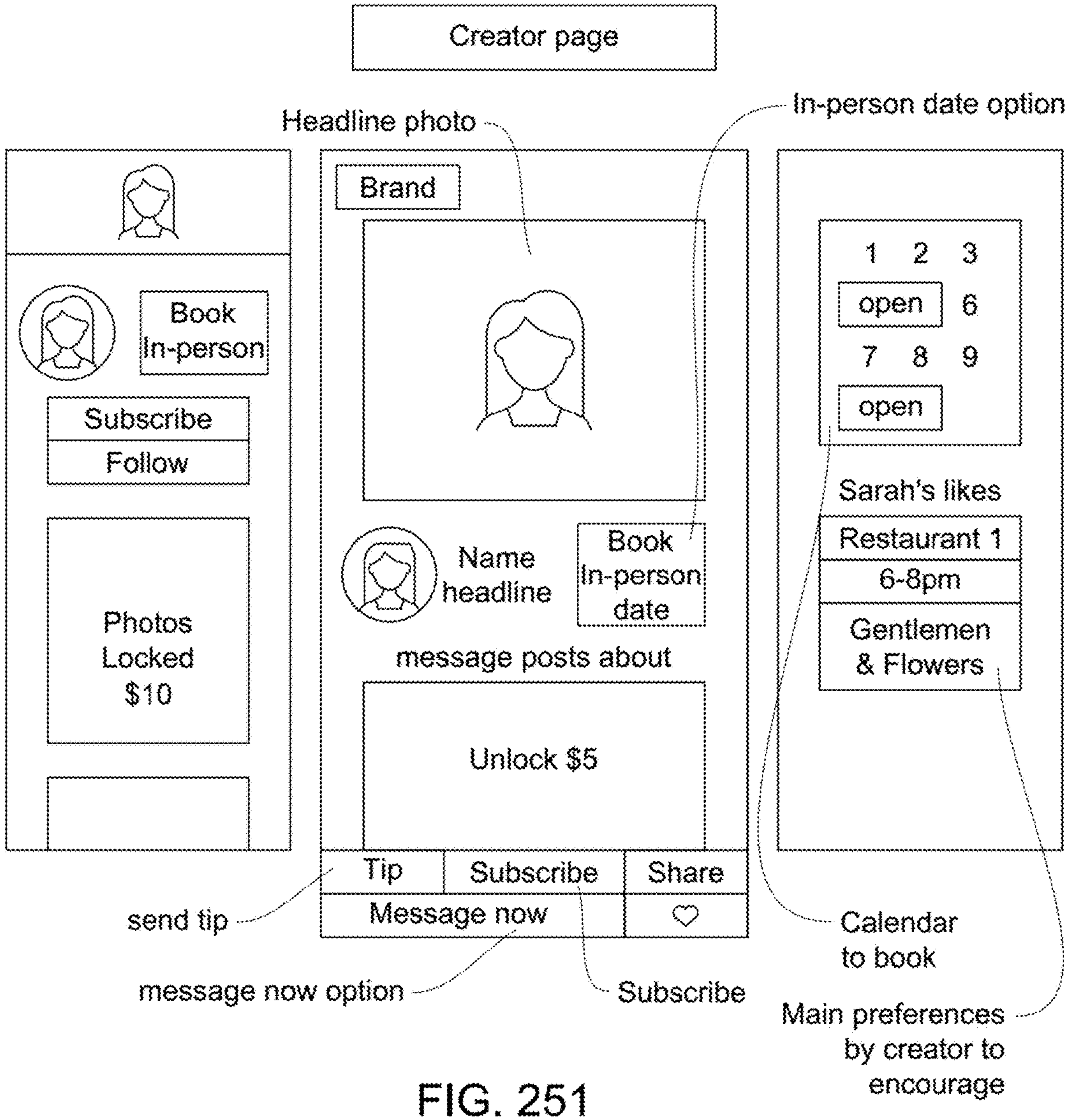
Figure 252:
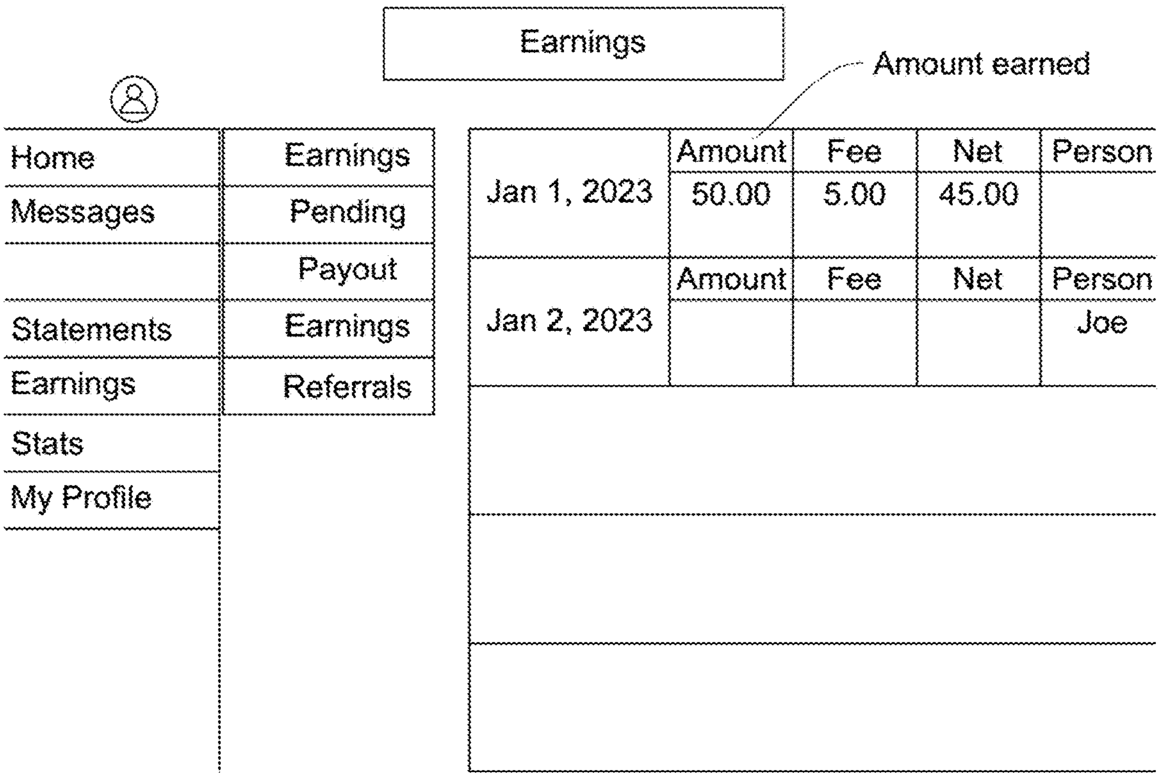
Figure 253:
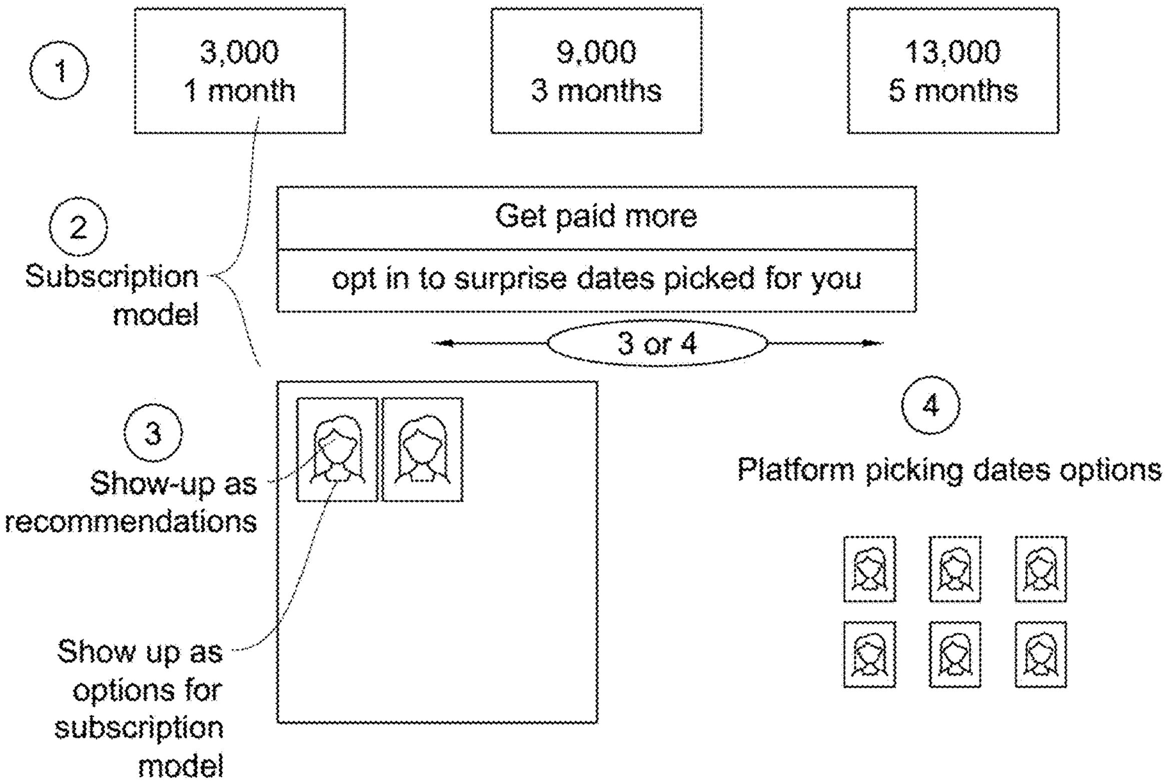

FIG. 249, FIG. 250: In some embodiments, there may be, which may include but not be limited to (e.g., 3rd party verification, other platform integration, platform verification, entity integration, 3rd parties, etc.) that may, which may include but not be limited to (e.g., show, confirm, deny, suggest, show, obtain cut of, referral fees, show ratings, show stars, shows other may use that may have worked with person, options to purchase, options to pay, options, to get credit for, certified or verified previous services, etc.) In some embodiments, there may be a user interface(s) that may have model/creator/user hiring tools, which may include but not be limited to (e.g., find a personal assistant, hire a cleaning service, hire a nanny, hire a babysitter, hire a chef, hire a stylist, hire hair, hire makeup, hire any service, etc.) Some embodiments may offer options to (e.g., pay or secure, etc.) using (e.g., credit, debit, installments, crypto, assets, etc.) In some embodiments, which may include but not be limited to (e.g., there may be reviews, ratings, categories or types, history of other users' experiences, or other creators hired persons they have worked with previously, etc.) In some embodiments, there may be profiles, history, or information regarding persons to be hired, which may include but not be limited to (e.g., ratings, persons worked with, users worked with, star ratings, general ratings, reviews, comments, profile photos, information, background checks, booking options, payment options, etc.)

In some embodiments, there may be a user interface that may allow users to, which may include but is not limited to (e.g., book, schedule, inquire about, inquire about, inquire regarding, secure, create a connection to, hold, pay for, create a business relationship with, use transmittables to secure or book, schedule, inquire about, etc.) which may include but not limited to (e.g., jobs, gigs, events, parties, on-going jobs, on-going events, etc.) through the platform(s) or which may include but not limited to (e.g., hire, find help, find assistance, pay someone else for any reasons, pay someone for assistance or goods or services, etc.) through, which may include but not limited to (e.g., platform or 3rd parties, advertisers, advertisements, businesses, or entities, or persons, etc.) In some embodiments, which may include but not limited to (e.g., options or ways to hire, or options available, or any possibilities of options, etc.) may include but not be limited to (e.g., find a personal assistant, browse through personal assistants, hire a personal assistant, hire a nanny, find a nanny, find/hire a chef, hire a driver, hire security, etc.) In some embodiments, options may include but are not limited to (e.g., paying on credit, paying cash, paying one-time, paying monthly, using credit, using rewards, having a 3rd party or another user pay, debit, immediate payment options, etc.) In some embodiments, there may be options to view potential 'hires' or 'those for work's history," which may include but not be limited to (e.g., how many jobs they have previously booked on the platform, their ratings, how many creators or models they've worked with, how many jobs they've done, their ratings for each job, their total ratings, comments, feedback, background check, background verification, etc.)

In some embodiments, the, which may include but not be limited to (e.g., users, persons, public persons, bidders, etc.) may be able to, which may include but not be limited to (e.g., click on the model's page to unlock custom photos, subscribe to her profile for automatically unlocked photos, to see her date availability is, see availability, see calendars, pay monthly membership, pay weekly membership, get experts to pick dates, get other person or 3rd party to pick dates, get an assistant to manage dates, allow platform to book, schedule, inquire about, inquire about, inquire regarding, secure, create connection to, hold, pay for, create business relationship with, use transmittables to secure or book, schedule, inquire about, etc.) date or suggest dates based on membership option, obtain membership, pay to view more, pay to subscribe, pay to become VIP, send tips, send money, see lives, view lives, obtain previews etc.) In some embodiments, the, which may include but not be limited to (e.g., platform, apps, hologram, screen, hologram, user interface, viewing display, visuals, site's, etc.) which may include but not be limited to (e.g., screen, hologram, user interface, viewing display, viewing, page, user interface, homepage, etc.) may offer, which may include but not be limited to (e.g., public, paying customers, paying persons, persons, users, bidders, etc.) the option to search, which may include but not be limited to (e.g., a category of "blondes" "brunettes" "actresses" "internet models" "models" "international models" "local models" "cosplay" search by location, area, etc.) which may allow finding, which may include but not be limited to (e.g., a category, model, person, user, etc.) for, which may include but not be limited to (e.g., date, subscribing, unlocks, view content, view calendar, book, schedule, inquire about, etc.)

In some embodiments, the user interface may be the, which may include but not be limited to (e.g., paying daters, the person paying, 3rd party paying, the entity paying, a business paying, any gifting, gifting, donations, donating, user paying, the person spending money, person subscribing, person on membership, person sending money, etc.) view. In some embodiments, the view that the, which may include but not be limited to (e.g., paying daters, persons paying, etc.) may be shown or defined as, which may have but not be limited to (e.g., those that are registered to obtain dates, those that pay or seek entertainment on platform, etc.) may be able to view. In some embodiments, the user interface may include or have options such as searching for things that may include but are not limited to (e.g., distance, price, looks, weight, model, interests, types, categories, etc.) In some embodiments, which may include but not be limited to (e.g., paying person, user, the person sending money, person pressuring, etc.), may be able to be searched by 'matching AI-connecting qualities' such as, which may include but not be limited to (e.g., distance, city, location, type, category, availability, attractiveness, etc.)

FIG. 251, FIG. 252, FIG. 253, FIG. 254: In some embodiments, which may include but not be limited to (e.g., model, creator, the person getting paid, etc.) may be able to manage their, which may include but not be limited to (e.g., own profile or make any changes, or any business relations, or any business development, accept, deny, change, withdrawal, accept, get paid from, etc.) on any user interface, which may include but not be limited to (e.g., hologram, internet, app, device, website, web, Web3, outside platform, etc.) In some embodiments, creator profile or management system may include but not be limited to (e.g., brand, logo, profile, person, live, live stream, pre-recorded live stream, pre-recorded content, pre-recorded live stream, pre-recorded live stream, pre-recorded content, pre-recorded content, name, headline, photo, content, receiving of likes, receiving of profile views, seeing who has viewed profile, how to book, schedule, inquire about, inquire about, inquire regarding, secure, create connection to, hold, pay for, create business relationship with, use transmittables to secure or book, schedule, inquire about, etc.) how to book, schedule, inquire about, inquire about, inquire regarding, secure, create connection to, hold, pay for, create business relationship with, use transmittables to secure or book, schedule, inquire about, etc.) dates, training videos, training content, safety content, calendar, calendar management software, calendar management platform, options to change calendar, accepting dates, denying dates, managing dates, issuing refunds, feed, sending feed, locked photos, locked content messages, mass messages, messaging platforms, subscribe, book, schedule, inquire about, book now, manage booking options, manage booking payments, manage content production, manage artificial intelligence assistant, manage or collect machine learning input data, managing machine learning output data, messages, posts, past posts, new data, learning data, learned data, community posts, community area, suggestions, book 3rd party, reserve or pay for 3rd party, book nanny, book security, receiving background checks, receiving funds, transfer funds to bank, transfer funds, manage asset platform, manage assets, book travel, accept travel, obtain visa information, receive passport information, etc.) In some embodiments, the user interface(s) may provide a job booking platform or options that may enable 'service providers' to 'connect with, which may include but not be limited to (e.g., clients, persons, users, brands, 3rd parties, advertisers, advertisements, businesses, entities, manage job bookings, manage finances, manage payments, etc.). In some embodiments, this may include a user interface(s) allowing service providers to have but are not limited to (e.g., create and manage profiles, receive job requests from clients, manage bookings, payments, etc.) In some embodiments, The system may have features for including but not limited to (e.g., verifying service provider qualifications, verifying payments, managing client reviews, managing ratings, feedback, comments, booking, messaging, unlocking content, etc.)

In some embodiments, there may be a user interface that may allow users to, which may include but is not limited to (e.g., book, schedule, inquire about, inquire about, inquire regarding, secure, create connection to, hold, pay for, create business relationship with, use transmittables to secure or book, schedule, inquire about, etc.) which may include but not limited to (e.g., jobs, gigs, events, parties, on-going jobs, on-going events, etc.) through platform(s) or which may include but not limited to (e.g., hire, find help, find assistance, pay someone else for any reasons, pay someone for assistance or goods or services, etc.) through, which may include but not limited to (e.g., platform or 3rd parties, advertisers, advertisements, businesses, or entities, or persons, etc.) In some embodiments, which may include but not limited to (e.g., options or ways to hire, or options available, or any possibilities of options, etc.) may include but not be limited to (e.g., find a personal assistant, browse through personal assistants, hire a personal assistant, hire a nanny, find a nanny, find/hire a chef, hire a driver, hire security, etc.) In some embodiments, options may include but are not limited to (e.g., paying on credit, paying cash, paying one-time, paying monthly, using credit, using rewards, having a 3rd party or another user pay, debit, immediate payment options, etc.) In some embodiments, there may be options to view potential 'hires' or 'those for work's history,' which may include but not be limited to (e.g., how many jobs they have previously booked on the platform, their ratings, how many creators or models they've worked with, how many jobs they've done, their ratings for each job, their total ratings, comments, feedback, background check, background verification, etc.)

In some embodiments, users or persons may not know that they are in membership format or are appointed or seen as 'members.' In some embodiments, platform may make (e.g., paid for persons, not paid for persons, appointed persons, suggested persons, voted on persons, specific persons or any user or any person members, special members, special persons, etc.) In some embodiments, which may include but not be limited to (membership opt-in, options to get paid more by going out on more dates, options to opt-in to being added as an 'extra' or a 'last minute change' or a 'last minute date' or an 'extra dater' or a 'additional model' or an additional person for a date or event, membership options, options to get paid more, options to go out on extra dates, options to be an additional party to a date, group dates may occur or there may be an option for group dates or more than one user booked at the same time for the same entertainment option, or different options, etc.) In some embodiments, users may be able to, which may include but not be limited to (opt-in, join, participate, view, see, come to, be included, not included, pay for, not pay for, be paid for, etc.) to allowing dates that have more than one person, or not allow to be booked for a 'more than one person option' etc.) In some embodiments, users or persons that may, which may include but not be limited to (e.g., opt-in, join, agree to, add themselves to, etc.) may be, which may include but not be limited to (e.g., suggested more, have more suggested options, be suggested more on calendars, be added more to the computing operations, be added more to the users calendars, be added more to the feed, be shown more, be suggested more, have more dating options, have more dating opportunities, etc.) In some embodiments, 'group dates' may give a, which may include but not be limited to (e.g., paying user, or a user that is exchanging something of value or assets) in exchange for multiple users to: (e.g., make connection, book or date etc.) In some embodiments, which may include but not be limited to (e.g., 'party option' or an option such as 'book multiple users' etc.)

In some embodiments, multiple users may be defined but not limited to as (e.g., 'more than one user at a time, multiple users, two or more, one or more, groups, staggered groups, different activities, different days, different times, etc.) In some embodiments, 'group dates' or 'group users' may be booked through the platform and all paid, which may include but not be limited to (e.g., separately, together, staggered, spread out, installments, credit, funds, assets, etc.) may be depending on if they meet the contractual 'minimal agreements,' or agreements, which may include but not be limited to (e.g., 'showing up, staying for the duration, check-in, check-out, time stamp, time record, time and data record, location, time and data record, coordinate(s), etc.) In some embodiments, a group date may be booked altogether, and some users may not meet the entirety of the 'agreement' but mostly, generally, or overall meet the agreement, such as, which may include but not be limited to ('one person left early, or one person got sick, etc.) Some embodiments, which may include but are not limited to ('double, triple, or group dates, staggered, same day, different day, different settings, different locations, traveling, etc.'), may be all booked together or booked separately. In some embodiments, there may be discounts for booking groups; there may not be discounts.

In some embodiments, the user may be able to choose to accept a, which may include but not be limited to (e.g., 'booked person, paid person,' etc.) to bring their friend or bring a 'plus one' or 'bring a family member, or bring a roommate, or bring a friend, or bring another person' etc.) In some embodiments, users may not be able to deny a user to bring a safety person due to any circumstances such as, which may include but not be limited to (e.g., may not know of a safety person, may disapprove, may not want that person to have safety persons near, wanting to get a person alone, or may be able to deny the request a safety person, or may not be able to refuse if someone else is there, etc.) In some embodiments, a 'bidder, which may include but not be limited to (e.g., a bidder may be defined as any person that is paying for a service or a connection or a date, or anything, etc.), may be chosen to pick a 'group date' which may include 'model,' which may include but not be limited to (e.g., plus one or more, or more 'creators' 'models,' etc.) to accompany the, which may include but not be limited to (e.g., 'bidder 'fan' or 'date buyer' etc.) to the entertainment option which may include but not limited to (e.g., dinner, lunch, coffee, pre-approved date choice, virtual, game, show, live, event, meeting, etc.)

Pre-chosen and listed 'closed: In some embodiments, which may include but not be limited to (e.g., 'Creators, persons, users, models, etc.) may have 'pre-picked" suggestions for their own (e.g., friend, other model, other creator, other user etc.), which may include but not be limited to (persons, chosen persons, appointed person, 3rd party chosen persons, creator chosen person, etc.) that are also on the platform or anywhere (e.g., of the platform or a 3rd party, etc.) that may appear on, which may include but not be limited to (e.g., their profile, information packet, information suggestion on the platform, on any advertisements, etc.) In some embodiments, 'pre-picked' (e.g., friend, other model, other creator, other user etc.) may be chosen to, which may include but not be limited to (e.g., appear on their profile or chosen to be hidden, or be chosen to be shared, etc.) with only specific, which may include but not be limited to (e.g., 'bidders' 'potential bidders' 'fans' or a part of the 'subscription unlocks' etc.) which may then show who the, which may include but not be limited to (e.g., 'creator/model' person, user, etc.) has available as suggestions for their, which may include but not be limited to (e.g., friend, other model, other creator, other user etc.) to add to the potential, which may include but not be limited to (connection, 'date' etc.) chosen by, which may include but not be limited to (e.g., bidder, model, person, user, etc.) may be choose to not allow or allow, which may include but not be limited to, which may include but not be limited to (e.g., dates' connections, lives, working with, etc.) with any other, which may include but not be limited to (e.g., friend, other model, other creator, other user, users, person, on the platform, user interface, or platform, friend, other model, other creator, other user etc.) which may mean, which may include but not be limited to (e.g., other creators or models on or off of the platform, user interface, or platform etc.)

In some embodiments, the model may be chosen only to allow, which may include but not be limited to (e.g., 'group' dates with these persons, security detail, safety chaperone, etc.) or be open to 'other, which may include but not be limited to (e.g., friend, another model, another creator, another user, etc.) On the, which may include but not be limited to (e.g., platform, user interface, etc.) In some embodiments, 'Other, which may include but not be limited to (e.g., friend, another model, another creator, other user, etc.) may mean other, which may include but not be limited to (e.g., women, users, models, creators on the, which may include but not be limited to (e.g., site, platform, or others, user, etc.) that the 'creator' may not, which may include but not be limited to (e.g., know personally or knows personally, or wants to use for business or personal purposes, etc.) In some embodiments, which may include but not be limited to (e.g., 'platform, interface, etc.) users, which may include but not be limited to (e.g., referred to as 'creators, models, the paid person(s), etc.) may have the option to suggest other users, which may include but not be limited to (referred to as (e.g., friend, another model, another creator, other users, etc.) to appear on, which may include but not be limited to (e.g., their profile, advertisement materials, information packets, suggestions, marketing materials, breakdowns, suggestions, etc.) In some embodiments, which may include but not be limited to ('pre-picked, or self-picked, or chosen'), which may include but not be limited to (e.g., friend, other models, another creator, other users, etc.) may be made visible or hidden to certain, which may include but not be limited to (e.g., audiences, such as 'bidders,' 'potential bidders,' or 'fans, etc.) In some embodiments, the option to view a creator's suggested, which may include but not be limited to (e.g., friend, another model, another creator, other users, etc.) may also be, which may include but not be limited to (e.g., unlocked, allowed, shown, added, etc.) through a, which may include but not be limited to (e.g., subscription, payment, installment, etc.) In some embodiments, creators can allow or disallow dates with their suggested, including but not limited to (e.g., a friend, another model, another creator, other users, etc.) or choose their option to allow or disallow group dates. In some embodiments, users may also choose to be open to dates with other users on the, which may include but not be limited to (e.g., platform, user interface, etc.) whom they do not personally, which may include but not be limited to (e.g., know, met, stranger, person, user, non-known user, non-known creator, etc.)

In some embodiments, there may be an option for, which may include but not be limited to (e.g., open-for-friend-model-creator-group-dates, or open for others to join dates, or open for adding on dates, or open for others to add on dates, or open to party dates, or open to group dates, etc.): In some embodiments, which may include but not be limited to (e.g., 'bidder' or 'paying person etc.) may be choose any, which may include but not be limited to (e.g., group of women, group, categories, selection, group-selection, etc.) to go on a, which may include but not be limited to (e.g., date, connection, party, event, etc.) with as a, which may include but not be limited to (e.g., 'package deal,' or one time check out or one time pay, or separate pay for one event, or separate pay for different events or booking etc.) In some embodiments, the, which may include but not be limited to (e.g., 'creators' or 'models' etc.) may have to all each, which may include but not be limited to (e.g., individually, collectively, separately, etc.) which may include but not be limited to (e.g., 'agree,' confirm, accept, opt-in etc.) on their, which may include but not be limited to (e.g., profile, settings, notifications, message, contact etc.) with the platform that the 'model' is, which may include but not be limited to (e.g., 'available,' accepting, wanting, confirming, opting in, etc.) for, which may include but not be limited to (e.g., 'open group dates, to be added to another date, to be accepted with other persons, to be added to a connection meeting for any time period, etc.) with other, which may include but not be limited to (e.g., friend, other model, other creator, other user etc.) on the, which may include but not be limited to (e.g., platform, user interface, etc.) In some embodiments, 'open for model-group dates' may, which may include but not be limited to (e.g., suggest or be suggested or be added, or be confirmed or paid for, etc.) with, which may include but not be limited to (e.g., artificial intelligence or other means in the area of suggestion, human, 3rd parties, advertisers, advertisements, businesses, persons, users, bidders, other groups, entities, etc.) for 'group dates' next to her picture, pictures of other 'potential group date options.' In some embodiments, options may be chosen by, which may include but not be limited to (e.g., computing operation and on artificial intelligence, humans, 3rd parties, advertisers, advertisements, businesses, entities, etc.) to potentially suggest potential, which may include but not be limited to (e.g., 'group packages, group suggestions, more than one model, types of dates, types of categories, etc.) to the potential, which may include but not be limited to (e.g., 'bidder' 'fan' 'high-value dater etc.) In some embodiments, which may include but not be limited to (e.g., 'high value dater' etc.) may be defined as any person spending money or using platform.

In some embodiments, which may include but not be limited to (e.g., 'paying person, person paying, etc.) may have the option to choose any, which may include but not be limited to (e.g., group of users, any users, any persons, any profiles, any models, any groups, any entities, any 3rd party integrations, any 3rd parties, advertisers, advertisements, businesses, etc.) to go on a, which may include but not be limited to (e.g., date, meeting, connection etc.) with as a, which may include but not be limited to (e.g., package, grouped, together, grouped together, paid together, paid staggered, paid per show up, etc.) deal paid for, which may include but not be limited to (e.g., separately or at one time or paid each or paid together etc.) In some embodiments, the 'models, which may include but not be limited to (e.g., which may be defined as any person being paid etc.) may have the option to, which may include but not be limited to (e.g., agree to, opt-in, confirm, join, participate in etc.) which may include but not be limited to (e.g., open group dates with other women, added to another connection to group date, or added as an extra, or added as another booked, etc.) on the, which may include but not be limited to (e.g., platform, user interface, etc.) In some embodiments, artificial intelligence may be used to suggest, which may include but not be limited to (e.g., potential group date options and package options, suggestions, suggestions of users, showing models, showing profiles, etc.) In some embodiments, suggestions may be based on, which may include but not be limited to (e.g., computing operations, artificial intelligence, user's preferences, users feedback etc.) Closed-model-group-dates only: In some embodiments, If the 'creator' may not want to go on 'model-group dates with other women on the, which may include but not be limited to (e.g., platform, user interface, outside, in-person, etc.) that the model may not, which may include but not be limited to (e.g., know, approve of, opt-in for, feel comfortable doing, etc.) In some embodiments, 'she,' which may include but not be limited to (e.g., she may be defined as any person on platform or any person being paid etc.) In some embodiments, the creator may choose to, which may include but not be limited to (e.g., opt out of that, opt-in-opt, out, chose to, agree to, confirm, etc.) and potentially choose to, which may include but not be limited to (e.g., opt-in to, agree to, chose to, etc.) 'Closed-model-group-dates only or instead or choose this option.' In some embodiments, which may then, which may include but not be limited to (e.g., show on her profile that user or she only goes on group dates, or it may not show on profile and may be private, or she may disappear from options, or she may or may not be suggested for this etc.) which may include but not be limited to (e.g., her having the choice of, agreeing to, denying, etc.) 'one or more' of the, which may include but not be limited to (e.g., 'known, accepted, agreed to, understood, opt-in etc.) which may include but not be limited to (e.g., friend, other model, other creator, other user etc.) which may be listed on her, which may include but not be limited to (e.g., profile/settings/platform information etc.)

In some embodiments, this may create a, which may include but not be limited to (e.g., 'package deal' or a package payment, or a group payment option, or an individual payment option, or begin an installment for, or pay through 3rd party for, or transfer assets to begin or start or secure, etc.) and the, which may include but not be limited to (e.g., 'bidder,' paying person, user, public person, etc.) may have to pay a 'premium, 'which may include but not be limited to (e.g., an additional fee, or a larger sum, or more money, or more distribution of money etc.) to be able to, which may include but not be limited to (e.g., opt-in or have the option to book, schedule, inquire about, inquire about, inquire regarding, secure, create connection to, hold, pay for, create business relationship with, use transmittables to secure or book, schedule, inquire about, etc.) which may include but not be limited to (e.g., multiple women, more than one woman, more than one creator, more than one model, etc.) In some embodiments, which may include but not be limited to (e.g., women may be defined as any person on platform, or any paid person, at a time etc.) In some embodiments, the 'creator, which may include but not be limited to (e.g., creator may be defined as any person being paid etc.) may be getting paid, which may include but not be limited to (e.g., 'more,' additionally, separate, for an additional fee, fee, etc.) for group dates that may be open to, which may include but not be limited to (e.g., 'there may be an option for, which may include but not be limited to (e.g., open-for-friend-model-creator-group-dates, or open for others to join dates, or open for adding on dates, or open for others to add on dates, or open to party dates, or open to multiple persons or entity dates, etc.) In some embodiments, others that may include a, which may include but not be limited to (e.g., additional fee, payment, opt-in etc.) may be 'closed-bestie, etc'

FIG. 254, FIG. 255, FIG. 256, FIG. 257, FIG. 258, FIG. 259: In some embodiments, which may include but not be limited to (e.g., date log, management area, any user data log, any user management log, any user interface, etc.) may include not be limited to (e.g., viewing routes, viewing driving, travel, route, routes, viewing locations, viewing live locations, location of meeting location, location of data of meeting, location of date location, location of past locations, GPS tracking, 3rd party tracking, cookies, other data on device, 3rd party data device, 3rd party data, 3rd party data during data or meeting or location or time, sending locations, sending data, storing data, storing locations, showing both locations at the same time, showing only one location, showing business locations, showing business data, showing location data, showing driving, travel, route, route and method of transportation, users information, user's background, public information, public background, showing mode of transportation, user's location, user's past location, user's current location, live locations, recorded locations, etc.)

In some embodiments, FIG. 254 or any user interface may show any combination of any, which may include but not be limited to (e.g., calendars, users, user's calendar, another user's calendar, messaging, tipping, saved lists, saved items, saved persons, saved dates, dates that are almost completed but not paid for yet, availability, sending tips, users, suggested users, suggested persons, availabilities, persons' availabilities, users that are saved by user 1 or user 2 or any user, etc.) In some embodiments, FIG. 255 may show any user interface combination of, which may include but not be limited to (e.g., current mode, suggested model, calendar, favorite buttons, category button, your calendar, their calendar, home, message, send tip, send money, multiple users calendar's promotional material, promo items, promo content, etc.) In some embodiments, FIG. 90 FIG. 257, FIG. 255, FIG. 256, FIG. 258, or any interface etc.) which may lead a, which may include but not be limited to (e.g., registered user or a public profile or a public person etc.) into a section where they may be make a, which may include but not be limited to (e.g., list, section, category, queue, etc.) to consider for, which may include but not be limited to (e.g., 'dates they have available' or 'dates that were chosen as available, or open spots, or open availability, or other availability etc.) In some embodiments, the 'dates that are available,' which may include but not be limited to (e.g., list, organization, separating, categorized, etc.) may be in any format for example, lists may be of, which may include but not be limited to (e.g., people, persons, models, users, public persons, etc.) that are, which may include but not be limited to (e.g., available on Fridays, Saturdays Sundays, people that may be available for weekends, people that are available only for lunch, people that are available only for dinner, any type of availability may be sorted into different lists whether it's by looks, personality, offerings such as subscriptions or unlocks, in-person daters, by people that are in the specified city, people that travel for dates, etc.) In some embodiments, FIG. 90 FIG. 257, FIG. 255, FIG. 256, FIG. 258, any interface etc.) In which may be organized based on, which may include but not be limited to (e.g., computing operation, machine learning, AI, person's automatic preferences based on data, manual preferences, learned preferences, suggestions, popularity, etc.) In some embodiments, which may include but not be limited to (e.g., organization, preferences, etc.) which may be able to be changed in, which may include but not be limited to (e.g., 'settings area' or 'database area, interfaces, 3rd parties, advertisers, advertisements, businesses, assistants, etc.) In some embodiments, FIG. 257 may show, which may include but not be limited to (e.g., users profile photo, users main photo, user's computing operation suggested photo, information about users, information, promo material, availabilities, availability per user, users calendar, users availability, showing user's current availability or upcoming availability, options to save users, options to save persons, send tip, send money, message, home, etc.)

In some embodiments, there may be a, which may include but not be limited to (e.g., 'date log, management area,' or a 'date user database or management system, etc.) that may have options such as, which may include but not be limited to (e.g., upload photos, videos, proof, content, required data, required content, suggested content, a user suggested content, platform suggested content, data, collected data, AI collected data, human collected data, 3rd party data, any proof, etc.) which may include but not be limited to (e.g., meeting requirements, meeting the minimum, allowing people to get paid, allowing the user to get paid, allowing the user to see how far on requirements, allowing user to see how to get paid, explainer, information, explanations, requirement information, requirement info, suggestions, suggestions for each user, suggestions by AI, machine learning suggestions or data or information, etc.) In some embodiments, which may include but not be limited to (e.g., data logs, a gathering of data, etc.), may be seen as or shown as or may be, which may include but not be limited to (e.g., regarding date information, time, location, both persons on a date may be used to determine if date occurred, if there are issues or disputes between the parties, etc.) In some embodiments, there may be other optional options to show more, which may include but not be limited to (e.g., gathered, suggested, inputted, asked to be inputted, etc.) which may include but not be limited to (e.g., 'roof of date' or proof that obligations paid for were met to ensure payment is disbursed. In some embodiments, there may be a, which may include but not be limited to (e.g., live location, or a live data log, or an 'amount until completed data log' etc.), which may include but not be limited to (e.g., where they are located or what location coordinates or place they are at, how far into a date, the progress of data, etc.) In some embodiments, 'live location' may be automatic, and the 'dater' or 'paid dater' may not need to check in because the location may automatically check-in for them and record all data.

In some embodiments, categories or searches may be done by, which may include but not be limited to (e.g., book in person, booking in person, book virtual, book talk, book chat, book video chat, book video meeting, book voice conversation, see dating profiles, see profiles, see content, who has viewed your profile, winks, persons, exclusive content, our models, platform, matching AI-connecting, your calendar, match calendar, view calendar, find date, find date based on calendar, match anywhere, find wife, find girlfriend, find by distance, swipe through profiles, follow for free, free profiles, lives, live events, live users, current lives, computing operation by popularity, new users computing operation, swipe through models, swipe by distance, book in-person date, book in-person activity, see locals, see someone to date, date in another city, travel city dating, etc.) In some embodiments, there may be a way for users to adjust prices, price ranges, general pricing, general transmittables, based on may include but not limited to (e.g., categories or user frequencies, or user activities, or user spending, etc.) In some embodiments, users may be categorized by different categories or created categories based on, which may include but not be limited to (e.g., any reasons, user data, user spending, AI, etc.) In some embodiments, some categories that may be price adjusted may include but not be limited to (e.g., previous in-person dates, those with high-ratings, those that have been rated highly by user, locked content, follow for free, book in person, book virtual, book talk, book chat, book video chat, book video meeting, book voice conversation, date, book voice date, book game, net worth, ratings by other users, self-ratings, etc.) In some embodiments, user may be able to give, which may include but not be limited to (e.g., any discount, any price, any group price, group discounts or group specials based on categories, or user history, or tags, etc.)

In some embodiments, there may be, which may include but not be limited to (e.g., communication before, during, or after etc.) In some embodiments, which may include but not be limited to (e.g., payment, transmittables, etc.) may be made for communication of any sort, which may include but not be limited to (e.g., date, for date, visual date, etc.) In some embodiments, communication may not happen, which may include but not be limited to (e.g., allowed, or be fully viewed, or be accepted, or be responded to, etc.) until, which may include but not be limited to (e.g., payment has been made, or cleared, received, acceptance, agreements, agreed upon, etc.) In some embodiments, bidder may be able to choose to, which may include but not limited to (e.g., 'pay,' checkout, etc.) which may include but not be limited to (creator chosen or platform, or 3rd party etc.) a chosen fee or payment to video chat with the may include but not be limited to (e.g., user, creator, model, person, etc.) which may include but not limited to (e.g., before the date/connection, after, during, or before payment or after payment etc.) In some embodiments, which may include but not limited to (e.g., paying person, person making payment, etc.) may include but not be limited to (e.g., bidder, paying person, winner, asset paying etc.) may choose to, which may include but not limited to (e.g., pay or exchange of value of any means, etc.) may include but not be limited to (e.g., set fee, or discovered fee, or bidder fee, or set price, or bidding/auction price, etc.) to, which may include but not limited to (e.g., video chat live with the person being paid for a date or paid to decide if user wants to bid or buy a date with user, or pre-call, or pre-date, or pre-connection, or any connection made, etc.) In some embodiments, 'price' may include but not be limited to (e.g., may be a high price or any price, etc.) may be defined as may include but not be limited to (e.g., 'market price, 3rd party price, set price, bidder price, platform price, AI created price, machine learning price, auto price etc.)

In some embodiments, which may include but not be limited to (e.g., bidder, person, user, etc.), may be able to choose to schedule through, which may include but not limited to (e.g., platform/interface/system, etc.) to schedule a may have or consist of but not be limited to (e.g., live video call, scheduled call etc.) for the bidder to potentially decide if, which may include but not be limited to (the bidder, the high-value dater, the user, the paying person, the person using transmittables,) wants to go on a connection or make a connection/date with ('the creator'). In some embodiments, which may include but not be limited to (e.g., market price, high price or set price, or high price, etc.) to schedule the connection, which may include but not be limited to (e.g., video chat date/connection, etc.) In some embodiments, a person or user may consist of but not be limited to (e.g., bidder, user, paying person, public person, any person, etc.) and may choose to pay a fee or make payment of any asset capacity to make a connection and may include but not be limited to (e.g., video chat with a user, etc.) may include but not be limited to (before, after, during, previewing, etc.) a connection may include but not be limited to (e.g., 'date, virtual date, entertainment options set by anyone or model or user, in-person date, messaging, video call, video chat, etc.) In some embodiments, which may include but not be limited to (bidder, user, follower, paying person, user, public person, etc.) may choose to pay a fee may include but not be limited to (e.g., a cost, a payment, assets, etc.) to obtain, join, or make a, which may include but not be limited to (e.g., video chat live or make a live call with another user, etc.) for any reason or to decide if a person wants to, which may include but not be limited to (e.g., spend more, pay more, book more, keep booking, etc.) which may include but not be limited to (e.g., bid, buy, pay, submit assets, book virtual, book talk, book chat, book video chat, book video meeting, book voice conversation, date, book or buy a date with her or spend any money, or any capacity of spending money or exchanging value, or giving up something of value, etc.) In some embodiments, the bidder may choose to schedule through, which may include but not be limited to (e.g., proprietary system, user interface, screen, platform, etc.) to schedule may consist of but not be limited to (e.g., a live video call for the bidder, etc.) for example may be including but not limited to decide if, which may include but not be limited to (e.g., 'the bidder' 'the high-value dater' wants to go on a date with her ('the creator' etc.) In some embodiments, which may include but not be limited to (e.g., a high price, a set price, a user-chosen price, or a decided set of acceptable assets) may be used to schedule the, which may include but not be limited to (video chat date, in-person date, subscription, follower, follow, etc.)

In some embodiments, which may include but not be limited to (e.g., a bidder, user, person, public person) whether signed in or not signed in, may have the option to schedule, which may include but not be limited to (e.g., live video call, etc.) with, which may include but not be limited to (e.g., payment or asset exchange method) through the, which may include but not be limited to (e.g., proprietary system, platform, or 3rd party system, etc.) to potentially determine if user may want to go on a date with a particular, which may include but not be limited to (e.g., creator, model, person, user, etc.) In some embodiments, sure may have to pay or not pay to, including but not limited to (e.g., schedule a call, chat, message, in-person date, in-person meeting, in-person activity, etc.) In some embodiments, which may include but not be limited to (e.g., food or date activity or date-related apparatus or items, etc.) may be ready, which may include but not be limited to (e.g., upon arrival or soon after arrival when the date is supposed to be taken place, etc.) In some embodiments, dates or meetings may be pre-picked or pre-planned. Some embodiments may include but are not limited to (e.g., tables, food, items, date activities, such as a paid table, meal, and section to be seated in, etc.) In some embodiments, user may be able to choose, which may include but not be limited to (e.g., server, person to book, schedule, inquire about, inquire about, inquire regarding, secure, create connection to, hold, pay for, create business relationship with, use transmittables to secure or book, schedule, inquire about, etc.) date with, host of date, date preferences, date options, date team, hair, makeup, stylists, users, people around, workers, employees, people, dates, activities, etc.)

Theme/uniform purchase/order options: In some embodiments, which may include but not be limited to (e.g., uniform, theme, similar, created, etc.) options to purchase form the, which may include but not be limited to (e.g., platform, app, site, etc.) directly for/from, which may include but not be limited to (e.g., 'creators,' models, creators, etc.) that want to have a, which may include but not be limited to (e.g., uniform-themed photo, uniformed item, uniformed shoot, etc.) with the, which may include but not be limited to (e.g., logo/brand/theme of the platform/site/app, etc.) In some embodiments, theme/uniform purchase options for the 'daters' may be available to purchase from the, which may include but not be limited to (e.g., platform, 3rd party, etc.) In some embodiments, any, which may include but not be limited to (e.g., person/entity, user, subscriber, mode, etc.) which may include but not be limited to (e.g., 'fan' or 'dater' or 'subscriber' or 'high-value dater' etc.) on the, which may include but not be limited to (e.g., platform/app/site, 3rd party integrations, other areas, other platforms, applications etc.) may be choose to purchase, which may include but not be limited to (e.g., pre-made uniform/themed, pre-made items, pre-made purchasing items, etc.) purchasing items from the, which may include but not be limited to (e.g., site/or a third party that may sell licensed versions of the theme/site/platform, etc.) In some embodiments, which may include but not be limited to (e.g., a 'bidder,' user, paying person, public person, etc.) may be choose to pick a 'group date' which may include 'model' plus one or more or more, which may include but not be limited to (e.g., 'creators' 'model' etc.) to accompany the, which may include but not be limited to (e.g., 'bidder' 'fan' or 'dater buyer,' user, etc.) to the activity such as, which may include but not be limited to (e.g., dinner, lunch, coffee, pre-approved date choice, etc.)

Pre-chosen and listed/chosen 'closed: In some embodiments, 'creators' may be have 'pre-picked' suggestions for their own, which may include but not be limited to (e.g., friend, other model, other creator, other user etc.) that are also on the platform that may appear on their profile, information packet, information suggestion on the platform, on any advertisements, etc.) In some embodiments, The 'pre-picked,' which may include but not be limited to (e.g., friend, other model, other creator, other user etc.) may be chosen to, which may include but not be limited to (e.g., appear on their profile or chosen to be hidden, etc.) or be chosen to be shared with, which may include but not be limited to (e.g., only specific 'bidders' 'potential bidders' 'fans' etc.) or a part of the 'subscription unlocks' which may then show who the 'creator/model' has available as suggestions for their, which may include but not be limited to (e.g., friend, other model, other creator, other user etc.) to add to the potential 'date' chosen by, which may include but not be limited to (e.g., 'bidder,' paying person, etc.) In some embodiments, model may choose to not allow 'dates' with any other (e.g., friend, other model, other creator, other user etc.) on the, which may include but not be limited to (e.g., platform, user interface, etc.) which may include but not be limited to (e.g., friend, other model, other creator, other user etc.) which may mean, which may include but not be limited to (e.g., 'other creators or models etc.) on the, which may include but not be limited to (e.g., platform, user interface, off the platform, etc.) In some embodiments, the model may choose to only allow 'group' dates with these, which may include but not be limited to (e.g., women, users, persons, etc.) or may be open to 'other, which may include but not be limited to (e.g., friend, other model, other creator, other user, 3rd party persons, outside persons, etc.) On the, which may include but not be limited to (e.g., platform, user interface, etc.) In some embodiments, 'other, which may include but not be limited to (e.g., friend, other model, other creator, other user etc.) means other, which may include but not be limited to (e.g., women/creators on the platform, user interface, 3rd party, outside, etc.) that the 'creator' may not/or may know personally.

In some embodiments, on our, which may include but not be limited to (e.g., platform, interfaces, interface, etc.) users, which may include but not be limited to (e.g., referred to as 'creators') may have the option to suggest other users, which may include but not be limited to (e.g., referred to as friend(s), other model, other creator, other user etc.) to appear on their, which may include but not be limited to (e.g., profile, advertisement materials, and information packets etc.) In some embodiments, these 'pre-picked,' which may include but not be limited to (e.g., friend, other model, other creator, other user etc.) may be made, which may include but not be limited to (e.g., visible or hidden, etc.) to certain audiences, such as, which may include but not be limited to (e.g., 'bidders,' 'potential bidders,' or 'fans, etc.) In some embodiments, the option to view a creator's suggested, which may include but not be limited to (e.g., friend, other model, other creator, other user etc.) may also be, which may include but not be limited to (e.g., unlocked, viewed, secured, etc.) through a, which may include but not be limited to (e.g., subscription, payment options, payment, exchangeable, etc.) In some embodiments, which may include but not be limited to (e.g., creators, models, persons, users, etc.) have the choice to allow or disallow dates with their suggested, which may include but not be limited to (e.g., friend, other model, other creator, other user etc.) or to, which may include but not be limited to (e.g., only allow, opt-into, agree to, confirm, etc.) which may include but not be limited to (e.g., group dates, more than one person, multiple bookings, etc.) In some embodiments, which may include but not be limited to (e.g., models, persons, users, etc.) may also choose to be, which may include but not be limited to (e.g., open to, allow, accept, confirm, etc.) dates with, which may include but not be limited to (e.g., other users on the platform, user interface, who they do not, or do, personally know, outside users, outside person, etc.)

In some embodiments, there may be an option for, which may include but not be limited to (e.g., open-for-friend-model-creator-group-dates, or open for others to join dates, or open for adding on dates, or open for others to add on dates, or open to party dates, or open to group dates, etc.) In some embodiments, which may include but not be limited to (e.g., 'bidder' or 'paying person etc.) may be choose any, which may include but not be limited to (e.g., group of women, group, categories, selection, group-selection, etc.) to go on a, which may include but not be limited to (e.g., date, connection, party, event, etc.) with as a, which may include but not be limited to (e.g., 'package deal,' or one time check out or one time pay, or separate pay for one event, or separate pay for different events or booking etc.) In some embodiments, the, which may include but not be limited to (e.g., 'creators' or 'models' etc.) may have to all each individually, which may include but not be limited to (e.g., 'agree,' confirm, accept, opt-in etc.) on their, which may include but not be limited to (e.g., profile/settings/notifications, message, contact etc.) with the platform that the 'model' is, which may include but not be limited to (e.g., 'available,' accepting, wanting, confirming, opting in, etc.) for, which may include but not be limited to (e.g., 'open group dates, to be added to another date, to be accepted with other persons, to be added to a connection meeting for any time period, etc.) with other, which may include but not be limited to (e.g., friend, other model, other creator, other user etc.) on the, which may include but not be limited to (e.g., platform, user interface, etc.) In some embodiments, 'open for model-group dates' may, which may include but not be limited to (e.g., suggest or be suggested or be added, or be confirmed or paid for, etc.) with, which may include but not be limited to (e.g., artificial intelligence or other means in the area of suggestion, human, 3rd parties, advertisers, advertisements, businesses, persons, users, bidders, other groups, entities, etc.) for 'group dates' next to her picture, pictures of other 'potential group date options.' In some embodiments, options may be chosen by, which may include but not be limited to (e.g., computing operation and on artificial intelligence, humans, 3rd parties, advertisers, advertisements, businesses, entities, etc.) to potentially suggest potential, which may include but not be limited to (e.g., 'group packages, group suggestions, more than one model, types of dates, types of categories, etc.) to the potential, which may include but not be limited to (e.g., 'bidder' 'fan' 'high-value dater etc.) In some embodiments, which may include but not be limited to (e.g., 'high value dater' etc.) may be defined as any person which may include but not limited to (e.g., spending money or using platform, any person, etc.)

In some embodiments, a, which may include but not be limited to (e.g., 'high-value dater, bidder, fan, the person paying, etc.), may have the option to choose any which may include but not limited to (e.g., group of women, any selection, any person, any user, any multiple users, any persons, any quantity of persons, etc.) to go on a date with as a, which may include but not limited to (e.g., package deal, package item, grouped item, grouped payment, separate payment, each payment, together payment, etc.) In some embodiments, the models can agree to participate in open group dates with other women on the platform. Artificial intelligence may be used to suggest potential group date options and package options to you. These suggestions will be based on computing operations and artificial intelligence in some embodiments. Closed-model-group-dates: the 'creator' may not want to go on 'Model-group dates which may include but are not limited to (e.g., other women or multiple women, multiple persons, multiple people, etc.) Closed-model-group-dates: In some embodiments, If the, which may include but not be limited to (e.g., 'creator' etc.) may not want to go on, which may include but not be limited to (e.g., 'Model-group dates with other women or models or persons, etc.) On the, which may include but not be limited to (e.g., platform, user interface, etc.) For example which may be including but not limited to, which may include but not be limited to (e.g., that the model may not know, may know' etc.) she, which may include but not be limited to (e.g., she may be defined as any person on platform or any person being paid etc.) the creator may be choose to, which may include but not be limited to (e.g., opt out of that etc.) and potentially choose to only/choose to opt-in to, which may include but not be limited to (e.g., 'closed-model-group-dates only etc.) In some embodiments, which would then show on her profile that, which may include but not be limited to (e.g., the user or she, etc.) which may include but not be limited to (e.g., prefers, only, etc.) goes on group dates with a choice of 'one or more' of the, which may include but not be limited to (e.g., 'known, accepted, pre-approved, chosen, etc.) which may have but not be limited to (e.g., (e.g., friend, another model, another creator, another user, etc.) listed on her, which may include but not be limited to (e.g., profile/settings/platform information, etc.)

Theme and/or uniform purchase options: uniform options to purchase from the, which may include but not be limited to (e.g., platform, app, interface, etc.) which may include but not be limited to (e.g., directly, or available, or there, or integrated, etc.) Theme/uniform purchase options: In some embodiments, which may include but not be limited to (e.g., uniform, theme, similar, created, etc.) options to purchase form the, which may include but not be limited to (e.g., platform, app, site, etc.) directly for/from, which may include but not be limited to (e.g., 'creators,' models, creators, etc.) that want to have a, which may include but not be limited to (e.g., uniform-themed photo, uniformed item, uniformed shoot, etc.) with the, which may include but not be limited to (e.g., logo/brand/theme of the platform/site/app, etc.) In some embodiments, theme/uniform purchase options for the 'daters' may be available to purchase from the, which may include but not be limited to (e.g., platform, 3rd party, etc.) In some embodiments, any, which may include but not be limited to (e.g., person/entity, user, subscriber, mode, etc.) which may include but not be limited to (e.g., 'fan' or 'dater' or 'subscriber' or 'high-value dater' etc.) on the, which may include but not be limited to (e.g., platform/app/site, 3rd party integrations, other areas, other platforms, applications, etc.) may choose to purchase, which may include but not be limited to (e.g., pre-made uniform/themed, pre-made items, pre-made purchasing items, etc.) buying things from the, which may include but not be limited to (e.g., site/or a third party that may sell licensed versions of the theme/site/platform, etc.)

In some embodiments, there may be a, including but not limited to (e.g., transportation service or a 3rd party transportation service that transports users, etc.) In some embodiments, safety features may be enabled for transportation services, including but not limited to (e.g., before after, during the date, during connection, afterward, and until indefinite times, etc.) In some embodiments, if a user may not, including but not limited to (e.g., getting into a vehicle after a date, if some alarm goes off, or if there is suspicion of a dangerous situation occurring or has occurred, etc.) In some embodiments, which may include but not be limited to (e.g., a portion of the money, proceeds, revenue, etc.) may go to, which may include but not be limited to (e.g., charity organizations at the discretion of platform or 3rd parties, advertisers, advertisements, businesses, etc.) Some embodiments may include but not be limited to (e.g., non-profit organizations may be donated to, etc.) In some embodiments, which may include but not be limited to (e.g., profits, revenues, etc.) may be donated to, which may include but not be limited to (e.g., non-profit organizations, 3rd parties, advertisers, advertisements, businesses, entities, persons, groups, charities, etc.)

FIG. 260, FIG. 261, FIG. 262, FIG. 263, FIG. 264, FIG. 265: In some embodiments, which may include but not be limited to (e.g., interface(s) or platform, etc.) which may include but not be limited to (e.g., one or more types of profiles, etc.) which may include but not be limited to (e.g., for example: a profile interface may show different types or categories, or types, or different versions or different actress roles or different category types, for example: a school teacher, girl next door, friendly, businesswoman, model, supermodel, etc.] [In some embodiments, interface(s) or platform may allow, which may include but not be limited to (e.g., book date, book virtual, book in-person date, message, send inquiry, send tip, about, date cheat sheet, gallery 1, gallery 2, content set 1, content set 2, any content set, any demonstration, any content, etc.) [In some embodiments, interface(s) or platform may allow, which may include but not be limited to (e.g., book for meeting, time, day, location, duration, calendar, etc.) [In some embodiments, interface(s) or platform may allow user to make their own (e.g., date log, data log, information log, connection log, user log, dater log, etc.) which may include but not be limited to (e.g., type, create, create new, create new data log, create new date log, add signature, location, location tracking, location: place, location: manually add, location: automatically added, location: type in location, amount, total, amount paid, amount: type in amount, amount: automatically added, amount: manually added, amount received, notes, information, GPS data, GPS location, 3rd party data tracking, calendar integration, calendar information, calendar, etc.) [In some embodiments, interface(s) or platform may allow, which may include but not be limited to (e.g., buy now price, price, current bid price, current auction price, add to list, send message, make offer, bid, bidding, prices, auction information, auction, type in offer, type offer in, reserve price, reserve amount, content, scrolling content, gallery content, moving content, any content, content, photos, videos, information, etc.) [In some embodiments, interface(s) or platform may allow, which may include but not be limited to (e.g., if [offer/bid/auction] price is not enough to reach reserve price, there may be an automatic or a manual rejection of offer, offer may also be considered above a certain amount or any amount set, any amount may be able to set by platform or user, any prices may be able to set by platform or user, etc.) [In some embodiments, interface(s) or platform may allow, which may include but not be limited to (e.g., rows, pages, areas, scrolling, stacks, stacked, etc.) of any (e.g., live streams, live content, promotional content, profiles, pictures, bids, auctions, prices, videos, series, movies, etc.) which may have (e.g., follow, follow for free, subscribe, subscribe price, view photoshoots, view content, book in-person, book virtual, message, etc.)

In some embodiments, which may include but not be limited to (e.g., interface(s) or platform, etc.) may allow, which may include but not be limited to (e.g., connection, date, virtual date, entertainment options set by anyone or model or user, in-person date, meeting, business meeting, etc.) which may involve any persons (e.g., public, private, celebrities, public persons, actresses, models, singers, dancers, CEOs, business persons, etc.) which may involve (e.g., bidding, bids, auctions, public auctions, private auctions, membership-only auctions, subscriber-only auctions, subscriber auctions, model auctions, model dates, proceeds going to charity, raising money for charity, raising money for any reason, raising money for any business person or business reason, payment, transmittables, dinner details, lunch details, duration, time, place, surprises, no surprises, who it is, content, persons, type of date, type of auction, type of category, type of bidding, type of payment, whether refundable or not refundable, price, bid price, reserve price, each meeting price, reservation price, etc.)]

Figure 267:
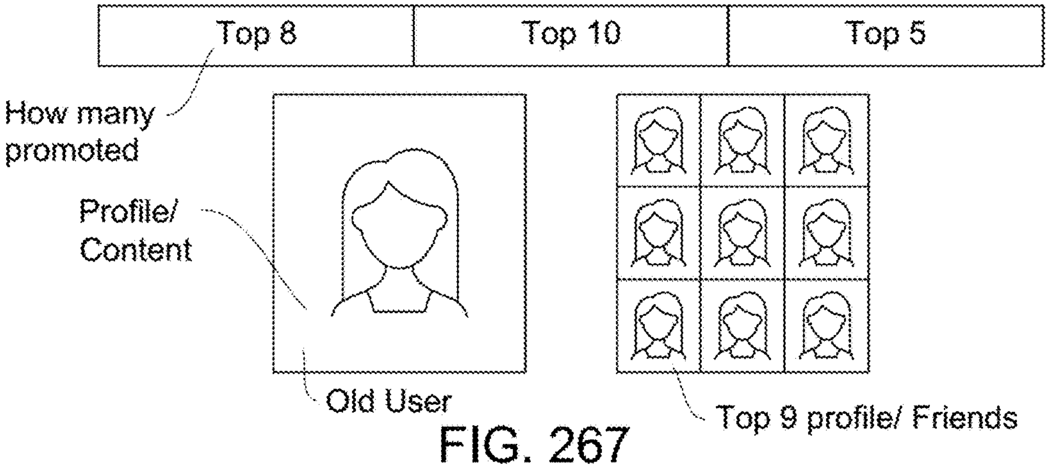
Figure 268:
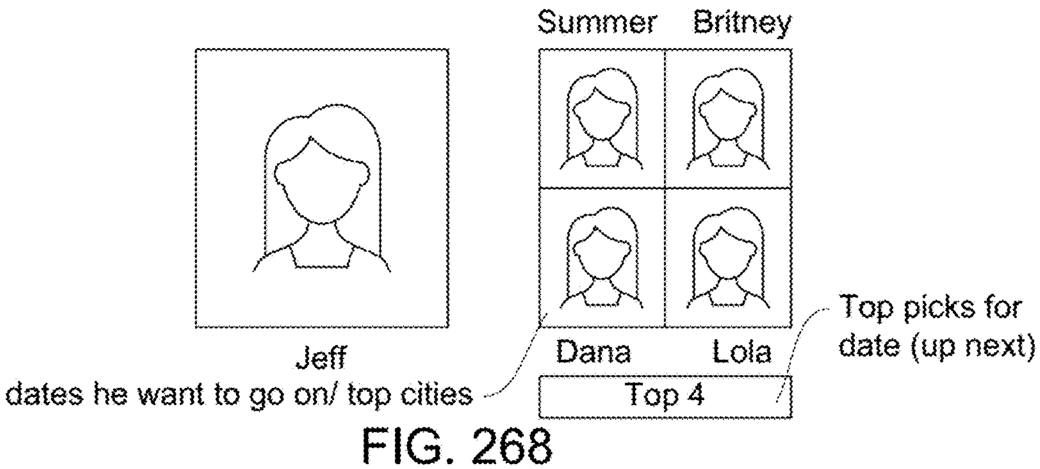
Figure 271:
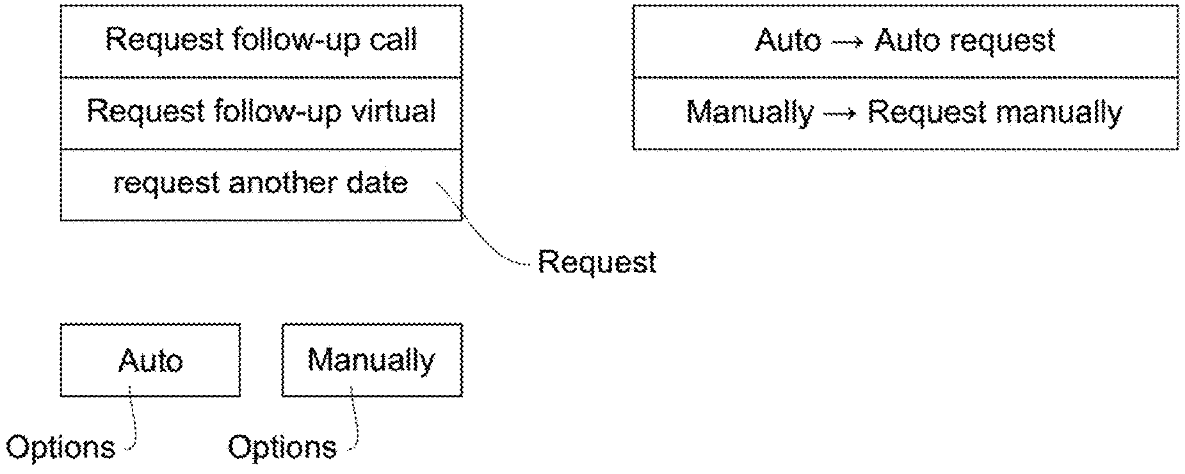
Figure 272:
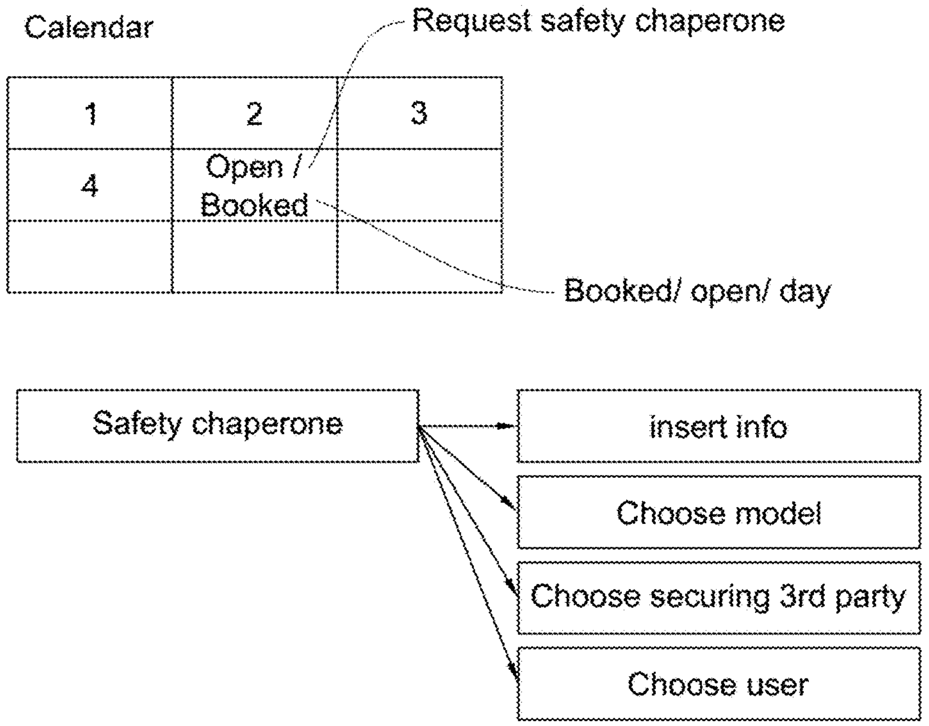

FIG. 267, FIG. 268: In some embodiments, which may include but not be limited to (e.g., interface(s) or platform, etc.) may allow, which may include but not be limited to (e.g., any combination of any top profiles, or top daters, or top dates, or top calendars, or top profiles, or top galleries, or top models, or top creators, users, persons, entities, etc.) In some embodiments, which may include but not be limited to (e.g., interface(s) or platform, etc.), may allow (e.g., movement, exchange, transmittables, moving around, swiping profiles, switching profiles, or persons or entities, etc.) which may include but not be limited to (e.g., top models, top 1, top 2, top 3, top 4, top 5, top 6, etc.) In some embodiments, which may include but not be limited to (e.g., top lists of models to book a date with, top promoted models on profiles, top listed profiles, users' list of profiles to be up next for a date, or to be subscribed to, etc.)

FIG. 269, FIG. 270, FIG. 271, FIG. 272: In some embodiments, which may include but not be limited to (e.g., interface(s) or platform, etc.) may allow (e.g., goods, services, bills, things, lists, items, etc.) which may include but not be limited to (e.g., user, model, or person, etc.) which may include but not be limited to (e.g., needs help with, wants, needs, etc.) which may include but not be limited to (e.g., dog care, doggy daycare, nanny, babysitter, food, gas, utilities, dog care, gas makeup, bills, daycare for dogs, donations, assistance, etc.) In some embodiments, which may include but not be limited to (e.g., interface(s) or platform, etc.) may allow a, which may include but not be limited to (e.g., breakdown, itemized receipt, receipt, breakdown of costs, no breakdown of costs and just the total, just the total, taxes, fees, dinner, lunch, virtual date, entertainment options set by anyone or model or user, meeting, etc.) In some embodiments, which may include but not be limited to (e.g., interface(s) or platform, etc.) may allow options from, which may include but not be limited to (e.g., calendar, interface(s), management center, editing center, business management center, interface(s), platform, timing data, timing methods, etc.) In some embodiments, which may include but not be limited to (e.g., interface(s) or platform, etc.) may allow safety chaperone options, which may include but not be limited to (e.g., booking safety chaperone from calendar, booking safety chaperone from management system, booking safety chaperone from any interface(s), etc.) In some embodiments, which may include but not be limited to (e.g., interface(s) or platform, etc.) which may allow after choosing safety chaperone or its options it may give the option to, which may include but not be limited to (e.g., insert safety chaperone information manually or automatically, choose model to be safety chaperone, choose user to be chaperone/security, choose security to be safety chaperone/security, choose 3rd party to be safety chaperone, choose any 3rd party to be chaperone/security, etc.)

Figure 273:
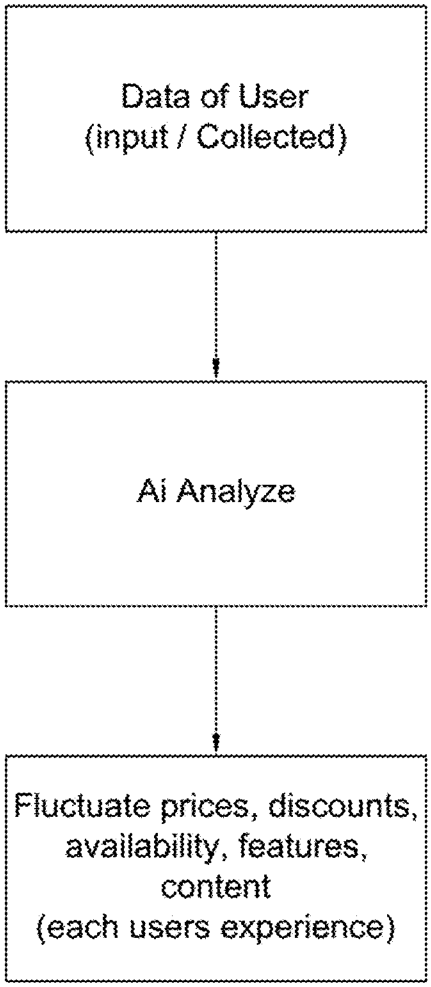

FIG. 273: In some embodiments, which may include but not be limited to (e.g., data, inputted data, AI-analyzed data, data, etc.) which may include but not be limited to, (e.g., age range, age, demographics, net worth, amount spent, funds in account, frequencies of dates, booked dates, virtual dates, in-person dates, history, history of dates, preferences, computing operation data gathered, gathered data, amount of money spent, frequencies of dates, time spent on platform, login frequencies, demographic data, looks, what content or availability, or features to show on profile based on age range features, etc.) may be used to, which may include but not be limited to (e.g., automatically, manually, or AI-changed, or AI-determined, manually change, automatically change or etc.) which may include but not be limited to (e.g., fluctuate, change, determine, etc.) which may include but not be limited to (e.g., prices, location, availability, features, experience, options that are available, content being shown, etc.)

FIG. 273: In some embodiments, which may include but not be limited to (e.g., content, moving content, squares or shapes with content, profiles, profiles photos, profile content, moving content, playing content, content that is moving, photos, images, selections, pictures, etc.) may have, which may include but not be limited to (e.g., prices, price, current price, in-person price, virtual price, date price, booking price, scheduling price, etc.). In some embodiments, there may be options to view multiple contents with pricing or opportunities, or options to view singular or a few profiles or content options with pricing or booking information, etc.) In some embodiments, swiping, tapping, switching, automatic replacement of content, or any replacement or a replacement or automatic replacement, automatic movements, automatic showing, slideshow, content moving in any direction by itself, or content moving based on human or command movements.

Figure 274:
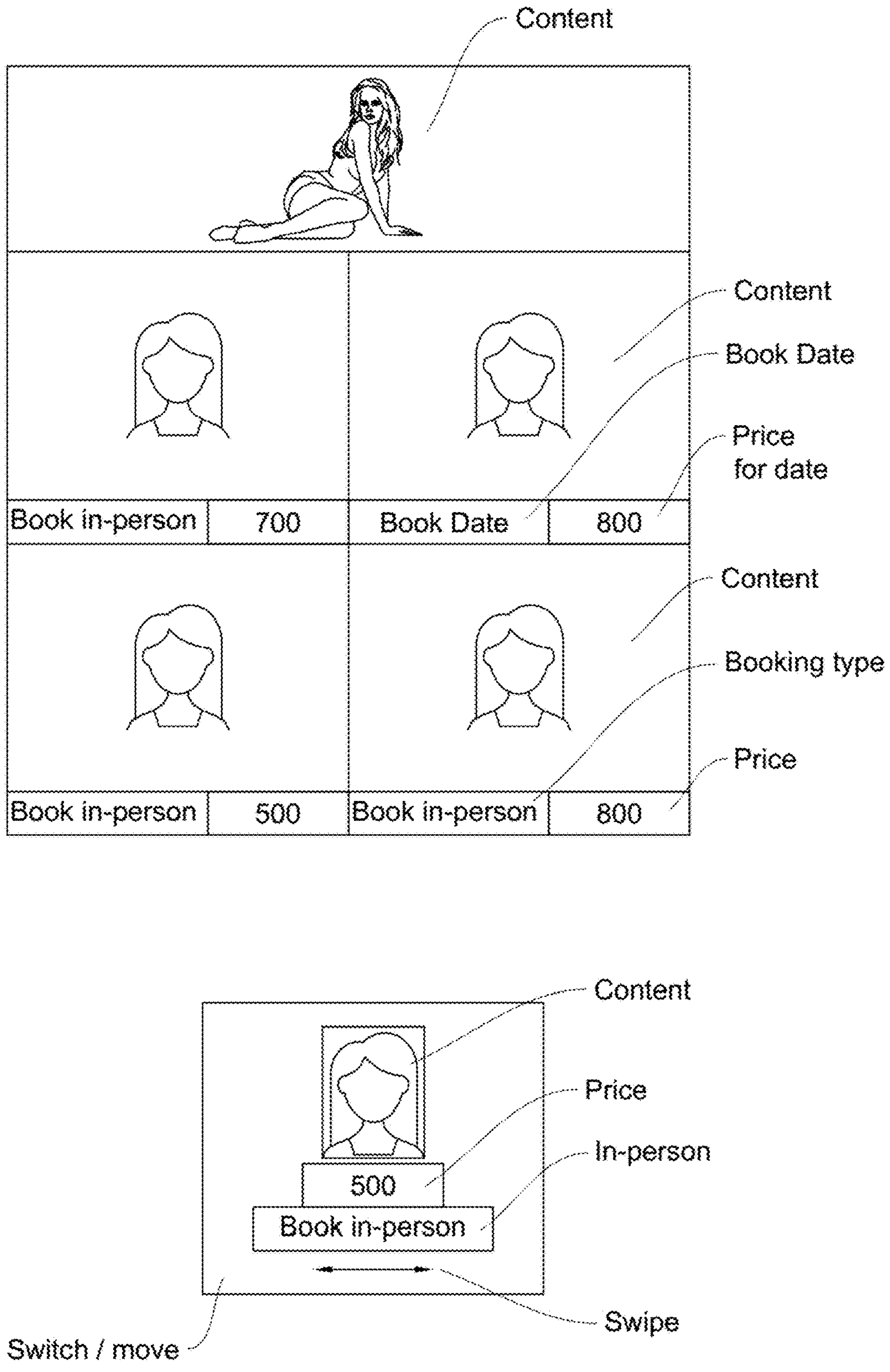

FIG. 274: In some embodiments, which may include but not be limited to (e.g., swiping, matching, browsing, or any other connection source or display, etc.) may display, which may include but not be limited to (e.g., pricing, type, content, information, etc.)

Figure 275:
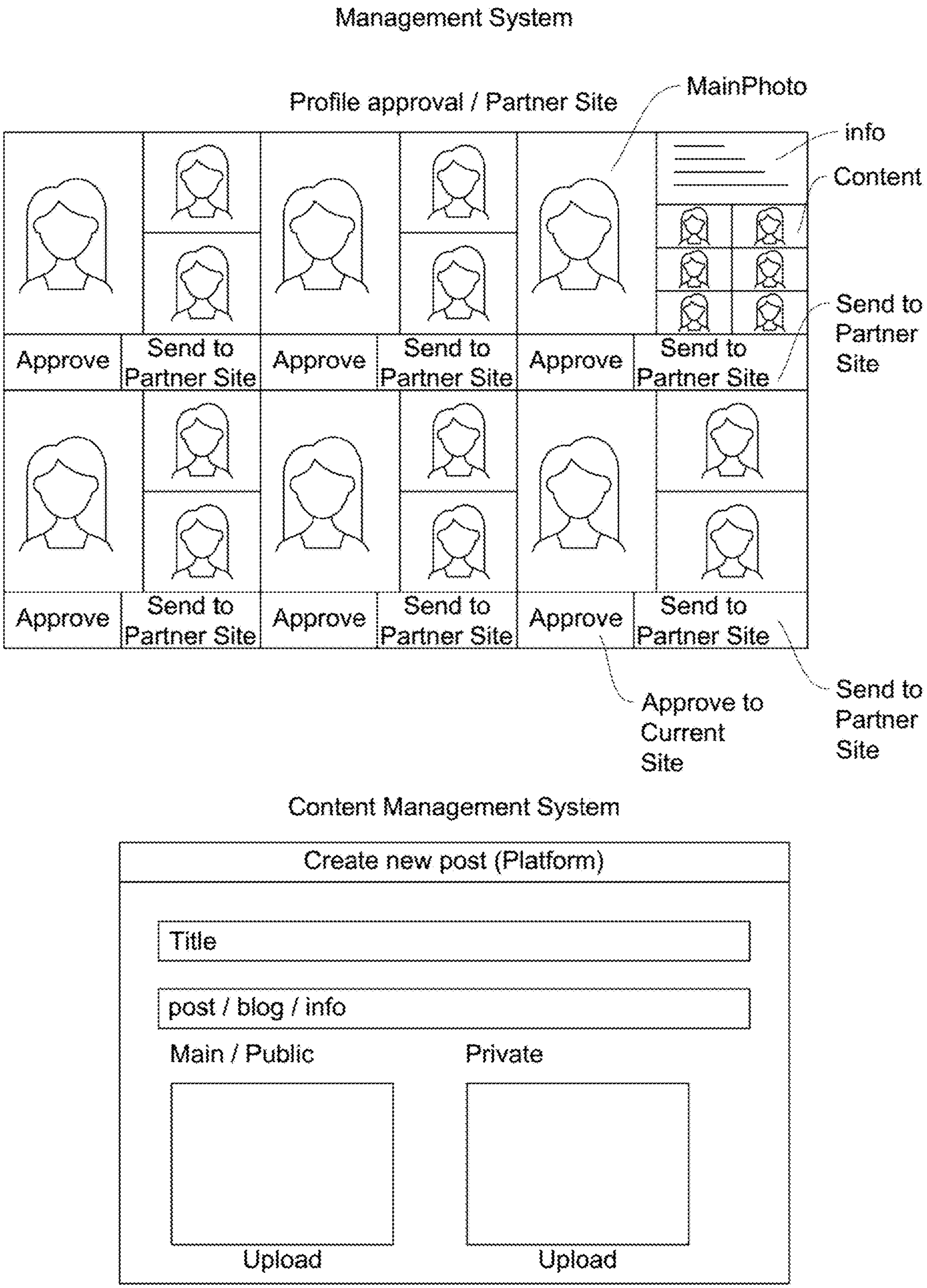
Figure 276:
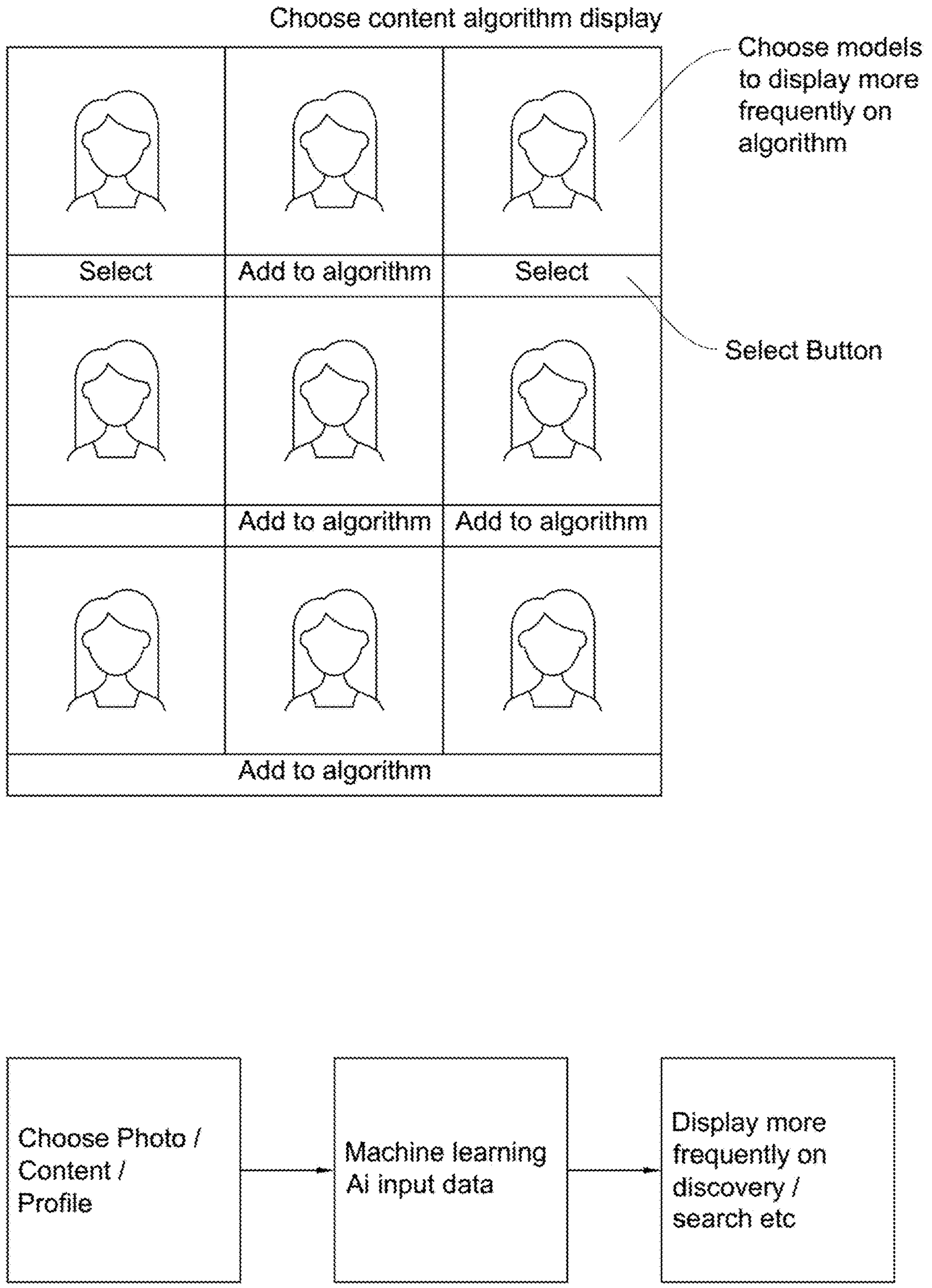
Figure 277:
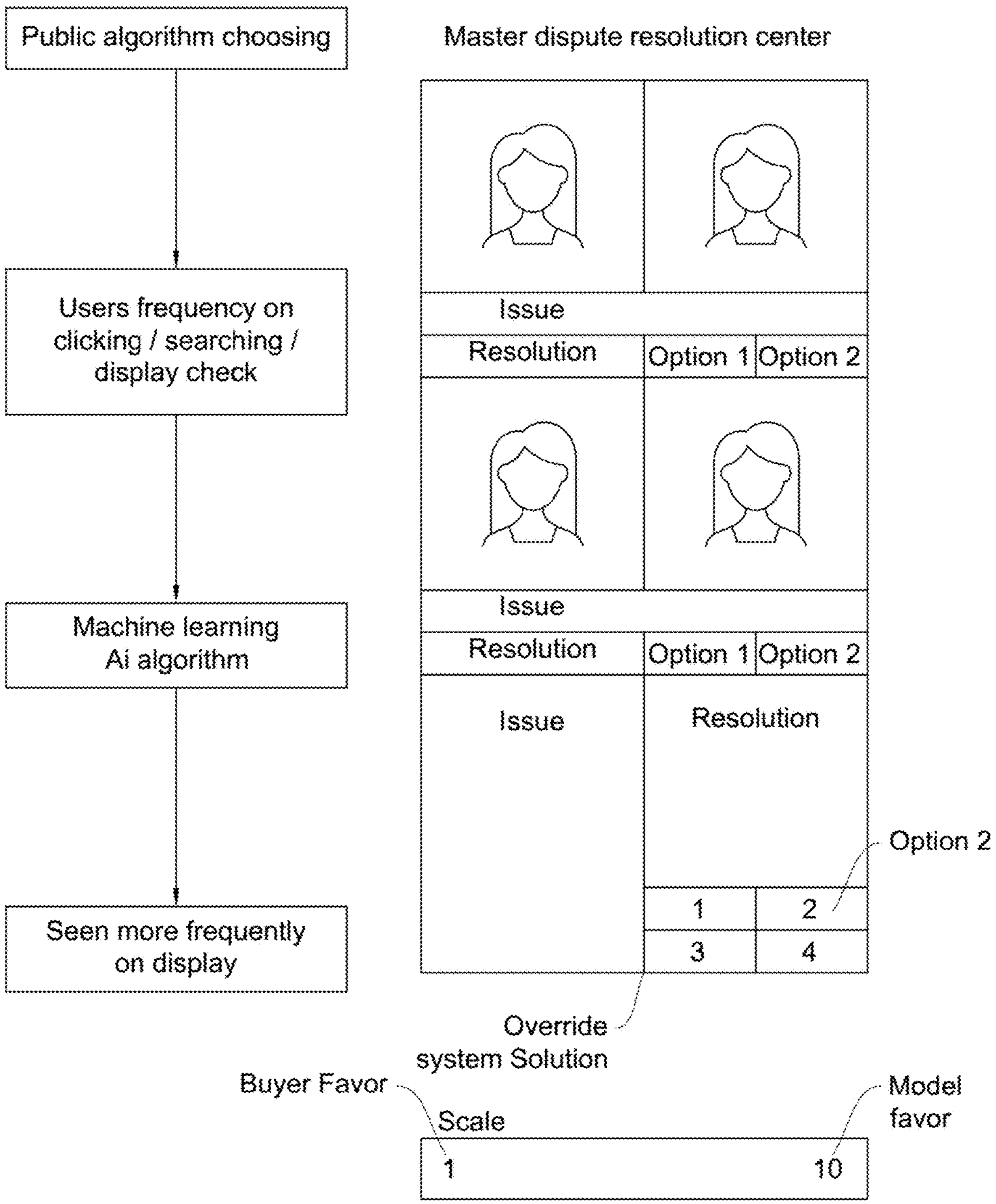
Figure 278:
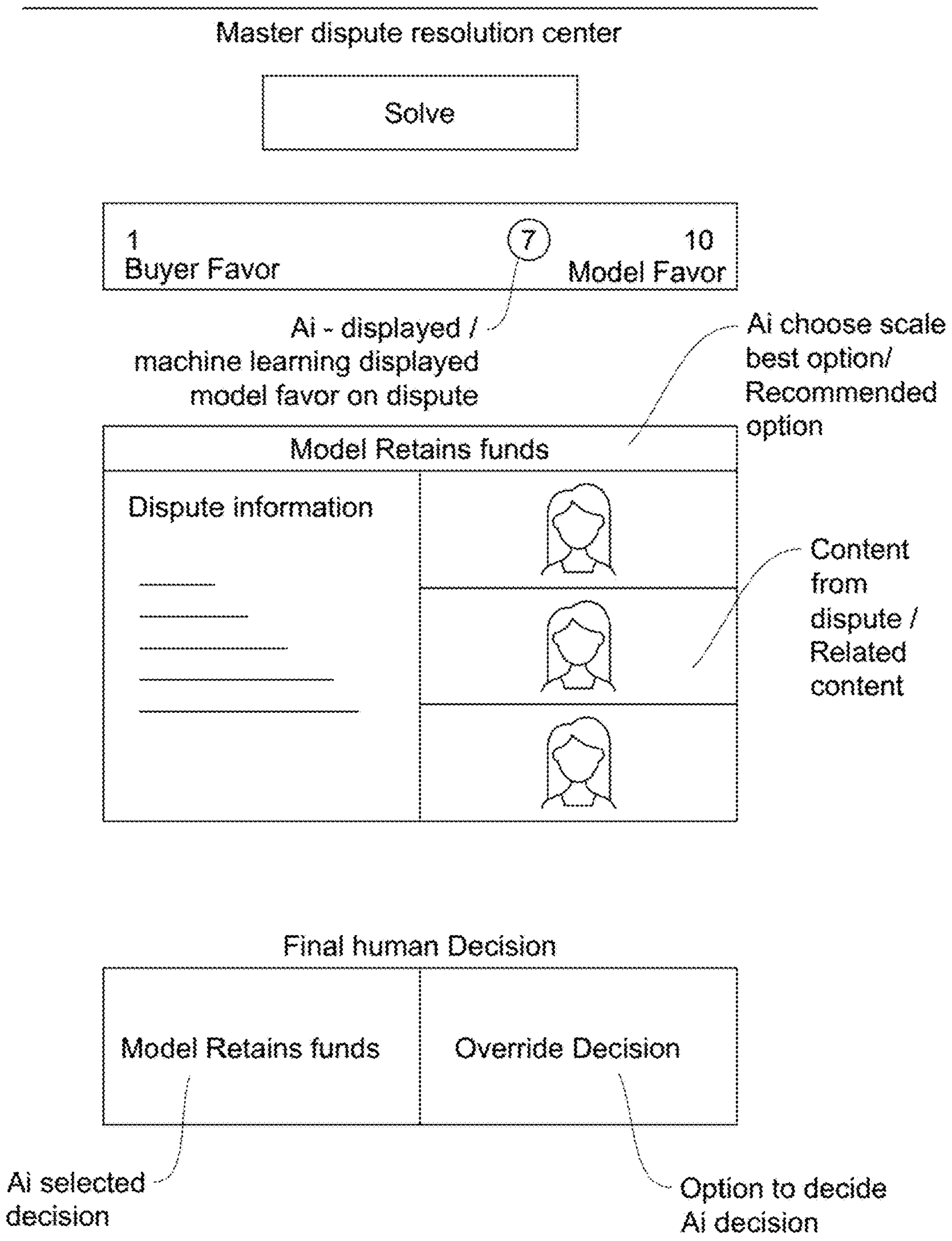
Figure 279:
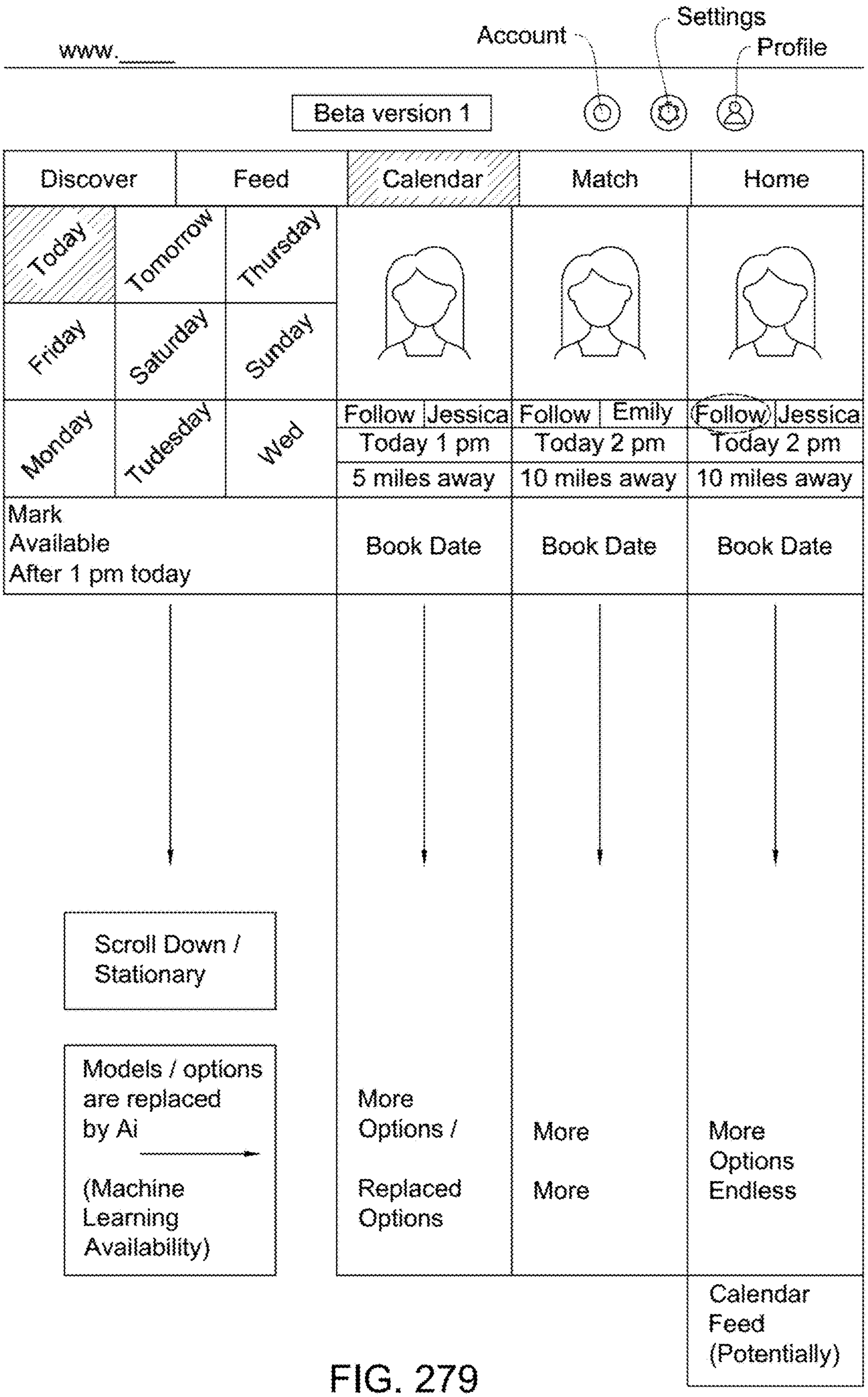
Figure 280:
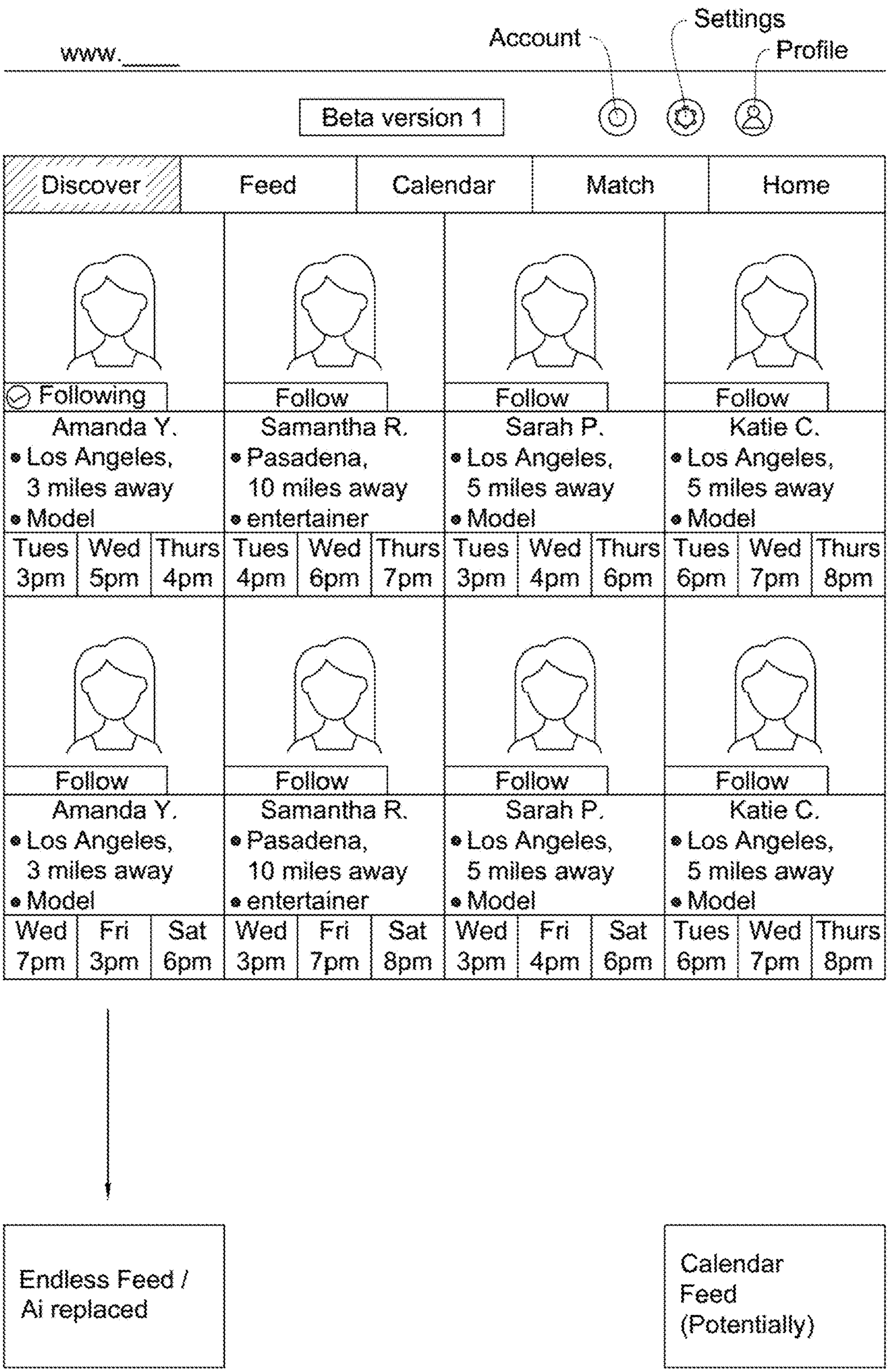
Figure 281:
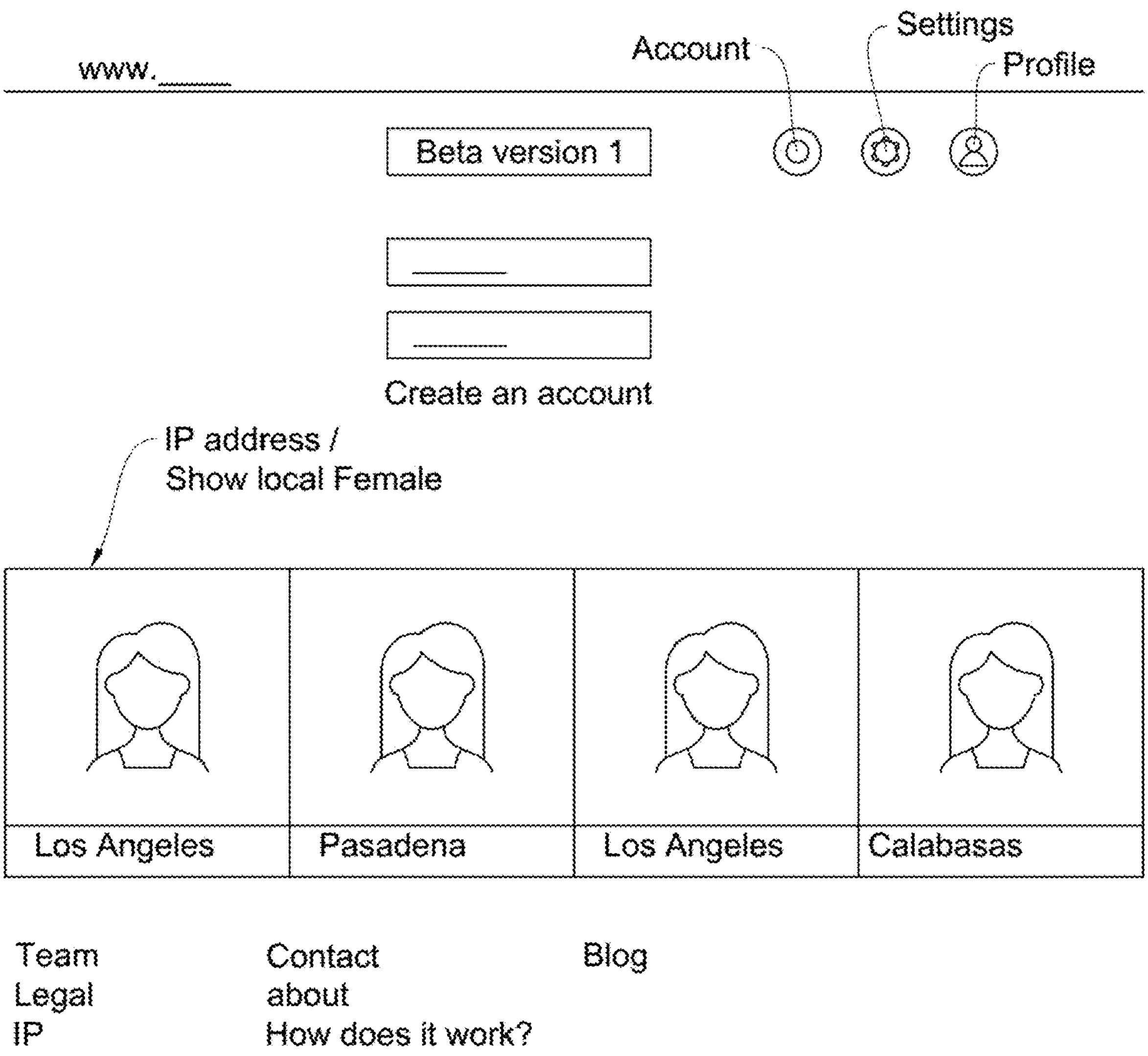
Figure 282:
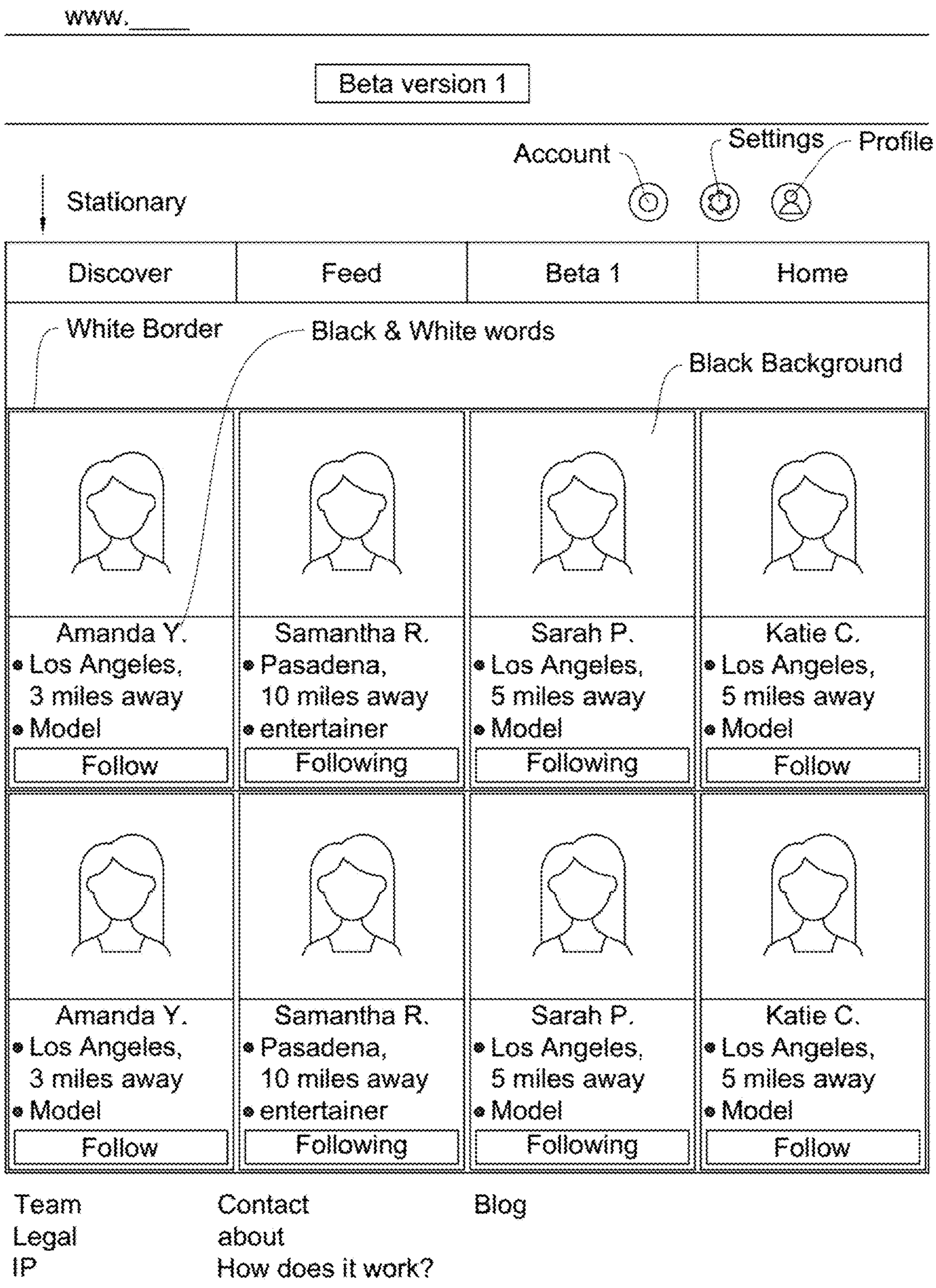
Figure 283A:
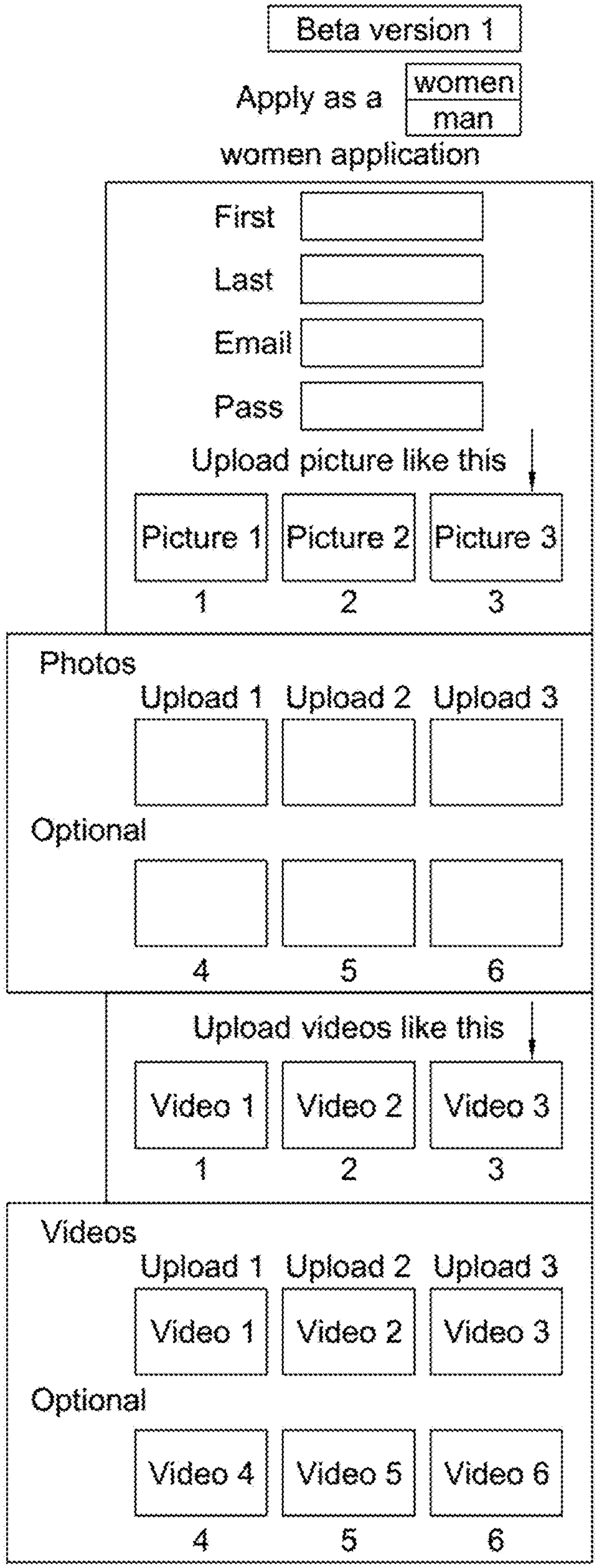
Figure 283B:
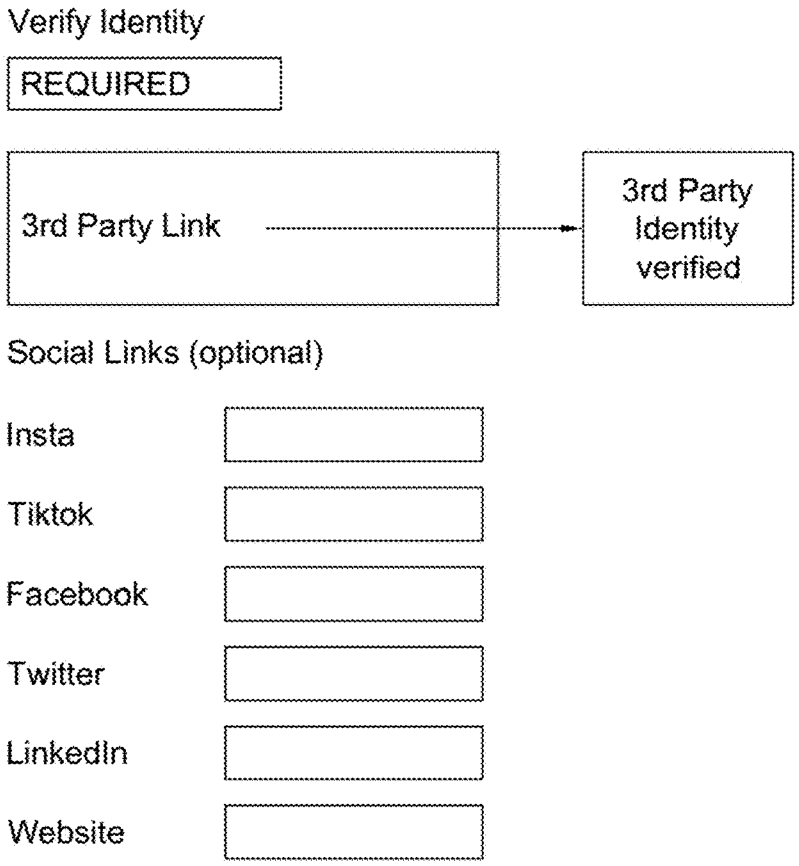
Figure 284:
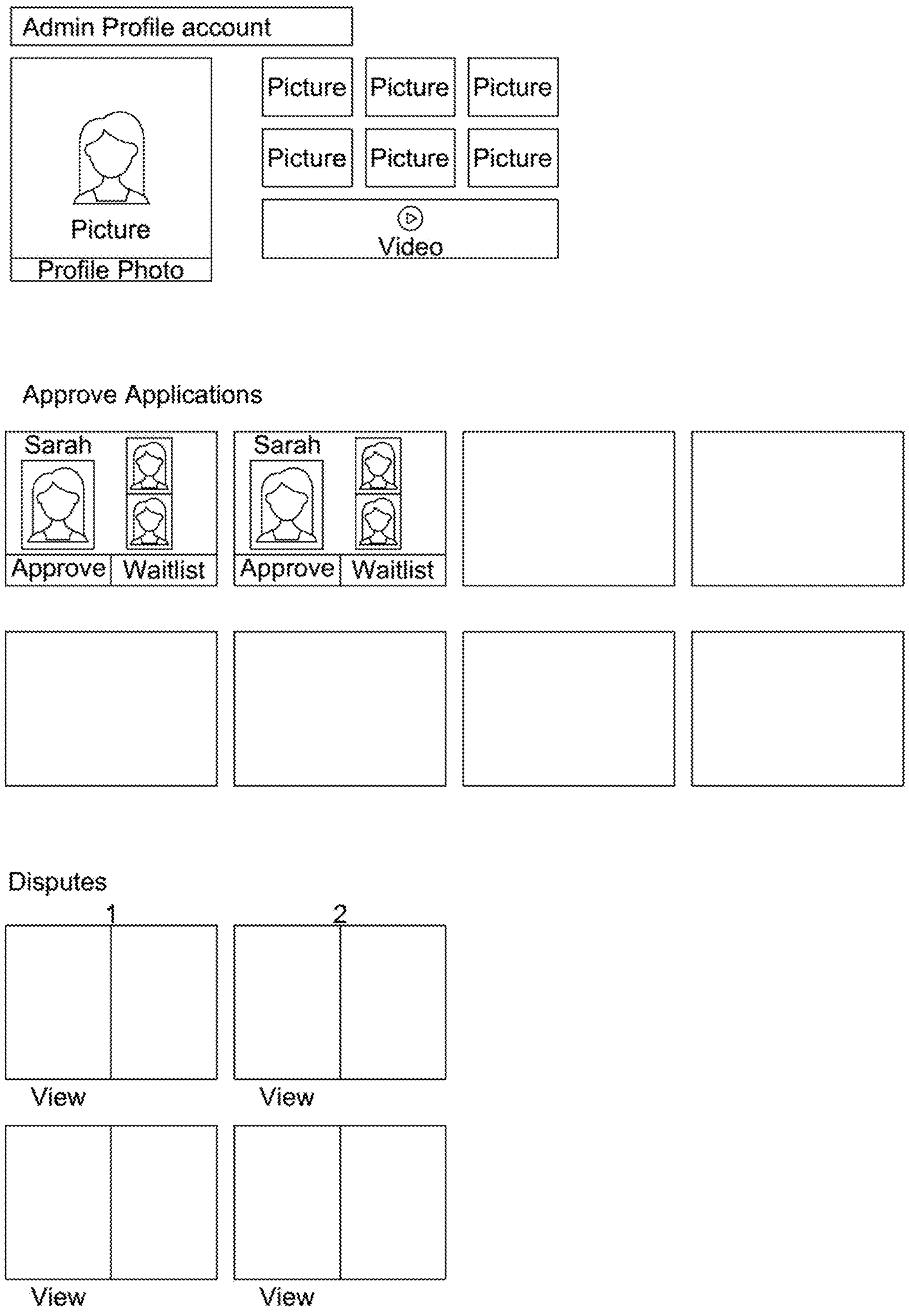
Figure 285A:
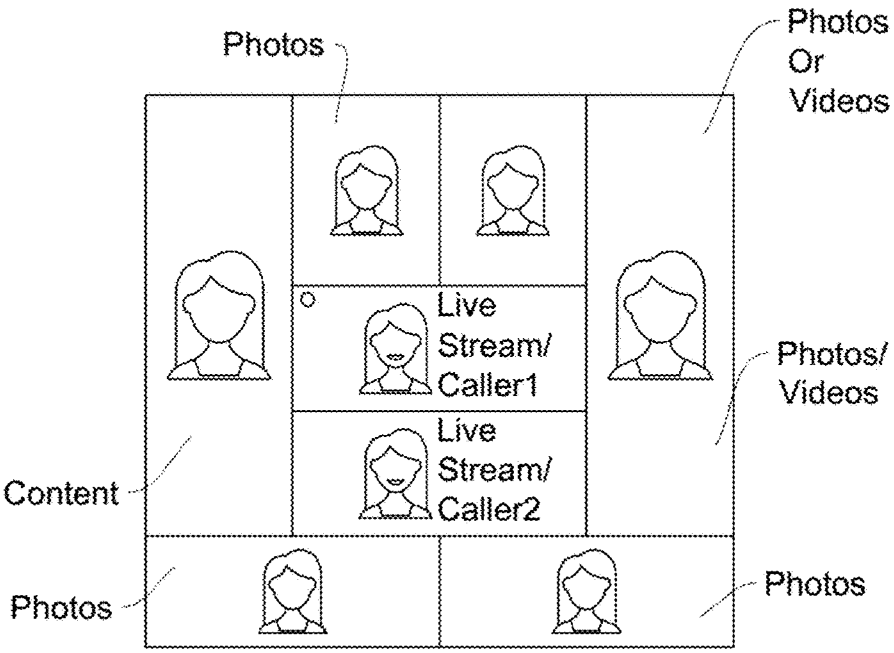
Figure 285B:
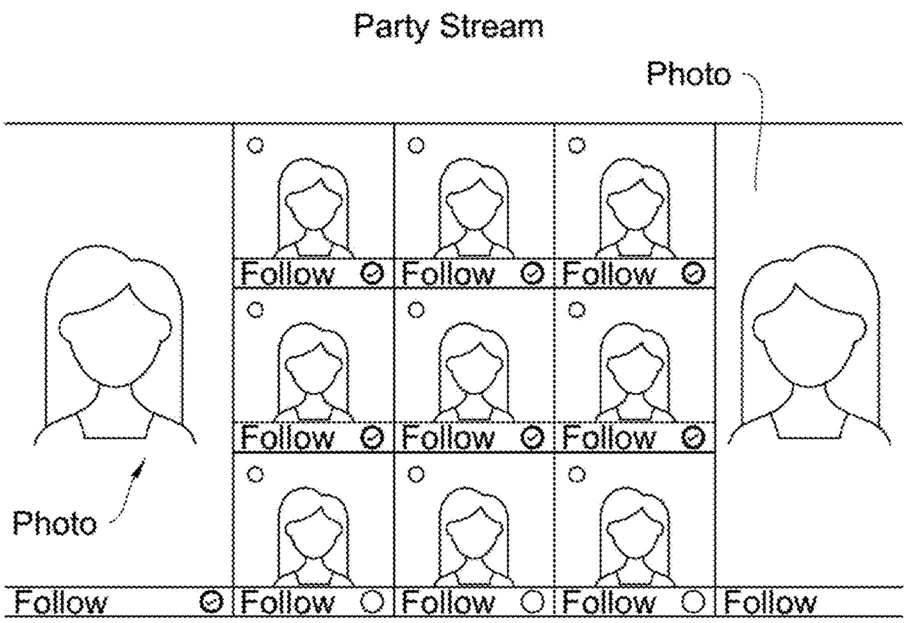
Figure 286:
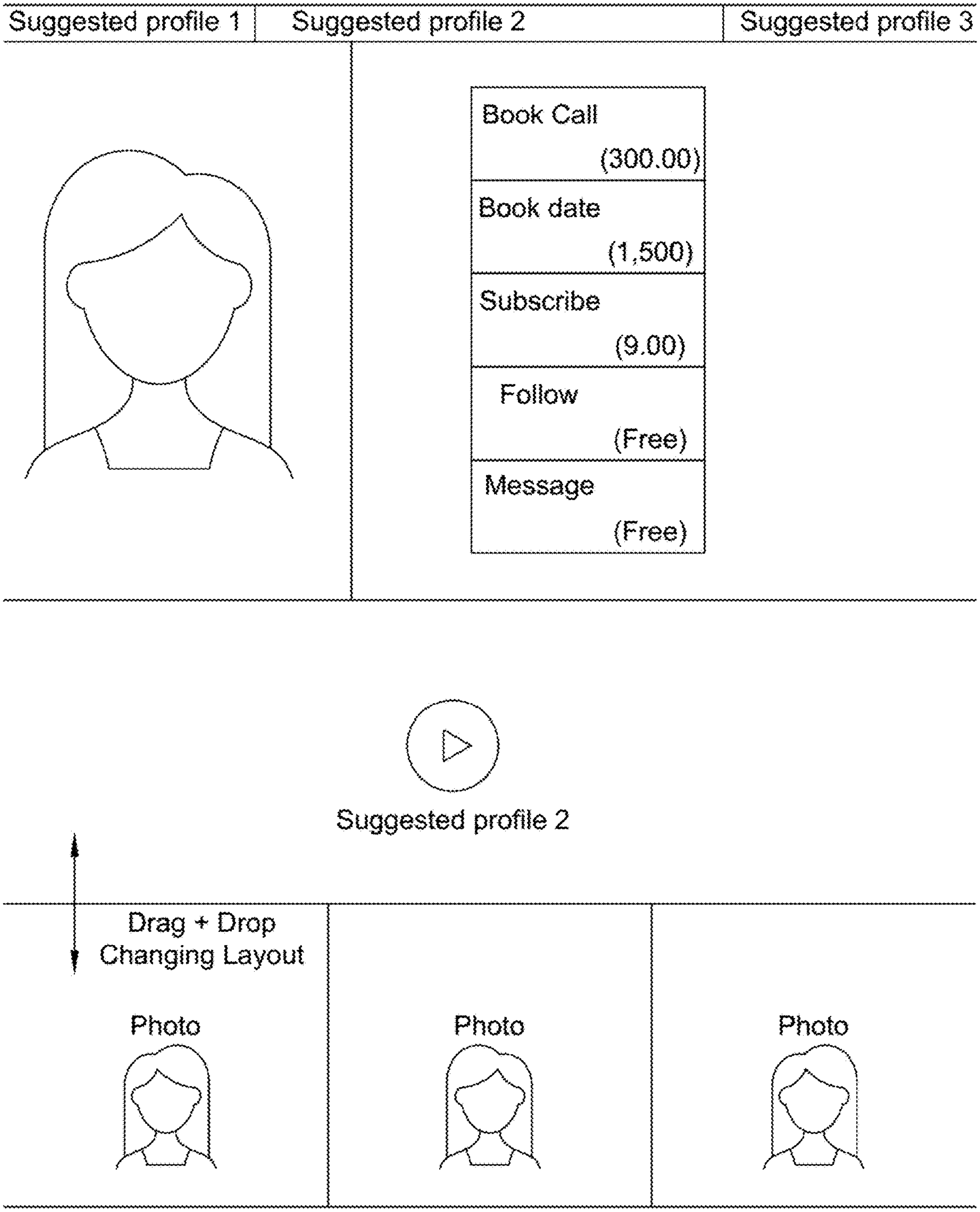
Figure 287:
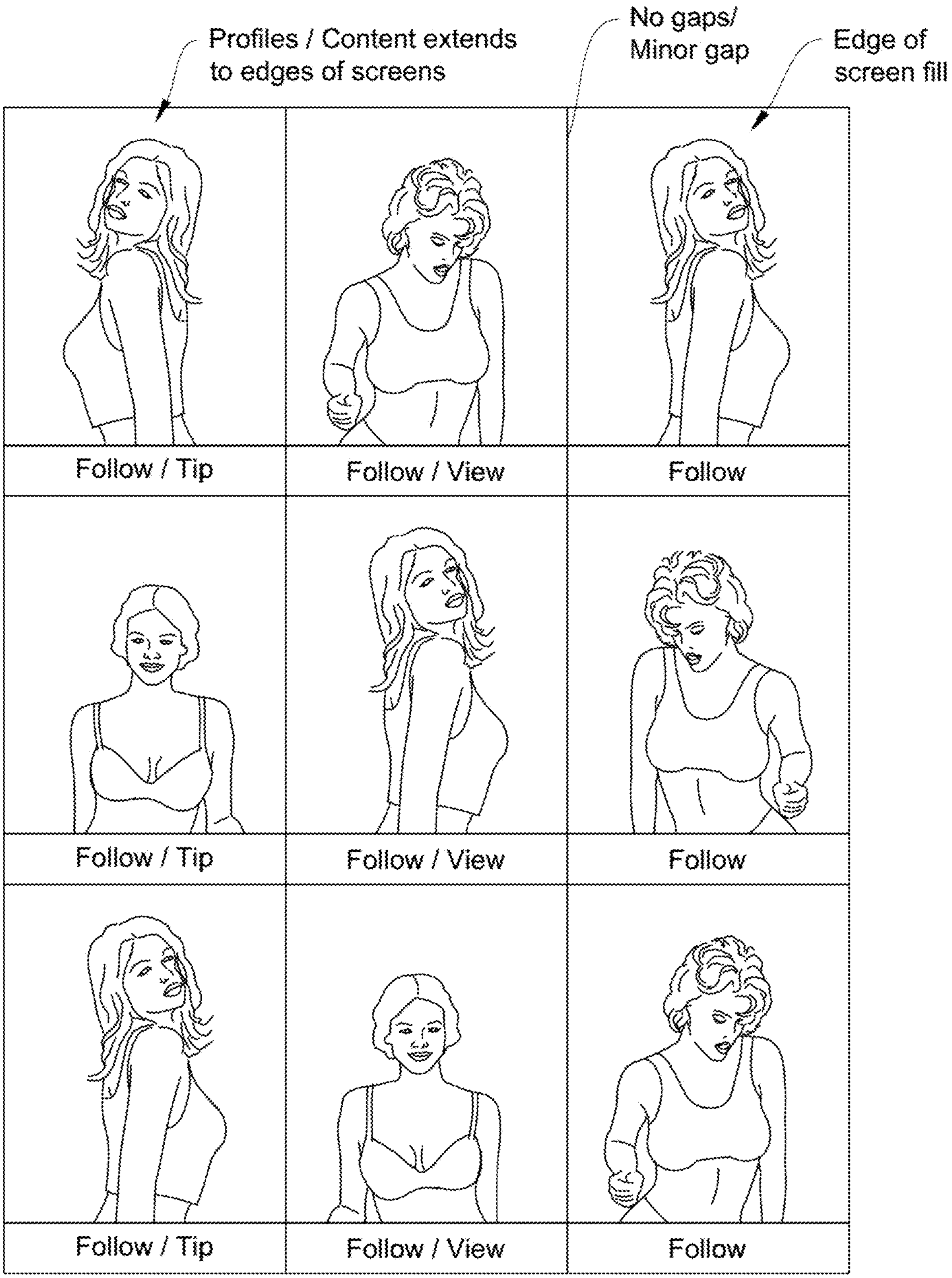

FIG. 275: In some embodiments, there may be a master management system where profiles may be, which may include but not be limited to (e.g., created by user and/or approved for platform one or sent to partner site two or any number, or denied, or sent to a waiting list, or added to a waiting list, or added to any database, etc.) In some embodiments, there may be a master management system where which may include but not be limited to (e.g., profiles or applications may be approved, sent to another site, denied, sent to partner site 2, or rejected, or sent to a waiting list, or added to a waiting list, or added to any database, etc.) In some embodiments, there may be a content platform management system, including but not limited to (e.g. creating new posts, content, displays, promotions, advertisements, etc.)

FIG. 276, FIG. 277, FIG. 278, FIG. 279, FIG. 280, FIG. 281, FIG. 282, FIG. 283, FIG. 284, FIG. 285, FIG. 286, FIG. 287: In some embodiments, there may be a public content computing operation system where public computing operation activity may be processed by machine learning and or AI to change the computing operation, which may include but not be limited to (e.g., content display, profile display, prices, options, content, etc.) based on public or private activity. In some embodiments, there may be a public content private or personal/master management system where profiles, photos, content, etc.) may be which may include but not be limited to (e.g., manually, AI, human, machine learning, etc.) included in the computing operation to which may have but not be limited to (e.g., show, display, be pushed to, shown on calendars, shown on profiles, shown as suggestions, etc.) In some embodiments, there may be a master dispute resolution center that may display, which may include but not be limited to (e.g., content, user disputes, user's information for disputes, users information, photos, videos, date log, show the information regarding the purchase or dispute or conflict, etc.) In some embodiments, the master dispute resolution center may allow dispute resolutions, which may include but not be limited to (e.g., pre-determined dispute resolutions, a scale human resolution system, an AI-resolution system, a machine learning scale resolution system, a picture-resolution system, a display of easy-to-read options on which resolution should be used as a resolving system for dispute, large displays to choose which resolution, a display that shows the scale on machine learning on how it should be resolved, resolutions that are pre-determined or pre-shown or pre-scaled that may be able to be edited, changed, or overridden, etc.) In some embodiments, users may be able to view or have displayed or heard (e.g., photo, content, media, and also see options to book or calendar options, messaging or contact options, etc.)

In some embodiments, there may be a master dispute resolution center, which may include but not be limited to (e.g., AI, machine learning, computerized decisions are made on behalf of humans but show humans the AI decision for review and either approve the AI decision and/or override decision computer made, etc.) In some embodiments, there may be a master dispute resolution center where the AI, machine learning, computer, or human has a pre-determined or pre-recommended scaled or shown or displayed decision for dispute.

In some embodiments, interfaces may serve as a connection platform, which may include but not be limited to (e.g., interface(s), computer system, system on computer, application etc.) In some embodiments, there may be, which may include but not be limited to (e.g., one or multiple models live streaming, creating content, streaming, creating videos, pictures, or any non-fungible token (NFT), or AI, content, etc.) with or without, which may include but not be limited to (e.g., saving content, storing content, keeping content, obtaining content, replaying content, etc.) with or without a, which may include but not be limited to (e.g., price to 'replay it,' a price or a free option that may be unlocked on either model's user interface/profile/shared, shared options, content etc.) In some embodiments, which may include but not be limited to (e.g., model, creator, user, person, human, AI, robot, etc.) can create, which may include but not be limited to (e.g., her own, their own, its own, etc.) which may include but not be limited to (e.g., date log, storage options, management options, date record options, etc.) with or without all same 'date log' experience and options and protection for a, which may include but not be limited to (e.g., manual, different, informal, new, changed, edited, non-automatic version of date scheduling, etc.) that may or may not have been created by, which may include but not be limited to (e.g., model, 3rd party, management system, etc.) In some embodiments, which may include but not be limited to (e.g., one model, a model, multiple models, collaborating models, users, person, etc.) may, which may include but not be limited to (e.g., live stream, or post content, or share content, or create content, etc.) and/or, which may include but not be limited to (e.g., save content with a price, option, suggestion, button, option to, etc.) which may include but not be limited to (e.g., replay it, share it, allow payment for, save it, play it, see it, display it, etc.) Models that may be, which may include but not be limited to (e.g., filmed and/or tagged and/or collaborating with and/or creating locked/unlocked/tagged/collaborative content etc.) may allow transmittables for, which may include but not be limited to (e.g., one price or set prices, price ranges, general pricing, general transmittables, etc.) and/or/from, which may include but not be limited to (e.g., one model's profile may be able to locked and unlocked with payment or free or subscriber from, and/or any of the tagged, collaborative, extra, other profile/model's user interface may content be unlocked from, etc.) Any, which may include but not be limited to (e.g., models or profiles, or users, or persons, or entities, or 3rd parties, advertisers, advertisements, businesses, etc.) may be able to, which may include but not be limited to (e.g., collaborate on or off platform etc.) and/or each party may get, which may include but not be limited to (e.g., paid for 'unlocked content, subscriber payments, content that is being paid to see, etc.)

In some embodiments, each party may be able to, which may include but not be limited to (e.g., get a cut or payment, etc.) per, which may include but not be limited to (e.g., user that unlocks, subscribers, pays for, views, etc.) In some embodiments, which may include but not be limited to (e.g., models or persons, etc., which may include but not be limited to (e.g., on or off the platform, subscribed, registered, have a profile, not have a profile, etc.) In some embodiments, the platform may require users to, which may include but not be limited to (e.g., make a profile to be tagged, create an account, link their bank account, etc.) and/or the platform may make a holding, which may include but not be limited to (e.g., bank account, or holding payment, etc.) for a, which may include but not be limited to (e.g., collaborative, tagged, partial creator, user, etc.) that may not be on the platform that was, which may include but not be limited to (e.g., tagged, given credit to, is owed funds, is owed subscription or partial payment for content, etc.) and that, which may include but not be limited to (e.g., user, person, 3rd party, etc.) may have to make, which may include but not be limited to (e.g., an account, link a bank, link a payable, and/or a profile, etc.) to get her money from the, which may include but not be limited to (e.g., payout, owed, tagging, collaborative content, etc.) In some embodiments, a hologram may display any user interface described here.

In some embodiments, conflict resolution may use a, which may include but not be limited to (e.g., point/scale system, AI-system, scale-created by AI, robotic scale system with input and output, etc.) for, which may include but not be limited to (e.g., in-person conflicts, virtual conflicts, subscription conflicts, unlocked content conflicts, disputes between models (one or more, groups or more), disputes between two paying customers or more, entities, 3rd parties, advertisers, advertisements, businesses, two paying customers, disputes between model and paying customer, daters, dates, connections, meetings, coffee, lunch, activities, events, any situation, model and platform, user and platform, etc.) Some embodiments may include but are not limited to (e.g., reusable sounds, trending sounds, trending sounds on the platform, platform's sounds, 3rd party sounds, licensed sounds, original sounds, unlicensed sounds, etc.)

In some embodiments, there may be, which may include but not be limited to (e.g., reusable, trending, 3rd party integrated, integrated, original, originally created, developed, etc.),' which may include but not be limited to (e.g., editing software' for photos, videos, content etc.) In some embodiments, there may be (e.g., trending, 3rd party integrated, integrated, original, originally created, developed, reusable or trending items, or integrated, items, etc.) which may include but not be limited to (e.g., (a 3rd party app that may allow editing for content, a platform based content editing tool, a trending editing content tool, a 3rd party integrated editing software device or option, etc.) In some embodiments, trending or useable, which may include but not be limited to (e.g., content, sounds, videos, looks, filters, methods, developments, AI-created content, integrations, partners for content collaborations such as, which may include but not be limited to (e.g., specific photographers, videographers, video production, open developers, developers, front end, back end, businesses, entities, groups, persons, AI, robotics, coders, companies, types of edited content such as a specific style photoshoot or process from a 3rd party, etc.) trending, which may include but not be limited to (e.g., partners or integrations, or development, developers, etc.) may have/allow/obtain, which may include but not be limited to (e.g., 3rd party cuts, payouts, payment, integrated payments, used as suggested as ads, get suggested ads, etc.) In some embodiments, there may be a connection, which may include but not be limited to (e.g., platform, interfaces, applications, etc.) with or without, which may include but not be limited to (e.g., calendar, calendar integration, 3rd party calendar integration, timing method, timing data, calendar, timing method, schedule method, scheduling method, timing data center, live calendar, timing method data, timing data method, timing process data, calendar may be able to update in real-time, etc.) In some embodiments, calendar may be able to have, which may include but not be limited to (e.g., fixed or customized, or changeable, or editable, or integrated, or AI-up dated, AI-changed, AI-managed, human managed, etc.) which may include but not be limited to (e.g., calendar timings, data, location, prices, activities, etc.) In some embodiments, countdown until booking may be available or not available, which may include but not be limited to (e.g., price, booking time, scheduled date time, etc.) In some embodiments, which may include but not be limited to (e.g., automatic, or AI-created, or set, or manually created, etc.) booking or re-booking, which may include but not be limited to (e.g., in-person, virtual dates, any connection, any date, etc.) which may include but not be limited to (e.g., for example which may be including but not limited to every Friday, every two weeks, every month, every Friday, every two weeks, every month etc.) In some embodiments, which may include but not be limited to (e.g., users, person, AI, etc.) may be able to, which may include but not be limited to (e.g., request, automate, pay for, ask for, suggest, etc.) a, which may include but not be limited to (e.g., follow-up 'call,' follow up virtual call, etc.) which may include but not be limited to (e.g., before, during, or after date, etc.) for, which may include but not be limited to (e.g., payment, or no payment, etc.) which may be, which may include but not be limited to (e.g., required, not required, suggested, listed, ask for, expected, up to person, etc.)

In some embodiments, a calendar which may be, which may include but not be limited to (e.g., locations, times, days, requests, searches, etc.) may be, which may be, which may include but not be limited to (e.g., fixed, changed, added to, customized, etc.) In some embodiments, the user, model, etc.) may have pre-approved, approved, accepted, agreed on, previously paid for, asked for payment for, etc.) which may be, which may include but not be limited to (e.g., specific locations or times, etc.) In some embodiments, paying users may request to go somewhere else. Which may be, which may include but not be limited to (e.g., model, user, person, etc.) may be able to which may be, which may include but not be limited to (e.g., charge, log, create a new date log, add to date log, to keep track of location, payments, which user may be able to put in manual/auto address. Or may be required to put a business address, etc.) In some embodiments, which may be, which may include but not be limited to (e.g., for example, which may be including but not limited to the user may have requirements such as which may be, which may include but not be limited to (e.g., not going to allow date a date past 9 pm, etc.)

In some embodiments, there may be a, which may include but not be limited to (e.g., approval, pre-approval, acceptance, 3rd party approval, 3rd party verification, 3rd party check, etc.) process check or information obtaining, which may include but not be limited to (e.g., legal first and last, driver's license, passport, social security, tax returns, a full report from 3rd party, outside references, person, humans, data, visa, car title, deed, etc.) which may include but not be limited to (e.g., before, during, after, viewing, seeing, obtaining, booking, scheduling, before 'booking options' are shown, being able to subscribe, being able to follow, being able to search, being able to browse, make or create or inquire about date request, send message, message, create content, inquire, view profile, view information, make connection request, virtual request, creating profile, etc.) which may include but not be limited to (e.g., calendars, profiles, persons, users, content, unlocks, subscriber benefits, content, streaming, live streaming, etc.)

In some embodiments, there may be, which may include but not be limited to (e.g., a-created content, manually created content, human-created content, AI-created information, visuals, content, etc.) which may include but not be limited to (e.g., videos, pictures, content, Graphics Interchange Format files (GIFs), anything with pixels or has visuals, hologram, loop videos, etc.) on, which may include but not be limited to (e.g., calendar, interfaces, etc.) which may include but not be limited to (e.g., for example which may be including but not limited to AI-created content may show a pic of the girl he is requesting or has a date scheduled with, or another example: AI-created content, picture, video of the guy or the girl, or both together, or both showing themselves at the anticipated date spot on calendar, or show the model or a model that the person is interested in, or show a suggested model on his calendar, or show a suggested model and what the date would look like as AI-created content on his calendar or any interface, etc.) In some embodiments, each calendar, which may include but not be limited to (e.g., spot, day section, area, time-period, day, date, month, year, etc.) has the ability to show visuals, which may include but not be limited to (e.g., videos, pictures, content, GIFs, anything with pixels or has visuals, hologram, loop videos, etc.) which may include but not be limited to (e.g., a-created content, manually created content, human-created content, AI-created information, visuals, content, etc.) In some embodiments, user or anyone may be able to, which may include but not be limited to (e.g., upload visuals, decorate, have AI-create content, allow visuals to be created by 3rd party, allow subscribers to decorate, allow AI to create visuals, design their own calendar, or interface, etc.) which may be for creating, which may include but not be limited to (e.g., user interfaces, 3rd party integrations, designs, integrations, drawings, AI-created content, calendars, interfaces, etc.) which may include but not be limited to (e.g., outlines, colors, borders, adding pictures, adding storytelling, adding voice, decorative, etc.) In some embodiments, which may include but not be limited to (e.g., artificial intelligence-created output or human input or human and/or AI-created content etc.) may be shown on, which may include but not be limited to (e.g., calendar and/or user interface etc.) which may include but not be limited to (e.g., users, locations, meetings, love, sweet showing, romantic, romance, business connection, etc.) In some embodiments, artificial intelligence-created, which may include but not be limited to (e.g., AI-created content or suggestions, or human/AI-created content-suggestions outputs, etc.) which may be combined various, which may include but not be limited to (e.g., data inputs and/or outputs or results, etc.) such as, which may include but not be limited to (e.g., secured or confirmed or possible dates' shown on calendar, visual or information preview of date on calendar created with artificial intelligence users, locations, meetings, love, sweet showing, romantic, business connection, etc.)

In some embodiments, which may include but not be limited to (e.g., model, creator, user, person, human, AI, etc.) may be able to, which may include but not be limited to (e.g., train AI model, input data for output automatic responses, input data for semi-automatic responses, input data for responses or reactions that have to be approved by model prior to sending, etc.) to, which may include but not be limited to (e.g., answer, give solutions, answer FAQs, answer any question, answer any specific question, answer questions to understand user's requirements, answer questions to limitations/boundaries, answer questions to rules, answer questions to regulations, answer questions to laws, flirty talk, fun, any that might be, which may include but not be limited to (e.g., asked by, inquired about, suggested the answering of, solutions-seeking, wanting to know, curiosity, etc.) of any, which may include but not be limited to (e.g., user, person, inquiry or model, 3rd party, paying person, subscriber, unlocked person, approved user for any questions, specifically approved user, etc.) In some embodiments, the model creator may be able to which may include but not be limited to (e.g., negotiate, monitor, accept, deny, negotiate if responses are to be sent by AI, by self, by anyone, what types of questions may be able to be answered by AI, and/or what types of questions may be able to be answered by a human, etc.)

In some embodiments, which may include but not be limited to (e.g., model, AI, 3rd party, etc.) may be able to be trained by input to allow automatic outputs such as, which may include but not be limited to (e.g., to book, schedule, inquire about, schedule, change, inquire, reminders, etc.) In some embodiments, which may include but not be limited to (e.g., inputted, collected, typed, discovered data, etc.) may be, which may include but not be limited to (e.g., collected, Inputted, machine-learned information, etc.) may be of, which may include but not be limited to (e.g., what user is doing at all times of the, which may be, which may include but not be limited to (e.g., day, year, month, hour, minute, etc.) which may be, which may include but not be limited to (e.g., each minute, daily routine, weekly routine, monthly routine, each hour, sleep schedule, sleep pattern, work schedule, outside work schedule, whether person has children/child duties, etc.)

In some embodiments, which may include but not be limited to (e.g., calendar, information, profile, photos, content, messages, calendar/profile viewing of users in different cities etc.) may only be, which may include but not be limited to (e.g., shown, displayed, searched for, search results, available, recommend, etc.) after, which may include but not be limited to (e.g., payment is made, transmittables, etc.) and/or which may be, which may include but not be limited to (e.g., after requirements may be met, which may be, which may include but not be limited to (e.g., membership, payment, platform payment, etc.) In some embodiments, which may include but not be limited to (e.g., users, models, persons, humans, AI, etc.) may be able to, which may include but not be limited to (e.g., view, manage, change, edit, add, integrate, etc.) which may include but not be limited to (e.g., 3rd party calendar(s), other calendars, self-made calendars, outside calendars, platform calendars, any timing data method etc.) In some embodiments, changing data, calendars, timing, interfaces may occur, which may include but not be limited to (e.g., creating a date, paying for date, paying to connect, getting access by 3rd party, getting accepted, getting approval, integration approving something, etc.) In some embodiments, which may include but not be limited to (e.g., users, persons, entities, 3rd parties, advertisers, advertisements, businesses, may pay to, which may include but not be limited to (e.g., block off, grey, make unavailable, not allow anyone else to book on, etc.) someone's, which may include but not be limited to (e.g., calendar, timing data, timing method, scheduling method, etc.) which may include but not be limited to (e.g., hour, day, month, time period, yearly, any time period, etc.)

In some embodiments, which may include but not be limited to (e.g., calendar, timing data, timing schedule, timing scheduler, etc.) may be created on, which may include but not be limited to (e.g., platform, platform, etc.) and/or calendar plus a calendar's 3rd party integration, which may include but not be limited to (e.g., outside calendars, etc.) In some embodiments, the calendar may be created, including but not limited to (e.g., only from the platform) or partially integrated. In some embodiments, the calendar may be managed by another calendar or platform, including but not limited to (e.g., its platform, calendar, etc.) In some embodiments, being matched to the user may be based on, including but not limited to (e.g., calendar availability, scheduling options, user one pic showed up on user 2's calendar, etc.) In some embodiments, payment may include but not be limited to (e.g., match persons together, send inquiries, or book, schedule, inquire about, etc.) In some embodiments, being users may be matched on calendar suggestions. In some embodiments, which may include but not be limited to (e.g., for example, which may be including but not limited to the calendar may be based on AI/computing operation, popularity, etc.) In some embodiments, calendar or user matching AI-connecting may be based on: which may include but not be limited to (e.g., which may be including but not limited to (e.g., Here are some beautiful blonde women you might like to court and or take on a date, etc.) In some embodiments, which may include but not be limited to (e.g., model, user, person, calendar, etc.), matching AI-connecting may be based on, including but not limited to (e.g., exact calendar availability, scheduling options, etc.) In some embodiments, which may include but are not limited to (e.g., model, user, person, calendar, etc.), matching AI-connecting may be based on, including but not limited to (e.g., location, distance, travel, etc.) In some embodiments, which may include but not be limited to (e.g., model, user, person, calendar, etc.), matching AI-connecting may be based on general similarities between two calendars, which may include but not be limited to (e.g., periods, days, weeks, frequencies, duration, check-in, check-out, time stamp, time record, time and data record, location, time and data record, coordinate(s), s, similar cities or areas, for example, which may be including but not limited to (e.g., Joe always has open Friday. Sarah also has open Friday, etc.)

In some embodiments, matching AI-connecting may be based on popularity, including but not limited to (e.g., this girl is popular, booked often, and may be matched to guys more often, etc.) In some embodiments, matching AI-connecting may be based on, which may include but not be limited to (e.g., price preferences based on look preferences [lawyer, accountant, entrepreneur, stay-at-home wifey, looking for marriage, seeking serious relationship, brunette, blonde, petite, busty, curvy], based on social preferences [I am an introvert, she is introvert. I like to read quietly; she likes to read quietly. I want to go out; she likes to go out. She likes parties; I like parties.] etc.) In some embodiments, the platform may allow notifications for updates, which may include but not be limited to (e.g., someone's calendar, user calendar, calendar, model's calendar, model's updates, model's changes, there may be 3rd party integrated notifications for updates on someone's calendar, there may be 3rd party separate notifications for updates on someone's calendar, etc.) In some embodiments, users may be able to pay or not pay to get, which may include but not be limited to (e.g., updates on someone's calendar, get 3rd party updates on someone's calendar, get integrated updates on someone's calendar, be able to add to a 3rd parties calendar through the platform, be able to add to a 3rd parties calendar through the platform, etc.) In some embodiments, which may include but not be limited to (e.g., users, persons, AI, etc.) may be able to, which may include but not be limited to (e.g., build users, profiles, user's calendar from scratch, build calendar from a 3rd party integration, etc.) In some embodiments, which may include but not be limited to (e.g., platform or interface(s), etc.) may be a, which may include but not be limited to (e.g., connection app with payment between users, payment options between users, bidding/auction options between users, charitable payment options between users, etc.)

In some embodiments, which may include but not be limited to (e.g., work, business, company email or number, or confirmation, or referral etc.) which may include but not be limited to (e.g., sign up, confirmation, acceptance, referral, verification, etc.) may, which may include but not be limited to (e.g., display, show, allow, appoint, etc.) a, which may include but not be limited to (e.g., badge, special badge a verification for location of job etc.) In some embodiments, which may include but not be limited to (e.g., work, company, business verifications, etc.) may be, which may include but not be limited to (e.g., public, private, saved, shared, with, etc.) and/or may have the option to, which may include but not be limited to (e.g., pay to remove, pay to hide, pay to update, pay to verify, etc.) In some embodiments, a, which may include but not be limited to (e.g., paying user, user, person, entry, 3rd party, etc.) may be able to, which may include but not be limited to (e.g., pay, use transmittables, free, both parties agree, one party, one person, anyone, etc.) to, which may include but not be limited to (e.g., watch, view, display, stream, see, interact with, etc.) a, which may include but not be limited to (e.g., virtual or in-person, etc.) which may include but not be limited to (e.g., 'live streamed movie, live streamed content, live streamed series, live streamed original, original series, content, movie, etc.) on or off, which may include but not be limited to (e.g., through platform, in-person, at 3rd party location, at business, at entity, through a 3rd party separate, 3rd party integrated platform, etc.) which may include but not be limited to (e.g., with model, by their self, with friends, with users, with anyone by themselves, etc.) In some embodiments, which may include but not be limited to (e.g., paying user, user, person, entry, 3rd party, etc.) may be able to, which may include but not be limited to (e.g., pay, exchange to, use transmittables, etc.) which may include but not be limited to (e.g., to watch a movie in-person at a theatre, do an activity, etc.) and/or pre-paying for, which may include but not be limited to (e.g., time, fee, date, movie, snacks, cost to go-kart, or any date activity, or any activity, or any restaurant, or any shopping, etc.) In some embodiments, which may include but not be limited to (e.g., paying user, user, person, entry, 3rd party, etc.) may be able to, which may include but not be limited to (e.g., pay to, for free, upon approval, inquire about, send tip for, etc.) which may include but not be limited to (e.g., send message(s), join model's 'live show,' send tip, send gifts, get coins, get funding, get credit, to tip model's 'live show,' to request a model's 'live show' private with user, etc.) In some embodiments, which may include but not be limited to (e.g., paying user, user, person, entry, 3rd party, etc.) may be able to, which may include but not be limited to (e.g., inquire about, request a 'rate sheet etc.) which may include but not be limited to (e.g., breakdown, itemized, receipt, invoice, total, partial, breakdown, bill, summary of, total, etc.) of, which may include but not be limited to (e.g., model, user, creator, etc.) rates, which may include but not be limited to (e.g., restaurant rate rates versus top golf dates, rates, or duration, check-in, check-out, time stamp, time record, time and data record, location, time and data record, coordinate(s), dates, or anything such as preferences, etc.) In some embodiments, which may include but not be limited to (e.g., paying user, user, person, entry, 3rd party, etc.) may be able to, which may include but not be limited to (e.g., inquire about, request a 'rate sheet etc.) a 'date cheat sheet' such as a, which may include but not be limited to (e.g., breakdown, itemized, receipt, invoice, total, partial, breakdown, bill, preferences, questions, sheet, paper, document, summary of, viewing, interface, AI-response, total, etc.) delivers or obtained by, which may include but not be limited to (e.g., human, AI, AI-response, robotics, etc.) with/or/and some examples, which may include but not be limited to (e.g., I like red roses, I like chocolates, I like gift cards for Sephora makeup, I like food, I like flowers, etc.)

In some embodiments, which may include but not be limited to (e.g., paying user, user, person, entry, 3rd party, etc.) may be able to, which may include but not be limited to (e.g., pay to, for free, inquire about, send tip for, etc.) to, which may include but not be limited to (e.g., send a video [for example pay per time limit on video or shorter video or any content], to send her an 'introductory video of himself such as his 'selling point video [a longer video potentially], to request personalized content (custom content) o send a photo, to request a phone call, to request a video call, to send a custom content request inquiry, to request to open a pre-paid 'chat line' such as (500 for 5 messages), to send an [in-person 'date time, place, location, duration, check-in, check-out, time stamp, time record, time and data record, location, time and data record, coordinate(s), inquiry'], to send a virtual 'date, time, duration, check-in, check-out, time stamp, time record, time and data record, location, time and data record, coordinate(s) type of date activity' inquiry'], to send a boyfriend, partner, husband application In some embodiments, which may include but not be limited to (e.g., paying user, user, person, entry, 3rd party, etc.) may be able to, which may include but not be limited to (e.g., pay, exchange to, use transmittables, etc.) to, which may include but not be limited to (e.g., voice call her through app/platform/interface or platform, video call' her through app or platform etc.) for, which may include but not be limited to (e.g., limited amount of time, set amount of time, pre-paid amount of time, pre-set amount of time, any duration of time approved or chosen, etc.) In some embodiments, 'time period" may be any time period such as, which may include but not be limited to (e.g., 5 minutes, 1 minute, 5 seconds, 10 minutes, 20 minutes, 1 hour, 2 hours, etc.) In some embodiments, which may include but not be limited to (e.g., paying user, user, person, entry, 3rd party, etc.) may be able to, which may include but not be limited to (e.g., gift, give, donate, pay for, pay for on someone else's behalf, pay for another 3rd parties behalf, etc.) a, which may include but not be limited to (e.g., 'specific date such as a 'specific user, time place, location,' specific user, special model, specific creator, any creator, any person, any general range of models, any groups of models, any profile, donate amount, pre-pay funds to account, pre-pay for date, Gifts in exchange for date, send gifts or buy something from 'wishlist' or 'list' or 'listed item' in exchange for date or time or virtual date or in person date or in exchange to view calendar or schedule or time or be able to message or book date or send like or interact with, pre-pay for group date, donate funds to date cause, donate funds to charity date, donate to date, donate to user, donate to model, etc.) In some embodiments, which may include but not be limited to (e.g., paying user, user, person, entry, 3rd party, etc.) may be able to, which may include but not be limited to (e.g., gift, give, donate, pay for, pay for on someone else's behalf, pay for another 3rd parties behalf, etc.) a, which may include but not be limited to (e.g., 'partial date' (location, day for example a user's birthday etc.) but, which may include but not be limited to (e.g., model, creator, user, etc.) may be able to, which may include but not be limited to (e.g., chose user, chose location, choose destination, choose date, choose day, platform may choose model or user, date or connection or funds may be requested to be approved of, to finalize etc.) from a, which may include but not be limited to (e.g., paying user, user, person, entry, 3rd party, etc.) In some embodiments, which may include but not be limited to (e.g., gifting, donating, requesting, paying for 3rd party, paying for user, giving funds or credits to user, etc.) a, which may include but not be limited to (e.g., subscription, date, membership, etc.) to a user' such as, which may include but not be limited to (e.g., 1 year subscriber price, or 6 month subscriber price, or unlimited messaging options, or platform unlock options, or unlocking content options, or pre-paid funds to pay for subscriptions or other options etc.) In some embodiments, which may include but not be limited to (e.g., user, paying person, subscriber, public person, 3rd party, etc.) may be able to use, which may include but not be limited to (e.g., pay, exchange to, use transmittables, etc.) to, which may include but not be limited to (e.g., join a live show, chat on live show, join a stream, join a collaboration, join a cola stream, chat on live, chat, message, contact, to go to a 'private discussion room' or a 'private alternative room' or a 'private interface, taking away from live and going to private call, voice, video, message, video, private live discussion, private discussion, private negotiation, negotiate, etc.) In some embodiments, which may include but not be limited to (e.g., payment, assets, installment payments [for example which may be including but not limited to such as 3rd pays us the entire amount and they have to pay installments to the 3rd party for credit that was given], installments, payment, transmittables, multiple payments, 3rd party credit line, outside credit, other example: [getting a 'date credit from a 3rd party through platform(s)] etc.) may be used to make purchase on, which may include but not be limited to (e.g., platform, platform integrations, etc.) In some embodiments, which may include but not be limited to (e.g., pre-date/pre-connection, etc.) which may include but not be limited to (e.g., phone/platform voice call, video call, 'pre-date 'get to know each other' interactive game, interactive game [chess, checkers], video interactive game or content streaming [content/video], etc.) may be for, which may include but not be limited to (e.g., free, payment, cost, instalments, transmittables, etc.)

In some embodiments, which may include but not be limited to (e.g., user, paying person, subscriber, public person, 3rd party, etc.) may able to, which may include but not be limited to (e.g., pay, exchange to, use exchangeable, 3rd party credit line, 3rd party credited payments, bank account transfer funds, crypto funds, asset funds, etc.) to make any purchase or payment or exchange. In some embodiments, which may include but not be limited to (e.g., user, paying person, subscriber, public person, 3rd party, etc.) may be able to, which may include but not be limited to (e.g., transmittables, payment, donations, assets, etc.) to, which may include but not be limited to (e.g., view models in another city, view calendar, interact with to view calendar, interact with to view timing data methods, in another city, view other profiles, view profiles in another city, etc.) In some embodiments, which may include but not be limited to (e.g., user, paying person, subscriber, public person, 3rd party, etc.) may able to, which may include but not be limited to (e.g., pay, exchange to, use exchangeable, 3rd party credit line, 3rd party credited payments, bank account transfer funds, crypto funds, asset funds, etc.) to, which may include but not be limited to (e.g., anything, anyone, any person, any entity, etc.) In some embodiments, which may include but not be limited to (e.g., user, model, individual, group, profile, etc.) may have a requirement such as, which may include but not be limited to (e.g., pay to view, 'one-time payment,' subscriber only payments, followers, met a spending threshold such as spent 5000 dollars) to meet to have (e.g., access to, be informed of, etc.) which may include but not be limited to (e.g., 'live in-person events, events, streaming events, live streaming, access to, etc.) such as, which may include but not be limited to (e.g., parties, events, meet and greets planned my person, etc.) In some embodiments, which may include but not be limited to (e.g., Credit card or credit lines available from platform and/or 3rd parties that, which may include but not be limited to (e.g., 'fund the date credit account' on user's 'funds,' fund account, give credit for, etc.)

In some embodiments, which may include but not be limited to (e.g., user, model, person, 3rd parties, advertisers, advertisements, businesses, etc.) may be able to, which may include but not be limited to (e.g., manage/sell stock, manage/sell real estate, manage/sell asset account from their platform management system, fund trust account through managing assets, fund security or 3rd parties such as [nanny, cleaner, personal assistant], automatically/manually pay for dates, Gifts in exchange for date, send gifts or buy something from 'wishlist' or 'list' or 'listed item' in exchange for date or time or virtual date or in person date or in exchange to view calendar or schedule or time or be able to message or book date or send like or interact with, etc.) by selling (e.g., things of value such as 'assets,' or get date credit by obtaining funds or credits etc.) to be used or exchanged for (e.g., dates, subscriptions, meetings, talking to, unlocks, unlimited services on platform, etc.) For example users may be able to (e.g., sell stocks integrated by 3rd party on platform, sell stocks from platform, invest in stocks on platform, sell real estate through platform, purchase shares from platform through platform or 3rd party, apply to invest in platform through platform or 3rd party, apply to be on waiting list to invest in platform through platform or 3rd party, etc.) In some embodiments, any amount of credit to payment may be used for, which may include but not be limited to (e.g., amount set by user, amount set by platform, amount for date, amount plus tip, amount plus gift-card/gift/, amount for activity such as [shopping fee or shopping fund amount], etc.)

In some embodiments, which may include but not be limited to (e.g., user interface(s) of profiles or calendars [user interfaces], integrated calendars, locked content, private content, private information, profiles, messages, content, questions, inquiries, users, models, content, movies, original series, etc.) showing, which may include but not be limited to (e.g., insert here' or make a suggestion, make an inquiry, pay, ask for, inquire about, payment for, transmittables for, etc.) which may include but not be limited to (e.g., dates, times, location, duration, check-in, check-out, time stamp, time record, time and data record, location, time and data record, coordinate(s), restaurants, information, messages, content, user interface(s) of profiles or calendars [user interfaces], integrated calendars, locked content, private content, private information, profiles, messages, content, questions, inquiries, users, models, content, movies, original series, etc.) which may include but not be limited to (e.g., may require payment to send an inquiry that is not pre-approved or pre-selected, may require payment for any reason, may require transmittables for any reason, etc.)

In some embodiments, which may include but not be limited to (e.g., user, paying person, 3rd party, entity, etc.) may be able to have, which may include but not be limited to (e.g., automatic 'selling of assets,' manually selling of assets, automatic, funding of dates/subscriptions/unlocks/unlimited services, sell assets and fund credit account on the platform for dates or any purposes of exchangeable or payments on the platform, etc.) In some embodiments, there may be options for example to, which may be included but not limited to (e.g., invest in stocks through 3rd party integration and/or from the platform, opportunities to invest in real estate through 3rd party integration and/or from the platform, options to sell their current assets through 3rd party integration and/or from the platform, etc.)

In some embodiments, the option to, which may include but not be limited to (e.g., 'pay all of the model's bills, and/or partial amounts of bills, and/or fund lifestyle, fund payments, or pay necessities, pay for wants, pay all of model's shown debts/bills/rent payment/food/groceries, pay for needs, or pay for debts, or purchase houses, properties, assets for any model or user on the platform, etc.) may be, which may include but not be limited to (e.g., open to the public, private, sent to persons, obtained after payment, for subscribers only, for users that inquire about it, a second interface, another interface, separate, a breakdown of bills, a list of items for persons to pay, a list of items to pay, a list of payments to be made, etc.) In some embodiments, there may be options or the ability to pay for, which may include but not be limited to (e.g., frequency, quantity, ability to have access to, timing, periods, etc.) of, which may include but not be limited to (e.g., 'dates, connections, meetings, virtual meetings, group days, etc.) for example which may be including but not limited to [such as every Friday night, every weekend, for an entire month, every other Wednesday, every Saturday, etc.], which may include but not be limited to (e.g., 'block off period if conditions are met [conditions such as which may be including but not limited to payment/conditions of requirements are made and/or no refunds or cancellations have been issued, etc.)

In some embodiments, there may be traveling options to be, which may include but not be limited to (e.g., booked by/for traveling, booked for traveling, to travel, for someone to travel, etc.) which may include but not be limited to (e.g., accepting 'paid for' or 'reserved' or pre-payment, or processed payment, etc.) for, which may include but not be limited to (e.g., travel expenses, or payments for, or bookings for, or scheduling for, etc.) such as, which may include but not be limited to (e.g., 'airplane, hotel, food, transportation, security [bodyguard], etc.) In some embodiments, all, which may include but not be limited to (e.g., 3rd party booking, any user, any public person, any verified person, any user, any 3rd party, etc.) may or may not be able to see, which may include but not be limited to (e.g., exact details by paying user, or exact details for model, or exact details for any identifying details, or model's information, etc.) for, which may include but not be limited to (e.g., model's safety, model's personal details, model's details, model's last name, model's phone number, models personal information, model's location, location, time period, duration, exact location, general location, etc.) In some embodiments, there may be traveling options to be, which may include but not be limited to (e.g., charity-raising payments, charity donations, charity balls, charity events, charity donation dates, charity donation virtual dates, charity donation messaging, charity donating meetings, raising money for cause, raising money for any reason, campaigning for any reason, etc.) In some embodiments, there may be options for, which may include but not be limited to (e.g., paying, transmittables for, assets in exchange for, date subscription model, membership model, pay per item, pay per view, pay per location, pay per activity, pay total, pay group total, pay senate for group, pay to add more, add additional, pay for date activities, etc.) which may include but not be limited to (e.g., date subscription model, pay for unlimited, multiple dates, message subscription model, pay for unlimited messages, virtual subscription model, pay for unlimited, multiple dates virtual, sending free tips with no payment processing fees, paying processing fees per sent payment, sending tips from stock accounts, sending stocks as tips, using stocks as tips, using real estate assets as tips, using cash as tips, using transmittables as tips, using crypto as tips, platform membership subscription model: may be pay for viewing all content and unlocking all content on site, platform-only content membership subscription model: may be pay for viewing all content and/or unlocking all platform content on site, having a date with one person, and then adding multiple other models to the same date or to a concurrent date [adding more models to the same date], adding more models to a different time but same day, paying users may be able to play 'games' with content creators/ models and models getting paid for playing games or activities, half of content may be shown and/or needing to be unlocked through payment, partial amount of content being shown needing payment [or viewing all of it with payment], video being shown without video and/or in need of payment to hear content, voice being heard without visuals and/or payment needing to be made to, which may include but not be limited to (e.g., see content, paying to send someone a message, content, video, inquiry, there may be unlimited messaging, contact or any options for dates or connections for payment or transmittables, etc.)

In some embodiments, there may be options to, which may include but not be limited to (e.g., for free, for exchangeable, for assets, at the discretion of any user or person or robot or AI, etc.) which may include but not be limited to (e.g., set up automatic dates with user, one creator paying another creator to 'safety chaperone date, one creator paying '3rd party security' to 'safety chaperone date, setting up automatic dates with user including payment transfer/ transmittables, setting up/set up automatic funds transfer to user, setting up/set up automatic gifts, gift cards, rent payments, bills payments, asset sending such as [for example which may be including but not limited to selling and sending funds for stocks etc.], transferring stocks, stocks to pay for dates, setting up automatic stock transfer to user, options to purchase outside or 3rd party items through platform and/or get sent to model or user, or delivered, or brought, or sent to other users house to bring to public date [for example which may be including but not limited to flowers, gift-cards, dresses, jewelry, makeup, hair products etc.], pay for human to match dates or book dates for user, etc.)

In some embodiments, any user interface or calendar may show (e.g., date location: time, users, models, [for example which may be including but not limited to show what date may look like using humans, content, or AI, or data about date, or any data, etc.], showing [date location, time, users, models, etc.] to show what date could look like, users (models) showing up on calendar/interface and/or asking if user wants to [for example which may be including but not limited to book, schedule, inquire about, inquire about, inquire regarding, secure, create connection to, hold, pay for, create business relationship with, use transmittables to secure or book etc.], model asking if user wants to [for example which may be including but not limited to join live, come see, view, see advertisements, showing models calendars and their availability, asking users or paying persons to pay for this time, date, person etc.], showing model advertisements from platform, showing model advertisements on interface, showing model advertisements on calendar, one or more 'Live shows' scrolling/lists of live shows on [for example which may be including but not limited to feed/ screen/user interface etc.], price of 'connection/date' and how its 'changing' based on user's [for example which may be including but not limited to preferences, history, information, background information], user interface showing lists of available users for date for particular time period [for example which may be including but not limited to day, time, month, time, location, duration, check-in, check-out, time stamp, time record, time and data record, location, time and data record, coordinate(s), etc.]. Calendar may show lists of available users for date for particular time period [for example which may be including but not limited to day, time, month, time, location, duration, check-in, check-out, time stamp, time record, time and data record, location, time and data record, coordinate(s), etc.], calendar matching AI-connecting, [for example which may be including but not limited to dates' or 'users' or 'persons to 'paying users' calendar etc.], calendar matching AI-connecting, two or more users based on [for example which may be including but not limited to availability, location, duration, check-in, check-out, time stamp, time record, time and data record, location, time and data record, coordinate(s), history, computing operation, preferences, history, etc.], [manual or automatic, or machine learning, or computer, or robotics, or 3rd party chosen, or entity-chosen, or AI changing of content on calendar (similar to mood-board, virtual or visible displays of 'mood' or 'fantasy' or suggestions or 'AI-created' or 'theatrical' or 'inspirational board' or 'inspirational displays of created content' but created with AI, created by human, robot, bot, 3rd party, entity, computer system, AI system, crafted, developed by robotics based on collected or other data, such as (preview of date, user of date, dater, profile photo, name' information, etc.], etc.)

In some embodiments, which may include but not be limited to (e.g., opt-in or opt-out of, which may include but not be limited to (e.g., 'date subscription pool' and/or getting paid based on 'frequency of 'pooled booked dates,' getting paid by date amounts, getting paid by date frequency, getting paid by the subscription model, getting paid by unlimited dates, getting paid by unlimited subscription, etc.) In some embodiments, the user may be able to pay, which may include but not be limited to (e.g., unlimited subscription, upfront payment, pre-arranged payment, pre-paid, obtained funds, fund account, etc.) for, which may include but not be limited to (e.g., unlimited dates, subscriptions, unlocks, viewing, etc.) Each date, which may include but not be limited to (e.g., payment, record, hour, time, period, etc.) to model may be, which may include but not be limited to (e.g., pooled together and/or with others, etc.) which may include but not be limited to (e.g., paid at the end of a period or a cycle, paid once per week, paid once per month, paid once per year, etc.] In some embodiments, pooled together may change their, which may include but not be limited to (e.g., 'date average rates, date average or per day amount disputed, amount to be disputed to them in the pot or pool, etc.) other factors that may affect price from pot such as, which may include but not be limited to (e.g., duration, check-in, check-out, time stamp, time record, time and data record, location, time and data record, coordinate(s), and frequency of dates, etc.)

In some embodiments, which may include but not be limited to (e.g., models, users, 3rd parties, advertisers, advertisements, businesses, advertisers, etc.) may be able to pay to, which may include but not be limited to (e.g., be recommended, viewing more often/top of recommend, more frequently recommend/more shown, etc.) Some embodiments may include but not be limited to (e.g., cadges or achievements or awards (digital and/or physical, etc.) In some embodiments, which may include but not be limited to (e.g., models, users, any persons, human, AI, etc.) achievements such as, [which may include but not be limited to 'payments earned,' frequencies, lives, etc.) may allow the/a, which may include but not be limited to (e.g., computing operation viewing more often/top of recommend, more frequently recommend/more shown, Badges or achievements or awards [digital or physical] based on amount of money earned/spent on platform, etc.) In some embodiments, any user, which may include but not be limited to (e.g., membership subscription model, or payment, acceptance, approval, etc.) may allow, which may include but not be limited to (e.g., viewing all content and unlocking all content for [individual model/creator, any model/creator, any person, any entity, any platform item or gallery or content, etc.], etc.) In some embodiments, platform/interface(s) may allow (e.g., asset exchangeable between users, etc.) such as (e.g., accepting crypto between users, unique daters, special dates, 3rd party integrations for payment [for example: sending in a [Rolex, deed to your house, title to your car to a 3rd party and the 3rd party sending 'funds' to the platform which may fund account or pay for the date, subscriptions, unlocks, dates, etc.], etc.)

In some embodiments, there may be but not be limited to (e.g., synchronized/similar, etc.) at-home dates, which may include but not be limited to (e.g., synchronized food delivery, synchronized entertainment services like ordering a dancer/entertainer, synchronized streaming content via platform or 3rd party, synchronized games on the platform or 3rd party, etc.) In some embodiments, there may be (e.g., pre-scheduled, coordinated, surprise, any time, etc.) which may include but not be limited to (e.g., (e.g., delivery, order, etc.) times, which may include but not be limited to (e.g., may be different days or times, etc.) for, which may include but not be limited to (e.g., gift cards, clothing, flowers, gifts, etc.) In some embodiments, which may include but not be limited to (e.g., platform, interface(s), etc.), which may include but not be limited to (e.g., entertainment services, which may include but not be limited to [in-person, virtual dates, meetings, in-person meetings, business meetings], etc.)

In some embodiments, any user interface of, which may include but not be limited to (e.g., profiles, interfaces, calendars, etc.) which may include but not be limited to (e.g., showing pre-selected: [which may include but not be limited to dates, times, location, duration, check-in, check-out, time stamp, time record, time and data record, location, time and data record, coordinate(s), restaurants etc.], showing, which may include but not be limited to (e.g., [, which may include but not be limited to insert here' or make a suggestion, make an inquiry) dates, times, location, duration, check-in, check-out, time stamp, time record, time and data record, location, time and data record, coordinate(s), restaurants, etc], etc.) In some embodiments, any user interface of, which may include but not be limited to (e.g., profiles, interfaces, calendars, etc.), which may include but not be limited to, which may include but not be limited to (e.g., may require payment to send an inquiry that is not pre-approved or pre-selected or pre-determined or allowed, etc.) In some embodiments, the User 1 calendar, which may include but not be limited to (e.g., also showing User 2 interface (or User 3, 4, 5, 6, etc.) calendar at the same time, similar times, different times, same interface, staggered, create a new interface with both, etc.) In some embodiments, there may be a, which may include but not be limited to (e.g., subscription model, payment exchanged for 'agreed upon terms,' [which may include but not be limited to a certain amount of time spent during/for 'connection,' amount of meets per week, type of entertainment services provided, types of activities, types of effort to get ready, gas refunding, etc.)

In some embodiments, there may be a options to/for, which may include but not be limited to (e.g., unlock each item model, open message with content unlock model, payment, made before date, tipping after date, tipping randomly, tipping for no reason, viewing content, one-time in-person booking payment, automatically recurring in-person booking payment, one-time virtual booking payment, automatically recurring virtual booking payment, subscription date options, paying another model/creator to be a 'secret safety chaperone' during date, paying a 3rd party 'security' to be 'security' during date, paying to block of someone's calendar, selling, [which may include but not be limited to content, photos, videos, series, original movies, platform movies] through platform, sending physical mail items through platform, requesting 'gift-cards, assets, money, payment, services, hair stylists, clothing items' from user, paying to, [which may include but not be limited to book, schedule, inquire about, inquire about, inquire regarding, secure, create connection to, hold, pay for, create business relationship with, use transmittables to secure or book etc.) someone through platform calendar traveling to you for, [which may include but not be limited to date, connection, meeting) from another city], paying to, [which may include but not be limited to book, schedule, inquire about, inquire about, inquire regarding, secure, create connection to, hold, pay for, create a business relationship with, use transmittables to secure or book, etc.) through platform calendar to see someone in another city for example (e.g., date, connection, meeting etc.], paying to send someone a, [which may include but not be limited to message, content, video, inquiry etc.], etc.)

In some embodiments, there may be, which may include but not be limited to (e.g., connection app/platform/interface with calendar and/or payment, connection to calendar and/or payment to change, [which may include but not be limited to paid person's and person paying's calendar] and or/to add to the calendar for date, options to request a follow-up 'call' after date for payment, options to request a follow-up 'virtual call' after the date for payment, Connection app, [which may include but not be limited to app, interface, etc.] and/or connection interface and/or calendar plus 3rd party delivery/pickup, [which may include but not be limited to gift cards, foods, makeup, hair, services, hair stylists, makeup artists, stylists, etc.], etc.) In some embodiments, there may be, which may include but not be limited to (e.g., trending partners, trending advertisers, trending recommendations, trending business collaborations, etc.), which may include but not be limited to (e.g., recommended, advertised, suggested, for/possibly of collaborations with, etc.) which may be included but not limited to (e.g., content, specific photographers, partner photographers, videographers, video production companies, types of edited content such as a particular style photoshoot and/or process and/or goods from a 3rd party, etc.) in which platform/user interface(s) may receive, which may include but not be limited to (e.g., referral payments, advertisement fees, advertiser status, integrations, partnerships, etc.)

In some embodiments, interface, and platform may allow which may be included but not limited to (e.g., booking requests, scheduling, gig requests, outside gig requests, etc.) with which may be included but not limited to (e.g., payment, transmittables, free, fee, etc.) for, which may be included but not limited to (e.g., outside jobs, [which may include but not be limited to such as 'modeling jobs' or 'acting jobs', etc.], modeling for a brand, brand collaborations, brand gigs, brand deals, etc.) In some embodiments, which may be included but not limited to (e.g., outside or gigs, or outside jobs, or booked jobs, or requested jobs, etc.) which may be included but not limited to (e.g., booked through platform/interface, inquired about, requested, scheduled, etc.) may, which may be included but not limited to (e.g., allow, accept, request, need, require, inquire about, etc.) a, which may be included but not limited to (e.g., referral fee, percentage fee, booking fee, full payment, partial payment, deposit payment, partial fee, etc.) to, which may be included but not limited to (e.g., platform, interface, etc.)

In some embodiments, which may be included but not limited to (e.g., artificial intelligence, humans, machine learning, 3rd party data, any data, behaviors, etc.) may be analyzing which may be included but not limited to (e.g., content, photos, videos, clicks, time spent, based on what is, [which may include but not be limited to needed, spoken about, suggested, viewed, clicked on, for example, hair extensions, makeup suggestions, hair growth items, oils, how to act on a date, how to be friendly, etc.] and/or which may be included but not limited to (e.g., suggesting advertisements, showing advertisements, showing products, showing services, showing discounts for services, suggesting purchases, offering discounts for users, [which may include but not be limited to ads may be platform or any party's discounts, content viewing, subscriber suggestions, click to purchase, purchase this item, explainer videos, discount codes], etc.)

In some embodiments, interfaces/platform may allow interface(s) which may be included but not limited to (e.g., connection platform plus a 3rd party delivery option, platform delivery option, connection platform and/or calendar plus 3rd party integration or within platform, [which may include but not be limited to use Uber, transportation service, through app to get to date], connection platform and/or calendar plus referrals for bringing to platform or using platform, connection platform and/or integration of restaurants or businesses, [which may include but not be limited to menu, venue, servers, ambiance, location in restaurant, etc.]) directly into/with platform to pre-pay or pre-pick, or choose to have ready upon arrival, connection platform and/or integration outside or 3rd party site or within platform that may provide [for example: nanny's, maids, cleaning persons, babysitters etc.], connection platform plus a platform Integration within platform, or 3rd party, to sell personal items, [which may include but not be limited to used or handmade or from user] through 3rd party or platform, [which may include but not be limited to postal service (e.g., USPS), postmark etc.], platform Integration to sell, [which may include but not be limited to merchandise, goods, services, China/new items/Alibaba/USA based etc.], business through 3rd party, 3rd party advertising on, [which may include but not be limited to platform's profiles, feed, stacks, content, stories, messages, etc.], options to book 3rd party plane, hotel, restaurant/activity for traveling through platform book, [which may include but not be limited to photoshoots, professional content producers, book videographers, book photographer, book videographer] through 3rd party or through platform or integrated, etc.) In some embodiments, platform/interfaces may allow or have the options for, which may be included but not limited to (e.g., assets may be sent to 3rd party and/or funds may be automatically sent to platform to create credited funds, assets may be sent to 3rd party and/or funds may be automatically sent to platform to pay for debt or credit, assets may be sent to 3rd party and/or funds may be automatically sent to platform to pay for date, etc.) In some embodiments, there may be, which may be included but not limited to (e.g., bidding/auction on dates, bidding/auction for dates, live/streaming/recorded/internet-based/in-person bidding/auction on/for dates, live/betting on dates, betting on dates, live/'options on dates' like stock options, payment installment options for bidding/auction on dates, auctions for dates, auctioning off a date, live/events with auctions for dates that may or may not take places over platform, betting on dates between self/one/or more persons, live/auction for in-person date, live/auction for virtual date, entertainment options set by anyone or model or user, live/bidding/auction for in-person date, live/bidding/auction for virtual date, entertainment options set by anyone or model or user, live/charity auction for in-person date, live charity auction for virtual date, entertainment options set by anyone or model or user, price bidding/auction on/and dates based on person's personal data, bidding/auction and/or/gifting dates to someone else, bidding/auction on dates and or/saving them for later (pre-pay), bidding/auction may have time period to make payment, payment may be immediate, bidding/auction may have to have a pre-payment only and/or/ bidding/auction stops after amount is more than pre-paid, bidding/auction may have unlimited funds due to credit, bidding/auction may have credit limit, bidding/auction may have automatic payment options, bidding/auction may be paid by credit from platform, [which may include but not be limited to pre-loaded funds], bidding/auction for date may be up against 3rd party, bidding/auction for date may be up against another user, bidding/auction for date may have minimum reserve price, surprise auctions for bidding/auction on date(s), surprise locations for bidding/auction on date(s), surprise prices, price ranges, general pricing, general transmittables, when bidding/auction on date(s), mystery location when bidding/auction on date(s), mystery location when auctioning date(s), mystery location when gifting date(s), surprise persons for auctioning date(s), mystery person when auctioning date(s), mystery person when bidding/auction date(s), mystery price when gifting date(s), mystery person when gifting date(s), mystery payment amount when, [which may include but not be limited to locating, auctioning, paying, securing, gifting etc.) for date(s)], etc.)

In some embodiments, interface(s)/platform may be included but not limited to (e.g., verification that the date/ meeting happened by collecting data during date, resolution center, date log, management area, data collection, Manual/ automatic check in start and/or stop of date, [which may include but not be limited to begin and/or end], start and/or end of 'date' or 'connection, any user or person or robot paying or being paid, [which may include but not be limited to location/coordinates recorded beginning, during, end, after, etc.] taking data from a 3rd party, [which may include but not be limited to virtual, phone records, pinging, towers, social media, other apps, internet, etc.] to record/verify/ obtain information/collect data if 'date/meeting happened' or 'date/meeting occurred' or 'contractual agreements were met/made, etc., obtaining/collecting/data recording references from a 3rd party or self or person, [which may include but not be limited to restaurant, patrons, persons there, passerby's, etc.] to potentially verify if 'date happened' or 'date occurred' or 'contractual agreements were made/occurred/happened/collected, etc., automatic/Manual recording or pinging of towers or phone data collection for 'date/connection, et., info on 'strong/a history' of model arriving on time for dates and not having complaints, driving, travel, route, record of 'driving, travel, route, there' and/or data collected 'during drive, taxi service and/or ride-share service of arrival and/or departure, etc.)

In some embodiments, there may be user interfaces such as which may be included but not limited to (e.g., upload date proof (data log), upload date 'experience' or content from date, [which may include but not be limited to photos taken, other proof, outside proof, outside resources to prove date/meeting, etc.] filtering by range of, [which may include but not be limited to prices, price ranges, general pricing, general transmittables], breakdown of date information, [which may include but not be limited to location, time, duration, check-in, check-out, time stamp, time record, time and data record, location, time and data record, coordinate(s), activity], discovered, inputted, machine learned information of what user is doing at all times of the day. [which may include but not be limited to each minute routine, each hour, sleep schedule, sleep pattern, work schedule, outside work schedule, whether person has children/child duties, etc.]

In some embodiments, there may be a, which may be included but not limited to (e.g., date information and/or plus a calendar, 'live screen' or 'live stream' or 'pre-recorded live stream' with 'locked' profile with options on the user interface such as [for example" 'follow to unlock profile, subscribe to see everything, subscribe to view her calendar [for example: for a date, to book a date, to see her schedule], some basic information, prices, price ranges, general pricing, general transmittables, etc., available options for dates, [which may include but not be limited to such as 'breakfast, brunch, lunch, dinner, coffee, dessert, top golf, go-karting, shopping, etc.], booking 'safety chaperones, [which may include but not be limited to security, support, or security,' of other 'models' on platform [and/or the option of paying other models for this safety chaperone service, or any other service], booking 3rd party 'safety chaperones, [which may include but not be limited to security, support, or security,' through integrated or 3rd party calendar's (family, friends, non-paid persons timing data or otherwise], booking 3rd party 'safety chaperones, security, support, or security,' through integrated or 3rd party security systems such as, [which may include but not be limited to private bodyguard, safety security, etc.], option to automatically send a 'thank you video or any type of video' after 'booking is made and/or payment is made etc.], add to' extend the date' option, [which may include but not be limited to add ice cream date after dinner, payment is made, date is extended or second date option, another option: add shopping to before or after lunch, payment is made, date is extended etc.], adjust price of 'in-person/virtual date/in-person/virtual date extension' by model based on [for example her own assessment of pricing or her own pricing on anything, which may include but not be limited to how far it is, how much inconvenience it would be for her, if she has to drive there or if its next door to the restaurant, if it's in the same mall just a few steps of a walk, if she has to tell her security to follow her there and it's at another location user interface may be more expensive etc.], etc.)

In some embodiments, there may be a, which may be included but not limited to (e.g., price adjustments for any 'date' or reason based on those reasons or other factors that may raise or lower the price, adjust price of virtual date extension, [which may include but not be limited to at the discretion of the model], a group date virtual user interface with one or more/multiple users, [which may include but not be limited to user may have control over what user interface looks like aka how big each person is on the screen, hologram, user interface, viewing display, whether paying user wants to be blurred out, or if he wants to be shown or not etc.], suggestions shown based on frequent date types such as, [which may include but not be limited to frequent 'lunch dates' or 'frequent dinner dates' or 'prefer dinner dates,' this person goes on frequent lunch dates and you have lunch open, etc.], ability to play/playing a virtual game with another user, book date option on/from content, book date option on/from calendar, book date from calendar, book date from content, book date from AI, book date from photo, book date from profile, book date from streaming, book date from timing date, book date from any user interface, book date option on matching AI-connecting, system [for example: while swiping, tapping, browsing, searching], book date option on search or perimeter search or location search for user system or user system search, book date option on computing operation content, [which may include but not be limited to showing up on someone's user interface(s) which may be feed, homepages, managing pages, messaging system, calendar], subscribe button may be near or directly on content, follow button may be directly on content, book date button may be directly on content, AI may be able to analyze content or user's photo and suggesting similar looking users or users that person may vibe with such as, [which may include but not be limited to a male brunette, AI matching AI-connecting, or suggesting with a female brunette, an active person matching AI-connecting, with an active person, workout videos matching AI-connecting, with workout videos, etc.]

In some embodiments, interface(s) and/or platform which may be included but not limited to (e.g., view calendar/book calendar option directly on content, there may be an 'upcoming date section,' [which may include but not be limited to an activity center, constantly updating to show next 'date' or 'activity' or 'connection' etc.], an option to add model or creator or user or person to a 'list' that may be used as, [which may include but not be limited to save for later, categorize, book date with this person next month at this time, take this list of models and notify me if anyone's price is at 500$ and automatically book that date once its available, take this list of models and notify or inform me if 'price changes' occur etc.], content with 'book now buttons' or options to book date or view calendar or timing options or timing methods from content, content with 'see calendar buttons, content with 'book an in-person date button(s), content with 'book an virtual date button(s), managing stock portfolio on/from platform, managing stock portfolio that may be integrated from 3rd party, converting stocks on platform to another form of currency, converting stocks integrated from 3rd party to another form of currency, user interface may show, [which may include but not be limited to agreements of date met, time period left until disbursement of payment, leave review, leave star rating] ask model/creator if, [which may include but not be limited to user, person, entity, 3rd party, etc.] want to go out with this person again etc.], managing payments of bills through platform/3rd party, managing payments of bills through 3rd party/platform integration, etc.)

In some embodiments, interface(s)/platform which may be included but not limited to (e.g., transferring payments or assets to bank from platform, transferring payments or assets to bank from 3rd party integration, viewing user 1 calendar while also viewing user 2 calendar, viewing own calendar (user 1) while also viewing user 2 calendar, user interface of all live/streamed content, user interface scrolling up, down, left, right, matching AI-connecting, viewing 'live content, options to [save user for later' to book, schedule, inquire about, inquire about, inquire regarding, secure, create connection to, hold, pay for, create business relationship with, use transmittables to secure or book, schedule, inquire about, etc.] at a later date or now, options to add users to cart or checkout area or categorize with only payment left to be made or breakdown or almost only payment to be made, option to categorize or separate or organize users to be 'booked for a date at a later time, [which may include but not be limited to when funds are available from job, when work check is paid etc.] Artificial intelligence, machine learning, virtual assistant, machine assistant may be able to automatically, manually or learn to perform automatically or by command any task or item listed here, combining any 'live/content user interfaces' with 'pre-made content or other content user interfaces' to create a custom user interface, combining multiple pages or user interfaces to create a custom user interface, user 1 viewing multiple calendars along with their own, user 1 viewing multiple calendars without their own, searching for users (models, users) through calendar as search engine through platform/interface(s), view 'hot spot or general 'hot' areas or cities with 'daters' or 'models' or persons on platform, calendar search engine to find users or matches or persons, matching AI-connecting, matching within calendar, matching users, matching models, QR code from platform to manage platform anywhere on the go or interface, etc.)

In some embodiments, interface(s)/platform which may be included but not limited to (e.g., connected application or downloadable app/software to, [which may include but not be limited to phone, device, iPad, computer, computing system that may be managed, tasks performed, integrated calendars, integrated access, given access etc.] there may be applications or submissions such as 'Find wife,' [which may include but not be limited to users/persons/entities that are accepting husband applications plus a fee/payment etc.] there may be applications or submissions such as 'Find girlfriend,' [which may include but not be limited to users/persons/entities that are accepting boyfriend applications plus a fee/payment etc.], there may be applications or submissions such as 'find a partner' (users/persons/entities that are accepting long-partner applications plus a fee/payment), find date based on availability, find date based on calendar, find date based on location, find date based on distance, find date based on city, requirements, [which may include but not be limited to requirements such as follow profile, pay platform, subscribe to person, send one-time or recurring payment etc.] to 'view calendar, see calendar, interact with calendar, view options on calendar, send inquiry to calendar, pay for booking on calendar,) asking AI for 'date' 'management,' [which may include but not be limited to assistance, help, voice commands, changing something, cancellation, something, AI recording my voice, AI accepting voice commands etc.] find date based on type, [which may include but not be limited to in-person, virtual, content only, interactive games, interactive messages, custom content, custom requests friendly etc.] find date based on categories, [which may include but not be limited to virtual only, reality stars, commercial models, runway models, actresses, models, creators, celebrities, beauties, types of content, types of availabilities in-person, student, virtual, content, popularity, most viewed, random computing operation etc.], etc.)

In some embodiments, interface(s)/platform which may be included but not limited to (e.g., calendar matching AI-connecting which may be within calendar or interface, trust account pays 'model or creator' at end of 'time period' or when 'clock ends or when connection occurs or at any time, different feed views or content views based on category, [which may include but not be limited to clicked/entered/typed/searched) such as, [which may include but not be limited to paying view, free view, subscriber view, VIP view, platform membership view, VIP dater view etc.], options to, [which may include but not be limited to manage, edit, block off, change, issue refunds/partial refunds within own personal calendar, etc.] driving data, travel/route data, location data, car data, sign data, stop light data, location camera data may be all recorded to data collection on platform, scroll or discovery or stack may continuously change based on computing operation, [which may include but not be limited to such as profiles clicked, type of content viewed most, type of memberships, types of persons frequently looking at etc.]

In some embodiments, interface(s) platform which may be included but not limited to (e.g., driving data, travel data, route data, data, location data, car data, sign data, stop light data, location camera data may be all recorded to data collection integrated from 3rd parties to platform or with platform, getting paid, [which may include but not be limited to in date log, management area, etc.] after data may be collected to confirm contractual agreements have been completed/performed, reserve outside resources such as 'Uber, transportation service, flowers, gift cards, visual gift cards, send stylists or resources' for date/connection, pay for all/most bills for creator or user, husband, partner, or lover, [which may include but not be limited to temporary relationship] application plus payment, husband, partner, or lover, [which may include but not be limited to temporary relationship] application, automatic data collection from date, manual data collection from date, 3rd party data collection from date, outside resources data collection from date, manual check in of date, manual check out of date, automatic check in of date, automatic check out of date, automatic location recording of date, manual location recording of date, 3rd party location recording of date, live current location of date, tax resources integration, outside 3rd party tax resources, gross, net, total, payment receiving, [which may include but not be limited to breakdown, itemized, receipt, invoice, total, partial, breakdown, bill, summary of, total, etc.], [user interface earnings, referral payments, status, calendar live, calendar, messages, payout, pending payments, total payments, total received yearly payments, yearly, monthly, weekly, daily, [which may include but not be limited to breakdown, itemized, receipt, invoice, total, partial, breakdown, bill, summary of, total, etc.] of payments or received payments, [modeling contests such as 'pay per vote' or 'vote for free'], [separate profiles or persons by, [which may include but not be limited to categories, tags, etc.) scrolling/matching AI-connecting/watching user interfaces for live shows, [which may include but not be limited to one or more], [concurrently looping/viewing/etc.)

In some embodiments, interface(s)/platform which may be included but not limited to (e.g., playing content in shapes, areas, user interfaces], [concurrently looping/viewing/playing content], [concurrently looping/viewing/playing content that may be replaced or is replaced with each loop with a new piece of content], [concurrently looping/viewing/playing content that may be replaced or is replaced with each loop with a new piece of content located in shapes, areas, user interfaces], disappearing and appearing profiles, [disappearing and appearing content, (which may include but not be limited to videos, scenes, scenarios, videos, original series, original content, platform content, etc)], disappearing and appearing calendars, disappearing and/or appearing live shows, disappearing and/or appearing messaging options or contact options, separating users by categories, creating a custom, [which may include but not be limited to user interface, viewing, hologram, visuals, screen etc.] by categories, creating a custom, [which may include but not be limited to user interface, viewing, hologram, visuals, screen etc.] by which may be included but not limited to (e.g., manually/automatically/artificial intelligence etc.) choosing which may be included but not limited to (e.g., which ones, some free preview credits for content, some free preview credits for lives, some free credits for viewing calendars, some free previews for content, unlimited credit for calendar viewing, unlimited credit for calendar booking, unlimited credit for virtual booking, unlimited credit for message sending, unlimited credit for content unlocking for each user, unlimited credit for content unlocking for platform content, trust fund holdings for reservations, trust fund holdings for in-person dates, trust fund holdings for food ordering for dates, trust fund holdings for penalty payment for cancellation date, trust fund holdings for payment for date, trust fund holdings for travel-related expenses such as, [which may include but not be limited to plane, hotel, vehicle transportation etc.] for date/connection, etc.)

In some embodiments, interface(s)/platform which may be included but not limited to (e.g., trust fund holdings for creator/model's time payment for date, gift in exchange for time or date, trust fund holdings for activity ordering for dates, trust fund holdings for shopping for date, trust fund holdings for services such as, [which may include but not be limited to massage, manicure, hair styling, go-karting etc.] for dates, beginning date by time, beginning date by location, beginning and/or ending date by business location, beginning date by contractual agreement time/date/location, start and/or ending date based on, [which may include but not be limited to duration, check-in, check-out, time stamp, time record, time and data record, location, time and data record, coordinate(s)], beginning and/or ending date based on time, beginning and/or ending date based on time, date, and/or location, chip/robot location recording of date, data log with location data from date, data log with duration, [which may include but not be limited to check-in, check-out, time stamp, time record, time and data record, location, time and data etc.], etc.)

In some embodiments, interface(s)/platform which may be included but not limited to (e.g., record coordinate(s)/data from date, data log with business/personal, [which may include but not be limited to what was eaten/ordered etc.] data from date, current time recording on date, manually date-ending options, [which may include but not be limited to issue refund, report problem etc.], automatic date-ending options, [which may include but not be limited to regular date, general date etc.], mental health resources, [which may include but not be limited to therapy, happiness, general etc.] safety resources, [which may include but not be limited to prevent crimes, prevent danger, report danger, be safe, what not to do etc.] sexual assault resources, [which may include but not be limited to if sexually assaulted, what to do, who to talk to, where to go etc.] forced labor, [which may include but not be limited to sex or human trafficking information and resources etc.], psychological coercion resources, [which may include but not be limited to psychological training, assistant, or help for preventing danger through mental coercion/tricking, false pretenses etc.], educational resources such as, [which may include but not be limited to community college, trade college, skills college, managing payments for school etc.], How to run your business center, [which may include but not be limited to how to do business, terms, conditions, business advice etc.], community bulletin, [which may include but not be limited to safety blog posts, safety posts, information for creators etc.], reapplication process if denied, guideline process for approval, upload proof of date plus approval plus funds disbursement, date log, management area, confirming contractual agreements have been met and/or automatically dispersing payment, requirements to be met in order to be paid, requirements to be met in order for funds to be disbursed, date resolution center for data collection, network address, IP address, funds disbursement, cancellation, refunds, editing for date/meeting/connection, etc.)

In some embodiments, interface(s)/platform which may be included but not limited to (e.g., summary or, which may include but not be limited to, [which may include but not be limited to breakdown, itemized, receipt, invoice, total, partial, breakdown, bill, a summary of, total, etc.] of 'date' which may include but not be limited to (e.g., time, location, duration, check-in, check-out, time stamp, time record, time and data record, location, time and data record, coordinate(s), safety information, external links, resources, what to wear, rules for date, terms and conditions, laws, address of location, activity, contractual agreement, info for funds disbursement, safety videos before date, safety videos or safety agreements signed or watched prior/after date, model block off own calendar for any reason, etc.) [model allow or deny bookings for calendar], [3rd party management system, entity, or person to approve, deny, manage bookings for model on platform], In some embodiments, interface(s)/platform which may be included but not limited to (e.g., [re-booking summary for easy rebooking such as, [which may include but not be limited to breakdown, itemized, receipt, invoice, total, partial, breakdown, bill, summary of, total, etc.] of last date/current date/upcoming date and/or easily re-book another date], easy re-book for date, easy summary and/or re-book for date, [denying/agreeing person to book, schedule, inquire about, inquire about, inquire regarding, secure, create connection to, hold, pay for, create business relationship with, use transmittables to secure or book, schedule, inquire about, etc.) another/first in-person/virtual date], [denying/agreeing for person to book, schedule, inquire about, inquire about, inquire regarding, secure, create connection to, hold, pay for, create business relationship with, use transmittables to secure or book, schedule, inquire about, etc.) another/first in-person/virtual date], removing calendar from users view, [not allowing/accepting users to view calendar, interact with to view calendar, interact with to view timing data method, [which may include but not be limited to meaning book, schedule, inquire about, view, inquire about etc.]], a/multiple creator/models booking, reserving on calendar/timing/interface, [friend, acquaintance, family member, anyone] to safety chaperone date with no payment/or payment just booking say on integrated calendar], [blocking/preventing specific places, time, locations, duration, check-in, check-out, time stamp, time record, time and data record, location, time and data record, coordinate(s), of in-person/virtual date], blocking house deliveries/address inquiries from 3rd parties or from user or from anyone, [adding only specific pre-approved or pre-determined places, time, locations, duration, check-in, check-out, time stamp, time record, time and data record, location, time and data record, coordinate(s), s of in-person/virtual date], setting up automatic dates with user setting up/allowing automatic dates with user including payment transfer, etc.)

In some embodiments, interface(s)/platform may allow, which may be included but not limited to (e.g., pay per minute for a phone call, pay per phone call, pay per video call, pay per minute to chat, pay to send voice messages, pay to send video messages, pay to send picture messages, etc.)

In some embodiments, interface(s)/platform may allow, which may be included but not limited to (e.g., setting up/allowing automatic funds transfer to user, setting up/allowing automatic/Manual, [which may include but not be limited to gifts, gift cards, rent payments, bills payments, asset sending such as 'selling and sending funds for stocks' transfer, etc.], setting up/allowing automatic stock transfer to user, agreeing to, [which may include but not be limited to signing, facial recognition, live viewing or live contractual agreement etc.] contract terms per date or per in-person/virtual connection, request for item [such as: hair item, makeup, gift card, rent payment) approval or denial request etc.], request for item [such as: hair item, cosmetics, gift card, rent payment etc.] approval or denial request then tracking or disbursement of item, [3rd party integrations or information such as 'safety agreements' safety videos' safety information] [Viewing background check, personal information of user that has, [which may include but not be limited to paid, looked, viewed, seen, booked, checkout, secured with you etc.]], [options to deny and refund paid persons, [which may include but not be limited to date, connection etc.]] options for free background check or social media check or personal information check for, [which may include but not be limited to paying dater, potential dater, viewer, follower, person, etc.]] [options for, [which may include but not be limited to pay per view or one-time payment]], [background check or social media check or personal information check for, [which may include but not be limited to paying dater, potential dater, viewer, follower, person, etc.]]

In some embodiments, interface(s)/platform which may be included but not limited to (e.g., [given summary of background check, all social media, all background information along with date summary], [Options to obtain background information or verified information before agreeing to date that is paid for or before payment is made], [options such as booking photoshoots, booking video shoots, paying for professional content services' through platform], Safety center for model, etc.)

In some embodiments, [Laws, rules, regulations, what is not allowed, signed agreements for 'paying person before date], [Customized entertainment, entertainment, requested entertainment, entertainment, for example, booking, requests, negotiations]], [Calendar pre-decided or pre-approved customized entertainment, entertainment, requested entertainment, entertainment, booking], [Badges or certifications showing 'prostitution is illegal, this may be not an escort site, rules, and regulations, etc.]

In some embodiments, there may be interface options on the screen or in general or on any user interface, which may be included but not limited to (e.g., date mode, bid mode, schedule mode, subscription mode, browsing mode, message mode, contact mode, discover mode, viewing content mode, view mode, discovery mode, content mode, search mode, list-mode, add to list mode, create-list mode, short-form content mode, bidding mode, model mode, creator mode, etc.)

In some embodiments, interface(s)/platform, which may be included but not limited to (e.g., AI assistant in connection app, [Ai assistant is knowledgeable and may be asked about terms, conditions, rules, regulations, laws, date rules etc.], AI assistant may be book calendar dates, AI assistant may be change calendar dates, AI assistant may be resound to messages, post content or negotiate business deals, AI assistant may be do a background check, AI assistant may be answer questions about specific dates (from data collection), AI assistant may be answer questions about 'how to act on date, [Ai assistant may be send reminders], AI assistant may be trained on how to send reminders (texting, type, day, time, email)], AI assistant may inform or communicate with security, AI assistant may inform or communicate with law enforcement, AI assistant may inform or communicate with platform, [artificial intelligence may be able to respond itself to application and gain/seek approval artificial intelligence may be able to, which may include but not be limited to (e.g., seek approve for, edit, submit etc.) application and/or denial], [Artificial intelligence may be able to send/approve/etc application and sending to human to make final decision], [Artificial intelligence may be able to send/approve/etc application and ask for more information or changes], [artificial intelligence assistant may be give 'real-time' travel data, such as, [which may include but not be limited to private travel data, public travel data, private jet inquiries, private information from travel companies, 3rd party traveling, 3rd party travel companies, etc.)], In some embodiments, interface(s)/platform which may be included but not limited to (e.g., AI assistant may be suggest 'dates' based on 'budget' or 'amount of money' or 'funds available' etc., AI assistant may send (reminders' to 'remember to re-book a date or book a date on this day etc.) preview of content, then pay to continue content viewing, tipping on messages, [user gets a, which may include but not be limited to (e.g., receipt, invoice, total, partial, breakdown, bill, itemized payment, etc.) for, which may include but not be limited to (e.g., date, connection, meeting, time period etc.)], paying for messages, booking requests with payment for outside jobs such as 'modeling jobs' or 'acting jobs' etc., booking requests inquiries for outside jobs such as 'modeling jobs' or 'acting jobs' etc., matching AI-connecting based on price preferences, based on looks, based on travel, based on duration, matching AI-connecting, check-in, check-out, time stamp, time record, time and data record, location, time and data record, coordinate(s), Matching AI-connecting, based on price range, [adding costs or payments or separate (e.g., breakdown, itemized, receipt, invoice, total, partial, breakdown, bill, summary of, total, etc.) for 'childcare costs during date, Connecting or adding social media to profile, content, [paying to view someone's social media links/content], [Users may be choose prices, price ranges, general pricing, general transmittables, for viewing personal information], [Users may be choose prices, price ranges, general pricing, general transmittables, for viewing social media information or links], In some embodiments, interface(s)/platform which may be included but not limited to (e.g., Integrate calendar or connect calendar to 3rd parties (3rd party calendar, 3rd party management calendar)], [view hot spot of 'daters or models' (no personal information)], Search in 'hot spot for 'daters or persons (no personal information) (general areas)], [add live 'story' or live post or disappearing post], [AI automatically updating live story], [manual or automatic, or machine learning, or computer, or robotics, or 3rd party chosen, or entity-chosen, 'live story' updating], pre-made posts to automatic 'live story' with updating by AI or machine learning or manual posts or automatically scheduled posts], [Ai using previous search perimeters such as 'blondes, New York' and showing a lot of 'blonds from New York, until other computing operation searches are performed or agate this one/previous ones] [public stories (live information or recent post) data saved to platform for safety reasons], [private stories (live information or recent post) data saved to platform for safety reasons], [user may be able to automatically promoted for a time period (day, week, month, year, any amount of time)], [user may be able to on homepage for a time period (day, week, month, year, any amount of time)], user may be able to recommended or show up on any user's calendars for a time period (day, week, month, year, any amount of time), [unlocking episodes or original series episodes (created by/uploaded by/made by) content creator]

In some embodiments, interface(s)/platform which may be included but not limited to (e.g., [artificial intelligence creating content by inputting user's content and creating other content], [artificial intelligence creating content by inputting stock content and creating other content], similar calendar matching AI-connecting, Similar pattern in calendar matching AI-connecting, similar date times available matching AI-connecting, [user may be able to recommended or show up on any user's content feed for a time period, (which may include but not be limited to day, week, month, year, any amount of time)], [platform/integrate outside or 3rd party site that may provide services or goods, [which may include but not be limited to nanny's, maids, cleaning persons, babysitters, groceries, supplies, clothes, etc.] plus/possibly along with their, [which may include but not be limited to reviews, ratings, other types of information regarding which models they have worked with, their comments, their reviews, star ratings etc.]], [manual or automatic, or machine learning, or computer, or robotics, or 3rd party chosen, or entity-chosen, charity donations or charity percentages for date payment, or partial payments of dates, or a percentage etc.], [User interfaces may be exchanged or changed, [which may include but not be limited to stack view to swipe view to flat view to category view, to list view to live view, to multiple user view, to custom user interface view etc.], [which may include but not be limited to specific content/photo/video upload instructions such as 'viewing or denying photos based on metadata, (which may include but not be limited to older than 3 years old' for users/men/or paying persons) on platform to, (which may include but not be limited to prevent catfishing], [real-time travel data, (which may include but not be limited to private travel data, public travel data, real-time pricing, real-time changes in traveling, real-time changes in pricing for travel or other locations, etc.)]], [live photo upload or person certification system that makes person take live photos of currently to prevent catfishing], [blur/grey/show partial with/without requirements to pay, [which may include but not be limited to follow, subscribe, membership only, payment, etc.] for clear view of content]], etc.)

In some embodiments, interface(s)/platform which may be included but not limited to (e.g., [greyed out calendar or not available to book, schedule, inquire about, inquire about, inquire regarding, secure, create connection to, hold, pay for, create business relationship with, use transmittables to secure or book, schedule, inquire about, etc.) time period when someone else has booked already], [unlimited dating options], [self-tagging or categorizing, (which may include but not be limited to content, persons, users, models)], [viewing 'likes or preferences for dates' such as, (which may include but not be limited to loves flowers, wants makeup, loves gift cards, favorite dessert options)], [seeing up automatic dates, times, places, duration, check-in, check-out, time stamp, time record, time and data record, location, time and data record, coordinate(s), payment sending], [allowing virtual assistant to manage bookings, schedule, messages, content], free following of user, payment for subscription for user, payment for each content unlock for user, payment for viewing 'live/pre-recorded live show' of user, free preview of 'live show' of user, free preview of content or collaboration content, free preview of 'platform content, paid options for 'platform's content, [booking, (which may include but not be limited to restaurant, location, waiter, items of food, dessert, liquid items, any birthday stuff etc.) all through platform/interface/integrated 3rd party], [categories or separation of users, plus additional sub categories (more specific)], rooms' or user interfaces for specific goals such as 'calendar viewing, [rooms' or user interfaces for specific goals such as 'which users are available for what day/time/location/duration, check-in, check-out, time stamp, time record, time and data record, location, time and data record, coordinate(s)]. [searching in calendar for user 2 to match availability of user 1], [searching in calendar to see if there are user 2's available for user 1], [searching in calendar to see if there are user 2's available for user 1 at a specific time, date, location, duration, check-in, check-out, time stamp, time record, time and data record, location, time and data record, coordinate(s)], etc.)

In some embodiments, interface(s)/platform which may be included but not limited to (e.g., [raising prices, price ranges, general pricing, general transmittables, or changing prices, price ranges, general pricing, general transmittables, from person from virtual date/in-person date, from person from messages or inquiries], [assigning specific payment requirements to specific users], [3rd party phone number integration with payment/for free (included in date log, management area.)], [Integrated 3rd party phone number integration with payment/free (included in date log, management area)], [adjusting mass messages costs to unlock or view], [changing or managing specific persons for specific prices, price ranges, general pricing, general transmittables, based on categories to unlock, view, or date], [automatic messages to book, schedule, inquire about, inquire about, inquire regarding, secure, create connection to, hold, pay for, create business relationship with, use transmittables to secure or book, schedule, inquire about, etc.) another date sometime after date is completed], [Automatic messages to book, schedule, inquire about, inquire about, inquire regarding, secure, create connection to, hold, pay for, create business relationship with, use transmittables to secure or book, schedule, inquire about, etc.) another date sometime before date is completed], [automatic messages to book, schedule, inquire about, inquire about, inquire regarding, secure, create connection to, hold, pay for, create business relationship with, use transmittables to secure or book, schedule, inquire about, etc.) another date sometime during date], [uploading proof of date outside such as (valet proof and cost, being left with a bill) and uploading it which may add a fee for paying person to pay], [allowing a 3rd party to manage bookings, schedule, messages, content], [Allowing artificial intelligence or machine learning or a training model to manage bookings, schedule, messages, content], [sending user an option to 'customize the in-person date' for example (request that Emily chooses date, time, place, duration, check-in, check-out, time stamp, time record, time and data record, location, time and data record, coordinate(s), and then user only may only to complete payment and agree to terms etc.)]

In some embodiments, interface(s) platform which may be included but not limited to (e.g., [sending user an option to 'customize the virtual date' for example (request that Emily chooses date, time, 3rd party food delivery or activity such as 'both people cooking or playing game,' duration, check-in, check-out, time stamp, time record, time and data record, location, time and data record, coordinate(s), and then user only has to complete payment and agree to terms etc.)], [platform Tagging or categorizing (content, persons, users, models)], [AI or machine learning putting models or persons on users calendar and asking them to pay (or continue booking by paying)], [suggesting credit cards or credit lines or to obtain 'funds' on platform to pre-pay for dates or to get credit for dates], [requesting 'paying person' to wear a suit/tie/attitude etc.) for date], [book photoshoots, photographers, videographers, professional content producers from platform], [book nanny, assistants, maids, babysitters, through platform], [comparisons of professional content and non-professional content], [mandatory type of submitted photos or 'digital polaroid' type photos 'similar to modeling agency (digitals, or digital polaroid's for booking jobs) for purpose of modeling, or acceptance to site, or to book, schedule, inquire about, inquire about, inquire regarding, secure, create connection to, hold, pay for, create business relationship with, use transmittables to secure or book, schedule, inquire about, etc.) jobs], [3rd party integrations or 3rd party management of 'talent, model, person' (booking jobs, approval, denial, price (e.g., breakdown, itemized, receipt, invoice, total, partial, breakdown, bill, summary of, total, etc.) responding to messages, responding to inquires)], [request 3rd party or platform background check on user], [categorize users or persons on platform for lists, separating, sections, or persons for any reason], [Options to pay full, partial, any amount of users or person's bills]

In some embodiments, interface(s)/platform which may be included but not limited to (e.g., [custom building or custom view of user interfaces (multiple user interfaces at one, multiple screenings at one, multiple content viewing at once etc.)], [(e.g., breakdown, itemized, receipt, invoice, total, partial, breakdown, bill, summary of, total, etc.) of recurring bills, one-time payment bills, debt payments, debts owed, payments that need to be made], [filtering persons by (salary, history, popularity, which may include but not be limited to (e.g., breakdown, itemized, receipt, invoice, total, partial, breakdown, bill, summary of, total, etc.) s, stock owning, owning house, type of car, type of profession, travel friendly, net worth, verified income etc)], [filtering persons by (looks, talent, beauty, categories, stay at home, gift loving, business owning, hobbies, love languages etc)], [internal communication center from platform for models for 'safety reasons' such as 'bulletin boards with information of what to look out for, how to be safe etc)], [accepting safety information from platform to be used for 'safety bulletin billboard center' within platform], [dummy versions of profile or separate versions of profile or multiple versions of profile or ways to contact that is all linked to one management center], [add 'boyfriend or special VIP or person' for 'special treatment or special viewing options or booking options], [searching for men or 'paying persons' from 'models' to send (winks, viewing profile, viewing person, model to send messages, inquiries, calendar availabilities, wanting to book, schedule, inquire about, inquire about, inquire regarding, secure, create connection to, hold, pay for, create business relationship with, use transmittables to secure or book, schedule, inquire about, etc.) with etc)], [searching for models or creators by 'price'], [searching for models or creators by 'availability'], [searching for models or creators by 'calendar]'

In some embodiments, interface(s)/platform which may be included but not limited to (e.g., [searching for models or creators by 'duration, check-in, check-out, time stamp, time record, time and data record, location, time and data record, coordinate(s), of date], [searching for models or creators by 'location of date], [searching for models or creators by 'frequency of dates], [searching for models or creators by 'type of date], [searching for models or creators by 'virtual dates], [searching for models or creators by 'in-person dates], [searching for models or creators by 'interests], [searching for models or creators by 'looks], [Searching for models or creators by 'talent], [Searching for models or creators by 'group], [searching for models or creators by 'categories], [searching for models or creators by 'platform tagged or platform given categories], [Searching for models or creators by '3rd party confirmation such as wiki page or celebrity, or in the news, or famous], [Live face shots' or live body shots required to sign up for platform]

In some embodiments, interface(s)/platform which may be included but not limited to (e.g., [payment required to submit application for platform], [payment required to book, schedule, inquire about, inquire about, inquire regarding, secure, create connection to, hold, pay for, create business relationship with, use transmittables to secure or book, schedule, inquire about, etc.) 'in-person dates' on platform], [verification required to book, schedule, inquire about, inquire about, inquire regarding, secure, create connection to, hold, pay for, create business relationship with, use transmittables to secure or book, schedule, inquire about, etc.) 'in-person dates' on platform], [Requesting 'paying person' to gift person a gift card, makeup, clothes, flowers in person, anything], [history of locating 'gifts' or presents], [history of locating where 'sent items are (such as merchandise or at home items that were sent)], [Seeing history of daters], [options to obtain automatic reminders about date], [may canceling and issuing refund for date], [changing date and time of date], [changing date and time of date in exchange for payment], booking date in-person in exchange for payment, booking date virtual in exchange for payment, sending message or getting response in exchange for payment, [blocking specific categories or persons from booking a virtual date, entertainment options set by anyone or model or user, in person date, sending messages, viewing locked content, viewing NSFW/sexy photos etc.], block persons went out on date with or may have had date with previously, block custom requests from in-person dates, block persons that are inappropriate from in-person, virtual, messages, or any type of communication or connection, block persons from re-booking another date without their knowledge, viewing entirely of content, movie, picture, video in exchange for payment, move date from one city to another, [option to book, schedule, inquire about, inquire about, inquire regarding, secure, create connection to, hold, pay for, create business relationship with, use transmittables to secure or book, schedule, inquire about, etc.) date, connection, business meeting, meeting with users in another city], [options to bring users from other cities to your city for date, connection, business meeting, meeting], [options to request custom content in exchange for payment], [options to deny, change, partially delivery content request in exchange for payment], [seeing background checks or personal information of daters], [seeing history of date log, management area, or 'previous date went on]

In some embodiments, interface(s)/platform which may be included but not limited to (e.g., [option to report situation using date log, management area, option to accept or deny date after date is paid], [option to accept or deny date before date is made], [option to block users that may have seen or unlocked 'NSFWs' or 'sexy photos' from booking a date with user], options to categorize users and block them from booking date with user], [options to manage calendars and change prices, price ranges, general pricing, general transmittables, for calendar times, dates, locations, availabilities, options], [options to view their request for additional items such as 'wanting flowers in-person, requesting a gift card in person], [requesting flowers sent to house, requesting a dress for date' 'requesting their bills be paid prior to date' 'requesting money for hair stylist etc.], viewing previous date pictures or videos from user, (which may include but not be limited to happy customers), [moving reels or moving content, or constantly looping content,

[grouped together or viewed or seen more content/person/users based on computing operation data, settings, execution/AI], [calendar integration for booking dates (or securing connection time spent) in exchange for payments], [pre-chosen dates, times, locations to choose on calendar to book, schedule, inquire about, inquire about, inquire regarding, secure, create connection to, hold, pay for, create business relationship with, use transmittables to secure or book, schedule, inquire about, etc.)]. [pre-chosen payment prices, price ranges, general pricing, general transmittables, set by user, person, model], [book for in-person date option (on user interface) on top of or next to content], [book for virtual date option (on user interface) on top of or next to content], [viewing calendar of user (model, creator) and/or calendar of user (paying person) at the same time/similar], [being matched to user based on calendar availability, scheduling option, etc.], [being matched to user based on calendar suggestions/computing operation], etc.)

In some embodiments, interface(s)/platform which may be included but not limited to (e.g., pay to get bad ratings removed, pay to get ratings removed, pay to have no option to be 'rated' after a date/before/during date [, Pay to have no comments made after date as a review on their platform area/profile etc.]. [pay platform to remove signed up job verification email verified badge etc.], pay for membership unlimited platform content, [pay for membership to see unlimited content only by users that opt-in to be part of the unlimited platform payments, (which may include but not be limited to models get paid based on how many times their content is viewed in a pot)], [pay to go on unlimited dates for an entire year, (which may include but not be limited to may be a limit of one day per day such as 400,000)], [pay to go incognito such as (not be seen by other male members, or not be seen by models that are not being bid on etc)], [pay to not have personal information shared with other (male members)], [pay to get unlimited messages to models on platform (but only if she responds or wants to be messaged)]. [pay to have compliments removed on platform], [pay to hide date 'amounts' (meaning how many dates he's been on or how much each date has costed him) to other male members], [pay to hide 'star or rating reviews' to other male/female members/entities/persons], [pay to hide net worth from other male/female users/entities/persons etc.], [personal information on users or persons or interested parties to female/model/users/members that person/interested party is interacting with for the purpose of any reason such as: in-person dates, virtual, connection, consideration, etc.], [model/content creator silent content until payment is made], [model/content creator blurred content until payment is made], [platform silent content until payment is made], [platform blurred content until payment is made], [half content shown until payment is made (to platform or to user or both)], Some swipes/interactions until payment is made (to platform or to user or both based on network address, IP address), A few browsing until payment is made (to platform or to user or both from Network address, IP address, etc.) Some live views using Network address, IP address/etc.) until payment may be made (to platform or to user or both), [a few photos/videos/content until payment is made (to platform or to user or both)], etc.)

In some embodiment, a countdown clock is provided to the first closed time (i.e., date), to the second user getting paid, etc.) In some embodiments is provided, a dating app/platform with at least one of the timing data and payment options. Also, third-party applications can be built on top of the dating app/platform. The platform may receive a portion of exchangeable charged by a third party to users. In some embodiments, an online/digital/intelligent resolution center is provided that collects data before, during, and after the date. In some embodiments, an AI assistant is provided on the platform that presents data to users based on various computing operations described herein. In some embodiments, any date described herein may be a virtual date (e.g., video, voice, in the meta verse, in a game, using augmented or virtual reality, etc.) In some embodiments, a date may be networking between two or more people of any gender or between a human user and a computer, etc.

In some embodiments, a warning may be presented on a user (e.g., a woman's or man's homepage) in response to a complaint received by a user she went on a date with. A complaint could result in blocking access from the platform for a period of time. In some embodiments, one or more of the users may submit photos taken from the date or date area either prior to, during or after the date. In some embodiments, if a first user does not complain within a certain period, payment is initiated to the second user. Suppose the first user complains about the date. In that case, the system may analyze location records and/or photo records from the date and inform the first user that the second user satisfied the conditions of the date of the location and/or photo records indicate the second user's presence at the date. If, however, no location and/or photo records exist, the first user may receive a refund. In some embodiments, the second user's location may be automatically received from the system periodically at least once prior to, during, or after the date. In some embodiments, upon closing of the first time, a location booking tool may be presented to the first user and/or the second user such that either can select a potential location of the date. In some embodiments, multiple first users may bid for the first closed time (i.e., date). In some embodiments, the user interfaces or functions presented to the first user by the platform are the same or different as the user interfaces or functions presented to the second user by the platform. In some embodiments, a stack of users presented to the first user may include photos and/or videos with a scheduling option on the user interface of each photo and/or video. Selecting the scheduling option may lead to electronic timing data (e.g., a calendar) of the first user. A video may loop until the first user makes an action to move to the next user. In some embodiments, a scheduling option is not provided for two users who connect on the platform. They can schedule a time to meet based on exchanging messages. In such embodiments, verification of the data may use at least one of location record, signature check, fingerprint check, photo records, etc.) A signature and/or fingerprint check may be a signature and/or fingerprint (or other identification information) input by the first user on a computing device of the second user at or near a location of the date. In some embodiments, application programming interfaces may be provided for connecting to external applications, functions, platforms, etc.) In some embodiments, an external application may be a calendar or timing application associated with a platform, location (e.g., restaurant or activity place), etc.) In some embodiments, external calendars may be integrated into timing data on the platform. In some embodiments, a user may be a computer that can attend a scheduled or instantaneous virtual date with a user.

An artificial intelligence/machine learning operation may be implemented in some embodiments. For example, a user may state using text or voice input that he wants to date someone who looks like Jane Doe on a specific date. The system will then conduct an image-based search of all potential users who have facial/body characteristics similar to Jane Doe and are available on a specific date and present options to the user. As another example, a user may state using text or voice input that he wants to go on a date with a blonde/brunette who is a lawyer. The system will then search for all users with blonde/brunette hair who are lawyers and present options to the user.

The present application incorporates by reference U.S. Provisional Application Nos. 63/436,590, 63/436,587, 63/436,586, 63/436,585, 63/436,584, 63/436,582, 63/436, 580, al of which were filed on Dec. 31, 2022, in their entirety, for all purposes.

API Integration into external 3rd parties, external apps, external platforms, etc.) Some embodiments may have a Calendar by itself. Some embodiments may have Personal calendar integration. Some embodiments may have Dating calendar integration. Some embodiments may have 3rd party calendar integration (information, specials, availability, time 3rd parties are open, restaurant times, activities times, and availability based on when activity is available, etc.) Some embodiments may have Auto-dating/connection. Some embodiments may have AI-assisted dating/connection. Some embodiments may have Machine learning dating/connection. Some embodiments may have a Connection platform, interface(s), computer system, system on computer, or application. Some embodiments may have Multiple models live streaming and saving content with a price to 'replay it' that may be unlocked on either model's user interface/profile/shared content, etc. Some embodiments may have A model that can create her date log with all the same 'date log' experience and options and protection for the informal version of date scheduling. Some embodiments may have One model live streaming and saving content with a price to replay it. Some embodiments may have Models that may be filmed and tagged for unlocked content (one price or set prices, price ranges, general pricing, general exchangeable, and either profile/model's user interface may be unlocked from). Some embodiments may have a Conflict resolution point/scale system for in-person conflicts. Some embodiments may have a Conflict resolution point/scale system for virtual conflicts. Some embodiments may have a Conflict resolution point/scale system for subscription conflicts. Some embodiments may have a Conflict resolution point/scale system for unlocked content conflicts. Some embodiments may have a Conflict resolution point/scale system for disputes between models. Some embodiments may have a Conflict resolution point/scale system for disputes between two paying customers. Some embodiments may have a Conflict resolution point/scale system for disputes between the model and the paying customer. Some embodiments may have Sound integrated into the content. Some embodiments may have Sound from 3rd party integrated into the content. Some embodiments may have Licensed sounds incorporated into the content. Some embodiments may have Trending sounds on the platform. Some embodiments may have Trending 'editing software' for photos, videos, content, etc.) (a 3rd party app that may allow editing for content, a platform-based content editing tool, a trending editing content tool, a 3rd party integrated editing software device or option, etc.) Some embodiments may have Trending partners for content collaborations such as (specific photographers, videographers, video production companies, types of edited content such as a particular style photoshoot or process from a 3rd party, etc.) All trending partners may be 3rd party cuts or suggested as ads, etc.

Some embodiments may have A Connection app with a calendar. (e.g., calendar, scheduling method, scheduling method, timing data center, etc.) may be a live calendar, timing method data, timing data method, or timing process data. Some embodiments may have updating in real-time. Some embodiments may have Calendar timings that may be fixed or customized. Some embodiments may have a Countdown until booking (price, booking time, etc.) is unavailable. Some embodiments may have Automatic re-booking in-person dates (every Friday, every two weeks, every month, etc.) Some embodiments may have Automatic re-booking of virtual dates (every Friday, every two weeks, every month, etc.). Some embodiments may have Requesting a follow-up 'call' after the date for payment. Some embodiments may have Requesting a follow-up 'virtual call' after the date for payment. Some embodiments may have Calendar locations, times, and days that may be fixed or customized, such as only at certain locations or times; a person may want to go elsewhere. We still have to know where you are going, which may be able to be put in a manual address. It has to put a business address. Not allowing a call or an option for 'meet me at park date.' I am not going to let a date past 9 p.m. Some embodiments may have Before calendars, the pre-approval process shows. Some embodiments may have legal first and last, driver's license, passport, social security, tax returns, visa, car title, and deed. The full report from a 3rd party. Some embodiments may have a Pre-approval process before 'booking options are shown. Some embodiments may have a Pre-approval process before a 'date request' may be made or approved. Some embodiments may have Photos on the calendar. Some embodiments may have a Guy's calendar, which may show the pic of the girl or the AI pic of the guy or the girl. Or offer a suggested model in that spot. Some embodiments may have Videos on the calendar. Some embodiments may have Each calendar spot as a video or photo. Some embodiments may have Artificial intelligence content on the calendar (users, locations, meetings, love, sweet showing, romantic, business connection, etc.) Some embodiments may have Artificial intelligence content combined with 'secured or confirmed or possible dates' shown on the calendar (users, locations, meetings, love, sweet showing, romantic, business connection, etc.) Some embodiments may have a Preview of the date on the calendar created with artificial intelligence. Some embodiments may have Discovered, Inputted, and/or machine-learned information about what the user is doing at all times of the day (each minute routine, hour, sleep schedule, sleep pattern, work schedule, outside work schedule, whether a person has children/child duties, etc.) Some embodiments may have The calendar only shown after payment is made. Calendar only shown after requirements are met (membership, payment, platform payment, etc.) Some embodiments may have Calendar viewing of users in different cities. Some embodiments may view 3rd party calendar(s) and/or 'change them' (by creating a date, paying for the date, etc.). Some embodiments may have Integration. Some embodiments may have Paid to block of someone's calendar. Some embodiments may have Calendar plus calendar 3rd party integration (outside calendars). Some embodiments may have Been matched to a user based on the calendar availability scheduling option. Some embodiments may have her pic show up on my calendar. For example, all I have to do is pay. Some embodiments may have Being matched to users based on calendar suggestions. Some embodiments may have an AI calendar based on computing operation; here are some blondes you might like. Some embodiments may have Matching based on calendar availability scheduling options. Some embodiments may have Matching based on location. Some embodiments may have Matching based on general similarities between two calendars, for example, similar (periods, days, weeks, frequencies, durations, similar cities or areas, etc.). Joe always has an open Friday. Sarah also has an open Friday. Some embodiments may have Matching based on popularity. Some embodiments may have this girl as popular (booked often). I will be matched to guys more often. Some embodiments may have Matching based on price preferences.

Some embodiments may have Matching based on look preferences (brunette, blonde, petite, busty, curvy). Some embodiments may have Matching based on social preferences, such as I am an introvert. She is an introvert. I like to read quietly; she likes to read quietly. I want to go out; she likes to go out. She likes parties; I like parties. Some embodiments may have Platform notifications for updates on someone's calendar. Some embodiments may have 3rd party integrated notifications for updates on someone's calendar. Some embodiments may have 3rd party separate notifications for updates on someone's calendar. Some embodiments may have Built user calendars from scratch. Some embodiments may have a Build calendar from 3rd party integration. Some embodiments through the platform may have been added to a 3rd parties calendar. Some embodiments may have Paid to get updates on someone's calendar. Some embodiments may have Paying to get integrated updates on someone's calendar. Some embodiments may have Paying to get 3rd party updates on someone's calendar. Some embodiments may have a Connection app with payment between users. Some embodiments may have a Connection app with payment options between users. Some embodiments may have a Connection app with bidding options between users. Some embodiments may have a Connection app with charitable payment options between users. Some embodiments may have Work email sign-up, give or receive a badge or verification for job location, etc. Some embodiments may have a 'Paying user' paying to watch a virtual 'live streamed movie or content or series or original' on or off (through the platform or a 3rd party separate, or 3rd party integrated) platform with the model (virtual date). Some embodiments may have a 'Paying user' paying to watch a movie in person at a theatre and prepaying for (time, fee, date, movie, snacks, etc.) Some embodiments may have 'Paying user' paying to send one message. Some embodiments may have a 'Paying user' paying to join the model's 'live show.' Some embodiments may have a 'Paying user' paying to tip the model's 'live show.' Some embodiments may have 'Paying user' paying to request a model's 'live show' private with the user. Some embodiments may have a 'Paying user' paying to request a 'rate sheet' or a (e.g., breakdown, itemized, receipt, invoice, total, partial, breakdown, bill, a summary of, total, etc.) of a girl, users, rates (such as restaurant rate rates versus top golf dates, or duration dates, or what she prefers, etc.) Some embodiments may have 'Paying user' paying to request a 'date cheat sheet' such as a (e.g., breakdown, itemized, receipt, invoice, total, partial, breakdown, bill, a summary of, total, etc.) of (I like red roses, I like chocolates, Some embodiments may have I like gift cards for Sephora makeup). Some embodiments may have 'Paying user' paying to send a video (time limit on video or shorter video). Some embodiments may have Paid the model to send her an 'introductory video of himself such as his 'selling point video, etc.) (a longer video). Some embodiments may have a 'Paying user' paying to send a photo. Some embodiments may have a 'Paying user' paying to request a phone call. Some embodiments may have a 'Paying user' paying to request a video call. Some embodiments may have a 'Paying user' paying to send a 'custom content request inquiry.' Some embodiments may have 'Paying user' paying to request to open a pre-paid 'chat line' such as (200 for five messages). Some embodiments may have a 'Paying user' paying to send an in-person 'date, time, place, location, duration inquiry.' Some embodiments may have a 'Paying user' paying to send a virtual 'date, time, duration, type of date activity' inquiry.' Some embodiments may have a 'Paying user' paying to send a boyfriend, partner, or husband application.

Some embodiments may have Pay the model to 'call her through app or platform' for a limited amount of time on a timer (such as 5 minutes). Some embodiments may have Pay the model to 'video call' her through an app or platform' for a limited amount of time on a timer (such as 5 minutes). Some embodiments may have Pay to request personalized content (custom content). Gifting a 'specific date' (specific user, time, place, location, etc.) from a 3rd party through the platform. Some embodiments may have The model or user may provide a price for the date or the meeting or the time period for the other user to book or secure or they may also provide item(s) from their wishlist or list of items they want to be purchased in exchange for that time period or date etc.) In some embodiments, the price of the date may show either the price of the date to pay in cash or money or it may also provide options that are equal or greater from their wish list that would equal the amount of exchange or money they would be receiving if cash was paid. Some embodiments may have Gifting a 'partial date' (location, day, for example, a birthday), but the platform user may choose a model to finalize, etc.) from a 3rd party through the platform. Some embodiments may have Gifting a 'subsection to a user' such as (a 1-year subscriber price, or six-month subscriber price, unlimited messaging options, platform unlock options, unlocking content options, or pre-paid funds to pay for subscriptions or other options, etc.). Some embodiments may have Pay a user to join their 'live show.'. Some embodiments may have Pay a user to chat on their 'live show.' Some embodiments may have Pay a user to go to a 'private discussion with them' (separate live with paying person and another person). Some embodiments may have Pay in installments from 3rd party (such as 3rd pay us the entire amount, and they have to pay installments to the 3rd party for credit that was given, etc.). Some embodiments may have Getting a 'date credit' from a 3rd party through the platform. Some embodiments may have Options for 'pre-date phone/platform voice call' for payment. Some embodiments may have Options for 'pre-date video call' for payment. Some embodiments may have Options for 'pre-date video interactive game or streaming (content/video etc.) for payment. Some embodiments may have Pay for date/connection using 3rd party credit line, 3rd party credited payments, bank account transfer funds, crypto funds, asset funds, etc.) (each may have been converted into USD or fiat, etc.). Some embodiments may have Options for 'pre-date interactive game for payment (chess, checkers, no video call, no voice call). Some embodiments may have Options for 'pre-date 'get to know each other' interactive game for payment. Some embodiments may have Pay to view models in another city. Some embodiments may have Pay to view a calendar, interact with to view a calendar, interact with to view timing data methods, s in another city. Some embodiments may have Pay to view platform's (one-time payment, subscriber-only payments, followers, met a spending threshold such as spent 5000 dollars) 'live in-person events' such as (parties, events, interactive events, charity events, platform events). Some embodiments may have Pay to view one-time payments, subscriber-only payments, followers, met a spending threshold such as spent 5000 dollars) each user's 'lives,' in-person events such as (parties, events, meet and greets planned by designated group agency or person, etc.). Some embodiments may have Credit cards or credit lines available from 3rd parties that may be 'fund the date credit account' on the user's 'funds.'. Some embodiments may have Users may be able to manage their stock/real estate/asset account from their platform management system and automatically/manually pay for dates by selling 'assets' and obtaining funds to be used for dates/subscriptions/unlocks/unlimited services on the platform. Some embodiments may have Trust fund account amount or transfer or security depending on (the amount set by the user, the amount set by the platform, the amount for the date, amount plus tip, amount plus gift-card/gift/, amount for activity such as (shopping fee or shopping fund amount).

Some embodiments may have Purchased shares from the platform. Some embodiments may have options to 'Apply to invest in the platform.' Some embodiments may have Apply to be on the waiting list to invest in the platform. Some embodiments may have The user interface of profiles or calendars (user interfaces) showing (insert here' or make a suggestion, make an inquiry) dates, times, location, duration, restaurants, etc.) (may require payment to send an inquiry that is not pre-approved or pre-selected). Some embodiments may have Users may be able to have automatic 'selling of assets that may be automatically funding their 'credit account for dates/subscriptions/unlocks/unlimited services on the platform. Some embodiments may have a Pay all of the model's bills option. Some embodiments may have Options to pay for frequency type of date/connection (such as every Friday night, every weekend, for an entire month, every other Wednesday, every Saturday, etc.), which may 'block off period if conditions are met (payment/conditions of requirements are made, and no refunds or cancellations have been issued). Some embodiments may have to pay all of the model's shown debts/bills/rent payments/food/groceries payments with one payment or partial payments. Some embodiments may have Traveling options to be booked by traveling (accepting paid airplane, hotel, food, transportation, security 'bodyguard) and all 3rd party booking (paying person is not available to see exact details by paying user for model's safety, for example, so he may be able to show up at her hotel and attack her). Some embodiments may have a Connection app with charity, raising payment options between users. Some embodiments may have The date subscription model in which the user, party, or person pays for unlimited, multiple dates. Some embodiments may have The message subscription model to pay or obtain credit for unlimited messages. Some embodiments may have a Virtual subscription model, pay for unlimited, multiple dates virtual. Some embodiments may have Sending free tips with no payment processing fees. Some embodiments may have Sending tips from stock accounts. Some embodiments may have Sending stocks as tips. Some embodiments may have a Platform Membership subscription model, pay for viewing all content, and unlock all content on site. Some embodiments may have a Platform-Only content Membership subscription model, pay for viewing all content, and unlock all platform content on the site. Some embodiments may have Having a date with one person and then adding multiple other models to the same date or a concurrent date (adding more models to the same date, adding more models to a different time but the same day, etc.). Some embodiments may have Paying users playing 'games' with content creators/models and models getting paid for playing games. Some embodiments may have Half of the content being shown and/or content needing to be unlocked through payment to view or interact with. Some embodiments may have A partial amount of content being shown needing payment (or viewing all of it with payment). In some embodiments, Video is shown without needing payment to hear content. Some embodiments may have a Voice being heard without visuals, and payment needs to be made to see the content. Some embodiments may have Paying to send someone a message, content, video, or inquiry. Some embodiments may have Unlimited messaging options. Some embodiments may have Set up automatic dates with the user. Some embodiments may have One creator pay another creator to 'safety chaperone date.' Some embodiments may have One creator paying '3rd party security' to 'safety chaperone date. Some embodiments may set up automatic dates with users, including payment transfers. Some embodiments may have Set up automatic funds transfer to a user. Some embodiments may include Setting up automatic gifts, gift cards, rent payments, bill payments, and asset sending such as 'selling and sending funds for stocks' transfer. Some embodiments may have Set up automatic stock transfer to the user. Some embodiments may have Options to purchase outside or 3rd party items through the platform and get sent to the model or user, delivered, brought, or sent to other users' houses to bring to a public date or any date, or group date, or virtual date (flowers, gift cards, dresses, jewelry, makeup, hair products, etc.). Some embodiments may have Paid for humans to match dates or book dates for the user. Some embodiments may have a User interface showing 'date location, time, users, models, etc.) to show what a date could look like. Some embodiments may have a Calendar user interface showing 'date location, time, users, models, etc.) to show a date's appearance. Some embodiments may have Users (models) show up on the calendar and ask if the user wants to book, inquire about, inquire regarding, secure, create a connection to, hold, pay for, create a business relationship with, use exchangeable to secure or book, etc.) (pay for this time, date, person, etc.) Some embodiments may have One or more 'Live shows' scrolling/lists of live shows on the feed/screen/user interface. Some embodiments may have the Price of 'connection/date' changes based on the user's preferences, history, information, and background information.

Some embodiments may have a User interface showing lists of available users for a date for a particular period (day, time, month, time, location, duration, etc.) Some embodiments may have a Calendar showing lists of available users for a date for a particular period (day, time, month, time, location, duration, etc.) Some embodiments may have Calendar matching (e.g., daters, users, or persons) to the 'paying users' calendar. Some embodiments may have Calendar matching two or more users based on (availability, location, duration, history, computing operation, preferences, history, etc.) Some embodiments may have Manual or automatic, machine learning, computer, or robotics, or 3rd party chosen, or entity-chosen, or AI changing of content on the calendar (similar to mood-board, virtual or visible displays of 'mood' or 'fantasy' or suggestions or 'AI-created' or 'theatrical' or 'inspirational board' or 'inspirational displays of created content' but created with AI, created by a human, robot, bot, 3rd party, entity, computer system, AI system, crafted, created by robotics based on collected or known data, etc.) such as (preview of date, user of date, dater, profile photo, name' information, etc.) Some embodiments may have Opt-in or Opt-out of 'date subscription pool and getting paid based on 'frequency of 'pooled booked dates.' The user is paying an unlimited subscription for unlimited dates. Each date payment to the model may be pooled together with others and paid at the end of a period or a cycle, etc.) which could change their 'date average rates'/ date average or per day amount disputed, amount to be disputed to them in the pot, other factors that may affect price from pot such as duration and frequency of dates, etc.) Some embodiments may have Models that can pay or earn credits, have sponsors, or be recommended. Some embodiments may have Models 'payments earned,' which may allow them computing operation viewing more often/top of recommend, more frequently recommend/more shown. Some embodiments may have Badges, achievements, or awards (digital or physical) based on the amount of money spent on the platform. Some embodiments may have Badges, achievements, or awards (digital or physical) based on the amount of money earned on the platform. Some embodiments may have a User Membership subscription model, pay for viewing all content, and unlock all content for individual models/creators. Some embodiments may have a Connection app with assets exchangeable between users. Some embodiments may have a Connection app with 3rd party integrations for payment, such as (sending in a [Rolex, deed to your house, title to your car] to a 3rd party and the 3rd party sending 'funds' to the platform to pay for the date, subscriptions, unlocks, dates, etc.) Some embodiments may have a Connection app accepting crypto between users. Some embodiments may have a Connection app with special daters in exchange for payment. Some embodiments may have Synchronized at-home dates (synchronized food delivery, synchronized entertainment services like ordering a dancer/entertainer, synchronized streaming content via platform or 3rd party, synchronized games on the platform or 3rd party, etc.) Some embodiments may have Pre-scheduled delivery times (may be different days or times, etc.) for (gift cards, clothing, flowers, gifts, etc.) Some embodiments may have a Connection app with entertainment services (in-person, virtual dates, meetings, in-person meetings, business meetings, etc.) Some embodiments may have The user interface of profiles or calendars (user interfaces) showing pre-selected dates, times, locations, duration, restaurants, etc. Some embodiments may have The user interface of profiles or calendars (user interfaces) showing (insert here' or make a suggestion, make an inquiry) dates, times, location, duration, restaurants, etc.) (may require payment to send an inquiry that is not pre-approved or pre-selected). Some embodiments may have a User 1 calendar plus a user interface showing User 2 (or User 3, 4, 5, 6, etc.) calendar simultaneously or some Subscription model.

Some embodiments may have Payment for 'agreed upon terms' (a certain amount of time spent) during/for 'connection.' Some embodiments may have Unlock each item model. Some embodiments may have An open message with a content unlock model. Some embodiments may have Payment made before the date. Some embodiments may have Tipping after the date. Some embodiments may have Tipping randomly. Some embodiments may have a One-time in-person booking payment. Automatically recurring in-person booking payment. Some embodiments may have a One-time virtual booking payment. Some embodiments may have Automatically recurring virtual booking payments. Some embodiments may have Subscription date options. Some embodiments may have Paid another model/ creator to be a 'secret safety chaperone' during the date. Some embodiments may have Paid a 3rd party 'security' to be 'security' during the date. Some embodiments may have Paid to block off someone's calendar. Some embodiments may have Selling (content, photos, videos, series, original movies, platform movies) through the platform. Some embodiments may have Sent physical mail items through the platform. Some embodiments may have Requesting 'gift cards, assets, money, payment, services, hair stylists, and clothing items from the user. Some embodiments may have Paying to book, inquire about, inquire regarding, secure, create a connection to, hold, pay for, create a business relationship with, use exchangeable to secure or book, etc.) someone through platform calendar traveling to you for (date, connection, meeting) from another city. Some embodiments may have Paying to book, inquire about, inquire regarding, secure, create a connection to, hold, pay for, create a business relationship with, use exchangeable to secure or book, etc.) through a platform calendar to see someone in another city for (date, connection, meeting). Some embodiments may have 'Paying to send someone a message, content, video, inquiry.' Connection app/platform with calendar and payment. In some embodiments, there may be a connection to calendar and payment to change (paid person's and person paying's calendar) to add to the calendar for the date. In some embodiments, there may be a 'Requesting a follow-up 'call' after the date for payment.' In some embodiments, there may be a Requesting a follow-up 'virtual call' after the date for payment.

Third-party integration (get a cut). In some embodiments, there may be a Calendar plus 3rd party delivery (gift cards, food, makeup, hair, services, hair stylists, makeup artists, etc.) In some embodiments, there may be a Connection app plus 3rd party delivery (gift cards, food, makeup, hair, services, hair stylists, makeup artists, stylists, etc.) In some embodiments, there may be a Trending partner for content collaborations such as (specific photographers, videographers, video production companies, types of edited content such as a particular style photoshoot or process from a 3rd party, etc.) All trending partners may be 3rd party cuts or suggested as ads, etc. In some embodiments, there may be Booking requests with payment for outside jobs such as 'modeling jobs' or 'acting jobs' etc. In some embodiments, there may be an Outside job confirmation, for example (modeling for a brand) (we get a cut). In some embodiments, Artificial intelligence may analyze content/photos/videos. It may suggest ads (ads may be discounts, content viewing, subscriber suggestions, click to purchase, purchase this item, explainer videos, discount codes, etc.) based on what is (needed, spoken about, suggested, viewed, clicked on) for example, (hair extensions, makeup suggestions, hair growth items, oils, how to act on a date, how to be nice, etc.) Some embodiments may have Options to invest in stocks through 3rd party integration from the platform. Some embodiments may have Options to invest in real estate through 3rd party integration from the platform. Some embodiments may have Options to sell their current assets through 3rd party integration from the platform. Some embodiments may have a Connection app plus 3rd party delivery. Some embodiments may have a Calendar plus 3rd party integration (use Uber, transportation service, through the app to get up to date). Calendar plus referrals for bringing to the platform. Some embodiments may have integrated restaurants or businesses (MENU) directly into the platform to pre-pay, pre-pick, or choose to have ready upon arrival. Some embodiments may have an Integrate outside or 3rd party site that provides nannies, maids, cleaning persons, babysitters, etc.) (get a cut). Some embodiments may have a Platform Integration to sell personal items (used or handmade or from the user) through 3rd party (selling items platform, etc.). Some embodiments may have a Platform Integration to sell (merchandise, goods, services, China/new items/imported/USA based) business through 3rd party. Some embodiments may have third-party advertising on the platform's profiles, feed, stacks, content, stories, messages, etc. Some embodiments may have a 'Book 3rd party plane, hotel, restaurant/activity for traveling through the platform.' Some embodiments may have the option to Book (photoshoots, professional content producers, book videographers, book photographers, book videographers) through 3rd party. Some embodiments may have a 'Assets may be sent to 3rd party', and funds may be automatically sent to the platform to create credited funds; assets may be sent to 3rd party, and funds may be automatically sent to the platform to pay for debt, Assets may be sent to 3rd party, and funds may be automatically sent to the platform to pay for the date.

Some embodiments may have bidding on dates. Some embodiments may have a 'Live bidding on dates.' Some embodiments may have a 'Live betting on dates.' In some embodiments, there may be a Date with any person, private, married, single, booed up, or public or celebrity or artist or any person: for example (e.g., BAD BUNNY, BRITNEY SPEARS, in exchange for auction, bid, buy now price. Proceeds can be directly sent to 'talent, creator, person, entity, figure, person, group, set of persons' one person, 'many people,' etc., and/or some proceeds may go to charity, or all proceeds may go to charity, 3rd party, agency, management, etc. Details, dinner/lunch/duration/details, charity details, etc.) In some embodiments, there may be a Live 'options on dates' like stock options. In some embodiments, Payment installment options for bidding on dates may be available. In some embodiments, there may be a 'live or anytime Betting on dates.' In some embodiments, there may be a 'Live or anytime auction for an in-person date.' Some embodiments may have a 'Live or anytime auction for a virtual date.' Some embodiments may have a 'Live or anytime bidding for an in-person date.' Some embodiments may have a 'Live bidding for virtual date.' Some embodiments may include a 'Live charity auction for an in-person date.' Some embodiments may have a 'Live charity auction for a virtual date.' In any embodiment, the price may be price and/or requirement (not a price but a requirement or a price requirement or a suggestion, request, or any exchangeable of value or consideration which may be a 'follow' a 'mention' a 'shout out' a 'suggestion' a 'work promise' a 'promise' a 'consideration' an 'application suggestion' a 'job consideration' a 'network' a 'networking opportunity' a 'meeting' a 'chat' a 'talk' a subscribe' a 'message' a 'gift' a 'click' or anything) In some embodiments, there may be a 'Price bidding on dates based on a person's data.' Some embodiments may have 'bidding and gifting dates to someone else.' In some embodiments, there may be a 'Bidding on dates and saving them for later (pre-pay).' In some embodiments, a Bidding may have a period to make a payment or a payment period to make a bid or payment for a date, connection, or meeting. In some embodiments, there may be a 'Bidding having a pre-payment only, and bidding stops after the amount is more than pre-paid.' In some embodiments, a 'Bidding has unlimited funds due to credit may exist.' Some embodiments may have a 'Bidding has a credit limit.' Some embodiments may have a 'Bidding has automatic payment options.' In some embodiments, a 'Bidding may be paid by credit from the platform (pre-loaded funds).' In some embodiments, a 'Bidding for dates may be up against 3rd party.' In some embodiments, a 'Bidding for a date may be up against another user.' In some embodiments, a 'Bidding for a date may have a minimum reserve price.' In some embodiments, there may be' surprise auctions for bidding on a date(s).' Some embodiments may have a 'Surprise location for bidding on a date(s).' In some embodiments, there may be 'surprise prices, price ranges, general pricing, and general exchangeable when bidding on a date(s).' In some embodiments, there may be a 'Mystery location when bidding on a date(s).' In some embodiments, there may be a 'Mystery location when auctioning date(s).' In some embodiments, there may be a 'Mystery location when gifting date(s).' In some embodiments, there may be a 'Surprise persons for auctioning date(s).' In some embodiments, there may be a 'Mystery person when auctioning date(s).' In some embodiments, there may be a Mystery person when bidding date(s), Mystery price when gifting date(s), Mystery person when gifting date(s), Mystery payment amount when (e.g., locating, auctioning, paying, securing, gifting, etc.) for the date (s).

Some embodiments verify that the date happened by collecting data during, before, after, or during the date. Some embodiments may have a Resolution center. Some embodiments may have a Date log management area. Some embodiments may have a Data collection. Some embodiments may have a Manuel check-in start, middle, 10 minutes after, and stop of date (begin and/or end). Some embodiments may have a Start and end of 'date' or 'connection.' Some embodiments may have a Guy or girl paying or being paid-Location/coordinates recorded beginning, during, end, and after. Some embodiments may have taken data from a 3rd party (e.g., virtual, phone records, pinging, towers, Facebook, other apps, internet, etc.) to verify if a 'date happened' or 'date occurred' or 'contractual agreements were made.' Some embodiments may have Referenced from a 3rd party (restaurant, patrons, persons there, passerby, etc.) to verify if the 'date happened' or 'date occurred' or 'contractual agreements were made.' Some embodiments may have an Automatic recording, pinging of towers, or phone data collection for 'date.' Some embodiments may have a strong history of the model arriving on time for dates and not having complaints. Some embodiments may have a Driving, travel, route, a record of 'driving, travel, route, there' or data collected 'during the drive.' Some embodiments may have a Taxi service or ride-share service for arrival and departure.

User interfaces. Some embodiments may have a Upload date proof (data log). Some embodiments may have a (e.g., models, persons, users, 3rd parties, non-registered models, public figures, celebrities, etc.) showing up on Man's (e.g., virtual hologram in-person phone call virtual screen, etc.) calendar and asking them with a video if they want to book a date with them. Some embodiments may have Models show up on the men's interface, homepage, or management system with a video or picture asking if they want to book a date with them, giving them the link, or showing their calendar so they can instantly book with them. Some embodiments may have an Upload date 'experience' or content from the date (may be photos taken, other proof, outside proof, or outside resources to prove the date). Some embodiments may have an AI train model to answer FAQs or any question that might be asked by a guy, user, person, inquiry, model, 3rd party. Some embodiments may have Automatic dating reminders to book another date after the date (or a way to automatically send them their calendar (model or users' calendar) and tell them they need to book another one and make it easy directly after the date) Some embodiments may have The process of rotating, replacing, changing, and scheduling including but not limited to (bios, biographies, opening lines, opening information, catch one-liners, "hook them statements," statements, marketing opening lines, photos, pictures, videos, organization of layout, layouts, etc.) Some embodiments may have AI being trained by an individual or group or person or entity and responses or messages or automation happening as a conversation, solution, problem, solution, suggestion, etc. Some embodiments may have AI train to book, schedule, change, inquire, remind, etc.) Some embodiments may have Anyone can create, integrate, and design their calendar with their designs or allow AI to create or design. Some embodiments may have In some embodiments; there may be news feeds or news, trending topics, trending blogs, or trending information based on user, person, demographic, etc. Some embodiments may have Pay-to-message before the meeting/date and Pay-to-message for a period before or after the date.

Options to pay to send messages, options to pay to send content. In some embodiments, each party may write, explain, or suggest what they 'offer a partner' or a person or an entity and what the other party, entity, or person 'offers.' Each party may be matched using AI computing operations or intelligence matching for suggestions or matching or showing. In some embodiments (e.g., payment, coins, crypto, a median of exchange, etc.), in exchange for showing, revealing, seeing, hearing (e.g., reviews, comments, feedback, opinions, entertainment, etc.), whether in the form of (e.g., video, pictures, comments, audio, voice, etc.) In some embodiments, payment is in exchange for hearing, seeing, or visualizing a video or audio review of the content you posted, someone you want feedback on, or there is an option to leave feedback on. Payment is made to see comments, reviews, opinions, etc. In some embodiments, payment for a (e.g., period, meeting, date, etc.) may be paid to or through the (e.g., platform, a 3rd party, an entity, a government, a host, directly to the person, through the platform, to the platform, to a manger, to any person, etc.) Free, paid, invite, or follow, or some requirement for one creator/model to message other creators, models, persons, or users through the system/platform. It could be between the paying users, too. In some embodiments, pictures, videos, users, persons, wish lists, items to purchase, items to buy, items listed, and options listed may move by themselves in any capacity such as but not limited to (e.g., slideshow view, scrolling by itself, moving by itself, replacing by itself with another option, replacing users with another option, switching by itself, scaling by itself, getting larger by itself, being triggered by other movements thus creating another movement, AI taking in information and giving it back in the way that they want to see based on their previous movements or clicks, etc.)

Some embodiments may have The calendar may be able to opt into AI-created content for the calendar (for example, if booked a day with Sarah, now AI-created content shows up for that day and time for Sarah, showing Sarah's face, the location, and magical designs. Some embodiments may have Booking may allow someone (model or booking person) to design that day on their calendar, like graphic creating/editing/designing or photo editing application designing, for example, with hearts or flowers. Some embodiments may have The model can design her calendar, interfaces, etc.) (flowers, colors, pictures, outlining, etc.). Some embodiments may have Anyone can create, integrate, and design their interfaces, profiles, etc.) or allow AI to create or design. Some embodiments may have Conflict resolution may use a point/scale system, an AI-system, a scale created by AI, a robotic scale system with input and output, etc.) for in-person conflicts. Some embodiments may have a Conflict resolution point/scale system for virtual conflicts. Some embodiments may have a Conflict resolution point/scale system for subscription conflicts. Some embodiments may have a Conflict resolution point/scale system for unlocked content conflicts. Some embodiments may have a Conflict resolution point/scale system for disputes between models. Some embodiments may have a Conflict resolution point/scale system for disputes between two paying customers. Some embodiments may have a Conflict resolution point/scale system for disputes between the model and the paying customer. Some embodiments may have Sound integrated into the content. Some embodiments may have Sound from 3rd party integrated into content.

Some embodiments may have Licensed sounds integrated into content. Some embodiments may have Trending sounds on the platform. Some embodiments may have Any models or profiles that can collaborate on or off the platform. Each party can get paid for 'unlocked content, subscriber payments, content being paid to see, etc.) Each party can get a cut or payment per user that unlocks, subscribers pay for, views, etc.) Models or persons can be on or off the platform. Some embodiments may have The platform may require a user to have a profile to be tagged, or the platform may make a bank account for a user that is not on the platform that was tagged, and that person has to make an account and a profile to get her money from the tagging. Some embodiments may be Filtered by a range of prices, price ranges, general pricing, general exchangeable (e.g., breakdown, itemized, receipt, invoice, total, partial, breakdown, bill, summary of, total, etc.) of date information (location, time, duration, activity). Some embodiments may have Discovered, Inputted, and machine-learned information about what the user is doing at all times of the day (each minute routine, each hour, sleep schedule, sleep pattern, work schedule, outside work schedule, whether a person has children/child duties, etc.). Some embodiments may have Date information plus a calendar. Some embodiments may have 'Live Screen' or 'live stream' or 'pre-recorded live stream' with a 'locked' profile with options on the user interface such as 'follow to unlock profile, subscribe to see everything, subscribe to view her calendar (for a date), some basic information, prices, price ranges, general pricing, general exchangeable, etc.). Some embodiments may have Only available options for dates such as 'breakfast, brunch, lunch, dinner, coffee, dessert, top golf, go-karting, shopping, etc.). Some embodiments may have Booking 'safety chaperones, security, support, or security of other 'models' on the platform (paying other models for this service). Some embodiments may have Booking 3rd party 'safety chaperones, security, support, or security through integrated or 3rd party calendars (family, friends, non-paid persons). Some embodiments may have Booking 3rd party 'safety chaperones, security, support, or security through integrated or 3rd party security systems such as 'private bodyguards safety security. Some embodiments may have the option to send a "thank you video" after the booking is made, payment is made, etc). Some embodiments may add an option to 'extend the date' option' (add ice cream date after dinner, payment is made, the date is extended) (add shopping to before or after lunch, payment is made, the date is extended, etc.). Some embodiments may have to Adjust the price of an 'in-person date extension' by a model based on (how far it is, how much inconvenience it would be for her if she has to drive there, or if it is next door to the restaurant, if it's in the same mall just a few steps of a walk, if she has to tell her security to follow her there and it's at another location user interface may be more expensive etc.) price adjustments based on those reasons or other factors that would raise or lower the price. Some embodiments may have Adjusted the price of virtual date extension (at the model's discretion). Some embodiments may have a Group date virtual user interface with multiple users (the user may have control over what the user interface looks like, aka how big each person is on the screen, hologram, user interface, viewing display, whether paying user wants to be blurred out, or if he wants to be shown or not, etc.). Some embodiments may have Suggestions based on frequent 'lunch dates' or 'frequent dinner dates' or 'prefer dinner dates' etc. Some embodiments may have been playing a virtual game with another user. Some embodiments may have a Book date option on content. Some embodiments may have a Book date option on the calendar. Some embodiments may have a Book date option on the matching system (swiping, tapping, browsing, searching). Some embodiments may have a Book date option on search only, perimeter search, or location search for the user system. Some embodiments may have a Book date option on computing operation content showing up on someone's user interface(s) (which may be feed, homepages, managing pages, messaging system, or calendar). Some embodiments may have a Subscribe button directly on the content. Some embodiments may have a "Follow the button directly on the content. In some embodiments, the process of any person booking, scheduling, a video call, phone call, audio call, live call, live session, or in-person time with someone for romantic, friendship, care, affection, attention, dating, relationship, partner-questions, romantic interest, liking someone, etc.

Some embodiments may allow Sign up men or users. Some embodiments may allow After they give their ID, passport, verified identity or picture, etc., with their work engine. Some embodiments may allow. Then we say we have your first and last name and work. Some embodiments may allow Two options: either we show your first and last name on the site and search engines, or b. You pay us 100 per month to remain a "partner at a law firm," verified law firm partner," or "verified licensed dentist in Texas, or verified dentist at 'Smile Week Dental Office' or 'verified licensed doctor."

Some embodiments may have a Book date button directly on the content. Some embodiments may have AI analyzes content or the user's photo and suggests similar-looking users or users that person may vibe with, such as (a male brunette, AI matching or suggesting a female brunette, an active person matching with an active person, workout videos matching with workout videos). Some embodiments may have View the calendar/book calendar option directly on the content. Some embodiments may have an Upcoming date section (activity center, constantly updating to show the next 'date,' 'activity,' 'connection,' etc.). Some embodiments may have Add model or creator to a 'list' that may be used as (book date with this person next month at this time, take this list of models and notify me if anyone's price is at 500$ and automatically book that date once it's available, take this list of models and notify me if 'price changes' occur, etc.). Some embodiments may have Content with 'book now buttons.'. Some embodiments may have Content with 'see calendar buttons.'. Some embodiments may have Content with a 'book an in-person date button(s). Some embodiments may have Content with 'book a virtual date button(s). Some embodiments may have a Managing stock portfolio on the platform. Some embodiments may have a Managing stock portfolio integrated from 3rd party. Some embodiments may convert stocks on the platform to another form of currency. Some embodiments may have Converting stocks integrated from 3rd party to another form of currency. Some embodiments may have a User interface that may show (agreements of date met, period left until disbursement of the payment, leave a review, leave a star rating, ask model/creator if (e.g., user, person, entity, 3rd party, etc.) want to go out with this person again, etc.). Some embodiments may have Managing payments of bills through the platform. Some embodiments may have Managing payments of bills through 3rd party integration. Some embodiments may transfer payments or assets to the bank from the platform. Some embodiments may transfer payments or assets to the bank from 3rd party integration. Some embodiments may have Viewing user one calendar while viewing the user two calendars. Some embodiments may have viewed their calendar (user 1) while viewing user 2's calendars. Some embodiments may have The user interface of all 'live content. Some embodiments may have a User interface scrolling up, down, left, and right, matching viewing 'live content. Some embodiments may have Options to 'save user for later to book, inquire about, inquire regarding, secure, create a connection to, hold, pay for, create a business relationship with, use exchangeable to secure or book, etc.) at a later date. Some embodiments may have Options to add users to the cart or checkout area or categorize with only payment left to be made. Some embodiments may have The option to categorize, separate, or organize users to be 'booked for a date later, when funds are available from the job when work check is paid, etc.). Some embodiments may have Artificial intelligence, machine learning, virtual assistant, machine assistant to automatically, manually, or learn to perform automatically or by command any task or item listed here. Some embodiments may have Combining 'live user interfaces with 'pre-made content or another content user interface to create a custom user interface Some embodiments may combine multiple pages or user interfaces to create a custom user interface. Some embodiments may have User 1 viewing multiple calendars along with their own. Some embodiments may have User 1 viewing multiple calendars without their own. Some embodiments may have Searching for users (models) through the calendar as a search engine. Some embodiments may have View 'hot spot' or general 'hot areas or cities with 'daters' or 'models' or persons on the platform. Some embodiments may have a Calendar search engine to find users or matches. Some embodiments may have Matching within the calendar. Some embodiments may have a QR code from the platform to manage the platform anywhere on the go. Some embodiments may have Connected applications or downloadable apps/software to a phone, device, iPad, computer, a computing system that may be managed, tasks performed, integrated calendars, integrated access, given access, etc.). Some embodiments may have 'Find a wife' (those that are accepting husband applications plus a fee/payment). Some embodiments may have 'Find a girlfriend' (those that are accepting boyfriend applications plus a fee/payment). Some embodiments may have 'Find a partner (those accepting long-partner applications plus a fee/payment). Some embodiments may have 'Find a based on availability.'. Some embodiments may have 'Find a date based on the calendar.'. Some embodiments may have a date based on the location. Some embodiments may have a 'Find a date based on the distance.' Some embodiments may have Find a date based on the city. Some embodiments may have Requirements (such as following profile, pay platform, subscribe to person, send one-time or recurring payment) to 'view a calendar, see the calendar, interact with calendar, view options on the calendar, send inquiry to the calendar, pay for booking on the calendar,). Some embodiments may ask AI for 'date,' 'management' assistance, help, voice commands, changing something, cancellation, AI recording my voice, AI accepting voice commands, etc. Some embodiments may have Find the user's type date based on category (in-person, virtual, content only, interactive games, interactive messages, custom content, custom requests friendly). Some embodiments may have Find a date based on categories (virtual only, reality stars, commercial models, runway models, actresses, models, creators, celebrities, beauties, types of content, types of availabilities in-person, student, virtual, content, popularity, most viewed, random computing operation). Some embodiments may have Calendar matching within a calendar. Some embodiments may have a Trust account pays 'model or creator' at the end of the 'period' or when the 'clock ends.' Some embodiments may have Different feed views or content views based on category (clicked/entered/typed/searched), such as (paying view, free view, subscriber view, VIP view, platform membership view, VIP dater view, etc.). Some embodiments may have Options to manage, edit, block off, change, and issue refunds/partial refunds within the personal calendar. Some embodiments may have Driving, travel, route data, location data, car data, sign data, stop light data, and location camera data recorded for data collection on the platform. Some embodiments may have Scroll, discovery, or stack, which may continuously change based on computing operation (such as profiles clicked, type of content viewed most, type of memberships, types of persons frequently looking at, etc.). Some embodiments may have Driving, travel, route data, location data, car data, sign data, stop light data, and location camera data, all recorded for data collection integrated from 3rd parties to the platform or with the platform. Some embodiments may have Getting paid (in date log, management area) after data is collected to confirm contractual agreements have been completed/performed. Some embodiments may have Reserve outside resources such as 'Uber, transportation service, flowers, gift cards, and visual gift cards, and sent stylists or resources' for the date. Some embodiments may have to pay all bills for the creator or user. Some embodiments may have a Husband, partner, or lover (temporary relationship) application plus payment. Some embodiments may have a Husband, partner, or lover (temporary relationship) application. Some embodiments may have Automatic data collection from the date. Some embodiments may have Manual data collection from the date.

Some embodiments may have 3rd party data collection from the date. Some embodiments may have Outside resources for data collection from the date. Some embodiments may have Manual check-in of date. Some embodiments may have Manual check-out of date. Some embodiments may have Automatic check-in of date. Some embodiments may have Automatic check-out of date. Some embodiments may have Automatic location recording of date. Some embodiments may have Manuel location recording of the date. Some embodiments may have 3rd third-party location recording of the date. Some embodiments may have The current location of the date. Some embodiments may have Tax resources integration. Some embodiments may have Outside 3rd party tax resources. Some embodiments may have Gross, net, total, payment receiving (e.g., breakdown, itemized, receipt, invoice, total, partial, breakdown, bill, summary of, total, etc.). Some embodiments may have User interface earnings, referral payments, status, calendar live, calendar, messaging, payout, pending payments, total payments, and total received. Some embodiments may have yearly payments, yearly, monthly, weekly, or daily (e.g., breakdown, itemized, receipt, invoice, total, partial, breakdown, bill, summary of, total, etc.) of payments or received payments. Some embodiments may have Modeling contests such as 'pay per vote' or 'vote for free.' Some embodiments may have Separate profiles or persons by categories, tags, etc. Some embodiments may have Scrolling/matching/watching user interfaces for live shows (one or more). Some embodiments may have Content: Concurrently looping/viewing/playing content in shapes, areas, and user interfaces. Some embodiments may have Content: Concurrently looping/viewing/playing content. Some embodiments may have Content that may be Concurrently looping/viewing/playing content that may be replaced or is replaced with each loop with a new piece of content. Some embodiments may have Content that may be Concurrently looping/viewing/playing content that may be replaced or is replaced with each loop with a new piece of the content located in shapes, areas, and user interfaces. Some embodiments may have Disappearing and appearing profiles. Some embodiments may have Disappearing and appearing content (videos, scenes, scenarios, videos, original series, original content, platform content, etc.). Some embodiments may have Disappearing and appearing calendars. Some embodiments may have disappearing and appearing live shows. Some embodiments may have Disappearing and appearing messaging options or contact options. Some embodiments may have Separated users by categories. Some embodiments may have Created a custom (user interface, viewing, hologram, visuals, screen) by categories. Some embodiments may create a custom (user interface, viewing, hologram, visuals, screen) by manually choosing which ones. Some embodiments may be able to create, manage, change, or create a custom (user interface, viewing, hologram, visuals, screen) by automatically choosing which ones. Some embodiments may be able to create a custom (user interface, viewing, hologram, visuals, screen) by artificial intelligence, machine learning, or robotics, choosing which ones. Some embodiments may have Some free preview credits for content. Some embodiments may have Some free preview credits for lives. Some free credits for viewing calendars. Some embodiments may have Some free previews for content. Some embodiments may have Unlimited credit for calendar viewing. Some embodiments may have Unlimited credit for a calendar booking. Some embodiments may have Unlimited credit for virtual booking. Some embodiments may have Unlimited credit for message sending. Some embodiments may have Unlimited credit for content unlocking for each user. Some embodiments may have Unlimited credit for content unlocking for platform content.

Some embodiments may have Trust fund holdings for reservations. Some embodiments may have Trust fund holdings for in-person dates. Some embodiments may have Trust fund holdings for food ordering for dates. Some embodiments may have Trust fund holdings for a penalty payment for the cancellation date. Some embodiments may have Trust fund holdings for payment for the date. Some embodiments may have Trust fund holdings for travel-related expenses such as (plane, hotel, and vehicle transportation) for the date. Some embodiments may have Trust fund holdings for the creator/model's time payment for the date. Some embodiments may have Trust fund holdings for activity ordering for dates. Some embodiments may have Trust fund holdings for shopping for a date. Some embodiments may have Trust fund holdings for services such as (massage, manicure, hair styling, go-karting) for dates. Some embodiments may have a Beginning date by the time. Some embodiments may have a Beginning date by location. Some embodiments may have a Beginning date by business location. Some embodiments may begin by contractual agreement time/date/location. Some embodiments may have Beginning and ending dates based on duration. Some embodiments may have Beginning and ending dates based on time. Some embodiments may have Beginning and ending dates based on time, date, and location. Some embodiments may have a Chip/robot location recording of the date. Some embodiments may have a Data log with location data from a date. Some embodiments may have a Data log with duration data from the date. Some embodiments may have a Data log with business/personal (what was eaten/ordered) data from the date. Some embodiments may have Current time recording on the date. Some embodiments may have Manual date-ending options (issue refund, report problem). Some embodiments may have Automatic date-ending options (regular date, general date). Some embodiments may have Mental health resources (therapy, happiness, general). Some embodiments may have Safety resources (prevent crimes, prevent danger, report danger, be safe, what not to do). Some embodiments may have Sexual assault resources (if sexually assaulted, what to do, whom to talk to, where to go). Some embodiments may have Forced labor (sex or human trafficking information and resources). Some embodiments may have Psychological coercion resources (psychological training, assistance, or help for preventing danger through mental coercion/tricking, false pretenses). Some embodiments may have educational options such as (community college, trade college, skills college, and managing payments for school). Some embodiments may have 'How to run your business center' (how to do business, terms, conditions, business advice). Some embodiments may have Community bulletins (safety blog posts, safety posts, information for creators, etc.). Some embodiments may have a Reapplication process if denied. Guideline process for approval. Some embodiments may have Upload proof of date plus approval plus funds disbursement. Some embodiments may have a Date log, management area, confirming contractual agreements have been met, and automatically dispersing payment. Some embodiments may have Requirements to be met to be paid. Some embodiments may have Requirements to be met for funds to be disbursed. Some embodiments may have a Date resolution center for data collection, funds disbursement, cancellation, refunds, etc.) for date/meeting/connection. Some embodiments may have a Summary, which may include but not be limited to (e.g., breakdown, itemized, receipt, invoice, total, partial, breakdown, bill, a summary of, total, etc.) of 'date,' which may include time, location, duration, safety information, external links, resources, what to wear, rules for a date, terms and conditions, laws, address of the location, activity, contractual agreement, info for funds disbursement. Some embodiments may have Safety videos before the date. Safety videos or safety agreements signed or watched before the date. Some embodiments may have Model block off their calendar for any reason. Some embodiments may have The ability for the model to allow or deny bookings for the calendar. Some embodiments may have 3rd party management system, entity, or person to approve, deny, and manage bookings for models on the platform. Some embodiments may have a Re-booking summary for easy rebooking, such as (e.g., breakdown, itemized, receipt, invoice, total, partial, breakdown, bill, summary of, total, etc.) of last date' and easily re-book another date. Some embodiments may have Easy re-book for date. Some embodiments may have Easy summary and re-book for the date. Some embodiments may have Denying a (e.g., person or a category (non-paying members, college students) or a type (brunette, blonde, muscular), etc.) to book, inquire about, inquire regarding, secure, create a connection to, hold, pay for, create a business relationship with, use exchangeable to secure or book, etc.) another in-person date. Some embodiments may have Agreeing for a person to book, inquire about, inquire regarding, secure, create a connection to, hold, pay for, create a business relationship with, use exchangeable to secure or book, etc.) another in-person date. Some embodiments may have Denying a person to book, inquire about, inquire regarding, secure, create a connection to, hold, pay for, create a business relationship with, use exchangeable to secure or book, etc.) another virtual date. Some embodiments may have Agreeing for a person to book, inquire about, inquire regarding, secure, create a connection to, hold, pay for, create a business relationship with, use exchangeable to secure or book, etc.) another virtual date.

Some embodiments may have removing options calendar from users' view. Some embodiments may not allow users to view the calendar, interact with it to view the calendar or interact with the view timing data method (meaning book, view, inquire about). Some embodiments may have One creator booking, reserving on the calendar, etc.) friend, acquaintance, family member, or anyone to safety chaperone date with no payment, just booking, say on the integrated calendar. Some embodiments may have Blocking specific places, times, locations, and durations of in-person dates. Some embodiments may block specific places, times, locations, and durations of virtual dates. Some embodiments may have Blocking house deliveries from 3rd parties, users, or anyone. Some embodiments may have the option to add only specific pre-approved or pre-determined places, times, locations, and durations of in-person of the date. Some embodiments may have Added only specific pre-approved or pre-determined places, times, locations, and durations of virtual dates. Some embodiments may have the option to set up automatic dates with the user/Some embodiments may have Setting up automatic date with users, including payment transfers. Some embodiments may have Set up automatic funds transfer to the user. Some embodiments may include Setting up automatic gifts, gift cards, rent payments, bill payments, and asset sending such as 'selling and sending funds for stocks' transfer. Some embodiments may have In any embodiment, a 'gifting section may be available, including but not limited to 'items listed to be paid for or gifted by 3rd party, fan, or any person. Some embodiments may have Set up automatic stock transfer to the user. Some embodiments may agree to (signing, facial recognition, live viewing, or live contractual agreement) contract terms per date or in-person connection. Some embodiments may have In any embodiment, there may be a request for an item (hair item, makeup, gift card, rent payment), including but not limited to approval or denial requests, suggestions, messages, shown items, and requested items. Some embodiments may have In any embodiment, there may be a request for an item (hair item, makeup, gift card, rent payment), approval or denial request, then tracking or disbursement of the item or shipping or any method of receiving the item or digital item. Some embodiments may have 3rd party integrations or information such as 'safety agreements' and safety video safety information. Some embodiments may have a Viewing background check on the user's personal information that has (paid, looked, viewed, seen, booked, checkout, secured with you, etc.). Some embodiments may have Options to deny or refund paid persons for (date, connection, etc.). Some embodiments may have a Free background check, social media check, or personal information check (paying dater, potential dater, viewer, follower, person, etc.). Some embodiments may have Options for (pay-per-view or one-time payment) background check, social media check, or personal information check for (paying dater, potential dater, viewer, follower, person, etc.). Some embodiments may have Given a background check summary, all social media, all background information, and a date summary. Some embodiments may have Options to obtain background information or verified information before agreeing to the date paid for or before payment is made. Some embodiments may have Options such as 'booking photoshoots, booking video shoots, and paying for professional content services through the platform. Some embodiments may have a Safety center for the model. Some embodiments may have Laws, rules, regulations, what is not allowed, and signed agreements for 'paying person before date.'. Some embodiments may have customized entertainment, entertainment, requested entertainment, entertainment, and booking. Some embodiments may have customized entertainment, entertainment, requested entertainment, and requests. Some embodiments may have customized entertainment, entertainment, requested entertainment, and negotiations. Some embodiments may have Calendar pre-decided or pre-approved customized entertainment, entertainment, requested entertainment, or booking. Some embodiments may have Badges or certifications showing 'prostitution is illegal, 'this is not an escort site,' rules and regulations, 'illegal activities will be reported to police,' etc.

AI assistant in Connection app/platform. Some embodiments may have a knowledgeable AI assistant and be asked about terms, conditions, rules, regulations, laws, date rules, etc. Some embodiments may have AI assistants and may book calendar dates. Some embodiments may have AI assistants that can change calendar dates. Some embodiments may have AI assistants that can respond to messages, post content, or negotiate business deals. Some embodiments may have AI (trained artificial intelligence model or assistant) assistants. Some embodiments may have to do a background check. Some embodiments may have AI models or assistants trained by each model, person, user, platform, or 3rd party. Some embodiments may have an AI assistant who can answer questions about specific dates (from data collection). Some embodiments may have AI assistants who answer questions about 'how to act on a date.' Some embodiments may have AI assistants who may be sent reminders. Some embodiments may have AI assistants trained in sending reminders (texting, typing, day, time, email). Some embodiments may have AI assistants who inform or communicate with the security. Some embodiments may have AI assistants to disclose or share with law enforcement. Some embodiments may have AI assistants who report or communicate with the platform. Some embodiments may have Artificial intelligence that can respond to applications and gain/seek approval. Some embodiments that Artificial intelligence may include but not be limited to (e.g., seek approval for, edit, submit, etc.) application approval and denial. Some embodiments may have Artificial intelligence that can send/approve/etc.) applications and send them to humans to make the final decision. Some embodiments may have Artificial intelligence that can send/approve/etc.) applications and ask for more information or changes. Some embodiments may have Artificial intelligence assistants that may give 'real-time' travel data, such as (private travel data, public travel data, private jet inquiries, private information from travel companies, 3rd party traveling, 3rd party travel companies, etc.) Some embodiments may have AI assistants suggest 'dates' based on 'budget' or 'amount of money' or 'funds available,' etc. Some embodiments may have AI assistants send (reminders' to 'remember to re-book a date or book a date on this day, etc.)

Virtual functionality. Some embodiments may have a Preview of content and then pay to continue content viewing. Some embodiments may have Tipping on messages. Some embodiments may have The user gets a, which may include but not be limited to (e.g., receipt, invoice, total, partial, breakdown, bill, itemized payment, etc.) for, which may include but not be limited to (e.g., date, connection, meeting, period, etc.). Some embodiments may have Paid for messages. Some embodiments may have Booking requests with payment for outside jobs such as 'modeling jobs' or 'acting jobs', etc.) Some embodiments may have Booking request inquiries for outside jobs such as 'modeling jobs' or 'acting jobs.' Some embodiments may have Matching based on price preferences. Some embodiments may have Matching based on looks. Some embodiments may have Matching based on travel. Some embodiments may have Matching based on duration. Some embodiments may have Matching based on price range; Some embodiments may have Adding costs or payments or separate (e.g., breakdown, itemized, receipt, invoice, total, partial, breakdown, bill, summary of, total, etc.) for 'childcare costs during the date.' (e.g., breakdown, itemized, receipt, invoice, total, partial, breakdown, bill, summary of, total, etc.) of all expenses. Some embodiments may have Connecting or adding social media to profile content. Some embodiments may have Paying to view someone's social media links/content. Some embodiments may have Users choose prices, price ranges, general pricing, and general exchangeable for viewing personal information. Some embodiments may have Users choose prices, price ranges, general pricing, and general exchangeable for viewing social media information or links. Some embodiments may have an Integrate calendar or connect the calendar to 3rd parties (3rd party calendar, 3rd party management calendar). Some embodiments may have View hot spot of 'daters or models' (no personal information). Some embodiments may have Search in 'hot spot' for 'daters or persons (no personal information) (general areas). Some embodiments may have Add live 'story' or live post or disappearing post. AI automatically updates the live story. Some embodiments may have Manual or automatic, machine learning, computer, robotics, 3rd party chosen, or entity-chosen, 'live story' updating. Some embodiments may have Pre-made posts to automatic 'live story' with updating by AI or machine learning or manual posts or automatically scheduled posts. Some embodiments may have AI use previous search perimeters such as 'blondes, new York' and show a lot of 'blonds from New York until other computing operation searches are performed or agate this one/previous one. Some embodiments may have Public stories (live information or recent posts) data saved to the platform for safety reasons. Some embodiments may have Private accounts or information (live information or recent posts) data saved to the platform for safety reasons. Some embodiments may have Users be able to automatically promoted for some time (day, week, month, year, any amount of time). Some embodiments may have Users may be able to be on the homepage for a time period (day, week, month, year, any amount of time). Some embodiments may have Users be able to recommend or show up on any user's calendars for a time period (day, week, month, year, any amount of time). Some embodiments may have Unlocking episodes or original series episodes (created by/uploaded by/made by) content creators. Artificial intelligence creates content by inputting users' content and creating other content. Artificial intelligence creates content by inputting stock content and creating other content. Some embodiments may have Similar calendar matching. Some embodiments may have A similar pattern in calendar matching. Some embodiments may have Similar date times available matching. Some embodiments may have Users be able to recommend or show up on any user's content feed for a time period (day, week, month, year, any amount of time). Some embodiments may have Integrate outside or 3rd party site that provides nannies, maids, cleaning persons, babysitters, etc.) plus their reviews, ratings, and other types of information regarding (which models they have worked with, their comments, their reviews, star ratings, etc.)

Some embodiments may have Manual or automatic, machine learning, computer, robotics, 3rd party chosen, entity-chosen, charity donations or charity percentages for date payment, partial payments of dates, or a percentage. Some embodiments may have User interfaces that may be exchanged or changed, including but not limited to (e.g., stack view to swipe view to flat view to category view, list view to live view, multiple user views, custom user interface view, etc.). Some embodiments may have Specific photo/video upload instructions such as 'viewing or denying photos based on metadata (older than three years old for MEN or paying persons) on the platform to prevent catfishing. Some embodiments may have Real-time travel data (private travel data, public travel data, real-time pricing, real-time changes in traveling, real-time changes in pricing for travel or other locations, etc.) Some embodiments may have a Live Photo upload or a person certification system that makes a person take live photos of currently to prevent catfishing. Some embodiments may have Blur to pay for a clear view of content. Some embodiments may have Greyed out the calendar or not available to book, inquire about, inquire regarding, secure, create a connection to, hold, pay for, create a business relationship with, use exchangeable to secure or book, etc.) period when someone else has booked already. Some embodiments may have Unlimited dating options. Some embodiments may have Self-Tagging or categorizing (content, persons, users, models). Some embodiments may have Viewing 'likes or preferences for dates' such as (loves flowers, wants makeup, loves gift cards, and favorite dessert options). Some embodiments may include automatic dates, times, places, duration, and payment sent. Some embodiments may allow virtual assistants to manage bookings, schedules, messages, and content. Some embodiments may have a Free following of the user. Some embodiments may have Payment for subscription for the user. Some embodiments may have Payment for each content unlock for the user. Some embodiments may have Payment for viewing the 'live show' of the user. Some embodiments may have a Free preview of the 'live show' of the user. Some embodiments may have a Free preview of content or collaboration content. Some embodiments may have a Free preview of 'platform content.' Some embodiments may have Paid options for 'platform's content.'. Some embodiments may have Booking (restaurant, location, server, items of food, dessert, liquid items, any birthday stuff, etc.) all through the platform etc. Some embodiments may have Categories or separation of users, plus additional subcategories (more specific). Some embodiments may have 'Rooms' or user interfaces for specific goals such as 'calendar viewing.' Some embodiments may have 'Rooms' or user interfaces for specific goals such as 'which users are available for what day/time/location/duration.'

Some embodiments may have Searching in the calendar for user 2 to match the availability of user 1. Some embodiments may have Searching in the calendar to see if there are user 2's available for user 1. Some embodiments may have Searching in the calendar to see if there are user 2's available for user 1 at a specific time, date, location, or duration. Some embodiments may have Raising prices, price ranges, general pricing, general exchangeable, or changing prices, price ranges, general pricing, general exchangeable, from a person from the in-person date. Some embodiments may have Raising prices, price ranges, general pricing, general exchangeable, or changing prices, price ranges, general pricing, general exchangeable, from a person from the virtual date. Some embodiments may have Raising prices, price ranges, general pricing, general exchangeable, or changing prices, price ranges, general pricing, general exchangeable, from a person from messages or inquiries. Some embodiments may have Assigned specific payment requirements to specific users. Some embodiments may integrate 3rd party phone numbers with payment (included in the date log, management area). Some embodiments may have 3rd party phone number integration for free (included in the date log, management area). Some embodiments may have Integrated 3rd party phone number integration with payment (included in the date log, management area). Some embodiments may have Integrated 3rd party phone number integration for free (included in the date log, management area). Some embodiments may have Adjusting mass messages costs to unlock or view. Some embodiments may have Changing or managing specific persons for specific prices, price ranges, general pricing, and general exchangeable based on categories to unlock, view, or date. Some embodiments may have Automatic messages to book, inquire about, inquire regarding, secure, create a connection to, hold, pay for, create a business relationship with, use exchangeable to secure or book, etc.) another date sometime after the date is completed. Some embodiments may have Automatic messages to book, inquire about, inquire regarding, secure, create a connection to, hold, pay for, create a business relationship with, use exchangeable to secure or book, etc.) another date sometime before the date is completed. Some embodiments may have Automatic messages to book, inquire about, inquire regarding, secure, create a connection to, hold, pay for, create a business relationship with, use exchangeable to secure or book, etc.) another date sometime during the date. Some embodiments may have Uploading proof of date outside, such as (valet proof and cost and being left with a bill) and uploading it, which may add a fee for paying a person to pay. Some embodiments may allow a 3rd party to manage bookings, schedules, messages, and content. Some embodiments may allow artificial intelligence machine learning or a training model to manage bookings, schedules, messages, and content. Some embodiments may send users an option to 'customize the in-person date,' for example (request that Emily (e.g., a creator) chooses the date, time, place, and duration. Then the user only has to complete payment and agree to terms, etc.).

Some embodiments may have Sent the user an option to 'customize the virtual date,' for example (request that Emily choose a date, time, 3rd third-party food delivery or activity such as 'both people cooking or playing game,' duration, and then the user only has to complete payment and agree to terms, etc.). Some embodiments may have Platform Tagging or categorizing (content, persons, users, models). Some embodiments may have AI or machine learning putting models or persons on users' calendars and asking them to pay (or continue booking by paying). Some embodiments may suggest credit cards or lines or obtain 'funds' on the platform to pre-pay for dates or get credit for dates. Some embodiments may have Requested a 'paying person' to wear a suit/tie/attitude, etc.) for the date. Some embodiments may have Book photoshoots, photographers, videographers, and professional content producers from the platform. Some embodiments may have Book nannies, assistants, maids, and babysitters through the platform. Some embodiments may have Comparisons of professional content and non-professional content. Some embodiments may have Mandatory type of submitted photos or 'digital polaroid' type photos 'similar to modeling agency (digitals or digital polaroids for booking jobs) for modeling, or acceptance to the site, or to book, inquire about, inquire regarding, secure, create a connection to, hold, pay for, create a business relationship with, use exchangeable to secure or book, etc.) jobs. Some embodiments may have 3rd party integrations or 3rd party management of 'talent, model, person' (booking jobs, approval, denial, price (e.g., breakdown, itemized, receipt, invoice, total, partial, breakdown, bill, summary of, total, etc.) responding to messages, responding to inquires). Some embodiments may have requested 3rd party or platform background check on the user. Some embodiments may have Categorize users or persons on the platform for lists, separating, sections, or persons for any reason. Some embodiments may have Options to pay full, partial, or any amount of users or person's bills. Some embodiments may have The custom building or view of user interfaces (multiple user interfaces at one, multiple screenings at one, multiple content viewing at once, etc.).

Some embodiments may have (e.g., breakdown, itemized, receipt, invoice, total, partial, breakdown, bill, summary of, total, etc.) recurring bills, one-time payment bills, debt payments, debts owed, payments that need to be made. Some embodiments may have Filtering persons by (salary, history, and popularity, which may include but not be limited to (e.g., breakdown, itemized, receipt, invoice, total, partial, breakdown, bill, a summary of, total, etc.), stock owning, owning a house, type of car, type of profession, travel-friendly, net worth, verified income, etc.). Some embodiments may have Filtering persons by (looks, talent, beauty, categories, stay-at-home, gift-loving, business owning, hobbies, love languages, etc.). Some embodiments may have an Internal Communication Center from a platform for models for 'safety reasons, such as 'bulletin boards with information on what to look out for, how to be safe, etc). Some embodiments may have Accepted safety information from the platform to be used for the 'safety bulletin billboard center' within the platform. Some embodiments may have Dummy profile versions, separate versions, multiple versions, or ways to contact linked to one management center. Some embodiments may have Added 'boyfriend or special VIP or person' for 'special treatment or special viewing options or booking options. Some embodiments may have Searching for men or 'paying persons' from 'models' to send (winks, viewing profile, viewing person, model to send messages, inquiries, calendar availabilities, wanting to book, inquire about, inquire regarding, secure, create a connection to, hold, pay for, create a business relationship with, use exchangeable to secure or book, etc.) with. Some embodiments may have Searched for models or creators by 'price.' Some embodiments may have Searched for models or creators by 'availability.' Some embodiments may have Searched for models or creators by 'calendar.' Some embodiments may have options to Search for models or creators by 'duration of date.' Some embodiments may have options to search for models or creators by 'location of date.' Some embodiments may have options to Search for models or creators by 'frequency of dates.' Some embodiments may have options to Search for models or creators by 'type of date.' Some e embodiments may have options to search for models or creators by 'virtual dates.' Some embodiments may have options to search for models or creators by 'in-person dates.' Some embodiments may be able to search for models or creators by 'interests.' Some embodiments may be able to search for models or creators by 'looks.' Searching for models or creators by 'talent.' Some embodiments may be able to search for models or creators by 'group.' Some embodiments may have the option for models or creators by 'categories.' Some embodiments may be able to search for models or creators by 'platform tagged or platform given categories.' Some embodiments may be able to search for models or creators by '3rd party confirmation such as wiki page or celebrity, or in the news, or famous'. Some embodiments may have 'Live face shots' or live body shots may be required to sign up for the platform. Some embodiments may have Payment may be required to apply to the platform. Some embodiments may require Payment to book, inquire about, inquire regarding, secure, create a connection to, hold, pay for, create a business relationship with, use exchangeable to secure or book, etc.) 'in-person dates' on the platform. Some embodiments may have the Verification required to book, inquire about, inquire regarding, secure, create a connection to, hold, pay for, create a business relationship with, use exchangeable to secure or book, etc.) 'in-person dates' on the platform. Some embodiments may have Requested a 'paying person' to gift a person a gift card, makeup, clothes, or flowers in person. Some embodiments may have a History of locating 'gifts' or presents. Some embodiments may have a History of locating where 'sent' items are (such as merchandise or at-home items that were sent).

Some embodiments may have Seen the history of daters. Some embodiments may have Options to obtain automatic reminders about dates or daters. Some embodiments may have May cancel and issue a refund for the date. Some embodiments may have Changed the date and time of the date. Some embodiments may have Changing date and time of date in exchange for payment. Some embodiments may have a Booking date in person in exchange for payment. Some embodiments may have a Booking date virtual in exchange for payment. Some embodiments may send messages or get a response in exchange for payment. Some embodiments may have blocking or allowing or restricting specific categories or persons from booking a 'virtual date, entertainment options set by anyone or model or user, in-person date, sending messages, viewing locked content, viewing NSFW/sexy photos, etc. Some embodiments may have Blocked, allowed, or restricted persons who went out on a date with or may have had a date with previously. Some embodiments may have blocked custom requests from in-person dates. Some embodiments may Block inappropriate persons from in-person, virtual messages, or any communication or connection. Some embodiments may Block persons from re-booking another date without their knowledge. Some embodiments may have Viewing entirely of content, movies, pictures, and videos in exchange for payment. Some embodiments may have the option to Move the date from one city to another. Some embodiments may have the option to book, inquire about, inquire regarding, secure, create a connection to, hold, pay for, create a business relationship with, use exchangeable to secure or book, etc.) date, connection, business meeting, meeting with users in another city. Some embodiments may have Options to bring users from other cities to your city for dates, connections, business meetings, and meetings. Some embodiments may have Options to request custom content in exchange for payment. Some embodiments may have Options to deny, change, or partially deliver content requests in exchange for payment. Some embodiments may have the option to view background checks or personal information of daters. Some embodiments may have the option to view or see the history of the date log, management area, or 'previous date went on.' Some embodiments may be able to report the situation using a date log and management area.

Some embodiments may be able to accept or deny a date after the date is paid. Some embodiments may have the option to accept or reject a date before the date is made. Some embodiments may have the opportunity to block users who may have seen or unlocked 'NSFWs' or 'sexy photos' from booking a date with the user. Some embodiments may have Options to categorize users and block them from booking dates with users. Some embodiments may have Options to manage calendars and change prices, price ranges, general pricing, and general exchangeable for calendar times, dates, locations, availabilities, and options. Some embodiments may have Options to view their request for additional items such as 'wanting flowers in-person, requesting a gift card in person,' requesting flowers sent to the house, requesting a dress for a date,' 'requesting their bills be paid before date,' 'requesting money for a hair stylist, etc. Some embodiments may have Viewed previous date pictures or videos from users (happy customers). Some embodiments may have Moving reels, moving content, or constantly looping content. Some embodiments may have Grouped together, viewed, or seen more content/person/users based on computing operation. Some embodiments may have Calendar integration for booking dates (or securing connection time spent) in exchange for payments. Some embodiments may have Pre-chosen dates, times, and locations to choose on the calendar to book, inquire about, inquire regarding, secure, create a connection to, hold, pay for, create a business relationship with, use exchangeable to secure or book, etc.). Some embodiments may have Pre-chosen payment prices, price ranges, general pricing, and general exchangeable set by the user. Some embodiments may have a Book for in-person date option (on the user interface) on top of or next to the content. Some embodiments may have a Book for Virtual Date option (on the user interface) on top of or next to the content. Some embodiments may have Viewing the calendar of the user (model, creator) and the user's calendar (paying person) simultaneously. Some embodiments may be matched to a user based on calendar availability and scheduling options. Some embodiments may have the option to be matched to users based on calendar suggestions.

User Pays the platform Directly. Some embodiments may Pay to get bad ratings removed. Some embodiments may have no option to be 'rated' after a date. Some embodiments may Pay to have no comments made after the date as a review on their platform area/profile, etc). Some embodiments may Pay the platform to remove signed-up job verification email verified badges, etc. Some embodiments may Pay for membership unlimited platform content. Some embodiments may Pay for membership to see unlimited content only by users who opt-in to be part of the unlimited platform payments (models get paid based on how often their content is viewed in a pot). Some embodiments may Pay to go on unlimited dates for an entire year (may be a limit of one day per day) (400,000). Some embodiments may Pay to go incognito, such as (not being seen by other male members, not being seen by models, not being bid on, etc.). Some embodiments may Pay not to have personal information shared with others (male members). Some embodiments may Pay to get unlimited messages to models on the platform (but only if she responds or wants to be messaged). Some embodiments may Pay to have compliments removed from the platform. Some embodiments may Pay to hide date 'amounts' (meaning how many dates he's been on or how much each date has cost him) to other male members. Some embodiments may Pay to hide 'star or rating reviews' from other male members. Some embodiments may Pay to hide net worth from other male users, etc. Some embodiments may have Personal information about female members that he is interacting with only on in-person dates, which needs to be shown to the model for safety reasons; if it's just virtual, then I don't think it matters that his personal information being shared with her for the paid-for virtual date (she needs to not share personal information with him). Some embodiments may Model/content creator silent content until payment is made. In some embodiments, the model/content creator may have blurred content until payment is made. Some embodiments may Platform silent content until payment is made. Some embodiments may Platform blurred content until payment is made. In some embodiments, Half of the content may be shown until payment is made (to the platform, user, or both). Some embodiments may Some swipes until payment is made (to the platform or user or both). Some embodiments may be A few browsing until payment is made (to the platform, user, or both). Some embodiments may Have live views until payment is made (to the platform, user, or both). Some embodiments may include A few photos/videos/content until payment is made (to the platform or the user or both).

In some embodiments, any features, functions, or embodiments described as being associated with a first user is equally associated as being associated with a second user, and any features, functions, or embodiments described as being associated with any user is equally associated as being associated with any other user.

In some embodiments, the data additionally or alternatively includes any other data described in this disclosure. In some embodiments, a training model is provided. A computing device/application may be trained using the above-described data and/or other data from the Internet to produce any of the displayable or non-displayable data to users described herein.

In some embodiments, this disclosure provides executing at least one of a computing operation, an intelligent computing operation, or a machine or model learning computing operation, or training a language model or large language model based on at least of: user content, a photo, a video, a clicking or selecting activity on platform, an activity outside platform (Google or Bing searches, questions on search bars, other 3rd party sites), ratings from other users, comments from other users, terms, conditions, rules, regulations, laws of the country, laws of the city, laws of the state, local laws, contracts between users, price data, price change data, user's personal information (name, location, distance, tax information, stock information, real estate information, paycheck information etc.) user history on site/platform/application, (what type of activities (watching lives, liking content, sending messages, booking dates, looking at calendars, unlocking photos, subscribing to photos etc), types of posted content, frequency of posted content, events, messages history, mass messaging, types of messages, amount of money earned, amount of money spent, whether 3 party integrations are used (selling stocks through integrated 3rd parties, selling jewelry to fund account, ordered outside 3rd party items such as food delivery or taxi services and the amount spent on those 3rd party integrations etc.) how many or identity of followers, how many or identity of subscribers, background checks, personal information, outside personal information that is public and accessible to computers, types of messages sent (requesting customs, requesting feet pictures, asking silly questions, etc.) payment history, date history, how long been on platform, how many recruited members/users, referrals, amount paid by platform, bonuses, membership status, membership history, previous terms and conditions, current terms and conditions, new regulations, new changes to platform, new rules to follow versus old rules, any term changes, information for how a date should be done such as (flowers, niceness, questions to ask on a date, rules to follow, protocol, etc), laws, history with platform such as any special photoshoots/recognitions such as (badges, earnings recognitions, VIP status) etc, History of data collection from dates such as (location, distance, driving history, time, place, location, rules of date, legal agreements, agreements, signed information, etc.) prices changes, price comparisons, market prices for time/dates, women's history, women's safety information, safety protocols, psychology related to platform, psychological data, non-profit resources, training information, legal information such as laws, frequency viewing content and what type of content and activity related to content or platform viewing, facial recognition, whether beauty apps have been used, whether content has been manipulated, metadata on content, metadata on photos/videos, timestamps, listening to voice commands and analyzing data for ads, assistance, questions, solutions, hearing, imported data, typed data, or viewing any 'potential advertisement analyzing information' (information needed or suggested to suggest advertisements) such as (needing hair extensions, needing to get hair done, needing to get a new credit card, or wanting a credit line, etc), location of date, date business history locations and or frequencies, nearby cities, nearby locations, favorite beauty items, beauty items used, work history, work-related information, information about date, content regarding date such as (shopping) so pictures of shopping, or pictures of the user created with AI going shopping, stock photos, stock videos, stock content, stock content that is related to relationships/romance/persons, stock content that is related to date, stock content that is related to activity, stock content that is related to location, business content, outside persons, outside 3rd parties, outside entities, movies, love stories, books, outside work schedule, work routine, time available during day, each hour of day, each minute of day, sleeping schedule, sleeping pattern, debt amount, credit amount, outside credit, outstanding credit, payment installments, history of date types, history of date information, users private comments about user, users public comments about user, bulletins, community boards, posted content, platform content, dating history of dater, level of dating experience of dater, work history, school history, location history, work schedule, outside work schedule, goals, wishes, wants, needs, suggestions, likes, etc.) In some embodiments, the data additionally or alternatively includes any other data described in this disclosure. In some embodiments, a training model is provided. A computing device/application may be trained using the above-described data and/or other data from the Internet to produce any of the displayable data to users described herein.

One or more apparatuses are provided comprising a memory for storing instructions associated with any of the methods described or claimed herein; and one or more hardware computing device processor for executing the instructions.

One or more apparatuses are provided comprising one or more computing device processors; and one or more memory systems comprising code, executable by the one or more computing device processors, and configured to: execute any of the methods described or claimed herein. The one or more apparatuses may comprise or be comprised in at least one of one or more servers, a first computing device associated with a first user, or a second computing device associated with a second user. At least two of the one or more servers, the first computing device, and the second computing device may be located in geographically distinct or disparate locations. At least two of the one or more servers, the first computing device, and the second computing device may be disparate from each other (e.g., different types of computing devices, and/or in different locations, etc.) In some embodiments, an application provisioning server may be provided to store an application comprising code for at least partially executing the various methods described or claimed herein, in coordination with one or more servers or other computing devices. The application comprising code is downloadable by computing devices of users. In some embodiments, a first application comprising first code may be stored on an application provisioning server associated with a first operating system. In some embodiments, a second application comprising second code may be stored on an application provisioning server associated with a second operating system. In some embodiments, a first computing device (associated with a first user) running a first operating system downloads the application stored on the first application provisioning server. In some embodiments, a second computing device (associated with a second user) running a second operating system downloads the application stored on the second application provisioning server. In some embodiments, the first user and the second user are part of the computing network described herein and are able to interact with each other (e.g., the first user is enabled to create a profile, close an open time in the second user's timing data or the first user is enabled to bid for an amount to close the open time in the second user's timing data, the first and second user are enabled to interact with each other using any of the methods described herein, the second user is enabled to create a profile and is enabled to indicate an open time in the second user's electronic timing data, etc.) In some embodiments, a user on the network is accessing a mobile application/website on a mobile Internet browser (or a laptop/tablet/desktop Internet browser) and does not need to download an application from an application provisioning server. This user is part of the computing network described herein and is able to interact with the first user and/or the second user as well, and perform any of the functions described as being performed by the first user and/or the second user. In some embodiments, the first user and/or the second user may additionally or alternatively access the application/website on a mobile Internet browser (or a laptop/tablet/desktop Internet browser) to perform any of the methods or functions described herein.

In some embodiments, the disclosure provides the following features:

Provide a communication network platform utilizable by computing users registered with the communication network platform or guests browsing the communication network platform. The term communication network platform may be interchangeably used with a communication app, communication application, communication website, communication software, etc.)

Provide a timing network platform utilizable by computing users registered with the communication network platform Establish a computing connection between a communication network platform and a timing network platform User 1 (e.g., a Man, group, user, entity, or business with money to spend) accesses an app or website on User 1's computing device.

User 2 (e.g., Woman/Creator) accesses an app or website on User 2's computing device.

User 2's profile goes through a verification process before going live on the app (face verification, which may include but not be limited to (e.g., photo taken with the app compared to picture ID), video, passport, license, social media, number of followers, why are you special). This process may be performed automatically using a verification network platform connected to the communication network platform.

User 2 establishes a profile with photos (photos (of different looks, interesting, cool, entertaining), videos (e.g., introducing the user), locked media, and shows your various interests (dogs, books, etc.)

User 2 can upload stores (photos/videos)

User 2 can show dating success on the app (successfully booked 50 dates on the app)

User 2's profile has the option to book, inquire about, inquire regarding, secure, create a connection to, hold, pay for, create a business relationship with, use exchangeable to secure or book, etc.) or Select a Date with User 2

Buy Now Option

User 1's profile goes through a verification process before going the profile goes on the app (face verification, which may include but not be limited to (e.g., photo taken with the app compared to picture ID), passport, license, social media, net worth, verify work email address). This process may partially or entirely be performed automatically using a verification network platform connected to the communication network platform.

User 1 establishes a profile with photos and a funds account (what do you do for work, like a LinkedIn profile, net worth, education)

Privacy preferences to stay private

Badges show that User 1 has been verified by the app (Verified LinkedIn, Twitter, criminal history, net worth, annual income, education, job/business, etc.)

User 2 is presented with rules at least once before, during, or after establishing availability in the electronic/digital calendar (also referred to as network timing platform or electronic timing platform)

Receive User 2's acknowledgment of the rules

User 2 establishes availability in the calendar (availability may include at least one date and time)

Sharing preferences may be public or private

No open availability (too many messages are being exchanged to figure out the time of the meeting)

User 2 establishes the lowest bid price associated with a particular time. A price may include a certain amount of electronic exchangeable, which may be electronic money or cash, Bitcoin, cryptocurrency, assets, electronic art, non-fungible tokens (NFTs), points, application currency, or credits which may be used only on the platform, stable-coin, digital currency that may or may not be trackable, etc.

The bidding process closes at a time established by the user or the app. A bid may include committing a certain amount of electronic exchangeable.

User 2's profile, including photos, is available for access by User 1

User 1 shows up in User 2's matches based on User 1's information (location, time of availability, or other preferences, including categories such as occupation, look, and cosplay)

User 1 bids for available dates or date or meetings or virtual or in-person in User 2's calendar Before, during, or after the bid is being processed/submitted, User 1 is presented with rules Receive User 1's acknowledgment of the rules User 3 access app User 2's profile, including photos, is available for access by User 3

User 3 bids for the same available in User 2's calendar

User 1 can see the progression of bids for the available date

At the end of the bidding process, whichever user bids the highest wins the date Notification is sent to both User 1 and User 2

The scheduled date shows up on the homepage of both User 1 and User 2

User 1's funds are moved to a trust network account

At a predetermined time after the start of the time, and based on User 2 completing their task (e.g., sending at least one photo with proof of time), a portion of the trust funds are moved to User 2's account, and a portion of the trust funds are moved to the platform's account If User 2 forgets, as long as User 1 may not make any objection indicating that User 2 did not show up, funds will be moved to User 2's account after a certain amount of time.

This will also increase User 2's reliability in the system.

The platform may rank or assign a rating to second-category users based on certain factors (number of successful dates without complaints, timely sending of photos/videos with proof of punctuality for a date, number of complaints regarding behaviors, etc.)

The platform may rank or assign a rating to first-category users based on certain factors (number of successful dates without complaints, timely sending of photos/videos with proof of punctuality for a date, number of complaints regarding behavior, etc.

User 1 may be able to stay anonymous

User 2 may be able to stay anonymous

User 2 may be established a location associated with the available time

User 1 has the option of Buy Now if User 2 has activated that option

If User 1 selects this option, the bidding process stops.

User 2 sets the duration of the bidding process or automatically sets it based on the date.

User 2 may be set filter for users who may be bid on a date (preference, badge, net worth, where you live, or other preferences)

User 1 may get badges (some mandatory, some optional)

User 2 may get badges (some mandatory, some optional)

User 2 has the option of deleting users who have bid for her date (either during the bidding process or after a user has won the bidding process)

User 2 may be able to see the user profile of User 1 before User 1 bidding on User 2's date User 1 may be set privacy preferences (e.g., available only to User 2 or other User 1s)

Live bidding wars on the homepage

It may be filtered based on location, creator, etc.

Upon winning the bid, a notification is sent to both User 1 and User 2 (either on the app or outside the app)

Notification may include additional preferences of User 2 (what User 1 clothes, gift card, flowers, etc.)

Funds may be points or app currency, or cryptocurrency

For both User 1 and User 2, take photos/videos of location, table, selfie, photos including User 1 and User 2, along with proof of time, which may include but not be limited to (e.g., screen record)

For the date, User 2 may be established location preference, cuisine preference, activity preference, budget preference, and duration preference.

Location may be established by either User 1 or User 2

Receive feed from certain locations regarding availability

Either User 2 may be able to select a location at the time of establishing time availability, or User 1 may be select a location at the time of winning the bid or anytime during the bidding process User 1 may be pay for Uber, transportation service, and rides to and back through the app User 1 and User 2 may be exchange messages through the app before the date In some embodiments, no messages are exchangeable through the app Reminders are sent periodically in the app and directly to the user's phone (based on preferences established by the user)

Reminders are sent to User 2 at the start of the date after the start of the date to send photos (based on preferences established by the user)

Send electronic non-disclosure agreement (NDA) for the date (at least one of before, during, or after the date) to User 2 (if User 1 so chooses)

Send NDA for a date to User 1 (if User 2 so chooses)

It may be a periodic subscription for User 1 and/or User 2 (e.g., to access some of their content, to bid on dates with them, etc.)

Provide an option for User 1 to subscribe to User 2's exclusive content

This may prevent User 2 from deleting User 1 from the bidding process.

In some embodiments, User 1 may need to be subscribed to User 2 to bid on a date with User 2.

User 2 may establish exclusive content for User 1 or other first-category users to view. This may include photos or videos that may be blurred but are available for unlocking based on a price established by User 2.

Provide an option for User 2 to go live (e.g., live streaming) either instantly or on a previously scheduled day/time. A notification may be sent to followers of User 2 either at the time of scheduling or at the time of going live.

Provide an option for second-category users (or first-category users) to follow User 1

Provide an option for second-category users (or first-category users) to follow User 2

User 1 and User 2 are reminded of the rules before the start of the date

User 2 may choose privacy settings for each appointment on her calendar (blocked out, date, available).

User 2 and/or User 1 may or may not be able to view other second-category users (based on a privacy preference established by the particular second-category user)

User 2 and/or User 1 may or may not be able to view other first-category users (based on a privacy preference established by the particular second-category user)

Homepage of User 1 or User 2 may show trending or most prolific first or second-category users (e.g., based on the number of dates currently in the bidding process, based on the number of successful dates, and the number of bids being made, location, current bid price, etc.)

After the conclusion of the first date, User 1 may request User 2 for a second date, or User 2 may request User 1 for a second date with a time and location prompt. Receiving users may be able to approve or deny. User 2 may keep 90% of the funds for the second or subsequent date.

Establish a connection between the network platform, a location platform, or an aggregator platform that may include data for multiple locations.

Use blockchain to record any data described herein.

Use artificial intelligence/machine learning to perform any of the processes (e.g., verification or authentication processes) described herein.

The bidding battle may be public (e.g., shown on other first-category or second-category users' homepages or news feeds) based on privacy preferences established by User 2. User 1's name and/or other profile may be accessible/viewable to other first-category or second-category users based on privacy preferences established by User 1. For instance, User 1 may be shown as anonymous. Regardless of User 1's privacy preferences, more information about User 1 may be shown to User 2 during the bidding process (if User 1 has made a bid on a date with User 2) or after the conclusion of the bidding process.

During or upon conclusion of the bidding process, User 1 may see User 2's preferences for the date (User 1's dress code or hairstyle/facial hair or clothes color preferences, travel requirements (e.g., pick up User 2 or arrange for Uber, transportation service/Lyft transportation, send flowers/gift card/retail bag (e.g., with make-up) to User 2 before date, send flowers/gift card/retail bag to User 1 before date so that User 1 may bring flowers/gift car/retail bag to date, send flowers/gift car/retail bag directly to the location of the date, send digital gift card before date, send electronically exchangeable to buy clothes for a date, etc.)

The network platform may be connected to or is integrated with retailers to efficiently execute User 2's preferences/wants User 2 may be integrated e-commerce into her profile.

Show recently sold

Show available for sale (e.g., clothing items)

This may include clean items (e.g., old clothing items worn and washed by User 2)

This may include dirty items (e.g., unwashed clothing worn by the user, old drinks, dirty socks, fart in a jar, used bathwater, etc.)

First-category users may bid on these items (or may be bought immediately if such an option has been established by User 2)

The minimum bid price and length of the bidding price may be established by User 2

After the bidding process, User 1's funds (if User 1 won the bid) are moved to a trust account The home page of first-category or second-category users may present bidding battles for items being auctioned by second-category users If someone buys or wins a bid (e.g., User 1 buys or wins a bid), a label is created for User 2 to print for shipping. Labels ready to be printed and shipped. Therefore, the communication network platform is connected to a labeling platform and shipping platform. The labeling platform sends labels to certain shippers. A notification is sent to User 2 that User 2 needs to print and ship the product in a certain number of days.

When the communication network platform receives notification that the product has been delivered (by receiving a notification from the shipping platform), a portion of the funds are moved from the trust account to User 2's account.

Any embodiments, elements, features, processes, etc.) which may be combined with any other embodiments, elements, features, processes, etc.

Embodiments described herein may be implemented as one or more methods, computing apparatuses, or computer program products

- Any steps described herein may be performed in any order
- Some steps may be skipped
- The timing platform may be integrated into the website/app
- User 2 may be pay to have their profile promoted to first-category users
- User 2 may be indicated if User 2 is available to go on a travel date.
- User 2 may make travel arrangements based on a travel platform communicating with or integrated into the network platform In some embodiments, any elements or features applicable to User 1 may apply to User 2 or vice versa.

- User 1 or User 2 may be a bot or a non-real person
- User 1 is a first-category user
- User 2 is a second-category user
- User 2 may search for first-category users based on filtering criteria (age, height, weight, occupation, income, net worth, interests, location, time on the app, profile age, badges associated with the profile, etc.)
- User 2 may send a like or other emoji to a first-category user that appears in User 2's stack Stack of first category users available for browsing (e.g., as a list of users (horizontal or vertical) or a swiping list (e.g., one profile shows up at a time and User 1 likes or dislikes the user based on executing a first action, which may include but not be limited to (e.g., swipe left) or second action, which may include but not be limited to (e.g., swipe right), respectively). In some embodiments, the order of users in the list or swiping list may be used in machine learning or artificial intelligence processes. For example, the system may order the list based on creating an order of users based on predicted likability. For example, the first category users that the user views at the top of the list (compared to the bottom of the list) or initially in the swiping list (compared to later in the swiping list) are the first category users that the users will likely like. This ordering may be based on User 2's (or another second category user's) preferences and activities on or outside the platform.

Enable User 1 to have at least one of (e.g., a text, voice, or video conversation, gain information on, get more information, get rules, get regulations, see 'how it works,' sign an agreement, sign a contract, or in person or chat or intelligent chatbot or AI, etc.) with User 2 (e.g., before or after User 1 makes a bid for (or wins) a date with User 2). Only User 2 may initiate such a conversation with User 1 in some embodiments. In some embodiments, User 1 may additionally or alternatively be able to initiate such a conversation with User 2 by making a payment.

- Establish a computing connection between a network platform and a timing platform
- User 1 (e.g., a Man with money to spend) accesses an app or website on User 1's computing device.
- User 2 (e.g., Woman/Creator) accesses an app or website on User 2's computing device.
- User 2's profile goes through a verification process before going live on the app (face verification, video, passport, license, social media, number of followers, why are you special)
- User 2 establishes a profile with photos (photos, different looks, interesting, cool, entertaining), videos (e.g., introducing), locked media, showing your various interests (dogs, books, etc.)
- User 2 can upload stores (photos/videos)
- User 2 can show dating success on the app (successfully booked 50 dates on the app)
- Buy Now option
- User 1's profile goes through a verification process before going live on the app (face verification, passport, license, social media, net worth)
- User 1 establishes a profile with photos and a funds account (what do you do for work, like a LinkedIn profile, net worth, education)
- Privacy preferences to stay private
- Badges show that he has been verified by the app (Verified LinkedIn, Twitter, etc.)
- Receive User 1's preferences
- Receive User 2's preferences
- Show user 1 in a shortened list of users available to match with user 2
- Show user 2 in a shortened list of users available to match with user 1
- User 1 and User 2 match based on User 1 liking or sending a message to User 2 and/or User 2 liking or sending a message to User 1
- User 2 establishes availability in the calendar (availability may include at least one date and time)
- Sharing preferences may be public or private
- No open availability (too many messages are being exchanged to figure out the time of the meeting)
- User 1 selects the available time.
- User 2 selects a location based on preferences established by at least User 1 or User 2
- User 1 approves the location
- Notification is sent to both User 1 and User 2
- The scheduled date shows up on the homepage of both User 1 and User 2
- Notification is sent to the location with details of booking time and/or information of User 1 and/or User 2
- User 1 (e.g., a Man with money to spend) accesses the app.
- User 2 (e.g., Woman/Creator) accesses the app.
- User 2's profile goes through a verification process before going live on the app (face verification, video, passport, license, social media, number of followers, why are you special)
- User 2 establishes a profile with photos (photos of different looks, interesting, cool, entertaining), videos (e.g., introducing), locked media, showing your various interests (dogs, books, etc.)
- User 2 can upload stores (photos/videos)
- User 2 can show dating success on the app (successfully booked 50 dates on the app)
- Buy Now option
- User 1's profile goes through a verification process before going live on the app (face verification, passport, license, social media, net worth)
- User 1 establishes a profile with photos and a funds account (what do you do for work, like a LinkedIn profile, net worth, education)

Privacy preferences to stay private
Badges show that he has been verified by the app (Verified LinkedIn, Twitter, etc.)
Receive User 1's preferences
Receive User 2's preferences
Show user 1 in a shortened list of users available to match with user 2
Show user 2 in the shortened list of users available to match with user 1
User 1 and User 2 match based on User 1 liking or sending a message to User 2 and/or User 2 liking or sending a message to User 1
User 2 establishes availability in the calendar (availability may include at least one date and time)
Sharing preferences may be public or private
No open availability (too many messages are being exchanged to figure out the time of the meeting)
User 1 selects the available time
Notification is sent to both User 1 and User 2
The scheduled date shows up on the homepage of both User 1 and User 2
User 2 selects a location based on preferences established by at least User 1 or User 2
User 1 approves the location Machine learning and artificial intelligence: The system incorporates machine learning and artificial intelligence techniques to optimize the integration process. In some embodiments, the system may be learned from user behavior, preferences, and past events to make more accurate predictions and recommendations. The system may also adapt to changing user needs and preferences in some embodiments.

Manual input: Users may manually input events and tasks into the system, either through a web user interface or a mobile application. Users may specify the calendar to which they wish to add the event or task and any additional details such as location, duration, and notes.

Automatic input: The system may automatically input events and tasks from various sources, including emails, messages, social media, and other applications. In some embodiments, the system may detect and extract relevant information, such as event title, date, time, and location, and add it to the appropriate calendar.

Calendar detection: The system is adaptable to various calendars, including Google Calendar, Outlook Calendar, Apple Calendar, and other popular calendars. In some embodiments, the system may automatically detect the user's calendar preferences and suggest appropriate integrations.

Event and task merging: The system may automatically detect and merge overlapping events and tasks from multiple calendars. In some embodiments, the system may also suggest alternative times or locations for events to avoid conflicts.

User interface: The system may include a user interface allowing users to view and manage their integrated calendars. Users may view their calendars in various formats, such as day, week, or month views. Users may filter events and tasks by calendar, category, or keyword.

Security and privacy: The system employs industry-standard security measures to protect user data and ensure privacy. Users may specify the access level they wish to grant the system, which may be revoked anytime.

In some embodiments, the calendar integration system may receive input from which may include but not be limited to (e.g., users, persons, automatically, outside information, 3rd party information, voice commands, etc.) either through, which may include but not limited to (e.g., manual or automatic, or machine learning, or computer, or robotics, or 3rd party chosen, or entity-chosen means, or any other means, etc.) In some embodiments, the system may apply machine learning or artificial intelligence techniques to optimize the 'integration process,' which may include but not be limited to (e.g., event merging, event management, task merging, alternative time and location suggestions, alternate plans, suggestions for plans, solutions, etc.) In some embodiments, the system may present the integrated calendars to the user through a user interface, allowing easy management and filtering. In some embodiments, the system may maintain security and privacy measures to protect user data.

Scheduling computing operations: The system uses advanced scheduling computing operations to identify conflicts and suggest alternative dates and times. In some embodiments, the computing operations may consider a wide range of factors such as location, availability, and priority.

Machine learning and artificial intelligence: The system incorporates machine learning and artificial intelligence techniques to optimize the scheduling process. In some embodiments, the system may be learned from user behavior, preferences, and past conflicts to make more accurate suggestions and recommendations over time. The system may also adapt to changing user needs and preferences in some embodiments.

Notifications and suggestions: The system may provide notifications and suggestions to users based on their preferences and behavior. For example, the system may remind users of upcoming events or suggest alternative dates and times for conflicting events. In some embodiments, the system may prioritize notifications and suggestions based on the user's importance or relevance.

User interface: The system may include a user interface allowing users to view and manage calendars. Users may view their schedule, receive notifications and suggestions, and update their availability and preferences Matching computing operations: The system may use advanced matching computing operations to suggest compatible matches based on a wide range of criteria, which may include but are not limited to age, location, interests, education, occupation, and lifestyle.

Machine learning and artificial intelligence: The system utilizes machine learning techniques to optimize the matching process. In some embodiments, the system may be learned from user behavior, preferences, and past matches to make more accurate suggestions and recommendations over time. The system may also adapt to changing user needs and preferences in some embodiments.

Manual input: Users may manually input their preferences and criteria into the system, either through a web user interface or a mobile application. Users may specify the type of relationship they are looking for and any additional details such as height, body type, and personality traits.

Tracking and data analysis: The system tracks user behavior and interactions to understand user preferences better and improve the matching process. The system may analyze data such as message content, response times, and user ratings in some embodiments to suggest more accurate matches.

User interface: The system may include a user interface allowing users to view and manage their matches. Users may view profiles and photos of potential matches, send messages, and express interest. Users may filter matches by various criteria, such as location, age, and interests.

Security and privacy: The system employs industry-standard security measures to protect user data and ensure privacy. Users may specify the access level they wish to grant the system, which may be revoked at any time.

In some embodiments, an operation or platform may receive user input through manual or automatic, machine learning, computer, robotics, 3rd party chosen, or entity-chosen means. In some embodiments, the system may include but not be limited to (e.g., apply advanced matching computing operations or machine learning techniques to suggest compatible matches based on a wide range of criteria, etc.) In some embodiments, the system may track user behavior and interactions to understand user preferences better and improve the matching process over time or collect more data, better data, etc.) In some embodiments, the system may present the suggested matches to the user through a user interface, allowing easy management, filtering, etc.) In some embodiments, the system may maintain security and privacy measures to protect user data.

In some embodiments, a link to meet in person is postable on any other social network (integrated, button posting, link to calendar, link to the profile, link to schedule date, etc.)

A method for using a timing network platform to modify or synchronize electronic timing data in a computing network, the method comprises:

Providing a computing network platform utilizable by computing users registered with the computing network platform;

providing a timing network platform utilizable by the computing users registered with the computing network platform, wherein the timing network platform is used to modify or synchronize electronic timing data;

establishing a computing connection between the computing network platform and the timing network platform;

determining, using one or more computing device processors, a first user accesses, using a first computing device associated with the first user, the computing network platform;

enabling, using one or more computing device processors, the first user to create a first user profile, wherein the first user profile comprises a first image or video, and wherein the first user profile is associated with a first location;

enabling, using one or more computing device processors, the first user to modify, using the timing network platform, first electronic timing data;

determining, using the one or more computing device processors, a second user accesses, using a second computing device associated with the second user, the computing network platform;

enabling, using one or more computing device processors, the second user to create a second user profile, wherein the second user profile comprises a second image or video and wherein the second user profile is associated with a second location;

enabling, using one or more computing device processors, the second user to modify, using the timing network platform, second electronic timing data, wherein the second electronic period comprises at least one open period;

executing, using one or more computing device processors, a first search operation based on one or more first search parameters, wherein the one or more first search parameters comprise a first location-based search parameter;

transmitting, using one or more computing device processors, at least one first search result to the first computing device of the first user, wherein at least one first search result comprises at least a portion of the second user profile;

receiving, using one or more computing device processors, from the first computing device associated with the first user, a first request to view the second electronic timing data related to the second user;

transmitting, using one or more computing device processors, to the first computing device associated with the first user, at least a portion of the second electronic timing data, wherein at least the portion of the second electronic timing data comprises a first open time, wherein the first open or available time is presented in a first visual state;

receiving, using one or more computing device processors, from the first computing device associated with the first user, a second request to view at least the portion of the second user profile;

transmitting, using one or more computing device processors, to the first computing device associated with the first user, at least the portion of the second user profile;

receiving, using one or more computing device processors, from the first user, a request to close the first open time in the second electronic timing data;

determining the first open time does not conflict with a first closed time in the first electronic timing data, either before or after receiving the request to close the first open time in the second electronic timing data;

in response to the acceptance of the request to close the first open time:

closing, using one or more computing device processors, at a first time, the first open time in the second electronic timing data, thereby resulting in a first closed time in the second electronic timing data, wherein the first closed time is presented in a second visual state different from the first visual state, wherein the first closed time is associated with a second time, and synchronizing, using one or more computing device processors, the first electronic timing data with the second electronic timing data such that the second electronic timing data or the first electronic timing data is modified based on the first closed time, wherein the first closed time is presented in the second visual state or a third visual state in the second electronic timing data; and transmitting, using one or more computing device processors, a first notification associated with the first closed time in the second electronic timing data to the second user or the second computing device;

transmitting, using one or more computing device processors, a second notification associated with the first closed time in the first electronic timing data or in the second electronic timing data to the first user or the first computing device;

determining, using one or more computing device processors, a third user accesses, using a third computing device associated with the third user, the computing network platform;

enabling, using one or more computing device processors, the third user to create a third user profile, wherein the third user profile comprises a third image and wherein the third user profile is associated with a third location;

executing, using one or more computing device processors, a second search operation based on one or more second search parameters, wherein the one or more second search parameters comprise a second location-based search parameter;

transmitting, using one or more computing device processors, at least one-second search result to the third computing device of the third user, wherein the at least one-second search result comprises at least the portion of the second user profile;

receiving, using one or more computing device processors, from the third computing device associated with the third user, a third request to view at least the portion of the second user profile;

transmitting, using one or more computing device processors, to the third computing device associated with the third user, at least the portion of the second user profile;

receiving, using one or more computing device processors, at a third time different from the first time and the second time, from the third computing device associated with the third user, a fourth request to view the second electronic timing data;

transmitting, using one or more computing device processors, to the first computing device associated with the first user, at least a portion of the second electronic timing data, wherein at least the portion of the second electronic timing data comprises the first closed time, wherein the first closed time is presented in the second visual state, the third visual state, or a fourth visual state; and providing, using one or more computing device processors, an option for the second user, and not for the third user, to modify, during a modification period, the first closed time in the second electronic timing data;

transmitting or enabling access to, using one or more computing device processors, to the second user, a first condition associated with the first closed time;

transmitting or allowing access to, using one or more computing device processors, to the first user, a second condition associated with a first notification period following the first closed time;

determining, using one or more computing device processors, during the first notification period during or following the first closed time, whether a notification is received from the first user, the notification indicating that the first condition of the first closed time was not satisfied; and in response to not receiving the notification during the first notification period, executing a conclusive computing operation using one or more computing device processors.

A method for using a timing network application to modify or synchronize electronic timing data in a computing network, the method comprises:

Providing a computing network utilizable by computing users registered with the communication network platform;

providing a timing network application utilizable by the computing users registered with the computing network platform, wherein the timing network platform is used to modify electronic timing data;

establishing a computing connection between the computing network and the timing network platform;

determining, using one or more computing device processors, a first user accesses, using a first computing device associated with the first user, the computing network platform;

enabling, using one or more computing device processors, the first user to create a first user profile, wherein the first user profile comprises a first image or video, and wherein the first user profile is associated with a first location;

enabling, using one or more computing device processors, the first user to modify, using the timing network platform, first electronic timing data;

determining, using the one or more computing device processors, a second user accesses, using a second computing device associated with the second user, the computing network platform;

enabling, using one or more computing device processors, the second user to create a second user profile, wherein the second user profile comprises a second image or video and wherein the second user profile is associated with a second location;

enabling, using one or more computing device processors, the second user to modify, using the timing network platform, second electronic timing data, wherein the second electronic period comprises at least one open period;

executing, using one or more computing device processors, a first search operation based on one or more first search parameters, wherein the one or more first search parameters comprise a first location-based search parameter;

transmitting, using one or more computing device processors, at least one first search result to the first computing device of the first user, wherein at least one first search result comprises at least a portion of the second user profile;

receiving, using one or more computing device processors, from the first computing device associated with the first user, a first request to view the second electronic timing data associated with the second user;

transmitting, using one or more computing device processors, to the first computing device associated with the first user, at least a portion of the second electronic timing data, wherein at least the portion of the second electronic timing data comprises a first open time, wherein the first open time is presented in a first visual state;

receiving, using one or more computing device processors, from the first computing device associated with the first user, a second request to view at least the portion of the second user profile;

transmitting, using one or more computing device processors, to the first computing device associated with the first user, at least the portion of the second user profile;

receiving, using one or more computing device processors, from the first user, a request to close the first open time in the second electronic timing data;

in response to the acceptance of the request to close the first open time:

closing, using one or more computing device processors, at a first time, the first open time in the second electronic timing data, thereby resulting in a first closed time in the second electronic timing data, wherein the first closed time is presented in a second visual state different from the first visual state, wherein the first closed time is associated with a second time, and modifying, using one or more computing device processors, the first electronic timing data such that the first closed time is presented in the second visual state or a third visual state; and transmitting, using one or more computing device processors, a first notification associated with the first closed time in the second electronic timing data to the second user or the second computing device;

transmitting, using one or more computing device processors, a second notification associated with the first closed time in the first electronic timing data or in the second electronic timing data to the first user or the first computing device;

determining, using one or more computing device processors, a third user accesses, using a third computing device associated with the third user, the computing network platform;

enabling, using one or more computing device processors, the third user to create a third user profile, wherein the third user profile comprises a third image and wherein the third user profile is associated with a third location;

executing, using one or more computing device processors, a second search operation based on one or more second search parameters, wherein the one or more second search parameters comprise a second location-based search parameter;

transmitting, using one or more computing device processors, at least one second search result to the third computing device of the third user, wherein the at least one second search result comprises at least the portion of the second user profile;

receiving, using one or more computing device processors, from the third computing device associated with the third user, a third request to view at least the portion of the second user profile;

transmitting, using one or more computing device processors, to the third computing device associated with the third user, at least the portion of the second user profile;

receiving, using one or more computing device processors, at a third time different from the first time and the second time, from the third computing device associated with the third user, a fourth request to view the second electronic timing data;

transmitting, using one or more computing device processors, to the first computing device associated with the first user, at least the portion of the second electronic timing data or at least a second portion of the second electronic timing data, wherein at least the portion of the second electronic timing data or the at least the second portion of the second electronic timing data comprises the first closed time, wherein the first closed time is presented in the second visual state or a fourth visual state; and providing, using one or more computing device processors, an option for the second user, and not for the third user, to modify, during a modification period, the first closed time in the second electronic timing data;

transmitting, using one or more computing device processors, a condition associated with the first closed time;

determining, during a first notification period after the first closed whether, whether a notification is received from the first user, the notification indicating that the condition of the first closed time was not satisfied; and in response to receiving the notification during the first notification period, enabling access to a log associated with the first closed time, wherein the log comprises the first data associated with the first closed time or second data associated with the second user.

A method for using a timing network platform to modify electronic timing data in a computing network, the method comprises:

Providing a communication network platform utilizable by computing users registered with the communication network platform;

providing a timing network platform utilizable by the computing users registered with the communication network platform, wherein the timing network platform is used to modify electronic timing data;

establishing a computing connection between the communication network platform and the timing network platform;

determining, using one or more computing device processors, a first user accesses, using a first computing device associated with the first user, the computing network platform;

enabling, using one or more computing device processors, the first user to create a first user profile, wherein the first user profile comprises a first image or video, and wherein the first user profile is associated with a first location;

enabling, using one or more computing device processors, the first user to modify, using the timing network platform, first electronic timing data;

determining, using the one or more computing device processors, a second user accesses, using a second computing device associated with the second user, the computing network platform;

enabling, using one or more computing device processors, the second user to create a second user profile, wherein the second user profile comprises a second image or video and wherein the second user profile is associated with a second location;

enabling, using one or more computing device processors, the second user to modify, using the timing network platform, second electronic timing data, wherein the second electronic period comprises at least one open period;

executing, using one or more computing device processors, a first search operation based on one or more first search parameters, wherein the one or more first search parameters comprise a first location-based search parameter and a first age-based search parameter;

transmitting, using one or more computing device processors, at least one first search result to the first computing device of the first user, wherein at least one first search result comprises at least a portion of the second user profile;

receiving, using one or more computing device processors, from the first computing device associated with the first user, a first approval action associated with the second user profile;

executing, using one or more computing device processors, a second search operation based on one or more first search parameters, wherein the one or more second search parameters comprise a second location-based search parameter and a second age-based search parameter;

transmitting, using the one or more computing device processors, at least one second search result to the second computing device of the second user, wherein the at least one second search result comprises at least a portion of the first user profile;

receiving, using one or more computing device processors, from the second computing device associated with the second user, a second approval action associated with the first user profile;

receiving, using one or more computing device processors, from the first computing device associated with the first user, a first selection to view the second electronic timing data associated with the second user;

transmitting, using one or more computing device processors, to the first computing device associated with the first user, at least the portion of the second electronic timing data, wherein at least the portion of the second electronic timing data comprises a first open time, wherein the first open time is presented in a first visual state;

receiving, using one or more computing device processors, from the first computing device associated with the first user, a second selection to view at least the portion of the second user profile;

transmitting, using one or more computing device processors, to the first computing device associated with the first user, at least the portion of the second user profile;

receiving, using one or more computing device processors, from the first user, a request to close the first open time in the second electronic timing data;

determining the first open time does not conflict with a first closed time in the first electronic timing data, either before or after receiving the request to close the first open time in the second electronic timing data;

in response to the acceptance of the request to close the first open time:

closing, using one or more computing device processors, at a first time, the first open time in the second electronic timing data, thereby resulting in a first closed time in the second electronic timing data, wherein the first closed time is presented in a second visual state different from the first visual state, wherein the first closed time is associated with a second time, and modifying, using one or more computing device processors, the first electronic timing data such that the first closed time is presented in the second visual state or a third visual state; and transmitting, using one or more computing device processors, a first notification associated with the first closed time in the second electronic timing data to the second user or the second computing device;

transmitting, using one or more computing device processors, a second notification associated with the first closed time in the first electronic timing data or in the second electronic timing data to the first user or the first computing device;

determining, using one or more computing device processors, a third user accesses, using a third computing device associated with the third user, the computing network platform;

enabling, using one or more computing device processors, the third user to create a third user profile, wherein the third user profile comprises a third image and wherein the third user profile is associated with a third location;

executing, using one or more computing device processors, a third search operation based on one or more second search parameters, wherein the one or more third search parameters comprise a third location-based search parameter and a third age-based search parameter;

transmitting, using one or more computing device processors, at least one-third of the search result to the third computing device of the third user, wherein at least one-third of the search result comprises at least the portion of the second user profile;

receiving, using one or more computing device processors, from the third computing device associated with the third user, a third request to view at least the portion of the second user profile;

transmitting, using one or more computing device processors, to the third computing device associated with the third user, at least the portion of the second user profile;

receiving, using one or more computing device processors, at a third time different from the first time and the second time, from the third computing device associated with [01353] the third user, a fourth request to view the second electronic timing data;

transmitting, using one or more computing device processors, to the first computing device associated with the first user, at least a portion of the second electronic timing data or at least a second portion of the second electronic timing data, wherein at least the portion of the second electronic timing data or at least the second portion of the second electronic timing data comprises the first closed time, wherein the first closed time is presented in the second visual state or a fourth visual state; and providing, using one or more computing device processors, an option for the second user, and not for the third user, to modify, during a modification period, the first closed time in the second electronic timing data.

A method for using a timing network platform to modify electronic timing data in a computing network, the method comprises:

Providing a computing network utilizable by computing users registered with the computing network platform;

providing a timing network application utilizable by the computing users registered with the computing network platform, wherein the timing network application is used to modify or synchronize electronic timing data;

establishing a computing connection between the computing network platform and the timing network platform;

determining, using one or more computing device processors, a first user accesses, using a first computing device associated with the first user, the computing network platform;

enabling, using one or more computing device processors, the first user to create a first user profile, wherein the first user profile comprises a first image or video, and wherein the first user profile is associated with a first location;

determining, using the one or more computing device processors, a second user accesses, using a second computing device associated with the second user, the computing network platform;

enabling, using one or more computing device processors, the second user to create a second user profile, wherein the second user profile comprises a second image or video and wherein the second user profile is associated with a second location;

enabling, using one or more computing device processors, the second user to modify, using the timing network platform, first electronic timing data, wherein the first electronic timing data comprises the first open time;

receiving, using one or more computing device processors, from the second user, a first electronic exchangeable transmission amount associated with closing the first open time;

executing, using one or more computing device processors, a first search operation based on one or more first search parameters, wherein the one or more first search parameters comprise a first location-based search parameter;

transmitting, using one or more computing device processors, at least one first search result to the first computing device of the first user, wherein at least one first search result comprises at least a portion of the second user profile;

receiving, using one or more computing device processors, from the first computing device associated with the first user, a first request to view the first electronic timing data associated with the second user;

transmitting, using one or more computing device processors, to the first computing device associated with the first user, the at least the portion of the first electronic timing data, wherein at least the portion of the first electronic timing data comprises the first open time, wherein the first open time is presented in a first visual state, and wherein the first electronic exchangeable transmission amount is displayed in or as being associated with the first open time;

receiving, using one or more computing device processors, from the first computing device associated with the first user, a second request to view at least the portion of the second user profile;

transmitting, using one or more computing device processors, to the first computing device associated with the first user, at least the portion of the second user profile;

receiving, using one or more computing device processors, from the first user, a request to close the first open time in the first electronic timing data;

executing a preliminary computing operation for initiating transmission of the first electronic exchangeable transmission amount;

transmitting verification data associated with the first electronic exchangeable transmission amount to a processing server;

receiving, from the processing server, an indication that the preliminary computing operation is successfully executed;

in response to the successful execution of the preliminary computing operation:

closing, using one or more computing device processors, at a first time, the first open time in the first electronic timing data, thereby resulting in a first closed time in the first electronic timing data, wherein the first closed time is presented in a second visual state different from the first visual state, wherein the first closed time is associated with or is a second time; and transmitting, using one or more computing device processors, a first notification associated with the first closed time in the first electronic timing data to the second user or the second computing device;

transmitting, using one or more computing device processors, a second notification associated with the first closed time in the first electronic timing data to the first user or the first computing device;

determining, using one or more computing device processors, a third user accesses, using a third computing device associated with the third user, the computing network platform;

enabling, using one or more computing device processors, the third user to create a third user profile, wherein the third user profile comprises a third image and wherein the third user profile is associated with a third location;

executing, using one or more computing device processors, a second search operation based on one or more second search parameters, wherein the one or more second search parameters comprise a second location-based search parameter;

transmitting, using one or more computing device processors, at least one second search result to the third computing device of the third user, wherein the at least one second search result comprises at least the portion of the second user profile;

receiving, using one or more computing device processors, from the third computing device associated with the third user, a third request to view at least the portion of the second user profile;

transmitting, using one or more computing device processors, to the third computing device associated with the third user, at least the portion of the second user profile;

receiving, using one or more computing device processors, at a third time different from the first time and the second time, from the third computing device associated with the third user, a fourth request to view the first electronic timing data;

transmitting, using one or more computing device processors, to the first computing device associated with the first user, at least a portion of the first electronic timing data or at least a second portion of the first electronic timing data, wherein at least the portion of the first electronic timing data or the at least the second portion of the first electronic timing data comprises the first closed time, wherein the first closed time is presented in the second visual state or a third visual state; and providing, using one or more computing device processors, an option for the second user, and not for the third user, to modify, during a modification period, the first closed time in the first electronic timing data;

transmitting or enabling access to, using one or more computing device processors, to the second user, a first condition associated with the first closed time;

transmitting or enabling access to, using one or more computing device processors, to the first user, a second condition associated with a first notification period during or following the first closed time;

determining, using one or more computing device processors, during the first notification period whether, whether a notification is received from the first user, the notification indicating that the first condition of the first closed time was not satisfied; and in response to not receiving the notification during the first notification period, executing, using one or more computing device processors, a conclusive computing operation.

A method for use in a computing network, the method comprising:

providing a computing network utilizable by computing users registered with the computing network platform;

establishing a computing connection between the computing network platform and the timing network platform;

determining, using one or more computing device processors, a first user accesses, using a first computing device associated with the first user, the computing network platform;

enabling, using one or more computing device processors, the first user to create a first user profile, wherein the first user profile comprises a first image or video, and wherein the first user profile is associated with a first location;

determining, using the one or more computing device processors, a second user accesses, using a second computing device associated with the second user, the computing network platform;

enabling, using one or more computing device processors, the second user to create a second user profile, wherein the second user profile comprises a second image or video and wherein the second user profile is associated with a second location;

executing, using one or more computing device processors, a first search operation based on one or more first search parameters, wherein the one or more first search parameters comprise a first location-based search parameter;

transmitting, using one or more computing device processors, at least one first search result to the first computing device of the first user, wherein at least one first search result comprises at least a first portion of the second user profile;

receiving, from the first user or the second user, a first time;

enabling the first user or the second user to set a first electronic exchangeable amount associated with the first time;

receiving, using one or more computing device processors, from the first computing device associated with the first user, a selection to view at least a first portion of the second user profile;

transmitting, using one or more computing device processors, to the first computing device associated with the first user, at least the first portion of the second user profile;

executing a preliminary computing operation for initiating transmission of the first electronic exchangeable transmission amount;

transmitting verification data associated with the first electronic exchangeable transmission amount to a processing server;

receiving, from the processing server, an indication that the preliminary computing operation is successfully executed;

holding the first electronic exchangeable transmission amount in a platform account;

transmitting, using one or more computing device processors, a first notification, associated with the first time, to the second user or the second computing device;

transmitting, using one or more computing device processors, a second notification, associated with the first time, to the first user or the first computing device;

transmitting or enabling access to, using one or more computing device processors, to the second user, a first condition associated with the first time;

transmitting or enabling access to, using the one or more computing device processors, to the first user, a second condition associated with at least one of a first notification period or the first time;

determining, using one or more computing device processors, during the first notification period whether, whether a notification is received from the first user, the notification indicating that the first condition of the first time was not satisfied; and in response to not receiving the notification during the first notification period, executing, using one or more computing device processors, a conclusive computing operation.

A method for using a timing network platform to modify or synchronize electronic timing data in a computing network, the method comprises:

Providing a computing network utilizable by computing users registered with the computing network platform;

providing a timing network application utilizable by the computing users registered with the computing network platform, wherein the timing network application is used to modify or synchronize electronic timing data;

establishing a computing connection between the computing network platform and the timing network platform;

determining, using one or more computing device processors, a first user accesses, using a first computing device associated with the first user, the computing network platform;

enabling, using one or more computing device processors, the first user to create a first user profile, wherein the first user profile comprises a first image or video, and wherein the first user profile is associated with a first location;

determining, using the one or more computing device processors, a second user accesses, using a second computing device associated with the second user, the computing network platform;

enabling, using one or more computing device processors, the second user to create a second user profile, wherein the second user profile comprises a second image or video and wherein the second user profile is associated with a second location;

enabling, using one or more computing device processors, the second user to modify, using the timing network platform, first electronic timing data, wherein the first electronic timing data comprises the first open time;

receiving, using one or more computing device processors, from the second user, a first electronic exchangeable transmission amount associated with closing the first open time;

executing, using one or more computing device processors, a first search operation based on one or more first search parameters, wherein the one or more first search parameters comprise a first location-based search parameter;

transmitting, using one or more computing device processors, at least one first search result to the first computing device of the first user, wherein at least one first search result comprises at least a portion of the second user profile;

transmitting, using one or more computing device processors, to the first computing device associated with the first user, the first open time comprised in the first electronic timing data, wherein the first electronic exchangeable transmission amount is displayed in or as being associated with the first open time;

receiving, using one or more computing device processors, from the first computing device associated with the first user, a selection to view at least a second portion of the second user profile;

transmitting, using one or more computing device processors, to the first computing device associated with the first user, at least the second portion of the second user profile;

receiving, using one or more computing device processors, from the first user, a request to close the first open time in the first electronic timing data;

executing a preliminary computing operation for initiating transmission of the first electronic exchangeable transmission amount;

transmitting verification data associated with the first electronic transmittables transmission amount to a processing server;

receiving, from the processing server, an indication that the preliminary computing operation is successfully executed;

in response to the successful execution of the preliminary computing operation:

closing, using one or more computing device processors, at a first time, the first open time in the first electronic timing data, thereby resulting in a first closed time in the first electronic timing data, wherein the first closed time is associated with or is a second time after the first time;

transmitting, using the one or more computing device processors, a first notification, associated with the first closed time in the first electronic timing data, to the second user or the second computing device;

transmitting, using the one or more computing device processors, a second notification, associated with the first closed time in the first electronic timing data, to the first user or the first computing device;

providing, using the one or more computing device processors, an option for the second user, to modify, during a modification period, the first closed time in the first electronic timing data;

transmitting or enabling access to, using the one or more computing device processors, to the second user, a first condition associated with the first closed time;

transmitting or enabling access to, using the one or more computing device processors, to the first user, a second condition associated with at least one of a first notification period or the first closed time;

determining, using the one or more computing device processors, during the first notification period whether, whether a notification is received from the first user, the notification indicating that the first condition of the first closed time was not satisfied; and in response to not receiving the notification during the first notification period, executing, using the one or more computing device processors, a conclusive computing operation.

The method, wherein the one or more data comprises content; a photo; a video; a selecting, clicking, searching, or computing activity on the computing network; a selecting, clicking, searching, or computing activity outside the computing network; a selecting, clicking, searching, or computing activity on a searching or social media platform or network; a rating; a comment; a term or condition of usage of the computing network; a law, rule, or regular or a jurisdiction in which the computing network is being used; an amount of electronic transmittables;

The method, further comprising, executing at least one of a computing operation, an intelligent computing operation, or a machine or model learning computing operation based on at least of: user content, a photo, a video, a clicking or selecting activity on platform, an activity outside platform (Google or Bing searches, questions on search bars, other 3rd party sites), ratings from other users, comments from other users, terms, conditions, rules, regulations, laws of the country, laws of the city, laws of the state, local laws, contracts between users, price data, price change data, user's personal information (name, location, distance, tax information, stock information, real estate information, paycheck information etc.) user history on site/platform/application, (what type of activities (watching lives, liking content, sending messages, booking dates, looking at calendars, unlocking photos, subscribing to photos etc), types of posted content, frequency of posted content, events, messages history, mass messaging, types of messages, amount of money earned, amount of money spent, whether 3 party integrations are used (selling stocks through integrated 3rd parties, selling jewelry to fund account, ordered outside 3rd party items such as food delivery or taxi services and the amount spent on those 3rd party integrations etc.) how many or identity of followers, how many or identity of subscribers, background checks, personal information, outside personal information that is public and accessible to computers, types of messages sent (requesting customs, requesting feet pictures, asking silly questions, etc.) payment history, date history, how long been on platform, how many recruited members/users, referrals, amount paid by platform, bonuses, membership status, membership history, previous terms and conditions, current terms and conditions, new regulations, new changes to platform, new rules to follow versus old rules, any term changes, information for how a date should be done such as (flowers, niceness, questions to ask on a date, rules to follow, protocol, etc), laws, history with platform such as any special photoshoots/recognitions such as (badges, earnings recognitions, VIP status) etc, History of data collection from dates such as (location, distance, driving history, time, place, location, rules of date, legal agreements, agreements, signed information, etc.) prices changes, price comparisons, market prices for time/dates, women's history, women's safety information, safety protocols, psychology related to platform, psychological data, non-profit resources, training information, legal information such as laws, frequency viewing content and what type of content and activity related to content or platform viewing, facial recognition, whether beauty apps have been used, whether content has been manipulated, metadata on content, metadata on photos/videos, timestamps, listening to voice commands and analyzing data for ads, assistance, questions, solutions, hearing, imported data, typed data, or viewing any 'potential advertisement analyzing information' (information needed or suggested to suggest advertisements) such as (needing hair extensions, needing to get hair done, needing to get a new credit card, or wanting a credit line, etc), location of date, date business history locations and or frequencies, nearby cities, nearby locations, favorite beauty items, beauty items used, work history, work-related information, information about date, content regarding date such as (shopping) so pictures of shopping, or pictures of the user created with AI going shopping, stock photos, stock videos, stock content, stock content that is related to relationships/romance/persons, stock content that is related to date, stock content that is related to activity, stock content that is related to location, business content, outside persons, outside 3rd parties, outside entities, movies, love stories, books, outside work schedule, work routine, time available during day, each hour of day, each minute of day, sleeping schedule, sleeping pattern, debt amount, credit amount, outside credit, outstanding credit, payment installments, history of date types, history of date information, users private comments about user, users public comments about user, bulletins, community boards, posted content, platform content, dating history of dater, level of dating experience of dater, work history, school history, location history, work schedule, outside work schedule, goals, wishes, wants, needs, suggestions, likes, etc.) In some embodiments, the data additionally or alternatively includes any other data described in this disclosure. In some embodiments, a training model is provided. A computing device/application may be trained using the above-described data and/or other data from the Internet to produce any of the displayable data to users described herein.

One or more apparatuses comprising one or more computing device processors; and one or more memory systems comprising code, executable by the one or more computing device processors, and configured to: execute any of the methods described or claimed herein. The one or more apparatuses may comprise or be comprised in at least one of one or more servers, a first computing device associated with a first user, or a second computing device associated with a second user. At least two of the one or more servers, the first computing device, and the second computing device may be located in geographically distinct or disparate locations. At least two of the one or more servers, the first computing device, and the second computing device may be disparate from each other (e.g., different types of computing devices, and/or in different locations, etc.) In some embodiments, an application provisioning server may be provided to store an application comprising code for at least partially executing the various methods described or claimed herein, in coordination with one or more servers or other computing devices. The application comprising code is downloadable by computing devices of users. In some embodiments, a first application comprising first code may be stored on an application provisioning server associated with a first operating system. In some embodiments, a second application comprising second code may be stored on an application provisioning server associated with a second operating system. In some embodiments, a first computing device (associated with a first user) running a first operating system downloads the application stored on the first application provisioning server. In some embodiments, a second computing device (associated with a second user) running a second operating system downloads the application stored on the second application provisioning server. In some embodiments, the first user and the second user are part of the computing network described herein and are able to interact with each other (e.g., the first user is enabled to create a profile, close an open time in the second user's timing data or the first user is enabled to bid for an amount to close the open time in the second user's timing data, the first and second user are enabled to interact with each other using any of the methods described herein, the second user is enabled to create a profile and is enabled to indicate an open time in the second user's electronic timing data, etc.) In some embodiments, a user on the network is accessing a mobile application/website on a mobile Internet browser (or a laptop/tablet/desktop Internet browser) and does not need to download an application from an application provisioning server. This user is part of the computing network described herein and is able to interact with the first user and/or the second user as well, and perform any of the functions described as being performed by the first user and/or the second user. In some embodiments, the first user and/or the second user may additionally or alternatively access the application/website on a mobile Internet browser (or a laptop/tablet/desktop Internet browser) to perform any of the methods or functions described herein.

A non-transitory computer-readable medium comprising code for causing one or more computing device processors to execute any of the methods described or claimed herein.

A method for using a timing network platform to modify or synchronize electronic timing data in a computing network, the method comprising:

providing a computing network utilizable by computing users registered with the computing network platform;

providing a timing network application utilizable by the computing users registered with the computing network platform, wherein the timing network application is used to modify or synchronize electronic timing data;

establishing a computing connection between the computing network platform and the timing network platform;

determining, using one or more computing device processors, a first user accesses, using a first computing device associated with the first user, the computing network platform;

enabling, using the one or more computing device processors, the first user to create a first user profile, wherein the first user profile comprises a first image or video, and wherein the first user profile is associated with a first location;

determining, using the one or more computing device processors, a second user accesses, using a second computing device associated with the second user, the computing network platform;

enabling, using the one or more computing device processors, the second user to create a second user profile, wherein the second user profile comprises a second image or video, and wherein the second user profile is associated with a second location;

enabling, using the one or more computing device processors, the second user to modify, using the timing network platform, first electronic timing data, wherein the first electronic timing data comprises the first open time;

receiving, using the one or more computing device processors, from the second user, a minimum electronic transmittables transmission amount associated with closing the first open time;

establishing a first period associated with closing the first open time, wherein the first period expires a duration prior to the first open time, and wherein the period or the duration is set automatically or by the second user;

executing, using the one or more computing device processors, a first search operation, based on one or more first search parameters, wherein the one or more first search parameters comprises a first location-based search parameter;

transmitting, using the one or more computing device processors, at least one first search result to the first computing device of the first user, wherein the at least one first search result comprises at least a portion of the second user profile;

transmitting, using the one or more computing device processors, to the first computing device associated with the first user, the first open time comprised in the first electronic timing data, wherein the first electronic transmittables transmission amount is displayed in or as being associated with the first open time;

receiving, using the one or more computing device processors, from the first computing device associated with the first user, a selection to view at least a second portion of the second user profile;

transmitting, using the one or more computing device processors, to the first computing device associated with the first user, the at least the second portion of the second user profile;

receiving, using the one or more computing device processors, from the first computing device associated with the first user, a first electronic transmittables amount greater than the minimum electronic transmittables amount;

initiating display, on a third computing device associated with a third user, of the first electronic transmittables amount and a first amount of time remaining to close the first open period;

receiving, using the one or more computing device processors, from the third computing device associated with the third user, a second electronic transmittables amount greater than the first electronic transmittables amount;

initiating display of the second electronic transmittables amount and a second duration of time remain to close the first open period;

upon expiration of the first period, executing a preliminary computing operation for initiating transmission of the second electronic transmittables transmission amount;

transmitting verification data associated with the second electronic transmittables transmission amount to a processing server;

receiving, from the processing server, an indication that the preliminary computing operation is successfully executed;

in response to successful execution of the preliminary computing operation:

closing, using the one or more computing device processors, at a first time, the first open time in the first electronic timing data, thereby resulting in a first closed time in the first electronic timing data, wherein the first closed time is associated with or is a second time after the first time;

transmitting, using the one or more computing device processors, a first notification, associated with the first closed time in the first electronic timing data, to the second user or the second computing device;

transmitting, using the one or more computing device processors, a second notification, associated with the first closed time in the first electronic timing data, to the third user or the third computing device;

providing, using the one or more computing device processors, an option for the second user, to modify, during a modification period, the first closed time in the first electronic timing data;

transmitting or enabling access to, using the one or more computing device processors, to the second user or the second computing device, a first condition associated with the first closed time;

transmitting or enabling access to, using the one or more computing device processors, to the third user or the third computing device, a second condition associated with at least one of a first notification period or the first closed time;

determining, using the one or more computing device processors, during the first notification period whether, whether a notification is received from the first user, the notification indicating that the first condition of the first closed time was not satisfied; and in response to not receiving the notification during the first notification period, executing, using the one or more computing device processors, a conclusive computing operation.

In some embodiments, a user may post a live or recorded stream from a data (e.g., video date or in-person data) associated with a closed period. The percentage amount of electronic transmittables transmitted to the user may be adjusted or increased based on the posting of or views associated with this stream. Additionally, the stream can be posted to a third-party social network. The stream can be associated with and may be posted as content on the user's profile on the computing network In some embodiments, the platform enables a first user to send a gift to the second user in exchange for a date (e.g., in-person date, virtual date, connection, meeting, discussion, negotiation for a relationship, relationship communication, courting, discussion, time, dating, date, etc.). In some embodiments, the gift is listed in a wish list established by the second user.

In some embodiments, the second user establishes an amount associated with an open time. Additionally, a reserve amount (not visible to the first user) may be established by the second user. Accordingly, bids for a date may start at a first amount, but the open time may only be closed if the final bid (winning big) during the bidding period is equal to or greater than the reserve amount.

In some embodiments, the gift is associated with an item indicator. The gift may include one or more of a nail salon appointment, makeup items, a vacation voucher, hair/makeup coupon/gift card/voucher, pre-paid pet, plane/hotel ticket, groceries, lunch/dinner voucher/prepayment/(through third-party food-delivery apps), taxi service voucher/prepayment, e-commerce voucher/gift card. The amount associated with the item indicator may or may not be revealed to the first user. To close the open period associated with the item indicator in the second user's electronic timing data, the first user may submit a bid amount greater than the current bid amount, submit a buy-it-now amount (which will end the bidding process), or transmit an amount equal to or greater than the amount associated with the item indicator.

In some embodiments, the various operations described herein may capture data (e.g., age, demographics, data used, looks, etc.). The data may be used by a machine learning/artificial intelligence operation to determine (e.g., change/fluctuate prices of dates, availability on the calendar, features available to specific users, users available for dates, bids available for specific users, etc.). As an example, the suggested price for a date with a particular user may be based on the number of profile hits or views associated with the user during a period, the number of bids for dates with the user during a period, the number of tips or gifts received by the user, the number of users in a particular location, etc.

In some embodiments, (e.g., collected data by any computing system described herein, inputted data, AI-analyzed data, data, etc.) may include but not be limited to (e.g., age range, age, demographics, net worth, amount spent, funds in account, frequencies of dates, booked dates, virtual dates, in-person dates, user activity history, history of dates, user preferences, computing operation data, amount of money spent, frequencies of dates, time spent on platform, login frequencies, demographic data, physical looks, comments, content, availability, or features to show on profile based on age range, features, etc.) may be used to, which may include but not be limited to (e.g., automatically, manually, or AI-changed, or AI-determined, manually change, automatically change or etc.) which may include but not be limited to (e.g., fluctuate, adjust, determine, etc.) which may include but not be limited to (e.g., prices, location, availability, features, experience, options that are available, content being shown, etc.)

In some embodiments, a (e.g., dater, guy, user spending money, user looking for a date or a connection, user with credits, user with money, registered or non-registered user, etc.) searches for (e.g., models, creators, users looking to get paid or gifted gifts, celebrities, influencers, users, profiles, suggested profiles, girls, etc.) in (e.g., any city, any location, any distance, any search area, etc.); multiple (e.g., users, women, users looking to get paid or gifted gifts females, models, creators, etc.) are presented on the (e.g., dater, guy, user spending money, user looking for a date or a connection, a user with credits, a user with money, registered or non-registered user, etc.) interface. The (e.g., models, creators, celebrities, influencers, users, profiles, suggested profiles, users looking to get paid or gifted gifts, girls, etc.) on the (e.g., dater, guy, user spending money, user looking for a date or a connection, user with credits, user with money, registered or non-registered user, etc.) interface are arranged based on the following factors: the (e.g., models, creators, users looking to get paid or gifted gifts, celebrities, influencers, users, profiles, suggested profiles, girls, etc.) activity on the platform, the number of interactions the (e.g., models, creators, users looking to get paid or gifted gifts, celebrities, influencers, users, profiles, suggested profiles, girls, etc.) has received from (e.g., dater, guy, user spending money, user looking for a date or a connection, user with credits, user with money, registered or non-registered user, etc.), the number of (e.g., clicks, gifts, donations, dates, dollars, assets, money, tips, dates, bookings, etc.), the amount (e.g., models, creators, users looking to get paid or gifted gifts, celebrities, influencers, users, profiles, suggested profiles, girls, etc.) has earned from the platform or through the platform whether organically or by ads (pushed to the top of the search engine, suggested more, etc.) for any (e.g., models, creators, users looking to get paid or gifted gifts, celebrities, influencers, users, profiles, suggested profiles, girls, etc.) that may pay to be promoted at the top of the search engine per city or area or country.

A (e.g., dater, guy, user spending money, a user looking for a date or a connection, a user with credits, user with money, registered or non-registered user, etc.) can search for (e.g., models, creators, users looking to get paid or gifted gifts, celebrities, influencers, users, profiles, suggested profiles, girls, etc.) based on the following search parameters which may include but not be limited to: (e.g., location, distance from him, age, keywords, high school, city school, college, current company, looks, height, weight, race, other users they are connected to, friends, best friends, friends on platform, hobbies, religion, sexual identity, education, profession, model or no model, income, celebrity status, area they are from, what school they went to, movies or shows they've been in, reality stars, Instagram, models, TikTokers, YouTubers, number of followers, etc.)

In some embodiments, the electronic timing data for a second user may not automatically be visible to the first user. The first user may need to subscribe to the second user (e.g., which may, optionally, involve the transmission of electronic exchangeable from the first user to the second user), or the first user may need to transmit electronic exchangeable to the second user specifically to have access the second user's electronic timing data for a certain period or a certain number of views of the electronic timing data. In some embodiments, the electronic timing data may be presented in blurred form until the electronic transmittables are successfully transmitted.

In some embodiments, a user (e.g., a creator) may be assigned shares associated with the entity managing the computing network based on the number of successful dates (e.g., during a period). A portion of the shares may vest over a period of time. In some embodiments, any users may be provided an option to purchase shares based on a valuation assigned to the entity managing the computing network.

In some embodiments, there may be (e.g., user interfaces or areas, apps or computing systems, or screens or displays or holograms, etc.) that may act as a parent dating app for their (e.g., adult children or on behalf of their adult children or legal children or nephews or nieces or cousins or family members or close friends or long-term friends, or friends, etc.). In some embodiments, parents may be able to (e.g., post or show media, or market themselves and or their child, etc.) to (e.g., market them or connect them or to show them or to show off, or to network with, etc.) to other (e.g., families and or parents or dads or moms or adoptive parents, etc.) to (e.g., discuss or negotiate or pay for or arrange or offer, etc.) (e.g., marriage or arranged marriage, or unions, relationships, long term, lifetime and/or short term, etc.). In some embodiments, instead of in addition to a parent, an agency or relationship manager can search for partners on behalf of a user.

In some embodiments, the 'parent or guardian management system' in which the (e.g., 'product' or display, or person, etc.) is (e.g., 'single' or 'bachelor' or 'bachelorette' or open to relationships or open to a connection, etc.) In some embodiments, the parents or guardians or family relation manager or management team may obtain a (e.g., legal or otherwise agreement in writing or oral or writing or verified legally, with or without witnesses, etc.) on behalf of the (e.g., 'product' or 'display' or 'single person' or 'bachelor or 'bachelorette,' etc.) to represent them on the computing network.

In some embodiments, there may be (e.g., payment created or managed or paid through the computing system for legal marriage or documents or arrangement of payment or documents or agreements made and or arranged and or signed, and or through or sent to an attorney or power of attorney over the computing system through the system or 3rd party, etc.) over the (e.g., app, computing system, software, 3rd party integrations, etc.) In some embodiments, a valid legal marriage may be arranged or completed through the computing system whether involving a (e.g., power of attorney or attorney or state documentation, government, religion, or other humans, or robotics, or systems, or witnesses, or church, or other visible persons, etc.), or any other requirements required for a valid legal marriage associated with a jurisdiction. Accordingly, this disclosure provides steps for creating a valid legal marriage between two or more persons without a physical meeting, if the rules of the jurisdiction allow such a marriage. Any documents that need to be executed can be executed through a live document sharing/viewing function such that the participants to a video call can witness all other participants and the live execution of any documents on a display screen.

In some embodiments, the process includes but is not limited to sending an electronic document to the first person and/or all parties or two parties or every attending party that may be signed or agreed on verbally or shown or recorded as binding or agreeing to terms or reading terms or showing terms. In some embodiments, (e.g., terms or contracts or expectations, etc.) may be (e.g., discussed or agreed on, questions answered, terms hashed out, or agreements approved or approval on agreements, etc.) In some embodiments, there may be a (e.g., live video, virtual call, virtual display, shown display, shown call, display, etc.) In some embodiments, a document may be displayed for everyone or any party to see or for the record; the two parties or any parties to sign it, creating a binding marriage or arrangement or legal arrangement. In some embodiments, the documents are executed in the presence of a physical or virtual witness that the parties can see on the video call. In some embodiments, a (e.g., hologram of parties or a display, etc.) seemingly attending or shown or displayed in-person or virtual that may look like in-person or may be in-person showing or displaying, whether realistically in-person or virtual or through a hologram, display screen, or display or record, or recording. In some embodiments, a (legal or otherwise) (e.g., record or recording, etc.) may be sent to the (e.g., state, government, group, governing group, owner, management, etc.). In some embodiments, the terms for marriage and actions that need to be completed are based on the jurisdiction associated with one or more participants on the video call.

In some embodiments, any (e.g., users, persons, entities, public persons, etc.) may be able to donate or fund (E.g., family members, friends, sisters, brothers, aunts, uncles, relatives, stepchildren, stepsisters, best friends, acquaintances, etc.) of users on platform or software. In some embodiments, (e.g., users or persons or entities, or groups, etc.) may be able to (e.g., fund, donate, give money to, send gifts to, etc.) (e.g., other friends or family members of users on the platform or software or registered or non-registered users, etc.) for any reason such as a ‘fundraising campaign’ or a ‘tragic situation happening’ or a ‘vacation donation’ or ‘help me get a plane ticket’ or ‘help me find my lost dog’ or ‘my mom needs medical care’ or ‘send flowers to my sister’ or ‘send flowers for my new baby’ or ‘send gifts for my new baby’ or ‘send gifts for dad’ or ‘send gifts for my dog’s birthday’ or ‘help fund my sisters business’ or ‘help fund my business etc.) In some embodiments, (e.g., users, persons, entities, public persons, etc.) may be able to donate for any reason (E.g., money, gifts, time, resources, jobs, connections, networking, events, charity fundraisers, animals, employees, etc.) to any user at any time for any reason for example: without a (e.g., mutual exchange happening and or a contract being in place or signed or mutual agreements or mutual exchange or any type of exchange, etc.) In some embodiments, a one-way or one-sided (e.g., exchange or funding or gifting or sending or offering, etc.) may be (e.g., used or offered or submitted or asked for or requested, etc.), in which case no return or agreement has to be made to accept donations or contributions.

In some embodiments, the present disclosure introduces an innovative computing system designed to match individuals with various types of relationships, relationship roles, temporary relationships, temporary roles, and long-term relationships. This versatile system integrates a comprehensive database, user profiles, an computing operation-based matching system, and an application platform to simplify the process for individuals seeking meaningful connections that align with their preferences and criteria. In some embodiments, it is a robust database that meticulously categorizes relationships and relationship roles by type, duration, and characteristics. In some embodiments, Users can explore a diverse array of relationship opportunities, from temporary connections to long-term commitments and specific roles to broader relationship types. In some embodiments, This categorization ensures that users can efficiently identify connections and roles that align with their individual preferences and relationship goals. In some embodiments, User profiles serve as a central element of the system, allowing individuals to express their relationship preferences, qualifications, and criteria. In some embodiments, These profiles provide a comprehensive snapshot of users’ characteristics and what they seek in a relationship or role, whether short-term, long-term, temporary or involves specific role expectations. In some embodiments, an advanced computing operation-based matching system that employs sophisticated computing operations to suggest suitable relationships and roles based on user profiles and predefined criteria. In some embodiments, The matching process is designed to be precise, considering numerous factors to ensure that recommendations are highly relevant and aligned with users’ desires. In some embodiments, Machine learning capabilities are seamlessly integrated into the system, continuously enhancing the matching process by analyzing user interactions, feedback, and evolving criteria. In some embodiments, This dynamic approach ensures that matches and recommendations become increasingly tailored over time, ultimately leading to higher user satisfaction. In some embodiments, the system includes a verification mechanism to maintain the authenticity and accuracy of profiles and applications. In some embodiments, This mechanism validates user-provided information, such as characteristics, preferences, and criteria for relationships and roles, enhancing the reliability of profiles and applications. In some embodiments, The process of matching individuals with relationships and roles using this system involves accessing the categorized database, creating or updating user profiles, engaging the computing operation-based matching system, and applying for relationships or roles, creating personal connections, or accepting automatic recommendations directly through user profiles or specified preferences. In some embodiments, The system’s use of machine learning and verification mechanisms guarantees a smooth and reliable experience. In some embodiments, the computing system for matching individuals with various types of relationships, relationship roles, temporary relationships, temporary roles, and long-term relationships transforms the way people discover and pursue meaningful connections. In some embodiments, By combining a versatile database, user profiles, advanced computing operations, and application platforms, this system ensures that relationships and roles precisely match users’ preferences, qualifications, and criteria. In some embodiments, Machine learning and verification mechanisms enhance accuracy and reliability, making it a valuable tool for individuals seeking a wide range of meaningful connections.

In some embodiments, the present disclosure introduces an innovative computing system designed to match individuals with a wide range of opportunities, including temporary, long-term, or permanent jobs or gigs, as well as relationship roles or connections. In some embodiments, this comprehensive system integrates a versatile database, user profiles, an computing operation-based matching system, and an application platform to streamline the process for individuals seeking opportunities that align with their goals and criteria.

In some embodiments, the system’s foundation is a database that meticulously categorizes job listings, relationship roles, or connection opportunities based on duration and type. In some embodiments, this categorization ensures that users can efficiently identify opportunities that match their individual preferences and career aspirations. In some embodiments, User profiles serve as a central element of the system, enabling individuals to apply for jobs, roles, or relationships, create personal connections, or receive automatic recommendations tailored to their criteria. In some embodiments, These profiles provide a comprehensive snapshot of users' qualifications, preferences, and criteria for various opportunities. In some embodiments, at the heart of the system lies an advanced computing operation-based matching system. This system employs sophisticated computing operations to suggest suitable job listings, relationship roles, or connections based on user profiles and predefined criteria. In some embodiments, The matching process is designed to be precise, considering numerous factors to ensure that recommendations are highly relevant and aligned with users' goals. In some embodiments, machine learning capabilities are seamlessly integrated into the system, continuously enhancing the matching process by analyzing user interactions, feedback, and evolving criteria. In some embodiments, This dynamic approach ensures that matches and recommendations become increasingly tailored over time, improving user satisfaction. In some embodiments, To maintain the authenticity and accuracy of profiles and applications, the system includes a verification mechanism. In some embodiments, This mechanism validates user-provided information, such as qualifications, characteristics, and criteria for opportunities, enhancing the reliability of profiles and applications. In some embodiments, The process of matching individuals with opportunities using this system involves accessing the categorized database, creating or updating user profiles, engaging the computing operation-based matching system, and applying for jobs, creating personal connections, or accepting automatic recommendations directly through user profiles or specified preferences. In some embodiments, The system's use of machine learning and verification mechanisms guarantees a smooth and reliable experience. In some embodiments, the computing system for matching individuals with temporary, long-term, or permanent jobs or gigs, as well as relationship roles or connections, revolutionizes the way individuals discover and pursue opportunities. In some embodiments, By combining a versatile database, user profiles, advanced computing operations, and application platforms, this system ensures that opportunities are precisely matched to users' preferences, qualifications, and criteria. In some embodiments, Machine learning and verification mechanisms enhance accuracy and reliability, making it a valuable tool for individuals seeking a wide range of opportunities. In some embodiments, the present disclosure introduces an innovative computing system designed for hiring and displaying temporary jobs or gigs, along with the creation of temporary relationships. In some embodiments, This comprehensive system combines a versatile database of temporary job listings, user profiles, an computing operation-based recommendation system, and an application platform to streamline the process for individuals seeking short-term roles or connections. In some embodiments, a database that meticulously categorizes temporary job listings and relationship roles. In some embodiments, Users can easily identify opportunities tailored to their unique preferences, whether they seek short-term employment, temporary relationships, or specific role-based interactions. In some embodiments, The spectrum of roles encompasses a wide array, accommodating various professions and short-term relationship criteria. In some embodiments, User profiles serve as a central component, enabling individuals to apply for temporary roles, create temporary relationships, or receive automatic recommendations from the system based on predefined criteria. In some embodiments, These profiles provide a comprehensive view of users' characteristics, preferences, and criteria for temporary roles or relationships. In some embodiments, A key feature of this system is the computing operation-based recommendation system, which suggests suitable temporary job listings, temporary relationships, or role-based connections based on user profiles and predefined criteria. This advanced computing operation considers many factors in some embodiments, ensuring that recommendations are precise and relevant to users' short-term goals. In some embodiments, Machine learning capabilities are seamlessly integrated into the system, continuously enhancing the recommendation process by analyzing user interactions, feedback, and evolving criteria. This dynamic approach ensures that recommendations become increasingly tailored over time in some embodiments. In some embodiments, To maintain the authenticity and accuracy of profiles and applications, the system includes a verification mechanism. In some embodiments, This mechanism validates user-provided information, such as qualifications, characteristics, and criteria for temporary roles or relationships, enhancing the reliability of profiles and applications. In some embodiments, The process of hiring temporary roles and establishing temporary relationships using this system involves accessing the categorized database, creating or updating user profiles, engaging the computing operation-based recommendation system, and applying for temporary roles, creating temporary relationships, or accepting automatic recommendations directly through user profiles or specified preferences. In some embodiments, The system's use of machine learning and verification mechanisms guarantees a smooth and reliable experience.

In some embodiments, the computing system for hiring and displaying temporary jobs or gigs, along with the creation of temporary relationships, reimagines the way individuals find and apply for short-term roles and establish meaningful connections. In some embodiments, merging a versatile database, user profiles, computing operation-based recommendations, and application platforms, this system streamlines the process, ensuring that temporary job listings, temporary relationships, or role-based connections align precisely with users' short-term preferences and goals. In some embodiments, Machine learning and verification mechanisms contribute to the system's accuracy and reliability, making it a valuable tool for users seeking short-term roles or connections.

In some embodiments, the present disclosure introduces an innovative computing system designed for job hiring, relationship establishment, and displaying roles encompassing unique criteria. In some embodiments, This groundbreaking system combines a comprehensive database of job listings, user profiles, computing operation-based recommendations, and an application platform to create a streamlined and efficient process for individuals seeking roles.

In some embodiments, a database meticulously categorizes job listings and relationship roles. Users can effortlessly find opportunities tailored to their unique preferences in some embodiments, whether they seek career advancements, relationship connections, or specific role-based interactions. In some embodiments, In some embodiments, User profiles play a pivotal role in this system, allowing individuals to apply for roles, create relationships, or be automatically recommended by the system based on predefined criteria. In some embodiments, these profiles provide a holistic view of users' characteristics, preferences, and criteria for relationships or role-based connections. In some embodiments, An essential feature of this system is the recommendation system, which suggests suitable job listings, relationships, or role-based connections based on user profiles and predefined criteria. In some embodiments, This sophisticated computing operation considers many factors, ensuring that recommendations are precise and relevant to the users' goals. In some embodiments, Machine learning capabilities are seamlessly integrated into the system, continuously refining the recommendation process based on user interactions, feedback, and evolving criteria. This dynamic approach ensures that recommendations become increasingly tailored over time. In some embodiments, To maintain the authenticity and accuracy of profiles and applications, the system includes a verification mechanism. In some embodiments, This mechanism validates user-provided information, such as qualifications, characteristics, and relationship criteria, enhancing the reliability of profiles and applications. In some embodiments, The process of job hiring and relationship establishment using this system involves accessing the categorized database, creating or updating user profiles, engaging the computing operation-based recommendation system, and applying for roles, creating relationships, or accepting recommendations directly through user profiles or specified preferences. In some embodiments, the system's use of machine learning and verification mechanisms guarantees a smooth and reliable experience. In conclusion, the computing system for job hiring and relationship establishment redefines how individuals find and apply for roles and create meaningful relationships with specific criteria. In some embodiments, By merging a comprehensive database, user profiles, computing operation-based recommendations, and application platforms, this system streamlines the process, ensuring that job listings, relationships, or role-based connections are precisely matched with users' preferences and goals. In some embodiments, Machine learning and verification mechanisms contribute to the system's accuracy and reliability, making it a valuable tool for users seeking specific roles or relationships. In some embodiments, the present disclosure introduces a novel computing system designed for job recruitment and display, with a particular focus on roles that require specific characteristics or qualifications, such as sales, recruiting, modeling, event staff, and others. In some embodiments, This innovative system merges a comprehensive database of job listings, user profiles, computing operation-based matching, and an application platform to create a seamless and efficient job recruitment process. In some embodiments, The computing system maintains a database of job listings meticulously categorized by roles, ensuring that individuals can easily find job opportunities tailored to their unique skills and qualifications. Roles span a wide spectrum in some embodiments, accommodating diverse professions and industries. In some embodiments, User profiles are at the heart of this system, allowing individuals to apply for roles using their profile data, photos, videos, and links to their social media accounts. In some embodiments, This comprehensive approach ensures that applicants can present themselves effectively, showcasing their qualifications, experiences, and characteristics relevant to specific roles. In some embodiments, A central feature of this system is the computing operation-based matching system, which pairs job listings with user profiles based on role-specific characteristics and qualifications. In some embodiments, This advanced computing operation considers numerous factors, ensuring that job matches are precise and relevant to the needs of both employers and applicants. In some embodiments, machine learning capabilities are integrated into the system, continually refining the matching process based on user interactions, feedback, and role-specific preferences. In some embodiments, This dynamic approach ensures that job listings become more tailored and suitable over time. In some embodiments, To maintain the authenticity and accuracy of profiles and applications, the system includes a verification mechanism. This mechanism validates user-provided information, such as qualifications and social media links, enhancing the reliability of profiles and applications. In some embodiments, The job recruitment process using this system involves accessing the database of categorized job listings, creating or updating user profiles, engaging the computing operation-based matching system to find suitable roles, and applying for those roles directly through user profiles or by submitting relevant media and documents. In some embodiments, The system's use of machine learning computing operations and verification mechanisms guarantees a smooth and reliable experience. In some embodiments, the computing system for job recruitment and display reimagines how individuals find and apply for roles with specific characteristics and qualifications. Combining a comprehensive database, user profiles, computing operation-based matching, and application platforms, this system streamlines the job recruitment process, ensuring that job listings are precisely matched with qualified applicants. In some embodiments, Machine learning and verification mechanisms contribute to the system's accuracy and reliability, making it a valuable tool for job seekers and employers alike.

In some embodiments, a computing system for job recruitment and display is provided, comprising:

a) A database of job listings categorized by roles, including sales, recruiting, modeling, event staff, and other specific roles.

b) User profiles enabling individuals to apply for roles using their profile data, photos, videos, and links to social media accounts.

c) An computing operation-based matching system that pairs job listings with user profiles based on role-specific characteristics and qualifications.

d) An application platform allowing users to apply for roles directly through their profiles or by submitting relevant media and documents.

The computing system, featuring machine learning capabilities that continuously refine the matching process by analyzing user interactions, feedback, and role-specific preferences.

The computing system, equipped with a verification mechanism to validate user-provided information, ensuring the accuracy and authenticity of profiles and applications.

In some embodiments, a method is provided for job recruitment using the computing system, comprising:

a) Accessing the database of job listings categorized by roles.

b) Creating or updating a user profile, including role-specific characteristics and qualifications.

c) Engaging the computing operation-based matching system to find suitable job listings based on user profiles.

d) Applying for roles directly through user profiles or by submitting relevant media and documents.

The method, which involves using machine learning computing operations to enhance the accuracy of job matches and continuously improve user experiences.

The method, wherein the verification mechanism validates user-provided information, ensuring the reliability of profiles and applications.

In some embodiments, a computing system is provided for job hiring and display, comprising:

a) A database of job listings categorized by roles, including models, relationship jobs, and roles;

b) User profiles allowing individuals to apply for roles, create relationships, or be recommended automatically by the system based on predefined criteria.

c) An computing operation-based recommendation system that suggests suitable job listings, relationship matches, or role-based connections based on user profiles and criteria.

d) An application platform enabling users to apply for roles, create relationships, or accept recommendations through their profiles or specified preferences.

The computing system, featuring machine learning capabilities that continuously improve the recommendation process by analyzing user interactions, feedback, and evolving criteria.

The computing system, equipped with a verification mechanism to validate user-provided information, ensuring the accuracy and authenticity of profiles and applications.

In some embodiments, a method is provided for job hiring and relationship establishment using the computing system, comprising:

a) Accessing the database of job listings categorized by roles, including models, relationship jobs, and roles.

b) Creating or updating a user profile, including preferences, characteristics, and relationship criteria.

c) Engaging the computing operation-based recommendation system to find suitable job listings, relationships, or role-based connections based on user profiles and predefined criteria.

d) Applying for roles, creating relationships, or accepting recommendations directly through user profiles or specified preferences.

The method, which involves using machine learning computing operations to enhance the accuracy of job matches, relationship recommendations, or role-based connections and continuously improve user experiences.

The method, wherein the verification mechanism validates user-provided information, ensuring the reliability of profiles and applications.

In some embodiments, a computing system is provided for hiring and displaying temporary jobs or gigs, comprising:

a) A database of job listings categorized by temporary roles, including models, relationship jobs, and roles;

b) User profiles enabling individuals to apply for temporary roles, create temporary relationships, or receive automatic recommendations based on predefined criteria.

c) An computing operation-based recommendation system that suggests suitable temporary job listings, temporary relationships, or role-based connections based on user profiles and criteria.

d) An application platform that facilitates user applications for temporary roles, temporary relationships, or the automatic acceptance of recommendations through their profiles or specified preferences.

The computing system, featuring machine learning capabilities that continuously enhance the recommendation process by analyzing user interactions, feedback, and evolving criteria.

The computing system, equipped with a verification mechanism to validate user-provided information, ensuring the accuracy and authenticity of profiles and applications.

A method for hiring temporary roles and establishing temporary relationships using the computing system, comprising:

a) Accessing the database of temporary job listings categorized by roles, including models, relationship jobs, and roles.

b) Creating or updating a user profile, including preferences, characteristics, and criteria for temporary roles or relationships.

c) Engaging the computing operation-based recommendation system to find suitable temporary job listings, temporary relationships, or role-based connections based on user profiles and predefined criteria.

d) Applying for temporary roles, creating temporary relationships, or accepting automatic recommendations directly through user profiles or specified preferences.

The method, which involves using machine learning computing operations to refine the accuracy of temporary job matches, temporary relationship recommendations, or role-based connections and continuously improve user experiences.

The method, wherein the verification mechanism validates user-provided information, ensuring the reliability of profiles and applications.

A computing system for matching individuals with temporary, long-term, or permanent jobs or gigs, as well as relationship roles or connections, comprising:

a) A comprehensive database of job listings, relationship roles, or connection opportunities categorized by duration and type.

b) User profiles enabling individuals to apply for jobs, roles, or relationships, create personal connections, or receive automatic recommendations based on specified criteria.

c) An advanced computing operation-based matching system that suggests suitable job listings, relationship roles, or connections based on user profiles and criteria.

d) An application platform that facilitates user applications for jobs, roles, or relationships, as well as the automatic acceptance of recommendations through their profiles or specified preferences.

The computing system, featuring machine learning capabilities that continuously enhance the matching process by analyzing user interactions, feedback, and evolving criteria.

The computing system, equipped with a verification mechanism to validate user-provided information, ensuring the accuracy and authenticity of profiles and applications.

A method for matching individuals with temporary, long-term, or permanent jobs or gigs, as well as relationship roles or connections, using the computing system, comprising:

a) Accessing the database of job listings, relationship roles, or connection opportunities categorized by duration and type.

b) Creating or updating a user profile, including preferences, qualifications, and criteria for jobs, roles, or relationships.

c) Engaging the computing operation-based matching system to find suitable job listings, relationship roles, or connections based on user profiles and predefined criteria.

d) Applying for jobs, creating personal connections, or accepting automatic recommendations directly through user profiles or specified preferences.

The method, which involves using machine learning computing operations to refine the accuracy of job matches, relationship recommendations, or connection suggestions, and continuously improve user experiences.

The method, wherein the verification mechanism validates user-provided information, ensuring the reliability of profiles and applications.

A computing system for matching individuals with various types of relationships, relationship roles, temporary relationships, temporary roles, and long-term relationships, comprising:

a) A comprehensive database categorizing relationships and relationship roles by type, duration, and characteristics.

b) User profiles allowing individuals to create or update their relationship preferences, qualifications, and criteria.

c) An computing operation-based matching system that suggests suitable relationships and roles based on user profiles and predefined criteria.

d) An application platform facilitating user applications for relationships and roles, as well as automatic acceptance of recommendations through user profiles or specified preferences.

The computing system, incorporating machine learning capabilities to continuously refine the matching process, consider evolving criteria, and enhance user experiences.

The computing system, featuring a verification mechanism to validate user-provided information, ensuring the authenticity and accuracy of profiles and applications.

A method for matching individuals with various types of relationships, relationship roles, temporary relationships, temporary roles, and long-term relationships, using the computing system, comprising:

a) Accessing the database of categorized relationships and relationship roles.

b) Creating or updating a user profile, including relationship preferences, qualifications, and criteria.

c) Employing the computing operation-based matching system to find suitable relationships and roles based on user profiles and predefined criteria.

d) Applying for relationships and roles, creating personal connections, or accepting automatic recommendations directly through user profiles or specified preferences.

The method, which involves using machine learning computing operations to enhance the accuracy of relationship matches, role recommendations, and connection suggestions, ensuring a more personalized experience.

The method, wherein the verification mechanism validates user-provided information, maintaining the reliability of profiles and applications.

A computing system for facilitating the hiring of companions or friends for various social or event-related purposes, comprising:

a) User registration and profile management components allowing individuals seeking companionship services (hiring parties) and individuals offering companion services (companion providers) to create and manage user profiles within the system.

b) A search and matching computing operation designed to match hiring parties with companion providers based on compatibility, availability, and specific event or social requirements.

c) A secure messaging and communication platform that enables hiring parties and companion providers to communicate and negotiate terms of service, including details about the event or social engagement.

d) A payment and transaction processing system allowing hiring parties to make payments to companion providers for their services, including options for additional costs associated with specific event requirements.

The computing system further comprising:

a) A review and rating system that allows hiring parties and companion providers to provide feedback and ratings based on their experiences, contributing to a reputation-based ranking system within the platform.

b) A scheduling and availability management tool that enables companion providers to set their availability and allows hiring parties to request services for specific dates and times.

The computing system wherein the search and matching computing operation utilizes user-provided preferences, event details, and location data to generate compatible matches between hiring parties and companion providers.

The computing system, incorporating a secure payment system that includes options for hiring parties to provide payment for companion services, additional expenses related to events, and a booking fee to secure companion services for specific dates and times.

A method to facilitate the hiring of companions or friends for various social or event-related purposes, comprising:

a) Registering and creating user profiles for hiring parties and companion providers within the computing system.

b) Utilizing the search and matching computing operation to identify and connect hiring parties with compatible companion providers based on event requirements and preferences.

c) Engaging in secure messaging and communication to negotiate terms of service and event details with selected companion providers.

d) Making secure payments for companion services, event-related expenses, and booking fees within the platform.

e) Providing feedback and ratings through the review and rating system based on the hiring party and companion provider experiences, contributing to the reputation-based ranking system.

The method, further emphasizing the use of user-provided preferences, event details, and location data to facilitate compatible matches between hiring parties and companion providers.

The method which includes companion providers setting their availability and hiring parties requesting services for specific dates and times using the scheduling and availability management tool.

In some embodiments, a computing system is disclosed for facilitating the hiring of companions or friends for various social or event-related purposes. This system comprises user registration and profile management components that allow individuals, including both hiring parties and companion providers, to create and maintain user profiles within the platform. The user profiles provide essential information about the users and their preferences, enabling effective matchmaking.

In some embodiments, the computing system incorporates a search and matching computing operation specifically designed to match hiring parties with compatible companion providers. This computing operation takes into account factors such as compatibility, availability, and specific event or social requirements. It utilizes user-provided preferences, event details, and location data to generate matches that align with the needs and preferences of the hiring parties.

In some embodiments, the computing system provides a secure messaging and communication platform. This platform facilitates direct communication and negotiation of terms of service between hiring parties and companion providers. Users can discuss event details, expectations, and any additional requirements, ensuring a clear understanding of the services to be provided.

In some embodiments, the system features a robust payment and transaction processing system. This system allows hiring parties to make secure payments to companion providers for their services. Additionally, it provides options for handling additional costs associated with specific event requirements and offers a booking fee mechanism to secure companion services for particular dates and times.

In some embodiments, the computing system includes a review and rating system that allows both hiring parties and companion providers to provide feedback and ratings based on their experiences. This system contributes to a reputation-based ranking system within the platform, helping users make informed decisions when selecting companions or clients.

In some embodiments, the system further incorporates a scheduling and availability management tool. This tool enables companion providers to set their availability based on their schedules and preferences. Hiring parties can then request services for specific dates and times through this tool, streamlining the booking process.

In summary, the disclosed computing system and method provide a comprehensive platform for individuals to hire companions or friends for various social or event-related purposes. It enhances user experiences through user-friendly profiles, precise matchmaking, secure communication, and robust payment systems while maintaining a reputation-based system to ensure quality services.

In some embodiments, when both parties arrive around the time of the date or date of the date or prior to the date of the 'in person date' or 'virtual date' 'or call', each party is required to confirm on the mobile site, website, or app, or computing system, computing software that they have arrived. In some embodiments, the selection of the "arrived" options of the first user (from the first user's mobile device) is required for the second user to get paid. In some embodiments, the selection of the "arrived" option of the first user (from the first user's mobile device) and the second user (from the second user's mobile device) is required for the second user to get paid. In some embodiments, the "arrived" option for both users may be submitted from a single device. In some embodiments, both parties are allowed to confirm on one device with a signature of confirmation (of the first user and/or the second user) or fingerprint (of the first user and/or the second user) or video recording (showing the first user and/or the second user) or picture capture (showing the first user and/or the second user) or voice recording (comprising the first user and/or the second user).

In some embodiments, user 1's confirmation of user 1's arrival activates the option for user 2 to select an option to confirm user 2's arrival. In some embodiments, once user 1 clicks or selects the option to indicate arrival, user 2 can select "arrival" option at anytime on user 2's device. The transaction amount (or transmittables) associated with the date are processed immediately or at any time period after user 1 clicks or selects the option to indicate user 2's arrival, such that the processing results in delivery of the transmittables or a portion of the transmittables to an account associated with user 2. In some embodiments, user 2's selection of the "arrival" option on user 2's device may additionally be needed for the transaction amount associated with the data to be processed.

In some embodiments, User 1 may need to confirm their arrival via user 1's mobile device, and user 2 may be allowed to access their 'confirm their arrival' option on user 2's mobile device after user 1 confirms theirs. The option for user 2 may not be visible or may not be activated until user 1 confirms their arrival on user 1's (or on user 2's) device. In some embodiments, user 1 may be instructed to select their "arrived" option on user 1's (or user 2's) device upon meeting user 2 (either physically or virtually). In some embodiments, user 2 receives a notification indicating that user 1 has arrived upon user 1 selecting their "arrived" option on user 1's (or user 2's) device.

In some embodiments, user 1 may select 'arrival' option or button as soon as user 2 arrives. In some embodiments, user 1 may activate elect 'arrival' option or button upon being urged by user 2. In some embodiments, the receipt of the 'arrived' or 'arrival' confirmation from user 1's device is proof of the date.

In some embodiments, an AI-based matchmaking/dating application is provided which searches the (e.g., world wide web, multiple public or privately listed networks/user database/information on the internet, etc.) for any potential matches that can be either which may include but not be limited to, (e.g. romantic partner, dating partner, friendship, husband, wife, long-term-relationship, casual relationship, dating as friends, friendships, friend circle, business partners, someone to hire, someone to talk to, therapists, counselors, schools, educational programs, businesses that person may like, food or beverages that person may like, etc.). In some embodiments, the application takes the information that is public on the internet (and applications and databases) and attempts to find matches based on the request of the user.

For example, in order to find candidates for marriage or dating, the application performs a search for specific terms to find single individuals across the Internet, which includes social and professional networks, database, etc. The search may include a search of text, video, audio, and/or photos. For example, the application may search for individuals (e.g., men) that are potentially single, e.g., not following a threshold number of women on social media, no pictures kissing or hugging a woman on the internet, face age looks between a certain age range (defined by the user), no public comments regarding cheating or domestic abuse made by the candidates, no comments of candidate using drugs, no pictures of candidate with alcohol or drugs, no pictures of candidate dating anyone, no records of current marriages, no comments regarding bad character such as a 'cheater,' records of divorce, record of presence of dating app profile, etc.).

In some embodiments, the application also takes into account a user's preferences such as which may include but not be limited to (e.g., blonde hair, blue eyes, brown eyes, a height range, a preference on religion, a preference on heritage, a preference on profession or education, etc.). These preferences may also be input into the AI application (large language model).

The output of this process may include multiple candidates that are potentially single and meet the user's preferences. The output of this process may also provide possible contact information (e.g., email address, phone number, social media contact information) for these candidates. The application may also provide a level of match (e.g., a percentage match to the user submitting the request based on the user's data, history, and preferences). In some embodiments, the application may automatically determine the user's preferences. In some embodiments, the application may have an option to automatically reach out to the candidate and indicate that a matching user may have been found for them for friendship, dating, marriage, etc. In some embodiments, at least some of the candidates may be AI generated (synthetic data). In some embodiments, the application may be a periodic subscription (associated with a fee) such that a certain number of matching candidates may be sent to the user periodically. The user may pay transmittables per number of candidates sent to the user. The user may also need to pay transmittables to view contact information or have the ability to contact the candidates. The application may also indicate a percentage match between a candidate and a user. In some embodiments, the candidates may be sorted from highest to lowest percentage of match, or vice versa. The user may have the ability to amend the sort. For example, the sorting function may be based on one or more of the user's preferences (e.g., most blue eyes to least blue eyes, highest education to least education). The determination of this quality for each candidate is made by the large language model.

The application may provide the user with a report or summary or recommendations, etc. In some embodiments, the user may be able to connect their social media and the artificial intelligence can take it a step further and actually reach out to those match preferences depending on what level such a highest match to lowest match and say that 'we find that you are a 90% match in which case the artificial intelligence would for example not only create and find the report but then actually reach out to that person via social media, or email addresses that are publicly listed anywhere on the world wide web or the internet, etc. In some embodiments, there may be a pay wall prior to receiving the report summary, or get any notifications regarding who is a match or reaching out to those persons, etc. for example, user may be required to pay prior to the artificial intelligence pulling the report from the internet or giving those actual results to the user or showing the user the actual results, etc.

In some embodiments, there may be options to find doppelgangers (e.g., lookalikes) on the internet such as uploading a picture of a singer/sportsperson and then getting regular normal people on the internet that look like this person and giving a report showing all of their public information such as their social media handles, their email addresses, and or the artificial intelligence reaching out saying that 'this person thinks you're attractive etc.' or any type of introduction to that person for any reason, the reasons can range from business, to lost friends, to old friends, to romantic relationships, etc. For example, the user is able to submit a photo or name of a sportsperson into the large language model (LLM). The LLM conducts a search on the Internet, networks, databases for similar looking candidates that are potentially single and can send them a communication providing a message or photo of the user.

In some embodiments, the user may be able to put in some data such as which may include but not be limited to (e.g., pictures of men/women she/he finds attractive, pictures of people she likes, data such as types of schools that she likes, PDF documents full of requirements or data regarding dating/matching preferences, videos such as of men/women, or videos such as types of hair colors or eye colors that he/she wants in a partner, facts regarding the preference of dater such as net worth, hobbies, education, sociability, characteristics, drinking/smoking habits, or videos or documents, or any type of data that may be searched or viewed or analyzed, etc. This data may be provided by the user or this data may be accessed based on the user's Internet browsing history or application usage history. This data may be provided to a search application (utilizing a large language model) that accesses the Internet (e.g., social or professional networking websites or applications) and searches for matches based on the data provided. As used herein, the term "large" may refer to a language model of any minimum number of nodes associated with an artificial neural network. The large language model may be an open source or closed source language model.

Any AI engine or AI application described herein may be associated with a language model comprising at least one node associated with an artificial neural network.

In some embodiments, a system is provided for identifying and retrieving image-based data across a distributed network, comprising: a network-researching application configured to: Scan publicly accessible websites, databases, and media repositories to collect visual data, including but not limited to photographs, videos, and graphical files; Continuously update its dataset by indexing new content based on search parameters; An image recognition application configured to: Analyze collected visual data using facial recognition algorithms, object detection models, or similar pattern recognition techniques; Compare the collected visual data against a user-provided or system-stored reference image or set of images; A metadata extraction application configured to: Extract metadata associated with identified visual data, including but not limited to timestamps, geolocation information, file origins, and context-based descriptions; Correlate metadata with corresponding visual data for comprehensive identification; A user interface application configured to: Allow users to input a query or reference image; Display search results comprising matching visual data and associated metadata in an organized format; A filtering and ranking application configured to: Prioritize and rank results based on relevance, visual similarity, metadata attributes, and user preferences; Offer customizable filters for refining search results, such as by date range, location, source, or content type; A data protection and privacy compliance application configured to: Implement measures to ensure compliance with data protection regulations, including user consent for personal data usage; Offer mechanisms for individuals to request the removal or exclusion of their visual data from search results.

In some embodiments, a system is provided for collecting and analyzing public comments and images across a distributed network, comprising: A web-crawling application configured to: Continuously scan publicly accessible websites, social media platforms, blogs, forums, and other online repositories for user-generated content, including comments, reviews, and images; Index collected content based on pre-defined search parameters, such as keywords, tags, or image types; A content recognition application configured to: Identify and retrieve user-generated comments and images from the scanned web data using natural language processing (NLP) techniques for text and image recognition algorithms for visual content; Differentiate between various content types, such as text, video, and images, and categorize them accordingly; a metadata extraction application configured to: Extract metadata from both comments and images, including but not limited to user IDs, timestamps, geolocation, and post origin; Associate metadata with the respective content for contextual analysis; A content analysis application configured to: Analyze retrieved comments using sentiment analysis, keyword detection, and contextual understanding to determine user opinions, topics of discussion, and relevance; Perform image analysis using image recognition techniques to detect objects, facial features, or visual patterns, and classify images based on user-defined or system-defined criteria; A filtering and ranking application configured to: Rank and prioritize retrieved content based on relevance to a user's query, popularity of the content, user engagement metrics, and other factors such as sentiment or visual similarity; Provide users with customizable filters to refine search results, including filters for specific time-frames, platforms, content types, or geographic locations; A user interface application configured to: Present the collected public comments and images to users in an organized, searchable format; Allow users to input search queries, view results, and interact with the system by refining search filters or saving relevant content; A data compliance and privacy application configured to: Ensure the system adheres to applicable privacy regulations and terms of service of third-party platforms from which content is retrieved; Provide mechanisms for users or content creators to request the removal or exclusion of their comments or images from the system's index.

In some embodiments, The present invention relates generally to the field of insurance, and more particularly, to a system and method for automating the management, purchase, and administration of insurance policies using a web-based platform. In some embodiments, The present invention provides a novel system and method for automating the management of date or experience insurance policies through a web-based platform and mobile application. In some embodiments, The system or computing system leverages artificial intelligence (AI) (i.e., based on using an LLM) to streamline the underwriting process, automate policy recommendations, and expedite claims processing. In some embodiments, The system or computing system comprises a cloud-based server, a user interface accessible via both web browsers and mobile applications, a database for storing user information and policy details, and an AI-driven engine that automates key date or experience insurance functions. In some embodiments, The user registers via the web app or mobile app by entering personal details. In some embodiments, The AI engine analyzes the user data to suggest the most suitable insurance policies based on the user's profile and risk factors. In some embodiments, Users may review and customize policy recommendations before purchase. In some embodiments, the insurance policy is associated with a date. The insurance policy is paid out to the user (e.g., a man) who purchases the policy if the date (e.g., a woman) does not show up and/or leaves before the end of the scheduled time of the date. In some embodiments, data associated with both users is input into a large language model to assess risk of no-shows and determine how much premium is to be paid by the user (e.g., a man). In some embodiments, the amount of premium may be determined in real-time. In some embodiments, this insurance model may be applied to other experience situations or other situations where an insurance policy is appropriate. The amount of premium may be determined based on the history on the network or user data of the user (e.g., the first user, the second user, the location of the date, any other data or parameters described in this disclosure, etc.).

In some embodiments, Once a date or experience policy is purchased, the system or computing system automatically manages renewals, premium payments, and coverage adjustments based on real-time user data and preferences. In some embodiments, Users may access their policy details, update personal information, and file claims directly through the platform. In some embodiments, The AI engine evaluates claims submitted by the user through the app, cross-referencing with policy coverage and relevant data stored in the system or computing system. In some embodiments, The system or computing system automates the approval process for claims, reducing processing time significantly. In some embodiments, For more complex claims, the system or computing system routes the case to a human adjuster while providing an initial analysis to expedite the decision-making process. In some embodiments, The system or computing system employs end-to-end encryption to secure all user data and transactions. In some embodiments, security audits and updates ensure compliance with industry standards and regulations.

In some embodiments, a marketplace in which dates may be able to be purchased or reserved and then resold to other users or people using the computing system or platform, for example, a user may be able to buy or purchase multiple dates or times or reservations or experiences and then resell them for higher prices, etc. In some embodiments, when the user opens or publishes their schedule, dates may be able to be purchase, reserved, resold, exchanged, gift cards may be able to be used to purchase or sell dates, gift cards may be able to be utilized, etc. In some embodiments, there is a pre-sale auction of dates, times, places, reservations, time booking, etc. for dates, etc. In some embodiments, a user may be able to hold pre-sale auctions or have pre-sale prices before the public auction or sale of date tickets, or prices or ticket prices, etc. In some embodiments, each date may be seen as a ticket, which may be a printed ticket, a digital ticket, etc. In some embodiments, a user (e.g., a woman) or the system may create a ticket; the other user may be able to use the ticket to begin the date, confirm the date, or create the transaction completion, etc. For example, each slot on the woman's schedule is associated with a ticket. When a man purchases the slot, he receives a ticket from the system. The system may generate the ticket. The user (e.g., the man) shows the ticket (e.g., on the man's phone) to the woman upon arriving for the date; the woman may scan the ticket or may otherwise process the ticket (e.g., based on a near field transaction between the man's phone and the woman's phone). The initiation of processing the ticket starts the date and confirms the presence of the man and/or the woman. The processing of the ticket also starts the process of initiating the transfer of transmittables from the platform account and/or the man's account to the woman's account. In some embodiments, the ticket may be processed based on a transaction between the man's phone and the server (e.g., without involving the woman's phone). In some embodiments, the ticket may include any of the data described in this disclosure. In some embodiments, a marketplace is provided for digital date tickets. Each date ticket is associated with a virtual or physical date with a woman/man. The date ticket is associated with a price and/or a time set by a dater (e.g., a woman). The date ticket may be purchased by pre-approved users and may be sold on the platform to other users. The dater (e.g., a woman) may need to approve each sale or resale of the ticket because the woman will need to feel comfortable that she is going on a date with. The dater (e.g., woman) will be presented with information associated with the purchaser or re-purchaser of the date ticket so that she can approve or reject the sale or resale.

In some embodiments, 'date insurance' may be sold on top of the ticket or transaction sale for the user, etc. In some embodiments, a ticket may be sold for a date, and then the user may be offered insurance for the date or the time or the day, or for any unexpected occurrences. In some embodiments, a cell phone video or picture or may be able toner (to connect to) app or may be able toner method on user's phone may be able to may be able to the other user's ticket for the date, the experience, the time, the day, the date, etc. In some embodiments, user may be able to add ticket to their phone database or wallet or may be able toner via their device, etc. In some embodiments, the ticket may be holographic in the air with another holographic may be able toning device or a code via a may be able toner or type of may be able toner.

In some embodiments, the code or the ticket to be may be able toned may be a picture, a code, a visual representation of something that is moving, it may be a bunch of pixels floating and creating a special code that only the person who is may be able toning it may be able to activate the code transaction or method that the code is trying to convey or complete such as a date ticket or a date transaction, etc. In some embodiments, users may have a primary marketplace where dates may be able to be reserved, paid for, auctioned off, and the user gets initial payment, etc. In some embodiments, there may be a secondary marketplace within the computing system where users may be able to resell already paid tickets, etc. In some embodiments, the initial user created the payment total and then received a reservation or payment or date reservation for that time and date, and another user pays the total, with the initial to resell the ticket and not to go on a date, the initial user still gets paid and assumes the user will show up to the date if the user does not show up due to the secondary user trying to resell their ticket, the initial user still gets paid because the user showed up for the date, etc. In some embodiments, first user may be able to raise their own prices or their tickets may be able to be sold on the secondary marketplace as a resell or as a higher price or a changed price, or a secondary user marketplace, but still within the same computing system or computing app or web app or platform, or may even be a secondary connected platform, etc. In some embodiments, there may be no refunds for the initial or secondary transaction of ticket sales, which may be for the date. In some embodiments, ticket sales may refer to a date or experience or time reservation, dinner or movie, golfing, breakfast, lunch, dinner, dessert, etc. In some embodiments, the payment of the date to obtain a ticket or transaction completion may not be refunded because it is a time reservation to the other user, so the secondary user may be able to resell the time reserved that was already paid or reserve to the first user, etc. In some embodiments, the user may be able to sell auction dates, times, reservations, times at the restaurant, food at a restaurant, payment for the meal, payment for the nightclub date, nightclub dates, nightclub sales or payments or transactions, etc. In some embodiments, users may be able to auction items, clothing, times, experiences, dates, lunches, dinners, breakfasts, tea time, gym dates, movie dates, etc. In some embodiments, users may be able to post their calendar with their pre-sell tickets, their pre-sell dates, their pre-sale auctions, their reservations, etc. In some embodiments, user may be able to charge other users to obtain their pre-sell ticket prices, or pre-sell reservations, or to see their calendar or their schedule or their dates prior to the rest of the public, etc.

In some embodiments, Ticket Purchase: In some embodiments, Online Platform: Customers visit website or mobile app or webapp, or hologram, or device, or software to browse and purchase tickets or reserve dates or reserve clothing, merchandise, or experiences, or dates, etc. In some embodiments, Selection: Users select the date or experience they want to attend, choose their seats (if applicable), and proceed to purchase. In some embodiments, Payment: Customers may be able to pay using various methods such as credit/debit cards, PayPal, or other payment options by 3rd parties. The transaction is completed through computing system secure payment gateway or through any third party that may be connected or with the computing system, etc. In some embodiments, Ticket Delivery: After payment, customers receive their tickets digitally (e-tickets), may be able to print their tickets, or may be able to opt for physical tickets to be mailed to them. In some embodiments, E-tickets may be stored in mobile wallets or accessed through the computing system, or device, or app. In some embodiments, computing systems may offer a resale marketplace where users may be able to resell tickets they have purchased but may be able to no longer use. In some embodiments, the computing system facilitates the transaction between the buyer and seller, handling payment processing and ticket delivery. In some embodiments, a secondary market is created for dates, where users buy dates and re-sell for higher or lower prices to other users.

In some embodiments, The invention relates to a method and system for managing the posting and retrieval of business leads on an online platform. In some embodiments, The system or computing system allows users to post business leads, which may be accessed by individuals or companies seeking such leads. Access to newly posted leads is restricted for a predefined time period unless a user subscribes to a premium service, granting them early access. In some embodiments, If a lead is claimed by a premium subscriber during this exclusive access period, it may become unavailable to others. In some embodiments, Non-premium users may access leads after the exclusive period expires, provided the lead has not been claimed or marked as taken. In some embodiments, The system or computing system described herein provides a method for managing the posting and retrieval of business leads on an online platform, with a specific focus on prioritizing access based on a user's subscription status. In some embodiments, This method allows lead providers to submit business opportunities, which are then made available to potential claimants under a structured access model. In some embodiments, When a user posts a business lead, the platform captures all relevant details, including the nature of the business opportunity, contact information, and any additional information that may be pertinent to potential claimants. In some embodiments, Once submitted, the lead is stored in the platform's database, and its availability is governed by the system or computing system's access control mechanisms. In some embodiments, Upon posting, the lead enters a predefined restricted access period during which only premium subscribers may view the details of the lead. In some embodiments, This period may vary based on the platform's settings or the lead provider's preferences. In some embodiments, Premium subscribers are granted immediate access to the lead, allowing them to claim it before others have the opportunity. In some embodiments, Non-premium users are informed of the existence of new leads but are unable to view the full details until the restricted access period expires. In some embodiments, During this time, they may opt to wait or upgrade to a premium subscription to gain immediate access. In some embodiments, If they choose to wait, they are notified when the restricted access period ends, provided the lead has not already been claimed by a premium subscriber.

In some embodiments, When a premium subscriber claims a lead, the platform updates the lead's status to "in process" or "taken," depending on the actions of the subscriber. In some embodiments, Once marked as taken, the lead is removed from the general availability pool, ensuring that non-premium users may not access it. In some embodiments, The system or computing system also prevents multiple users from claiming the same lead simultaneously by implementing real-time updates and status checks. In some embodiments, The system or computing system may include a notification mechanism that alerts non-premium users when the restricted access period has expired, provided the lead is still available. In some embodiments, This feature ensures that users are informed promptly and may act quickly to claim available leads. In some embodiments, the platform continuously updates the status of leads to reflect their availability, ensuring transparency for all users. In some embodiments, The user interface is designed to be intuitive, allowing users to easily navigate between available leads, claim opportunities, and manage their subscription settings. In some embodiments, The subscription management module tracks users' payment status, renewals, and access privileges, ensuring that only eligible subscribers may access premium features. In some embodiments, This patent application describes a method and system for prioritizing access to business leads on an online platform based on a subscription model. In some embodiments, The invention provides premium subscribers with early access to newly posted leads, while non-premium users must wait until the restricted access period expires. In some embodiments, If a lead is claimed by a premium subscriber, it becomes unavailable to others, ensuring exclusivity and incentivizing the purchase of premium subscriptions. In some embodiments, The system or computing system may include features for secure lead management, real-time updates, and user-friendly interfaces, designed to optimize the process of connecting lead providers with interested parties. In some embodiments, This outline covers the unique aspects of the business method and system, emphasizing the differentiated access based on subscription status and the mechanisms for managing lead availability and exclusivity.

In some embodiments, advertisements may be offered, placed, or put anywhere within the ticket or date system or website or web app, etc. In some embodiments, users may be able to use a computing system platform to manage their dates, experience times, and calendars, track sales, and gather data on attendee or date demographics and preferences. In some embodiments, For some or all events or dates, the computing system may use dynamic pricing, where ticket prices fluctuate based on demand. In some embodiments, a suggested date price is presented to the user; the user may choose to provide a custom price lower or higher than the suggested price. In some embodiments, the computing system may offer customer support for issues like ticket refunds, exchanges, and date cancellations. In some embodiments, They also may handle disputes between buyers and sellers on their resale marketplace. In some embodiments, AI may be able to detect the face of the person the body of the person, show the shown outfit or jewelry or piece of clothing or makeup option, and try it on directly through the computing system and or display screen, etc. In some embodiments, 3rd party apps such as photo or video editing apps or web apps may be able to be integrated into the computing system before uploading a picture or a video on the computing system, etc. In some embodiments, date or ticket Listing (For Sellers): In some embodiments, Creating a Listing: Individuals or users who have tickets, or dates, or times they want to sell, they may be able to use or want to sell may be able to create a listing. In some embodiments, Sellers set their own prices, which may be able to be higher or lower than the original face value of the tickets, depending on demand. In some embodiments, Ticket Upload: Sellers may be able to upload e-tickets directly to the computing system or ship physical tickets to buyers using a shipping method. For some events, sellers may also provide ticket barcodes, which buyers may be able to use to enter the event. In some embodiments, Sellers or users may be able to adjust their prices at any time based on market demand. In some embodiments, a computing system or platform may provide tools and insights to help sellers price their tickets competitively. In some embodiments, Ticket Purchase (For Buyers): In some embodiments, Browsing and Selection: Buyers browse platform or computing system's listings by creator, model, person, race, city, looks, hair color, body type, gender, event, date, location, or price. In some embodiments, They may be able to see the available dates or tickets, date locations, and prices set by sellers. In some embodiments, Purchase Process: Once a buyer selects date or times or tickets, they proceed to checkout. In some embodiments, webapp or app or system may charge the buyer the ticket price set by the seller, plus additional service fees (which may be able to vary based on the type of date, demand for a date, model, creator, person, event, or ticket price).

In some embodiments, Payment: Buyers pay using credit/debit cards, 3rd party methods, crypto, or other supported payment methods. In some embodiments, a web app, computer system, or 3rd party securely processes the payment. In some embodiments, Ticket Delivery: After payment, the buyer receives their tickets electronically (e-tickets) or by email, or by mail. In some embodiments, E-tickets may be able to be downloaded or accessed through the web app or computer system app. In some embodiments, tickets may be able to be transferred directly to the buyer's account on the primary ticketing platform for some dates or events. In some embodiments, it offers valid tickets in time for the event. In some embodiments, the computing system provides a replacement date ticket or a refund in some embodiments. In some embodiments, the Customer Support computing system offers customer support to resolve any issues related to ticket sales, purchases, or event cancellations. In some embodiments, The platform may integrate with mobile wallets and ticketing apps to streamline the ticket delivery, date delivery, entry process, etc.

In some embodiments, creators, models, users, may be able to list tickets directly for sale on the platform, while customers may purchase these tickets or resell them if needed. In some embodiments, users may have options such as "reflect current market conditions" or "set their own price" or "change price due to demand etc." In some embodiments, users may be able to charge based on market demand for their date, their experience, their day, their time, their availability, etc. In some embodiments, users may be able to manage their dates, events, including real-time sales tracking, customer analytics, and targeted marketing capabilities, their marketing campaigns, their analytics, their pricing, their resell ticket allowance or their no selling of tickets, or no reselling of tickets, or choose their own customer base to sell tickets to etc. In some embodiments, users may be able to allow only paid subscribers or paid persons who have spent at least a minimum amount of money to be able to purchase tickets, dates, experiences, etc.

In some embodiments, the seller of the tickets or the dates may be able to 'approve or deny' each sale of the ticket; for example, the initial user may approve the first transaction but then say they do not want their ticket resold, and only approving the first person for the date, etc. In some embodiments, the seller of the date may be able to have an open marketplace where anyone may be able to book or buy the tickets, or they may have a list of people or previously paying clients or previously paying users, or current subscribers that are able to purchase tickets, at that point the seller of the ticket may be able to determine if those tickets are allowed to be resold or not, etc. In some embodiments, ai search results of the specific search of 'pink shirts less than 20 dollars' may result in pink shirts coming in less than 20 for sale currently, etc. In some embodiments, there may be other ways, such as 'pink and or purple shirts, cute logos, bubble letters, under 25,' which may result in further or longer or more results to show what is currently being sold on the market, etc. In some embodiments, pre-approve dating profiles in which the user may be able to pre-approve who they like from a list and or search based on income, money, status, looks, education, etc. In some embodiments, the user may be able to approve profiles or pre-approve any communication from this or these person(s) or users or profiles or messages, etc.

The application incorporates by reference the entirety of the non-provisional application titled "Intelligent synchronization of computing users, and associated timing data, based on parameters or data received from disparate computing systems," with application Ser. No. 18/377,819 filed by the Applicant Inventor on Oct. 8, 2023, which claims priority to U.S. Provisional Application Nos. 63/461,311 and 63/436,590, all of which are incorporated by reference in their entirety for all purposes. The application incorporates by reference the entirety of the PCT application titled "Intelligent synchronization of computing users, and associated timing data, based on parameters or data received from disparate computing systems," with Application No. PCT/US24/10003 filed by the Applicant Inventor on Jan. 1, 2024.

This application incorporates by reference U.S. non-provisional application Ser. Nos. 18/402,683, 18/402,703, and 18/402,716 filed by the Applicant Inventor on Jan. 2, 2024.

This application incorporates by reference U.S. Provisional Application No. 63/436,582, filed on Dec. 31, 2022, U.S. Provisional Application No. 63/461,314, filed on Apr. 23, 2023, U.S. Provisional Application No. 63/543,101, filed on Oct. 8, 2023, and U.S. Provisional Application No. 63/546,235, filed on Oct. 29, 2023, for all purposes.

This application incorporates by reference U.S. Provisional Application No. 63/436,585, filed on Dec. 31, 2022, U.S. Provisional Application No. 63/461,315, filed on Apr. 23, 2023, U.S. Provisional Application No. 63/543,102, filed on Oct. 8, 2023, and U.S. Provisional Application No. 63/546,234, filed on Oct. 29, 2023, for all purposes.

This application incorporates by reference U.S. Provisional Application No. 63/436,587, filed on Dec. 31, 2022, U.S. Provisional Application No. 63/461,312, filed on Apr. 23, 2023, U.S. Provisional Application No. 63/543,101, filed on Oct. 8, 2023, and U.S. Provisional Application No. 63/546,235, filed on Oct. 29, 2023, for all purposes.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to explain the principles of the disclosed subject-matter and its practical applications, to thereby enable others skilled in the art to use the technology disclosed and various embodiments with various modifications as are suited to the particular use contemplated. It is appreciated that the term optimize/optimal and its variants (e.g., efficient or optimally) may simply indicate improving, rather than the ultimate form of 'perfection' or the like.

Furthermore, the functions or operations described above can be implemented in digital electronic circuitry, in computer software, firmware or hardware. In particular, the disclosed techniques can be implemented using one or more computer program products. The computer program products, in some embodiments, comprises non-transitory computer-readable media comprising code configured to execute the disclosed approach. Programmable processors and computers can be included in or packaged as mobile devices according to some embodiments. The processes and logic flows can be performed by one or more programmable processors and by one or more programmable logic circuitry. General and special purpose computing devices and storage devices can be interconnected through communication networks.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered the same object or step.

The terminology used in the description herein is for the purpose of describing particular embodiments and is not intended to be limiting. As used in the description of the disclosure and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including." "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting." depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

The invention claimed is:

1. A method for controlling a computing operation in a computing network, the method comprising:

providing a computing network usable by computing users registered with the computing network;

providing a timing network application usable by the computing users registered with the computing network, wherein the timing network application is used to modify electronic timing data;

determining, using one or more hardware computing device processors, a first user accesses, using a first computing device associated with the first user, the computing network;

enabling, using the one or more hardware computing device processors, the first user to create a first user profile;

determining, using the one or more hardware computing device processors, a second user accesses, using a second computing device associated with the second user, the computing network;

enabling, using the one or more hardware computing device processors, the second user to create a second user profile, wherein the second user profile comprises a first image or video, and wherein the second user profile is associated with a first location;

enabling, using the one or more hardware computing device processors, the second user to modify, using the timing network application, first electronic timing data, wherein the first electronic timing data comprises a first open time;

receiving, using the one or more hardware computing device processors, from the second user, a first electronic transmittables transmission amount indicator associated with a first electronic transmittables transmission amount, or a first item indicator associated with a first item electronic transmittables transmission amount, associated with closing the first open time;

executing, using the one or more hardware computing device processors, a first search operation, based on one or more first search parameters associated with the first user, wherein the one or more first search parameters comprises a first location-based search parameter;

generating, using the one or more hardware computing device processors, based on the first location-based search parameter, one or more first search results, wherein a first search result and a second search result are comprised in the one or more first search results;

transmitting, using the one or more hardware computing device processors, the one or more first search results to the first computing device of the first user, wherein the one or more first search results comprises at least a portion of the second user profile, wherein the first search result and the second search result are presented either sequentially or are arranged together on at least one interface;

receiving, using the one or more hardware computing device processors, from the first computing device associated with the first user, a first request to view the first electronic timing data associated with the second user;

transmitting, using the one or more hardware computing device processors, to the first computing device associated with the first user, at least a first portion of the first electronic timing data, wherein the at least the first portion of the first electronic timing data comprises the first open time, wherein the first open time is presented in a first visual state, and wherein the first electronic transmittables transmission amount indicator is displayed as being associated with the first open time or wherein the first item indicator is displayed as being associated with the first open time;

receiving, using the one or more hardware computing device processors, from the first computing device associated with the first user, a second request to view the at least the portion of the second user profile;

transmitting, using the one or more hardware computing device processors, to the first computing device associated with the first user, the at least the portion of the second user profile;

receiving, using the one or more hardware computing device processors, from the first user, a third request to close the first open time in the first electronic timing data;

executing, using the one or more hardware computing device processors, a preliminary computing operation for initiating transmission of at least the first electronic transmittables transmission amount, at least the first item electronic transmittables transmission amount, or a second electronic transmittables transmission amount equal to or greater than the first electronic transmittables transmission amount;

transmitting, using the one or more hardware computing device processors, verification data associated with the at least the first electronic transmittables transmission amount, the at least the first item electronic transmittables transmission amount, or the second electronic transmittables transmission amount to a processing application or server;

receiving, using the one or more hardware computing device processors, from the processing application or server, an indication that the preliminary computing operation is successfully executed;

in response to successful execution of the preliminary computing operation:

closing, using the one or more hardware computing device processors, at a first time, the first open time in the first electronic timing data, thereby resulting in a first closed time in the first electronic timing data, wherein the first closed time is presented in a second visual state different from the first visual state, wherein the first closed time occurs after the first time, transmitting, using the one or more hardware computing device processors, a first notification, associated with the first closed time in the first electronic timing data, to the second user or the second computing device, and transmitting, using the one or more hardware computing device processors, a second notification, associated with the first closed time in the first electronic timing data, to the first user or the first computing device;

determining, using the one or more hardware computing device processors, a third user accesses, using a third computing device associated with the third user, the computing network;

enabling, using the one or more hardware computing device processors, the third user to create a third user profile;

executing, using the one or more hardware computing device processors, a second search operation based on one or more second search parameters associated with the third user, wherein the one or more second search parameters comprises a second location-based search parameter;

generating, using the one or more hardware computing device processors, based on the second location-based search parameter, one or more second search results;

transmitting, using the one or more hardware computing device processors, the one or more second search results to the third computing device of the third user, wherein the one or more second search results comprises the at least the portion of the second user profile;

receiving, using the one or more hardware computing device processors, from the third computing device associated with the third user, a fourth request to view the at least the portion of the second user profile;

transmitting, using the one or more hardware computing device processors, to the third computing device associated with the third user, the at least the portion of the second user profile;

receiving, using the one or more hardware computing device processors, at a second time different from the first time and a third time, from the third computing device associated with the third user, a fifth request to view the first electronic timing data;

transmitting, using the one or more hardware computing device processors, to the third computing device associated with the third user, at least a second portion of the first electronic timing data or at least a third portion of the first electronic timing data, wherein one of:

the at least the second portion of the first electronic timing data or the at least the third portion of the first electronic timing data comprises the first closed time, wherein the first closed time is presented in the second visual state or a third visual state, or the at least the second portion of the first electronic timing data or the at least the third portion of the first electronic timing data does not comprise the first closed time;

providing, using the one or more hardware computing device processors, an option for the second user, and not for the third user, to modify, during a modification period, the first closed time, or data associated with the first closed time, in the first electronic timing data;

implementing a sequential order of the first search result and the second search result, or an arrangement of the first search result and the second search result, on a user interface, based on: a first activity, on the computing network, of a fourth user associated with the first search result or initiated by one or more first users directed to the fourth user associated with the first search result, and a second activity, on the computing network, of a fifth user associated with the second search result or initiated by the one or more first users, or one or more second users, directed to the fifth user associated with the second search result.

2. The method of claim 1, further comprising at least one of:

preventing the third user from transmitting a request to modify or close the first closed time in the first electronic timing data, providing an option for the first user, to modify, during the modification period, the first closed time in the first electronic timing data, providing a location recommendation associated with the first closed time, wherein the location recommendation is based on at least one of first user data associated with the first user, second user data associated with the second user, a second location associated with the first user, or the first location associated with the second user, providing a first activity user interface for the second user to view activity associated with the second user on the computing network, providing a second activity user interface for the first user or the second user to view electronic transmittables transmitted by the first user or closed periods associated with the first user during a period, providing the second user with a first option to transmit a first message to the first user prior to the first closed time, providing the second user with a second option to transmit a second message to the first user after the first closed time, providing the first user with a third option to transmit a third message to the second user prior to the first closed time, providing the first user with a fourth option to transmit a fourth message to the second user after the first closed time, providing the second user with a request to close a second open time in the first electronic timing data, providing a third activity user interface for the first user to view scheduled or completed activity associated with the first user, enabling export of the first closed time from the timing network application to a timing application, or import of a second closed time from the timing network application to the timing application, following the first closed time, providing an option for the second user to assign a first rating to the first user, following the first closed time, providing an option for the first user to assign a second rating to the second user, providing a first badge to the first user or the second user for completing a user profile verification status or a milestone associated with the computing network, providing an option for the second user, or the first user, to view an analytic or a statistic, associated with activity on the computing network, associated with the second user or the first user, providing an option for the first user or the second user to hide at least a first portion of the first user profile or a second portion of the second user profile, respectively, modifying or providing a first suggestion to modify the first electronic transmittables transmission amount or the first item electronic transmittables transmission amount based on execution of an intelligent operation, modifying or providing a second suggestion to modify the first electronic transmittables transmission amount or the first item electronic transmittables transmission amount based on current or prior activity of the second user, the first user, or a group of creator users, on the computing network, receiving, using the one or more hardware computing device processors, from the first computing device associated with the first user, a request to view the first electronic timing data associated with the second user, receiving, using the one or more hardware computing device processors, at a time different from the first time and the second time, from a computing device associated with a user, a request to view the first electronic timing data, wherein the second user sets a parameter associated with accepting the initiating the transmission of the first electronic transmittables amount, or the first item electronic transmittables transmission amount, for closing the first open time, wherein a user that does not meet the parameter cannot initiate transmission of the first electronic transmittables amount, or the first item electronic transmittables transmission amount, for closing the first open time, wherein the transmitting, using the one or more hardware computing device processors, to the first computing device associated with the first user, the at least the portion of the first electronic timing data, is based on executing a timing electronic transmittables computing operation based on a second electronic transmittables transmission amount indicator established automatically or by the second user, wherein the first closed time is associated with an in-person, video-based, or virtual meeting between the first user and the second user, preventing the second user from creating a second open time in the first electronic timing data less than or equal to a first duration after the first open time, preventing the second user from having a second open time occurring simultaneously with the first open time, receiving, from a mobile device of the second user, first verification data at least one of prior to, during, or after the first closed time, wherein the first user profile comprises a second image or video, and wherein the first user profile is associated with a second location, wherein the third user profile comprises a third image or video, and wherein the third user profile is associated with a third location, wherein in the first electronic timing data, the first open time is separated from a second open time by at least a duration, wherein the first user profile is associated with or comprises the second image or video, wherein the first item indicator is established by at least one of the first user or the second user, wherein the first item indicator comprises multiple first item indicators, wherein the first item indicator is associated with an item or a gift, wherein the first item indicator is part of a wish list, wherein the first electronic transmittables transmission amount indicator is associated with a minimum electronic transmittables transmission amount, wherein the second electronic transmittables transmission amount resulted from a bidding operation associated with the first open time, wherein the third request to close the first open time is transmitted to the second user prior to initiation of the preliminary computing operation, wherein approval of the third request to close the first open time is received from the second user prior to initiation of the preliminary computing operation, wherein first activity associated with the first user or the second user comprises a first amount of the first activity during a first period, or wherein second activity associated with the first user or the second user comprises a second amount of the second activity during the first period.

3. The method of claim 1, further comprising:

transmitting or enabling access to, using the one or more hardware computing device processors, to the second user, a first condition associated with the first closed time;

transmitting or enabling access to, using the one or more hardware computing device processors, to the first user, a second condition associated with a first notification period during or following the first closed time; and determining, using the one or more hardware computing device processors, during the first notification period, whether a notification is received from the first user, or whether the notification is automatically received based on an action or inaction associated with the second user or the first user, the notification indicating that the first condition of the first closed time was not satisfied.

4. The method of claim 3, further comprising:

in response to not receiving the notification during the first notification period, executing, using the one or more hardware computing device processors, a conclusive computing operation.

5. The method of claim 3, further comprising:

holding the first electronic transmittables transmission amount, the first item electronic transmittables transmission amount, or the second electronic transmittables transmission amount, in a first platform account until the first notification period or a first duration after the first notification period.

6. The method of claim 5, further comprising at least one of:

initiating releasing of at least a first portion of the first electronic transmittables transmission amount, the first item electronic transmittables transmission amount, or the second electronic transmittables transmission amount, to a first account associated with the second user after the first notification period or the first duration after the first notification period, initiating releasing of at least a second portion of the first item electronic transmittables transmission amount, the first item electronic transmittables transmission amount, or the second electronic transmittables transmission amount to the first account associated with the second user, or associated with a second platform account, after the first notification period or the first duration after the first notification period, or initiating releasing of at least the second portion or a third portion of the first item electronic transmittables transmission amount, or the second electronic transmittables transmission amount or a fourth portion of the second electronic transmittables transmission amount, to a second account associated with a merchant after the first notification period or the first duration after the first notification period, wherein the merchant initiates at least one of ordering or shipping of a first item associated with the first item electronic transmittables transmission amount.

7. The method of claim 6, wherein the first portion of the first electronic transmittables transmission amount is based on an activity or data associated with the second user on the computing network.

8. The method of claim 3, further comprising:

in response to receiving the notification during the first notification period, executing, using the one or more hardware computing device processors, a conflict resolution computing operation.

9. The method of claim 8, wherein the conflict resolution computing operation comprises:

accessing, using the one or more hardware computing device processors, at least one of verification data from the second user, or a log associated with the first closed time; and executing, using the one or more hardware computing device processors, based on the at least one of the verification data or the log, a conclusive computing operation.

10. The method of claim 1, further comprising:

adjusting, using a resource allocator, one or more computing operations executable in the computing network, based on at least one of: a computing load associated with the computing network, an available storage or memory associated with the computing network, a number or type of users associated with the computing network or online on the computing network, or a number or type of operations being executed or to be executed by the computing network, wherein the resource allocator is controlled by a basic input/output system (BIOS) or a resource-controlling system.

11. A method for controlling a computing operation in a computing network, the method comprising:

providing a computing network usable by computing users registered with the computing network;

providing a timing network application usable by the computing users registered with the computing network, wherein the timing network application is used to modify electronic timing data;

determining, using one or more hardware computing device processors, a first user accesses, using a first computing device associated with the first user, the computing network;

enabling, using the one or more hardware computing device processors, the first user to create a first user profile, wherein the first user profile comprises a first image or video, and wherein the first user profile is associated with a first location;

determining, using the one or more hardware computing device processors, a second user accesses, using a second computing device associated with the second user, the computing network;

enabling, using the one or more hardware computing device processors, the second user to create a second user profile, wherein the second user profile comprises a second image or video, and wherein the second user profile is associated with a second location;

enabling, using the one or more hardware computing device processors, the second user to modify, using the timing network application, first electronic timing data, wherein the first electronic timing data comprises a first open time;

executing, using the one or more hardware computing device processors, a first search operation, based on one or more first search parameters associated with the first user, wherein the one or more first search parameters comprises a first location-based search parameter;

generating, using the one or more hardware computing device processors, based on the first location-based search parameter, one or more first search results, wherein a first search result and a second search result are comprised in the one or more first search results;

transmitting, using the one or more hardware computing device processors, the one or more first search results to the first computing device of the first user, wherein the one or more first search results comprises at least a portion of the second user profile;

receiving, using the one or more hardware computing device processors, from the first computing device associated with the first user, a first request to view the first electronic timing data associated with the second user;

transmitting, using the one or more hardware computing device processors, to the first computing device associated with the first user, at least a first portion of the first electronic timing data, wherein the at least the first portion of the first electronic timing data comprises the first open time, wherein the first open time is presented in a first visual state;

receiving, using the one or more hardware computing device processors, from the first computing device associated with the first user, a second request to view the at least the portion of the second user profile;

transmitting, using the one or more hardware computing device processors, to the first computing device associated with the first user, the at least the portion of the second user profile;

receiving, using the one or more hardware computing device processors, from the first user, a third request to close the first open time in the first electronic timing data;

closing, using the one or more hardware computing device processors, at a first time, the first open time in the first electronic timing data, thereby resulting in a first closed time in the first electronic timing data, wherein the first closed time is presented in a second visual state different from the first visual state, wherein the first closed time occurs after the first time;

transmitting, using the one or more hardware computing device processors, a first notification, associated with the first closed time in the first electronic timing data, to the second user or the second computing device;

transmitting, using the one or more hardware computing device processors, a second notification, associated with the first closed time in the first electronic timing data, to the first user or the first computing device;

determining, using the one or more hardware computing device processors, a third user accesses, using a third computing device associated with the third user, the computing network;

enabling, using the one or more hardware computing device processors, the third user to create a third user profile;

executing, using the one or more hardware computing device processors, a second search operation based on one or more second search parameters associated with the third user, wherein the one or more second search parameters comprises a second location-based search parameter;

generating, using the one or more hardware computing device processors, based on the second location-based search parameter, one or more second search results;

transmitting, using the one or more hardware computing device processors, the one or more second search results to the third computing device of the third user, wherein a third search result and a fourth search result are comprised in the one or more second search results, wherein the third search result and the fourth search result are presented either sequentially or are arranged together on at least one interface of the third computing device of the third user, and wherein the one or more second search results comprises the at least the portion of the second user profile;

receiving, using the one or more hardware computing device processors, from the third computing device associated with the third user, a fourth request to view the at least the portion of the second user profile;

transmitting, using the one or more hardware computing device processors, to the third computing device associated with the third user, the at least the portion of the second user profile;

receiving, using the one or more hardware computing device processors, at a second time different from the first time and a third time, from the third computing device associated with the third user, a fifth request to view the first electronic timing data;

transmitting, using the one or more hardware computing device processors, to the third computing device associated with the third user, at least a second portion of the first electronic timing data or at least a third portion of the first electronic timing data, wherein one of:

the at least the second portion of the first electronic timing data or the at least the third portion of the first electronic timing data comprises the first closed time, wherein the first closed time is presented in the second visual state or a third visual state, or the at least the second portion of the first electronic timing data or the at least the third portion of the first electronic timing data does not comprise the first closed time;

providing, using the one or more hardware computing device processors, an option for the second user, and not for the third user, to modify, during a modification period, the first closed time in the first electronic timing data;

implementing a sequential order of the first search result and the second search result, or an arrangement of the first search result and the second search result, on a user interface, based on: a first activity, on the computing network, of a fourth user associated with the first search result or initiated by one or more first users directed to the fourth user associated with the first search result, and a second activity, on the computing network, of a fifth user associated with the second search result or initiated by the one or more first users, or one or more second users, directed to the fifth user associated with the second search result.

12. The method of claim 11, further comprising at least one of:

adjusting, using a resource allocator, one or more computing operations executable in the computing network, based on at least one of: a computing load associated with the computing network, an available storage or memory associated with the computing network, a number or type of users associated with the computing network or online on the computing network, or a number or type of operations being executed or to be executed by the computing network, wherein the resource allocator is controlled by a basic input/output system (BIOS) or a resource-controlling system, or adjusting, using the resource allocator, one or more available operations available to the first user or the second user, or transferring data from a first memory or storage location to a second memory or storage location, in the computing network, based on at least one of: the computing load associated with the computing network, the available storage or memory associated with the computing network, the number or type of users associated with the computing network or online on the computing network, or the number or type of operations being executed or to be executed by the computing network.

13. The method of claim 11, further comprising: adjusting, using a resource allocator, one or more computing operations executable in the computing network, based on at least one of: a computing load associated with the computing network, an available storage or memory associated with the computing network, a number or type of users associated with the computing network or online on the computing network, or a number or type of operations being executed or to be executed by the computing network, wherein the resource allocator is controlled by a basic input/output system (BIOS) or a resource-controlling system.

14. The method of claim 11, further comprising preventing the second user from setting a second open time in the first electronic timing data less than or equal to a first duration after the first open time.

15. The method of claim 11, wherein one or more application functions available to the first user or the second user is based on a type of device or operating system used for accessing the computing network.

16. The method of claim 11, further comprising:

initiating presentation of an interface or a stack comprising creators, wherein the second user is comprised in the creators, wherein the first user is comprised in non-creator users, wherein the creators are arranged or presented in an order, at least one of:

based on a first activity of at least some of the creators, based on a second activity of at least some of the non-creator users with one or more profiles of the creators, wherein the second activity comprises a number or frequency of messages, likes, interactions, or views, or based on an age of an account associated with a creator such that a first account created after the second account is displayed either prior to or after the second account in the stack or such that the first account created after the second account is displayed more prominently or less prominently on the interface.

17. The method of claim 11, further comprising recording an activity of the second user, wherein the activity comprises at least one of a number of views of the second user profile or content associated with the second user profile, an average or total duration of users viewing the second user profile or the content associated with the second user profile, an average or total number of interactions with the second user by other users, a number of followers following the second user, a number of subscribers subscribed to the second user, a number of connections of the second user, a number of closed periods successfully completed by the second user during a period, an average number of closed periods successfully completed by the second user during a period, a total number of electronic transmittables received by the second user during a period, an average number of electronic transmittables received by the second user during a period, an average or total duration of time spent on the computing network by the second user or a sixth user managing an account associated with the second user, a total or average number of messages received by the second user during a period, a total or average number of subscriptions received by the second user during a period, a total or average number of tips or gifts received by the second user during a period, a total or average number of content unlocks received by the second user during a period, an age of the account of the second user, or a rating received by the second user during a period.

18. The method of claim 11, further comprising:

following a first duration after the first closed time, at least one of:

transmitting, to the first user or the first computing device, a message on behalf of the second user, providing a first option for the first user to request closing of a second open time in the first electronic timing data, or providing a second option for the first user to request closing of a recurring third open time in the first electronic timing data.

19. The method of claim 11, wherein at least one of:

the first closed time is associated with a communication session between the first user and the second user, the one or more first search parameters comprises a first time-based search parameter, the first open time comprises at least one of a minute, an hour, a day, or a week, the first computing device comprises at least one of a first mobile device, a first laptop, a first desktop, a first wearable device, or a first tablet, the first user profile comprises data generated using an intelligence operation or based on a learning model, the first location associated with the first user comprises a first city or country, the second location comprises the first city or country or a second city or country, and a third location associated with the third user profile comprises the first city or country, the second city or country, or a third city or country, the first closed time is associated with a location selected by at least one of the first user or the second user, or a first search parameter further comprises a user category.

20. The method of claim 11, wherein the first closed time is associated with an in-person meeting between the first user and the second user.

21. The method of claim 11, further comprising at least one of:

receiving from the first computing device or a mobile device of the first user, first verification data at least one of prior to, during, or after the first closed time, wherein the first verification data comprises at least one of a signature, a photograph, a fingerprint, verification data, or location data, associated with the first user or the second user; or receiving at least one of a text, an image, a video, or a link from the second computing device or the second user, wherein the second user profile is generated based on the at least one of the text, the image, the video, or content associated with the link.

22. The method of claim 11, further comprising providing an option for the first user to at least one of: send a message to the second user, open a first communication channel for a first duration at least one of prior to the first closed time or after the first closed time, open a second communication channel, based on execution of a communication channel transmittables operation, for a second duration at least one of prior to the first closed time or after the first closed time, unlock an image, a video, or a text associated with the second user, or subscribe to the second user profile of the second user, based on initiating, by the first user, execution of a preliminary computing operation for initiating transmission of at least an electronic transmittables transmission amount, wherein the electronic transmittables transmission amount is set by the second user.

23. The method of claim 11, further comprising:

enabling, using the one or more hardware computing device processors, a sixth user to create a fourth user profile, wherein the second user provides approval for the sixth user to manage one or more functions associated with the second user.

24. The method of claim 11, wherein the closing, using the one or more hardware computing device processors, at the first time, the first open time in the first electronic timing data, thereby resulting in the first closed time in the first electronic timing data, is based on:

determining approval, associated with the second user, to close the first open time in the first electronic timing data, based on a condition established by or for the second user, or transmitting, using the one or more hardware computing device processors, to the second user or the second computing device, the third request to close the first open time in the first electronic timing data, and receiving approval, from the second user, to close the first open time in the first electronic timing data.

25. The method of claim 11, at least one of:

wherein the sequential order of the first search result and the second search result, or the arrangement of the first search result and the second search result, on the user interface, is modifiable based on an option selected by the first user, or wherein the one or more first search parameters comprises a first time-based search parameter such that the first electronic timing data, or the first open time, satisfies the first time-based search parameter, or further comprising executing, using the one or more hardware computing device processors, a preliminary computing operation for initiating transmission of a first electronic transmittables transmission amount, transmitting, using the one or more hardware computing device processors, verification data associated with the first electronic transmittables transmission amount to a processing application or server, and receiving, using the one or more hardware computing device processors, from the processing application or server, an indication that the preliminary computing operation is successfully executed.

26. The method of claim 11, wherein during the first closed time, the first user is located at least one of within five feet of the second user, at substantially a same location as the second user, within one hundred feet of the second user, or wherein during the first closed time, the first user is on a video conference with the second user.

27. The method of claim 11, further comprising at least one of:

transmitting, using the one or more hardware computing device processors, to the second user, the third request to close the first open time in the first electronic timing data, and receiving, using the one or more hardware computing device processors, from the second user, approval to close the first open time in the first electronic timing data, tracking or receiving a location of the second user or the first user at least one of prior to, during, or after the first closed time, initiating presentation of an interface comprising at least one creator, wherein at least two creators are arranged or presented in an order based on a first activity of a first creator in the at least two creators and a second activity of a second creator in the at least two creators, or based on a second activity of at least some users with one or more profiles of the first creator or the second creator, in response to closing the first open time, the first electronic timing data for a period or day associated with the first closed time is altered or not visible to the first user, wherein the first closed time is associated with a location selected by at least one of the first user or the second user, receiving from a mobile device of the first user, verification data at least one of prior to, during, or after the first closed time, wherein the verification data indicates that the mobile device of the first user is present near a location selected by at least one of the first user or the second user at least one prior to, during, or after the first closed time, wherein the verification data provides at least one of a signature, a photo, or a fingerprint associated with the first user or the second user in a form or transmission submitted as part of the verification data, wherein a conclusive computing operation is executed further based on processing verification data, wherein the conclusive computing operation is executed upon expiration of a first notification period, receiving from a mobile device of the second user, verification data at least one of prior to, during, or after the first closed time, wherein the verification data indicates that the mobile device of the second user is present near a location selected by at least one of the first user or the second user at least one prior to, during, or after the first closed time, wherein the verification data provides at least one of a signature, a photo, or a fingerprint associated with the first user or the second user in a form or transmission submitted as part of the verification data, wherein a first notification period ends a first duration after the first closed time, wherein a first notification period ends when the first closed time ends, wherein the at least the portion of the second user profile associated with the second user comprises a photo or video captured or uploaded by the second user or an Internet or application link provided by the second user, wherein the at least the portion of the second user profile associated with the second user comprises a live or recorded video stream associated with the second user, enabling the first user to swipe through a stack comprising a fourth user profile associated with the fourth user and a fifth user profile associated with the fifth user, wherein the fourth user profile comprises at least one of an image, a video, or a live or recorded video stream associated with the fourth user, and wherein the fifth user profile comprises at least one an image, a video, or a live or recorded video stream associated with the fifth user, wherein a video on the second user profile loops on a user interface displaying the video unless the first user selects an option that stops looping of the video, providing a comments interface for the first user to add a comment associated with the at least the portion of the second user profile, providing an option for the first user to indicate an emotion or reaction associated with the at least the portion of the second user profile, wherein comments associated with the at least the portion of the second user profile are sortable, wherein comments associated with the at least the portion of the second user profile are arranged based on a number of emotions or reactions received for at least some comments in the comments, transmitting, to the first computing device of the first user, a location associated with the first open time, wherein the location is selected or input by the second user, transmitting, to the second computing device of the second user, a location associated with the first open time, wherein the location is selected or input by the first user, either prior to or after receiving the third request to close the first open time, providing a recommendation of a location to the first user or the second user, based on user data or a user preference associated with the first user or the second user, wherein the at least the portion of the second user profile is displayed on at least one first user interface, and wherein the first open time is displayed on the at least one first user interface or on at least one second user interface, wherein the at least the portion of the second user profile is displayed on at least one first user interface, and wherein an amount of a first electronic transmittables for closing the first open time is displayed on the at least one first user interface or on at least one second user interface, wherein a portion of a first electronic transmittables is donatable to a charity entity based on a setting established by the first user, wherein a portion of a first electronic transmittables is donatable to a charity entity based on a setting established by the second user, providing an option to the first user to view the first electronic timing data associated with the second user, providing an option for the first user to access second electronic timing data associated with the first user, and establishing a second open time in the second electronic timing data, providing an option for the first user or the second user to establish a parameter for a target user or automatically establishing the parameter for a target user, initiating display of, on a user interface showing second electronic timing data of the first user, at least a portion of a user profile of the fourth user, wherein the portion of the user profile of the fourth user comprises a video or an image associated with the fourth user, wherein the fourth user meets a parameter for a target user provided by the first user or automatically established for the first user, wherein the fourth user established a third open time in a third electronic timing data associated with the fourth user that overlaps with the second open time established by the first user in the second electronic timing data, wherein the at least the portion of the second user profile of the second user is displayed to the first user based on accessing the first electronic timing data of the second user and determining whether the first open time is open in second electronic timing data of the first user, determining whether a conflict with the first open time is present in second electronic timing data of the first user, and in response to determining the conflict with the first open time is present in the second electronic timing data of the first user, disabling or not enabling the first user from selecting an option to close the first open time in the first electronic timing data of the second user, receiving at least one matching parameter from the second user, wherein the matching parameter comprises at least one of a distance or location, a minimum income or an income range, a net worth of a user, a facial or body feature of a user, a background, an education, a personal or professional status of a user, an age of an account, or an activity in the computing network, wherein a portion of the first user profile of the first user is displayed in or as a search result resulting from a matching search executed by or for the second user based on a matching parameter received from or established for the second user, wherein the first user is enabled to initiate a preliminary computing operation based on the first user matching a matching parameter received from or established for the second user, wherein a sixth user is blocked from initiating a preliminary computing operation for closing a second open time in the first electronic timing data based on the fourth user not matching a matching parameter received from or established for the second user, wherein a first condition associated with executing a conclusive computing operation comprises the first user being present at a location at a starting time of approximately the first closed time and at an ending time of approximately the first closed time or a second closed time following the first closed time, enabling presentation of a user interface on a mobile device of the second user, enabling presentation of a user interface on a mobile device of the second user, wherein the user interface comprises a form, enabling presentation of a user interface on a mobile device of the second user, wherein the user interface is available based on or in response to determining a location of the mobile device of the second user being near a location associated with the first closed time, enabling presentation of a user interface on a mobile device of the second user, wherein the user interface is available based on determining a location of the mobile device of the second user being near a location associated with the first closed time, wherein the user interface is presented on the mobile device of the second user in response to the mobile device, or a computing device, transmitting a location of the mobile device, enabling presentation of a user interface on a mobile device of the second user, wherein prior to, during, or after a closed period, the user interface, displayed on the mobile device of the second user, receives a signature or input data of or associated with the first user or the second user, wherein an amount of electronic transmittables associated with a first electronic transmittables transmission amount, a first item electronic transmittables transmission amount, or a second electronic transmittables transmission amount is presented on a user interface associated with the first computing device of the first user or the second computing device of the second user, wherein prior to, during, or after a closed time, a user interface, displayed on a mobile device of the second user, receives information, wherein the information comprises or is based on at least one of a code associated with an electronic transmittables mechanism associated with the first user, a zip code associated with the first user, a fingerprint of the first user, a captured image or video of at least one of the first user or the second user, wherein the user interface is not available prior to or during a first duration of the first closed time, wherein the user interface is available after or during a second duration of the first closed time, wherein the second duration occurs after the first duration, receiving a completed form based on input received from the second user on a user interface on a mobile device of the second user, transmitting a completed form to a verification system to verify at least some information comprised in the completed form, prompting the second user to attach or input, or attaching or inputting, location data or time data to a completed form, wherein the time data comprises a time of transmission of the completed form from a mobile device of the second user, wherein the location data comprises an approximate location of the mobile device of the second user at the time of the transmission of the completed form from the mobile device of the second user, comparing information in a completed form to at least some information accessible to a verification system, wherein the at least some information comprises at least one of a code, a zip code, a signature, a fingerprint, or a facial feature from an image or a video, enabling execution of a short-range computing operation between a mobile device associated with the first user and a mobile device associated with the second user, wherein the short-range computing operation comprises at least one of a Bluetooth or a near field communication (NFC) operation, enabling execution of a computing operation between a mobile device associated with the first user and a mobile device associated with the second user, wherein the computing operation comprises at least one of a Wi-Fi or a cellular operation, enabling execution of a computing operation between a mobile device associated with the first user and a mobile device associated with the second user, such that based on information transmitted from an account of the first user to at least one of an account of the second user or a holding account associated with the computing network, a form presented on an interface is signed or dated using a digital signature of at least one of the first user or the second user, arranging an icon associated with the fourth user, associated with the first search result, on a user interface of the first computing device based on activity on the computing network directed to or initiated by the fourth user displayed in the icon, wherein the activity on the computing network comprises a number of views of a profile of the fourth user, an average or total duration of viewing the profile of the fourth user, an average or total number of interactions with the fourth user, or with content associated with the fourth user, by other users, a number of followers following the fourth user, a number of subscribers subscribed to the fourth user, a number of connections of the fourth user, a number of closed times successfully completed by the fourth user during a period, an average number of closed times successfully completed by the fourth user during a period, a frequency or number of content items uploaded by the fourth user, a total or average number of electronic transmittables or items successfully received by the fourth user during a period, an average number of electronic transmittables per closed period received by the fourth user during a period, a demand associated with the fourth user, an age of an account associated with the fourth user, a total or average number of messages or reactions received by or sent by the fourth user during a period, a total or average number or duration of subscriptions received by the fourth user during a period, a total or average number of tips or gifts received by the fourth user during a period, a total or average duration spent by the fourth user on the computing network, a total or average number of comments received by the fourth user during a period, or a total number of shares owned by the fourth user in an entity managing the computing network, initiating, upon closing of the first open time, transmission to the first user or the second user, one or more suggested locations associated with the first closed time based on at least one of the first location associated with the first user or the second location associated with the second user, or based on location history of prior closed periods associated with at least one of the first user or the second user, receiving a selection of a first location, from at least one of the first user or the second user, from one or more suggested locations, prompting the first user to execute a computing operation to reserve a first location or an activity associated with a first location, wherein one or more suggested locations are based on user data associated with at least one of the first user or the second user, wherein one or more suggested locations are based on an amount of electronic transmittables associated with a closed time, receiving a first location data and a first time data associated with the second user periodically prior to, during, and after the first closed time, and adding the first location data and the first time data to a log associated with the second user or associated with the first closed time, transmitting a notification to the second user to turn on a location tracking device in a mobile device associated with the second user in response to determining the location tracking device in the mobile device is not turned on, at least one of prior to, during, or after the first closed time, wherein the location tracking device comprises a Bluetooth device, an Internet connecting device, a cell tower connecting device, or a GPS device, receiving a first location data and a first time data associated with the first user periodically prior to, during, and after the first closed time, and adding the first location data and the first time data to a log associated with the first user or associated with the first closed time, transmitting a notification to the first user to turn on a location tracking device in a mobile device associated with the first user in response to determining the location tracking device in the mobile device is not turned on, at least one of prior to, during, or after the first closed time, comparing first user location data associated with the first user or second user location data associated with the second user, with closed time location data associated with the first closed time, to determine whether a condition associated with the first closed time or associated with executing a conclusive computing operation is met, comparing first user location data associated with the first user or second user location data associated with the second user, with closed time location data associated with the first closed time, to determine whether a mobile device of the first user or a mobile device of the second user, respectively, is near the closed time location data, tracking movement of a mobile device of the first user or the second user during, prior to, and after the first closed time, wherein the movement is tracked using an accelerometer comprised in the mobile device, or wherein the movement is tracked using at least one of the accelerometer or a GPS device comprised in the mobile device, determining whether a mobile device of the first user or the second user is moving or is substantially stationary at a particular time during the first closed time, counting a step of the first user or the second user prior to, during, or after the first closed time, based on data received from a mobile device of the first user or the second user, respectively, executing a generative artificial intelligence (AI) operation using first data associated with one or more computing operations executed in the computing network, generating at least one of profile data, an image, or a video for visual display in the computing network using a generative AI operation, prompting the first user or the second user to capture a substantially real-time image or video, transmitting profile information associated with the first user or the second user to a verification system, receiving an indication from a verification system regarding an assessment of profile information associated with the first user or the second user, wherein a notification period begins at a start of the first closed time, or after the start of the first closed time, and ends after an end of the first closed time, providing a first user interface for visual display on the first computing device associated with the first user, wherein the first user interface indicates upcoming closed periods and one or more suggestions of users based on at least one of an availability or open times of the first user, an activity on the computing network or a timing application of the first user, an activity or open times of a suggested user, a rating associated with the first user or the suggested user, an amount of electronic transmittables transferred from the first user for a period on the computing network, a preference established by the first user or the suggested user, or an update associated with the first user or the suggested user on the computing network, encrypting or packaging data prior to transmission on the computing network, decrypting or unpackaging data upon receipt on the computing network, providing a cloud-based security agent to monitor data on the computing network, providing an intelligent agent to learn a user's preference or activity on the computing network, providing a mobile application to access the computing network, providing a mobile application to access the first electronic timing data or second electronic timing data, providing a website, a tablet application, or a desktop application to access at least one of the computing network, the first electronic timing data, or second electronic timing data, performing one or more AI/machine learning (ML) operations based on one or more data, wherein data collected from the computing network comprises at least one of content; a photo; a video; a selecting, clicking, searching, or computing activity on the computing network; a selecting, clicking, searching, or computing activity outside the computing network; a selecting, clicking, searching, or computing activity on a searching or social media platform or network; a rating; a comment; a term or condition of usage of the computing network; a law, rule, or regulation or a jurisdiction in which the computing network is being used; or an amount of electronic transmittables, executing at least one of a computing operation, an intelligent computing operation, or a machine or model learning computing operation, or training a language model or large language model based on at least of: user content, a photo, a video, a clicking or selecting activity on the computing network, an activity outside the computing network, a rating received from or provided to a user, a comment provided to or received from a user, a term or account age associated with using the computing network, a condition associated with using the computing network, a rule associated with using the computing network, a private or public regulation, a law of a country, a law of a city, a law of a state, a local law, a contract between users or between a user and an entity, price or electronic transmittables data, price change or electronic transmittables change data, a user's personal information such as at least one of a name, a location, a distance, asset information, real estate information, or paycheck information, user history on the computing network, computing operation history on the computing network, history of watching live streams, data associated with a live stream, history of liking or interacting with content, content interaction data, data associated with sending messages, data associated with booking dates or closing open times, data associated with calendars or electronic timing data, data associated with unlocking content, data associated with subscribing to content, data associated with types of posted content, data associated with frequency of posted content, data associated with events, data associated with messaging history, data associated with mass messaging, or automated messaging, to multiple users, data associated with types of messages, data associated with amount of electronic transmittables or items earned by a user, data associated with amount of electronic transmittables spent by a user, data associated with third party integrations into the computing network, data associated with how many or identity of followers associated with a user, data associated with how many or identity of subscribers, data associated with a background or verification check of a user, data associated with personal information of a user, data associated with personal public information associated with a user, data associated with custom messages or requests sent or received by users, data associated with electronic transmittables transmission or receipt history associated with a user, data associated with open time or closed time history associated with a user, data associated with account age associated with a user, data associated with users recruited or referred by a user, data associated with referrals associated with a user, data associated with electronic transmittables transmitted to a user based on activity of the user on the computing network, data associated with bonuses or tips earned by a user, data associated with membership status or history of a user, a previous or a current term or condition associated with the computing network, data associated with new or previous regulations associated with the computing network, data associated with a change to an application or a function associated with the computing network, data associated with information, including behavior information, or protocol associated with a meeting associated with a closed period, data associated with photoshoots associated with a user, data associated with recognitions or badges earned by user based on verification data or amount of electronic transmittables transmitted or received, location data, distance data associated with a location, driving or transportation history associated with a user, punctuality associated with a user, agreements executed by a user, electronic transmittables or closed time history associated with a user or associated with a location or time, automatic or user-entered changes to electronic transmittables amounts associated with open times, supply of open times or users or demand for open times or user statistics associated with a location or a time, safety information, safety protocol information, psychological data, facial recognition data, image or content manipulation data, metadata associated with content, beauty application data, timestamp data, voice command data, advertisement data, advertisement-related data, data associated with questions submitted to the computing network, imported data, typed data, or stock content data, initiating display of or generating new data based on collected data from the computing network, training a computing model based on a voice of a user and enabling the user to transmit a voice message, a periodic voice message, a custom voice message in response to a question, in the voice of the user, enabling a user to bulk or mass follow multiple users based on providing identifying information associated with the multiple users, enabling a user to bulk or mass follow multiple users, using a single command, based on providing identifying information associated with the multiple users, enabling a user to bulk or mass follow multiple users, without individually having to select an option to follow each of the multiple users, based on providing identifying information associated with the multiple users, wherein a first user interface provides a search function or a browse function, wherein a search function is executed based on a parameter input by the first user, wherein a browse function comprises one or more categories, wherein one or more application functions available to the first user or the second user is based on a type of device or operating system used for accessing the computing network, wherein one or more application functions available to the first user or the second user is based on whether a desktop or laptop website, a tablet website, a mobile device website, a tablet application, or a mobile application is used for accessing the computing network, wherein one or more application functions available to the first user or the second user is based on a location or a setting associated with the first user or the second user, respectively, wherein one or more categories associated with classification of the first user or the second user comprises an education category, a popularity or celebrity category, a model category, an athlete category, a number of followers category, a profession category, an endorsements category, a sports category, a social media presence category, an intelligence category, a location category, an earnings on the computing network, a category, or a looks category, wherein an arrangement of categories on a first user interface is based on user data associated with the first user, using an artificial intelligence (AI) or machine learning (ML) operation to present suggested users on a user interface of the first computing device, or on a second user interface of the second computing device, displaying the first electronic timing data, wherein an AI or ML operation analyzes data or activity history associated with multiple users on the computing network, providing a user interface for visual display on the second computing device associated with the second user, wherein a notification period is less than or equal to half of a duration of the first closed time, comparing the first electronic timing data with second electronic timing data of the first user, and providing, to the first user, the second user as a suggested user and an open period as a suggested time, wherein the open period is open in both the first electronic timing data and the second electronic timing data, receiving a first application, comprising application data, prior to being approved to perform one or more computing operations in the computing network, associated with the second user, and transmitting at least a portion of the first application to a verification system, requesting additional data from the second user, receiving an application, comprising application data, prior to being approved to perform one or more computing operations in the computing network, associated with the first user, and transmitting at least a portion of the application to a verification system, requesting additional data from the first user, collecting user data from or associated with the first user or the second user, wherein the user data comprises user input, a user document, user activity on the computing network, user search history on the computing network, user like or follow history on the computing network, account age, age, or a rating, receiving, from the second user, a rating for the first user following the first closed time, receiving, from the first user, a rating for the second user following the first closed time, transmitting, within a period after the first closed time, a notification to the second user prompting the second user to rate the first user or provide a comment about the first user, transmitting, within a period after the first closed time, a notification to the second user prompting the second user to approve transmission of a message to the first user, the message indicating or inviting the first user to close an open period in the first electronic timing data, prior to, during, or after the first closed time, receiving location data from a mobile device associated with the second user, and recording the location data in a log associated with the first closed time or associated with the first user or the second user, in response to receiving a notification during a first notification period, enabling a sixth user to access a log, or accessing the log, associated with the first closed time or associated with the first user or the second user, accessing or enabling access to a log associated with the first closed time or associated with the first user or the second user, determining first location data from a log associated with the first closed time or associated with the first user or the second user, in response to first location data from a log at least partially matching second location data associated with a location, transmitting a matching notification to the first user, determining whether a notification is received from the first user, and in response to determining the notification is not received from the first user, executing a first conclusive computing operation, accessing a log and determining first location data is absent from the log, and in response to the first location data being absent from the log, transmitting a notification to the first user, transmitting a notification to the second user, and executing a conclusive computing operation, wherein the conclusive computing operation comprises initiating transmission of at least some electronic transmittables to an account associated with the first user, prior to, during, or after the first closed time, receiving location data from a mobile device associated with the first user or the second user, and recording the location data in a log associated with the first closed time, prior to, during, or after the first closed time, receiving image data from a mobile device associated with the first user or the second user, and recording the image data in a log associated with the first closed time, wherein the image data comprises at least one of receipt data associated with a purchase at a location associated with the first closed time, or wherein the image data comprises image data associated with the location or of at least one of the first user or the second user, prior to, during, or after the first closed time, receiving first location data from a mobile device associated with the first user or the second user; prior to, during, or after the first closed time, receiving second location data from a mobile device associated with the first user or the second user; and comparing the first location data with the second location data, wherein the first location data comprises a first location at a fourth time prior to a start of the first closed time or after the start of the first closed time, and the second location data comprises a second location at a fifth time prior to an end of the first closed time or after the end of the first closed time, wherein the first location data or the second location data comprises at least one of a check-in location, Global Positioning System (GPS) coordinates data, cellular tower data, network location data, social network-based location data, location metadata associated with an image received from the first mobile device or the second mobile device, or a user-inputted location data; determining whether a partial match exists between the first location data and the second location data, and in response to determining the partial match exists, transmitting a notification to the first user or the second user, prior to, during, or after the first closed time, receiving image data from a mobile device associated with the second user, recording the image data in a log associated with the first closed time or associated with the second user, wherein the image data comprises at least one of a time of capture of the image data, device or user data associated with the image data, or location data associated with the image data, analyzing image data to determine a location of the first user or the second user during or at the first closed time, and comparing the image data with Internet data associated with the location, preventing a sixth user from viewing or requesting to close a second open time in the first electronic timing data in response to determining the sixth user has a conflicting closed period in second electronic timing data associated with the sixth user, wherein the computing network comprises one or more computing devices or servers, wherein the one or more computing devices or servers are stored in one or more locations, wherein the one or more locations comprises one or more geographically dispersed locations, wherein a visual state indicates a conflict with a closed time in a second electronic timing data associated with the third user, wherein the first user is unable to request the close the first open time if a conflict exists with a closed time in second electronic timing data associated with the first user, wherein a mobile device of the first user is the first computing device, wherein a mobile device of the first user is different from the first computing device, wherein a mobile device of the second user is the second computing device, wherein a mobile device of the second user is different from the second computing device, wherein the second user is unable to modify the first closed time after the modification period, wherein the first user is unable to modify the first closed time after the modification period, wherein the first user is unable to modify the first closed time during the modification period, wherein the second user is able to modify the first closed time during the modification period, providing a countdown timer to the first closed time, wherein the countdown timer is presented to the first user or the second user, wherein at least one of the second time or the third time is associated with a duration comprising at least one of one or more seconds, one or more minutes, one or more hours, one or more days, one or more weeks, one or more months, or one or more years, wherein, during the first closed time, the second computing device, a mobile device associated with the second user, or the second user is in proximity to a location associated with the first closed time, wherein, during the first closed time, the first computing device, a mobile device associated with the first user, or the first user is in proximity to a location associated with the first closed time, wherein, during the first closed time, the first computing device, a mobile device associated with the first user, or the first user is in proximity to the second computing device, a mobile device associated with the second user, or the second user, wherein the third user cannot execute an action with regard to the first closed time, wherein the modification period ends prior to, at, or after a time prior to the first closed time, transmitting a notification associated with modification of the first closed time to the first user or the first computing device, receiving a first search parameter from the first computing device of the first user, determining at least one of a location or a time zone of the first user, receiving a first search request from the first computing device of the first user, wherein a search operation is executed based on the first search request, wherein the at least the first portion of the first electronic timing data is transmitted to or made available for display to the first user based on at least first profile content of the first user profile being verified or second profile content of the second user profile being verified, requesting one or more verification data from the first user, receiving one or more verification data from the first user, the one or more verification data comprises at least one of age-related data, income-related data, net worth-related data, assets-related data, identification-related data, employment-related data, or location-related data, recording activity or history of at least one of the first user, the second user, or the third user, wherein the at least the second portion of the first electronic timing data is transmitted to or made visible to the third user in response to electronic transmittables being transmitted from an account associated with the third user, wherein at least a portion of the electronic transmittables are transmitted to an account associated with the second user, updating the first electronic timing data in substantially real-time based on input received from at least one of the first user, the second user, or the third user, wherein an update associated with the first electronic timing data is synchronized with second electronic timing data on the second computing device or associated with a first mobile application being executed on the second computing device, wherein the first electronic timing data comprises at least one fixed or recurring period, wherein the first electronic timing data comprises at least one closed period that is not modifiable by the second user, receiving a request, from the second computing device of the second user, to set an open period, associated with a first duration, in the first electronic timing data, receiving a request, from the second computing device of the second user, to set an open period, associated with a first location, in the first electronic timing data, receiving a request, from the first computing device of the first user, to set a blocked period, associated with a first duration, in second electronic timing data of the first user, wherein the first duration is established by the first user or the second user, receiving a request, from the first computing device of the first user, to set a blocked period or a periodic blocked period, associated with a first duration, in the first electronic timing data of the second user, based on the first user initiating an electronic transmittables transmission to the second user, receiving a request, from the first computing device of the first user or from the second user, to set a blocked period or a periodic blocked period, associated with a first duration, in second electronic timing data of the first user, based on the first user initiating an electronic transmittables transmission to the second user, receiving a request, from the first computing device of the first user, to set a first periodically blocked period, associated with a first duration, in the first electronic timing data of the second user, wherein second electronic timing data associated with the first user comprises a first closed period and a second closed period, wherein a visual state of the first closed period comprises a first user image, and wherein a visual state of the second closed period comprises a second user image, wherein the first user image comprises a first creator, and wherein the second user image comprises a second creator, wherein the first electronic timing data associated with the second user comprises a first closed period and a second closed period, wherein a visual state of the first closed period comprises a first user image, and wherein a visual state of the second closed period comprises a second user image, wherein the first user image comprises a sixth user, and wherein the second user image comprises a seventh user, wherein second electronic timing data associated with the first user, or the first electronic timing data associated with the second user, comprises a first closed period and a second closed period, wherein a visual state of the first closed period comprises a first user image, and wherein a visual state of the second closed period comprises a second user image, wherein the first search operation comprises a first matching operation, wherein the one or more first search parameters comprises at least one of a location, an age, an availability, a facial feature, a body feature, a height, an interest, a social preference, an activity, a personality trait, a computing history, a user status, a subscription status, a verification status, a distance, an availability, an amount or range amount of electronic transmittables, a price, a price range, a popularity on a platform, or an objective, wherein the one or more first search parameters are automatically determined, wherein the first open time is associated with a location, wherein a location is selected, by the second user, from a list of one or more locations, wherein one or more locations comprise at least one or more of restaurants, bars, amusement parks, sightseeing establishments, museums, activity establishments, or sports arenas, transmitting a notification to a first location computing device associated with a first location, the notification comprising first user information associated with the first user or second user information associated with the second user, wherein the first closed time is associated with a location, wherein a location is selected, by the first user or the second user, from a list of one or more locations, transmitting, to the first user, an update associated with the first electronic timing data associated with the second user, wherein the receiving, from the first user, the third request to close the first open time in the first electronic timing data is based on receiving, from the first user, an electronic transmittables transmission, wherein the first user is a first category user, wherein the second user is a second category user, enabling the first user to like or follow the second user, or enabling the second user to like or follow the first user, enabling a first first category user to follow or like a second first category user or a first second category user, or enabling the first second category user to follow or like a second second category user or the first first category user, providing an option for the first user to be invisible, hidden, or anonymous on the computing network, wherein the option is approved for the first user in response to an electronic transmittables transmission received from the first user, wherein a user interface presented to the first user provides an update associated with the second user, wherein a first electronic transmittables transmission amount indicator or a first item indicator is set by the second user, preventing the second user from setting a first electronic transmittables transmission amount indicator or a first item indicator to be less than a threshold amount, providing a time window for the second user to cancel or propose rescheduling of the first closed time, wherein the time window expires prior to the first closed time, or expires a first duration prior to the first closed time, wherein in response to the second user canceling the first closed time, a first electronic transmittables amount is transmitted back to a first account associated with the first user, wherein in response to the first user disapproving a first rescheduled closed time, a first electronic transmittables amount is transmitted back to a first account associated with the first user, providing a suggested first electronic transmittables transmission amount indicator or a suggested first item indicator to the second user, wherein the suggested amount is generated by an AI/ML operation, receiving, from the first user or the first computing device, an amount of electronic transmittables associated with a first electronic transmittables transmission amount indicator or associated with a first item indicator, associated with the first open time, wherein the first closed time is associated with an in-person, video-based, or virtual meeting between the first user and the second user, wherein a first electronic transmittables transmission amount indicator or a first item indicator is displayed in the first open time in the first electronic timing data, wherein second electronic timing data associated with the first user comprises the first closed time, wherein the second image or video, or another image or video, associated with the second user is comprised in a first visual representation of the first closed time, wherein the first electronic timing data associated with the second user comprises the first closed time, wherein the first image or video associated with the first user is comprised in a first visual representation of the first closed time, wherein the first electronic timing data associated with the second user comprises the first closed time, wherein an image or video associated with a first location associated with the first closed time is comprised in a first visual representation of the first closed time, wherein the first electronic timing data associated with the second user comprises the first closed time, wherein an image associated with the second user and an image associated with the first user is comprised in a first visual representation of the first closed time, wherein second electronic timing data associated with the first user comprises an open period, wherein the second image or video associated with the second user is comprised in a first visual representation of the open period and presented as a suggested user, wherein acceptance of the third request to close the first open time is received from the second user or automatically established based on a preference established by the second user, enabling the second user to create the first open time in the first electronic timing data, transmitting, using the one or more hardware computing device processors, a periodic notification, associated with the first closed time in the first electronic timing data, to the second user or the second computing device, or to the first user or the first computing device, wherein the first electronic timing data comprises an electronic calendar, wherein the first user or the second user establishes a setting to hide or alter at least some content associated with the first user profile or the second user profile, respectively, from or to a sixth user, wherein the at least some content comprises a location, an image, a video, or text, wherein the first closed time is not associated with an electronic video-based meeting between the first user and the second user, wherein the first closed time is associated with an electronic video-based meeting between the first user and the second user, wherein the first closed time is associated with an in-person meeting between the first user and the second user, wherein the first electronic timing data comprises a second closed period associated with an electronic video-based meeting, providing a link for the second user to share, in the computing network or outside the computing network, or in a social network, an invitation to close an open period in the first electronic timing data, wherein the open period is associated with a location selected or input by the second user, wherein the open period is associated with an electronic transmittables amount or an item indicator established by the second user or established based on a bidding operation engaged in by at least one first category user, providing a link for the second user to share, in the computing network or outside the computing network, or in a social network, the second user profile or content in the second user profile, providing a locking option to the second user for locking first content associated with the second user profile, enabling the second user to provide, to a sixth user, access of an account, or content associated with the account, associated with the second user, wherein the sixth user is an assistant, a helper, or a manager, providing a user interface for a manager, helper, or assistant to manage one or more functions or operations in the computing network for a first category user or a second category user, providing a virtual assistant to at least one of the first user or the second user, providing a countdown timer associated with completion of transmission of electronic transmittables to the second user, transmitting a message, from the first user, to the second user, after the first closed time, in response to the third request to close the first open time in the first electronic timing data, transmitting a message to the first user requesting additional data, wherein received data from the first user is transmitted to the second user, opening a messaging channel between the first user and the second user such that the first user and the second user can exchange visual messages on the messaging channel, wherein the messaging channel is opened after the closing the first open time, wherein the messaging channel is closed after the first closed time, wherein the messaging channel is opened based on transmission of an electronic transmittables amount received from the first user, enabling the first user to: unlock profile content associated with the second user profile, send to or receive from the first user a visual message, a text message, or a video message, initiate a voice or video call with the first user, at least one of prior to or after the first closed time, based on an enabling computing operation executed by the first user, wherein the enabling computing operation comprises initiating transmission of electronic transmittables to at least one of an account associated with the second user or an account associated with the computing network, wherein at least a first portion of a first electronic transmittables transmission amount, a first item electronic transmittables transmission amount, or a second electronic transmittables transmission amount equal to or greater than the first electronic transmittables transmission amount, is transmitted to a first user account associated with the second user, and at least a second portion of the first electronic transmittables transmission amount, the first item electronic transmittables transmission amount, or the second electronic transmittables transmission amount equal to or greater than the first electronic transmittables transmission amount, is transmitted to a platform account associated with the computing network, wherein the platform account comprises a trust account managed by an entity outside the computing network, wherein the first portion or the second portion is determined based on an activity or user data of the second user, wherein a first electronic transmittables transmission amount, a first item electronic transmittables transmission amount, or a second electronic transmittables transmission amount equal to or greater than the first electronic transmittables transmission amount is set by the second user, providing an application programming interface (API) to connect with one or more external servers or applications, wherein the timing network application comprises an electronic calendar synchronizable with a second application, wherein the first user is a first male, and wherein the second user is a first female, wherein the first user is a first gender, and wherein the second user is a second gender or the first gender, wherein a duration of the first open time is modifiable by the second user, but not by the first user, enabling the first electronic timing data from the timing network application to be synchronized with second electronic timing data from a social networking or calendaring or scheduling application, exporting the first closed time to a timing application, importing a closed period, from electronic timing data associated with a timing application, to the timing network application, synchronizing first data from the timing network application with second data from a timing application, wherein electronic transmittables are associated with or comprised in a pre-loaded account associated with the first user, wherein electronic transmittables comprises at least one of a real asset, a physical asset, a virtual asset, a point, real currency, cryptocurrency, an asset, Bitcoin, or a virtual currency, providing a badge to the first user in response to activity associated with the first user or in response to a request received from the first user, providing a mobile application to the second user for tracking or recording location history of the second user, providing a mobile application to the first user for tracking or recording location history of the first user, receiving a first tracked location and a first tracked time for the second user, wherein the first tracked location comprises a starting location prior to the second user traveling to a location associated with the first closed time, receiving a second tracked location and a second tracked time for the second user, wherein the second tracked location comprises a location associated with the first closed time, receiving a third tracked location and a third tracked time for the second user, wherein the third tracked location comprises a location associated with the first closed time, receiving a fourth tracked location and a fourth tracked time for the second user, wherein the fourth tracked location comprises an ending safe location after the second user travels from a location associated with the first closed time, providing a user interface for the second user to record a location and a time of the second user, or a computing device of the second user, in response to an interaction with the user interface, wherein the location and the time of the second user are recorded in a log, receiving a first tracked location and a first tracked time for the first user, wherein the first tracked location comprises a starting location prior to the first user traveling to a location associated with the first closed time, receiving a second tracked location and a second tracked time for the first user, wherein the second tracked location comprises a location associated with the first closed time, receiving a third tracked location and a third tracked time for the first user, wherein the third tracked location comprises a location associated with the first closed time, receiving a fourth tracked location and a fourth tracked time for the first user, wherein the fourth tracked location comprises an ending safe location after the first user travels from a location associated with the first closed time, providing a user interface for the first user to record a location and a time of the first user, or a computing device of the first user, in response to an interaction with the user interface, wherein the location and the time of the first user are recorded in a log, receiving an image from a computing device of the second user, wherein the image is added to a log, receiving an image from a computing device of the first user, wherein the image is added to a log, receiving a first tracked location and a first tracked time for the second user, wherein the first tracked location comprises a location associated with the first closed time, and wherein the first tracked time comprises a starting time associated with the first closed time, receiving a first tracked location and a first tracked time for the first user, wherein the first tracked location comprises a location associated with the first closed time, and wherein the first tracked time comprises a starting time associated with the first closed time, providing a countdown timer on a user interface of a computing device of the second user or the first user, providing a countdown timer on a user interface of a computing device of the second user in response to receiving a first tracked time, receiving a tracked location and a tracked time for the second user, wherein the tracked location comprises a location associated with the first closed time, and wherein the tracked time comprises an ending time associated with the first closed time, providing an option for the first user to add a closed period following expiration of the first closed time, providing, for visual display, on a user interface of the first computing device associated with the first user, at least one live or recorded video stream of the second user, providing an option for the first user to unlock the second user profile, or at least a second portion of the second user profile, of the second user, wherein the second portion of the second user profile comprises the at least the first portion of the first electronic timing data, wherein selecting the option comprises initiating transmission of an amount of electronic transmittables to an account associated with the second user, providing an option for the first user to view users outside of an allowed location or distance associated with the first user, wherein selecting the option comprises initiating transmission of an amount of electronic transmittables, integrating the computing network with a ride-booking, travel-booking, restaurant-booking, gift-sending, or electronic commerce function, integrating the computing network with a ride-booking, travel-booking, restaurant-booking, or gift-sending function, wherein the first user is of a first category type and wherein the second user is of a second category type, receiving a first offer of electronic transmittables for an open period, and automatically rejecting the first offer based on determining the first offer is less than or equal to a threshold transmittables established by the second user or automatically established, wherein a threshold transmittables comprises a reserve amount of transmittables, receiving a second offer of electronic transmittables for the open period, and entering the second offer, wherein the second offer is displayed on a user interface such that the second offer, and an identifiable user associated with the second offer, are displayed on a user interface of at least one of the second user, the first user, a first category user, or a second category user, wherein the second offer is displayed on a user interface such that the second offer, and a non-identifiable or anonymous user associated with the second offer, are displayed on a user interface of at least one of the second user, the first user, a first category user, or a second category user, wherein a non-identifiable user is identifiable to the second user having the open period in the first electronic timing data, wherein a bidding duration associated with the open period is customizable by the second user associated with the open period, wherein the second user sets one or more user conditions associated with qualifying for submitting a bid, wherein one or more conditions associated qualifying for submitting a bid comprises a distance or location of a user, an income of the user, a net worth of the user, a facial or body feature of the user, a background of the user, an education of the user, a personal or professional status of the user, an age of an account of the user, an activity of the user on the computing network, a number of closed times associated with the user, or a number of electronic transmittables transmitted from an account associated with the user, wherein an offer is received as part of a bidding operation initiated by the second user, wherein at least one offer received as part of a bidding operation is viewable to a first category user or a second category user, wherein a bidding operation is presented on a user interface viewable to a first category user or a second category user, wherein a bidding operation is presented as part of multiple bidding operations being executed on the computing network, wherein a bidding operation is presented in a list or stack of bidding operations based on a number of offers received, a current value of an open period being bidded on, user data associated with a user associated with the open period, a number of views of the bidding operation or a user profile of the user, a location associated with the open period or the user, an amount of time for which the bidding operation has been open, or an amount of time for expiration of the bidding operation, wherein a user associated with an open period being bidded on has an option to reject an offer associated with a bidding operation either during the bidding operation or after expiration of the bidding operation, generating, using a generative AI/ML computing operation, a first image based on a second image uploaded by the second user, wherein the second image comprises a background, foreground, or facial feature customizable by the second user, implementing an edit to a first image based on input received from the second user, establishing a connection with an application server, wherein the application server provides an application for use in the computing network, determining a trending user, associated with a location, on the computing network, initiating visual display of a trending user to first category users or second category users associated with a location, initiating visual display of trending users associated with at least two different locations, enabling a collaborating user to access data associated with a trending user, initiating display of visual data on a user interface based on analyzing at least one of data or content associated with a user profile associated with the second user or the first user, modifying, based on a permission being assigned to or associated with the first user or a manager user, access to the first electronic timing data associated with the second user, modifying, for the first user, access to a portion of the first electronic timing data after successful closing of the first time, wherein a period before and after the first closed time, from the first electronic timing data, is hidden from, not visible to, or altered in visual state, for the first user, wherein the first electronic timing data is not accessible to at least one of a first category user or a second category user, wherein a search parameter for conducting a search among first category users or among second category users is received from a user or is automatically set based on user data associated with the user, providing a messaging option for the first user to send a message to the second user or for the second user to access the message sent by the first user, wherein the messaging option comprises at least one of a text message option, a voice call option, or a video call option, wherein the messaging option is activated based on successful execution of an electronic transmittables computing operation, wherein the messaging option provides a first number of messages or provides a first amount of time during which the first user sends one or more messages to the second user, enabling the second user to share, in or outside the computing network, a link associated with the second user profile of the second user, enabling the second user to share, in or outside the computing network, a link associated with the first electronic timing data associated with the second user or a link associated with an open time associated with the first electronic timing data, enabling the first user to share, in or outside the computing network, a link associated with the first user profile of the first user, enabling the first user to share, in or outside the computing network, a link associated with second electronic timing data associated with the first user or a link associated with an open time associated with the second electronic timing data, in response to successfully closing the first open time, opening a messaging channel for the first user and the second user to exchange messages, and closing the messaging channel upon expiration of a notification period, wherein the notification period expires a first duration after the first closed time, wherein the second user sets a parameter associated with submission or transmission of an electronic transmittables amount for closing the first open time, wherein a user that does not meet the parameter cannot transmit or submit the electronic transmittables amount for closing the first open time, wherein the first user or the third user meets the parameter associated with the submission or the transmission of the electronic transmittables amount, initiating display, on the first computing device associated with the first user, a first electronic transmittables amount, a first item electronic transmittables amount, or a first item associated with the first item electronic transmittables amount, and a first amount of time remaining to close the first open period, wherein the first closed time is associated with a location determined by at least one of the first user or the second user, or receiving at, prior to, about, or after the first closed time, a notification from the first user indicating that the first user is at least one of present at or near a location determined by at least one of the first user or the second user, is satisfying or satisfied a condition associated with the first closed time, can physically or virtually view the second user, or is physically, virtually, or electronically present in a physical, virtual, or electronic presence of the second user, wherein the notification further comprises at least one of a time of reception of the notification, a time of transmission of the notification from a mobile device of the first user, location data of the mobile device of the first user at the time of the transmission of the notification from the mobile device of the first user, an image or video displaying at least one of the first user or the second user, an image or video displaying both the first user and the second user, metadata associated with the image or video displaying the at least one of the first user or the second user, time of capture of the image or video displaying the at least one of the first user or the second user, a geographical or network location of capture of the image or video displaying the at least one of the first user or the second user, or a signature or fingerprint of at least one of the first user or the second user.

28. A method for controlling a computing operation in a computing network, the method comprising:

providing a computing network usable by computing users registered with the computing network;

providing a timing network application usable by the computing users registered with the computing network, wherein the timing network application is used to modify electronic timing data;

determining, using one or more hardware computing device processors, a first user accesses, using a first computing device associated with the first user, the computing network;

enabling, using the one or more hardware computing device processors, the first user to create a first user profile, wherein the first user profile comprises a first image or video, and wherein the first user profile is associated with a first location;

determining, using the one or more hardware computing device processors, a second user accesses, using a second computing device associated with the second user, the computing network;

enabling, using the one or more hardware computing device processors, the second user to create a second user profile, wherein the second user profile comprises a second image or video, and wherein the second user profile is associated with a second location;

enabling, using the one or more hardware computing device processors, the second user to modify, using the timing network application, first electronic timing data, wherein the first electronic timing data comprises a first open time;

executing, using the one or more hardware computing device processors, a first search operation, based on one or more first search parameters associated with the first user, wherein the one or more first search parameters comprises a first location-based search parameter;

generating, using the one or more hardware computing device processors, based on the first location-based search parameter, one or more first search results;

transmitting, using the one or more hardware computing device processors, the one or more first search results to the first computing device of the first user, wherein the one or more first search results comprises at least a portion of the second user profile, wherein a first search result and a second search result are comprised in the one or more first search results, wherein the first search result and the second search result are presented either sequentially or are arranged together on at least one first interface of the first computing device of the first user;

executing, using the one or more hardware computing device processors, a second search operation, based on one or more second search parameters associated with the second user, wherein the one or more second search parameters comprises a second location-based search parameter;

generating, using the one or more hardware computing device processors, based on the second location-based search parameter, one or more second search results;

transmitting, using the one or more hardware computing device processors, the one or more second search results to the second computing device of the second user, wherein the one or more second search results comprises at least a portion of the first user profile;

wherein a third search result and a fourth search result are comprised in the one or more second search results, wherein the third search result and the fourth search result are presented either sequentially or are arranged together on at least one second interface of the second computing device of the second user;

receiving, using the one or more hardware computing device processors, from the first computing device associated with the first user, a first request to view the first electronic timing data associated with the second user;

transmitting, using the one or more hardware computing device processors, to the first computing device associated with the first user, at least a first portion of the first electronic timing data, wherein the at least the first portion of the first electronic timing data comprises the first open time, and wherein the first open time is presented in a first visual state;

receiving, using the one or more hardware computing device processors, from the first computing device associated with the first user, a second request to view the at least the portion of the second user profile;

transmitting, using the one or more hardware computing device processors, to the first computing device associated with the first user, the at least the portion of the second user profile;

receiving, using the one or more hardware computing device processors, from the first user, a third request to close the first open time in the first electronic timing data;

closing, using the one or more hardware computing device processors, at a first time, the first open time in the first electronic timing data, thereby resulting in a first closed time in the first electronic timing data, wherein the first closed time is presented in a second visual state different from the first visual state, wherein the first closed time occurs after the first time;

transmitting, using the one or more hardware computing device processors, a first notification, associated with the first closed time in the first electronic timing data, to the second user or the second computing device;

transmitting, using the one or more hardware computing device processors, a second notification, associated with the first closed time in the first electronic timing data, to the first user or the first computing device;

determining, using the one or more hardware computing device processors, a third user accesses, using a third computing device associated with the third user, the computing network;

enabling, using the one or more hardware computing device processors, the third user to create a third user profile, wherein the third user profile comprises a third image or video, and wherein the third user profile is associated with a third location;

executing, using the one or more hardware computing device processors, a third search operation based on one or more third search parameters associated with the third user, wherein the one or more third search parameters comprises a third location-based search parameter;

generating, using the one or more hardware computing device processors, based on the third location-based search parameter, one or more third search results;

transmitting, using the one or more hardware computing device processors, the one or more third search results to the third computing device of the third user, wherein the one or more third search results comprises the at least the portion of the second user profile;

receiving, using the one or more hardware computing device processors, from the third computing device associated with the third user, a fourth request to view the at least the portion of the second user profile;

transmitting, using the one or more hardware computing device processors, to the third computing device associated with the third user, the at least the portion of the second user profile;

receiving, using the one or more hardware computing device processors, at a second time different from the first time and a third time, from the third computing device associated with the third user, a fifth request to view the first electronic timing data;

transmitting, using the one or more hardware computing device processors, to the third computing device associated with the third user, at least a second portion of the first electronic timing data or at least a third portion of the first electronic timing data, wherein one of:

the at least the second portion of the first electronic timing data or the at least the third portion of the first electronic timing data comprises the first closed time, wherein the first closed time is presented in the second visual state or a third visual state, or the at least the second portion of the first electronic timing data or the at least the third portion of the first electronic timing data does not comprise the first closed time; and providing, using the one or more hardware computing device processors, an option for the second user, and not for the third user, to modify, during a modification period, the first closed time in the first electronic timing data, implementing a sequential order of the first search result and the second search result, or an arrangement of the first search result and the second search result, based on: a first activity, on the computing network, of a fourth user associated with the first search result or initiated by one or more first users directed to the fourth user associated with the first search result, and a second activity, on the computing network, of a fifth user associated with the second search result or initiated by the one or more first users, or one or more second users, directed to the fifth user associated with the second search result.

29. A method for controlling a computing operation in a computing network, the method comprising:

providing a computing network usable by computing users registered with the computing network;

providing a timing network application usable by the computing users registered with the computing network, wherein the timing network application is used to modify electronic timing data;

determining, using one or more hardware computing device processors, a first user accesses, using a first computing device associated with the first user, the computing network;

enabling, using the one or more hardware computing device processors, the first user to create a first user profile;

determining, using the one or more hardware computing device processors, a second user accesses, using a second computing device associated with the second user, the computing network;

enabling, using the one or more hardware computing device processors, the second user to create a second user profile, wherein the second user profile comprises a first image or video, and wherein the second user profile is associated with a first location;

enabling, using the one or more hardware computing device processors, the second user to modify, using the timing network application, first electronic timing data, wherein the first electronic timing data comprises a first open time;

receiving, using the one or more hardware computing device processors, from the second user, a first electronic transmittables transmission amount indicator associated with a first electronic transmittables transmission amount, or a first item indicator associated with a first item electronic transmittables transmission amount, associated with closing the first open time;

executing, using the one or more hardware computing device processors, a first search operation, based on one or more first search parameters associated with the first user, wherein the one or more first search parameters comprises a first location-based search parameter;

generating, using the one or more hardware computing device processors, based on the first location-based search parameter, one or more first search results, wherein a first search result and a second search result are comprised in the one or more first search results;

transmitting, using the one or more hardware computing device processors, the one or more first search results to the first computing device of the first user, wherein the one or more first search results comprises at least a portion of the second user profile, wherein the first search result and the second search result are presented either sequentially or are arranged together on at least one interface;

receiving, using the one or more hardware computing device processors, from the first computing device associated with the first user, a first request to view the first electronic timing data associated with the second user;

transmitting, using the one or more hardware computing device processors, to the first computing device associated with the first user, at least a first portion of the first electronic timing data, wherein the at least the first portion of the first electronic timing data comprises the first open time, wherein the first open time is presented in a first visual state, and wherein the first electronic transmittables transmission amount indicator is displayed as being associated with the first open time or wherein the first item indicator is displayed as being associated with the first open time;

receiving, using the one or more hardware computing device processors, from the first computing device associated with the first user, a second request to view the at least the portion of the second user profile;

transmitting, using the one or more hardware computing device processors, to the first computing device associated with the first user, the at least the portion of the second user profile;

receiving, using the one or more hardware computing device processors, from the first user, a third request to close the first open time in the first electronic timing data;

executing, using the one or more hardware computing device processors, a preliminary computing operation for initiating transmission of at least the first electronic transmittables transmission amount, at least the first item electronic transmittables transmission amount, or a second electronic transmittables transmission amount equal to or greater than the first electronic transmittables transmission amount;

transmitting, using the one or more hardware computing device processors, verification data associated with the at least the first electronic transmittables transmission amount, the at least the first item electronic transmittables transmission amount, or the second electronic transmittables transmission amount to a processing application or server;

receiving, using the one or more hardware computing device processors, from the processing application or server, an indication that the preliminary computing operation is successfully executed;

in response to successful execution of the preliminary computing operation:

closing, using the one or more hardware computing device processors, at a first time, the first open time in the first electronic timing data, thereby resulting in a first closed time in the first electronic timing data, wherein the first closed time is presented in a second visual state different from the first visual state, wherein the first closed time occurs after the first time, transmitting, using the one or more hardware computing device processors, a first notification, associated with the first closed time in the first electronic timing data, to the second user or the second computing device, and transmitting, using the one or more hardware computing device processors, a second notification, associated with the first closed time in the first electronic timing data, to the first user or the first computing device;

determining, using the one or more hardware computing device processors, a third user accesses, using a third computing device associated with the third user, the computing network;

enabling, using the one or more hardware computing device processors, the third user to create a third user profile;

executing, using the one or more hardware computing device processors, a second search operation based on one or more second search parameters associated with the third user, wherein the one or more second search parameters comprises a second location-based search parameter;

generating, using the one or more hardware computing device processors, based on the second location-based search parameter, one or more second search results;

transmitting, using the one or more hardware computing device processors, the one or more second search results to the third computing device of the third user, wherein the one or more second search results comprises the at least the portion of the second user profile;

receiving, using the one or more hardware computing device processors, from the third computing device associated with the third user, a fourth request to view the at least the portion of the second user profile;

transmitting, using the one or more hardware computing device processors, to the third computing device associated with the third user, the at least the portion of the second user profile;

receiving, using the one or more hardware computing device processors, at a second time different from the first time and a third time, from the third computing device associated with the third user, a fifth request to view the first electronic timing data;

transmitting, using the one or more hardware computing device processors, to the third computing device associated with the third user, at least a second portion of the first electronic timing data or at least a third portion of the first electronic timing data, wherein one of:

the at least the second portion of the first electronic timing data or the at least the third portion of the first electronic timing data comprises the first closed time, wherein the first closed time is presented in the second visual state or a third visual state, or the at least the second portion of the first electronic timing data or the at least the third portion of the first electronic timing data does not comprise the first closed time;

providing, using the one or more hardware computing device processors, an option for the second user, and not for the third user, to modify, during a modification period, the first closed time, or data associated with the first closed time, in the first electronic timing data;

receiving at, prior to, about, or after the first closed time, a third notification from the first user indicating that the first user is at least one of: present at or near a second location determined by at least one of the first user or the second user, is satisfying or satisfied a condition associated with the first closed time, can physically or virtually view the second user, or is physically, virtually, or electronically present in a physical, virtual, or electronic presence of the second user;

implementing a sequential order of the first search result and the second search result, or an arrangement of the first search result and the second search result, based on: a first activity, on the computing network, of a fourth user associated with the first search result or initiated by one or more first users directed to the fourth user associated with the first search result, and a second activity, on the computing network, of a fifth user associated with the second search result or initiated by the one or more first users, or one or more second users, directed to the fifth user associated with the second search result.

30. The method of claim 29, further comprising at least one of:

adjusting, using a resource allocator, one or more computing operations executable in the computing network, based on at least one of: a computing load associated with the computing network, an available storage or memory associated with the computing network, a number or type of users associated with the computing network or online on the computing network, or a number or type of operations being executed or to be executed by the computing network, wherein the resource allocator is controlled by a basic input/output system (BIOS) or a resource-controlling system, executing a conclusive computing operation based on receipt of the third notification, wherein the conclusive computing operation: causes further processing of the transmission of the at least the first electronic transmittables transmission amount, the at least the first item electronic transmittables transmission amount, or the second electronic transmittables transmission amount equal to or greater than the first electronic transmittables transmission amount, to an account associated with the second user, or causes further processing of a purchase of an item associated with the at least the first item electronic transmittables transmission amount or the second electronic transmittables transmission amount such that the item is subsequently shipped or transmitted to a physical or virtual address associated with the second user, transmitting the third notification to the second user, receiving at, prior to, about, or after the first closed time, a fourth notification from the second user indicating that the second user is at least one of present at or near the second location determined by the at least one of the first user or the second user, is satisfying or satisfied a second condition associated with the first closed time, can physically or virtually view the first user, or is physically, virtually, or electronically present in a physical, virtual, or electronic presence of the first user, executing a second conclusive computing operation based on receipt of the fourth notification and the third notification, wherein the second conclusive computing operation: causes further processing of the transmission of the at least the first electronic transmittables transmission amount, the at least the first item electronic transmittables transmission amount, or the second electronic transmittables transmission amount equal to or greater than the first electronic transmittables transmission amount, to the account associated with the second user, or causes further processing of the purchase of the item associated with the at least the first item electronic transmittables transmission amount or the second electronic transmittables transmission amount such that the item is subsequently shipped or transmitted to the physical or virtual address associated with the second user, wherein an option to the transmit the fourth notification from a mobile device of the second user is activated after receiving the third notification from the first user, or receiving at, prior to, about, or after the first closed time, the fourth notification from the second user indicating that the second user is at least one of present at or near the second location determined by the at least one of the first user or the second user, is satisfying or satisfied the second condition associated with the first closed time, can physically or virtually view the first user, or is physically, virtually, or electronically present in the physical, virtual, or electronic presence of the first user, wherein the fourth notification further comprises at least one of a time of reception of the fourth notification, a time of transmission of the fourth notification from the mobile device of the second user, location data of the mobile device of the second user at the time of the transmission of the fourth notification from the mobile device of the second user, a second image or video displaying the at least one of the first user or the second user, a third image or video displaying both the first user and the second user, metadata associated with the second image or video displaying the at least one of the first user or the second user, time of capture of the second image or video displaying the at least one of the first user or the second user, a geographical or network location of capture of the second image or video displaying the at least one of the first user or the second user, or a signature or fingerprint of the at least one of the first user or the second user.

* * * * *